United States Patent [19]

Hartford et al.

[11] 4,255,789

[45] Mar. 10, 1981

[54] MICROPROCESSOR-BASED ELECTRONIC ENGINE CONTROL SYSTEM

[75] Inventors: Thomas W. Hartford, Livonia; Edwin A. Johnson, Clarkston, both of Mich.; Frank A. Russo, Williamsburg, Va.

[73] Assignee: The Bendix Corporation, Southfield, Mich.

[21] Appl. No.: 881,321

[22] Filed: Feb. 27, 1978

[51] Int. Cl.[3] .......................... F02D 5/00; F02B 3/02; F02P 5/04; G05B 15/02

[52] U.S. Cl. .................................... 364/431; 364/723

[58] Field of Search ............... 364/424, 431, 442, 200, 364/900, 550; 123/32 EB, 32 EE, 32 EH, 32 EC, 32 EA, 117 D, 117 R, 119 EC; 340/347 AD; 235/304.1

[56] References Cited

U.S. PATENT DOCUMENTS

| | | | |
|---|---|---|---|
| 3,553,654 | 1/1971 | Crane | 364/200 |
| 3,581,304 | 5/1971 | Paradise et al. | 340/347 AD |
| 3,636,555 | 1/1972 | Waaben | 340/347 AD |
| 3,661,126 | 5/1972 | Baxendale | 123/32 EH |
| 3,688,221 | 8/1972 | Fruhalf | 340/347 AD |
| 3,749,065 | 7/1973 | Rothfusz et al. | 123/32 EH |
| 3,835,819 | 9/1974 | Anderson, Jr. | 123/32 EA |
| 3,858,561 | 1/1975 | Aono | 123/119 R |
| 3,867,717 | 2/1975 | Moehring et al. | 364/431 |
| 3,893,432 | 7/1975 | Krupp et al. | 123/32 EA |
| 3,919,533 | 11/1975 | Einolf, Jr. et al. | 235/304.1 |
| 3,969,614 | 7/1976 | Moyer et al. | 364/431 |
| 3,996,911 | 12/1976 | Canup | 364/424 |
| 4,008,698 | 2/1977 | Gartner | 123/117 R |
| 4,009,699 | 3/1977 | Hetzler et al. | 364/431 |
| 4,020,802 | 5/1977 | Hattori et al. | 123/32 EH |
| 4,035,780 | 7/1977 | Kristick et al. | 364/900 |
| 4,099,495 | 7/1978 | Kiencke et al. | 123/32 EB |
| 4,100,891 | 7/1978 | Williams | 123/32 EB |
| 4,115,864 | 9/1978 | Vick et al. | 364/550 |
| 4,121,554 | 10/1978 | Sueishi et al. | 123/32 EE |
| 4,126,107 | 11/1978 | Harada et al. | 123/32 EH |
| 4,127,091 | 11/1978 | Léichlé | 123/117 D |
| 4,130,095 | 12/1978 | Bowler et al. | 123/119 EC |
| 4,132,193 | 1/1979 | Takase et al. | 123/119 EC |
| 4,132,200 | 1/1979 | Asano et al. | 123/119 EC |

FOREIGN PATENT DOCUMENTS

| | | | |
|---|---|---|---|
| 2551639 | 6/1977 | Fed. Rep. of Germany | 123/32 EC |

*Primary Examiner*—Felix D. Gruber

*Attorney, Agent, or Firm*—Gaylord P. Haas, Jr.; Russel C. Wells

[57] ABSTRACT

A method and apparatus for controlling the various functions of an internal combustion engine using a program-controlled microprocessor having a memory preprogrammed with various control laws and associated control schedules receives information concerning one or more engine operating parameters such as manifold pressure, throttle position, engine coolant temperature, air temperature, and engine speed or period and the like. These parameters are sensed and then supplied to input circuits for signal conditioning and conversion to digital words usable by the microprocessor. The microprocessor-based electronic engine control system computes a digital word indicative of a computer-commanded engine control operation and output circuitry responds to predetermined computer-generated commands and to the computed digital command words for converting them to corresponding pulse-width control signals or the like for controlling such engine operations as fuel-injection ignition timing, proportional and/or on-off EGR control, and the like.

22 Claims, 216 Drawing Figures

*Microprocessor-Based Electronic Engine Control System*

Microprocessor-Based Electronic Engine Control System

Analog To Digital Converter

Pressure Sensor
Signal Amplifier & Comparator

Air Temperature Sensor
Signal Amplifier & Comparator

Engine Coolant Temperature Sensor
Signal Amplifier & Comparator

Throttle Position Sensor Signal Amplifier & Comparator

Oxygen Sensor Signal Conditioning System

Ramp Generator

Timing Diagram

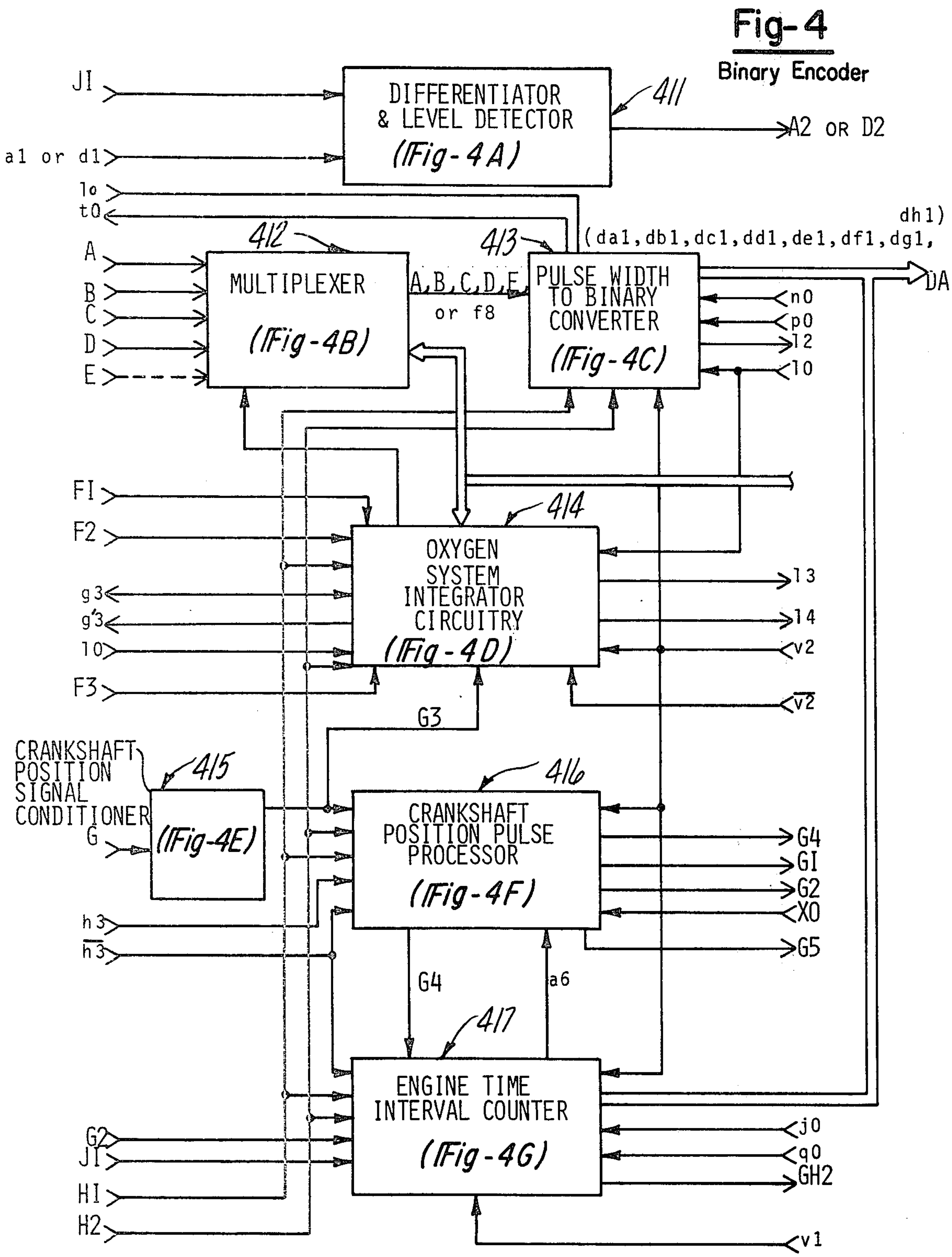
Fig-4
Binary Encoder
J1
a1 or d1
DIFFERENTIATOR & LEVEL DETECTOR
(Fig-4A)
411
A2 OR D2
1o
t0
412
413
(da1,db1,dc1,dd1,de1,df1,dg1, dh1)
A
B
C
D
E
MULTIPLEXER
(Fig-4B)
A,B,C,D,E
or f8
PULSE WIDTH TO BINARY CONVERTER
(Fig-4C)
DA
n0
p0
12
10
F1
F2
g3
g'3
10
F3
OXYGEN SYSTEM INTEGRATOR CIRCUITRY
(Fig-4D)
414
13
14
v2
v2
G3
CRANKSHAFT POSITION SIGNAL CONDITIONER
415
G
(Fig-4E)
416
CRANKSHAFT POSITION PULSE PROCESSOR
(Fig-4F)
G4
G1
G2
X0
G5
h3
h3
G4
a6
417
ENGINE TIME INTERVAL COUNTER
(Fig-4G)
G2
J1
H1
H2
j0
q0
GH2
v1

Differentiator & Level Detector

Multiplexer

Pulse Width To Binary Converter Block Diagram

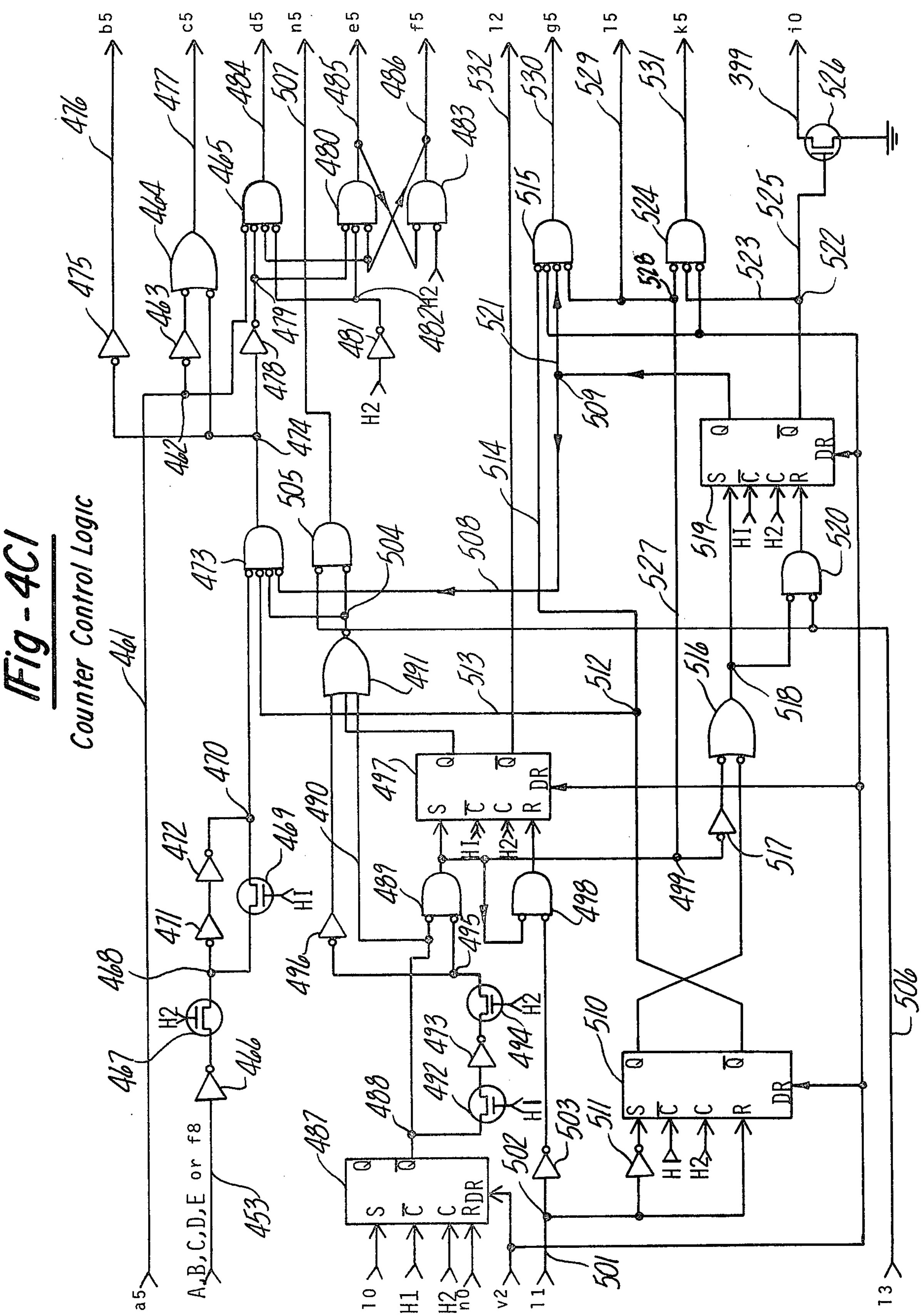
Fig-4C1
Counter Control Logic

Fig - 4C2
Ramp Reset Control Counter
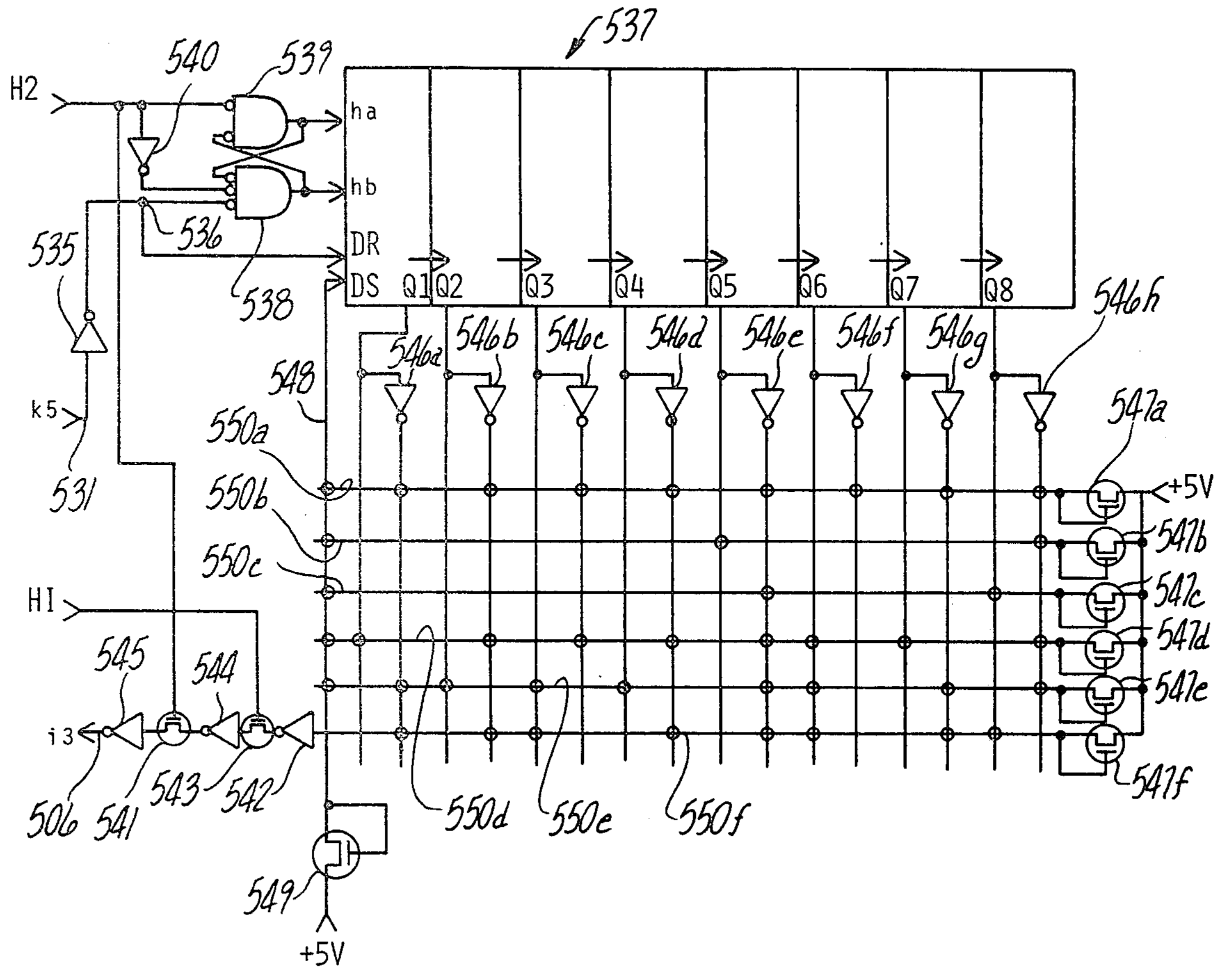

Fig-4C3 Count State Table For Eight Stage Counter Of Fig-4C2, Fig-4D9

| COUNT | COUNTER STAGE VALUE 12345678 |
|---|---|
| 1 | 00000000 |
| 2 | 10000000 |
| 3 | 11000000 |
| 4 | 11100000 |
| 5 | 11110000 |
| 6 | 11111000 |
| 7 | 01111100 |
| 8 | 00111110 |
| 9 | 00011111 |
| 10 | 10001111 |
| 11 | 11000111 |
| 12 | 01100011 |
| 13 | 00110001 |
| 14 | 00011000 |
| 15 | 00001100 |
| 16 | 00000110 |
| 17 | 10000011 |
| 18 | 01000001 |
| 19 | 00100000 |
| 20 | 10010000 |
| 21 | 11001000 |
| 22 | 01100100 |
| 23 | 10110010 |
| 24 | 11011001 |
| 25 | 11101100 |
| 26 | 01110110 |
| 27 | 10111011 |
| 28 | 11011101 |
| 29 | 11101110 |
| 30 | 01110111 |
| 31 | 00111011 |
| 32 | 10011101 |
| 33 | 11001110 |
| 34 | 01100111 |
| 35 | 00110011 |
| 36 | 00011001 |
| 37 | 10001100 |
| 38 | 01000110 |
| 39 | 10100011 |
| 40 | 01010001 |
| 41 | 00101000 |
| 42 | 00010100 |
| 43 | 10001010 |
| 44 | 01000101 |
| 45 | 00100010 |
| 46 | 10010001 |
| 47 | 01001000 |
| 48 | 00100100 |
| 49 | 10010010 |
| 50 | 11001001 |
| 51 | 11100100 |
| 52 | 11110010 |
| 53 | 11111001 |
| 54 | 11111100 |
| 55 | 01111110 |
| 56 | 00111111 |
| 57 | 10011111 |
| 58 | 11001111 |
| 59 | 11100111 |
| 60 | 01110011 |
| 61 | 00111001 |
| 62 | 10011100 |
| 63 | 01001110 |
| 64 | 00100111 |
| 65 | 00010011 |
| 66 | 00001001 |
| 67 | 10000100 |
| 68 | 11000010 |
| 69 | 11100001 |
| 70 | 01110000 |
| 71 | 10111000 |
| 72 | 01011100 |
| 73 | 00101110 |
| 74 | 00010111 |
| 75 | 00001011 |
| 76 | 10000101 |
| 77 | 01000010 |
| 78 | 10100001 |
| 79 | 01010000 |
| 80 | 10101000 |
| 81 | 01010100 |
| 82 | 10101010 |
| 83 | 01010101 |
| 84 | 00101010 |
| 85 | 00010101 |
| 86 | 00001010 |
| 87 | 00000101 |
| 88 | 00000010 |
| 89 | 10000001 |
| 90 | 01000000 |
| 91 | 10100000 |
| 92 | 11010000 |
| 93 | 11101000 |
| 94 | 01110100 |
| 95 | 10111010 |
| 96 | 01011101 |
| 97 | 10101110 |
| 98 | 01010111 |
| 99 | 00101011 |
| 100 | 10010101 |
| 101 | 01001010 |
| 102 | 00100101 |
| 103 | 00010010 |
| 104 | 10001001 |
| 105 | 11000100 |
| 106 | 11100010 |
| 107 | 11110001 |
| 108 | 01111000 |
| 109 | 00111100 |
| 110 | 00011110 |
| 111 | 00001111 |
| 112 | 10000111 |
| 113 | 01000011 |
| 114 | 00100001 |
| 115 | 00010000 |
| 116 | 10001000 |
| 117 | 01000100 |
| 118 | 10100010 |
| 119 | 11010001 |
| 120 | 01101000 |
| 121 | 00110100 |
| 122 | 10011010 |
| 123 | 01001101 |
| 124 | 10100110 |
| 125 | 11010011 |
| 126 | 01101001 |
| 127 | 10110100 |
| 128 | 11011010 |
| 129 | 01101101 |
| 130 | 10110110 |
| 131 | 11011011 |
| 132 | 11101101 |
| 133 | 11110110 |
| 134 | 11111011 |
| 135 | 11111101 |
| 136 | 11111110 |
| 137 | 01111111 |
| 138 | 10111111 |
| 139 | 11011111 |
| 140 | 11101111 |
| 141 | 11110111 |
| 142 | 01111011 |
| 143 | 10111101 |
| 144 | 11011110 |
| 145 | 01101111 |
| 146 | 10110111 |
| 147 | 01011011 |
| 148 | 10101101 |
| 149 | 11010110 |
| 150 | 11101011 |
| 151 | 11110101 |
| 152 | 01111010 |
| 153 | 00111101 |
| 154 | 10011110 |
| 155 | 01001111 |
| 156 | 10100111 |
| 157 | 01010011 |
| 158 | 00101001 |
| 159 | 10010100 |
| 160 | 11001010 |
| 161 | 01100101 |
| 162 | 00110010 |
| 163 | 10011001 |
| 164 | 11001100 |
| 165 | 01100110 |
| 166 | 10110011 |
| 167 | 01011001 |
| 168 | 10101100 |
| 169 | 01010110 |
| 170 | 10101011 |
| 171 | 11010101 |
| 172 | 01101010 |
| 173 | 00110101 |
| 174 | 00011010 |
| 175 | 00001101 |
| 176 | 10000110 |
| 177 | 11000011 |
| 178 | 01100001 |
| 179 | 00110000 |
| 180 | 10011000 |
| 181 | 01001100 |
| 182 | 00100110 |
| 183 | 10010011 |
| 184 | 01001001 |
| 185 | 10100100 |
| 186 | 11010010 |
| 187 | 11101001 |
| 188 | 11110100 |
| 189 | 11111010 |
| 190 | 01111101 |
| 191 | 10111110 |
| 192 | 01011111 |
| 193 | 10101111 |
| 194 | 11010111 |
| 195 | 01101011 |
| 196 | 10110101 |
| 197 | 01011010 |
| 198 | 00101101 |
| 199 | 10010110 |
| 200 | 11001011 |
| 201 | 11100101 |
| 202 | 01110010 |
| 203 | 10111001 |
| 204 | 11011100 |
| 205 | 01101110 |
| 206 | 00110111 |
| 207 | 00011011 |
| 208 | 10001101 |
| 209 | 11000110 |
| 210 | 11100011 |
| 211 | 01110001 |
| 212 | 00111000 |
| 213 | 00011100 |
| 214 | 00001110 |
| 215 | 00000111 |
| 216 | 00000011 |
| 217 | 00000001 |

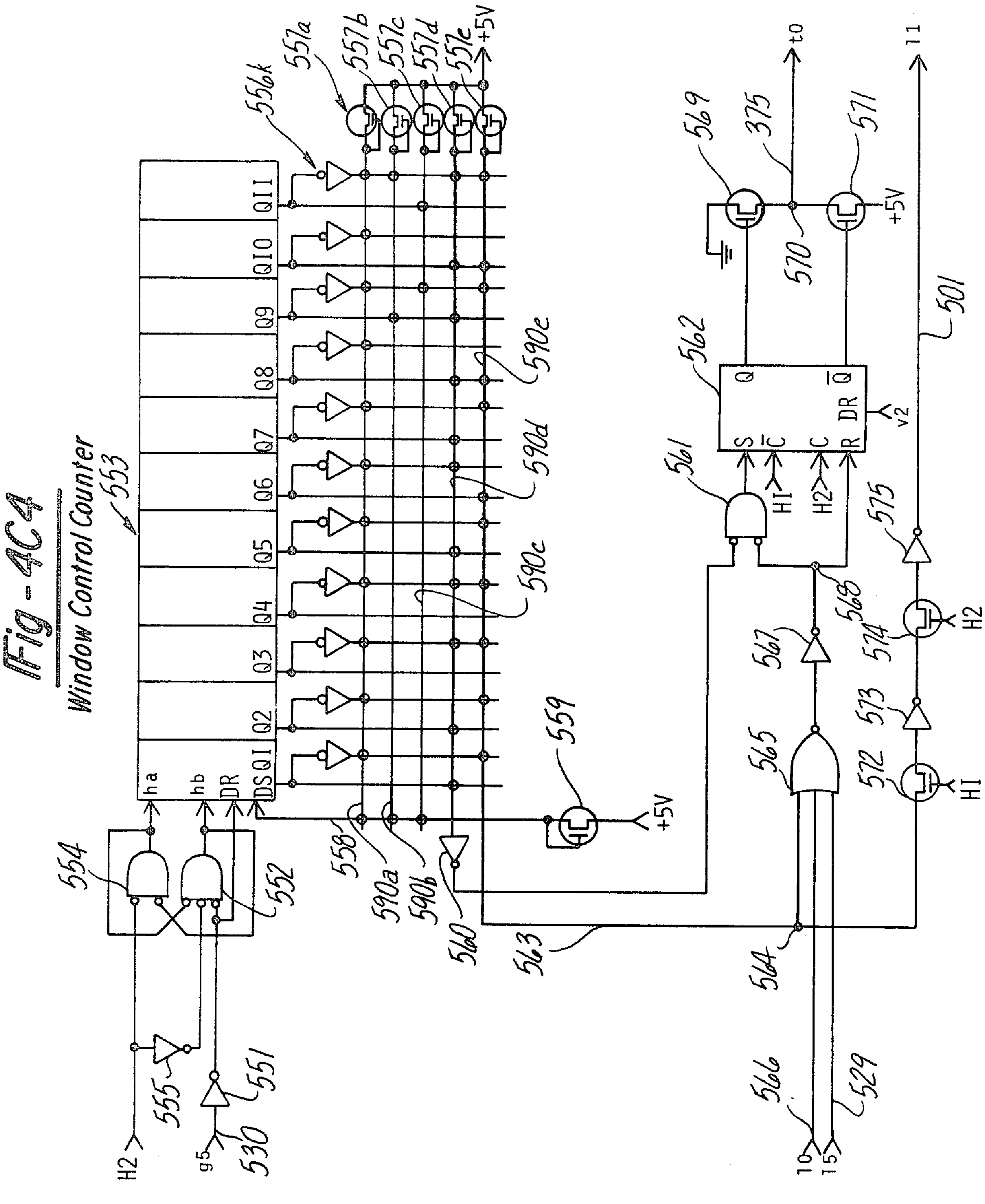
Fig - 4C4
Window Control Counter

Fig - 4C5 (a)

Count State Table For Window Counter Of Fig - 4C4

| COUNT | 1 | 2 | 3 | 4 | 5 | 6 | 7 | 8 | 9 | 10 | 11 |
|---|---|---|---|---|---|---|---|---|---|---|---|
| | COUNTER STAGE VALUE | | | | | | | | | | |
| 1 | 0 | 0 | 0 | 0 | 0 | 0 | 0 | 0 | 0 | 0 | 0 |
| 2 | 1 | 0 | 0 | 0 | 0 | 0 | 0 | 0 | 0 | 0 | 0 |
| 3 | 1 | 1 | 0 | 0 | 0 | 0 | 0 | 0 | 0 | 0 | 0 |
| 4 | 1 | 1 | 1 | 0 | 0 | 0 | 0 | 0 | 0 | 0 | 0 |
| 5 | 1 | 1 | 1 | 1 | 0 | 0 | 0 | 0 | 0 | 0 | 0 |
| 6 | 1 | 1 | 1 | 1 | 1 | 0 | 0 | 0 | 0 | 0 | 0 |
| 7 | 1 | 1 | 1 | 1 | 1 | 1 | 0 | 0 | 0 | 0 | 0 |
| 8 | 1 | 1 | 1 | 1 | 1 | 1 | 1 | 0 | 0 | 0 | 0 |
| 9 | 1 | 1 | 1 | 1 | 1 | 1 | 1 | 1 | 0 | 0 | 0 |
| 10 | 1 | 1 | 1 | 1 | 1 | 1 | 1 | 1 | 1 | 0 | 0 |
| 11 | 0 | 1 | 1 | 1 | 1 | 1 | 1 | 1 | 1 | 1 | 0 |
| 12 | 0 | 0 | 1 | 1 | 1 | 1 | 1 | 1 | 1 | 1 | 1 |
| 13 | 1 | 0 | 0 | 1 | 1 | 1 | 1 | 1 | 1 | 1 | 1 |
| 14 | 1 | 1 | 0 | 0 | 1 | 1 | 1 | 1 | 1 | 1 | 1 |
| 15 | 1 | 1 | 1 | 0 | 0 | 1 | 1 | 1 | 1 | 1 | 1 |
| 16 | 1 | 1 | 1 | 1 | 0 | 0 | 1 | 1 | 1 | 1 | 1 |
| 17 | 1 | 1 | 1 | 1 | 1 | 0 | 0 | 1 | 1 | 1 | 1 |
| 18 | 1 | 1 | 1 | 1 | 1 | 1 | 0 | 0 | 1 | 1 | 1 |
| 19 | 1 | 1 | 1 | 1 | 1 | 1 | 1 | 0 | 0 | 1 | 1 |
| 20 | 0 | 1 | 1 | 1 | 1 | 1 | 1 | 1 | 0 | 0 | 1 |
| 21 | 0 | 0 | 1 | 1 | 1 | 1 | 1 | 1 | 1 | 0 | 0 |
| 22 | 0 | 0 | 0 | 1 | 1 | 1 | 1 | 1 | 1 | 1 | 0 |
| 23 | 0 | 0 | 0 | 0 | 1 | 1 | 1 | 1 | 1 | 1 | 1 |
| 24 | 1 | 0 | 0 | 0 | 0 | 1 | 1 | 1 | 1 | 1 | 1 |
| 25 | 1 | 1 | 0 | 0 | 0 | 0 | 1 | 1 | 1 | 1 | 1 |
| 26 | 1 | 1 | 1 | 0 | 0 | 0 | 0 | 1 | 1 | 1 | 1 |
| 27 | 1 | 1 | 1 | 1 | 0 | 0 | 0 | 0 | 1 | 1 | 1 |
| 28 | 1 | 1 | 1 | 1 | 1 | 0 | 0 | 0 | 0 | 1 | 1 |
| 29 | 0 | 1 | 1 | 1 | 1 | 1 | 0 | 0 | 0 | 0 | 1 |
| 30 | 0 | 0 | 1 | 1 | 1 | 1 | 1 | 0 | 0 | 0 | 0 |
| 31 | 1 | 0 | 0 | 1 | 1 | 1 | 1 | 1 | 0 | 0 | 0 |
| 32 | 1 | 1 | 0 | 0 | 1 | 1 | 1 | 1 | 1 | 0 | 0 |
| 33 | 0 | 1 | 1 | 0 | 0 | 1 | 1 | 1 | 1 | 1 | 0 |
| 34 | 0 | 0 | 1 | 1 | 0 | 0 | 1 | 1 | 1 | 1 | 1 |
| 35 | 1 | 0 | 0 | 1 | 1 | 0 | 0 | 1 | 1 | 1 | 1 |
| 36 | 1 | 1 | 0 | 0 | 1 | 1 | 0 | 0 | 1 | 1 | 1 |
| 37 | 1 | 1 | 1 | 0 | 0 | 1 | 1 | 0 | 0 | 1 | 1 |
| 38 | 0 | 1 | 1 | 1 | 0 | 0 | 1 | 1 | 0 | 0 | 1 |
| 39 | 0 | 0 | 1 | 1 | 1 | 0 | 0 | 1 | 1 | 0 | 0 |
| 40 | 0 | 0 | 0 | 1 | 1 | 1 | 0 | 0 | 1 | 1 | 0 |
| 41 | 0 | 0 | 0 | 0 | 1 | 1 | 1 | 0 | 0 | 1 | 1 |
| 42 | 0 | 0 | 0 | 0 | 0 | 1 | 1 | 1 | 0 | 0 | 1 |
| 43 | 0 | 0 | 0 | 0 | 0 | 0 | 1 | 1 | 1 | 0 | 0 |
| 44 | 0 | 0 | 0 | 0 | 0 | 0 | 0 | 1 | 1 | 1 | 0 |
| 45 | 0 | 0 | 0 | 0 | 0 | 0 | 0 | 0 | 1 | 1 | 1 |
| 46 | 1 | 0 | 0 | 0 | 0 | 0 | 0 | 0 | 0 | 1 | 1 |
| 47 | 0 | 1 | 0 | 0 | 0 | 0 | 0 | 0 | 0 | 0 | 1 |
| 48 | 0 | 0 | 1 | 0 | 0 | 0 | 0 | 0 | 0 | 0 | 0 |
| 49 | 1 | 0 | 0 | 1 | 0 | 0 | 0 | 0 | 0 | 0 | 0 |
| 50 | 1 | 1 | 0 | 0 | 1 | 0 | 0 | 0 | 0 | 0 | 0 |
| 51 | 1 | 1 | 1 | 0 | 0 | 1 | 0 | 0 | 0 | 0 | 0 |
| 52 | 1 | 1 | 1 | 1 | 0 | 0 | 1 | 0 | 0 | 0 | 0 |
| 53 | 1 | 1 | 1 | 1 | 1 | 0 | 0 | 1 | 0 | 0 | 0 |
| 54 | 1 | 1 | 1 | 1 | 1 | 1 | 0 | 0 | 1 | 0 | 0 |
| 55 | 0 | 1 | 1 | 1 | 1 | 1 | 1 | 0 | 0 | 1 | 0 |
| 56 | 1 | 0 | 1 | 1 | 1 | 1 | 1 | 1 | 0 | 0 | 1 |
| 57 | 0 | 1 | 0 | 1 | 1 | 1 | 1 | 1 | 1 | 0 | 0 |
| 58 | 0 | 0 | 1 | 0 | 1 | 1 | 1 | 1 | 1 | 1 | 0 |
| 59 | 0 | 0 | 0 | 1 | 0 | 1 | 1 | 1 | 1 | 1 | 1 |
| 60 | 1 | 0 | 0 | 0 | 1 | 0 | 1 | 1 | 1 | 1 | 1 |
| 61 | 1 | 1 | 0 | 0 | 0 | 1 | 0 | 1 | 1 | 1 | 1 |
| 62 | 1 | 1 | 1 | 0 | 0 | 0 | 1 | 0 | 1 | 1 | 1 |
| 63 | 1 | 1 | 1 | 1 | 0 | 0 | 0 | 1 | 0 | 1 | 1 |
| 64 | 0 | 1 | 1 | 1 | 1 | 0 | 0 | 0 | 1 | 0 | 1 |
| 65 | 1 | 0 | 1 | 1 | 1 | 1 | 0 | 0 | 0 | 1 | 0 |
| 66 | 1 | 1 | 0 | 1 | 1 | 1 | 1 | 0 | 0 | 0 | 1 |
| 67 | 0 | 1 | 1 | 0 | 1 | 1 | 1 | 1 | 0 | 0 | 0 |
| 68 | 1 | 0 | 1 | 1 | 0 | 1 | 1 | 1 | 1 | 0 | 0 |
| 69 | 0 | 1 | 0 | 1 | 1 | 0 | 1 | 1 | 1 | 1 | 0 |
| 70 | 0 | 0 | 1 | 0 | 1 | 1 | 0 | 1 | 1 | 1 | 1 |
| 71 | 1 | 0 | 0 | 1 | 0 | 1 | 1 | 0 | 1 | 1 | 1 |
| 72 | 1 | 1 | 0 | 0 | 1 | 0 | 1 | 1 | 0 | 1 | 1 |
| 73 | 0 | 1 | 1 | 0 | 0 | 1 | 0 | 1 | 1 | 0 | 1 |
| 74 | 1 | 0 | 1 | 1 | 0 | 0 | 1 | 0 | 1 | 1 | 0 |
| 75 | 0 | 1 | 0 | 1 | 1 | 0 | 0 | 1 | 0 | 1 | 1 |
| 76 | 0 | 0 | 1 | 0 | 1 | 1 | 0 | 0 | 1 | 0 | 1 |
| 77 | 1 | 0 | 0 | 1 | 0 | 1 | 1 | 0 | 0 | 1 | 0 |
| 78 | 1 | 1 | 0 | 0 | 1 | 0 | 1 | 1 | 0 | 0 | 1 |
| 79 | 0 | 1 | 1 | 0 | 0 | 1 | 0 | 1 | 1 | 0 | 0 |
| 80 | 0 | 0 | 1 | 1 | 0 | 0 | 1 | 0 | 1 | 1 | 0 |
| 81 | 0 | 0 | 0 | 1 | 1 | 0 | 0 | 1 | 0 | 1 | 1 |
| 82 | 0 | 0 | 0 | 0 | 1 | 1 | 0 | 0 | 1 | 0 | 1 |
| 83 | 1 | 0 | 0 | 0 | 0 | 1 | 1 | 0 | 0 | 1 | 0 |
| 84 | 1 | 1 | 0 | 0 | 0 | 0 | 1 | 1 | 0 | 0 | 1 |
| 85 | 0 | 1 | 1 | 0 | 0 | 0 | 0 | 1 | 1 | 0 | 0 |
| 86 | 0 | 0 | 1 | 1 | 0 | 0 | 0 | 0 | 1 | 1 | 0 |
| 87 | 0 | 0 | 0 | 1 | 1 | 0 | 0 | 0 | 0 | 1 | 1 |
| 88 | 0 | 0 | 0 | 0 | 1 | 1 | 0 | 0 | 0 | 0 | 1 |
| 89 | 0 | 0 | 0 | 0 | 0 | 1 | 1 | 0 | 0 | 0 | 0 |
| 90 | 1 | 0 | 0 | 0 | 0 | 0 | 1 | 1 | 0 | 0 | 0 |
| 91 | 1 | 1 | 0 | 0 | 0 | 0 | 0 | 1 | 1 | 0 | 0 |
| 92 | 0 | 1 | 1 | 0 | 0 | 0 | 0 | 0 | 1 | 1 | 0 |
| 93 | 0 | 0 | 1 | 1 | 0 | 0 | 0 | 0 | 0 | 1 | 1 |
| 94 | 0 | 0 | 0 | 1 | 1 | 0 | 0 | 0 | 0 | 0 | 1 |
| 95 | 0 | 0 | 0 | 0 | 1 | 1 | 0 | 0 | 0 | 0 | 0 |
| 96 | 1 | 0 | 0 | 0 | 0 | 1 | 1 | 0 | 0 | 0 | 0 |
| 97 | 1 | 1 | 0 | 0 | 0 | 0 | 1 | 1 | 0 | 0 | 0 |
| 98 | 1 | 1 | 1 | 0 | 0 | 0 | 0 | 1 | 1 | 0 | 0 |
| 99 | 0 | 1 | 1 | 1 | 0 | 0 | 0 | 0 | 1 | 1 | 0 |
| 100 | 0 | 0 | 1 | 1 | 1 | 0 | 0 | 0 | 0 | 1 | 1 |
| 101 | 0 | 0 | 0 | 1 | 1 | 1 | 0 | 0 | 0 | 0 | 1 |
| 102 | 0 | 0 | 0 | 0 | 1 | 1 | 1 | 0 | 0 | 0 | 0 |
| 103 | 1 | 0 | 0 | 0 | 0 | 1 | 1 | 1 | 0 | 0 | 0 |
| 104 | 1 | 1 | 0 | 0 | 0 | 0 | 1 | 1 | 1 | 0 | 0 |
| 105 | 0 | 1 | 1 | 0 | 0 | 0 | 0 | 1 | 1 | 1 | 0 |
| 106 | 0 | 0 | 1 | 1 | 0 | 0 | 0 | 0 | 1 | 1 | 1 |
| 107 | 1 | 0 | 0 | 1 | 1 | 0 | 0 | 0 | 0 | 1 | 1 |
| 108 | 0 | 1 | 0 | 0 | 1 | 1 | 0 | 0 | 0 | 0 | 1 |
| 109 | 0 | 0 | 1 | 0 | 0 | 1 | 1 | 0 | 0 | 0 | 0 |
| 110 | 1 | 0 | 0 | 1 | 0 | 0 | 1 | 1 | 0 | 0 | 0 |
| 111 | 1 | 1 | 0 | 0 | 1 | 0 | 0 | 1 | 1 | 0 | 0 |
| 112 | 0 | 1 | 1 | 0 | 0 | 1 | 0 | 0 | 1 | 1 | 0 |
| 113 | 0 | 0 | 1 | 1 | 0 | 0 | 1 | 0 | 0 | 1 | 1 |
| 114 | 0 | 0 | 0 | 1 | 1 | 0 | 0 | 1 | 0 | 0 | 1 |
| 115 | 0 | 0 | 0 | 0 | 1 | 1 | 0 | 0 | 1 | 0 | 0 |
| 116 | 0 | 0 | 0 | 0 | 0 | 1 | 1 | 0 | 0 | 1 | 0 |
| 117 | 1 | 0 | 0 | 0 | 0 | 0 | 1 | 1 | 0 | 0 | 1 |
| 118 | 0 | 1 | 0 | 0 | 0 | 0 | 0 | 1 | 1 | 0 | 0 |
| 119 | 0 | 0 | 1 | 0 | 0 | 0 | 0 | 0 | 1 | 1 | 0 |
| 120 | 0 | 0 | 0 | 1 | 0 | 0 | 0 | 0 | 0 | 1 | 1 |
| 121 | 0 | 0 | 0 | 0 | 1 | 0 | 0 | 0 | 0 | 0 | 1 |
| 122 | 0 | 0 | 0 | 0 | 0 | 1 | 0 | 0 | 0 | 0 | 0 |
| 123 | 1 | 0 | 0 | 0 | 0 | 0 | 1 | 0 | 0 | 0 | 0 |
| 124 | 1 | 1 | 0 | 0 | 0 | 0 | 0 | 1 | 0 | 0 | 0 |
| 125 | 1 | 1 | 1 | 0 | 0 | 0 | 0 | 0 | 1 | 0 | 0 |
| 126 | 0 | 1 | 1 | 1 | 0 | 0 | 0 | 0 | 0 | 1 | 0 |
| 127 | 1 | 0 | 1 | 1 | 1 | 0 | 0 | 0 | 0 | 0 | 1 |
| 128 | 0 | 1 | 0 | 1 | 1 | 1 | 0 | 0 | 0 | 0 | 0 |
| 129 | 1 | 0 | 1 | 0 | 1 | 1 | 1 | 0 | 0 | 0 | 0 |
| 130 | 1 | 1 | 0 | 1 | 0 | 1 | 1 | 1 | 0 | 0 | 0 |
| 131 | 1 | 1 | 1 | 0 | 1 | 0 | 1 | 1 | 1 | 0 | 0 |
| 132 | 0 | 1 | 1 | 1 | 0 | 1 | 0 | 1 | 1 | 1 | 0 |
| 133 | 0 | 0 | 1 | 1 | 1 | 0 | 1 | 0 | 1 | 1 | 1 |
| 134 | 1 | 0 | 0 | 1 | 1 | 1 | 0 | 1 | 0 | 1 | 1 |
| 135 | 0 | 1 | 0 | 0 | 1 | 1 | 1 | 0 | 1 | 0 | 1 |
| 136 | 1 | 0 | 1 | 0 | 0 | 1 | 1 | 1 | 0 | 1 | 0 |
| 137 | 1 | 1 | 0 | 1 | 0 | 0 | 1 | 1 | 1 | 0 | 1 |
| 138 | 1 | 1 | 1 | 0 | 1 | 0 | 0 | 1 | 1 | 1 | 0 |
| 139 | 0 | 1 | 1 | 1 | 0 | 1 | 0 | 0 | 1 | 1 | 1 |
| 140 | 1 | 0 | 1 | 1 | 1 | 0 | 1 | 0 | 0 | 1 | 1 |
| 141 | 0 | 1 | 0 | 1 | 1 | 1 | 0 | 1 | 0 | 0 | 1 |
| 142 | 0 | 0 | 1 | 0 | 1 | 1 | 1 | 0 | 1 | 0 | 0 |
| 143 | 0 | 0 | 0 | 1 | 0 | 1 | 1 | 1 | 0 | 1 | 0 |
| 144 | 1 | 0 | 0 | 0 | 1 | 0 | 1 | 1 | 1 | 0 | 1 |
| 145 | 1 | 1 | 0 | 0 | 0 | 1 | 0 | 1 | 1 | 1 | 0 |
| 146 | 0 | 1 | 1 | 0 | 0 | 0 | 1 | 0 | 1 | 1 | 1 |
| 147 | 1 | 0 | 1 | 1 | 0 | 0 | 0 | 1 | 0 | 1 | 1 |
| 148 | 0 | 1 | 0 | 1 | 1 | 0 | 0 | 0 | 1 | 0 | 1 |
| 149 | 1 | 0 | 1 | 0 | 1 | 1 | 0 | 0 | 0 | 1 | 0 |
| 150 | 1 | 1 | 0 | 1 | 0 | 1 | 1 | 0 | 0 | 0 | 1 |
| 151 | 0 | 1 | 1 | 0 | 1 | 0 | 1 | 1 | 0 | 0 | 0 |
| 152 | 1 | 0 | 1 | 1 | 0 | 1 | 0 | 1 | 1 | 0 | 0 |
| 153 | 0 | 1 | 0 | 1 | 1 | 0 | 1 | 0 | 1 | 1 | 0 |
| 154 | 0 | 0 | 1 | 0 | 1 | 1 | 0 | 1 | 0 | 1 | 1 |
| 155 | 0 | 0 | 0 | 1 | 0 | 1 | 1 | 0 | 1 | 0 | 1 |
| 156 | 1 | 0 | 0 | 0 | 1 | 0 | 1 | 1 | 0 | 1 | 0 |
| 157 | 1 | 1 | 0 | 0 | 0 | 1 | 0 | 1 | 1 | 0 | 1 |
| 158 | 1 | 1 | 1 | 0 | 0 | 0 | 1 | 0 | 1 | 1 | 0 |
| 159 | 0 | 1 | 1 | 1 | 0 | 0 | 0 | 1 | 0 | 1 | 1 |
| 160 | 0 | 0 | 1 | 1 | 1 | 0 | 0 | 0 | 1 | 0 | 1 |
| 161 | 1 | 0 | 0 | 1 | 1 | 1 | 0 | 0 | 0 | 1 | 0 |
| 162 | 1 | 1 | 0 | 0 | 1 | 1 | 1 | 0 | 0 | 0 | 1 |
| 163 | 0 | 1 | 1 | 0 | 0 | 1 | 1 | 1 | 0 | 0 | 0 |
| 164 | 1 | 0 | 1 | 1 | 0 | 0 | 1 | 1 | 1 | 0 | 0 |
| 165 | 0 | 1 | 0 | 1 | 1 | 0 | 0 | 1 | 1 | 1 | 0 |
| 166 | 0 | 0 | 1 | 0 | 1 | 1 | 0 | 0 | 1 | 1 | 1 |
| 167 | 1 | 0 | 0 | 1 | 0 | 1 | 1 | 0 | 0 | 1 | 1 |
| 168 | 0 | 1 | 0 | 0 | 1 | 0 | 1 | 1 | 0 | 0 | 1 |
| 169 | 0 | 0 | 1 | 0 | 0 | 1 | 0 | 1 | 1 | 0 | 0 |
| 170 | 0 | 0 | 0 | 1 | 0 | 0 | 1 | 0 | 1 | 1 | 0 |
| 171 | 0 | 0 | 0 | 0 | 1 | 0 | 0 | 1 | 0 | 1 | 1 |
| 172 | 0 | 0 | 0 | 0 | 0 | 1 | 0 | 0 | 1 | 0 | 1 |
| 173 | 1 | 0 | 0 | 0 | 0 | 0 | 1 | 0 | 0 | 1 | 0 |
| 174 | 1 | 1 | 0 | 0 | 0 | 0 | 0 | 1 | 0 | 0 | 1 |
| 175 | 0 | 1 | 1 | 0 | 0 | 0 | 0 | 0 | 1 | 0 | 0 |
| 176 | 0 | 0 | 1 | 1 | 0 | 0 | 0 | 0 | 0 | 1 | 0 |
| 177 | 1 | 0 | 0 | 1 | 1 | 0 | 0 | 0 | 0 | 0 | 1 |
| 178 | 0 | 1 | 0 | 0 | 1 | 1 | 0 | 0 | 0 | 0 | 0 |
| 179 | 1 | 0 | 1 | 0 | 0 | 1 | 1 | 0 | 0 | 0 | 0 |
| 180 | 1 | 1 | 0 | 1 | 0 | 0 | 1 | 1 | 0 | 0 | 0 |
| 181 | 1 | 1 | 1 | 0 | 1 | 0 | 0 | 1 | 1 | 0 | 0 |
| 182 | 0 | 1 | 1 | 1 | 0 | 1 | 0 | 0 | 1 | 1 | 0 |
| 183 | 0 | 0 | 1 | 1 | 1 | 0 | 1 | 0 | 0 | 1 | 1 |
| 184 | 0 | 0 | 0 | 1 | 1 | 1 | 0 | 1 | 0 | 0 | 1 |
| 185 | 0 | 0 | 0 | 0 | 1 | 1 | 1 | 0 | 1 | 0 | 0 |
| 186 | 0 | 0 | 0 | 0 | 0 | 1 | 1 | 1 | 0 | 1 | 0 |
| 187 | 1 | 0 | 0 | 0 | 0 | 0 | 1 | 1 | 1 | 0 | 1 |
| 188 | 1 | 1 | 0 | 0 | 0 | 0 | 0 | 1 | 1 | 1 | 0 |
| 189 | 0 | 1 | 1 | 0 | 0 | 0 | 0 | 0 | 1 | 1 | 1 |
| 190 | 1 | 0 | 1 | 1 | 0 | 0 | 0 | 0 | 0 | 1 | 1 |
| 191 | 0 | 1 | 0 | 1 | 1 | 0 | 0 | 0 | 0 | 0 | 1 |
| 192 | 0 | 0 | 1 | 0 | 1 | 1 | 0 | 0 | 0 | 0 | 0 |
| 193 | 1 | 0 | 0 | 1 | 0 | 1 | 1 | 0 | 0 | 0 | 0 |
| 194 | 1 | 1 | 0 | 0 | 1 | 0 | 1 | 1 | 0 | 0 | 0 |
| 195 | 1 | 1 | 1 | 0 | 0 | 1 | 0 | 1 | 1 | 0 | 0 |
| 196 | 0 | 1 | 1 | 1 | 0 | 0 | 1 | 0 | 1 | 1 | 0 |
| 197 | 0 | 0 | 1 | 1 | 1 | 0 | 0 | 1 | 0 | 1 | 1 |
| 198 | 0 | 0 | 0 | 1 | 1 | 1 | 0 | 0 | 1 | 0 | 1 |
| 199 | 1 | 0 | 0 | 0 | 1 | 1 | 1 | 0 | 0 | 1 | 0 |
| 200 | 1 | 1 | 0 | 0 | 0 | 1 | 1 | 1 | 0 | 0 | 1 |
| 201 | 0 | 1 | 1 | 0 | 0 | 0 | 1 | 1 | 1 | 0 | 0 |
| 202 | 0 | 0 | 1 | 1 | 0 | 0 | 0 | 1 | 1 | 1 | 0 |
| 203 | 0 | 0 | 0 | 1 | 1 | 0 | 0 | 0 | 1 | 1 | 1 |
| 204 | 1 | 0 | 0 | 0 | 1 | 1 | 0 | 0 | 0 | 1 | 1 |
| 205 | 0 | 1 | 0 | 0 | 0 | 1 | 1 | 0 | 0 | 0 | 1 |
| 206 | 0 | 0 | 1 | 0 | 0 | 0 | 1 | 1 | 0 | 0 | 0 |
| 207 | 1 | 0 | 0 | 1 | 0 | 0 | 0 | 1 | 1 | 0 | 0 |
| 208 | 0 | 1 | 0 | 0 | 1 | 0 | 0 | 0 | 1 | 1 | 0 |
| 209 | 0 | 0 | 1 | 0 | 0 | 1 | 0 | 0 | 0 | 1 | 1 |
| 210 | 0 | 0 | 0 | 1 | 0 | 0 | 1 | 0 | 0 | 0 | 1 |
| 211 | 0 | 0 | 0 | 0 | 1 | 0 | 0 | 1 | 0 | 0 | 0 |
| 212 | 1 | 0 | 0 | 0 | 0 | 1 | 0 | 0 | 1 | 0 | 0 |
| 213 | 0 | 1 | 0 | 0 | 0 | 0 | 1 | 0 | 0 | 1 | 0 |
| 214 | 1 | 0 | 1 | 0 | 0 | 0 | 0 | 1 | 0 | 0 | 1 |
| 215 | 0 | 1 | 0 | 1 | 0 | 0 | 0 | 0 | 1 | 0 | 0 |
| 216 | 0 | 0 | 1 | 0 | 1 | 0 | 0 | 0 | 0 | 1 | 0 |
| 217 | 1 | 0 | 0 | 1 | 0 | 1 | 0 | 0 | 0 | 0 | 1 |
| 218 | 0 | 1 | 0 | 0 | 1 | 0 | 1 | 0 | 0 | 0 | 0 |
| 219 | 1 | 0 | 1 | 0 | 0 | 1 | 0 | 1 | 0 | 0 | 0 |
| 220 | 1 | 1 | 0 | 1 | 0 | 0 | 1 | 0 | 1 | 0 | 0 |
| 221 | 0 | 1 | 1 | 0 | 1 | 0 | 0 | 1 | 0 | 1 | 0 |
| 222 | 1 | 0 | 1 | 1 | 0 | 1 | 0 | 0 | 1 | 0 | 1 |
| 223 | 1 | 1 | 0 | 1 | 1 | 0 | 1 | 0 | 0 | 1 | 0 |
| 224 | 1 | 1 | 1 | 0 | 1 | 1 | 0 | 1 | 0 | 0 | 1 |
| 225 | 0 | 1 | 1 | 1 | 0 | 1 | 1 | 0 | 1 | 0 | 0 |

Fig - 4C5 (b)

Count State Table For Window Counter Of Fig - 4C4

| COUNT | COUNTER STAGE VALUE | | | | | | | | | | |
|---|---|---|---|---|---|---|---|---|---|---|---|
| | 1 | 2 | 3 | 4 | 5 | 6 | 7 | 8 | 9 | 10 | 11 |
| 226 | 0 | 0 | 1 | 1 | 1 | 0 | 1 | 1 | 0 | 1 | 0 |
| 227 | 1 | 0 | 0 | 1 | 1 | 1 | 0 | 1 | 1 | 0 | 1 |
| 228 | 1 | 1 | 0 | 0 | 1 | 1 | 1 | 0 | 1 | 1 | 0 |
| 229 | 0 | 1 | 1 | 0 | 0 | 1 | 1 | 1 | 0 | 1 | 1 |
| 230 | 0 | 0 | 1 | 1 | 0 | 0 | 1 | 1 | 1 | 0 | 1 |
| 231 | 1 | 0 | 0 | 1 | 1 | 0 | 0 | 1 | 1 | 1 | 0 |
| 232 | 0 | 1 | 0 | 0 | 1 | 1 | 0 | 0 | 1 | 1 | 1 |
| 233 | 1 | 0 | 1 | 0 | 0 | 1 | 1 | 0 | 0 | 1 | 1 |
| 234 | 0 | 1 | 0 | 1 | 0 | 0 | 1 | 1 | 0 | 0 | 1 |
| 235 | 0 | 0 | 1 | 0 | 1 | 0 | 0 | 1 | 1 | 0 | 0 |
| 236 | 0 | 0 | 0 | 1 | 0 | 1 | 0 | 0 | 1 | 1 | 0 |
| 237 | 0 | 0 | 0 | 0 | 1 | 0 | 1 | 0 | 0 | 1 | 1 |
| 238 | 0 | 0 | 0 | 0 | 0 | 1 | 0 | 1 | 0 | 0 | 1 |
| 239 | 0 | 0 | 0 | 0 | 0 | 0 | 1 | 0 | 1 | 0 | 0 |
| 240 | 0 | 0 | 0 | 0 | 0 | 0 | 0 | 1 | 0 | 1 | 0 |
| 241 | 1 | 0 | 0 | 0 | 0 | 0 | 0 | 0 | 1 | 0 | 1 |
| 242 | 1 | 1 | 0 | 0 | 0 | 0 | 0 | 0 | 0 | 1 | 0 |
| 243 | 1 | 1 | 1 | 0 | 0 | 0 | 0 | 0 | 0 | 0 | 1 |
| 244 | 0 | 1 | 1 | 1 | 0 | 0 | 0 | 0 | 0 | 0 | 0 |
| 245 | 1 | 0 | 1 | 1 | 1 | 0 | 0 | 0 | 0 | 0 | 0 |
| 246 | 1 | 1 | 0 | 1 | 1 | 1 | 0 | 0 | 0 | 0 | 0 |
| 247 | 1 | 1 | 1 | 0 | 1 | 1 | 1 | 0 | 0 | 0 | 0 |
| 248 | 1 | 1 | 1 | 1 | 0 | 1 | 1 | 1 | 0 | 0 | 0 |
| 249 | 1 | 1 | 1 | 1 | 1 | 0 | 1 | 1 | 1 | 0 | 0 |
| 250 | 0 | 1 | 1 | 1 | 1 | 1 | 0 | 1 | 1 | 1 | 0 |
| 251 | 0 | 0 | 1 | 1 | 1 | 1 | 1 | 0 | 1 | 1 | 1 |
| 252 | 1 | 0 | 0 | 1 | 1 | 1 | 1 | 1 | 0 | 1 | 1 |
| 253 | 0 | 1 | 0 | 0 | 1 | 1 | 1 | 1 | 1 | 0 | 1 |
| 254 | 1 | 0 | 1 | 0 | 0 | 1 | 1 | 1 | 1 | 1 | 0 |
| 255 | 0 | 1 | 0 | 1 | 0 | 0 | 1 | 1 | 1 | 1 | 1 |
| 256 | 1 | 0 | 1 | 0 | 1 | 0 | 0 | 1 | 1 | 1 | 1 |
| 257 | 1 | 1 | 0 | 1 | 0 | 1 | 0 | 0 | 1 | 1 | 1 |
| 258 | 1 | 1 | 1 | 0 | 1 | 0 | 1 | 0 | 0 | 1 | 1 |
| 259 | 0 | 1 | 1 | 1 | 0 | 1 | 0 | 1 | 0 | 0 | 1 |
| 260 | 0 | 0 | 1 | 1 | 1 | 0 | 1 | 0 | 1 | 0 | 0 |
| 261 | 0 | 0 | 0 | 1 | 1 | 1 | 0 | 1 | 0 | 1 | 0 |
| 262 | 1 | 0 | 0 | 0 | 1 | 1 | 1 | 0 | 1 | 0 | 1 |
| 263 | 1 | 1 | 0 | 0 | 0 | 1 | 1 | 1 | 0 | 1 | 0 |
| 264 | 1 | 1 | 1 | 0 | 0 | 0 | 1 | 1 | 1 | 0 | 1 |
| 265 | 1 | 1 | 1 | 1 | 0 | 0 | 0 | 1 | 1 | 1 | 0 |
| 266 | 0 | 1 | 1 | 1 | 1 | 0 | 0 | 0 | 1 | 1 | 1 |
| 267 | 1 | 0 | 1 | 1 | 1 | 1 | 0 | 0 | 0 | 1 | 1 |
| 268 | 0 | 1 | 0 | 1 | 1 | 1 | 1 | 0 | 0 | 0 | 1 |
| 269 | 0 | 0 | 1 | 0 | 1 | 1 | 1 | 1 | 0 | 0 | 0 |
| 270 | 1 | 0 | 0 | 1 | 0 | 1 | 1 | 1 | 1 | 0 | 0 |
| 271 | 0 | 1 | 0 | 0 | 1 | 0 | 1 | 1 | 1 | 1 | 0 |
| 272 | 0 | 0 | 1 | 0 | 0 | 1 | 0 | 1 | 1 | 1 | 1 |
| 273 | 1 | 0 | 0 | 1 | 0 | 0 | 1 | 0 | 1 | 1 | 1 |
| 274 | 1 | 1 | 0 | 0 | 1 | 0 | 0 | 1 | 0 | 1 | 1 |
| 275 | 0 | 1 | 1 | 0 | 0 | 1 | 0 | 0 | 1 | 0 | 1 |
| 276 | 1 | 0 | 1 | 1 | 0 | 0 | 1 | 0 | 0 | 1 | 0 |
| 277 | 1 | 1 | 0 | 1 | 1 | 0 | 0 | 1 | 0 | 0 | 1 |
| 278 | 0 | 1 | 1 | 0 | 1 | 1 | 0 | 0 | 1 | 0 | 0 |
| 279 | 0 | 0 | 1 | 1 | 0 | 1 | 1 | 0 | 0 | 1 | 0 |
| 280 | 1 | 0 | 0 | 1 | 1 | 0 | 1 | 1 | 0 | 0 | 1 |
| 281 | 0 | 1 | 0 | 0 | 1 | 1 | 0 | 1 | 1 | 0 | 0 |
| 282 | 0 | 0 | 1 | 0 | 0 | 1 | 1 | 0 | 1 | 1 | 0 |
| 283 | 0 | 0 | 0 | 1 | 0 | 0 | 1 | 1 | 0 | 1 | 1 |
| 284 | 0 | 0 | 0 | 0 | 1 | 0 | 0 | 1 | 1 | 0 | 1 |
| 285 | 1 | 0 | 0 | 0 | 0 | 1 | 0 | 0 | 1 | 1 | 0 |
| 286 | 0 | 1 | 0 | 0 | 0 | 0 | 1 | 0 | 0 | 1 | 1 |
| 287 | 0 | 0 | 1 | 0 | 0 | 0 | 0 | 1 | 0 | 0 | 1 |
| 288 | 0 | 0 | 0 | 1 | 0 | 0 | 0 | 0 | 1 | 0 | 0 |
| 289 | 0 | 0 | 0 | 0 | 1 | 0 | 0 | 0 | 0 | 1 | 0 |
| 290 | 1 | 0 | 0 | 0 | 0 | 1 | 0 | 0 | 0 | 0 | 1 |
| 291 | 0 | 1 | 0 | 0 | 0 | 0 | 1 | 0 | 0 | 0 | 0 |
| 292 | 1 | 0 | 1 | 0 | 0 | 0 | 0 | 1 | 0 | 0 | 0 |
| 293 | 1 | 1 | 0 | 1 | 0 | 0 | 0 | 0 | 1 | 0 | 0 |
| 294 | 0 | 1 | 1 | 0 | 1 | 0 | 0 | 0 | 0 | 1 | 0 |
| 295 | 1 | 0 | 1 | 1 | 0 | 1 | 0 | 0 | 0 | 0 | 1 |
| 296 | 0 | 1 | 0 | 1 | 1 | 0 | 1 | 0 | 0 | 0 | 0 |
| 297 | 1 | 0 | 1 | 0 | 1 | 1 | 0 | 1 | 0 | 0 | 0 |
| 298 | 1 | 1 | 0 | 1 | 0 | 1 | 1 | 0 | 1 | 0 | 0 |
| 299 | 0 | 1 | 1 | 0 | 1 | 0 | 1 | 1 | 0 | 1 | 0 |
| 300 | 1 | 0 | 1 | 1 | 0 | 1 | 0 | 1 | 1 | 0 | 1 |
| 301 | 1 | 1 | 0 | 1 | 1 | 0 | 1 | 0 | 1 | 1 | 0 |
| 302 | 0 | 1 | 1 | 0 | 1 | 1 | 0 | 1 | 0 | 1 | 1 |
| 303 | 0 | 0 | 1 | 1 | 0 | 1 | 1 | 0 | 1 | 0 | 1 |
| 304 | 1 | 0 | 0 | 1 | 1 | 0 | 1 | 1 | 0 | 1 | 0 |
| 305 | 1 | 1 | 0 | 0 | 1 | 1 | 0 | 1 | 1 | 0 | 1 |
| 306 | 1 | 1 | 1 | 0 | 0 | 1 | 1 | 0 | 1 | 1 | 0 |
| 307 | 0 | 1 | 1 | 1 | 0 | 0 | 1 | 1 | 0 | 1 | 1 |
| 308 | 0 | 0 | 1 | 1 | 1 | 0 | 0 | 1 | 1 | 0 | 1 |
| 309 | 1 | 0 | 0 | 1 | 1 | 1 | 0 | 0 | 1 | 1 | 0 |
| 310 | 0 | 1 | 0 | 0 | 1 | 1 | 1 | 0 | 0 | 1 | 1 |
| 311 | 0 | 0 | 1 | 0 | 0 | 1 | 1 | 1 | 0 | 0 | 1 |
| 312 | 0 | 0 | 0 | 1 | 0 | 0 | 1 | 1 | 1 | 0 | 0 |
| 313 | 0 | 0 | 0 | 0 | 1 | 0 | 0 | 1 | 1 | 1 | 0 |
| 314 | 0 | 0 | 0 | 0 | 0 | 1 | 0 | 0 | 1 | 1 | 1 |
| 315 | 1 | 0 | 0 | 0 | 0 | 0 | 1 | 0 | 0 | 1 | 1 |
| 316 | 0 | 1 | 0 | 0 | 0 | 0 | 0 | 1 | 0 | 0 | 1 |
| 317 | 0 | 0 | 1 | 0 | 0 | 0 | 0 | 0 | 1 | 0 | 0 |
| 318 | 0 | 0 | 0 | 1 | 0 | 0 | 0 | 0 | 0 | 1 | 0 |
| 319 | 1 | 0 | 0 | 0 | 1 | 0 | 0 | 0 | 0 | 0 | 1 |
| 320 | 0 | 1 | 0 | 0 | 0 | 1 | 0 | 0 | 0 | 0 | 0 |
| 321 | 1 | 0 | 1 | 0 | 0 | 0 | 1 | 0 | 0 | 0 | 0 |
| 322 | 1 | 1 | 0 | 1 | 0 | 0 | 0 | 1 | 0 | 0 | 0 |
| 323 | 1 | 1 | 1 | 0 | 1 | 0 | 0 | 0 | 1 | 0 | 0 |
| 324 | 0 | 1 | 1 | 1 | 0 | 1 | 0 | 0 | 0 | 1 | 0 |
| 325 | 1 | 0 | 1 | 1 | 1 | 0 | 1 | 0 | 0 | 0 | 1 |
| 326 | 0 | 1 | 0 | 1 | 1 | 1 | 0 | 1 | 0 | 0 | 0 |
| 327 | 1 | 0 | 1 | 0 | 1 | 1 | 1 | 0 | 1 | 0 | 0 |
| 328 | 0 | 1 | 0 | 1 | 0 | 1 | 1 | 1 | 0 | 1 | 0 |
| 329 | 1 | 0 | 1 | 0 | 1 | 0 | 1 | 1 | 1 | 0 | 1 |
| 330 | 1 | 1 | 0 | 1 | 0 | 1 | 0 | 1 | 1 | 1 | 0 |
| 331 | 0 | 1 | 1 | 0 | 1 | 0 | 1 | 0 | 1 | 1 | 1 |
| 332 | 1 | 0 | 1 | 1 | 0 | 1 | 0 | 1 | 0 | 1 | 1 |
| 333 | 0 | 1 | 0 | 1 | 1 | 0 | 1 | 0 | 1 | 0 | 1 |
| 334 | 1 | 0 | 1 | 0 | 1 | 1 | 0 | 1 | 0 | 1 | 0 |
| 335 | 1 | 1 | 0 | 1 | 0 | 1 | 1 | 0 | 1 | 0 | 1 |
| 336 | 1 | 1 | 1 | 0 | 1 | 0 | 1 | 1 | 0 | 1 | 0 |
| 337 | 1 | 1 | 1 | 1 | 0 | 1 | 0 | 1 | 1 | 0 | 1 |
| 338 | 1 | 1 | 1 | 1 | 1 | 0 | 1 | 0 | 1 | 1 | 0 |
| 339 | 0 | 1 | 1 | 1 | 1 | 1 | 0 | 1 | 0 | 1 | 1 |
| 340 | 0 | 0 | 1 | 1 | 1 | 1 | 1 | 0 | 1 | 0 | 1 |
| 341 | 1 | 0 | 0 | 1 | 1 | 1 | 1 | 1 | 0 | 1 | 0 |
| 342 | 1 | 1 | 0 | 0 | 1 | 1 | 1 | 1 | 1 | 0 | 1 |
| 343 | 1 | 1 | 1 | 0 | 0 | 1 | 1 | 1 | 1 | 1 | 0 |
| 344 | 0 | 1 | 1 | 1 | 0 | 0 | 1 | 1 | 1 | 1 | 1 |
| 345 | 1 | 0 | 1 | 1 | 1 | 0 | 0 | 1 | 1 | 1 | 1 |
| 346 | 1 | 1 | 0 | 1 | 1 | 1 | 0 | 0 | 1 | 1 | 1 |
| 347 | 1 | 1 | 1 | 0 | 1 | 1 | 1 | 0 | 0 | 1 | 1 |
| 348 | 0 | 1 | 1 | 1 | 0 | 1 | 1 | 1 | 0 | 0 | 1 |
| 349 | 0 | 0 | 1 | 1 | 1 | 0 | 1 | 1 | 1 | 0 | 0 |
| 350 | 0 | 0 | 0 | 1 | 1 | 1 | 0 | 1 | 1 | 1 | 0 |
| 351 | 0 | 0 | 0 | 0 | 1 | 1 | 1 | 0 | 1 | 1 | 1 |
| 352 | 1 | 0 | 0 | 0 | 0 | 1 | 1 | 1 | 0 | 1 | 1 |
| 353 | 0 | 1 | 0 | 0 | 0 | 0 | 1 | 1 | 1 | 0 | 1 |
| 354 | 1 | 0 | 1 | 0 | 0 | 0 | 0 | 1 | 1 | 1 | 0 |
| 355 | 0 | 1 | 0 | 1 | 0 | 0 | 0 | 0 | 1 | 1 | 1 |
| 356 | 1 | 0 | 1 | 0 | 1 | 0 | 0 | 0 | 0 | 1 | 1 |
| 357 | 0 | 1 | 0 | 1 | 0 | 1 | 0 | 0 | 0 | 0 | 1 |
| 358 | 0 | 0 | 1 | 0 | 1 | 0 | 1 | 0 | 0 | 0 | 0 |
| 359 | 1 | 0 | 0 | 1 | 0 | 1 | 0 | 1 | 0 | 0 | 0 |
| 360 | 1 | 1 | 0 | 0 | 1 | 0 | 1 | 0 | 1 | 0 | 0 |
| 361 | 0 | 1 | 1 | 0 | 0 | 1 | 0 | 1 | 0 | 1 | 0 |
| 362 | 1 | 0 | 1 | 1 | 0 | 0 | 1 | 0 | 1 | 0 | 1 |
| 363 | 1 | 1 | 0 | 1 | 1 | 0 | 0 | 1 | 0 | 1 | 0 |
| 364 | 1 | 1 | 1 | 0 | 1 | 1 | 0 | 0 | 1 | 0 | 1 |
| 365 | 1 | 1 | 1 | 1 | 0 | 1 | 1 | 0 | 0 | 1 | 0 |
| 366 | 1 | 1 | 1 | 1 | 1 | 0 | 1 | 1 | 0 | 0 | 1 |
| 367 | 0 | 1 | 1 | 1 | 1 | 1 | 0 | 1 | 1 | 0 | 0 |
| 368 | 0 | 0 | 1 | 1 | 1 | 1 | 1 | 0 | 1 | 1 | 0 |
| 369 | 0 | 0 | 0 | 1 | 1 | 1 | 1 | 1 | 0 | 1 | 1 |
| 370 | 0 | 0 | 0 | 0 | 1 | 1 | 1 | 1 | 1 | 0 | 1 |
| 371 | 1 | 0 | 0 | 0 | 0 | 1 | 1 | 1 | 1 | 1 | 0 |
| 372 | 0 | 1 | 0 | 0 | 0 | 0 | 1 | 1 | 1 | 1 | 1 |
| 373 | 1 | 0 | 1 | 0 | 0 | 0 | 0 | 1 | 1 | 1 | 1 |
| 374 | 1 | 1 | 0 | 1 | 0 | 0 | 0 | 0 | 1 | 1 | 1 |
| 375 | 1 | 1 | 1 | 0 | 1 | 0 | 0 | 0 | 0 | 1 | 1 |
| 376 | 0 | 1 | 1 | 1 | 0 | 1 | 0 | 0 | 0 | 0 | 1 |
| 377 | 0 | 0 | 1 | 1 | 1 | 0 | 1 | 0 | 0 | 0 | 0 |
| 378 | 1 | 0 | 0 | 1 | 1 | 1 | 0 | 1 | 0 | 0 | 0 |
| 379 | 1 | 1 | 0 | 0 | 1 | 1 | 1 | 0 | 1 | 0 | 0 |
| 380 | 0 | 1 | 1 | 0 | 0 | 1 | 1 | 1 | 0 | 1 | 0 |
| 381 | 1 | 0 | 1 | 1 | 0 | 0 | 1 | 1 | 1 | 0 | 1 |
| 382 | 1 | 1 | 0 | 1 | 1 | 0 | 0 | 1 | 1 | 1 | 0 |
| 383 | 0 | 1 | 1 | 0 | 1 | 1 | 0 | 0 | 1 | 1 | 1 |
| 384 | 1 | 0 | 1 | 1 | 0 | 1 | 1 | 0 | 0 | 1 | 1 |
| 385 | 0 | 1 | 0 | 1 | 1 | 0 | 1 | 1 | 0 | 0 | 1 |
| 386 | 0 | 0 | 1 | 0 | 1 | 1 | 0 | 1 | 1 | 0 | 0 |
| 387 | 0 | 0 | 0 | 1 | 0 | 1 | 1 | 0 | 1 | 1 | 0 |
| 388 | 0 | 0 | 0 | 0 | 1 | 0 | 1 | 1 | 0 | 1 | 1 |
| 389 | 0 | 0 | 0 | 0 | 0 | 1 | 0 | 1 | 1 | 0 | 1 |
| 390 | 1 | 0 | 0 | 0 | 0 | 0 | 1 | 0 | 1 | 1 | 0 |
| 391 | 0 | 1 | 0 | 0 | 0 | 0 | 0 | 1 | 0 | 1 | 1 |
| 392 | 0 | 0 | 1 | 0 | 0 | 0 | 0 | 0 | 1 | 0 | 1 |
| 393 | 1 | 0 | 0 | 1 | 0 | 0 | 0 | 0 | 0 | 1 | 0 |
| 394 | 1 | 1 | 0 | 0 | 1 | 0 | 0 | 0 | 0 | 0 | 1 |
| 395 | 0 | 1 | 1 | 0 | 0 | 1 | 0 | 0 | 0 | 0 | 0 |
| 396 | 1 | 0 | 1 | 1 | 0 | 0 | 1 | 0 | 0 | 0 | 0 |
| 397 | 1 | 1 | 0 | 1 | 1 | 0 | 0 | 1 | 0 | 0 | 0 |
| 398 | 1 | 1 | 1 | 0 | 1 | 1 | 0 | 0 | 1 | 0 | 0 |
| 399 | 0 | 1 | 1 | 1 | 0 | 1 | 1 | 0 | 0 | 1 | 0 |
| 400 | 1 | 0 | 1 | 1 | 1 | 0 | 1 | 1 | 0 | 0 | 1 |
| 401 | 0 | 1 | 0 | 1 | 1 | 1 | 0 | 1 | 1 | 0 | 0 |
| 402 | 0 | 0 | 1 | 0 | 1 | 1 | 1 | 0 | 1 | 1 | 0 |
| 403 | 0 | 0 | 0 | 1 | 0 | 1 | 1 | 1 | 0 | 1 | 1 |
| 404 | 0 | 0 | 0 | 0 | 1 | 0 | 1 | 1 | 1 | 0 | 1 |
| 405 | 1 | 0 | 0 | 0 | 0 | 1 | 0 | 1 | 1 | 1 | 0 |
| 406 | 0 | 1 | 0 | 0 | 0 | 0 | 1 | 0 | 1 | 1 | 1 |
| 407 | 1 | 0 | 1 | 0 | 0 | 0 | 0 | 1 | 0 | 1 | 1 |
| 408 | 0 | 1 | 0 | 1 | 0 | 0 | 0 | 0 | 1 | 0 | 1 |
| 409 | 1 | 0 | 1 | 0 | 1 | 0 | 0 | 0 | 0 | 1 | 0 |
| 410 | 1 | 1 | 0 | 1 | 0 | 1 | 0 | 0 | 0 | 0 | 1 |
| 411 | 0 | 1 | 1 | 0 | 1 | 0 | 1 | 0 | 0 | 0 | 0 |
| 412 | 1 | 0 | 1 | 1 | 0 | 1 | 0 | 1 | 0 | 0 | 0 |
| 413 | 1 | 1 | 0 | 1 | 1 | 0 | 1 | 0 | 1 | 0 | 0 |
| 414 | 0 | 1 | 1 | 0 | 1 | 1 | 0 | 1 | 0 | 1 | 0 |
| 415 | 1 | 0 | 1 | 1 | 0 | 1 | 1 | 0 | 1 | 0 | 1 |
| 416 | 1 | 1 | 0 | 1 | 1 | 0 | 1 | 1 | 0 | 1 | 0 |
| 417 | 1 | 1 | 1 | 0 | 1 | 1 | 0 | 1 | 1 | 0 | 1 |
| 418 | 1 | 1 | 1 | 1 | 0 | 1 | 1 | 0 | 1 | 1 | 0 |
| 419 | 0 | 1 | 1 | 1 | 1 | 0 | 1 | 1 | 0 | 1 | 1 |
| 420 | 0 | 0 | 1 | 1 | 1 | 1 | 0 | 1 | 1 | 0 | 1 |
| 421 | 1 | 0 | 0 | 1 | 1 | 1 | 1 | 0 | 1 | 1 | 0 |
| 422 | 0 | 1 | 0 | 0 | 1 | 1 | 1 | 1 | 0 | 1 | 1 |
| 423 | 0 | 0 | 1 | 0 | 0 | 1 | 1 | 1 | 1 | 0 | 1 |
| 424 | 1 | 0 | 0 | 1 | 0 | 0 | 1 | 1 | 1 | 1 | 0 |
| 425 | 0 | 1 | 0 | 0 | 1 | 0 | 0 | 1 | 1 | 1 | 1 |
| 426 | 1 | 0 | 1 | 0 | 0 | 1 | 0 | 0 | 1 | 1 | 1 |
| 427 | 1 | 1 | 0 | 1 | 0 | 0 | 1 | 0 | 0 | 1 | 1 |
| 428 | 0 | 1 | 1 | 0 | 1 | 0 | 0 | 1 | 0 | 0 | 1 |
| 429 | 0 | 0 | 1 | 1 | 0 | 1 | 0 | 0 | 1 | 0 | 0 |
| 430 | 0 | 0 | 0 | 1 | 1 | 0 | 1 | 0 | 0 | 1 | 0 |
| 431 | 1 | 0 | 0 | 0 | 1 | 1 | 0 | 1 | 0 | 0 | 1 |
| 432 | 0 | 1 | 0 | 0 | 0 | 1 | 1 | 0 | 1 | 0 | 0 |
| 433 | 0 | 0 | 1 | 0 | 0 | 0 | 1 | 1 | 0 | 1 | 0 |
| 434 | 1 | 0 | 0 | 1 | 0 | 0 | 0 | 1 | 1 | 0 | 1 |
| 435 | 1 | 1 | 0 | 0 | 1 | 0 | 0 | 0 | 1 | 1 | 0 |
| 436 | 0 | 1 | 1 | 0 | 0 | 1 | 0 | 0 | 0 | 1 | 1 |
| 437 | 0 | 0 | 1 | 1 | 0 | 0 | 1 | 0 | 0 | 0 | 1 |
| 438 | 0 | 0 | 0 | 1 | 1 | 0 | 0 | 1 | 0 | 0 | 0 |
| 439 | 1 | 0 | 0 | 0 | 1 | 1 | 0 | 0 | 1 | 0 | 0 |
| 440 | 0 | 1 | 0 | 0 | 0 | 1 | 1 | 0 | 0 | 1 | 0 |
| 441 | 1 | 0 | 1 | 0 | 0 | 0 | 1 | 1 | 0 | 0 | 1 |
| 442 | 0 | 1 | 0 | 1 | 0 | 0 | 0 | 1 | 1 | 0 | 0 |
| 443 | 0 | 0 | 1 | 0 | 1 | 0 | 0 | 0 | 1 | 1 | 0 |
| 444 | 0 | 0 | 0 | 1 | 0 | 1 | 0 | 0 | 0 | 1 | 1 |
| 445 | 0 | 0 | 0 | 0 | 1 | 0 | 1 | 0 | 0 | 0 | 1 |
| 446 | 0 | 0 | 0 | 0 | 0 | 1 | 0 | 1 | 0 | 0 | 0 |
| 447 | 1 | 0 | 0 | 0 | 0 | 0 | 1 | 0 | 1 | 0 | 0 |
| 448 | 0 | 1 | 0 | 0 | 0 | 0 | 0 | 1 | 0 | 1 | 0 |
| 449 | 1 | 0 | 1 | 0 | 0 | 0 | 0 | 0 | 1 | 0 | 1 |
| 450 | 1 | 1 | 0 | 1 | 0 | 0 | 0 | 0 | 0 | 1 | 0 |

Fig-4C5(c)

Count State Table For Window Counter Of Fig-4C4

| COUNT | 1 | 2 | 3 | 4 | 5 | 6 | 7 | 8 | 9 | 10 | 11 |
|---|---|---|---|---|---|---|---|---|---|---|---|
| 451 | 1 | 1 | 1 | 0 | 1 | 0 | 0 | 0 | 0 | 0 | 1 |
| 452 | 0 | 1 | 1 | 1 | 0 | 1 | 0 | 0 | 0 | 0 | 0 |
| 453 | 1 | 0 | 1 | 1 | 1 | 0 | 1 | 0 | 0 | 0 | 0 |
| 454 | 1 | 1 | 0 | 1 | 1 | 1 | 0 | 1 | 0 | 0 | 0 |
| 455 | 1 | 1 | 1 | 0 | 1 | 1 | 1 | 0 | 1 | 0 | 0 |
| 456 | 0 | 1 | 1 | 1 | 0 | 1 | 1 | 1 | 0 | 1 | 0 |
| 457 | 1 | 0 | 1 | 1 | 1 | 0 | 1 | 1 | 1 | 0 | 1 |
| 458 | 1 | 1 | 0 | 1 | 1 | 1 | 0 | 1 | 1 | 1 | 0 |
| 459 | 0 | 1 | 1 | 0 | 1 | 1 | 1 | 0 | 1 | 1 | 1 |
| 460 | 1 | 0 | 1 | 1 | 0 | 1 | 1 | 1 | 0 | 1 | 1 |
| 461 | 0 | 1 | 0 | 1 | 1 | 0 | 1 | 1 | 1 | 0 | 1 |
| 462 | 1 | 0 | 1 | 0 | 1 | 1 | 0 | 1 | 1 | 1 | 0 |
| 463 | 0 | 1 | 0 | 1 | 0 | 1 | 1 | 0 | 1 | 1 | 1 |
| 464 | 1 | 0 | 1 | 0 | 1 | 0 | 1 | 1 | 0 | 1 | 1 |
| 465 | 0 | 1 | 0 | 1 | 0 | 1 | 0 | 1 | 1 | 0 | 1 |
| 466 | 1 | 0 | 1 | 0 | 1 | 0 | 1 | 0 | 1 | 1 | 0 |
| 467 | 0 | 1 | 0 | 1 | 0 | 1 | 0 | 1 | 0 | 1 | 1 |
| 468 | 0 | 0 | 1 | 0 | 1 | 0 | 1 | 0 | 1 | 0 | 1 |
| 469 | 1 | 0 | 0 | 1 | 0 | 1 | 0 | 1 | 0 | 1 | 0 |
| 470 | 1 | 1 | 0 | 0 | 1 | 0 | 1 | 0 | 1 | 0 | 1 |
| 471 | 1 | 1 | 1 | 0 | 0 | 1 | 0 | 1 | 0 | 1 | 0 |
| 472 | 1 | 1 | 1 | 1 | 0 | 0 | 1 | 0 | 1 | 0 | 1 |
| 473 | 1 | 1 | 1 | 1 | 1 | 0 | 0 | 1 | 0 | 1 | 0 |
| 474 | 1 | 1 | 1 | 1 | 1 | 1 | 0 | 0 | 1 | 0 | 1 |
| 475 | 1 | 1 | 1 | 1 | 1 | 1 | 1 | 0 | 0 | 1 | 0 |
| 476 | 1 | 1 | 1 | 1 | 1 | 1 | 1 | 1 | 0 | 0 | 1 |
| 477 | 0 | 1 | 1 | 1 | 1 | 1 | 1 | 1 | 1 | 0 | 0 |
| 478 | 0 | 0 | 1 | 1 | 1 | 1 | 1 | 1 | 1 | 1 | 0 |
| 479 | 0 | 0 | 0 | 1 | 1 | 1 | 1 | 1 | 1 | 1 | 1 |
| 480 | 1 | 0 | 0 | 0 | 1 | 1 | 1 | 1 | 1 | 1 | 1 |
| 481 | 1 | 1 | 0 | 0 | 0 | 1 | 1 | 1 | 1 | 1 | 1 |
| 482 | 1 | 1 | 1 | 0 | 0 | 0 | 1 | 1 | 1 | 1 | 1 |
| 483 | 1 | 1 | 1 | 1 | 0 | 0 | 0 | 1 | 1 | 1 | 1 |
| 484 | 1 | 1 | 1 | 1 | 1 | 0 | 0 | 0 | 1 | 1 | 1 |
| 485 | 1 | 1 | 1 | 1 | 1 | 1 | 0 | 0 | 0 | 1 | 1 |
| 486 | 0 | 1 | 1 | 1 | 1 | 1 | 1 | 0 | 0 | 0 | 1 |
| 487 | 0 | 0 | 1 | 1 | 1 | 1 | 1 | 1 | 0 | 0 | 0 |
| 488 | 1 | 0 | 0 | 1 | 1 | 1 | 1 | 1 | 1 | 0 | 0 |
| 489 | 0 | 1 | 0 | 0 | 1 | 1 | 1 | 1 | 1 | 1 | 0 |
| 490 | 0 | 0 | 1 | 0 | 0 | 1 | 1 | 1 | 1 | 1 | 1 |
| 491 | 1 | 0 | 0 | 1 | 0 | 0 | 1 | 1 | 1 | 1 | 1 |
| 492 | 1 | 1 | 0 | 0 | 1 | 0 | 0 | 1 | 1 | 1 | 1 |
| 493 | 1 | 1 | 1 | 0 | 0 | 1 | 0 | 0 | 1 | 1 | 1 |
| 494 | 1 | 1 | 1 | 1 | 0 | 0 | 1 | 0 | 0 | 1 | 1 |
| 495 | 0 | 1 | 1 | 1 | 1 | 0 | 0 | 1 | 0 | 0 | 1 |
| 496 | 0 | 0 | 1 | 1 | 1 | 1 | 0 | 0 | 1 | 0 | 0 |
| 497 | 0 | 0 | 0 | 1 | 1 | 1 | 1 | 0 | 0 | 1 | 0 |
| 498 | 1 | 0 | 0 | 0 | 1 | 1 | 1 | 1 | 0 | 0 | 1 |
| 499 | 0 | 1 | 0 | 0 | 0 | 1 | 1 | 1 | 1 | 0 | 0 |
| 500 | 0 | 0 | 1 | 0 | 0 | 0 | 1 | 1 | 1 | 1 | 0 |
| 501 | 0 | 0 | 0 | 1 | 0 | 0 | 0 | 1 | 1 | 1 | 1 |
| 502 | 1 | 0 | 0 | 0 | 1 | 0 | 0 | 0 | 1 | 1 | 1 |
| 503 | 1 | 1 | 0 | 0 | 0 | 1 | 0 | 0 | 0 | 1 | 1 |
| 504 | 0 | 1 | 1 | 0 | 0 | 0 | 1 | 0 | 0 | 0 | 1 |
| 505 | 0 | 0 | 1 | 1 | 0 | 0 | 0 | 1 | 0 | 0 | 0 |
| 506 | 1 | 0 | 0 | 1 | 1 | 0 | 0 | 0 | 1 | 0 | 0 |
| 507 | 0 | 1 | 0 | 0 | 1 | 1 | 0 | 0 | 0 | 1 | 0 |
| 508 | 1 | 0 | 1 | 0 | 0 | 1 | 1 | 0 | 0 | 0 | 1 |
| 509 | 0 | 1 | 0 | 1 | 0 | 0 | 1 | 1 | 0 | 0 | 0 |
| 510 | 1 | 0 | 1 | 0 | 1 | 0 | 0 | 1 | 1 | 0 | 0 |
| 511 | 0 | 1 | 0 | 1 | 0 | 1 | 0 | 0 | 1 | 1 | 0 |
| 512 | 0 | 0 | 1 | 0 | 1 | 0 | 1 | 0 | 0 | 1 | 1 |
| 513 | 0 | 0 | 0 | 1 | 0 | 1 | 0 | 1 | 0 | 0 | 1 |
| 514 | 0 | 0 | 0 | 0 | 1 | 0 | 1 | 0 | 1 | 0 | 0 |
| 515 | 0 | 0 | 0 | 0 | 0 | 1 | 0 | 1 | 0 | 1 | 0 |
| 516 | 1 | 0 | 0 | 0 | 0 | 0 | 1 | 0 | 1 | 0 | 1 |
| 517 | 1 | 1 | 0 | 0 | 0 | 0 | 0 | 1 | 0 | 1 | 0 |
| 518 | 1 | 1 | 1 | 0 | 0 | 0 | 0 | 0 | 1 | 0 | 1 |
| 519 | 1 | 1 | 1 | 1 | 0 | 0 | 0 | 0 | 0 | 1 | 0 |
| 520 | 1 | 1 | 1 | 1 | 1 | 0 | 0 | 0 | 0 | 0 | 1 |
| 521 | 0 | 1 | 1 | 1 | 1 | 1 | 0 | 0 | 0 | 0 | 0 |
| 522 | 1 | 0 | 1 | 1 | 1 | 1 | 1 | 0 | 0 | 0 | 0 |
| 523 | 1 | 1 | 0 | 1 | 1 | 1 | 1 | 1 | 0 | 0 | 0 |
| 524 | 1 | 1 | 1 | 0 | 1 | 1 | 1 | 1 | 1 | 0 | 0 |
| 525 | 0 | 1 | 1 | 1 | 0 | 1 | 1 | 1 | 1 | 1 | 0 |

| COUNT | 1 | 2 | 3 | 4 | 5 | 6 | 7 | 8 | 9 | 10 | 11 |
|---|---|---|---|---|---|---|---|---|---|---|---|
| 526 | 0 | 0 | 1 | 1 | 1 | 0 | 1 | 1 | 1 | 1 | 1 |
| 527 | 1 | 0 | 0 | 1 | 1 | 1 | 0 | 1 | 1 | 1 | 1 |
| 528 | 1 | 1 | 0 | 0 | 1 | 1 | 1 | 0 | 1 | 1 | 1 |
| 529 | 1 | 1 | 1 | 0 | 0 | 1 | 1 | 1 | 0 | 1 | 1 |
| 530 | 0 | 1 | 1 | 1 | 0 | 0 | 1 | 1 | 1 | 0 | 1 |
| 531 | 1 | 0 | 1 | 1 | 1 | 0 | 0 | 1 | 1 | 1 | 0 |
| 532 | 0 | 1 | 0 | 1 | 1 | 1 | 0 | 0 | 1 | 1 | 1 |
| 533 | 1 | 0 | 1 | 0 | 1 | 1 | 1 | 0 | 0 | 1 | 1 |
| 534 | 0 | 1 | 0 | 1 | 0 | 1 | 1 | 1 | 0 | 0 | 1 |
| 535 | 0 | 0 | 1 | 0 | 1 | 0 | 1 | 1 | 1 | 0 | 0 |
| 536 | 0 | 0 | 0 | 1 | 0 | 1 | 0 | 1 | 1 | 1 | 0 |
| 537 | 0 | 0 | 0 | 0 | 1 | 0 | 1 | 0 | 1 | 1 | 1 |
| 538 | 1 | 0 | 0 | 0 | 0 | 1 | 0 | 1 | 0 | 1 | 1 |
| 539 | 0 | 1 | 0 | 0 | 0 | 0 | 1 | 0 | 1 | 0 | 1 |
| 540 | 1 | 0 | 1 | 0 | 0 | 0 | 0 | 1 | 0 | 1 | 0 |
| 541 | 1 | 1 | 0 | 1 | 0 | 0 | 0 | 0 | 1 | 0 | 1 |
| 542 | 1 | 1 | 1 | 0 | 1 | 0 | 0 | 0 | 0 | 1 | 0 |
| 543 | 1 | 1 | 1 | 1 | 0 | 1 | 0 | 0 | 0 | 0 | 1 |
| 544 | 0 | 1 | 1 | 1 | 1 | 0 | 1 | 0 | 0 | 0 | 0 |
| 545 | 1 | 0 | 1 | 1 | 1 | 1 | 0 | 1 | 0 | 0 | 0 |
| 546 | 1 | 1 | 0 | 1 | 1 | 1 | 1 | 0 | 1 | 0 | 0 |
| 547 | 0 | 1 | 1 | 0 | 1 | 1 | 1 | 1 | 0 | 1 | 0 |
| 548 | 1 | 0 | 1 | 1 | 0 | 1 | 1 | 1 | 1 | 0 | 1 |
| 549 | 1 | 1 | 0 | 1 | 1 | 0 | 1 | 1 | 1 | 1 | 0 |
| 550 | 0 | 1 | 1 | 0 | 1 | 1 | 0 | 1 | 1 | 1 | 1 |
| 551 | 1 | 0 | 1 | 1 | 0 | 1 | 1 | 0 | 1 | 1 | 1 |
| 552 | 1 | 1 | 0 | 1 | 1 | 0 | 1 | 1 | 0 | 1 | 1 |
| 553 | 0 | 1 | 1 | 0 | 1 | 1 | 0 | 1 | 1 | 0 | 1 |
| 554 | 1 | 0 | 1 | 1 | 0 | 1 | 1 | 0 | 1 | 1 | 0 |
| 555 | 0 | 1 | 0 | 1 | 1 | 0 | 1 | 1 | 0 | 1 | 1 |
| 556 | 0 | 0 | 1 | 0 | 1 | 1 | 0 | 1 | 1 | 0 | 1 |
| 557 | 1 | 0 | 0 | 1 | 0 | 1 | 1 | 0 | 1 | 1 | 0 |
| 558 | 0 | 1 | 0 | 0 | 1 | 0 | 1 | 1 | 0 | 1 | 1 |
| 559 | 0 | 0 | 1 | 0 | 0 | 1 | 0 | 1 | 1 | 0 | 1 |
| 560 | 1 | 0 | 0 | 1 | 0 | 0 | 1 | 0 | 1 | 1 | 0 |
| 561 | 0 | 1 | 0 | 0 | 1 | 0 | 0 | 1 | 0 | 1 | 1 |
| 562 | 0 | 0 | 1 | 0 | 0 | 1 | 0 | 0 | 1 | 0 | 1 |
| 563 | 1 | 0 | 0 | 1 | 0 | 0 | 1 | 0 | 0 | 1 | 0 |
| 564 | 1 | 1 | 0 | 0 | 1 | 0 | 0 | 1 | 0 | 0 | 1 |
| 565 | 0 | 1 | 1 | 0 | 0 | 1 | 0 | 0 | 1 | 0 | 0 |
| 566 | 0 | 0 | 1 | 1 | 0 | 0 | 1 | 0 | 0 | 1 | 0 |
| 567 | 1 | 0 | 0 | 1 | 1 | 0 | 0 | 1 | 0 | 0 | 1 |
| 568 | 0 | 1 | 0 | 0 | 1 | 1 | 0 | 0 | 1 | 0 | 0 |
| 569 | 0 | 0 | 1 | 0 | 0 | 1 | 1 | 0 | 0 | 1 | 0 |
| 570 | 1 | 0 | 0 | 1 | 0 | 0 | 1 | 1 | 0 | 0 | 1 |
| 571 | 0 | 1 | 0 | 0 | 1 | 0 | 0 | 1 | 1 | 0 | 0 |
| 572 | 0 | 0 | 1 | 0 | 0 | 1 | 0 | 0 | 1 | 1 | 0 |
| 573 | 0 | 0 | 0 | 1 | 0 | 0 | 1 | 0 | 0 | 1 | 1 |
| 574 | 0 | 0 | 0 | 0 | 1 | 0 | 0 | 1 | 0 | 0 | 1 |
| 575 | 0 | 0 | 0 | 0 | 0 | 1 | 0 | 0 | 1 | 0 | 0 |
| 576 | 0 | 0 | 0 | 0 | 0 | 0 | 1 | 0 | 0 | 1 | 0 |
| 577 | 1 | 0 | 0 | 0 | 0 | 0 | 0 | 1 | 0 | 0 | 1 |
| 578 | 0 | 1 | 0 | 0 | 0 | 0 | 0 | 0 | 1 | 0 | 0 |
| 579 | 0 | 0 | 1 | 0 | 0 | 0 | 0 | 0 | 0 | 1 | 0 |
| 580 | 1 | 0 | 0 | 1 | 0 | 0 | 0 | 0 | 0 | 0 | 1 |
| 581 | 0 | 1 | 0 | 0 | 1 | 0 | 0 | 0 | 0 | 0 | 0 |
| 582 | 1 | 0 | 1 | 0 | 0 | 1 | 0 | 0 | 0 | 0 | 0 |
| 583 | 1 | 1 | 0 | 1 | 0 | 0 | 1 | 0 | 0 | 0 | 0 |
| 584 | 1 | 1 | 1 | 0 | 1 | 0 | 0 | 1 | 0 | 0 | 0 |
| 585 | 1 | 1 | 1 | 1 | 0 | 1 | 0 | 0 | 1 | 0 | 0 |
| 586 | 0 | 1 | 1 | 1 | 1 | 0 | 1 | 0 | 0 | 1 | 0 |
| 587 | 1 | 0 | 1 | 1 | 1 | 1 | 0 | 1 | 0 | 0 | 1 |
| 588 | 0 | 1 | 0 | 1 | 1 | 1 | 1 | 0 | 1 | 0 | 0 |
| 589 | 0 | 0 | 1 | 0 | 1 | 1 | 1 | 1 | 0 | 1 | 0 |
| 590 | 1 | 0 | 0 | 1 | 0 | 1 | 1 | 1 | 1 | 0 | 1 |
| 591 | 1 | 1 | 0 | 0 | 1 | 0 | 1 | 1 | 1 | 1 | 0 |
| 592 | 0 | 1 | 1 | 0 | 0 | 1 | 0 | 1 | 1 | 1 | 1 |
| 593 | 1 | 0 | 1 | 1 | 0 | 0 | 1 | 0 | 1 | 1 | 1 |
| 594 | 1 | 1 | 0 | 1 | 1 | 0 | 0 | 1 | 0 | 1 | 1 |
| 595 | 0 | 1 | 1 | 0 | 1 | 1 | 0 | 0 | 1 | 0 | 1 |
| 596 | 1 | 0 | 1 | 1 | 0 | 1 | 1 | 0 | 0 | 1 | 0 |
| 597 | 1 | 1 | 0 | 1 | 1 | 0 | 1 | 1 | 0 | 0 | 1 |
| 598 | 0 | 1 | 1 | 0 | 1 | 1 | 0 | 1 | 1 | 0 | 0 |
| 599 | 0 | 0 | 1 | 1 | 0 | 1 | 1 | 0 | 1 | 1 | 0 |
| 600 | 0 | 0 | 0 | 1 | 1 | 0 | 1 | 1 | 0 | 1 | 1 |

| COUNT | 1 | 2 | 3 | 4 | 5 | 6 | 7 | 8 | 9 | 10 | 11 |
|---|---|---|---|---|---|---|---|---|---|---|---|
| 601 | 0 | 0 | 0 | 0 | 1 | 1 | 0 | 1 | 1 | 0 | 1 |
| 602 | 1 | 0 | 0 | 0 | 0 | 1 | 1 | 0 | 1 | 1 | 0 |
| 603 | 0 | 1 | 0 | 0 | 0 | 0 | 1 | 1 | 0 | 1 | 1 |
| 604 | 0 | 0 | 1 | 0 | 0 | 0 | 0 | 1 | 1 | 0 | 1 |
| 605 | 1 | 0 | 0 | 1 | 0 | 0 | 0 | 0 | 1 | 1 | 0 |
| 606 | 0 | 1 | 0 | 0 | 1 | 0 | 0 | 0 | 0 | 1 | 1 |
| 607 | 0 | 0 | 1 | 0 | 0 | 1 | 0 | 0 | 0 | 0 | 1 |
| 608 | 0 | 0 | 0 | 1 | 0 | 0 | 1 | 0 | 0 | 0 | 0 |
| 609 | 1 | 0 | 0 | 0 | 1 | 0 | 0 | 1 | 0 | 0 | 0 |
| 610 | 1 | 1 | 0 | 0 | 0 | 1 | 0 | 0 | 1 | 0 | 0 |
| 611 | 0 | 1 | 1 | 0 | 0 | 0 | 1 | 0 | 0 | 1 | 0 |
| 612 | 1 | 0 | 1 | 1 | 0 | 0 | 0 | 1 | 0 | 0 | 1 |
| 613 | 0 | 1 | 0 | 1 | 1 | 0 | 0 | 0 | 1 | 0 | 0 |
| 614 | 0 | 0 | 1 | 0 | 1 | 1 | 0 | 0 | 0 | 1 | 0 |
| 615 | 1 | 0 | 0 | 1 | 0 | 1 | 1 | 0 | 0 | 0 | 1 |
| 616 | 0 | 1 | 0 | 0 | 1 | 0 | 1 | 1 | 0 | 0 | 0 |
| 617 | 1 | 0 | 1 | 0 | 0 | 1 | 0 | 1 | 1 | 0 | 0 |
| 618 | 0 | 1 | 0 | 1 | 0 | 0 | 1 | 0 | 1 | 1 | 0 |
| 619 | 0 | 0 | 1 | 0 | 1 | 0 | 0 | 1 | 0 | 1 | 1 |
| 620 | 0 | 0 | 0 | 1 | 0 | 1 | 0 | 0 | 1 | 0 | 1 |
| 621 | 1 | 0 | 0 | 0 | 1 | 0 | 1 | 0 | 0 | 1 | 0 |
| 622 | 1 | 1 | 0 | 0 | 0 | 1 | 0 | 1 | 0 | 0 | 1 |
| 623 | 0 | 1 | 1 | 0 | 0 | 0 | 1 | 0 | 1 | 0 | 0 |
| 624 | 0 | 0 | 1 | 1 | 0 | 0 | 0 | 1 | 0 | 1 | 0 |
| 625 | 1 | 0 | 0 | 1 | 1 | 0 | 0 | 0 | 1 | 0 | 1 |
| 626 | 1 | 1 | 0 | 0 | 1 | 1 | 0 | 0 | 0 | 1 | 0 |
| 627 | 1 | 1 | 1 | 0 | 0 | 1 | 1 | 0 | 0 | 0 | 1 |
| 628 | 0 | 1 | 1 | 1 | 0 | 0 | 1 | 1 | 0 | 0 | 0 |
| 629 | 1 | 0 | 1 | 1 | 1 | 0 | 0 | 1 | 1 | 0 | 0 |
| 630 | 0 | 1 | 0 | 1 | 1 | 1 | 0 | 0 | 1 | 1 | 0 |
| 631 | 0 | 0 | 1 | 0 | 1 | 1 | 1 | 0 | 0 | 1 | 1 |
| 632 | 0 | 0 | 0 | 1 | 0 | 1 | 1 | 1 | 0 | 0 | 1 |
| 633 | 0 | 0 | 0 | 0 | 1 | 0 | 1 | 1 | 1 | 0 | 0 |
| 634 | 0 | 0 | 0 | 0 | 0 | 1 | 0 | 1 | 1 | 1 | 0 |
| 635 | 0 | 0 | 0 | 0 | 0 | 0 | 1 | 0 | 1 | 1 | 1 |
| 636 | 1 | 0 | 0 | 0 | 0 | 0 | 0 | 1 | 0 | 1 | 1 |
| 637 | 0 | 1 | 0 | 0 | 0 | 0 | 0 | 0 | 1 | 0 | 1 |
| 638 | 1 | 0 | 1 | 0 | 0 | 0 | 0 | 0 | 0 | 1 | 0 |
| 639 | 1 | 1 | 0 | 1 | 0 | 0 | 0 | 0 | 0 | 0 | 1 |
| 640 | 0 | 1 | 1 | 0 | 1 | 0 | 0 | 0 | 0 | 0 | 0 |
| 641 | 1 | 0 | 1 | 1 | 0 | 1 | 0 | 0 | 0 | 0 | 0 |
| 642 | 1 | 1 | 0 | 1 | 1 | 0 | 1 | 0 | 0 | 0 | 0 |
| 643 | 1 | 1 | 1 | 0 | 1 | 1 | 0 | 1 | 0 | 0 | 0 |
| 644 | 1 | 1 | 1 | 1 | 0 | 1 | 1 | 0 | 1 | 0 | 0 |
| 645 | 0 | 1 | 1 | 1 | 1 | 0 | 1 | 1 | 0 | 1 | 0 |
| 646 | 1 | 0 | 1 | 1 | 1 | 1 | 0 | 1 | 1 | 0 | 1 |
| 647 | 1 | 1 | 0 | 1 | 1 | 1 | 1 | 0 | 1 | 1 | 0 |
| 648 | 0 | 1 | 1 | 0 | 1 | 1 | 1 | 1 | 0 | 1 | 1 |
| 649 | 0 | 0 | 1 | 1 | 0 | 1 | 1 | 1 | 1 | 0 | 1 |
| 650 | 1 | 0 | 0 | 1 | 1 | 0 | 1 | 1 | 1 | 1 | 0 |
| 651 | 0 | 1 | 0 | 0 | 1 | 1 | 0 | 1 | 1 | 1 | 1 |
| 652 | 1 | 0 | 1 | 0 | 0 | 1 | 1 | 0 | 1 | 1 | 1 |
| 653 | 1 | 1 | 0 | 1 | 0 | 0 | 1 | 1 | 0 | 1 | 1 |
| 654 | 0 | 1 | 1 | 0 | 1 | 0 | 0 | 1 | 1 | 0 | 1 |
| 655 | 1 | 0 | 1 | 1 | 0 | 1 | 0 | 0 | 1 | 1 | 0 |
| 656 | 0 | 1 | 0 | 1 | 1 | 0 | 1 | 0 | 0 | 1 | 1 |
| 657 | 0 | 0 | 1 | 0 | 1 | 1 | 0 | 1 | 0 | 0 | 1 |
| 658 | 0 | 0 | 0 | 1 | 0 | 1 | 1 | 0 | 1 | 0 | 0 |
| 659 | 0 | 0 | 0 | 0 | 1 | 0 | 1 | 1 | 0 | 1 | 0 |
| 660 | 1 | 0 | 0 | 0 | 0 | 1 | 0 | 1 | 1 | 0 | 1 |
| 661 | 1 | 1 | 0 | 0 | 0 | 0 | 1 | 0 | 1 | 1 | 0 |
| 662 | 0 | 1 | 1 | 0 | 0 | 0 | 0 | 1 | 0 | 1 | 1 |
| 663 | 0 | 0 | 1 | 1 | 0 | 0 | 0 | 0 | 1 | 0 | 1 |
| 664 | 1 | 0 | 0 | 1 | 1 | 0 | 0 | 0 | 0 | 1 | 0 |
| 665 | 1 | 1 | 0 | 0 | 1 | 1 | 0 | 0 | 0 | 0 | 1 |
| 666 | 0 | 1 | 1 | 0 | 0 | 1 | 1 | 0 | 0 | 0 | 0 |
| 667 | 1 | 0 | 1 | 1 | 0 | 0 | 1 | 1 | 0 | 0 | 0 |
| 668 | 1 | 1 | 0 | 1 | 1 | 0 | 0 | 1 | 1 | 0 | 0 |
| 669 | 0 | 1 | 1 | 0 | 1 | 1 | 0 | 0 | 1 | 1 | 0 |
| 670 | 0 | 0 | 1 | 1 | 0 | 1 | 1 | 0 | 0 | 1 | 1 |
| 671 | 0 | 0 | 0 | 1 | 1 | 0 | 1 | 1 | 0 | 0 | 1 |
| 672 | 0 | 0 | 0 | 0 | 1 | 1 | 0 | 1 | 1 | 0 | 0 |
| 673 | 0 | 0 | 0 | 0 | 0 | 1 | 1 | 0 | 1 | 1 | 0 |
| 674 | 0 | 0 | 0 | 0 | 0 | 0 | 1 | 1 | 0 | 1 | 1 |
| 675 | 0 | 0 | 0 | 0 | 0 | 0 | 0 | 1 | 1 | 0 | 1 |

Fig - 4C5 (d)

Count State Table For Window Counter Of Fig - 4C4

| COUNT | COUNTER STAGE VALUE 1 2 3 4 5 6 7 8 9 10 11 |
|---|---|
| 676 | 1 0 0 0 0 0 0 0 1 0 1 |
| 677 | 0 1 0 0 0 0 0 0 0 1 0 |
| 678 | 0 0 1 0 0 0 0 0 0 0 1 |
| 679 | 0 0 0 1 0 0 0 0 0 0 0 |
| 680 | 1 0 0 0 1 0 0 0 0 0 0 |
| 681 | 1 1 0 0 0 1 0 0 0 0 0 |
| 682 | 1 1 1 0 0 0 1 0 0 0 0 |
| 683 | 1 1 1 1 0 0 0 1 0 0 0 |
| 684 | 1 1 1 1 1 0 0 0 1 0 0 |
| 685 | 0 1 1 1 1 1 0 0 0 1 0 |
| 686 | 1 0 1 1 1 1 1 0 0 0 1 |
| 687 | 0 1 0 1 1 1 1 1 0 0 0 |
| 688 | 1 0 1 0 1 1 1 1 1 0 0 |
| 689 | 0 1 0 1 0 1 1 1 1 1 0 |
| 690 | 0 0 1 0 1 0 1 1 1 1 1 |
| 691 | 1 0 0 1 0 1 0 1 1 1 1 |
| 692 | 1 1 0 0 1 0 1 0 1 1 1 |
| 693 | 1 1 1 0 0 1 0 1 0 1 1 |
| 694 | 0 1 1 1 0 0 1 0 1 0 1 |
| 695 | 1 0 1 1 1 0 0 1 0 1 0 |
| 696 | 1 1 0 1 1 1 0 0 1 0 1 |
| 697 | 1 1 1 0 1 1 1 0 0 1 0 |
| 698 | 1 1 1 1 0 1 1 1 0 0 1 |
| 699 | 0 1 1 1 1 0 1 1 1 0 0 |
| 700 | 0 0 1 1 1 1 0 1 1 1 0 |
| 701 | 0 0 0 1 1 1 1 0 1 1 1 |
| 702 | 1 0 0 0 1 1 1 1 0 1 1 |
| 703 | 0 1 0 0 0 1 1 1 1 0 1 |
| 704 | 1 0 1 0 0 0 1 1 1 1 0 |
| 705 | 0 1 0 1 0 0 0 1 1 1 1 |
| 706 | 1 0 1 0 1 0 0 0 1 1 1 |
| 707 | 1 1 0 1 0 1 0 0 0 1 1 |
| 708 | 0 1 1 0 1 0 1 0 0 0 1 |
| 709 | 0 0 1 1 0 1 0 1 0 0 0 |
| 710 | 1 0 0 1 1 0 1 0 1 0 0 |
| 711 | 0 1 0 0 1 1 0 1 0 1 0 |
| 712 | 1 0 1 0 0 1 1 0 1 0 1 |
| 713 | 1 1 0 1 0 0 1 1 0 1 0 |
| 714 | 1 1 1 0 1 0 0 1 1 0 1 |
| 715 | 1 1 1 1 0 1 0 0 1 1 0 |
| 716 | 0 1 1 1 1 0 1 0 0 1 1 |
| 717 | 0 0 1 1 1 1 0 1 0 0 1 |
| 718 | 0 0 0 1 1 1 1 0 1 0 0 |
| 719 | 0 0 0 0 1 1 1 1 0 1 0 |
| 720 | 1 0 0 0 0 1 1 1 1 0 1 |
| 721 | 1 1 0 0 0 0 1 1 1 1 0 |
| 722 | 0 1 1 0 0 0 0 1 1 1 1 |
| 723 | 1 0 1 1 0 0 0 0 1 1 1 |
| 724 | 1 1 0 1 1 0 0 0 0 1 1 |
| 725 | 0 1 1 0 1 1 0 0 0 0 1 |
| 726 | 0 0 1 1 0 1 1 0 0 0 0 |
| 727 | 1 0 0 1 1 0 1 1 0 0 0 |
| 728 | 1 1 0 0 1 1 0 1 1 0 0 |
| 729 | 0 1 1 0 0 1 1 0 1 1 0 |
| 730 | 0 0 1 1 0 0 1 1 0 1 1 |
| 731 | 0 0 0 1 1 0 0 1 1 0 1 |
| 732 | 1 0 0 0 1 1 0 0 1 1 0 |
| 733 | 0 1 0 0 0 1 1 0 0 1 1 |
| 734 | 0 0 1 0 0 0 1 1 0 0 1 |
| 735 | 0 0 0 1 0 0 0 1 1 0 0 |
| 736 | 0 0 0 0 1 0 0 0 1 1 0 |
| 737 | 0 0 0 0 0 1 0 0 0 1 1 |
| 738 | 0 0 0 0 0 0 1 0 0 0 1 |
| 739 | 0 0 0 0 0 0 0 1 0 0 0 |
| 740 | 1 0 0 0 0 0 0 0 1 0 0 |
| 741 | 0 1 0 0 0 0 0 0 0 1 0 |
| 742 | 1 0 1 0 0 0 0 0 0 0 1 |
| 743 | 0 1 0 1 0 0 0 0 0 0 0 |
| 744 | 1 0 1 0 1 0 0 0 0 0 0 |
| 745 | 1 1 0 1 0 1 0 0 0 0 0 |
| 746 | 1 1 1 0 1 0 1 0 0 0 0 |
| 747 | 1 1 1 1 0 1 0 1 0 0 0 |
| 748 | 1 1 1 1 1 0 1 0 1 0 0 |
| 749 | 0 1 1 1 1 1 0 1 0 1 0 |
| 750 | 1 0 1 1 1 1 1 0 1 0 1 |

| COUNT | COUNTER STAGE VALUE 1 2 3 4 5 6 7 8 9 10 11 |
|---|---|
| 751 | 1 1 0 1 1 1 1 1 0 1 0 |
| 752 | 1 1 1 0 1 1 1 1 1 0 1 |
| 753 | 1 1 1 1 0 1 1 1 1 1 0 |
| 754 | 0 1 1 1 1 0 1 1 1 1 1 |
| 755 | 1 0 1 1 1 1 0 1 1 1 1 |
| 756 | 1 1 0 1 1 1 1 0 1 1 1 |
| 757 | 1 1 1 0 1 1 1 1 0 1 1 |
| 758 | 0 1 1 1 0 1 1 1 1 0 1 |
| 759 | 1 0 1 1 1 0 1 1 1 1 0 |
| 760 | 0 1 0 1 1 1 0 1 1 1 1 |
| 761 | 1 0 1 0 1 1 1 0 1 1 1 |
| 762 | 1 1 0 1 0 1 1 1 0 1 1 |
| 763 | 0 1 1 0 1 0 1 1 1 0 1 |
| 764 | 1 0 1 1 0 1 0 1 1 1 0 |
| 765 | 0 1 0 1 1 0 1 0 1 1 1 |
| 766 | 1 0 1 0 1 1 0 1 0 1 1 |
| 767 | 0 1 0 1 0 1 1 0 1 0 1 |
| 768 | 1 0 1 0 1 0 1 1 0 1 0 |
| 769 | 1 1 0 1 0 1 0 1 1 0 1 |
| 770 | 1 1 1 0 1 0 1 0 1 1 0 |
| 771 | 0 1 1 1 0 1 0 1 0 1 1 |
| 772 | 0 0 1 1 1 0 1 0 1 0 1 |
| 773 | 1 0 0 1 1 1 0 1 0 1 0 |
| 774 | 1 1 0 0 1 1 1 0 1 0 1 |
| 775 | 1 1 1 0 0 1 1 1 0 1 0 |
| 776 | 1 1 1 1 0 0 1 1 1 0 1 |
| 777 | 1 1 1 1 1 0 0 1 1 1 0 |
| 778 | 0 1 1 1 1 1 0 0 1 1 1 |
| 779 | 1 0 1 1 1 1 1 0 0 1 1 |
| 780 | 0 1 0 1 1 1 1 1 0 0 1 |
| 781 | 0 0 1 0 1 1 1 1 1 0 0 |
| 782 | 0 0 0 1 0 1 1 1 1 1 0 |
| 783 | 0 0 0 0 1 0 1 1 1 1 1 |
| 784 | 1 0 0 0 0 1 0 1 1 1 1 |
| 785 | 1 1 0 0 0 0 1 0 1 1 1 |
| 786 | 1 1 1 0 0 0 0 1 0 1 1 |
| 787 | 0 1 1 1 0 0 0 0 1 0 1 |
| 788 | 1 0 1 1 1 0 0 0 0 1 0 |
| 789 | 1 1 0 1 1 1 0 0 0 0 1 |
| 790 | 0 1 1 0 1 1 1 0 0 0 0 |
| 791 | 1 0 1 1 0 1 1 1 0 0 0 |
| 792 | 1 1 0 1 1 0 1 1 1 0 0 |
| 793 | 0 1 1 0 1 1 0 1 1 1 0 |
| 794 | 0 0 1 1 0 1 1 0 1 1 1 |
| 795 | 1 0 0 1 1 0 1 1 0 1 1 |
| 796 | 0 1 0 0 1 1 0 1 1 0 1 |
| 797 | 1 0 1 0 0 1 1 0 1 1 0 |
| 798 | 0 1 0 1 0 0 1 1 0 1 1 |
| 799 | 0 0 1 0 1 0 0 1 1 0 1 |
| 800 | 1 0 0 1 0 1 0 0 1 1 0 |
| 801 | 0 1 0 0 1 0 1 0 0 1 1 |
| 802 | 0 0 1 0 0 1 0 1 0 0 1 |
| 803 | 0 0 0 1 0 0 1 0 1 0 0 |
| 804 | 0 0 0 0 1 0 0 1 0 1 0 |
| 805 | 1 0 0 0 0 1 0 0 1 0 1 |
| 806 | 1 1 0 0 0 0 1 0 0 1 0 |
| 807 | 1 1 1 0 0 0 0 1 0 0 1 |
| 808 | 0 1 1 1 0 0 0 0 1 0 0 |
| 809 | 0 0 1 1 1 0 0 0 0 1 0 |
| 810 | 1 0 0 1 1 1 0 0 0 0 1 |
| 811 | 0 1 0 0 1 1 1 0 0 0 0 |
| 812 | 1 0 1 0 0 1 1 1 0 0 0 |
| 813 | 1 1 0 1 0 0 1 1 1 0 0 |
| 814 | 0 1 1 0 1 0 0 1 1 1 0 |
| 815 | 0 0 1 1 0 1 0 0 1 1 1 |
| 816 | 1 0 0 1 1 0 1 0 0 1 1 |
| 817 | 0 1 0 0 1 1 0 1 0 0 1 |
| 818 | 0 0 1 0 0 1 1 0 1 0 0 |
| 819 | 0 0 0 1 0 0 1 1 0 1 0 |
| 820 | 1 0 0 0 1 0 0 1 1 0 1 |
| 821 | 1 1 0 0 0 1 0 0 1 1 0 |
| 822 | 0 1 1 0 0 0 1 0 0 1 1 |
| 823 | 0 0 1 1 0 0 0 1 0 0 1 |
| 824 | 0 0 0 1 1 0 0 0 1 0 0 |
| 825 | 0 0 0 0 1 1 0 0 0 1 0 |

| COUNT | COUNTER STAGE VALUE 1 2 3 4 5 6 7 8 9 10 11 |
|---|---|
| 826 | 1 0 0 0 0 1 1 0 0 0 1 |
| 827 | 0 1 0 0 0 0 1 1 0 0 0 |
| 828 | 1 0 1 0 0 0 0 1 1 0 0 |
| 829 | 0 1 0 1 0 0 0 0 1 1 0 |
| 830 | 0 0 1 0 1 0 0 0 0 1 1 |
| 831 | 0 0 0 1 0 1 0 0 0 0 1 |
| 832 | 0 0 0 0 1 0 1 0 0 0 0 |
| 833 | 1 0 0 0 0 1 0 1 0 0 0 |
| 834 | 1 1 0 0 0 0 1 0 1 0 0 |
| 835 | 0 1 1 0 0 0 0 1 0 1 0 |
| 836 | 1 0 1 1 0 0 0 0 1 0 1 |
| 837 | 1 1 0 1 1 0 0 0 0 1 0 |
| 838 | 1 1 1 0 1 1 0 0 0 0 1 |
| 839 | 0 1 1 1 0 1 1 0 0 0 0 |
| 840 | 1 0 1 1 1 0 1 1 0 0 0 |
| 841 | 1 1 0 1 1 1 0 1 1 0 0 |
| 842 | 0 1 1 0 1 1 1 0 1 1 0 |
| 843 | 0 0 1 1 0 1 1 1 0 1 1 |
| 844 | 0 0 0 1 1 0 1 1 1 0 1 |
| 845 | 1 0 0 0 1 1 0 1 1 1 0 |
| 846 | 0 1 0 0 0 1 1 0 1 1 1 |
| 847 | 1 0 1 0 0 0 1 1 0 1 1 |
| 848 | 0 1 0 1 0 0 0 1 1 0 1 |
| 849 | 1 0 1 0 1 0 0 0 1 1 0 |
| 850 | 0 1 0 1 0 1 0 0 0 1 1 |
| 851 | 0 0 1 0 1 0 1 0 0 0 1 |
| 852 | 0 0 0 1 0 1 0 1 0 0 0 |
| 853 | 1 0 0 0 1 0 1 0 1 0 0 |
| 854 | 0 1 0 0 0 1 0 1 0 1 0 |
| 855 | 1 0 1 0 0 0 1 0 1 0 1 |
| 856 | 1 1 0 1 0 0 0 1 0 1 0 |
| 857 | 1 1 1 0 1 0 0 0 1 0 1 |
| 858 | 1 1 1 1 0 1 0 0 0 1 0 |
| 859 | 1 1 1 1 1 0 1 0 0 0 1 |
| 860 | 0 1 1 1 1 1 0 1 0 0 0 |
| 861 | 1 0 1 1 1 1 1 0 1 0 0 |
| 862 | 0 1 0 1 1 1 1 1 0 1 0 |
| 863 | 1 0 1 0 1 1 1 1 1 0 1 |
| 864 | 1 1 0 1 0 1 1 1 1 1 0 |
| 865 | 0 1 1 0 1 0 1 1 1 1 1 |
| 866 | 1 0 1 1 0 1 0 1 1 1 1 |
| 867 | 1 1 0 1 1 0 1 0 1 1 1 |
| 868 | 1 1 1 0 1 1 0 1 0 1 1 |
| 869 | 0 1 1 1 0 1 1 0 1 0 1 |
| 870 | 1 0 1 1 1 0 1 1 0 1 0 |
| 871 | 1 1 0 1 1 1 0 1 1 0 1 |
| 872 | 1 1 1 0 1 1 1 0 1 1 0 |
| 873 | 0 1 1 1 0 1 1 1 0 1 1 |
| 874 | 0 0 1 1 1 0 1 1 1 0 1 |
| 875 | 1 0 0 1 1 1 0 1 1 1 0 |
| 876 | 0 1 0 0 1 1 1 0 1 1 1 |
| 877 | 1 0 1 0 0 1 1 1 0 1 1 |
| 878 | 0 1 0 1 0 0 1 1 1 0 1 |
| 879 | 1 0 1 0 1 0 0 1 1 1 0 |
| 880 | 0 1 0 1 0 1 0 0 1 1 1 |
| 881 | 1 0 1 0 1 0 1 0 0 1 1 |
| 882 | 0 1 0 1 0 1 0 1 0 0 1 |
| 883 | 0 0 1 0 1 0 1 0 1 0 0 |
| 884 | 0 0 0 1 0 1 0 1 0 1 0 |
| 885 | 1 0 0 0 1 0 1 0 1 0 1 |
| 886 | 1 1 0 0 0 1 0 1 0 1 0 |
| 887 | 1 1 1 0 0 0 1 0 1 0 1 |
| 888 | 1 1 1 1 0 0 0 1 0 1 0 |
| 889 | 1 1 1 1 1 0 0 0 1 0 1 |
| 890 | 1 1 1 1 1 1 0 0 0 1 0 |
| 891 | 1 1 1 1 1 1 1 0 0 0 1 |
| 892 | 0 1 1 1 1 1 1 1 0 0 0 |
| 893 | 1 0 1 1 1 1 1 1 1 0 0 |
| 894 | 0 1 0 1 1 1 1 1 1 1 0 |
| 895 | 0 0 1 0 1 1 1 1 1 1 1 |
| 896 | 1 0 0 1 0 1 1 1 1 1 1 |
| 897 | 1 1 0 0 1 0 1 1 1 1 1 |
| 898 | 1 1 1 0 0 1 0 1 1 1 1 |
| 899 | 1 1 1 1 0 0 1 0 1 1 1 |
| 900 | 1 1 1 1 1 0 0 1 0 1 1 |

Fig - 4C5 (e)

Count State Table For Window Counter Of Fig - 4C4

| COUNT | COUNTER STAGE VALUE 1 2 3 4 5 6 7 8 9 10 11 |
|---|---|
| 901 | 0 1 1 1 1 1 0 0 1 0 1 |
| 902 | 1 0 1 1 1 1 1 0 0 1 0 |
| 903 | 1 1 0 1 1 1 1 1 0 0 1 |
| 904 | 0 1 1 0 1 1 1 1 1 0 0 |
| 905 | 0 0 1 1 0 1 1 1 1 1 0 |
| 906 | 0 0 0 1 1 0 1 1 1 1 1 |
| 907 | 1 0 0 0 1 1 0 1 1 1 1 |
| 908 | 1 1 0 0 0 1 1 0 1 1 1 |
| 909 | 1 1 1 0 0 0 1 1 0 1 1 |
| 910 | 0 1 1 1 0 0 0 1 1 0 1 |
| 911 | 1 0 1 1 1 0 0 0 1 1 0 |
| 912 | 0 1 0 1 1 1 0 0 0 1 1 |
| 913 | 0 0 1 0 1 1 1 0 0 0 1 |
| 914 | 0 0 0 1 0 1 1 1 0 0 0 |
| 915 | 1 0 0 0 1 0 1 1 1 0 0 |
| 916 | 0 1 0 0 0 1 0 1 1 1 0 |
| 917 | 0 0 1 0 0 0 1 0 1 1 1 |
| 918 | 1 0 0 1 0 0 0 1 0 1 1 |
| 919 | 0 1 0 0 1 0 0 0 1 0 1 |
| 920 | 1 0 1 0 0 1 0 0 0 1 0 |
| 921 | 1 1 0 1 0 0 1 0 0 0 1 |
| 922 | 0 1 1 0 1 0 0 1 0 0 0 |
| 923 | 1 0 1 1 0 1 0 0 1 0 0 |
| 924 | 0 1 0 1 1 0 1 0 0 1 0 |
| 925 | 1 0 1 0 1 1 0 1 0 0 1 |
| 926 | 0 1 0 1 0 1 1 0 1 0 0 |
| 927 | 0 0 1 0 1 0 1 1 0 1 0 |
| 928 | 1 0 0 1 0 1 0 1 1 0 1 |
| 929 | 1 1 0 0 1 0 1 0 1 1 0 |
| 930 | 0 1 1 0 0 1 0 1 0 1 1 |
| 931 | 0 0 1 1 0 0 1 0 1 0 1 |
| 932 | 1 0 0 1 1 0 0 1 0 1 0 |
| 933 | 1 1 0 0 1 1 0 0 1 0 1 |
| 934 | 1 1 1 0 0 1 1 0 0 1 0 |
| 935 | 1 1 1 1 0 0 1 1 0 0 1 |
| 936 | 0 1 1 1 1 0 0 1 1 0 0 |
| 937 | 0 0 1 1 1 1 0 0 1 1 0 |
| 938 | 0 0 0 1 1 1 1 0 0 1 1 |
| 939 | 0 0 0 0 1 1 1 1 0 0 1 |
| 940 | 0 0 0 0 0 1 1 1 1 0 0 |
| 941 | 0 0 0 0 0 0 1 1 1 1 0 |
| 942 | 0 0 0 0 0 0 0 1 1 1 1 |
| 943 | 1 0 0 0 0 0 0 0 1 1 1 |
| 944 | 1 1 0 0 0 0 0 0 0 1 1 |
| 945 | 0 1 1 0 0 0 0 0 0 0 1 |
| 946 | 0 0 1 1 0 0 0 0 0 0 0 |
| 947 | 1 0 0 1 1 0 0 0 0 0 0 |
| 948 | 1 1 0 0 1 1 0 0 0 0 0 |
| 949 | 1 1 1 0 0 1 1 0 0 0 0 |
| 950 | 1 1 1 1 0 0 1 1 0 0 0 |
| 951 | 1 1 1 1 1 0 0 1 1 0 0 |
| 952 | 0 1 1 1 1 1 0 0 1 1 0 |
| 953 | 0 0 1 1 1 1 1 0 0 1 1 |
| 954 | 0 0 0 1 1 1 1 1 0 0 1 |
| 955 | 0 0 0 0 1 1 1 1 1 0 0 |
| 956 | 0 0 0 0 0 1 1 1 1 1 0 |
| 957 | 0 0 0 0 0 0 1 1 1 1 1 |
| 958 | 1 0 0 0 0 0 0 1 1 1 1 |
| 959 | 1 1 0 0 0 0 0 0 1 1 1 |
| 960 | 1 1 1 0 0 0 0 0 0 1 1 |
| 961 | 0 1 1 1 0 0 0 0 0 0 1 |
| 962 | 0 0 1 1 1 0 0 0 0 0 0 |
| 963 | 1 0 0 1 1 1 0 0 0 0 0 |
| 964 | 1 1 0 0 1 1 1 0 0 0 0 |
| 965 | 1 1 1 0 0 1 1 1 0 0 0 |
| 966 | 1 1 1 1 0 0 1 1 1 0 0 |
| 967 | 0 1 1 1 1 0 0 1 1 1 0 |
| 968 | 0 0 1 1 1 1 0 0 1 1 1 |
| 969 | 1 0 0 1 1 1 1 0 0 1 1 |
| 970 | 0 1 0 0 1 1 1 1 0 0 1 |
| 971 | 0 0 1 0 0 1 1 1 1 0 0 |
| 972 | 0 0 0 1 0 0 1 1 1 1 0 |
| 973 | 0 0 0 0 1 0 0 1 1 1 1 |
| 974 | 1 0 0 0 0 1 0 0 1 1 1 |
| 975 | 1 1 0 0 0 0 1 0 0 1 1 |
| 976 | 0 1 1 0 0 0 0 1 0 0 1 |
| 977 | 0 0 1 1 0 0 0 0 1 0 0 |
| 978 | 0 0 0 1 1 0 0 0 0 1 0 |
| 979 | 1 0 0 0 1 1 0 0 0 0 1 |
| 980 | 0 1 0 0 0 1 1 0 0 0 0 |
| 981 | 1 0 1 0 0 0 1 1 0 0 0 |
| 982 | 1 1 0 1 0 0 0 1 1 0 0 |
| 983 | 0 1 1 0 1 0 0 0 1 1 0 |
| 984 | 0 0 1 1 0 1 0 0 0 1 1 |
| 985 | 0 0 0 1 1 0 1 0 0 0 1 |
| 986 | 0 0 0 0 1 1 0 1 0 0 0 |
| 987 | 1 0 0 0 0 1 1 0 1 0 0 |
| 988 | 0 1 0 0 0 0 1 1 0 1 0 |
| 989 | 1 0 1 0 0 0 0 1 1 0 1 |
| 990 | 1 1 0 1 0 0 0 0 1 1 0 |
| 991 | 0 1 1 0 1 0 0 0 0 1 1 |
| 992 | 0 0 1 1 0 1 0 0 0 0 1 |
| 993 | 0 0 0 1 1 0 1 0 0 0 0 |
| 994 | 1 0 0 0 1 1 0 1 0 0 0 |
| 995 | 1 1 0 0 0 1 1 0 1 0 0 |
| 996 | 0 1 1 0 0 0 1 1 0 1 0 |
| 997 | 1 0 1 1 0 0 0 1 1 0 1 |
| 998 | 1 1 0 1 1 0 0 0 1 1 0 |
| 999 | 0 1 1 0 1 1 0 0 0 1 1 |
| 1000 | 0 0 1 1 0 1 1 0 0 0 1 |
| 1001 | 0 0 0 1 1 0 1 1 0 0 0 |
| 1002 | 1 0 0 0 1 1 0 1 1 0 0 |
| 1003 | 0 1 0 0 0 1 1 0 1 1 0 |
| 1004 | 0 0 1 0 0 0 1 1 0 1 1 |
| 1005 | 0 0 0 1 0 0 0 1 1 0 1 |
| 1006 | 1 0 0 0 1 0 0 0 1 1 0 |
| 1007 | 0 1 0 0 0 1 0 0 0 1 1 |
| 1008 | 0 0 1 0 0 0 1 0 0 0 1 |
| 1009 | 0 0 0 1 0 0 0 1 0 0 0 |
| 1010 | 1 0 0 0 1 0 0 0 1 0 0 |
| 1011 | 0 1 0 0 0 1 0 0 0 1 0 |
| 1012 | 1 0 1 0 0 0 1 0 0 0 1 |
| 1013 | 0 1 0 1 0 0 0 1 0 0 0 |
| 1014 | 1 0 1 0 1 0 0 0 1 0 0 |
| 1015 | 0 1 0 1 0 1 0 0 0 1 0 |
| 1016 | 1 0 1 0 1 0 1 0 0 0 1 |
| 1017 | 0 1 0 1 0 1 0 1 0 0 0 |
| 1018 | 1 0 1 0 1 0 1 0 1 0 0 |
| 1019 | 0 1 0 1 0 1 0 1 0 1 0 |
| 1020 | 1 0 1 0 1 0 1 0 1 0 1 |
| 1021 | 1 1 0 1 0 1 0 1 0 1 0 |
| 1022 | 1 1 1 0 1 0 1 0 1 0 1 |
| 1023 | 1 1 1 1 0 1 0 1 0 1 0 |
| 1024 | 1 1 1 1 1 0 1 0 1 0 1 |
| 1025 | 1 1 1 1 1 1 0 1 0 1 0 |
| 1026 | 1 1 1 1 1 1 1 0 1 0 1 |
| 1027 | 1 1 1 1 1 1 1 1 0 1 0 |
| 1028 | 1 1 1 1 1 1 1 1 1 0 1 |
| 1029 | 1 1 1 1 1 1 1 1 1 1 0 |
| 1030 | 0 1 1 1 1 1 1 1 1 1 1 |
| 1031 | 1 0 1 1 1 1 1 1 1 1 1 |
| 1032 | 1 1 0 1 1 1 1 1 1 1 1 |
| 1033 | 1 1 1 0 1 1 1 1 1 1 1 |
| 1034 | 1 1 1 1 0 1 1 1 1 1 1 |
| 1035 | 1 1 1 1 1 0 1 1 1 1 1 |
| 1036 | 1 1 1 1 1 1 0 1 1 1 1 |
| 1037 | 1 1 1 1 1 1 1 0 1 1 1 |
| 1038 | 1 1 1 1 1 1 1 1 0 1 1 |
| 1039 | 0 1 1 1 1 1 1 1 1 0 1 |
| 1040 | 1 0 1 1 1 1 1 1 1 1 0 |
| 1041 | 0 1 0 1 1 1 1 1 1 1 1 |
| 1042 | 1 0 1 0 1 1 1 1 1 1 1 |
| 1043 | 1 1 0 1 0 1 1 1 1 1 1 |
| 1044 | 1 1 1 0 1 0 1 1 1 1 1 |
| 1045 | 1 1 1 1 0 1 0 1 1 1 1 |
| 1046 | 1 1 1 1 1 0 1 0 1 1 1 |
| 1047 | 1 1 1 1 1 1 0 1 0 1 1 |
| 1048 | 0 1 1 1 1 1 1 0 1 0 1 |
| 1049 | 1 0 1 1 1 1 1 1 0 1 0 |
| 1050 | 1 1 0 1 1 1 1 1 1 0 1 |
| 1051 | 1 1 1 0 1 1 1 1 1 1 0 |
| 1052 | 0 1 1 1 0 1 1 1 1 1 1 |
| 1053 | 1 0 1 1 1 0 1 1 1 1 1 |
| 1054 | 1 1 0 1 1 1 0 1 1 1 1 |
| 1055 | 1 1 1 0 1 1 1 0 1 1 1 |
| 1056 | 1 1 1 1 0 1 1 1 0 1 1 |
| 1057 | 0 1 1 1 1 0 1 1 1 0 1 |
| 1058 | 1 0 1 1 1 1 0 1 1 1 0 |
| 1059 | 0 1 0 1 1 1 1 0 1 1 1 |
| 1060 | 1 0 1 0 1 1 1 1 0 1 1 |
| 1061 | 0 1 0 1 0 1 1 1 1 0 1 |
| 1062 | 1 0 1 0 1 0 1 1 1 1 0 |
| 1063 | 0 1 0 1 0 1 0 1 1 1 1 |
| 1064 | 1 0 1 0 1 0 1 0 1 1 1 |
| 1065 | 1 1 0 1 0 1 0 1 0 1 1 |
| 1066 | 0 1 1 0 1 0 1 0 1 0 1 |
| 1067 | 1 0 1 1 0 1 0 1 0 1 0 |
| 1068 | 1 1 0 1 1 0 1 0 1 0 1 |
| 1069 | 1 1 1 0 1 1 0 1 0 1 0 |
| 1070 | 1 1 1 1 0 1 1 0 1 0 1 |
| 1071 | 1 1 1 1 1 0 1 1 0 1 0 |
| 1072 | 1 1 1 1 1 1 0 1 1 0 1 |
| 1073 | 1 1 1 1 1 1 1 0 1 1 0 |
| 1074 | 0 1 1 1 1 1 1 1 0 1 1 |
| 1075 | 0 0 1 1 1 1 1 1 1 0 1 |
| 1076 | 1 0 0 1 1 1 1 1 1 1 0 |
| 1077 | 0 1 0 0 1 1 1 1 1 1 1 |
| 1078 | 1 0 1 0 0 1 1 1 1 1 1 |
| 1079 | 1 1 0 1 0 0 1 1 1 1 1 |
| 1080 | 1 1 1 0 1 0 0 1 1 1 1 |
| 1081 | 1 1 1 1 0 1 0 0 1 1 1 |
| 1082 | 1 1 1 1 1 0 1 0 0 1 1 |
| 1083 | 0 1 1 1 1 1 0 1 0 0 1 |
| 1084 | 0 0 1 1 1 1 1 0 1 0 0 |
| 1085 | 0 0 0 1 1 1 1 1 0 1 0 |
| 1086 | 1 0 0 0 1 1 1 1 1 0 1 |
| 1087 | 1 1 0 0 0 1 1 1 1 1 0 |
| 1088 | 0 1 1 0 0 0 1 1 1 1 1 |
| 1089 | 1 0 1 1 0 0 0 1 1 1 1 |
| 1090 | 1 1 0 1 1 0 0 0 1 1 1 |
| 1091 | 1 1 1 0 1 1 0 0 0 1 1 |
| 1092 | 0 1 1 1 0 1 1 0 0 0 1 |
| 1093 | 0 0 1 1 1 0 1 1 0 0 0 |
| 1094 | 1 0 0 1 1 1 0 1 1 0 0 |
| 1095 | 0 1 0 0 1 1 1 0 1 1 0 |
| 1096 | 0 0 1 0 0 1 1 1 0 1 1 |
| 1097 | 0 0 0 1 0 0 1 1 1 0 1 |
| 1098 | 1 0 0 0 1 0 0 1 1 1 0 |
| 1099 | 0 1 0 0 0 1 0 0 1 1 1 |
| 1100 | 1 0 1 0 0 0 1 0 0 1 1 |
| 1101 | 0 1 0 1 0 0 0 1 0 0 1 |
| 1102 | 0 0 1 0 1 0 0 0 1 0 0 |
| 1103 | 0 0 0 1 0 1 0 0 0 1 0 |
| 1104 | 1 0 0 0 1 0 1 0 0 0 1 |
| 1105 | 0 1 0 0 0 1 0 1 0 0 0 |
| 1106 | 1 0 1 0 0 0 1 0 1 0 0 |
| 1107 | 0 1 0 1 0 0 0 1 0 1 0 |
| 1108 | 1 0 1 0 1 0 0 0 1 0 1 |
| 1109 | 1 1 0 1 0 1 0 0 0 1 0 |
| 1110 | 1 1 1 0 1 0 1 0 0 0 1 |
| 1111 | 0 1 1 1 0 1 0 1 0 0 0 |
| 1112 | 1 0 1 1 1 0 1 0 1 0 0 |
| 1113 | 0 1 0 1 1 1 0 1 0 1 0 |
| 1114 | 1 0 1 0 1 1 1 0 1 0 1 |
| 1115 | 1 1 0 1 0 1 1 1 0 1 0 |
| 1116 | 1 1 1 0 1 0 1 1 1 0 1 |
| 1117 | 1 1 1 1 0 1 0 1 1 1 0 |
| 1118 | 0 1 1 1 1 0 1 0 1 1 1 |
| 1119 | 1 0 1 1 1 1 0 1 0 1 1 |
| 1120 | 0 1 0 1 1 1 1 0 1 0 1 |
| 1121 | 1 0 1 0 1 1 1 1 0 1 0 |
| 1122 | 1 1 0 1 0 1 1 1 1 0 1 |
| 1123 | 1 1 1 0 1 0 1 1 1 1 0 |
| 1124 | 0 1 1 1 0 1 0 1 1 1 1 |
| 1125 | 1 0 1 1 1 0 1 0 1 1 1 |

Fig - 4C5 (f)

Count State Table For Window Counter Of Fig - 4C4

| COUNT | COUNTER STAGE VALUE 1 2 3 4 5 6 7 8 9 10 11 |
|---|---|
| 1126 | 1 1 0 1 1 1 0 1 0 1 1 |
| 1127 | 0 1 1 0 1 1 1 0 1 0 1 |
| 1128 | 1 0 1 1 0 1 1 1 0 1 0 |
| 1129 | 1 1 0 1 1 0 1 1 1 0 1 |
| 1130 | 1 1 1 0 1 1 0 1 1 1 0 |
| 1131 | 0 1 1 1 0 1 1 0 1 1 1 |
| 1132 | 1 0 1 1 1 0 1 1 0 1 1 |
| 1133 | 0 1 0 1 1 1 0 1 1 0 1 |
| 1134 | 1 0 1 0 1 1 1 0 1 1 0 |
| 1135 | 0 1 0 1 0 1 1 1 0 1 1 |
| 1136 | 0 0 1 0 1 0 1 1 1 0 1 |
| 1137 | 1 0 0 1 0 1 0 1 1 1 0 |
| 1138 | 0 1 0 0 1 0 1 0 1 1 1 |
| 1139 | 1 0 1 0 0 1 0 1 0 1 1 |
| 1140 | 0 1 0 1 0 0 1 0 1 0 1 |
| 1141 | 1 0 1 0 1 0 0 1 0 1 0 |
| 1142 | 1 1 0 1 0 1 0 0 1 0 1 |
| 1143 | 1 1 1 0 1 0 1 0 0 1 0 |
| 1144 | 1 1 1 1 0 1 0 1 0 0 1 |
| 1145 | 0 1 1 1 1 0 1 0 1 0 0 |
| 1146 | 0 0 1 1 1 1 0 1 0 1 0 |
| 1147 | 1 0 0 1 1 1 1 0 1 0 1 |
| 1148 | 1 1 0 0 1 1 1 1 0 1 0 |
| 1149 | 1 1 1 0 0 1 1 1 1 0 1 |
| 1150 | 1 1 1 1 0 0 1 1 1 1 0 |
| 1151 | 0 1 1 1 1 0 0 1 1 1 1 |
| 1152 | 1 0 1 1 1 1 0 0 1 1 1 |
| 1153 | 1 1 0 1 1 1 1 0 0 1 1 |
| 1154 | 0 1 1 0 1 1 1 1 0 0 1 |
| 1155 | 0 0 1 1 0 1 1 1 1 0 0 |
| 1156 | 0 0 0 1 1 0 1 1 1 1 0 |
| 1157 | 0 0 0 0 1 1 0 1 1 1 1 |
| 1158 | 1 0 0 0 0 1 1 0 1 1 1 |
| 1159 | 1 1 0 0 0 0 1 1 0 1 1 |
| 1160 | 0 1 1 0 0 0 0 1 1 0 1 |
| 1161 | 1 0 1 1 0 0 0 0 1 1 0 |
| 1162 | 0 1 0 1 1 0 0 0 0 1 1 |
| 1163 | 0 0 1 0 1 1 0 0 0 0 1 |
| 1164 | 0 0 0 1 0 1 1 0 0 0 0 |
| 1165 | 1 0 0 0 1 0 1 1 0 0 0 |
| 1166 | 1 1 0 0 0 1 0 1 1 0 0 |
| 1167 | 0 1 1 0 0 0 1 0 1 1 0 |
| 1168 | 0 0 1 1 0 0 0 1 0 1 1 |
| 1169 | 0 0 0 1 1 0 0 0 1 0 1 |
| 1170 | 1 0 0 0 1 1 0 0 0 1 0 |
| 1171 | 1 1 0 0 0 1 1 0 0 0 1 |
| 1172 | 0 1 1 0 0 0 1 1 0 0 0 |
| 1173 | 1 0 1 1 0 0 0 1 1 0 0 |
| 1174 | 0 1 0 1 1 0 0 0 1 1 0 |
| 1175 | 0 0 1 0 1 1 0 0 0 1 1 |
| 1176 | 0 0 0 1 0 1 1 0 0 0 1 |
| 1177 | 0 0 0 0 1 0 1 1 0 0 0 |
| 1178 | 1 0 0 0 0 1 0 1 1 0 0 |
| 1179 | 0 1 0 0 0 0 1 0 1 1 0 |
| 1180 | 0 0 1 0 0 0 0 1 0 1 1 |
| 1181 | 0 0 0 1 0 0 0 0 1 0 1 |
| 1182 | 1 0 0 0 1 0 0 0 0 1 0 |
| 1183 | 1 1 0 0 0 1 0 0 0 0 1 |
| 1184 | 0 1 1 0 0 0 1 0 0 0 0 |
| 1185 | 1 0 1 1 0 0 0 1 0 0 0 |
| 1186 | 1 1 0 1 1 0 0 0 1 0 0 |
| 1187 | 0 1 1 0 1 1 0 0 0 1 0 |
| 1188 | 1 0 1 1 0 1 1 0 0 0 1 |
| 1189 | 0 1 0 1 1 0 1 1 0 0 0 |
| 1190 | 1 0 1 0 1 1 0 1 1 0 0 |
| 1191 | 0 1 0 1 0 1 1 0 1 1 0 |
| 1192 | 0 0 1 0 1 0 1 1 0 1 1 |
| 1193 | 0 0 0 1 0 1 0 1 1 0 1 |
| 1194 | 1 0 0 0 1 0 1 0 1 1 0 |
| 1195 | 0 1 0 0 0 1 0 1 0 1 1 |
| 1196 | 0 0 1 0 0 0 1 0 1 0 1 |
| 1197 | 1 0 0 1 0 0 0 1 0 1 0 |
| 1198 | 1 1 0 0 1 0 0 0 1 0 1 |
| 1199 | 1 1 1 0 0 1 0 0 0 1 0 |
| 1200 | 1 1 1 1 0 0 1 0 0 0 1 |
| 1201 | 0 1 1 1 1 0 0 1 0 0 0 |
| 1202 | 1 0 1 1 1 1 0 0 1 0 0 |
| 1203 | 0 1 0 1 1 1 1 0 0 1 0 |
| 1204 | 1 0 1 0 1 1 1 1 0 0 1 |
| 1205 | 0 1 0 1 0 1 1 1 1 0 0 |
| 1206 | 0 0 1 0 1 0 1 1 1 1 0 |
| 1207 | 0 0 0 1 0 1 0 1 1 1 1 |
| 1208 | 1 0 0 0 1 0 1 0 1 1 1 |
| 1209 | 1 1 0 0 0 1 0 1 0 1 1 |
| 1210 | 0 1 1 0 0 0 1 0 1 0 1 |
| 1211 | 1 0 1 1 0 0 0 1 0 1 0 |
| 1212 | 1 1 0 1 1 0 0 0 1 0 1 |
| 1213 | 1 1 1 0 1 1 0 0 0 1 0 |
| 1214 | 1 1 1 1 0 1 1 0 0 0 1 |
| 1215 | 0 1 1 1 1 0 1 1 0 0 0 |
| 1216 | 1 0 1 1 1 1 0 1 1 0 0 |
| 1217 | 0 1 0 1 1 1 1 0 1 1 0 |
| 1218 | 0 0 1 0 1 1 1 1 0 1 1 |
| 1219 | 0 0 0 1 0 1 1 1 1 0 1 |
| 1220 | 1 0 0 0 1 0 1 1 1 1 0 |
| 1221 | 0 1 0 0 0 1 0 1 1 1 1 |
| 1222 | 1 0 1 0 0 0 1 0 1 1 1 |
| 1223 | 1 1 0 1 0 0 0 1 0 1 1 |
| 1224 | 0 1 1 0 1 0 0 0 1 0 1 |
| 1225 | 1 0 1 1 0 1 0 0 0 1 0 |
| 1226 | 1 1 0 1 1 0 1 0 0 0 1 |
| 1227 | 0 1 1 0 1 1 0 1 0 0 0 |
| 1228 | 1 0 1 1 0 1 1 0 1 0 0 |
| 1229 | 0 1 0 1 1 0 1 1 0 1 0 |
| 1230 | 1 0 1 0 1 1 0 1 1 0 1 |
| 1231 | 1 1 0 1 0 1 1 0 1 1 0 |
| 1232 | 0 1 1 0 1 0 1 1 0 1 1 |
| 1233 | 0 0 1 1 0 1 0 1 1 0 1 |
| 1234 | 1 0 0 1 1 0 1 0 1 1 0 |
| 1235 | 0 1 0 0 1 1 0 1 0 1 1 |
| 1236 | 0 0 1 0 0 1 1 0 1 0 1 |
| 1237 | 1 0 0 1 0 0 1 1 0 1 0 |
| 1238 | 1 1 0 0 1 0 0 1 1 0 1 |
| 1239 | 1 1 1 0 0 1 0 0 1 1 0 |
| 1240 | 0 1 1 1 0 0 1 0 0 1 1 |
| 1241 | 0 0 1 1 1 0 0 1 0 0 1 |
| 1242 | 0 0 0 1 1 1 0 0 1 0 0 |
| 1243 | 0 0 0 0 1 1 1 0 0 1 0 |
| 1244 | 1 0 0 0 0 1 1 1 0 0 1 |
| 1245 | 0 1 0 0 0 0 1 1 1 0 0 |
| 1246 | 0 0 1 0 0 0 0 1 1 1 0 |
| 1247 | 0 0 0 1 0 0 0 0 1 1 1 |
| 1248 | 1 0 0 0 1 0 0 0 0 1 1 |
| 1249 | 0 1 0 0 0 1 0 0 0 0 1 |
| 1250 | 0 0 1 0 0 0 1 0 0 0 0 |
| 1251 | 1 0 0 1 0 0 0 1 0 0 0 |
| 1252 | 1 1 0 0 1 0 0 0 1 0 0 |
| 1253 | 0 1 1 0 0 1 0 0 0 1 0 |
| 1254 | 1 0 1 1 0 0 1 0 0 0 1 |
| 1255 | 0 1 0 1 1 0 0 1 0 0 0 |
| 1256 | 1 0 1 0 1 1 0 0 1 0 0 |
| 1257 | 0 1 0 1 0 1 1 0 0 1 0 |
| 1258 | 1 0 1 0 1 0 1 1 0 0 1 |
| 1259 | 0 1 0 1 0 1 0 1 1 0 0 |
| 1260 | 0 0 1 0 1 0 1 0 1 1 0 |
| 1261 | 0 0 0 1 0 1 0 1 0 1 1 |
| 1262 | 0 0 0 0 1 0 1 0 1 0 1 |
| 1263 | 1 0 0 0 0 1 0 1 0 1 0 |
| 1264 | 1 1 0 0 0 0 1 0 1 0 1 |
| 1265 | 1 1 1 0 0 0 0 1 0 1 0 |
| 1266 | 1 1 1 1 0 0 0 0 1 0 1 |
| 1267 | 1 1 1 1 1 0 0 0 0 1 0 |
| 1268 | 1 1 1 1 1 1 0 0 0 0 1 |
| 1269 | 0 1 1 1 1 1 1 0 0 0 0 |
| 1270 | 1 0 1 1 1 1 1 1 0 0 0 |
| 1271 | 1 1 0 1 1 1 1 1 1 0 0 |
| 1272 | 0 1 1 0 1 1 1 1 1 1 0 |
| 1273 | 0 0 1 1 0 1 1 1 1 1 1 |
| 1274 | 1 0 0 1 1 0 1 1 1 1 1 |
| 1275 | 1 1 0 0 1 1 0 1 1 1 1 |
| 1276 | 1 1 1 0 0 1 1 0 1 1 1 |
| 1277 | 1 1 1 1 0 0 1 1 0 1 1 |
| 1278 | 0 1 1 1 1 0 0 1 1 0 1 |
| 1279 | 1 0 1 1 1 1 0 0 1 1 0 |
| 1280 | 0 1 0 1 1 1 1 0 0 1 1 |
| 1281 | 0 0 1 0 1 1 1 1 0 0 1 |
| 1282 | 0 0 0 1 0 1 1 1 1 0 0 |
| 1283 | 0 0 0 0 1 0 1 1 1 1 0 |
| 1284 | 0 0 0 0 0 1 0 1 1 1 1 |
| 1285 | 1 0 0 0 0 0 1 0 1 1 1 |
| 1286 | 1 1 0 0 0 0 0 1 0 1 1 |
| 1287 | 0 1 1 0 0 0 0 0 1 0 1 |
| 1288 | 1 0 1 1 0 0 0 0 0 1 0 |
| 1289 | 1 1 0 1 1 0 0 0 0 0 1 |
| 1290 | 0 1 1 0 1 1 0 0 0 0 0 |
| 1291 | 1 0 1 1 0 1 1 0 0 0 0 |
| 1292 | 1 1 0 1 1 0 1 1 0 0 0 |
| 1293 | 1 1 1 0 1 1 0 1 1 0 0 |
| 1294 | 0 1 1 1 0 1 1 0 1 1 0 |
| 1295 | 0 0 1 1 1 0 1 1 0 1 1 |
| 1296 | 0 0 0 1 1 1 0 1 1 0 1 |
| 1297 | 1 0 0 0 1 1 1 0 1 1 0 |
| 1298 | 0 1 0 0 0 1 1 1 0 1 1 |
| 1299 | 0 0 1 0 0 0 1 1 1 0 1 |
| 1300 | 1 0 0 1 0 0 0 1 1 1 0 |
| 1301 | 0 1 0 0 1 0 0 0 1 1 1 |
| 1302 | 1 0 1 0 0 1 0 0 0 1 1 |
| 1303 | 0 1 0 1 0 0 1 0 0 0 1 |
| 1304 | 0 0 1 0 1 0 0 1 0 0 0 |
| 1305 | 1 0 0 1 0 1 0 0 1 0 0 |
| 1306 | 0 1 0 0 1 0 1 0 0 1 0 |
| 1307 | 1 0 1 0 0 1 0 1 0 0 1 |
| 1308 | 0 1 0 1 0 0 1 0 1 0 0 |
| 1309 | 0 0 1 0 1 0 0 1 0 1 0 |
| 1310 | 1 0 0 1 0 1 0 0 1 0 1 |
| 1311 | 1 1 0 0 1 0 1 0 0 1 0 |
| 1312 | 1 1 1 0 0 1 0 1 0 0 1 |
| 1313 | 0 1 1 1 0 0 1 0 1 0 0 |
| 1314 | 0 0 1 1 1 0 0 1 0 1 0 |
| 1315 | 1 0 0 1 1 1 0 0 1 0 1 |
| 1316 | 1 1 0 0 1 1 1 0 0 1 0 |
| 1317 | 1 1 1 0 0 1 1 1 0 0 1 |
| 1318 | 0 1 1 1 0 0 1 1 1 0 0 |
| 1319 | 0 0 1 1 1 0 0 1 1 1 0 |
| 1320 | 0 0 0 1 1 1 0 0 1 1 1 |
| 1321 | 1 0 0 0 1 1 1 0 0 1 1 |
| 1322 | 0 1 0 0 0 1 1 1 0 0 1 |
| 1323 | 0 0 1 0 0 0 1 1 1 0 0 |
| 1324 | 0 0 0 1 0 0 0 1 1 1 0 |
| 1325 | 0 0 0 0 1 0 0 0 1 1 1 |
| 1326 | 1 0 0 0 0 1 0 0 0 1 1 |
| 1327 | 0 1 0 0 0 0 1 0 0 0 1 |
| 1328 | 0 0 1 0 0 0 0 1 0 0 0 |
| 1329 | 1 0 0 1 0 0 0 0 1 0 0 |
| 1330 | 0 1 0 0 1 0 0 0 0 1 0 |
| 1331 | 1 0 1 0 0 1 0 0 0 0 1 |
| 1332 | 0 1 0 1 0 0 1 0 0 0 0 |
| 1333 | 1 0 1 0 1 0 0 1 0 0 0 |
| 1334 | 1 1 0 1 0 1 0 0 1 0 0 |
| 1335 | 0 1 1 0 1 0 1 0 0 1 0 |
| 1336 | 1 0 1 1 0 1 0 1 0 0 1 |
| 1337 | 0 1 0 1 1 0 1 0 1 0 0 |
| 1338 | 0 0 1 0 1 1 0 1 0 1 0 |
| 1339 | 1 0 0 1 0 1 1 0 1 0 1 |
| 1340 | 1 1 0 0 1 0 1 1 0 1 0 |
| 1341 | 1 1 1 0 0 1 0 1 1 0 1 |
| 1342 | 1 1 1 1 0 0 1 0 1 1 0 |
| 1343 | 0 1 1 1 1 0 0 1 0 1 1 |
| 1344 | 0 0 1 1 1 1 0 0 1 0 1 |
| 1345 | 1 0 0 1 1 1 1 0 0 1 0 |
| 1346 | 1 1 0 0 1 1 1 1 0 0 1 |
| 1347 | 0 1 1 0 0 1 1 1 1 0 0 |
| 1348 | 0 0 1 1 0 0 1 1 1 1 0 |
| 1349 | 0 0 0 1 1 0 0 1 1 1 1 |
| 1350 | 1 0 0 0 1 1 0 0 1 1 1 |

Fig - 4C5 (g)

Count State Table For Window Counter Of Fig - 4C4

| COUNT | COUNTER STAGE VALUE 1 2 3 4 5 6 7 8 9 10 11 |
|---|---|
| 1351 | 1 1 0 0 0 1 1 0 0 1 1 |
| 1352 | 0 1 1 0 0 0 1 1 0 0 1 |
| 1353 | 0 0 1 1 0 0 0 1 1 0 0 |
| 1354 | 0 0 0 1 1 0 0 0 1 1 0 |
| 1355 | 0 0 0 0 1 1 0 0 0 1 1 |
| 1356 | 0 0 0 0 0 1 1 0 0 0 1 |
| 1357 | 0 0 0 0 0 0 1 1 0 0 0 |
| 1358 | 1 0 0 0 0 0 0 1 1 0 0 |
| 1359 | 0 1 0 0 0 0 0 0 1 1 0 |
| 1360 | 0 0 1 0 0 0 0 0 0 1 1 |
| 1361 | 0 0 0 1 0 0 0 0 0 0 1 |
| 1362 | 0 0 0 0 1 0 0 0 0 0 0 |
| 1363 | 1 0 0 0 0 1 0 0 0 0 0 |
| 1364 | 1 1 0 0 0 0 1 0 0 0 0 |
| 1365 | 1 1 1 0 0 0 0 1 0 0 0 |
| 1366 | 1 1 1 1 0 0 0 0 1 0 0 |
| 1367 | 0 1 1 1 1 0 0 0 0 1 0 |
| 1368 | 1 0 1 1 1 1 0 0 0 0 1 |
| 1369 | 0 1 0 1 1 1 1 0 0 0 0 |
| 1370 | 1 0 1 0 1 1 1 1 0 0 0 |
| 1371 | 1 1 0 1 0 1 1 1 1 0 0 |
| 1372 | 0 1 1 0 1 0 1 1 1 1 0 |
| 1373 | 0 0 1 1 0 1 0 1 1 1 1 |
| 1374 | 1 0 0 1 1 0 1 0 1 1 1 |
| 1375 | 1 1 0 0 1 1 0 1 0 1 1 |
| 1376 | 0 1 1 0 0 1 1 0 1 0 1 |
| 1377 | 1 0 1 1 0 0 1 1 0 1 0 |
| 1378 | 1 1 0 1 1 0 0 1 1 0 1 |
| 1379 | 1 1 1 0 1 1 0 0 1 1 0 |
| 1380 | 0 1 1 1 0 1 1 0 0 1 1 |
| 1381 | 0 0 1 1 1 0 1 1 0 0 1 |
| 1382 | 0 0 0 1 1 1 0 1 1 0 0 |
| 1383 | 0 0 0 0 1 1 1 0 1 1 0 |
| 1384 | 0 0 0 0 0 1 1 1 0 1 1 |
| 1385 | 0 0 0 0 0 0 1 1 1 0 1 |
| 1386 | 1 0 0 0 0 0 0 1 1 1 0 |
| 1387 | 0 1 0 0 0 0 0 0 1 1 1 |
| 1388 | 1 0 1 0 0 0 0 0 0 1 1 |
| 1389 | 0 1 0 1 0 0 0 0 0 0 1 |
| 1390 | 0 0 1 0 1 0 0 0 0 0 0 |
| 1391 | 1 0 0 1 0 1 0 0 0 0 0 |
| 1392 | 1 1 0 0 1 0 1 0 0 0 0 |
| 1393 | 1 1 1 0 0 1 0 1 0 0 0 |
| 1394 | 1 1 1 1 0 0 1 0 1 0 0 |
| 1395 | 0 1 1 1 1 0 0 1 0 1 0 |
| 1396 | 1 0 1 1 1 1 0 0 1 0 1 |
| 1397 | 1 1 0 1 1 1 1 0 0 1 0 |
| 1398 | 1 1 1 0 1 1 1 1 0 0 1 |
| 1399 | 0 1 1 1 0 1 1 1 1 0 0 |
| 1400 | 0 0 1 1 1 0 1 1 1 1 0 |
| 1401 | 0 0 0 1 1 1 0 1 1 1 1 |
| 1402 | 1 0 0 0 1 1 1 0 1 1 1 |
| 1403 | 1 1 0 0 0 1 1 1 0 1 1 |
| 1404 | 0 1 1 0 0 0 1 1 1 0 1 |
| 1405 | 1 0 1 1 0 0 0 1 1 1 0 |
| 1406 | 0 1 0 1 1 0 0 0 1 1 1 |
| 1407 | 1 0 1 0 1 1 0 0 0 1 1 |
| 1408 | 0 1 0 1 0 1 1 0 0 0 1 |
| 1409 | 0 0 1 0 1 0 1 1 0 0 0 |
| 1410 | 1 0 0 1 0 1 0 1 1 0 0 |
| 1411 | 0 1 0 0 1 0 1 0 1 1 0 |
| 1412 | 0 0 1 0 0 1 0 1 0 1 1 |
| 1413 | 0 0 0 1 0 0 1 0 1 0 1 |
| 1414 | 1 0 0 0 1 0 0 1 0 1 0 |
| 1415 | 1 1 0 0 0 1 0 0 1 0 1 |
| 1416 | 1 1 1 0 0 0 1 0 0 1 0 |
| 1417 | 1 1 1 1 0 0 0 1 0 0 1 |
| 1418 | 0 1 1 1 1 0 0 0 1 0 0 |
| 1419 | 0 0 1 1 1 1 0 0 0 1 0 |
| 1420 | 1 0 0 1 1 1 1 0 0 0 1 |
| 1421 | 0 1 0 0 1 1 1 1 0 0 0 |
| 1422 | 1 0 1 0 0 1 1 1 1 0 0 |
| 1423 | 0 1 0 1 0 0 1 1 1 1 0 |
| 1424 | 0 0 1 0 1 0 0 1 1 1 1 |
| 1425 | 1 0 0 1 0 1 0 0 1 1 1 |

| COUNT | COUNTER STAGE VALUE 1 2 3 4 5 6 7 8 9 10 11 |
|---|---|
| 1426 | 1 1 0 0 1 0 1 0 0 1 1 |
| 1427 | 0 1 1 0 0 1 0 1 0 0 1 |
| 1428 | 0 0 1 1 0 0 1 0 1 0 0 |
| 1429 | 0 0 0 1 1 0 0 1 0 1 0 |
| 1430 | 1 0 0 0 1 1 0 0 1 0 1 |
| 1431 | 1 1 0 0 0 1 1 0 0 1 0 |
| 1432 | 1 1 1 0 0 0 1 1 0 0 1 |
| 1433 | 0 1 1 1 0 0 0 1 1 0 0 |
| 1434 | 0 0 1 1 1 0 0 0 1 1 0 |
| 1435 | 0 0 0 1 1 1 0 0 0 1 1 |
| 1436 | 0 0 0 0 1 1 1 0 0 0 1 |
| 1437 | 0 0 0 0 0 1 1 1 0 0 0 |
| 1438 | 1 0 0 0 0 0 1 1 1 0 0 |
| 1439 | 0 1 0 0 0 0 0 1 1 1 0 |
| 1440 | 0 0 1 0 0 0 0 0 1 1 1 |
| 1441 | 1 0 0 1 0 0 0 0 0 1 1 |
| 1442 | 0 1 0 0 1 0 0 0 0 0 1 |
| 1443 | 0 0 1 0 0 1 0 0 0 0 0 |
| 1444 | 1 0 0 1 0 0 1 0 0 0 0 |
| 1445 | 1 1 0 0 1 0 0 1 0 0 0 |
| 1446 | 1 1 1 0 0 1 0 0 1 0 0 |
| 1447 | 0 1 1 1 0 0 1 0 0 1 0 |
| 1448 | 1 0 1 1 1 0 0 1 0 0 1 |
| 1449 | 0 1 0 1 1 1 0 0 1 0 0 |
| 1450 | 0 0 1 0 1 1 1 0 0 1 0 |
| 1451 | 1 0 0 1 0 1 1 1 0 0 1 |
| 1452 | 0 1 0 0 1 0 1 1 1 0 0 |
| 1453 | 0 0 1 0 0 1 0 1 1 1 0 |
| 1454 | 0 0 0 1 0 0 1 0 1 1 1 |
| 1455 | 1 0 0 0 1 0 0 1 0 1 1 |
| 1456 | 0 1 0 0 0 1 0 0 1 0 1 |
| 1457 | 1 0 1 0 0 0 1 0 0 1 0 |
| 1458 | 1 1 0 1 0 0 0 1 0 0 1 |
| 1459 | 0 1 1 0 1 0 0 0 1 0 0 |
| 1460 | 0 0 1 1 0 1 0 0 0 1 0 |
| 1461 | 1 0 0 1 1 0 1 0 0 0 1 |
| 1462 | 0 1 0 0 1 1 0 1 0 0 0 |
| 1463 | 1 0 1 0 0 1 1 0 1 0 0 |
| 1464 | 0 1 0 1 0 0 1 1 0 1 0 |
| 1465 | 1 0 1 0 1 0 0 1 1 0 1 |
| 1466 | 1 1 0 1 0 1 0 0 1 1 0 |
| 1467 | 0 1 1 0 1 0 1 0 0 1 1 |
| 1468 | 0 0 1 1 0 1 0 1 0 0 1 |
| 1469 | 0 0 0 1 1 0 1 0 1 0 0 |
| 1470 | 0 0 0 0 1 1 0 1 0 1 0 |
| 1471 | 1 0 0 0 0 1 1 0 1 0 1 |
| 1472 | 1 1 0 0 0 0 1 1 0 1 0 |
| 1473 | 1 1 1 0 0 0 0 1 1 0 1 |
| 1474 | 1 1 1 1 0 0 0 0 1 1 0 |
| 1475 | 0 1 1 1 1 0 0 0 0 1 1 |
| 1476 | 0 0 1 1 1 1 0 0 0 0 1 |
| 1477 | 0 0 0 1 1 1 1 0 0 0 0 |
| 1478 | 1 0 0 0 1 1 1 1 0 0 0 |
| 1479 | 1 1 0 0 0 1 1 1 1 0 0 |
| 1480 | 0 1 1 0 0 0 1 1 1 1 0 |
| 1481 | 0 0 1 1 0 0 0 1 1 1 1 |
| 1482 | 1 0 0 1 1 0 0 0 1 1 1 |
| 1483 | 1 1 0 0 1 1 0 0 0 1 1 |
| 1484 | 0 1 1 0 0 1 1 0 0 0 1 |
| 1485 | 0 0 1 1 0 0 1 1 0 0 0 |
| 1486 | 1 0 0 1 1 0 0 1 1 0 0 |
| 1487 | 0 1 0 0 1 1 0 0 1 1 0 |
| 1488 | 0 0 1 0 0 1 1 0 0 1 1 |
| 1489 | 0 0 0 1 0 0 1 1 0 0 1 |
| 1490 | 0 0 0 0 1 0 0 1 1 0 0 |
| 1491 | 0 0 0 0 0 1 0 0 1 1 0 |
| 1492 | 0 0 0 0 0 0 1 0 0 1 1 |
| 1493 | 0 0 0 0 0 0 0 1 0 0 1 |
| 1494 | 0 0 0 0 0 0 0 0 1 0 0 |
| 1495 | 0 0 0 0 0 0 0 0 0 1 0 |
| 1496 | 1 0 0 0 0 0 0 0 0 0 1 |
| 1497 | 0 1 0 0 0 0 0 0 0 0 0 |
| 1498 | 1 0 1 0 0 0 0 0 0 0 0 |
| 1499 | 1 1 0 1 0 0 0 0 0 0 0 |
| 1500 | 1 1 1 0 1 0 0 0 0 0 0 |

| COUNT | COUNTER STAGE VALUE 1 2 3 4 5 6 7 8 9 10 11 |
|---|---|
| 1501 | 1 1 1 1 0 1 0 0 0 0 0 |
| 1502 | 1 1 1 1 1 0 1 0 0 0 0 |
| 1503 | 1 1 1 1 1 1 0 1 0 0 0 |
| 1504 | 1 1 1 1 1 1 1 0 1 0 0 |
| 1505 | 0 1 1 1 1 1 1 1 0 1 0 |
| 1506 | 1 0 1 1 1 1 1 1 1 0 1 |
| 1507 | 1 1 0 1 1 1 1 1 1 1 0 |
| 1508 | 0 1 1 0 1 1 1 1 1 1 1 |
| 1509 | 1 0 1 1 0 1 1 1 1 1 1 |
| 1510 | 1 1 0 1 1 0 1 1 1 1 1 |
| 1511 | 1 1 1 0 1 1 0 1 1 1 1 |
| 1512 | 1 1 1 1 0 1 1 0 1 1 1 |
| 1513 | 1 1 1 1 1 0 1 1 0 1 1 |
| 1514 | 0 1 1 1 1 1 0 1 1 0 1 |
| 1515 | 1 0 1 1 1 1 1 0 1 1 0 |
| 1516 | 0 1 0 1 1 1 1 1 0 1 1 |
| 1517 | 0 0 1 0 1 1 1 1 1 0 1 |
| 1518 | 1 0 0 1 0 1 1 1 1 1 0 |
| 1519 | 0 1 0 0 1 0 1 1 1 1 1 |
| 1520 | 1 0 1 0 0 1 0 1 1 1 1 |
| 1521 | 1 1 0 1 0 0 1 0 1 1 1 |
| 1522 | 1 1 1 0 1 0 0 1 0 1 1 |
| 1523 | 0 1 1 1 0 1 0 0 1 0 1 |
| 1524 | 1 0 1 1 1 0 1 0 0 1 0 |
| 1525 | 1 1 0 1 1 1 0 1 0 0 1 |
| 1526 | 0 1 1 0 1 1 1 0 1 0 0 |
| 1527 | 0 0 1 1 0 1 1 1 0 1 0 |
| 1528 | 1 0 0 1 1 0 1 1 1 0 1 |
| 1529 | 1 1 0 0 1 1 0 1 1 1 0 |
| 1530 | 0 1 1 0 0 1 1 0 1 1 1 |
| 1531 | 1 0 1 1 0 0 1 1 0 1 1 |
| 1532 | 0 1 0 1 1 0 0 1 1 0 1 |
| 1533 | 1 0 1 0 1 1 0 0 1 1 0 |
| 1534 | 0 1 0 1 0 1 1 0 0 1 1 |
| 1535 | 0 0 1 0 1 0 1 1 0 0 1 |
| 1536 | 0 0 0 1 0 1 0 1 1 0 0 |
| 1537 | 0 0 0 0 1 0 1 0 1 1 0 |
| 1538 | 0 0 0 0 0 1 0 1 0 1 1 |
| 1539 | 0 0 0 0 0 0 1 0 1 0 1 |
| 1540 | 1 0 0 0 0 0 0 1 0 1 0 |
| 1541 | 1 1 0 0 0 0 0 0 1 0 1 |
| 1542 | 1 1 1 0 0 0 0 0 0 1 0 |
| 1543 | 1 1 1 1 0 0 0 0 0 0 1 |
| 1544 | 0 1 1 1 1 0 0 0 0 0 0 |
| 1545 | 1 0 1 1 1 1 0 0 0 0 0 |
| 1546 | 1 1 0 1 1 1 1 0 0 0 0 |
| 1547 | 1 1 1 0 1 1 1 1 0 0 0 |
| 1548 | 1 1 1 1 0 1 1 1 1 0 0 |
| 1549 | 0 1 1 1 1 0 1 1 1 1 0 |
| 1550 | 0 0 1 1 1 1 0 1 1 1 1 |
| 1551 | 1 0 0 1 1 1 1 0 1 1 1 |
| 1552 | 1 1 0 0 1 1 1 1 0 1 1 |
| 1553 | 0 1 1 0 0 1 1 1 1 0 1 |
| 1554 | 1 0 1 1 0 0 1 1 1 1 0 |
| 1555 | 0 1 0 1 1 0 0 1 1 1 1 |
| 1556 | 1 0 1 0 1 1 0 0 1 1 1 |
| 1557 | 1 1 0 1 0 1 1 0 0 1 1 |
| 1558 | 0 1 1 0 1 0 1 1 0 0 1 |
| 1559 | 0 0 1 1 0 1 0 1 1 0 0 |
| 1560 | 0 0 0 1 1 0 1 0 1 1 0 |
| 1561 | 0 0 0 0 1 1 0 1 0 1 1 |
| 1562 | 0 0 0 0 0 1 1 0 1 0 1 |
| 1563 | 1 0 0 0 0 0 1 1 0 1 0 |
| 1564 | 1 1 0 0 0 0 0 1 1 0 1 |
| 1565 | 1 1 1 0 0 0 0 0 1 1 0 |
| 1566 | 0 1 1 1 0 0 0 0 0 1 1 |
| 1567 | 0 0 1 1 1 0 0 0 0 0 1 |
| 1568 | 0 0 0 1 1 1 0 0 0 0 0 |
| 1569 | 1 0 0 0 1 1 1 0 0 0 0 |
| 1570 | 1 1 0 0 0 1 1 1 0 0 0 |
| 1571 | 1 1 1 0 0 0 1 1 1 0 0 |
| 1572 | 0 1 1 1 0 0 0 1 1 1 0 |
| 1573 | 0 0 1 1 1 0 0 0 1 1 1 |
| 1574 | 1 0 0 1 1 1 0 0 0 1 1 |
| 1575 | 0 1 0 0 1 1 1 0 0 0 1 |

Fig - 4C5(h)

Count State Table For Window Counter Of Fig - 4C4

| COUNT | COUNTER STAGE VALUE | | | | | | | | | | |
|---|---|---|---|---|---|---|---|---|---|---|---|
| | 1 | 2 | 3 | 4 | 5 | 6 | 7 | 8 | 9 | 10 | 11 |
| 1576 | 0 | 0 | 1 | 0 | 0 | 1 | 1 | 1 | 0 | 0 | 0 |
| 1577 | 1 | 0 | 0 | 1 | 0 | 0 | 1 | 1 | 1 | 0 | 0 |
| 1578 | 0 | 1 | 0 | 0 | 1 | 0 | 0 | 1 | 1 | 1 | 0 |
| 1579 | 0 | 0 | 1 | 0 | 0 | 1 | 0 | 0 | 1 | 1 | 1 |
| 1580 | 1 | 0 | 0 | 1 | 0 | 0 | 1 | 0 | 0 | 1 | 1 |
| 1581 | 0 | 1 | 0 | 0 | 1 | 0 | 0 | 1 | 0 | 0 | 1 |
| 1582 | 0 | 0 | 1 | 0 | 0 | 1 | 0 | 0 | 1 | 0 | 0 |
| 1583 | 0 | 0 | 0 | 1 | 0 | 0 | 1 | 0 | 0 | 1 | 0 |
| 1584 | 1 | 0 | 0 | 0 | 1 | 0 | 0 | 1 | 0 | 0 | 1 |
| 1585 | 0 | 1 | 0 | 0 | 0 | 1 | 0 | 0 | 1 | 0 | 0 |
| 1586 | 0 | 0 | 1 | 0 | 0 | 0 | 1 | 0 | 0 | 1 | 0 |
| 1587 | 1 | 0 | 0 | 1 | 0 | 0 | 0 | 1 | 0 | 0 | 1 |
| 1588 | 0 | 1 | 0 | 0 | 1 | 0 | 0 | 0 | 1 | 0 | 0 |
| 1589 | 0 | 0 | 1 | 0 | 0 | 1 | 0 | 0 | 0 | 1 | 0 |
| 1590 | 1 | 0 | 0 | 1 | 0 | 0 | 1 | 0 | 0 | 0 | 1 |
| 1591 | 0 | 1 | 0 | 0 | 1 | 0 | 0 | 1 | 0 | 0 | 0 |
| 1592 | 1 | 0 | 1 | 0 | 0 | 1 | 0 | 0 | 1 | 0 | 0 |
| 1593 | 0 | 1 | 0 | 1 | 0 | 0 | 1 | 0 | 0 | 1 | 0 |
| 1594 | 1 | 0 | 1 | 0 | 1 | 0 | 0 | 1 | 0 | 0 | 1 |
| 1595 | 0 | 1 | 0 | 1 | 0 | 1 | 0 | 0 | 1 | 0 | 0 |
| 1596 | 0 | 0 | 1 | 0 | 1 | 0 | 1 | 0 | 0 | 1 | 0 |
| 1597 | 1 | 0 | 0 | 1 | 0 | 1 | 0 | 1 | 0 | 0 | 1 |
| 1598 | 0 | 1 | 0 | 0 | 1 | 0 | 1 | 0 | 1 | 0 | 0 |
| 1599 | 0 | 0 | 1 | 0 | 0 | 1 | 0 | 1 | 0 | 1 | 0 |
| 1600 | 1 | 0 | 0 | 1 | 0 | 0 | 1 | 0 | 1 | 0 | 1 |
| 1601 | 1 | 1 | 0 | 0 | 1 | 0 | 0 | 1 | 0 | 1 | 0 |
| 1602 | 1 | 1 | 1 | 0 | 0 | 1 | 0 | 0 | 1 | 0 | 1 |
| 1603 | 1 | 1 | 1 | 1 | 0 | 0 | 1 | 0 | 0 | 1 | 0 |
| 1604 | 1 | 1 | 1 | 1 | 1 | 0 | 0 | 1 | 0 | 0 | 1 |
| 1605 | 0 | 1 | 1 | 1 | 1 | 1 | 0 | 0 | 1 | 0 | 0 |
| 1606 | 0 | 0 | 1 | 1 | 1 | 1 | 1 | 0 | 0 | 1 | 0 |
| 1607 | 1 | 0 | 0 | 1 | 1 | 1 | 1 | 1 | 0 | 0 | 1 |
| 1608 | 0 | 1 | 0 | 0 | 1 | 1 | 1 | 1 | 1 | 0 | 0 |
| 1609 | 0 | 0 | 1 | 0 | 0 | 1 | 1 | 1 | 1 | 1 | 0 |
| 1610 | 0 | 0 | 0 | 1 | 0 | 0 | 1 | 1 | 1 | 1 | 1 |
| 1611 | 1 | 0 | 0 | 0 | 1 | 0 | 0 | 1 | 1 | 1 | 1 |
| 1612 | 1 | 1 | 0 | 0 | 0 | 1 | 0 | 0 | 1 | 1 | 1 |
| 1613 | 1 | 1 | 1 | 0 | 0 | 0 | 1 | 0 | 0 | 1 | 1 |
| 1614 | 0 | 1 | 1 | 1 | 0 | 0 | 0 | 1 | 0 | 0 | 1 |
| 1615 | 0 | 0 | 1 | 1 | 1 | 0 | 0 | 0 | 1 | 0 | 0 |
| 1616 | 0 | 0 | 0 | 1 | 1 | 1 | 0 | 0 | 0 | 1 | 0 |
| 1617 | 1 | 0 | 0 | 0 | 1 | 1 | 1 | 0 | 0 | 0 | 1 |
| 1618 | 0 | 1 | 0 | 0 | 0 | 1 | 1 | 1 | 0 | 0 | 0 |
| 1619 | 1 | 0 | 1 | 0 | 0 | 0 | 1 | 1 | 1 | 0 | 0 |
| 1620 | 0 | 1 | 0 | 1 | 0 | 0 | 0 | 1 | 1 | 1 | 0 |
| 1621 | 0 | 0 | 1 | 0 | 1 | 0 | 0 | 0 | 1 | 1 | 1 |
| 1622 | 1 | 0 | 0 | 1 | 0 | 1 | 0 | 0 | 0 | 1 | 1 |
| 1623 | 0 | 1 | 0 | 0 | 1 | 0 | 1 | 0 | 0 | 0 | 1 |
| 1624 | 0 | 0 | 1 | 0 | 0 | 1 | 0 | 1 | 0 | 0 | 0 |
| 1625 | 1 | 0 | 0 | 1 | 0 | 0 | 1 | 0 | 1 | 0 | 0 |
| 1626 | 0 | 1 | 0 | 0 | 1 | 0 | 0 | 1 | 0 | 1 | 0 |
| 1627 | 1 | 0 | 1 | 0 | 0 | 1 | 0 | 0 | 1 | 0 | 1 |
| 1628 | 1 | 1 | 0 | 1 | 0 | 0 | 1 | 0 | 0 | 1 | 0 |
| 1629 | 1 | 1 | 1 | 0 | 1 | 0 | 0 | 1 | 0 | 0 | 1 |
| 1630 | 0 | 1 | 1 | 1 | 0 | 1 | 0 | 0 | 1 | 0 | 0 |
| 1631 | 0 | 0 | 1 | 1 | 1 | 0 | 1 | 0 | 0 | 1 | 0 |
| 1632 | 1 | 0 | 0 | 1 | 1 | 1 | 0 | 1 | 0 | 0 | 1 |
| 1633 | 0 | 1 | 0 | 0 | 1 | 1 | 1 | 0 | 1 | 0 | 0 |
| 1634 | 0 | 0 | 1 | 0 | 0 | 1 | 1 | 1 | 0 | 1 | 0 |
| 1635 | 1 | 0 | 0 | 1 | 0 | 0 | 1 | 1 | 1 | 0 | 1 |
| 1636 | 1 | 1 | 0 | 0 | 1 | 0 | 0 | 1 | 1 | 1 | 0 |
| 1637 | 0 | 1 | 1 | 0 | 0 | 1 | 0 | 0 | 1 | 1 | 1 |
| 1638 | 1 | 0 | 1 | 1 | 0 | 0 | 1 | 0 | 0 | 1 | 1 |
| 1639 | 0 | 1 | 0 | 1 | 1 | 0 | 0 | 1 | 0 | 0 | 1 |
| 1640 | 0 | 0 | 1 | 0 | 1 | 1 | 0 | 0 | 1 | 0 | 0 |
| 1641 | 0 | 0 | 0 | 1 | 0 | 1 | 1 | 0 | 0 | 1 | 0 |
| 1642 | 1 | 0 | 0 | 0 | 1 | 0 | 1 | 1 | 0 | 0 | 1 |
| 1643 | 0 | 1 | 0 | 0 | 0 | 1 | 0 | 1 | 1 | 0 | 0 |
| 1644 | 0 | 0 | 1 | 0 | 0 | 0 | 1 | 0 | 1 | 1 | 0 |
| 1645 | 0 | 0 | 0 | 1 | 0 | 0 | 0 | 1 | 0 | 1 | 1 |
| 1646 | 0 | 0 | 0 | 0 | 1 | 0 | 0 | 0 | 1 | 0 | 1 |
| 1647 | 1 | 0 | 0 | 0 | 0 | 1 | 0 | 0 | 0 | 1 | 0 |
| 1648 | 1 | 1 | 0 | 0 | 0 | 0 | 1 | 0 | 0 | 0 | 1 |
| 1649 | 0 | 1 | 1 | 0 | 0 | 0 | 0 | 1 | 0 | 0 | 0 |
| 1650 | 1 | 0 | 1 | 1 | 0 | 0 | 0 | 0 | 1 | 0 | 0 |
| 1651 | 0 | 1 | 0 | 1 | 1 | 0 | 0 | 0 | 0 | 1 | 0 |
| 1652 | 1 | 0 | 1 | 0 | 1 | 1 | 0 | 0 | 0 | 0 | 1 |
| 1653 | 0 | 1 | 0 | 1 | 0 | 1 | 1 | 0 | 0 | 0 | 0 |
| 1654 | 1 | 0 | 1 | 0 | 1 | 0 | 1 | 1 | 0 | 0 | 0 |
| 1655 | 1 | 1 | 0 | 1 | 0 | 1 | 0 | 1 | 1 | 0 | 0 |
| 1656 | 0 | 1 | 1 | 0 | 1 | 0 | 1 | 0 | 1 | 1 | 0 |
| 1657 | 0 | 0 | 1 | 1 | 0 | 1 | 0 | 1 | 0 | 1 | 1 |
| 1658 | 0 | 0 | 0 | 1 | 1 | 0 | 1 | 0 | 1 | 0 | 1 |
| 1659 | 1 | 0 | 0 | 0 | 1 | 1 | 0 | 1 | 0 | 1 | 0 |
| 1660 | 1 | 1 | 0 | 0 | 0 | 1 | 1 | 0 | 1 | 0 | 1 |
| 1661 | 1 | 1 | 1 | 0 | 0 | 0 | 1 | 1 | 0 | 1 | 0 |
| 1662 | 1 | 1 | 1 | 1 | 0 | 0 | 0 | 1 | 1 | 0 | 1 |
| 1663 | 1 | 1 | 1 | 1 | 1 | 0 | 0 | 0 | 1 | 1 | 0 |
| 1664 | 0 | 1 | 1 | 1 | 1 | 1 | 0 | 0 | 0 | 1 | 1 |
| 1665 | 0 | 0 | 1 | 1 | 1 | 1 | 1 | 0 | 0 | 0 | 1 |
| 1666 | 0 | 0 | 0 | 1 | 1 | 1 | 1 | 1 | 0 | 0 | 0 |
| 1667 | 1 | 0 | 0 | 0 | 1 | 1 | 1 | 1 | 1 | 0 | 0 |
| 1668 | 0 | 1 | 0 | 0 | 0 | 1 | 1 | 1 | 1 | 1 | 0 |
| 1669 | 0 | 0 | 1 | 0 | 0 | 0 | 1 | 1 | 1 | 1 | 1 |
| 1670 | 1 | 0 | 0 | 1 | 0 | 0 | 0 | 1 | 1 | 1 | 1 |
| 1671 | 1 | 1 | 0 | 0 | 1 | 0 | 0 | 0 | 1 | 1 | 1 |
| 1672 | 1 | 1 | 1 | 0 | 0 | 1 | 0 | 0 | 0 | 1 | 1 |
| 1673 | 0 | 1 | 1 | 1 | 0 | 0 | 1 | 0 | 0 | 0 | 1 |
| 1674 | 0 | 0 | 1 | 1 | 1 | 0 | 0 | 1 | 0 | 0 | 0 |
| 1675 | 1 | 0 | 0 | 1 | 1 | 1 | 0 | 0 | 1 | 0 | 0 |
| 1676 | 0 | 1 | 0 | 0 | 1 | 1 | 1 | 0 | 0 | 1 | 0 |
| 1677 | 1 | 0 | 1 | 0 | 0 | 1 | 1 | 1 | 0 | 0 | 1 |
| 1678 | 0 | 1 | 0 | 1 | 0 | 0 | 1 | 1 | 1 | 0 | 0 |
| 1679 | 0 | 0 | 1 | 0 | 1 | 0 | 0 | 1 | 1 | 1 | 0 |
| 1680 | 0 | 0 | 0 | 1 | 0 | 1 | 0 | 0 | 1 | 1 | 1 |
| 1681 | 1 | 0 | 0 | 0 | 1 | 0 | 1 | 0 | 0 | 1 | 1 |
| 1682 | 0 | 1 | 0 | 0 | 0 | 1 | 0 | 1 | 0 | 0 | 1 |
| 1683 | 0 | 0 | 1 | 0 | 0 | 0 | 1 | 0 | 1 | 0 | 0 |
| 1684 | 0 | 0 | 0 | 1 | 0 | 0 | 0 | 1 | 0 | 1 | 0 |
| 1685 | 1 | 0 | 0 | 0 | 1 | 0 | 0 | 0 | 1 | 0 | 1 |
| 1686 | 1 | 1 | 0 | 0 | 0 | 1 | 0 | 0 | 0 | 1 | 0 |
| 1687 | 1 | 1 | 1 | 0 | 0 | 0 | 1 | 0 | 0 | 0 | 1 |
| 1688 | 0 | 1 | 1 | 1 | 0 | 0 | 0 | 1 | 0 | 0 | 0 |
| 1689 | 1 | 0 | 1 | 1 | 1 | 0 | 0 | 0 | 1 | 0 | 0 |
| 1690 | 0 | 1 | 0 | 1 | 1 | 1 | 0 | 0 | 0 | 1 | 0 |
| 1691 | 1 | 0 | 1 | 0 | 1 | 1 | 1 | 0 | 0 | 0 | 1 |
| 1692 | 0 | 1 | 0 | 1 | 0 | 1 | 1 | 1 | 0 | 0 | 0 |
| 1693 | 1 | 0 | 1 | 0 | 1 | 0 | 1 | 1 | 1 | 0 | 0 |
| 1694 | 0 | 1 | 0 | 1 | 0 | 1 | 0 | 1 | 1 | 1 | 0 |
| 1695 | 0 | 0 | 1 | 0 | 1 | 0 | 1 | 0 | 1 | 1 | 1 |
| 1696 | 1 | 0 | 0 | 1 | 0 | 1 | 0 | 1 | 0 | 1 | 1 |
| 1697 | 0 | 1 | 0 | 0 | 1 | 0 | 1 | 0 | 1 | 0 | 1 |
| 1698 | 1 | 0 | 1 | 0 | 0 | 1 | 0 | 1 | 0 | 1 | 0 |
| 1699 | 1 | 1 | 0 | 1 | 0 | 0 | 1 | 0 | 1 | 0 | 1 |
| 1700 | 1 | 1 | 1 | 0 | 1 | 0 | 0 | 1 | 0 | 1 | 0 |
| 1701 | 1 | 1 | 1 | 1 | 0 | 1 | 0 | 0 | 1 | 0 | 1 |
| 1702 | 1 | 1 | 1 | 1 | 1 | 0 | 1 | 0 | 0 | 1 | 0 |
| 1703 | 1 | 1 | 1 | 1 | 1 | 1 | 0 | 1 | 0 | 0 | 1 |
| 1704 | 0 | 1 | 1 | 1 | 1 | 1 | 1 | 0 | 1 | 0 | 0 |
| 1705 | 0 | 0 | 1 | 1 | 1 | 1 | 1 | 1 | 0 | 1 | 0 |
| 1706 | 1 | 0 | 0 | 1 | 1 | 1 | 1 | 1 | 1 | 0 | 1 |
| 1707 | 1 | 1 | 0 | 0 | 1 | 1 | 1 | 1 | 1 | 1 | 0 |
| 1708 | 0 | 1 | 1 | 0 | 0 | 1 | 1 | 1 | 1 | 1 | 1 |
| 1709 | 1 | 0 | 1 | 1 | 0 | 0 | 1 | 1 | 1 | 1 | 1 |
| 1710 | 1 | 1 | 0 | 1 | 1 | 0 | 0 | 1 | 1 | 1 | 1 |
| 1711 | 1 | 1 | 1 | 0 | 1 | 1 | 0 | 0 | 1 | 1 | 1 |
| 1712 | 1 | 1 | 1 | 1 | 0 | 1 | 1 | 0 | 0 | 1 | 1 |
| 1713 | 0 | 1 | 1 | 1 | 1 | 0 | 1 | 1 | 0 | 0 | 1 |
| 1714 | 0 | 0 | 1 | 1 | 1 | 1 | 0 | 1 | 1 | 0 | 0 |
| 1715 | 0 | 0 | 0 | 1 | 1 | 1 | 1 | 0 | 1 | 1 | 0 |
| 1716 | 0 | 0 | 0 | 0 | 1 | 1 | 1 | 1 | 0 | 1 | 1 |
| 1717 | 0 | 0 | 0 | 0 | 0 | 1 | 1 | 1 | 1 | 0 | 1 |
| 1718 | 1 | 0 | 0 | 0 | 0 | 0 | 1 | 1 | 1 | 1 | 0 |
| 1719 | 0 | 1 | 0 | 0 | 0 | 0 | 0 | 1 | 1 | 1 | 1 |
| 1720 | 1 | 0 | 1 | 0 | 0 | 0 | 0 | 0 | 1 | 1 | 1 |
| 1721 | 1 | 1 | 0 | 1 | 0 | 0 | 0 | 0 | 0 | 1 | 1 |
| 1722 | 0 | 1 | 1 | 0 | 1 | 0 | 0 | 0 | 0 | 0 | 1 |
| 1723 | 0 | 0 | 1 | 1 | 0 | 1 | 0 | 0 | 0 | 0 | 0 |
| 1724 | 1 | 0 | 0 | 1 | 1 | 0 | 1 | 0 | 0 | 0 | 0 |
| 1725 | 1 | 1 | 0 | 0 | 1 | 1 | 0 | 1 | 0 | 0 | 0 |
| 1726 | 1 | 1 | 1 | 0 | 0 | 1 | 1 | 0 | 1 | 0 | 0 |
| 1727 | 0 | 1 | 1 | 1 | 0 | 0 | 1 | 1 | 0 | 1 | 0 |
| 1728 | 1 | 0 | 1 | 1 | 1 | 0 | 0 | 1 | 1 | 0 | 1 |
| 1729 | 1 | 1 | 0 | 1 | 1 | 1 | 0 | 0 | 1 | 1 | 0 |
| 1730 | 0 | 1 | 1 | 0 | 1 | 1 | 1 | 0 | 0 | 1 | 1 |
| 1731 | 0 | 0 | 1 | 1 | 0 | 1 | 1 | 1 | 0 | 0 | 1 |
| 1732 | 0 | 0 | 0 | 1 | 1 | 0 | 1 | 1 | 1 | 0 | 0 |
| 1733 | 0 | 0 | 0 | 0 | 1 | 1 | 0 | 1 | 1 | 1 | 0 |
| 1734 | 0 | 0 | 0 | 0 | 0 | 1 | 1 | 0 | 1 | 1 | 1 |
| 1735 | 1 | 0 | 0 | 0 | 0 | 0 | 1 | 1 | 0 | 1 | 1 |
| 1736 | 0 | 1 | 0 | 0 | 0 | 0 | 0 | 1 | 1 | 0 | 1 |
| 1737 | 1 | 0 | 1 | 0 | 0 | 0 | 0 | 0 | 1 | 1 | 0 |
| 1738 | 0 | 1 | 0 | 1 | 0 | 0 | 0 | 0 | 0 | 1 | 1 |
| 1739 | 0 | 0 | 1 | 0 | 1 | 0 | 0 | 0 | 0 | 0 | 1 |
| 1740 | 0 | 0 | 0 | 1 | 0 | 1 | 0 | 0 | 0 | 0 | 0 |
| 1741 | 1 | 0 | 0 | 0 | 1 | 0 | 1 | 0 | 0 | 0 | 0 |
| 1742 | 1 | 1 | 0 | 0 | 0 | 1 | 0 | 1 | 0 | 0 | 0 |
| 1743 | 1 | 1 | 1 | 0 | 0 | 0 | 1 | 0 | 1 | 0 | 0 |
| 1744 | 0 | 1 | 1 | 1 | 0 | 0 | 0 | 1 | 0 | 1 | 0 |
| 1745 | 1 | 0 | 1 | 1 | 1 | 0 | 0 | 0 | 1 | 0 | 1 |
| 1746 | 1 | 1 | 0 | 1 | 1 | 1 | 0 | 0 | 0 | 1 | 0 |
| 1747 | 1 | 1 | 1 | 0 | 1 | 1 | 1 | 0 | 0 | 0 | 1 |
| 1748 | 0 | 1 | 1 | 1 | 0 | 1 | 1 | 1 | 0 | 0 | 0 |
| 1749 | 1 | 0 | 1 | 1 | 1 | 0 | 1 | 1 | 1 | 0 | 0 |
| 1750 | 0 | 1 | 0 | 1 | 1 | 1 | 0 | 1 | 1 | 1 | 0 |
| 1751 | 0 | 0 | 1 | 0 | 1 | 1 | 1 | 0 | 1 | 1 | 1 |
| 1752 | 1 | 0 | 0 | 1 | 0 | 1 | 1 | 1 | 0 | 1 | 1 |
| 1753 | 0 | 1 | 0 | 0 | 1 | 0 | 1 | 1 | 1 | 0 | 1 |
| 1754 | 1 | 0 | 1 | 0 | 0 | 1 | 0 | 1 | 1 | 1 | 0 |
| 1755 | 0 | 1 | 0 | 1 | 0 | 0 | 1 | 0 | 1 | 1 | 1 |
| 1756 | 1 | 0 | 1 | 0 | 1 | 0 | 0 | 1 | 0 | 1 | 1 |
| 1757 | 0 | 1 | 0 | 1 | 0 | 1 | 0 | 0 | 1 | 0 | 1 |
| 1758 | 1 | 0 | 1 | 0 | 1 | 0 | 1 | 0 | 0 | 1 | 0 |
| 1759 | 1 | 1 | 0 | 1 | 0 | 1 | 0 | 1 | 0 | 0 | 1 |
| 1760 | 0 | 1 | 1 | 0 | 1 | 0 | 1 | 0 | 1 | 0 | 0 |
| 1761 | 0 | 0 | 1 | 1 | 0 | 1 | 0 | 1 | 0 | 1 | 0 |
| 1762 | 1 | 0 | 0 | 1 | 1 | 0 | 1 | 0 | 1 | 0 | 1 |
| 1763 | 1 | 1 | 0 | 0 | 1 | 1 | 0 | 1 | 0 | 1 | 0 |
| 1764 | 1 | 1 | 1 | 0 | 0 | 1 | 1 | 0 | 1 | 0 | 1 |
| 1765 | 1 | 1 | 1 | 1 | 0 | 0 | 1 | 1 | 0 | 1 | 0 |
| 1766 | 1 | 1 | 1 | 1 | 1 | 0 | 0 | 1 | 1 | 0 | 1 |
| 1767 | 1 | 1 | 1 | 1 | 1 | 1 | 0 | 0 | 1 | 1 | 0 |
| 1768 | 0 | 1 | 1 | 1 | 1 | 1 | 1 | 0 | 0 | 1 | 1 |
| 1769 | 0 | 0 | 1 | 1 | 1 | 1 | 1 | 1 | 0 | 0 | 1 |
| 1770 | 0 | 0 | 0 | 1 | 1 | 1 | 1 | 1 | 1 | 0 | 0 |
| 1771 | 0 | 0 | 0 | 0 | 1 | 1 | 1 | 1 | 1 | 1 | 0 |
| 1772 | 0 | 0 | 0 | 0 | 0 | 1 | 1 | 1 | 1 | 1 | 1 |
| 1773 | 1 | 0 | 0 | 0 | 0 | 0 | 1 | 1 | 1 | 1 | 1 |
| 1774 | 1 | 1 | 0 | 0 | 0 | 0 | 0 | 1 | 1 | 1 | 1 |
| 1775 | 1 | 1 | 1 | 0 | 0 | 0 | 0 | 0 | 1 | 1 | 1 |
| 1776 | 1 | 1 | 1 | 1 | 0 | 0 | 0 | 0 | 0 | 1 | 1 |
| 1777 | 0 | 1 | 1 | 1 | 1 | 0 | 0 | 0 | 0 | 0 | 1 |
| 1778 | 0 | 0 | 1 | 1 | 1 | 1 | 0 | 0 | 0 | 0 | 0 |
| 1779 | 1 | 0 | 0 | 1 | 1 | 1 | 1 | 0 | 0 | 0 | 0 |
| 1780 | 1 | 1 | 0 | 0 | 1 | 1 | 1 | 1 | 0 | 0 | 0 |
| 1781 | 1 | 1 | 1 | 0 | 0 | 1 | 1 | 1 | 1 | 0 | 0 |
| 1782 | 0 | 1 | 1 | 1 | 0 | 0 | 1 | 1 | 1 | 1 | 0 |
| 1783 | 0 | 0 | 1 | 1 | 1 | 0 | 0 | 1 | 1 | 1 | 1 |
| 1784 | 1 | 0 | 0 | 1 | 1 | 1 | 0 | 0 | 1 | 1 | 1 |
| 1785 | 1 | 1 | 0 | 0 | 1 | 1 | 1 | 0 | 0 | 1 | 1 |
| 1786 | 0 | 1 | 1 | 0 | 0 | 1 | 1 | 1 | 0 | 0 | 1 |
| 1787 | 0 | 0 | 1 | 1 | 0 | 0 | 1 | 1 | 1 | 0 | 0 |
| 1788 | 0 | 0 | 0 | 1 | 1 | 0 | 0 | 1 | 1 | 1 | 0 |
| 1789 | 0 | 0 | 0 | 0 | 1 | 1 | 0 | 0 | 1 | 1 | 1 |
| 1790 | 1 | 0 | 0 | 0 | 0 | 1 | 1 | 0 | 0 | 1 | 1 |
| 1791 | 0 | 1 | 0 | 0 | 0 | 0 | 1 | 1 | 0 | 0 | 1 |
| 1792 | 0 | 0 | 1 | 0 | 0 | 0 | 0 | 1 | 1 | 0 | 0 |
| 1793 | 0 | 0 | 0 | 1 | 0 | 0 | 0 | 0 | 1 | 1 | 0 |
| 1794 | 0 | 0 | 0 | 0 | 1 | 0 | 0 | 0 | 0 | 1 | 1 |
| 1795 | 0 | 0 | 0 | 0 | 0 | 1 | 0 | 0 | 0 | 0 | 1 |
| 1796 | 0 | 0 | 0 | 0 | 0 | 0 | 1 | 0 | 0 | 0 | 0 |
| 1797 | 1 | 0 | 0 | 0 | 0 | 0 | 0 | 1 | 0 | 0 | 0 |
| 1798 | 1 | 1 | 0 | 0 | 0 | 0 | 0 | 0 | 1 | 0 | 0 |
| 1799 | 0 | 1 | 1 | 0 | 0 | 0 | 0 | 0 | 0 | 1 | 0 |
| 1800 | 1 | 0 | 1 | 1 | 0 | 0 | 0 | 0 | 0 | 0 | 1 |

Fig - 4C5(i)

Count State Table For Window Counter Of Fig - 4C4

| COUNT | COUNTER STAGE VALUE 1 2 3 4 5 6 7 8 9 10 11 |
|---|---|
| 1801 | 0 1 0 1 1 0 0 0 0 0 0 |
| 1802 | 1 0 1 0 1 1 0 0 0 0 0 |
| 1803 | 1 1 0 1 0 1 1 0 0 0 0 |
| 1804 | 1 1 1 0 1 0 1 1 0 0 0 |
| 1805 | 1 1 1 1 0 1 0 1 1 0 0 |
| 1806 | 0 1 1 1 1 0 1 0 1 1 0 |
| 1807 | 0 0 1 1 1 1 0 1 0 1 1 |
| 1808 | 0 0 0 1 1 1 1 0 1 0 1 |
| 1809 | 1 0 0 0 1 1 1 1 0 1 0 |
| 1810 | 1 1 0 0 0 1 1 1 1 0 1 |
| 1811 | 1 1 1 0 0 0 1 1 1 1 0 |
| 1812 | 0 1 1 1 0 0 0 1 1 1 1 |
| 1813 | 1 0 1 1 1 0 0 0 1 1 1 |
| 1814 | 1 1 0 1 1 1 0 0 0 1 1 |
| 1815 | 0 1 1 0 1 1 1 0 0 0 1 |
| 1816 | 0 0 1 1 0 1 1 1 0 0 0 |
| 1817 | 1 0 0 1 1 0 1 1 1 0 0 |
| 1818 | 0 1 0 0 1 1 0 1 1 1 0 |
| 1819 | 0 0 1 0 0 1 1 0 1 1 1 |
| 1820 | 1 0 0 1 0 0 1 1 0 1 1 |
| 1821 | 0 1 0 0 1 0 0 1 1 0 1 |
| 1822 | 1 0 1 0 0 1 0 0 1 1 0 |
| 1823 | 0 1 0 1 0 0 1 0 0 1 1 |
| 1824 | 0 0 1 0 1 0 0 1 0 0 1 |
| 1825 | 0 0 0 1 0 1 0 0 1 0 0 |
| 1826 | 0 0 0 0 1 0 1 0 0 1 0 |
| 1827 | 1 0 0 0 0 1 0 1 0 0 1 |
| 1828 | 0 1 0 0 0 0 1 0 1 0 0 |
| 1829 | 0 0 1 0 0 0 0 1 0 1 0 |
| 1830 | 1 0 0 1 0 0 0 0 1 0 1 |
| 1831 | 1 1 0 0 1 0 0 0 0 1 0 |
| 1832 | 1 1 1 0 0 1 0 0 0 0 1 |
| 1833 | 0 1 1 1 0 0 1 0 0 0 0 |
| 1834 | 1 0 1 1 1 0 0 1 0 0 0 |
| 1835 | 1 1 0 1 1 1 0 0 1 0 0 |
| 1836 | 0 1 1 0 1 1 1 0 0 1 0 |
| 1837 | 1 0 1 1 0 1 1 1 0 0 1 |
| 1838 | 0 1 0 1 1 0 1 1 1 0 0 |
| 1839 | 0 0 1 0 1 1 0 1 1 1 0 |
| 1840 | 0 0 0 1 0 1 1 0 1 1 1 |
| 1841 | 1 0 0 0 1 0 1 1 0 1 1 |
| 1842 | 0 1 0 0 0 1 0 1 1 0 1 |
| 1843 | 1 0 1 0 0 0 1 0 1 1 0 |
| 1844 | 0 1 0 1 0 0 0 1 0 1 1 |
| 1845 | 0 0 1 0 1 0 0 0 1 0 1 |
| 1846 | 1 0 0 1 0 1 0 0 0 1 0 |
| 1847 | 1 1 0 0 1 0 1 0 0 0 1 |
| 1848 | 0 1 1 0 0 1 0 1 0 0 0 |
| 1849 | 1 0 1 1 0 0 1 0 1 0 0 |
| 1850 | 0 1 0 1 1 0 0 1 0 1 0 |
| 1851 | 1 0 1 0 1 1 0 0 1 0 1 |
| 1852 | 1 1 0 1 0 1 1 0 0 1 0 |
| 1853 | 1 1 1 0 1 0 1 1 0 0 1 |
| 1854 | 0 1 1 1 0 1 0 1 1 0 0 |
| 1855 | 0 0 1 1 1 0 1 0 1 1 0 |
| 1856 | 0 0 0 1 1 1 0 1 0 1 1 |
| 1857 | 0 0 0 0 1 1 1 0 1 0 1 |
| 1858 | 1 0 0 0 0 1 1 1 0 1 0 |
| 1859 | 1 1 0 0 0 0 1 1 1 0 1 |
| 1860 | 1 1 1 0 0 0 0 1 1 1 0 |
| 1861 | 0 1 1 1 0 0 0 0 1 1 1 |
| 1862 | 1 0 1 1 1 0 0 0 0 1 1 |
| 1863 | 0 1 0 1 1 1 0 0 0 0 1 |
| 1864 | 0 0 1 0 1 1 1 0 0 0 0 |
| 1865 | 1 0 0 1 0 1 1 1 0 0 0 |
| 1866 | 1 1 0 0 1 0 1 1 1 0 0 |
| 1867 | 0 1 1 0 0 1 0 1 1 1 0 |
| 1868 | 0 0 1 1 0 0 1 0 1 1 1 |
| 1869 | 1 0 0 1 1 0 0 1 0 1 1 |
| 1870 | 0 1 0 0 1 1 0 0 1 0 1 |
| 1871 | 1 0 1 0 0 1 1 0 0 1 0 |
| 1872 | 1 1 0 1 0 0 1 1 0 0 1 |
| 1873 | 0 1 1 0 1 0 0 1 1 0 0 |
| 1874 | 0 0 1 1 0 1 0 0 1 1 0 |
| 1875 | 0 0 0 1 1 0 1 0 0 1 1 |
| 1876 | 0 0 0 0 1 1 0 1 0 0 1 |
| 1877 | 0 0 0 0 0 1 1 0 1 0 0 |
| 1878 | 0 0 0 0 0 0 1 1 0 1 0 |
| 1879 | 1 0 0 0 0 0 0 1 1 0 1 |
| 1880 | 1 1 0 0 0 0 0 0 1 1 0 |
| 1881 | 0 1 1 0 0 0 0 0 0 1 1 |
| 1882 | 0 0 1 1 0 0 0 0 0 0 1 |
| 1883 | 0 0 0 1 1 0 0 0 0 0 0 |
| 1884 | 1 0 0 0 1 1 0 0 0 0 0 |
| 1885 | 1 1 0 0 0 1 1 0 0 0 0 |
| 1886 | 1 1 1 0 0 0 1 1 0 0 0 |
| 1887 | 1 1 1 1 0 0 0 1 1 0 0 |
| 1888 | 0 1 1 1 1 0 0 0 1 1 0 |
| 1889 | 0 0 1 1 1 1 0 0 0 1 1 |
| 1890 | 0 0 0 1 1 1 1 0 0 0 1 |
| 1891 | 0 0 0 0 1 1 1 1 0 0 0 |
| 1892 | 1 0 0 0 0 1 1 1 1 0 0 |
| 1893 | 0 1 0 0 0 0 1 1 1 1 0 |
| 1894 | 0 0 1 0 0 0 0 1 1 1 1 |
| 1895 | 1 0 0 1 0 0 0 0 1 1 1 |
| 1896 | 1 1 0 0 1 0 0 0 0 1 1 |
| 1897 | 0 1 1 0 0 1 0 0 0 0 1 |
| 1898 | 0 0 1 1 0 0 1 0 0 0 0 |
| 1899 | 1 0 0 1 1 0 0 1 0 0 0 |
| 1900 | 1 1 0 0 1 1 0 0 1 0 0 |
| 1901 | 0 1 1 0 0 1 1 0 0 1 0 |
| 1902 | 1 0 1 1 0 0 1 1 0 0 1 |
| 1903 | 0 1 0 1 1 0 0 1 1 0 0 |
| 1904 | 0 0 1 0 1 1 0 0 1 1 0 |
| 1905 | 0 0 0 1 0 1 1 0 0 1 1 |
| 1906 | 0 0 0 0 1 0 1 1 0 0 1 |
| 1907 | 0 0 0 0 0 1 0 1 1 0 0 |
| 1908 | 0 0 0 0 0 0 1 0 1 1 0 |
| 1909 | 0 0 0 0 0 0 0 1 0 1 1 |
| 1910 | 0 0 0 0 0 0 0 0 1 0 1 |
| 1911 | 1 0 0 0 0 0 0 0 0 1 0 |
| 1912 | 1 1 0 0 0 0 0 0 0 0 1 |
| 1913 | 0 1 1 0 0 0 0 0 0 0 0 |
| 1914 | 1 0 1 1 0 0 0 0 0 0 0 |
| 1915 | 1 1 0 1 1 0 0 0 0 0 0 |
| 1916 | 1 1 1 0 1 1 0 0 0 0 0 |
| 1917 | 1 1 1 1 0 1 1 0 0 0 0 |
| 1918 | 1 1 1 1 1 0 1 1 0 0 0 |
| 1919 | 1 1 1 1 1 1 0 1 1 0 0 |
| 1920 | 0 1 1 1 1 1 1 0 1 1 0 |
| 1921 | 0 0 1 1 1 1 1 1 0 1 1 |
| 1922 | 0 0 0 1 1 1 1 1 1 0 1 |
| 1923 | 1 0 0 0 1 1 1 1 1 1 0 |
| 1924 | 0 1 0 0 0 1 1 1 1 1 1 |
| 1925 | 1 0 1 0 0 0 1 1 1 1 1 |
| 1926 | 1 1 0 1 0 0 0 1 1 1 1 |
| 1927 | 1 1 1 0 1 0 0 0 1 1 1 |
| 1928 | 1 1 1 1 0 1 0 0 0 1 1 |
| 1929 | 0 1 1 1 1 0 1 0 0 0 1 |
| 1930 | 0 0 1 1 1 1 0 1 0 0 0 |
| 1931 | 1 0 0 1 1 1 1 0 1 0 0 |
| 1932 | 0 1 0 0 1 1 1 1 0 1 0 |
| 1933 | 1 0 1 0 0 1 1 1 1 0 1 |
| 1934 | 1 1 0 1 0 0 1 1 1 1 0 |
| 1935 | 0 1 1 0 1 0 0 1 1 1 1 |
| 1936 | 1 0 1 1 0 1 0 0 1 1 1 |
| 1937 | 1 1 0 1 1 0 1 0 0 1 1 |
| 1938 | 0 1 1 0 1 1 0 1 0 0 1 |
| 1939 | 0 0 1 1 0 1 1 0 1 0 0 |
| 1940 | 0 0 0 1 1 0 1 1 0 1 0 |
| 1941 | 1 0 0 0 1 1 0 1 1 0 1 |
| 1942 | 1 1 0 0 0 1 1 0 1 1 0 |
| 1943 | 0 1 1 0 0 0 1 1 0 1 1 |
| 1944 | 0 0 1 1 0 0 0 1 1 0 1 |
| 1945 | 1 0 0 1 1 0 0 0 1 1 0 |
| 1946 | 0 1 0 0 1 1 0 0 0 1 1 |
| 1947 | 0 0 1 0 0 1 1 0 0 0 1 |
| 1948 | 0 0 0 1 0 0 1 1 0 0 0 |
| 1949 | 1 0 0 0 1 0 0 1 1 0 0 |
| 1950 | 0 1 0 0 0 1 0 0 1 1 0 |
| 1951 | 0 0 1 0 0 0 1 0 0 1 1 |
| 1952 | 0 0 0 1 0 0 0 1 0 0 1 |
| 1953 | 0 0 0 0 1 0 0 0 1 0 0 |
| 1954 | 0 0 0 0 0 1 0 0 0 1 0 |
| 1955 | 1 0 0 0 0 0 1 0 0 0 1 |
| 1956 | 0 1 0 0 0 0 0 1 0 0 0 |
| 1957 | 1 0 1 0 0 0 0 0 1 0 0 |
| 1958 | 0 1 0 1 0 0 0 0 0 1 0 |
| 1959 | 1 0 1 0 1 0 0 0 0 0 1 |
| 1960 | 0 1 0 1 0 1 0 0 0 0 0 |
| 1961 | 1 0 1 0 1 0 1 0 0 0 0 |
| 1962 | 1 1 0 1 0 1 0 1 0 0 0 |
| 1963 | 1 1 1 0 1 0 1 0 1 0 0 |
| 1964 | 0 1 1 1 0 1 0 1 0 1 0 |
| 1965 | 1 0 1 1 1 0 1 0 1 0 1 |
| 1966 | 1 1 0 1 1 1 0 1 0 1 0 |
| 1967 | 1 1 1 0 1 1 1 0 1 0 1 |
| 1968 | 1 1 1 1 0 1 1 1 0 1 0 |
| 1969 | 1 1 1 1 1 0 1 1 1 0 1 |
| 1970 | 1 1 1 1 1 1 0 1 1 1 0 |
| 1971 | 0 1 1 1 1 1 1 0 1 1 1 |
| 1972 | 1 0 1 1 1 1 1 1 0 1 1 |
| 1973 | 0 1 0 1 1 1 1 1 1 0 1 |
| 1974 | 1 0 1 0 1 1 1 1 1 1 0 |
| 1975 | 0 1 0 1 0 1 1 1 1 1 1 |
| 1976 | 1 0 1 0 1 0 1 1 1 1 1 |
| 1977 | 1 1 0 1 0 1 0 1 1 1 1 |
| 1978 | 1 1 1 0 1 0 1 0 1 1 1 |
| 1979 | 1 1 1 1 0 1 0 1 0 1 1 |
| 1980 | 0 1 1 1 1 0 1 0 1 0 1 |
| 1981 | 1 0 1 1 1 1 0 1 0 1 0 |
| 1982 | 1 1 0 1 1 1 1 0 1 0 1 |
| 1983 | 1 1 1 0 1 1 1 1 0 1 0 |
| 1984 | 1 1 1 1 0 1 1 1 1 0 1 |
| 1985 | 1 1 1 1 1 0 1 1 1 1 0 |
| 1986 | 0 1 1 1 1 1 0 1 1 1 1 |
| 1987 | 1 0 1 1 1 1 1 0 1 1 1 |
| 1988 | 1 1 0 1 1 1 1 1 0 1 1 |
| 1989 | 0 1 1 0 1 1 1 1 1 0 1 |
| 1990 | 1 0 1 1 0 1 1 1 1 1 0 |
| 1991 | 0 1 0 1 1 0 1 1 1 1 1 |
| 1992 | 1 0 1 0 1 1 0 1 1 1 1 |
| 1993 | 1 1 0 1 0 1 1 0 1 1 1 |
| 1994 | 1 1 1 0 1 0 1 1 0 1 1 |
| 1995 | 0 1 1 1 0 1 0 1 1 0 1 |
| 1996 | 1 0 1 1 1 0 1 0 1 1 0 |
| 1997 | 0 1 0 1 1 1 0 1 0 1 1 |
| 1998 | 0 0 1 0 1 1 1 0 1 0 1 |
| 1999 | 1 0 0 1 0 1 1 1 0 1 0 |
| 2000 | 1 1 0 0 1 0 1 1 1 0 1 |
| 2001 | 1 1 1 0 0 1 0 1 1 1 0 |
| 2002 | 0 1 1 1 0 0 1 0 1 1 1 |
| 2003 | 1 0 1 1 1 0 0 1 0 1 1 |
| 2004 | 0 1 0 1 1 1 0 0 1 0 1 |
| 2005 | 1 0 1 0 1 1 1 0 0 1 0 |
| 2006 | 1 1 0 1 0 1 1 1 0 0 1 |
| 2007 | 0 1 1 0 1 0 1 1 1 0 0 |
| 2008 | 0 0 1 1 0 1 0 1 1 1 0 |
| 2009 | 0 0 0 1 1 0 1 0 1 1 1 |
| 2010 | 1 0 0 0 1 1 0 1 0 1 1 |
| 2011 | 0 1 0 0 0 1 1 0 1 0 1 |
| 2012 | 1 0 1 0 0 0 1 1 0 1 0 |
| 2013 | 1 1 0 1 0 0 0 1 1 0 1 |
| 2014 | 1 1 1 0 1 0 0 0 1 1 0 |
| 2015 | 0 1 1 1 0 1 0 0 0 1 1 |
| 2016 | 0 0 1 1 1 0 1 0 0 0 1 |
| 2017 | 0 0 0 1 1 1 0 1 0 0 0 |
| 2018 | 1 0 0 0 1 1 1 0 1 0 0 |
| 2019 | 0 1 0 0 0 1 1 1 0 1 0 |
| 2020 | 1 0 1 0 0 0 1 1 1 0 1 |
| 2021 | 1 1 0 1 0 0 0 1 1 1 0 |
| 2022 | 0 1 1 0 1 0 0 0 1 1 1 |
| 2023 | 1 0 1 1 0 1 0 0 0 1 1 |
| 2024 | 0 1 0 1 1 0 1 0 0 0 1 |
| 2025 | 0 0 1 0 1 1 0 1 0 0 0 |

Fig - 4C5 (J)

Count State Table For Window Counter Of Fig - 4C4

| | COUNTER STAGE VALUE | | | | | | | | | | |
|---|---|---|---|---|---|---|---|---|---|---|---|
| COUNT | 1 | 2 | 3 | 4 | 5 | 6 | 7 | 8 | 9 | 10 | 11 |
| 2026 | 1 | 0 | 0 | 1 | 0 | 1 | 1 | 0 | 1 | 0 | 0 |
| 2027 | 0 | 1 | 0 | 0 | 1 | 0 | 1 | 1 | 0 | 1 | 0 |
| 2028 | 1 | 0 | 1 | 0 | 0 | 1 | 0 | 1 | 1 | 0 | 1 |
| 2029 | 1 | 1 | 0 | 1 | 0 | 0 | 1 | 0 | 1 | 1 | 0 |
| 2030 | 0 | 1 | 1 | 0 | 1 | 0 | 0 | 1 | 0 | 1 | 1 |
| 2031 | 0 | 0 | 1 | 1 | 0 | 1 | 0 | 0 | 1 | 0 | 1 |
| 2032 | 1 | 0 | 0 | 1 | 1 | 0 | 1 | 0 | 0 | 1 | 0 |
| 2033 | 1 | 1 | 0 | 0 | 1 | 1 | 0 | 1 | 0 | 0 | 1 |
| 2034 | 0 | 1 | 1 | 0 | 0 | 1 | 1 | 0 | 1 | 0 | 0 |
| 2035 | 0 | 0 | 1 | 1 | 0 | 0 | 1 | 1 | 0 | 1 | 0 |
| 2036 | 1 | 0 | 0 | 1 | 1 | 0 | 0 | 1 | 1 | 0 | 1 |
| 2037 | 1 | 1 | 0 | 0 | 1 | 1 | 0 | 0 | 1 | 1 | 0 |
| 2038 | 0 | 1 | 1 | 0 | 0 | 1 | 1 | 0 | 0 | 1 | 1 |
| 2039 | 0 | 0 | 1 | 1 | 0 | 0 | 1 | 1 | 0 | 0 | 1 |
| 2040 | 0 | 0 | 0 | 1 | 1 | 0 | 0 | 1 | 1 | 0 | 0 |
| 2041 | 0 | 0 | 0 | 0 | 1 | 1 | 0 | 0 | 1 | 1 | 0 |
| 2042 | 0 | 0 | 0 | 0 | 0 | 1 | 1 | 0 | 0 | 1 | 1 |
| 2043 | 0 | 0 | 0 | 0 | 0 | 0 | 1 | 1 | 0 | 0 | 1 |
| 2044 | 0 | 0 | 0 | 0 | 0 | 0 | 0 | 1 | 1 | 0 | 0 |
| 2045 | 0 | 0 | 0 | 0 | 0 | 0 | 0 | 0 | 1 | 1 | 0 |
| 2046 | 0 | 0 | 0 | 0 | 0 | 0 | 0 | 0 | 0 | 1 | 1 |
| 2047 | 0 | 0 | 0 | 0 | 0 | 0 | 0 | 0 | 0 | 0 | 1 |
| 2048 | 0 | 0 | 0 | 0 | 0 | 0 | 0 | 0 | 0 | 0 | 0 |

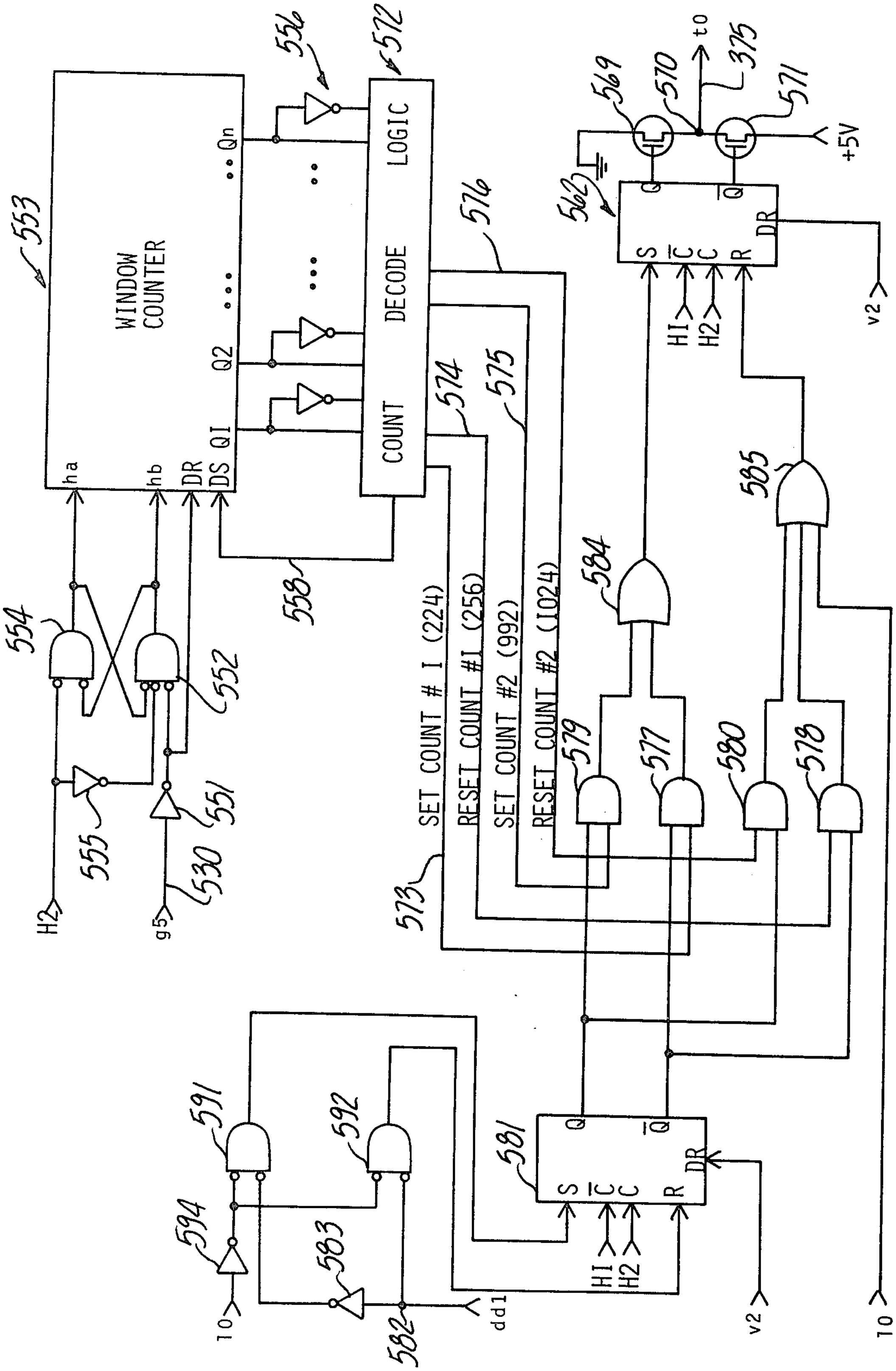
Fig - 4C6
*Window Counter With Range Selection*

Fig - 4C7
Pulse Width Counter *1
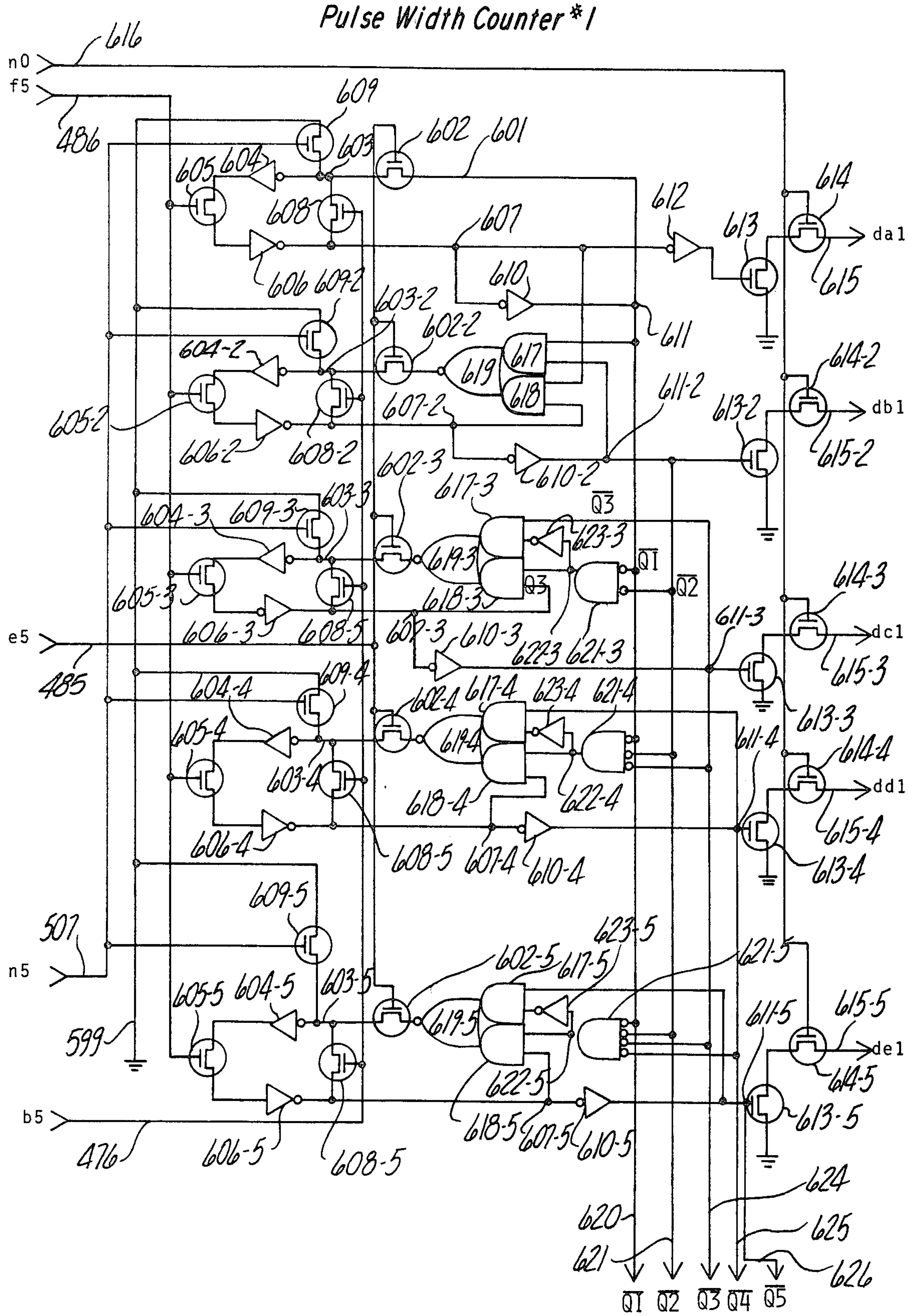

Pulse Width Counter #2

Fig-4C9
Pulse Width Counter *3
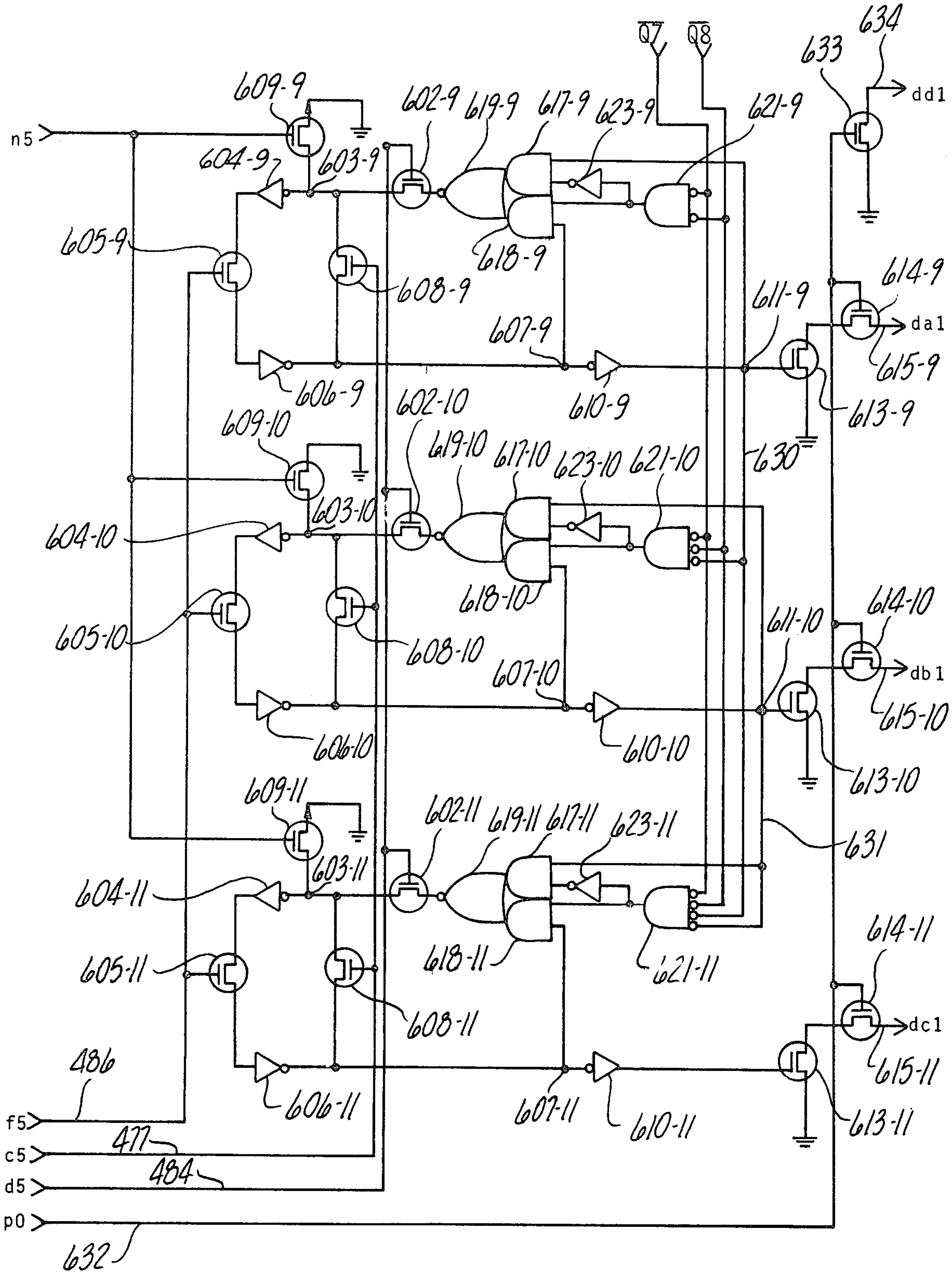

Oxygen System Integrator Circuitry

Divide By 16 Counter

Fig-4D2

Count State Table For Counter Of Fig-4D1

| | COUNTER STAGE VALUES |
|---|---|
| COUNT | 1 2 3 |
| 0 | 0 0 0 |
| 1 | 1 0 0 |
| 2 | 1 1 0 |
| 3 | 1 1 1 |
| 4 | 0 1 1 |
| 5 | 1 0 1 |
| 6 | 0 1 0 |
| 7 | 0 0 1 |

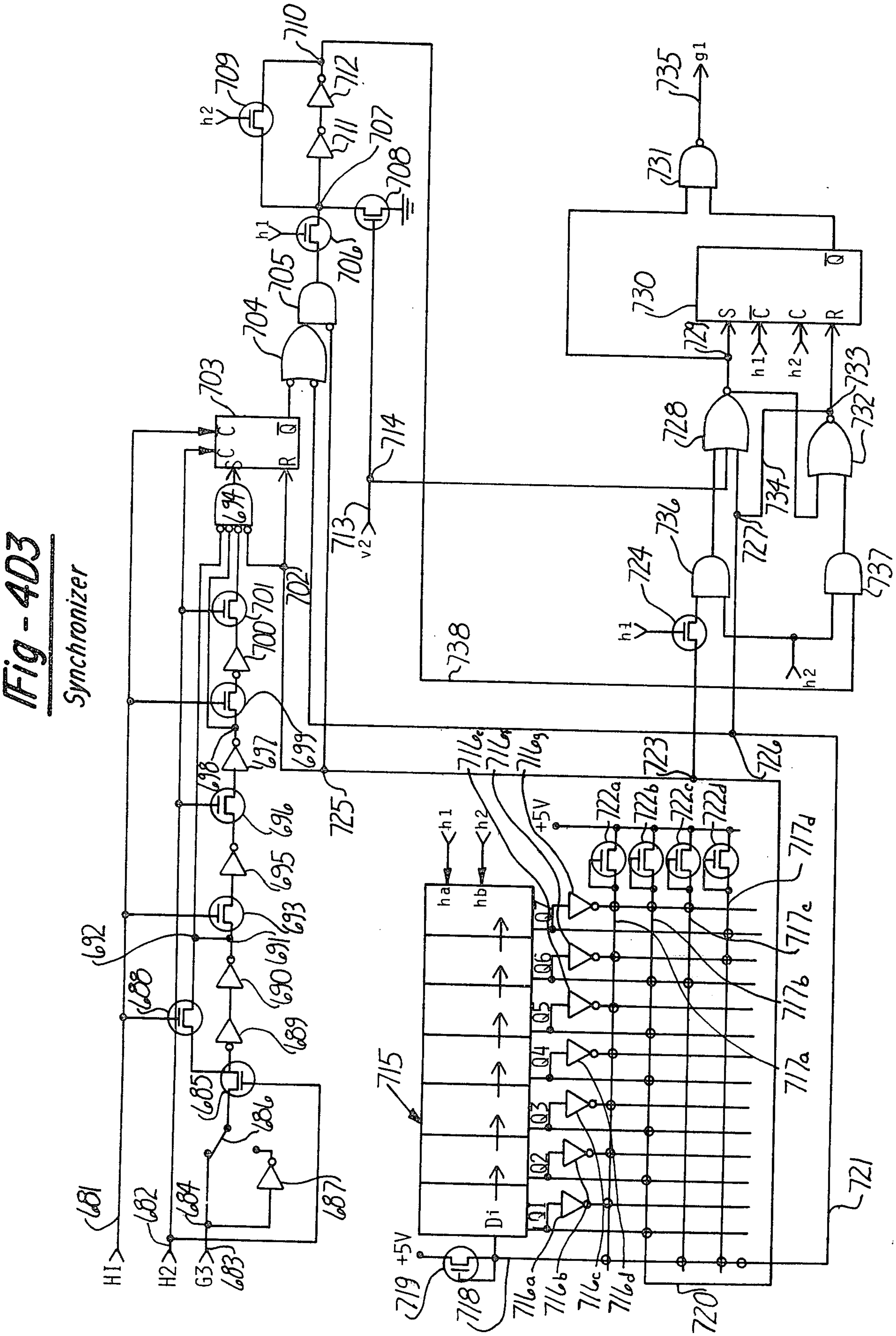
Fig - 4D3
Synchronizer

Fig - 4D4

Count State Table For Seven Stage Counter Of Fig - 4D3

| COUNT | COUNTER STAGE VALUE 1234567 |
|---|---|
| 1 | 0000000 |
| 2 | 1000000 |
| 3 | 1100000 |
| 4 | 1110000 |
| 5 | 1111000 |
| 6 | 1111100 |
| 7 | 1111110 |
| 8 | 0111111 |
| 9 | 1011111 |
| 10 | 1101111 |
| 11 | 1110111 |
| 12 | 1111011 |
| 13 | 1111101 |
| 14 | 0111110 |
| 15 | 0011111 |
| 16 | 1001111 |
| 17 | 1100111 |
| 18 | 1110011 |
| 19 | 1111001 |
| 20 | 0111100 |
| 21 | 1011110 |
| 22 | 0101111 |
| 23 | 1010111 |
| 24 | 1101011 |
| 25 | 1110101 |
| 26 | 0111010 |
| 27 | 0011101 |
| 28 | 0001110 |
| 29 | 0000111 |
| 30 | 1000011 |
| 31 | 1100001 |
| 32 | 0110000 |
| 33 | 1011000 |
| 34 | 1101100 |
| 35 | 1110110 |
| 36 | 0111011 |
| 37 | 1011101 |
| 38 | 0101110 |
| 39 | 0010111 |
| 40 | 1001011 |
| 41 | 1100101 |
| 42 | 0110010 |
| 43 | 0011001 |
| 44 | 0001100 |
| 45 | 1000110 |
| 46 | 0100011 |
| 47 | 1010001 |
| 48 | 0101000 |
| 49 | 1010100 |
| 50 | 1101010 |
| 51 | 0110101 |
| 52 | 0011010 |
| 53 | 0001101 |
| 54 | 0000110 |
| 55 | 0000011 |
| 56 | 1000001 |
| 57 | 0100000 |
| 58 | 1010000 |
| 59 | 1101000 |
| 60 | 1110100 |
| 61 | 1111010 |
| 62 | 0111101 |
| 63 | 0011110 |
| 64 | 0001111 |

| COUNT | COUNTER STAGE VALUE 1234567 |
|---|---|
| 65 | 1000111 |
| 66 | 1100011 |
| 67 | 1110001 |
| 68 | 0111000 |
| 69 | 1011100 |
| 70 | 1101110 |
| 71 | 0110111 |
| 72 | 1011011 |
| 73 | 1101101 |
| 74 | 0110110 |
| 75 | 0011011 |
| 76 | 1001101 |
| 77 | 0100110 |
| 78 | 0010011 |
| 79 | 1001001 |
| 80 | 0100100 |
| 81 | 1010010 |
| 82 | 0101001 |
| 83 | 0010100 |
| 84 | 1001010 |
| 85 | 0100101 |
| 86 | 0010010 |
| 87 | 0001001 |
| 88 | 0000100 |
| 89 | 1000010 |
| 90 | 0100001 |
| 91 | 0010000 |
| 92 | 1001000 |
| 93 | 1100100 |
| 94 | 1110010 |
| 95 | 0111001 |
| 96 | 0011100 |
| 97 | 1001110 |
| 98 | 0100111 |
| 99 | 1010011 |
| 100 | 1101001 |
| 101 | 0110100 |
| 102 | 1011010 |
| 103 | 0101101 |
| 104 | 0010110 |
| 105 | 0001011 |
| 106 | 1000101 |
| 107 | 0100010 |
| 108 | 0010001 |
| 109 | 0001000 |
| 110 | 1000100 |
| 111 | 1100010 |
| 112 | 0110001 |
| 113 | 0011000 |
| 114 | 1001100 |
| 115 | 1100110 |
| 116 | 0110011 |
| 117 | 1011001 |
| 118 | 0101100 |
| 119 | 1010110 |
| 120 | 0101011 |
| 121 | 1010101 |
| 122 | 0101010 |
| 123 | 0010101 |
| 124 | 0001010 |
| 125 | 0000101 |
| 126 | 0000010 |
| 127 | 0000001 |
| 128 | 0000000 |

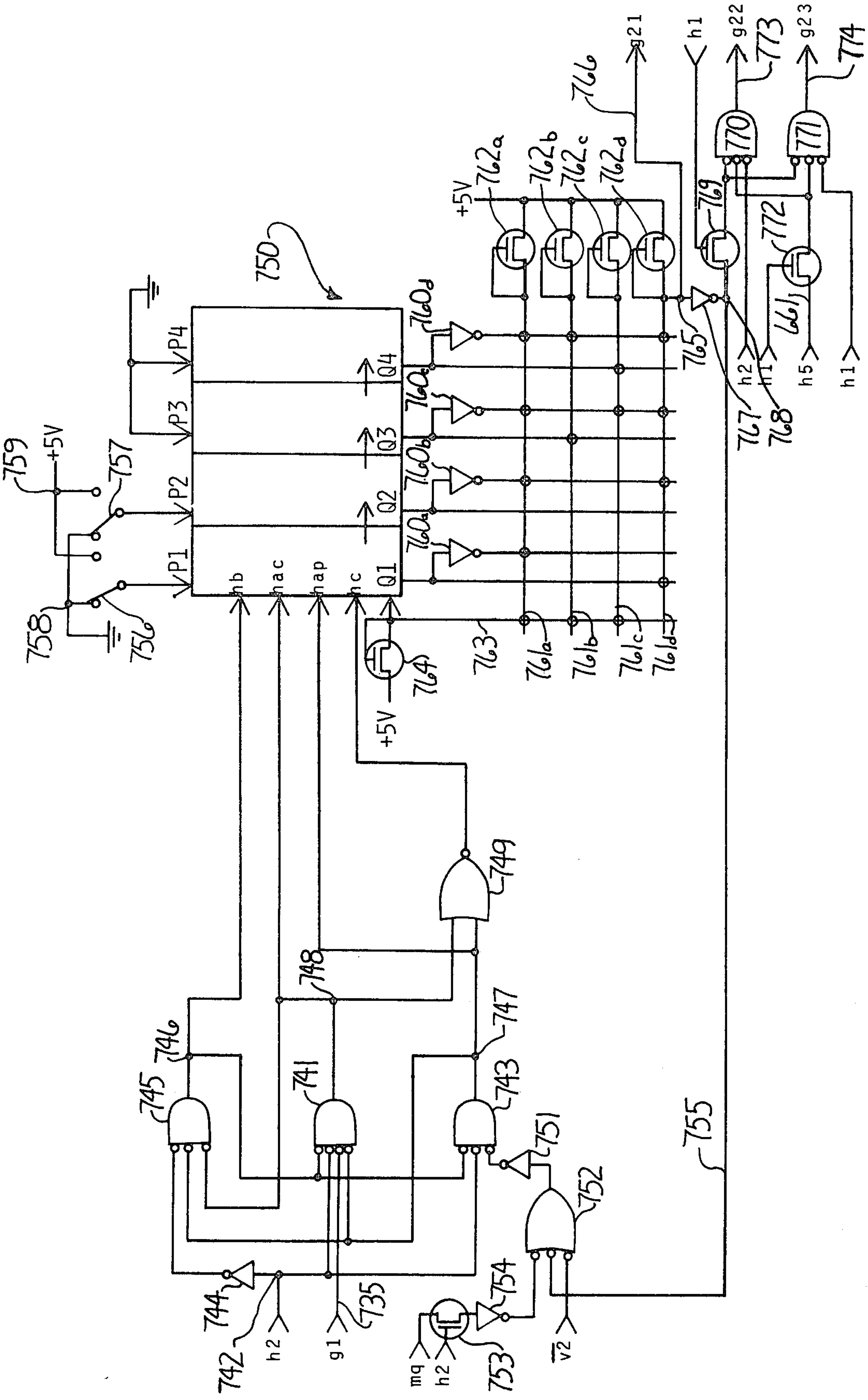
Fig - 4D5
Counter

Fig-4D6

Count State Table For Preset Table Counter Of Fig-4D5

| | COUNTER STAGE VALUE |
|---|---|
| COUNT | 1 2 3 4 |
| 0 | 0 0 0 0 |
| 1 | 1 0 0 0 |
| 2 | 1 1 0 0 |
| 3 | 1 1 1 0 |
| 4 | 1 1 1 1 |
| 5 | 0 1 1 1 |
| 6 | 1 0 1 1 |
| 7 | 1 1 0 1 |
| 8 | 0 1 1 0 |
| 9 | 0 0 1 1 |
| 10 | 1 0 0 1 |
| 11 | 0 1 0 0 |
| 12 | 1 0 1 0 |
| 13 | 0 1 0 1 |
| 14 | 0 0 1 0 |
| 15 | 0 0 0 1 |
| 0 | 0 0 0 0 |

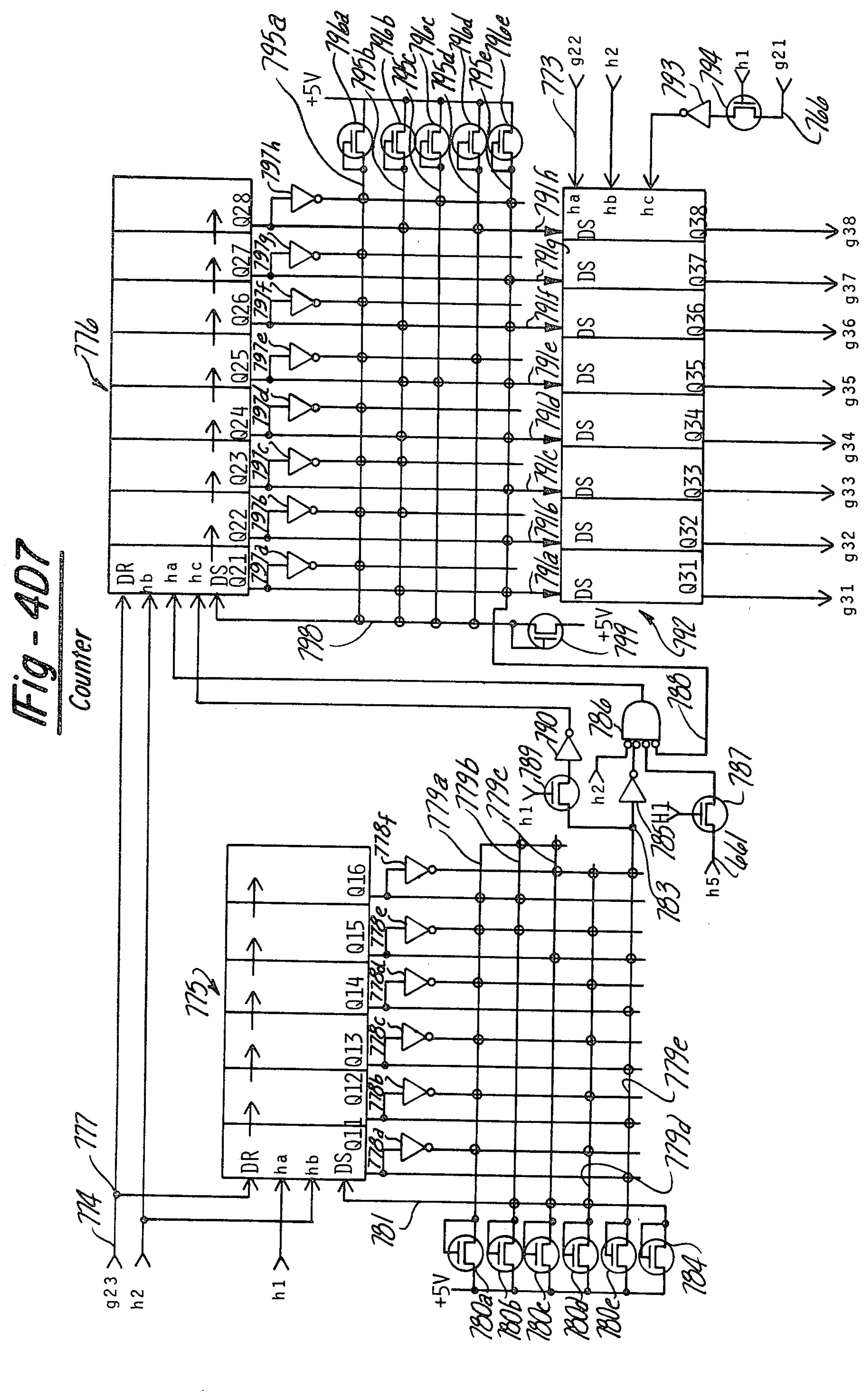
Fig - 4D7
Counter

Fig - 4D8

Count State Table For Six Stage Counters Of Fig - 4D7, Fig - 4D11, Fig - 4D12 & Fig - 4D14

| COUNT | COUNTER STAGE VALUE 1 2 3 4 5 6 |
|---|---|
| 1 | 0 0 0 0 0 0 |
| 2 | 1 0 0 0 0 0 |
| 3 | 1 1 0 0 0 0 |
| 4 | 1 1 1 0 0 0 |
| 5 | 1 1 1 1 0 0 |
| 6 | 1 1 1 1 1 0 |
| 7 | 1 1 1 1 1 1 |
| 8 | 0 1 1 1 1 1 |
| 9 | 1 0 1 1 1 1 |
| 10 | 1 1 0 1 1 1 |
| 11 | 1 1 1 0 1 1 |
| 12 | 1 1 1 1 0 1 |
| 13 | 0 1 1 1 1 0 |
| 14 | 0 0 1 1 1 1 |
| 15 | 1 0 0 1 1 1 |
| 16 | 1 1 0 0 1 1 |
| 17 | 1 1 1 0 0 1 |
| 18 | 0 1 1 1 0 0 |
| 19 | 1 0 1 1 1 0 |
| 20 | 0 1 0 1 1 1 |
| 21 | 1 0 1 0 1 1 |
| 22 | 1 1 0 1 0 1 |
| 23 | 0 1 1 0 1 0 |
| 24 | 0 0 1 1 0 1 |
| 25 | 0 0 0 1 1 0 |
| 26 | 0 0 0 0 1 1 |
| 27 | 1 0 0 0 0 1 |
| 28 | 0 1 0 0 0 0 |
| 29 | 1 0 1 0 0 0 |
| 30 | 1 1 0 1 0 0 |
| 31 | 1 1 1 0 1 0 |
| 32 | 0 1 1 1 0 1 |
| 33 | 0 0 1 1 1 0 |
| 34 | 0 0 0 1 1 1 |
| 35 | 1 0 0 0 1 1 |
| 36 | 1 1 0 0 0 1 |
| 37 | 0 1 1 0 0 0 |
| 38 | 1 0 1 1 0 0 |
| 39 | 1 1 0 1 1 0 |
| 40 | 0 1 1 0 1 1 |
| 41 | 1 0 1 1 0 1 |
| 42 | 0 1 0 1 1 0 |
| 43 | 0 0 1 0 1 1 |
| 44 | 1 0 0 1 0 1 |
| 45 | 0 1 0 0 1 0 |
| 46 | 0 0 1 0 0 1 |
| 47 | 0 0 0 1 0 0 |
| 48 | 1 0 0 0 1 0 |
| 49 | 0 1 0 0 0 1 |
| 50 | 0 0 1 0 0 0 |
| 51 | 1 0 0 1 0 0 |
| 52 | 1 1 0 0 1 0 |
| 53 | 0 1 1 0 0 1 |
| 54 | 0 0 1 1 0 0 |
| 55 | 1 0 0 1 1 0 |
| 56 | 0 1 0 0 1 1 |
| 57 | 1 0 1 0 0 1 |
| 58 | 0 1 0 1 0 0 |
| 59 | 1 0 1 0 1 0 |
| 60 | 0 1 0 1 0 1 |
| 61 | 0 0 1 0 1 0 |
| 62 | 0 0 0 1 0 1 |
| 63 | 0 0 0 0 1 0 |
| 64 | 0 0 0 0 0 1 |
| 65 | 0 0 0 0 0 0 |

Fig-4D9
Sampler
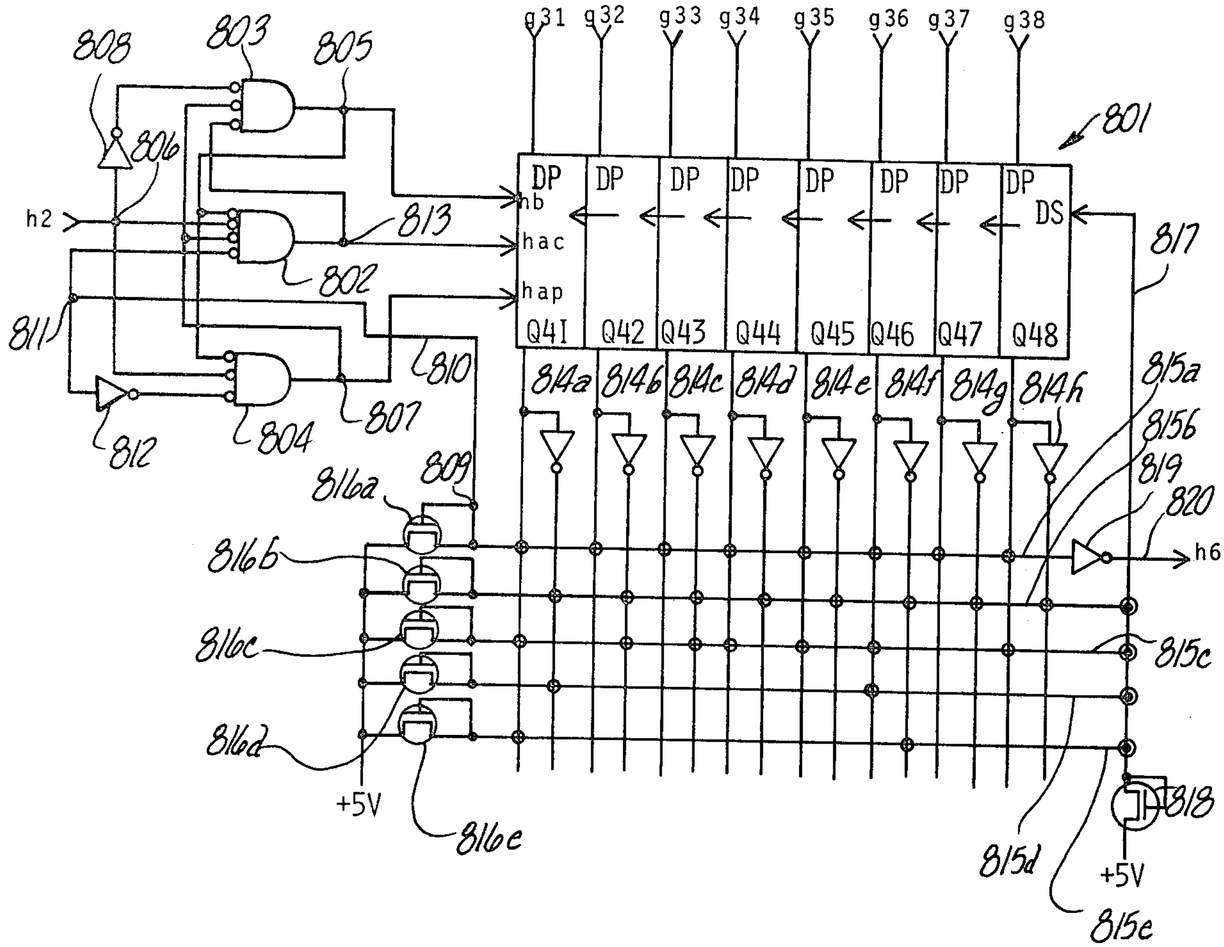

Fig-4D10
Sensor Test Control
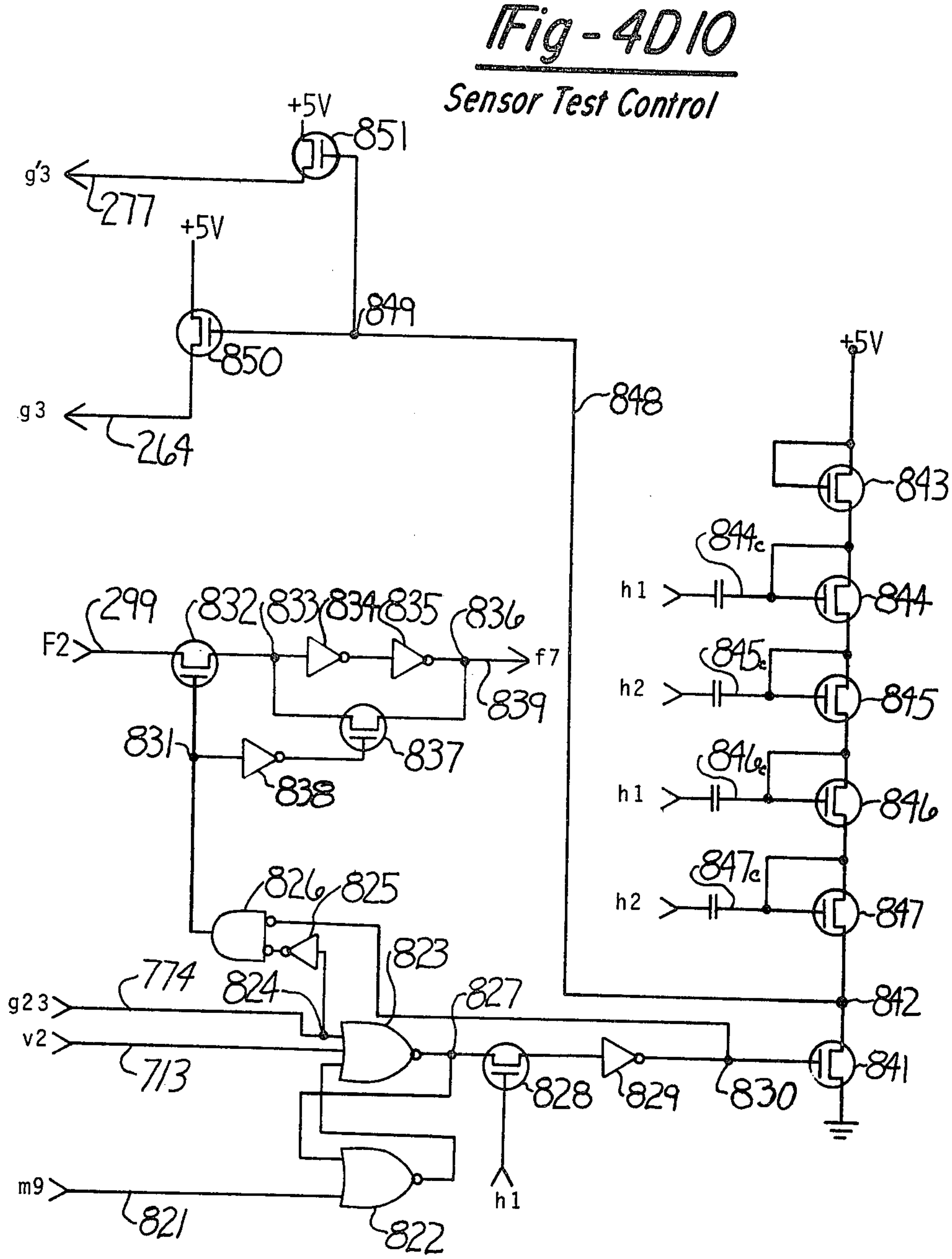

Fig-4D II
Channel #1 Sampling Counter & Register
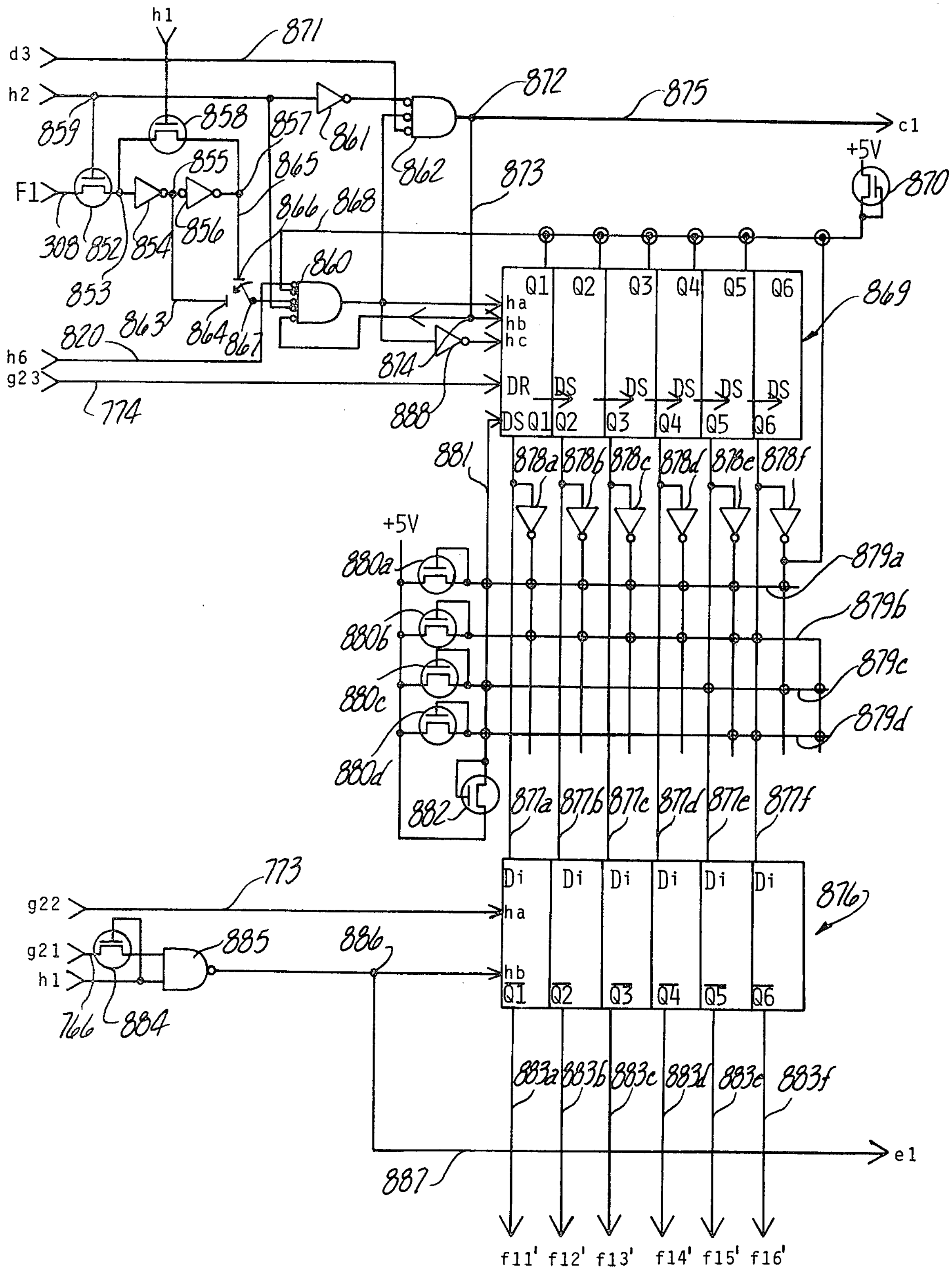

Fig-4D12
Channel*2 Sampling Counter & Register
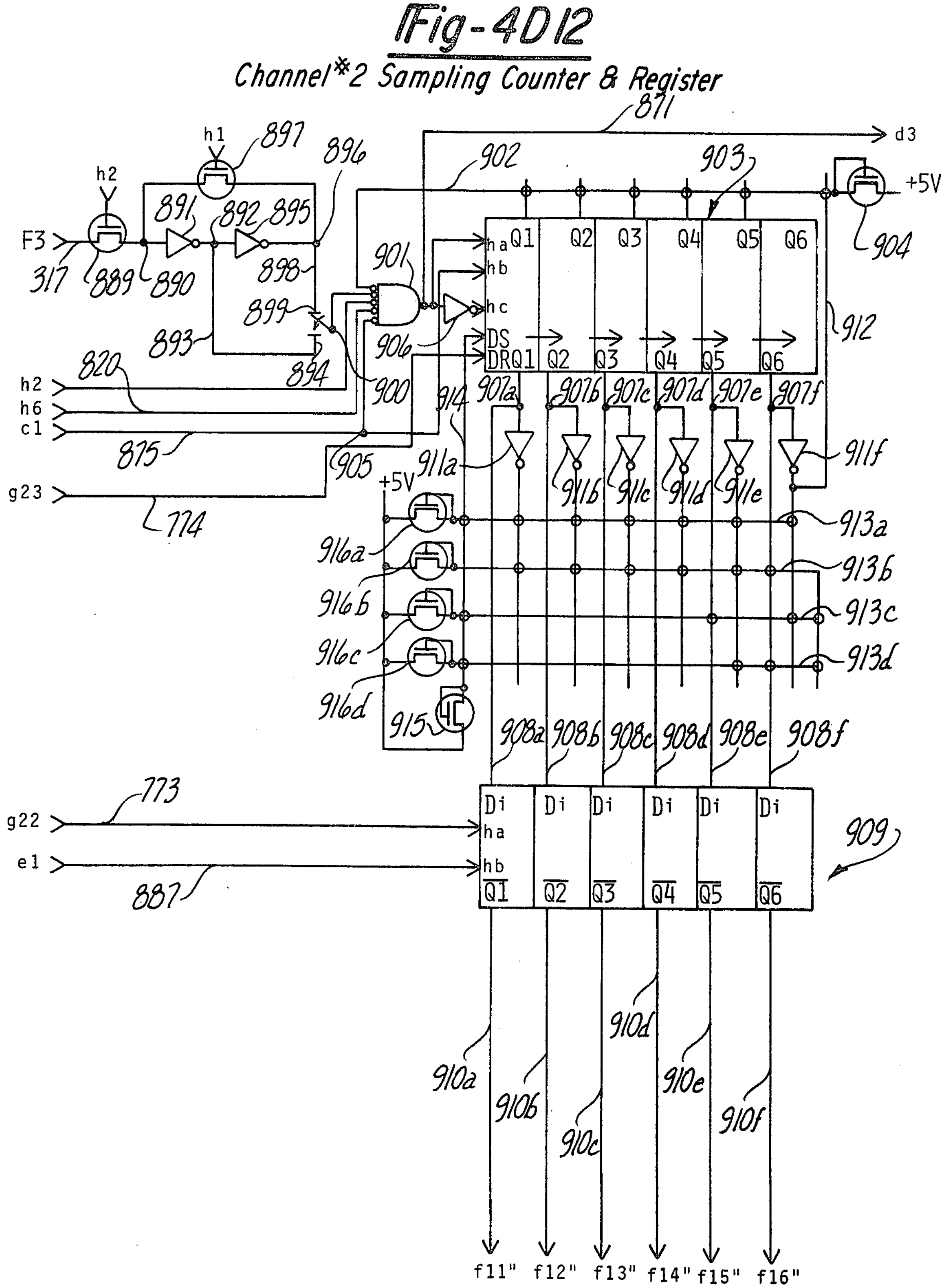

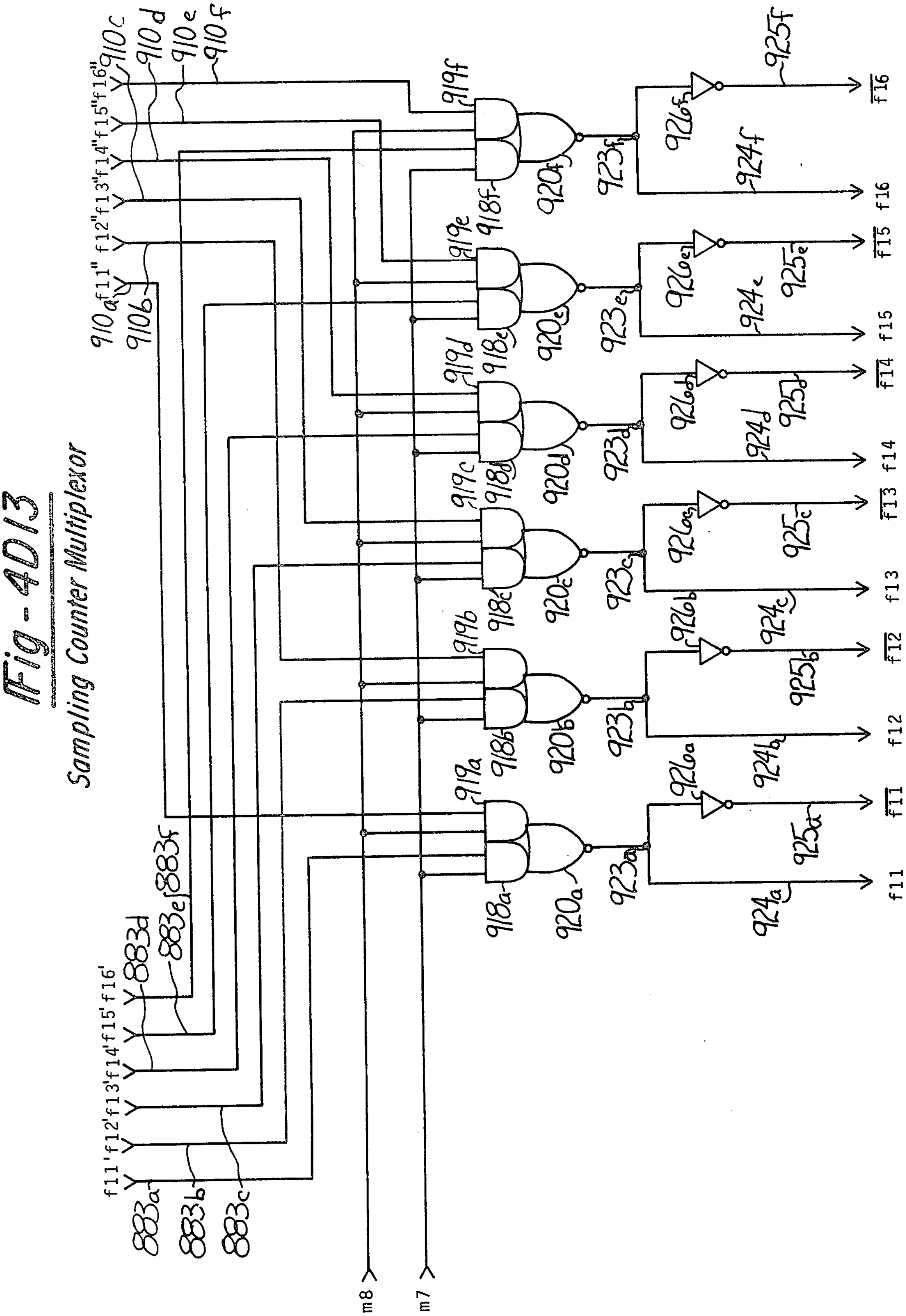
Fig-4D13
Sampling Counter Multiplexor

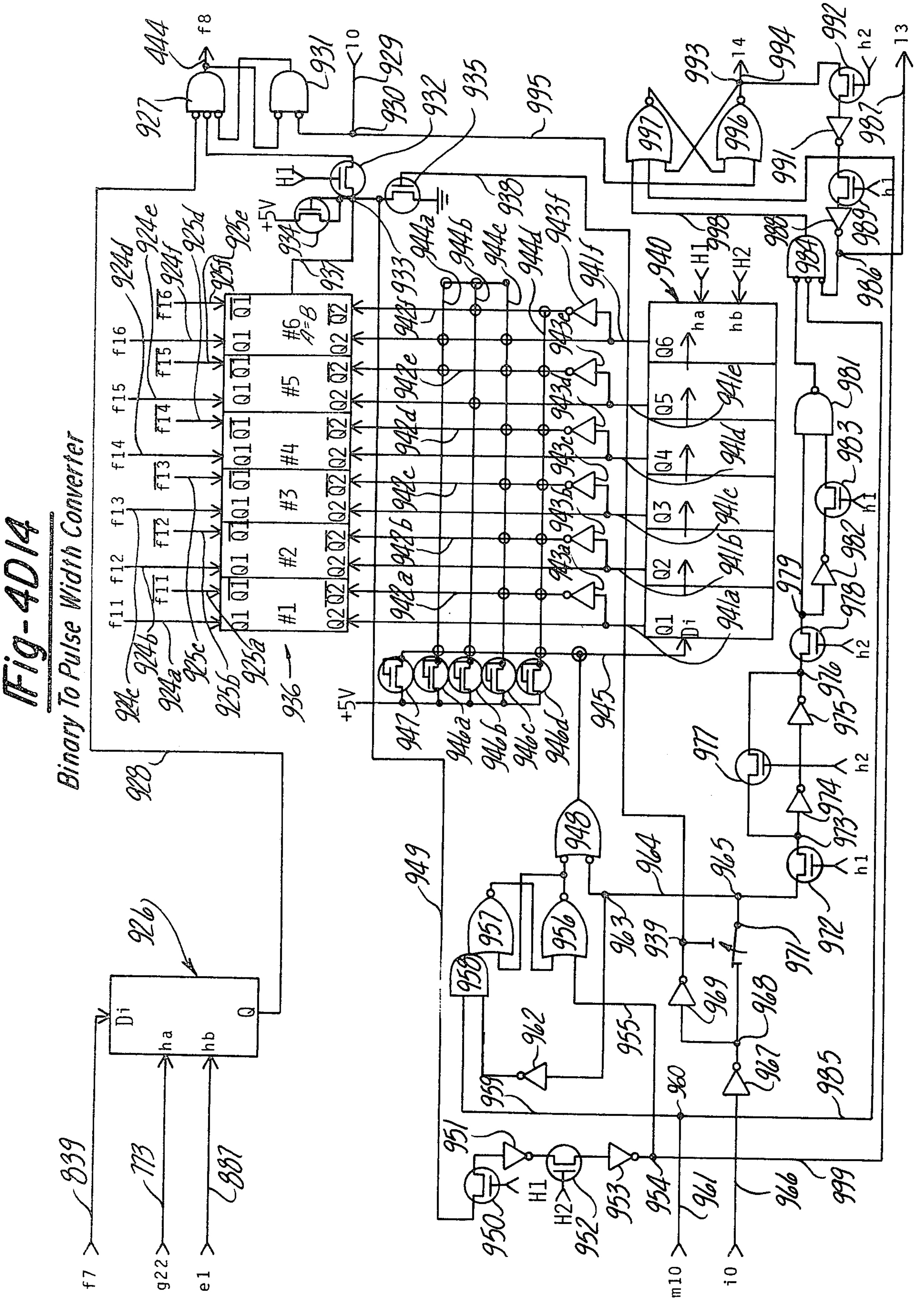
Fig-4D14
Binary To Pulse Width Converter

Crankshaft Position Signal Conditioner

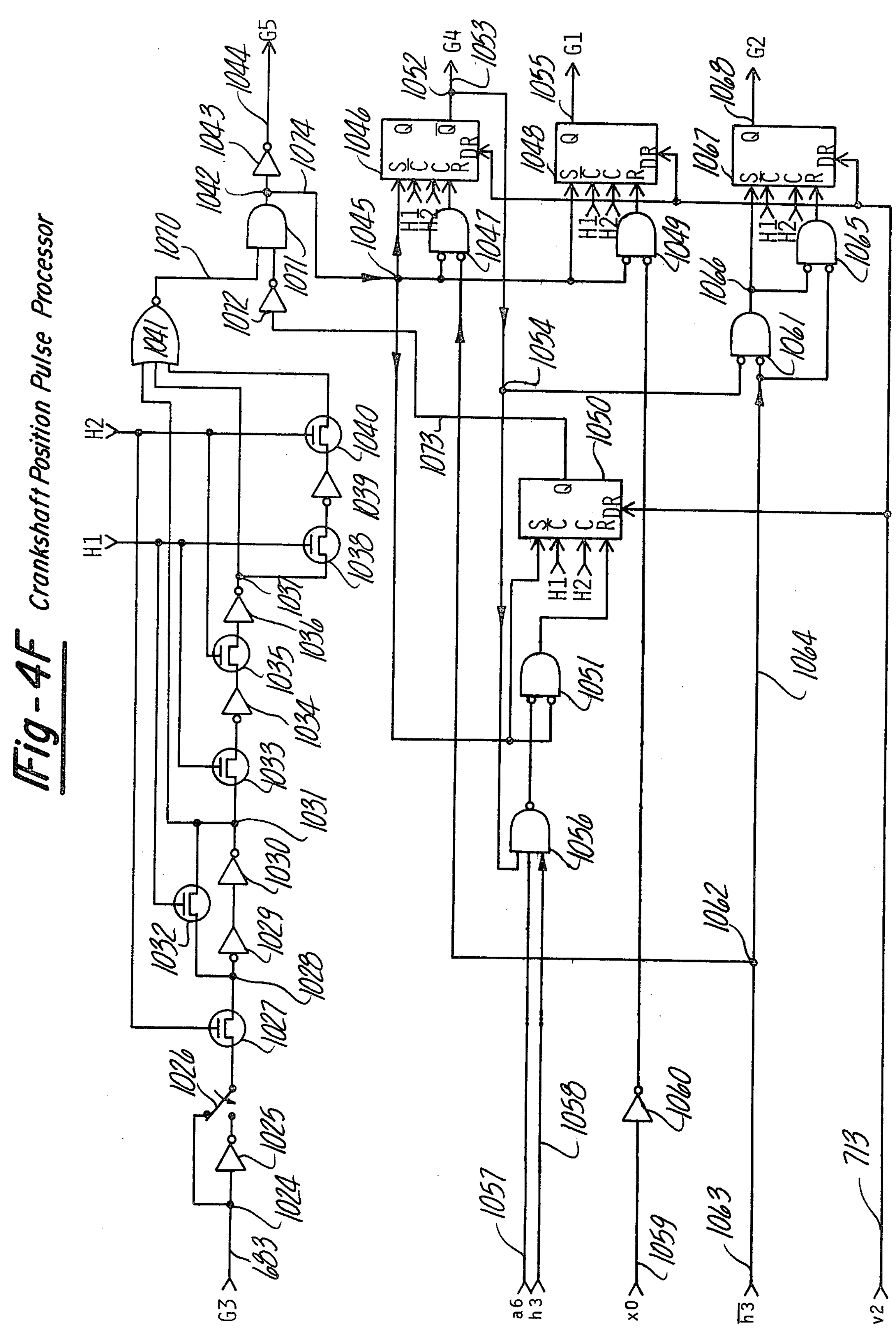
Fig-4F Crankshaft Position Pulse Processor

Engine Time Interval Counter

Micro Processor System

Reset Control System
1142
POWER-ON RESET GENERATOR
Fig-5A1
v2
$\overline{v2}$
v
BUFFER LOGIC
Fig-5A2
1143
v0
$\overline{v0}$
H1
H2
1144
CLOCK FAIL DETECTOR
Fig-5A3
v1
h3
f0
G5
1145
MPU RESET CONTROL
Fig-5A4
v1
a9
b9
$\overline{h3}$
c9
v3
1146
WATCH DOG CIRCUIT
Fig-5A5
Z

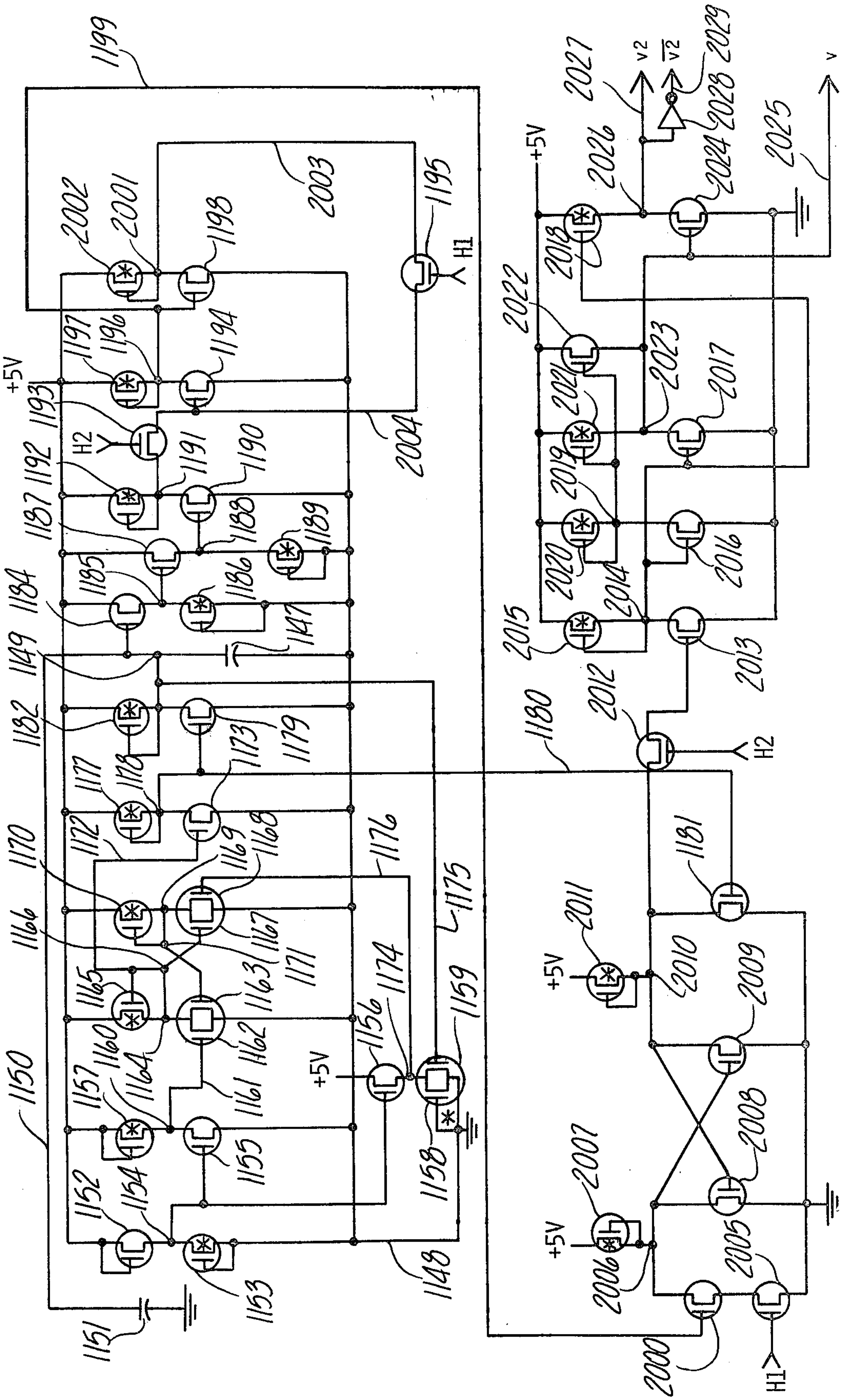
Fig-5A1
Power-On Reset Generator

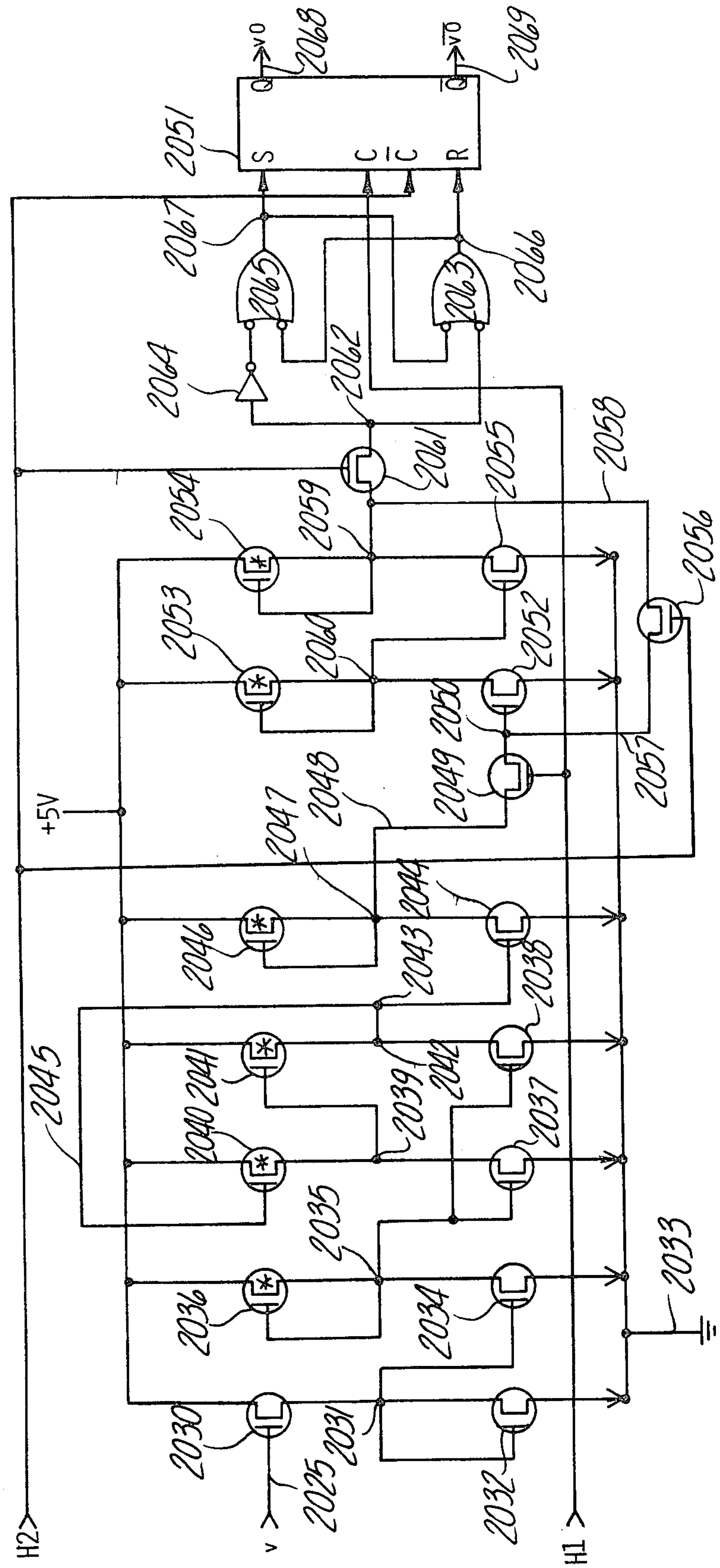
Fig-5A2
Buffer Logic

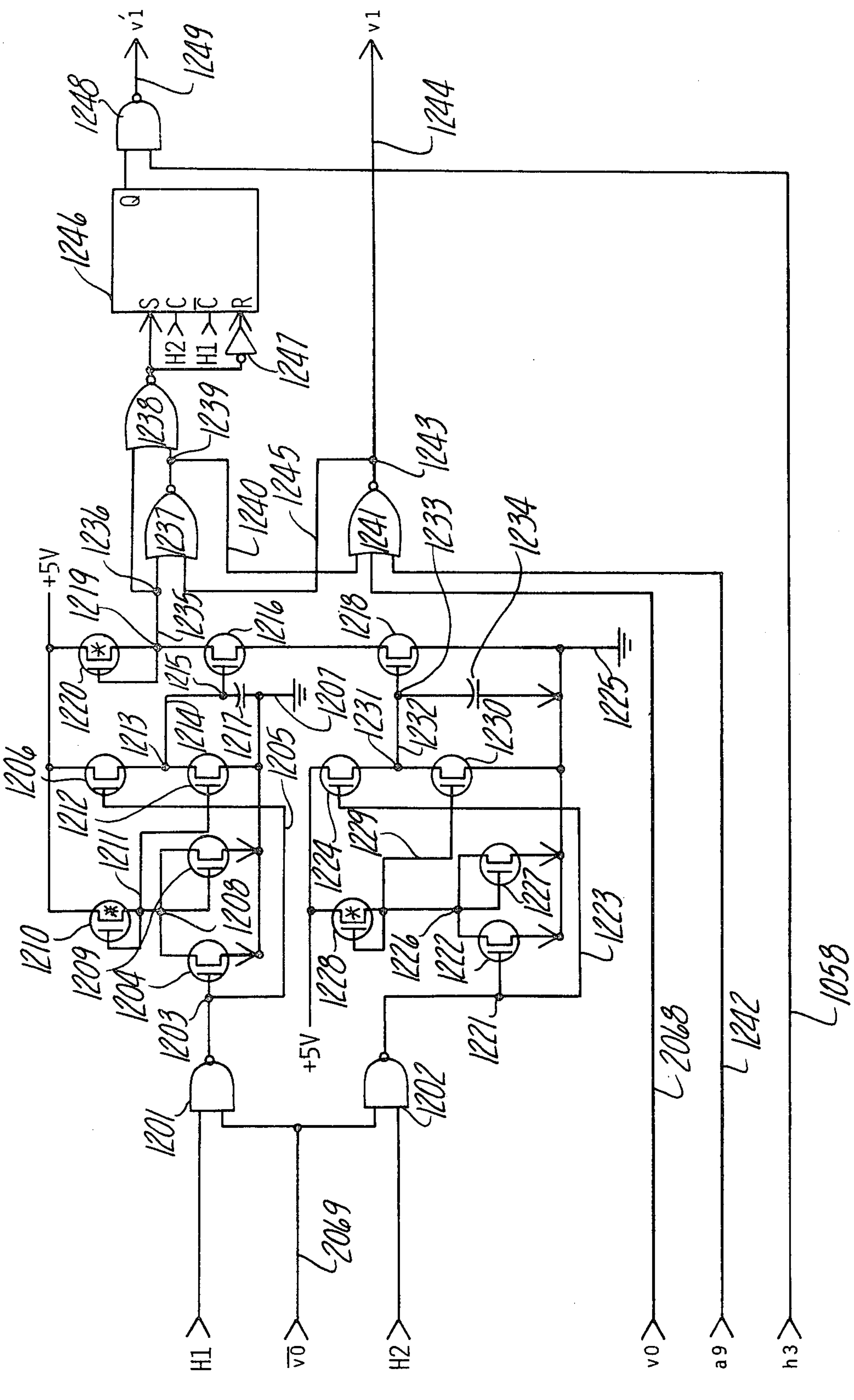
Fig-5A3
Clock Fail Detector

Fig-5A4
MPU Reset Control
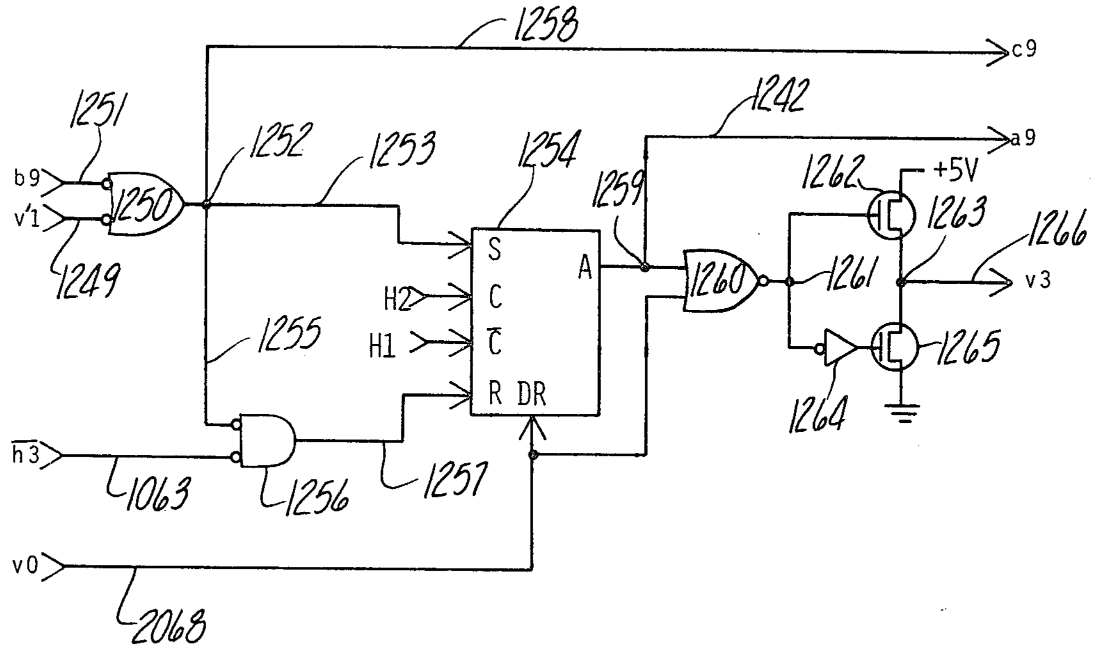

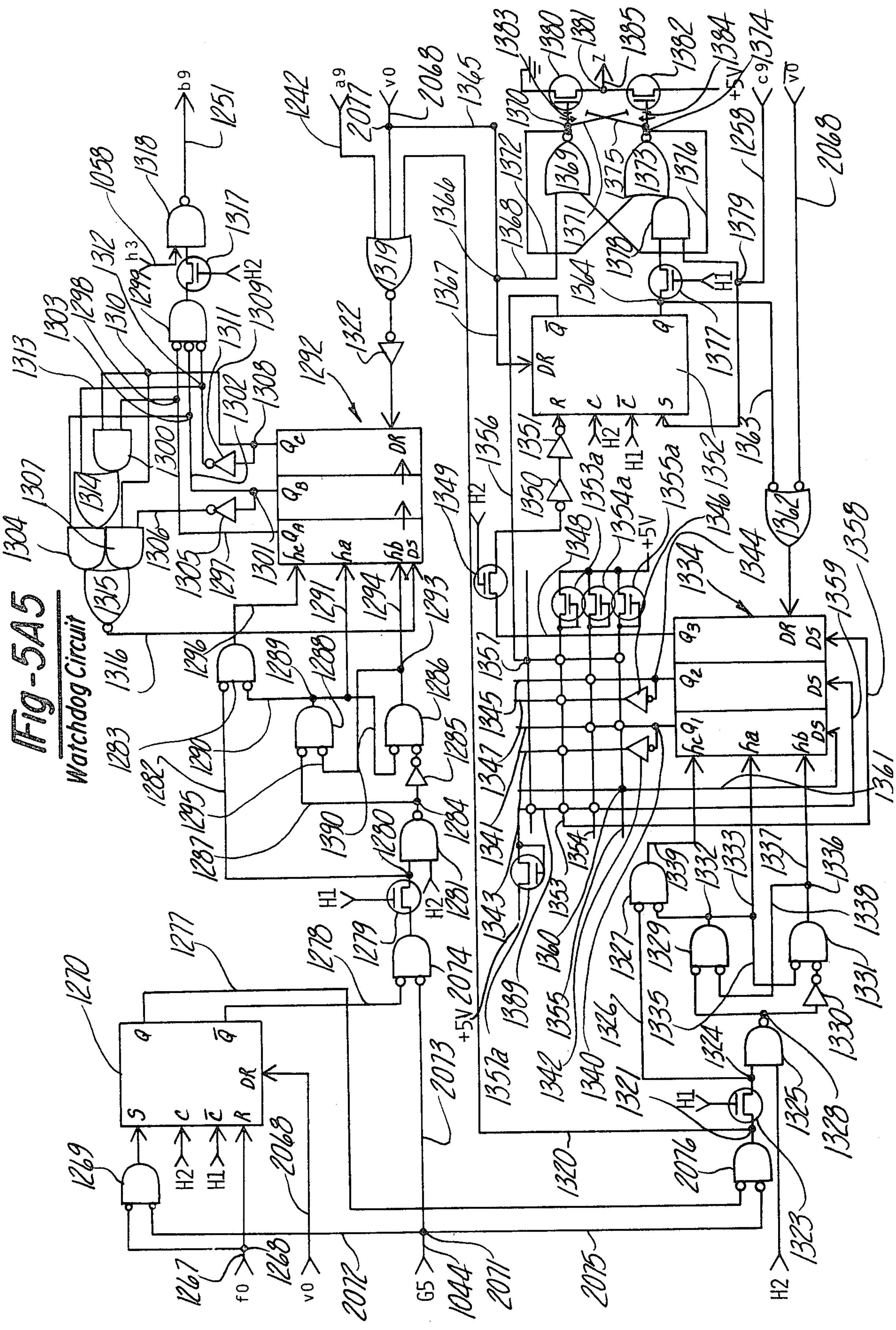
Fig-5A5
Watchdog Circuit

Fig-5A6

*Count State Table For Three Stage Shift Counter 1292 Of Fig - 5A5*

| COUNT | COUNTER STAGE VALUE 1 2 3 |
|---|---|
| 1 | 0 0 0 |
| 2 | 0 0 1 |
| 3 | 0 1 1 |
| 4 | 1 1 0 |
| 5 | 1 0 1 |
| 6 | 0 1 0 |
| 7 | 1 0 0 |

Fig-5A7

*Count State Table For The Three Stage Binary Counter Of Fig - 5A5*

| COUNT | COUNTER STAGE VALUE 1 2 3 |
|---|---|
| 1 | 0 0 0 |
| 2 | 0 0 1 |
| 3 | 0 1 0 |
| 4 | 0 1 1 |
| 5 | 1 0 0 |

MPU 6800

Memory Section

Chip Select

Parallel To Serial Convertor

Status Input

Camshaft Sensor Conditioning

Interrupt Control

Binary Decoder

Output Port

Fuel Pulse Counters

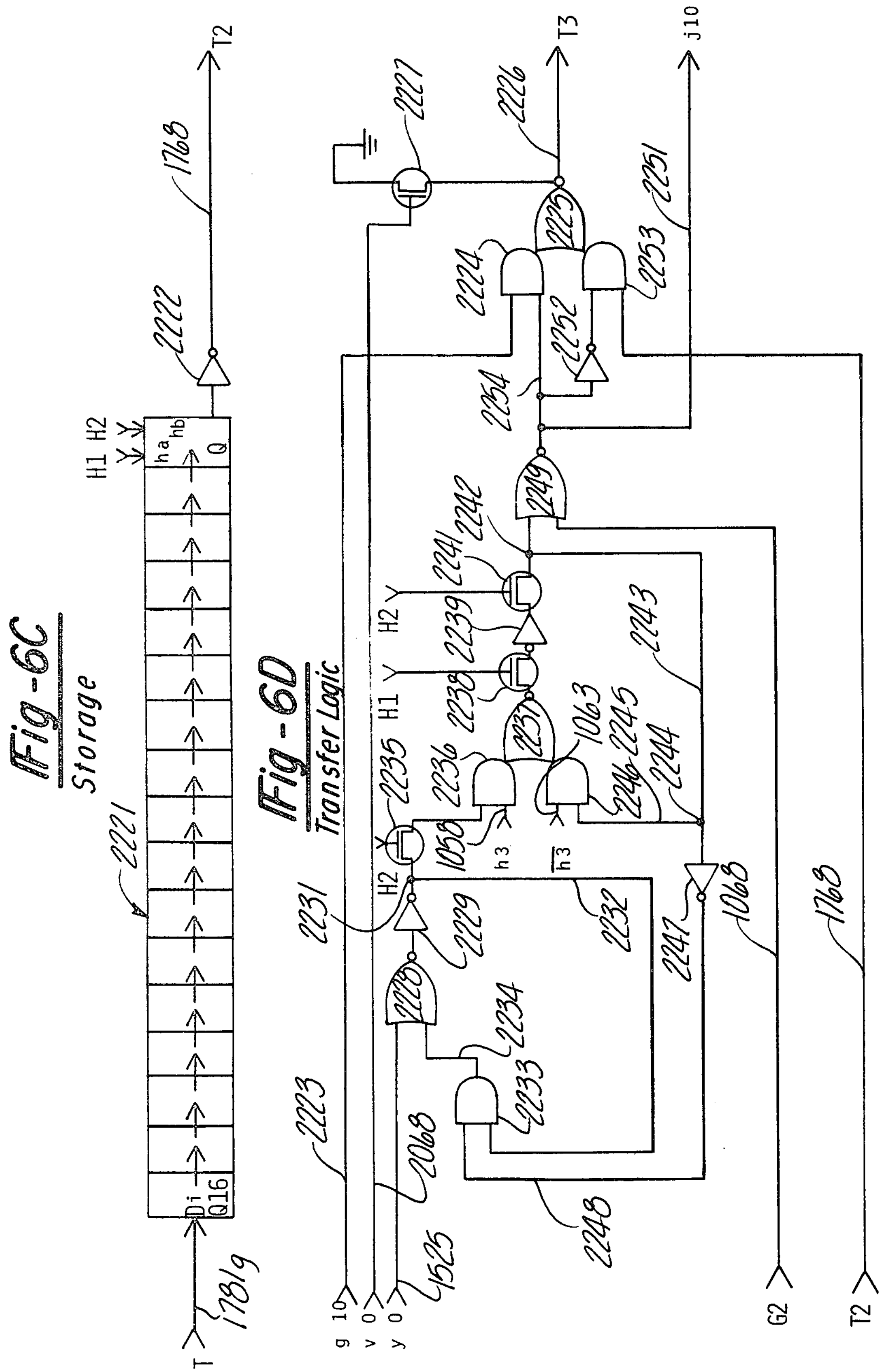
Fig-6C Storage
Fig-6D Transfer Logic

Counter

Storage

Transfer Logic

Counter

Ignition Control

Timing Generator

Fig-6J1

Count State Table For The
Shift Register Counter Of Fig-6J

| | COUNT | COUNTER STAGE VALUES 1 2 3 4 |
|---|---|---|
| | 0 | 0 0 0 0 |
| | 1 | 1 0 0 0 |
| | 2 | 1 1 0 0 |
| * | 3 | 1 1 1 0 |
| | 4 | 1 1 1 1 |
| ** | 5 | 0 1 1 1 |
| | 6 | 1 0 1 1 |
| | 7 | 1 1 0 1 |
| | 8 | 0 1 1 0 |
| | 9 | 0 0 1 1 |
| | 10 | 1 0 0 1 |
| | 11 | 0 1 0 0 |
| | 12 | 1 0 1 0 |
| *** | 13 | 0 1 0 1 |
| | 14 | 0 0 1 0 |
| | 15 | 0 0 0 1 |
| | 16 | 0 0 0 0 |

* CAUSES DIRECT SET OVER-RIDE

** SETS RS FLIP-FLOP 2404 TO GENERATE $h_4$

*** SETS RF FLIP-FLOPS 2404 AND 2407 TO GENERATE $h_3$ AND $h_4$ ( ONCE EACH 16 COUNT CYCLE)

Counter

Fuel Pulse Control

Power Control Circuit
3001
I
J
S1
RELAY DRIVER & RELAY
(Fig - 7A)
TO FUEL PUMP
S10
J'
3002
3X OR 4X
EGR VALVE DRIVER
(Fig-7B)
X30
TO EGR SOLENDID VALVE
3003
S2
S3
INJECTOR DRIVER CIRCUIT #1
(Fig -7C)
S20, S30
TO FUEL INJECTOR (S)
3007
S4
S5
INJECTOR DRIVER CIRCUIT #2
TO FUEL INJECTORS
S40, S50
3004
3005
TU1
POWER AMPLIFIER
(Fig -7D)
a11
IGNITION COIL DRIVER
(Fig -7E)
TU10
TO IGNITION COIL
+ CAR
BATTERY
3006
REGULATOR
+5V
TO ALL CIRCUITS 10-60
+9.5V Relay Driver & Relay EGR Valve Driver Injector Driver Circuit Fig-7C1
Voltage To Current Converter
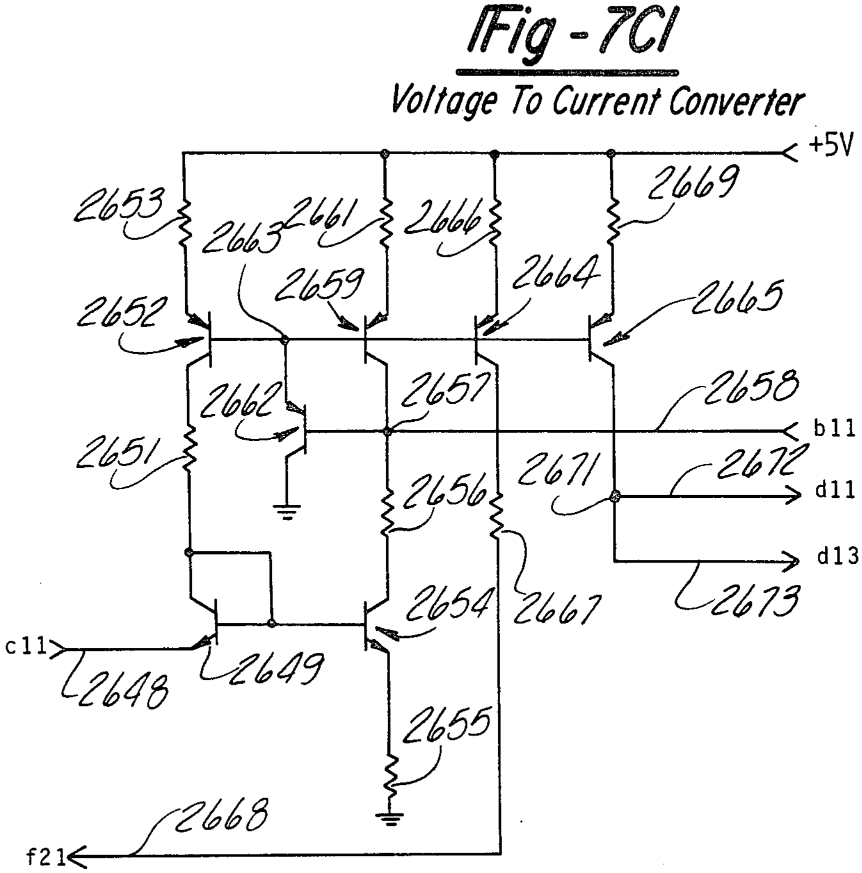
Fig-7C2
Precision Current Sinks
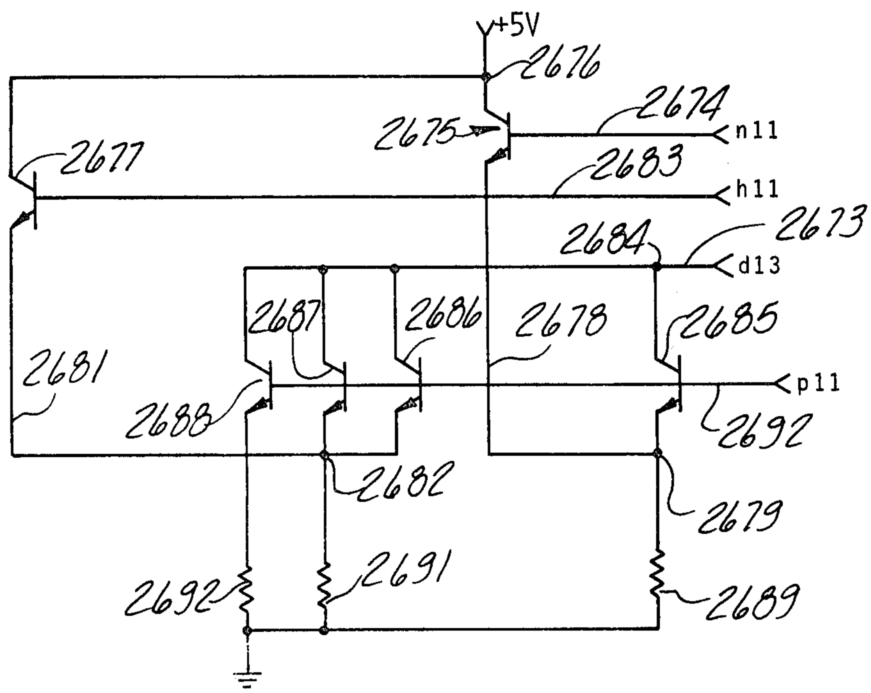

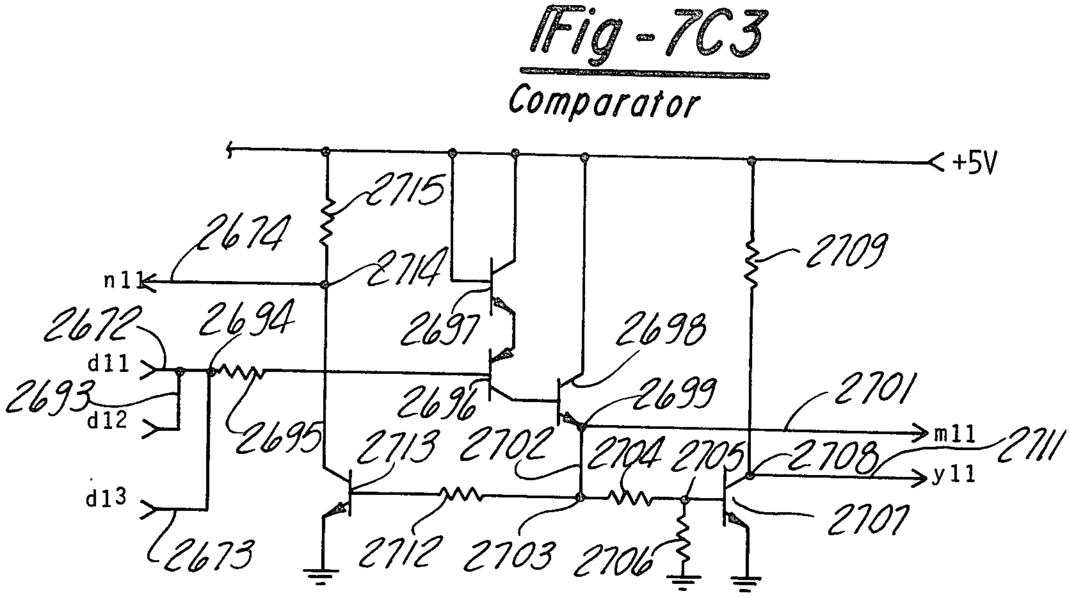
Fig-7C3
Comparator
+5V
n11
d11
d12
d13
m11
y11
2715
2674
2714
2709
2672
2694
2697
2698
2693
2696
2699
2701
2695
2713
2702
2704
2705
2708
2711
2707
2673
2712
2703
2706
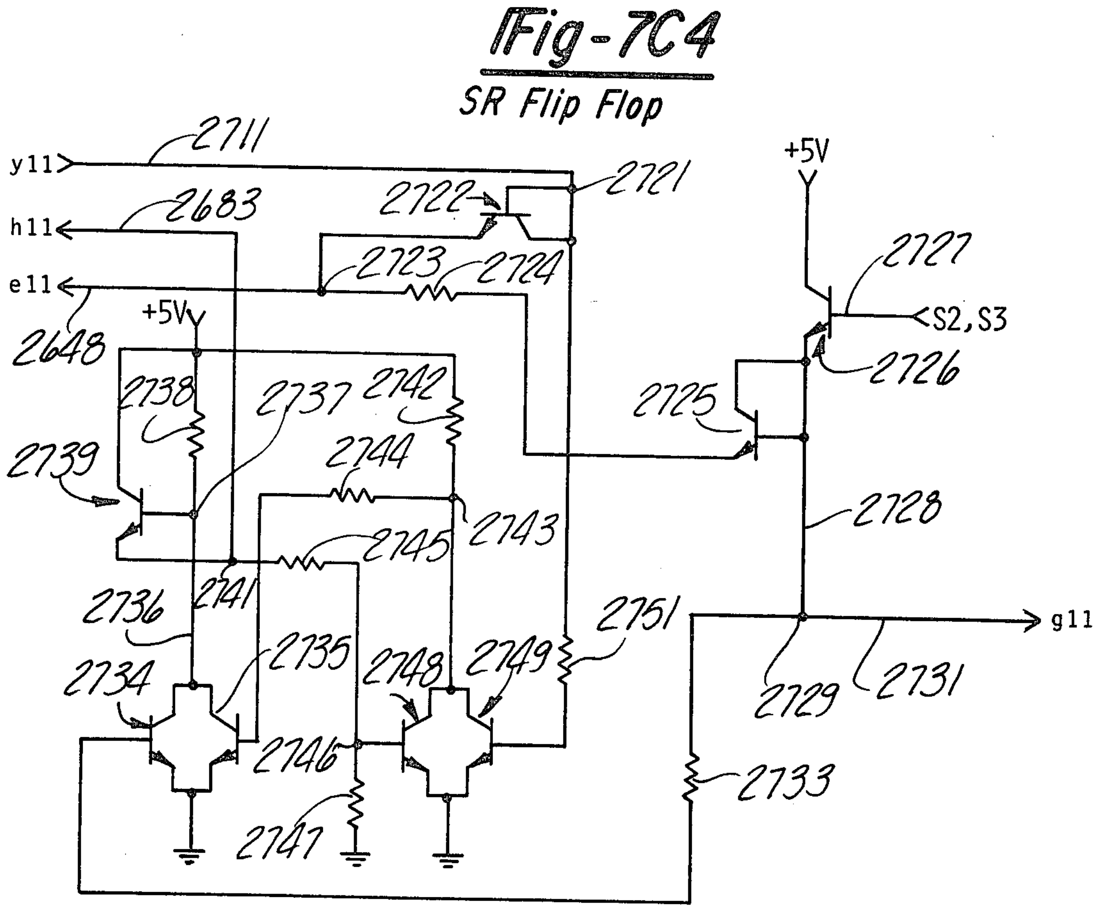
Fig-7C4
SR Flip Flop
y11
h11
e11
+5V
+5V
S2,S3
g11
2711
2683
2722
2721
2723
2724
2727
2648
2726
2738
2737
2742
2725
2739
2744
2743
2728
2745
2736
2741
2751
2734
2735
2748
2749
2729
2731
2746
2733
2747

Fig-7C5
Injector Clamp Control
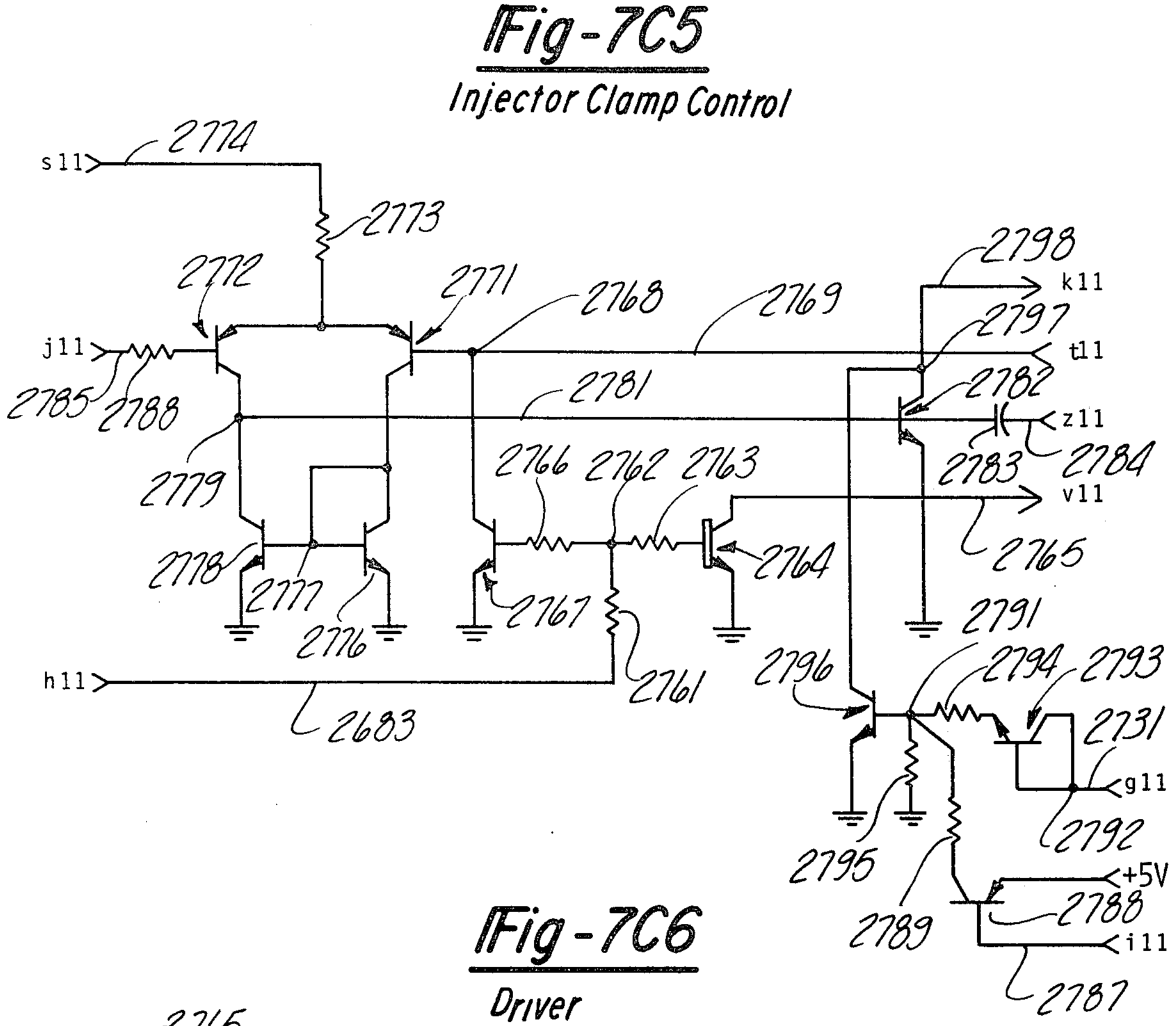
Fig-7C6
Driver
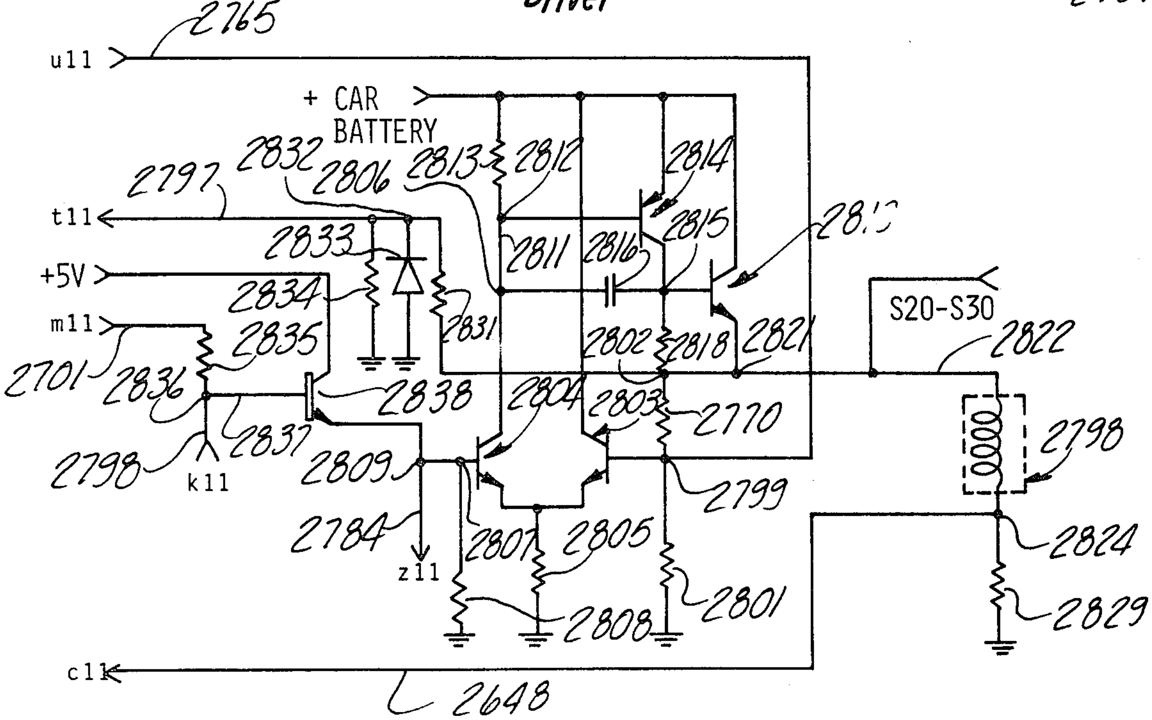

Fig - 7C7
Sense Resistor Short Protection
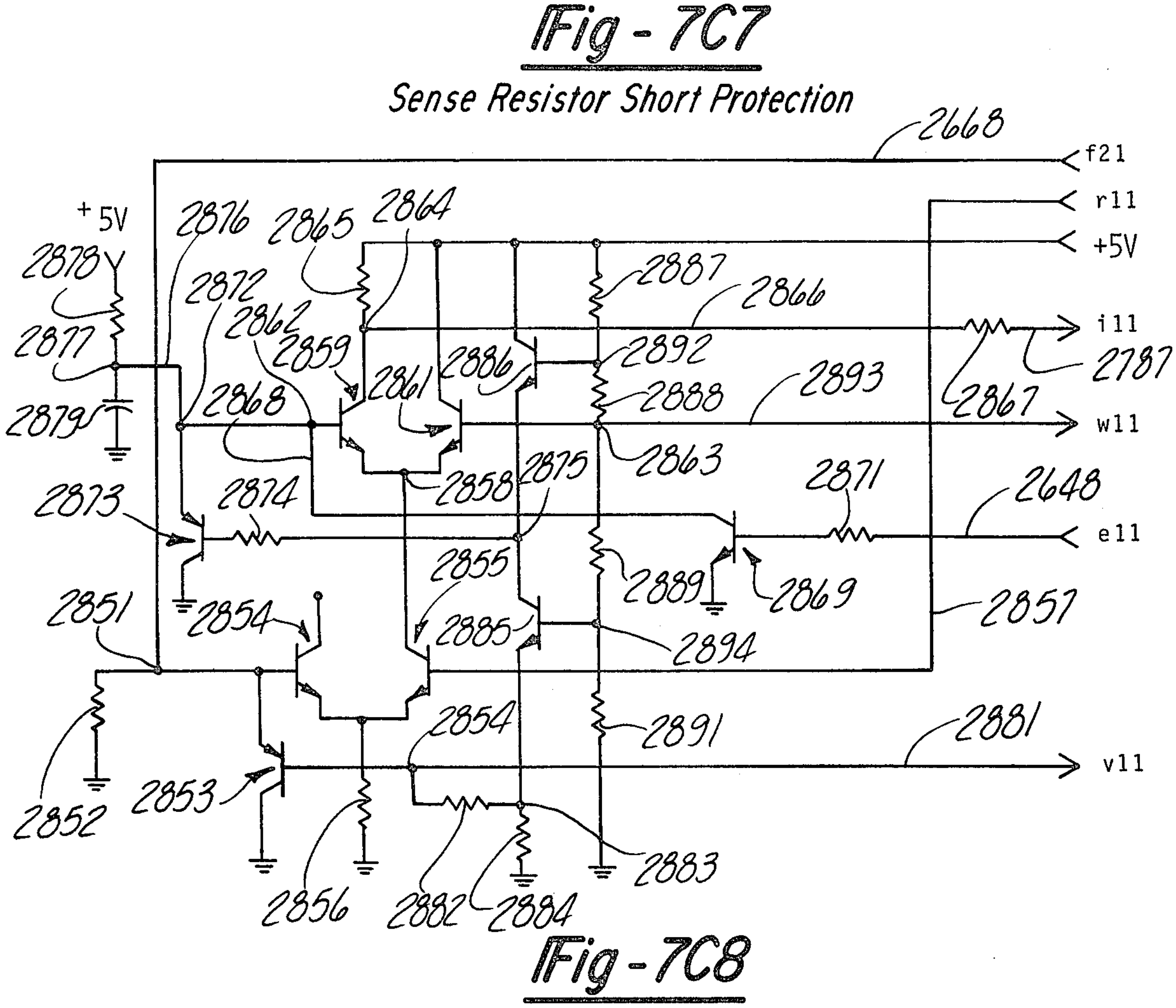
Fig - 7C8
Injector Short Protection
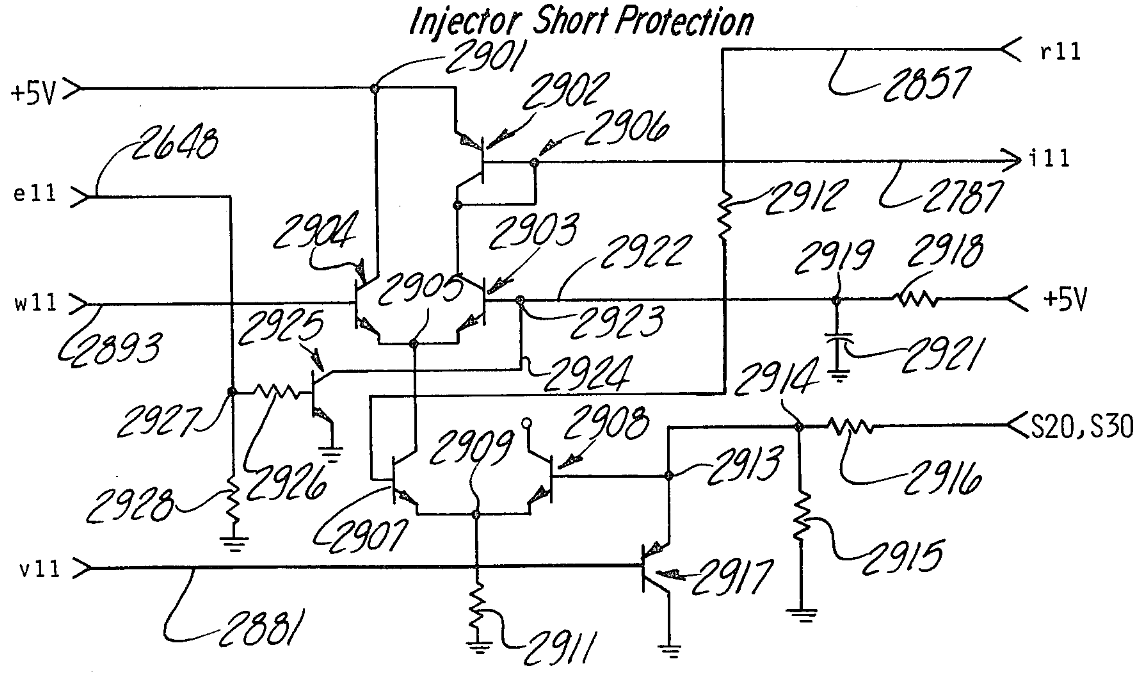

Fig - 7C9
Bias
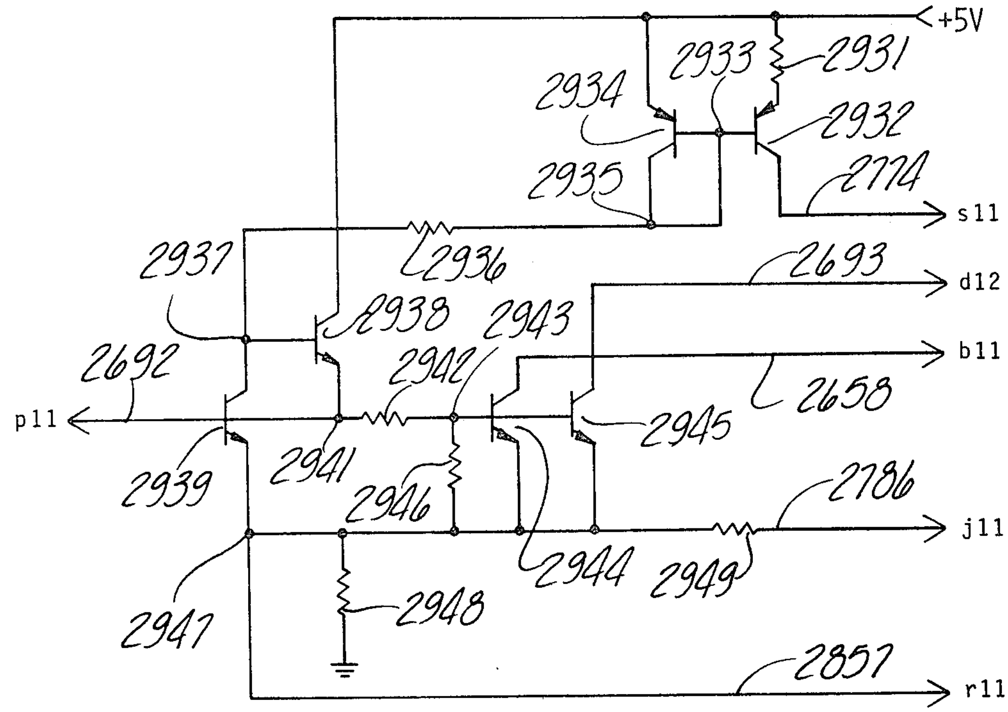
Fig - 7C10
Injector Current Control
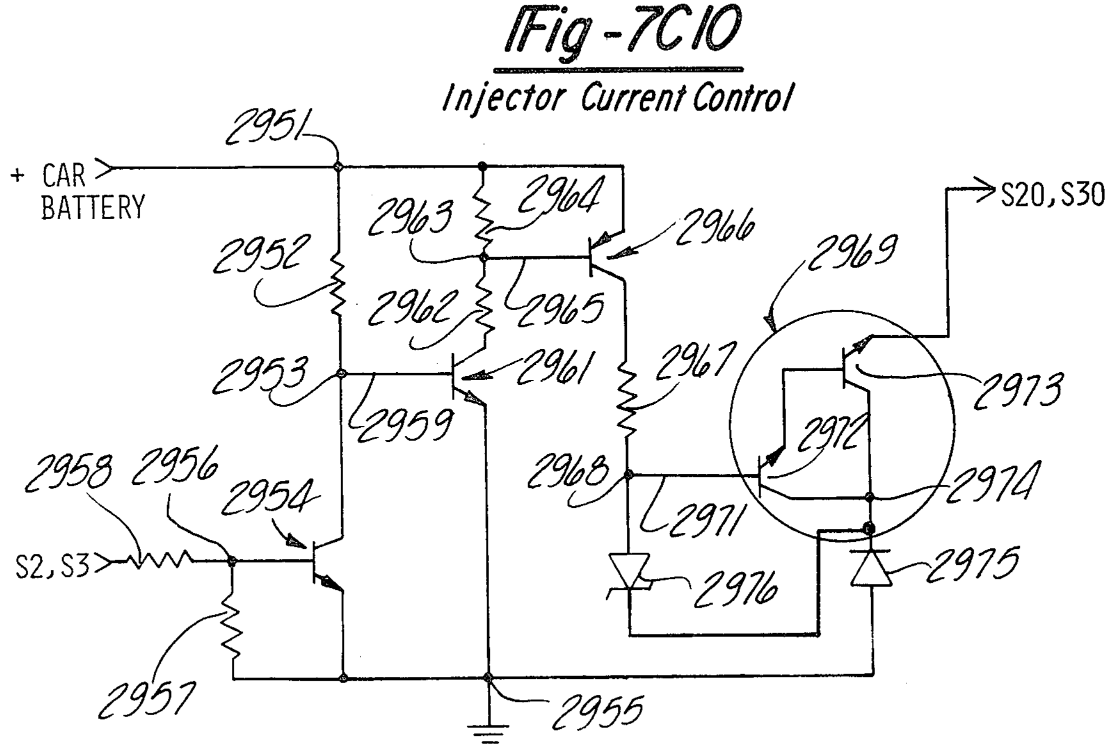

Power Amplifier & Ignition Coil Driver

Voltage Regulator + 5 Volt Section

Voltage Regulator + 9.5 Volt Section

Fuel Management Control Limp Home Circuit

Ignition Limp Home Circuit

Master Clock Oscillator

Fig-9
READ ONLY MEMORY NOTATION
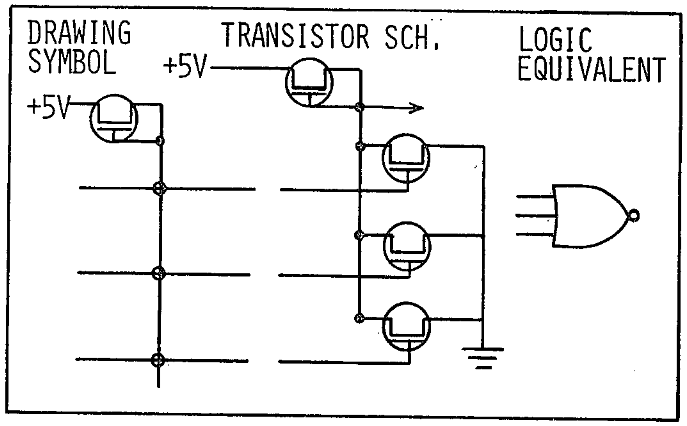
Fig-9.1A
INVERTER
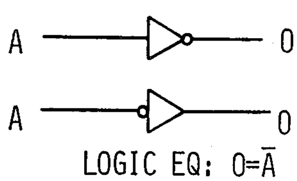
LOGIC EQ: $0=\overline{A}$
Fig-9.1B
INVERTER
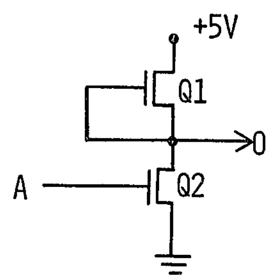
Fig-9.2A
2 INPUT NOR CIRCUIT
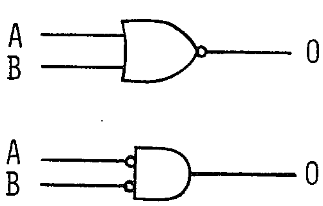
LOGIC EQ: $0 = \overline{A+B} = \overline{A}\cdot\overline{B}$
Fig-9.2B
2 INPUT NOR CIRCUIT
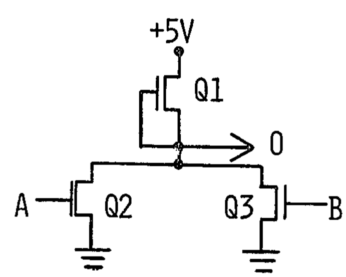

Fig-9.3A
3 INPUT NOR
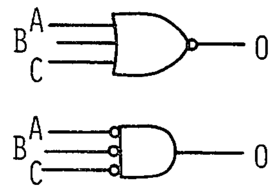
LOGIC EQ: $0 = \overline{A+B+C} = \bar{A}\bullet\bar{B}\bullet\bar{C}$
Fig-9.3B
3 INPUT NOR
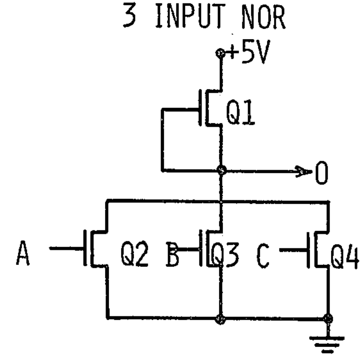
Fig-9.4A
4 INPUT NOR
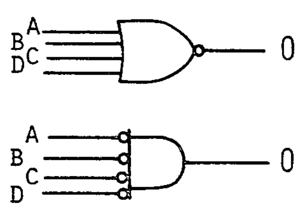
LOGIC EQ: $0 = \overline{A+B+C+D} = \bar{A}\cdot\bar{B}\cdot\bar{C}\cdot\bar{D}$
Fig-9.4B
4 INPUT NOR
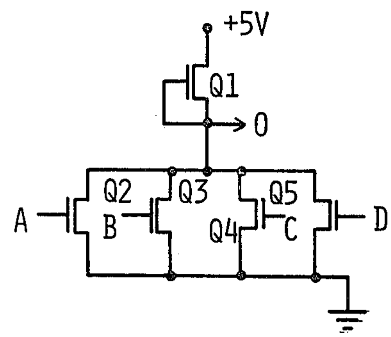
Fig-9.5A
5 INPUT NOR
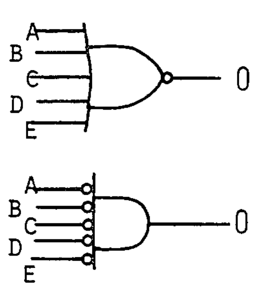
LOGIC EQ: $0 = \overline{A+B+C+D+E} = \bar{A}\cdot\bar{B}\cdot\bar{C}\cdot\bar{D}\cdot\bar{E}$
Fig-9.5B
5 INPUT NOR
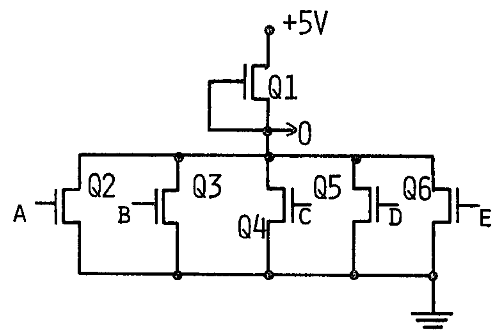

Fig-9.6A
6 INPUT NOR
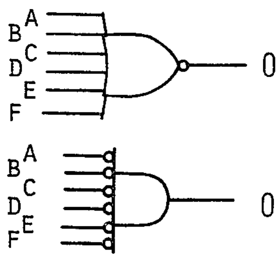
LOGIC EQ: $0 = \overline{A+B+C+D+E+F} = \bar{A}\ \bar{B}\ \bar{C}\ \bar{D}\ \bar{E}\ \bar{F}$
Fig-9.6B
6 INPUT NOR
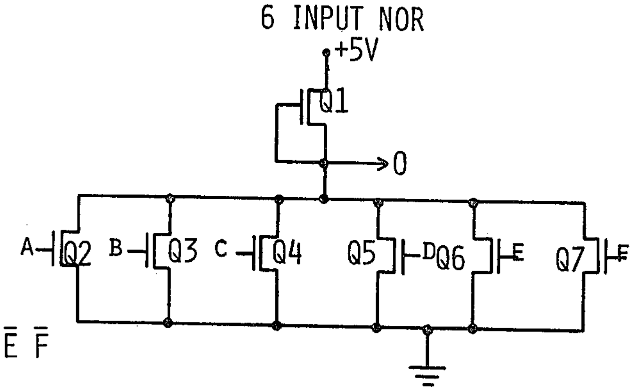
Fig-9.7A
2 INPUT NAND
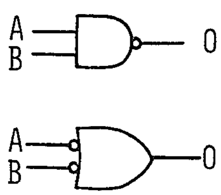
LOGIC EQ: $0 = \overline{A \cdot B} = \bar{A}+\bar{B}$
Fig-9.7B
2 INPUT NAND
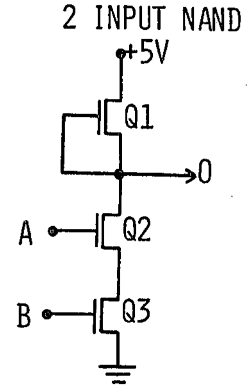
Fig-9.8A
3 INPUT NAND
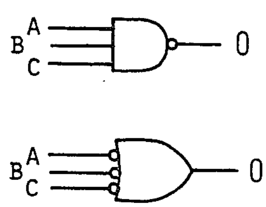
LOGIC EQ: $0 = \overline{A \cdot B \cdot C} = \bar{A}+\bar{B}+\bar{C}$
Fig-9.8B
3 INPUT NAND
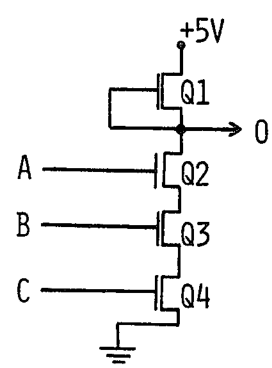

Fig-9.9A

2 INPUT AND/3 INPUT NOR

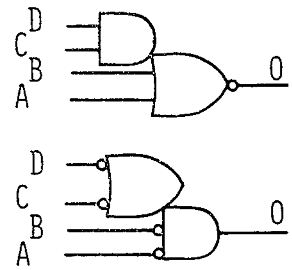

LOGIC EQ: $0 = \overline{A+B+CD} = \bar{A}\cdot\bar{B}\cdot(\bar{C}+\bar{D})$

Fig-9.9B

2 INPUT AND/3 INPUT NOR

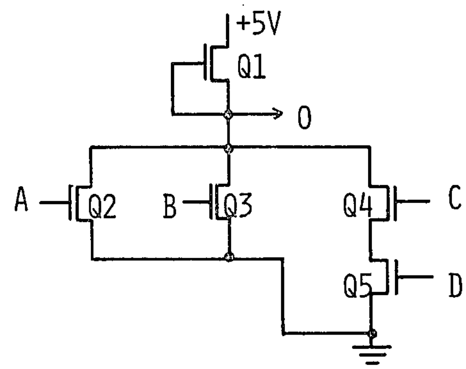

Fig-9.10A

3 AND/3 NOR GATE

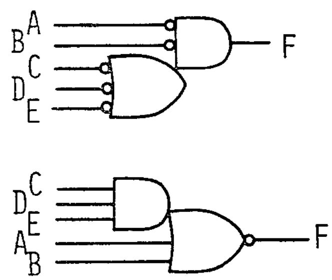

LOGIC EQ: $F = \bar{A}\cdot\bar{B}\cdot(\overline{\bar{C}+\bar{D}+\bar{E}}) = A+B+\overline{CDE}$

Fig-9.10B

3 AND/3 NOR GATE'

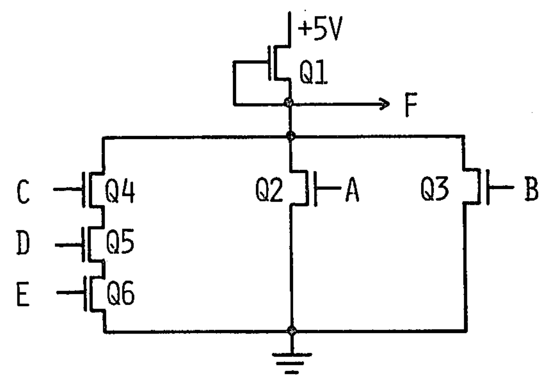

Fig-9.11A

3 INPUT AND, 2 INPUT
AND/2 INPUT NOR

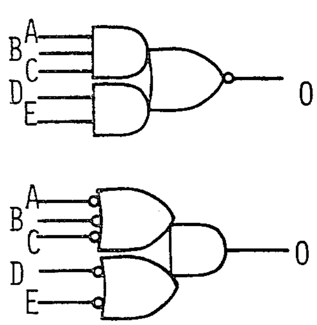

LOGIC EQ: $\overline{ABC+DE} = (\bar{A}+\bar{B}+\bar{C})\ (\bar{D}+\bar{E})$

Fig-9.11B

3 INPUT AND, 2 INPUT
AND/2 INPUT NOR

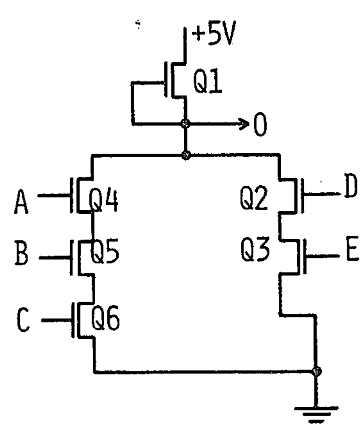

Fig-9.12A
DUAL 2 INPUT AND/
2 INPUT NOR
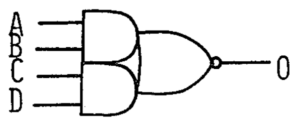
LOGIC EQ: $0 = \overline{AB+CD}$
Fig-9.12B
DUAL 2 INPUT AND/
2 INPUT NOR
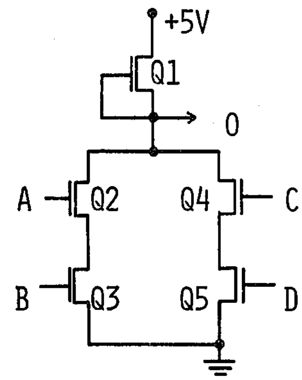
Fig-9.13A
2 INPUT AND/2 INPUT
OR/2 INPUT NAND
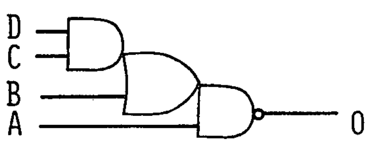
LOGIC EQ: $0 = \overline{A\,(B+CD)}$
Fig-9.13B
2 INPUT AND/2 INPUT
OR/2 INPUT NAND
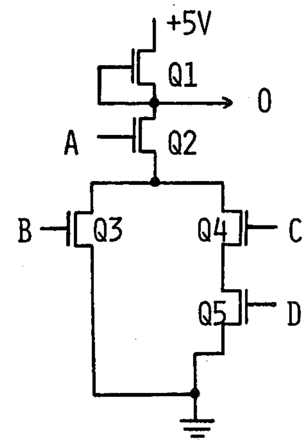
Fig-9.14A
2 INPUT AND/2 INPUT NOR
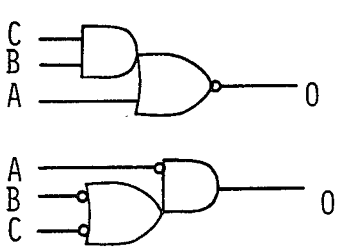
LOGIC EQ: $0 = \overline{A+BC} = \overline{A}\,(\overline{B}+\overline{C})$
Fig-9.14B
2 INPUT AND/2 INPUT NOR
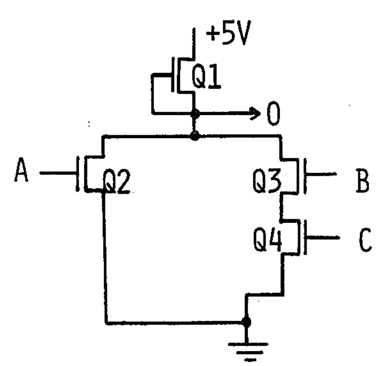

Fig-9.15A

2 INPUT OR (2 INPUT AND), 3 INPUT AND/2 INPUT NOR

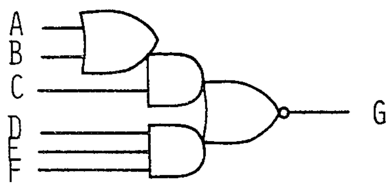

LOGIC EQ: $G = \overline{(A+B)\ C+D\cdot E\cdot F}$

Fig-9.15B

2 INPUT OR (2 INPUT AND), 3 INPUT AND/2 INPUT NOR

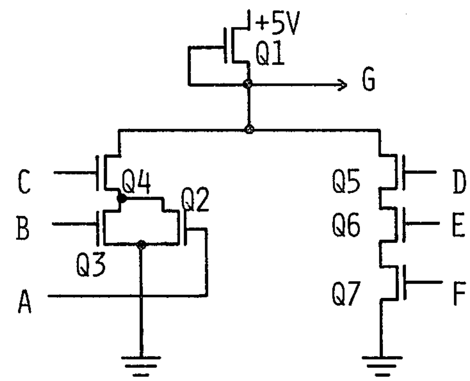

Fig-9.16A

2 INPUT OR/2 INPUT NAND

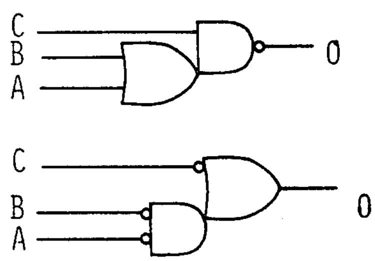

LOGIC EQ: $O = \overline{(A+B)\cdot C} = \overline{A}\cdot\overline{B}+\overline{C}$

Fig-9.16B

2 INPUT OR/2 INPUT NAND

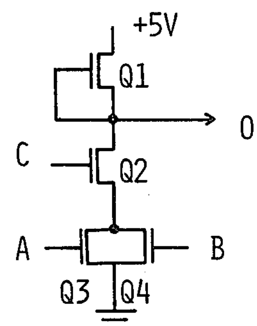

Fig-9.17A

DUAL 2 INPUT OR/2 INPUT NAND

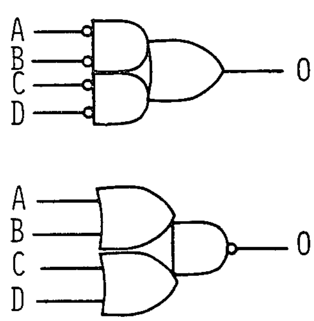

LOGIC EQ: $O = \overline{(A+B)\ (C+D)} = \overline{A}\,\overline{B}+\overline{C}\,\overline{D}$

Fig-9.17B

DUAL 2 INPUT OR/2 INPUT NAND

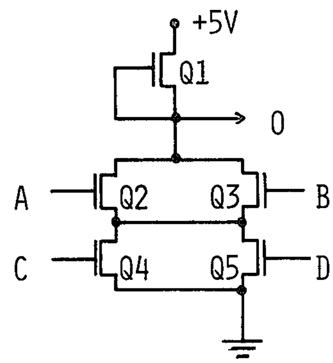

Fig-9.18A
3 INPUT NOR, 2 INPUT NOR/
2 INPUT AND
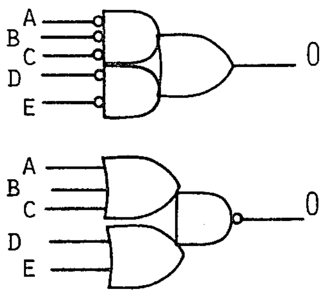
LOGIC EQ: $O = \bar{A}\cdot\bar{B}\cdot\bar{C}+\bar{D}\cdot\bar{E} = \overline{(A+B+C)\ (D+E)}$
Fig-9.18B
3 INPUT NOR, 2 INPUT NOR/
2 INPUT AND
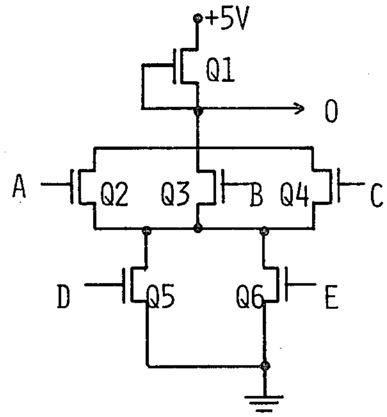
Fig-9.19A
2 INPUT AND (2 INPUT OR),
DUAL 2 INPUT AND/2 INPUT NOR
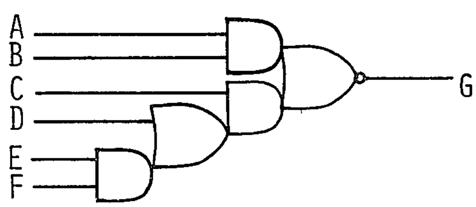
LOGIC EQ: $G = \overline{A\cdot B+C\ (D+E\cdot F)}$
Fig-9.19B
2 INPUT AND (2 INPUT OR),
DUAL 2 INPUT AND/2 INPUT NOR
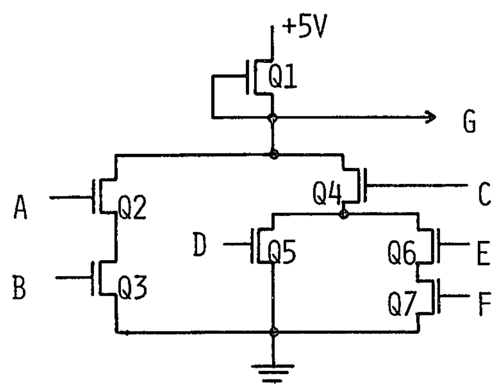
Fig-9.20A
S,R CLOCKED FLIP FLOP
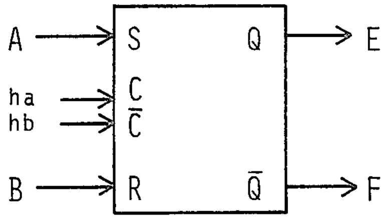
Fig-9.20B
S,R CLOCKED FLIP FLOP
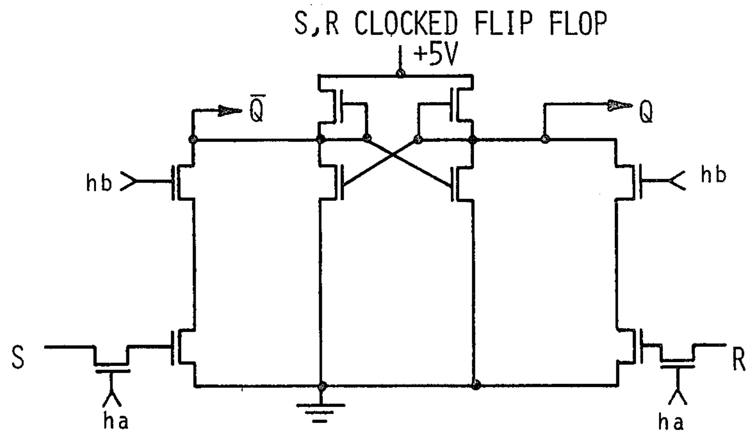

Fig-9.21A
S,R,DR, CLOCKED FLIP FLOP
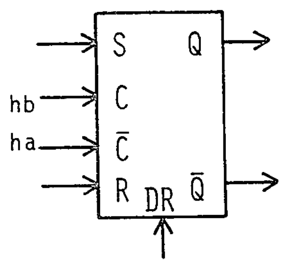
Fig-9.21B
S,R,DR, CLOCKED FLIP FLOP
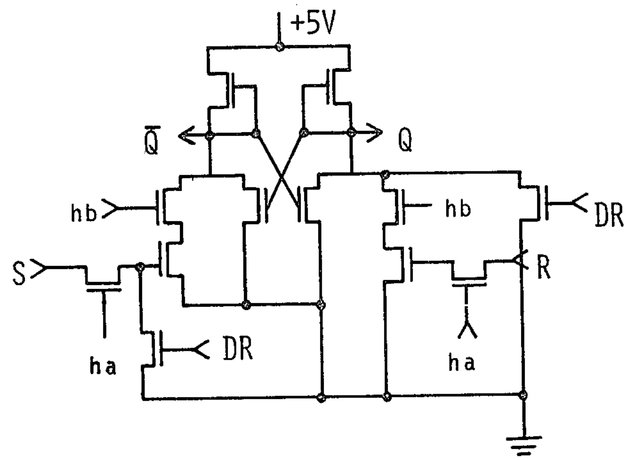
Fig-9.22A
2 PHASE DYNAMIC FLIP FLOP
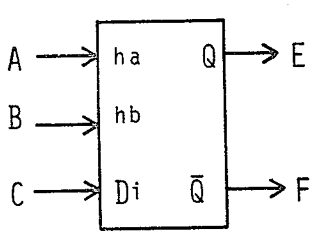
Fig-9.22B
2 PHASE DYNAMIC FLIP FLOP
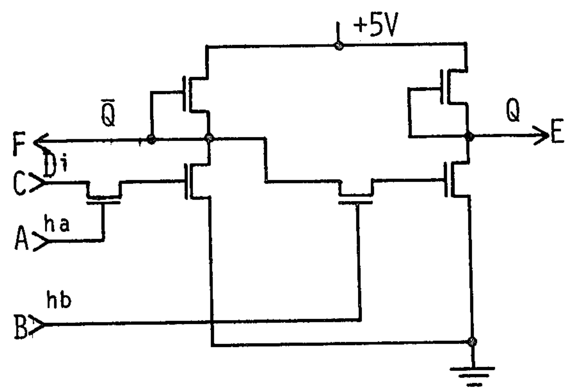
Fig-9.23A
D FLIP FLOP
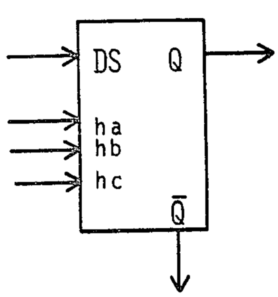
Fig-9.23B
D FLIP FLOP
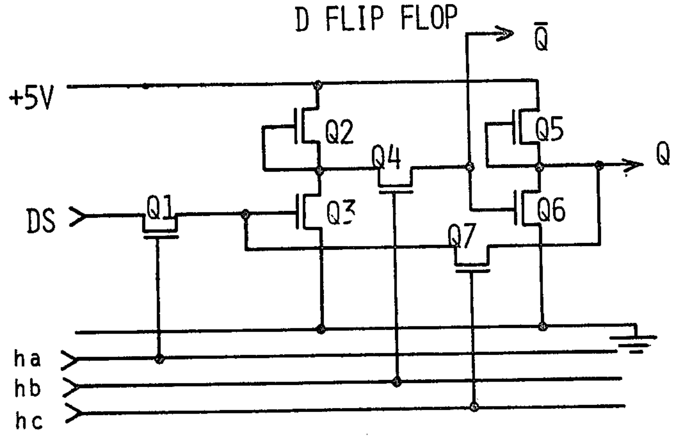

Fig-9.24A
2 PHASE DYNAMIC DS, DR, FLIP FLOP
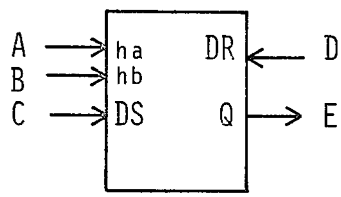
Fig-9.24B
2 PHASE DYNAMIC DS, DR, FLIP FLOP
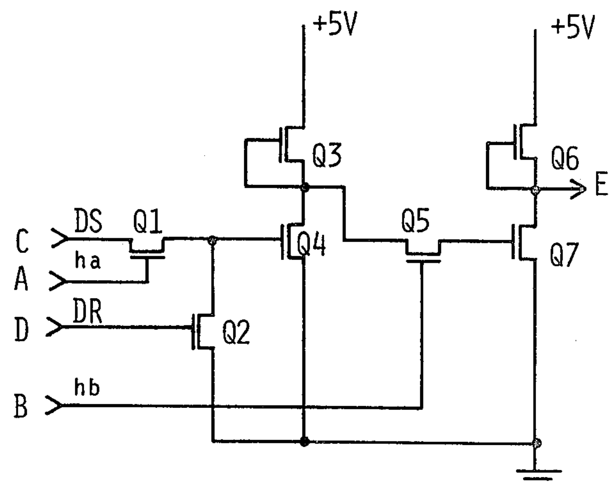
Fig-9.25A
STATIC SHIFT REGISTER STAGE
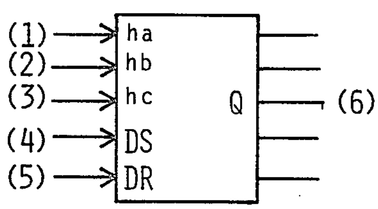
Fig-9.25B
STATIC SHIFT REGISTER STAGE
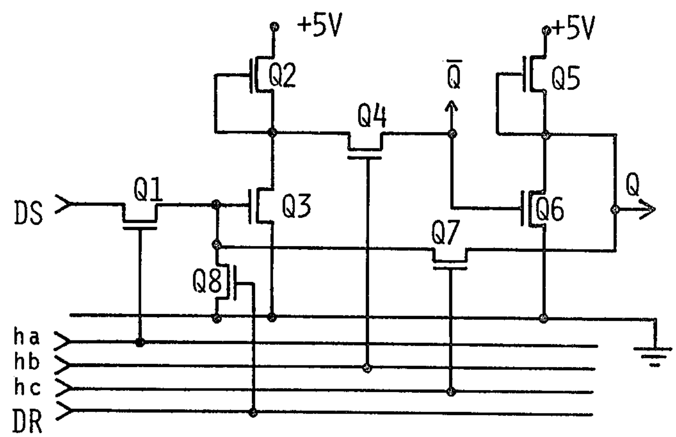
Fig-9.26A
STATIC SHIFT REGISTER STAGE WITH PRESET
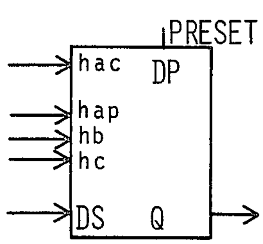
Fig-9.26B
STATIC SHIFT REGISTER STAGE WITH PRESET
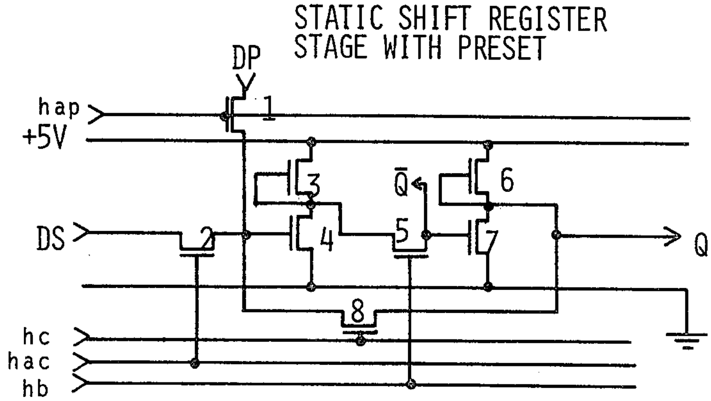

Fig-9.27A
DYNAMIC SHIFT REGISTER STAGE WITH PRESET
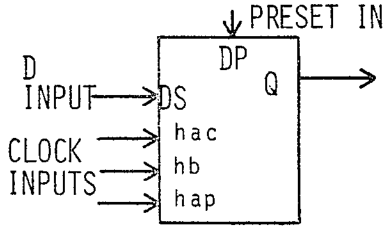
Fig-9.27B
DYNAMIC SHIFT REGISTER STAGE WITH PRESET
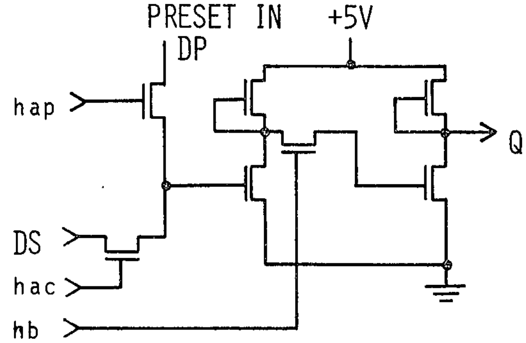
Fig-9.28A
2 PHASE DYNAMIC FLIP FLOP WITH DR AND DS INPUTS
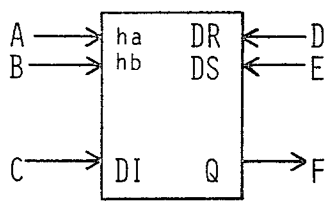
Fig-9.28B
2 PHASE DYNAMIC FLIP FLOP WITH DR AND DS INPUTS
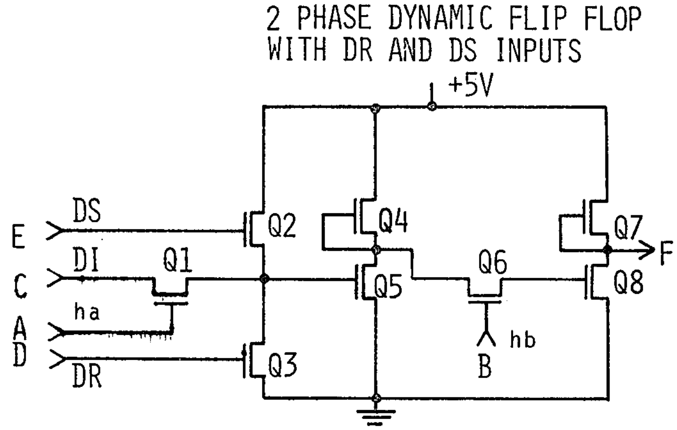
Fig-9.29A
HALF ADDER
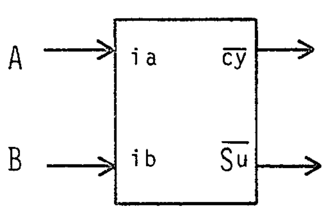
Fig-9.29B
HALF ADDER
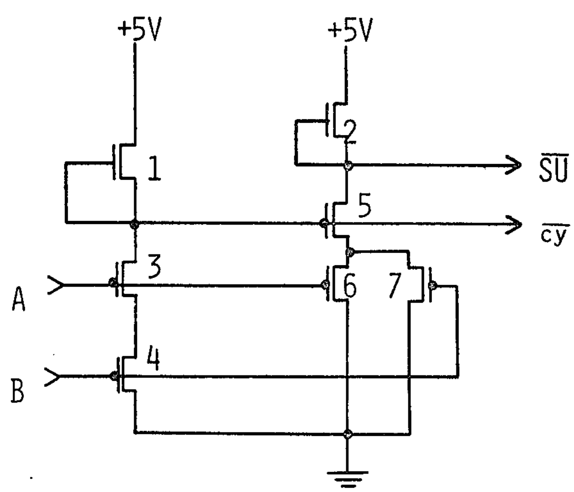

Fig-9.30A
COMPARATOR CIRCUIT
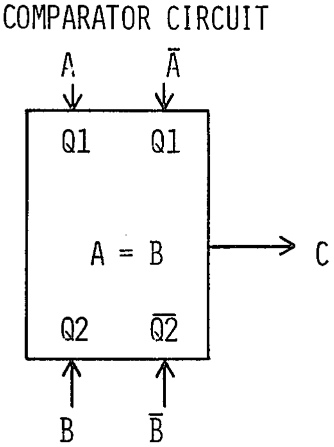
LOGIC EQ: $A\cdot\overline{B}+\overline{A}\cdot B = C$
Fig-9.30B
COMPARATOR CIRCUIT
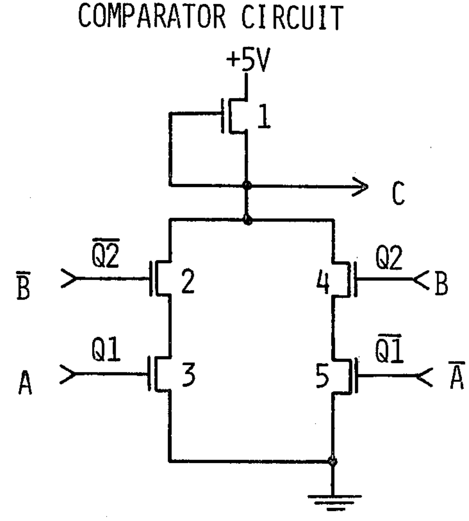

SOFTWARE BLOCK DIAGRAM

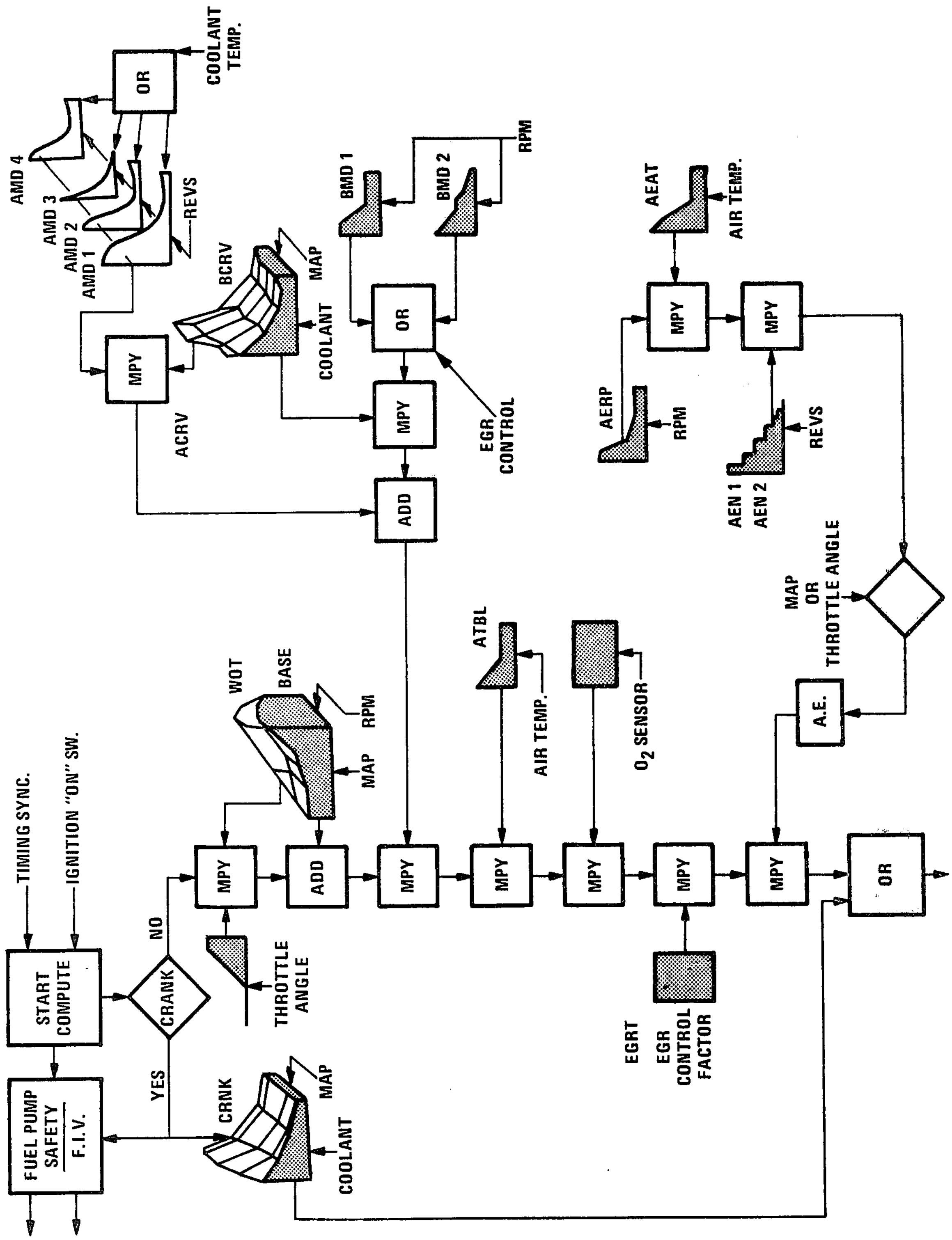
IFig-10.1
FUEL CONTROL LAW

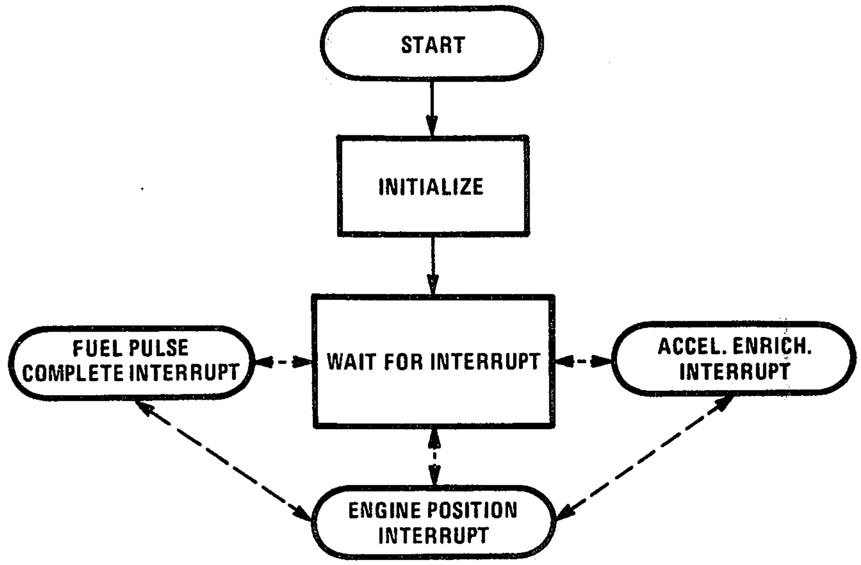
Fig-10.2
BASIC SOFTWARE STRUCTURE

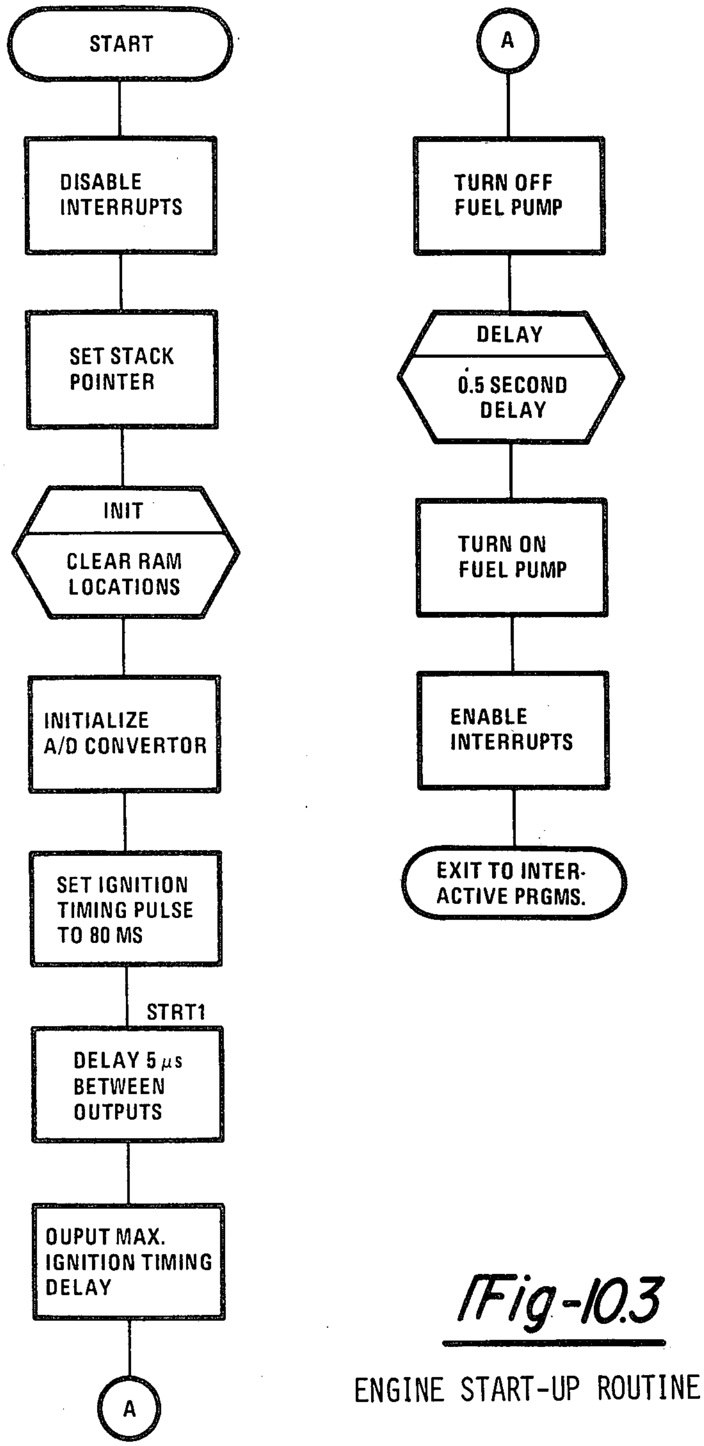
FIG-10.3
ENGINE START-UP ROUTINE

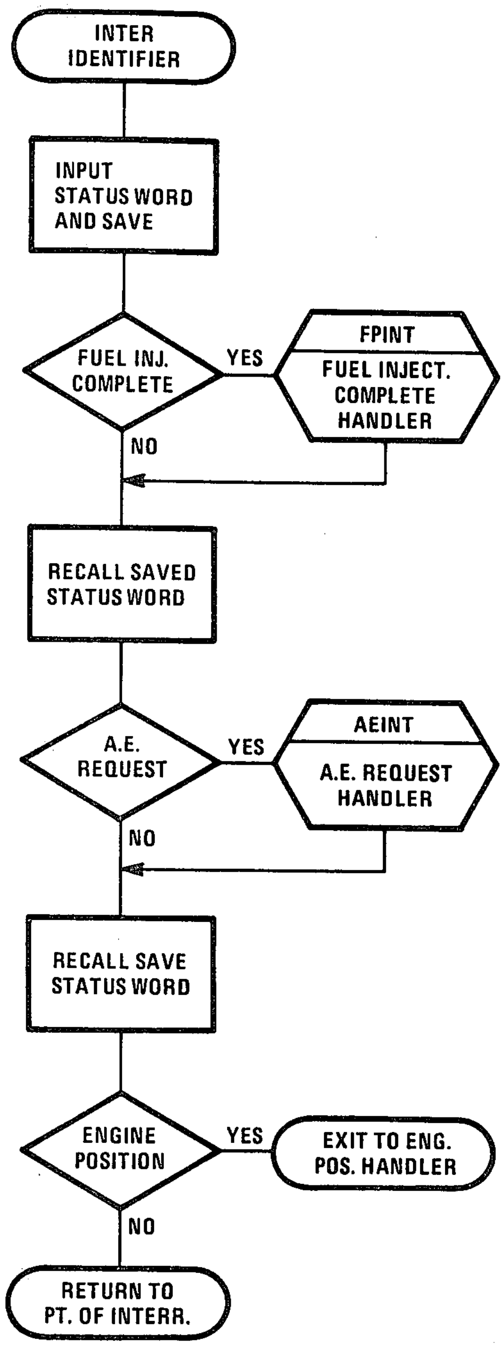
Fig-10.4
INTERRUPT HANDLING ROUTINE

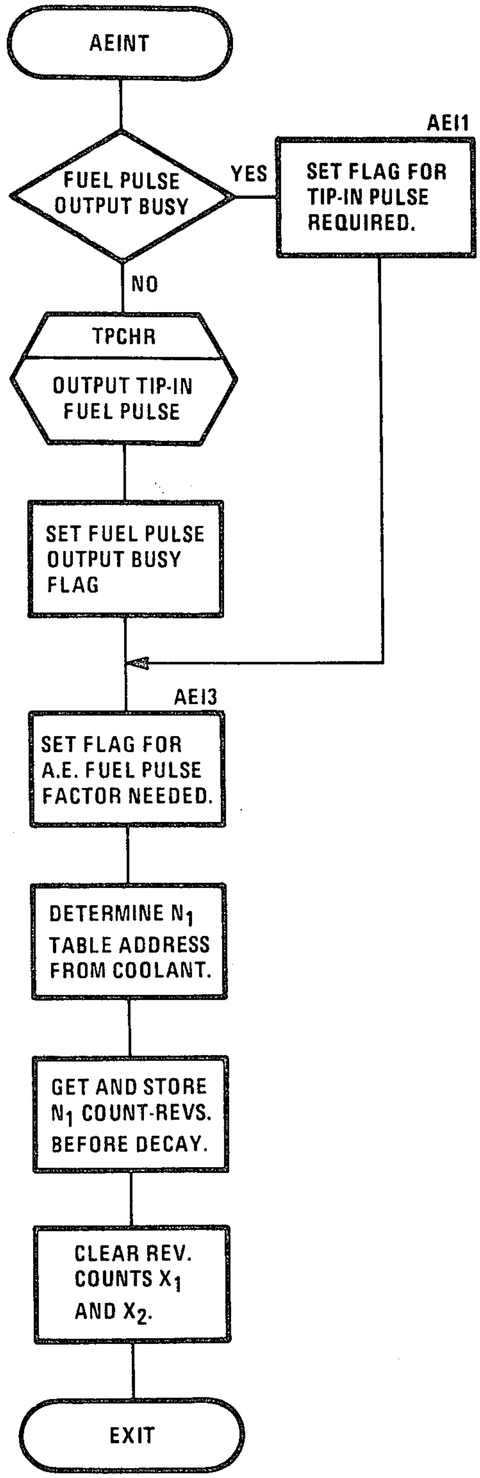
Fig-10.5
A.E. INTERRUPT HANDLER

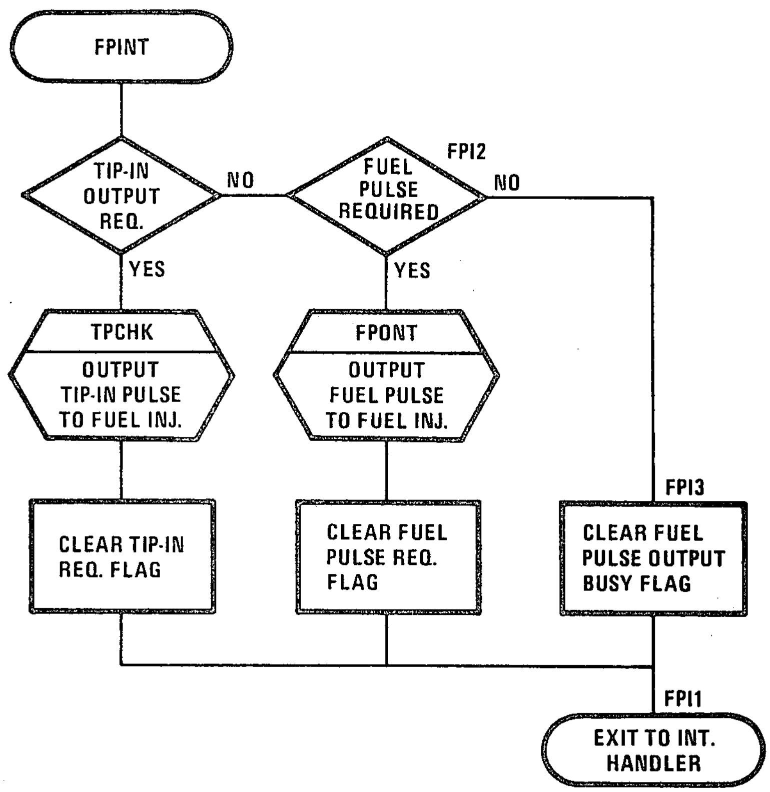
Fig-10.6
FUEL PULSE INTERRUPT HANDLER

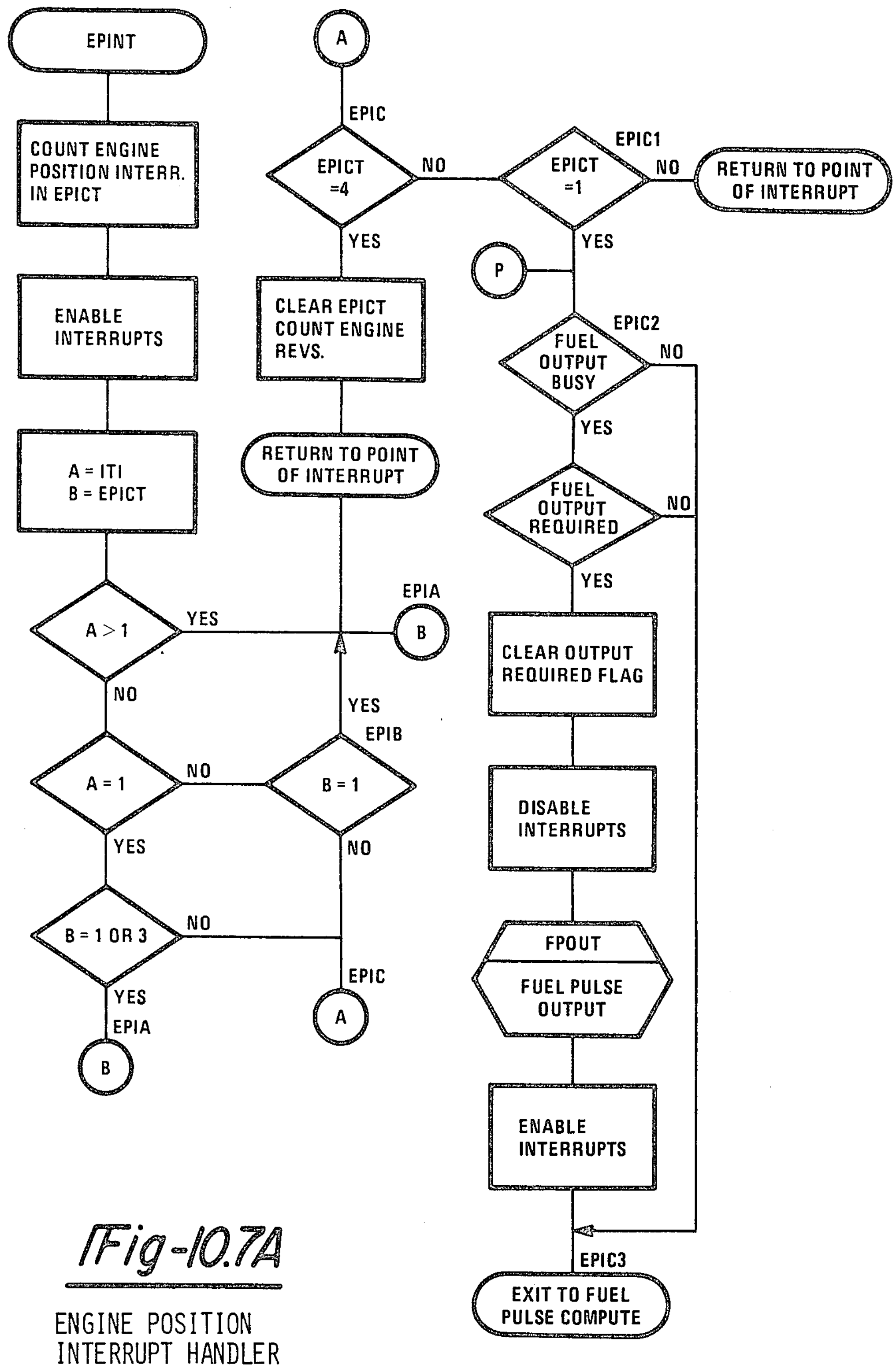
Fig-10.7A
ENGINE POSITION INTERRUPT HANDLER

ENGINE POSITION INTERRUPT HANDLER (CONT.)

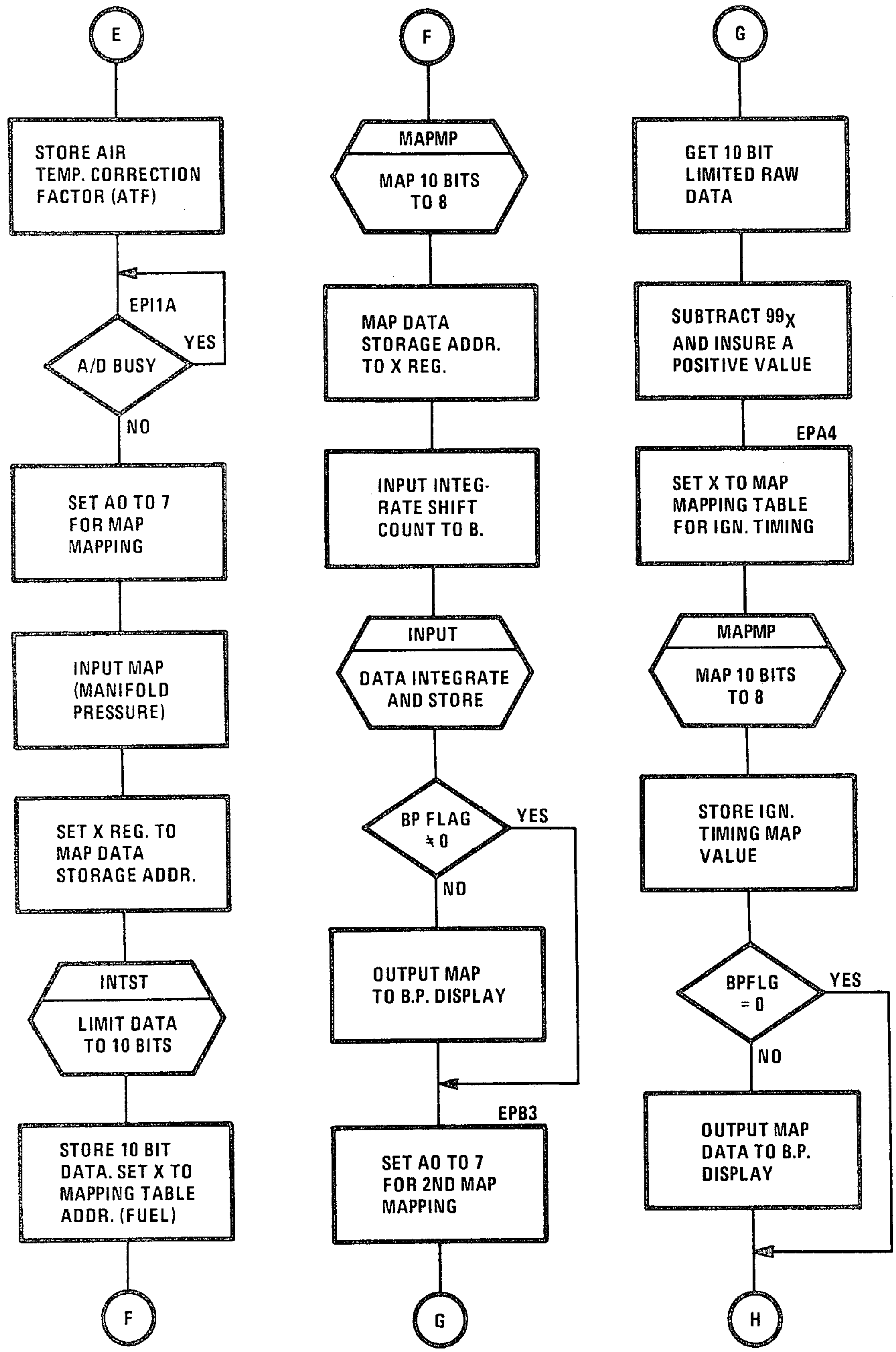
Fig-10.7C
ENGINE POSITION INTERRUPT HANDLER (CONT.)

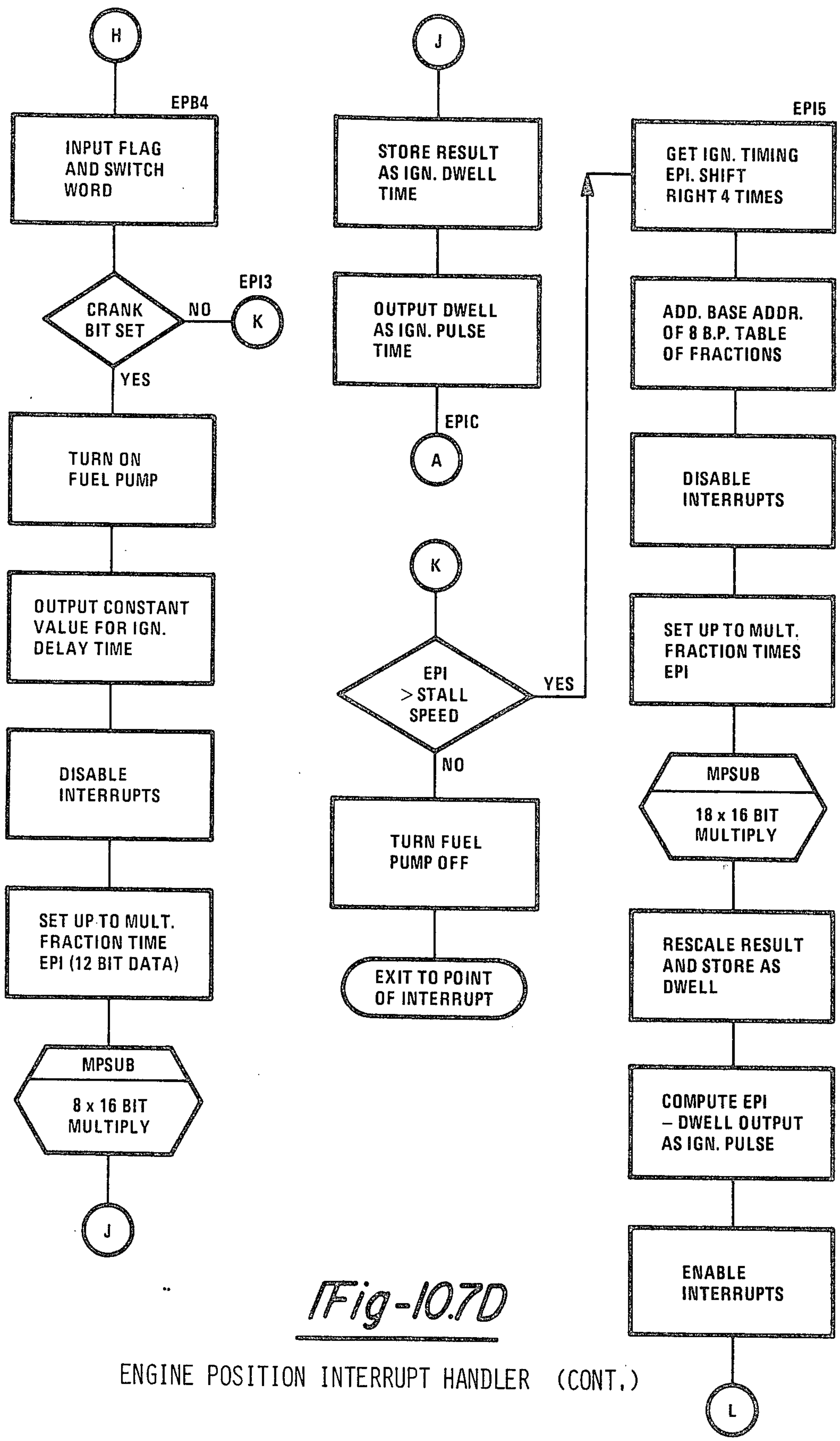
Fig-10.7D
ENGINE POSITION INTERRUPT HANDLER (CONT.)

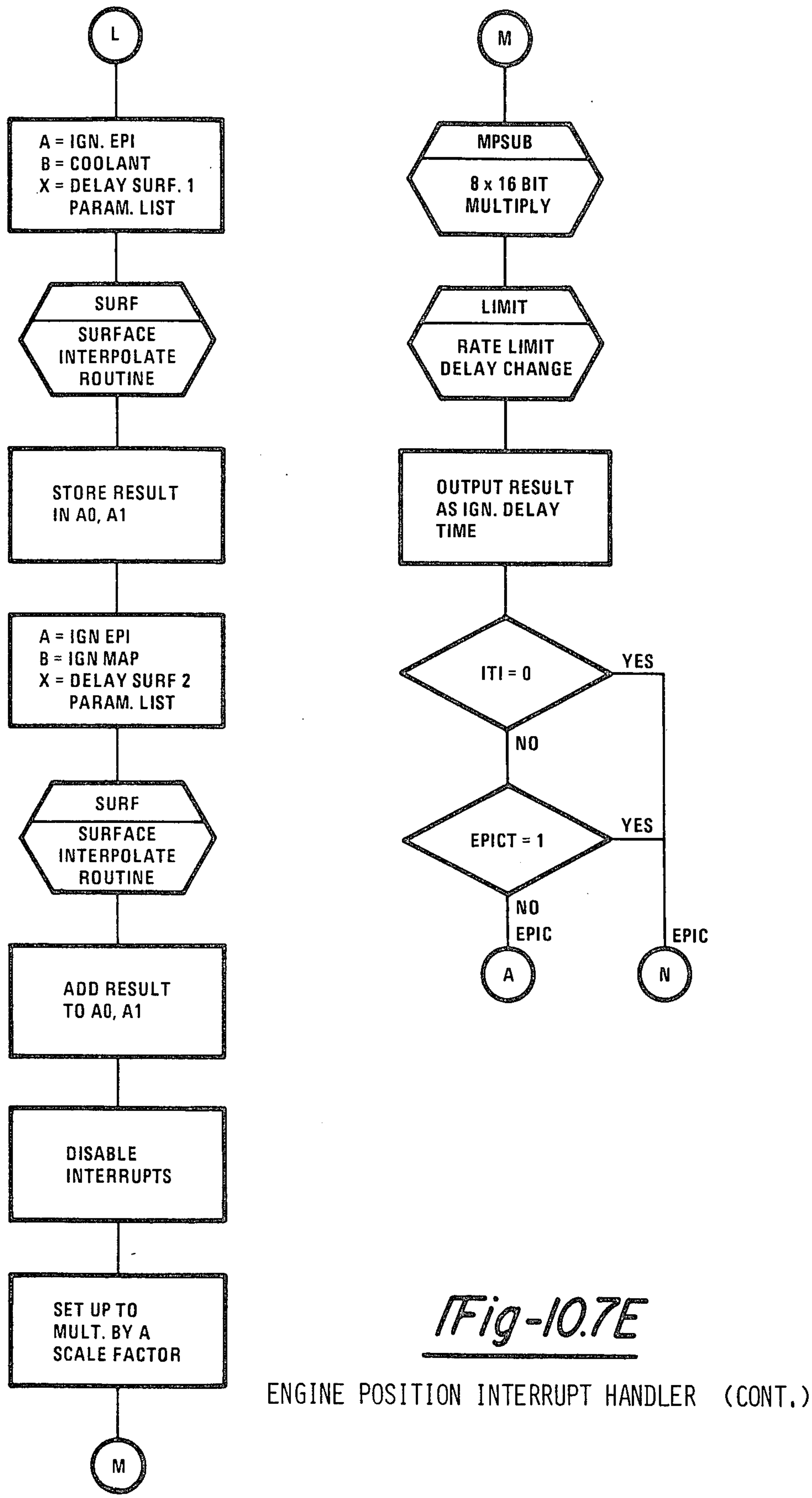
Fig-10.7E
ENGINE POSITION INTERRUPT HANDLER (CONT.)

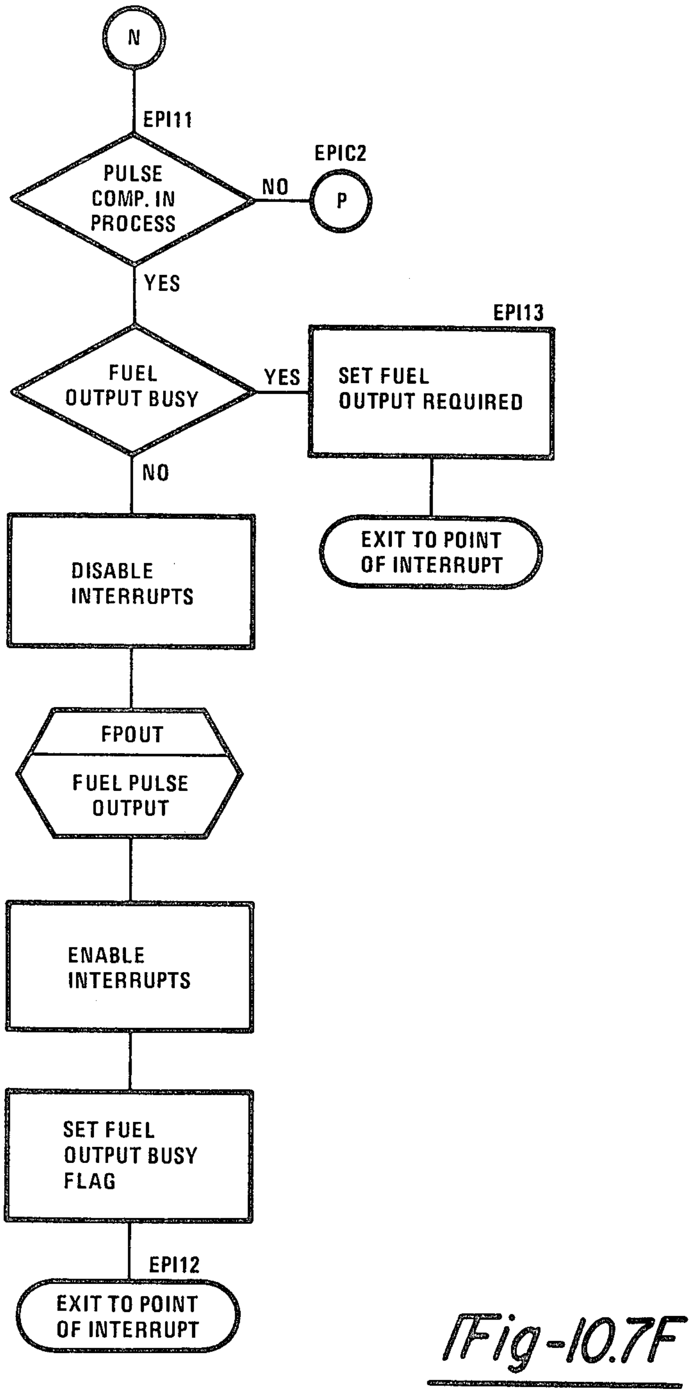
Fig-10.7F
ENGINE POSITION INTERRUPT HANDLER (CONT.)

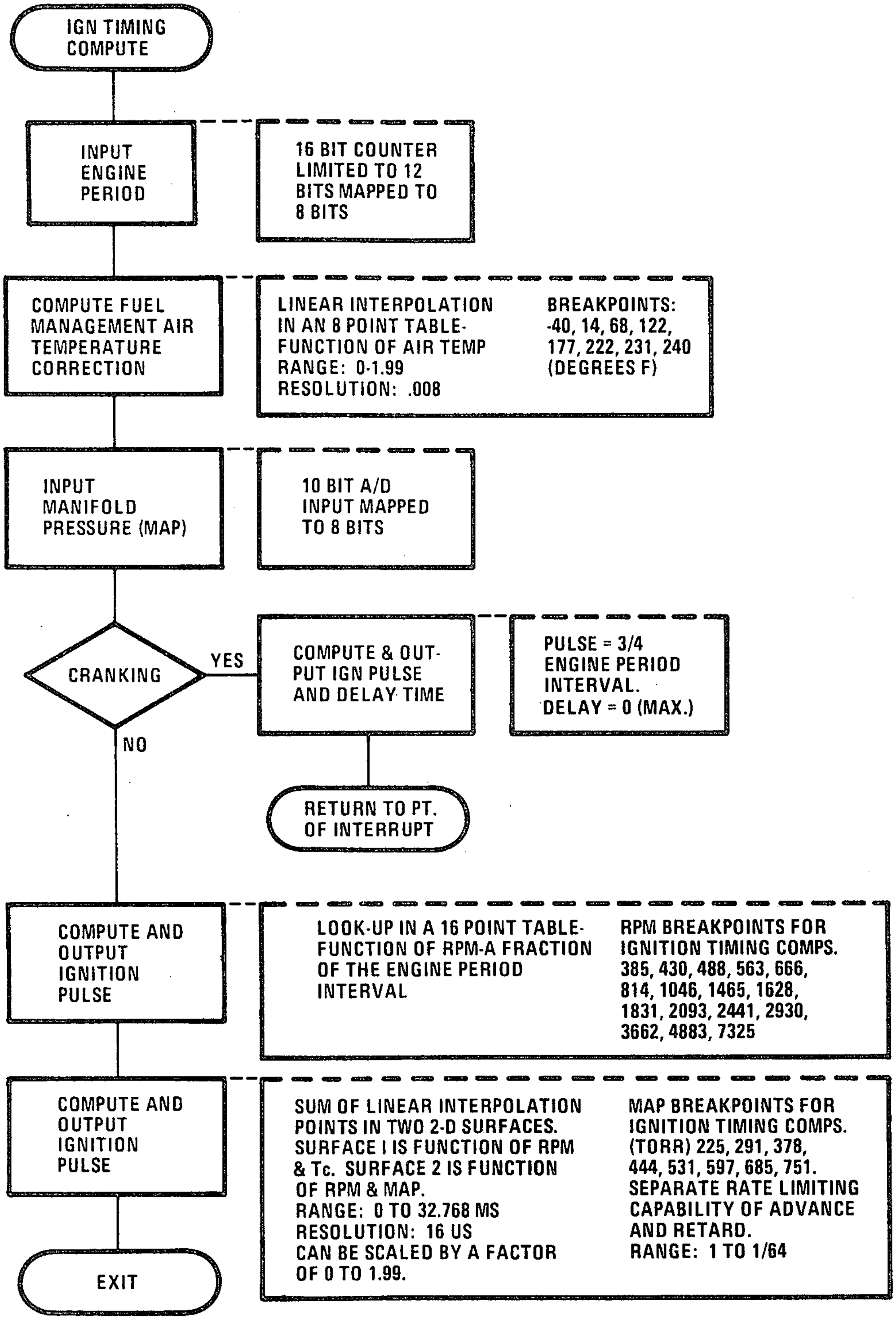
Fig-10.8
IGNITION TIMING COMPUTATION ROUTINE

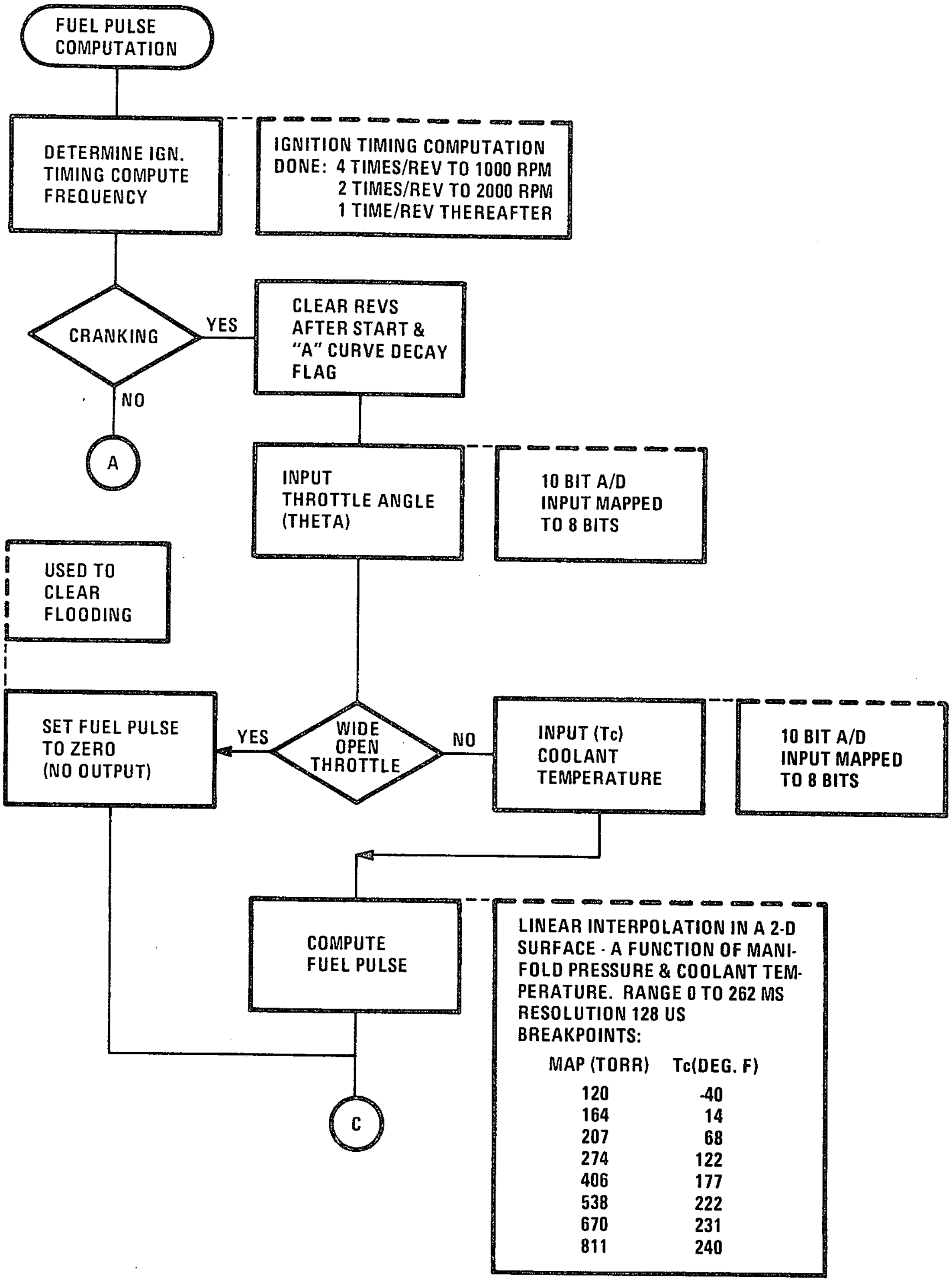
Fig-10.9A
FUEL PULSE COMPUTATION ROUTINE

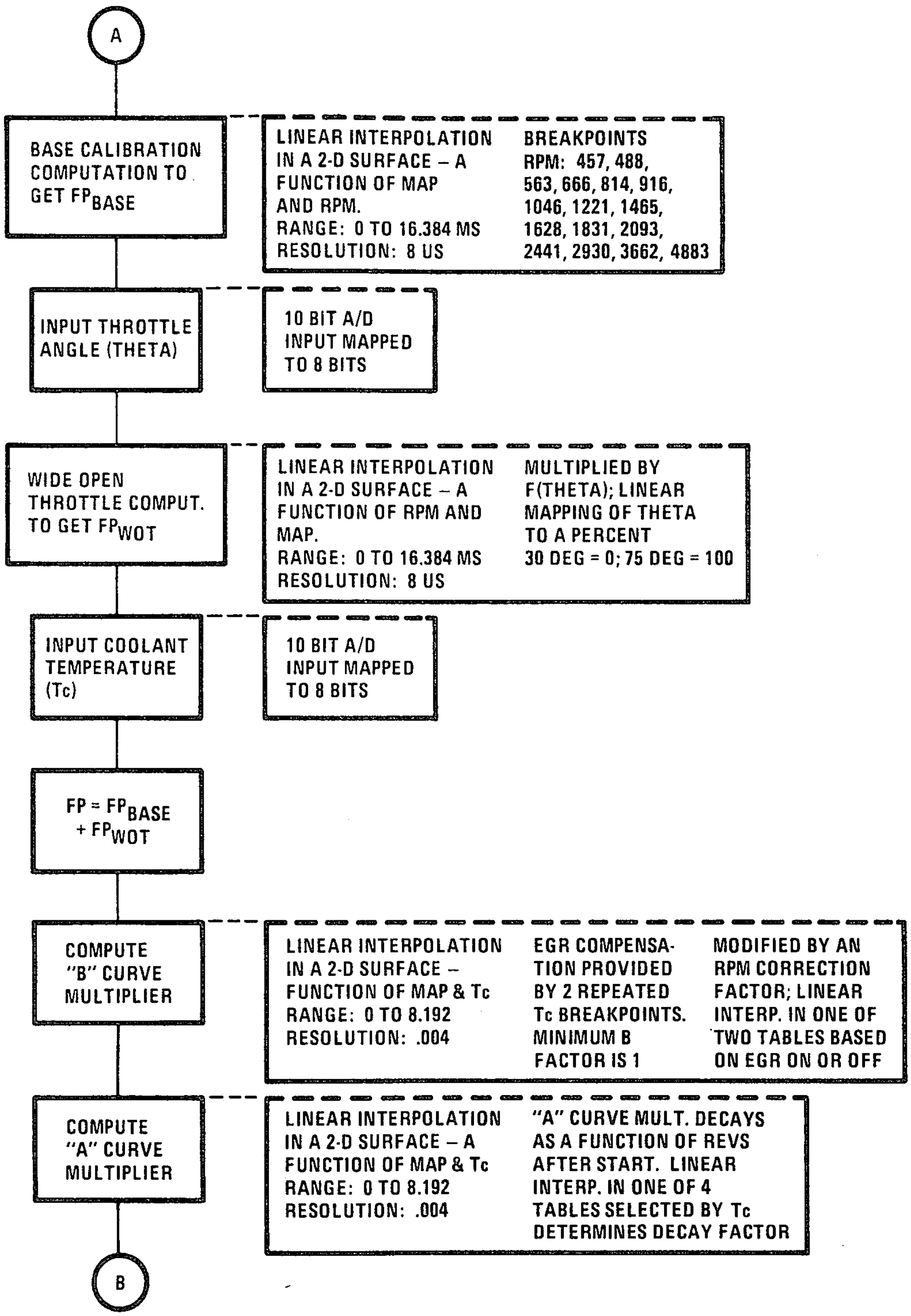
Fig-10.9B
FUEL PULSE COMPUTATION ROUTINE (CONT.)

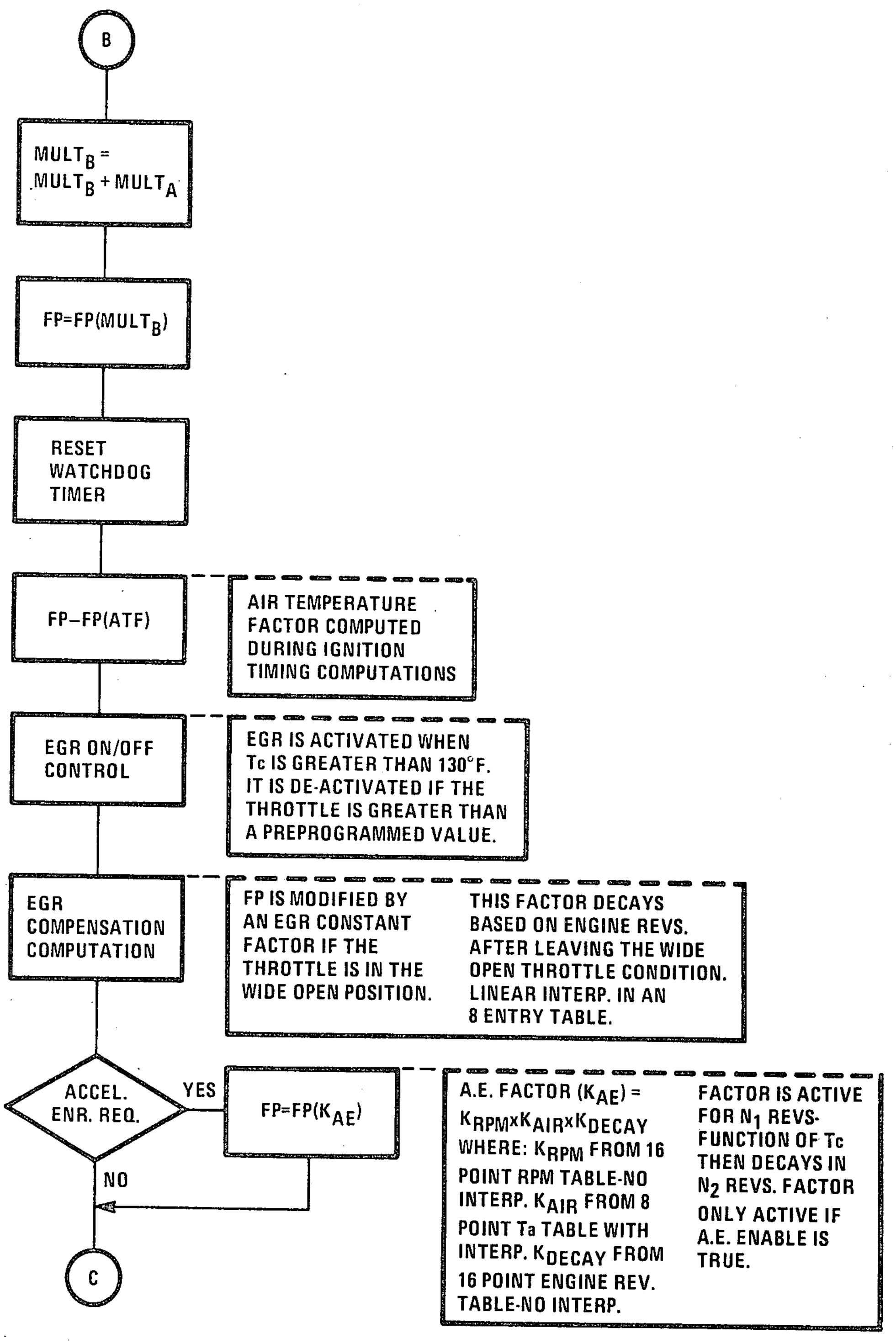
Fig-10.9C
FUEL PULSE COMPUTATION ROUTINE (CONT.)

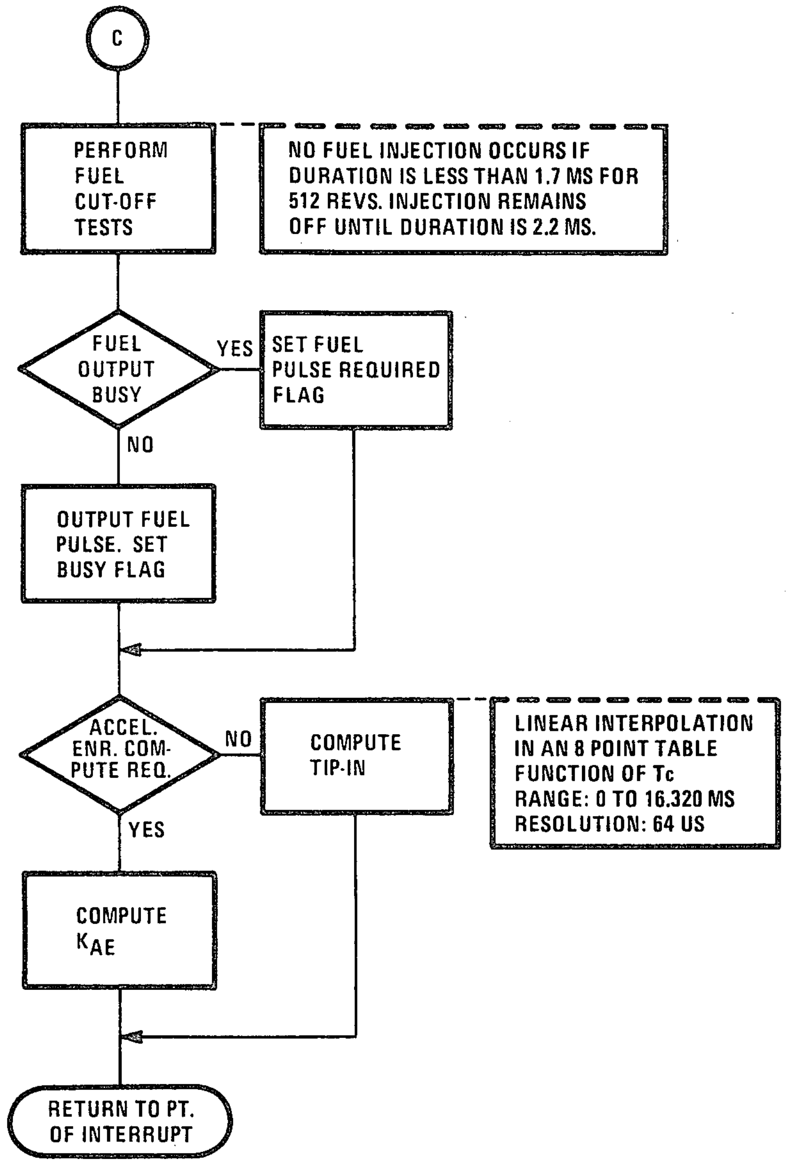
Fig-10.9D
FUEL PULSE COMPUTATION ROUTINE (CONT.)

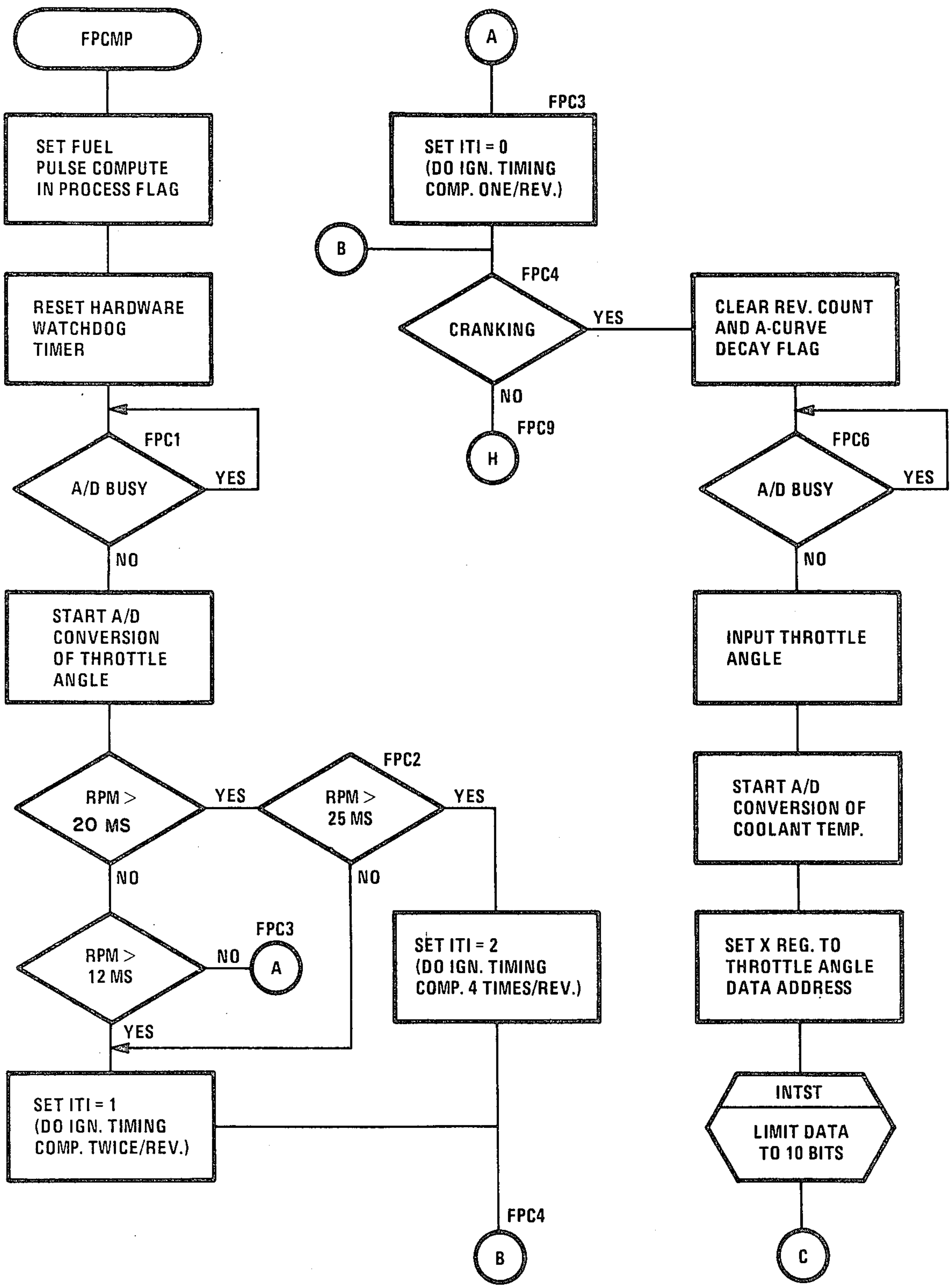
Fig-10.10A
DETAILED FLOW DIAGRAM OF FUEL PULSE COMPUTATION

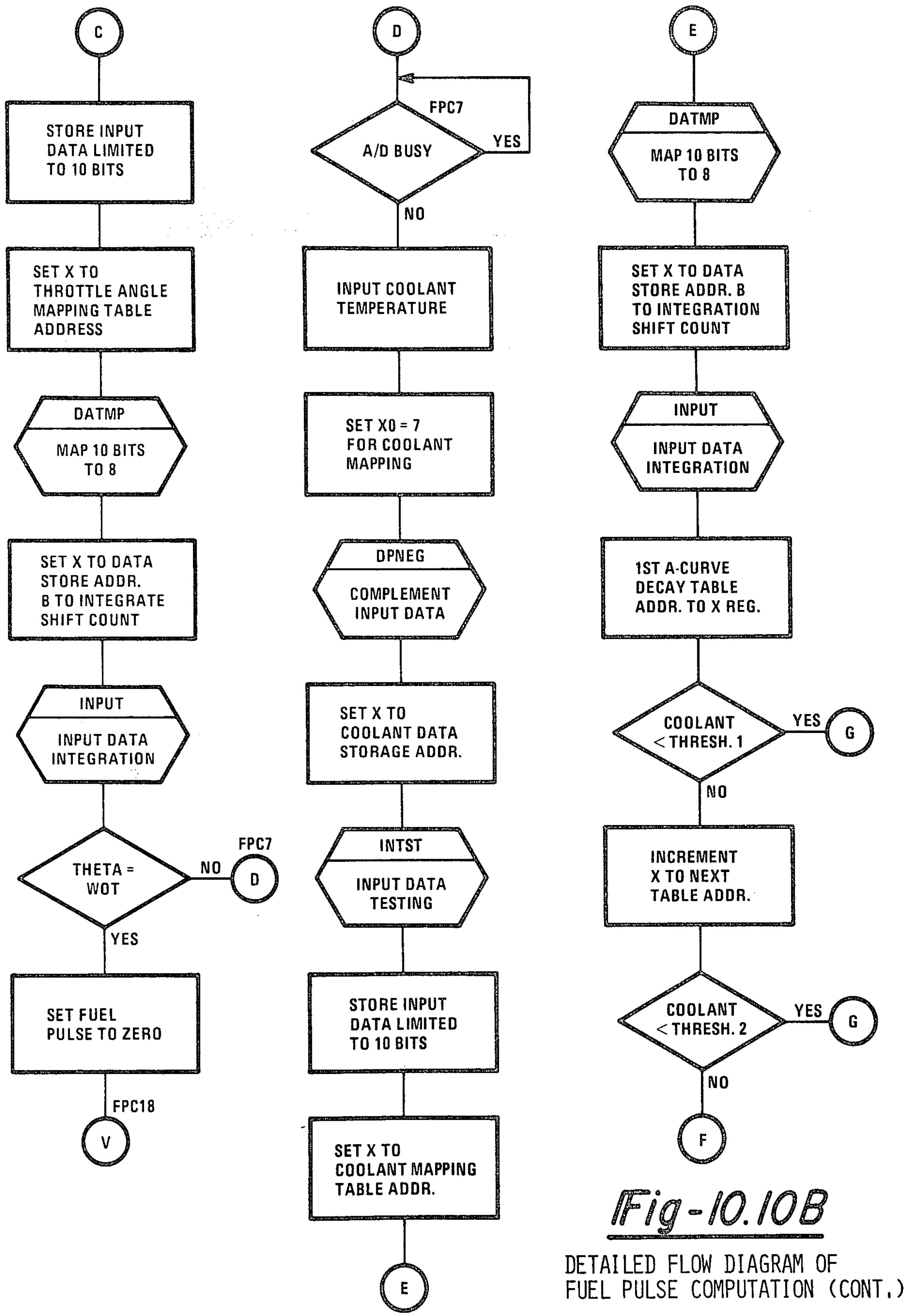
Fig-10.10B
DETAILED FLOW DIAGRAM OF FUEL PULSE COMPUTATION (CONT.)

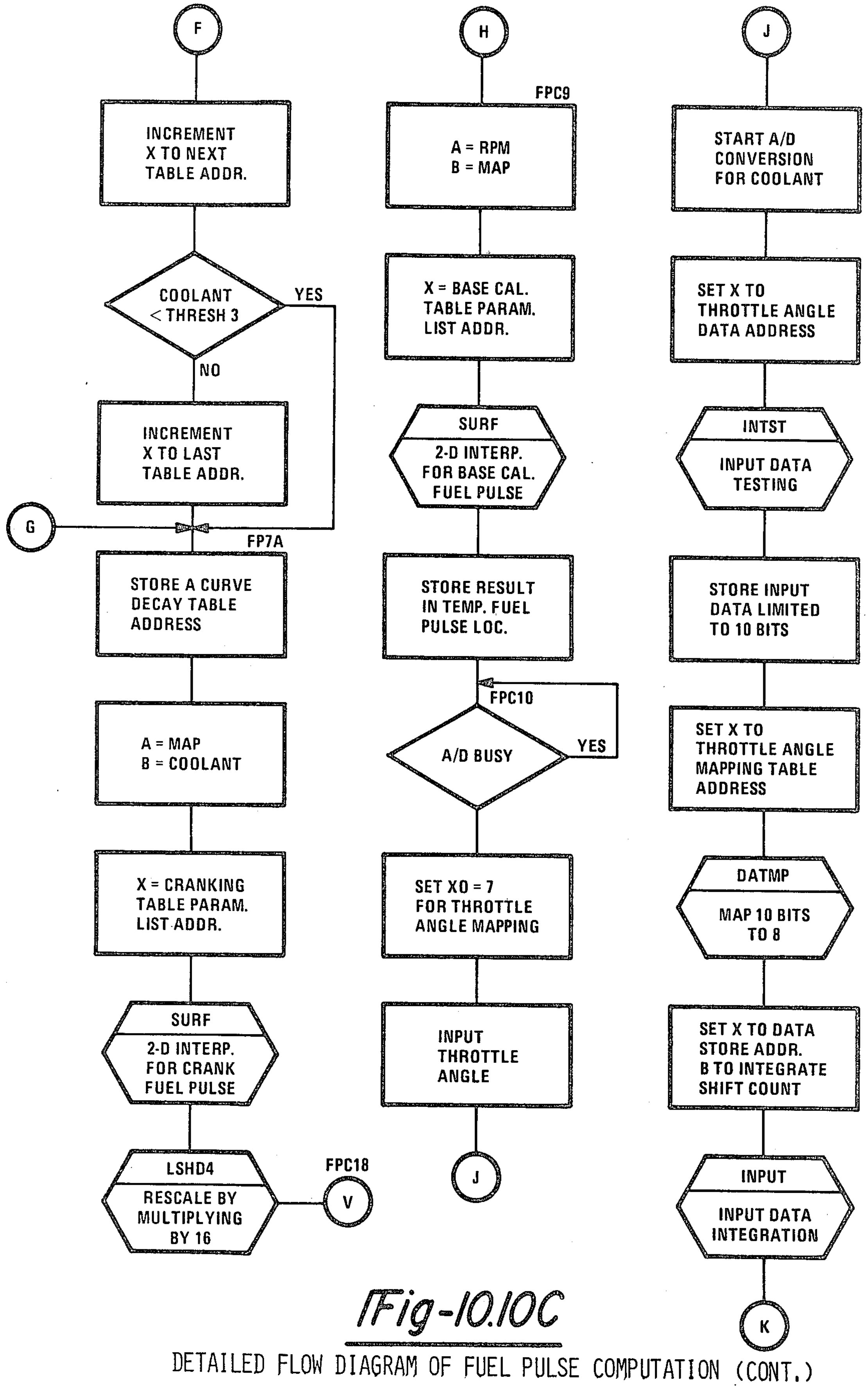
Fig-10.10C
DETAILED FLOW DIAGRAM OF FUEL PULSE COMPUTATION (CONT.)

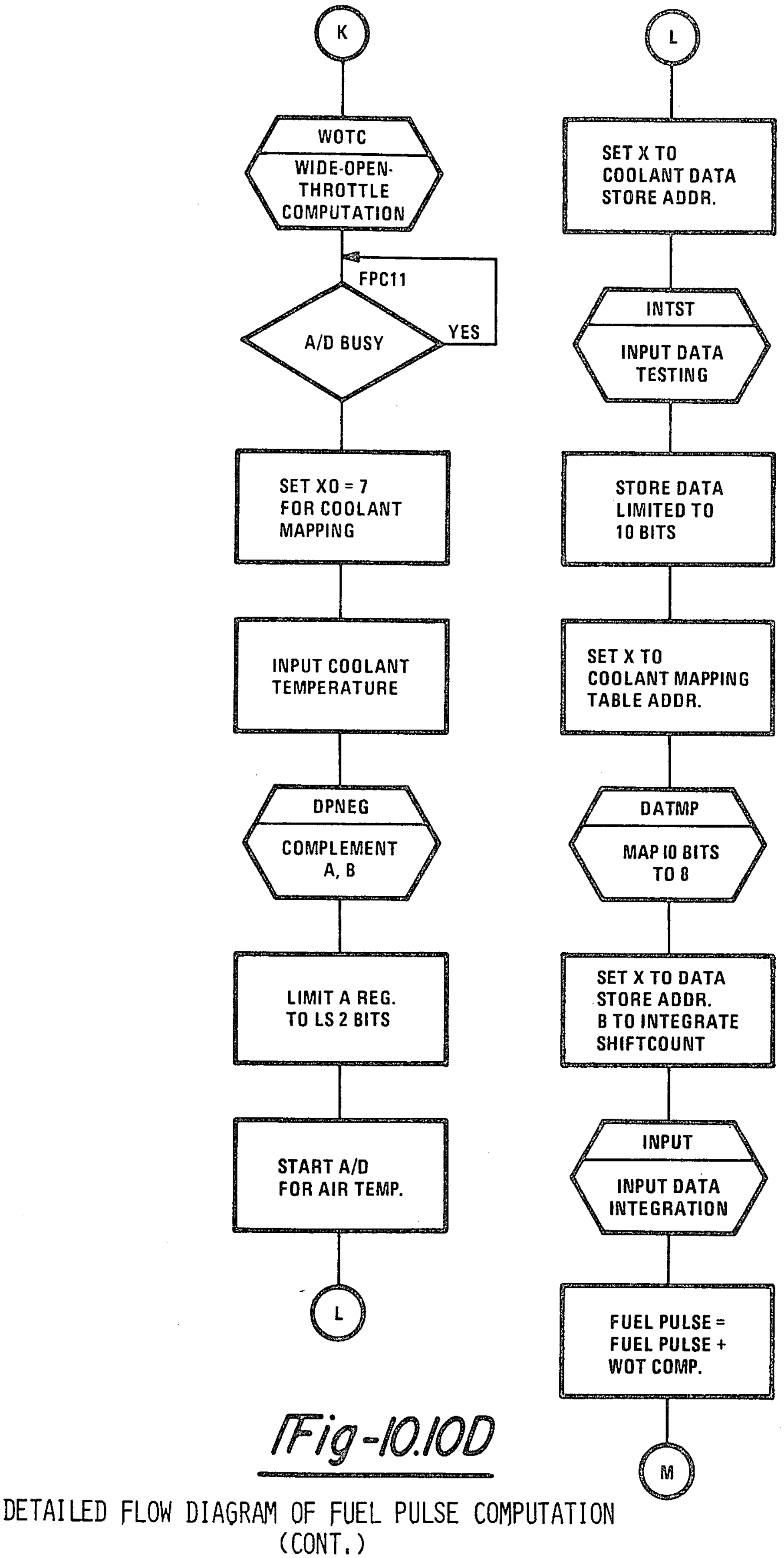
Fig-10.10D
DETAILED FLOW DIAGRAM OF FUEL PULSE COMPUTATION (CONT.)

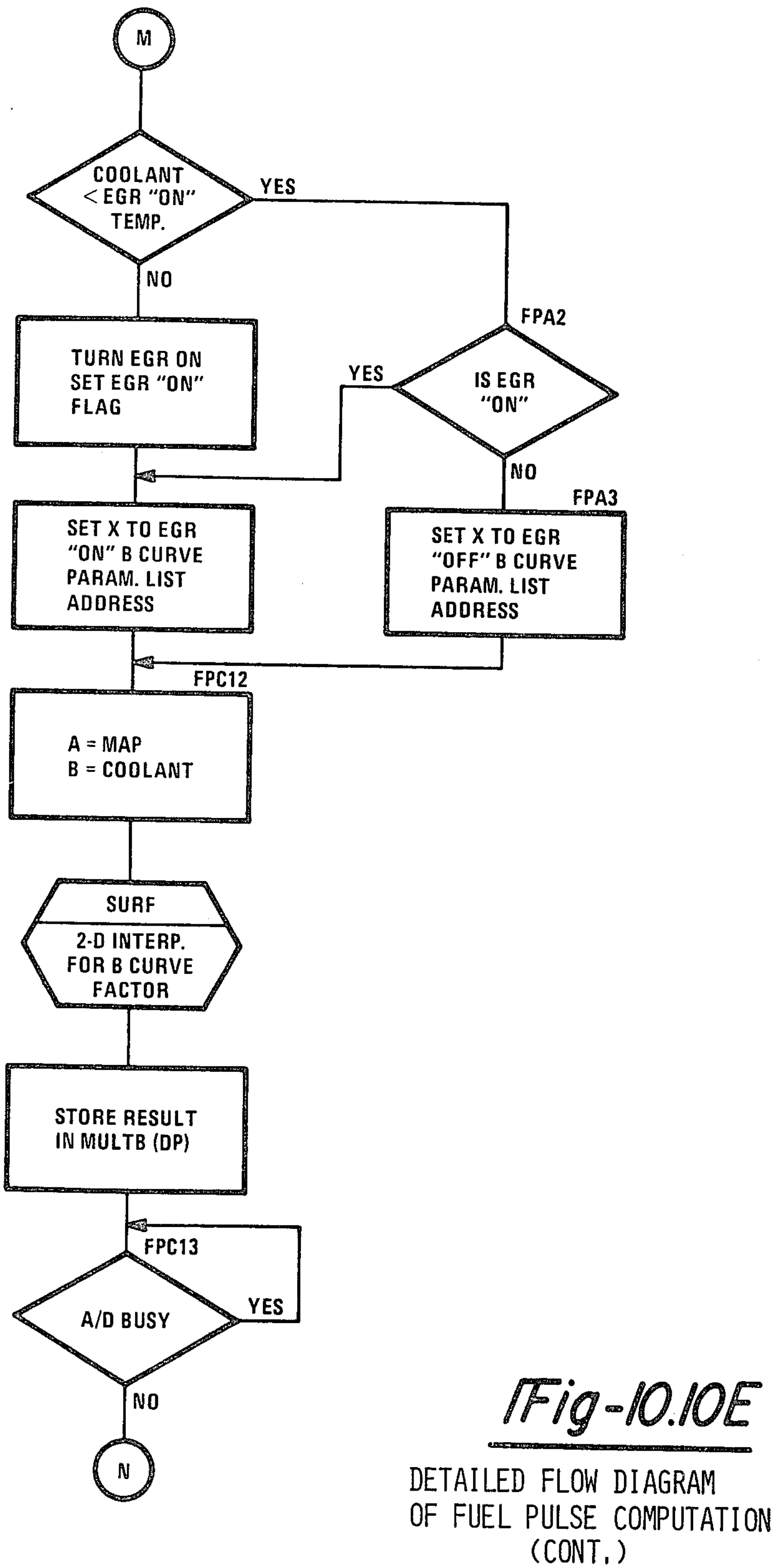
Fig-10.10E
DETAILED FLOW DIAGRAM
OF FUEL PULSE COMPUTATION
(CONT.)

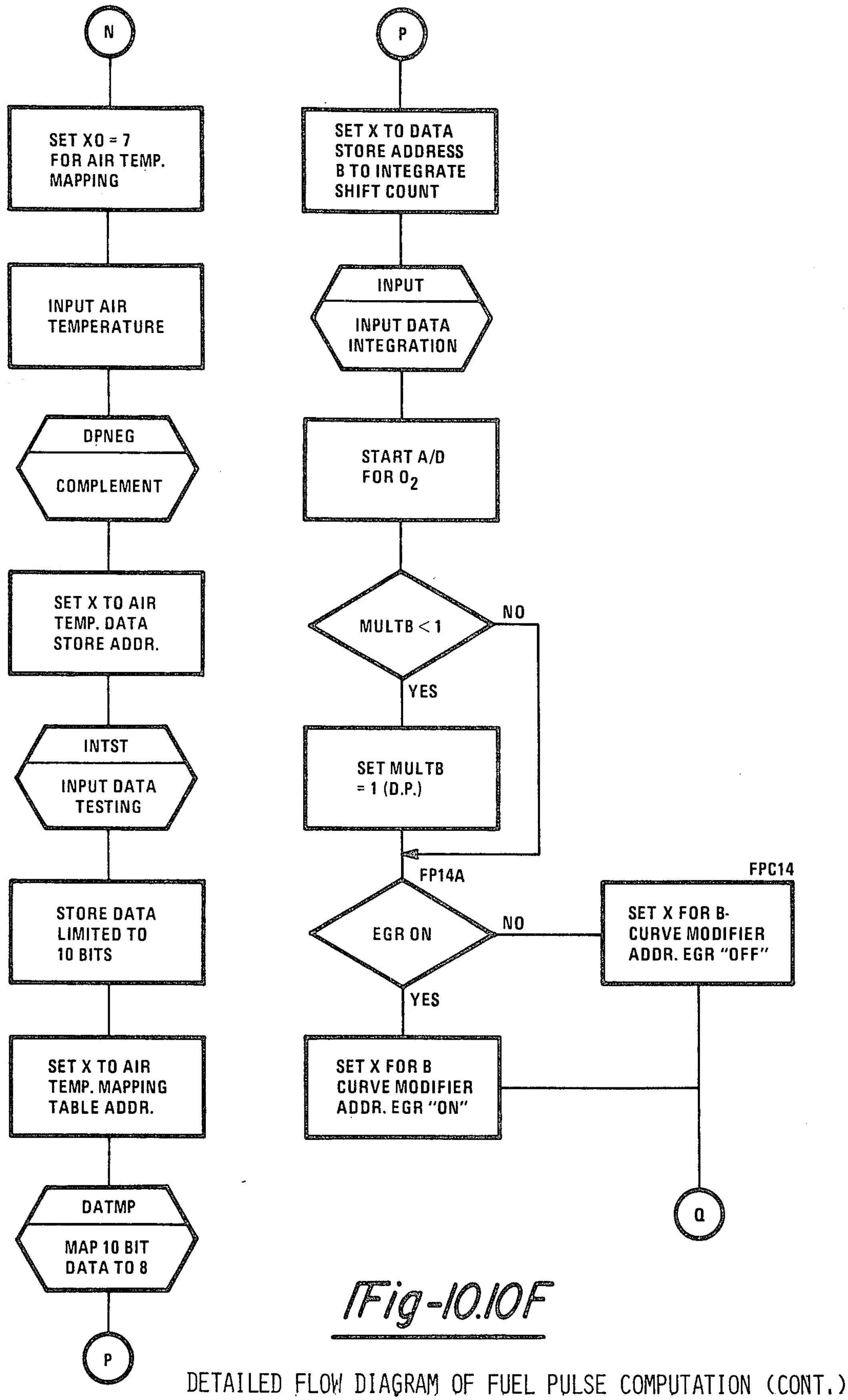
Fig-10.10F
DETAILED FLOW DIAGRAM OF FUEL PULSE COMPUTATION (CONT.)

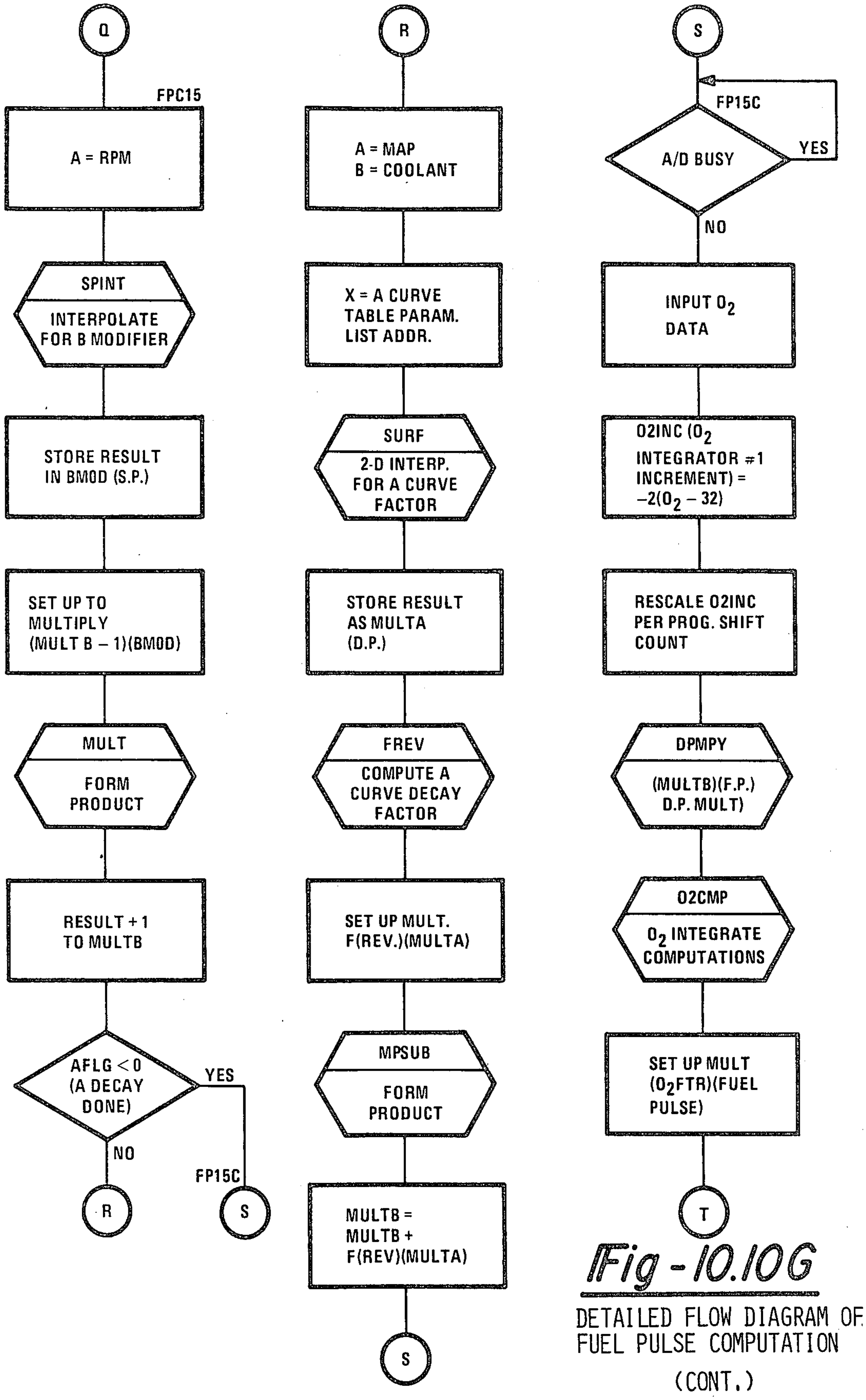
Fig-10.10G
DETAILED FLOW DIAGRAM OF FUEL PULSE COMPUTATION (CONT.)

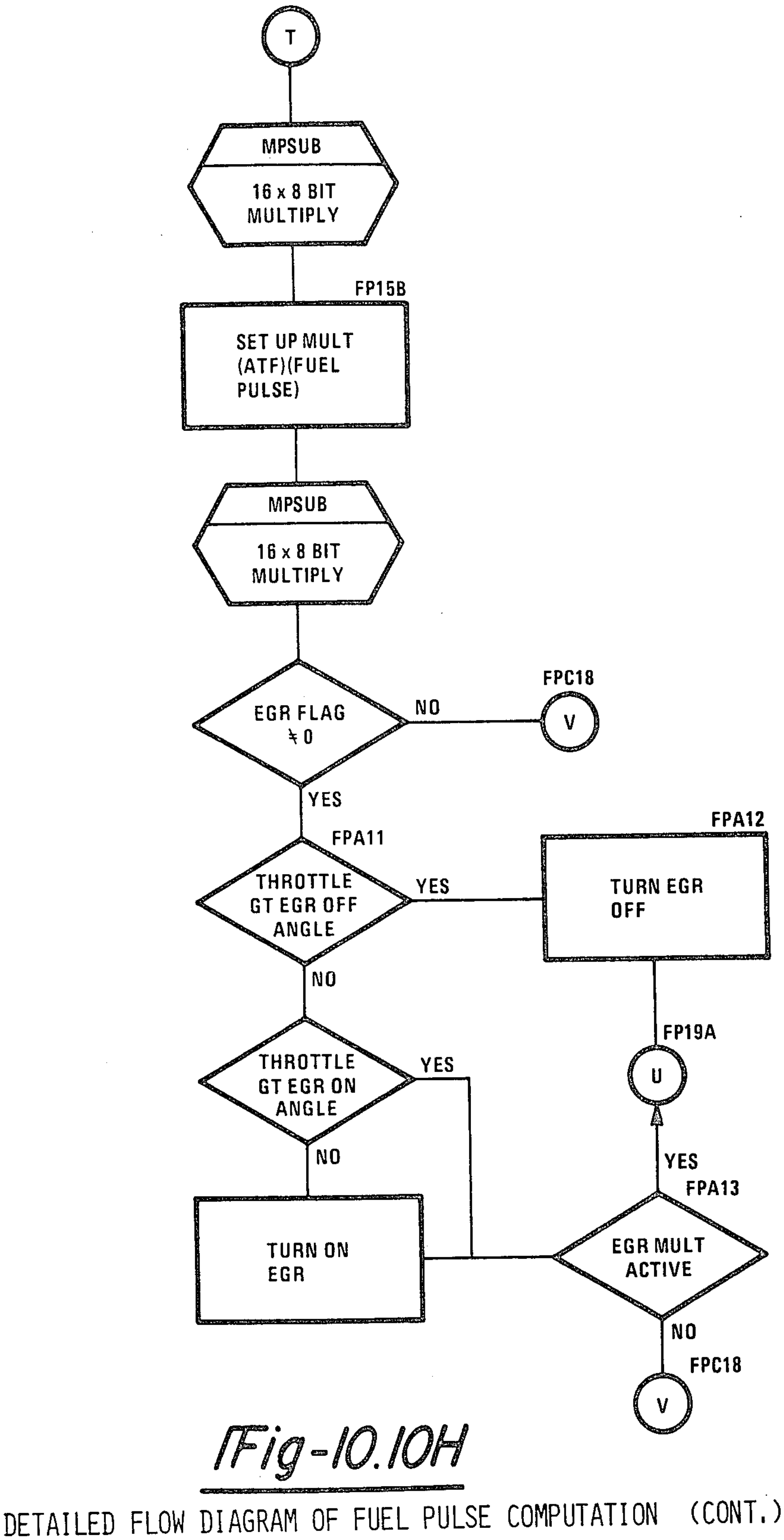
Fig-10.10H
DETAILED FLOW DIAGRAM OF FUEL PULSE COMPUTATION (CONT.)

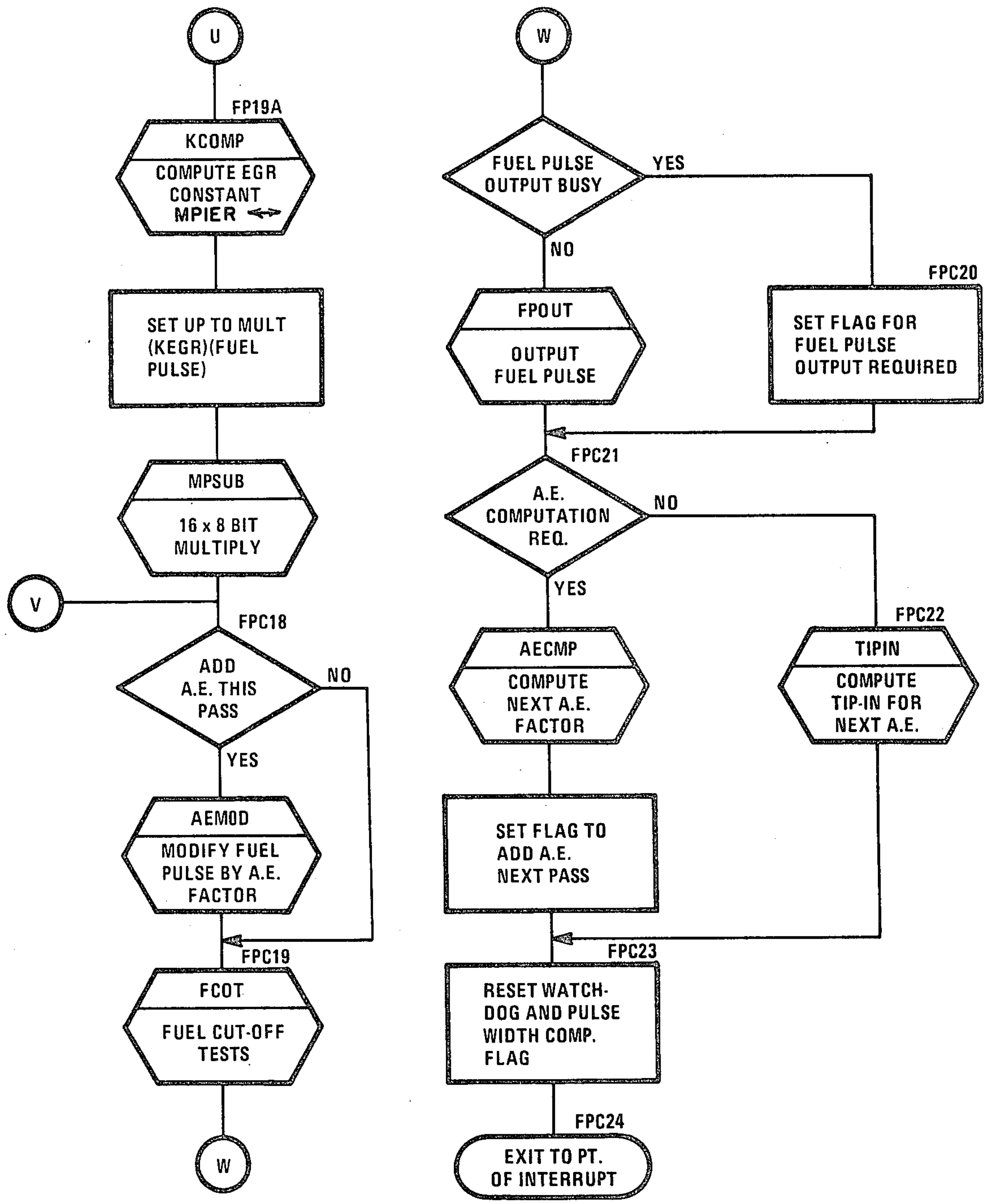
Fig-10.101
DETAILED FLOW DIAGRAM OF FUEL PULSE COMPUTATION (CONT.)

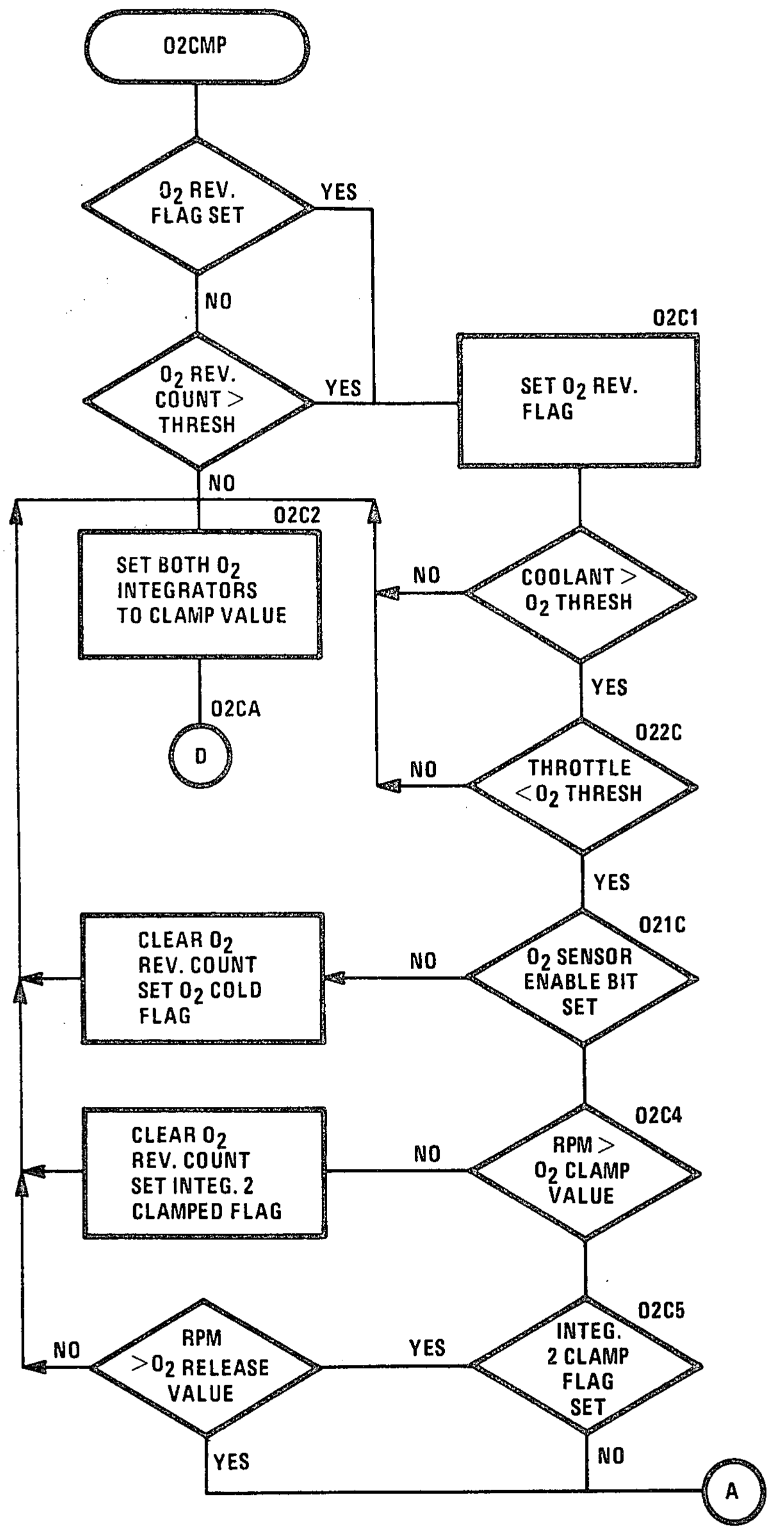
Fig-10.11A
$O_2$ COMPENSATION ROUTINE

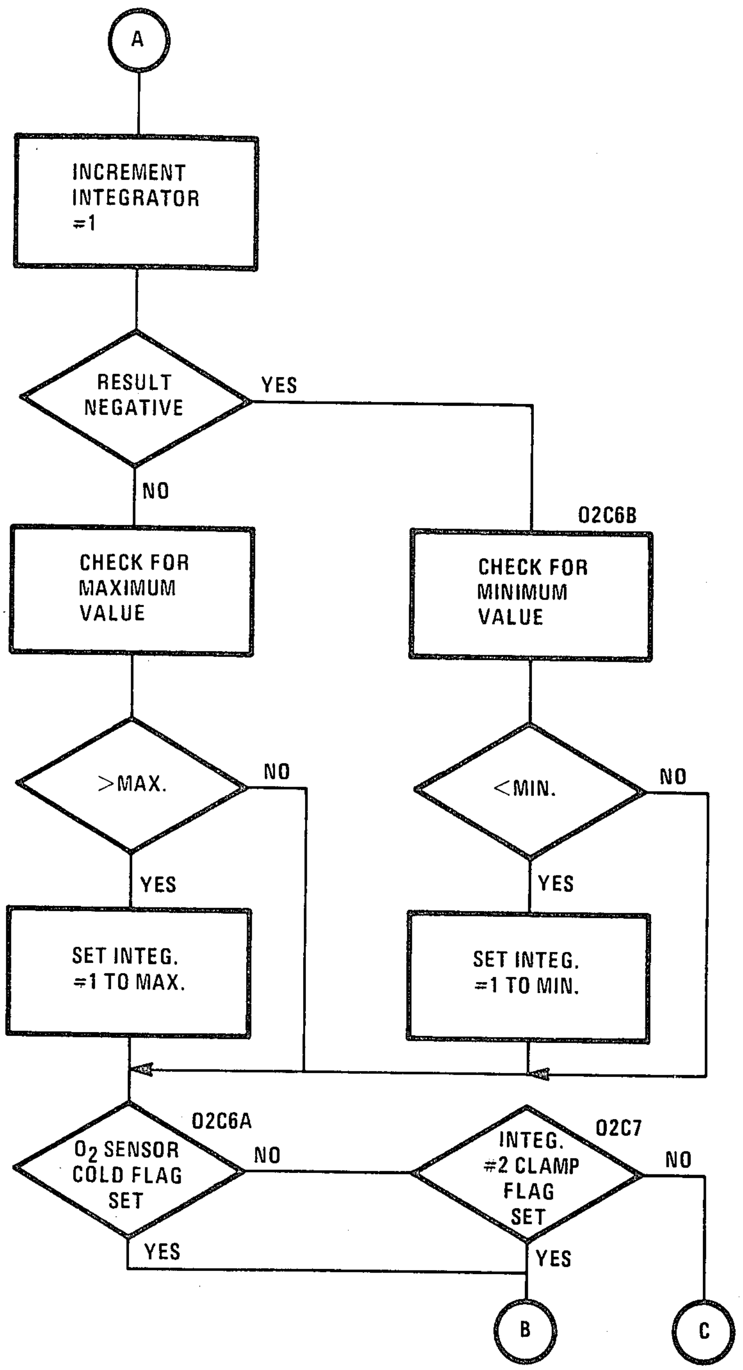
Fig-10.11B
$O_2$ COMPENSATION ROUTINE (CONT.)

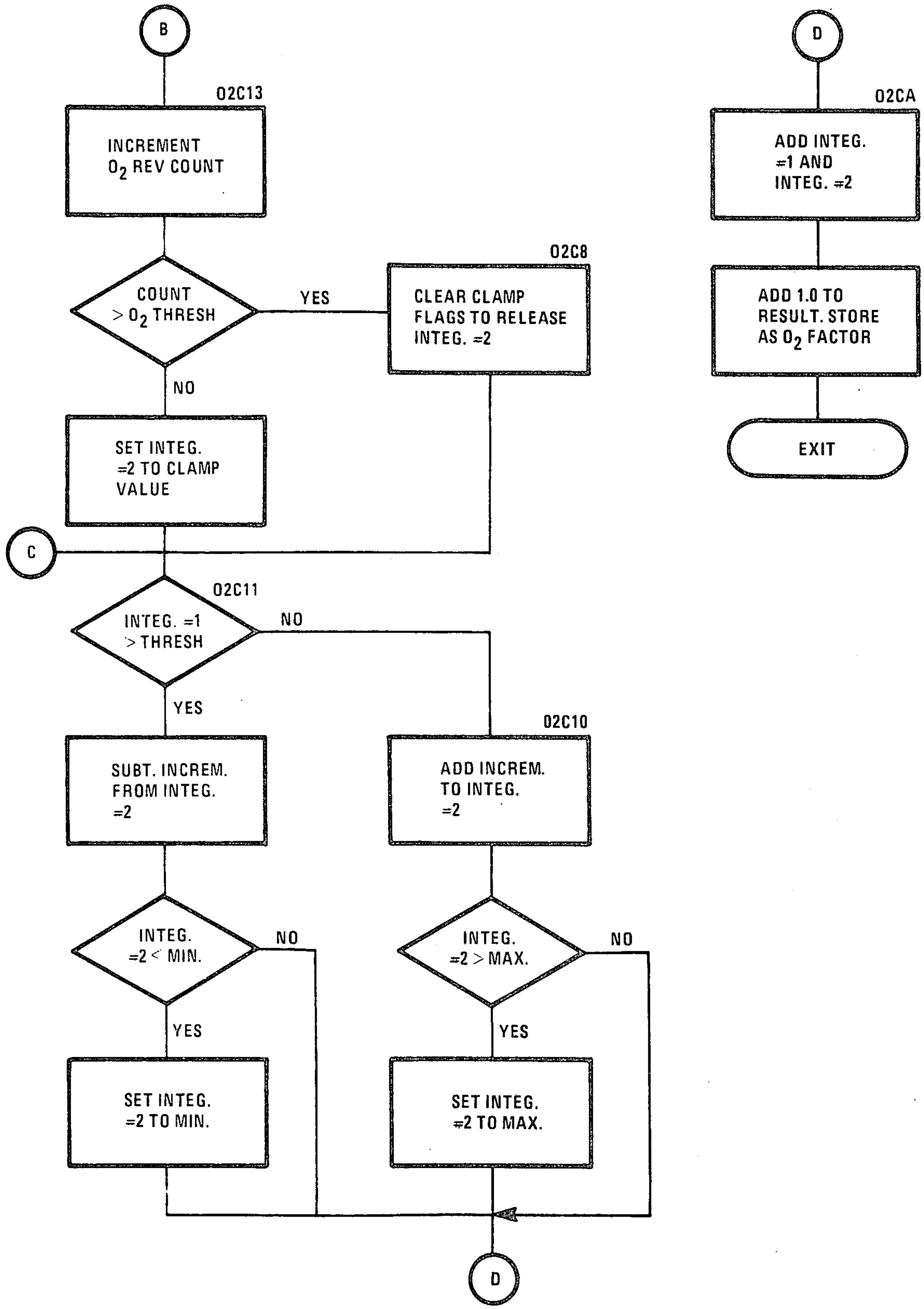
Fig-10.11C
$O_2$ COMPENSATION ROUTINE (CONT.)

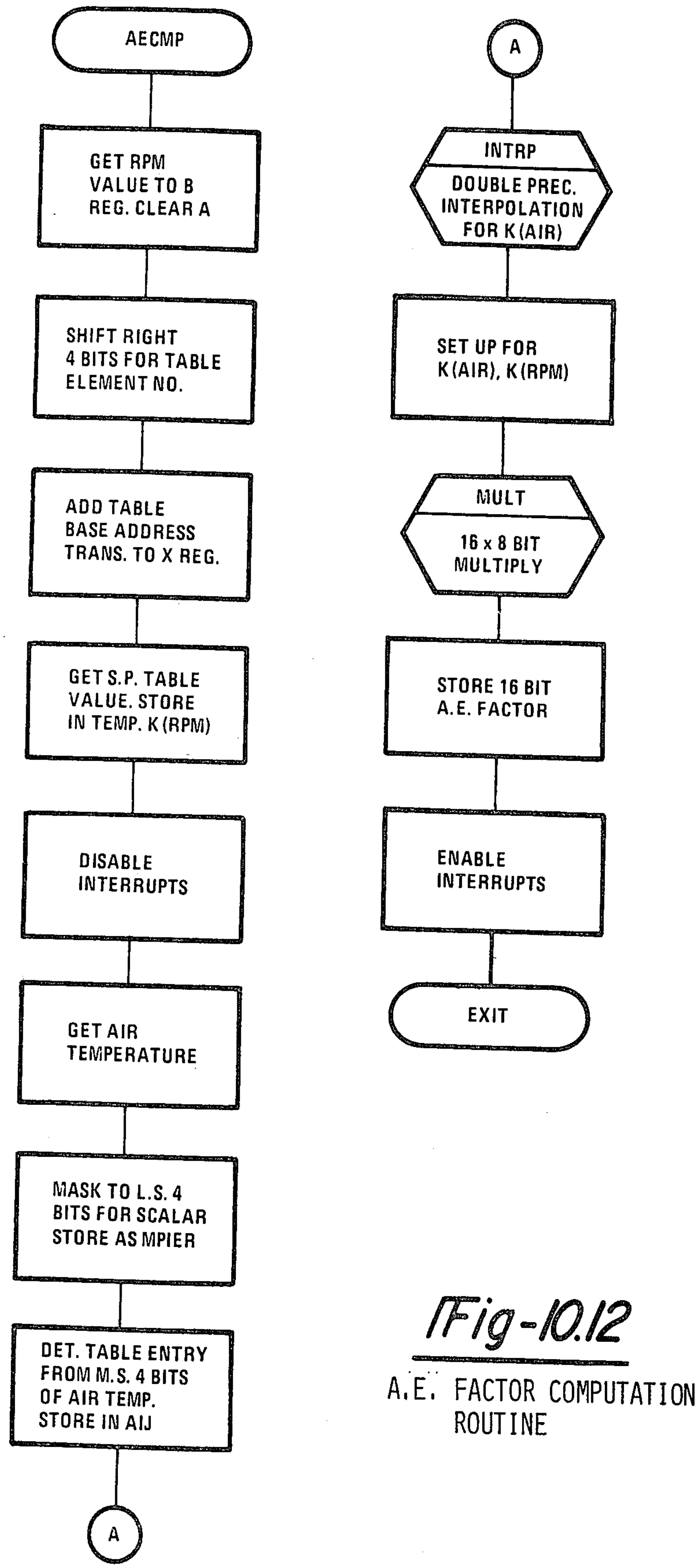
Fig-10.12
A.E. FACTOR COMPUTATION ROUTINE

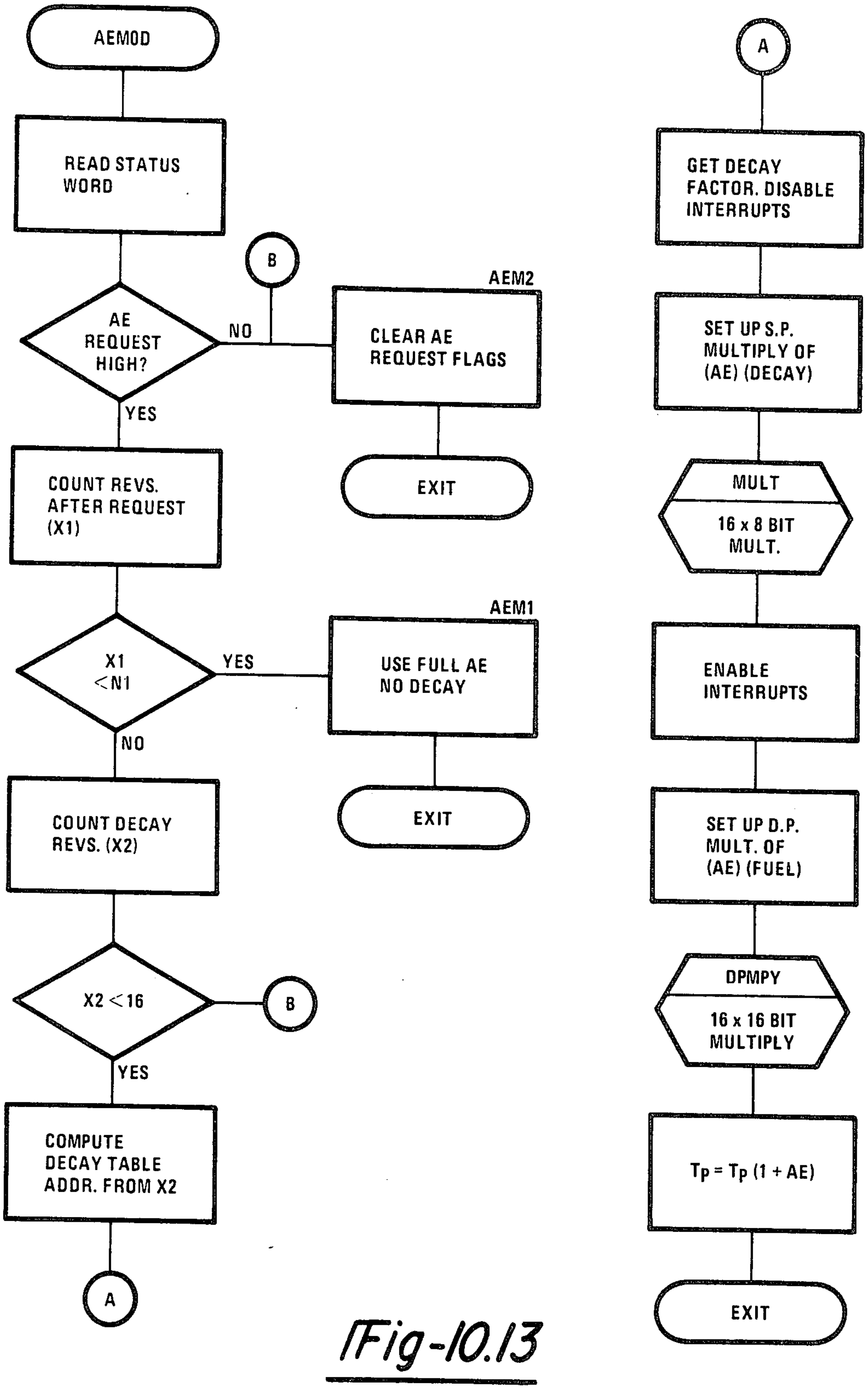
Fig-10.13
A.E. FODIFIED FUEL PULSE COMPUTATION

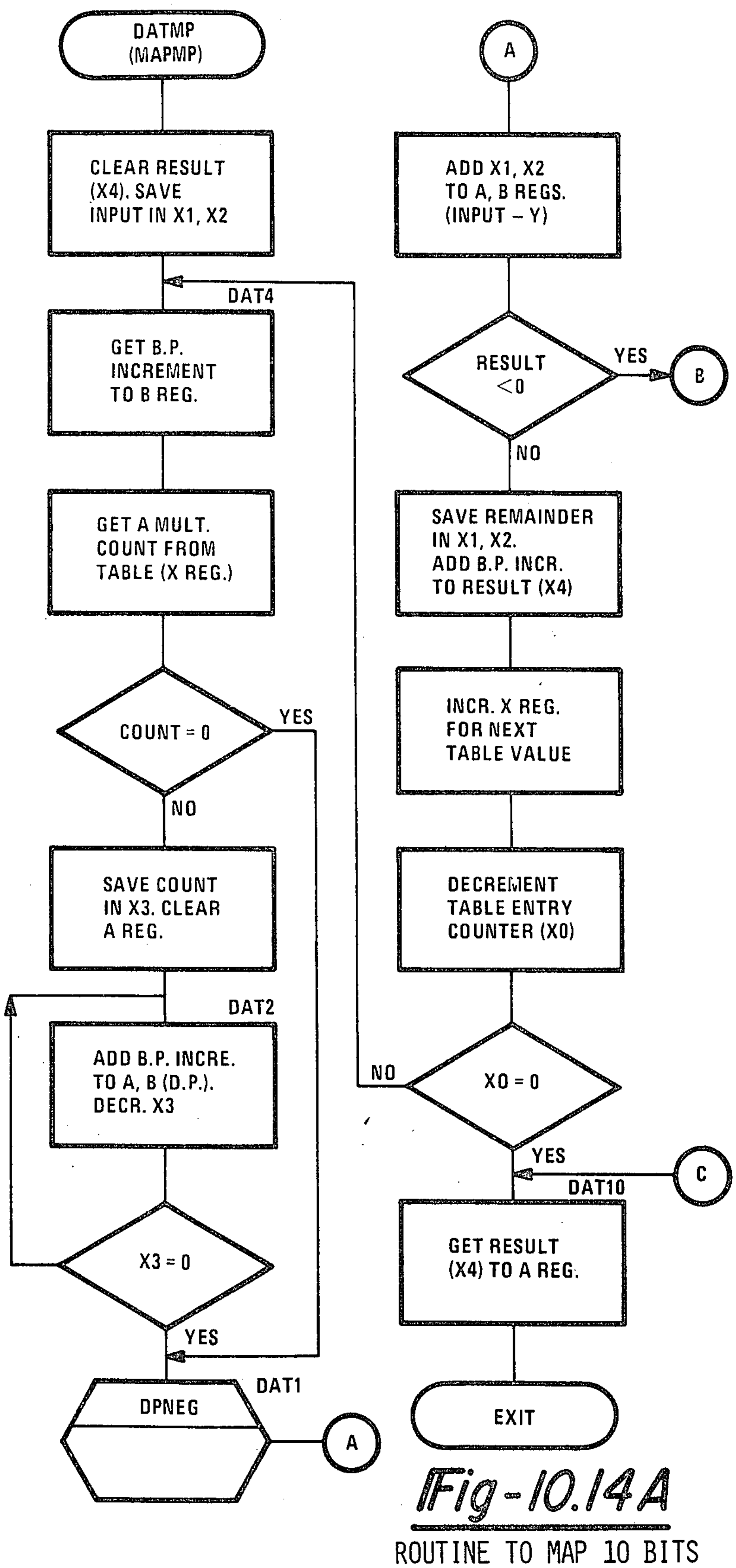
Fig-10.14A
ROUTINE TO MAP 10 BITS A/10 TO 8 BITS

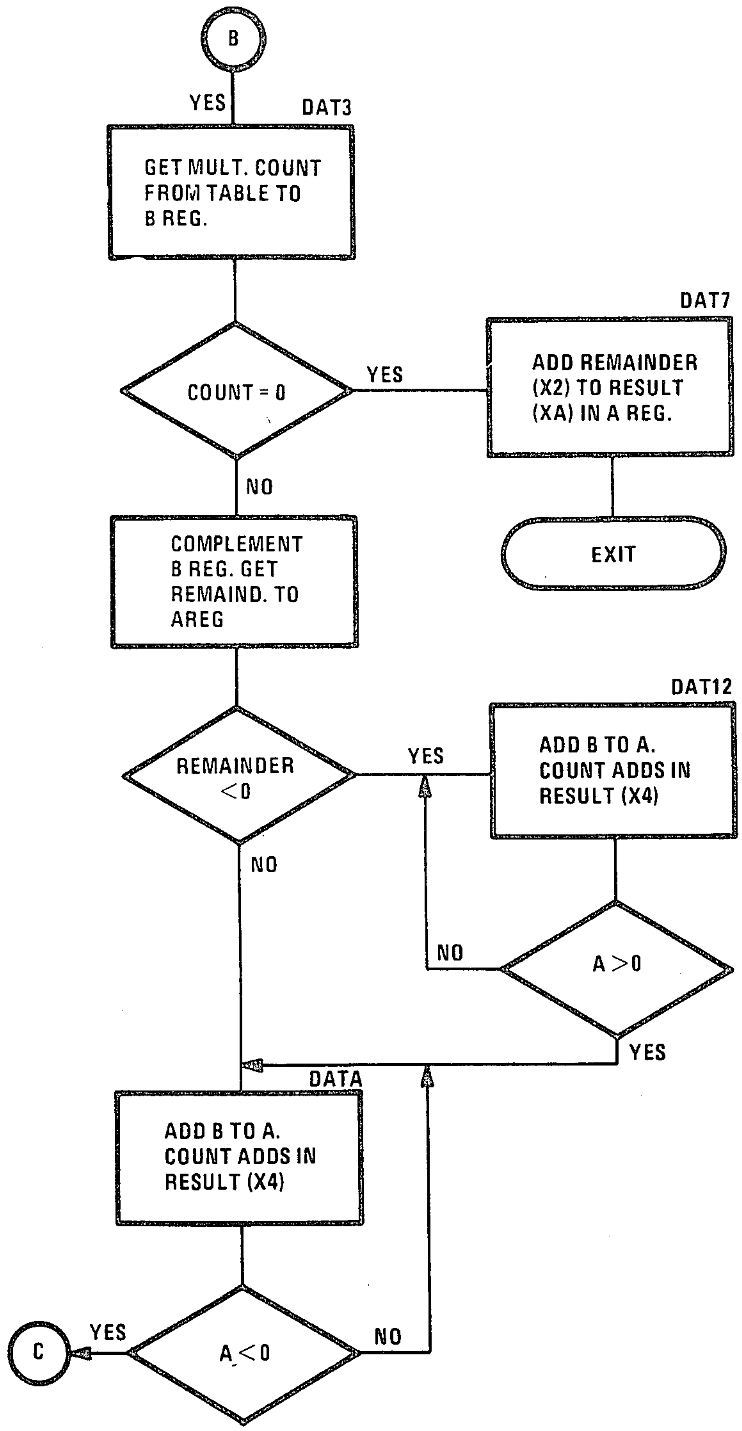
Fig-10.14B
ROUTINE TO MAP 10 BITS A/10 TO 8 BITS (CONT.)

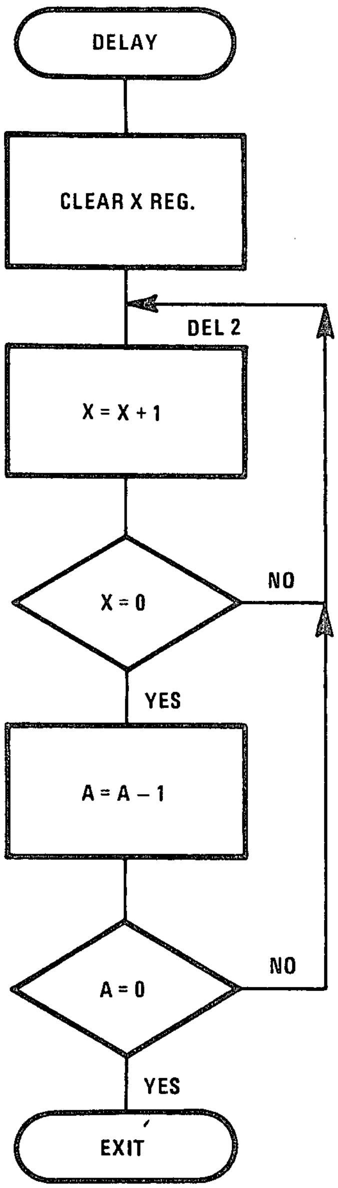
FIG-10.15
DELAY COMPUTATION ROUTINE

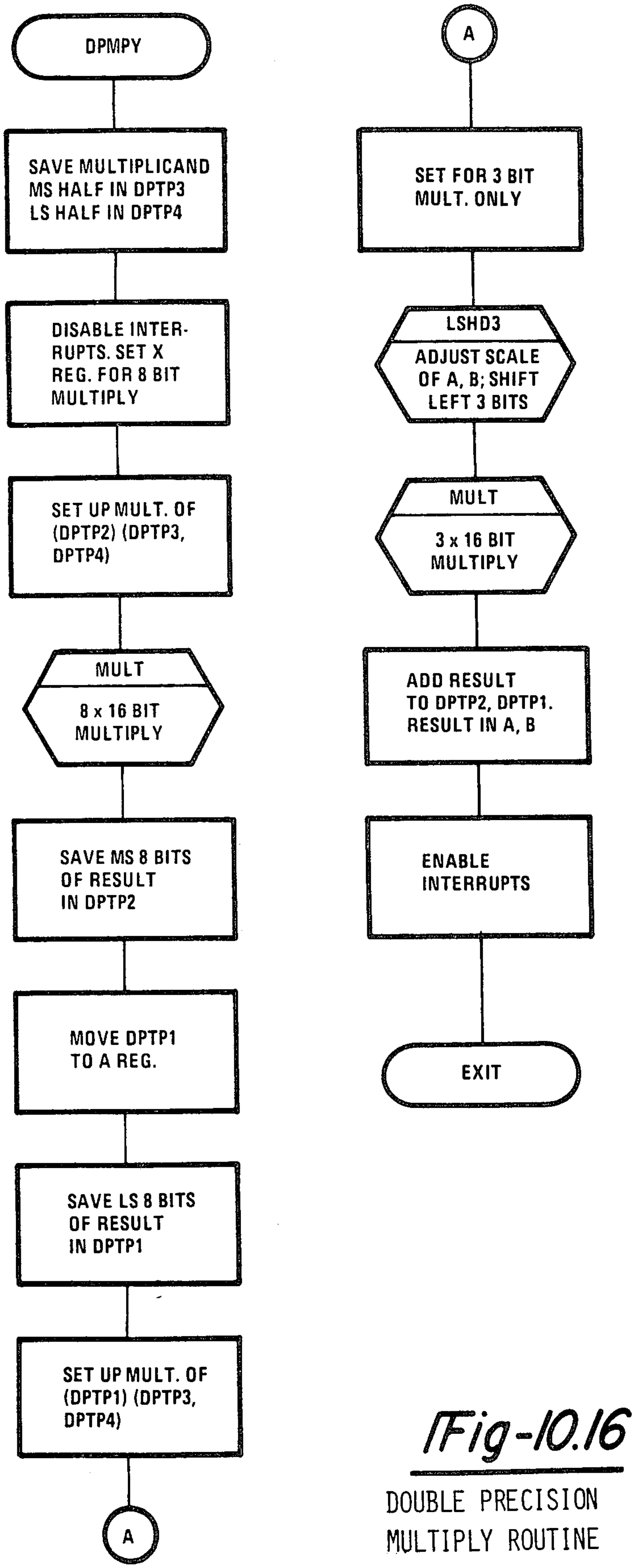
Fig-10.16
DOUBLE PRECISION MULTIPLY ROUTINE

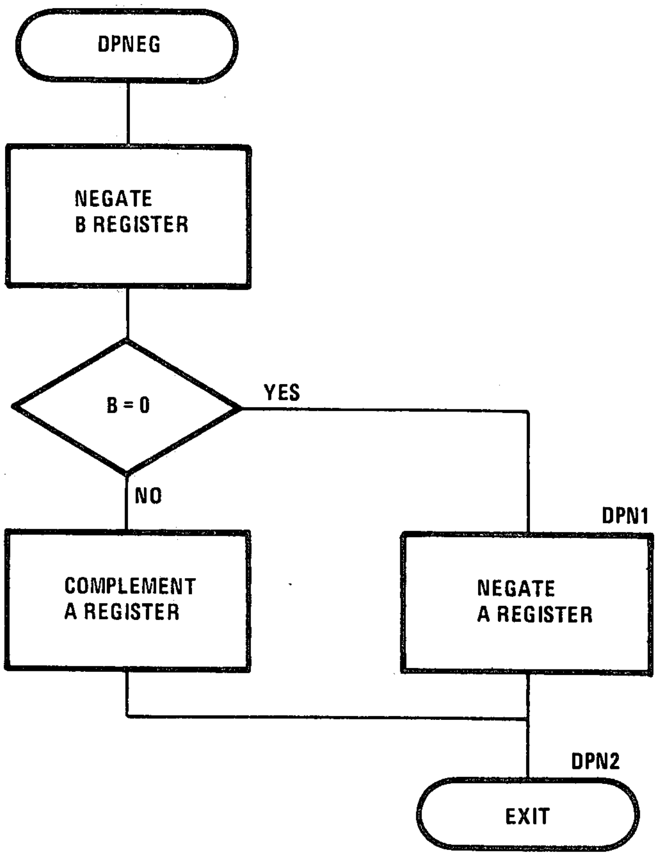
Fig-10.17
DOUBLE PRECISION
NEGATION ROUTINE

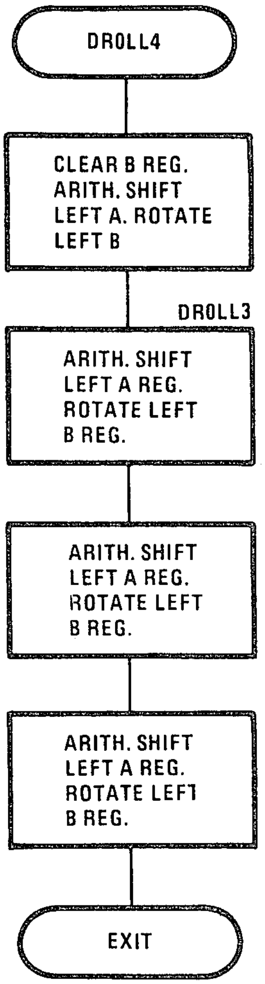
Fig-10.18
DOUBLE PRECISION LEFT ROTATE 4 PLACES

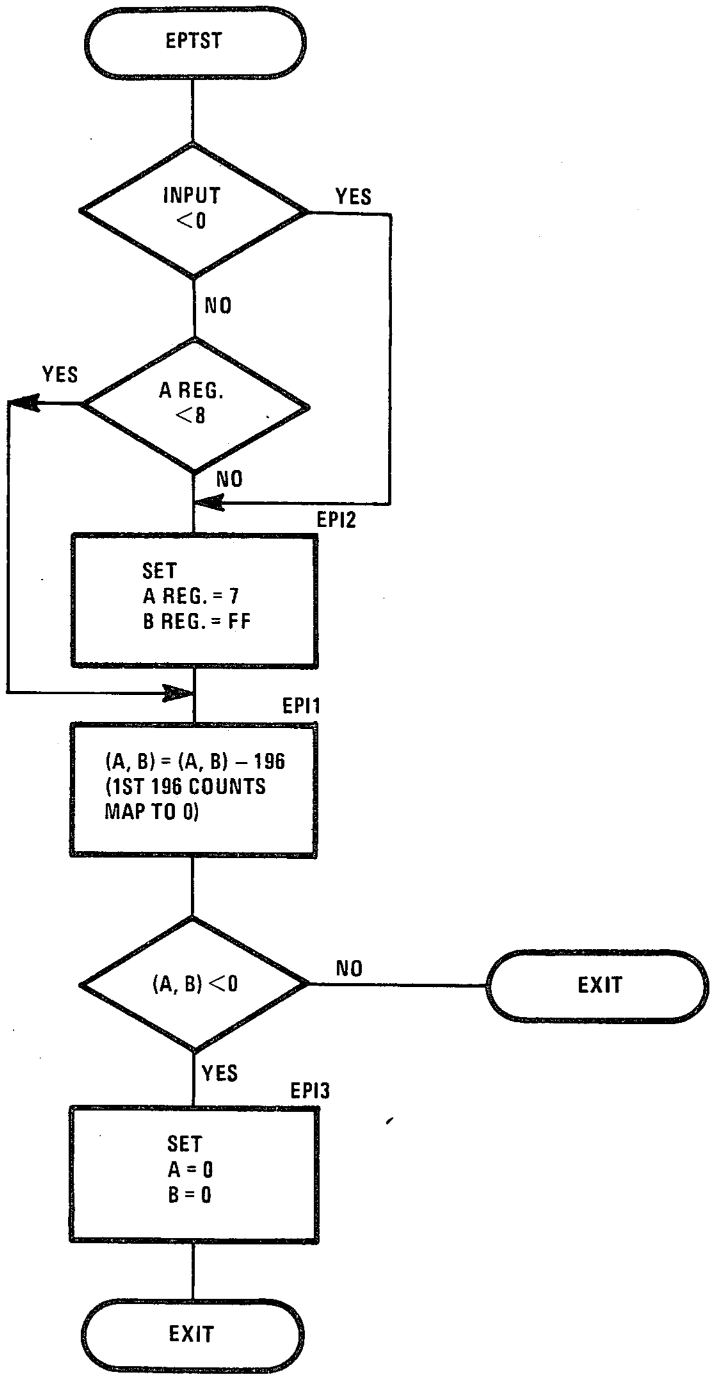
FIG-10.19
ENGINE PERIOD
LIMIT ROUTINE

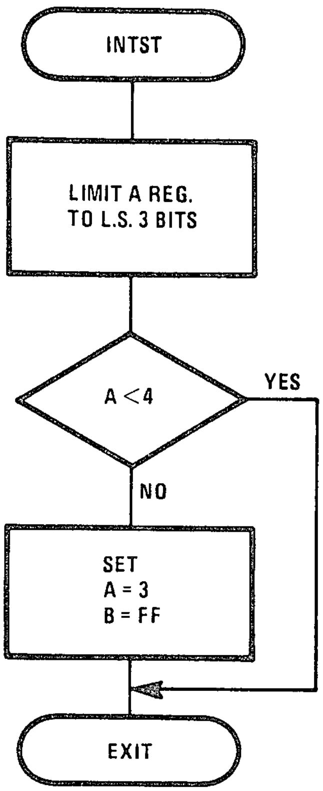
Fig-10.20
ROUTINE TO LIMIT A/D INPUT
DATA TO 10 BITS

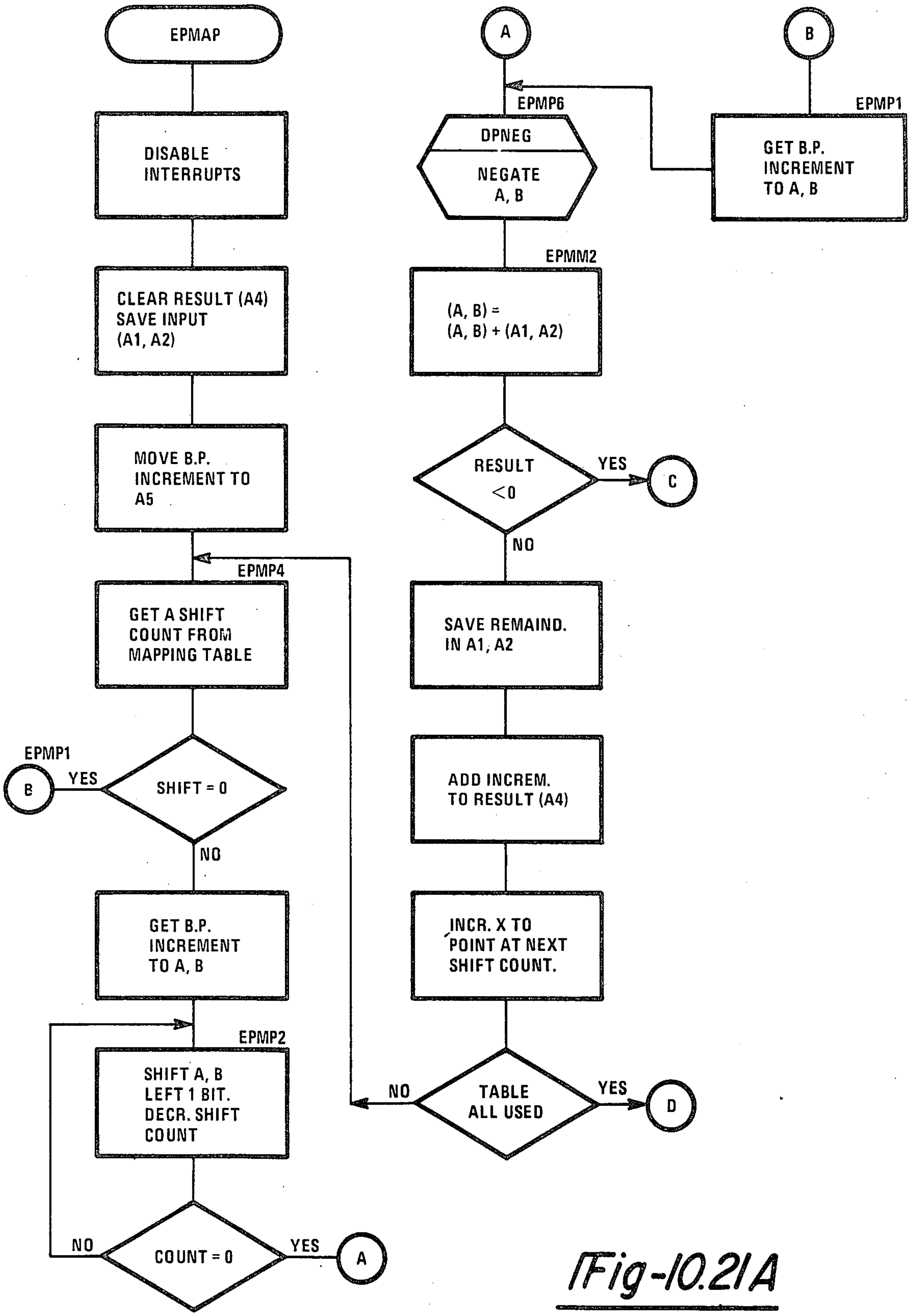
Fig-10.21A
ENGINE INTERVAL INPUT DATA MAPPING ROUTINE

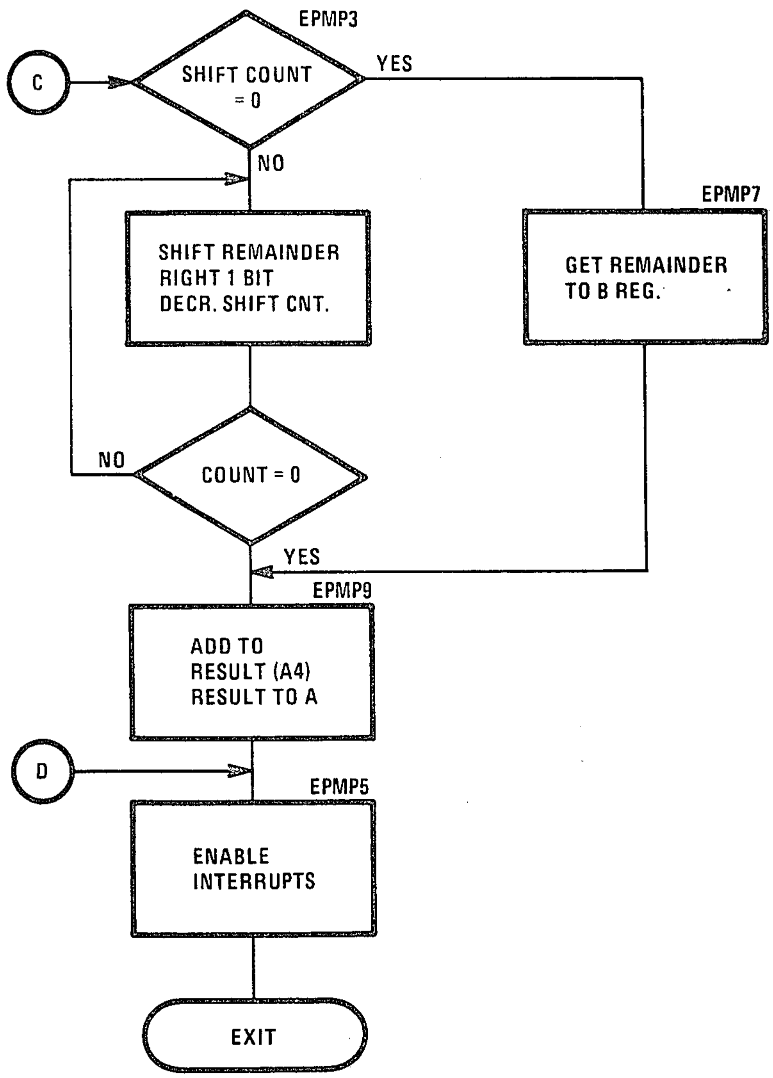
Fig-10.21B
ENGINE INTERVAL INPUT DATA MAPPING ROUTINE (CONT.)

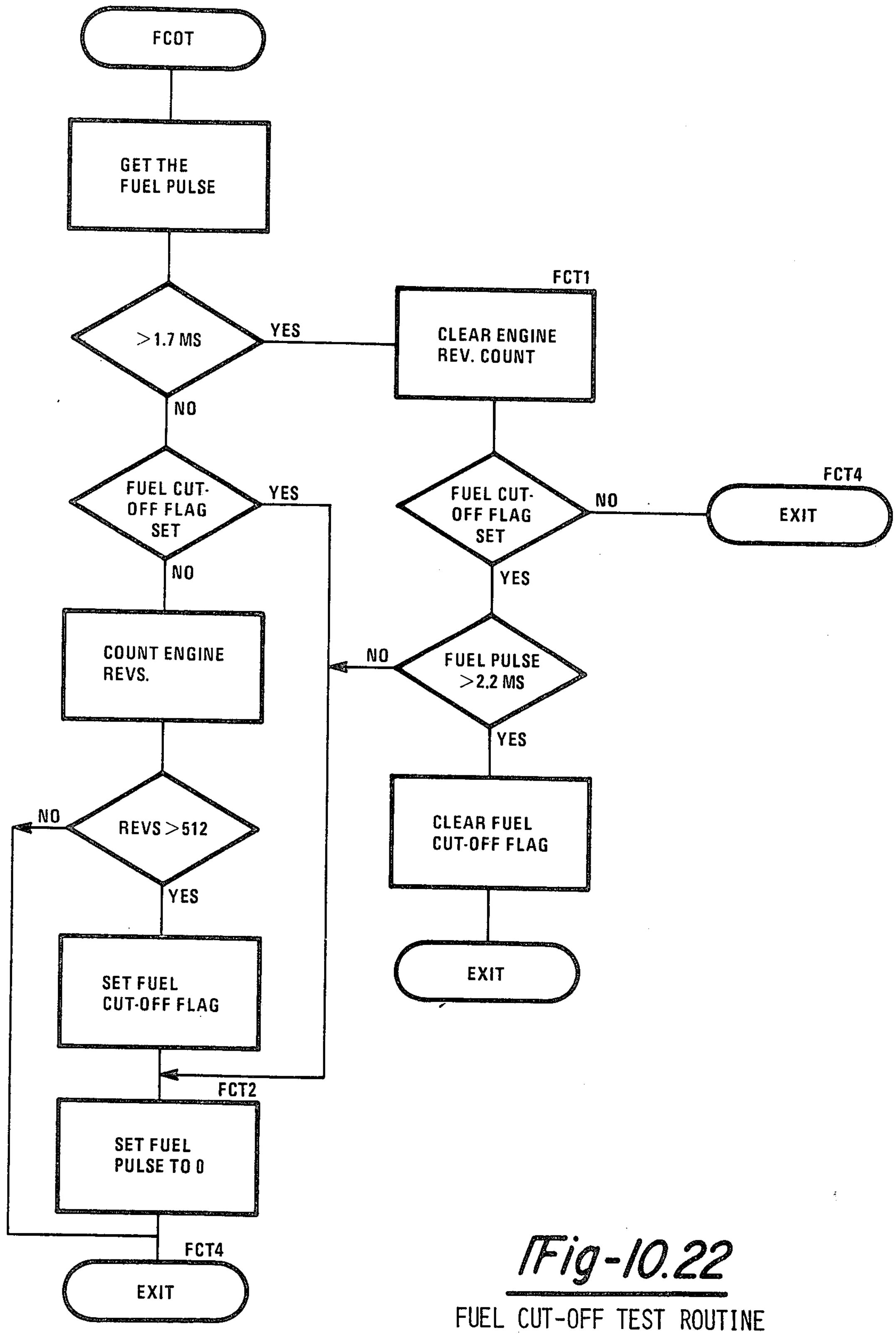
Fig-10.22
FUEL CUT-OFF TEST ROUTINE

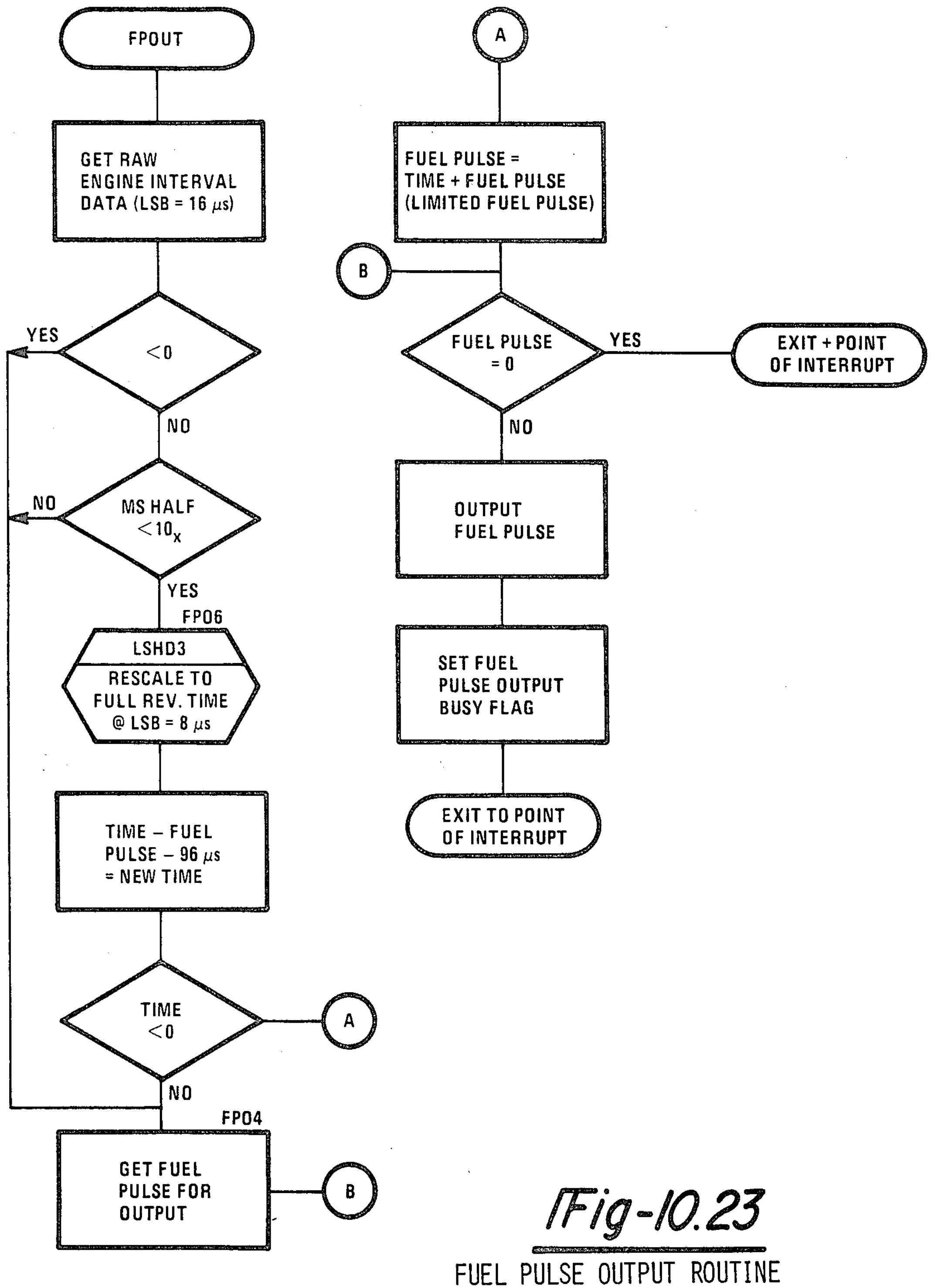
Fig-10.23
FUEL PULSE OUTPUT ROUTINE

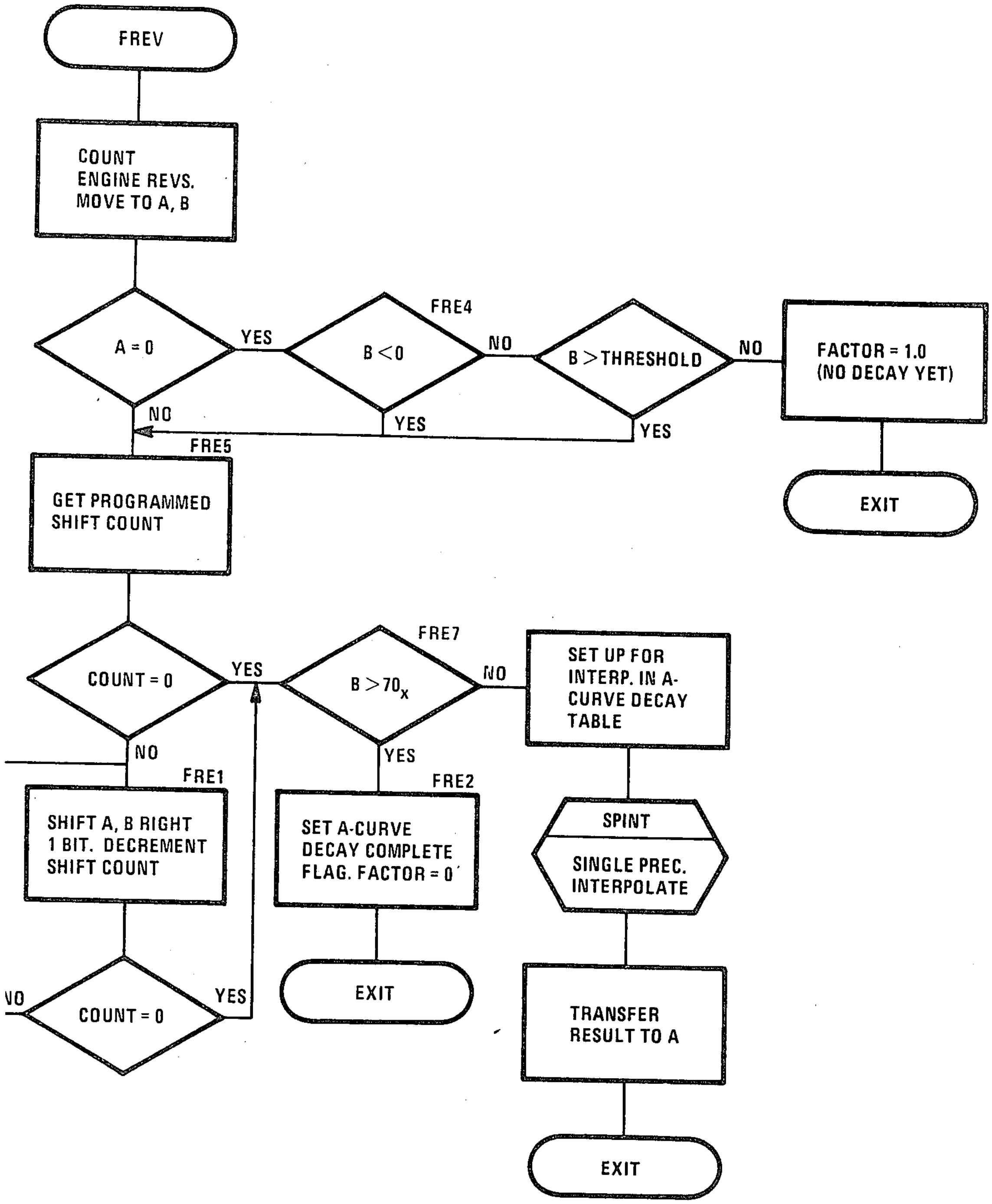
Fig-10.24
ROUTINE TO DETERMINE
"A"-CURVE DECAY FACTOR

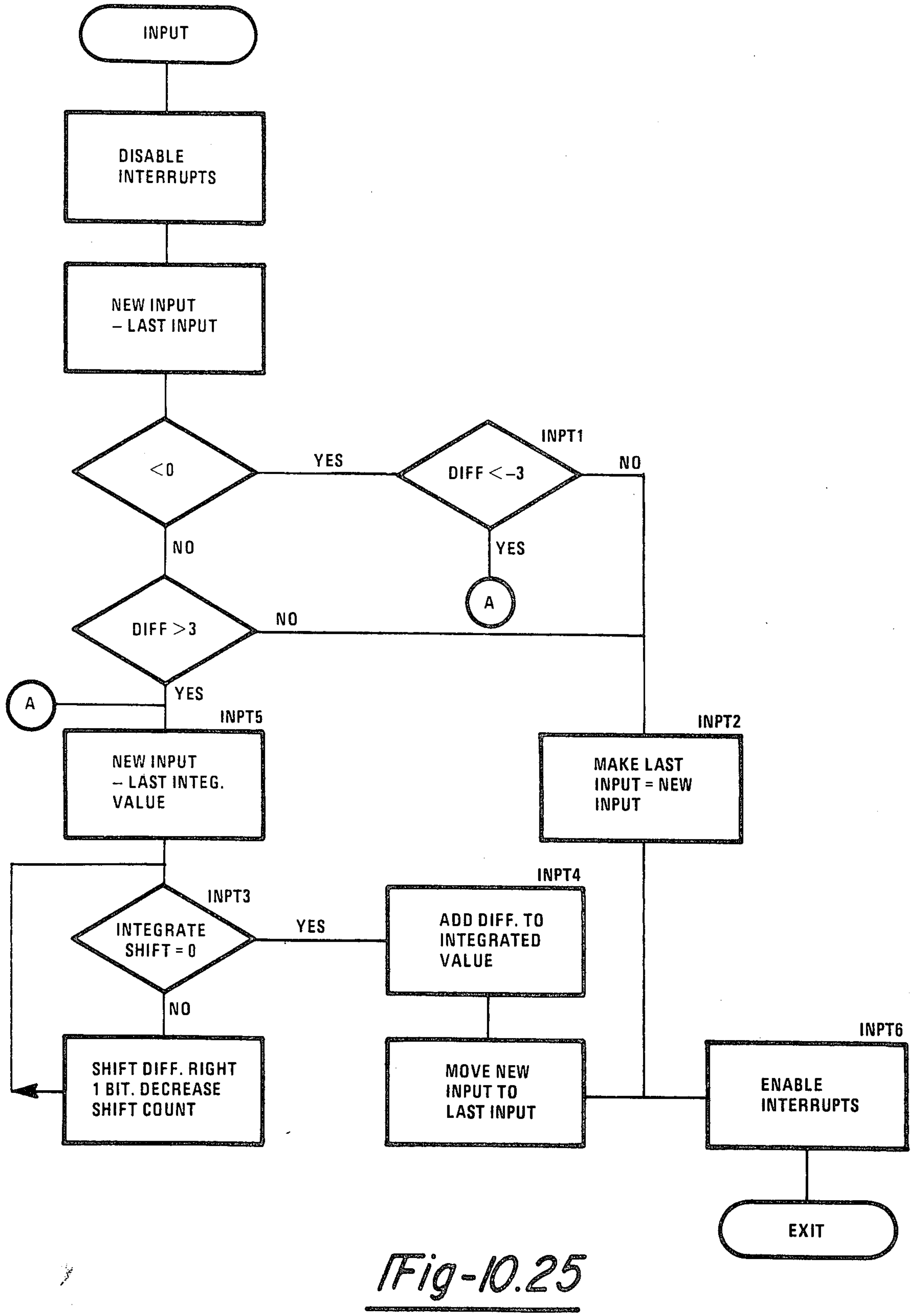
Fig-10.25
INPUT DATA INTEGRATION ROUTINE

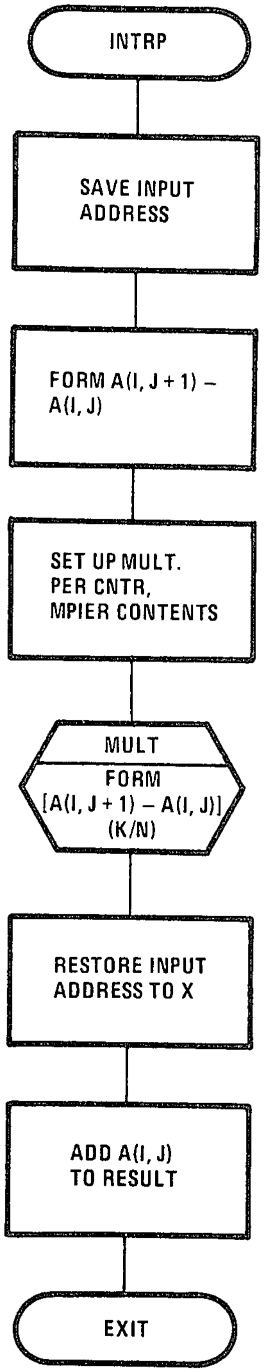
FIG-10.26
DOUBLE LINEAR INTER POLATION ROUTINE

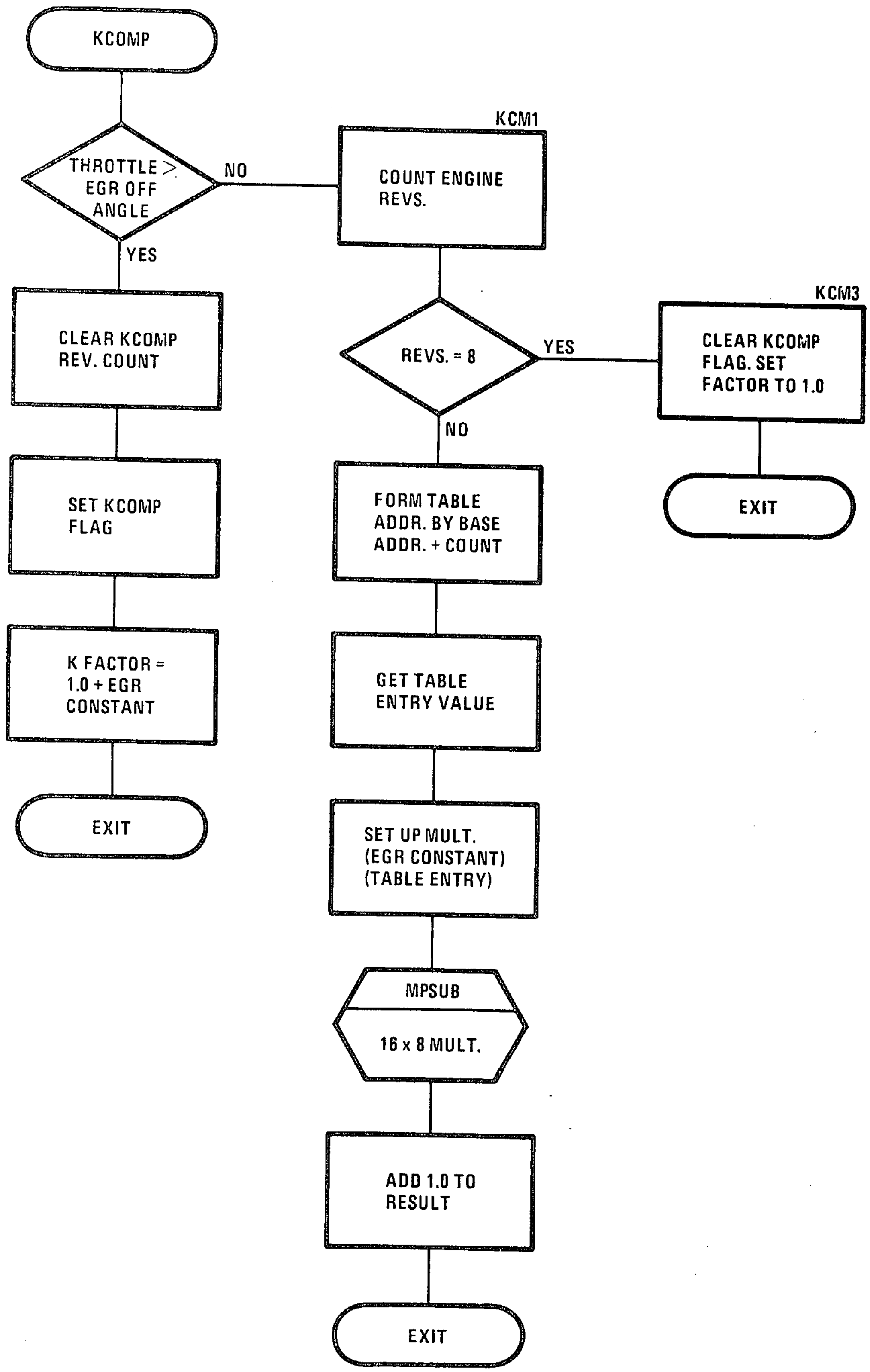
Fig-10.27
ROUTINE TO COMPUTE EGR CONSTANT MULTIPLIER

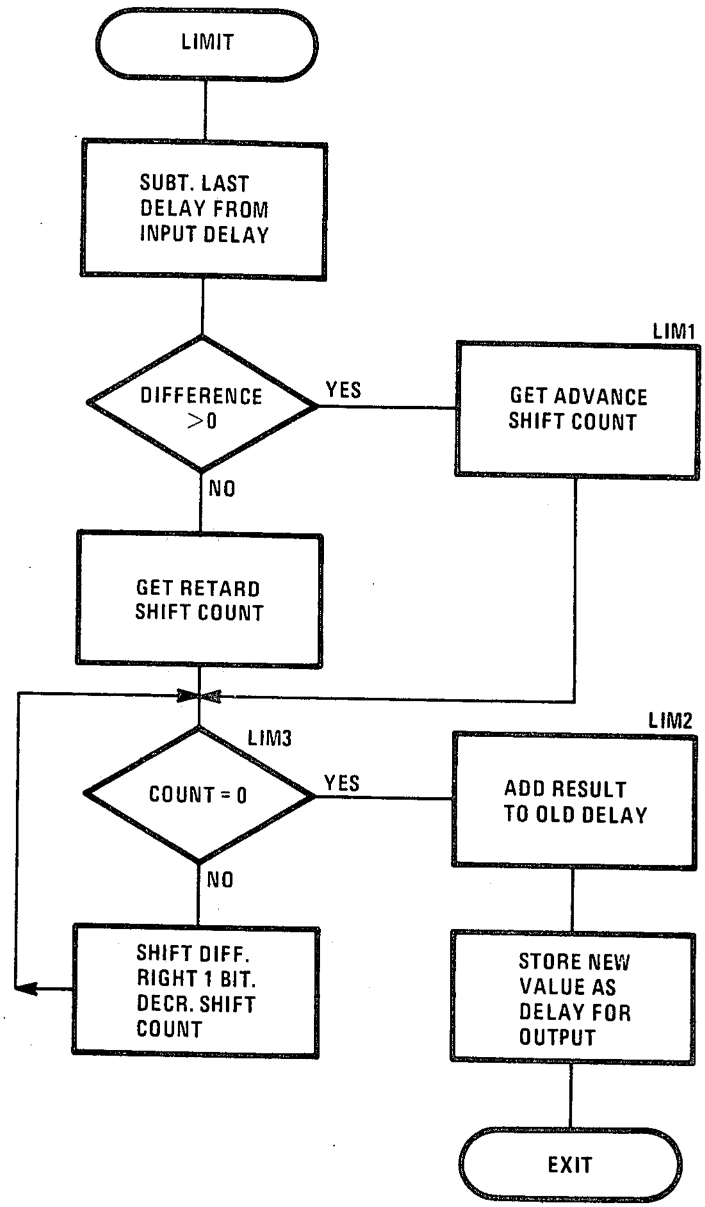
Fig-10.28
ROUTINE TO RATE LIMIT
IGNITION ADVANCE OR RETARD

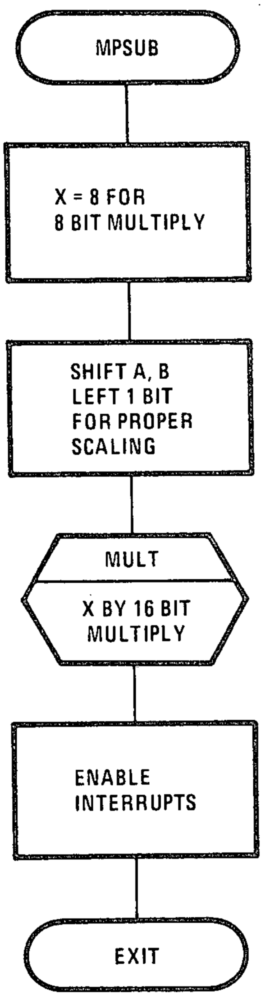
Fig-10.29
8 X 16 MULTIPLICATION ROUTINE

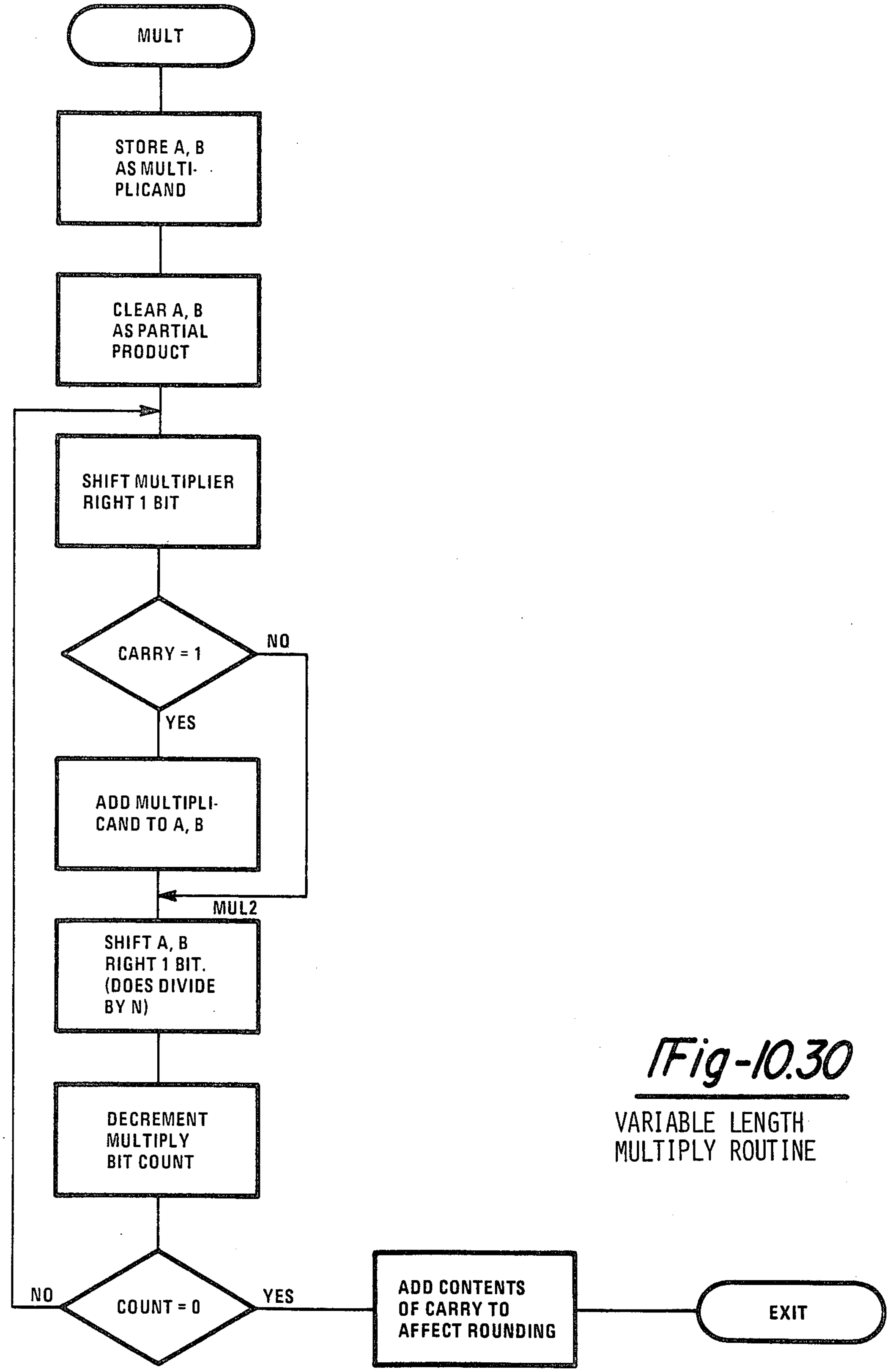
Fig-10.30
VARIABLE LENGTH MULTIPLY ROUTINE

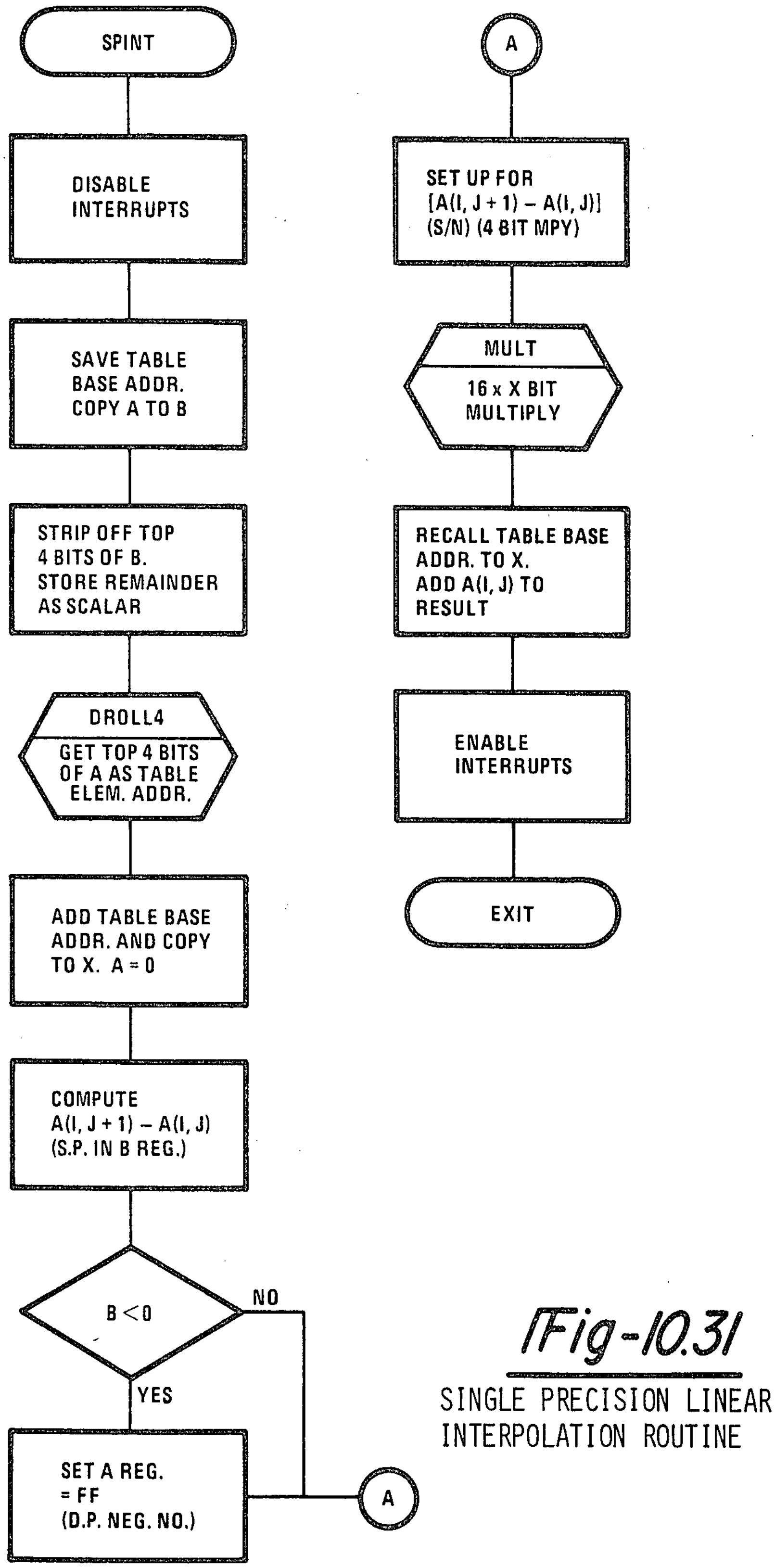
Fig-10.31
SINGLE PRECISION LINEAR INTERPOLATION ROUTINE

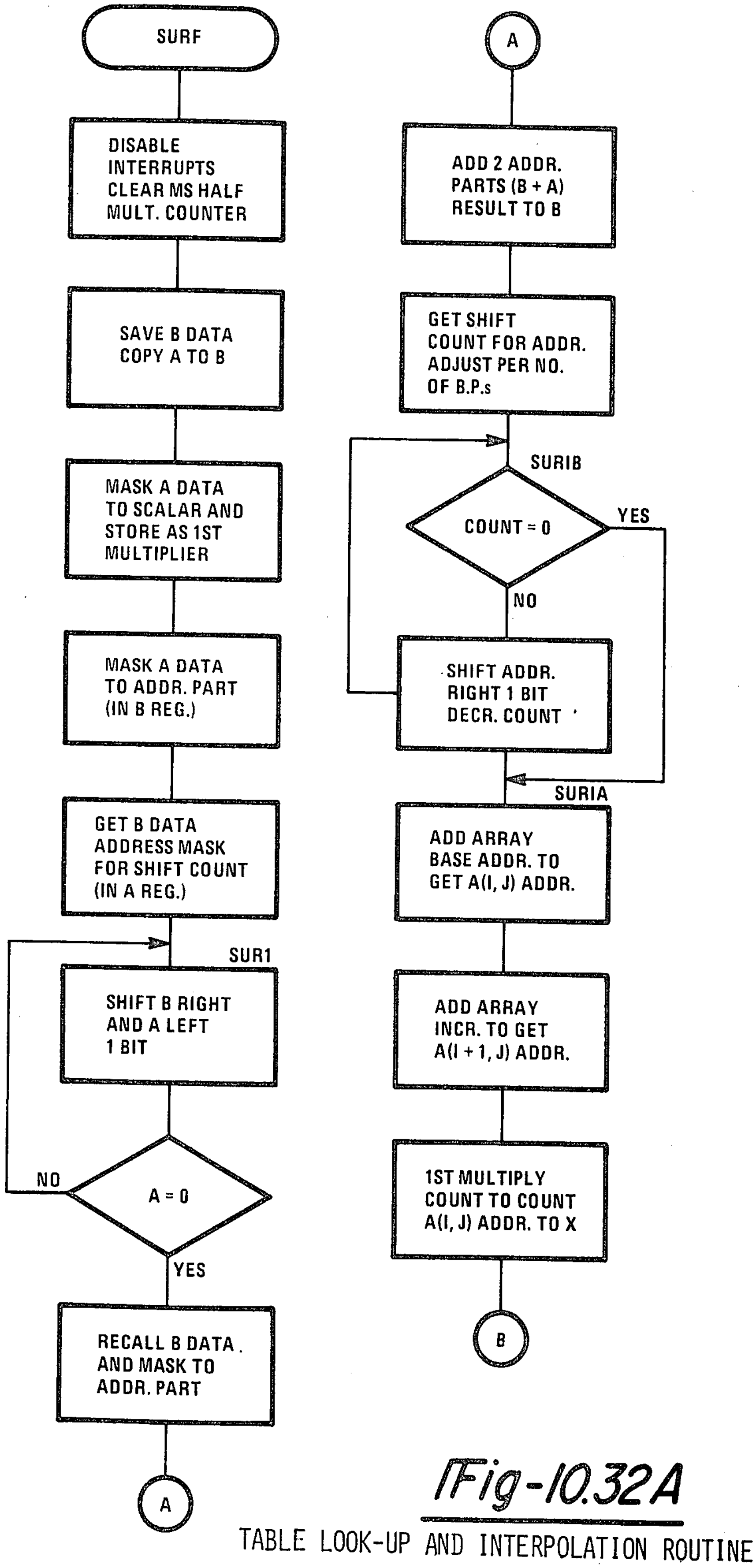
Fig-10.32A
TABLE LOOK-UP AND INTERPOLATION ROUTINE

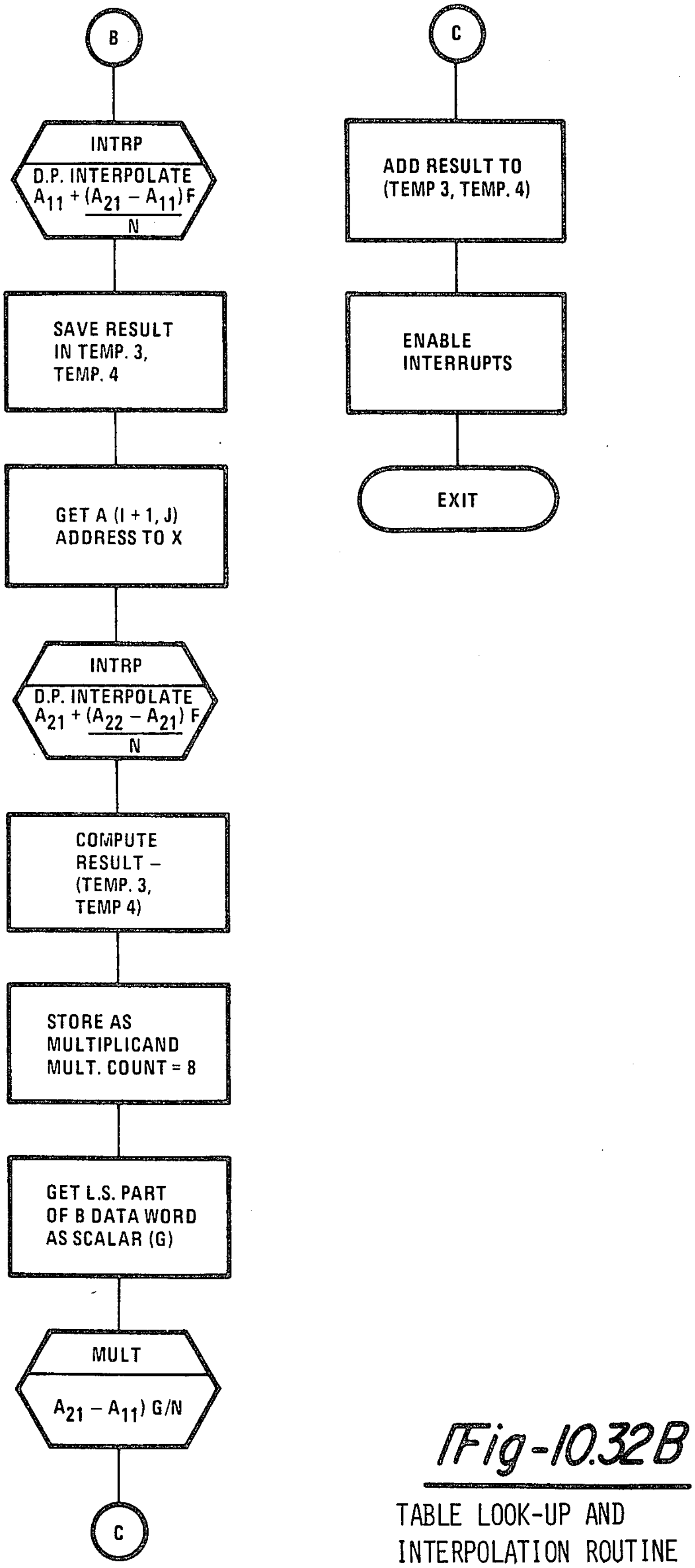
Fig-10.32B
TABLE LOOK-UP AND
INTERPOLATION ROUTINE

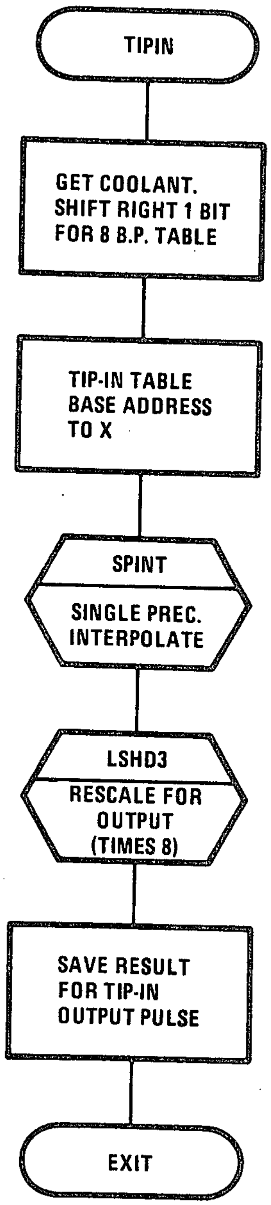
Fig-10.33
TIP-IN FUEL PULSE COMPUTATION ROUTINE

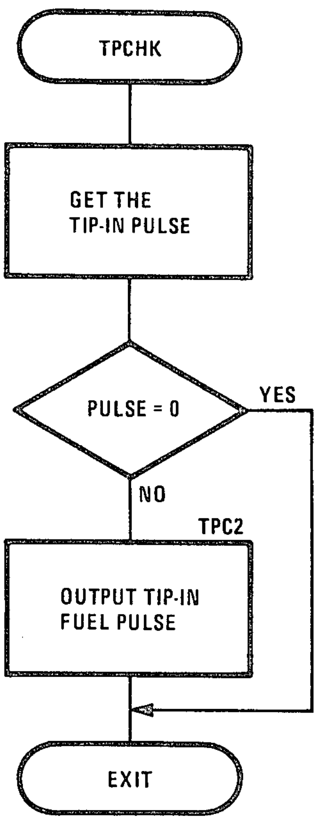
Fig-10.34
TIP-IN FUEL PULSE OUTPUT ROUTINE

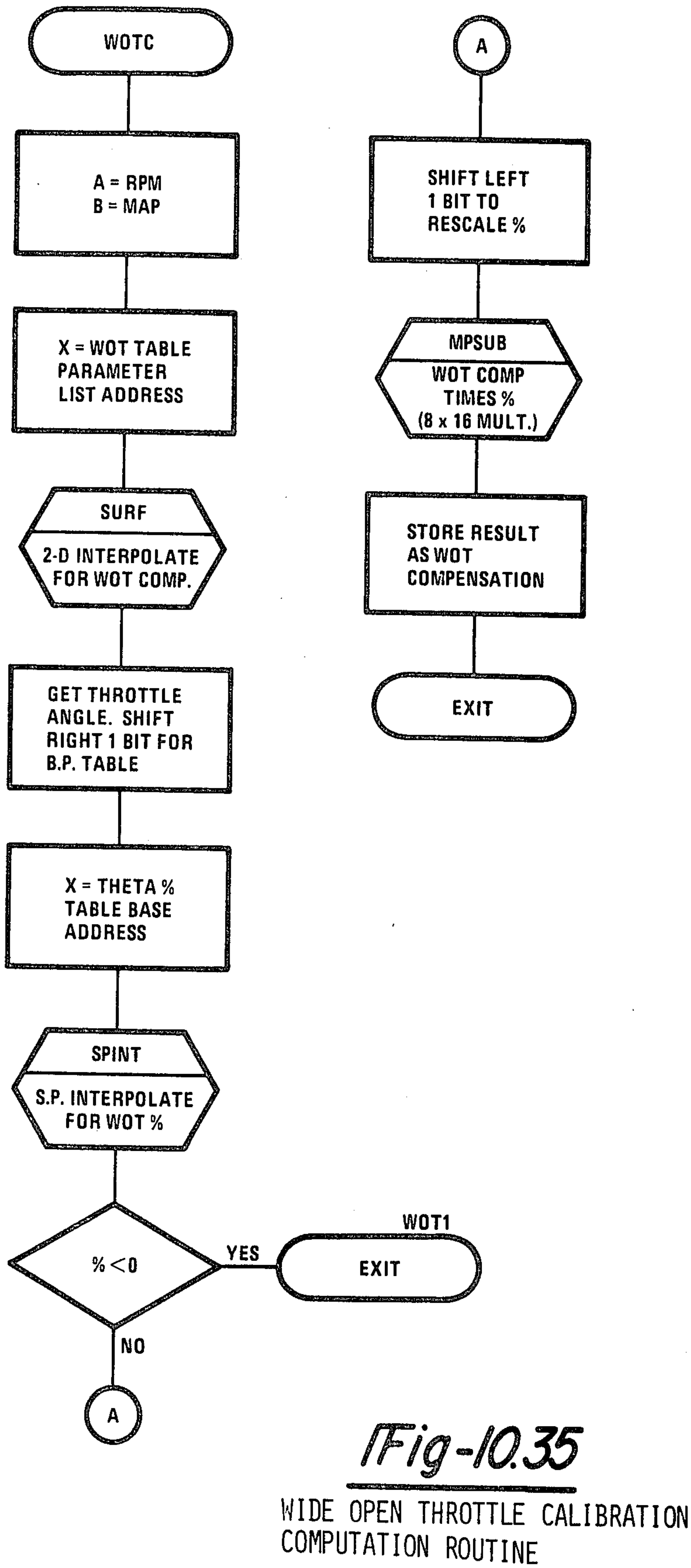
Fig-10.35
WIDE OPEN THROTTLE CALIBRATION COMPUTATION ROUTINE

MICROPROCESSOR-BASED ELECTRONIC ENGINE CONTROL SYSTEM

BACKGROUND OF THE INVENTION

1. Field of the Invention

This invention relates generally to a method and apparatus for controlling an internal combustion engine and more particularly to a microprocessor-based electronic engine control system having a memory preprogrammed with various control laws and control schedules and being responsive to one or more sensed engine-operating parameters for generating control signals for controlling one or more of such engine operating functions as, for example, fuel injection, ignition timing, EGR control, and the like.

2. Statement Of The Prior Art

Many of the patents of the prior art recognize the need for employing the enhanced accuracy of digital control systems for more accurately controlling one or more functions of an internal combustion engine.

U.S. Pat. No. 3,969,614 which issued to David F. Moyer, et al on July 13, 1976 is typical of such systems as are U.S. Pat. No. 3,835,819 which issued to Robert L. Anderson, Jr. on Sept. 17, 1974; U.S. Pat. No. 3,904,856 which issued to Louis Monptit on Sept. 9, 1975; and U.S. Pat. No. 3,906,207 which issued to Jean-Pierre Rivere, et al on Sept. 16, 1975. All of these Patents represent a break-away from the purely analog control systems of the past, but neither the accuracy, reliability, or number of functions controlled is sufficient to meet present day requirements.

Future internal combustion engines will require that emissions be tightly controlled due to ever-increasing governmental regulations, while fuel consumption is minimized and drivability improved over the entire operating range of the engine. None of the systems of the prior art provide a method and apparatus for controlling the operation of an internal combustion engine with sufficient accuracy to attain minimal emissions and minimal fuel consumption together with improved drivability.

The systems of the prior art attempt to control one or more of the engine operating functions but none attempts to control the operation of the fuel pump, fuel injection, engine ignition timing, on-off and/or proportional EGR control, and the like while using feedback from such devices as oxygen sensors for emission control purposes or for effecting a closed loop fuel control made of operation while including provisions for optimizing acceleration enrichment handling, and the like.

These and other problems of the prior art are solved by the microprocessor-based electronic engine control system of the present invention which eliminates most or all of the problems of the prior art and enables a commercially feasible implementation of a digital control system having a relatively low cost, and which is easy to repair and maintain. The system of the present invention is able to implement much more advanced and complex fuel control laws and expand the various control funtions performed thereby to include, in addition to fuel injection, ignition timing and on-off and/or proportional EGR control while, at the same time, reducing the cost and size of the unit and increasing reliability so as to render the system commercially feasible.

These and other objects and advantages of the present invention will be accomplished by the present method and apparatus for the electronic engine control of nearly all engine functions while simultaneously providing many safety features together with increased accuracy and ease of adaption to the internal combustion engines of modern vehicles.

SUMMARY OF THE INVENTION

A method and apparatus for controlling one or more of the operating functions of an internal combustion engine such as the on-off control of the fuel pump, the control of fuel injection, ignition timing and pulse-width control, on-off and/or proportional EGR control, and the like, as well as making provisions for implementing closed loop control of various engine-operating functions. The system of the present invention includes a program-controlled microprocessor which is entirely interrupt driven. Memory means associated with the microprocessor are used to store program routines for implementing various control laws and the subroutines required for the implementation thereof as well as look-up tables or schedules of control values required for implementation of said control laws. Means for sensing engine speed or period are provided and various clock-controlled operations are synchronized thereto so that the present system operates on a clock-normalized to the engine speed which is particularly useful in controlling the I/O circuitry associated therewith. The I/O input circuitry converts inputs from sensors monitoring one or more engine operating parameters into pulse-width modulated signals which are subsequently converted into binary codes for transfer to the microprocessor system. Based on the programs stored in the memory associated with the microprocessor, the microprocessor monitors the present engine operating conditions via the sensors and various hardware features for detecting failures and the like and, via interrupts supplied to the computer, controls the execution of the stored control laws to output the appropriate engine control commands.

Many independent yet inter-related novel features are present in the microprocessor-based electronic engine control system of the present invention including:

(1) The use of a programmable engine control system which can control fuel flow only, ignition timing only, on-off and/or proportional EGR control only, or any combination thereof, including all three combined;

(2) System partitioning whereby some of the very high speed simpler sensing and control operations are performed in I/O digital input circuitry and the more complex slower varying functions are performed in the microprocessor so as to maximize the use of a standard microprocessor while minimizing the custom interface and thereby reducing its attendant cost while increasing the system flexibility;

(3) The system provides for a variable allocation of the microprocessor computing capability to select the control functions on the basis of engine speed. The desired update rate for the control commands is generally based on engine revolutions and as the engine speed increases, the number of computations that can be performed per revolution decreases. Therefore, to effectively use the changing computing power per revolution, it is automatically apportioned such that certain control functions such as fuel control are updated once per revolution at lower engine speeds until a first predetermined engine speed is reached and then once every other revolution thereafter as the speed increases and other control functions such as ignition timing are updated once per firing (four times per revolution on an eight cylinder engine) at low engine speeds and reduced down to two times per revolution as the engine speed increases past a second predetermined value and then once per revolution as the engine speed increases beyond a third predetermined value of engine speed;

(4) The method and apparatus of the present invention teaches a mapping approach which reduces a ten-bit input variable down to eight bits while keeping a relatively constant accuracy throughout the measurement range;

(5) The fuel control commands of the present invention are derived from a combination of a look-up table and interpolation operations which are extremely complex and highly accurate;

(6) Extra fuel commands for acceleration enrichment are provided through the same output circuitry as the main fuel command;

(7) Acceleration enrichment accomplished through a combination of an immediately generated fuel command following the detection of an acceleration input request and then a longer term programmed increase in the main fuel pulse via the preprogrammed control laws;

(8) Fuel control commands are modified to compensate for engine temperatures using look-up tables and interpolation operations;

(9) The present system provides for closed loop fuel control using either an oxygen sensor in the exhaust system of the engine or for closed loop fuel control using any other feedback signal, and closed loop control of other engine control functions could also be implemented using the teachings of this invention;

(10) Ignition timing is controlled by means of electronic delays determined by table look-up and interpolate operations;

(11) Ignition dwell time is electronically controlled as a function of engine speed by means of a table look-up and interpolation approach;

(12) The system of the present invention automatically switches from electronic control of ignition timing to mechanical control during engine cranking if desired;

(13) The system of the present invention allows the ignition timing to be electronically varied from advance to retard and back to advance without loss of firing;

(14) The system of the present invention can either control on-off EGR or proportional EGR;

(15) The preferred embodiment of the present invention utilizes two separate fuel pulse output commands, but a single command or a number of command corresponding to the number of injectors could be used with only minor alterations in the output circuitry;

(16) Both group injection and simultaneous double fire modes of operation can be controlled with the system of the present invention;

(17) the microprocessor-based electronic engine control system of the present invention is automatically reinitialized if random noise results in the continuous execution of an errneous program loop and means are further provided for insuring that if reinitialization is ineffective, "a fail condition" is flagged; and

(18) Various system failures, such as clock failure, a stall condition, or the like are automatically flagged by the microprocessors and may be used for other purposes, as safety dictates. Furthermore, various failure indications may be used to activate a limp-home type circuit to enable the vehicle to travel a short distance for repairs even through the engine control system itself has failed.

Other advantages and meritorious features of the present invention will be more fully understood from the following detailed description of the drawings and the preferred embodiment, the appended claims and the drawings, which are briefly described hereinbelow.

BRIEF DESCRIPTION OF THE DRAWINGS

FIG. 3I is an electrical timing diagram used to illustrate the operation of the circuit of FIGS. 3H and 3J;

FIG. 4 is a block diagram of the binary encoder circuitry of block 122 of FIG. 2;

FIG. 4C1 is an electrical schematic diagram of the counter control logic circuitry of block 454 of FIG. 4C;

FIG. 4C2 is an electrical schematic diagram of the ramp reset control counter circuitry of block 455 of FIG. 4C;

FIG. 4C3 is a count state table for the eight stage counters of FIGS. 4C2, 4D7, and 4D9;

FIG. 4C4 is an electrical schematic diagram of the window control counter system of block 456 of FIG. 4C;

FIG. 4C5 is a ten-page count state table for the window counter of FIG. 4C4;

FIG. 4C6 is a combined block and schematic diagram of a window counter system with range selection which represents and alternate embodiment to the window control counter system of FIG. 4C4;

FIG. 4C7 is an electrical schematic diagram of the pulse-width counter number one circuitry associated with block 457 of FIG. 4C;

FIG. 4C8 is an electrical schematic diagram of the pulse-width counter number two circuitry associated with block 458 of FIG. 4C;

FIG. 4C9 is an electrical schematic diagram of the pulse-width counter number three circuitry associated with block 459 of FIG. 4C.

FIG. 4D1 is an electrical schematic diagram of the divide-by 16 counter of block 641 of FIG. 4D;

FIG. 4D2 is a count state table for the three stage counter of FIG. 4D1;

FIG. 4D3 is an electrical schematic diagram of the synchronizer circuitry of block 642 of FIG. 4D;

FIG. 4D4 is a count state table for the seven stage counter 715 of FIG. 4D3;

FIG. 4D5 is an electrical schematic diagram of the counter circuitry of block 643 of FIG. 4D;

FIG. 4D6 is a count state table for the four stage preset table counter 750 of FIG. 4D5;

FIG. 4D7 is an electrical schematic diagram of the counter circuitry associated with block 644 of FIG. 4D;

FIG. 4D8 is a count state diagram for the six stage counters of FIGS. 4D7, 4D11, 4D12 and 4D14;

FIG. 4D9 is an electrical schematic diagram of the sampler circuitry of block 645 of FIG. 4D;

FIG. 4D10 is an electrical schematic diagram of the sensor test control circuitry of block 646 of FIG. 4D;

FIG. 4D11 is an electrical schematic diagram of the channel number one sampling counter and register circuitry of block 647 of FIG. 4D;

FIG. 4D12 is an electrical schematic diagram of the channel number two sampling counter and register circuitry of block 648 of FIG. 4D;

FIG. 4D13 is an electrical schematic diagram of the sampling counter multiplexer of block 649 fo FIG. 4D;

FIG. 4D14 is an electrical schematic diagram of the binary to pulse-width converter of block 650 of FIG. 4D;

FIG. 4F is an electrical schematic diagram of the crankshaft position pulse processor circuitry of block 416 of FIG. 4;

FIG. 5 is a block diagram of the microcomputer system of block 123 of FIG. 2 and various circuits associated therewith;

FIG. 5A1 is an electrical schematic diagram of the power-on reset generator circuitry of block 1142 of FIG. 5A;

FIG. 5A2 is an electrical schematic diagram of the buffer logic circuitry of block 1143 of FIG. 5A;

FIG. 5A3 is an electrical schematic diagram of the clock fail detector circuitry of block 1144 of FIG. 5A;

FIG. 5A4 is an electrical schematic diagram of the MPU reset control circuit of block 1145 of FIG. 5A;

FIG. 5A5 is an electrical schematic diagram of the watchdog circuit of block 1146 of FIG. 5A;

FIG. 5A6 is a count state table for the shift counter of FIG. 5A5;

FIG. 5A7 is a count state table for the binary counter of FIG. 5A5;

FIG. 6 is a block diagram of the binary decoder system of block 124 of FIG. 2 and the circuitry generally associated therewith;

FIG. 6C is an electrical schematic diagram of the ignition delay storage register of block 2113 of FIG. 6; FIG. 6D is an electrical schematic diagram of the transfer logic network associated with block 2114 of FIG. 6;

FIG. 6J1 is a count state table for the shift register counter of FIG. 6J;

FIG. 7 is a block diagram generally illustrating the power control circuitry and analog output circuitry associated with block 125 of FIG. 2;

FIG. 7C1 is an electrical schematic diagram of the voltage-to-current converter circuitry of block 3011 of FIG. 7C;

FIG. 7C2 is an electrical schematic diagram of the precision current sink circuitry of block 3012 of FIG. 7C;

FIG. 7C3 is an electrical schematic diagram of a comparator circuitry of block 3013 of FIG. 7C;

FIG. 7C4 is an electrical schematic diagram of the SR flip-flop circuitry of the block 3014 of FIG. 7C;

FIG. 7C5 is an electrical schematic diagram of the injector clamp control circuitry of block 3015 of FIG. 7C;

FIG. 7C6 is an electrical schematic diagram of the driver circuitry associated with block 3016 of FIG. 7C; FIG. 7C7 is an electrical schematic diagram of the sensing resistor and short protection circuitry of block 3017 of FIG. 7C;

FIG. 7C8 is an electrical schematic diagram of the injector short protection circuitry of block 3018 of FIG. 7C;

FIG. 7C9 is an electrical schematic diagram of the bias circuitry of block 3019 of FIG. 7C;

FIG. 7C10 is an electrical schematic diagram of the injector current control circuit block 3020 of FIG. 7C;

FIG. 8 is a block diagram illustrating a conventional MC 6875 clock oscillator with the related inputs and outputs which is used in the preferred embodiment of the present invention and as the master-clock oscillator of block 134 of FIG. 2;

FIG. 9 is a schematic diagram illustrating the read-only memory (ROM) notion utilized throughout this application including the drawing symbol or notation, the actual transistor schematic diagram, and the logic element equivalent;

FIGS. 9.1A and B represent equivalent logic symbols for an inverter as used in the present application and an electrical circuit implementation thereof;

FIGS. 9.2A and B represent equivalent logic symbols for a two input NOR circuit and a schematic implementation thereof;

FIGS. 9.3A and B represent equivalent logic symbols for a three input NOR gate and an electrical schematic implementation thereof;

FIGS. 9.4A and B represent equivalent logic symbols for a four input NOR gate and an electrical circuit implementation thereof;

FIGS. 9.5 A and B represent equivalent logic symbols for a five input NOR gate and an electrical circuit implementation thereof;

FIGS. 9.6A and B represents equivalent logic symbols for a six input NOR gate and a circuit schematic implementation thereof; FIGS. 9.7A and B show equivalnet logic symbols for a two input NAND gate and the preferred circuit implementation thereof;

FIGS. 9.8A and B represent equivalent logic symbols for a three input NAND gate and the preferred circuit implementation thereof;

FIGS. 9.9A and B show equivalent logic symbols for a two input AND/ three input NOR gate network and the preferred circuit implementation thereof;

FIGS. 9.10A and B show two equivalent logic symbols for a three input AND/ three input NOR gate network and the preferred circuit implementation thereof;

FIGS. 9.11A and B show equivalent logic symbols for a three input AND, two input AND/ two input NOR gate configuration and the preferred circuit implementation thereof;

FIGS. 9.12A and B show a dual two input AND/ two input NOR gate configuration and the preferred circuit implementation thereof;

FIGS. 9.13A and B represent the logical designation for a two input AND/ two input OR/ two input NAND gate configuration and the preferred circuit implementation thereof;

FIGS. 9.14A and B show equivalent logical designations for a two input AND/two input NOR gate configuration and the preferred circuit implementation thereof;

FIGS. 9.15A and B show the logic symbol designation for a two input OR (two input AND), three input AND/ two input NOR gate configuration and the preferred circuit implementation thereof;

FIGS. 9.16A and B show equivalent logic diagrams of a two input OR/ two input NAND gate configuration and the preferred circuit implementation thereof;

FIGS. 9.17A and B show equivalent logic designations for a dual two input OR/ two input NAND gate configuration and the preferred circuit implementation thereof;

FIGS. 9.18A and B show equivalent logic symbols for a three input NOR, two input NOR/ two input AND gate configuration and the preferred circuit implementation thereof;

FIGS. 9.19A and B show the logical symbol for a two input NAND (two input OR), dual two input AND/ two input NOR gate configuration and preferred circuit implementation thereof;

Figure 10:
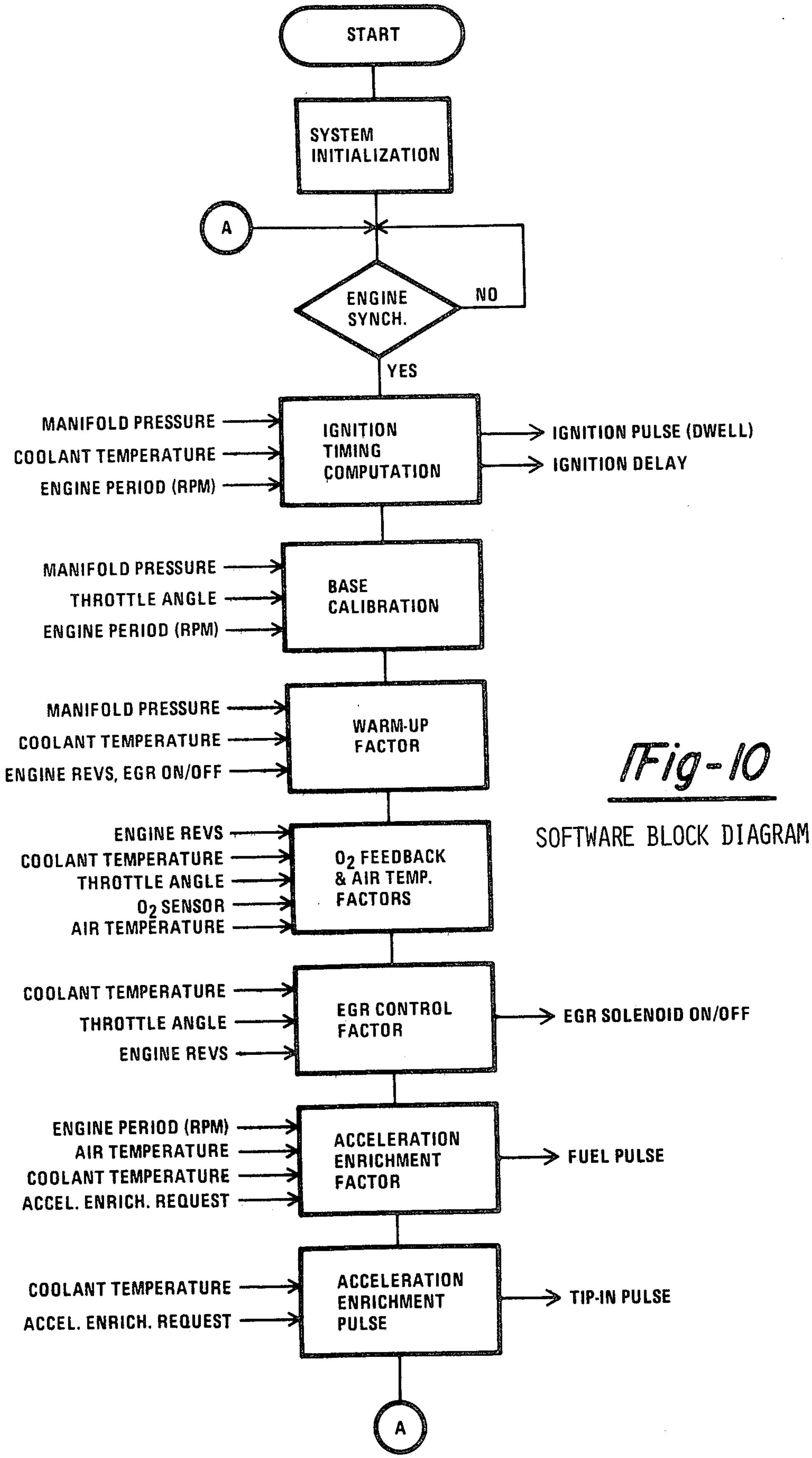
Figure 107B:
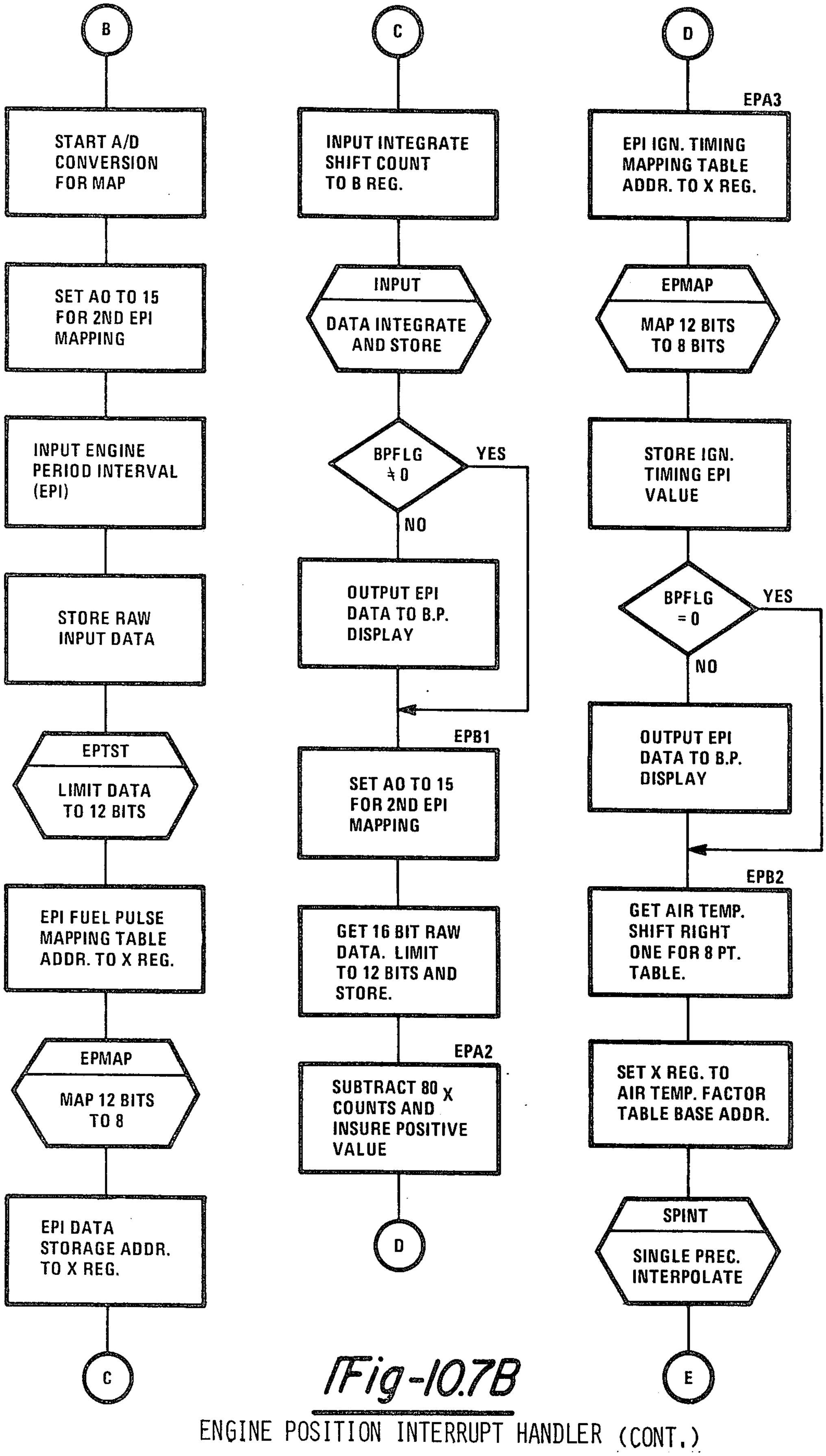

FIGS. 9.20A and B show the logic designation for an RS clocked flip-flop and the preferred circuit implementation thereof;

FIGS. 9.21A and B show the logic designation for an RS, Dr clock flip-flop and the preferred circuit implementaion thereof;

FIGS. 9.22A and B show the logic designation of a two phase dynamic flip-flop and the preferred circuit implementation thereof;

FIGS. 9.23A and B show the logic designation for a "D" flip-flop and the preferred circuit implementation thereof;

FIGS. 9.24A and B show the logic designation for a two phase dynamic DS, DR, flip-flop and the preferred circuit implementation thereof;

FIGS. 9.25A and B show the logic designation for a static shift register stage and the preferred circuit implementation thereof;

FIGS. 9.26A and B show the logic designation for a static shift registier stage with preset and the preferred circuit implementation thereof;

FIGS. 9.27A and B show the logic designation for a dynamic shift register stage with preset and preferred circuit implementation thereof;

FIGS. 9.28A and B show the logic designation of a two phase dynamic flip-flop with DR and DS inputs and the preferred circuit implementation thereof;

FIGS. 9.29A and B show the logic designation of half adder or subtractor circuit and the preferred circuit implementation thereof;

FIGS. 9.30A and B show the logic designation of a comparator circuit and the preferred circuit implementation thereof;

FIG. 10 is a block diagram of the software utilized in the preferred eombodiment of the microprocessor based electronic engine control system of the present invention;

FIG. 10.1 is a diagramatic flow chart illustrating the basic fuel control law implemented by the hardware and software systems of the present invention;

FIG. 10.2 is a block diagram illustration of the basic software structure utilized in the preferred embodiment of the present system;

FIG. 10.3 is a detailed flow diagram of the start-up routine implemented in the present system;

FIG. 10.4 is a detailed flow diagram of the interrupt handling routine used in the system of the present invention;

FIG. 10.5 is a detailed flow diagram of the acceleration enrichment interrupt routine used in the present system;

FIG. 10.6 is a detailed flow diagram of the fuel pulse complete interrupt routine used in the present system;

FIGS. 10.7A through 10.7F illustrate a detailed flow diagram of the engine position interrupt routine used with the present system;

FIG. 10.8 is a detailed flow diagram of the ignition timing computation routine of the present system;

FIG. 10.9A through 10.9D illustrate a detailed flow diagram of the fuel pulse computation routine used in the present system;

FIGS. 10.10A through 10.10I illustrate an even more detailed flow diagram of the fuel pulse computation routine used in the present system;

FIGS. 10.11A through 10.11C represent the detailed flow diagram of the oxygen compensation routine used in the present system;

FIG. 10.12 is a detailed flow diagram of the acceleration enrichment factor computation routine used in the present system;

FIG. 10.13 is a detailed flow diagram of the acceleration enrichment modifier routine used in the present system;

FIGS. 10.14A and B form a detailed flow diagram of the analog-to-digital data mapping routine used in the present system;

FIG. 10.15 is a detailed flow diagram of the delay computation routine used in the present system;

FIG. 10.16 is a detailed flow diagram of the double precision multiplication routine used in the present system;

FIG. 10.17 is a detailed flow diagram of the double precision negation routine used in the present system;

FIG. 10.18 is a detailed flow diagram of the double precision four place rotation routine used in the present system;

FIG. 10.19 is a detailed flow diagram of the engine period input data test routine used in the present system;

FIG. 10.20 is a detailed flow diagram of the A/D input data test routine used in the present system;

FIGS. 10.21A and B form a detailed flow diagram of the engine period input mapping routine used in the present system;

FIG. 10.22 is a detailed flow diagram of the fuel cut-off test routine used in the present system;

FIG. 10.23 is a detaled flow diagram of the fuel pulse output routine used in the present system;

FIG. 10.24 is a detailed flow diagram of the "A"-curve decay factor computation routine used in the present system;

FIG. 10.25 is a detailed flow diagram of the input data integration routine used in the present system;

FIG. 10.26 is a detailed flow diagram of the double precision linear interpolation routine used in the present system;

FIG. 10.27 is a detailed flow diagram of the EGR constant multiplier computation routine used in the present system;

FIG. 10.28 is a detailed flow diagram of the ignition rate limiting routine used in the present system;

FIG. 10.29 is a detailed flow diagram of the 8×16 multiplication routine used in the present system;

FIG. 10.30 is a detailed flow diagram of the generalized X by 16 bit multiplication (or divide by 2X) routine used in the present system;

FIG. 10.31 is a detailed flow diagram of the single precision linear interpolation routine used in the present system;

FIGS. 10.32A and B form a detailed flow diagram of the two dimensional surface interpolation routine used in the present system;

FIG. 10.33 is a detailed flow diagram of the tip-in fuel pulse computation routine used in the present system;

FIG. 10.34 is a detailed flow diagram of the tip-in fuel pulse output routine used in the present system; and FIG. 10.35 is a detailed flow diagram of the wide open throttle compensation computation routine used in the present system.

This application is one of fourteen applications filed on Feb. 27, 1978, all commonly assigned and having substantially the same specification and drawings, the fourteen applications being identified below:

| Serial Number | Title |
|---|---|
| 881,321 | Microprocessor-Based Electronic Engine Control System |
| 881,322 | Feedback-Compensated Ramp-Type Analog to Digital Converter |
| 881,323 | Input/Output Electronic For Microprocessor-Based Engine Control System |
| 881,324 | Switching Control of Solenoid Current in Fuel Injection Systems |
| 881,921 | Dual Voltage Regulator With Low Voltage Shutdown |
| 881,922 | Oxygen Sensor Qualifier |
| 881,923 | Ratiometric Self-Correcting Single Ramp Analog To Pulse Width Modulator |
| 881,924 | Microprocessor-Based Engine Control System Acceleration Enrichment Control |
| 881,925 | Improvements in Microprocessor-Based Engine Control Systems |
| 881,981 | Oxygen Sensor Feedback Loop Digital Electronic Signal Integrator for internal Combustion Engine Control |
| 881,982 | Improvements in Electronic Engine Controls System |
| 881,983 | Electronic Fuel Injection Compensation |
| 881,984 | Ignition Limp Home Circuit For Electronic Engine Control Systems |
| 881,985 | Oxygen Sensor Signal Conditioner |

DESCRIPTION OF THE PREFERRED EMBODIMENT

I. Introduction

In the following description, the method and apparatus of the invention are embodied in a microprocessor-based electronic engine control system as applied to a General Motors Corporation 350 cubic inch, V-8 internal combustion engine installed in a standard 1976 Cadillac Seville automobile. The engine is a conventional reciprocating piston, throttled, electronic fuel injected, spark-ignition internal combustion engine, but any type of engine having any conventional number of cylinders "N" can also be used with the system of the present invention.

Figure 1:
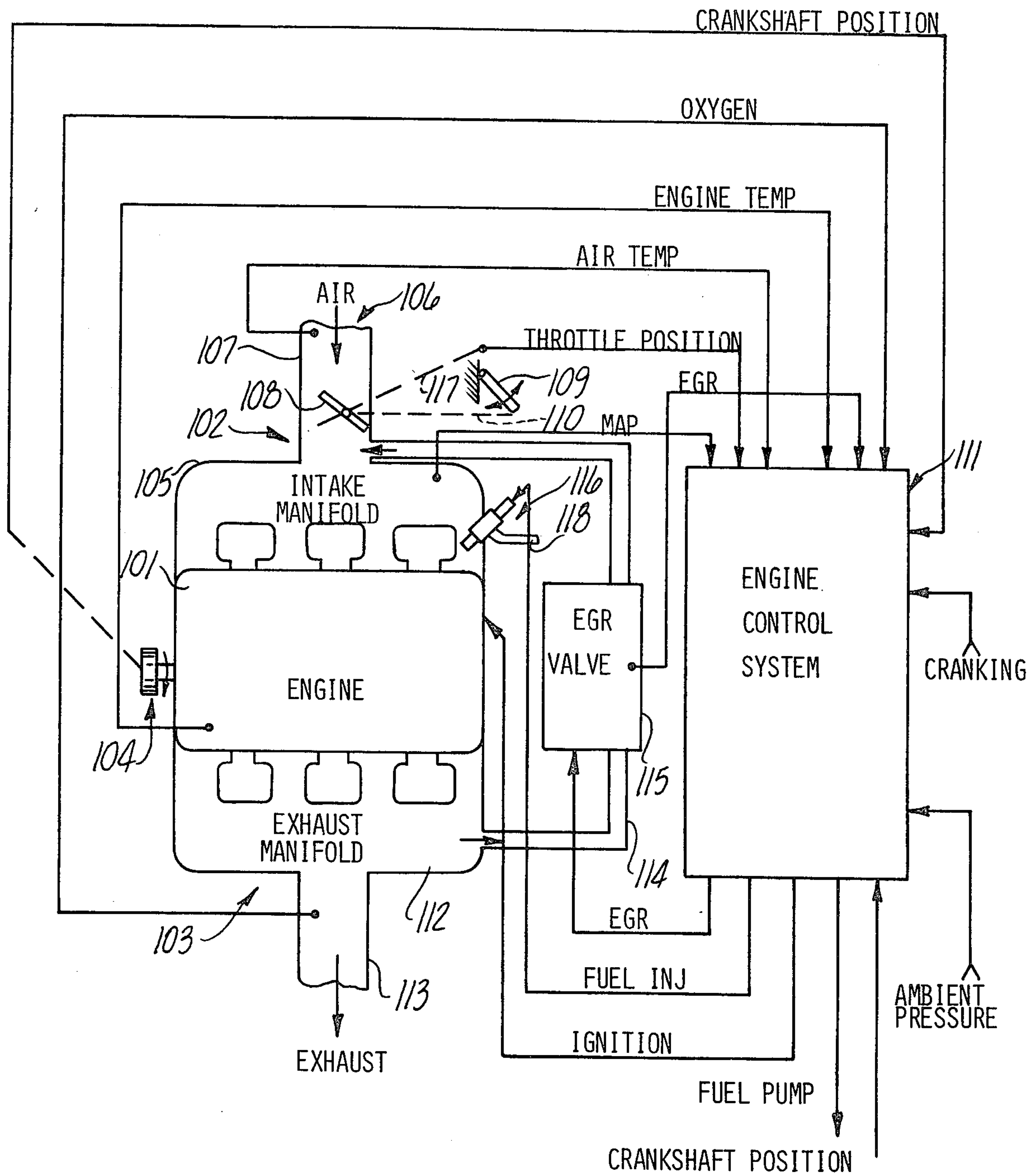
FIG. 1 is an overall block diagram of an internal combustion engine provided with the mircroprocessor-based electronic engine control system of the present invention.

FIG. 1 shows an internal combustion engine 101 having an intake system 102, an exhaust 103, and an output shaft 104 which is operatively rotated by the reciprocation of the individual pistons produced by the combustion of fuel and air within the individual cylinders of the engine 101, as conventionally known.

Figure 2:
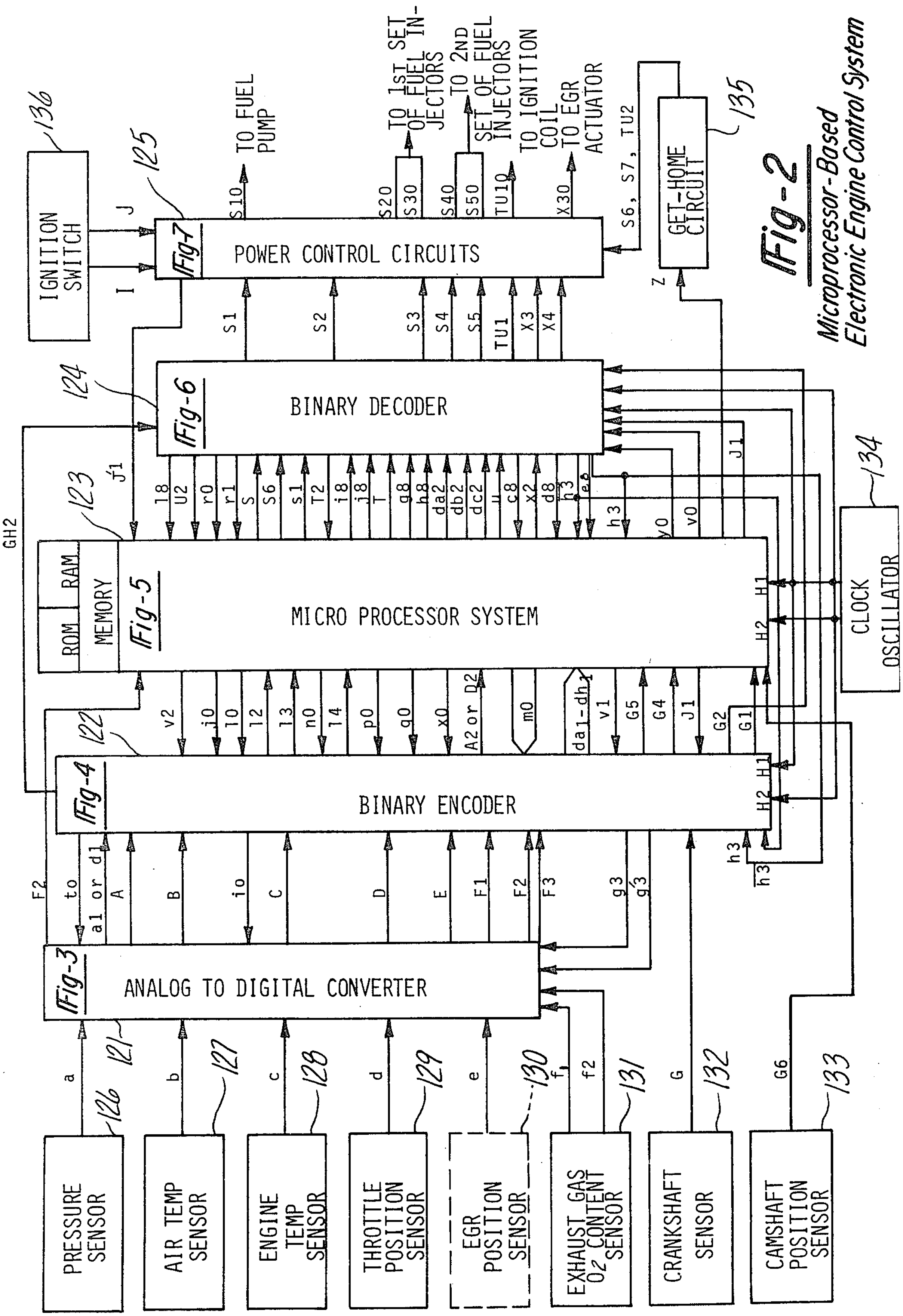
FIG. 2 is a broad block diagram of the microprocessor-based electronic engine control system of the present invention.

The intake system 102 includes an intake manifold 105, an air inlet assembly 106 and a throat 107 communicating the air inlet assembly 106 with the intake manifold 105. A throttle valve 108, such as a conventional butterfly valve or the like, is operatively disposed within the throat 107 to control the air flow between the inlet 106 and the intake manifold 105 for varying the air/fuel ratio, as conventionally known. An accelerator pedal 109 is conventionally used to vary the position of the throttle valve 108, as indicated by the dotted line 110 from the accelerator pedal 109 to the throttle or throttle valve 108. As conventionally known, the operator controls or commands the position of the accelerator pedal 109 to vary the air flow into the intake manifold 105 and the electronic engine control system 111 which, as illustrated in FIG. 2, operates to automatically and nearly instantaneously adjust various controlled variables to control or determine the operating characteristics of the engine 101 as hereinafter described.

The exhaust system 103 includes an exhaust manifold 112 and an exhaust outlet apparatus 113. A conduit 114 is provided for operatively connecting the exhaust manifold 112 of the exhaust system 103 back to the intake system 102 for supplying exhaust gases back to the intake system 102 for reducing the generation and emission of pollutants. An exhaust gas recirculation EGR) valve, generally represented by block 115, is operatively disposed in or at least partially within or operatively associated with the conduit 114 for regulating, controlling or metering the EGR flow back to the intake system 102.

The engine 101 of FIG. 1 is also provided with two groups of fuel injectors, represented generally by the singularly illustrated fuel injector 116 and each of the individual injectors 116 of both groups are operated simultaneously in parallel, via the mode of operation referred to as simultaneous double fire (SDF) in the prior art. In an alternate implementation, it is well known that each of the injectors 116 of a group may be operated simultaneously in parallel with each of the groups being operated on alternate engine revolutions and on different engine revolutions from the other groups referred to as two groups (TG) in the prior art. A fuel pump, not shown, but known in the art, is used via fuel lines 118 to the individual injectors 116 and to provide the necessary pressure so that the quantity of fuel injected into the individual cyclinders of the engine 101 is determined by the period of energization or operation of the injector 116 which is the primary controlled variable of the system of the present invention.

The controlled variables, that is, the variables which may be selectively adjusted or varied to control or determine the performance characteristic of the engine's energy conversion process include the fuel injection pulse-width which determines the period of energization of the injectors 116 and hence the quantity of fuel injected into the engine 101 and the timing thereof; the spark ignition, including advance angle in crankshaft degrees of rotation, firing and spark ignition dwell (time duration that the spark coil is energized); and the positioning of the EGR valve 115 to control exhaust gas recirculation.

Various sensors, detectors, etc. to be hereinafter described are positioned at various locations with respect to the internal combustion engine 101 and are used to measure or sense various engine operating parameters such as manifold absolute pressure; throttle position; coolant temperature; air temperature; the oxygen content of the exhaust gases; crankshaft and camshaft position for engine period information; ambient air pressure; engine cranking status; and the position of the EGR valve and the like. Signals indicative of these actual engine operating parameters are supplied to the microprocessor-based electronic engine control system 111 of the present invention which dynamically and continually computes the optimal controlled variables, e.g., the fuel-injection timing and pulse-width; the ignition firing advance and dwell; the EGR valve position, etc. These controlled variables are dynamically up-dated and recomputed to continually adjust the performance of the engine 101 so as to achieve an optimal balance between (a) minimizing the generation and emission of pollutants; (b) minimizing fuel consumption; and (c) optimizing vehicle drivability.

As hereinafter described, the microprocessor-based electronic engine control system 111 of the system of FIG. 1 utilizes programs and tables of optimal values stored in memory for optimizing the selection and adjustment of the controlled variables to obtain optimal engine performance under all operating conditions.

FIG. 2 is a broad block diagram of the microprocessor-based electronic engine control system of block 111 of FIG. 1 and illustrates the signal exhanges betwen the various blocks illustrating the system.

A plurality of sensors or detectors 126 to 133, as hereinafter described, supply signals to the analog to digital converter circuitry of block 121; to the binary encoder circuitry of block 122; or directly to the microprocessor system circuitry of block 123. Many of the outputs of the microprocessor system of block 123 are supplied to the binary decoder circuitry of block 124 which supplies decoded signals to the power control circuits of block 125 which then outputs signals to control the previously described controlled variables.

Block 126 represents a pressure transducer for sensing the absolute pressure existing within the intake system 102 of the internal combustion engine 101 of FIG. 1 and generates an analog output signal indicative of the absolute manifold pressure existing within the intake manifold 105. The pressure transducer of block 126 may be a conventional Gulton pressure transducer or, in the preferred embodiment of the present invention, a pressure transducer such as that disclosed in U.S. Pat. application Ser. No. 797,726 which was filed on May 17, 1977 and assigned to the assignee of the present invention, and incorporated by reference herein, but any conventional pressure transducer capable of accurately measuring the absolute manifold pressure existing within the intake system 102 may be used. The analog output of the pressure transducer 126 is an analog signal or voltage level represented by the letter "a" which is supplied to one input of the analog to digital converter circuitry of block 121 as hereinafter described.

The air temperature sensor of block 127 is preferably a thermistor-type device connected in an electrical circuit capable of producing a DC voltage having a variable level proportional to the ambient air temperature. A preferred location for the temperature sensor 127 is in the throat 107 of the air intake system 102 of the engine 101 somewhere upstream of the throttle valve 108. The DC electrical signal having a voltage proportional to the ambient air temperature existing in the throat 107 upstream of the throttle plate 108 is designated by the letter "b" and is transferred to another input of the circuitry of block 121.

The engine temperature sensor of block 128 is preferably a similar thermistor-type device mounted in the engine cooling system upstream of the usual engine control thermostat and having a negative temperature co-efficient. The thermistor of sensor 128 is connected in an electrical circuit capable of producing a DC voltage having a variable level proportional to the engine coolant temperature and this DC signal or voltage level is designated by the letter "c" which is supplied to a third input of the circuitry of block 121 as hereinafter described.

The throttle position sensor of block 129 may be any conventional device such as a strain gage, potentiometer or the like for generating a DC voltage proportional to the relative position of the throttle valve 108 from some reference position. For example, the transducer 129 may include a mechanical link, represented by the dotted line 117 of FIG. 1 and a one turn wire-wound potentiometer electrically connected in a voltage divider circuit for supplying a DC voltage level or signal proportional to the relative position of the throttle valve 108. The DC voltage is designated "d" and is supplied to still another input of the analog to digital converter circuitry of block 121. A similar transducer may be used as the EGR value position sensor of block 130 to supply a DC voltage signal "e" to a fifth input of the circuitry of block 21 which is proportional to the position of the EGR valve 115 of FIG. 1.

The exhaust gas oxygen content sensor or sensors of block 131 are conventional zirconia type oxygen sensors. These devices are electrochemical gas sensors which may, for example, include a hollow cylindrical tube of stabilized zirconium dioxide closed at one end. The outside of the tube is exposed to the exhaust gases and the inside of the tube is referenced to atmospheric oxygen. The zirconium dioxide acts as a solid electrolyte and the inside and outside surfaces are coated with platinum which serves as a catalyst and provides conductive electrodes which can be used to sense the electric potential produced by the sensor. The sensor has the unique characteric that the potential it produces varies characteristically from approximately 800 milivolts at a rich air/fuel ratio to 200 milivolts at a lean air/fuel ratio. In the rich condition, the outside of the sensor is exposed to gases containing near zero quantities of excess oxygen, allowing a maximum potential and at a point just slightly rich of stoichiometric however, appreciable amounts of excess oxygen appear in the exhaust gases and the potential drops abruptly in accordance with the Nernst equation $D=(RT/K)\ln(P_1/P_2)$. The gain or slope of this voltage change is so sharp and so abrupt as to be nearly comparable to that of a switch. Particularly important, of course, is the fact that is occurs at the ideal operating point of a conventional "three-way-catalyst". Because this characteristic is an inherent property of the oxygen sensor, it is not subject to drift and does not change significantly with age. Moreover, there are no unit-to-unit differences in the characteristics.

In the preferred embodiment of the present invention, one oxygen sensor is provided in each bank of a V-8 engine immediately before the two banks join. In the event that a single oxygen sensor is used, it would preferably be located at or immediately below the point where the two banks join in the exhaust outlet 113 of the exhaust system 103 of the engine 101.

Because of the high gain characteristics of the zirconia type oxygen sensor of block 131 near the stoichiometric air/fuel ratio, the sensor is often referred to as an air/fuel ratio or lamda (λ) sensor. In operation, the sensor or sensors of block 131 will produce a first DC level signal when a rich air/fuel ratio is detected and a second and distinct DC voltage when a lean air/fuel ratio is detected. These DC signal levels from the first and second oxygen sensors are designated by the letters "$f_1$" and "$f_2$", respectively, and are supplied to the analog to digital converter circuitry of block 121 of FIG. 3.

A particularly important characteristic of the oxygen sensors of block 131 is that their impedence decreases exponentially with temperature. Therefore, a very small output voltage is produced at low temperatures when the internal impedance of the sensor is extremely high so that the sensor output becomes unreliable or invalid below some predetermined operating temperature such as 300 degrees Centigrade or the like where its internal impedance is approximately one megaohm. As hereinafter described with respect to the circuitry of block 121, means are provided for testing the validity of the oxygen sensor signals from block 131 before the output readings are used for control purposes.

II. General Description of the Microprocessor-Based Electronic Control System of FIG. 2

The analog to digital converter circuitry of block 121 of FIG. 2 is primarily a group of analog circuits used to perform an analog to pulse-width conversion as hereinafter described. Each sensor input channel of the analog to digital converter circuitry of block 121 has a signal conditioner to achieve the proper impedence matching, polarity changing, and scaling of the sensed parameter prior to its conversion into a pulse-width. The primary function of the converter circuitry of block 121 is to convert or transform the analog voltage signal or level into a pulse-width digital signal, hereinafter called digital signal, which is proportional to and indicative of the value of the analog input signal from the particular sensor associated with a given channel.

The binary encoder circuitry of block 122 includes the digital portion of the circuits required for the analog to digital conversion and the circuitry for multiplexing the pulse-width converted signals indicative of the various analog inputs into a pulse-width to binary converter which transforms the pulse-widths into corresponding binary numbers or digital words indicative of the sensed engine operating parameters. The binary encoder circuitry of block 122 also includes circuitry for digitally processing the oxygen sensor information and circuitry for measuring time intervals between engine position pulses so that the sampling frequency of each sensor may be determined in normalized real time rather than actual real time as hereinafter described.

The binary words indicative of the actual sensed engine operating parameters are supplied to the microprocessor system of block 123 wherein a standard, low-cost, off-the-shelf microprocessor and standard units of memory are programmed to manipulate the incoming data in accordance with various programs and memory-stored one, two and three dimensional optimal surfaces and look-up tables, determined experimentally or the like. The microprocessor system of block 123 performs the required control law computations and table look-ups and outputs digital control words to the binary decoder circuitry of block 124. The microprocessor system of block 123 further includes means for processing camshaft position signals, interrupt control circuitry, command signal generators, reset control logic, buffers, and parallel-to-serial converters for transferring data to the binary decoders of block 124.

The binary decoder circuitry of block 124 receives the binary words indicative of the required timing and pulse-width of the fuel injection pulses; the ignition firing delay from the last crankshaft position pulse and ignition pulse-width information; and the EGR control function, and converts these digital words into pulse-widths capable of driving or actuating the power control circuits of block 125. The circuits of block 125 respond to the pulse-width inputs and supply the necessary drive current to operate the fuel injectors, fuel pump, ignition coils, EGR actuators and the like. Additionally, the circuitry of block 125 includes the power supply regulator circuitry of the present invention.

Additionally, the microprocessor-based electronic engine control system of FIG. 2 includes a crankshaft position sensor 132 which may be, for example, a conventional reluctance pick-up or magnetic transducer, optical transducer or the like capable of detecting timing marks, holes or cogs on the crankshaft 104 of the engine 101 or on some member such as a pulley affixed thereto for rotation therewith. The analog output of the engine crankshaft position sensor of block 132 is indicated by the letter "G" which is supplied to an input of the binary encoder circuitry of block 122 which includes pulse processing logic for conditioning the crankshaft sensor signal "G" and synchronizing the engine position pulse to the logic clock to generate one and only one clock period wide pulse for each engine position pulse detected.

The engine crank-shaft position sensor outputs the signal "G" which is representative of a particular point in the operating cycle of each individual engine cylinder, for example, this pulse could be indicative of some fixed angular rotation ahead of top dead center of the compression stroke for each cylinder, four-cycle, or the like. Therefore, on an eight cylinder engine, four engine position pulses would occur during each engine revolution. Similarly, on the six cylinder engine, the sensor would generate three engine position pulses per revolution and on a four cylinder engine, two pulses per revolution, etc. These signals are used to normalize the logic clock to the engine cycle and the normalized pulses are used to control various engine events.

A similar magnetic transducer or reluctance pick-up may be included within the camshaft position sensor circuitry of block 133 which senses some predetermined camshaft position for generating the output signal "G6" and supplies this signal to the microprocessor system of bloc 123 for interrupt control and engine event timing purposes as hereinafter described.

In the preferred embodiment of this invention, a camshaft position sensor and conditioning circuit such as disclosed in U.S. Pat. application Ser. No. 828,806 which was filed on Aug. 29, 1977 and which is assigned to the assignee of the present invention, is contemplated.

A crystal controlled master clock oscillator is represented by the block 134 which supplies accurate clock signals to the circuitry of blocks 122, 123 and 124. Additionally, various "get-home" or limp-home circuits may be coupled between the microprocessor system of block 123 and the power control circuits of block 125, as represented by block 135 to generate the necessary fuel injection pulse-width and ignition advance timing and dwell time to enable the automobile to function long enough to get to a service station or the like in the event of a major systems failure. Lastly, an ignition switch 136 supplies an "ignition-on" signal and a "starting" signal to the power control circuits of block 125 as hereinafter described.

The signal "S10" is outputted from the power control circuits of block 125 and used to supply switched power to actuate a conventional fuel pump, such as that disclosed in U.S. Pat. No. 2,980,090 which issued on Apr. 18, 1961 to R. W. Sutton, et al and which is assigned to the assignee of the present invention and incorporated by reference herein. The fuel pump, not shown but conventionally known—is connected to the fuel injector 116 by a suitable conduit 118. Similarly, the fuel pump is connected to the fuel tank by another conduit and it may be electrically operated by the output of the signal S10 for maintaining sufficient pressure on the fuel into the injector for insuring its injection while the fuel injectors 116 are in the open position.

The power control circuits of block 125 also supply the signals S20 and S30 to control the operation of the first set of fuel injectors and the signals S40 and S50 to control the operation of the second set of fuel injectors.

The fuel injectors 116 may be any conventional type of fuel injectors designed to be responsive to a pulse-width signal for opening a fuel injection valve or port for a period directly controlled by the duration or pulse-width of the signals supplied thereto. For example, the type of fuel injectors disclosed in the above-identified U.S. Pat. No. 2,980,090 or the type illustrated in U.S. Pat. No. 4,030,668 which issued to A. M. Kiwior on June 21, 1977, and which is assigned to the assignee of the present invention and incorporated by reference herein, may be used.

The output signal TU10 is supplied to a conventional ignition coil for controlling the spark timing as conventionally known and set forth in one or more of the above-referenced patents.

The output signal X30 may be supplied to an EGR actuator to control the positioning of the EGR valve 115 of FIG. 1 in any conventional manner. For example, the EGR valve 115 could include a butterfly valve connected by a mechanical linkage to a stepper motor with the stepper motor being electrically controlled by the electrical output signal X30. Similarly, the positioning of the EGR valve 115 could be controlled by standard on/off solenoid or a proportional actuator such as a servo motor as disclosed in U.S. Pat. application Ser. No. 855,493 filed on Nov. 28, 1977 which is assigned to the assignee of the present invention and which is incorporated by reference herein. See also commonly owned U.S. Pat. application Ser. No. 870,966 filed on Jan. 19, 1978 the disclosure of which is incorporated by reference herein.

III. Analog to Digital Converter Circuits

3.0 Broad Description of the Analog to Digital Converter Circuitry

Figure 3:
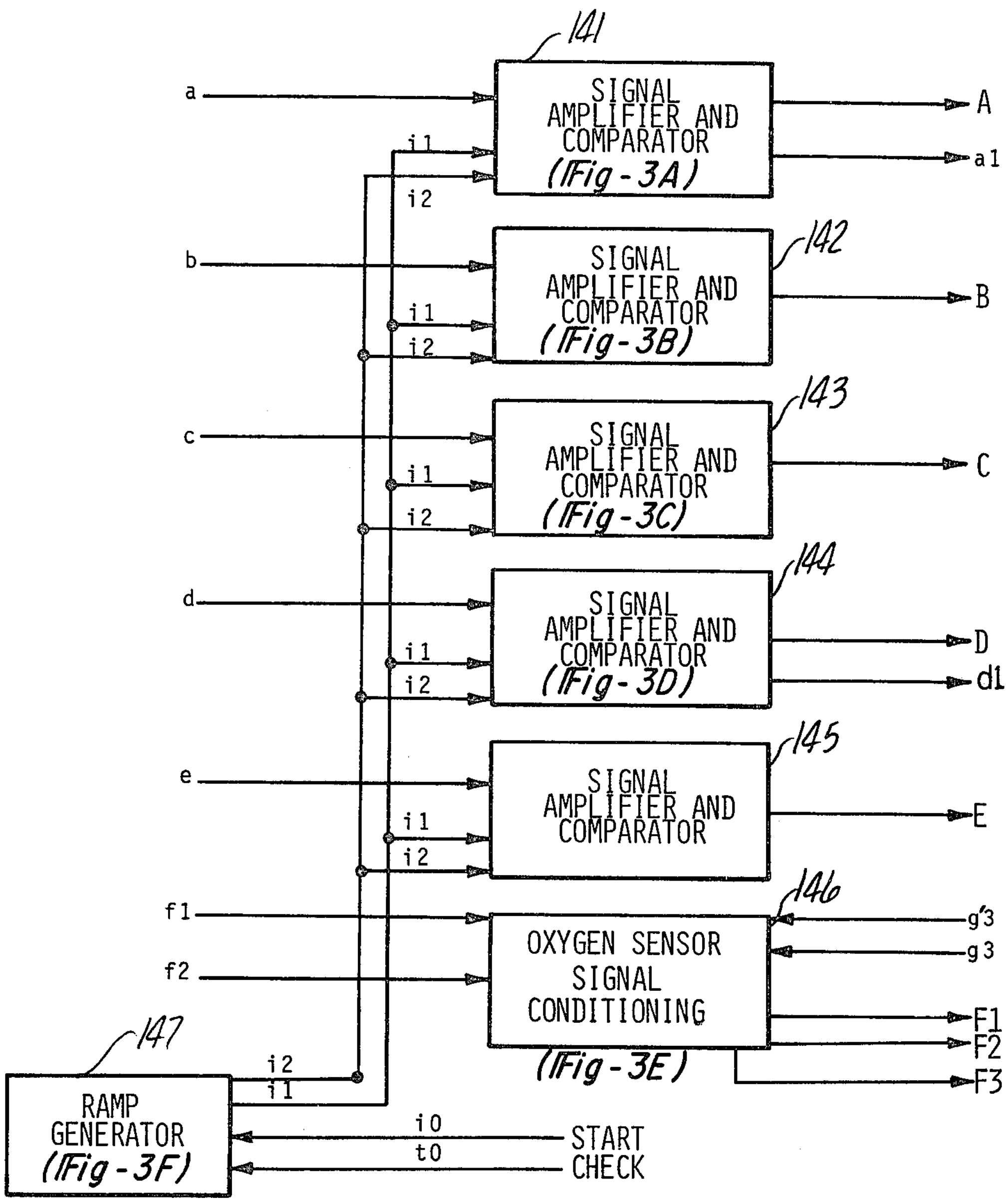
FIG. 3 is a block diagram of the analog-to-digital converter circuitry of block 121 of FIG. 2.

The analog to digital converter circuitry of block 121 of FIG. 2 is illustrated in a more detailed block diagram in FIG. 3. The signal amplifier and comparator circuitry of blocks 141, 142, 143, 144 and 145 each have one input adapted to receive the corresponding analog sensor output signals "a", "b", "c", "d" and "e" from the sensors of blocks 126, 127, 128, 129 and 130 of FIG. 2, respectively; a second input connected to the output of the ramp generator of block 147; and a third reference input, also from the ramp generator circuitry of block 147. The ramp generator of block 147 produces an extremely accurate voltage ramp which is initiated by a first signal to start at a predetermined reference level and then its output is checked after one or more predetermined time intervals to verify the accuracy of the ramp and make corrections, if necessary, as hereinafter described.

The signal amplifier and comparator circuits of blocks 141 through 145 perform the required signal conditioning to provide impedence matching, scaling and signal inversion, if needed, depending upon the sensor output signal supplied to the particular A/D converter input.

The primary outputs of the signal amplifier and comparator circuits of blocks 141, 142, 143, 144 and 145 supply pulse-width output signals A, B, C, D and E, respectively, to the binary encoder circuitry of block 122 of FIG. 2. The primary signal output of each of the blocks 141 through 145 is normally low but goes high as soon as the sampling period is begun after the signal $i_0$ is supplied from the binary encoder circuitry of block 122 to the ramp generator of block 147 to initialize the system to the reference level $i_2$ and begin the generation of the ramp voltage $i_1$. At this point, the outputs A, B, C, D, and E go high and remain high until the value of the ramp voltage becomes equal to the value of the corresponding analog input signals "a", "b", "c", "d", and "e". As soon as the ramp voltage $i_1$ has become equal to the analog input level, the output signal goes low so that the pulse-width or pulse duration of each of the output signals A, B, C, D and E is proportional to and indicative of the magnitude of the corresponding analog input signals "a", "b", "c", "d" and "e", respectively.

Additionally, a second output of the pressure sensor signal amplifier and comparator circuit of block 141 may supply an amplified analog signal $a_1$ and a second output of the throttle position sensor signal amplifier and comparator of block 144 may supply an amplified analog signal $d_1$ to the binary encoder circuitry of block 122 for monitoring the rate of change of manifold absolute pressure and/or throttle position, as hereinafter described.

The oxygen sensor signal conditioning system of block 146 receives as its inputs, the output signals $f_1$ and $f_2$ from the first and second oxygen sensors of block 131 of FIG. 2. In addition to appropriate amplification circuitry, the oxygen sensor signal conditioning system of block 146 directs the current to the oxygen sensors for impedence monitoring; establishes a stoichiometric threshhold level; and sets an inhibit threshhold level against which the impedence monitoring current is compared for generating an inhibit signal whenever the sensor temperature is below the required operating temperature for valid and reliable readings.

In addition to generating the required ramp voltage signal $i_1$, the ramp generator of block 147 establishes a reset or initial reference signal $i_2$ which is offset a predetermined amount from ground and this reference signal $i_2$ is also supplied to the amplifier circuitry of blocks 141 through 145 so that a ratiometric relationship is established between the ramp generator and the circuitry of blocks 141 through 145 so that their operation is relatively independent of fluctuations in power supply voltage as hereinafter described.

3.1 Pressure Sensor Signal Amplifier and Comparator Circuit

Figure 3A:
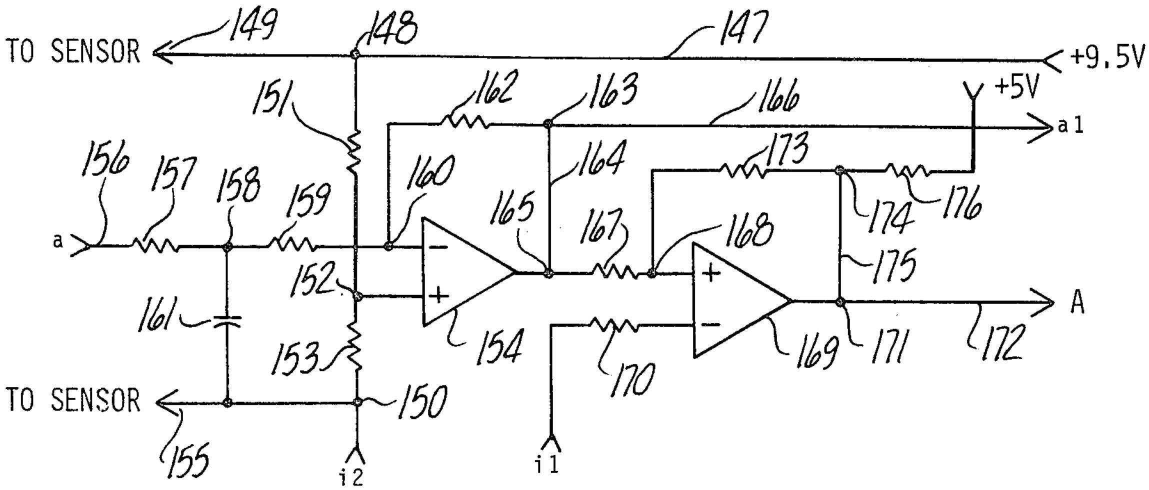
FIG. 3A is an electrical schematic diagram of the pressure sensor signal amplifier and comparator circuitry of block 141 of FIG. 3.

The pressure sensor signal amplifier and comparator circuit of block 141 of FIG. 3 is illustrated in the electrical schematic of FIG. 3A. The +9.5 volt regulated power supply of block 125 of FIG. 2 is connected via lead 147 to a node 148 which in turn is connected via lead 149 to the positive input terminal of the manifold absolute pressure sensor of block 126 of FIG. 2. The reference signal $i_2$ is supplied from the ramp generator of block 147 of FIG. 3 to reference node 150. A first resistor 151 has one end connected to the +9.5 volt supply at node 148 and its opposite end connected to a positive input node 152. A second resistor 153 has one end connected to the positive input node 152 and its opposite end connected to the reference node 150. The positive input node 152 is connected directly to the non-inverting input of an operational amplifier 154. The combination of the resistors 151 and 153 establish a voltage divider so that the node 152 is established at some predetermined ratiometric voltage level between the reference node 150 and the +9.5 volt supply.

The reference node 150 is also connected to the negative input terminal of the manifold absolute pressure sensor of block 126 of FIG. 2 via lead 155 and the output of the sensor supplies the signal "a" via lead 156 to the source input of the signal conditioning portion of the circuitry of FIG. 3A. Lead 156 is connected to the inverting input node 160 through a pair of series resistors 157 and 159. A high frequency transient shunt is provided by connecting a capacitor 161 between the sensor input and reference lead 155 by connecting one end of the capacitor 161 to the junction 158 of the resistors 157, 159 and its opposite end to the lead 155. Therefore, the combination of resistors 157, 159, and capacitor 161 provides a high frequency filter whose RC time constant should not substantially attentuate the analog input signal frequencies.

The inverting input node 160 is connected directly to the inverting input of the operational amplifier 154 and a feedback resistor 162 is connected between the inverting input node 160 and the output 165 of the operational amplifier 154 with one end of resistor 162 connected directly to the inverting input node 160 and the opposite end connected to a node 163. Node 163 is directly connected to the output node 165 via lead 164. The resistor 162 is a trim resistor which can be used for controlling the amount of gain or the slew rate of the operational amplifier 154.

In the preferred embodiment of the present invention, the circuits of FIG. 3 are implemented in LSI and the value of resistor 162 may be actively tailored or trimmed with a laser during live operation so that the gain of the amplifier 154 may be tailored along with offset so as to allow calibration for any specific manifold absolute pressure sensor to the present system with a high degree of accuracy. The resistor 153 is used to provide the necessary offset and the total signal conditioning circuit comprising the operational amplifier 154, the capacitor 161, and resistors 151, 153, 157, 159 and 162 provide a signal conditioning circuit which acts as an inverter and provides an amplified and inverted signal level at the circuit output 165.

The amplified and inverted signal level is supplied from the output node 165 as the output signal "$a_1$" via lead 164, node 163 and output lead 166. The output signal is also supplied through a resistor 167 to the non-inverting input node 168 of an operational amplifier 169 configured as a conventional comparator circuit. The non-inverting input node 168 is connected directly to the non-inverting input terminal of the comparator 169 and the ramp voltage signal $i_1$ is supplied to the inverting input of the comparator 169 through a resistor 170. The resistors 167 and 170 provide isolation. The output of the comparator 169 is taken from output node 171 and output node 171 supplies the pulse-width output signal "A" to the binary encoder circuitry of block 122 of FIG. 2 via lead 172.

A feedback resistor 173 is connected between the comparator output 171 and the non-inverting input 168. One terminal of the feedback resistor 173 is connected directly to the non-inverting input 168 of the comparator 169 and the opposite terminal of the resistor 173 is connected to a node 174. Node 174 is connected directly to the output node 171 via lead 175 so as to establish a positive feedback path from the output terminal 171 back to the non-inverting input of the operational amplifier 169 via lead 175, node 174, resistor 173 and node 168. This positive feedback provides the necessary hysteresis so that the output of the comparator 169 provides a snap-action type effect as soon as the ramp voltage $i_1$ reaches the threshhold level established at the non-inverting input. A resistor 176 connects the +5-volt regulated power supply from the power control circuitry of block 125 of FIG. 2 to the node 174 to act as a pull-up resistor. The +5-volt signal level is compatible with the digital logic circuitry of the binary encoder of block 122 of FIG. 2 and insures the proper output transitions as the comparator 169 sinks currents from the positive supply of voltage.

In operation, the analog signal level "a" provided from the output of the pressure sensor circuit of block 126 of FIG. 2 is supplied to the sensor input of the signal conditioning circuit of FIG. 3A via lead 156. This signal is filtered to eliminate high speed transients and the ratio established by resistor 151 and 153 together with the gain of the amplifier 154, which is controlled by the value of the feedback resistor 162, provides a properly amplified and conditioned signal $a_1$ at the output 165.

The amplified signal level is also supplied from the output 165 of the operational amplifier 154 through the isolation resistor 167 to the non-inverting input of the comparator 169. So long as the voltage level of the ramp signal $i_1$ being supplied through the isolation resistor 170 to the inverting input of the comparator 169 remains below the voltage level of the signal present at the non-inverting input, the output of the comparator 169 will be high. As soon as the comparator voltage $i_1$ becomes equal to the signal at the non-inverting input, the output of comparator 169 will go low. The hysteresis resistor 173 insures that the output changes rapidly in a snap-action manner so that as soon as the ramp voltage $i_1$ becomes equal to the signal present at the non-inverting input of the comparator 169, the output from the comparator will immediately go low. This terminates the analog to pulse-width conversion such that the signal A is a pulse-width signal whose width or time duration is proportional to and indicative of the value of the output signal "a" from the pressure sensor 126 of FIG. 2 and this pulse-width signal A is supplied to an input of the analog to digital comparator circuitry of block 121 of FIG. 2 for conversion into a binary number as hereinafter described.

3.2 Air Temperature Sensor Signal Amplifier and Comparator Circuit

Figure 3B:
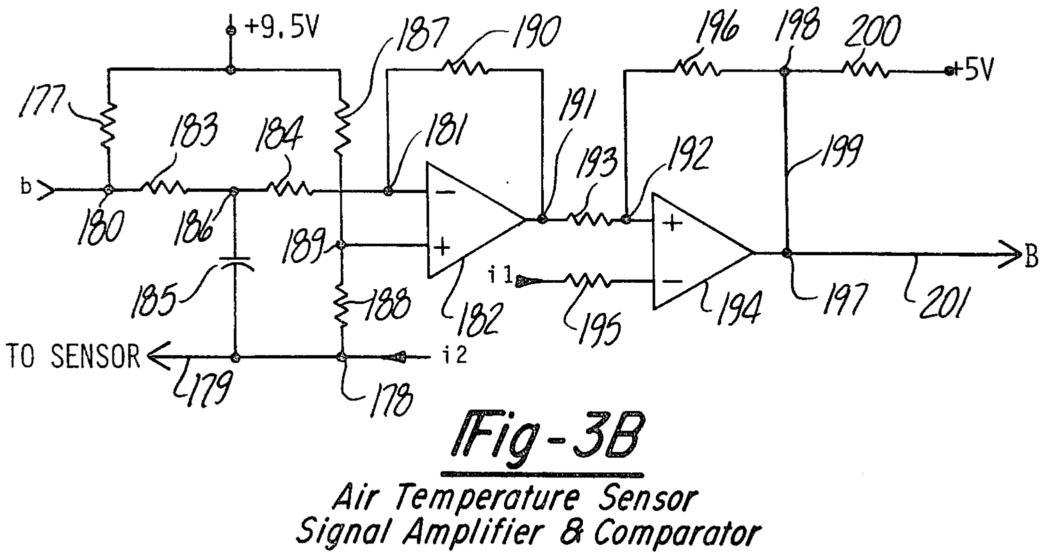
FIG. 3B is an electrical schematic diagram of the air temperature sensor signal amplifier and comparator circuitry of block 142 of FIG. 3.

The air temperature sensor signal amplifier and comparator circuit of block 142 of FIG. 3 is illustrated in the electrical schematic diagram of FIG. 3B. The +9.5-volt supply is connected to the positive input of the air temperature sensor of block 127 of FIG. 2 through a resistor 177 and the reference level $i_2$ is connected to a reference node 178 and then to the opposite terminal of the air temperature sensor of block 127 via lead 179. The air temperature sensor could be a thermistor type device or some similar temperature responsive device which would appear as a resistance between the input sensing node 180 and the reference lead 179. The characteristics of the sensor would be such that its resistance would vary, although not in a truly linear manner, with changes in temperature so that the sensor output signal "b" would be supplied to the input node 180 of the signal amplifier and signal conditioning circuitry of FIG. 3B and the node 180 would act, in effect, as the tap point on a voltage divider comprising the resistor 177 and the air temperature sensing device 127.

The signal "b" is supplied to the inverting input node 181 of an operational amplifier 182 through a pair of series resistors 183 and 184. A capacitor 185 is connected in shunt between a junction 186 between the series resistors 183, 184 and the reference lead 179 to form a high frequency filter. The combination of resistors 183 and 184 with the capacitor 185 forms a high frequency filter whose time constant does not substantially attenuate the "b" input signal but which does serve to filter out high frequency transients and the like.

The +9.5-volt supply is also connected to the reference node 178 through a pair of resistors 187, 188. The junction 189 of the resistors 187, 188 is connected directly to the non-inverting input of the operational amplifier 182 and the resistors 187, 188 establish a voltage divider configuration between the +9.5-volt source and the reference potential ramp $i_2$ at node 178 so as to establish a predetermined threshhold level at the non-inverting input with the value of the resistor 188 establishing the offset voltage for the operational amplifier 182 as conventionally known.

A feedback resistor 190 is connected between the inverting input node 181 and the amplifier output node 191 to determine the gain of the amplifier 182. As previously described, the value of the gain resistor 190 may be actively tailored during live operation of the sensor so that the operation of the circuit of FIG. 3B is not dependent upon the use of the particular type of air temperature sensor 127 but may be used with any such sensor. The output of the operational amplifier 182 is taken directly from output node 191 and represents an amplified and inverted version of the analog input signal "b" from the air temperature sensor 127 of FIG. 2.

The amplified and inverted signal from the output 191 of the amplifier 182 is supplied to the non-inverting input node 192 through an isolation resistor 193. The non-inverting input node 192 is connected directly to the non-inverting input of another operational amplifier 194 configured as a conventional comparator circuit. The ramp of voltage signal $i_1$ is supplied to the inverting input of the comparator 194 through a second isolation resistor 195. A feedback resistor 196 is connected between the non-inverting input node 192 and the comparator output node 197 through a resistor 196, node 198, and lead 199. The feedback path from the output 197 through lead 199, node 198 and resistor 196 back to the non-inverting input 192 provides the necessary hysteresis so that the output of the comparator reacts in a snap-action manner to provide a sharp transition as soon as the comparator threshhold voltage is attained. The node 198 is connected to a +5-volt DC supply through a pull-up resistor 200 as previously described and the output of the comparator 194 is taken from node 197 and supplies the signal "B" to one input of the binary encoder circuitry of block 122 of FIG. 2 via lead 201.

In operation, the output signal level "b" from the air temperature sensor 127 of FIG. 2 is supplied to input node 180 and high frequency transients and the like are filtered out. The filtered signal is supplied to the inverting input of operational amplifier 182 whose gain is controlled by a feedback resistor 190 and a properly conditioned, amplified and inverted output signal is supplied to one input of a comparator 194. The opposite comparator input is supplied with the ramp voltage signal $i_1$ and the output of the comparator 194 will go high and remain high until the ramp voltage becomes equal to the value of the amplified sensor signal voltage present at the non-inverting input node 192. As soon as equality of inputs is attained, the output of the comparator 194 immediately goes low to terminate the output pulse and the signal B which is outputted to the binary encoder circuitry of block 122 is a pulse-width signal whose width or time duration is proportional to and indicative of the value of the sensed air temperature.

Figure 3C:
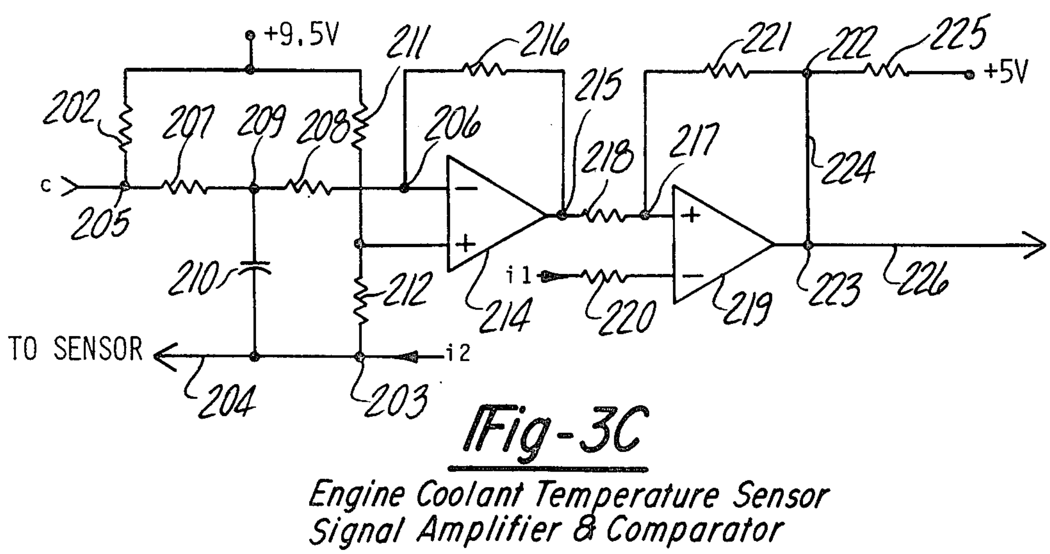
FIG. 3C is an electrical schematic diagram of the engine coolant temperature sensor signal amplifier and comparator circuitry of block 143 of FIG. 3.

3.3 Engine Coolant Temperature Sensor Signal Amplifier and Comparator Circuit The engine coolant temperature sensor signal amplifier and comparator circuit of block 143 of FIG. 3 is illustrated in the electrical schematic of FIG. 3C. The +9.5-volt supply is connected to the positive terminal of the engine temperature sensor device of block 128 of FIG. 2 through a resistor 202 and the reference level signal $i_2$ is supplied to reference node 203 and to the opposite terminal of the engine temperature sensor 128 via lead 204. As indicated previously, the engine temperature sensor 128 is a thermistor type device similar to that used in the air temperature sensor but normally having a slower response time and would normally appear as a resistor between the input node 205 and the reference lead 204. Therefore, the resistor 202 and the engine temperature sensor 128 would establish a voltage divider such that the signal present at the node 205 represents the sensor output signal "c" which is proportional to and indicative of the engine temperature since the resistance of the sensor with changes in the engine coolant temperature.

The engine coolant temperature signal "c" is supplied to the inverting input node 206 through a pair of series resistors 207 and 208. A shunt capacitor 210 is connected between the junction 209 between the resistors 207, 208 and the reference lead 204 so as to establish a filter configuration from resistors 207, 208 and capacitor 210 which filters out the high frequency components presented to the input node 205 without significantly attenuating the input signal "c".

The +9.5-volt source is also connected to the reference node 203 through a pair of series resistors 211, 212. The junction 213 of resistors 211 and 212 is connected directly to the non-inverting input of an operational amplifier 214 whose inverting input is connected directly to the input node 206. The resistors 211, 212 form a voltage divider between the +9.5-volt source and the reference node 203 and the value of the resistor 212 establishes the offset potential presented to the non-inverting input of the amplifier 214.

The inverting input node 206 is connected directly to the output node 215 of the amplifier 214 through a feedback resistor 216. As previously described, the value of feedback resistor 216 may be actively tailored during live operation of the sensor 128 so as to calibrate the gain for any specific temperature sensor with the required degree of accuracy.

A properly conditioned, amplified and inverted signal indicative of the engine temperature is present at the output node 215 of the amplifier 214 and this condition signal is presented to the non-inverting input node 217 through an isolation resistor 218. Node 217 is connected directly to the non-inverting input of an operational amplifier 219 configured as a conventional comparator. The ramp voltage signal $i_1$ is supplied through an isolation resistor 220 to the negative comparator input and a feedback resistor 221 has one terminal connected directly to the positive input node 217 and its opposite terminal connected to a node 222. Node 222 is connected directly to the output node 223 of the comparator 219 through a lead 224 so as to establish a feedback path from the output node 223 of the comparator 219 to the positive input node 217 via lead 224, node 222 and resistor 221. The resistor 221 provides the necessary hysteresis so that the output of the comparator will abruptly change as soon as the established threshhold is attained as conventionally known. A +5-volt source of potential is connected to node 222 through a pull-up resistor 225, as previously described, and the output of the comparator is the pulse-width signal "C" which is suppied to another input of the binary encoder circuitry of block 122 of FIG. 2 via lead 226.

In operation, the analog signal level "c" from the engine temperature sensor of block 128 of FIG. 2 is taken from the input node 205 and high frequency transients and the like are filtered out by the filter comprising resistors 207, 208 and capacitor 210. The offset of the operational amplifier 214 is established by resistor 212 and the gain is controlled by the value of resistor 216 so that a properly conditioned, amplified and inverted signal indicative of the actual engine coolant temperature is presented to one input of a comparator 219. The other input of the comparator 219 receives the output of the ramp generator $i_1$ so that the output of the comparator will initially go high to generate the signal C which will remain high until the ramp voltage $i_1$ becomes equal to the value of the signal present at the non-inverting input node 217 of the comparator 219. As soon as equality exists, the output of the comparator 219 will immediately go low to terminate the generation of the signal C whose pulse-width or time duration will be proportional to and indicative of the actual measured value of the engine coolant temperature and this signal C is supplied to the binary encoder circuitry of block 122 for conversion into a binary number for further processing as hereinafter described.

3.4 Throttle Position Sensor Signal Amplifier and Comparator Circuit

Figure 3D:
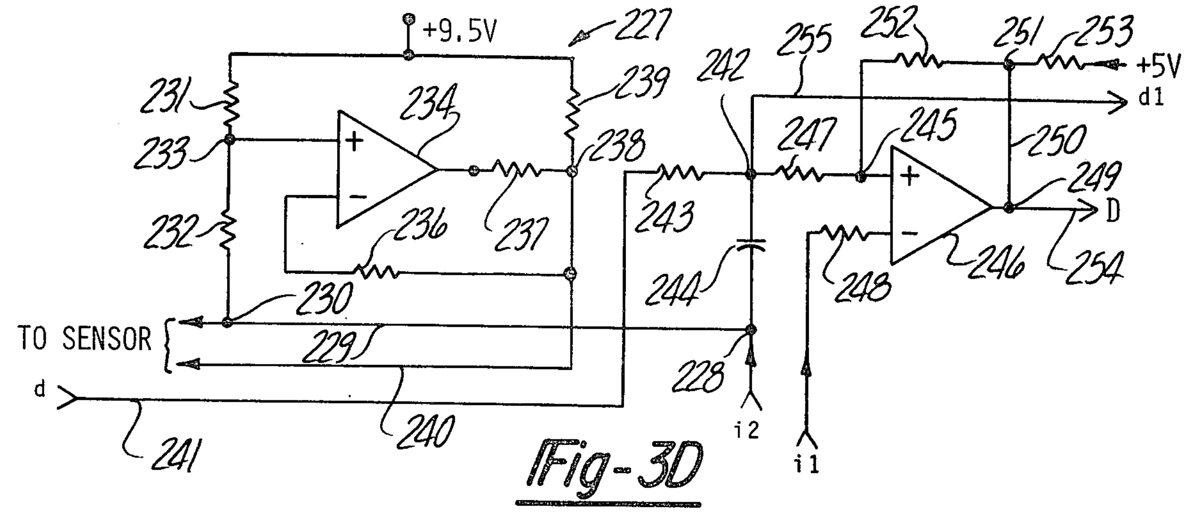
FIG. 3D is an electrical schematic diagram of the throttle position sensor signal amplifier and comparator circuitry of block 144 of FIG. 3.

A voltage-to-current transformer circuit indicated generally by the reference numeral 227 in the schematic of FIG. 3D is used to supply a source of current to the potentiometer of the throttle position sensor of block 129 of FIG. 2. FIG. 3D illustrates the circuit detail of block 144 of FIG. 3. The voltage-to-current transformer circuit 227 has an input reference node 228 connected through a reference lead 229 and an output reference node 230 to the reference terminal of the throttle position sensing potentiometer 129. A +9.5-volt source is connected to the output reference node 230 through a pair of serially connected resistors 231 and 232. The resistors 231 and 232 form a voltage divider network between the +9.5-volt source and the output reference node 230 and the junction 233 of resistor 231 and the resistor 232 is directly connected to the non-inverting input of an operational amplifier 234 which is used to form the central component of the voltage to current transformer 227. The output of the operational amplifier 234 is taken from output node 235 which is connected through a feedback resistor 236 to the inverting input of the operational amplifier 234. The amplifier 234 is used in a unity gain circuit. Resistor 236 is chosen to match the input impedance of node 233 and does not change the gain of amplifier 234. Thus, the node 238 is at the same voltage as node 233. Resistor 237 provides short circuit protection for the signals going to the sensor, and provides a low impedance source to drive sensors having a wide impedance variation. The value of the feedback resistor 236 may be dynamically altered or trimmed to control the gain of the amplifier 234 is previously described. The output 235 is also connected through a resistor 237 to a current output node 238. Node 238 is connected to the +9.5-volt source of potential through a resistor 239 so that current is supplied from the node 238 to the positive or high terminal of the throttle position potentiometer 129 via lead 240. The potentiometer wiper supplies the output signal "d" to lead 241 and due to the ratiometric nature of the circuit, the value of the sensor output signal or level "d" is substantially independent of the end-to-end resistance of the throttle position sensor potentiometer 129.

The sensor output signal "d" is supplied via lead 241 to node 242 through a resistor 243. Node 242 is shunted to the conductor 229 by a capacitor 244 such that the combination of the resistor 243 and the capacitor 244 establish a high frequency filter to the input signal "d". The filtered signal is then supplied to the positive input 245 of an operational amplifier 246 configured as a conventional comparator through a isolation resistor 247. The positive input node 245 is connected directly to the positive input of the comparator 246 and the negative input of the comparator 246 is supplied with the ramp voltage signal $i_1$ through an isolation resistor 248. The output of the comparator 246 is taken from output node 249 which is connected through a lead 250 to a node 251. Node 251 is connected back to the positive input node 245 through a feedback resistor 252 which provides the required hysteresis to insure a snap-action type of transition at the output of comparator 246 once the established threshhold is attained. A pull-up resistor 253 is connected between a +5-volt source of potential and the node 251 as previously described. The primary output of the circuit of FIG. 3D is the output of the comparator 246 which is taken from node 249 and supplied as the pulse-width signal "D" to one input of the binary encoder circuitry of block 122 of FIG. 2 via lead 254. A secondary input may be taken from node 242 via lead 255 which supplies the filtered analog signal "$d_1$" to the binary encoder circuitry of block 122 for use as hereinafter described.

In operation, the voltage-to-current transformer circuitry 227 supplies a predetermined, ratiometric-determined current to the throttle position sensor of block 129 of FIG. 2 and the sensor output signal "d" is supplied via lead 241 to the input of a filter comprising resistor 243 and capacitor 244. The filtered output signal "$d_1$" may be supplied directly to one input of the binary encoder circuitry of block 122 but is also supplied to one input of a comparator 246 whose other input is supplied with the ramp voltage signal $i_1$. The output of the comparator goes high to produce the signal D and remains high until the value of the ramp signal $i_1$ becomes equal to the value of the signal present at the positive input 245 of the comparator 246. As soon as equality is attained, the output of the comparator 246 goes low to terminate the generation of the signal D whose pulse-width or time duration is proportional to and indicative of the value of the actual position of the throttle. The pulse-width signal D is supplied to another input of the binary encoder circuitry of block 122 wherein it is converted into a binary word for further processing as hereinafter described.

In the preferred embodiment of the present invention, the EGR valve position sensor signal amplifier and comparator circuitry of block 145 of FIG. 3 is similar in structure and operation to the above-described throttle position sensor signal amplifier and comparator circuitry of block 144.

3.5 Oxygen Sensor Signal Conditioning System

Figure 3E:
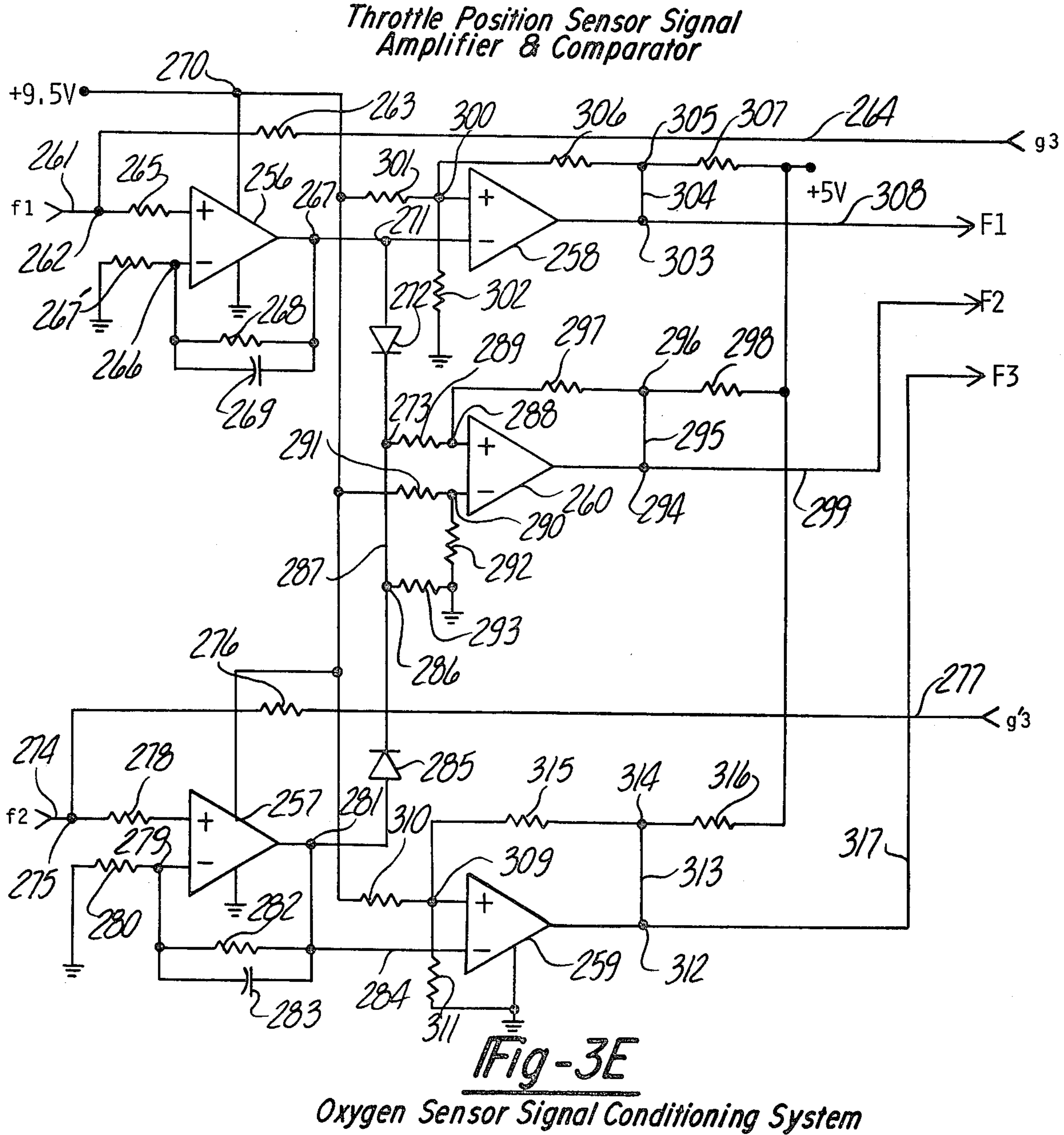
FIG. 3E is an electrical schematic diagram of the preferred embodiment of the oxygen sensor signal conditioning system of block 146 of FIG. 3.

The oxygen sensor signal conditioning system of block 146 of FIG. 3 is shown in the circuit schematic of FIG. 3E. In order to understand the function and operation of the circuit of FIG. 3E, a brief background description is provided. The zirconium dioxide oxygen sensors of block 131 of FIG. 2 are normally placed in the exhaust gas stream to sense any level of uncombined oxygen. A hot operating sensor will normally produce a relatively low output signal in the general range of from 0 to 0.2 volts for an excess of oxygen indicating a lean air/fuel ratio and a relatively high output signal or from 0.7 to 0.9 volts for a rich air/fuel condition which is represented by the absence of oxygen. The ability of such a sensor to produce a signal difference from either side of stoichiometric air/fuel ratio is important to the closed loop operation of an engine since the ability of engines to operate with low exhaust gas emissions will depend largely on the use of the conventional "three-way catalyst", at least in the near future. For this catalyst to operate efficiently, the exhaust gas composition must be kept very near to stoichiometry and large excursions from stoichiometry are generally not desired.

A major problem encountered in using such sensors is that for the sensor to produce useful or valid signals, its temperature must be above some predetermined temperature such as 300 degrees C. During normal operation of the engine (start, cruise and idle) the sensor temperature will vary and often will go below 300 degrees C. At the lower temperatures, some signal must be generated which can indicate to the electronic engine control system of the present invention that the values outputted from the oxygen sensors are invalid or unreliable and should therefore be disregarded. In some cases, the present system can produce useful results with sensor temperatures as low as 250 degrees C. while most prior art schemes can not get valid readings below 400 degrees C.

In the scheme of the present invention, the oxygen sensors of block 131 have their impedence monitored to derive an oxygen sensor inhibit signal $F_2$ whenever the voltage developed across the sensor exceeds a fixed level for a specified current applied to the sensor. This is accomplished by using a monitoring amplifier which has a very small amount of current flowing out of its input terminals. A simple current source from a resistor connected to a voltage level can be used to develop a voltage across the sensor as a function of its impedence. This voltage is related to the sensor's temperature. The oxygen sensor signal conditioning system of FIG. 3E presents a schematic diagram of a dual channel oxygen sensor signal conditioner which provides both the oxygen sensor inhibit signal $F_2$ and the properly conditioned outputs $F_1$, $F_3$ of the two sensor channels. It must be realized that in the preferred embodiment of the present invention a two sensor installation for use in a V-8 engine or in any engine which has two separate exhaust manifolds was used so that one sensor is present in each separate exhaust stream. A single channel system would, of course, be obvious in light of the following description.

The oxygen sensor signal conditioning system of FIG. 3E includes a pair of non-inverting operational amplifiers 256, 257 which, in the preferred embodiment of the present invention are conventional CA 3140 amplifiers having MOS FET inputs which allow very little current to flow in or out of the input terminals of the amplifier. This characteristic will be important for reasons hereinafter described. The system of FIG. 3E also includes three operational amplifiers configured as conventional comparators 258, 259 and 260.

The output signal "$f_1$" from the first oxygen sensor of block 131 is connected via lead 261 to input node 262. Input node 262 is connected to one terminal of a relatively large valued resistor 263, for example, one megaohm, whose opposite terminal is connected via lead 264 to an output of the binary encoder circuitry of block 122 of FIG. 2 to receive the oxygen qualifier output signal $g_3$ so that the test current supplied to the sensors may be regulated by the resistor 263 and the +5-volt supply and circuitry of the oxygen qualifier circuit of the binary encoder of block 122 as hereinafter described. The current value will not significantly change for any given amplifier 256, 257 since the maximum current flowing from its input terminal is extremely small so as to be negligible.

Input node 262 is also used to supply the sensor signal $f_1$ to the non-inverting input of the operational amplifier 256 via a isolation resistor 265 which is used to protect the amplifier 256. The inverting input of the amplifier 256 is connected to ground through a resistor 267'. Node 266 is also connected to the output node 267 of the amplifier 256 through the parallel combination of a feedback resistor 268 and a capacitor 269 which provide operational compensation. The value of the resistor 267' may be adjusted to establish the gain of the amplifier 256 which, in the preferred embodiment of the present invention has a value of approximately three. The +9.5-volt source of potential is supplied to the node 270 which is connected directly to the positive supply input of the amplifier 256 while the negative power supply input is connected directly to ground. The output of the amplifier 256 is taken from output node 267 and the configuration is such that the operational amplifier 256 produces a non-inverted, amplified sensor signal at the output node 267. Node 267 is connected directly to an input node 271 and input node 271 is connected directly to the negative input of the comparator 258 and to the anode of a diode 272 whose cathode is connected directly to a node 273.

The output signal $f_2$ from the second oxygen sensor of block 131 is connected via lead 274 to input node 275. Node 275 is connected to one terminal of a high value resistor 276 whose opposite terminal is connected via lead 277 to an output of the oxygen qualifier circuit of the binary encoder of block 122 for receiving the test signal $g'_3$ therefrom for injecting a predetermined test current into the oxygen sensor for impedance testing purposes as hereinafter described.

The output of the second oxygen sensor, the signal $f_2$ is supplied from the input node 275 to the non-inverting input of the operational amplifier 257 through an isolation resistor 278 which is used to protect the amplifier 257. The inverting input of the amplifier 257 is connected directly to an input node 279. Node 279 is connected through a gain resistor 280 to ground. Input node 279 is also connected to the output node 281 of the operational amplifier 257 through the parallel combination of a resistor 282 and a capacitor 283 which provide operational compensation. The gain of the amplifier 257 is controlled by the value of the resistor 280 which gain is, in the preferred embodiment of the present invention, maintained at a value of approximately 3. The positive voltage input of the operational amplifier 257 is connected directly to the +9.5-volt source of node 270 and the negative voltage input is connected directly to ground.

The output of the operational amplifier 257 is taken from output node 281 which is connected via lead 284 to the negative input of the comparator 259 and to the anode of a diode 285 whose cathode is connected directly to a node 286. Node 286 is connected via lead 287 to node 273 and node 273 is connected to the positive input node 288 through resistor 289. The positive input node 288 is connected directly to the positive input of the comparator 260 while the negative input is connected directly to the negative input node 290. Node 290 is connected through a resistor 291 to the +9.5-volt supply at node 270 and is also connected through a resistor 292 to ground. Resistor 293 is connected between node 286 and ground as well. The output of the comparator 260 is taken from comparator output node 294 and node 294 is connected via lead 295 to node 296. Node 296 is connected to the positive input node 288 through a feedback resistor 297 so that a feedback path is established between the comparator output 294 and the positive input terminal 288 via lead 295, node 296 and feedback resistor 297. The feedback resistor 297 is used to establish the necessary hysteresis so as to provide a snap-action type of transition at the comparator output when the threshhold level of the comparator 260 is attained. A pull-up resistor 298 is connected between the +5-volt source of potential and node 296 as previously described. The output node 294 is also connected to one input of the binary encoder circuitry of block 122 of FIG. 2 via lead 299 so as to supply the oxygen sensor inhibit signal $F_2$ thereto.

Resistors 291 and 292 are connected between the +9.5-volt source of potential and ground and establish a voltage divider such that node 290 establishes a threshhold level at the negative input of the comparator 260 against which the output of comparators 256 and/or 257 are compared. Resistor 293 is used to provide a current path to ground for the diodes 272,285.

As previously described, the negative input of comparator 258 is connected directly to the node 271 to receive the output of the operational amplifier 256. The positive input to the comparator 258 is taken from the positive input node 300. Node 300 is connected to the +9.5-volt source of potential at node 270 through a resistor 301 and to ground through a resistor 302. The combination of resistors 301 and 302 connected in series between the +9.5-volt source of potential and ground establish a voltage divider to control the value of the threshhold voltage supplied to the positive input node 300 and the threshhold value will be established for the stoichiometric air/fuel ratio. The output of the comparator 258 is taken from output node 303. Node 303 is connected via lead 304 to a node 305. Node 305 is connected through a feedback resistor 306 back to the positive input node 300 so as to establish the necessary hysteresis to provide a snap-action type of transition at the comparator output whenever the threshhold level established at the positive input 300 by the voltage divider comprising resistors 301, 302 is attained. Node 305 is also connected to a +5-volt source of potential through a pull-up resistor 307 and the output node 303 is connected to an input of the binary encoder circuitry of block 122 of FIG. 2 via lead 308 for supplying the properly conditioned and amplified signal $F_1$ indicative of either a rich or lean air/fuel ratio thereto.

As previously described, the negative input of comparator 259 is connected via lead 284 to the output node 281 from the second operational amplifier 257. The positive input of the comparator 259 is taken from the positive input node 309. Node 309 is connected through a first resistor 310 to the +9.5-volt source of potential at node 270 and through a second resistor 311 to ground. The combination of resistors 310 and 311 connected in series between the +9.5-volt source of potential at node 270 and ground establish a voltage divider combination for determining the threshhold voltage present at the input node 309. The output of the comparator 259 is taken from output node 312 which is connected via lead 313 to a node 314. Node 314 is connected back to the positive input node 309 through a feedback resistor 315 so as to establish a feedback path between the comparator output node 312 and the positive input node 309 via lead 313, node 314 and the feedback resistor 315. The feedback resistor 315 is used to provide the necessary hysteresis so as to insure a snap-action type of rapid transition at the comparator output once the threshhold voltage established at node 309 is attained. Node 314 is also connected through a pull-up resistor 316 to the +5-volt source of potential and the output node 312 is connected through a lead 317 to another input of the binary encoder circuitry of block 122 so as to provide the properly amplified and conditioned signal $F_3$ indicative of a lean or rich air/fuel ratio at the point monitored by the second oxygen sensor.

In operation, when the oxygen qualifier circuit of the binary encoder of block 122 which will be hereinafter described receives a command from the program to test the oxygen sensors, a +5-volt pulse will be applied as the signal $g_3$ on lead 264 and as the signal $g'_3$ on lead 277. As the +5-volt pulse is applied to the high impedence resistors 263 and 276, the resistors 263 and 276 act as current sources to provide current which is supplied via the leads 261 and 274 to the first and second oxygen sensors of block 131 respectively. Since the voltage developed across the $ZiO_2$ depends upon the sensor resistance and on the operating condition of the sensor, the following applies. If the oxygen sensors are cold or cool, they will have a very high impedence and a high voltage will be developed at the input nodes 262, 275. This indicates that the signal producing capability of the sensors is not proper. The high voltage developed by the cold sensors (which indicates that they are not to be used) is supplied to the operational amplifiers 256, 257, whose high outputs will be supplied via diodes 272 and 285 which are ORed together at node 273 and presented to the positive input of the comparator 260. If the value of either of these ORed signals exceed the threshhold level established at node 290, the output of the comparator 260, the signal $F_2$ goes high indicating the presence of an oxygen sensor inhibit signal which commands the digital processing circuitry of the binary encoder of block 122 to disregard the output of the first and second sensors until they are again tested and found to be reliable. In the preferred embodiment of the present invention, as hereinafter described with reference with the oxygen qualifier circuit of block 122, the test current supplied to the sensors via the signals $g_3$ and $g'_3$ can be done on a sampling basis under program control and need not be supplied continuously. Furthermore, the use of two separate sources avoids any chance of cross-coupling through the large value resistors 263, 276.

The other two comparators, comparator 258 and comparator 259 have their negative inputs directly connected to the output of the operational amplifiers 256 and 257 respectively. A threshhold level is established at the positive input nodes 300, 309 are selected so as to match the level at which the sensor crosses the stoichiometric air/fuel ratio boundary so that the output of the comparators remains normally high via the action of the pull-up resistors 307, 316 until the amplified sensor signal attains the threshhold level established at the positive input 300, 309 at which time the output of the comparator 258, 259 goes quickly low to indicate the presence of a rich air/fuel ratio. Therefore, the presence of a low $F_1$, $F_3$ signal indicates a rich air/fuel ratio and the presence of a high indicates a lean air/fuel ratio and these signals are supplied to the binary encoder circuitry of block 122 and further process to be used to establish the closed loop mode of engine control unless the inhibit signal $F_2$ indicates that the sensor readings are invalid or unreliable and are not to be used.

The oxygen sensor signal conditioning system of FIG. 3E provides the necessary matching interface between the oxygen sensors of block 131 and the digital electronics of the binary encoder circuitry of block 122 of FIG. 2 and allows for the control of current to the sensor for impedence monitoring to determine whether or not the sensor output signals are reliable. Furthermore, the circuit provides the ability to distinguish the difference between rich or lean signals and those caused by sensor high impedence conditions and it provides a convenient means of optimizing the current supplied to the sensor, to inhibit threshhold level, and to control the stoichiometric threshhold levels. This last feature allows the threshhold level governing the generation of the sensor inhibit signal and the threshhold levels governing the stoichiometric changeover point to be adjusted depending upon the characteristics of the particular sensors employed. Further advantages of the circuit of FIG. 3E will be more fully understood when read in conjunction with the circuitry to be hereinafter described relating to the open loop and closed loop mode of operation using oxygen sensor feedback.

3.6 Ratiometric Feedback-Compensated Ramp A/D Converter

Figure 3F:
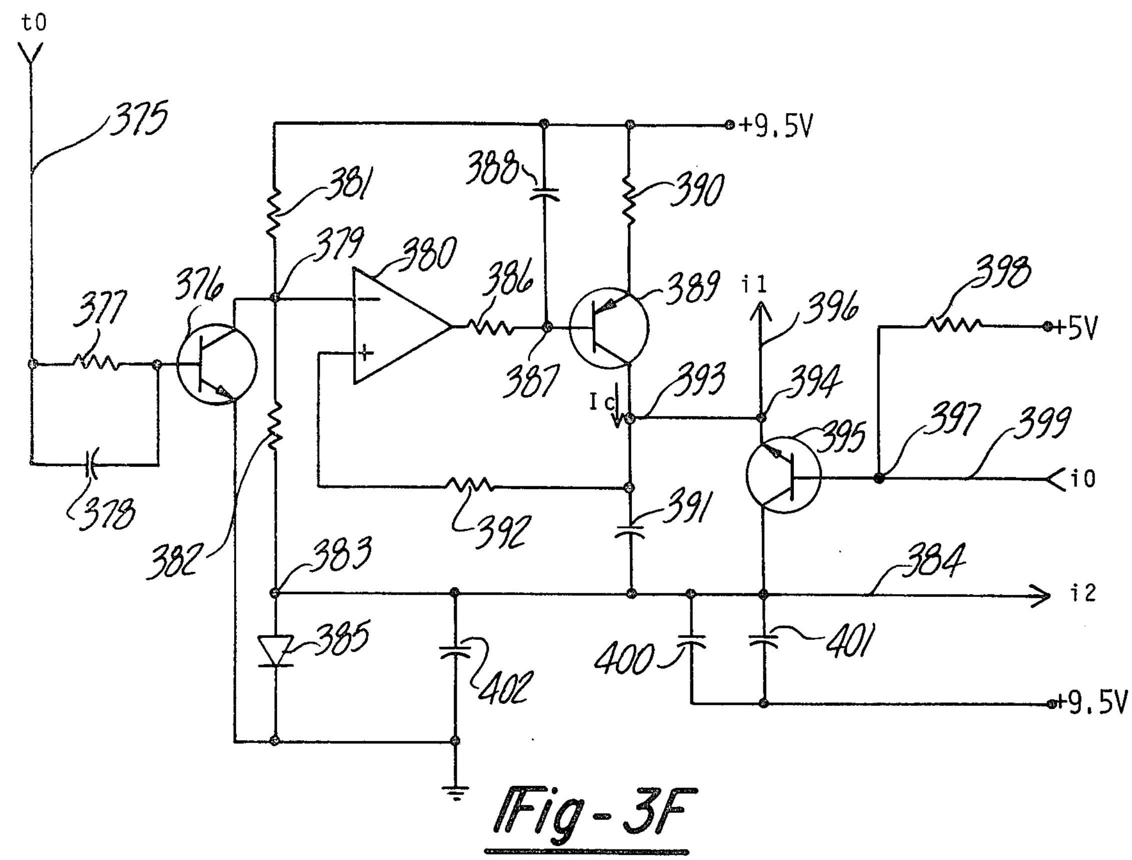
FIG. 3F is an electrical schematic diagram of the preferred embodiment of the ramp generator circuitry of block 147 of FIG. 3.
Figure 3G:
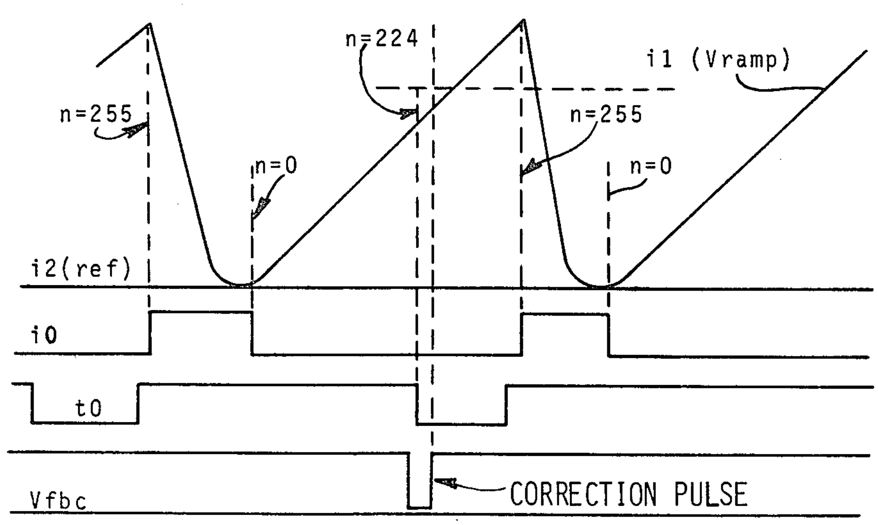
FIG. 3G is a timing diagram for explaining the operation of the ramp generator circuitry of FIG. 3F.
Figure 3H:
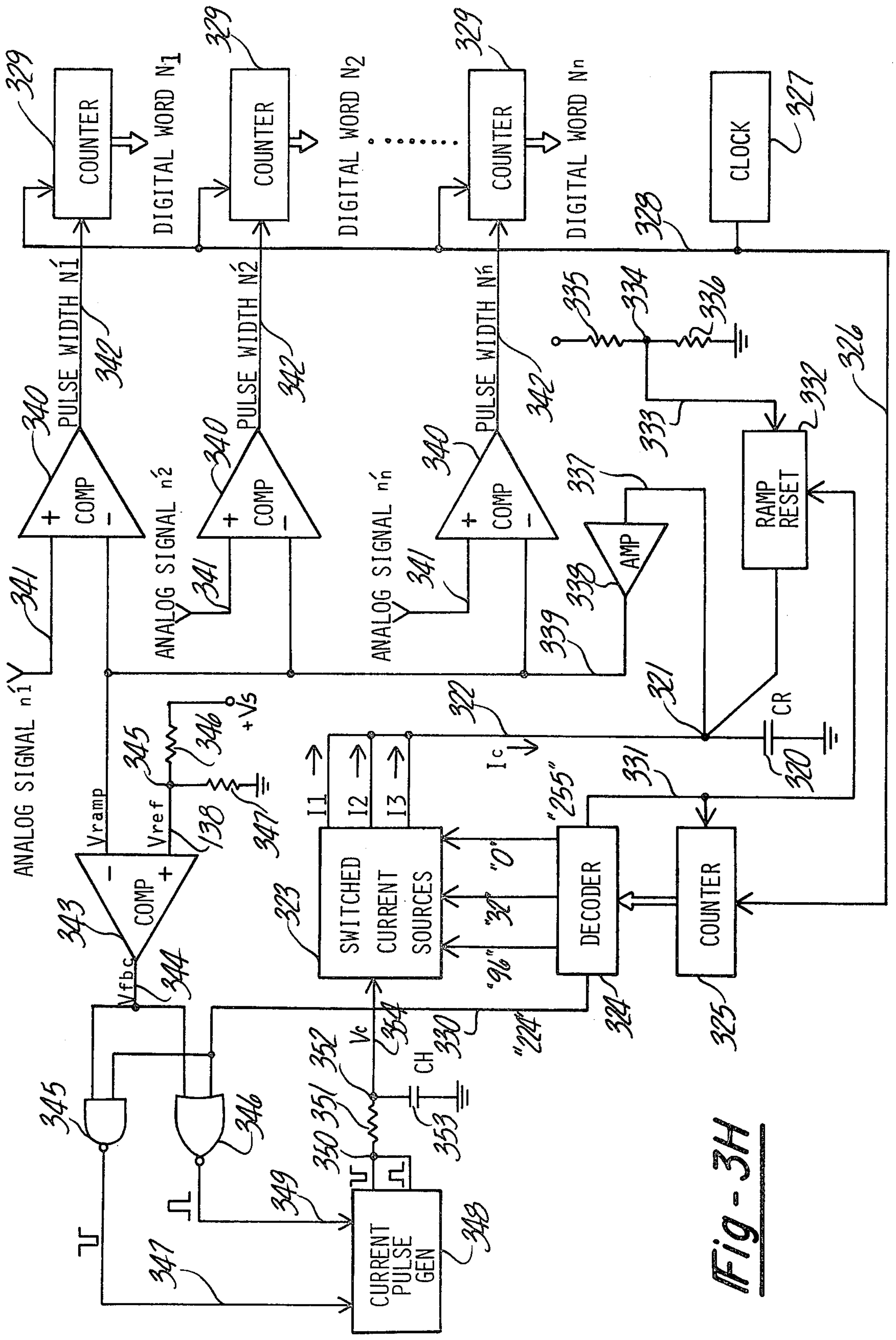
FIG. 3H is a block diagram illustrating the broad concept of the ratiometric feedback-compensated ramp-type analog-to-digital converter system of the present invention.
Figure 3J:
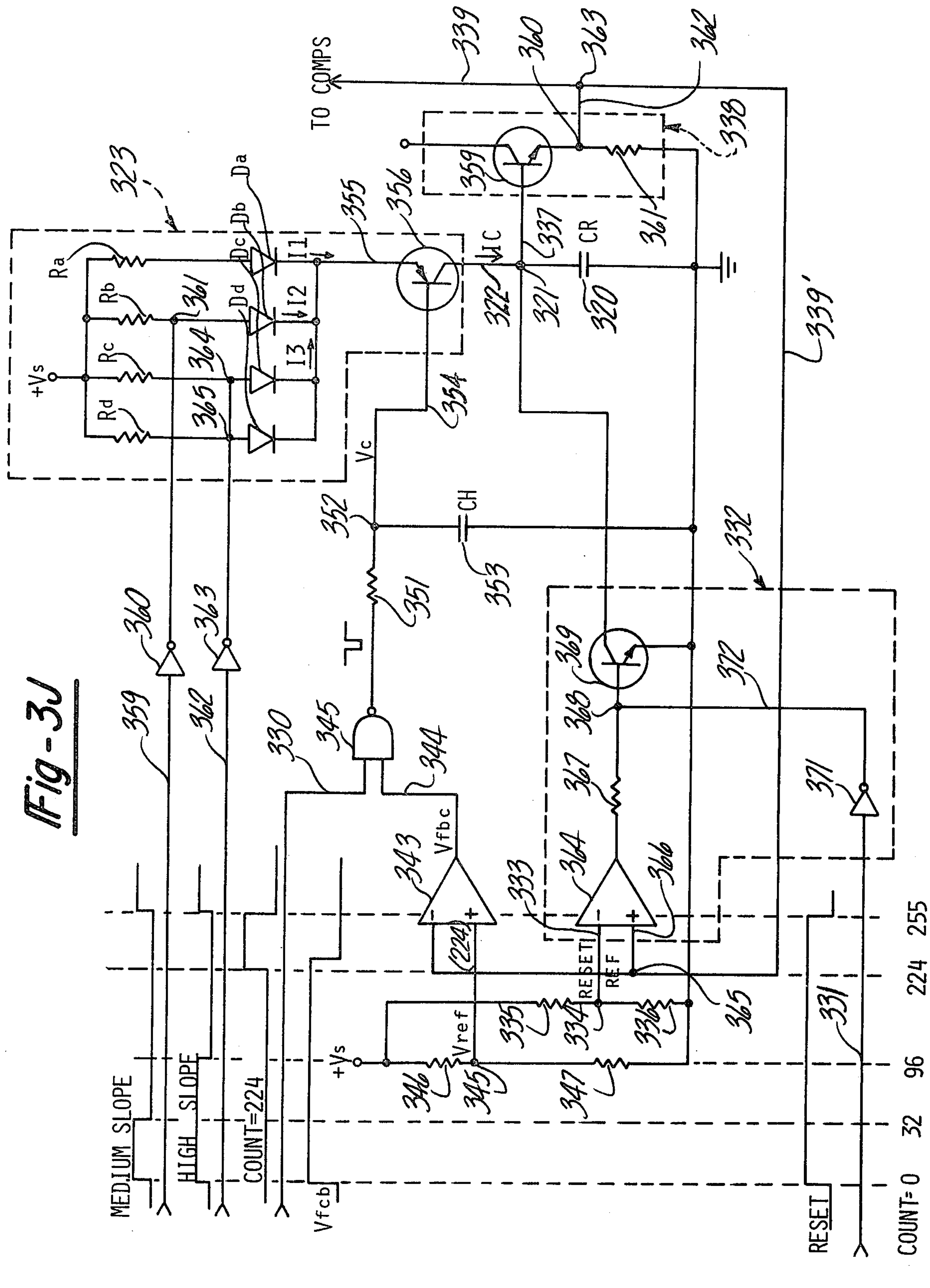
FIG. 3J is an electrical schematic diagram showing, in detail, portions of the circuit of FIG. 3H and for describing an alternate embodiment to the ramp generating circuit utilized in the preferred embodiment of FIG. 3F.

The broad concept of the ratiometric feedback-compensated ramp-type analog to digital converter will be disclosed with reference to FIGS. 3H, 3I, and 3J. This description is to teach the broad underlying concept of a ratiometric feedback-compensated ramp type analog to digital converter and the improved version thereof utilized in the preferred embodiment of the present invention will be described with reference to FIGS. 3F and 3G in the next section hereof.

The concept of this invention will find use in applications requiring the combination of low-cost reliable operational accuracy even in hostile environments. In the present example, digitizing transducer inputs for computer control in an automobile is an ideal application. By a simple closed loop regulator control scheme, conversion accuracy is maintained even as internal component values change. While previous converters depend upon precision trimming and matching of many critical components to achieve conversion accuracy, the present system does not. Similarly, the accuracy of the present system is not temperature dependent and will not deteriorate with age. Even if internal components change in value over a wide range and in an unpredictible manner, the feedback correction scheme of the present invention will make the necessary corrections without significantly effecting conversion accuracy.

Figure 31:
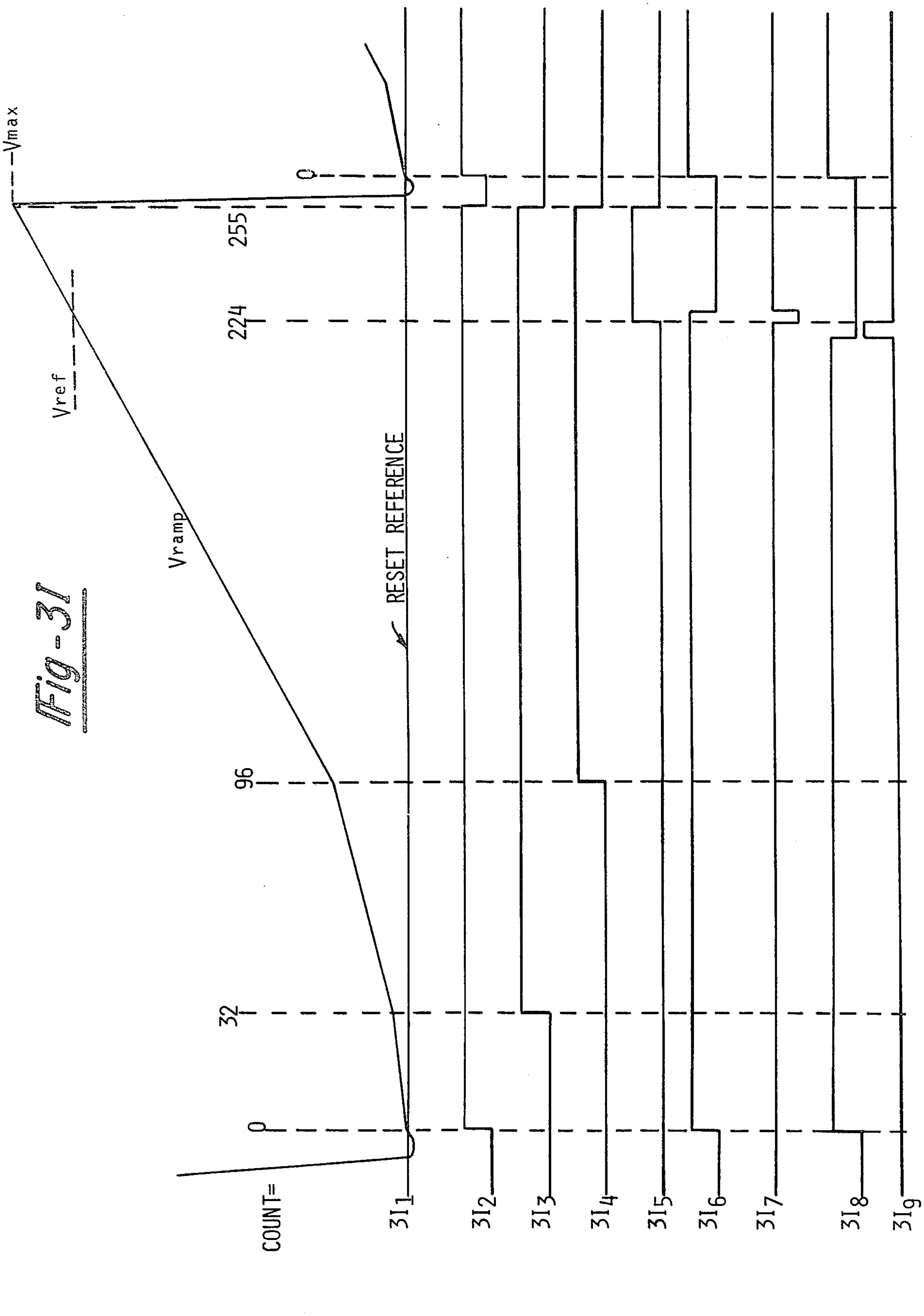

The block diagram of FIG. 3H depicts a multi-input ramp-type analog to digital encoder. Three ramp rates are employed in this particular converter to achieve higher digitizing resolution for low analog input voltages. It will be realized that linear, logarithmic or other ramp functions could equally be utilized with the basic concept of this invention. In the circuit of FIG. 3H, the ramp rate correction loop virtually eliminates real time as a consideration in determining conversion accuracy. Ramp voltage is tied directly to a counter number rather than to elapsed real time. In the example of FIG. 3H, the count number is 224. The desired ramp voltage when the counter reaches 224 is established as the voltage level $V_{ref}$ by a two resistor voltage divider network. If the ramp is not at this voltage $V_{ref}$ when the count reaches 224, correction pulses are developed by the ramp level comparator and logic as shown in the waveform diagram of FIG 31. By applying these pulses through the current pulse generator to the holding capacitor $C_H$, the magnitude of the currents $I_1$, $I_2$ and $I_3$ are changed to correct the charging rate of the ramp.

Referring to FIG. 3H, a generalized analog to digital converter using a ratiometric, feedback-compensated ramp generator will be described. The ramp is established as the voltage stored on an integrating capacitor $C_R$ indicated by reference numeral 320. The integrating capacitor 320 has one plate connected to ground and the opposite plate connected to the ramp output node 321. The ramp capacitor 320 is charged by the current $I_c$ via lead 322 which is the sum of one or more of the currents $I_1$, $I_2$ and $I_3$ outputted from the switched current sources of block 323. The nature of the switched current sources of block 323 is such that the sum of the currents is under switching control in accordance with the output of the counter decoder logic of block 324. Decoder 324 decodes the count present in a binary counter 325 which is adapted to count clock pulses supplied thereto via lead 326 from a source of clock pulses 327. The source of clock pulses 327 also supplies clock pulses via lead 328 to the count input of a plurality of binary counters 329 as hereinafter described.

The decoder circuitry of block 324 detects the count of zero to initiate the ramp by supplying the first current $I_1$ along the lead 322 as the current $I_c$ to charge the ramp capacitor 320 at a first charging rate. When the decoder of block 324 detects the count "32", the second current source $I_2$ is switched in so that $I_c$ equals $I_1+I_2$ and the charging capacitor 320 is charged at twice the rate it was previously charged. When the decoder 324 detects the count "96", the third current source $I_3$ will also be switched in so that $I_c$ equals $I_1+I_2+I_3$ which will charge the ramp capacitor 320 at twice the rate at which it previously charged. This charging rate will continue for the duration of the charging cycle.

When the decoder 324 detects the count "224", a pulse indicative thereof is outputted on lead 330 to query the feedback loop to determine whether or not the actual ramp voltage is or is not where it is supposed to be at this predetermined count. Lastly, the decoder circuitry of block 324 will output a reset pulse when it detects some final number, such as "255" and outputs a pulse indicative thereof via lead 331 which is supplied to reset the counter 325 for the next cycle of operations and to operate the ramp reset circuitry of block 332 to discharge the ramp capacitor 320 to an initial reference level before beginning the next ramp cycle. The ramp reset circuitry of block 332 has one input connected to the ramp node 321 and another input connected via lead 33 to a node 334. Node 334 is connected to a source of positive potential plus $V_s$ through a resistor 335 and is connected to ground through a resistor 336 to provide a discharge pass for the capacitor 320 during reset.

The ramp voltage generated at the ramp voltage node 321 is supplied via lead 337 to the input of a buffer amplifier 338 and an amplified ramp voltage $V_{ramp}$ is outputted from the amplifier 338 via lead 339. Lead 339 is connected to a first input of a series of analog to pulse-width conversion comparators 340 each of which has its second input connected to an analog signal via lead 341. The output of each of the comparators 340 supplies a pulse-width signal proportional to and indicative of the value of the analog signal present at the input of lead 341 to the enable inputs of the binary counters 329 via leads 342.

In operation, as the switched current sources of block 323 charge the ramp capacitor 320, the ramp voltage increases in a generally linear manner at the ramp voltage node 321. This voltage is amplified by the buffer amplifier 338 and applied to one input of a plurality of analog to pulse-width converter comparators 340. The opposite input to the comparators 340 receives individual analog signals indicative of various measured parameters. As soon as the ramp capacitor 320 is reset to the initial reference level and the ramp begins to build, the output of the comparators 340 goes high indicating that the value at the ramp input is less than the value at the analog signal input. The output of the comparators 340 will remain high until the ramp voltage becomes equal to the value of the analog signal at its other input. At the point of equality, the output of the comparators 340 goes low terminating the output pulse supplied to enable the counters 329. Therefore, the counters 329 perform the pulse-width to digital word conversion and the pulse-width or time duration of the pulse outputted from the comparators 340 is proportional to and indicative of the value of the analog input signal received at the comparator inputs.

This accurate pulse-width signal enables the counters 329 to count clock pulses from the clock 327 during the period in which it is high. As soon as it goes low, the counters 329 are disabled and the count stored therein represents a binary number or digital word indicative of the pulse-width at its enable input and therefore proportional to and indicative of the actual measured analog signal at the input of the comparators 340. This digital word may then be processed in a computer, digital logic circuitry or the like, as conventionally known.

The signal $V_{ramp}$ outputted from the buffer amplifier 338 on lead 339 is also supplied to one input of a feedback comparator 343. The opposite input of the comparator 343 is taken via lead 344 from a node 345. Node 345 is the junction of a pair of resistors 346, 347 connected in series between the source of positive potential plus $V_s$ and ground to establish a voltage divider. The value of voltage present at the voltage divider reference node 345 is designated $V_{ref}$ and, as illustrated in FIG. 3I represents the desired voltage level which the ramp should have achieved when the counter 325 reaches the designated count of 224. The output of the comparator is the signal $V_{fbc}$ which stands for the voltage of the feedback comparator and this comparator output is supplied via lead 344' to a first input of a first NAND gate 345' and to the first input of a logical NOL gate 346'. The second input of NAND gate 345' and the second input of NOR gate 346' is connected to lead 330 which supplies the signal indicative of the 224 count which is outputted from the decoder circuitry of block 324. The output of NAND gate 345' is connected via lead 347' to the current pulse generator circuit of block 348 while the output of NOR gate 346' is connected to the current pulse generator 348 via lead 349 so that the current pulse generator circuit of block 348 receives one or the other of the corrective signals and supplied either one or the other of the signals to its output node 350 for feedback correction purposes.

In operation, the output $V_{fbc}$ of comparator 343 normally floats high since the signal $V_{ramp}$ is less than the signal $V_{ref}$ which is the desired voltage level of the ramp at the 224 count. As soon as the level of the ramp voltage is equal to $V_{ref}$, the output of the comparator goes low terminating the signal $V_{fbc}$. As shown in FIG. 3I, signal lines $3I_5$, $3I_6$, and $3I_7$, whenever the 224 pulse arrives via lead 330 before the output of the comparator $V_{fbc}$ has gone low, both signals are momentarily high at the input to NAND gate 345' until the signal $V_{fbc}$ goes low meaning that the ramp signal has reached $V_{ref}$ at a point later than it should have. This results in a negative-going ulse at the output of NAND gate 345' which is supplied via lead 347' to the current pulse generator 348 to supply a negative-going, narrow-width correction pulse to the node 350. On the other hand, as indicated by pulse lines $3I_5$, $3I_8$ and $3I_9$, if the ramp signal $V_{ramp}$ reaches the reference level $V_{ref}$ prior to the arrival of the 224 count, the output of NOR gate 346' goes momentarily high. The momentary narrow-width, positive-going correction pulse is supplied via lead 349 to the current pulse generator circuirty of block 348 to supply a narrow-width, positive-going correction pulse to the node 350.

The correction signal present at node 350 is supplied to one terminal of a resistor 351 whose opposite terminal is connected to a node 352. Node 352 is connected to ground through a holding capacitor $C_H$ which is designated by the reference numeral 353 and via lead 354 to the voltage input of the switched current source network of block 323 as the signal $V_c$ which signifies the control voltage signal. The combination of resistor 351 and capacitor 353 forms a low pass filter which acts as a pulse-width to voltage comparator with the capacitor 353 serving as a memory means so that a voltage whose level is proportional to the width of the correction pulse presented to node 350 and whose level is either increasing or decreasing depending on whether or not a positive-going correction pulse or a negative-going correction pulse was presented thereto.

The value of the voltage level $V_c$ determines the amount of current $I_1$, $I_2$ and $I_3$ supplied as the charging current $I_c$ on lead 322 for charging the ramp capacitor 320. Therefore, the feedback network comprising the comparator 343, the ratiometric voltage divider comprising resistors 346 and 347, NAND gate 345', NOR gate 346', the current pulse generator circuit of block 348, the filter comprising the resistor 351 and capacitor 353 can increase or decrease the amount of current $I_c$ provided to the charging capacitor 320 so as to increase or decrease its charging rate to correct the ramp slope by varying the charging current $I_c$ so that the ramp voltage will reach the established reference level $V_{ref}$ at the same point in time that the counter 325 reaches the referenced 224 count.

The circuit of FIG. 3J illustrates the ratiometric feedback-compensated ramp generator of the circuit of FIG. 3H in circuit detail with the signal time shown along the left portion thereof. In FIG. 3J, the switched current sources of block 323 are shown as including a source of positive potential $V_s$ which is connected to one terminal of a set of four series circuit paths connected in parallel between the source of potential $V_s$ and an output lead 355. Each of the four circuit paths includes the series combination of a resistor and a diode with the first circuit path including a resistor $R_a$ and a diode $D_a$ with one terminal of the resistor $R_a$ being connected to the source of potential $V_s$ and the opposite terminal being connected to the anode of the diode $D_a$ whose cathode is connected to the output lead 355.

A second series circuit path comprises a resistor $R_b$ connected in series with a diode $D_b$ such that one terminal of the resistor $R_b$ is connected to the source of potential $V_s$ and its opposite terminal is connected to the anode of the diode $D_b$ whose cathode is connected to the output lead 355. The third series circuit includes a resistor $R_c$ connected in series with the diode $D_c$ such that one teminal of the resistor $R_c$ is connected to the source of potential $V_s$ and its opposite terminal is connected to the anode of a diode $D_c$ whose cathode is connected to the output lead 355. Lastly, the fourth series branch includes a resistor $R_d$ and a diode $D_d$ such that one terminal of the resistor $R_d$ is connected to the source of potential $V_s$ and its opposite terminal is connected to the anode of the diode $V_d$ whose cathode is connected to the output lead 355.

The output lead 355 is connected to the emitter of a transistor 356 whose collector is connected via lead 322 to supply the charging current $I_c$ to the ramp voltage node 321. The base of the current source transistor 356 is connected via lead 354 to the filter output node 352 as previously described to supply the correction voltage $V_c$ to the base of the transistor 356 for controlling the amount of current $I_c$ flowing therethrough to the charging capacitor 320. The medium slope signal or count-equals-32 signal is supplied via lead 359 to the input of inverter 360 whose output is connected directly to a node 361 at junction of the resistor $R_b$ and the diode $D_b$ for normally disabling the second series branch until after the count of 32 has been reached. From this point forward, the second series branch is enabled so that the current $I_2$ flows through the branch comprising resistor $R_b$ and diode $D_b$ to join with the current $I_1$ flowing in the first branch comprising resistor $R_a$ and diode $D_a$ so that $I_c$ equals $I_1+I_2$.

The high slope signal indicative of the count 96 is supplied via lead 362 to the input of an inverter 363 whose output is connected jointly to node 364 at the junction of resistor $R_c$ and diode $D_c$ and node 365 at the junction of resistor $R_d$ and diode $D_d$. This connection disables the third and fourth series branches until the signal count 92 has arrived and thereafter enables the third branch comprising resistor $R_c$ and diode $D_c$ and the fourth branch comprising resistor $R_d$ and diode $D_d$ to jointly supply the current $I_3$ to the output 355 so that after count 96, all of the current from the current sources is used to make up the charging current with $I_c$ equal to $I_1+I_2+I_3$.

The current $I_c$ conducted by transistor 356, which is operated in the linear range and not in saturation, is also controlled in accordance with the level of the signal $V_c$ present on lead 354 at the base of transistor 356, as conventionally known. The conducted current $I_c$ is supplied to the capacitor 320 via node 321 so that the ramp voltage present at node 321 is supplied via lead 337 to the input of a buffer amplifier 338 which, in the schematic of FIG. 3J, is a transistor 359 configured as an emitter follower. The base of transistor 359 is connected directly to the ramp voltage node 321 via lead 337 while the collector is connected directly to the source of potential $V_s$ and its emitter is connected to an emitter output node 360. Node 360 is connected to ground through a resistor 361 and via lead 362 to a node 363. Node 363 is connected via lead 339 to supply the amplified ramp voltage signal $V_{ramp}$ to the comparators 340 of FIG. 3H and via lead 339' to the feedback comparator 343 and to the positive input of a difference amplifier 364 via node 365 and lead 366 which forms a portion of the ramp reset circuitry of block 332 as hereinafter described.

The ramp reset circuitry of block 332 includes a difference amplifier 364 whose positive input is connected to node 365 on lead 339' via lead 366 and whose negative input is connected via lead 333 to a reference node 334 at the junction of a voltage divider comprising resistors 335 and 336 connected in series between a source of potential $V_s$ and ground. The value of the voltage at node 334 establishes a reset reference at the negative input of the difference amplifier 364 against which the ramp voltage on lead 366 is compared. The reset reference corresponds to, for example, the minimum voltage expected to be attained by the ramp during ramp capacitor discharge or at the count of zero. The output of the difference amplifier 364 remains high as long as the ramp voltage $V_{ramp}$ is greater than the reset reference voltage on lead 333. As soon as the ramp voltage $V_{ramp}$ becomes less than the reset reference, the output of the difference amplifier 364 goes low and this low is transmitted through resistor 367 to the base input node 368 of a switching transistor 369. The collector of transistor 369 is connected directly to the ramp node 321 and the emitter is connected to ground.

A reset signal, which remains high from count zero until count 255 and which is controlled by a decoder output is connected to the counter rather than to any particular voltage source, is supplied via lead 331 to the input of an open collector inverter 371 and the output of inverter 371 is connected via lead 372 to the reset node 368. As long as the reset signal is high, the open collector inverter 371 clamps node 368 to ground to inhibit any output signal from amplifier 364 via resistor 367. As long as the base node 368 is clamped low, switching transistor 369 is held in a non-conductive or "off" state and this condition persists from the zero to the 255th count.

On the count of 255, the reset signal on lead 331 goes low to command a ramp reset, i.e. a discharging of ramp capacitor 320. This low reset signal is inverted by inverting amplifier 371 which is constructed with an open collector output which now allows node 368 to seek the voltage level outputted by the difference amplifier 364 through resistor 367.

As soon as the reset signal goes low and node 368 is unclamped, transistor 369 turns on hard since the voltage outputted by the difference amplifier is very high. This establishes a discharge path through which the ramp capacitor 320 rapidly discharges toward ground. The output of the difference amplifier is controlling the conduction of the ramp capacitor 320, so that after a settling time, the voltage at node 360 eventually becomes equal to the reset reference voltage at node 334 so that the output of the difference amplifier goes low to maintain the ramp voltage at the initial reference level. As soon as the voltage at node 360 approaches the reference level at node 334, the relatively low level output of the difference amplifier 364 causes the transistor 369 to operate in the linear range so as to permit fine control of its conduction and therefore of the initial reference voltage level of the ramp until counting begis and the node 368 is again clamped low to inhibit the output of the amplifier 364. This operation insures that the initial reference voltage of the ramp is also ratiometric. This greatly increases accuracy by insuring at all A/D conversions begin at the same initial reference level at the initial zero count and therefore permits feedback correction of the ramp voltage at a later count as hereinafter described.

The ratiometric feedback-compensated loop operates in the following manner. As the ramp voltage $V_{ramp}$ builds, it is initially less than the reference indicative of the desired level at the 224 count which is indicated by the signal $V_{ref}$. So long as this condition exists, the output of comparator 343, the signal $V_{fbc}$, remains high so that NAND gate 345' is enabled. As soon as the signal from the decoder 324 indicating that count 224 has been attained is supplied via lead 330 to the other input of NAND gate 345', the output goes low until the ramp reaches the level of the reference voltage $V_{ref}$ at which time the signal $V_{fbc}$ goes low to disable the output of NAND gate 345'.

The negative-going, narrow-width pulse at the output of NAND gate 345' is a correction pulse of a time duration equal to the time which the ramp voltage was late in reaching the desired voltage level which should have been attained when the 224 count was reached and the pulse-width of this signal controls the amount of charge added to or substracted from the holding capacitor 353, and hence the amount of change in the level of the signal $V_c$, while the polarity, negative-going as opposed to positive-going controls the direction of the change.

Therefore, the negative-going pulse at the output of NAND gate 345' in the present example decreases the charge on the memory capacitor 353 and hence lowers the value of the signal $V_c$ presented to the base of transistor 356 via lead 354. This increases the base to emitter voltage which increases the magnitude of the current $I_c$ transmitted from the current source 323 thereby increasing the charging rate at the capacitor 320 to minimize or eliminate the time error during the next charging cycle. Similarly, the NAND gate, NOR gate combination of FIG. 3H could be used to correct in either direction. However, the embodiment of FIG. 3J can be used if the circuit is adjusted so that the ramp is normally slightly slow in reaching the reference level.

It will be understood that if greater accuracy is required, the concept of the present invention can be expanded to provide a separate control voltage of a ratiometric nature for each of the current sources $I_1$, $I_2$ and $I_3$. For example, the ramp could be forced to cross a first reference voltage at the 32 count; a second reference voltage at the 96 count and a third reference voltage at the 224 count. Depending upon the accuracy required and the cost considerations, the concept could be expanded to achieve any desired degree of accuracy.

The operation of the circuits of FIGS. 3H and 3J will now be briefly described with reference to the timing diagram of FIG. 3I. The ramp voltage signal is shown as the signal originating on line $3I_1$ and it is seen that as the ramp capacitor discharges, the value may go slightly less than zero but then quickly rises until it reaches the ratiometric initial reference level. It is maintained at this reference level by the operation of difference amplifier 364 controlling the conduction of transistor 369 until the time at which the zero count is begun. The ramp voltage $V_{ramp}$ increases at a first rate and therefore has a first slope until the 32 count is attained. During this time, it is charged solely by the current $I_1$. From the 32 count until the attainment of count 96, the ramp capacitor is charged at twice the rate since both the current $I_1$ and $I_2$ are summed to charge the ramp capacitor. From count 96 until discharge, the ramp capacitor is charged at twice the previous rate since the current $I_3$, which is equal to the sum of $I_1$ and $I_2$ is added thereto to increase the slope of the ramp. The desired voltage level which the ramp should have attained at the time of the 224 count is indicated by the horizontal dotted line marked $V_{ref}$ and once the count 255 has been obtained, the reset signal is generated and the ramp capacitor is discharged back to the initial or reset reference level to begin a new charging cycle as previously described.

In FIG. 3I, the timing line $3I_2$ shows the reset pulse which goes high at the zero count and remains high until the attainment of the count 255. It then goes low and remains low during the discharge of the ramp capacitor 320 and while the ramp capacitor is held at the initial reference level. It then goes high again at the start of the next zero count. Timing diagram line $3I_3$ shows the normally low count 32 pulse which goes high upon the attainment of the count 32 and remains high until ramp discharge. Timing line $3I_4$ shows that the count 96 line is normally low until the attainment of count 96 and it then goes high and remains high until ramp discharge. Similarly, line $3I_5$ shows the 224 decode line as being low until the attainment of count 224 at which time the pulse goes high and remains high until ramp discharge. Line $3I_6$ shows the output $V_{fbc}$ of the feedback comparator 343 which goes high as soon as the capacitor begins charging at the zero count and then goes low as soon as the value of the ramp voltage $V_{ramp}$ becomes equal to the desired reference voltage $V_{ref}$. The condition shown on line $3I_6$ indicates that the ramp was slow in attaining the reference voltage and therefore a negative going correction pulse is produced by the NAND gate 345' as indicated on line $3I_7$. Line $3I_8$ indicates a condition whereby the output $V_{fbc}$ of the ramp comparator 343 is early in reaching the desired reference voltage $V_{ref}$. Under this condition, the output of NOR gate 346' generates a narrow-width, positive-going correction pulse as indicated in timing line $3I_9$.

With this description, the broad concept of an analog to digital converter utilizing a ratiometric feedback-compensated ramp generator should be understood as well as the concept of generating multisloped ramps for increased resolution accuracy. If desired, the ramp capacitor 320 could include a pair of integrating capacitors, one being a polycarbonate and the other a polystyrene capacitor each having offsetting temperature coefficients to produce a negligible error as a function of temperature if temperature considerations become accute. The ratiometric nature of the voltage reference $V_{ref}$ used for the feedback compensation together with the ratiometric nature of the initial reset reference presented to each of the signal amplifier and comparator circuits of block 141 through 145 of FIG. 3, forces the reference to be proportional to the supply voltage so that the ramp signal falls or rises proportionally with output signals from the sensors, all of whose outputs are proportional to supply voltage, so that the analog to digital converter of the present invention is relatively immune from fluctuations to supply voltage and the like. The three slope ramp described with reference to FIGS. 3H, 3I and 3J provides a ten bit resolution at low signal levels, a nine bit resolution for intermediate levels and approximately an eight bit resolution at high signal levels so that when the A/D converter compares the analog signal level from the signal conditioner to the well-controlled ramp signal, the resulting pulse-width is an extremely accurate measure of the conditioned analog level compared to the ramp signal.

It will also be realized that a non-linear pulse-width to digital signal conversion can be achieved by varying the ramp slope during the A/D conversion. Either a linear, a logarithmic or other ramp function could also be utilized with the feedback compensated ramp generator of the present invention.

3.7 Improved Ratiometric, Feedback-Compensated Ramp Generator of the Preferred Embodiment of the Analog to Digital Converter of the Present Invention The ratiometric feedback-compensated ramp generator of block 147 of FIG. 3 is illustrated in FIG. 3F and is a much simplified version of the circuitry illustrating the broad concept of the invention set forth in FIG. 3H and represents the improved version of the ramp generator utilized in the preferred embodiment of the present invention.

The signal $t_0$ is generated by the digital logic of the binary encoder circuitry of block 122 of FIG. 2 and is inputted to the ramp generator of FIG. 3F via lead 375. The signal $t_0$ is a binary signal which activates the compensation circuit in the ramp generator and causes the ramp output to be corrected for any error due to changing component values and the like. This signal is outputted only at a predetermined count generally corresponding to the reference count previously described and is shown as the third pulse train line of the timing diagram of FIG. 3G. This signal is supplied via lead 375 to the base of a switching transistor 376 through the parallel combination of the resistor 377 and a capacitor 378 which are utilized at a speed-up mechanism to attain faster action from the transistor 376 with the capacitance of the capacitor 378 compensating for the inherent capacitance in transistor 376. The emitter of transistor 376 is connected directly to ground and a collector is connected to the negative input node 379 which is connected directly to the negative input of the feedback comparator 380.

A pair of resistors 381 and 382 are connected in series between the +9.5-volt source of potential and a reference node 383 to form a voltage divider with the reference node 379 being the junction of resistor 381 and resistor 382. The value of the resistors is chosen such that the voltage reference signal $V_{ref}$ which is presented to the negative input of the feedback comparator 380 corresponds to the desired voltage which should have been attained by the voltage ramp $i_1$ whenever a predetermined count, for example 992, used to generate the signal $t_0$ is attained.

The reference node 383 is used to supply the initial reset reference signal $i_2$ to the signal amplifier and comparator circuits of block 141 through 145 of FIG. 3 via lead 384. Reference node 383 is displaced one diode drop from ground since it is connected directly to the anode of a diode 385 whose cathode is connected directly to ground. The use of the diode 385 to lift the reference level one diode drop above ground permits the use of low-cost single supply amplifiers for the signal conditioning networks of blocks 141 through 145 of FIG. 3 and for the low-cost high speed ramp reset switch to be hereinafter described. The comparators used in the signal conditioning networks of blocks 141 through 145 and for the feedback comparator 380 are used in a circuit arrangement such that only the negative transitions from high to low are used for critical timing with the slower rising edge portion from low to high being not critical and hence not used for timing purposes.

The output of the feedback comparator 380 is the signal $V_{fbc}$ which stands for the voltage at the output of the feedback comparator and this signal, which is normally allowed to float in a high condition, is supplied from the output of the comparator 380 to one terminal of a resistor 386 whose opposite input is connected to a voltage compensation node 387. Node 387 is connected to one plate of a holding or memory capacitor 388 whose opposite plate is connected to the +9.5-volt source of potential.

The combination of the resistor 386 and the capacitor 388 form a low pass filter which acts as a pulse-width to voltage level converter for transforming the compensation or correction signal $V_{fbc}$, which is shown as the fourth pulse train of the timing diagram of FIG. 3G into a voltage level indicative of the pulse-width thereof by varying the charge stored on the holding capacitor 388. The voltage level $V_c$ is used to control the operation of a voltage-to-current transformer or current source comprising transistor 389 and resistor 390. The voltage compensation node 387 is connected directly to the base of a linearly operated transistor 389 whose emitter is connected through the resistor 390 to the +9.5-volt source of potential. The collector of transistor 389 is connected directly to a first plate of the integrating ramp capacitor 391 whose opposite plate is connected to the reference lead 384. The first plate of the ramp capacitor 391 which stores the ramp voltage $V_{ramp}$ is connected through a resistor 392 back to the positive input of the ramp feedback comparator 380 and via lead 393 to the emitter node 394 of a discharge transistor 395. Node 394 is connected via lead 396 to supply the ramp signal $i_1$ which represents the voltage $V_{ramp}$ to the signal amplifier and comparator circuit of blocks 141 through 145 as previously described.

The base of transistor 395 is connected directly to an input node 397 and input node 397 is connected to a +5-volt source of potential through a resistor 398 and to a source of the reset signal $i_0$ via lead 399. The signal $i_0$ is generated in the binary encoder circuitry of block 122 of FIG. 2 and is a binary signal which commands the A/D converter to begin a conversion when the ramp voltage is equal to the $i_2$ reference on the high to low transition of the signal and during the high state of the signal, the ramp capacitor is discharged to reset the ramp voltage as illustrated in the third pulse train of the timing diagram of FIG. 3G.

The +9.5-volt source of potential is also connected to the reference lead 384 through a pair of parallel filter capacitors 400, 401 and another filter capacitor 402 is connected in parallel with the diode 385 between the reference leads 384 and ground. The filter capacitors 400, 401 and 402 are used to filter out noise from other circuit areas and particular noise which is out of phase. By function, the ratiometric, feedback-compensated ramp generator of FIG. 3F includes an integrating capacitor 391; a voltage-controlled current source comprising transistor 389 and resistor 390; a reset switch comprising transistor 395; a pulse-width error modulator comprising the feedback comparator 380; a switched reference input to the pulse-width error modulator comprising transistor 376 and the resistors 381, 382; and a pulse-width to voltage converter comprising the low pass filter of resistor 386 and capacitor 388. The resistor 386 also serves as a damping resistor to reduce ramp jitter while the capacitor 388 serves as a holding for memory capacitor for holding the compensation reference voltage level for node 387. The diode drop established at the reference point 383 by diode 385 is used because the comparator inputs do not work linearly down near actual ground potential.

In operation, the reference level established at node 387 by the value stored on the holding capacitor 388 controls the amount of charging current through resistor 390 and transistor 389 and therefore the charging rate of the ramp capacitor 391. The voltage on the charging capacitor 391, $V_{ramp}$ is transmitted via lead 393, node 394 and lead 396 to the signal amplifier and comparator circuits of blocks 141 through 145 of FIG. 3 as the ramp signal $i_1$. When the digital signal $i_0$ is transmitted from the binary encoder logic of block 122, the high transition of the signal causes the base of transistor 395 to go high which switches transistor 395 from the non-conductive to a conductive state and completes a current path which serves to discharge the ramp capacitor 391 and to sink the current passed by resistor 390 and transistor 389 so long as $i_0$ remains high. As soon as $i_0$ goes low when the ramp capacitor has recharged to the reference level $i_2$, the ramp capacitor 391 is again enabled to charge since the base of transistor 395 again goes low switching transistor 395 to a non-conductive state. The voltage on the ramp capacitor 391 is continually fed back through resistor 392 to the positive input of the feedback comparator 380.

During normal operation, the signal $t_0$ which is transmitted from the binary encoder logic of block 122 is high. A high at the base of transistor 376 maintains it in a conductive state to complete a current path between the reference node 379 and ground so that the negative input of the comparator 380 is clamped to ground so long as $t_0$ is high. Therefore, so long as the ramp signal fed back to the positive input of comparator 380 is above ground potential, the output of comparator 380 is normally high as indicated by the signal $V_{fbc}$ in the timing diagram of FIG. 3G. This high signal selects a normal voltage level on the voltage capacitor 388 which controls the conduction of transistor 389 in its linear range and therefore the amount of charging current $I_c$ supplied to the ramp capacitor 391.

When the signal $t_0$ goes low, indicating that the digital logic portion of the binary encoder of block 122 has detected a predetermined count such as 992 corresponding to the predetermined voltage level $V_{ref}$ which the ramp should have attained at the time, the low is immediately applied to the base of transistor 376 causing it to switch to a non-conductive state. The voltage potential at node 379, which is the signal $V_{ref}$ established by the voltage divider of resistors 381 and 383 and which is ratiometric to the 9.5-volt power supply and the reset reference $i_2$ and which is indicative of the desired level which the ramp should have reached at this time is supplied to the negative input of the comparator 380. As soon as the reference at node 379 is unclamped and applied to the negative input of the comparator 380, the comparator output goes low and remains low momentarily until the actual ramp voltage seen at the positive input reaches the level $V_{ref}$.

As soon as the two inputs to the comparator 380 are equal, the output again goes high as indicated in the fourth timing line of FIG. 3G. This results in the generation of a negative-going, narrow-width correction pulse which is applied to the filter network of resistor 386 and capacitor 388 which in turn results in a pulse-width to voltage level conversion which slightly adjusts the level of the voltage at node 387 so as to increase current $I_c$ outputted from the current source of resistor 390 and transistor 389. The rate at which the ramp capacitor 391 charges increases in an attempt to correct for the present lag on the next ramp cycle.

Therefore, the ratiometric, self-correcting ramp generator of FIG. 3F can be used in conjunction with the signal amplifier and comparator circuitry of blocks 141 through 145 of FIG. 3 and with the digital logic of the binary encoder of block 122 of FIG. 2, as hereinafter described, to form an extremely accurate, low-cost, analog to digital converter that can be easily interfaced with either a custom or standard microprocessor. The circuit of FIG. 3F may be used in hostile environments such as in the electronic engine control system used to control the operation of an internal combustion engine in a standard automobile or the like and its accuracy is relatively unaffected by changes to temperature, age or variations in power supply. The self-correcting aspect of the present circuit enables the establishment of a direct correlation between the slope of the ramp and the frequency of the clock pulses counted with the various counters of the system and results in greatly improved accuracy with greatly reduced cost due to simplicity and maintainability over the systems of the prior art.

IV. Binary Encoder Circuits

4.0 Broad Functional Description of the Binary Encoder Circuitry

A broad functional description of the various circuitry included in block 122 of FIG. 2 will now be described with reference to the block diagram of FIG. 4. Broadly speaking, the circuitry of FIG. 4 is used to perform the timing, synchronizing and data translation functions between the analog signal converting electronics of FIG. 3 and the microprocessor system of block 123 of FIG. 2.

The differentiator and the level detector circuitry of block 411 of FIG. 4 receives as its inputs the signals $J_1$ which is a digitally conditioned signal indicative of the initial starting or cranking mode of operation of the engine and either the signal $a_1$ or $d_1$ from blocks 141 or 144, respectively of FIG. 3. The signal $a_1$ represents a properly conditioned and amplified analog signal indicative of manifold absolute pressure and the signal $d_1$ represents a properly conditioned and amplified analog signal indicative of throttle position as previously described. The circuitry of block 411 outputs the signal $A_2$ or $D_2$ to the microprocessor system of block 123 of FIG. 2 to actuate an acceleration enrichment interrupt as hereinafter described. The circuitry of block 411 operates to sense a rapid change in speed requirements or to otherwise anticipate the need for immediate acceleration enrichment.

Block 412 of FIG. 4 is a multiplexer which operates under computer command of the signals on the secondary command signal bus $m_0$ from the microprocessor system of block 123 to select one of the analog sensor pulse-width output signals A, B, C, D, E or $f_8$ from the outputs of FIG. 3 for transmission to the pulse-width to binary converter circuitry of block 413.

Block 413 contains various digital circuitry responsive to command signals from the microprocessor system of block 123 for converting the selected pulse-width signals from the multiplexer of block 412 into a binary number indicative of the sensed analog parameter and transmits the digital word indicative of the sensed parameter over an eight bit data bus to the microprocessor system of block 123.

The binary encoder circuitry of FIG. 4 also includes the oxygen system integrator circuitry of block 414 which receives the properly conditioned signals $F_1$, $F_3$ from the first and second oxygen sensor channels of the conditioner circuit of FIG. 3 and the signal $F_2$ which indicates whether or not the sensor signals are usable. The oxygen system integrator circuitry of block 414 also contains an oxygen sensor qualifier or test control circuit for generating the signals $g_3$ and $g'_3$ for periodic transmission back to the oxygen sensor conditioning circuit of block 146 of FIG. 3 for interrogating the individual oxygen sensors of block 131 of FIG. 2 to ascertain their reliability or usefulness. The oxygen system integrator circuitry of block 414 also includes circuitry for controlling the operation of the oxygen feedback sensor sampler and an electronic signal integrator for converting the sensor signals into a pulse-width indicative of the lean or rich status existing in the exhaust system 103 of the internal combustion engine 101 of FIG. 1 for inputting to the multiplexer circuitry of block 412.

FIG. 4 also includes the crankshaft position signal conditioner of block 415 which receives the output signal G from a magnetic pick-up device or the like represented by the crankshaft sensor of block 132 of FIG. 2 and conditions the signal G to produce outputs having either a rising or a falling edge in phase with the center of the sensed magnetic perturbation of the sensed element. The crankshaft position signal conditioner of block 415 outputs a properly shaped and conditioned engine crankshaft position pulse $G_3$ to the oxygen system integrator circuitry of block 414 for timing purposes and to the crankshaft position pulse processor of block 416. The crankshaft position pulse processor of block 416 synchronizes the engine position pulse $G_3$ to the logic clock so as to generate one and only one, one-clock period wide pulse for each engine crankshaft position pulse $G_3$. In addition, a number of related control signals are generated from the engine crankshaft position pulse $G_3$ which are utilized in various sections of the logic as hereinafter described.

Lastly, FIG. 4 includes an engine time interval counter 417 for measuring the time interval between engine crankshaft position pulses. The engine time interval counter of block 417 includes a storage register which is a serial dynamic register in combination with a half adder circuit so as to provide a binary counter function while minimizing the amount of area utilized when the circuit is implemented in custom LSI. Since the serial shaft register includes sixteen stages, the engine time interval word may become more than eight bits in length. Therefore, the time iterval register must be sampled by the computer program in two separate operations. Furthermore, the engine time interval counter circuitry of block 417 includes circuitry for detecting and indicating an engine stall condition which may be utilized in the alarm control circuitry, to be hereinafter explained, to turn off the fuel pump to the engine during a stall condition to prevent fires and the like.

4.1 Electronic Differentiator and Level Detector Circuit the differentiator and level detector circuitry of block 411 of FIG. 4 will now be described with reference to FIG. 4A. The properly conditioned and amplified analog signal $a_1$ indicative of sensed manifold absolute pressure or the properly conditioned and amplified analog signal $d_1$ indicative of throttle position or angle is supplied to input node 418 via lead 419. Node 418 is connected to the negative input of a conventional voltage comparator 420 through a pair of series resistors 421, 422. The junction 424 of the series resistors 421, 422 is connected through a capacitor 423 to a +9.5-volt source of potential. The combination of resistor 421 and the capacitor 423 forms a low pass filter which acts as a delay to the input signal presented to input node 418 while the second series resistor 422 provides isolation from the signal input for protecting the voltage comparator 420.

Input node 418 is also connected to the anode of a diode 425 whose cathode is connected to a node 426. Node 426 is connected to ground through a resistor 427 and to a positive input comparator node 429 through a resistor 428. Positive input node 429 is connected directly to the positive input of the voltage comparator 420 and the output of the comparator 420 is taken from lead 430 which is connected back to the positive input node 429 through a feedback resistor 431. The diode 425 provides a small voltage drop difference between the input node 418 and node 426 while the resistor 428 provides isolation for protecting the positive input of comparator 420. The feedback resistor 431 provides positive feedback to achieve a hysteresis effect so as to provide a sharp comparator output signal transition whenever the comparator input voltage reaches the established threshhold.

The comparator output lead 430 supplies the acceleration enrichment signal $A_2$ derived from manifold absolute pressure or the acceleration enrichment signal $D_2$ derived from throttle angle to the microprocessor system of block 123 for generating an interrupt flag to inform the system of the need for acceleration enrichment. The output lead 430 is connected to a +5-volt source of potential through a pull-up resistor 432. So long as the output of the comparator 420 is low, the pull-up resistor 432 has no effect, but as soon as the output of the comparator goes high, the pull-up resistor 432 insures that the proper output logic level is attained for the signal $A_2$ or $D_2$.

The output lead 430 is also connected directly to the collector of a transistor 433 whose emitter is connected directly to ground. The base of transistor 433 is connected to a node 434. Node 434 is connected to the emitter of transistor 433 through a resistor 435 and to an input lead 436 through a resistor 437. The input lead 436 is adapted to receive the digital input signal $J_1$ indicating the existence of the starting or cranking mode of operation of the internal combustion engine 101 of FIG. 1. The series resistors 435 and 437 establishes a voltage divider between the input lead 436 and ground and the reference at the junction 434 of the voltage divider resistors 435, 437 is applied directly to the base of transistor 433 for controlling the operation thereof. Transistor 433 is normally maintained in a non-conductive state so as to have no effect upon the output of the voltage comparator 420. However, whenever the signal $J_1$ is present at the input 436, the potential present at the base from the voltage divider node 434 switches the transistor 433 to a conductive state to establish a current path between the output of the comparator 430 and ground thereby disabling the use of the differentiator and level detector circuit of FIG. 4A during the engine starting or cranking mode of operation.

In operation, input node 418 monitors the properly conditioned and amplified analog signal $a_1$ indicative of the sensed manifold absolute pressure or the properly conditioned and amplified analog signal $d_1$ indicative of the sensed throttle angle. During starting or cranking conditions, the generation of the signal $J_1$ will disable the comparator 420 by switching the transistor 433 to a conductive state and shunting the comparator output to ground. During other than starting conditions, the signal $J_1$ will be low, disabling the transistor 433 and enabling the differentiator and level detector circuitry of FIG. 4A.

So long as the signal presented to the input node 418 is a slowly rising signal, the output of comparator 420 will remain low since the comparator will not respond. This condition is characteristic of a normal operating condition wherein acceleration enrichment is not required. If, however, the operator of the vehicle steps on the accelerator 109, the rapid rise in the throttle angle signal or the rapid increase in manifold absolute pressure resulting from the increased air flow are characteristic of a need for additional fuel in the form of acceleration enrichment. A fast rising signal at the input 418, which amounts to a change in value of greater than a voltage drop across the diode 425, will apply a high signal to the positive input of the comparator 420 causing its output to go immediately high. This high output pulse, $A_2$ or $D_2$, will continue until the signal present at the negative input becomes equal to the analog signal $a_1$ or $d_1$, respectively, present at the positive input node 429.

The negative input of the comparator 420 does not rise as quickly as the signal at the positive input node 429 because of the low pass filter comprising resistor 421 and capacitor 423. As the charge of the capacitor 423 builds, the negative input will catch up to the positive input causing the output of the comparator 420 to again go low to terminate the pulse width output signal $A_1$ or $D_2$. Therefore, the pulse-width or duration of the signal $A_2$ or $D_2$ is indicative of the magnitude of the change in signal levels and therefore the magnitude of the acceleration enrichment required. The higher the change in the value of the input signal, the longer the delay caused by capacitor 423 and therefore the longer the pulse-width or pulse duration of the output pulse $A_2$ or $D_2$.

Figure 4A:
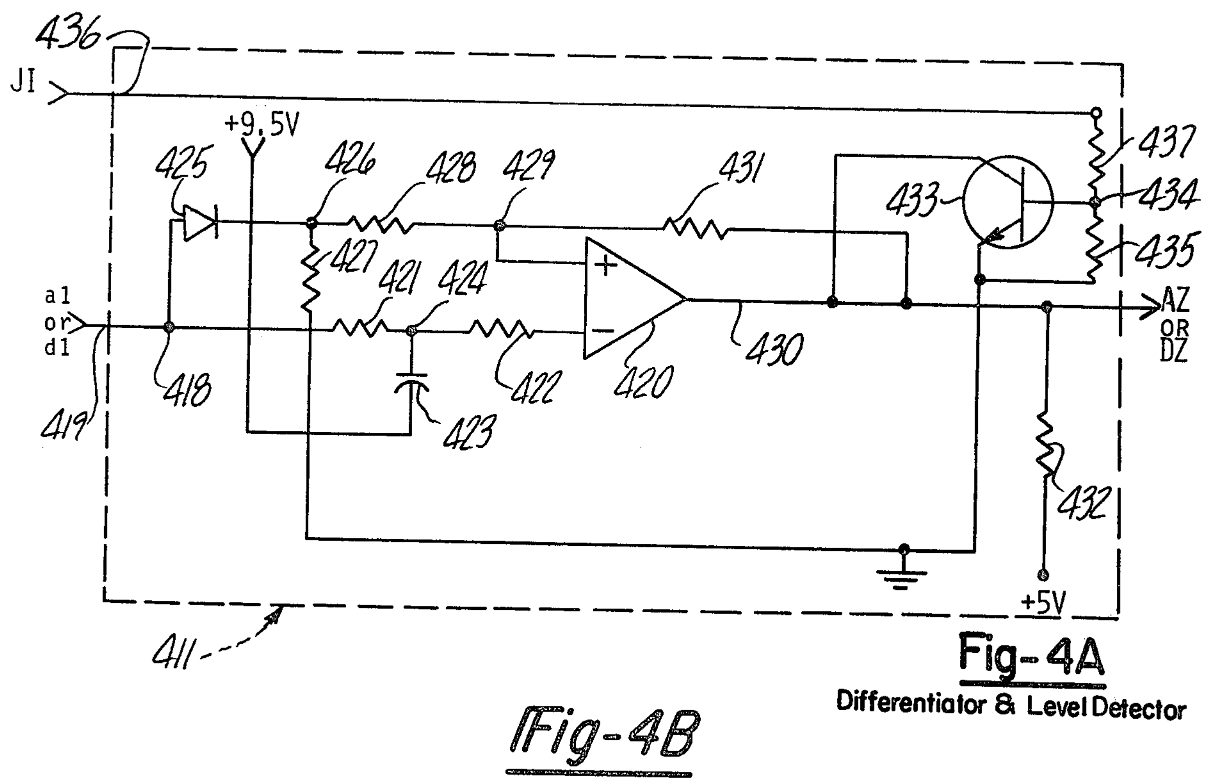
FIG. 4A is an electrical schematic diagram of the preferred embodiment of the differentiator and level detector circuitry of block 411 of FIG. 4.

While the actual circuit configuration of FIG. 4A functions as an electronic differentiator whenever the signal is above a predetermined 0.6–0.8 volt level, it actually (1) uses an integrating feature to achieve a differentiating result; (2) is more accurate than a conventional differentiator and (3) produces a faster output transistion for sharper edges to the output pulses $A_2$ or $D_2$. As hereinafter described, the microprocessor system of block 123 of FIG. 2 responds to the acceleration enrichment commands $A_2$ or $D_2$ to set interrupt flags to allow the processor, under program control, to provide the commanded acceleration enrichment to be added, as hereinafter described, to the fuel pulse output described with reference to the binary decoder circuitry of block 124 and the power control circuits of block 125.

4.2 Pulse-Width Signal Multiplexer

Figure 4B:
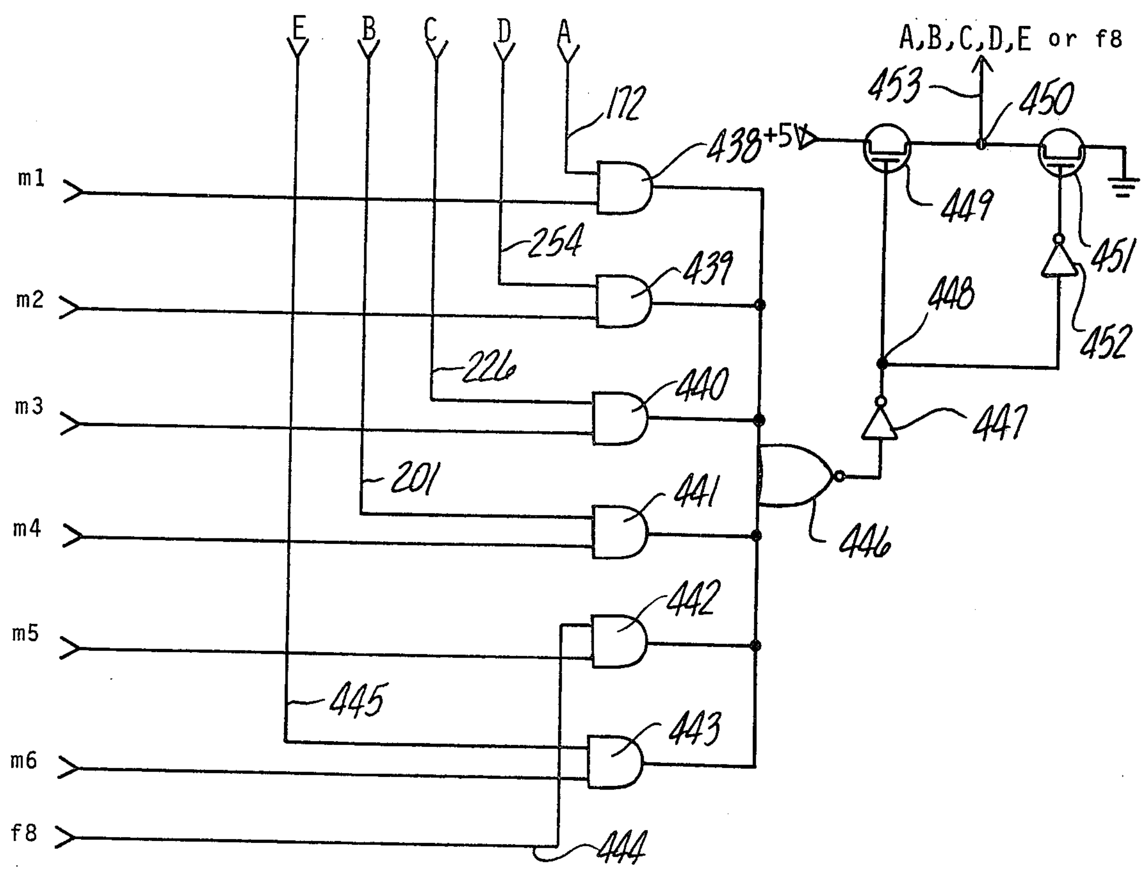
FIG. 4B in an electrical schematic diagram of the multiplexer circuitry of block 412 of FIG. 4.

The pulse-width multiplexer of block 412 of FIG. 4 will now be described with reference to the circuitry of FIG. 4B. In the circuit of FIG. 4B, a group of signals $m_0$ on the bus from the secondary command signal generator of the microprocessor system of block 123 of FIG. 2, as hereinafter described, comprises a group of ten computer-commanded, hardware-generated, secondary command signals which is connected to the multiplexer circuitry of FIG. 4B.

The multiplexer includes first, second, third, fourth, fifth and sixth logical AND gates 438, 439, 440, 441, 442, and 443 respectively. The pulse-width signal A from the pressure sensor signal amplifier and comparator circuit of FIG. 3A is connected to one input of AND gate 438 via lead 172. A first input to AND gate 439 is connected to receive the pulse-width signal D from the output of the throttle position sensor signal amplifier and comparator circuit of FIG. 3D via lead 254. The first input to AND gate 440 is connected to the output of the engine coolant temperature sensor signal amplifier and comparator circuit of FIG. 3C via lead 226 for receiving the pulse-width signal C while the first input to AND gate 441 is connected to receive the pulse-width signal B from the output of the air temperature sensor signal amplifier and comparator circuit of FIG. 3B via lead 201. The first input to AND gate 442 is adapted to receive the pulse-width modulated signal $f_8$ representing the integrated value for the selected oxygen sensor from the circuity of FIG. 4D as hereinafter described via lead 444. Lastly, the first input to AND gate 443 is connected to the pulse-width signal E from the output of an EGR valve position sensor signal amplifier and comparator circuit similar to the throttle position sensor signal amplifier and comparator circuit of FIG. 3D via lead 445.

The second input to each of the six AND gates 438 through 443 is connected to a corresponding secondary command signal $m_1$–$m_6$ respectively. Each of the outputs of the AND gate 438 through 443 form an input to a six input NOR gate 446 whose output is connected directly to the input of an inverter 447 whose output is connected directly to node 448. Node 448 is connected directly to the gate electrode of a transistor 449. In the preferred embodiment of the present invention, the transistors are nMOS FETs formed via conventional LSI techniques. As conventionally known, each FET transistor has two current-carrying electrodes (a source and a drain) plus a gate electrode. One current-carrying electrode of the transistor 449 is connected to the +5-volt source of potential and the opposite current-carrying electrode is connected to an output node 450. Node 450 is also connected to a first current-carrying electrode of a second n-MOS FET transistor 451 whose opposite current-carrying electrode is connected directly to ground. The note 448 is also connected to the input of an inverter 452 whose output is connected to the gate electrode of transistor 451 and the output node 450 is used to output the selected multiplexed pulse-width signal A, B, C, D, E or $f_8$ on output lead 453 for transmission of the selected signal to the pulse-width to binary converter of block 413.

In operation, the pulse-width signal multiplexer of FIG. 4B operates as follows. One and only one of the secondary command signals $m_1m_6$ are transmitted to the second input of the corresponding AND gate at any one time. The arrival of the selected secondary signal command enables the corresponding AND gate to pass the pulse-width signal A, B, C, D, E or $f_8$, present at its other input, as a high signal level. A high signal level at the output of any of the AND gates 438 through 443 causes the output of NOR gate 446 to go low and the output of the inverter 447, which appears at node 448, to go high. A high signal at node 448 turns on the transistor 449 switching it to a conductive state while the low from the output of inverter 452 turns off transistor 451 rendering it non-conductive. Therefore, a high signal at node 448, connects the output node 450 to the +5-volt source of potential causing a high signal output on lead 453. As soon as the selected sensor pulse-width signal present at the input of the enabled AND gate goes low, the output of NOR gate 446 goes high since all of its inputs are low. This results in a low signal at node 448 to turn off transistor 449 and turn on transistor 451 so as to pull node 450 to ground and terminate the transmission of the pulse-width output signal on lead 453.

Therefore, the microprocessor system of FIG. 123 can select, through programming and the secondary command signal generator, as hereinafter described, which of the sensor signals is to be converted from a pulse-width signal into a binary number or digital word by enabling the corresponding AND gate to pass the selected pulse-width signal which is then multiplexed via NOR gate 446 and the output network including transistors 449, 451 and inverters 447, 452 for transmission to the pulse-width to binary converter of block 413 via lead 453.

4.3 Pulse-Width to Binary Converter

Figure 4C:
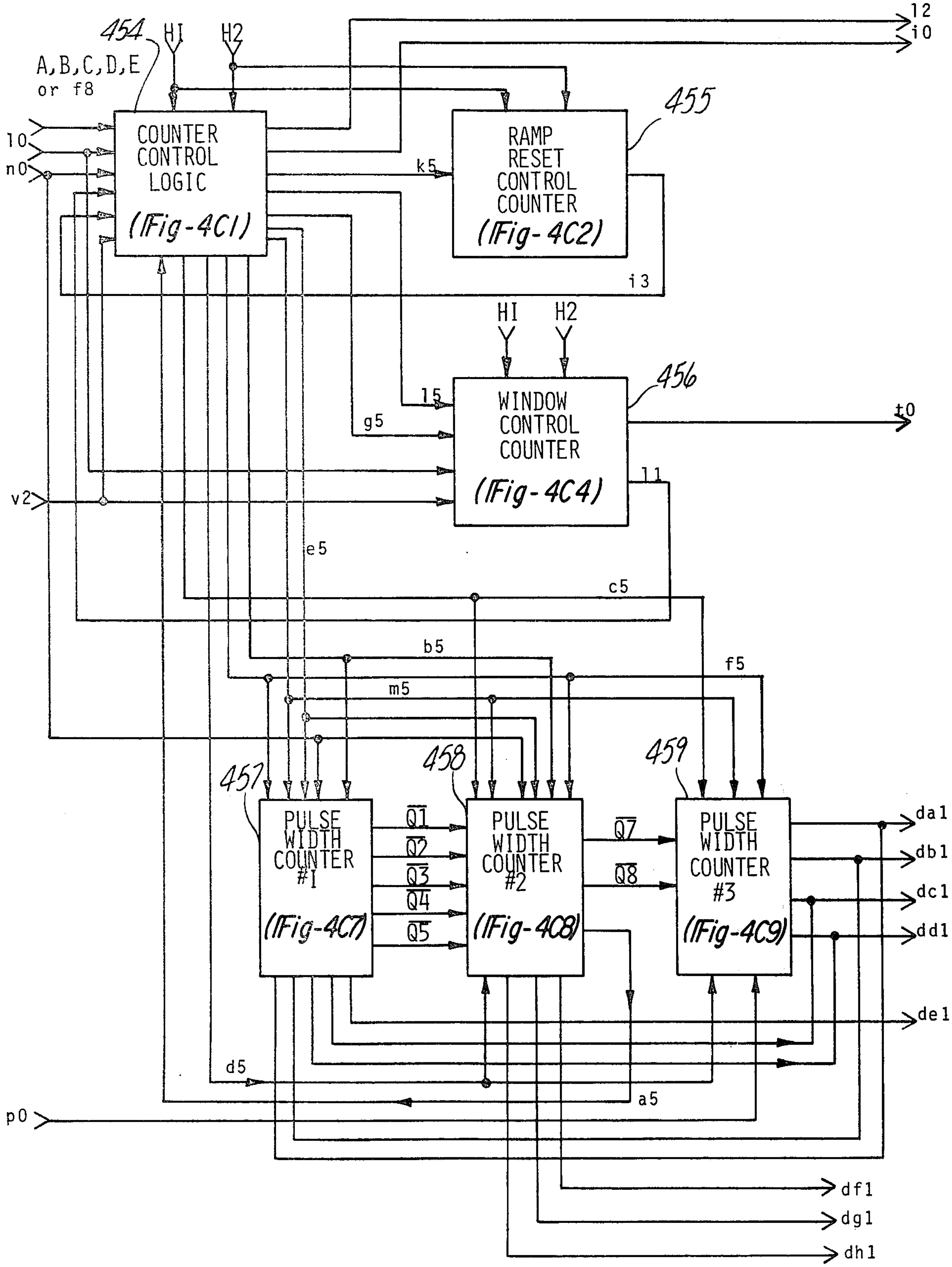
FIG. 4C is a block diagram of the pulse-width to binary converter system of block 413 of FIG. 4.
Figure 408:
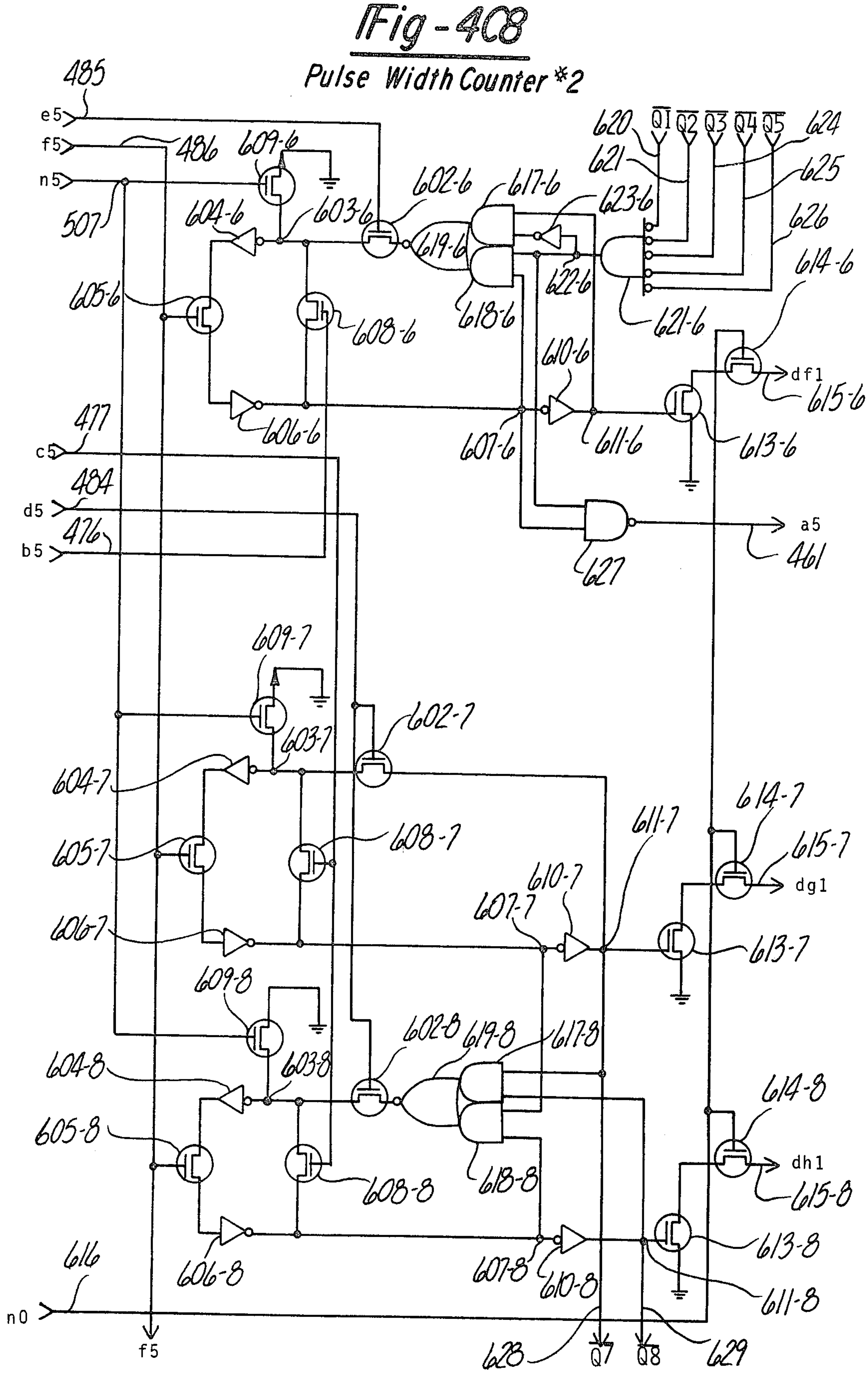

The pulse-width to binary converter circuitry of block 413 of FIG. 4 is illustrated in FIG. 4C as a more detailed block diagram. The pulse-width to binary converter of FIG. 4C includes the counter control logic of block 454 which receives the multiplexed pulse-width signals A, B, C, D, E or $f_8$ and various command signals generated by the microprocessor circuitry of block 123 to control the ramp reset control counter of block 455; the window control counter of block 456, and the first, second and third pulse-width counters 457, 458 and 459 respectively.

The counter control logic of block 454 generates the various signals required for controlling the circuitry of blocks 455 through 459. The ramp reset control counter of block 455 is generally used in generating a ramp reset signal and the window control counter circuitry of block 456 is used to define the window during which A/D conversion is enabled, as previously described with respect to the timing diagram of FIG. 3G. The analog portion of the analog to digital converter of the preferred embodiment of the present invention was described in FIG. 3F while the digital portion of the A/D converter will be described with respect to the FIG. 4C and the various subsections thereof. The functions of the individual blocks will be discussed in more detail as the blocks themselves are discussed hereinafter. The pulse-width counters 457, 458 and 459 are used to generate a binary number or count which serves as a digital word indicative of the measured or converted parameter originally sensed and the digital word is outputted and supplied via the data bus $da_1$ through $dh_1$ to the microprocessor system of block 123 for control purposes as hereinafter described.

As will become obvious from a description of the various subsections of FIG. 4C, the incorporation of the ramp reset control counter of block 455 and the window control counter of block 456 into the analog to digital conversion system of the present invention is a major innovation. Similarly, the concept of using a single pulse-width binary converter which is time-shared via the multiplexer of FIG. 4B among the various sensor channels previously described is innovative. The A/D converter is started by a computer command and the sensor input to be converted is selected by computer command where both commands are provided by the execution of an instruction sequence in the computer program. The frequency of sampling of each of the sensors can be independently controlled by the computer program. The sensor to be converted can be commanded by computer program thereby allowing the computational sequence to be synchronized to the sensor conversion. This results in improved dynamic response of the control system. Furthermore, the conversion counter comprising blocks 457, 458 and 459 also hold the binary number or words indicative of the converted signal until it is requested by the computer thereby eliminating the necessity of separate holding or buffer registers. As indicated above, the several unique advantages of the various portions of the circuitry of FIG. 4C will be described in greater detail as the individual circuits are described hereinbelow.

4.4 Counter Control Logic

The counter control logic of block 454 of FIG. 4C will now be described with reference to the circuitry of FIG. 4C1. As previously indicated, the digital circuitry of the preferred embodiment of the present invention is implemented by LSI techniques using nMOS logic. The particular building blocks developed from the basic nMOS circuitry will be described hereinafter and the individual building block circuits are defined in FIGS. 9.1 through 9.30. The circuitry of the present invention utilizes dynamic and static two-phase logic employing two different master clock signals $H_1$ and $H_2$ out of phase with one another and operating at a clock rate of one megahertz. The crystal controlled clock oscillator of block 134 of FIG. 2 will be described in detail hereinafter and circuitry is also provided for generating additional clock signals utilizing the master clock signals $H_1$ and $H_2$.

The counter control logic will now be described with reference to the schematic diagram of FIG. 4C1. A signal $a_5$, which is a digital signal indicating that the lower six bits of the pulse-width binary counter of blocks 457, 458 and 459 are not all ones, outputted from the second counter portion of block 458 and inputted via lead 461 to a node 462. Node 462 is connected directly to the input of an inverter 463 whose output is connected to one inverted input of a logical OR gate 464 having inverted inputs, which is, as known in the art, the logical equivalent to a two input NAND gate. Node 462 is also connected directly to a first inverted input of a logical AND gate 465 having four inverted inputs which is, as known in the art, the logical equivalent to a four input NOR gate.

The selected pulse-width representations A, B, C, D, E or $f_8$ of the analog sensor outputs are supplied from the output of the multiplexer of FIG. 4B and supplied via lead 453 to the input of an inverter 466. The output of inverter 466 is connected to one current-carrying electrode of an FET transistor 467 (hereinafter simply referred to as transistor) whose other current-carrying electrode is connected directly to node 468. Node 468 is connected directly to the first current-carrying electrode of another transistor 469 whose opposite current-carrying electrode is connected directly to node 470. A parallel path is provided between node 468 and 470 comprising an inverter 471 having its input connected to node 468 and its output connected directly to the input of an inverter 472 whose output is in turn connected directly to the node 470. Node 470 is then connected directly to a first inverting input of a logical AND gate 473 having four inverted inputs. The gas electrode of the first transistor 467 is connected to the $H_2$ clock phase or signal while the gate of the second transistor 469 is connected to the $H_1$ clock phase or signal. The pulse-width signal is supplied via lead 453 and inverted by the action of inverter 466. It is then sampled or gated with the clock pulses $H_2$ and $H_1$ to arrive at the first inverted input of AND gate 473. The use of transistors 467 and 469 and inverters 471 and 472 provide a conventional high frequency bounce prevention circuit for insuring that the selected pulse-width signal is continuously applied to the first inverted input of the AND gate 473 for its entire duration since it only debounces noise pulses or spikes having a time duration of less than one clock phase $H_2$.

The output of gate 473 is taken from node 474. Node 474 is connected to the input of an inverter 475 whose output supplies the signal b5 to the first and second pulse-width counters of blocks 457 and 458 respectively via output lead 476. The signal b5 is a control signal used to inhibit the lower six bits of the pulse-width counters of blocks 457 and 458 from counting as hereinafter described.

Node 474 is also connected to the second inverted input of the logical OR gate 464. The output of the gate 464 is the signal $c_5$ which is supplied to the second and third pulse-width counters of blocks 458 and 459 via lead 477. The signal $c_5$ is a control signal used to inhibit the upper five bits of the pulse-width counter of blocks 458 and 459 from counting as hereinafter described.

Node 474 is also connected to the input of an inverter 478 whose output is connected to a node 479. Node 479 is connected to the second inverted input of AND gate 465 and to the first inverted input of a logical AND gate 480 having three inverted inputs. A clock signal $H_2$ is supplied to the input of an inverter 481 whose output is connected to a node 482. Node 482 is connected directly to a second inverted input of gate 480 and to a third inverted input of gate 465. The signal $H_2$ is also connected directly to the inverted input of another logical AND gate 483 having two inverted inputs and the output of gate 483 is connected back to the third inverted input of AND gate 480 and to the fourth and last inverted input of AND gate 465. The second and final input of gate 483 is taken from the output of gate 480. With their outputs cross-coupled to their respective inputs, gates 480 and 483 establish a latch-type arrangement. The output of gate 465 is the signal $d_5$ which is supplied to the pulse-width counter circuitry of blocks 458 and 459 via lead 484. The signal $d_5$ is a control signal which enables the D inputs into the five upper bits of the pulse-width counter of blocks 458 and 459 of FIG. 4C.

The output of gate 480 is the signal $e_5$ which is supplied to the pulse-width counter of blocks 457 and 458 via lead 485. The signal $e_5$ is a control signal which enables the D inputs into the lower six bits of the pulse-width binary counter of blocks 457 and 458. The output of gate 483 is the signal $f_5$ which is connected to all stages of the pulse-width counter of blocks 457, 458 and 459 via led 486 and latches the stored information into all stages of the pulse-width binary counter of blocks 457, 458 and 459, as hereinafter described.

An R/S flip-flop 487 has its set input connected to the source of the signal $1_0$ which is a control signal from the microprocessor system of block 123 of FIG. 2 which is used to synchronize the ramp generator to the computer program and to initiate a software-commanded analog to digital conversion. The reset input of the flip-flop 487 is connected directly to the source of the computer commanded control signal $n_0$ from the microprocessor system of block 123 which enables the least significant word of the pulse-width to binary converter to connect onto the data bus.

One clock input of the flip-flop 487 is connected to the clock signal $H_1$ while the other clock input is connected to the oppositely phased clock signal $H_2$. The direct reset input DR of the flip-flop 487 is connected directly to the source of the reset signal $v_2$ which is a power-on reset signal synchronized to the logic clock. The $\overline{Q}$ output of flip-flop 487 is connected directly to output node 488. Node 488 is connected directly to one inverted input of a logical AND gate 489 having two inverted inputs. Node 488 is also connected via lead 490 to a first input of a logical NOR gate 491 and still further to a first current-carrying electrode of a transistor 492 whose opposite current-carrying electrode is connected directly to the input of an inverter 493. The output of inverter 493 is connected to the first current-carrying electrode of another transistor 494 whose opposite current-carrying electrode is connected to a node 495. Node 495 is connected directly to the second inverted input of a logical AND gate 489 and to the input of an inverter 496 whose output is connected directly to a second input of NOR gate 491.

The gate electrode of the first transistor 492 is connected to the source of clock pulses $H_1$ while the gate electrode of the second transistor 494 is connected to a source of the oppositely phased clock signals $H_2$ so that the $\overline{Q}$ output presented to node 488 and thence to one input of the gate 489 is delayed one clock time and inverted before being presented to the second inverted input of the AND gate 489. The output of AND gate 489 is connected directly to the set input of a second R/S flip-flop 497; to one inverted input of a logical AND gate 498 having two inverted inputs; and to node 499. The control signal $1_1$ which is supplied from the output of the window control counter of block 456 of FIG. 4C as hereinafter explained, is supplied via lead 501 to node 502. Node 502 is connected directly to the input of an inverter 503 whose output is connected to the second inverted input of gate 498. The output of gate 498 is connected directly to the reset input of R/S flip-flop 497 while one clock input thereof is connected to the clock phase $H_1$ and the other clock input is connected to the clock phase $H_2$. The direct reset input of the R/S flip-flop 497 is connected to the source of the reset signal $v_2$. The Q output of flip-flop 497 is connected directly to the third and last input of the NOR gate 491 and the output of NOR gate 491 is taken from node 504. Node 504 is connected directly to a second inverted input of AND gate 473 and to the first inverted input of a logical AND gate 505 having two inverted inputs. The other inverted input to AND gate 505 is connected via lead 506 to the output of the ramp reset control counter of block 455 of FIG. 4C, as hereinafter described, which outputs the signal $i_3$ which is an overflow signal from the ramp reset control couner. The output of AND gate 505 is the signal $n_5$ which is supplied to all stages of the pulse-width counter of blocks 457, 458 and 459 via output lead 507. The signal $n_5$ is a control signal used to reset the pulse-width counter as hereinafter described.

The signal $I_1$ which indicates the end of an analog to digital conversion is also supplied via lead 501 and node 502 to the reset input of another R/S flip-flop 510 and to the input of an inverter 511 whose output is connected directly to the set input of flip-flop 510. The first clock input of the flip-flop 510 is connected to the first clock phase $H_1$ and a second clock input is connected directly to the second clock phase $H_2$. The direct reset input is connected to receive the power-on reset signal $v_2$ as previously described. The $\bar{Q}$ output of R/S flip-flop 510 is taken from node 512. Node 512 is connected via lead 513 to the third input of gate 473 and the fourth input of gate 473 is taken directly from the output of NOR gate 491 via node 504. As previously described, the output of AND gate 473 is taken from node 474 and inverted or gated to generate the control signals $b_5$, $c_5$, $d_5$, $e_5$, and $f_5$.

Node 512 is also connected via lead 514 to a first inverted input of a logical AND gate 515 having four inverted inputs. The Q output of the R/S flip-flop 510 is connected directly to a first inverted input of a logical OR gate 516 whose other inverted input is taken from the output of an inverter 517 whose output is connected to the node 499 which in turn is connected to the output of gate 489, as previously described.

The output of gate 516 is taken from node 518 and supplied directly to the set input of still another R/S flip-flop 519. Node 581 is also connected to a first inverted input of a logical AND gate 520 whose other inverted input is connected directly to the lead 506 for receiving the overflow signal $i_3$ from the ramp reset control counter of block 455 of FIG. 4C as previously mentioned. The output of gate 520 is connected directly to the reset input of the R/S flip-flop 519. The signal $H_1$ is connected to the first clock input of flip-flop 519; the signal $H_2$ is connected to the second clock input thereof and the direct reset input is connected to receive the power on reset signal $v_2$.

The Q output of R/S flip-flop 519 is fed to node 509 which is connected to one inverted input of gate 473 via lead 508 and to a second inverted input of gate 515 via lead 521. The $\bar{Q}$ output of R/S flip-flop 519 is fed to node 522. Node 522 is connected via lead 523 to one inverted input of a logical AND gate 524 having three inverted inputs and via lead 525 to the gate electrode of a transistor 526. One current-carrying electrode of transistor 526 is connected directly to ground while the other current-carrying electrode is used to output the ramp reset signal $i_0$ to the ramp generator circuit of FIG. 3F via lead 399.

Node 499 is also connected via lead 527 to a node 528. Node 528 is connected directly to a second inverted input of AND gate 524; to a third inverted input of AND gate 515; and is used to supply the signal $l_5$ to the window control counter of block 456 of FIG. 4C via lead 529. The signal $l_5$ is a control signal used to reset the signal "$t_0$" at the start of a program commanded analog to digital conversion cycle as hereinafter described.

The third and last inverted input to gate 524 and the fourth and last input to gate 515 are connected directly to the source of power on reset signals $v_2$. The output of gate 515 is the signal $g_5$ which is supplied to the window control counter of block 456 of FIG. 4C via lead 530. The signal $g_5$ is a control signal used to enable the window counter to count. The output of gate 524 is the signal $k_5$ which is supplied to the ramp reset control counter of block 455 of FIG. 4C via lead 531. The signal $k_5$ is a control signal used to enable the ramp reset control counter to count as hereinafter described. Lastly, the $\bar{Q}$ output of R/S flip-flop 497 outputs the control signal $l_2$ to the microprocessor system of block 123 of FIG. 2 via lead 532. The signal $l_2$ is a flag signal to the computer for indicating that an analog to digital conversion is currently in progress.

The operation of the counter control logic of FIG. 4C1 will now be briefly described. Assume initially that a computer-requested pulse-width to binary conversion has just been completed. The pulse-width signal A, B, C, D, E, or $f_8$ which is inputted on lead 453 will be low. The transition from high to low of the pulse-width signal will be reflected as a high at the output of inverter 466 and in the clock period which it takes to gate transistors 467 and 469 with the two clock phases $H_2$, $H_1$, the high will be presented to the first inverted input of AND gate 473 so as to disable the gate and cause its output at node 474 to go low. A low at node 474 will be inverted by inverter 475 to cause the signal $b_5$ to go high for inhibiting the lower six bits of the pulse-width counter of blocks 457 and 458 of FIG. 4C. The low at node 474 will also be supplied to one inverted input of NOR gate 464 to cause the signal $c_5$ to go high so as to inhibit the five upper bits of the pulse-width counter of blocks 458 and 459 of FIG. 4C so that further counting by the pulse-width counters 457, 458, 459 of FIG. 4C is prevented.

Furthermore, the low at node 474 is inverted by inverter 478 to apply a high to one of the inverted inputs of AND gate 465 and to one of the inverted inputs of AND gate 480 such that the signals $d_5$ and $e_5$ respectively disenable the upper five bits and lower six bits of the pulse-width counter of blocks 457, 458 and 459 of FIG. 4C as previously described. A low at the output of gate 480 will cause the signal $f_5$ to go high at the output of gate 483 when the next clock phase $H_2$ goes low so as to latch the information stored in the various stages of the counter to its present count value.

Since flip-flop 487 has not yet been reset by the signal $n_0$, the $\bar{Q}$ output remains low such that a low is presented to one inverted input of the AND gate 489 while a high is presented to the other inverted input. Therefore, the output of gate 489, the signal $l_5$, is low. Since the window control counter of block 456 of FIG. 4C has not yet decoded the end of count signal $l_1$, the analog to digital conversion in progress flip-flop 497 remains set so that a one is present at the Q output and is supplied to one input of NOR gate 491 so as to cause its output at node 504 to be low. Since the ramp reset signal $i_3$ is normally high, gate 505 is disabled causing its output to be low indicating that the reset signal $n_5$ has not yet been generated on lead 507. With the Q output of flip-flop 497 high, the $\bar{Q}$ output is low and therefore, the signal $l_2$ remains low.

Similarly, since the end of conversion signal $l_1$ has not yet gone high, the low present at node 502 is inverted by inverter 511 to maintain the flip-flop 510 in the set state. This causes a high to be presented to one inverted input of OR gate 516. However, so long as the signal $l_5$ at node 499 remains low, it is inverted by inverter 517 to present another one to the other inverted input of OR gate 516 so that a low is normally presented at output node 518 which prevents the flip-flop 519 from setting and maintains it normally in the reset state. With the flip-flop 519 normally maintained in the reset state, a low is present in its Q output and a high at its $\overline{Q}$ output. The high at the $\overline{Q}$ output node 522 is presented to one inverted input of AND gate 524 causing the signal $k_5$ to go low and reset the ramp reset control counter of FIG. 4C2 as hereinafter described. The presence of a high signal at node 522 also causes transistor 526 to conduct to pull the ramp reset signal $i_0$ normally to ground. So long as the signal $i_0$ remains low, it cannot switch on transistor 395 from the ramp generator circuit of FIG. 3F to discharge the ramp capacitor 391 so the ramp generator is free to operate normally.

Lastly, so long as flip-flop 510 is maintained in the set state, the $\overline{Q}$ output node 512 supplies a low signal via lead 514 to one inverted input of AND gate 515 to maintain the output signal $g_5$high so as to enable the window control counter of FIG. 4C4 to count until the $l_1$ signal goes high to trigger the resetting of flip-flop 510 to disable gate 515 and hold $g_5$ low to reset the window counter and inhibit further counting as hereinafter described.

Next, assume that there has not been a computer request for an analog to digital conversion. When the 992 count is detected by the window control counter of FIG. 4C4, as hereinafter described, the signal $t_0$ will go low to enable the ramp generator of FIG. 3F to generate a self-correcting pulse as previously described. As soon as the 1024 count is detected, the $t_0$ pulse again goes high and remains high for one clock time before the signal $l_1$ is generated to indicate the end of a window count interval.

When $l_1$ goes high, a high signal is applied to reset flip-flop 510 for one clock time. When flip-flop 510 is reset, the low from the Q output is supplied to one inverted input of OR gate 516 causing its output to go high and set the flip-flop 519. When flip-flop 519 sets the Q output goes high to hold the $g_5$signal low and the output of gate 473 low while the $\overline{Q}$ output goes low. With the $\overline{Q}$ output at 522 low, gate 524 is enabled and since $l_5$ is also low and the power-on reset signal $v_2$ is not present, the output of gate 524 goes high such that the signal $k_5$ is used to enable the ramp reset control counter of FIG. 4C2 so that it begins counting. Furthermore, the presence of the low at node 522 turns off transistor 526 and allows the ramp reset signal $i_0$ on lead 399 to go high. When the ramp reset signal goes high, it turns on transistor 395 of FIG. 3F to short out or discharge the ramp capacitor 391 and prepare the ramp generator for the next ramp cycle, as previously described.

Then, when the signal $l_1$ goes high, it is inverted by inverter 503 so as to provide a low to the other inverted input of AND gate 498 thereby causing its output to go high to reset flip-flop 497. When flip-flop 497 resets, the signal $l_2$ goes high and the Q output goes low. With the Q output low, gate 473 is disabled by a high at the Q output of flip-flop 519; by the high present at node 504 at the output of gate 491 whose inputs are all low; and by the high present at node 470 since the pulse-width signal A, B, C, D, E, or $f_8$ may have not yet arrived. Therefore, the inhibit signals $b_5$ and $c_5$ remain high to inhibit the lower six bits and upper five bits of the pulse-width counter circuitry of blocky 457, 458 and 459 of FIG. 4C while the count enable signals $d_5$ and $e_5$ remain low. The signal $l_5$ also remains low but the signal $k_5$ goes high, as previously indicated, to enable the ramp reset counter of FIG. 4C2 while the ramp reset signal $i_0$ goes high to discharge the ramp capacitor 391. The signal $g_5$ at the output of gate 515 goes low as soon as the signal $l_1$ resets flip-flop 510 and remains low even when $l_1$ goes low to again set flip-flop 510 due to the setting of flip-flop 519. Since $g_5$ is low, the window control counter of FIG. 4C4 remains reset and inhibited from counting.

As soon as the enabled ramp reset control counter counts 128 clock pulses, its decoded output causes the signal $i_3$ to go low. (Actually 127 clock pulses counted plus a one clock output delay as hereinafter described.) When $i_3$ goes low, gate 520 generates a high signal to reset the flip-flop 519. The resetting of flip-flop 519 causes a zero or low to appear at the Q output node 509 which enables gate 515. With all of the inputs of gate 515 now enabled, the signal $g_5$ on lead 530 goes high to enable the window control counter of FIG. 4C4 to begin counting a time interval or "window" during which the analog to digital conversion will take place. Furthermore, the resetting of flip-flop 519 causes the $\overline{Q}$ output to go high which disables gate 524 to cause the signal $k_5$ to go low to again reset the ramp reset control counter and inhibit further counting. The high at the $\overline{Q}$ output also causes transistor 526 to conduct so as to restore the ramp reset signal $i_0$ to its normally low state. This begins the counting of the window counter of FIG. 4C4 and the defined time interval during which the A/D conversion takes place.

Once the window counter of FIG. 4C4 has decoded the 992 count, the signal $t_0$ again goes low until the detection of the 1024 count wherein $t_0$ again goes high and the end of conversion signal $l_1$ goes high for one clock period. With $l_1$ high, flip-flop 510 is again reset to set flip-flop 519 so as to cause the signal $g_5$ to go low to reset and inhibit the window counter; the signal $k_5$to go high to enable the ramp reset counter; and the ramp reset signal $i_0$ to go high to discharge the ramp capacitor 391 as previously described.

Assume now, however, that the computer generated command $n_0$, indicating that the computer has taken the previously stored count data, has reset flip-flop 487 and subsequently the computer generated command $l_0$, requiring the initiation of an analog to digital conversion, has been generated. The signal $l_0$ goes high for one clock period. The presence of a high at the set input of the previously reset flip-flop 487 causes the $\overline{Q}$ output to go low and supply the signal to one inverted input of gate 489. Since the other inverted input was already being presented with a low signal from node 495, its output goes high for one clock period until inverter 493 causes node 495 to go high to disable gate 489 and cause its output to again go low. The output of gate 489 is the signal $l_5$. When $l_5$ goes high for one clock period, it sets flip-flop 497 and causes the output of gate 516 to go high which causes the flip-flop 519 to set. Setting flip-flop 519 generates a low at its $\overline{Q}$ output which enables the last inverted input of gate 524 causing $k_5$ to go high and reset the ramp reset counter.

The setting of flip-flop 497 causes the Q output to go high which in turn causes the output of NOR gate 491 to go low and enable another input of gate 473. As soon as the ramp reset counter, enabled by the setting of flip-flop 519, has attained the count of 128, the decoded output causes the signal $i_1$ to go low. When $i_3$ goes low, gate 520 is enabled to reset flip-flop 519. When the Q output of flip-flop 519 goes low, another input of gate 473 is enabled and all of the inputs to gate 515 become enabled so that the signal $g_5$ goes high to enable the window counter to begin the count sequence. Simultaneously, when the $\overline{Q}$ output of flip-flop 519 goes high after reset, gate 524 is disabled causing the signal $k_5$ to go low to disable and clear the ramp reset counter and to switch transistor 526 to a conductive state so as to restore the ramp reset signal $i_0$ to a low condition to disable the transistor 395 of the ramp generator circuit of FIG. 3F and allow the ramp voltage to begin building on the ramp capacitor 391.

By this time, the pulse-width signal A, B, C, D, E, or $f_8$ has arrived at the input 453 and been inverted by inverter 466 to cause a low signal to be presented to the last input to gate 473. Thus, the four inverted inputs of gate 473 are enabled by the lows produced by the arrival of the pulse-width signal to be converted; the setting of flip-flop 510 indicating that an A/D conversion is in progress; the setting of flip-flop 497 indicating that the computer has requested a conversion; and the resetting of flip-flop 519 indicating that the capacitor discharge is complete.

Therefore, the output of gate 473 goes high causing the signal $b_5$ to go low to remove the inhibition imposed upon the lower six bits of the pulse-width counter of blocks 457 and 458 of FIG. 4C. The signal $c_5$ remains high since the signal $a_5$ is high indicating that all of the lower six bits of the counter are not yet ones. As soon as all of the six bits of the lower counter are ones, the signal $a_5$ goes low and this signal is inverted by inverter 463 to cause $c_5$ to go low to remove the inhibition from the upper five bits of the pulse-width counter of blocks 458, 459. As soon as the output of gate 473 goes high, gates 465 and 480 are enabled and the signals $d_5$ and $e_5$ go high to enable both the lower six bits and the upper five bits of the counter of blocks 457, 458, 459 to begin counting.

When the signal $i_3$ goes low, it also enables gate 505 to generate the high signal $n_5$ on lead 507. This signal is used to reset the pulse-width counter of blocks 457, 458 and 459 of FIG. 4C in preparation for a new count sequence. After one clock duration, the signal $i_3$ again goes high to disable gate 505 returning the reset signal $n_5$ to a low condition.

Since the resetting of flip-flop 519 causes the signal $g_5$ to go high to enable the window counter and causes the signal $b_5$ to go low while the signals $d_5$ and $e_5$ go high to enable the pulse-width counter of blocks 457, 485, 495 to begin counting, the counts coincide and the counting which effects the pulse-width to binary conversion corresponds to the counts counted by the enable window counter.

The presence of the window count interval insures that spurious negative-going noise signals and the like on the signals A, B, C, D, E, or $f_8$ will not prematurely terminate the conversion process before the main body of the pulse-width signal A, B, C, D, E, or $f_8$ has terminated. It is a unique and extremely effective means of protecting the circuit from noise while increasing the accuracy of the A/D converter of the present invention as hereinafter described.

At some later point in time, the pulse-width of the signal A, B, C, D, E, or $f_8$ terminates to go low and this is reflected as a high at node 470 which disables gate 473 and causes the output at node 474 to again go low. The presence of a low at node 474 immediately causes the signal $b_5$ and $c_5$ to go high to inhibit further counting; the signals $d_5$ and $e_5$ to go low to disable further counting and the signal $f_5$ to go high to latch the results in the counter. Therefore, as soon as the measured pulse-width signal A, B, C, D, E or $f_8$ terminates, all counting by the pulse-width counter of block 457, 458, 459 terminates as well although the window counter continues to count out its designated cycle.

At the detection of the count 992 by the window counter of FIG. 4C4, the signal $t_0$ goes low enabling the ramp generator of FIG. 3F to self-correct the slope of the ramp for the next cycle of operation. At the detection of the 1024 count, the signal $t_0$ again returns to its normally high state to await another count sequence. This cycle is repeated over and over as the pulse-width outputs indicative of the various sensed values are converted into binary numbers or digital words for use by the computer. After each number is computed, it is latched and stored in the pulse-width counters of blocks 457, 458 and 459 until requested by the computer as hereinafter described so that no separate buffer stage or storage registers are required.

The counter control logic of FIG. 4C1 provides an extremely simple logic circuit for generating the necessary command signals for insuring the proper timing sequences and the like for a highly accurate analog to digital conversion of the selected sensed parameter and a further understanding of this circuit wil be gained from the following description of the various circuits which are controlled by these generated signals.

4.5 Ramp Reset Control Counter

The ramp reset control counter of block 455 of FIG. 4C will now be described with reference to the schematic diagram of FIG. 4C2. The control signal $k_5$ is outputted from the counter control logic of the circuit of FIG. 4C1 and supplied via lead 531 to the input of an inverter 535 whose output is connected to a node 536. Node 536 is connected to the direct reset input DR of all eight stages of an eight stage counter 537 configured from two phase dynamic shift registers. The individual register stages which make up the counter 537 are illustrated in the block diagram and schematic FIGS. 9.24 A and B.

Node 436 is also connected directly to one inverted input of a logical AND gate 538 having three inverted intputs. The second phase clock signal $H_2$ is supplied to an inverted input of a second logical AND gate 539 having two inverted inputs; to the input of an inverter 540 whose output is connected to a second inverted input of gate 538; and to the gate electrode of a transistor 541. The output of AND gate 539 is connected back to the third and last inverted input of AND gate 538 and to the first clock phase input $h_a$ of the counter 537 while the output of the second AND gate 538 is coupled back to the second inverted input of AND gate 539 and is supplied directly to the second clock phase input $h_b$ of the counter 537.

In operation, when the signal $K_5$ is low, the signal at node 536 is high due to the presence of the inverter 535 which causes the ramp reset counter 537 to be directly reset and presence of a high at one inverted input of the AND gate 538 inhibits the counter 537 from counting since the output of gate 538 which is presented to the clock $h_b$ is forced to remain low to inhibit the counter 537 from counting.

The operation of the ramp reset control counter 537 is complex due to its implementaton in nMOS logic by LSI techniques in the form of specially configured, two phase, dynamic shift registers which greatly reduce chip area. The counting sequence of the shift register 537 may be seen by referring to the count state table of FIG. 4C3.

In actuality, the counter 537 can be made to cycle through a number of different count sequences or form loops depending upon which of the counter outputs are exclusively ORed together and supplied back to the set input and other output decoding factors.

The matrix notion utilized to decode the outputs of the ramp reset counter 537 is explained in FIG. 9 but in short, each of the circles represents an nMOS FET transistor element and they are configured such that each of the rows of circled junctions represents a NOR gate having a number of inputs equal to the number of circles on the horizontal line and similarly, the vertical line connected back to the "D" or set input of a given counter stage (hereinafter the "D" counter input is often designated "DS" for data shift, not direct set—where direct set is intended, it is specified) represents a NOR gate having a number of inputs equal to the number of circled intersections on the vertical line. The count sequence of the ramp reset counter 537 was established by NORing the non-inverted output from the fifth stage of the counter 537 with the inverted output from the eighth stage of the counter 537 and by NORing the inverted output of the fifth stage of the counter 537 with the non-inverted output of the eighth stage and then connecting the outputs of these two NOR gates as two inputs to a five input NOR gate whose output is fed back to the set input of the first stage of the counter 537 to establish the count loop. As shown in the count state table of FIG. 4C3, this combination allows the counter to sequence through 217 counts, of which only the first 128 states are used, before beginning to repeat itself in a new count cycle.

In addition, all the inverted outputs of all of the eight stages of the counter 537 are NORed together and its output connected as a third input to the five input NOR gate whose output is fed back to the "D" or set input of the first stage of the counter 527 to prevent counter overflow. Furthermore, it has been found that the counter 537 can possibly malfunction and jump out of the main control loop into a secondary or tertiary loop from which it cannot return of its own accord. Therefore, the NORing of the non-inverted outputs of the first, sixth and seventh stages with the inverted outputs of the second, third, fourth, fifth, and eighth stages is used to detect passage into an erroneous loop and the output is the fourth input to the five input set control NOR gate 548 whose output forces the counter 537 back into the correct sequence. Similarly, the NORing of the non-inverted counter outputs of the second, third, fourth, and sixth stages with the inverted outputs of the first, fifth, seventh and eighth stages recognizes a similar erroneous loop and since its output is the last input to the five input NOR gate, it forces the counter 537 back into the primary count sequence or loop.

Lastly, the decoded output of the counter 537 is taken by NORing the non-inverted outputs of the third, sixth and eighth stages ($Q_3$, $Q_6$ and $Q_7$) with the inverted outputs of the first, second, fourth, fifth, and seventh stages ($\overline{Q}_1$, $\overline{Q}_2$, $\overline{Q}_4$, $\overline{Q}_5$ and $\overline{Q}_7$) of the ramp reset counter 537 so that this eight-input, count decoding NOR gate will generate a high output whenever the 128th clock pulse is counted. As indicated in the count state table of FIG. 4C3 after 128 clock pulses are counted, the binary number equivalent to 218 is stored in the register 537. Therefore, going from most significant to least significant bits (left to right in FIG. 4C2), the binary number 11011010 will be decoded when the 128th count has been made to output a high signal. Since the first clock count is said to have been made to input all zeroes, we are actually decoding the high output 127 clock periods or counts later.

This one clock time duration high signal is fed to the input of an inverter 542 whose output is supplied to one current-carrying electrode of a transistor 543. The other current-carrying electrode of transistor 543 is connected to the input of an inverter 544 whose output is connected directly to one current-carrying electrode of transistor 541. The other current-carrying electrode of transistor 541 is connected directly to the input of an inverter 545 which outputs the reset complete signal $i_3$ on lead 506 to the counter control logic circuitry of FIG. 4C1 as previously described. The clock phase signal $H_1$ is supplied to the gate electrode of the transistor 543 while the second phase clock $H_2$ is supplied to the gate electrode of transistor 541, as previously described, so that the two clock phases will step the decoded output out of the circuit in a serial manner with a one clock time delay, as conventionally known. Therefore, we speak of the generation of the reset complete signal $1_3$ on count 128 which is, in fact, technically correct since it is outputted 128 counts after counter reset.

Since the decoded output of the eight input NOR gate comprising the output decoder system is normally low, the output of inverter 542 is normally high; the output of inverter 544 is normally low, and the output of inverter 545, the signal $i_3$, is normally high as previously described. However, as soon as the 128th count (as labeled in the state table) is reached, 127 clock times after direct reset of the counter 537, the output of the decoder NOR gate goes hgh causing the output of inverter 542 to go low; the output of inverter 544 to go high; and the signal $i_3$ at the output of inverter 545 to go low on the 128th true count after reset. As soon as the counter 537 makes the next count, the output of the decoder NOR gate again goes low to causethe signal $i_3$ to again go high for the remainder of the count cycle.

As a further explanation to the output circuitry of the counter 537, the non-inverted output $Q_n$ of each of the eight stages of the counter 537 is represented by a straight vertical line extending downwardly from each counter stage while the inverted output of each of the eight stages $\overline{Q}_n$ is shown as a second set of straight vertical lines each of which is connected to the first set of vertical straight lines through inverters 546*a*–546*h*.

Each of the horizontal lines 550*a*–550*f* has one end jointly connected to one current-carrying electrode and the gate electrode of a corresponding pull-up transistor 547*a*–547*f* whose opposite current-carrying electrode is connected directly to the +5-volt source of potential so as to provide the necessary driving power to the NOR gate represented by each of the horizontal lines. The uppermost or first horizontal line 550*a* represents an eight input NOR gate coupled to the inverted outputs of each of the eight stages of the counter 537 as previously described. The second and third horizontal lines 550*b* and 550*c* respectively represent two separate NOR gates which form the Exclusive OR combination to establish the primary control loop. The fourth and fifth horizontal lines 550*d* and 550*e* respectively represent the decode NOR gates used to recognize an erroneous loop and to force the counter 537 back into the primary control loop while the sixth and final horizontal line 550*f* represents an eight input NOR gate used to decode the predetermined count to indicate termination of the ramp reset pulse, as previously described.

The outputs of the first five NOR gates represented by the first, second, third, fourth and fifth horizontal lines 550*a*–550*e* are connected together as five inputs to a NOR gate represented by the vertical line 548 which is connected back to the "D" or set input of the first stage of the ramp reset counter 537 for cntorl purposes. As indicated previously, the "D" input of the first counter stage is frequently desginated the "DS" input (for data shift input) herein but is not to be confused with a direct set input. Whenever the symbol "DS" is meant to indicate a direct set input, it is expressly so stated. The opposite end of the line 548 representing the five input NOR gate is shown as being connected to the first current-carrying electrode and the gate electrode of a pull-up transistor 549 whose oposite current-carrying electrode is connected directly to the +5-volt source of potential to provide the necessary pull-up for driving the NOR gate 548 and insuring the proper logic levels are maintained, as conventionally known in the art.

In operation, the counter control logic of FIG. 4C1 normally maintains the signal $K_5$ low so that a high signal is presented to the reset input of counter 537 to keep a reset. As soon as the counter control logic of FIG. 4C1 indicates the start of a ramp reset pulse, by a setting of flip-flop 519, the signal $K_5$ goes high causing a low to be presented to node 536 to enable the outputs of gates 538, 539 to pulse on opposing clock phases $H_2$, $\overline{H}_2$ to operate the ramp reset counter 537. As soon as the predetermined decode count is attained, the decode network comprising the eight input NOR gate of the last horizontal line 550*f* will generate a one clock width high signal causing the end of ramp reset signal $i_3$ to go low for one clock time. As previously described, when the signal $i_3$ goes low, it resets the flip-flop 519 to terminate the discharging of the ramp capacitor 391 and it generates the reset signal $n_5$ for clearing the pulse-width counter of blocks 457, 458 and 459, as hereinafter described. 4.6 Window Control Counter The window control counter of block 456 of FIG. 4C will now be described with reference to the schematic diagram of FIG. 4C4. The signal $g_5$ from the output of gate 515 of FIG. 4C1 is supplied via lead 530 to the input of the inverter 551 whose output is connected directly to the inverting input of a logical AND gate 552 having three inverted inputs. The output of inverter 551 is also connected to the direct reset input DR of an eleven stage window counter 553 formed from eleven individual two phase dynamic flip-flop stages as shown in the block diagram and schematic of FIGS. 9.24A and B. The eleven individual stages are arranged to form an eleven stage two phase dynamic shift register usable as a counter similar to the previously described ramp reset counter 537 of FIG. 4C2.

The second clock phase $H_2$ is connected to a first inverting input of a second logical AND gate 554 and to the input of an inverter 555 whose output is connected directly to the second inverting input of gate 552. The output of gate 552 is connected directly to the second phase clock input $h_b$ of all of the shift register stages of the window counter 553 and is coupled back to the second inverting input of gate 554. The output of gate 554 is connected directly to the first phase clock input $h_a$ of all of the shift register stages of the window counter 553 and is coupled back to the third and final inverting input of gate 552.

In operation, the signal $g_5$, which originates at the output of gate 515 in FIG. 4C1, is normally maintained high. The signal goes low when the flip-flop 519 is set to indicate the start of a ramp reset pulse $i_0$. As soon as $g_5$ goes low, it is inverted by inverter 551 to reset the various stages of the counter 553. When the flip-flop 519 is reset by the signal $i_3$ going low when the predetermined count is decoded by the ramp reset control counter of FIG. 4C2, the signal $g_5$ goes high with the high-to-low transition of the ramp reset pulse $i_0$. As soon as the signal $g_5$ goes high, it is inverted to provide a low at the first inverted input of gate 552 to enable the counter 553 to begin counting clock pulses. The counter will continue to count until the signal $g_5$ again goes low to reset the counter 553 and disable gate 552.

Each of the eleven stages of the counter 553 has a non-inverting output labeled $Q_1$ through $Q_{11}$ respectively. Each non-inverting output $\overline{Q}_1$ through $\overline{Q}_{11}$ is represented by a straight vertical line and each inverting output $Q_1$ through $Q_{11}$ is represented by a corresponding vertical line originating from the output of an inverter 556*a*–556*k* whose input is connected directly to a corresponding non-inverting output line. There are also five horizontal lines 590*a*–590*e* each representing a separate NOR gate and each having one end connected to a current-carrying electrode and gate electrode of an individual transistor 557 whose opposite current-carrying electrode is commonly coupled to a +5-volt source of potential to provide the driving power required to maintain correct logic levels at the outputs of the NOR gates. Another vertical line 558 representing a three input NOR gate is provided at the opposite end of the horizontal lines and has one end connected to both a current-carrying electrode and the gate electrode of a transistor 559 whose opposite current-carrying electrode is connected to a +5-volt source of potential for maintaining the necessary voltage levels required for driving the NOR gate 558 whose output is connected directly to the set or data shift input DS of the first stage of the window counter 553.

As previously described, the circle notation at the intersection of a vertical and a horizontal line indicates that a transistor exists at that point and the configuration is such that each of the five horizontal lines 590*a*–590*e* represents a separate NOR gate and the vertical line 558 represents a three input NOR gate connected back to the DS input of the first stage of the window counter 553. The three inputs of the NOR gate 558 are the outputs of the NOR gates comprising the first three horizontal lines 590*a*, 590*b* and 590*c*. The first horizontal line 590*a* represents an eleven input NOR gate each of whose inputs is connected to an inverting output of each of the eleven stages of the counter 553 for detecting counter overflow. The second horizontal line 590*b* represents a two input NOR gate having one input connected to the non-inverting output of the ninth shift register stage and the inverting output of the eleventh shift resister stage while the third horizontal line 590*c* represents a NOR gate having a first input connected to the inverting output of the ninth shift register stage and another input connected to the non-inverting output of the eleventh stage. The secondand third lines 590*b* and 590*c* respectively comprise an Exclusive OR combination which, together with NOR gate 590*a*, from the three inputs to NOR gate 558 whose output controls the count cycle of the window control counter 553 which may be further understood by referring to the window counter count state table of FIG. 4C5.

The fourth horizontal line 590_d_ at the output of the window control counter 553 represents an eleven input NOR gate which is not coupled back to the DS input of the counter 553 via NOR gate 558 but which is sued for count decoding purposes. The NOR gate 590_d_ normally outputs a low signal but when all of its inputs go low, a high signal is outputted which has a duration of one clock time before the output again returns to the normally low state. The output of this eleven input NOR gate for decoding a first predetermined count, for example, the 992nd count (after 991 clock times), is connected to the input of an inverter 560 whose output is connected back to a first inverted input of a logical AND gate 561 having two inverted inputs. So long as the output of the 992 decode NOR gate 590_d_ remains normally low, a high is supplied from the output of inverter 560 to one input of gate 561 so as to disable the gate and generate a low signal at its output which is connected directly to the set input of an R/S flip-flop 562.

The fifth and final horizontal line 590_e_ at the output of the window control counter 553 represents still another eleven input NOR gate adapted to detect a second predetermined count, for example, the 1024th count of the counter 553, 1023 clock times after direct reset. The output of this NOR gate is also normally low but as soon as the 1024 count is detected, it goes high for one clock pulse before returning to its normally low state. The output from the 1024 detect NOR gate is connected via lead 563 to a node 564. Node 564 is connected to a first input of NOR gate 565 which has a second input supplied with the signal $l_0$, which is used to initiate a software commanded analog to digital conversion, via lead 566 and a third input supplied with the signal $\mathbf{1}_5$ from output lead 529 of FIG 4C1.

The output of NOR gate 565 is connected directly to the input of an inverter 567 whose output is connected directly to node 568. Node 568 is connected directly to the second inverted input of AND gate and to the reset input of R/S flip-flop 562. One clock phase $H_1$ is supplied to a first clock input of flip-flop 562 and the opposite clock phase $H_2$ is supplied to the second clock input. The direct reset input is connected to a sorce of the power-on reset signal $v_2$ as previously described. The $\bar{Q}$ putput of R/S flip-flop 562 is connected directly to the gate electrode of a transistor 569 having one current-carrying electrode connected directly to ground and its opposite current-carrying electrode connected to a node 570. The $\bar{Q}$ output of R/S flip-flop 562 is connected to the gate electrode of the second transistor 571 having one current-carrying electrode carried directly to a +5-volt source of potential and its opposite current-carrying electrode commonly coupled to the node 570. The node 570 is used to output the signal $t_0$ via lead 375 to the ramp generator circuit of FIG. 3F to allow the ramp generator to correct itself as previously described.

Node 564 is also connected directly to one current-carrying electrode of a transistor 572 whose opposite current-carrying electrode is connected directly to the input of an inverter 573. The output of inverter 573 is connected directly to the first current-carrying electrode of another transistor 574 whose opposite current-carrying electrode is connected directly to the input of another inverter 575. The output of inverter 575 is the signal $\mathbf{1}_1$ which indicates the end of an analog to digital conversion and which is supplied via lead 501 to an input of the counter control logic of FIG. 4C1 as previously described. The gate electrode of the transistor 572 is supplied with the first phase clock pulse $H_1$ while the gate electrode of the transistor 574 is supplied with the second phase clock signal $H_2$ so that the combination of transistors 572, 574 with the intermediate inverter 573 delays the output of the 1024 decode output supplied on lead 563 for one clock period and inverter 575 reinverts this signal so that the signal $\mathbf{1}_1$ is high for one clock period after the 1024 count has been detected which is, in actuality, on the 124th clock period after direct reset of the window counter 553.

Figure 5:
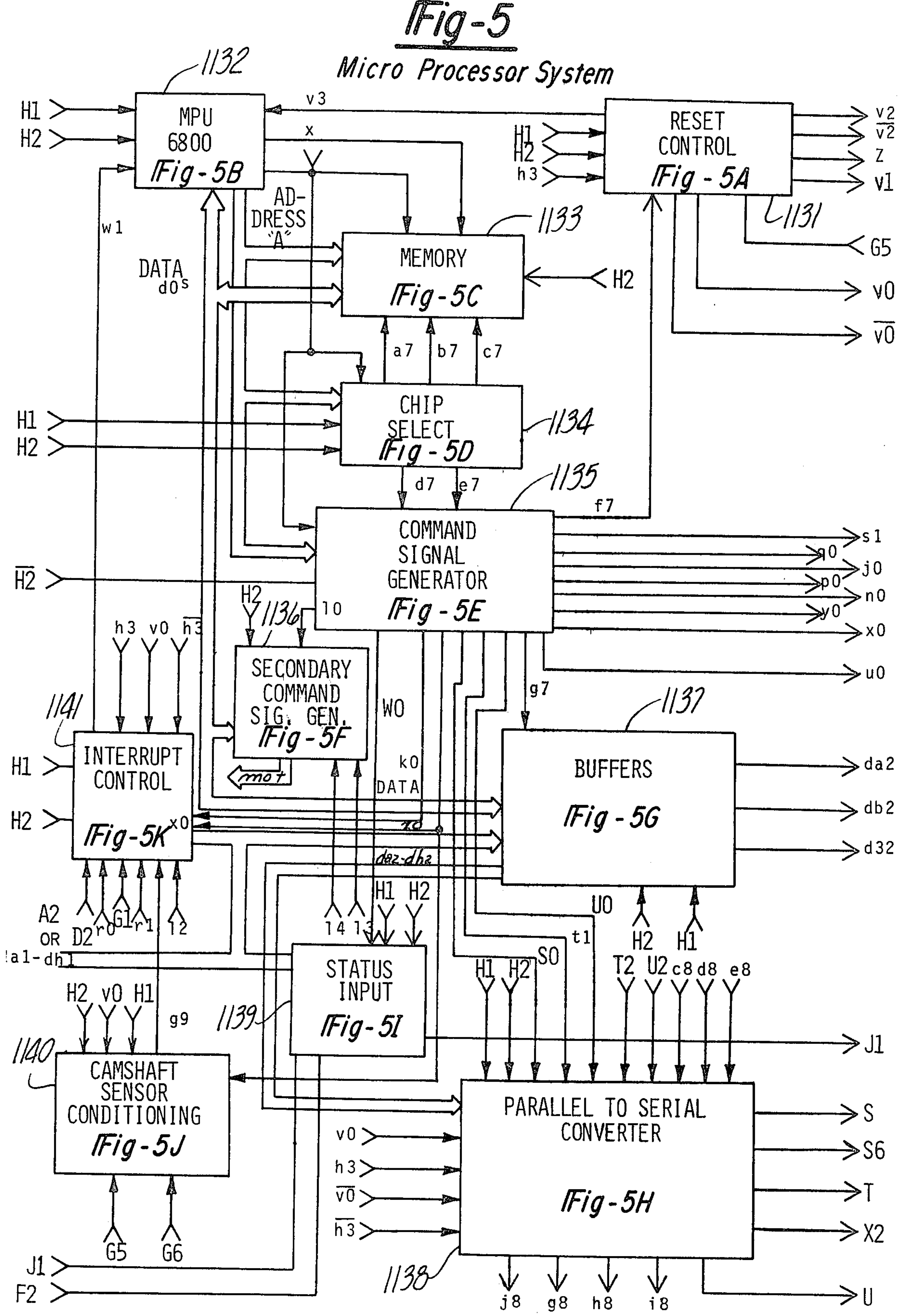

In operation, once the counter 553 has been enabled by the signal $g_5$ going high, it begins to count clock pulses in the predetermined sequence determined by the exclusive OR outputs fed back to the DS input as represented by the second and third horizontal decode lines and as indicated by the count state table of FIG. 4C5. Whenever the first predetermined window counter count is detected by the NOR gate 590_d_, its output goes high so as to supply a low from the output of inverter 560 to enable gate 561. The first predetermined count represents the number 417 in the particular count sequence established by the exclusive OR feedback of the present counter 553 which stands for the binary number 00110100001 which can be verified by checking the circled intersections on the fourth horizontal line 590_d_ representing the NOR gate inputs from the designated outputs of the window counter 553.

If the computer has not just requested an A/D conversion, the signal $\mathbf{1}_0$ is low and since the signal $\mathbf{1}_5$ is normally low and the second predetermined count has not yet been attained, all inputs to NOR gate 565 are low causing a high to appear at its output. This high is inverted by inverter 567 so that a low is supplied to the other inverted input of gate 561 and to the reset input of flip-flop 562. With lows at both inverted inputs, 561 goes high so that the next clock time after the detection of the attainment of the first predetermined count, the flip-flop 562 is set so that the Q output goes high. When the Q output goes high, transistor 569 conducts to ground node 570 to pull the signal $t_0$ to ground. When the signal $t_0$ goes low, the ram generator circuit of FIG. 3F is able to make the necessary comparison for correcting the ramp voltage for the next cycle, as previously explained. On the next clock time, the output of inverter 560 again goes high to disable gate 561 but the signal $t_0$ will remain low until R/S flip-flop 562 is reset.

The R/S flip-flop 562 is reset whenever any one of the three inputs to NOR gate 565 goes high. In the present example, it is most likely that the second predetermined count be detected to cause a one clock width high pulse to be presented at node 564 causing the output of NOR gate 565 to go low and the output of inverter 567 to go high so that during the next clock time, flip-flop 562 will be reset. When R/S flip-flop 563 is reset, the $\bar{Q}$ output goes high and the Q output goes low so that transistor 571 is turned on while transistor 569 is turned off. This connects the +5-volt source of potential directly to node 570 and causes the signal $t_0$ to again to high. Since 32 clock pulses are counted between the detection of the first predetermined count and the detection of the second predetermined count and hence between the setting and resetting of flip-flop 562, the $t_0$ signal goes low for 32 microseconds when, as in the presentexample, a one megahertz clock is used. As soon as the signal $t_0$ goes high, it remains high until the signal $g_5$ again goes low to reset the counter 553 and then high to enable its counting for the next window cycle. As previously described, the detection of the second predetermined count also causes the signal $\mathbf{1}_1$ to go high one clock time later to indicate the end of the window count period for resetting flip-flops 497 and 510 of FIG. 4C1 as previously described.

The signal $t_0$ can also be reset whenever the computer has requested an A/D conversion, as indicated by the signal $\mathbf{1}_0$ going momentarily high or by the signal $\mathbf{1}_5$ going momentarily high which happens when the flip-flop 487 is set by the computer commanded instruction $\mathbf{1}_0$.

The window counter of FIG. 4C4 must be considered together with the ramp reset control counter of FIG. 4C2, the counter control logic of FIG. 4C1, the ramp generator circuit of FIG. 3F and the analog to pulse-width converters of FIG. 3 together with the clock and pulse-width counters of blocks 457, 458 and 459 of FIG. 4C to be hereinafter described.

In other words, the importance of the window control counter circuit of FIG. 4C4 togetherwith the ramp reset control counter of FIG. 4C2 and the counter control logic of FIG. 4C1 can best be understood in the broad context of the overall analog to digital conversion system of the present invention, but it could be used, even without the feedback compensated ramp generator of FIG. 3F so long as a sufficiently accurate ramp were utilized.

In brief summary, the analog to digital converter of the present invention is designed to operate over a broad temperature range of from minus 40 degrees C. to plus 100 degrees C. and to be insensitive to high frequency noise pulses on the voltages being converted since its preferred embodiment is in a hostile environment such as in an automobile. The analog to digital system contemplated in the present invention utilizes inexpensive components and yet has extremely high accuracy over the entire operating range of the automobile. In order to make the converter operate over the temperature range with inexpensive components, the feedback compensated ramp generator of FIG. 3F was used in the preferred embodiment of the present invention.

The analog to digital converter goes through a cycle starting with the generation of a capacitor reset pulse $i_0$ followed by a predetermined window time interval during which conversion takes place and during which a correction feedback pulse $t_0$ is initiated. The ramp capacitor is discharged during the reset pulse $i_0$ which is sufficiently long to insure that the ramp capacitor has discharged to the predetermined reference level before recharging and count initiation is begun.

As soon as the ramp capacitor reset pulse has ended, the capacitor again begins charging at a rate determined by the feedback control network. The sensor voltage being converted is compared to the ramp capacitor voltage and as long as the capacitor voltage is less than the sensed voltage, a summing counter is allowed to count. The window time allows the digital summing counter (i.e., the pulse-width counter of blocks 457, 458 and 459 of FIG. 4C) to count all during the window time. The window time interval is made to be slightly larger than the time it would take for the summing counter to reach the maximum value corresponding to the largest expected sensor voltage. In this way, the summing counter will count all of the time that the sensor voltage is greater than the capacitor voltage even if the sensor voltage should have noice spikes that extend momentarily to smaller levels than the ramp capacitor has reached.

If the summing counter should count to a higher number than the largest expected sensor value, which may be sensed, for example, by the eleventh bit in the pulse-width counter of blocks 457, 458 and 459 going high, then a signal (the set eleventh bit) will indicate that a faulty sensor or a faulty sensor amplifier has been detected and corrective action can be taken. At the end of the window period, or at some particular count in the period, as previously described, the ramp capacitor is expected to have charge to a certain voltage level. If it has not, a feedback correction pulse is generated which changes the charge on a holding capacitor 388 in the feedback control network to correct the rate at which the ramp capacitor 391 will charge on the next cycle. This allows correction for capacitor leakage, changes in temperature, power supply variations, and the like. The noise immunity provided by the use of the window which allows the circuitry to ignore transient sensor pulses which would normally tend to terminate the conversion, is extremely important in many analog to digital converter applications and particularly in a hostile environment such as that contemplated in the preferred embodiment fo the present invention.

4.7 Window Counter with Range Selection

Figure 6:
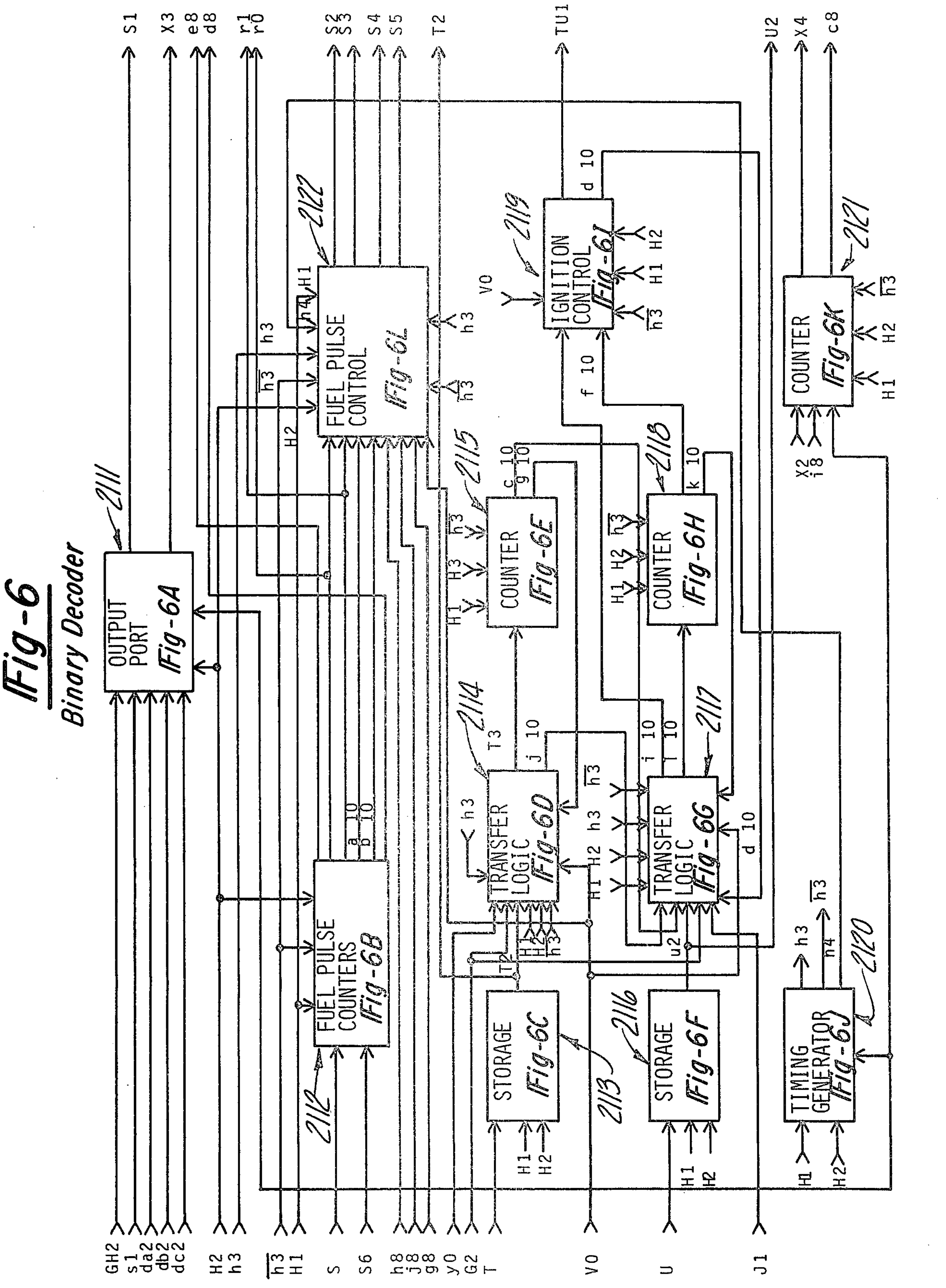

An analog-to-digital converter having the window counter described hereinabove with the added feature of switchable range selection will now be described with reference to FIG. 4C6. The purpose of the modification shown in FIG. 4C6 is to provide a general purpose design for use in mulitple applications wherein the range of values of an analog-to-digital converter may be made selectable by the computer or, even manually. In one application, an eight bit converter may be adequate while a ten converter may be needed in another application. Since conversion time is related to the number of bits to be converted, it is not adequate to use a ten bit converter in applications where an eight bit converter would suffice. Therefore, the modification of the analog-to-digital converter employing the window counter previously described which allows selectable change of the range of the sensor values is described herein.

This invention extends the range of application adding multiple count decodes to the output of the window counter previously described. The window counter must contain enough bits to count the entire window time for a ten bit converter or more if so desired. A flip-flop is added which holds a data bit from the computer bus, or is set manually or via hardware, if desired, which indicates the selection of either an eight bit or ten bit conveter. It will be realized that any number of selections can be made depending on the number of decoded outputs and selector circuits so as to vary the number of bits converted depending upon the requirements of the given application. For example, the flip-flop migt be set for an eight bit converter and reset for a ten bit converter. Four count decodes would be needed all together as hereinafter described. It is necessary to detect the counts corresponding to the beginning of the feedback control signal and to the end of the feedback control signal for both the eight and the ten bit conversions to insure the accuracy of the feedback compensated ramp employed in the analog-to-digital converter system described herein.

The analog-to-digital circuitry described in the present application can be used in many different applications without modification if the switchable range selection feature herein described is employed. The function of this circuit can be modified with only a relatively minor change in the computer program or the inclusion of a range control switch or the like. The advantageous feature of the noise suppression window is retained and, as previously described, the output feedback signal $t_0$ insures ramp compensation and hence the overall accuracy of the system regardless of the size of the conversion involved.

In FIG. 4C6, the components corresponding to those illustrated in FIG. 4C4 receive like reference numerals and only the additional features will be described herein. Assume that the outputs $Q_1$ through $Q_n$ of the window counter 553 are supplied to a count decode logic network, as represented by block 572, which includes a system of NOR gates as previously described with reference to FIG. 4C4. Assume further that the same NORed outputs are fed back to the DS input via lead 558 to establish the count sequence illustrated in the count state table of FIG. 4C5 although any number of stages may be used in the window counter of FIG. 4C6 and any desired count sequence can be established, as known in the art, by varying the outputs which are exclusively ORed back to the DS input to obtain the desired number of counts in the cycle.

In the present example, let us assume that we wish to switch between an eight bit converter and a ten bit converter, although it must be understood that any range could be selected just by changing the decoded outputs depending upon the number of stages in the window counter 553. For example, in the circuit of FIG. 4C6, an embodiment is shown wherein it is possible to switch from an eight bit conversion to a ten bit conversion and visa versa. The counter decode logic could be adapted to output a one-clock-pulse wide positive-going pulse whenever a first count, for example, the 224th clock pulse, is attained, and to output this pulse via lead 573. Thirty-two clock pulses later, the first reset count is decoded and a one-clock-pulse wide positive-going pulse indicative of the attainment of the count 256 could be outputted on lead 574. Similarly, the decode logic of block 572 could include two decode lines, as previously described, so that the second count decode would output a one clock-width positive -going pulse on lead 575 whenever the first predetermined count 992 is counted and another decode NOR gate would output a positive-going pulse on lead 576 whenever the second predetermined count 1024 is attained, as previously described.

The set count number one decode output is supplied from the decode logic of block 572 to the first input of a logical AND gate 577 while the reset count number one output is supplied via lead 574 to the first inut of a second logical AND gate 578. Similarly, the set count number two output from the decoder logic of block 572 is connected via lead 575 to the first input of a third logical AND gate 579 and the reset count number two output is connected via lead 576 to the first input of logical AND gate 580. The second input of AND gates 579 and 580 are connected to the Q output of an R/S flip-flop 581 while the $\overline{Q}$ output of flip-flop 581 is connected to the second input of AND gate 577 and 578.

R/S flip-flop 581 has its set input connected to the output of a logical AND gate having two inverted inputs and its reset input connected to the output of a second logical AND gate having two inverted inputs. The R/S flip-flop 581 has its first clock input $\overline{C}$ connected to the clock phase $H_1$; its second clock input connected to the second clock phase $H_2$; and its direct reset input DR connected to receive the power-on reset signal $v_2$.

In the preferred embodiment of the present invention, a data bit signal could be generated by the computer program and supplied, for example, as $dd_1$ on the data but a manually operable switch or digital logic such as the pulse width counter of blocks 457, 458, 459 of FIG. 4C could be used. The signal $dd_1$ could be generated such that it is high whenever a 10-bit conversion is requested and low whenever an 8-bit conversion is requested.

The signal $dd_1$ is supplied to a node 582 which is connected directly to a first inverted input of AND gate 592 and to the input of an inverter 583 whose output is connected directly to a first inverted inut of AND gate 591. The second inverted inputs of AND gates 591, 592 are connected to receive the command signal $\mathbf{1}_0$ from the output of inverter 594 which receives the signal $\mathbf{1}_0$ from the command signal generator of the micropressor circuitry of block 123 of FIG. 2. The signal $\mathbf{1}_0$ is a computer initiated command used to initiate a software commanded A/D conversion by synchronizing the ramp genertor to the program.

Whenever $\mathbf{1}_0$ is high, indicating a computer requested A/D conversion, and $dd_1$ is high, indicating a request for a 10-bit conversion, both inputs to gate 591 go low causing gate 591 to output a high pulse to set flipflop581. When $dd_1$ is low, gate 592 is enabled to reset the flip-flop 581.

The outputs of the first count set AND gate 577 and the output of the second set count AND gate 579 are connected to the inputs of a logical OR gate 584 whose output is connected directly to the set input of the R/S flip-flop 562 which is previously described with reference to FIG. 4C4. Similarly, the output of the first reset count AND gate 578 and the output of the second reset-count AND gate 580 are connected to two inputs of the logical OR gate 585 whose output is connected directly to the reset input of R/S flip-flop 562. A third input to OR gate 585 may be the signal $\mathbf{1}_0$ which is the computer generated command indicating that a analog-to-digital conversion has been requested, the signal $\mathbf{1}_0$ initially resetting the flip-flop 562 to cause the output signal $t_0$ to go high.

In operation, if the signal $dd_1$ is high, AND gate 591 is enabled and R/S flip-flop 581 is set so that the Q output goes high to enable AND gates 579 and 580 while the output $\overline{Q}$ goes low to disable AND gates 577 and 578. Therefore, as soon as the set count 992 is decoded, the other input of the set AND gate 579 goes high for one clock pulse-width and this high signal is transmitted via OR gate 584 to set flip-flop 562 to cause the Q output to go high which grounds node 570 and causes the signal $t_0$ to go low which permits the feedback compensated ramp generator of FIG. 3G to generate the required compensation pulse if necessary. Thirty-two clock pulses later, the reset count number two, the count 1024, is detected and a high is presented to the other input of AND gate 580 causing it to gate a one-clock-width high pulse to the reset input of flip-flop 562 via OR gate 585, thereby causing the flip-flop 562 to reset. When flip-flop 562 resets, the $\overline{Q}$ output goes high and the Q output low so as to connect the output node 570 to the +5-volt source of potential and cause the output signal $t_0$ to again go high until the next correction is required. The signal $1_0$, as previously described, goe momentarily high to initially reset flip-flop 562 and enables gates 591, 592 whenever a conversion is initially requested.

Throughout the procedure described hereinabove, the $\overline{Q}$ output of flip-flop 581 being low caused the set count number one AND gate 577 and the reset count number one flip-flop 578 to be disabled. However, whenever an eight bit conversion is requested, the signal $dd_1$ goes low enabling AND gate 592 and causing flip-flop to reset. With flip-flop 581 reset, the Q output is low to disable the count number two set gate 579 and the count number two reset gate 580. Similarly, the $\overline{Q}$ output goes high to enable the set AND gate 577 and the reset AND gate 578. As soon as the set count number one, the count 224 for example, is attained, a one clock pulse-width high signal is supplied via lead 573 to the other input of the enable AND gate 577 which causes it to output one clock pulse-width high signal which is passed via OR gate 584 to set flip-flop 562 and cause the signal $t_0$ to go low. Thirty-two counts later, the reset count number one count of 256 is decoded and a one clock pulse-width signal is supplied via lead 574 to the other input of the enabled AND gate 578 causing a one clock pulse-width high signal to be outputted and passed via OR gate 585 to reset flip-flop 562 and again cause the signal $t_0$ to go high.

It will be understood, that the thirty-two counts between set and reset can be varied as can the detected counts depending upon the time required to insure that the feedback correction is made and the reset counts can be chosen depending upon the number of bits required in the selected A/D conversion.

Therefore, with the range selection feature coupled to the outputs of the window counter previously described, a feedback compensated analog-to-digital converter described herein attains a heretofore unachievable general purpose design for multiple applications regardless of conversion time or the number of bits of accuracy required since it is easily switched to meet particular conversion needs.

4.8 Pulse-Width Binary Counter

The pulse-width binary counter of blocks 457, 458 and 459 of FIG. 4C will now be described with reference to FIGS. 4C7, 4C8 and 4C9 respectively. Broadly speaking, the pulse-width binary counter of the present invention is a standard eleven stage binary counter implemented in nMOS logic by state of the art LSI technology. The purpose of the pulse-width counter of the present invention is to generate a binary number proportional to and indicative of the pulse-width of the analog signal selected for conversion. The outputs from the pulse-width binary counter supply a selected eight bit binary number or digital word and supply it to the mircoprocessor system of block 123 of FIG. 2 via a data bus transfer system as hereinafter described.

The first stage of the pulse-width binary converter will now be described with reference to FIG. 4C7. The "D" input to the first stage is represented by lead 601 which has one end connected to the current-carrying electrode of a first transistor 602 whose opposite current-carrying electrode is connected to a node 603. Node 603 is connected to the input of an inverter 604 whose output is connected to a first current-carrying electrode of another transistor 605. The opposite current-carrying electrode of transistor 605 is connected directly to the input of another inverter 606 whose output is connected to the Q output node 607 of the first stage of the counter.

The output of the inverter 604 is also connected to one current-carrying electrode of a transistor 608 whose opposite current-carrying electrode is connected directly to node 603. Node 603 is further connected to a first current-carrying electrode of a transistor 609 whose opposite current-carrying electrode is connected to ground via ground lead 599. The gate electrode of transistor 602 is connected via lead 485 to the counter control logic of FIG. 4C1 for receiving the output signal $e_5$ which enables the input to the lower six bits of the pulse-width counter as hereinafter described. The gate electrode of transistor 605 is connected via lead 486 to the counter control logic output of FIG. 4C1 for receiving the signal $f_5$ which latches the information stored into all stages of the pulse-width binary counter. The gate electrode of transistor 609 is connected via lead 507 to the output of the counter control logic of FIG. 4C1 which outputs the signal $n_5$ which is used to reset the pulse-width to binary converter counter as hereinafter described.

The Q output node 607 is connected to the input of an inverter 610 whose output is connected to a node 611. Node 611 is connected to the first current-carrying electrode of transistor 602 via lead 601 as previously described. The Q output node 607 is also connected to the input of an inverter 612 whose output is connected to the gate electrode of a transistor 613 having one current-carrying electrode connected to ground and its opposite current-carrying electrode connected directly to a current-carrying electrode of a first output transistor 614 whose opposite current-carrying electrode is used to output the least significant data bit $da_1$ via the data bus to the microprocessor system of block 123 of FIG. 2 via lead 615. The gate electrode of output transistor 614 is connected via lead 616 to an output of the command signal generator of the microprocessor system of block 123, as hereinafter described, for receiving the signal $n_0$ which is used to enable the least significant word of the pulse-width binary counter to be connected to the data bus as hereinafter described. Lastly, the gate electrode of transistor 608 is connected via lead 476 to an output of the counter control logic of FIG. 4C1 for receiving the signal $b_5$ which is used to inhibit the six lower bits of the counter from counting.

The operation of the first stage of the pulse-width binary counter is as follows. As previously described with reference to the counter control logic of FIG. 4C1, the signal $b_5$ is initially high and the signal $e_5$ is initially low. A high $b_5$ signal inhibits the lower six bits of the counter since it causes transistor 608 to conduct causing a short between the input node 603 and the Q output node 607 while a low $e_5$ signal prevents transistor 602 from conducting thereby disabling the "D" input to inhibit counting. Upon counter reset, $n_5$ goes momentarily high to switch transistor 609 to a conductive state and ground node 603. The signal $f_5$ then goes high to supply a logical "0" to all Q outputs to complete counter reset. With a low present at the Q output, a high is present at the D input via inverter 610, node 611 and lead 601.

When the signal $b_5$ goes low and $e_5$ goes high, as previously described with reference to FIG. 4C1, the pulse-width binary counter is enabled. Transistor 608 is turned off by a low potential at its gate electrode presented by the low signal $b_5$ while the "D" input transistor 602 is made conductive by the "D" input enable signal $e_5$ which is clocked with a first phase clock signal to pass the high now present on lead 601 to node 603.

Since node 603 is not connected to ground through transistor 609 since it is now rendered non-conductive by the normally low reset signal $n_5$ and is not shunted to the Q output via conductor 608 since it is made non-conductive by the presence of the low signal $b_5$ at its gate electrode, the high input signal is inverted by the inverter 604 to present a low to the input of an inverter 606 as soon as the transistor 605 is rendered conductive by the momentary high signal $f_5$ at its input which is clocked with the second clock phase. The inverter 606 then passes a high signal to the Q output node 607 at the end of the first complete clock time.

With a high signal now at the Q output node 607, inverter 612 presents a low to the gate electrode of transistor 613 so as to render transistor 613 non-conductive. With transistor 613 non-conductive, if the signal $n_0$ goes high to output the first bit of the counter, transistor 614 would conduct to pull the data bus lead 615 high through conducting transistor 614 so that a high signal $da_1$ represents a binary one output from the first stage of the counter. The high signal present at the Q output 607 after the initial count is also presented to the input of inverter 610 which presents a low to node 611. The low is then transmitted via lead 601 back to the input of inverter 604 on the next clock phase of $e_5$ which renders transistor 602 conductive. On the subsequent clock phase, the signal $f_5$ renders transistor 605 conductive to pass the high signal to the input of inverter 606 which then presents a low to the Q output node 607. It will be seen that as each two phase clock cycle is complete, the first stage of the counter will alternate between a high state and a low state as required for the first stage or least significant bit stage of a binary counter. The inverted signal from the Q output node 607 is also supplied from node 611 to one input of the logical AND gate 617 which forms a portion of a dual two input AND/two input NOR gate combination as shown in FIG. 9.12. Another AND gate 618 is provided and the output of AND gate 617 provides one input of a NOR gate 619 while the output of AND gate 618 provides the other input to NOR gate 619. The output to NOR gate 619 is the "D" input to the second stage of the counter and all corresponding components of the various stages of the pulse-width binary counter of FIGS. 4C7, 4C8, and 4C9 are designated by like reference numerals except that all those corresponding elements of the second counter stage are followed by the designation "-2"; the third stage by "-3"; etc. through corresponding elements of the eleventh stage which are designated "-11".

The "D" input for the second stage of the counter is supplied from the output of NOR gate 619 to one current-carrying electrode of input transistor 602-2 whose opposite current-carrying electrode is connected to node 603-2. Node 603-2 is connected firstly, to one current-carrying electrode of a direct reset grounding transistor 609-2; secondly, to one current-carrying electrode of a shunting transistor 608-2 and lastly to the input of an inverter 604-2. The output of inverter 604-2 is connected to one current-carrying electrode of a latching transistor 605-2 whose opposite current-carrying electrode is connected to the input of another inverter 606-2 whose output is connected to the Q output node 607-2. The gate electrodes of transistors 602-2, 604-2, 605-2, and 608-2 are connected as previously described with respect to their counterparts in the first stage of the counter. Similarly, the Q output node 607-2 is connected to one input of AND gate 618 and to the input of an inverter 610-2 whose output is connected (a) to the second input of AND gate 617; (b) to the gate electrode of a transistor 613-2; and (c) to a $\overline{Q_2}$ output lead 621. Similarly, the inverted output node 611 of the first stage is connected to a first $\overline{Q_1}$ output lead 620.

As previously described, the $\overline{Q_1}$ output is supplied from output node 611 via lead 620 and lead 620 has one output branch connected to the first input of AND gate 617 whose second input is connected to the $\overline{Q_2}$ output node 611-2. Therefore, AND gate 617 will provide a low signal to the first input of NOR gate 619 unless both $\overline{Q_1}$ and $\overline{Q_2}$ are simultaneously high. Similarly, the $Q_1$ output from node 607 of the first stage is connected to one input of AND gate 618 whose other input is supplied with the $Q_2$ output from node 607-2 so that the AND gate 618 supplies a low to NOR gate 619 unless both the $Q_1$ and $Q_2$ outputs are simultaneously high. Since NOR gate 619 will present a low output if either of its inputs is high and a high output if both inputs are low, the operation of the second stage is as follows.

When the counter is first started, the reset signal $n_5$ will have forced all of the Q outputs low leaving all of the $\overline{Q}$ outputs high. Therefore, before the first count, the $\overline{Q_1}$ and $\overline{Q_2}$ outputs which are supplied to the inputs of AND gate 618 are low causing its output to go low while the $Q_1$ and $Q_2$ outputs are high causing the output of AND gate 617 to go high. Since a high and a low are present at the inputs of NOR gate 619, its output to the "D" input of the second counter stage is low.

With a low presented to the "D" input of the second stage of the counter, when the first clock phase drives the signal $e_5$ high, a low is passed via transistor 602-2 to node 603-2 and this low signal is inverted by inverter 604-2 to present a high to the input of transistor 605-2. When the second clock phase arrives and $f_5$ goes high, transistor 605 conducts to present a high to the input of inverter 606-2 which inverts the signal to supply a low at the $Q_2$ output node 607-2. Prior to the second count, the $Q_1$ output is high while the $Q_2$ output is low causing a low to appear at the output of AND gate 618 while the $\overline{Q_1}$ output is low and the $\overline{Q_2}$ output is high causing a low to appear at the output of AND gate 617. With two low signals at the input of NOR gate 619, its output goes high so that when the next clock phase causes $e_5$ to go high and the "D" input transistor 602-2 to conduct, a high is passed to input node 603-2 and inverted by inverter 604-2 to present a low to the latching transistor 605-2. With the second clock phase sending the signal $f_5$ momentarily high, transistor 605 conducts to pass the low signal to the inverter 606-2 so that the $Q_2$ output goes high.

At this point, as previously described, we are at the end of the second count and the $Q_1$ output is low while the $Q_2$ output is high as required for the first two stages of a binary counter. With $Q_1$ low and $Q_2$ high, the output of AND gate 618 is low and with $\overline{Q_1}$ high and $\overline{Q_2}$ low, the output of AND gate 617 is low so that the output of NOR gate 619 is again high. With the next clock phase, the signal $e_5$ renders transistor 602-2 conductive to pass the high signal from the output of NOR gate 619 through inverter 604-2 so that the occurrence of the second clock phase will drive $f_5$ high to render transistor 605-2 conductive to pass the low signal through inverter 606-2 so that $Q_2$ again remains high. At the end of the third count, therefore, both $Q_1$ and $Q_2$ are high as required of the first two stages of a binary counter after three counts.

At this point, with $Q_1$ and $Q_2$ both high, the output of AND gate 618 is high but since $\overline{Q_1}$ and $\overline{Q_2}$ are both low, the output of AND gate 617 is low. With a high and a low presented to the inputs of NOR gate 619, its output now goes low at the start of the fourth count. With the first clock phase, $e_5$ renders transistor 602-2 conductive so that a high signal appears at the output of inverter 604-2 and with the occurrence of the second clock phase, $f_5$ causes transistor 605-2 to conduct so that the $Q_2$ output again goes low. Therefore, at the end of the fourth count, the $Q_1$ output of the first stage and the $Q_2$ output of the second stage are both low. As with the first stage, the $\overline{Q_2}$ output is taken from node 611-2 and supplied to the gate electrode of transistors 613-2. Transistor 613-2 has one current-carrying electrode connected to ground and the opposite current-carrying electrode connected to one current-carrying electrode of a second stage output transistor 614-2 whose opposite current-carrying electrode connects the second data bit $db_1$ to the data bus via lead 615-2. As with the first stage, when the $\overline{Q_2}$ output node 611-2 goes high, indicating that the $Q_2$ output node 607-2 is a low, transistor 613-2 conducts to pull the output low and since the output corresponds to the $Q_2$ output rather than the $\overline{Q_2}$ output, the correct information is transmitted over to the data bus to the computer. Similarly, with $Q_2$ high, $\overline{Q_2}$ is low rendering transistor 613-2 non-conductive so that when $n_0$ goes high and transistor 614-2 conducts, the output $dd_2$ is allowed to be pulled high, as hereinafter explained, to indicate a high $Q_2$ output.

Figure 7:
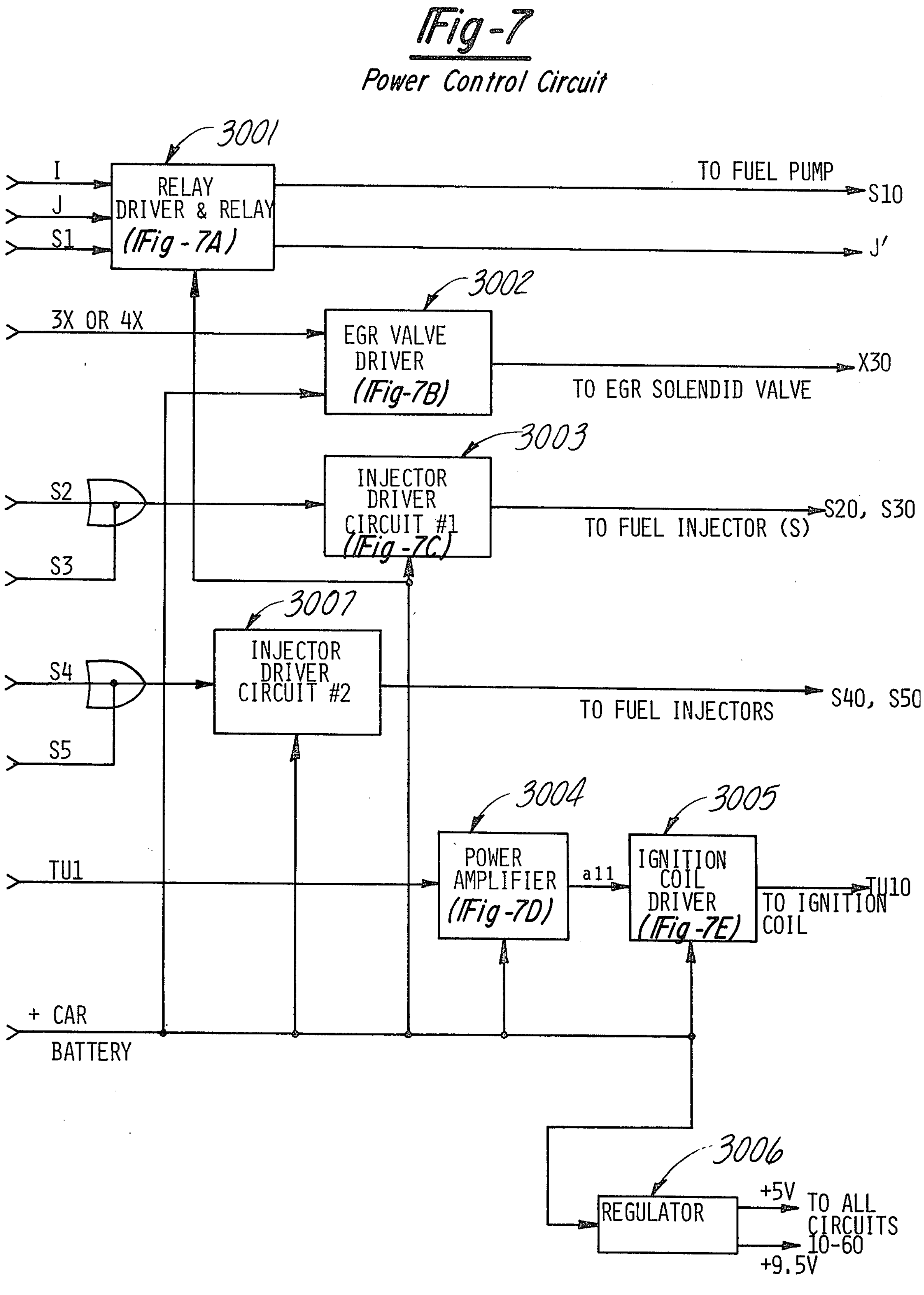

The third stage of the binary counter of FIG. 4C7 includes circuitry similar to that of the second stage including the dual two input AND/two input NOR gate combination comprising AND gates 617-3 and 618-3 whose outputs form the two inputs to a NOR gate 619-3. The $\overline{Q_2}$ output from node 611-2 is supplied from a branch of the $\overline{Q_2}$ output lead 621 to a first inverted input of a logical AND gate 621-3 whose other inverted input is connected to the $\overline{Q_1}$ output lead 620. The output of logical AND gate 621 is taken from node 622-3 which is connected to the input of an inverter 623-3 whose output is connected to one input of AND gate 617-3 whose other input is taken from the $\overline{Q_3}$ output node 611-3. Node 622-3 is also connected to one input of AND gate 618-3 whose other input is connected to the $Q_3$ output node 607-3. Initially, the $Q_1$, $Q_2$ and $Q_3$ outputs are low while the $\overline{Q_1}$, $\overline{Q_2}$, and $\overline{Q_3}$ outputs are high. With $\overline{Q_1}$ and $\overline{Q_2}$ high, the output of AND gate 621-3 is low so that a low is presented to one input of AND gate 618-3 while the low $Q_3$ signal is presented to the other input so that the output is low. Similarly, the low from node 622-3 is inverted and presented as a high to one input of AND gate 617-3 whose other input is also high since $\overline{Q_3}$ is high. Therefore, the output of AND gate 617-3 is high. With a high and a low at its two inputs, NOR gate 619-3 will present a low signal to the "D" input of the third stage of the counter before the initial count.

With the first clock phase, $e_5$ goes high and causes transistor 602-3 to conduct the low in the output of NOR gate 619-3 to the input of inverter 604-3. When the second clock arrives, $f_5$ goes high and causes transistor 605-3 to conduct so as to present a high signal to the input of inverter 606-3 and therefore a low at the $Q_3$ output node 607-3. At the beginning of the second count, $Q_1$, $\overline{Q_2}$ and $\overline{Q_3}$ are high while $\overline{Q_1}$, $Q_2$ and $Q_3$ are low. With a high and a low presented to the input of gate 621-3, a low is present at its output node 622-3. At the end of the second count a low is still present at the $Q_3$ output node 607-3. At the end of the second count, therefore, $\overline{Q_1}$, $\overline{Q_2}$ and $\overline{Q_3}$ are high while $Q_1$, $\overline{Q_2}$ and $Q_3$ are low. With a high and a low present at the inputs to gate 621-3, a low is again presented at output node 622-3 so that after the third count, a low is still present at the $Q_3$ output node 607-3.

Prior to the fourth count, $Q_1$, $Q_2$ and $\overline{Q_3}$ are high while $\overline{Q_1}$, $\overline{Q_2}$ and $Q_3$ are low. With $\overline{Q_1}$ and $\overline{Q_2}$ both low, the output of gate 621-3 goes high. With a high at node 622-3, a high is presented to one input of gate 618-3 while a low $Q_3$ signal is presented to the other input resulting in a low at the output of AND gate 618-3. Similarly, with a high at node 622-3, a low is presented at the output of inverter 623-3 to one input of AND gate 617-3 causing its output to be low. Since both inputs to NOR gate 619-3 are now low, the output presented to the input of the third stage is now high. With the occurrence of the first clock phase, $e_5$ goes high and causes transistor 602-3 to conduct and pass the high signal to inverter 604-3. When the second clock phase occurs, $f_5$ goes high to turn on transistor 605-3 and pass the low signal to the input of inverter 606-3. The output of inverter 606-3, which is the $Q_3$ output node 607-3 goes high so that at the end of the fourth count, the $Q_1$ and $Q_2$ outputs are low while the $Q_3$ output is high in accordance with the standard binary arithmetic. The arrangement of the third stage of the counter is such that its $Q_3$ output changes state on every fourth count just as the output of the second stage $Q_2$ changes state on every other count and the output of the first stage $Q_1$ changes state on every count.

Figure 8:
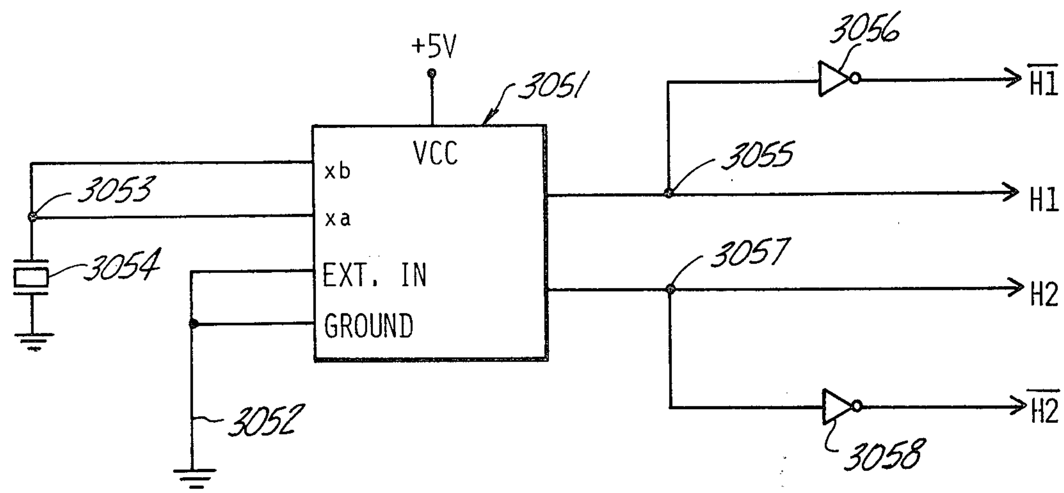

The fourth, fifth and sixth stages of the pulse-width counter of FIG. 4C7 and 4C8 which comprise the lowest order six bits of the pulse-width binary counter are identical to the circuitry of the third stage with the exception that another inverted input is added in each successive gate 621 so that all subsequent $\overline{Q}$ signals are presented to the inputs thereof. As known in the art, the $Q_4$ output changes state with every eighth count; the output of the fifth stage $Q_5$ changes state every sixteen counts and the output of the sixth stage $Q_6$ changes state with every thirty-two counts. A $\overline{Q_3}$ output node 611-3 is connected to a $\overline{Q_3}$ output lead 624 while the $\overline{Q_4}$ output node 611-4 is connected to output lead 625 and the $\overline{Q_5}$ output node 611-5 is connected to the $\overline{Q_5}$ output lead 626.

The sixth and final stage of the lower six bits of the pulse-width binary counter is illustrated at the top of FIG. 4C8. In order to reduce the amount of circuitry required since each successive stage would require an AND gate 621 having an additional inverted input, the $Q_6$ output node 607-6 is inverted and passed to the output circuitry comprising transistor 613-6 and 614-6 as before but the $Q_6$ node is also connected to a first input of a two input NAND gate 627 whose other input is connected to the output node 622-6 of the five inverted AND gate 621-6 which has as its inputs the $\overline{Q_1}$, $\overline{Q_2}$, $\overline{Q_3}$, $\overline{Q_4}$ and $\overline{Q_5}$ outputs.

Therefore, as long as either of the inputs to NAND gate 627 is low, its output signal $a_5$ remains high. As previously described with reference to the counter control logic of FIG. 4C1, as long as the signal $a_5$ on lead 461 is high the signal $c_5$ which is supplied via lead 477 to the gate electrode of the shunt transistors of the remaining five stages of the counter, i.e., 608-7 through 608-11.

The signal $a_5$ inhibits the upper five bits of the counter from counting since it shunts the input nodes 603-7 through 603-11 to the $Q_7$ through $Q_{11}$ output nodes 607-7 through 607-11 respectively. However, as soon as all of the lower six bits are ones, indicating that a count of 64 has been attained, then all of the $\overline{Q}$ inputs to gate 621-6 go low causing a high to appear at output node 622-6 and as soon as the sixth stage has reached its count, $Q_6$ goes high at the output node 607-6 causing both inputs of NAND gate 627 to go high and a low to appear on the output lead 461.

As soon as the signal $a_5$ goes low, as previously described with reference to FIG. 4C1, the signal $c_5$ on lead 477 goes low to disable the inhibiting shunt transistors 608-7 through 608-11 to allow the upper five bits of the binary counter to operate. Simultaneously, the transition of the signal $a_5$ from high to low will cause the signal $d_5$ on lead 484 to go high with each first clock phase for counting purposes. The signal $d_5$ is presented to each of the gate electrodes of the "D" input transistors 602-7 through 602-11 in the same manner that the enabling clock input signal $e_5$ was presented to the "D" input transistors 602-1 through 602-6 of the first six stages of the counter.

Therefore, the seventh stage of the pulse-width binary counter of FIG. 4C8 responds to the clock $d_5$ signal in much the same way as the first input stage of the counter reacted to the clock input signal $e_5$ to begin the counting of the seventh stage which will change its output $Q_7$ with each 64th count. The remaining stages 8, 9, 10 and 11 of the counter are similar to the second, third, fourth and fifth stages previously described and the outputs $Q_8$, $Q_9$, $Q_{10}$ and $Q_{11}$ change states on each 128th, 256th, 512th and 1024th binary counts as conventionally known for a typical eleven stage binary counter.

For feedback to the eighth, ninth, tenth and eleventh stages, the $Q_7$ output node 611-7 is connected to lead 628; the $\overline{Q_8}$ node 611-8 is connected to lead 629; the $\overline{Q_9}$ node 611-9 is connected to lead 630 and the $\overline{Q_{10}}$ node 611-10 is connected to lead 631.

As previously indicated, when the signal $n_0$ goes high, the output transistor 614 through 614-8 conduct to output the state of the first eight bits $da_1$ through $da_8$ via data bus inputs 615 through 615-8 respectively. Whenever the command signal generator circuitry of the microcomputer system of block 123 of FIG. 2 outputs the command signal $P_0$, it enables the most significant word of the pulse-width to binary counter to be connected to the computer data bus in the following manner. When the signal $P_0$ goes high, it is connected via lead 632 to the gate electrode of output transistors 614-9, 614-10 and 614-11 to output the most significant bits $Q_9$, $Q_{10}$ and $Q_{11}$ onto the data bus path $da_1$, $db_1$ and $dc_1$ via connections 615-9, 615-10 and 615-11 respectively. Lead 632 is also connected to the gate electrode of a transistor 633 having one current-carrying electrode connected directly to ground and its opposite current-carrying electrode connected to the $dd_1$ data bus line via lead 634 so that whenever the command signal $P_0$ goes high, the $dd_1$ bit of the data bus is pulled low. The most significant word comprising the data bits corresponding to the outputs of the last three stages of the counter, $Q_9$, $Q_{10}$ and $Q_{11}$, will be connected to the data bus whenever the signal $P_0$ goes high and is used as hereinafter described.

Therefore, the pulse-width to binary counter of blocks 457, 458 and 459 of FIG. 4C as illustrated in the electrical schematics of FIGS. 4C7, 4C8 and 4C9, respectively comprise a single eleven stage binary counter which can be activated to count clock pulses and store a binary count or digital word indicative of an analog signal (previously converted to a pulse-width representation thereof) representing a measured engine operating parameter as previously described. The binary number or count stored in the pulse-width binary counter of blocks 457, 458 and 459 can be latched in the counter upon termination of the pulse-width signal and stored therein until the computer requests the stored data without the need for additional storage or buffer registers as conventionally is done. Upon computer command, the pulse-width binary counter can transmit either the most significant word comprising the most significant three bits of the counter onto the data bus or an eight bit word comprising the eight least significant bits of the counter onto the data bus for use by the computer as hereinafter described. The number stored in the counter and requested by the computer is, therefore, a digital representation of a measured value and can be used by the computer to implement various control laws and the like for controlling the various operating functions of the engine as hereinafter described.

4.9 Oxygen System Integrator Circuitry

Figure 4D:
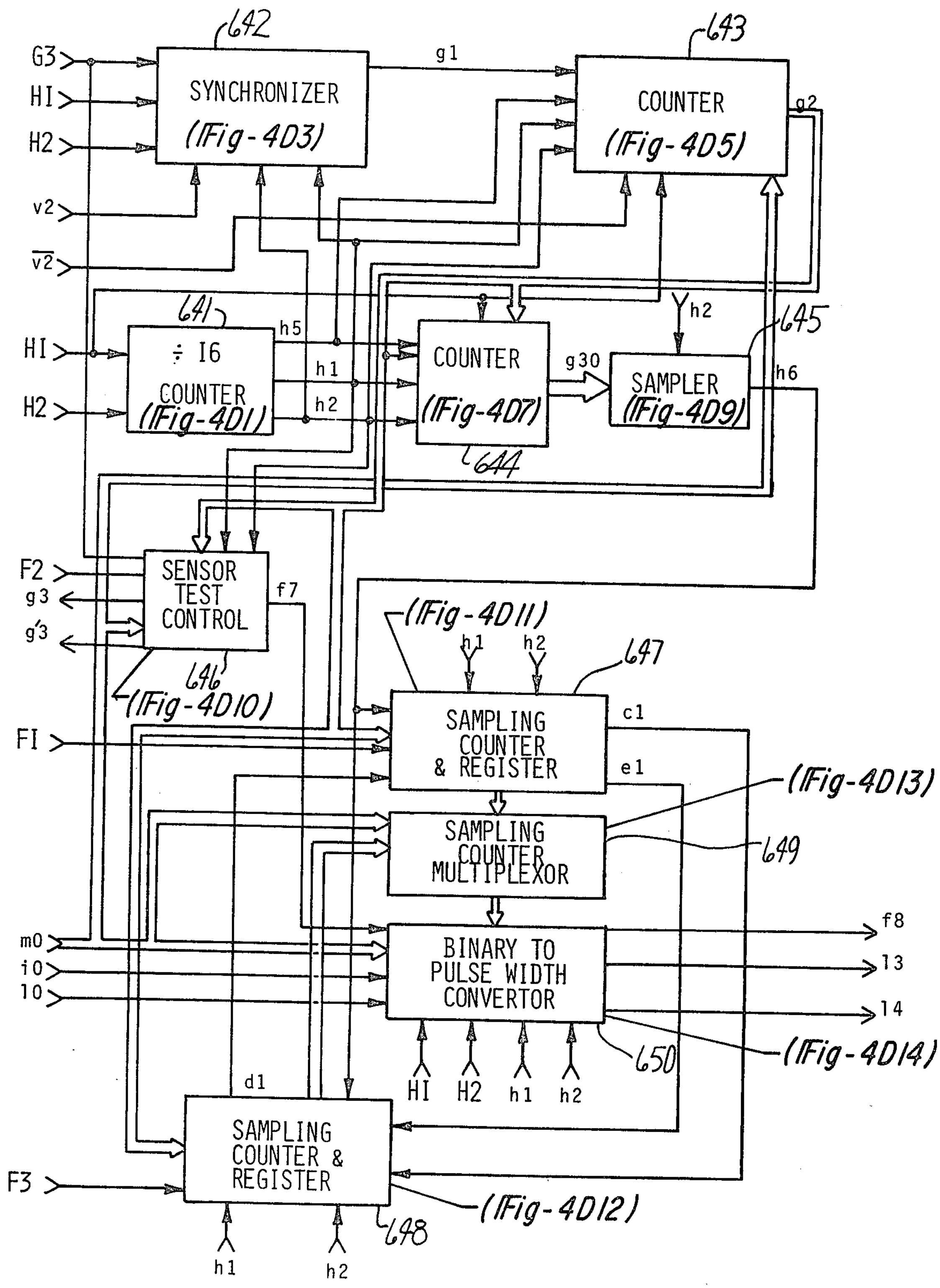
FIG. 4D is a block diagram of the oxygen system integrator circuitry of block 414 of FIG. 4.
Figure 4D:
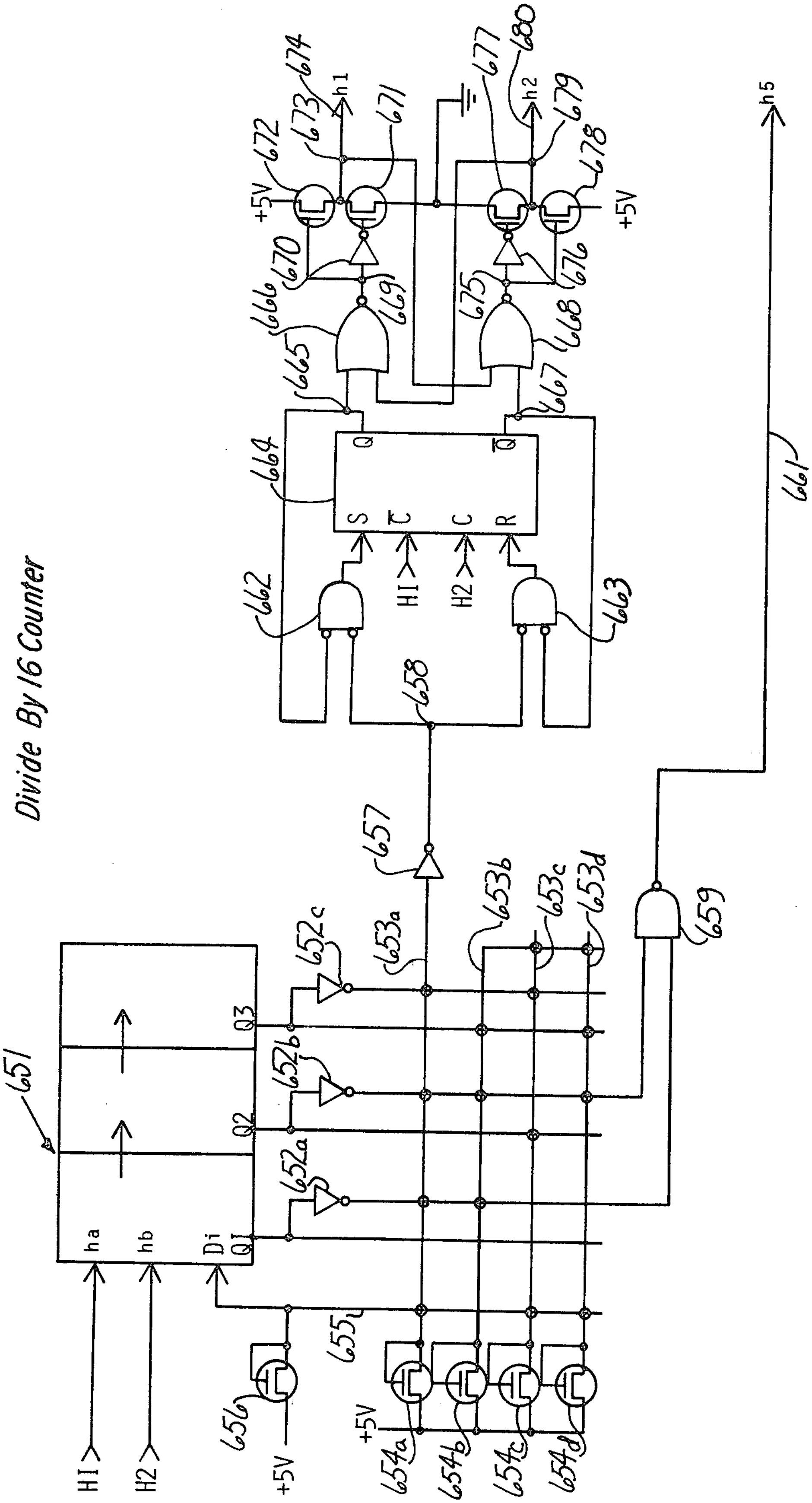

The block diagram of FIG. 4D illustrates, in greater functional detail, the oxygen system integrator circuitry of block 414 of FIG. 4. Block 641 of FIG. 4D is a divide-by-sixteen counter which receives as its inputs the first and second phases $H_1$ and $H_2$ from the output of the master clock. In the preferred embodiment of the present invention, the master clock is a crystal-controlled one megahertz clock as hereinafter described. The circuit of block 641 divides down the one megahertz $H_1$ and $H_2$ clock rate to produce first and second phase clock signals $h_1$ and $h_2$ operating at a frequency of 62.5 kilohertz. The divide-by-sixteen counter of block 641 also outputs a decoded clock signal $h_5$ which occurs once for every four $H_1$ signals to be used for timing purposes as hereinafter described.

The synchronizer circuitry of block 642 receives the engine crankshaft position pulses $G_3$ which are properly shaped and timed by the crankshaft position signal conditioner of block 415 of FIG. 4 as hereinafter described and which are generated N/2 times per engine revolution where "N" is the number of cylinders in the engine. The synchronizer provides a short time filter to insure that relatively short time duration voltage spikes and the like do not trigger a false engine crankshaft position pulse output and a long term filter to insure that after a true engine crankshaft position signal $G_3$ is detected, not even a long term noise signal or the like can falsely trigger another until a predetermined time interval has elapsed. The properly filtered engine crankshaft position pulse $G_3$ is then synchronized with the slower phase clock pulses $h_1$ and $h_2$ so that after being digitally processed to exclude noise and to obtain synchronization with the lower speed logic clock phases $h_1$ and $h_2$, the synchronized and retimed engine crankshaft position pulse $g_1$ is outputted to the counter of block 643.

The counter of block 643 has presetable inputs which change the initial preset count state depending upon the number of cylinders in the engine under consideration. The counter of block 643 will output a group of three signals, referred to collectively as $g_2$, which are decoded outputs from the counter. The group of signals $g_2$, represents a group of three signals occurring once each four, three or two occurrences of the synchronized and retimed engine crankshaft position pulse $g_1$, depending upon the preset condition of the counter, which, as previously described, depends upon the number of cylinders in the engine. The group of three output signals $g_2$ are used for clear and shift operations and for various timing considerations as hereinafter described and the use of the preset inputs of the counter 643 provides a greater flexibility in utilizing a single counter and simply changing the preset inputs to provide the necessary timing, shift and clear outputs for any given number of cylinders in an engine.

The counter of block 644 is a fourteen stage dynamic shift register counter which receives the divided down clock signals $h_1$, $h_2$; the decoded clock signal $h_5$; and the group of three signals $g_2$ decoded from the output of the counter of block 643. The fourteen stage counter of block 644 counts the number of clock times $h_1$, $h_2$, per engine revolution and the eight most significant bits of the counter are outputted as the signal group $g_{30}$ which is indicative of engine period. The group of signals $g_{30}$ are outputted to the sampling circuitry of block 645.

The sampling circuitry of block 645 receives the group of signals $g_{30}$ which are used to preset an eight stage dynamic shift register counter. Since the initial count stored in the sampling counter of block 645 represents only the upper most significant bits of a fourteenth stage counter clocked at the clock rate of signals $h_1$, $h_2$ and since the eight stage sampling counter of block 645 is counted down at the same clock rate, $h_1$, $h_2$ but has six less stages, the output of the sampling counter of block 645 counts 64 times as fast as did the counter of block 644. Therefore, the output of the sampling counter of block 645, the group of signal pulses $h_6$, insures that the sampling counters of blocks 647 and 648 normally obtain 64 equally-spaced sample periods per time period counter (one revolution) regardless of the engine speed.

The sensor test control circuitry of block 646, which is also referred to as the oxygen qualifier network of the present invention, receives one of the synchronized timing signals from the group $g_2$ outputted from the counter 643; a command signal $m_9$ from the secondary command signal generator of the microprocessor system of block 123 of FIG. 2 as hereinafter described; and the inhibit signal $F_2$ from the output of the oxygen sensor signal conditioning system of FIG. 3E, as previously described; and outputs the oxygen sensor test signals $g_3$ and $g'_3$ which cause the impedence of each of the $ZiO_2$ sensors to be tested via the oxygen sensor signal conditioning system of FIG. 3E. The sensor test control circuitry of block 646 also outputs the command signal $f_7$ which indicates the sensor condition output at the last test command for preventing binary to pulse-width conversion of the sensor outputs if the previous impedence test indicated that the temperature of either sensor is low enough so that its output is invalid or otherwise unreliable.

The 64 sampling pulses per timing period represented by the signal $h_6$ are supplied to a gate, at the input of the channel number one or first oxygen sensor sampling counter and register of block 647, and to a corresponding gate at the input of the channel number two or second oxygen sensor sampling counter and register of block 648. The first channel gate of block 647 is enabled by the signal output $F_1$ from the output of the oxygen sensor signal conditioning system of FIG. 3E which is low whenever a rich condition exists at the first oxygen sensor while the signal $F_3$, which is outputted from the channel two output from the circuit of FIG. 3E, enables the channel number two gate of block 648 when a low signal level is present indicating a rich level at the channel number two oxygen sensor.

Each of the sampling counter and register circuits of blocks 647 and 648 include a sampling counter and a latch register. Each sampling counter will count a gated pulse whenever the gate is enabled by a low sensor output signal $F_1$, $F_3$ and the sampling count $h_6$ is present. Therefore, at the end of an engine timing period, the first and second oxygen sensor channels will have been sampled 64 times. Each sampling counter of blocks 647 and 648 will contain a count between zero and 64 depending upon the status of the sensor output during each of the 64 sample periods. For example, if the output of the first sensor channel $F_1$ remained high throughout the sample period, it would indicate that a lean condition has existed throughout the sampling period. Therefore, the counter will never have been enabled to count the sampling pulses $h_6$ and a count of zero will remain at the end of the sample time interval.

On the other hand, if a continually rich condition persists throughout the time interval, one engine revolution in the present example, then the gate would have enabled the counter to count all 64 of the pulses $h_6$ and a count of 63 would be stored therein at transfer time. Under ideal conditions, the number of rich samples will equal the number of lean samples and a count of 32 pulses will be made, which corresponds to the desired stoichiometric mode of operation. At the end of a timing interval, the attained count is stored in a latching register until requested by the computer for further processing.

The sampling counter multiplexer of block 649 responds to a computer request and initiates the transfer of the count stored in the channel number one latch register of block 647 or the channel number two latch register of block 648 for input into the binary to pulse-width converter of block 650.

The binary to pulse-width converter circuitry of block 650 responds to a computer initiated command for an oxygen reading to output a pulse-width signal $f_8$ whose pulse-width or time duration is proportional to the count stored in the last register of the selected channels of blocks 647 or 648. Therefore, the count stored in the blocks 647 or 648 is indicative of the richness or leanness of the exhaust gas mixture sensed by the selected first or second oxygen sensor and this pulse-width signal $f_8$ is supplied via the multiplexer of FIG. 4B to the pulse-width to binary converter of FIG. 4C, previously described, to supply the computer with a digital word indicative of the oxygen sensor output over a predetermined time interval. This digital word enables the computer to adjust the amount of fuel supplied to the engine to restore the desired stoichiometric operation so as to minimize the generation and emission of noxious pollutants and the like.

4.10 Divide-by-Sixteen Counter

The divide-by-sixteen counter of block 641 of FIG. 4D is illustrated in the schematic diagram of FIG. 4D1. FIG. 4D1 shows a three stage dynamic shift register configured to form a two phase, three stage counter 651. Each of the two phase shift register stages of the counter 651 are two phase dynamic flip-flops constructed as illustrated in FIGS. 9.22 A and B. The first clock input $h_a$ receives the first phase master clock signal $H_1$ while the second clock input $h_b$ receives the second phase master clock pulse $H_2$. The non-inverted or "Q" output of each of the three stages, designated $Q_1$, $Q_2$ and $Q_3$ are represented by the three vertical lines extending downwardly therefrom. The inverted or "$\bar{Q}$" outputs are represented by the three straight vertical lines extending from the output of inverters 652*a*, 652*b*, and 652*c*, whose inputs are connected to the $Q_1$, $Q_2$ and $Q_3$ outputs, respectively.

The four horizontal lines 653*a*, 653*b*, 653*c*, and 653*d* intersect the vertical Q and $\bar{Q}$ output lines of each of the three stages of the counter 651 and represent the decoding circuitry associated with the outputs of the counter 651. One end of each of the horizontal lines 653*a* through 653*d* is commonly connected to a current-carrying electrode and the gate electrode of a corresponding pull-up transistor 654*a* through 654*d*, respectively. The other current-carrying electrode of each of the transistors 654*a* through 654*d* is connected directly to the +5-volt source of potential for insuring proper logic levels. Each of the horizontal lines 653*a* through 653*d* represent a multiple input NOR gate having, as its inputs, the outputs from the counter 651 represented by the circled intersection of the vertical output lines with the particular horizontal line representing a particular NOR gate. This convention is further illustrated in FIG. 9.

The vertical line designated 655 represents a three input NOR gate whose inputs are the outputs of the three NOR gates designated by the horizontal lines 653*a*, 653*c* and 653*d* as represented by the circled intersections of vertical line 655 with the correspondingly designated horizontal lines. The NOR gate represented by the vertical line 655 is coupled to the current-carrying electrode and gate electrode of a pull-up transistor 656 whose opposite current-carrying electrode is connected directly to the +5-volt source of potential for providing the necessary gate drive to insure proper logic levels and the output of the NOR gate represented by the vertical line 655 is connected directly to the $D_i$ input of the first stage of the counter 651. The $D_i$ input of the second stage of counter 651 is directly coupled to the $Q_1$ output of the first counter stage and the $D_i$ input to the third and last stage of counter 651 is coupled to the $Q_2$ output of the second stage to form a conventional dynamic shift register combination.

The operation of the counter 651, as with the various counters previously described which are implemented through the use of dynamic shift registers, the horizontal line 652 represents a three input NOR gate having one input coupled to the non-inverted output $Q_2$ of the second stage of the counter 651, a second input coupled to the inverted output $\bar{Q}_3$, i.e., from the output of inverter 652*c* from the third stage of the counter 651 and a third disabling input taken from the output of NOR gate 653*b* as hereinafter explained.

Similarly, horizontal line 653*d* represents a three input NOR gate having its first input coupled to the inverted output $\bar{Q}_2$ from the second stage of counter 651; its second input connected directly to the $Q_3$ output from the third stage of the counter 651; and its third or disabling input taken from the output of NOR gate 653*b*. The outputs of the NOR gates represented by line 653*c* and line 653*d* form two of the three inputs to the NOR gate represented by the vertical line 655 and form an Exclusive OR combination which is supplied back to the $D_i$ input of the first stage of the counter 651 to determine the count cycle. The count cycle determined by this basic feedback arrangement, as modified by the disabling NOR gate represented by horizontal line 653*b* and the all ones detect NOR gate 653*a*, is set forth in the count state table of FIG. 4D2.

The three input NOR gate represented by horizontal line 653*b* has its inputs connected to receive the counter outputs $\bar{Q}_1$, $\bar{Q}_2$, and $Q_3$. The output of NOR gate 653*b* serves as one input to NOR gates 653*c* and 653*d* for disabling same to enable a logical "1" to be supplied to the $D_i$ input of the first stage of counter 651 via the output of NOR gate 655 whenever the count state 110 is detected to insure use of all count states in the cycle.

Similarly, the $\bar{Q}$ output from each of the inverters 652*a*, 652*b*, and 652*c* form the inputs to a three input NOR gate whose output forms the third and last input to the NOR gate 655 and is used to detect an all ones state to disable NOR gate 655 and feed a logical "0" into the $D_i$ input of the first stage of the counter 651 on the next count so as to prevent the counter from being stuck in an all ones state. The output of the three input NOR gate 653*a*, which is used to detect an all ones condition, also has its decoding output connected to the input of an inverter 657 whose output is connected to a node 658 for use as hereinafter described.

The $\bar{Q}_1$ output from the first stage of the counter 651 and the $\bar{Q}_2$ output from the second stage of the counter 651 are supplied from the vertical lines extending from the output of inverters 652*a* and 652*b* respectively to the first and second inputs of a NAND gate 659. The output of NAND gate 659 is taken from lead 661. NAND gate 659 senses the outputs $\bar{Q}_1$ and $\bar{Q}_2$ of the counter 651 and outputs a decoded clock signal on lead 661. The decoded or gated clock signal $h_5$ is generated once for every four occurrences of the master clock phase $H_1$.

The output of the NOR gate 653*a* provides a positive-going, one clock-pulse wide signal whenever the $Q_1$, $Q_2$ and $Q_3$ stages of the counter 651 contain a high which occurs once each count cycle, a count cycle being completed each time eight master clock pulses have been counted. The occurrence of this high, which indicates that an all ones condition exists, causes a low signal to appear at the output of inverter 657 and this low persists at the input node 658 for one master clock time or count.

The low at node 658 is coupled directly to a first inverted input of a first logical AND gate 662 having two inverted inputs and to the first inverted input of a logical AND gate 663 having two inverted inputs. The output of gate 662 is connected directly to the set input of a two phase R/S clocked flip-flop 664 as illustrated in FIG. 9.20, while the output of gate 663 is connected directly to the reset inputs of flip-flop 664. The first phase clock input $\bar{C}$ is connected to receive the first master clock phase $H_1$ while the second clock phase input C is connected to receive the second master clock phase $H_2$. The Q output of R/S flip-flop 664 is taken from node 665 which is connected back to the second inverted input of AND gate 662 and to a first input of NOR gate 666 while the $\bar{Q}$ output of flip-flop 664 is taken from node 667 which is connected back to the second input of AND gate 663 and to a first input of a second NOR gate 668.

In operation, node 658 will go low each time the counter 651 reaches an all ones (111) condition. As indicated by the count state table of FIG. 4D2, this occurs once in each eight counter master clock times. Assume initially that the R/S flip-flop 664 is in the reset condition so that a low is present at the Q output node 665 while a high is present at the $\bar{Q}$ output node 667.

The high present at node 667 is supplied back to one inverted input of AND gate 663 to disable the gate while the low from the Q output node 665 is supplied back to enable AND gate 662. As soon as the counter 651 has reached the 111 count, which occurs once each eight master clock times, node 658 goes low for one master clock time.

As soon as this low is transmitted to the other inverted input of gate 662, gate 662 supplies a high pulse to the set input of flip-flop 664. With a high present at the set input and a low at the reset input, flip-flop 664 will set with the next occurrence of the $H_1$ and $H_2$ phase signals. Therefore, after one master clock time, the R/S flip-flop 664 will set so that a high is presented to the Q output node 665 and a low to the $\bar{Q}$ output node 667. The high at output node 665 is fed back to disable AND gate 662 while the low at node 667 enables AND gate 663. Therefore, the next time that an all ones count condition is detected at the output of counter 651 and node 658 goes low, gate 663 will present a high signal to the reset input of R/S flip-flop 664 while a low is presented to a set input. After one master clock time, R/S flip-flop 664 will be reset causing a low to again appear at the Q output node 665 and a high to appear at the $\bar{Q}$ output node 667.

Therefore, the operation of the decoder circuitry for sensing an all ones condition from the counter 651 and the operation of the R/S flip-flop 664, will result in the action of a divide-by-sixteen counter since with each eight counted master clock pulses, the Q output goes high and remains high until flip-flop 664 is reset after eight more clock pulses. Therefore, a complete clock cycle from the setting of R/S flip-flop 664 until it is again set requires the counting of sixteen master clock pulses so as to achieve a divide-by-sixteen effect at the outputs of the R/S flip-flop 664.

As previously described, the Q output node 665 of the R/S flip-flop 664 is connected to a first input of NOR gate 666 whose output is connected directly to an output node 669. Node 669 is connected to the input of an inverter 670 whose output is connected directly to the gate electrode of a transistor 671. The output node 669 is also connected directly to the gate electrode of a second transistor 672 having one current-carrying electrode connected to a +5-volt source of potential and its other current-carrying electrode connected to one current-carrying electrode of the transistor 671 whose opposite current-carrying electrode is connected to ground. The junction of the current-carrying electrodes of transistor 671 and 672 form the first phase output node 673 from which the first phase of the 62.5 kilohertz, (one megahertz divided-by-sixteen) clock signal $h_1$ is outputted via the first clock phase output lead 674.

The output node 673 is also connected back to the second input of NOR gate 668 whose first input was connected directly to the $\bar{Q}$ output node 667. The output of NOR gate 668 is fed to node 675 and 675 is connected directly to the input of an inverter 676 whose output is connected directly to the gate electrode of a first transistor 677. Node 675 is also connected directly to the gate electrode of a second transistor 678 whose first current-carrying electrode is connected to the +5-volt source of potential and whose second current-carrying electrode is connected to the first current-carrying electrode of transistor 677. The second current-carrying electrode of transistor 677 is connected to ground. The junction of the second current carrying electrode of transistor 678 and the first current-carrying electrode of transistor 677 is the second phase output node 679 which outputs the second phase 62.5 kilohertz logic clock signal $h_2$ via the second phase output lead 680. The second phase output node 679 is also connected back to the second input of NOR gate 666 so as to form a latching connection between the $h_1$ and $h_2$ outputs 673, 679 to prevent signal overlap and provide a clear distinction between the two phases of the 62.5 kilohertz or divided down logic clock.

The operation of the divide-by-sixteen counter of FIG. 4D1 is such that each time the R/S flip-flop 664 is reset causing a low to appear at the node 665, NOR gate 666 is enabled. As soon as the $\bar{Q}$ output goes high, the output of NOR gate 668 goes low causing the signal at the output of inverter 676 to go high which turns on transistor 677 and turns off transistor 678 to clamp the clock phase $h_2$ low. Since this low is supplied back to the second input of the enabled NOR gate 666, its output goes high causing transistor 671 to turn off and transistor 672 to turn on. This connects the +5-volt source of potential directly to the output node 673 and immediately causes the first clock phase $h_1$ to go high.

Eight master clock times from the resetting of R/S flip-flop 664, the R/S flip-flop 664 is set causing the Q output node 665 to go high and the $\bar{Q}$ output node 667 to go low. The presence of a low at the node 667 immediately enables NOR gate 668. The presence of a high at node 665 immediately causes the output of NOR gate 666 to go low. A low at node 669 turns off the transistor 672 and turns on transistor 671 so that the output node 673 is grounded causing the first phase signal $h_1$ to go low causing the previously enabled NOR gate 668 to produce a high pulse at its output node 675. When node 675 goes high, transistor 677 is turned off and transistor 678 is turned on so that the +5-volt source of potential is connected directly to the second phase output node 679 causing the second phase clock signal $h_2$ to go high.

This sequence is repeated so that after eight more master clock times, the R/S flip-flop 664 is again reset causing the signal $h_1$ to again go high while $h_2$ goes low. The frequency of the two clock phases outputted by the circuit of FIG. 4D1 is, therefore 1/16 that of the master clock since sixteen master clock times elapse between each subsequent low-to-high transition of a given clock phase $h_1$ or $h_2$.

4.11 Engine Crankshaft Position Pulse Synchronizer

FIG. 4D3 is an electrical schematic diagram of the synchronizer circuitry of block 642 of FIG. 4D. The synchronizer circuit of FIG. 4D3 includes a short time filter for preventing the generation of a synchronized engine crankshaft position pulse from short time duration voltage spikes and the like; and a long time filter or bounce suppressor which resets the input flip-flop after a predetermined, relatively long time interval to be sure that once a filtered engine crankshaft position pulse has been detected for synchronization with the divided down logic clock $h_1$, $h_2$, it cannot indicate the presence of another input until after a predetermined period of time has elapsed. The synchronizer of FIG. 4D3 also provides timing logic for synchronizing the detected and properly filtered engine crankshaft position pulses to the 62.5 kilohertz logic clock as hereinafter described.

The first phase $H_1$ of the master clock is supplied to the synchronizer circuit of FIG. 4D3 via lead 681 while the second master clock phase $H_2$ is supplied via input lead 682. The signal $G_3$ which is a properly sensed and shaped engine crankshaft position pulse outputted from the circuitry of block415 of FIG. 4 as hereinafter described, is supplied via lead 683 to an input node 684. Node 684 is connected directly to a first switch contact which is connected to a first current-carrying electrode of a transistor 685 through a selectively positionable switch arm 686. Should it be desired to use the opposite polarity input, node 684 is also connected to the input of an inverter 687 whose output is connected to a second switch contact to which the mask-positionable switch arm 686 may be moved or positioned by well-known LSI techniques to complete a current path between the output of the inverter 687 and the first current carrying electrode of transistor 685.

The gate electrode of transistor 685 is connected directly to the $H_2$ clock phase lead 682 while the opposite current-carrying electrode of transistor 685 is connected to both the first current-carrying electrode of a transistor 688 and to the input 689. the output of inverter 689 is connected directly to the input of a second inverter 690 whose output is connected to a node 691. Node 691 is connected directly to a node 692 and to the first current-carrying electrode of a transistor 693. Node 692 is connected to the second current-carrying electrode of transistor 688 and to a first inverted input of a logical AND gate 694 having four inverted inputs.

The gate electrode of transistor 688 and the gate electrode of transistor 693 are connected directly to the $H_1$ clock phase input lead 681. The opposite current-carrying electrode of transistor 693 is connected to the input of an inverter 695 whose output is connected directly to the first current-carrying electrode of a transistor 696 whose opposite current-carrying electrode is connected to the input of an inverter 697. The output of inverter 697 is supplied to node 698 and node 698 is connected to a first current-carrying electrode of a transistor 699 and to the second inverted input of AND gate 694. The second current-carrying electrode of transistor 699 is connected directly to the input of an inverter 700 whose output is connected to the first current-carrying electrode of a transistor 701 whose second current-carrying electrode is connected directly to the third inverted input of AND gate 694. The gate electrodes of transistor 696 and transistor 701 are connected to the $H_2$ clock phase lead 682 while the gate electrode of transistor 699 is connected directly to the $H_1$ clock phase lead 681.

The fourth inverted input of AND gate 694 is connected directly to a node 702 which is also connected directly to the reset input of an R/S clocked flip-flop 703. The set input of R/S flip-flop 703 is connected directly to the output of the gate while a first clock phase input C is connected to the $H_2$ clock phase lead 682 and the second clock phase input $\bar{C}$ is connected to the $H_1$ clock phase lead 681. The $\bar{Q}$ output of the R/S flip-flop 703 is connected directly to a first inverted input of a logical OR gate 704 whose output is connected to a first non-inverted input of a logical AND gate 705 having a second input which is inverted. The combination of OR gate 704 and AND gate 705 is equivalent to the two input AND/two input NOR gate combination illustrated in FIG. 9.16.

The output of AND gate 705 is connected directly to the first current-carrying electrode of a transistor 706 whose second current-carrying electrode is connected to output node 707. Node 707 is connected (1) to the first current-carrying electrode of a transistor 708 whose opposite current-carrying electrode is connected to ground; (2) to the first current-carrying electrode of a transistor 709 whose opposite current-carrying electrode is connected to a node 710; and (3) to the input of an inverter 711 whose output is connected to the input of a second inverter 712 whose output is directly coupled to node 710. The gate electrode of transistor 706 is connected to the first phase $h_1$ of the divided down logic clock which wasoutputted on lead 674 of FIG. 4D1 while the transistor 709 has its gate electrode connected to the second phase divided down clock pulse $h_2$ from the output lead 680 of FIG. 4D1. Since the first and second clock phase signals $h_1$ and $h_2$, which represent the first and second phases of a 62.5 kilohertz logic clock are used extensively hereinafter, it will be understood that they originate at the output leads 674 and 680, respectively, of the divide-by-sixteen counter circuit of FIG. 4D1, previously described, and the leads will not hereinafter be referenced to avoid excessive cluttering of the figures.

The reset signal $v_2$ is supplied via lead 713 to a node 714 and node 714 is connected directly to the gate electrode of transistor 708. The reset signal $v_2$ is a power-on reset signal synchronized to the 62.5 kilohertz logic clock which is outputted by the reset control circuitry of the microprocessor system of block 123 of FIG. 2, as hereinafter described.

A long time filter or bounce protection circuit is provided by seven two phases dynamic flip-flops (as further described in FIG. 9.22A and B.) combined to form a seven stage shift register counter 715. The first clock phase input $h_a$ of each of the seven stages is connected to the source of the logic clock phase $h_1$ while the second clock phase input $h_b$ of each of the seven stages is connected to the source of the clock phase $h_2$. The non-inverted outputs of each of the seven stages are designated $Q_1$ through $Q_7$ and are represented by the straight vertical line extending downwardly therefrom. The inverted outputs $\bar{Q}_1$ through $\bar{Q}_7$ are represented by the straight vertical line extending downwardly from the output of the respective inverters 716*a* through 716*g* whose respective inputs are connected directly to the $Q_1$ through $Q_7$ outputs of the counter 715.

As previously indicated, the four horizontal lines which intersect the vertical lines representing the Q and $\bar{Q}$ outputs of each of the seven stages of the counter 715 each represent multiple input NOR gates 717*a*, 717*b*, 717*c* and 717*d*. Horizontal line 717*a* represents a seven input NOR gate whose inputs are connected to the outputs of the inverters 716*a* through 716*g* respectively (counter outputs $\bar{Q}_1$ throuth $\bar{Q}_7$) for detecting an all ones counter condition. The output of the NOR gate 717*a* is one input of a three input NOR gate represented by the vertical line 718. The output of the NOR gate 718 is commonly connected to the gate electrode and one current-carrying electrode of pull-up transistor 719 whose opposite current-carrying electrode is connected directly to a +5-volt source of potential to provide the necessary gate drive to insure proper logic levels. The output of the NOR gate 718 is also connected directly to the $D_i$ input of the first stage of the counter 715 for controlling the operation thereof by supplying either a logical "1" or a logical "0" thereto as hereinafter described. The $D_i$ input of each successive stage of counter 715 is connected to the Q output of the preceding stage, as known in the art.

The NOR gate represented by the second horizontal line 717*b* represents a seven input NOR gate for decoding a predetermined count of the counter 715 and outputting a high pulse on output lead 720 whenever all of the inputs are simultaneously low. The seven inputs of NOR gate 717b are the non-inverted outputs $Q_1$, $Q_2$, $Q_3$, $Q_4$, $Q_5$, and $Q_6$ of the first six stages of the counter 715 and the inverted output $\overline{Q}_7$ of the seventh and last counter stage.

The third NOR gate represented by horizontal line 717c is a two input NOR gate having as its inputs the counter outputs $Q_6$ and $\overline{Q}_7$ and the fourth NOR gate represented by the fourth horizontal line 717d is a two input NOR gate having as its inputs the counter outputs $\overline{Q}_6$ and $Q_7$. The outputs of the NOR gates 717c and 717d form two inputs of a four input NOR gate represented by the straight vertical line 718 and form and Exclusive OR combination which, together with NOR gate 717a and the signal on lead 721, as hereinafter described, controls the count sequence of the counter 715 in accordance with the count state table of FIG. 4D4. The output of NOR gate 718 supplies a logical "1" or a logical "0" to the $D_i$ input of the first stage of the counter 715a depending upon the decoded signal at its four inputs.

One end of each of the horizontal lines 717a through 717d is shown as being commonly connected to both the gate electrode and a first current-carrying electrode of a corresponding transistor 722a through 722d and the opposite current-carrying electrode of each of the transistors 722a through 722d is connected directly to the +5-volt source of potential to provide the necessary pull-up or drive required for operating the respective NOR ates, as known in the art. Similarly, the NOR gate represented by vertical line 718 is shown as being commonly coupled to the gate electrode and one current-carrying electrode of a pull-up transistor 719 whose other current-carrying electrode is coupled to a +5-volt source of potential for insuring sufficient gate drive.

The first count decode output lead 720 is connected directly to a node 723 and node 723 is connected to the first current-carrying electrode of the transistor 724 and to a second node 725. Node 725 is connected directly to the previously described node 702 and directly to the inverted input of AND gate 705. Similarly, the count control lead 721 is connected directly to a node 726. Node 726 is connected to the second inverted input of gate 704 and to a node 727. Node 727 is connected to a first input of a three input NOR gate 728 whose output is taken from node 729 and supplied (1) directly to the set inputs of an R/S flip-flop 730; (2) directly to a first input of a two input NAND gate 731;and (3) is fed back to a first input of a second two input NOR gate 732. The output of NOR gate 732 is connected directly to a node 733 and node 733 is connected directly to the reset input R of R/S flip-flop 730 and is supplied via lead 734 back to the node 727.

The first phase clock input $\overline{C}$ of the R/S clock flip-flop 730 is connected to receive the first phase logic clock signals $h_1$ while the second clock phase input C is connected to receive the second clock phase signals $h_2$. The $\overline{Q}$ output of R/S flip-flop 730 is connected directly to the second input of NAND gate 731 whose output is taken from lead 735.

The second input of the three input NOR gate 728 is connected directly to node 714 for receiving the power-on reset signals $v_2$ via lead 713 while the third and last input of NOR gate 728 is connected to the output of a logical AND gate 736. One input of AND gate 736 is taken from the second current-carrying electrode of transistor 724 whose gate electrode is connected to receive the first phase clock pulses $h_1$ while the second input is commonly connected to the second input of a logical AND gate 737 and is adapted to supply the second clock phase pulses $h_2$ thereto. The first input of AND gate 737 is connected via lead 738 to the output node 710 previously described and the output of AND gate 737 is connected directly to the second input of NOR gate 732.

In actuality, the combination of AND gate 736 and NOR gate 728 is a two input AND/three input NOR configuration as illustrated in FIG. 9.9 while the combination of AND gate 737 and NOR gate 732 is a two input AND/two input NOR gate configuration as illustrated in FIG. 9.14.

The operation of the synchronizer circuit of FIG. 4D3 is as follows. When the system is initially started or subsequently restarted, the generation of the power-on reset signal $v_2$ will cause a momentary high signal to be presented via lead 713 to node 714. This high will cause transistor 708 to conduct so as to clamp node 707 low. With node 707 low, the output of inverter 711 is high, hence the output of inverter 712, node 710 is low. The low from node 710 is supplied back via lead 738 to disable the AND gate 737 and cause its output to go low. A low at the output of AND gate 737 enables NOR gate 732. Simultaneously, the power-on reset signal $v_2$ supplies a momentary high to one input of NOR gate 729 causing its output node 729 to go low. The low present at output node 729 disables NAND gate 731; supplies a low to the set input of R/S flip-flop 730; and supplies a low back to the second input of the enabled NOR gate 732 causing a high to appear at output node 733. The high at output node 733 is presented to the reset input of R/S flip-flop 730 and is supplied back via lead 734 to node 727. A high at node 727 is supplied to one input of NOR gate 728 to continue to disable the gate even after the power-on reset signal $v_2$ again goes low. The cross coupled outputs of the two NOR gates 728, 732 effectively latches them in this state until external conditions change.

The next $h_1$, $h_2$ clock cycle, resets R/S flip-flop 730. The resetting of R/S flip-flop 730 causes the $\overline{Q}$ output to go high so as to enable one input of NAND gate 731. NAND gate 731 outputs the normally high signal $g_1$ on lead 735 since its other input is disabled via the low at node 729. The signal $g_1$ is the engine crankshaft positon pulse $g_3$ after it has been filtered for noise and synchronized with the divided down logic clock phases $h_1$, $h_2$. A narrow width, negative-going pulse $g_1$ is generated at a predetermined time interval after each engine crankshaft positon pulse $G_3$ is detected, but between detected pulses, the signal $g_1$ stays normally high.

The high present at the output node 733 of NOR gate 732, as previously described, is also supplied via lead 734 back to input node 727. Node 727 is also connected to node 726 so that the high signal is presented via lead 721 to a first input of the four input NOR gate represented by the vertical line 718 so as to normally disable the NOR gate and continually supply zeroes to the $D_i$ input of counter 715 to effectively clear same. The high at node 726 is also supplied to the second inverted input of OR gate 704 so as to enable same.

Assuming that the input flip-flop 703 was initially in the reset state, the $\overline{Q}$ output presents a high to the other inverted input of OR gate 704 causing a low to appear at its output. With a low present at the non-inverted input of AND gate 705, the gate is initially disabled causing a low to appear at its output. Therefore, once the synchronizer has been reset by the power-on reset signal $v_2$, both clock phases $h_1$ and $h_2$ will merely transfer the lows from the output of AND gate 705 to disable AND gate 737 via node 710 and lead 738. This will maintain the output of AND gate 737 low to insure that the output of NOR gate 732 remains clamped or latched high.

The circuit is then considered to be in the reset state and awaits the detection of an engine crankshaft position pulse $G_3$. The signal $G_3$ supplied via lead 683 to input node 684 is a normally high signal which goes momentarily low whenever an engine crankshaft position pulse is to be generated. The circuitry between the input node 684 and the set inputs of the R/S flip-flop 703 acts as a short time filter to insure that negative-going, short time pulses having a duration of less than three clock times, three microseconds in the present example wherein a one megahertz master clock is used, have no effect on the circuit. So long as the signal $G_3$ remains high, a high is present at nodes 691, 692, a low is present at the output of inverter 695, a high is present at node 698 and a low is present at the output of inverter 700.

Therefore, with each clock phase $H_2$, the first and second inverted inputs of gate 694 are disabled. The fourth inverted input, which is taken from node 702, is continuously enabled since node 702 is connected to node 725, node 725 being connected to node 723 which is connected to the decoded output lead 720 from the counter 715. Since the predetermined count decoded by the NOR gate illustrated by the horizontal line 717*b* has not yet been attained, since the counter is only shifting zeroes, the output of NOR gate is normally low causing a low to appear at nodes 723, 725 and 702 via lead 720, thereby enabling the fourth inverted input of AND gate 694.

When $G_3$ initially goes low, on the first clock phase $H_2$, transistor 685 conducts to pass this low through the double inverters 689, 690 causing a low to appear at node 691 which is connected directly to node 692. The low at node 692 will enable the first inverted input of AND gate 694 which will continue to be enabled during both clock phases $H_1$ and $H_2$ since the low outputted from transistor 685 is also conducted to node 692 when the $H_1$ signal causes transistor 688 to conduct.

Simultaneously with the conduction of transistor 685, the first $H_2$ signal triggers the initial conduction of transistor 696 to supply the low present at the output of inverter 695 through inverter 697 to cause a high to appear at node 698. This high is supplied to the second inverted input of gate 694 causing it to be disabled. At the same time, the first $H_2$ clock phase causes transistor 701 to conduct to pass the low signal present at the output of inverter 700 to enable the third input of gate 694 so that the first, third and fourth inputs of AND gate 694 are enabled after the first clock phase $H_2$. The occurrence of the first $H_1$ clock phase continues the low at node 692 so as to continue the first inverted input of gate 694 in the enabled state. Furthermore, the first occurrence of clock phase $H_1$ triggers transistor 693 into conduction to pass the low from node 691 through inverter 695 causing a high to appear at its output. Simultaneously, the first $H_1$ causes transistor 699 to conduct to pass the disabling high signal from node 698 through inverter 700 causing a low to appear at its output. Therefore, after the first complete clock cycle $H_1$, $H_2$ after the appearance of the low $G_3$ signal, the first, third and fourth inverted inputs of AND gate 694 are enabled while the second remains disabled.

With the occurrence of the second $H_2$ pulse, nodes 691 and 692 remain low but the condition of transistor 696 transfers the high previously present at the output of transistor 695 through inverter 697 causing a low to appear at node 698. The appearance of a low at node 698 enables the second inverted input of gate 694. Simultaneously, the appearance of the second $H_2$ pulse triggers the conduction of transistor 701 to pass the low present at its outut to enable the third inverted input of AND gate 694. Therefore, after the occurrence of the second $H_2$ pulse, all four inverted inputs to gate 694 are low causing a high signal to appear at its outputwhich is connected directly to the set inputs of the input flip-flop 703.

The occurrence of the next $H_1$ pulse causes the conduction of transistor 688 so that a low is still supplied to the first inverted input of gate 694; the conduction of transistor 693 so that a high is again present at the output of inverter 695; and the conduction of transistor 699 so that a high is now present at the output of inverter 700. However, all four inverted inputs of gate 694 remain low so that the high signal remains present at the set input of R/S flip-flop 703. The appearance of the second $H_1$ signal also transfers the high from the output ofgate 694 into the set input of flip-flop 703.

With the occurrence of the third $H_3$ clock phase, one clock time after gate 694 was caused to output a high signal, the signal $H_2$ will again trigger conduction of transistor 685 causing an enabling low to appear at node 691, 692 and the conduction of transistor 696 will cause the high at the output of inverter 695 to be supplied to inverter 697 to maintain the low at node 698 continuing to enable the second inverted input of gate 694. However, when the third $H_3$ signal triggers conduction of transistor 701, the high present at the output of inverter 700 is supplied to the third inverted input of gate 694 disabling the gate and causing its output signal to go low.

Simultaneously, however, when the third $H_2$ signal triggers conduction of transistor 701, it also gates the second clock input of R/S flip-flop 703 and causes the flip-flop to switch to the set state so that a low is present at the $\bar{Q}$ output. Therefore, even though the set signal at the output of gate 694 only persisted for a single clock period, it was sufficient to set the input flip-flop 703 which will remain in the set state until reset, as hereinafter described.

The purpose of the short time filter network appearing between the $G_3$ input node 694 and the set input of flip-flop 703 is such that short duration pulses of less than three clock times will not be able to trigger the setting of flip-flop 703. Since any real engine crankshaft position pulse $G_3$ will have a duration of longer than three clock periods, only a legitimate engine crankshaft position pulse $G_3$ is able to persist the required three clock periods to set the input flip-flop 703 as previously described. In effect, therefore, this three clock period delay after the detection of the signal $G_3$ results in a noise filter which screens out relatively short duration negative going noise pulses, voltage spikes and the like to prevent improper generation of the synchronized engine position pulse $g_1$.

When flip-flop 703 is set, as hereinabove described, its $\bar{Q}$ output goes low. The $\bar{Q}$ output is supplied to one inverted input of OR gate 704 whose other inverted input is supplied with the high signal from the latched output of NOR gate 732 via node 733, lead 734, and nodes 727, 726 and 725. With one high and one low output, the output of gate 704 goes high causing a high to appear at the non-inverted input of AND gate 705. Since a low is present at the inverted input of AND gate 705 from node 725, and since counter 715 has not yet reached its decode cunt since it is still inhibited from counting, the output from AND gate 705 goes high.

A high at the output of AND gate 705 will be passed with the occurrence of the clock phase $h_1$ which triggers conduction of transistor 706 causing node 710 to go high. The high at node 710 is supplied via lead 738 to enable AND gate 737. The occurrence of the second clock phase $h_2$ provides a high at the other input of AND gate 737 causing its output to go high. Since the high outputted from AND gate 737 is connected to one input of the latched NOR gate 732, the output of NOR gate 732 at node 733 will immediately go low. When node 733 goes low, this low is supplied via lead 734 back to node 727 so that all three inputs of NAND gate 728 come low causing a high to be outputted at node 729. Furthermore, the low from node 727 is transmitted to node 726 which is the fourth input to the NOR gate represented by the vertical line 718 and since the other three inputs were previously low since the counter 715 had not yet begun to count, the arrival of a low at the fourth and last input causes a high to be supplied to the $D_i$ input of the first stage of the counter 715 causing the counter 715 to begin counting in accordance with the count state table of FIG. 4D4. The low is also supplied from node 726 to the previously high inverted input of NOR gate 704 causing its output to go low.

With the occurrence of the next clock phase $h_1$, the high present at the node 729 is supplied into the set input of R/S flip-flop 730 while the low present at the output of AND gate 705 is transmitted to node 710 and then via lead 738 to one input of AND gate 737. The occurrence of the second clock phase $h_2$ sets flip-flop 730 causing the $\overline{Q}$ output to go low. During the clock time $h_1$, $h_2$ that a high was present at the set input 729 of R/S flip-flop 730 and the $\overline{Q}$ output was still high, NAND gate 731 caused the signal $g_1$ to go low for the one clock period $h_1$, $h_2$ required to set flip-flop 730 and cause the $\overline{Q}$ output to go low disabling the NAND gate 731.

Therefore, the synchronizer output has generated a signal $g_1$ which indicates that a true engine crankshaft position pulse $G_3$ has been detected and properly timed and synchronized with the divided down counter. Simultaneusly with the transmission of the low from the output of gate 705 to node 710, AND gate 737's output goes low to again enable the first input of NOR gate 732 whose opposite input is disabled by the latched high signal present at node 729 from the output of NOR gate 728.

The synchronizer circuitry of FIG. 4D3 also includes a long term noise filter or bounce prevention circuit which includes the counter 715 and its associated output circuitry. As previously described, after the initial power-on reset, the decoded output from lead 720 is maintained low so as to present a low signal to nodes 723, 725 and 702. The low at node 702 enables the fourth inverted input of gate 692 so that if a true $G_3$ pulse occurs, i.e., a negative-going pulse having a duration of greater than three clock times, the input flip-flop 703 may be set.

Immediately upon detecting a proper $G_3$ engine crankshaft position pulse, flip-flop 730 is set and a one clock-pulse-width, negative-going, synchronized engine position pulse $g_1$ is generated. One clock time prior to the setting of flip-flop 730, the output states of the latched NOR gates 728 and 732 was switched causing a low to appear at output 733 which, as previously described, enabled the counter 715 to receive a one at its $D_i$ input and begin its counting sequence. The operation of the counter 715 serves as a long term filter to prevent the generation subsequent $g_1$ signals even if an input having a duration greater than three clock times is present since it prevents resetting of the input flip-flop 703 for a predetermined time period. Therefore, so long as the counter is operating and it is not yet reached its predetermined decoded output count, the reset input of flip-flop 703 which is connected directly to node 702 is held low and prevented from resetting so that any number of flip-flop settings will not affect the output of flip-flop 703.

Once the counter 715 has reached the output count decoded by the NOR gate 717*b*, a high will appear on lead 720 for one clock time or count. When a high appears on lead 720, the high will simultaneously appear at nodes 723, 725 and 702. A high at node 702 will disable gate 694 causing a low to appear at the set input of flip-flop 703 and supply a high to the reset input. One clock time later, therefore, flip-flop 703 is reset causing a high to appear at the $\overline{Q}$ output. Similarly, the high at node 723 is transferred to the input of AND gate 736 with the conduction of transistor 724 when $h_1$ goes high. When $h_2$ goes high, AND gate 736 will output a high pulse to one input of NOR gate 728 causing its output to unlatch and a low to appear at node 729. With a low at node 729, the second input of NOR gate 732 is enabled and a high appears at the reset output 733 causing the R/S flip-flop 730 to reset after one $h_1$, $h_2$ clock time and a high to again appear at the $\overline{Q}$ output. Since the set input node 729 went low prior to the $\overline{Q}$ output going high, the signal $g_1$ remains high and after flip-flop 730 is set, the $\overline{Q}$ output enables one input of NAND gate 731 whose other input is held disabled by the low at node 729.

The high at node 733 is supplied via lead 734 and to node 727 to latch the output of NOR gate 728 low. The high is also supplied from node 727 to node 726 to terminate the counting operation of the counter 715 or clear it by feeding only zeroes into the $D_i$ input of the first stage while simultaneously supplying a high signal to the second inverted input of OR gate 704. With both inverted inputs of OR gate 704 high, a low is outputted to the non-inverted input of AND gate 705 so even though the momentary high present at node 725 when the predetermined count is attained only lasted for one clock duration, a low now present at node 725 is supplied to the inverted input of AND gate 705 but its output remains low due to the presence of a low at its non-inverted input. With the occurrence of the next clock phase $h_1$, transistor 706 conducts to supply a low to node 710. The low at node 710 disables AND gate 737 and causes an enabling low to appear at one input of NOR gate 732. At this point, the circuit is in the same state that it was after initial power on reset and it is able to detect the next $G_3$ input which persists for three or more clock times to generate another $g_1$ pulse as previously described.

4.12 Presetable Engine Period Counter

The presetable counter of block 643 of FIG. 4D will now be described with reference to the schematic diagram of FIG. 4D5. The counter of FIG. 4D5 is preset in order to program the number of synchronized engine crankshaft position pulses $g_1$ per given measurement period, i.e., in the present example, one complete engine period. The counter is presetable to determine the number of $g_1$ pulses to be counted per period for an eight cylinder, six cylinder or four cylinder engine but it would be obvious to those skilled in the art that modifications may be made to accommodate any engine configuration. The decoded output of the counter includes a signal occurring each four, three or two occurrences of $g_1$, depending upon whether an eight cylinder, six cylinder or four cylinder engine is being utilized. In addition, this signal is gated with various timing signals to produce signals used for data transfer and clear operations as hereinafter described.

The signal $g_1$ which is produced by the synchronizer circuit of FIG. 4D3 is supplied via lead 735 to a first inverted input of a logical AND gate 741 having four inverted inputs. The clock phase $h_2$ is supplied to a clock input node 742 which supplies the $h_2$ clock phase to a second inverted input of AND gate 741 and to a first inverted input of a second logical AND gate 743 having three inverted inputs. The node 742 is also connected to the input of an inverter 744 whose output supplies the signal $\overline{h_2}$, which is roughly equivalent to the $h_1$ clock phase, to the first inverted input of a third logical AND gate 745 having three inverted inputs.

The output of AND gate 745 is taken from node 746 and supplied back to a third inverted input of AND gate 741 and to a second inverted input of AND gate 743. The output of AND gate 743 is taken from an output node 747 which is supplied back to the fourth and final inverted input of AND gate 741 and to the second inverted input of AND gate 745. The output of the four inverted input AND gate 741 is taken from node 748 and node 748 is connected to the third and final inverted input of AND gate 745; to the first input of a NOR gate 749; and to the set enable input $h_{ac}$ of the first stage of a four stage counter 750. Each stage of the counter 750 is a static shift register stage with preset which will be more fully understood by referring to the static shift register stage with preset block diagram and circuitry of FIGS. 9.26 A and B.

As indicated, the node 748 of the output of the four inverted input AND gate 741 is connected directly to the set enable input $h_{ac}$; output node 746 from the three inverted input AND gate 745 is connected directly to the first clock input $h_b$; the output node 747 from the output of the other three inverted AND gate 743 is connected directly to the direct preset enable input $h_{ab}$ and the second clock input $h_c$ is connected directly to the output of NOR gate 749. The second input of NOR gate 749 is taken from the output of the three inverted input AND gates 743 via node 747 and the third and final inverted input of AND gate 743 is taken from the output of an inverter 751 whose input is connected directly to the output of the logical OR gate 752 having three inverted inputs.

A command signal $m_9$ from the secondary signal command generator of the microprocessor system of block 123 of FIG. 2 is used to reset the counter 750. This signal is used to synchronize the engine revolution cycle of the oxygen sensor integrator to the software engine revolution cycle. This signal $m_9$ is inputted to the oxygen integrator circuitry of FIG. 4D by the secondary command signal bus $m_0$ and is supplied to the first current-carrying electrode of a transistor 753. The opposite current-carrying electrode is supplied directly to the input of an inverter 754 whose output is connected to the first inverted input of OR gate 752. The gate electrode of transistor 753 is connected to receive the second divided down clock phase signal $h_2$. The second inverted input of OR gate 752 is supplied via lead 755 from the decoded output circuitry associated with the outputs of counter 750 as hereinafter described. The third and final inverted input of OR gate 752 is adapted to receive the inverted power-on reset signal $\overline{v_2}$ which is generated in the microprocessor system of block 123 as hereinafter described.

Four static shift register stages are used to make the counter 750. Each of the four stages has an output $Q_1$, $Q_2$, $Q_3$ and $Q_4$ and each has a corresponding preset input $P_1$, $P_2$, $P_3$ and $P_4$. The preset inputs $P_3$ and $P_4$ of the third and fourth stages of the counter 750 are connected directly to ground. The $P_1$ input is connected directly to a positionable switch element 756 while the $P_2$ preset input is connected directly to a positionable switch element 757. A ground lead 758 contains two switch contacts which are connected directly to ground while a lead assembly 759 contains two separate switch contacts connected directly to a +5-volt source of potential.

As previously described, the positionable switch element 756 and 757 may be selectively position to control the number of engine crankshaft position pulses $g_1$ to be counted each engine period depending upon the number of cylinders in the engine being utilized. The least significant preset input $P_1$ is positioned so as to contact the grounded lead 758 to complete the current path between the $P_1$ input and ground for eight cylinder engines as shown in FIG. 4D5 but is switched to the right to contact the +5-volt lead 759 for six and four cylinder engines. The second least significant bit of the counter 750 is the preset input $P_2$ whose switch element 757 is positioned to contact the grounded lead 758 for eight and six cylinder engines as shown in the embodiment of FIG. 4D5 but is moved to the left to contact the +5-volt lead 759 for four cylinder engines. Therefore, with the $P_1$ and $P_2$ inputs switched to a grounded position for an eight cylinder engine, and since the $P_3$ and $P_4$ preset inputs are always grounded, the programming of the counter 750 for an eight cylinder engine presets the count 0000 into the counter initially when the signals supplied from the output of the three inverted input AND gate 753 tio the $h_{ap}$ input to the first stage of the counter goes high to enable the presetting thereof.

For six cylinder engines, the switch element 756 has switched to contact the +5-volt lead 759 while the $P_2$, $P_3$ and $P_4$ present inputs are grounded. Therefore, upon presentation of a high signal to the $h_{ap}$ input, the count 1000 is set into the input of the first, second, third and fourth stages respectively of the counter 750. Lastly, for a four cylinder, the switch 756 and the switch 757 are moved to contact the +5-volt lead 759 so that a high is presented to both the $P_1$ and $P_2$ inputs while the $P_3$ and $P_4$ inputs are grounded. Therefore, upon the occurrence of a high at the $h_{ap}$ input, the count 1100 is preset into the first through fourth stages of the counter 750.

The non-inverted outputs of the first, second, third and fourth stages of the counter 750 are designated $Q_1$, $Q_2$, $Q_3$ and $Q_4$, respectively and are represented by the straight vertical lines extending downwardly therefrom. The $\overline{Q}$ output from each of the stages, $\overline{Q_1}$, $\overline{Q_2}$, $\overline{Q_3}$ and $\overline{Q_4}$ are represented by the straight vertical lines extending from the outputs of the respective inverters *760a*, *760b*, *760c*, and *760d*, respectively, each of whose inputs is connected to the corresponding output lead $Q_1$, $Q_2$, $Q_3$ and $Q_4$, respectively.

The four horizontal lines designated 761*a*, 761*b*, 761*c*, and 761*d* each represent a multi-input NOR gate having as its inputs, the various outputs of the counter 750 whose intersection with the horizontal line is shown as a circle. This notation is further explained in FIG. 9, as hereinafter described. One end of each of the horziontal lines 761*a* through 761*d* representing the four separate NOR gates is shown as being commonly connected to the first current-carrying electrode and gate electrode of a transistor 762*a* through 762*d*, respectively, each of whose opposite current-carrying electrodes is commonly connected to a +5-volt source of potential to provide the necessary drive to the respective NOR gate.

The vertical line designated 763 represents a three input NOR gate whose output is connected to (1) a current-carrying electrode and a gate electrode of a pull-up transistor 764 whose opposite current-carrying electrode is connected to a +5-volt source of potential (2) directly to the D input of the static shift register forming the first or input stage of the four stage shift register counter 750. The first input to the NOR gate 763 is the output of the four input NOR gate 761*a* whose inputs are taken from the outputs of inverters 760*a* through 760*c* respectively, or alternatively, the counter outputs $\overline{Q_1}$, $\overline{Q_2}$, $\overline{Q_3}$ and $\overline{Q_4}$ so that the NOR gate 761*a* acts as detector for detecting the presence of all ones in the counter 750.

Similarly, the second input of the NOR gate 763 is from the output of a two input NOR gate 761*b* whose two inputs are from the $Q_3$ output and the $\overline{Q_4}$ output of the third and fourth stages, respectively of counter 750 while the third and final input to the NOR gate 763 are taken from the $\overline{Q_3}$ and $Q_4$ outputs of the third and fourth stages of the counters 750.

The combination of the NOR gate 761*b* and the NOR gate 761*c* form an Exclusive OR gate combination which, combined with NOR gate 761*a*, establishes the count cycle of counter 750. The count state table showing the specific count sequence is set forth in FIG. 4D6.

The fourth and final horizontal line 761*d* represents a four input NOR gate used for decoding a predetermined count output for generating a desired output signal as hereinafter described. The output of the four input NOR gate 761*d* is taken from output node 765 which supplies the output signal $g_{21}$ via lead 766. The signal $g_{21}$ is a signal occuring once each four, three, or two occurrences of the synchronized engine crankshaft position pulse $g_1$ depending upon the preprogrammed condition of the preset inputs $P_1$ and $P_2$ to the counter 750, as previously described.

The count decode output node 765 is also connected to the input of an inverter 767 whose output is connected to a node 768. Node 768 is connected back to the second inverted input of OR gate 752 via lead 755 and is also connected to the first current-carrying electrode of a transistor 769 whose opposite current-carrying electrode is connected to the first inverted input of a logical AND gate 770 having three inverted inputs, and simultaneously to the first inverted input of the second logical AND gate 771 also having three inverted inputs. The gate electrode of transistor 769 is connected directly to receive the first clock phase signal $h_1$. The clock phase $h_1$ is also supplied to the gate electrode of a transistor 772 whose first current-carrying electrode is supplied with the signal $h_5$ from the output lead 661 of the divide-by-sixteen counter of FIG. 4D1 previously described. The opposite current-carrying electrode of transistor 772 is connected simultaneously to a second inverted input of AND gate 770 and to a second inverted input of AND gate 771. The third and final inverted input of AND gate 770 is connected directly to receive the second clock phase $h_2$ while the third and final inverted input of AND gate 771 is connected to receive the first clock phase signal $h_1$. The output of OR gate 770 is the transfer signal $g_{22}$ which is outputted on lead 773 while the clear signal $g_{23}$ is outputted via lead 774 from OR gate 771. The signal $g_{22}$ is the signal $g_{21}$ synchronized with $h_2$, $H_1$, and $h_5$ while the signal $g_{23}$ is the signal $g_{21}$ synchronized with $h_1$, $H_1$ and $h_5$. The signals $g_{21}$, $g_{22}$, and $g_{23}$ are referred to collectively as the bus signal $g_2$ previously described occur at the end of an engine period, and are used for transfers, clearing operations and timing as hereinafter described.

The operation of the presetable engine period counter of FIG. 4D5 will now be described. The signals at the three inverted inputs of OR gate 752 are all normally high causing a low to appear at the input of inverter 751 and a high to appear at the first inverted input of AND gate 743, normally maintaining its output at node 747 low. Assume initially that one of the following three conditions occur.

If either (1) the power-on reset signal $v_2$ goes high during initial start up or the like, the signal $\overline{v_2}$ goes low and a low presented to the third inverted input of OR gate 752 causes its output to go high so that the output of inverter 751 goes low to enable AND gate 743 or (2) the decoded output of NOR gate 761*d* goes high and the high presented at the output node 765 is inverted by inverter 767 causing the low from node 768 to be presented via lead 755 back to the second input of OR gate 752 causing its output to go high. A high signal at the input of inverter 751 causes an enabling low to appear at one input of AND gate 743 or (3) a command signal $m_9$ from the secondary command signal generator of the microprocessor circuitry of block 123, as hereinafter described, is outputted requesting a resetting of the counter 750. Upon the occurrence of the clock phase signal $h_2$, the high signal $m_9$ is fed to the input of an inverter 754 causing a low to appear at yet another inverted input of OR gate 752 causing its output to go high. Again, the high at the output of OR gate 752 causes an enabling low to appear at one input of AND gate 743 when the clock phase $h_2$ which is supplied to node 742 goes low, a second inverted input of gate 743 goes low since it is connected directly thereto and since the output of inverter 744 will supply a high to the inverted input of gate 745, its output node 746 will provide another low back to the third and last inverted input of AND gate 743 causing the output at node 747 to go high.

The high at node 747 is supplied to one inverted input of AND gate 741 to disable same and cause its output to go low; to one inverted input of AND gate 745 to disable it and cause its output to go low; and to one input of NOR gate 749 causing its output to go low. Therefore, during the time that $h_2$ remains low, the high at node 747 is supplied to the $h_{ap}$ input to all stages of the counter 750.

The operation of the counter 750 will now be described and a better understanding may be had by referring to the block diagram and circuit diagram of the static shift register stage with preset of FIGS. 9.26A and B which are utilized to form the counter 750. Assuming initially that an eight cylinder engine is being used, the switch arms 756 and 757 of the first and second preset inputs $P_1$ and $P_2$ are positioned to the left as shown in FIG. 4D5 to contact the grounded lead 758 while preset inputs $P_3$ and $P_4$ are normally grounded. Therefore, when the high signal from node 747 is supplied to the direct preset enable inputs $h_{ap}$, the lows represented by the grounding of the preset inputs $P_1$, $P_2$, $P_3$ and $P_4$ are fed or clocked into the input of each of the four stages of the counter 750 since the high signal presented to the $h_{ac}$ inputs is presented to the gate electrode of a transistor which conducts to transmit the low represented by the grounded preset input into the actual input node of each of the stages of the counter 750.

As soon as the clock signal $h_2$ goes high, the output of gate 743 again goes low. Substantially concurrently therewith, the condition which triggers the preset, i.e., the signal $m_9$, the decoded output of the counter 750 or the power-on reset signal $\overline{v_2}$, returns to its normal state so that all ones are again presented to the inverted inputs of OR gate 752 causing a low to appear at the output. This low is supplied to inverter 751 to present a high to the inverted input of gate 743 so as to normally disable the gate and keep node 747 low. The low from node 747 is fed back to enable one inverted input of gate 741 and to enable one inverted input of gate 745. As previously described, a low $h_2$ signal disables AND gate 745 causing a low to appear at note 746. The low at note 746 enables a second input of gate 741 and one input of AND gate 743 as soon as the signal $h_2$ goes high which, as previously described, causes the signal at node 747 to go low to terminate the clock pulse supplied to the $h_{ap}$ input of the counter 750, a low appears at the output of inverter 744 so that the third inverted input of AND gate 745 goes low causing a high to appear at output node 746. The high at node 746 is fed back to one inverted input of gate 741 and to one input of gate 743 to disable the outputs thereof. With gate 743 disabled, node 747 remains low so a low is supplied to one input of NOR gate 749. Simultaneously, a disabled gate 741 causes a low to appear at node 748 causing a low to appear at the other input of NOR gate 749.

Therefore, almost simultaneously, a high is supplied from node 746 to the $h_b$ clock input of each of the shift register stages of the counter 750 and a high is supplied to the $h_c$ clock input of each of the stages of the counter 750. The high clock pulses at the $h_b$ and $h_c$ clock inputs are fed to the gate electrodes of two transistors within each static shift register stage, as shown in FIG. 9.26B, to cause the signal present at the input node to be transmitted to the output node and latched in that state.

Therefore, after one clock time $\overline{h_2}$, $h_2$, the count of "0000" is preset into the first through fourth stages of the counter 750, respectively, and supplied to the outputs thereof. Since none of the decoder NOR gates represented by the horizontal lines 761*a* through 761*d* detects this count, the output of the NOR gate represented by the vertical line 763 is high to supply a logical "1" to the D input of the first stage of the counter 750.

However, the gate 741 is disabled by the presence of a high $g_1$ signal on its input lead 753 to cause a low to appear at node 748. This low is transmitted to the shift enable input $h_{ac}$ so as to inhibit the inputting of the "1" present at the D input from being transferred to the input node of the first stage and the Q output of each stage from being fed into the D input of the next successive stage so long as the signal presented to the $h_{ac}$ inputs remains low. Therefore, the counter is unable to count regardless of the generation of high signals at the $h_b$, $h_c$ clock inputs via nodes 746 and 749 respectively since the zeroes are merely shifted between the input and output of its respective stage after each clock time that the count does not change.

However, as soon as a narrow-width, negative-going, properly synchronized engine crankshaft position pulse $g_1$ is outputted from the synchronizer circuit of FIG. 4D3 via lead 735, and since this occurs when the signal $h_2$ is low, all inverted inputs of gate 741 become low causing a high to be presented to node 748. The high at node 748 disables gate 745 and NOR gate 749 to keep the signals presented to the $h_b$ and $h_c$ inputs low. When the high is transmitted to the $h_{ac}$ clock input, a transistor conducts and passes the "1" previously sitting at the D input of the first stage into the input node of the register and the zero previously present at each output, into the input node of the next successive stage. Node 748 remains high for one clock phase since when $h_2$ goes high, gate 741 is again disabled causing node 748 to go low.

With node 748 low, gates 745 and 749 are again enabled. A high $h_2$ clock phase is inverted by inverter 744 so as to cause gate 745 to transmit a high to node 746. Therefore, as soon as the clock phase $h_2$ goes high, gate 745 and gate 749 provide a one clock-phase-width signal to clock inputs $h_b$ and $h_c$, respectively, and cause the transferrence and latching of the "1" sitting on the input node of the first register to the output thereof while each of the zeroes previously sitting at the output of the $Q_1$, $Q_2$ and $Q_3$ registers which were transferred to the input nodes of the second, third and fourth registers, respectively, by the generation of the high at node 748 which was applied to the counter via the $h_{ac}$ inputs, and these zeroes are now transmitted and latched at the outputs of the second, third and fourth stages, respecitvely, when the inputs $h_b$ and $h_c$ go high.

Therefore, one clock time after the detection of the $g_1$ pulse, the count "1000" is present at the counter outputs. Since none of the NOR gate output decoders 761*a* through 761*d* detect this output, each of their outputs remains low so that all its inputs to the NOR gate 763 are low causing another "1" to be presented to the D input of the first stage of the counter 750. Again, no transfer can take place between stages until the detection of the next $g_1$ pulse which causes a high to appear at the $h_{ac}$ input. When this occurs, the "1" presently sitting at the D input of the first stage; and the "1" currently sitting at the D input of the second stage (since it is connected directly to the Q output of the first stage); the "0" present at the $Q_2$ output of the second stage and sitting at the D input of the third stage; and the "0" output of the $Q_3$ stage which is sitting at the D input of the fourth stage of the counter 750 are all transferred to the input stages thereof. As soon as $h_2$ goes high, the signal at node 748 will go low causing a high to appear at the $h_b$ and $h_c$ clock inputs causing the transfer of the signals sitting at the stage input nodes to the respective stage outputs so that after the second $g_1$ signal is detected, the number "1100" is presented at the outputs of the counter 750.

Again, since the decoder logic at the output of the counter 750 does not respond to this output, the NOR gate 763 again presents a "1" to the D input of the first shift register stage. At this point, a "1" is also presented to theD input of the second stage from the $Q_1$ output of the first stage; a "1" is presented to the D input of the third stage from the $Q_2$ output of the second stage; and a "0" is presented to the D input of the fourth stage from the $Q_3$ output of the third stage.

With the detection of the third $g_1$ signal, node 748 at the output of AND gate 741 will again go high so that the high presented to the $h_{ac}$ input of the counter 750 will transfer the signal sitting at the D input of each stage into the respective input stage or node of the register. As soon as $h_2$ goes high, node 648 goes low and gates 745 and 749 present a high to the $h_b$ and $h_c$ clock inputs causing the signals now sitting in the input stage or node of each of the registers to be transferred to the stage outputs and latched so that after the detection of the third $g_1$ pulse, the count "1110" is presented at the outputs of the counter 750.

However, as soon as the count "1110" is presented to the output $Q_1$, $Q_2$, $Q_3$ and $Q_4$ respectively, then the condition of $\overline{Q_3}$ low and $Q_4$ high is detected by the NOR gate 761*c* and since both signals present at its input are low, a high appears at its output. With a high presented to one of the inputs ofthe NOR gate 763, its output goes low and a "0" is presented to the D input of the first stage of the counter 750.

On the occurrence of the fourth $g_1$ pulse, the high outputted from gate 741 to node 748 is presented to $h_{ac}$ clock input of counter 750 causing the transfer of the signal present at the D input of each of the stages into the input node or stage thereof. With the occurrence of the high at the $h_{ac}$ inputs when the fourth $g_1$ signal is detected, the "0" present at the D input of the first stage is transferred into the input node thereof, while the "1" previously present at the $Q_1$ output and therefore at the D input of the second counter stage is fed into the input node thereof; the "1" previously present at the $Q_2$output and hence at the D input of the third counter stage is transferred into the input node thereof; and the "1" previously present at the $Q_3$ output and therefore at the D input of the fourth stage is transferred into the input node of the fourth stage of the counter 750, as previously described. As soon as the signal $h_2$ goes high, node 748 goes low, and high clock signals are supplied to the clock inputs $h_b$ and $h_c$ causing the transfer of the signals present at the input stage of each of the registers to each of their respective outputs and the latching thereof so that after the fourth $g_1$ signal is detected, the signal "0111" is stored in the counter 750.

Therefore, after the detection of the fourth $g_1$ pulse, which, in the case of an eight cylinder internal combustion engine represents one complete engine cycle or engine period, the count "0111" is present at the $Q_1$, $Q_2$, $Q_3$, and $Q_4$ outputs of the counter 750. The fourth horizontal line 761*d* represents a four input decoding NOR gate having its inputs coupled to the outputs $Q_1$, $\overline{Q_2}$, $\overline{Q_3}$, and $\overline{Q_4}$. When the count "0111" is attained, the outputs $Q_1$,$\overline{Q_2}$, $\overline{Q_3}$, $\overline{Q_4}$ are all low causing a decode ouptut from the NOR gate 761*d* to be presented as a high signal at node 765. This high signal which persists for one clock time $h_2$, $h_2$ generates the signal $g_{21}$ which is outputted via lead 766 and represents a digital signal occurring once for each four occurrences of $g_1$ for an eight cylinder engine indicating that one complete engine period has elapsed.

The signal $g_{21}$ is inverted by inverter 767 and supplied via node 768 as a low input back to one inverted input of OR gate 752 via lead 755 causing its output to go high. A high at the output of OR gate 752 causes a low to appear at the output of inverter 751 and since this low is supplied to the inverted input of a logical AND gate 743, gate 743 is again enabled so that when the clock phase $h_2$ goes low, gates 741, 745 and 749 will be disabled for one clock phase while a high is presented from node 747 to the $h_{ap}$ input to enable a transfer of the programmable preset count to be supplied from the preset inputs $P_1$, $P_2$, $P_3$, $P_4$ into the input stage of each of the four registers comprising the counter 750, as previously described.

The low at note 768 is also transferred when the clock signal $h_1$ goes high to cause transistor 769 to conduct to enable a first input of the output AND gates 770 and 771. The occurrence of the signal $h_1$ also triggers conduction of transistor 772 which enables the gates 770 and 771 whenever the signal $h_5$ is low. Therefore, when $h_1$ is high, indicating that $h_2$ is low, two inverted inputs of each of the output gates 770 and 771 become enabled since $h_2$ is low at this time, the first AND gate 770 has low signals at each of its inputs causing a one clock phase-width high-going pulse to be outputted via lead 773 as the transfer signal $g_{22}$. As soon as the clock phase is reversed and $h_2$ goes high to disable gate 770, clock phase $h_1$ goes low and causes a one clock phase-wide, positive-going clear pulse $g_{23}$ to be outputted from AND gate 771 via lead 774. The signals $g_{21}$, $g_{22}$, $g_{23}$, are referred to collectively as the bus $g_2$ and are used for timing considerations, transfer and clear operations as hereinafter described.

From the description given above, it will be obvious that if a six cylinder engine is used, the positioning of the switch element 756 from the grounded lead 758 to the +5-volt source of potential lead 759 will cause a logical "1" to be sent to the $P_1$ input while a low or logical "0" is presented to the preset inputs $P_2$, $P_3$ and $P_4$. Therefore, upon initial power-on reset, after the detection of the decoded "0111" output, or upon the generation of the computer command signal $m_9$, a high signal will be supplied to the $h_{ap}$ direct preset enable input causing the count of "1000" to be initially preset into the counter 750.

As previously described, after the first $g_1$ signal is detected, the count will have changed to "1100"; after the second $g_1$ pulse is detected, the count will have changed to "1110"; and since the NOR gate 761*c* will decode this output causing the NOR gate 763 to present a "0" to the D input of the first counter stage, then after the third $g_1$ pulse is detected, the count "0111" is present in the counter 750. As previously described, the decoding of the count "0111" again causes generation of the decoded output signal $g_{21}$ and reinitialization of the counter 750 again by presetting the signals present at the preset inputs $P_1$, $P_2$, $P_3$ and $P_4$ into the counter in preparation of the next count cycle. In this case, the preset inputs will have been preprogrammed for a six cylinder engine, and as expected for six cylinder operation, the output signals $g_2$ will be generated once for each three $g_1$ pulses detected.

For a four cylinder engine, both the switch arm 756 and the switch arm 757 are moved to the right to connect to contact the +5-volt lead 759 so that a high is presented to the $P_1$ and $P_2$ preset inputs while the $P_3$ and $P_4$ preset inputs remain grounded. Therefore, the count "1100" is initially preset into the counter 750 so that only two $g_1$ signals can be detected and counted before the "0111" output is detected so that the circuit of FIG. 4D5 outputs the $g_2$ sequence once for every two $g_1$ signals when it is preprogrammed for a four cycle engine. It is to be understood, that similar schemes can be used for various numbers of cylinders, etc.

4.13 Fourteen Stage Counter

The fourteen stage counter circuitry of block 644 of FIG. 4D, will now be described with reference to the schematic diagram of FIG. 4D7. The fourteen stage counter and latch assembly of FIG. 4D7 is a fourteen stage shift register counter adapted to count the 62.5 kilohertz clock signals $h_1$, $h_2$ which occur between successive reset or clear pulses $g_{23}$. At high speeds, such as 6000 RPMs, for example, there can be about 625 clock pulses requiring ten stages to count, but at low speeds, such as 500 RPMs, some 3720 to 7500 pulses may occur, requiring thirteen counter stages to count. In order to get a pulse rate 64 times the engine period requires a pulse period of 1/64 of the engine period. Shifting the contents of the counter down by six bits gives a period duration of the higher rate. The last eight bits of the fourteen bit counter are transferred into an eight bit latch where they are used to preset another eight bit counter, as hereinafter described, so as to generate a pulse train of approximately 64 equally-spaced sampling pulses per engine period.

The fourteen bit counter of FIG. 4D7 includes a first six stage counter portion 775 and a second eight stage counter portion 776. The six stage counter 775 includes six individual stages each of which is a two phase dynamic flip-flop having a direct reset DR input, as depicted in FIG. 9.24A and B. The eight stage counter 776 includes eight stages, each of which is a static shift register having a direct reset input DR, as depicted in FIG. 9.25A and B.

The last of the $g_2$ signals generated by the circuit of FIG. 4D5, the clear signal $g_{23}$ is supplied via lead 774 to a counter clear input node 777. Node 777 is connected directly to the direct reset DR input to each of the stages of the six stage counter 775 and directly to the direct reset DR input of each of the eight stages of the eight stage counter 776. The 62.5 kilohertz clock signal $h_2$ is supplied to the $h_b$ clock input of each of the stages of the counters portions 775 and 776. The clock phase $h_1$ is supplied to the $h_a$ clock input of each of the six stages of the counter portion 775. The Q output of each stage of the counter portion 775 is connected directly to the data shift or DS input of the next most significant stage and the Q output of each of the stages of the eight stage counter portion 776 is connected directly to the DS input of each subsequent stage so as to form a conventional shift register counter arrangement.

The non-inverted outputs of the first, second, third, fourth, fifth and sixth stages of the counter portion 775 are designated $Q_{11}$, $Q_{12}$, $Q_{13}$, $Q_{14}$, $Q_{15}$, and $Q_{16}$ respectively. The non-inverted output is, in each case, represented by a straight vertical line extending downwardly from the correspondingly numbered output from the stage while the $\overline{Q}$ output of each of the stages, $\overline{Q_{11}}$, $\overline{Q_{12}}$, $\overline{Q_{13}}$, $\overline{Q_{14}}$, $\overline{Q_{15}}$, and $\overline{Q_{16}}$ is taken from the output of an inverter *778a, 778b, 778c, 778d, 778e* and *778f*, respectively, whose output is connected directly to the vertical line representing the output of the respective stages $Q_{11}$, $Q_{12}$, $Q_{13}$, $Q_{14}$, $Q_{15}$, and $Q_{16}$, respectively. The decoding logic associated with the outputs of the six stage counter portion 775 is illustrated by five horizontal lines designated 779*a* through 779*e* respectively, and each of these lines represents a logical NOR gate as previously described. One end of each of the lines 779*a* through 779*e* is connected simultaneously to one current-carrying electrode and the gate electrode of a corresponding pull-up transistor 780*a* through 780*e* whose other current-carrying electrode is connected to a +5-volt source of potential to provide the necessary pull-up or drive power to operate the NOR gates and to maintain the desired logic levels.

The first horizontal line 779*a* represents a six input NOR gate whose output is connected to a disable input of a three input NOR gate represented by horizontal line 779*b* and to a disable input of a three input NOR gate represented by the horizontal line 779*c*. The second and third inputs of the NOR gate 779*b* are connected to receive the $\overline{Q_{15}}$ and $Q_{16}$ outputs of the counter portion 775 while the other two inputs of the NOR gate 779*c* are connected to receive the outputs $Q_{15}$ and $\overline{Q_{16}}$. The NOR gates 779*b* and 779*c* have their outputs connected to two inputs of a three input NOR gate represented by the vertical line 781 whose output supplies logical ones or zeroes to the data shift DS input of the first stage of the six stage counter portion 775, depending upon the signals present at the inputs of the NOR gate 781.

The fourth horizontal line 779*d* represents a six input NOR gate each of whose inputs are connected to the $\overline{Q}$ outputs from the six stages of the counter portion 775, i.e., $\overline{Q_{11}}$ through $\overline{Q_{16}}$, and the output of NOR gate 779*d* is connected to the third and final input of the NOR gate 781. The fifth and final horizontal lines 779*e* represents a six input NOR gate whose inputs are connected to receive the counter outputs $Q_{11}$, $Q_{12}$, $Q_{13}$, $Q_{14}$, $Q_{15}$, and $\overline{Q_{16}}$ and the output is taken from the count decode output node 783. A pull-up transistor 784 is also associated with the NOR gate 781 to provide proper logic levels, as previously described.

The NOR gates 779*b* and 779*c* establish an Exclusive OR gate combination which controls the basic loop through which the shift register stages making up the counter portions 775 sequence. The NOR gate 779*a* decodes a particular counter output to generate a high signal which disables the NOR gates 779*b* and 779*c* whenever its decoded count 111110 is detected. Finally, the fourth NOR gate 779*d* detects an all ones condition. Therefore, the first four NOR gates 779*a* through 779*d* establish the count cycle of the six stage, shift register configured counter portion 775, the count state table for which is shown in FIG. 4D8. The count decode NOR gate 779*e* will supply a low signal at its decode output node 783 so long as a one exists at any of its inputs. Therefore, the NOR gate 779*e* will output a high signal having a one clock pulse duration at node 783 when the 63rd count after direct reset, i.e., 000001, is reached by the counter 775.

The decode output node 783 is connected to the input of an inverter 785 whose output is connected to a second inverted input of a logical AND gate 786 having four inverted inputs. The first inverted input of AND gate 786 is adapted to receive the $h_2$ clock phase whle the third inverted input is connected to one current-carrying electrode of a transistor 787 whose opposite current-carrying electrode is adapted to receive the decoded or gated clock signal $h_5$ from the divide-by-sixteen counter of FIG. 4D1 via lead 661. The gate electrode of transistor 787 is adapted to receive the first clock phase signal $H_1$ of the one megahertz master clock. The fourth and final inverted input of AND gate 786 is supplied via lead 788 from the output of a count decode NOR gate associated with the output circuitry of the eight stage counter portion 776 as hereinafter described.

The output of the gate 786 is connected directly to the $h_a$ clock input of each of the eight static shift reigster stages of the counter portion 776. The decode output node 783 is also connected directly to one current-carrying electrode of a transistor 789 whose opposite current-carrying electrode is connected directly to the input of an inverter 790 whose output is connected to the clock input $h_c$ of each of the eight static shift register stages of the eight bit counter portion 776.

Each of the eight stages of the eight bit counter portion designated by the reference numeral 776 is preferably a static shift register stage with direct reset, as illustrated in FIG. 9.25A and B. The output of the least significant counter bit comes from the first counter stage and is designated $Q_{21}$ while the most significant bit of the counter stage 776 comes from the output of the eighth and last stage and is designated $Q_{28}$. Therefore, the non-inverted outputs of each of the eight stages of the counter 776 are represented by the straight vertical lines 791*a*, 791*b*, 791*c*, 791*d*, 791*e*, 791*f*, 791*g* and 791*h* whose input originates at the output $Q_{21}$, $Q_{22}$, $Q_{23}$, $Q_{24}$, $Q_{25}$, $Q_{26}$, $Q_{27}$, and $Q_{26}$, respectively, from the eight stages of the counter portion 776 and the output end of each of these leads 791*a* through 791*h* is connected directly to the data shift or DS input of a D flip-flop forming a corresponding stage in an eight bit latching register 792 such that the eight D-type flip-flops are configured to form the individual stage of bit positions of an eight bit latching register 792.

Each of the D flip-flops whose outputs are designated $Q_{31}$, $Q_{32}$, $Q_{33}$, $Q_{34}$, $Q_{35}$, $Q_{36}$, $Q_{37}$, and $Q_{38}$ are coupled to form the latching register 792 and each D-type flip-flop stage may be more clearly understood by referring to the block diagram and schematic of FIG. 9.25A and B. Therefore, the outputs $Q_{21}$ through $Q_{28}$ of the eight uppermost significant bits of the fourteen stage counter of FIG. 4D7 which ate the eight non-inverting outputs of the counter portion 776 are supplied via lead 791*a* through 791*h*, respectively, to the corresponding DS inputs of eight flip-flops forming the latching registers 792 and each of the eight D flip-flops having corresponding outputs $Q_{31}$ through $Q_{38}$ corresponding to the eight non-inverted outputs of the counter portion 776, $Q_{21}$ through $Q_{28}$, respectively.

The $h_a$ input of each of the flip-flops making up the latching register 792 is supplied with the shift enable signal $g_{22}$ which is outputted from the circuit of FIG. 4D5 via lead 773 to enable the signals present at the outputs of the eight stages of the counter 776 to be shifted into the inputs of corresponding bit position stages of the latching register 792. The clock signal $h_2$ is connected directly to the $h_b$ clock input while the $h_c$ clock input is connected directly to the output of an inverter 793 whose input is connected to a first current-carrying electrode of a transistor 794 whose opposite current-carrying electrode receives the decoded output timing signal $g_{21}$ from the decoded output of the counter circuit of FIG. 4D5 via lead 766. The gate electrode of transistor 794 is clocked with the 62.5 kilohertz clock phase $h_1$.

The outputs of the flip-flops making up the latch register 792 are designated $Q_{31}$ through $Q_{38}$ which correspond to the least through the most significant bits of the counter 776 outputs $Q_{21}$ through $Q_{28}$, respectively. These outputs are supplied as inputs to the circuit of block 645 of FIG. 4D, as hereinafter described, on the output leads originating at the $Q_{31}$ through $Q_{38}$ outputs, which outputs are designated by the signal notation $g_{31}$ through $g_{38}$. The signals from $Q_{31}$ through $Q_{38}$ are the eight most significant bits from the fourteen stage counter of FIG. 4D7 which the $h_1$, $h_2$ counts clock pulses occurring between successive $g_{23}$ reset pulses, hence per engine period, as hereinafter described.

Each of the eight stages forming the eight bit counter portion 776 is preferably a static shift register stage as illustrated in FIG. 925A and B with the least significant bit or stage output being designated $Q_{21}$ and the most significant bit or stage output being designated $Q_{28}$, as previously described. Each of these non-inverted outputs is represented by the straight, vertically-extending lines 791*a* through 791*h* respectively. The inverted output from each of the eight stages of counter portion 776 is represented by the straight vertical line extending from the output of inverters 797*a* through 797*h* each of whose inputs are connected directly to the $Q_{21}$ through $Q_{28}$ output leads 791*a* through 791*h*, respectively. The straight vertical line extending from the outputs of inverters 797*a* through 797*h*, respectively, correspond to the output $\overline{Q_{21}}$ through $\overline{Q_{28}}$ from the eight stages of the counter section 776.

Associated with the output circuitry of the eight stages of the counter portion 776, is a decoding network which includes five horizontal lines 795*a* through 795*e*, each of which represents a logical NOR gate. One end of each of the horizontal lines 795*a* through 795*e* is shown as being commonly connected to one current-carrying electrode and the gate electrode of a corresponding pull-up transistor 796*a* through 796*e*, respectively, whose opposite current-carrying electrode is connected directly to a +5-volt source of potential for providing the necessary driving power to the NOR gates to insure proper logic levels.

The first horizontal line 795*a* represents an eight input NOR gate, each of whose inputs is connected to the output of an inverter 797*a* through 797*h* so that its inputs receive the counter output signals $\overline{Q_{21}}$ through $\overline{Q_{28}}$ to act as a ones detector. The output of the NOR gate 795*a* forms one input of a four input NOR gate represented by the vertical line 798 and the output of the NOR gate 798 is supplied to the DS input of the first and least significant stage of the eight stage shift register counter portion 776. The NOR gate 798 is also coupled to the current-carrying electrode and gate electrode of a transistor 799 whose opposite current-carrying electrode is connected to a +5-volt source of potential to provide the necessary driving power to insure proper logic levels, as previously described.

The horizontal line 795*c* represents a two input NOR gate having one input connected to receive the counter output $Q_{25}$ and its opposite input adapted to receive the counter output $\overline{Q_{28}}$ while the NOR gate represented by the fourth horizontal line 795*d* is a two input NOR gate having one input adapted to receive the counter output $\overline{Q_{25}}$ and its other input adapted to receive the counter output $Q_{28}$. The combination of the NOR gates 795*c* and 795*d* have their outputs connected as two inputs of the NOR gate 798 and form an Exclusive OR gate combination which, along with the ones decode NOR gate 795*a*, establishes the basic counting cycle or sequence of the eight stage counter portion 776 as set forth in the counter state table of FIG. 4C3.

The second horizontal line 795*b* represents a seven input count decode NOR gate adapted to receive the counter outputs $Q_{21}$, $\overline{Q_{22}}$, $\overline{Q_{23}}$, $Q_{24}$, $Q_{25}$, $Q_{26}$ and $Q_{28}$ and its output forms the fourth input of the NOR gate represented by the vertical 798. The count modification decode NOR gate 795*b* detects one or more numbers generated only in a second undesirable loop and forces the counter back into the proper sequence set forth in table 4C3.

The fifth and final count decoding NOR gate is represented by the horizontal line 795*e* which represents an eight input NOR gate. The NOR gate 795*e* receives as its inputs, the counter outputs $Q_{21}$, $Q_{22}$, $Q_{23}$, $Q_{24}$, $Q_{25}$, $Q_{26}$, $Q_{27}$, and $\overline{Q_{28}}$ and the output of NOR gate 795*e*, which forms the count decode output of the eight stage counter portion 776, is supplied via lead 788 back to one inverted input of the AND gate 786 previously described. For example, NOR gate 795*e* can transmit a high pulse via lead 788 to disable gate 786 on the 217th count to prevent the counter from returning to its initial all zero condition on the next count.

In operation, the synchronizer circuitry of FIG. 4D3 outputs properly synchronized engine crankshaft position pulses $g_1$ and depending upon the number of cylinders in the engine and the appropriate preprogramming of its preset inputs, the presettable counter circuitry of FIG. 4D5 counts the properly synchronized engine crankshaft position pulses $g_1$ and outputs of a signal sequence $g_2$ once and only once in each engine period. The order of generation of the pulses $g_2$ is as follows. The signal $g_{21}$ and $g_{22}$ are generated nearly simultaneously although the signal $g_{21}$ precedes the signal $g_{22}$ by some small delay. The signals $g_{21}$ and $g_{22}$ are normally used for timing and initiating data transfers while the signals $g_{23}$, which trails the signal $g_{22}$ by one clock phase, is used for clear or reset operations.

Since each of these signals, $g_{21}$, $g_{22}$, and $g_{23}$ occurs once and only once for each engine revolution, the arrival of the signal $g_{21}$ and $g_{22}$ to the circuitry of FIG. 4D7 will cause the eight most significant bits of the fourteen stage counter, i.e., the $Q_{21}$ through $Q_{28}$ outputs of the eight stage counter portion 776 which are provided to the DS inputs of the eight stages of the latching register 792 via leads 791*a* through 791*h*, to be set into the registers and transferred to the outputs $Q_{31}$ through $Q_{38}$ with the occurrence of the clock phase $h_1$. The occurrence of clock phase $h_2$ will cause the $Q_{31}$ through $Q_{38}$ outputs to be latched so that the eight most significant bits last stored in the counter portion 776 are now firmly stored and latched in the latching register 792 for use as hereinafter described.

With the occurrence of the clock pulse $h_2$, the signal $g_{23}$ is supplied from the circuit of FIG. 4D5 via lead 774 to input node 777. Node 777 transfers this momentary high to the direct reset inputs of all six stages of the counter portion 775 and simultaneously to the reset inputs of all eight stages of the counter 776 so that all fourteen stages of the counter are immediately reset to zero at the end of the first $h_1$, $h_2$ count. With all zeroes stored in the six stage counter 755, none of its decoded outputs detect the presence of a one and therefore the output of the NAND gate 781 stays high to present a logical "1" to the DS input of the first stage of the six stage counter 775. As previously described, each $h_1$ clock phase, which is supplied to the $h_a$ input, transfers the "1" present at the DS input of the first stage an the zeroes which are provided to the DS inputs of all subsequent stages from the Q output of all preceding stages to be shifted into the input thereof. The occurrence of the $h_2$ signal at the $h_b$ clock input to each of the six stages transfers the previously shifted input to the output stage so that upon the completion of first count, after direct reset (the second count in the count state sequence), the count "100000" is stored in the six stage register 775.

Since the decoder circuitry is still inactive, another one is fed into the DS input of the first register during the next clock cycle. This continues, as previously described, until 63 clock counts after direct reset have been counted, i.e. 64 total clock counts if the clock sequence $h_1$, $h_2$ used to establish the initial state of all zeros is included. At this point, the decode NOR gate 779*e* detects the 63rd count after direct reset (the 64th total count) and generates a positive-going pulse for one count duration. The positive-going pulse at the output node 783 of the NOR gate 779*e* is inverted by inverter 785 to present an enabling low to gate 786 whose other inputs are already low. As soon as the signal $h_1$goes high, indicating that the signal $h_2$has gone low, all four inverted inputs of AND gate 786 are enabled and a high pulse is presented to the $h_a$ clock input of the eight stages of the register 776.

Until this time, all eight stages of the second counter portion 776 contain zeros and therefore the decode network did not detect the presence of any ones so that all four inputs to the NOR gate 798 are low so as to present a logical "1" to the DS input of the first stage of the eight stage counter section 776. When the decode output node 783 of the six stage counter section 775 goes high, all of the inverted inputs to AND gate 786 are low causing a high clock signal to be applied to the $h_a$ input of each of the eight stages of the counter section 776. This causes the logical "1" present at the DS input of the first stage to be transferred therein and at the completion of the 64th clock count, $h_2$ goes high causing a high to be supplied to the $h_b$ clock input so that the previously transferred data becomes latched in the individual registers. This as the 64th clock period after direct reset is counted by register 775, the first count is made by the eight stage register 776 so that 64 clock periods after direct reset, and the number "10000000" is stored in the eight stage counter 776.

The operation continues so that as each 64th clock period after all zeroes in the six stage counter sections 775 is counted, another logical "1" or logical "0", depending upon the output of the four input NOR gate 798 is inputted to the DS input of the first stage of the eight stage counter 776 which counts according to the count state table of FIG. 4D8. The decoded output circuitry of the counter 776 assures maintenance of the correct sequence shown in the table and in the event that the maximum count should be reached before return to all zeroes, the fifth NOR gate 795*e* transfers a high signal via lead 788 on the 217th count state to disable gate 786 and prevent further counting.

As soon as one complete engine revolution has occurred, the $g_2$ sequence will again be generated by the circuitry of FIG. 4D5 and the signal $g_{21}$ and $g_{22}$ will cause the eight most significant bits currently present at the non-inverting outputs of the eight stages of the counter 776 to be transferred into the latch register 792 with the count $h_2$causing this number to be latched therein for use as hereinafter described. When $h_2$ goes low and $h_1$ goes high, the signal $g_{23}$ follows to again reset all stages of counter 775 and 776 to the zero state and enables the counters to begin counting anew the 62.5 kilohertz clock pulses $h_1$, $h_2$ until the arrival of the next $g_2$ pulse sequence signifying that another engine revolution or period has been completed. The latched contents of the buffer register 792 are provided as the signals $g_{31}$ through $g_{38}$ to the direct preset DP inputs of the eight dynamic shift register stages of the sampler counter 801 of FIG. 4D9 as hereinafter described.

4.14 Sampler Counter

The sampler counter of block 645 of FIG. 4D is shown in the electical schematic diagram of FIG. 4D9. The sampler counter 801 of FIG. 4D9 is an eight stage down counter configured from eight dynamic shift register stages as shown in the block diagram of FIG. 9.27A and the schematic of FIG. 9.27B. Each of the eight dynamic shift register stages of the down counter 801 has a direct preset input DP, a data shift input DS; a direct preset clock input $h_{ap}$; a phase one clock input $h_{ac}$ and a phase two clock input $h_b$. The Q output of each of the eight shift register stages is coupled directly to the DS input of a previous stage so as to form a conventional shift register down counter 801, as hereinafter described. The direct preset or DP inputs of each of the eight stages of the down counter 801 receive the outputs $g_{31}$ through $g_{38}$ from the circuit of FIG. 4D7 and each has a corresponding non-inverting output $Q_{41}$ through $Q_{48}$, respectively.

The purpose of the sampler counter of FIG. 4D9 is to insure that a predetermined exact number of sample pulses, in the preferred embodiment of the present invention 64, are outputted for each engine period, i.e., between each successive $g_2$ pulse output sequences.

The clocking input circuitry to the counter 801 includes a first logical AND gate 802 having four inverted inputs; and a second logical AND gate 803 having three inverted inputs and a third logical AND gate 804 having three inverted inputs. The output of gate 803 is taken from node 805 and supplied simultaneously to the $h_b$ clock input of each of the eight stages of the counter 801 and to the first inverted input of AND gate 803 and the first inverted input of AND gate 804. The 62.5 megahertz clock supplies the signal $h_2$ to clock input node 806 and node 806 applies the signal $h_2$ directly to the second inverted input of AND gate 802 and to the second inverted input of AND gate 804. The output of AND gate 804 is taken from node 807 which is connected simultaneously to the direct preset enable clock input $h_{ap}$ and to the third inverted input of AND gate 802 and to the second inverted input of AND gate 803.

The clock signal $h_2$ from node 806 is also supplied to the input of an inveted 808 whose output is connected to the third inverted input of AND gate 803. A decode logic node 809, as hereinafter explained, is connected via lead 810 back to input node 811 and node 811 is connected directly to the fourth and final inverted input of AND gate 802 and to the input of an inverter 812 whose output is connected directly to the third and final inverted input of AND gate 804. Lastly, the output of the AND gate 802 is taken from node 813 which is connected directly to the first phase clock enable input $h_{ac}$ and simultaneously to the final inverted input of AND gate 803.

As previously described, the output of the least significant bit the counter 801 is designated $Q_{41}$ while the output of the most significant bit is designated $Q_{48}$ such that the shift registers are configured in forming the counter 801 so that the eight non-inverted outputs, one for each stage of the register or counter, $Q_{41}$ through $Q_{48}$ are represented by the vertical straight lines extending downwardly therefrom. The inverted output from each of the stages representing the counter outputs $\overline{Q_{41}}$ through $\overline{Q_{48}}$ are represented by the straight vertical line extending downwardly from the output of inverters 814*a* through 814*h*, each of whose inputs is connected directly to the corresponding counter outputs $Q_{41}$ through $Q_{48}$ respectively.

The five horizontal lines 815*a* through 815*e* each represent a logical NOR gate used for output decoding purposes as hereinafter described. Each of the horizontal lines 815*a* through 815*e* is shown as being commonly coupled to a current-carrying electrode and the gate electrode of the corresponding pull-up transistor 816*a* through 816*e*, respectively and the opposite current-carrying electrode of each of the transistors 816*a*–816*e* is commonly coupled to a +5-volt source of potential to provide the necessary power to the gates to insure proper logic levels.

The NOR gate 815*d* is a two input NOR gate having as its inputs the counter 801 outputs $\overline{Q_{41}}$ and $Q_{46}$ while the two input NOR gate 815*e* has as its inputs, the counter outputs $Q_{41}$ and $\overline{Q_{46}}$. The output of the NOR gates 815*d* and 815*e* form two inputs of a four input NOR gate represented by the vertical line 817 which has one end commonly coupled to the gate electrode and the first current-carrying electrode of a pull-up transistor 818 whose opposite current-carrying electrode is connected to a +5-volt source of potential to provide the necessary drive for the gate and insure proper logic levels. The output of the NOR gate 817 is connected back to the DS input of the last stage of the down counter 801 which is preset with the $g_{38}$ most significant bit signal.

The line 815*b* represents an eight input NOR gate having as its inputs the $\overline{Q_{41}}$ through $\overline{Q_{48}}$ outputs of the counter 801 so as to sense an all ones condition and the output of this eight input NOR gate is connected back to a third input of the NOR gate 817. Horizontal line 815*c* represents a seven input NOR gate whose output is connected to the fourth and final input to the NOR gate 817. The seven inputs to the NOR gate 815*c* are the counter outputs $Q_{41}$, $\overline{Q_{42}}$, $\overline{Q_{43}}$, $Q_{44}$, $Q_{45}$, $Q_{46}$, and $Q_{48}$. The NOR gates 815*d* and 815*e* form an Exclusive OR combination which, together with NOR gate 815*b*, establish the basic control loop or count sequence of the counter 801 of FIG. 4D9 as illustrated in the count state table of FIG. 4C3, with the initial state beginning with the preset value and then the count states proceeding backwards until the all zeroes decoded count is detected by NOR gate 815*a* to disenable AND gate 802 and prevent further down-counting. The NOR gate 815*c* provides decode modification to restore the count cycle whenever a number or numbers in a second undesired loop is detected.

The fifth horizontal line 815*a* represents an eight input NOR gate used for output decoding purposes. The inputs of the NOR gate 815*a* are the counter outputs $Q_{41}$ through $Q_{48}$ so that a decode output of the NOR gate 815*a* which is taken from the decode output node 809 will go high whenever all stages of the counter reach zero. The output of the decode NOR gate represented by the horizontal line 815*a* is also supplied to the input of an inverter 819 whose output is taken on lead 820 as the signal $h_6$ which is a series of 64 equally spaced sample clock pulses derived from the eight most significant bits stored in the fourteen stage counter of FIG. 4D7 which are used to effect 64 oxygen sensor state samples per engine period or revolution regardless of engine speed, as hereinafter described.

The operation of the sampling counter 801 of FIG. 4D9 will now be briefly described. Since the eight stages of the down counter 801 have their direct preset inputs DP connected to receive the signals $g_{31}$ through $g_{38}$ respectively from the outputs $Q_{31}$ through $Q_{38}$ respectively of the latch register 792 of FIG. 4D7, the counter 801 will be initially preset with a given count and then down-counted until all stages of the counter 801 contain zeroes.

At this point, the counter will again be preset with the previously stored eight most significant bits from the fourteen stage counter of FIG. 4D7 via the signals $g_{31}$ through $g_{38}$, previously described. This will continue in such a way that the signal train $h_6$ is a series of one clock width pulses generated at a rate 64 times the rate of generation of the engine period pulses $g_1$ since it proceeds to down-count at a rate 64 times the rate of generation of the clear signals $g_{23}$ which occur once and only once each engine period as previously described. The signal pulses are generated at a rate 64 times greater than the engine period since the engine period time interval counter of FIG. 4D7 contain fourteen stages and only the eight most significant bits of that fourteen stage counter are preset into the eight stage sampler counter. Therefore, the sampler counter, which is operated at the same 62.5 kilohertz clock frequency by the clock phases $h_1$, $h_2$ down-counts the preset numbers at a rate 64 times the rate at which they were generated due to the elimination of the six least significant counter stages of FIG. 4D7 which were required to generate the eight most significant bits originally.

In operation, as soon as the counter 801 has been down-counted so that a logical "0" is present at each of its outputs, the NOR gate decoder 815*a* supplies a high via output node 809 and lead 810 to node 811. The high at node 811 is inverted by invertor 812 to enable a first inverted input of AND gate 804. When the clock phase $h_2$ goes low, a second input of AND gate 804 is enabled and with a low $h_2$ signal, a high is presented to one input of AND gate 803 causing its output node 805 to go low. A low at node 805 enables the third and last inverted input of AND gate 804 and causes a high to be outputted at node 807. A high at node 807 disables gates 802 and 803 and causes a one clock phase width positive signal to be applied to the $h_{ap}$ input of each of the stages of the counter 801. Since the $h_{ap}$ input goes to the gate of a preset enable transistor causing it to conduct, the input stage of each of the eight stages of the counter 801 receives the presently stored and latched signal from the $Q_{31}$ through $Q_{38}$ outputs of the latch register 792 of FIG. 4D7 via signals $g_{31}$ through $g_{38}$, respectively, so as to preset the counter 801 with a predetermined count indicative of the eight most significant bits of a fourteen stage counter counting clock periods per engine revolution or periods.

When the clock signal $h_2$ goes high, the second inverted input of gate 804 goes high causing a low to appear at node 807 to enable gates 802 and 803. Gate 802 is disabled by the high $h_2$ signal from node 806 causing its output node 813 to go low so as to enable another inverted input of gate 803. As $h_2$ goes high, it is inverted and supplied as a low to the third input of gate 803 causing its output at node 805 to go high to inhibit gates 802 and 804 and this high is supplied as a one clock phase duration pulse to the $h_b$ clock input of each of the eight stages of the counter 801 causing the previously inputted or preset value to be latched at the outputs thereof.

As soon as a count is preset into the counter 801, the NOR gate 815*a*, which outputs a high at node 809 only when all inputs are zero, will cause node 809 to go low so as to cause a high to appear via node 811 and inverter 812 at one inverted input of gate 804 to disable the gate 804 until the next state of all zeroes is detected. As $h_2$ again goes low, gate 802 will be enabled to conduct a high pulse to the $h_{ac}$ input of each of the stages of the counter 801.

A high at the $h_{ac}$ inputs will cause the signal previously present (via the preset) at the Q output of the stage on the right to be transferred into the direct shift input of the stage on the left with the value present at the output of NOR gate 817 being transferred to the DS input of the last or right most stage of the counter 801 so that all values in the counter are shifted one position to the left with the right hand most value being supplied with the value present at the output of NOR gate 817 as previously explained.

As soon as the signal $h_2$ goes high, gate 802 is disabled and gate 803 is enabled so that a high is presented to the $h_b$ clock input to latch the downshifted value into the receiving register stage. Each time $h_2$ goes low, a high will be presented to the $h_{ac}$ input causing a leftward shift of the data in the register and as $h_2$ goes high, a high will be presented to the $h_b$ clock inputs to latch the new value in the receiving registers.

The decoding NOR gates 815*b* through 815*e* whose outputs serve as the four inputs to the NOR gate 817 dictate whether a logical one or a logical zero is supplied to the DS input of the last stage of the counter 801 as previously described and the count sequence is illustrated in the count state table of FIG. 4C3 (in reverse order from the present initial count).

Each time the preset count is down-counted to all zeroes, the decoding NOR gate 815*a* generates an output pulse. This pulse again triggers direct presetting of the counter 801 and begins the down-counting sequence anew so that regardless of the number of clock counts between successive engine periods, the sequence represented by $h_6$ is a series of 64 sampling clock pulses per engine period due to the fact that the counter 801 down-counts at a rate 64 times greater than the rate at which the counter stage 776 of FIG. 4D7 is loaded.

Signal $h_6$, as hereinafter explained, will enable 64 samples to be taken from a selected oxygen sensor during each engine period regardless of speed, etc. Since the signal outputted from the NOR gate 815*a* is a normally low signal whose goes high when all zeroes are detected, the signal $h_6$ taken from the output of inverter 819 via lead 820 is a normally high signal which goes momentarily low for one count duration each time the all zero condition is detected and, as described hereinabove, this occurs under nearly all conditions, 64 times for each engine period, i.e., for each loading of the counter of FIG. 4D7 between the successive $g_{23}$ pulses indicating a given engine period.

4.15 Sensor Test Control or Oxygen Qualifier Network

The sensor test control circuit or oxygen qualifier network of block 646 of FIG. 4D is shown in the detailed schematic diagram of FIG. 4D10. The oxygen qualifier network of FIG. 4D10 is a test circuit which operates upon a decode of various signals on the data bus to generate the secondary command signal $m_9$, as hereinafter described with respect to the secondary command signal generator of the microprocessor system of block 123 of FIG. 2.

The purpose of the oxygen qualifier network is to provide a test current $g_3$ and/or $g'_3$ which is supplied to the oxygen sensors of block 131 of FIG. 2, as previously described with respect to the oxygen sensor signal conditioning circuit of FIG. 3E, and the test current is immediately terminated at the end of the engine period. The same logic which decodes the data bus signals which generates the secondary command signal $m_9$, also synchronizes the engine period or cycle time of the oxygen sensor circuitry of FIG. 4D with the engine period or cycle time of the computer.

The oxygen qualifier or test circuit of the present invention is necessary because it is desired to operate the oxygen sensors of block 131 of FIG. 2 even at such high impedances as might exist when the sensor temperature is below 300 degrees C. and perhaps down to 250 degrees C. or the like. At such temperatures, the high sensor impedance due to the low temperature tends to mask the sensor signal and render its output invalid or unreliable.

The oxygen sensor qualifier network or sensor test control circuit of FIG. 4D10 eliminates the interaction of the sensor impedance measuring scheme and the sensor signal by applying a predetermined current source to the $ZiO_2$ periodically under computer control to determine the temperature condition of the sensor, i.e., by measuring its impedance. The monitoring of the oxygen sensor condition under the present scheme is preferably a small duty cycle of the overall sensor operation. The method employed in the present invention is to derive a switching signal which is one engine revolution in duration and this signal period is used to test and identify the condition of the sensor and relate to the other networks of the system its condition with a binary signal level $f_7$ which indicates the oxygen sensor condition at the last sensor test command with a logical "1" indicating that the oxygen sensor is not usable and a logical "0" indicating that the oxygen sensor is usable.

Should the oxygen sensor impedance be too high indicating the existence of a cold sensor, an inhibit signal, $f_7=1$ would be produced and stored until the sensor impedance is next measured. Should the sensor impedance drop to indicate an active or usable sensor at the time of the next test, $f_7$ would go low and the network would indicate an active sensor and the oxygen sensor signals would then be conditioned without masking by the circuit of FIG. 3E and utilized as hereinafter described. After some predetermined number of engine revolutions, typically between 32 and 256 revolutions in the preferred embodiment of the present invention, the oxygen sensor information is inhibited for one engine revolution while the sensor impedance condition is tested. Should the subsequent sensor impedance test indicate an active sensor, the inhibit signal $f_7$ would be removed and the sensor signals would be allowed to pass through for normal processing. Again, if the sensors should prove to have too low a temperature and thus too high an impedance, the signal $f_7$ will be high which will inhibit processing of the oxygen sensor feedback information until the predetermined period has elapsed and a subsequent sensor test shows a usable sensor condition, i.e., $f_7=0$ (low).

The oxygen qualifier network or sensor test control circuit of FIG. 4D10 will now be described. The signal $m_9$ is generated by the secondary command signal generator of the microprocessor system of block 123 as hereinafter described upon decoding of a computer program command ordering that the condition of the $ZiO_2$ sensors be tested. The command signal $m_9$ is used to reset the presetable four stage counter of FIG. 4D5 so as to synchronize the engine revolution cycle of the oxygen sensor integrator of FIG. 4D to the software engine revolution cycle, as previously described, and its generation will be hereinafter described with reference to the secondary command signal generator.

The signal $m_9$ is received from the $m_0$ command signal bus from the microprocessor system of block 123 of FIG. 2 and provided via lead 821 to the first input of a two input NOR gate 822 whose output is connected directly to the first input of a three input NOR gate 823. The second input of NOR gate 823 is connected via lead 713 to the source of the power-on reset signal $v_2$, to be hereinafter described with respect to the reset control circuitry of the microprocessor system of block 123, and the clear signal $g_{23}$ which is generated at the end of each engine period by the presetable counter circuitry of FIG. 4D5, as previously described, is supplied via lead 774 to an input node 824. Node 824 is connected directly to the third and final input of NOR gate 823 and to the input of an inverter 825 whose output is connected to a first inverted input of a logical AND gate 826 having two inverted inputs.

The output of NOR gate 823 is supplied to node 827 and then coupled back to the second input of the two input NOR gate 822 and connected directly to one current-carrying electrode of a transistor 828 whose opposite current-carrying electrode is connected to the input of an inverter 829. The gate electrode of transistor 828 is connected to a source of the first phase signal $h_1$ from the 62.5 kilohertz clock and the output of the inverter 829 is connected to a node 830. Node 830 is connected directly to the second inverted input of the logical AND gate 826 whose output is supplied to a node 831. Node 831 is connected directly to the gate electrode of a transistor 832 whose first current-carrying electrode is connected via lead 299 to the output of the oxygen sensor signal conditioning system of FIG. 3E for receiving the oxygen sensor inhibit status signal $F_2$, as previously described. The opposite current-carrying electrode of transistor 832 is connected to a node 833. Node 833 is connected to the input of the first inverter 834 whose output is connected directly to the input of a second series inverter 835 whose output is supplied to output node 836. Node 833 is connected directly to a first current-carrying electrode of another transistor 837 whose opposite current-carrying electrode is connected to node 836. The gate electrode of transistor 837 is connected to the output of an inverter 838 whose input is connected to node 831. The output node 836 is used to supply the oxygen sensor inhibit test command signal $f_7$ to the binary to pulse-width converter of block 650 of FIG. 4D, as hereinafter described, via lead 839. As previously stated, the signal $f_7$ indicates the sensor condition at the last test command with a logical "1" indicating that the sensor temperature was too low (impedance too high) and therefore, that the oxygen sensors are not usable or otherwise unreliable; and a logical "0" indicating that the sensor temperatures are within the usable range so that the readings from the oxygen sensors may be used.

Node 830 is also connected to the gate electrode of a transistor 841 having its first current-carrying electrode connected to a node 842 and its opposite current-carrying electrode connected to ground. Node 842 forms the output node of a series path formed between a +5-volt source of potential and the output node 842 via the serially-connected current-carrying electrodes of transistors 843, 844, 845, 846, and 847. The +5-volt source of potential is commonly coupled to a first current-carrying electrode and the gate electrode of transistor 843 whose opposite current-carrying electrode is commonly coupled to the first current-carrying electrode and the gate electrode of a second transistor 844. The second current-carrying electrode of transistor 844 is commonly connected to the first current-carrying electrode and the gate electrode of a transistor 845 and the second current-carrying electrode of transistor 845 is commonly connected to the first current-carrying electrode and the gate electrode of transistor 846. The second current-carrying electrode of transistor 846 is commonly connected to the first current-carrying electrode and gate electrode of transistor 847 whose opposite current-carrying electrode is connected directly to the output node 842.

The gate electrode of transistor 844 is also connected to receive the first phase $h_1$ of the 62.5 kilohertz clock through a capacitor 844*c* while the gate electrode of transistor 845 is connected to receive the second clock phase $h_2$ through a capacitor 845*c*. Similarly, the gate electrode of transistor 846 is connected to receive the clock signal $h_1$ through a capacitor 846*c* and the gate electrode of transistor 847 is connected to receive the clock signal $h_2$ through a capacitor 847*c*.

The series combination of the transistors 843 through 847 via their current-carrying electrodes between the +5-volt source of potential and the output node 842 coupled with alternate transistor gates being clocked with alternate clock phases $h_1$, $h_2$ through their respective transistors, establishes a conventional high voltage charge pump which acts as a voltage booster or voltage doubler to increase or build up the voltage at node 842 to a value greater than the +5-volts from the source of potential when transistor 841 is rendered non-conductive by the low at node 830 to break the discharge path to ground.

The charge pump output node 842 is connected via lead 848 to a common node 849. Node 849 is connected to the gate electrode of a first transistor 850 having its first current-carrying electrode connected to a first +5-volt source of potential and its opposite current-carrying electrode adapted to output the sensor test signal $g_3$ which causes the $ZiO_2$ sensor impedance of the first oxygen sensor to be tested via the current generator circuitry of the oxygen sensor signal conditioning system of FIG. 3E and the signal $g_3$ is outputted via lead 264. Similarly, node 849 is also connected to the gate electrode of a second transistor 851 having its first current-carrying electrode connected to a +5-volt source of potential and its opposite current-carrying electrode adapted to pass the test signal $g'_3$ via lead 277 to the circuit of FIG. 3E, as previously described.

In operation, the oxygen qualifier network or sensor test control circuit of FIG. 4D10 operates to output the oxygen sensor impedance test signal $g_3$ for testing the first oxygen sensor and the test signal $g'_3$ to the second oxygen sensor whenever the computer program transmits data which is decoded, as hereinafter described, to output the command signal $m_9$. Initially, the power-on reset signal $v_2$ goes high causing the output of NOR gate 823 appearing at node 827 to go low. The low from node 827 is fed back to one input of NOR gate 822 for enabling same and since the computer has not yet commanded the test signal, the signal $m_9$ is also low causing the output of NOR gate 822 to go high. The high at the output of NOR gate 822 is supplied back to one input of NOR gate 823 so that even after the power-on reset signal $v_2$ goes low, a high is still present at one input of the NOR gate 823 from the output of NOR gate 822 causing its output appearing at node 827 to remain low. NOR gate 822 and 823, with their cross-coupled outputs form a latch which is ordinarily latched with the output of NOR gate 823 low and the output of NOR gate 822 high.

Each time the clock phase $h_1$ goes high, transistor 828 conducts to pass the low from the output node 827 to the input of an inverter 829 causing its output appearing at node 830 to go high. A high at node 830 is supplied to the gate electrode of transistor 841 causing it to conduct to keep node 842 grounded and prevent the generation of the test signals $g_3$ and $g'_3$. Furthermore, the normal high signal at node 830 is supplied to one inverted input of AND gate 826 for normally disabling same and causing its output to go low. The normally low output of AND gate 826 is taken from node 831 and supplied to the gate electrode of transistor 832 causing it to remain in a non-conductive state so that the oxygen sensor condition or status signal $F_2$ cannot be sampled or measured under normal conditions. Simultaneously, the low from node 831 is inverted via inverter 838 to supply a high to the gate electrode of transistor 837 rendering it conductive so that the last value of $f_7$ appearing at the output node 836 is recirculated via conducting transistor 837, node 833, and inverters 834 and 835 to maintain node 836 at its last test state, at least for some non-negligible period of time.

Each time the signal $g_{23}$ goes high, indicating the end of another engine period, the circuit remains unaffected since the momentary high will not affect the output of NOR gate 823 which remains low so long as another input of NOR gate 823 is still supplied with a high from the latched output of NOR gate 822. Similarly, the high $g_{23}$ signal which is supplied to inverter 825 to present a low to the second inverted input of NAND gate 826 will not change the output status of the gate since the opposite inverted input still maintains gate 826 disabled so that a low appears at node 831.

After a predetermined number of engine periods have elapsed, depending upon computer program which, in the preferred embodiment of the present invention, is varied anywhere between 32 and 256 engine revolutions or periods, the computer program will dictate that the oxygen sensors be tested. When the program so dictates, the secondary command generator of the microprocessor circuit of block 123 of FIG. 2 will output the signal $m_9$ on the bus $m_0$ and the momentary high signal $m_9$ is applied via lead 821 to one input of NOR gate 822. With a high presented to one input of NOR gate 822, its output will go low thereby enabling NOR gate 823. While the signal $m_9$ is high, the low present at the output of NOR gate 822 is supplied back to enable NOR gate 823 and since the power-on reset signal $v_2$ has been low for some time and assuming that the signal $g_{23}$ has not yet arrived at the end of the present engine period, a low is present at each input of NOR gate 823 causing its output at node 827 to go high. The high at node 827 is fed back to the opposite input of NOR gate 822 latching its output low even after the command signal $m_9$ again goes low due to the latching effect of the cross-coupled output configuration of NOR gates 822, 823 previously described.

The high appearing at the output node 827 of NOR gate 823 is transferred with the next $h_1$ clock phase to the input of inverter 829 causing a low to appear at node 830. With node 830 low, a low is supplied to the gate electrode of transistor 841 rendering it non-conductive. With transistor 841 non-conductive, the voltage at node 842 quickly becomes greater than the +5-volt source of potential due to the charge pump or voltage doubler aspect of the particular circuit configuration, and a very high signal will be applied at node 849, and hence to the gate electrodes of transistors 850 and 851. This causes transistors 850 and 851 to turn on very hard so that the +5-volt source of potential present at the current-carrying electrode of each of the separate transistors 850 and 851 is outputted as the test signals $g_3$ and $g'_3$ via lead 264 and 267, respectively to the oxygen sensor signal conditioning system of FIG. 3E. This establishes the necessary current source for testing the $ZiO_2$ oxygen sensors of the first and second channels respectively. Simultaneously with node 830 going low, the low is supplied back to the first inverted input of AND gate 826 so as to enable the AND gate 826 but, since a low is still present at node 824 since $g_{23}$ remains normally low, a high will appear at the output of inverter 825 to continue to disable the AND gate 826.

At the end of the particular engine period in which the signal $m_9$ was generated, the clear signal $g_{23}$ will go high for one clock phase as explained in the description of the presetable counter circuitry of FIG. 4D5. As soon as the signal $g_{23}$ goes high, node 824 goes high and the output of inverter 825 goes low. With both inverted inputs of AND gate 826 now low, its output goes high causing a high signal to appear at node 831. With node 831 high, the high is supplied to the gate electrode of transistor 832 causing the binary signal $F_2$ to be gated through transistor 832 to node 833. If the binary signal $F_2$ is high, the impedance current being supplied to one or both of the oxygen sensors via the signal $g_3$ and $g'_3$, the circuit has detected a high impedance indicating the presence of a cold sensor which should not be used and if a low signal is present, the oxygen sensors have tested satisfactorily. Whatever the status of the signal, it is passed, possibly with some slight propagation delay, from node 833 to node 836 via the double inversion caused by inverters 834, 835 and generated as the sensor condition signal $f_7$ via lead 839 for use as hereinafter described.

The presence of the high signal $g_{23}$ at node 824 also causes the output of NOR gate 823 and node 827 to again go momentarily low. As soon as node 827 goes low, this low is supplied back to the second input of NOR gate 822 whose opposite input is already low since the signal $m_9$ is assumed to have previously gone low. Therefore, the output of NOR gate 822 goes high and this high signal is supplied back to one input of NOR gate 823 latching its output and node 827 low regardless of the status of the $g_{23}$ signal.

With a low latched at node 827, the occurrence of the next clock phase signal $h_1$ causes a high to appear at node 830. The high at node 830 is fed to the gate electrode of transistor 841 rendering it conductive and causing node 842 to be drawn to ground. With node 842 grounded, node 849 is also grounded via lead 848 turning test transistors 850 and 851 off thereby terminating the generation of the oxygen sensor test signals $g_3$ and $g'_3$ as previously described.

The high at node 830 is also supplied back to the first inverted input of gate 826 causing its output to again go low. With node 831 low, transistor 832 is rendered non-conductive to complete the sample of the $F_2$ sensor status and the low at node 831 appears as a high at the output of inverter 838 and causes transistor 837 to conduct to recirculate the previously sensed state of the $F_2$ signal present at output node 836 back to the node 833 so that the signal $f_7$ is maintained at the latched level and outputted via lead 839 for at least a complete period for setting a flip-flop to store the $f_7$ value, as hereinafter described.

As soon as the clear signal $g_{23}$ is terminated indicating the completion of another engine period, $g_{23}$ goes low and the low at node 824 is inverted by inverter 825 so that a high is present at the second inverted input of AND gate 826 for disabling same. With the $g_{23}$ signal and $v_2$ signal both low, two inputs of NOR gate 823 are low but the gate remains disabled by the latched high present at the output of NOR gate 822 and this condition will continue through any number of engine cycles until the computer again commands sensor testing by outputting command information which is decoded to generate the secondary command signal $m_9$ to begin the cycle anew some predetermined number of engine cycles later.

If, the present test of the status of the sensors indicated that the impedance was sufficiently low and therefore the temperature sufficiently high such that the outputs of the sensors could be considered valid, then the signal $f_7$ would be low which would enable the sensor outputs to be sampled and converted to pulse width for subsequent utilization by the computer for a predetermined number of engine cycles at which time the sensors would again be tested. So long as the signal $f_7$ remains low, indicating a satisfactory impedance level, the computer may continue to use the sensor output data. If, however, the particular sample or test indicates a cold sensor or sensors, by measuring a predetermined high impedance, the test signal $f_7$ goes high and this signal is used to prevent the computer from using the sensor output information until a subsequent test some number of engine periods in the future again shows the sensor outputs to be usable.

The actual utilization of the $f_7$ signal to permit or inhibit usage of the sensor outputs will be described hereinafter with respect to the description of the circuitry of block 650 of FIG. 4D. The oxygen qualifier network or sensor test control circuit described hereinabove eliminates the interaction of the sensor impedance measuring scheme and the sensor output signal by applying a current source to the sensor periodically to determine the temperature (impedance) condition of the sensor and the monitoring time is a very small duty cycle portion of the total sensor operation so as to minimize that period during which the impedance test masks the sensor operation. It is also important that the number of engine revolutions or periods between tests can be programmatically controlled depending upon the operating environment and needs of a particular situation to greatly extend system flexibility and reliability in the manner heretofore unachievable in the prior art. cl 4.16 Channel No. 1 Sampling Counter and Register The channel No. 1 sampling counter and register circuitry of block 647 of FIG. 4D will now be described with reference to the schematic diagram of FIG. 4D11. Briefly, the circuit of FIG. 4D11 receives 64 sample pulses per engine period via the signal sequence $h_6$ outputted by the sampler counter FIG. 4D9 and takes approximately 64 equally-spaced samples of the properly conditoned sensor No. 1 output $F_1$ from output lead 308 of the oxygen sensor signal conditioning system of FIG. 3E. The $F_1$ output is supplied via lead 308 to a first current-carrying electrode of a transistor 852 whose opposite current-carrying electrode is connected to an input node 853. Node 853 is connected to the input of a first inverter 854 whose output is supplied to node 855. The output node 855 from inverter 854 is connected directly to the input of a second inverter 856 whose output is supplied to node 857.

Output node 857 is also connected to input node 853 through a feedback transistor 858 having its first current-carrying electrode connected directly to the node 853 and its second current-carrying electrode connected to the inverter output node 857. The gate electrode of transistor 858 is connected to receive the first phase clock signals $h_1$ from the 62.5 kilohertz clock while the second phase clock signals $h_2$ are supplied to an input node 859. The $h_2$ input node 859 is connected directly to the gate electrode of the first transistor 852; to one inverted input of a logical AND gate 860 having five inverted inputs; and to the input of an inverter 861.

The output of inverter 861 is connected to a first inverted input of a logical AND gate 862 having three inverted inputs. Node 855 is also connected via lead 863 to a first switch contact 864 while inverter output node 857 is connected via led 865 to a second switch contact 866. A second inverted input of AND gate 860 is connected to a switching arm 867 which can be selectively positionable by suitable LSI masking techniques to contact either the first contact point 864 or the second contact point 866 depending upon the ultimate polarity of the signals involved. In the preferred embodiment of the present invention, the switch arm 867 is positioned, as shown in FIG. 4D11, to contact the second switch contact 866 and establish a current path between the output node 857 and an inverted input of AND gate 860 via lead 865, switch contact 866 and switch arm 867.

A third inverted input of AND gate 860 is connected via lead 820 to receive the sequences of 64 equally-spaced, negative-going sampling pulses which are generated by and outputted from the sampler counter circuit of FIG. 4D9, as previously described. A fourth inverted input of AND gate 860 is taken from the output of a six input NOR gate represented by the horizontal line 868 (in accordance with the convention of FIG. 9) and having as its inputs the $Q_1$, $Q_2$, $Q_3$, $Q_4$, $Q_5$, and $\overline{Q_6}$ outputs from the six stage counter 869 of FIG. 9D11.

The six stage counter 869 is configured from six individual static shift register stages whose non-inverted outputs are labeled $Q_1$, $Q_2$, $Q_3$, $Q_4$, $Q_5$ and $Q_6$, respectively. The respective "Q" output of each of the shift register stages comprising the counter 869 is connected directly to the set or "D" input of the next adjacent right hand stage, as known in the art, and as previously indicated, the designation "DS" does not stand for a direct set input but rather for the standard "D" input of the shift register 869 with the DS designation being used herein to stand for the data shift input. The six input NOR gate represented by the horizontal line 868 is shown as having one end thereof commonly coupled to a first current-carrying electrode and the gate electrode of a pull-up transistor 870 whose opposite current-carrying electrode is connected directly to a +5 -volt source of potential for providing the necessary driving power to the gate and insuring proper logic levels.

The output of the five inverted input AND gate 860 is connected directly to a second inverted input of AND gate 862 whose third inverted input is connected via lead 871 to receive the signal $d_3$ from the first clock phase input $h_a$ of the channel No. 2 sampling counter circuit of FIG. 4D12 as hereinafter described. The output of the three inverted input AND gate 862 is supplied to node 872 and node 872 is connected via lead 873 to a clock input node 874. Clock input node 874 is connected directly to the second phase clock input $h_b$ of each of the six shift register stages of the counter 869 and is also supplied back to the fifth and final inverted input of AND gate 860. Node 872 also supplies the gated sampling clock signal $c_1$ to the second clock input $h_b$ of all stages of the sampling counter FIG. 4D12 via lead 875 to be hereinafter described.

The direct reset input DR to each of the static shift register stages of the counter 869 is supplied with the clear signal $g_{23}$ which occurs once at the end of each engine period via lead 774 from the output of the presetable counter circuitry of FIG. 4D5 previously explained. A block diagram of each of the static shift register stages and the schematic therefore will be shown in greater detail in FIGS. 9.26 A and B, if further detail is required.

The non-inverted output from each of the static shift register stages of the counter 869, $Q_1$ through $Q_6$ is connected directly to the $D_i$ (data in) or set input of six corresponding two stage dynamic flip-flops used to form a latching register 876, as hereinafter described. The vertical leads connecting the static shift register stage outputs $Q_1$ through $Q_6$ of the counter 869 to the $D_i$ inputs of the six stages of the latch register 876 are designated by the reference numerals 877*a* through 877*f* respectively. The inverted outputs $\overline{Q_1}$ through $\overline{Q_6}$ from the six static shift register stages of the counter 869 are represented by the straight vertical lines extending from the output of the respectively numbered inverters and the input of each of the inverters 878*a* through 878*f* are connected directly to the $Q_1$ through $Q_6$ output lead 877*a* through 877*f*, respectively. The decoding network associated with the Q and $\overline{Q}$ outputs of the counter 869 are represented by the four horizontal lines designated 879*a* through 879*d* and each of these horizontal lines represents a docoding NOR gate, as hereinafter described. Each of the NOR gates represented by the horizontal lines 879*a* through 879*d* is shown as having one end commonly coupled to the current-carrying electrode and the gate electrode of a pull-up transistor 880*a* through 880*d*, respectively and the opposite current-carrying electrode of each of the transistors 880*a* through 880*d* is connected directly to a +5-volt source of potential for supplying the necessary drive required for the NOR gates represented by the respective horizontal lines for insuring proper logic levels at the gate outputs.

The first horizontal line 879*a* represents a six input NOR gate each of whose inputs is connected to the inverted outputs $\overline{Q_1}$ through $\overline{Q_6}$ of the six stages of the shift register counter 869 for detecting the presence of all ones in the counter 869 to insure that a zero is supplied back to the DS input of the first counter stage on the next count to prevent the counter from becoming locked in the all ones state. The second horizontal line 897*b* represents a six input NOR gate having, as its inputs, the counter outputs $\overline{Q_1}$, $\overline{Q_2}$, $\overline{Q_3}$, $\overline{Q_4}$, $\overline{Q_5}$, and $Q_6$ and its output connected as a first input of the three input NOR gate represented by the horizontal line 879*c* and as one input of the three input NOR gate represented by the horizontal line 879*d* for disabling the NOR gates 879*c* and 879*d* whenever the count 111110 is detected, as hereinafter described. The three input NOR gate represented by horizontal line 879*c* has its other two inputs connected to receive the signal $Q_5$ and $\overline{Q_6}$ while the NOR gate represented by the horizontal line 879*d* has its other two inputs adapted to receive the counter outputs $\overline{Q_5}$ and $Q_6$, respectively.

The outputs of the first six input NOR gate 879*a*, the first three input NOR gate 879*c* and the second three input NOR gate 879*d* form the three inputs of a three input NOR gate represented by the vertical straight line 881 whose output is connected directly to the data shift input "DS" of the first stage of the six stage counter 869 such that the output of the NOR gate 881 determines whether a logical "1" or a logical "0" is supplied to the input of the first stage of the shift register counter 869. The NOR gate represented by the vertical line 881 is also shown as having one end commonly connected to the first current-carrying electrode and the gate electrode of a pull-up transistor 882 whose opposite current-carrying electrode is connected directly to the +5-volt source of potential for providing the necessary driving power to the gate to insure proper logic levels, as previously described.

The combination of NOR gates 879*c* and 879*d* form an Exclusive OR gate combination which, in combination with the disabling decode NOR gate 879*b* and the ones detect NOR gate 879*a*, control the count sequence through the output of NOR gate 881, as previously described with respect to the six stage counter 775 of FIG. 4D7 and the count sequence or count cycle is shown in FIG. 4D8. It will, of course, be understood that if the counter is initially cleared by the signal $g_{23}$ via lead 774 to activate the direct reset of each of the stages of the counter 869, the initial count one will begin with a zero in each of the stages thereof. After the first clock pulse, the output of NOR gate 881 will feed a logical one into the first stage and the count sequence will then proceed as shown in the count state table of FIG. 4D8. The decoded output of NOR gate 879*b* may be used to disable gates 879*c* and 879*d* to insure the proper counter sequence, as known in the art.

Each of the six stages of the latching reqister 876 is a two phase dynamic flip-flop which is depicted in the block diagram and electrical schematic diagram of FIGS. 9.22 A and B. The $D_i$ input of each of the flip-flop stages of the latching register 876 are connected to the outputs $Q_1$ through $Q_6$ of the six stages of the counter 869 via leads 877*a* through 877*f*, respectively. Each of the flip-flop stages of the latching register 876 has an inverting latch output $\overline{Q_1}$ through $\overline{Q_6}$ which outputs the complement of the count from the counter 869 which has been stored within the latch register 876 and these complemented outputs are designated $f'_{11}$ through $f'_{16}$.

The count complement output signals $f'_{11}$ through $f'_{16}$ from the latch register outputs $\overline{Q_1}$ through $\overline{Q_6}$ are supplied via leads 883*a* through 883*f*, respectively, to the inputs of the sampling counter multiplexer of FIG. 4D13, as hereinafter described. The first clock phase input $h_a$ is supplied with the transfer signal $g_{22}$ generated by the presetable counter circuitry of FIG. 4D5, as previously described, via lead 773. The signal $g_{21}$ from FIG. 4D5 is supplied via lead 766 to the first current-carrying electrode of a transistor 884 whose opposite current-carrying electrode is connected to the first input of a logical NAND gate 885. The second input to NAND gate 885 is supplied with the first phase signal $h_1$ from the 62.5 kilohertz clock which is also supplied to the gate electrode of transistor 766. The output of NAND gate 885 is taken from node 886 and supplied directly to the second clock phase input $h_b$ of each of the flip-flop stages of the latching register 876. The signal from node 886 is also supplied via lead 887 as the signal $e_1$ to the second clock phase inputs of the latching register of the channel No. 2 sampling counter and register of FIG. 4D12 to be hereinafter described. The logic signal $e_1$ is simply the timing signal $g_{21}$ synchronized with the $h_1$ clock phase.

The operation of the channel No. 1 sampling counter and latching register of FIG. 4D11 will now be described. At the end of the preceding engine period, the generation of the sequence of pulses $g_{21}$, $g_{22}$, $g_{23}$, whose generation was previously described with reference to FIG. 4D5, are generated. The signal $g_{22}$ causes the current count present at the output $Q_1$ through $Q_6$ of the six stages of the counter 869 to be transferred into the $D_i$ inputs of the corresponding flip-flop stages of the latching register 876. Since the signal $g_{22}$ was generated with the $h_1$ clock phase high to pass an inverted or low $g_{21}$ signal to one inverted input of AND gate 770 of FIG. 4D5 while another inverted input is supplied with a low $h_2$ clock phase and the final input supplied with a low $h_5$ clock pulse gated to the third inverted input when $h_1$ is high, the output of AND gate 885 will be low when the $h_1$ signal at its input is high to gate the high $g_{21}$ signal to its opposite input.

The low signal at output node 886 will remain while the high $g_{22}$ signal is present at the first clock phase input $h_a$. As soon as the first clock phase signal $g_{22}$ goes high with the occurrence of the next clock phase, i.e., $h_1$ goes low and $h_2$ goes high. The low $h_1$ signal present at one input of NAND gate 885 will immediately cause a high to appear at node 886 and since this high is supplied to the second clock phase input $h_b$ of the flip-flops comprising the stages of the latching register 876, one clock phase after the generation of $g_{22}$, the count previously supplied to the $D_i$ inputs will be latched with the complements appearing at the corresponding outputs $\overline{Q_1}$ through $\overline{Q_6}$. Thus, the count attained at the $Q_1$ through $Q_6$ outputs of the counter 869, upon the occurrence of the transfer pulse $g_{22}$, will, one clock phase later, be stored and latched in the six stages of the latching register 876 such that the complement of each bit $Q_1$ through $Q_6$ appears at the latch outputs $\overline{Q_1}$ through $\overline{Q_6}$, respectively. As the $h_1$ clock phase goes low and the $h_2$ clock phase high, the clear pulse $g_{23}$ is generated and supplied via lead 773 to the direct reset inputs of each of the six stages of the counter 869 so that all zeroes are stored therein prior to beginning a new count sequence.

Immediately after the clearing of the counter 869 via the direct reset caused by the $g_{23}$ clear signal, the logical AND gate 860 having five inverted inputs will determine whether or not the counter 869 is clocked to advance it in the count sequence set forth in the state table of FIG. 4D8 via enabling the signal present at the output of NOR gate 881 to be fed thereto as previously described. Gate 860 is enabled whenever all of its inputs are low. One of its inverted inputs is from the output of the six inverted input NOR gate 868 which will present a low to the inverted input of gate 860 so long as the counter has not yet attained the count state 0000001 since, in accordance with the count state table of FIG. 4D8, the next count would again place all zeroes into the counter 869 and destroy the validity of any count output.

The second inverted input of AND gate 860 is taken from node 874 and node 874 is connected via lead 873 to the output of gate 862 via node 872. A low at this input insures that the second clock phase signal $h_b$ is not high since it is desired to first clock the phase $h_a$ and then the second phase $h_b$, and the phasing must be mutually exclusive, as hereinafter described. A third inverted input of AND gate 869 is taken from node 859 which receives the second phase clock signal $h_2$ while a fourth inverted input is connected to the switching arm 867 which is connected to complete a circuit path between the switch arm 867 and node 857 via contact 866 and 865. So long as the signal $F_1$ which is a binary signal conditioned to acceptable digital circuit logic levels and representing the output of the channel No. 1 or first oxygen sensor, is low, indicating the occurrence of a rich air/fuel mixture in the exhaust system of the engine, a low is present to enable AND gate 860.

With the signal $F_1$ low, the occurrence of the clock phase $h_2$ causes transistor 852 to conduct to pass this low signal to node 853. When the clock phase $h_2$ goes low, clock phase $h_1$ goes high to render feedback transistor 858 conductive and recirculate the low signal present at output node 857 back to the inverter input node 853 so as to maintain the sampled low $F_1$ signal at node 857 for the complete clock period. This low is then transmitted via lead 865 contact 866 and switch arm 867 to enable the four inverted input of AND gate 860 even after the clock phase $h_2$ again goes high and $h_1$ goes low, since the sampled low is still present at the inverter output node 857 via the conducting feedback transistor 852 to node 853. This low is then inverted and then reinverted by inverters 854, 856 so that a low is maintained at the output node 857 regardless of the clock phase $h_1$ or $h_2$ so long as the sampled input signal $F_1$ remains low, indicating a rich air/fuel mixture.

Therefore, when a rich air/fuel mixture is sensed by the first oxygen sensor and the signal $F_1$ is low, four of the five inverted inputs of gate 860 are enabled. One inverted input is enabled since the counter 869 has not yet attained its 63rd count; another inverted input is enabled while the clock phase $h_2$ is low, a third input is enabled so long as the signal $c_1$ is not high to clock the second phase input $h_b$ and the fourth inverted input is enabled so long as the rich air/fuel mixture exists in the exhaust. Therefore, since the fifth inverted input is supplied with the sequence of 64 equally spaced sampling pulses per each engine period via lead 820, and since $h_6$ represents a sequence of 64 negative-going sampling pulses gated with the clock phase $h_2$ such that a negative-going pulse occurs only when $h_2$ is low, then gate 860 will output a high clock pulse to the first clock phase input $h_a$ of each of the six stages of the counter 869 to transfer the count value present at the data shift DS input of the first stage into the register and the value present at the non-inverted output Q of each stage into the DS input of each succeeding right hand stage to shift or transfer the previous output to the subsequent input as previously described.

As soon as the clock phase $h_2$ goes high, the output of gate 860 goes low to terminate the first clock phase $h_a$ of each of the six stages of the counter 869. As soon as the output of gate 860 goes low, gate 862 is enabled and a high appears at its output node 872 which is transferred via lead 873 to clock input node 874. A high at node 874 disables gate 860 and supplies a high clock pulse input to the second clock phase input $h_b$ while the low caused to appear at the output of gate 860 is simultaneously inverted by inverter 888 to present a high clock signal to the $h_c$ clock input. Thus, as high signals are simultaneously or nearly simultaneously presented to the $h_b$ and $h_c$ clock inputs of each of the static shift register stages of the counter 869, the signal previously transferred to the input of the shift register stage will be entered therein and latched at its output. Accordingly, after one complete clock phase, the data in the registers of the counter 869 has been shifted one stage to the right with the left-most stage having received the output of NOR gate 881, the data being entered and latched at its output, as conventionally known.

This operation will continue and the counter 869 will increase the count stored therein by "one" each time one of the 64 sampling pulses $h_6$ arrives and the output of the first oxygen sensor, the condition signal $F_1$, remains low indicating a rich air/fuel mixture. If, the mixture detected by the first channel oxygen sensor remains rich throughout the entire engine period, meaning the signal $F_1$ remained low through the entire period, than all of the $h_6$ sampling pulses, or all but the last one since gate 860 would be disenabled prior to the arrival of the 64th pulse by the decoded output of NOR gate 868, and the counter 869 would store a high count indicative of a rich air/fuel ratio.

If, on the other hand, the air/fuel ratio sensed by the first oxygen sensor remained lean throughout the engine period, then the signal $F_1$ outputted from the oxygen sensor conditioning system of FIG. 3E would remain high throughout the entire period. A high $F_1$ signal on input lead 308 would cause a high to appear at node 857 and therefore a high at one input of gate 860. A high at one inverted input of AND gate 860 would prevent any of the 64 sampling pulses $h_6$ from being counted so that at the end of the engine period, a zero count would be present in the counter 869 indicating the existence of an extremely lean air/fuel mixture in the exhaust system.

More realistically, the signal $F_1$ will remain high at one portion of the engine cycle and low at another since the firing of the different cylinders may cause a rich indication to appear at one firing time and a lean indication to appear at another. Under these more realistic conditions, gate 860 will be enabled to cause the counter 869 to up its count by one each time one of the 64 sampling pulses $h_6$ detects a rich condition, but the counter will not increase its count each time a lean condition is detected. Therefore, at the end of the engine period, some count between zero and 63 will have been attained by the counter 869. Ideally, a count of 32 will indicate stoichiometric operation while a lesser count indicates lean engine operation and a higher count indicates too rich an air/fuel mixture in the exhaust. With a zero count indicating the extreme case of a continuously lean air/fuel ratio in the exhaust and the "63" count indicating the extreme case of a continuously rich air/fuel mixture in the exhaust, it will be understood that under normal conditions, some intermediate count will be stored in the counter near the end of the engine period when the transfer pulse $g_{22}$ is generated.

As the engine period ends, the transfer signal $g_{22}$ transfers the count attained by the counter 869 into the inputs of the latching register 876 and the next clock phase will cause the high signal outputted from NAND gate 885 to clock the $h_b$ clock phase to transfer and latch the highest count attained by the counter 869 into the latching registers 876 for connection to the sampling counter multiplexer of FIG. 4D13, as hereinafter described, while the clear signal $g_{23}$ directly resets all of the stages of the counter 869 to begin the next count cycle for the next engine period.

4.17 Channel No. 2 Sampling Counter and Register

The channel No. 2 sampling counter and register is shown in FIG. 4D12 and is similar and in fact nearly identical to the channel No. 1 sampling counter and register of FIG. 4D11. The channel No. 2 sampling counter and register of FIG. 4D12 receives the properly conditioned output from the second oxygen sensor as the signal $F_3$ via lead 317 from the output of the oxygen sensor signal conditioning system of FIG. 3E. As previously described, the signal $F_3$ is a binary signal representing the properly conditioned output of the channel No. 2 $ZiO_2$ sensor and a high or logical "1" state represents a lean condition while a low or logical "0" state represents a rich air/fuel ratio in the exhaust system.

The signal $F_3$ is supplied via lead 317 to one current-carrying electrode of a transistor 889 whose opposite current-carrying electrode is connected to a node 890. Node 890 is connected to the input of a first inverter 891 whose output is supplied to node 892. Node 892 is connected via lead 893 to a first switch contact 894 and also to the input of the second inverter 895. The output of inverter 895 is supplied to an output node 896. Node 890 is connected to the first current-carrying electrode of a feedback transistor 897 whose opposite current-carrying electrode is connected to the inverter output node 896. Node 896 is connected via lead 898 to a switch contact point 899 and a contact arm 900, which is selectively positionable via conventional LSI masking techniques between one or the other of the contacts 894, 899 is positioned to contact 899 so as to establish a current path between an inverted input of a logical AND gate 901 and the inverter output node 896 via switching arm 900, contact 899, and lead 898.

A second inverted input of gate 901 is taken directly from the output of a six input NOR gate represented by the horizontal line 902 and having as its inputs the $Q_1$, $Q_2$, $Q_3$, $Q_4$, $Q_5$, and $\overline{Q_6}$ outputs of the six stages of the second sampling counter 903. One end of the line representing NOR gate 902 is shown as being commonly connected to a first current-carrying electrode and the gate electrode of a transistor 904 whose opposite current-carrying electrode is connected to a +5-volt source of potential for acting as a pull-up transistor to supply the necessary drive to the six input NOR gate 902 to insure proper logic levels at its output, as previously described.

The second sampling counter 903 is, as was the first sampling counter 869 of FIG. 4D11, a shift register counter configured from six static shift register stages each having clock phase inputs $h_a$, $h_b$, $h_c$; a data shift input DS; a direct reset input DR; and a non-inverting output Q. The outputs of the six stages are designated $Q_1$, $Q_2$, $Q_3$, $Q_4$, $Q_5$ and $Q_6$ respectively and the six stages are coupled, as previously described, to form a conventional shift counter.

A third inverted input of AND gate 901 is connected to receive the second phase $h_2$ of the 62.5 kilohertz clock. The fourth inverted input of gate 901 is connected to receive the sampling pulses $h_6$ from output lead 820 from the sampler counter decode logic of FIG. 4D9. The signal $c_1$, which is used to clock the second phase of the counters 903, is supplied via lead 875 from FIG. 4D11 to clock input node 905. The clock input node 905 is connected directly to the fifth and last inverted input of gate 901 and is connected directly to the second clock input $h_b$ of each of the six static shift register stages comprising the counter 903. The direct reset input of each of the static shift register stages of the counter 903 receive the clear signal $g_{23}$ via lead 774 for resetting each of the stages of the counter 20 at the end of of each engine period for clearing the counter 903 prior to its beginning a new count cycle.

The output of AND gate 901 is connected (1) via lead 871 to supply the signal $d_3$ to one inverted input of AND gate 862 of FIG. 4D11 as previously described; (2) directly to the first clock phase input $h_a$ of each of the six stages of the counter 903; and (3) to the input of an inverter 906 whose output is connected to the clock input $h_c$ of each of the stages of the counter 903.

The non-inverted output of each of the six stages of the counter 903 are designated $Q_1$ through $Q_6$ and each is connected directly to a corresponding non-inverted output node 907*a* through 907*f*, respectively. The Q output of each of the stages is taken from the respective non-inverting output node 907*a* through 907*f* and supplied via lead 908*a* through 908*f* to the $D_i$ input of a corresponding stage of a latching register 909.

Each of the stages of the latching register 909 is a two phase dynamic flip-flop having a data in input $D_i$, an inverting output Q, a first clock phase input $h_a$ and a second phase clock input $h_b$ and each stage is adapted to receive and store the logic state existing in a corresponding stage of the counter 903 whenever the data transfer pulse $g_{22}$ is supplied to the first clock phase input $h_a$ of each of the stages of the latching register 909 via output lead 773 from FIG. 4D5. The signal $e_1$ from the output node 886 of AND gate 885 of FIG. 4D11 is supplied via lead 887 to the second clock phase input $h_b$ of each of the stages of the latching register 909 to latch the transferred count therein. Each of the inverting outputs of the six stages of the latching register are designated $\overline{Q_1}$ through $\overline{Q_6}$ and are adapted to supply the complement of the count bits stored therein via output leads 910*a* through 910*f* which are used to supply the count complement signals $f''_{11}$ through $f''_{16}$ to the sampling counter miltiplexer of FIG. 4D13 as hereinafter described.

The $\overline{Q}$ outputs, $\overline{Q_1}$ through $\overline{Q_6}$, of the six stages of the shift register counter 903 are represented by the straight vertical lines extending from the output of the inverters 911*a* through 911*e*, respectively whose inputs are coupled directly to the non-inverting output nodes 907*a* through 907*f*, respectively. The $\overline{Q_6}$ output is also taken from the output of inverter 911*f* and supplied via lead 912 back to one of the six inverted inputs of NOR gate 902, as previously described, so that the output of NOR gate 902 will go high to disable gate 901 whenever the count 000001 is attained by the counter 903. This count is attained on the 63rd count after direct reset and the following count would cause all zeroes to appear in the counter 903 rendering its reading invalid or ambiguous since it would be impossible to tell whether all zeroes are stored in the counter due to the fact that a continuously lean air/fuel ratio was detected in the exhaust by the second oxygen sensor inhibiting the gate 901 from passing any of the 64 sampling pulses $h_6$ and therefore retaining the direct reset count of all zeroes in the counter 903 or whether all 64 of the sampling pulses $h_6$ were passed by the gate indicating an excessively rich air/fuel mixture in the exhaust which caused the counter to return itself to the all zero count. Therefore, as soon as the 63rd sampling pulse is counted, the output from the decoding NOR gate 902 goes high to inhibit gate 901 and prevent another count from being entered therein.

As previously described with respect to the decoding network at the output of the first sampling counter 869 of FIG. 4D11, the decoding network at the output of the second sampling counter 903 includes four additional NOR gates represented by the horizontal lines 913*a* through 913*d*. The NOR gate represented by the horizontal line 913*a* is a six input NOR gate having as its inputs the outputs of the inverters 911*a* through 911*f* and therefore the counter signals $\overline{Q_1}$ through $\overline{Q_6}$, respectively. The output of the decoding NOR gate 913*a* will, therefore, go high whenever all ones are detected in the counter 903 to force a zero to be fed into the first stage thereof as previously described.

The second decoding NOR gate is represented by the horizontal line 913*b* and its six inputs receive the counter outputs $\overline{Q_1}$, $\overline{Q_2}$, $\overline{Q_3}$, $\overline{Q_4}$, $\overline{Q_5}$, and $Q_6$. The output of the six input decoding NOR gate 913*b* is supplied as a first input to a three input NOR gate represented by the horizontal line 913*c* and as one input of a three input NOR gate represented by the horizontal line 913*d*. The NOR gate 913*c* has its other two inputs adapted to receive the counter outputs $Q_5$ and $\overline{Q_6}$ while the other two inputs of NOR gate 913*d* are connected to receive the counter outputs $\overline{Q_5}$ and $Q_6$.

The outputs of the NOR gates 913*c* and 913*d* form an Exclusive OR gate combination which controls the basic count cycles of the counter as previously described. The outputs of NOR gates 913*c* and 913*d* form two inputs of a three input NOR gate represented by the vertical line 914 whose third input is the output of the six input NOR gate 913*a*. The output of the NOR gate 913*b* is used to disable NOR gates 913*c* or 913*d* at a predetermined count or counts in the cycle so as to control the count sequence to achieve the count cycle or sequence set forth in the count state table of FIG. 4D8. It will, of course, be understood that, depending upon the starting values in the counter, in the present example, all zeroes after a direct reset by the signal $g_{23}$, the counter 903 will follow the count state table of FIG. 4D8 from the point on with each successively gated clock time producing the next successive state, etc.

The output of the three input NOR gate represented by the vertical line 914 is supplied directly to the data shift input DS of the first stage of the shift register counter 903 for supplying a high or logical "1" to the input of the first counter stage whenever all of the inputs to NOR gate 914 are low and for providing a low or a logical "0" to the input of the first counter stage whenever any of the inputs of NOR gate 914 are high, and it is in this manner that the count state sequence is established. One end of the line 914, which represents the three input NOR gate, is shown as being commonly connected to a current-carrying electrode and gate electrode of a transistor 915 whose opposite current-carrying electrode is connected directly to a +5-volt source of potential. Similarly, each of the NOR gates 913*a* through 913*d* is shown as being commonly connected to one current-carrying electrode and the gate electrode of a corresponding transistor 916*a* through 916*d* whose opposite current-carrying electrode is connected directly to a +5-volt source of potential. The transistors 915 and 916*a* through 916*d* are pull-up transistors which provide power to the respective NOR gates and insure proper logic levels.

As previously described, at the end of an engine period, the transfer signal $g_{22}$ goes high for one clock phase and since it is connected via lead 773 to the first clock input $h_a$ of each of the stages of the latching register 909, the count then stored in the six stages of the counter 903 is fed into the $D_i$ input of a corresponding stage of the latching register 909. On the next clock phase, the signal $e_1$ goes high and since this signal is supplied to the second clock phase $h_b$ of each of the stages of the latching register 909, the complement on each previously inputted value is transferred to the corresponding latch output $\overline{Q_1}$ through $\overline{Q_6}$ and latched therein for further use.

Simultaneously with the generation of the signal $e_1$, the clear signal $g_{23}$ is supplied via lead 774 to the direct reset input DR of each of the counter stages 903 for clearing the counter and causing a zero to be present at each of its Q outputs. The signal $g_{23}$ signifies the end of an engine period and as soon as the counter 903 is reset to all zeroes, a new engine period is begun and the counter 903 begins to count as hereinafter described. Since the 63rd count has not yet been attained, the output of NOR gate 902 remains low to enable one inverted input of gate 901. Simultaneously, a second inverted input of gate 901 is enabled each time the clock phase $h_2$ goes low. Each time the clock phase $h_2$ goes low, the output of inverter 861 of FIG. 4D11 goes high disabling gate 862 and causing the signal $c_1$ to go low. Since $c_1$ is supplied via lead 875 to a third inverted input of gate 901, it also is enabled. A fourth inverted input of gate 901 is connected via switch arm 900, contact 899, and lead 898 to the inverter output node 896.

Assume first that the second oxygen sensor detects a continuously rich air/fuel mixture in the exhaust system of the internal combustion engine in which it is installed. Therefore, the output of the oxygen sensor signal conditioning system of FIG. 3E, the signal $F_3$ supplied on lead 317 is low. When clock phase $h_2$ goes high, transistor 889 conducts to pass the low $F_3$ signal to input node 890. When $h_2$ goes low and $h_1$ goes high, feedback transistor 897 conducts to pass the low from output node 896 back to node 890 for recirculating same. Subsequently, the low at node 890 undergoes a double inversion via inverters 891 and 895 so that a low will be continuously present at the inverter output node 896 so long as the input signal $F_3$ remains low. This low is then supplied to enable the fourth inverted input of gate 901. Since the fifth inverted input of gate 901 is connected to receive the 64 equally-spaced negative-going sampling pulses $h_6$ via lead 820, the gate 901 will output a high pulse $d_3$ each time all of its inputs are enabled and one of the negative-going sampling pulses $h_6$ arrives.

Each high pulse outputted from gate 901, which can occur only when the signal $h_2$ is low since it is one of the enabling inputs thereof, is supplied to the first clock phase input $h_a$ of each of the six stages of the counter 903 causing the signal then present at the output of NOR gate 914 to be entered into the DS input of the first stage and the Q output of each counter stage to be fed into the DS input of the next right most successive stage, as known in the art.

As soon as the clock signal $h_2$ goes high, the output of gate 901 goes low and a low from gate 901 is transmitted as a low $d_3$ signal via lead 871 to enable gate 862 which then outputs the high gated clock signal $c_1$. The signal $c_1$ is supplied via lead 875 to the second clock phase input $h_b$ of each of the six stages of the counter 903 and also, when the output of gate 901 goes low, the output of inverter 906 goes high to supply a high signal to the third clock input $h_c$ of each of the six stages of the counter 903. Thus, the value previously entered with the high presented to the $h_a$ input is then transferred to and latched at the corresponding stage output when the signals presented to the $h_b$ and $h_c$ inputs go high.

This sequence is repeated with the value present at the output of NOR gate 914, which determines the count sequence of the counter 903 and which is determined in turn by the decoding network as previously described, being fed into the input of the first counter stage as each stage output is transferred to the input of the next adjacent succeeding stage and then all inputted values are transferred to the stage outputs and latched each time one of the sampling clock signals $h_6$ is passed by gate 901.

Therefore, if, the output signal $F_3$ from the oxygen sensor signal conditoning system of FIG. 3E is continually low, gate 901 will continue to be enabled every other clock phase so that all of the sampling signals $h_6$ will cause the count stored in the counter 903 to increase with the resulting high count corresponding to an excessively rich air/fuel mixture in the exhaust system of the engine. Similarly, if the signal $F_3$ from the output of the oxygen sensor signal conditioning system of FIG. 3E is continually high, indicating a continuously lean air/fuel ratio, the gate 901 will be continuously disabled throughout the 64 sampling pulses and no count will be entered into the counter 903 since a low count indicates an excessively lean air/fuel ratio existing in the exhaust system of the engine.

From a practical standpoint, however, the output $F_3$ from the second oxygen sensor, after it has been properly conditioned by the oxygen sensor signal conditioning system of FIG. 3E, will periodically go high or low as different cylinders fire since one cylinder may be running rich while another runs low, etc. Therefore, since the 64 sample pulses $h_6$ are more or less equally spaced over the engine period, the state of the air/fuel ratio in the exhaust system is sampled or averaged over the entire engine period and, if the signal $F_3$ were low half the time indicating a rich air/fuel ratio and a high the other half of the time indicating a lean air/fuel ratio, an average count of 32 would be attained in the counter 903 at the time the transfer signal $g_{22}$ was generated to shift the outputs of the counter stages into the latching register 909. It will be understood that the count stored in the counter 903 will vary between zero and 63 depending upon the number of times the signal $F_3$ was high and the number of times it was low when the $h_6$ sampling pulses generated. While a count of 32 at transfer time indicates stoichiometric operation, under normal conditions a count slightly greater, indicating a righ air/fuel ratio or a count slightly less, indicating a lean air/fuel ratio is more likely. Whatever count has been attained in the counter 903 one clock phase before the end of the engine period when the transfer signal $g_{22}$ is generated, that count then present at the outputs $Q_1$ through $Q_6$ of the counter 903 is inputted to the $D_i$ inputs of corresponding stages of the latching register 909 via leads 908*a* through 908*f*, respectively. On the final clock phase of an engine period, the signal $e_1$ goes high to latch the attained count at the output of the latching register 909 so that the complement of each bit thereof is represented by the signals $f''_{11}$ through $f''_{16}$ and the clear signal $g_{23}$ again directly resets all stages of the counter 903 to ready the counter for the next counting cycle as previously described.

4.18 Sampling Counter Multiplexer

The sampling counter multiplexer of block 649 of FIG. 4D is shown in the schematic diagram of FIG. 4D13. The count stored in the sampling counter at the end of the previous engine cycle and transferred to the latch register 876 of FIG. 4D11 has its compliment transferred to one set of inputs of the sampling counter multiplexer of FIG. 4D13 as the signals $f'_{11}$ through $f'_{16}$ via leads 883*a* through 883*f* respectively while the count stored in the second sampling counter just prior to the end of the engine period and subsequently stored in the latching register 909 of the circuit of FIG. 4D12 has its complement supplied as the input signals $f''_{11}$ through $f''_{16}$ via leads 910*a* through 910*f* respectively.

The multiplexing is done through a set of six two-input AND/two-input NOR gate combinations, each of which includes a first two-input logical AND gate 918*a* through 918*f*, respectively; a second two-input logical AND gate 919*a* through 919*f*, respectively; and a two-input NOR gate 920*a* through 920*f*, respectively, each having as its input the outputs of the respectively designated pair of AND gates 918*a* through 918*f* and 919*a* through 919*f*, respectively.

A command signal $m_7$ and a command signal $m_8$ are supplied to the sampling counter multiplexer via leads 921 and 922 respectively. The command signals $m_7$ and $m_8$ are transmitted via the command signal bus $m_0$ from the secondary command signal generator of the microprocessor system of block 123 of FIG. 2, as hereinafter explained, and the command signal $m_7$ enables the latched count or digital word representative of the sampled output of the first oxygen sensor to be supplied to the binary to pulse-width converter circuit of FIG. 4D14, as hereinafter described, while the command signal $m_8$ enables the second latched count or digital word indicative of the sampled average reading of the second oxygen sensor to be inputted to the binary to pulse-width converter circuit of FIG. 4D14.

The connection of the various leads for achieving the multiplexing of the two sampling counters is as follows. The signal $m_7$ for enabling the latched output of the first sampling counter latch register 876 of FIG. 4D11 is connected via lead 921 directly to a first input of each of the first one of a pair of logical AND gates 918*a*, 918*b*, 918*c*, 918*d*, 918*e*, and 918*f* respectively. The signal $m_8$ which enables the counter output from the latch register 909 of the second sampling counter of FIG. 4D12 is supplied via lead 922 to a first input of each of the second of the pair of logical AND gates 919*a*, 919*b*, 919*c*, 919*d*, 919*e*, and 919*f*.

The outputs from the $\overline{Q_1}$ through $\overline{Q_6}$ stages of the latch register 876 of the first oxygen sensor counter and register of FIG. 4D11 are represented by the signals $f'_{11}$ through $f'_{16}$ and are supplied via leads 883*a* through 883*f* to the second input of each of the corresponding first AND gates 918*a* through 918*f*, respectively while the $\overline{Q_1}$ through $\overline{Q_6}$ outputs from the latching register 909 of the second oxygen sensor counter and register of FIG. 4D12 which are represented by the signals $f''_{11}$ through $f''_{16}$ are supplied via leads 910*a* through 910*f* to the second input of each of the corresponding second AND gates 919*a* through 919*f*, respectively. As previously indicated, the output of each of the pair of AND gates 918*a* and 919*a* form the two inputs of the two input NOR gate 220*a*; while the outputs of the pair of AND gates 918*b* and 919*b* form the two inputs of the two-input NOR gate 920*b*; and so on through the outputs of AND gates **918*f* and 919*f* forming the two inputs of NOR gate 820*f***.

The outputs of the NOR gates **820*a* through 820*f* are taken from multiplexer output nodes 923*a* through 923*f*, respectively, and the nodes 923*a* through 923*f* have a corresponding non-inverted signal output $\overline{f_{11}}$ through $\overline{f_{16}}$ which is outputted via lead 924*a* through 924*f*, respectively, and a corresponding inverted output $f_{11}$ through $f_{16}$ which is supplied via lead 925*a* through 925*f*, respectively, to the binary to pulse-width converter of FIG. 4D14. The inverted output leads 925*a* through 925*f* originate at the output of inverters 926*a* through 926*f* each of whose inputs are connected directly back to the multiplexer output nodes 923*a* through 923*f***, respectively.

In operation, the sampling counter multiplexer of FIG. 4D13 operates as follows. The signals $m_7$ and $m_8$ which are generated by the secondary command signal generator of the microprocessor system of block 23 of FIG. 2 as hereinafter described, are normally low and when one is on or high to command the transfer of the number stored in a particular latch register to the pulse-width to binary converter of FIG. 4D14, the other remains low and visa versa. The signal $m_7$ is a command signal which goes high when the program requests that the digital word stored in the latch register 876 and indicative of the last average engine period reading of the first oxygen sensor be converted to a pulse-width for further processing and the signal $m_8$ is a command signal which goes high when the computer requests that the digital word stored in the latch register 909 and indicative of the average reading of the second oxygen sensor during the last engine period be transferred for conversion to a pulse-width for further processing.

Since the signals $m_7$ and $m_8$ are normally low, the output of each and every one of the logical AND gates **918*a* through 918*f* and 919*a* through 919*f* is low causing the output of each of the NOR gates 920*a* through 920*f* appearing at nodes 923*a* through 923*f*** to be normally high. Therefore, under normal conditions, the multiplexer outputs $f_{11}$ through $f_{16}$ are normally high and the outputs $\overline{f_{11}}$ through $\overline{f_{16}}$ are normally low.

As soon as the computer requests that the digital word or count stored in the latch register 876 be converted into a pulse width, the signal $m_7$ goes high while the signal $m_8$ remains low. With $m_8$ low, the output of each of the AND gates **919*a* through 919*f* remains low. As soon as $m_7$ goes high, a high signal is presented to one of the two inputs of each of the AND gates 918*a* through 918*f*. Since the input signals $f'_{11}$ through $f'_{16}$ represent the $\overline{Q_1}$ through $\overline{Q_6}$ outputs of the six stages of the latching register 876 and hence the complement of the output of the counter 869 stored in the latch register 876, each time a high appears at the second input of the AND gates 918*a*, its output will go high causing the output of its respective NOR gate to go low. When the output of the NOR gate goes low, it indicates that a zero was previously stored in a corresponding bit position or stage of the counter 869 and inputted to the latch 876. Whenever one or more of the signals $f'_{11}$ through $f'_{16}$ remain low, this low is supplied to the second input of a corresponding one or more of the AND gates 918*a* through 918*f*, respectively so that its output remains low. With the output remaining low, the output of the corresponding NOR gate remains high and this high output corresponds to the value previously stored in the corresponding bit position or stage of the counter 869 and subsequently transferred to the latch register 876**.

To illustrate, assume stoichiometric operation is sensed by the first sensor and 32 counts were made by the counter 869. Therefore, the count stored in the counter 869 of FIG. 4D11 is 100000. This count is transferred into the latch register 876 when the transfer signal $g_2$ goes high. One clock phase later, this number is transferred to the output of the latching registers latched therein while the signal $g_{23}$ clears the counter 869 to begin a new cycle. Since the output signals $f'_{11}$ through $f'_{16}$ are connected via leads **883*a* through 883*f* respectively to the $\overline{Q_1}$ through $\overline{Q_6}$ outputs of the respective stages of the latching register 876**, the complement 011111 rather than the stored count number 100000 appears as the signals $f'_{11}$ through $f'_{16}$ respectively.

When $m_7$ goes high to request transfer of the count stored in the latch register 876 to the pulse-width to binary converter of FIG. 4D14, the first input of each of the AND gates **918*a* through 918*f* goes high, and since the signals $f'_{11}$ through $f'_{16}$ reflect the complement 011111, a zero appears at the second input of AND gate 918*a* causing its output to remain low while a high is applied to the second input of each of the AND gates 918*b* through 918*f* causing each of their outputs to go high. As a result, the output of NOR gate 920*a* remains high while the output of NOR gates 920*b* through 920*f* goes low since one input is now high while the other is low. Therefore, the original shift register count now appears at the outputs of the respective NOR gates and the output signal $f_{11}$ through $f_{16}$ is the originally stored count 100000 and it is this count which is supplied to the pulse-width converter of FIG. 4D14** for conversion, as hereinafter described.

Similarly, if the signal $m_8$ goes high indicating that the computer has commanded the transfer of the digital word stored in the latching register 909 indicative of the state of the air/fuel ratio sensed by the second oxygen sensor during the last engine period, AND gates **918*a* through 918*f* remain disabled and their outputs zero while a first input to each of the AND gates 919*a* through 919*f* goes high. When the complement of the number stored in the latch register 909 is inputted as the signals $f''_{11}$ through $f''_{16}$ via leads 910*a* through 910*f* as the second input to each of the AND gates 919*a* through 919*f*** respectively, each of those gates will have its output remain low if a zero was present at a corresponding bit position and go high if a logical one was present at the corresponding bit position. Each time a zero appears, the output of the corresponding NOR gate will remain high indicating that the original bit position of the counter stored a logical one while each time the transferred signal is high, the output of the corresponding AND gate goes high causing the output of the NOR gate to go low indicating that a logical zero was originally present in the corresponding bit position of the counter transfer as previously described.

Therefore, the gating system of the sampling counter multiplexer of FIG. 4D13 reacts to a computer command so as to transfer the complement of the count achieved by the first oxygen sensor counter and stored in the latch 876 when the signal $m_7$ goes high upon computer command into the gating system to output the originally stored count indicative of the relative richness or leanness of the air/fuel mixture sensed in the exhaust by the first oxygen sensor.

Similarly, when the command signal $m_8$ goes high upon computer request, the complement of the count attained by the counter 903 and transferred to the latch register 909 is inputted into the gating system of the multiplexer which outputs the originally stored count attained by the counter 903 and transferred to the latching register 909 at the end of the engine period which is indicative of the relative richness or leanness of the air/fuel mixture in the exhaust of the engine as detected by the second oxygen sensor.

In either case, the actual count is represented by the multiplexer output signals $\overline{f_{11}}$ through $\overline{f_{16}}$ while the complement is represented by the signals $f_{11}$ through $f_{16}$ and, as hereinafter described, these signals are fed to corresponding inputs of a comparator in the binary to pulse-width converter circuit of FIG. 4D14 for conversion into corresponding pule-widths for further processing.

4.19 Binary to Pulse-Width Converter

The binary to pulse-width converter circuit of block 650 of FIG. 4D is illustrated in the schematic diagram of FIG. 4D14. Broadly speaking, the function of the binary to pulse-width converter circuit of FIG. 4D14 is to generate a pulse-width signal $f_8$ indicative of the richness or leanness of the air/fuel mixture in the exhaust system area monitored by a particular oxygen sensor and to pass the pulse-width signal indicative of the sensor reading through the multiplexer of FIG. 4B to the pulse-width to binary converter of block 413 of FIG. 4 for conversion into a digital word usable by the computer for further processing operations.

The computer, under program control, initiates the request at the beginning of an analog to digital conversion and this request is used to enable the generation of secondary command signals which feed either the stored count indicative of the first oxygen sensor reading or the stored count indicative of the second oxygen sensor reading to a first set of inputs of a comparator whose opposite set of inputs is fed directly to the outputs of the counter. The counter is disabled during the period which the ramp reset pulse $i_0$ is high but begins counting as soon as it again goes low. At this point, the measurement of the pulse-width of the signal $f_8$ is begun. As soon as the counter achieves the predetermined count present at the other set of inputs of the comparator, the comparator output signal terminates generation of the pulse-width signal $f_8$. This measured pulse-width $f_8$ is then fed to the pulse-width to binary converter of block 413 of FIG. 4 and converted to an accurate digital word indicative of the true state of the air/fuel mixture at the location of the chosen sensor.

The detailed description of the binary to pulse-width converter of FIG. 4D14 is as follows. The condition of the sensors at the last test command is represented by the signal $f_7$ which is outputted via lead 839 from the circuit of FIG. 4D10 as previously described. The signal $f_7$, as previously described, is high or a logical "1" whenever the test indicates a cold sensor or one which is otherwise unreliable or unusable while a logical "0" or low indicates that the sensors are valid and stable. The signal $f_7$ is supplied via lead 839 to the $D_i$ input of a two phase dynamic flip-flop 926 having a non-inverting or "Q" output, a first clock phase input $h_a$, and a second clock phase input $h_b$. The two phase dynamic flip-flop is further illustrated in the block diagram of FIG. 9.22A and the schematic diagram of FIG. 9.22B.

As previously described with respect to the latching registers 876 and 909 of FIGS. 4D11 and 4D12 respectively, the end of period shift signal $g_{22}$, which is generated by the presetable counter circuit of 4D5, is supplied via lead 773 to the first clock phase input $h_a$ of flip-flop 926. The signal $e_1$, which is outputted from the circuit of FIG. 4D11 via lead 887, is supplied to the second clock phase input $h_b$ of the flip-flop 926. The signal $e_1$ is a gated signal taken from node 886 at the output of NAND gate 885 whose inputs are the clock signal $h_1$ and the timing signal $g_{21}$ gated to the second input of the NAND gate 885 by the high $h_1$ signal.

As previously described, with reference to the oxygen qualifier circuit of FIG. 4D10, every so many engine periods the oxygen sensors are tested and the signal $f_7$ generated. The generation of the status signal $f_7$ is fed to the $D_i$ input of flip-flop 926 via lead 829 and then entered therein upon the occurrence of the signal $g_{22}$ and latched at the output thereof by the signal $e_1$. The flip-flop 926 then stores the high or low signal $f_7$ indicative of an unusable or usable oxygen sensor system, respectively, until the next computer controlled test is run.

The Q output of the flip-flop 926 supplies the signal $f_7$ to a first inverted input of a logical AND gate 927 having three inverted inputs via lead 928. If, for example, the last oxygen sensor impedence test indicated that one or both of the oxygen sensors were too cold and therefore their impedence too high so that the sensor output results would be invalid or unusable, the signal $f_7$ would be high. Therefore, the signal present at the Q output of the flip-flop 926 and supplied via lead 928 to the first inverted input of AND gate 927 would be high to disable the output of the gate 927 so as to maintain the signal $f_8$ clamped low to inhibit its conversion into a binary number by the circuit of block 413 of FIG. 4 as previously described and therefore prevent computer utilization of same until a favorable test result occurs. Assume, on the other hand, that the last impedance test revealed that the oxygen sensors were warm enough to provide reliable readings. Therefore, the signal $f_7$ on lead 839 would be low. This low signal would be passed to the Q output of flip-flop 926 via the clock signals $g_{22}$ and $e_1$ and as the low is supplied via lead 928 back to the first inverted input of AND gate 927, the first inverted input of AND gate 927 would be enabled.

The command signal $1_0$, which is generated by the microprocessor control system of block 123 of FIG. 2 as hereinafter described, is generated upon computer request to synchronize the ramp generator to the computer program, as previously described, and to initiate a software-commanded analog-to-digital conversion. The signal $1_0$ is supplied via lead 929 to a node 930. Node 930 is connected to a first inverted input of a logical AND gate 931 whose output is cross-coupled back to a second inverted input of AND gate 927. The output of AND gate 927 is used to supply the signal $f_8$ on lead 444 and is simultaneously cross-coupled and fed back to the second inverted input of AND gate 931 so as to form a conventional latch.

The third and final inverted input of AND gate 927 is connected to one current-carrying electrode of a transistor 932 whose opposite current-carrying electrode is connected to a node 933. Node 933 is connected simultaneously to (1) the first current-carrying electrode and gate electrode of a transistor 934 whose opposite current-carrying electrode is connected directly to a +5-volt source of potential; (2) a first current-carrying electrode of a grounding transistor 935 whose opposite current-carrying electrode is connected directly to ground; and (3) the output of a six stage comparator circuit 936 via lead 937. The gate electrode of the transistor 932 is connected to receive the first one megahertz clock phase $H_1$ while the gate electrode of the grounding transistor 935 is connected via lead 938 to a node 939 to be hereinafter explained.

The six stage comparator 936 includes six comparator stages each having a first pair of comparator inputs $Q_1$ and $\overline{Q_1}$ and a second pair of comparator inputs $Q_2$ and $\overline{Q_2}$. The output C of any given comparator stage is given by the logic equation $A \cdot B + A \cdot B = C$. Therefore, the C output of each stage remains normally low. The individual comparator stages may be more fully understood by reference to the comparator circuit block diagram of FIG. 9.30A and the comparator circuit schematic of FIG. 9.30B. The six comparator stages are coupled together such that the comparator output remains low so long as the first set of inputs to any particular stage is unequal to its corresponding second set of inputs. As soon as the first set of inputs of each and every stage of the comparator 936 are equal to the second set of corresponding inputs to each and every comparator stage, then the common C output of all the comparator stages, designated A=B of the comparator combination 936 in FIG. 4D14 will go momentarily high enabling a high to appear at node 933 via lead 937.

The six individual comparator stages making up the overall comparator 936 are each designated as having a first set of inputs designated $Q_1$ and $\overline{Q_1}$ and a second set of comparator inputs designated $Q_2$ and $\overline{Q_2}$ and each of the six stages are designated #1 through #6 respectively. The first set of inputs to the six stages of the comparator are the outputs of the sampling counter multiplexer of FIG. 4D13. The output signals $\overline{f_{11}}$ through $\overline{f_{16}}$ are supplied to the $\overline{Q_1}$ inputs of the first through the sixth comparator stages via leads 924*a* through 924*f* respectively while the inverted output signals $f_{11}$ through $f_{16}$ are supplied to the $Q_1$ inputs of each of the six stages of the comparator 936 via leads 925*a* through 925*f*, respectively. Therefore, the first set of inputs $Q_1$, $\overline{Q_1}$ of each of the six stages of the comparator 936 are supplied with the oxygen status indicative count from the shift register counter 869 if the computer selected the first oxygen sensor and from the shift register counter 903 if the computer selected the second oxygen sensor, via their respective latching registers 876 and 909, respectively and the muliplexer circuit of FIG. 4D13 previously described.

The second set of inputs $Q_2$, $\overline{Q_2}$ of each of the six stages of the comparator 936 are taken from corresponding outputs of a six stage counter 940 each of whose stages comprises a two phase dynamic flip-flop having a $D_i$ input, a non-inverting Q output, a first clock phase input $h_a$ and the second clock phase input $h_b$. Each of the six stages of the counter 940 has its outputs designated with the corresponding reference numeral $Q_1$ through $Q_6$, respectively and the $D_i$ input of the first stage of the counter 940 is adapted to receive logical "1" or logical "0" signals, as hereinafter described, while the Q output of each stage of the counter 940 is adapted to supply its output directly to the $D_i$ input of the subsequent right hand stage as previously described with respect to the other six stage shift register counters of the present invention. The first clock phase input $h_a$ receives the master clock signals $H_1$ while the second clock phase input $h_b$ receives the master clock signals $H_2$.

The output $Q_1$ through $Q_6$ of each of the six stages of the shift register counter 940 is connected directly to the corresponding $Q_2$ comparator input of a corresponding stage of the comparator 936 via the output leads 941*a* through 941*f* respectively. Each of the leads 941*a* through 941*f* represent the non-inverted output $Q_1$ through $Q_6$ of the counter 940 and are supplied to the non-inverted comparator inputs $Q_2$ of the second set of comparator inputs of each of the respective six comparator stages as previously described. The $\overline{Q_2}$ comparator input of the second set of inputs of each of the six stages of the comparator 936 are connected via leads 942*a* through 942*f*, respectively, to the output of the respective inverters 943 through 943*f* which supply the inverted output signals $\overline{Q_1}$ through $\overline{Q_6}$, respectively from the six stages of the counter 940. The input of each of the inverters 943*a* through 943*f* is connected directly to the non-inverted output lead 941*a* through 941*f*, respectively. Therefore, both the non-inverted outputs $Q_1$ through $Q_6$ of the six stages of the shift register counter 940 and the inverted outputs $\overline{Q_1}$ through $\overline{Q_6}$ of the six stages of the counter 940 are supplied via leads 941*a* through 941*f*, respectively and 942*a* through 942*f*, respectively to the $Q_2$ and $\overline{Q_2}$ comparator inputs of each of the six corresponding stages of the comparator 936, as known in the art.

The decoder output circuitry associated with the counter 940 includes four NOR gates represented by the horizontal lines designated 944*a*, 944*b*, 944*c*, 944*d*. The NOR gate represented by the horizontal line 944*d*, is a six input NOR gate having as its inputs, the outputs of the inverters 943*a* through 944*f* respectively and therefore the counter outputs $\overline{Q_1}$ through $\overline{Q_6}$. NOR gate 944*d* is, therefore, adapted to detect an all ones condition in the counter 940 and generates a high output when such a count is reached.

The second NOR gate which is represented by the horizontal line 944*c*, is also a six input NOR gate having as its inputs, the counter outputs $\overline{Q_1}$, $\overline{Q_2}$, $\overline{Q_3}$, $\overline{Q_4}$, $\overline{Q_5}$ and $Q_6$. The output of the NOR gate 944*c* is used as one input of a three input NOR gate represented by the horizontal line 944*b* and as one input of a three input NOR gate represented by the horizontal line 944*a*. The NOR gate 944*c* is used to detect the count immediately prior to the attainment of all ones and disable the NOR gates 944*a* and 944*b* to enable the all ones condition to exist so that the counter can run through all 64 count states.

The NOR gate represented by horizontal line 944*a* has as its other two inputs, the counter outputs $\overline{Q_5}$ and $Q_6$ while the NOR gate 944*b* has as its other two inputs the counter outputs $Q_5$ and $\overline{Q_6}$. The combination of NOR gates 944*a* and 944*b* form an Exclusive OR combination to determine the primary state or loop sequence of the counter 940. The outputs of NOR gate 944*a*, 944*b*, and 944*d* represent the three inputs to the four input NOR gate represented by the vertical straight line 945 whose output is connected directly to the $D_i$ input of the first stage of the shift register counter 940 for determining whether a logical "1" or a logical "0" is supplied thereto. Therefore, the output at the NOR gate 945 which, in turn, is determined by the outputs of the decode NOR gate 944*a*, 944*b*, 944*d* whose outputs form the inputs to NOR gate 945, establish the count cycle or count sequence or loop of the counter 940 which will be more fully understood by referring to the count state table of FIG. 4D8 previously described.

One end of each of the straight lines 944*a*, 944*b*, 944*c*, 944*d* and 945 is illustrated as being commonly connected to one current-carrying electrode and the gate electrode of the corresponding transistor 946*a*, 946*b*, 946*c*, 946*d*, and 947, respectively, whose opposite current-carrying electrode is connected directly to a +5-volt source of potential for serving as pull-up transistors to provide sufficient driving power to the NOR gates to insure proper logic levels, as known in the art. The fourth and final input to the NOR gate represented by the vertical straight line 945 is taken from the output of a logical OR gate 948 having two inverted inputs as hereinafter described.

Node 933 at the output of the comparator 937 is also connected via lead 949 to a first current-carrying electrode of the transistor 950 whose opposite current-carrying electrode is connected directly to the input of an inverter 951 whose output is connected to the first current-carrying electrode of a transistor 952. The opposite current-carrying electrode of transistor 952 is connected directly to the inputs of an inverter 953 whose output is supplied to inverter output node 954. The gate electrode of transistor 950 is supplied with the first phase master clock signals $H_1$ while the gate electrode of the second transistor 952 is supplied with the second phase master clock signals $H_2$.

Inverter output node 954 is connected via lead 955 to a first input of a NOR gate 956 whose output is connected (a) to a first inverted input of a logical OR gate 948 and (b) cross-coupled back as a first input of a second NOR gate 957 whose output is in turn cross-coupled back to the second input of NOR gate 956 to form a latch. The second input of NOR gate 956 is taken from the output of a logical AND gate 958 having one input connected via lead 959 to a command signal input node 960 which receives the secondary command signal $m_{10}$ via lead 961. The secondary command signal $m_{10}$ is generated in the secondary command signal generator of the microprocessor system of block 123 of FIG. 2, as hereinafter described, and designates a computer command ordering the connection of a load to the input lines of the binary to pulse-width converter of FIG. 4D14, as hereinafter described. The second input of logical AND gate 958 is taken from the output of an inverter 962 whose input is taken directly from a node 963. Node 963 is connected directly to the second and last inverted input of logical OR gate 948 and is also connected via lead 964 to a node 965.

The ramp reset signal $i_0$, previously described with reference to the ramp generator circuitry of FIG. 3, is a binary signal which commands the analog-to-digital converter to begin a conversion on the "1" to "0" trailing edge transition of the pulse. During the time which the signal $i_0$ is high, the ramp generator capacitor is discharged to reset the voltage to its initial value as previously described. The signal $i_0$ is generated in the counter control logic circuit of FIG. 4C1, previously described with an appropriate pull-up means added as represented by the +5-volt source of potential and resistor 398 connecting to lead 399 and the ramp generator circuit of FIG. 3F, previously described.

The signal $i_0$ is supplied via lead 966 to the input of the inverter 967 whose output is taken from node 968. Node 968 is connected directly to the input of an inverter 969 whose output is connected to node 939. As previously indicated, node 939 is connected via lead 938 to the gate electrode of transistor 935 but it is also connected directly to a first switch contact. Node 968 is also connected directly to a second switch contact and node 965 is connected to a mask-positionable switch arm 971 which, in the embodiment herein described, is shown as being positioned to be second switch contact to complete a current path directly between the output node 968 at the output of inverter 967 and the node 965 via the second contact and the closed switch arm 971. As known in the art, if a polarity change were required, the position of the arm 971 could be changed to complete an electrical path between node 965 and node 939 via the switching arm 971 and the first contact via conventional LSI masking techniques or the like.

Node 965 is connected to a first current-carrying electrode of a transistor 972 whose opposite current-carrying electrode is connected to a node 973. Node 973 is connected to the input of a first inverter 974 whose output is connected directly to the input of the second inverter 975 whose output is, in turn, connected to an inverter output node 976. Node 973 is also connected to the first current-carrying electrode of a feedback transistor 977 whose opposite current-carrying electrode is connected to the node 976. Node 976 is connected to the first current-carrying electrode of a transistor 978 whose opposite current-carrying electrode is connected to a node 979. Node 979 is connected directly to a first input of NAND gate 981 and to the input of an inverter 982 whose output is connected to the first current-carrying electrode of a transistor 983 whose second current-carrying electrode is connected directly to the second input of NAND gate 981. The gate electrodes of transistors 972 and 983 are connected to receive the first clock phase $h_1$ of the 62.5 kilohertz clock while the gate electrodes of transistors 977 and 978 are connected to receive the second clock phase $h_2$ of the 62.5 kilohertz clock.

The output of NAND gate 981 is connected to a first inverted input of a logical AND gate 984 having three inverted inputs. The second inverted input of AND gate 984 is connected via lead 985 to node 960 for receiving the secondary command signal $m_{10}$ via lead 961.

The third inverted input of AND gate 984 is connected directly to an inverter output node 986. Node 986 is used to supply the enabling signal $l_3$ via lead 987 which enables the secondary command signals $m_7$, $m_8$ and $m_9$ to be generated as valid address decodes as hereinafter described. Inverter output node 986 is also connected directly to the output of an inverter 988 whose input is connected to one current-carrying electrode of a transistor 989 whose opposite current-carrying electrode is connected to the output of an inverter 991 whose input is connected to a first current-carrying electrode of a transistor 992 whose opposite current-carrying electrode is, in turn, connected to a latch output node 993. The gate electrode of transistor 989 is connected to receive the first clock phase $h_1$ from the 62.5 kilohertz clock while the gate electrode of transistor 992 is connected to receive the second clock phase $h_2$. Latch output node 993 also supplies the binary signal $l_4$ via lead 994 to the secondary command signal generator of the microprocessor system of block 123 of FIG. 4 to enable the command signal $m_{10}$ to be validly generated upon a proper address decode, as hereinafter described.

As previously described, the computer requested analog to digital conversion initiation command $l_0$ is supplied via lead 929 to node 930. Node 930 is also connected via lead 995 to a first input of NOR gate 996 whose output is taken from the latch output node 993 for supplying the normally high binary signal $l_4$. Node 993 is also cross-coupled back to a first input of a second NOR gate 997 whose output is cross-coupled back to the second input of NOR gate 996 to form a conventional latch arrangement. A second input of NOR gate 997 is taken via lead 998 from the output of the AND gate 984 having three inverted inputs and the third and final input of NOR gate 997 is supplied via lead 999 to node 954 as previously described.

The operation of the binary to pulse-width converter of FIG. 4D14 will now be briefly described. As previously indicated, the status of the oxygen sensors when the last computer-commanded inpedence test was conducted, is supplied as the signal $f_7$ to the $d_i$ input of flip-flop 926. If the signal $f_7$ was high, indicating a bad condition, AND gate 927 is enabled by a high at one of its inverted inputs and the signal $f_8$ remains permanently low telling the computer that there was, in fact, no pulse-width to binary conversin of an oxygen sensor output since the sensor output was invalid or otherwise unreliable. We will assume, however, for the purpose of describing the operation of the present circuit that the last impedance test indicated that the sensors were usable and the signal $f_7$ was low. When the low signal is fed into the flip-flop 926, the Q output goes low so as to enable the first inverted input of AND gate 927.

Initially, let us assume that a previous conversion has been conducted which would have caused the output of the comparator 936 to go momentarily high and a momentary high at node 933 would cause transistor 934 to conduct so that a high is presented to the second inverted input of gate 927 to maintain the output on lead 444 low. The low at the output of gate 927 is supplied back to enable one inverted input of gate 931 whose other input is also low due to the normally low status of the signal $1_0$ which goes high momentarily only when the computer commands that an analog to digital conversion be initiated. With a low at both inverted inputs of gate 931, its output is high and this signal is fed back to the third inverted input of gate 927 to further disable the gate and latch the output signal $f_8$ low.

So long as the computer has not commanded an analog-to-digital conversion, the signal $l_0$ remains low causing a low to appear at one input of NOR gate 996 for enabling same since the signal $i_0$ is normally low, particularly toward the end of a cycle and prior to the initiation of a new computer commanded A/D conversion, the low on lead 966 will appear as a high at node 968 due to the action of inverter 967. The high at node 968 will continually appear as a high at node 976 because when $h_2$ goes high, transistor 977 conducts to feed the high at node 976 back to input node 973 to recirculate same and when $h_1$ goes high, transistor 972 conducts to pass the high from node 965 through the double inverter combination of inverters 974, 975, causing node 976 to remain high. The high at node 976 will appear at one input to NAND gate 981 but one clock time later, due to the presence of inverter 982, a low will be presented to the other input causing its output to go back high. A high at one inverted input of AND gate 984 will cause its output to go low enabling one input of NOR gate 997. Since $i_0$ is normally low, the high present at node 968 is reflectedas a low at node 939 due to the additional inverter 969. The low present at node 939 is supplied via lead 938 to the gate electrode of transistor 935 causing it to be maintained as non-conductive state.

Since, as previously indicated, node 933 remains high due to the conduction of transistor 934, a high signal is supplied via lead 949 to appear as a high at node 954 due to the double inversion caused by inverters 951 and 953. The high at node 954 is supplied via lead 999 to a second input of NOR gate 997 causing its output to go low. A low at the output of NOR gate 997 causes a low to appear at the second input of NOR gate 996. With both inputs of NOR gate 996 low, the output node 993 goes high and a high signal is supplied back to the third input of NOR gate 997 to latch same.

Therefore, the signal $l_4$ is normally high and since $l_4$ is supplied, after some delay, through the double inversion caused by inverters 991 and 988 to node 986, the signal $l_3$ is also maintained normally high to disable the generation of the signals $m_7$–$m_{10}$ respectively. The high at node 986 also disables gate 984 as previously described. When $l_3$ goes high to disable the generation of the secondary command signals $m_7$, $m_8$, $m_9$, and $m_{10}$, the inputs $\overline{f_{11}}$ through $\overline{f_{16}}$ go to all ones and the inputs $f_{11}$ through $f_{16}$ go to all zeroes thus disabling the comparator output to cause node 933 to go low after one complete 62.5 kilohertz clock period $h_1$,$h_2$.

So long as the signal $l_0$ has not been generated to indicate a computer initiated analog to digital conversion, the signals $l_3$ and $l_4$ remain high to prevent generation of the signals $m_8$ through $m_{10}$. Since $m_{10}$ remains normally low, the third input of gate 984 is enabled but the output of AND gate 958 goes low enabling one input to NOR gate 957. Since the signal $i_0$ is normally low, prior to the signal $l_0$ going high to indicate the initiation of a computer commanded analog to digital conversion, the signal at node 968, node 965, and node 963 is high enabling gate 948 and further disabling gate 958. The low $i_0$ signal, however, causes a high to appear at node 968 and thus a low at node 939 which maintains transistor 935 non-conductive and causes the high of node 933 caused by the conduction of transistor 934 to be supplied via lead 949 as a high at node 954 via the double inverters 951, 953. The high at node 954 is supplied via lead 955 to one input of NOR gate 956 causing its output to go low. This low is supplied back to the second input of NOR gate 957 and since both of its inputs are low, its output is latched high.

This high output signal is supplied back to the second input of NOR gate 956 latching its output low. The low at the output of NOR gate 956 disables gate 948 and causes a logical one or high to appear at its output. Since the output of gate 948 is connected as one input to the four input NOR gate 945, the output of NOR gate 945 remains low thereby feeding only logical zeroes into the $D_i$ input of the first stage of the counter 940 and these zeroes are sequentially shifted through the registers of the counter 940 with each clock phase $H_1$, $H_2$ to clear the counter and keep it cleared until a true count cycle is begun.

When the computer requests an analog to digital conversion, the signal $l_0$ goes momentarily high. When the signal $l_0$ goes momentarily high, the signal $f_8$ goes high since all inputs of gate 927 are now low. However, a momentary high $l_0$ signal supplied to the input of NOR gate 996 causes the output node 993 to go low and this low is supplied back to enable one input of NOR gate 997. When node 993 goes low, the signal $l_4$ goes low to enable the address decode to generate the signal $m_{10}$, if desired. As soon as the clock phases $h_1$ and $h_2$ have occurred, the low from node 992 will be presented to node 986 causing the signal $l_3$ on lead 987 to also go low to enable an address decode of the secondary commanded signals $m_7$ and $m_8$ depending on the particular address decode which will choose whether the count indicative of the value of the first oxygen sensor reading or the count indicative of the second oxygen sensor reading will be converted.

As soon as $m_7$ has been generated to transfer the outputs of the latch register 876 from the first oxygen sensor sampling counter of FIG. 4D11 or the signal $m_8$ is gone momentarily high to enable transfer of the contents of the latch register 909 of the second oxygen sensor sampling counter of FIG. 4D12 to be transferred to the multiplexer of FIG. 4D13 so that the computer selected count, either of the first oxygen sensor reading or the second oxygen sensor reading, will be presented to the first set of inputs, $Q_1$, $\overline{Q_1}$ of the six stages of the comparator 936 as previously described. Meanwhile, shortly after the signal $l_0$ went high to indicate the initiation of an analog to digital conversion, the signal $i_0$ goes high for a predetermined period during which the ramp capacitor is discharged as previously described. With the signal $i_0$ high, a low is presented at node 968, 965 and 963 disabling gate 948 and causing ones to continue to appear at the output. With ones at the output of gate 948, the output of NOR gate 945 continues to feed zeroes into the $d_i$ input of the counter 940 thereby inhibiting its counting.

Similarly, with the signal $i_0$ high, node 968 goes low due to inverter 967 and node 939 goes high due to the action of inverter 969. With a high signal at node 939, a high appears at the gate electrode of transistor 935 via lead 938. A high at the gate electrode of transistor 935 causes it to conduct to hold node 933 to ground. With node 933 connected to ground through conducting transistor 935, transistor 934 is turned off and the normally low output of the comparator 937 appears at node 933. The low at node 933 is supplied via lead 949 back to the double inversion of inverters 951 and 953 so that a low is present at node 954. A low at node 954 is supplied via lead 955 to enable one input of NOR gate 956 which still remains disabled due to the high at its other input from the latched output of NOR gate 957.

The high $i_0$ signal which is inverted 967 and presented as a low at node 963 to disable gate 948 is also inverted by inverter 962 to present a high to one input of AND gate 958. As soon as the signal $m_{10}$ is generated by an address decode or the like as hereinafter described with respect to the microprocessor circuitry of block 123 of FIG. 2, the high is supplied via lead 961, node 960 and lead 959 to the second input of AND gate 958 causing its output to go high. A high at the output of AND gate 958 causes the output of NOR gate 957 to unlatch and go low to present a low to the second input of NOR gate 956.

Since the other input of NOR gate 956 is already low via the low at node 954, its output is latched high to enable one inverted input of the OR gate 948 but since the other input node 963 remains low due to the inversion of the high $i_0$ signal, the output of OR gate 948 remains high so as to continue to disable the counter 940 so long as the ramp capacitor is being discharged.

The high $m_{10}$ signal is also supplied back via lead 985 to one input of gate 984 keeping its output low and preventing the unlatching of the gates 996, 997. If $m_{10}$ is not decoded, then the delayed signal from the output of gate 981 will unlatch the gates 996, 997 so that the circuits are restored to the initial set-up condition again to await another $l_0$ command signal.

As soon as the signal $i_0$ goes high, and the high from node 939 causes transistor 935 to conduct to hold node 933 to ground, on the next clock phase $H_1$, this low is presented at the second inverted input of gate 927 for enabling same. As previously described, when signal $l_0$ went initially high, the output of gate 931 went low for enabling the third inverted input of gate 927. All three inputs of gate 927 are now momentarily low enabling its output, the signal $f_8$ on lead 444, to go high and this high is fed back to disable one input of gate 931 to hold a signal $f_8$ latched high even after $l_0$ returns low. Therefore, the signal $f_8$ is high even while the ramp reset signal $i_0$ is discharging the ramp capacitor since the computer program does not permit the pulse-width to binary conversion of block 413 of FIG. 4 to begin until the signal $i_0$ again goes from high to low indicating the beginning of a new analog to digital conversion period.

As soon as $i_0$ goes low, a high appears at nodes 968, 965, and 963. Since node 963 is supplied to one inverted input of OR gate 948 whose other inverted input is currently latched high, the output goes low and since this output is supplied to the fourth and final input to NOR gate 945, a logical "1" is finally supplied to the $d_i$ input of the first stage of the counter 940 allowing it to begin counting on the high to low transition of the $i_0$ signal. Even though the low $i_0$ will again render transistor 935 non-conductive, node 933 remains low since transistor 934 has been turned off by the low on lead 937 thereby enabling the circuitry to detect equality when a high pulse appears at the output of the comparator 940 and is supplied to node 933 via lead 937. Since the signal $i_0$ will remain low throughout the remainder of the conversion period, a high will continue to be presented to node 963 to enable the first input of gate 948 and the transistor 935 will remain non-conductive for the duration of the conversion period due to the presence of a low at the output of inverter 969.

When $m_{10}$ has gone low causing one inputted AND gate 958 to go low and the high signal present at node 963 is inverted via inverter 962 causing the other input of the AND gate 958 to go low, the output of gate 957 remains latched low due to the high at the output of NOR gate 956 and the latched condition of NOR gates 957 and 956 maintains a one at the other inverted input of OR gate 948 so as to cause the output thereof to remain low so as not to interfere with the normal count sequence of the counter 940.

Assuming first that the counter 940 counts through its sequence until its outputs, which are presented to the second set of inputs of the comparator 936, become equal to the values presented to the first set of comparator inputs, then, when all values are equal, the output of the comparator 936 will go high causing a high to appear at node 933 via 937. The high at node 933 will cause transistor 934 to conduct and when the clock phase $H_1$ again goes high, transistor 932 will conduct to transmit this high to one inverted input of gate 927 causing $f_8$ to go immediately low to define the pulse-width or pulse duration for later conversion into a binary number for subsequent use by the computer as described with reference to the pulse-width to binary converter circuitry of block 413 of FIG. 4 previously described.

When node 933 goes high, this high is transmitted back via node 949 and a high appears at node 954 via the double inversion of inverters 951, 953. A high at node 954 is supplied via lead 955 to one input of NOR gate 956 causing its output to go low since its output is supplied back to the second input of NOR gate 957, both inputs of NOR gate 957 now go low causing its output to go high so as to latch the output of NOR gate 957 high and the output of NOR gate 957 low. With the output of NOR gate 957 low, gate 948 is disabled causing a high to appear at its output. A high at the output of gate 948 will cause a high to appear at one input of the NOR gate 945 causing its output to go low and again supply all zeroes into the counter 940 for clearing same to await the next conversion. Alternatively, while it cannot be readily foreseen how it could happen, if the signal $i_0$ were to again go high signaling the initiation of a new A/D conversion cycle and the discharging of the ramp capacitor, the low at the output of inverter 967 would be supplied via node 968, switch arm 971, node 965, lead 964, node 963 to one inverted input of the gate 948 causing a low to appear at that input therefore disabling the gate 948 and causing a high to appear at one input of NOR gate 945 for disabling the counter 940.

One important feature of the binary to pulse-width converter of FIG. 4D14 which merits additional notice, is the provision for insuring that the computer is able to distinguish between the condition when the signal $f_8$ is continually low due to its being inhibited by a high $f_7$ sensor test signal and the condition wherein an extremely lean mixture caused all zeroes to be inputted as the signals $f_{11}$ through $f_{16}$ to the $Q_1$ inputs of the first set of inputs of the six stages of the comparator 936.

In the latter case, the signal $f_8$ will go high as soon as $I_0$ goes high. Since there is no valid decode made until after $i_0$ goes high, node 933 is normally low before $i_0$ goes high due to a low comparator output via lead 937 and then after $i_0$ goes high, transistor 935 conducts to hold node 933 low even if the comparator output on lead 937 is now high. Therefore, in the latter case, $f_8$ will always be high for some time interval while in the former case, $f_8$ is always low due to a high $f_7$.

So long as node 933 is held low, even if all zeroes are presented to both sets of inputs of the comparator 936, any high outputted pulse is grounded through transistor 935 and cannot terminate the pulse-width pulse $f_8$. Besides, as previously indicated, the computer does not begin counting the pulse-width for pulse-width to binary conversion until the high to low transition of the signal $i_0$. As soon as $i_0$ goes low, transistor 935 is again rendered non-conductive allowing node 933 to go high due to the high on lead 937 due to the all zeroes comparison.

But 933 going high does not immediately terminate the pulse-width output signal $f_8$ since the high is not transmitted to disable gate 927 until the next $H_1$ clock phase occurs. Therefore, two clock phases occur from the time the computer begins counting the high clock pulse $h_8$ until the comparator output signals equality and terminates the $f_8$ pulse. In this manner, the computer program can subtract two clock pulse-widths from every $f_8$ reading in order to obtain accurate results while still being able to differentiate between a two clock phase duration $f_8$ signal indicating an extremely lead air/fuel ratio in the exhaust, i.e., all zeroes in the counter, and a condition of no $f_8$ pulse indicating the $f_7$ inhibit signal was high and the oxygen sensors were invalid or unusable.

4.20 Crankshaft Position Signal Conditioner

Figure 4E:
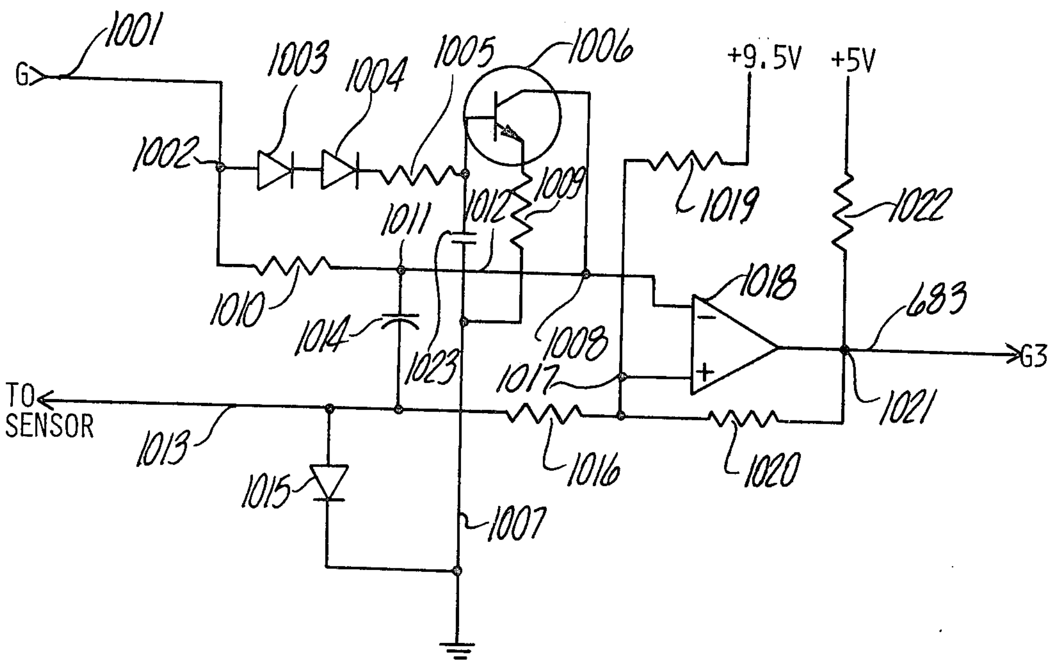
FIG. 4E is an electrical schematic diagram of the crankshaft position signal conditioner circuitry of block 415 of FIG. 4.

The crankshaft position signal conditioner circuitry of block 415 of FIG. 4 will now be further described with respect to the schematic diagram of FIG. 4E. As a brief background, it must be understood that as engine control becomes more sophisticated, a need arises for more accurate engine position or phase information. The greater the accuracy concerning the exact engine position, the greater the possibility of attaining the optimum ignition spark timing, fuel quantity injected and other engine controlled parameters which lead to optimal fuel economy and minimal emissions. The most accurate information is received directly from the crankshaft or from a sensor element directly coupled to the crankshaft through the fewest number of interfaces thereby reducing the part manufacturing tolerance stack-up to a minimum.

A common system to obtain engine position is through the use of a magnetic sensor which produces electrical signals caused by the motion of a magnetic element. Perturbations of a ferrous sensed element such as a cog, hole, slot, or some other surface condition causes a distinct variation in the magnetic field associated with the crankshaft sensor of block 132 of FIG. 2. One of the major problems with this type of sensor is the inability to respond to the desired perturbations while ignoring other variations which cause the magnetic field to change in the sensor.

These unwanted perturbations are increased as the speed of the sensed element is increased. Therefore, when such magnetic sensors are used in internal combustion engine applications, the unwanted perturbations or noise is increased with speed. The speed range of most spark ignition engines is from 30 RPMs for a low speed start to greater than 6000 RPMs while at cruising speeds. The magnetic sensor and the sensed element must be designed to a configuration such that a usable and sufficient amplitude signal be produced at minimum speed. The peak amplitude at low speed is normally a fraction of one volt; however, at higher speeds, signal amplitudes of several tens of volts can be produced. The noise components of the signal due to surface imperfections, vibrations, non-concentric alignment, and other noise components, known in the art, also increase with engine speed but remain substantially as a constant percentage of the total signal output.

Thus, the high speed noise component may be considerably greater than the low speed signal component making it extremely difficult, if not impossible, to discriminate between the two signals. Moreover, the signal component may normally vary over several magnitudes to further complicate the discrimination effort.

Therefore, to produce a useful output signal for processing by other engine circuitry, the sensor output must be conditioned to reject the noise and provide an indication of an angular event with greatly increased accuracy heretofore unattainable in the prior art. The crankshaft position signal conditioner of FIG. 4E produces a clean usable crankshaft position pulse which accurately concurs in phase with the desired sensed magnetic perturbation while substanially ignoring noise and background signals and protecting itself from high peak signal values at high engine speeds. The method and apparatus utilized in the circuit of FIG. 4E is the subject matter of co-pending patent application Ser. No. 828,806 which was filed on Aug. 29, 1977 by Robert S. Henrich for a "Signal Conditioning Circuit for Magnetic Sensing Means" and which is assigned to the assignee of the present invention and incorporated by reference herein.

In summary, the crankshaft position signal conditioner of FIG. 4E provides a signal conditioning circuit for simultaneously discriminating between the variable noise and signal levels from the output of a rotational magnetic position sensor and for generating a signal indicative of the zero crossing of the sensor signal. The signal conditioning circuit includes a comparator for sensing whether the total output signal of the magnetic sensor is greater than a predetermined threshhold which is maintained above the noise level component input to the comparator and the threshold is maintained above the noise component of the magnetic sensor signal by attenuating the magnetic sensor signal with a peak detector in proportion to the peak amplitude of the magnetic sensor signal input. The comparison between the sensor signal and the threshold is performed after the zero crossing of the magnetic sensor signal to provide a leading edge pulse output of the comparator indicative of the zero crossing. By performing the comparison at this point, both the function of noise discrimination and zero crossing are performed simultaneously and the leading edge indication provides the optimum form of angular position information supplied to the crankshaft positioning pulse processor of block 416 of FIG. 4 for further processing as hereinafter described.

The engine crankshaft position sensor output signal G, which is normally an analog-type alternating current signal offset by some predetermined DC level caused by lifting the sensor output from ground, is supplied via the sensor input lead 1001 to an input node 1002. Node 1002 is connected to the anode of a diode 1003 whose cathode is connected directly to the anode of a second series-connected diode 1004 whose cathode is connected through a resistor 1005 to the base of a transistor 1006. Transistor 1006 also has the junction of its base electrode with the resistor 1005 connected to one plate of a capacitor 1023 whose opposite plate is connected to ground via grounding lead 1007. The collector of transistor 1006 is connected directly to an inverting input node 1008 while the emitter electrode of transistor 1006 is connected to the grounding lead 1007 through a resistor 1009 so as to shunt capacitor 1023.

The input node 1002 is also connected to one terminal of a resistor 1010 whose opposite terminal is connected to a node 1011 and node 1011 is connected to the negative comparator input node 1008 through a lead 1012 and to a sensor reference lead 1013 through a capacitor 1014. The sensor reference lead 1013 is also connected to the sensor of block 132 of FIG. 2 and to the anode of a diode 1015 whose cathode is connected directly to the grounding lead 1007. The reference lead 1013 is also connected through a resistor 1016 to the positive comparator input node 1017. The positive comparator input node 1017 is (1) connected directly to the positive or non-inverting input of an operational amplifier configured as a comparator 1018; (2) connected to a +9.5-volt source of potential through a resistor 1019; and (3) connected to the junction of a resistor 1016 and a second resistor 1020 such that one terminal of resistor 1020 is connected to the positive comparator input node 1017 while the opposite terminal is connected to the comparator output node 1021.

The output of the comparator 1018 is supplied directly to the comparator output node 1021 and node 1021 is connected to a +5-volt source of potential through a pull-up resistor 1022. The comparator output node 1021 supplies the properly filtered and shaped engine crankshaft position sensor pulse $G_3$ to the crankshaft position pulse processor of block 416 and the oxygen system integrator circuitry of block 414 of FIG. 2 via output lead 683.

The crankshaft sensor of block 132 of FIG. 2 appears, for all practical purposes, as a variable resistor between the sensor input lead 1001 and the sensor reference lead 1013. The reference lead 1013 is biased one diode drop above ground by diode 1015 which also serves to provide a return path for the sensor. A small high frequency filter comprising resistor 1010 and capacitor 1014 filters out the high frequency noise components from the input signal G before it is presented to the inverting input of the amplifier (comparator) 1018. The amplifier 1018 also has a threshhold bias level established at its non-inverting or positive input node 1017 by the voltage divider effect of the +9.5-volt source of potential, resistor 1019, and the resistor 1016 whose opposite end is connected to the reference lead 1013. The threshold voltage established at node 1017 at the junction of resistors 1019 and 1016 establishes the threshold level of the comparator 1018 and hence the level below which all signals are rejected.

The non-inverting input node 1017 is also connected to the comparator output node 1021 through a feedback resistor 1020 to provide sufficient hysteresis to insure a sharp, snap-action transition of the comparator output when the threshold level is reached by the sensor signal. A pull-up resistor 1022 is connected between the comparator output node 1021 and a +5-volt source of potential to insure proper logic levels and to maintain the comparator output normally high, as known in the art.

The crankshaft position signal conditioner circuit of FIG. 4E also includes a gain feedback control loop comprising the resistor 1005 connected to the base of the transistor 1006 and a capacitor 1023 having one plate connected to the junction of the base of transistor 1006 and resistor 1005 and its opposite plate connected to the grounding lead 1007. Two poled diodes 1003 and 1004 are used to communicate the positive portions of the sensor signal G from sensor input node 1002 to the peak measuring circuit of resistor 1005, transistor 1006 and capacitor 1023.

The collector of transistor 1006 is connected to the inverting input of the amplifier 1018 to modify the input signal G in response to the voltage produced by the peak detector circuit comprising resistor 1005, transistor 1006 and capacitor 1023. Transistor 1006 is further provided with a current-limiting resistor 1009 which prevents the transistor 1006 from shunting more than a predetermined portion of the magnetic sensor signal G to ground.

In operation, the crankshaft position signal conditioner circuit of FIG. 4E will receive the magnetic sensor output signal G between its sensor signal input lead 1001 and its reference lead 1013, as known in the art. The signal is supplied to the inverting input of the comparator-configured amplifier 1018 where it is compared to the threshold established at the non-inverting input node 1017 of the amplifier 1018 by the voltage divider action of resistors 1019 and 1016.

The filter combination of resistor 1010 and capacitor 1014 will filter a portion of the high frequency noise from the input signal G to ground through the diode 1015. A constant threshold value is established by the voltage divider of resistor 1019 and resistor 1016 at their junction 1017 which forms a non-inverting input node of comparator 1018. The comparator 1018 is normally at some predetermined positive level above ground which, if the sensor input signal G is larger than the constant threshold set at node 1017, will produce a sharply falling edge which is latched in by the action of the hysteresis resistor 1020, as known in the art. When the sensor output volage signal G on lead 1001 is less than the offset voltage established by resistor 1016, the comparator 1018 will return to the predetermined higher voltage level so as to generate a sharply defined, negative-going pulse $G_3$ indicative of the crankshaft position for use as hereinafter described.

The peak detector circuitry including resistor 1005, transistor 1006 and capacitor 1023, receives a positive input via the diodes 1003 and 1004 to form a voltage signal which is substantially proportional to the positive peaks of the sensor input signal G to drive the base of the transistor 1006 which is operated in the linear mode. The diodes 1003 and 1004 provide a voltage offset of approximately 1.2 volts before the peak detector becomes operative. The transistor 1006, depending upon the base drive supplied thereto, acts as a variable resistance which, in combination with the input resistor 1010 to the inverting input node 1008 of the comparator 1018 forms a variable attenuator for the peak input signal from the magnetic sensor. The larger the sensor output signal G and the noise component thereof, the more attenuation is provided by the transistor 1006 and input resistor 1010 combination.

Therefore, the offset voltage of the amplifier-configured comparator 1018 always remains in excess of the noise level and thus provides a point at which the falling edge can be generated in substantial synchronism with the negative-to-positive zero crossing of the sensor signal G. The amount of attenuation provided is most advantageously that used for the variable thresholding which is, in the preferred embodiment of the present invention, a 5:1 ratio. Thus, the peak input signal will be limited or attenuated to approximately five times the predetermined ofset voltage.

The use of the constant threshold level with a variable gain on the input signal G to make the circuit less sensitive to noise at high engine speeds while providing relatively high sensitivity for low amplitude signals and reduced sensitivity for a high amplitude signal where noise is greater insures avoiding the problems of the prior art and generating a highly accurate and suitably shaped engine crankshaft position pulse $G_3$ which may be further processed as hereinafter described to achieve a degree of accuracy heretofore impractical, if not impossible, with prior art systems.

4.21 Crankshaft Position Pulse Processor

The crankshaft position pulse processor of block 416 of FIG. 4 will now be described with reference to the schematic diagram of FIG. 4F. The properly shaped and conditioned engine crankshaft position pulse $G_3$ outputted from the crankshaft position signal conditioner circuit of FIG. 4E is supplied via lead 683 to the crankshaft position pulse processor of FIG. 4F and, after suitable short time filtering, it is properly timed and synchronized via gating means and R/S clocked flip-flops to generate various engine crankshaft position pulses $G_1$, $G_2$, $G_4$ and $G_5$ used for various purposes as hereinafter described.

The signal $G_1$ is a properly shaped and filtered crankshaft position signal $G_3$ synchronized and stored until such storage is erased by a software generated computer command and is generally used to generate a computer interrupt signaling the computer that the specified crankshaft position event has occurred. The signal $G_2$ is a binary signal indicating the completion of first complete timing cycle from one $h_3$ clock time to the next after the occurrence of the crankshaft position pulse $G_3$ and is used as hereinafter described. The binary signal $G_4$ is generated to signal the fact that a new crankshaft position pulse $G_3$ has arrived but that the first $h_3$ clock pulse has not yet occurred. This signal stores the trailing edge of the signal $G_5$ until the clock time $h_3$ arrives to generate $G_2$ for use as hereinafter described. Finally, the signal $G_5$ is simply the crankshaft position pulse $G_3$ synchronized to the one megahertz master logic clock, edge detected and rate limited.

The engine crankshaft position pulse $G_3$ is supplied from the output of the signal conditioning circuitry of FIG. 4E via lead 683 and supplied to input node 1024. Node 1024 is connected to the input of an inverter 1025 whose output is connected directly to a first switch contact point. Node 1024 is also connected directly to a second switch contact point. A mask-positionable switch arm 1026 may be positioned between the first and second switch contact points by conventional LSI techniques, as known in the art, and in the preferred embodiment of the present invention, the switch arm 1026 is positioned to contact the second switch contact point so as to establish a contact path between lead 683, node 1024, and the switch arm 1026 to the first current-carrying electrode of a transistor 1027. The opposite current-carrying electrode of transistor 1027 is connected directly to a node 1028. Node 1028 is connected directly to the input of a first inverter 1029 whose output is connected directly to the input of a second series inverter 1030 whose output is connected directly to an inverter output node 1031.

Node 1028 is also connected to the first current-carrying electrode of a transistor 1032 whose opposite current-carrying electrode is connected to the inverter output node 1031. Node 1031 is connected directly to a first input of a three input NOR gate 1041 and to the first current-carrying electrode of a transistor 1033 whose opposite current-carrying electrode is connected to the input of an inverter 1034 whose output is, in turn, connected to the first current-carrying electrode of a transistor 1035. The opposite current-carrying electrode of transistor 1035 is connected to the inut of an inverter 1036 whose output is connected directly to an inverter output node 1037. The inverter output node 1037 is connected to a first current-carrying electrode of a transistor 1038 whose second current-carrying electrode is connected to the input of inverter 1039 whose output is connected to the first current-carrying electrode of another transistor 1040. The opposite current-carrying electrode of transistor 1040 is connected to another input of the three-input NOR gate 1041. The third and final input of the NOR gate 1041 is connected directly to inverter output node 1037.

The first master clock phase $H_1$ is supplied to the gate electrode of transistors 1032, 1033, 1038 while the second master clock phase $H_2$ is connected directly to the gate electrode of transistors 1027, 1035, 1040. The output of the three-input NOR gate 1041 is connected directly to one input of a two input AND gate 1071 via lead 1070 and the output of AND gate 1071 is connected directly to an output node 1042. Node 1042 is connected to the input of an inverter 1043 which outputs the signal $G_5$ via output lead 1044 which is supplied to the camshaft sensor conditioning circuit of the microprocessor system of block 123 of FIG. 2 as hereinafter described. The second input of the two input AND gate 1071 is taken from the output of an inverter 1072 whose input is connected to the non-inverting "Q" output of an R/S flip-flop 1050 via lead 1073.

Node 1042 at the output of the two-input AND gate 1071 is also connected directly to a distribution node 1045. Node 1045 is connected (1) directly to the set input S of an R/S clocked flip-flop with direct reset 1046; (2) to a first inverted input of a logical AND gate 1047 having two inverted inputs; (3) to the set input S of a second R/S clocked flip-flop with direct reset 1048; (4) to a first inverted input of another logical AND gate 1049 having two inverted inputs; (5) to the set input S of a third R/S clocked flip-flop with direct reset 1050; and (6) to a first inverted input of a third logical AND gate 1051 having two inverted inputs. Each of the R/S clocked flip-flops with direct reset used in the circuit of FIG. 4F (i.e., 1046, 1048, 1050 and 1067) are further defined by the block diagram of FIG. 9.21A and the schematic diagram of FIG. 9.21B, and each has a set input S, a reset input R, a direct reset input DR, a first clock phase input $\overline{C}$, a second clock phase input C, a non-inverted output Q, and an inverted output $\overline{Q}$, as known in the art.

As previously described, the set input of R/S flip-flop 1046 is connected directly to node 1045 and the reset input is connected directly to the output of AND gate 1047. The first clock input $\overline{C}$ is supplied with the first master clock phase signal $H_1$ while the second clock input C is supplied with the second master clock phase $H_2$. The $\overline{Q}$ output of flip-flop 1046 is supplied directly to an output node 1052 which outputs the signal $G_4$ via lead 1053 to the engine time interval counter of block 417 of FIG. 4, as hereinafter described. Output node 1052 is also connected directly to a node 1054.

As previously described, the set input of flip-flop 1048 is connected directly to the node 1045 while the reset input is connected directly to the output of the AND gate 1049. As previously described, the first clock phase $H_1$ is supplied to the first clock input $\overline{C}$ while the second clock phase signal $H_2$ is supplied to the second clock input C. The Q input supplies the signal $G_1$ via lead 1055 to the microprocessor system of block 123 of FIG. 2 for use as hereinafter described.

Node 1054 is connected to a first input of a three-input NAND gate 1056 whose second input is connected to receive the binary signal $a_6$ from the engine time interval counter of block 417 of FIG. 4 to indicate that 64 counts have occurred since the last $G_2$ signal via lead 1057. The third input of NAND gate 1056 is adapted to receive the clock signal $h_3$ which is a logic clock pulse occurring once each sixteen master clock pulses $H_1$, $H_2$ and which is used to synchronize all serial operations in the input/output circuit to be hereinafter described. The signal $h_3$ is inputted via lead 1058 from the timing generator of the binary decoder circuitry of block 124 of FIG. 2 as hereinafter described. The output of NAND gate 1056 is connected directly to the second inverted input of AND gate 1051.

As previously described, the set input of flip-flop 1050 is taken from node 1045 and the reset input is connected directly to the output of the AND gate 1051. The first master clock phase signal $H_1$ is supplied to the first clock phase input $\overline{C}$ of flip-flop 1050 while the second master clock phase signal $H_2$ is supplied to the second clock phase input C. The non-inverting output Q of the R/S flip-flop 1050 is connected to the second input of AND gate 1071 via lead 1073 and inverter 1072, as previously described.

The command signal $x_0$ is supplied via lead 1059 to the input of an inverter 1060 whose output is connected directly to the second inverted input of AND gate 1049. The signal $x_0$ is generated by the command signal generator of the microprocessor system of block 123 of FIG. 2, as hereinafter described, and is used to command that an interrupt status word be connected to the microcomputer data bus; the status word being cleared after it is read by the microcomputer, as known in the art.

Node 1054 is also connected to a first inverted input of a logical AND gate 1061 having two inverted inputs. The other inverted input of AND gate 1061 is connected directly to a node 1062. Node 1062 is connected to the output of the timing circuit of block 124 of FIG. 2, as hereinafter described, via lead 1063 and is adapted to receive the inverted logic clock pulse $\overline{h_3}$ which is used to synchronize all serial operations in the input/output circuits as previously mentioned. Node 1062 also supplies the signal $\overline{h_3}$ from lead 1063 to the second inverted input of the previously described AND gate 1047 which is used to reset flip-flop 1046.

The second inverted input of AND gate 1061, which is connected via lead 1064 to the $\overline{h_3}$ input node 1062, is also connected directly to the inverted input of a second logical AND gate 1065 having two inverted inputs. The output of AND gate 1061 is supplied to node 1066 and node 1066 is connected to the second inverted input of AND gate 1065 and is simultaneously connected directly to the set input of another R/S clocked flip-flop with direct reset 1067 while the output of AND gate 1065 is connected directly to the reset input thereof. The first master clock phase signal $H_1$ is supplied to the first clock phase input $\overline{C}$ while the second master clock phase signal $H_2$ is supplied to the second clock phase input C. The signal $G_2$ is supplied from the non-inverted or Q output of flip-flop 1067 via lead 1068. Lead 1068 connects the signal $G_2$ to the engine time interval counter of block 417 of FIG. 4 and to the binary decoder circuitry of block 124 of FIG. 2 for use as hereinafter described.

The power-on reset signal $v_2$ from the reset control circuitry of the microprocessor system of block 123 of FIG. 2 is supplied via lead 713 to the direct reset input DR of each of the R/S clocked flip-flops 1046, 1048, 1050 and 1067 for directly resetting the flip-flops, when required.

The operation of the crankshaft position pulse processor of FIG. 4F will now be briefly described. Initially, assume that some predetermined period has elapsed since the detection of the last properly shaped and conditioned engine crankshaft position pulse $G_3$ from the output of the circuit of FIG. 4E. Therefore, the signal $G_5$ which is the engine crankshaft position pulse $G_3$ synchronized to the logic clock is normally high since it indicates a properly conditioned and synchronized engine crankshaft position pulse by going momentarily low but it remains high between subsequent engine position pulses $G_3$. Therefore, the R/S flip-flops 1046, 1048, 1050 and 1067 can be assumed to be in the reset state. This being so, the signal $G_4$ is in its normally high state since the negative going $G_4$ signal signifies that a new $G_3$ signal has arrived but that the input/output iteration cycle start signal $h_3$ has not yet arrived from the computer. As previously indicated, flip-flop 1046 stores the trailing edge of the $G_5$ signal until the $h_3$ clock time arrives to generate the signal $G_2$.

Similarly, when flip-flop 1048 is reset, the signal $G_1$ present at its Q output on lead 1055 goes low since the transition from low to high of the signal $G_1$ represents a $G_3$ event synchronized and stored until such storage is erased by a software generated computer command as hereinafter described. A high $G_1$ signal generates a computer interrupt as hereinafter described. The Q output of the flip-flop 1067 outputs the signal $G_2$ on lead 1068 and while flip-flop 1067 is reset, the $G_2$ signal is low. The signal $G_2$ will go high to indicate the first input/output logic iteration cycle after the arrival of a properly conditioned engine crankshaft position pulse $G_3$ and flip-flop 1050 being in the reset state causes a low to appear at its Q output. This low is supplied via lead 1070 to the input of inverter 1072 to present a high signal to one input of AND gate 1071 for enabling same. Since the other input of AND gate 1071 is taken via lead 1070 from the output of NOR gate 1041 whose output remains low since one or more of its inputs are high, the output of AND gate 1071 as seen at node 1042 remains low. A low at node 1042 is inverted by inverter 1043 to maintain the high $G_5$ signal on the output lead 1044 between the detection of properly conditioned engine crankshaft position signals $G_3$ as previously described.

The circuitry between the input node 1024 for receiving the properly conditioned engine crankshaft position signal $G_3$ from the output of the circuit of FIG. 4E via lead 683 and the three inputs to NOR gate 1041 constitute a short term filter for noise suppression purposes. This circuitry provides a signal delay of approximately two clock times to insure that a short time duration negative-going noise spike will not erroneously indicate the arrival of an engine crankshaft position pulse and is similar in structure and operation to the short term filter circuitry previously described at the input of the synchronizer circuit of FIG. 4D3.

In operation, at some time prior to the detection of a properly conditioned engine crankshaft position pulse $G_3$, which is a sharply defined negative-going pulse having a clock width of greater than two or three clock times, the signal presented at the input node 1024 will have been normally high for some predetermined period of time since the last engine crankshaft position pulse $G_3$ was detected and again went high. During this time, nodes 1024, 1028, 1031, and 1037 will have gone high while the outputs of inverters 1034 and 1039 will be low. Therefore, at this undetermined point in time, a disabling high from node 1031 is supplied to the first input of NOR gate 1041 for disabling same; a disabling high from node 1037 will be presented to the second input of NOR gate 1041 for disabling same; and each time the second master clock phase $H_2$ goes high, transistor 1040 will conduct to pass the low from the output of inverter 1039 to the third input of NOR gate 1041 so as to enable the third input. However, with a high present at two of its inputs, the output of NOR gate 1041 goes low disabling AND gate 1071 and maintaining the low at node 1042 and a normally high $G_5$ level on lead 1044 as previously described.

Assume now that a properly conditioned engine crankshaft position pulse $G_3$ is outputted from the circuit of FIG. 4E via lead 683 so that the negative-going low signal $G_3$ appears at input node 1024. When the first clock phase $H_1$ goes high, none of the circuit parameters change from that given above but as soon as the second clock phase $H_2$ goes high, transistor 1027 conducts. The conduction of transistor 1027 passes the low from the input node 1024 to the input of the first serial inverter 1029 via the switch path from node 1024 through the switch arm 1026 and through the current-carrying electrodes of transistor 1027. When node 1028 goes low, the output of inverter 1029 goes high and since this is supplied to the input of a second serially-connected inverter 1030, its output, which is supplied to node 1031 will go low. The low at node 1031 is supplied directly to the first input of NOR gate 1041 for enabling same. However, at this point, node 1037 remains high so that NOR gate 1041 has two of its inputs low and one high which still maintains its output low to disable AND gate 1071 as previously described.

The second time the $H_1$ clock phase goes high, transistors 1032, 1033 and 1038 conduct. The conduction of transistor 1032 by-passes the double inversion of inverters 1029 and 1030 and feeds back a low from node 1031 directly to input node 1028. This feedback improves the level of node 1028 if the original low at node 1028 was just below the threshhold level of inverter 1029. This sharpens the output at node 1031 even if the $G_3$ signal has a slow rise or fall time and latches the low at node 1031. The low at node 1031 is supplied to the first input of NOR gate 1041 for enabling same. Since node 1031 was already low from the double inversion previously described, regardless of whether the $H_1$ or $H_2$ clock phase is present, node 1031 will remain latched low to enable the first input of NOR gate 1041 so long as the input node 1024 remains low indicating the presence of the properly conditioned $G_3$ signal.

The conduction of transistor 1033 passes the low from node 1031 to the input of inverter 1034 and causes its output to go high while the conduction of transistor 1038 passes the high from node 1037 at the output of inverter 1036 to the input of an inverter 1039 to maintain its output low as previously described. With the second occurrence of the clock phase $H_2'$, transistors 1027, 1035 and 1040 again conduct. The conduction of transistor 1027 maintains the first input of NOR gate 1041 low so long as the negative-going $G_3$ pulse remains present at the input node 1024. The conduction of transistor 1035 passes the high from the output of inverter 1034 to the input of inverter 1036 and causes a low to appear at node 1037.

Since node 1037 is connected directly to the second input of NOR gate 1041, its second input also goes low. The low previously present at the output of inverter 1039 is passed via conducting transistor 1040 to the third input of NOR gate 1041 and with a low present at each of its inputs, the output of NOR gate 1041 goes high and this high is supplied via lead 1070 to the previously disabled input of AND gate 1071. Since the other input of AND gate 1071 is taken from the output of inverter 1072 whose input is connected to the Q output of flip-flop 1050 via lead 1073 and since flip-flop 1050 is initially in the reset state, a low is present at the Q output causing a high to appear at the output of inverter 1072 thereby causing a high to be present at the other input of AND gate 1071. With a high signal present at both of its inputs, AND gate 1071 goes high causing node 1042 to go high and the output of inverter 1043, the signal $G_5$, which is taken from lead 1044 to immediately go low so that the $G_5$ signal is a negative-going pulse synchronized to the negative-going, properly-conditioned engine crankshaft position pulse $G_3$ and it is synchronized to go low with the clock phase $H_2$.

The next $H_1$ clock phase again causes transistors 1032, 1033 and 1038 to conduct. The conduction of transistor 1032 maintains the first input of NOR gate 1041 enabled so long as the $G_3$ signal present at input node 1024 remains low and the conduction of transistor 1033 passes this low through inverter 1034 causing its output to remain high. However, the conduction of transistor 1038 passes the low from node 1037 through inverter 1039 causing a high to appear at its output.

Therefore, the occurrence of the third $H_2$ clock phase causes transistors 1027, 1035 and 1040 to conduct. Even if the $G_3$ signal is still present as a low at input node 1024, the occurrence of the third $H_2$ clock phase will maintain the first and second inputs of NOR gate 1041 enabled but the conduction of transistor 1040 will pass the high from the output of inverter 1039 to the third input of NOR gate 1041 disabling it and causing its output to go low. As the low at the output of NOR gate 1041 is transmitted via lead 1070 to the input of AND gate 1071, AND gate 1071 will be disabled causing a low to appear at node 1042. The low at node 1042 is inverted by inverter 1043 to cause the signal $G_5$ present on output lead 1044 to go sharply high so that the signal $G_5$ will have been generated as a negative-going pulse having a clock duration of one clock time, i.e., one microsecond in the preferred embodiment of the present invention wherein a one megahertz master clock is used, and the leading and trailing edges of the negative-going, synchronized engine crankshaft position pulse $G_5$ will be synchronous with the second clock phase $H_2$ as previously described.

Therefore, it will be observed that the detection of a proper negative-going $G_3$ signal at the input node 1024 will trigger the generation of the negative-going synchronized engine crankshaft position pulse $G_5$ on output lead 1044 provided the negative-going properly conditioned input signal $G_3$ remains low at node 1024 for the proper time period. For example, if a negative-going voltage spike caused by transient noise or the like was to appear on lead 683 and arrive at node 1024, but was to persist for less than two clock times, the following would occur.

The first clock phase $H_2$ would cause the conduction of transistor 1027 and pass the erroneous low from node 1024 to node 1028 where it would be inverted and reinverted by inverters 1029, 1030 causing a low to appear at node 1031 to enable the first input of NOR gate 1041. The second input of NOR gate 1041 will still be disabled by the high present at the output of inverter 1037 and the third input is enabled by the low present at the output of inverter 1039. The next $H_1$ clock phase will cause transistors 1032, 1033 and 1038 to conduct. The conduction of transistor 1032 will pass the low from node 1028 to maintain the first input of NOR gate 1041 enabled even if the signal $G_3$ went high again at that time and the conduction of transistor 1033 will cause a low at node 1031 to be inverted by inverter 1034 so that a high is present at the output thereof. The next $H_2$ signal will cause transistors 1027, 1035 and 1040 to conduct. The conduction of transistor 1035 will pass the high from inverter 1034 through inverter 1036 causing node 1037 to go low to enable the second input of NOR gate 1041 while the conduction of transistor 1040 passes the low from the output of inverter 1039 to the third input of NOR gate 1041 for enabling same.

However, the conduction of the first transistor 1027 passes the high from node 1024 to node 1028 where it is passed through the double inverter combination 1029, 1030 causing node 1031 to go high to disable the first input of NOR gate 1041 and prevent the output of NOR gate 1041 from going high since the negative-going pulse at the input node 1024 did not persist for the required time duration. Therefore, the input circuitry between the input node 1024 and three inputs of NOR gate 1041 serve as a noise suppressant filter and prevent the circuit from responding to short term negative-going voltage spikes and the like.

As previously described, when the properly-conditioned, negative-going engine crankshaft position pulse $G_3$ is presented via lead 683 to input node 1024, the output of AND gate 1071 will go high for one clock time while the properly synchronized negative-going engine crankshaft position pulse $G_5$ present on output lead 1044 goes low for one clock duration. The high from node 1042 is supplied via lead 1074 to distribution node 1045. The high at node 1045 causes a high signal to be presented to the set input S of R/S flip-flop 1046 and a high to be presented to the set input S of R/S flip-flop 1048 and directly to the set input of a third flip-flop 1050. Simultaneously, the high at node 1045 is presented to a first inverted input of AND gates 1047, 1049 and 1051 forcing the outputs of same to go low, thereby causing a low to be presented to the reset input R of each of the flip-flops 1046, 1048 and 1050, respectively. With a high at the set input and a low at the reset input of the flip-flops 1046, 1048 and 1050, the first clock phase signal $H_1$ will transfer the logical "1" or high signal present at the set input into the flip-flop and the second clock phase signal $H_2$ will latch the logical "1" or high at the Q output simultaneously causing the Q output to go low.

Therefore, the detection of a properly conditioned engine crankshaft position of proper negative-going duration which causes the one clock duration high signal to appear at node 1042 causes flip-flops 1046, 1048 and 1050 to set. The setting of flip-flop 1046 causes its $\overline{Q}$ output to go low. This low appears at output node 1052 and is transmitted via lead 1053 as the negative-going signal $G_4$ signifying that a new $G_3$ signal has arrived but that the input/output logic iteration cycle start signal has not yet arrived.

The setting of flip-flop 1048 causes its Q output to go high so that a logical "1" is transmitted over lead 1055 as the signal $G_1$ to generate a computer interrupt which will remain stored in flip-flop 1048 until it is erased by the generation of a software command $x_0$. Just after the logical "1" at the set input of R/S flip-flops 1046, 1048 and 1050 is latched into same, the third input of NOR gate 1041 goes high causing the output of AND gate 1071 to go low and the signal $G_5$ to be restored to its normally high state.

A low at node 1042 at the output of AND gate 1071 is supplied via lead 1074 to the distribution node 1045. The low at node 1045 provides a logical zero to the set input of flip-flops 1046, 1048 and 1050 simultaneously the low at distribution node 1045 enables one inverted input of each of the AND gates 1047, 1049 and 1051 so that when the other inverted input thereof is enabled, the corresponding flip-flop may be reset. When the command signal generator circuit of the microprocessor system of block 123 of FIG. 2 outputs the momentary high signal commanding that the bit $G_1$ in the interrupt status word be connected to the microcomputer data bus, as hereinafter described, and then cleared immediately after having been read by the microprocessor.

When the $x_0$ decoded signal goes momentarily high to command that the bit $G_1$ in the status word be connected to the data bus, the signal on lead 1059 goes high and this high is supplied to the input of inverter 1060. The output of inverter 1060 goes low and since this low is supplied to the second inverted input of AND gate 1049, its output goes high so long as the $x_0$ command signal remains high. When the output of AND gate 1049 is high, a logical one is presented to the reset input of R/S flip-flop 1048 while a low or logical "0" from node 1045 is supplied to the set input. The occurrence of the first clock phase $H_1$ will feed the input signals into the flip-flop and the $H_2$ clock phase will latch the flip-flop to reset state so that the Q output goes low causing the signal $G_1$ outputted on lead 1055 to go low indicating that the status word has been cleared after being read by the microprocessor.

As soon as flip-flop 1046 has been set by the detection of a properly conditioned sufficient time duration negative-going crankshaft position pulse $G_3$, the $\overline{Q}$ output of flip-flop 1046 goes low. Therefore, since the $\overline{Q}$ output is connected to output node 1052, the signal $G_4$ on lead 1053 goes low and the low is also supplied from the $\overline{Q}$ output node 1052 back to a node 1054. Immediately prior to the setting of flip-flop 1046, the $\overline{Q}$ output was high and the high present at node 1054 via node 1052 was presented to disable one inverted input of AND gate 1061 causing a low to be presented to node 1066 to enable one inverted input of gate 1065 while supplying a low to the set input of flip-flop 1067.

As soon as flip-flops 1046 and 1050 are set by the presence of a high at node 1042, the $\overline{Q}$ output of flip-flop 1046 goes low. The low is supplied from node 1052 to node 1054 and thence to one inverted input of AND gate 1061 to enable same. During this time, let us assume that the signal $h_3$ is low and the signal $\overline{h_3}$ is high. This disables one inverted input of each of the AND gates 1047 and 1061 causing their outputs to remain low. With $h_3$ high, NAND gate 1056 could be enabled but for the fact that the low from node 1054 is supplied back to another of its inputs. When $\overline{h_3}$ goes low, this low is supplied via lead 1063 to node 1062 and then from node 1062 to enable one inverted input of each of the AND gates 1047, 1061 nd 1065. As soon as the flip-flop 1046 was set causing the $\overline{Q}$ output to go low and hence node 1054 to go low, a low was supplied to the other inverter input of AND gate 1061.

Therefore, the presence of a low $\overline{h_3}$ signal at node 1062 causes the output of AND gate 1061 to go high at node 1066 to disable gate 1065 causing a logical "1" to be presented to the set input S of R/S flip-flop 1067 while a logical "0" is presented to the reset input thereof. The occurrence of the first clock phase $H_1$ inputs these values into the flip-flop 1967 such that the occurrence of the second clock phase $H_2$ latches the flip-flop in the set state causing its Q output to go high. Since the Q output is taken on lead 1068, the signal $G_2$ goes high to indicte the first input/output logic iteration after the detection of true engine crankshaft position pulse $G_3$.

Simultaneously with the setting of flip-flop 1067 which is synchronized with the clock $\overline{h_3}$ low, both inputs of AND gate 1047 go low causing its output to go high. With the output of AND gate 1047 high, a logical "1" is presented to the reset input of flip-flop 1046 while a low from node 1045 is supplied to the set input. After the first and second clock phases $H_1$, $H_2$, flip-flop 1046 is reset causing the signal $G_4$ on output lead 1053 from the $\overline{Q}$ output node 1052 to again go high. The high from node 1042 is transmitted to node 1054 to enable one input of NAND gate 1056 and disable one inverted input of AND gate 1061 causing its output at node 1066 to again go low after the flip-flop 1067 has been set and the signal $G_2$ has gone high.

As soon as the $h_3$ clock phase goes low and the clock phase $\overline{h_3}$ goes high, a low $h_3$ signal will disable at NAND gate 1056 and the high $\overline{h_3}$ signal at node 1062 will disable one inverted input of each of the AND gates 1047, 1061 and 1065 causing their outputs to go low since a valid $G_3$ signal has already been detected the output of AND gate 1071 will have returned to its normally low state and the low from node 1042 will be transmitted via lead 1074 to the distribution node 1045. With node 1045 remaining low, the opposite inverted inputs of each of the NAND gates 1047, 1049, 1051, 1061 and 1065 remain enabled.

At the end of the next timing cycle, the signal $\overline{h_3}$ goes high to enable NAND gate 1056 and the signal $h_3$ goes low. The low $\overline{h_3}$ signal is supplied via lead 1063 to node 1062 and thence to the opposite inverted input of AND gate 1047 and to the opposite inverted inputs of AND gates 1061 and 1065. With both inverted inputs of AND gate 1047 low, a high will appear at its output attempting to reset flip-flop 1046 but since it is already reset, the Q output at node 1052 remains high. Therefore, since this high is supplied from output node 1052 to node 1054, one inverted input of gate 1061 remains disabled causing its output at node 1066 to remain low. The low at output node 1066 is supplied to the set input of flip-flop 1067 and directly to the opposite inverted input of gate 1065 to enable same. Since the low $\overline{h_3}$ signal at node 1062 is also supplied to the second inverted input of gate 1065, the output of gate 1065 goes high to supply a logical "1" to the reset input of R/S flip-flop 1067 so that after one clock time $H_1$, $H_2$, flip-flop 1067 is reset causing the signal $G_2$ to go low. In this manner, the signal $G_2$ goes high and remains high for sixteen master clock times after the setting of the flip-flop 1046 and the clock phase $\overline{h_3}$ being low. The sixteen clock time high signal $G_2$ is used to indicate the first input/output logic iteration after the detection of a valid $G_3$ engine crankshaft position pulse.

The circuitry comprising the flip-flop 1050 and logic gates 1056 and 1051 constitute a long-time filter of the conventional bounce-suppression variety which prevent the generation of another properly synchronized engine crankshaft position pulse $G_5$ even if a negative-going pulse duration of sufficient width is presented to the input node 1024 for some predetermined time period after the previous valid engine crankshaft position pulse $G_3$ was detected. Its operation is as follows.

When the first properly conditioned, negative-going engine crankshaft position pulse $G_3$ is detected to be of sufficient duration causing the generation of the negative-going synchronized output $G_5$, the flip-flop 1050 is set after one $H_1$, $H_2$ clock time due to the presence of the high at the distribution node 1045. One clock time later, when the distribution node 1045 goes low, this low is presented to the set input of flip-flop 1050 and the first inverted input of NAND gate 1051 whose output is connected to the reset input of flip-flop 1050 is enabled. The opposite inverted input of AND gate 1051 receives a high signal from the output of NAND gate 1056 so that the output of NAND gate 1051 remains low to keep flip-flop 1050 in the set state for some predetermined period of time, such as one millisecond. The time period is controlled by the output of the three input NAND gate 1056. The first input of NAND gate 1056 is fed back from the $\overline{Q}$ output node 1052 of flip-flop 1046 and node 1054 which is low to disable NAND gate 1056 when flip-flop 1046 is set and then goes low when the flip-flop 1046 is reset the first time the clock phase $\overline{h_3}$ goes low when the distribution node 1045 is low.

As soon as flip-flop 1046 resets, a high is present at the $\overline{Q}$ output node 1052 and therefore at node 1054 and this high signal is supplied back to the first input of NAND gate 1056 for enabling the first input. Each time the divided down clock phase $h_3$ goes high, another input of NAND gate 1056 goes high so that NAND gate 1056 has two inputs enabled each time the clock phase $h_3$ goes high and its output remains low to disable the AND gate 1051 and delay the resetting of flip-flop 1050 since the signal $a_6$ is normally low. The signal $a_6$ is a counter output signal from the engine time interval counter of FIG. 4G, as hereinafter described. which is used to indicate that 64 master $h_3$ clock counts have occurred since the occurrence of the last $G_2$ signal. When $a_6$ goes high to indicate that a predetermined number of clock pulses have been counted by the engine time interval counter of FIG. 4G since the last occurrence of $G_2$, the output of NAND gate 1056 goes low. A low at the output of NAND gate 1056 causes both inverted inputs of AND gate 1051 to be low causing its output to be high. A high at the output of AND gate 1051 presents a logical "1" to the reset input R of the R/S flip-flop 1050 while a low from the distribution node 1045 is presented to the set input S thereof. One clock time later, after $H_1$, $H_2$ have occurred, the R/S flip-flop 1050 is reset causing the Q output to go low.

Previously, the R/S flip-flop 1050 was initially set with the generation of the synchronized negative-going engine crankshaft position pulse $G_5$ and simultaneously with the setting of R/S flip-flop 1046 and 1048. At this time, immediately after a proper $G_3$ signal was detected by the crankshaft position pulse processor of FIG. 4F, the Q output of flip-flop 1050 went high and this high signal was supplied via lead 1073 to the input of an inverter 1072 whose output passed a low to one input of AND gate 1071 to disable AND gate 1071 from detecting any further pulses at the input node 1024 by clamping the output node 1042 low. With the resetting of flip-flop 1050, the Q output goes low and this low is supplied via lead 1073 to the input of inverter 1072 which supplies an enabling high to one input of AND gate 1071 to enable the circuit of FIG. 4F to detect the next proper $G_3$ signal.

Therefore, the engine crankshaft position pulse processor of FIG. 4F is able to detect properly conditioned negative-going engine crankshaft position pulses $G_3$ which are outputted from the circuit of FIG. 4E so as to produce a negative-going engine crankshaft position pulse $G_5$ whose leading and trailing edges are synchronized to the $H_2$ clock phase. The circuit of FIG. 4F includes a short time filter for noise suppression purposes which enables the circuit to filter out negative-going input transients or noise signals of short duration and a long time bounce suppression filter which prevents a second crankshaft position pulse from being detected for some predetermined period after the detection of a properly conditioned $G_3$ pulse even if its time duration is greater than that of the short time filter.

Flip-flop 1050 is reset at the end of the predetermined period by a signal $a_6$ from the engine time interval counter of FIG. 4G, as hereinafter described, so as to enable the detection circuitry to detect the next properly conditioned negative-going engine crankshaft position pulse $G_3$ of sufficient negative time duration. Simultaneously, flip-flop 1046 generates a positive-going pulse $G_4$ which signifies the arrival or detection of a new $G_3$ signal which indicates that the input/output logic iteration start cycle has not yet arrived since flip-flop 1046 stores the trailing edge of the $G_5$ pulse until after the arrival of the $h_3$ clock phase which generates $G_2$. Flip-flop 1048 responds to the detection of a proper $G_3$ signal to output a computer interrupt signal $G_1$ which is stored in the flip-flop until a software-generated command signal causes the interrupt status word to be connected to the microprocessor data bus and then clears the flip-flop 1048 after the interrupt has been read by the microprocessor.

Lastly, flip-flop 1067 generates a positive-going signal $G_2$ on the first input/output logic iteration cycle after the detection of a proper engine crankshaft position pulse $G_3$ and this iteration cycle lasts, as hereinafter described, sixteen master clock times. The outputs of the crankshaft position pulse processor circuit of FIG. 4F will be used for various timing and synchronization purposes as hereinafter described.

4.22 Engine Time Interval Counter

The engine time interval counter of block 417 of FIG. 4 will now be described with reference to the schematic diagram of FIG. 4G. The engine time interval counter of FIG. 4G includes means for measuring the engine time interval; means for detecting an engine stall condition; and means for generating an alarm signal whenever certain types of faults are detected.

Figure 4G:
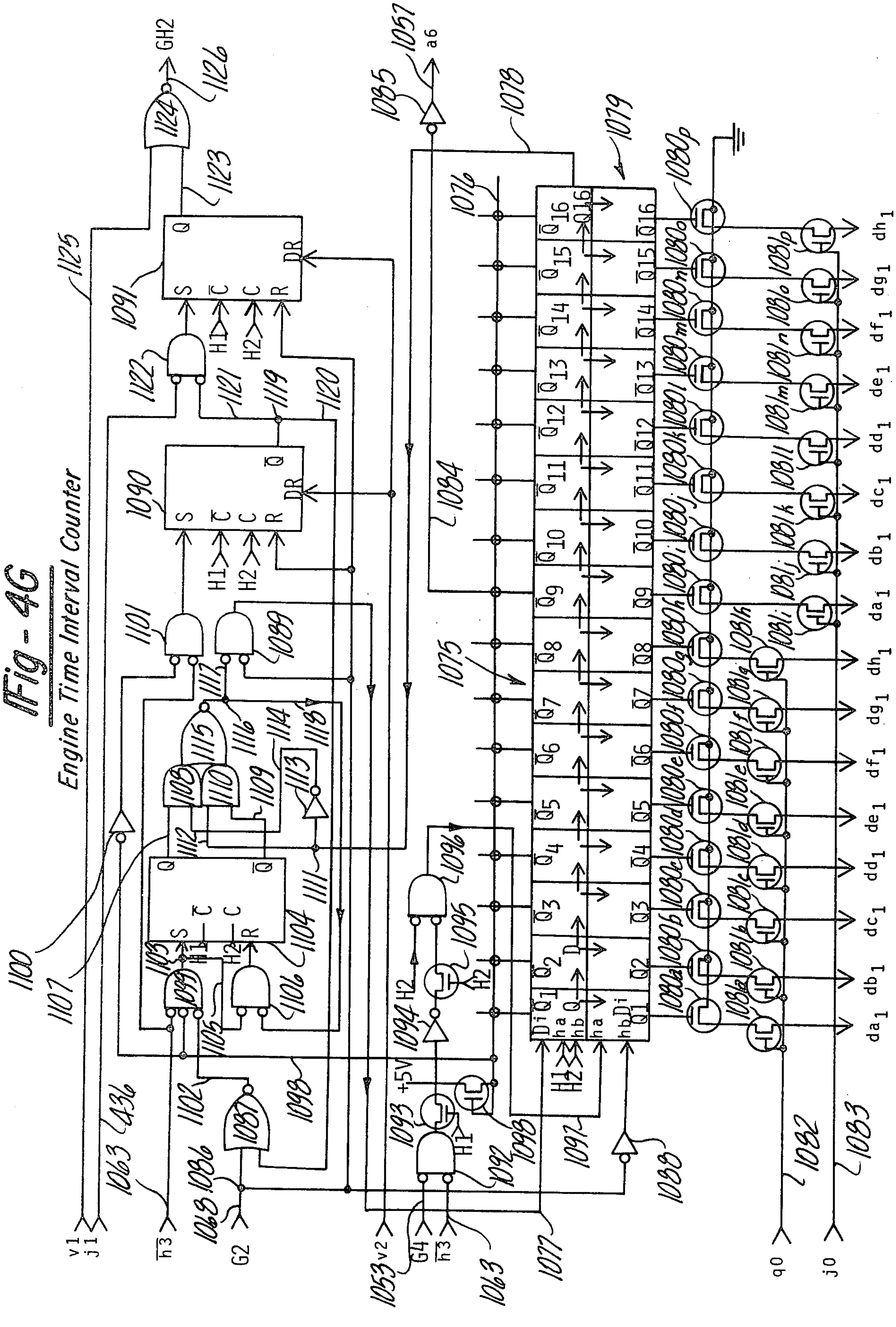
FIG. 4G is an electrical schematic diagram of the engine time interval counter circuitry of block 417 of FIG. 4.

The circuit of FIG. 4G includes an engine time interval counter which measures the time interval between the occurrence of successive engine crankshaft position pulses $G_3$. The engine time interval measurement functions by incrementing a serial binary word by one count once each sixteen microseconds and hence once each timing counter cycle since, in the preferred embodiment of the present invention, a one megahertz master clock is utilized, and this incrementing is continued for the duration of time between two successive engine crankshaft position pulses $G_3$. The least significant bit in the engine time interval counter has a weight of sixteen microseconds in the embodiment illustrated.

The time interval storage register described hereinbelow is, in the preferred embodiment of the present invention, a serial dynamic shift register in combination with a half adder circuit means used to provide a binary counter function. The combination of a serial register with a half adder circuit means are utilized in the design of the present invention because the combination results in a much smaller surface area when the circuit is implemented in custom LSI but maintains high accuracy and reliability. The details of the engine time interval counter and storage means, the half adder circuit means, the stall detection circuit means, and the alarm circuit means will now be described in detail with reference to the schematic diagram of FIG. 4G.

The engine time interval counter of FIG. 4G includes a sixteen stage shift register each stage of which is a two phase dynamic flip-flop such as that shown in the block diagram of FIG. 9.22 A and the circuit diagram of FIG. 9.22B. Each of the sixteen stages of the serial shift register includes a data input $D_i$, a first clock phase input $h_a$, a second clock phase input $h_b$, a non-inverting Q output and an inverting $\overline{Q}$ output. Each of the sixteen stages of the serial shift register have their inverting output designated $\overline{Q_1}$ through $\overline{Q_{16}}$. The sixteen stage serial shift register is referred by the reference numeral 1075 and the sixteen stage shift register is formed as follows. The first master clock phase $H_1$ is connected to each of the clock phase inputs $h_a$ of each of the sixteen two phase dynamic flip-flops making up the shift register 1075 and the second master clock phase $H_2$ is connected to the second clock phase input $h_b$ of each of the sixteen stages. The inverting output $\overline{Q_1}$ through $\overline{Q_{16}}$ whose numbers designates the corresponding stage in the shift register 1075 is connected directly to one input of a sixteen input NOR gate which is represented by the horizontal line 1076 where the circled intersection of the output lead from the $\overline{Q_1}$ through $\overline{Q_{16}}$ from the shift register stages intersects the horizontal line 1076 in accordance with the convention of FIG. 9. The non-inverting Q output of each of the stages of the shift register 1075 is supplied to the $D_i$ input of the next higher stage with the $D_i$ input of the first shift register stage being connected to receive the logical "1" or logical "0" via external lead 1077 and the non-inverting Q output of the sixteenth and final stage of the serial shift register 1075 being connected to the shift register output lead 1078.

Additionally, each of the sixteen stages of the serial shift register 1075 has associated with it a corresponding buffer stage or latch. Each of the latching stages can be, for example, a similar two-phase dynamic flip-flop having a $D_i$ data input, a first clock phase input $h_a$, a second clock phase input $h_b$, and an inverting output $\overline{Q}$. Each of the outputs of the latching registers which are referred to collectively by the reference numeral 1079 has its $D_i$ input connected to the non-inverting Q output of its associated shift register stage of serial shift register 1075 and each has a correspondingly numbered $\overline{Q}$ output so that the latching registers 1079 have their outputs designated $\overline{Q_1}$ through $\overline{Q_{16}}$ respectively with each of the similarly numbered latching stages of the latching register 1079 corresponding to a similarly numbered shift register stage of the serial shift register 1075.

The outputs $\overline{Q_1}$ through $\overline{Q_{16}}$ of the shift register latching stages 1079 are connected directly to the gate electrode of corresponding grounding transistors 1080*a* through 1080*p*. One current-carrying electrode of each of the transistors 1080*a* through 1080*p* is commonly connected to ground while the opposite current-carrying electrode is connected to a first current-carrying electrode of a correspondingly designated output transistor 1081*a* through 1081*p* respectively. The gate electrode of each of the output transistors 1081*a* through 1081*h* which comprise the eight most significant bits from the output of the latch registers 1079 are commonly connected to a command signal $q_0$ via lead 1082. The signal $q_0$ is a computer-generated command signal which goes high to connected the most signficant word of the engine time interval counter to the data bus. The second current-carrying electrode of each of the transistors 1081*a* through 1081*h* are connected to corresponding leads on the data bus and are designated as outputs $da_1$, $db_1$, $dc_1$, $dd_1$, $de_1$, $df_1$, $dg_1$, $dh_1$, which correspond to the similarly lettered grounding and output transistors 1080*a* through 1080*h* and 1081*a* through 1081*h*, respectively.

Similarly, the gate electrode of each of the output transistors 1081*i* through 1081*p* is commonly connected via lead 1083 to receive the computer generated command signal $j_0$ which connects the least significant word of the engine time interval counter to the data bus as hereinafter explained. While the first current-carrying electrode of each of the output transistors 1081*i* through 1081*p* are connected to the non-grounded current-carrying electrode of transistors 1080*a* through 1080*p* respectively, the opposite current-carrying electrodes are connected directly to the corresponding data bit positions of the data bus designated $da_1$, $db_1$, $dc_1$, $dd_1$, $de_1$, $df_1$, $dg_1$ and $dh_1$.

The $\overline{Q_9}$ output of the ninth stage of the serial register 1075 is connected not only to one input of the sixteen input NOR gate 1076 but is also connected via output lead 1084 to the input of an inverter 1085 whose output is connected via lead 1057 to supply the signal to $a_6$ to the circuit of FIG. 4F as previously described to indicate the presence of a logical "1" at the ninth bit position of the serial shift register 1075. Normally, if the ninth bit position is low, a high will appear at the $\overline{Q_9}$ output causing a low to appear on lead 1057 but whenever a logical "1" is present in the ninth stage, the $\overline{Q_9}$ output goes low and this low is supplied via lead 1084 to the input of an inverter 1085 whose output supplies a high $a_6$ signal to NAND gate 1056 of the circuit of FIG. 4F via lead 1057 as previously described to indicate that the 64th count has been attained when the $h_3$ signal goes high to cause the output of NAND gate 1056 to go low for de-activating the long-term bounce-suppression filter and re-enabling the crankshaft position pulse processor of FIG. 4F to detect the presence of a new properly conditioned negative-going engine crankshaft position pulse $G_3$, as previously described.

The Q output of R/S flip-flop 1067 of FIG. 4F is connected via lead 1068 to supply the signal $G_2$ to input node 1086. Node 1086 supplies the $G_2$ signal to one input of a logical NOR gate 1087; to the input of an inverter 1088; to a first inverted input of a logical AND gate 1089; to the reset input R of an R/S clock flip-flop 1090 and to the reset input R of a second R/S clock flip-flop 1091. The output of the AND gate 1089 is connected via lead 1077 back to the $D_i$ input of the first stage of the serial shift register 1075 while the output of inverter 1088 is connected to the second clock phase input $h_b$ of each of the stages of the latching register 1079. The power-on reset signal $v_2$ may be supplied directly to the direct reset DR inputs of flip-flops 1090 and 1091 to initially reset same when the signal $v_2$ goes high.

The signal $G_4$ is taken from the $\overline{Q}$ output node 1052 of the R/S flip-flop 1046 of the circuit of FIG. 4F and supplied via lead 1053 to a first inverted input of logical AND gate 1092 whose opposite inverted input is connected to receive the clock signal $\overline{h_3}$ via lead 1063. The output of AND gate 1092 is connected directly to the first current-carrying electrode of a transistor 1093 whose opposite current-carrying electrode is connected to the input of an inverter 1094. The output of the inverter 1094 is connected to the first current-carrying electrode of a second transistor 1095 whose opposite current-carrying electrode is connected to the first inverted input of a second logical AND gate 1096 whose opposite inverted input is connected to receive the second master clock phase signals $H_2$. The gate electrode of transistor 1093 is adapted to receive the first master clock phase signal $H_1$ while the gate electrode of transistor 1095 is adapted to receive the second master clock signal $H_2$. The output of AND gate 1096 is connected via lead 1097 to the first clock phase input $h_a$ of each of the stages of the latching register 1079 previously described.

One end of the horizontal line 1076 which represents a sixteen input NOR gate is shown as being commonly coupled to the gate electrode and one current-carrying electrode of a transistor 1098 whose opposite current-carrying electrode is connected directly to the +5-volt source of potential for serving as a pull-up transistor to provide the necessary power to drive the sixteen input NOR gate 1076 and insure proper logic levels. The output of the sixteen input NOR gate 1076 is supplied via lead 1098 to one inverted input of a logical AND gate 1099 having three inverted inputs and to the input of an inverter 1100 whose output is connected directly to a first inverted input of a logical AND gate 1101 having two inverted inputs while the output of AND gate 1101 is connected directly to the set input S of the R/S flip-flop 1090.

A second inverted input of the AND gate 1099 is taken from the output of NOR gate 1087 via lead 1102 while the third and final inverted input of AND gate 1099 is connected via lead 1063 to the clock signal $\overline{h_3}$ which is also supplied simultaneously to the second inverted input of the AND gate 1101. The output of AND gate 1099 is supplied directly to a node 1103 and node 1103 is connected directly to the set input S of a clocked R/S flip-flop 1104. Node 1103 is also connected via lead 1105 to the first inverted input of a logical AND gate 1106 having two inverted inputs. The output of AND gate 1106 is connected directly to the reset input R of the clocked R/S flip-flop 1104. The first clock phase input $\overline{C}$ of R/S flip-flop 1104 is adapted to receive the master clock signal $H_1$ while the second clock phase input C is adapted to receive the master clock signal $H_2$.

The non-inverting Q output of the R/S flip-flop 1104 is connected via lead 1107 to a first input of a logical AND gate 1108 while the $\overline{Q}$ output of the R/S flip-flop 1104 is connected via lead 1109 to a second logical AND gate 1110. As previously described, the non-inverting $Q_{16}$ output of the sixteenth stage of the serial shift register 1075 is connected via lead 1078 back to a node 1111. Node 1111 is connected directly to a second input of logical AND gate 1110 via lead 1112 and to the input of an inverter 1113 whose output is connected via lead 1114 to the second input of AND gate 1108. The output of AND gate 1108 is connected directly to one input of a NOR gate 1115 whose second input is connected directly to the output of the second AND gate 1110. The output of NOR gate 1115 is connected directly to the output node 1116. Node 1116 is connected via lead 1117 to the second inverted input of AND gate 1089 and via lead 1118 to the second inverted input of AND gate 1106.

As previously described, the output of AND gate 1101 is connected directly to the set input S of the R/S flip-flop 1090 whose reset input is connected directly to the input node 1086 for receiving the $G_2$ reset signal. The first clock phase input $\overline{C}$ is adapted to receive a first master clock phase $H_1$while the second clock phase input C is adapted to receive the second master clock signal $H_2$. The inverting $\overline{Q}$ output of R/S flip-flip 1090 is connected directly to an output node 1119 and the output node 1119 is connected via lead 1120 back to the second input of NOR gate 1087 and via lead 1121 to the first inverted input of a logical AND gate 1122 whose second inverted input is adatped to receive the signal $J_1$ via lead 436. The signal $J_1$ is the engine start or cranking signal J conditioned to the logic signal levels, as hereinafter described.

The output of AND gate 1122 is connected directly to the set input S of the clocked R/S flip-flop 1091 whose reset input is also adapted to receive the $G_2$ signal from input node 1086. The first clock phase input $\overline{C}$ is adapted to receive the master clock signal $H_1$ while the second clock phase input C is adapted to receive the second master clock signal $H_2$. The non-inverting output Q of the R/S flip-flop 1091 is connected via lead 1123 to one input of a NOR gate 1124 whose opposite input is adapted to receive the signal $v_1$ via lead 1125. The signal $v_1$ is a clock failure indication generated as hereinafter described wherein a logical "1" indicates clock failure and a logical "0" represents the absence of a clock failure. The output of NOR gate 1124 supplies the alarm signal $GH_2$ which is outputted via lead 1126 for use as hereinafter described.

As previously indicated, the combination of the sixteen stage serial shift register 1075 with the half adder circuitry which includes the clocked R/S flip-flop 1104 and gates 1087, 1099, 1106, 1108, 1110, 1115, 1089, and inverter 1113 combine to function as a true binary counter with the same accuracy and reliability but can be implemented in LSI technology using considerably less chip area. The operation of the shift register 1075 and half adder circuitry to function as a binary counter will now be briefly described. As was previously described, the crankshaft position pulse processor circuitry of FIG. 4F generates the signal $G_4$ which signifies that a properly conditioned engine crankshaft position pulse $G_3$ has arrived but that the input/output logic iteration cycle start signal has not yet arrived.

The signal $G_4$ is a negative-going pulse which goes low when flip-flop 1046 is set when the synchronized engine crankshaft position pulse $G_5$ is outputted and then returns to its normally high state when the flip-flop 1046 is reset when the signal $\overline{h_3}$ goes low. Since $G_4$ is supplied to one inverted input of AND gate 1092 via lead 1053 while the signal $\overline{h_3}$ is supplied to the other inverted input, on the trailing edge of the $G_4$ pulse, both inverted inputs are low causing a high to appear at the output of AND gate 1092. The next clock phase signal $H_1$ will cause transistor 1093 to conduct and pass the high from the output of AND gate 1092 to the input of inverter 1094 causing a low to appear at its output. The next $H_2$ clock signal will cause transistor 1095 to conduct to pass the low from the output of inverter 1094 to one inverted input of AND gate 1096 for enabling same. When the $H_2$ clock signal goes low, AND gate 1096 outputs a high signal on lead 1097 to the first phase clock input $H_a$ of each of the stages of the latch register 1079 causing the signal present at the Q output of each of the sixteen stages of the serial shift register 1075 to be transferred into the $D_i$ input of the corresponding latching stage 1079.

As previously described, when R/S flip-flop 1046 of FIG. 4F is initially set to indicate the detection of a new $G_3$ engine crankshaft position pulse, the output signal $G_4$ goes momentarily low. This low signal enables one inverted input of AND gate 1061. When the signal $h_3$ goes high, which occurs once each sixteen clock times, the normally high $\overline{h_3}$ signal goes low to reset the R/S flip-flop 1046 and cause the termination of the $G_4$ pulse while simultaneously enabling the other inverted input of AND gate 1061 to set R/S flip-flop 1067 and cause the signal $G_2$ to go high. When the signal $G_2$ goes high, it remains high for sixteen clock times before being reset to cause the signal $G_2$ to go low at the end of the first sixteen counts after the detection of a new engine crankshaft position pulse $G_3$ and the outputting of the synchronized engine crankshaft position pulse $G_5$. When $G_2$ goes high, the high is supplied via lead 1068 to node 1086 and thence to one input of NOR gate 1087 causing its output to go low. This low is supplied via lead 1102 to one inverted input of AND gate 1099 to enable same.

A second inverted input of AND gate 1099 is connected to the output of NOR gate 1076 via lead 1098 and assuming that an all ones condition does not exist in the shift register 1075, a low is outputted from NOR gate 1076 via lead 1098 to enable the second input of AND gate 1099. As soon as the $h_3$ clock signal goes high, which occurs once each sixteen master clock times, the signal $\overline{h_3}$ goes low to enable the third and last inverted input of AND gate 1099 and cause the AND gate 1099 to output a high to node 1103. The high on node 1103 will supply a logical "1" to the set input of R/S flip-flop 1104 and disable AND gate 1106 to supply a low to the reset input so that after one clock time $H_1$, $H_2$, the R/S flip-flop 1104 is set causing the Q output to go high and the $\overline{Q}$ output to go low so that the gating logic including AND gates 1108 and 1110, NOR gate 1115, and the AND gate 1089 with inverted inputs will complement the output of the last stage of the serial shift register 1075 which is supplied via lead 1078 to node 1111. Node 1111 supplies the uncomplemented output of the sixteenth stage of the serial shift register 1075 to the first input of AND gate 1110 via lead 1112 while the second input to AND gate 1110 is supplied via lead 1109 from the $\overline{Q}$ output of the set flip-flop 1104. Simultaneously, the value from the sixteenth stage of the shift register 1075 is supplied from the node 1111 through inverter 1113 so that the complement thereof is supplied to a first input of AND gate 1108 whose second input is connected to the Q output of R/S flip-flop 1104 via lead 1107.

However, so long as the signal $G_2$ is high, the high at node 1086 is supplied to one inverted input of the logical AND gate 1089 causing its output to be low since the output of the AND gate is connected via lead 1077 back to the $D_i$ input of the first stage of the serial shift register 1075, the high $G_2$ signal forces zeroes to be inputted into the serial shift register 1075 for the first sixteen counts. This serves to clear the serial shift register 1075 and cause all zeroes to be stored therein.

After the serial shift register 1075 has been cleared after the first sixteen clock times, the signal $G_2$ goes low causing node 1086 to go low to enable one input of NOR gate 1087 as soon as the signal at node 1086 goes low, inverter 1088 supplies a high to the second clock phase input $h_b$ of the latching registers 1079 causing the count previously inputted into the latching registers from the serial shift register counter 1075 to be stored in the corresponding latch register stages thereof and latched therein. Simultaneously, a low at node 1086 enables one inverted input of AND gate 1089 so that AND gate 1089 is no longer forced to output only zeroes and the half adder circuitry is enabled as described hereinbelow.

The half adder circuitry and the serial shift register 1075 operate such that the value stored in the sixteenth stage of the serial shift register 1075 is fed back to the half adder circuitry where it is complemented and the complement supplied back to the $D_i$ input of the first stage of the serial shift register 1075 until the detection of the first zero. The first zero is also complemented but all values after that are passed through in an uncomplemented fashion. The complementing or un-complementing of the value outputted from the sixteenth stage of the serial shift register 1075 is determined by the state of the R/S flip-flop 1104 which causes the outputted value to be complemented when the R/S flip-flop 1104 is set and causes it to pass through in an un-complemented manner whenever the R/S flip-flop 1104 is reset as hereinafter described. The detection of the first zero causes resetting of the R/S flip-flop to control the sequence as hereinafter described.

For example, on the seventeenth clock time, which is the first full clock time after all sixteen stages of the serial shift register 1075 have been cleared by being filled with zeroes from the output of the disabled AND gate 1089 via lead 1077, the zero from the sixteenth stage is passed via lead 1078 to node 1111 so that a logical zero is presented to the first input of AND gate 1110 via lead 1112 while its complement, a logical "1" is supplied from the output of inverter 1113 to the first input of AND gate 1108 via lead 1114. Since the R/S flip-flop 1104 was previously set when $G_2$ when high, a logical "1" is outputted from the Q output via lead 1107 to the second input of AND gate 1108 while a logical "0" is outputted via lead 1109 from the $\overline{Q}$ output to the second input of AND gate 1110.

Since a one is present at both inputs of AND gate 1108, its output is high and since zeroes are presented to the inputs of AND gate 1110, its output goes low. With a high present at one input of NOR gate 1115 and a low at the other input, the output of NOR gate 1115 supplies a low signal to node 1116. The low from node 1116 is supplied via led 1117 to the other inverted input of AND gate 1089 causing its output to go high and a logical "1" to be supplied via lead 1077 back to the $D_i$ input of the first stage of the serial shift register 1075. Simultaneously, the low from node 1116 is supplied via lead 1118 back to the second inverted input of AND gate 1106 and since lows are now present at both of its inputs, the output of gate 1106 goes high causing flip-flop 1104 to reset.

On the next clock time, another zero is outputted from the sixteenth stage of the serial shift register 1075 via lead 1078 and supplied to node 1111. Again, the zero is supplied via lead 1112 to one input of AND gate 1110 while a logical "1" is supplied to the output of inverter 1113 via lead 1114 to one input of the AND gate 1108. However, since the R/S flip-flop 1104 has now been reset, a low from the Q output is supplied via lead 1107 to the other input of AND gate 1108 while a high is supplied from the $\overline{Q}$ output via lead 1109 to the other input of AND gate 1110. With a high and a low present at each of the inputs of each of the AND gates 1108, 1110, both outputs are low. And since both of these lows are supplied as the inputs to NOR gate 1115, its output goes high and this high is supplied to node 1116. The high at node 1116 is supplied back via lead 1118 to disable AND gate 1106 and cause its output to go low so that the R/S flip-flop 1104 may be set at the end of sixteen clock times when the signal $\overline{h_3}$ again goes low. Meanwhile, the logical "1" present at node 1116 is supplied via lead 1117 to disable one inverted input of AND gate 1089 and cause its output to go low. The low outputted from AND gate 1089 is supplied as a logical "0" to the $D_i$ input of the first stage of the serial shift register 1075 via lead 1077.

The first zero detected by the half adder circuitry previously described was complemented and a logical "1" supplied back to the input of the first stage of the shift register 1075 but subsequent zeroes and, in fact, any subsequent values, are passed through after the R/S flip-flop 1104 is reset in the un-complemented form so that after the second sixteen clock times, the first count cycle after clear, the serial shaft register 1075 will store the binary number 0000000000000001. Assuming that the R/S flip-flop 1090 remains in the reset state, NOR gate 1087 remains disabled so that a low is supplied via lead 1102 to enable one inverted input of AND gate 1099 and since we do not have an all ones conditions in the serial shift register 1075, the second inverted input of AND gate 1099 is also enabled. Therefore, on the sixteenth clock time, the normally high signal $\overline{h_3}$ again goes low to enable the third and final inverted input of AND gate 1099 causing its output go to high. A high at the output of AND gate 1099 is supplied to node 1103 and thence directly to the set input of R/S flip-flop 1104 and via lead 1105 to disable AND gate 1106 causing a low to be supplied to the reset input. At the next clock time, R/S flip-flop 1104 is again set to cause the output of the serial shaft register 1075 to be complemented until the first zero is detected as previously described.

The first clock time of the third input/output logic iteration cycle, after the detection of the engine crankshaft position pulse $G_3$, the second count cycle after clearing the counter 1075, outputs the logical "1" which was previously stored in the sixteenth stage of the serial shift register 1075 via lead 1078 to node 1111. From there, the high is supplied to a first input of AND gate 1110 and a low is supplied from the output of inverter 1113 via lead 1114 to one input of AND gate 1108. Since the R/S flip-flop 1104 is set, a high is supplied from the Q output via lead 1107 to the other input of AND gate 1108 while a low is taken from the Q output and supplied via lead 1109 to the other input of AND gate 1110.

Therefore, on the first clock time of this cycle, a one and a zero is supplied to the two inputs of each of AND gates 1108 and 1110 causing both of their outputs to go low and a high to be outputted from NOR gate 1115 to node 1116. The high at node 1116 will be passed via lead 1117 to the second inverted input of AND gate 1089 so that its output goes low to pass a logical "0" to the $D_i$ input of the first stage of the sixteen stage serial shift register 1075 via lead 1077. Simultaneously, the existence of a high at node 1116 will hold AND gate 1106 disabled via lead 1118 to prevent the resetting of the R/S flip-flop 1104. On the second count of the third sequence, a logical "0" is supplied from the output of the last stage of the serial shift register 1075 to node 1111 via lead 1078. The zero at node 1111 is supplied via lead 1112 to one input of AND gate 1110 and the high for the output of inverter 1113 is supplied via lead 1114 to one input of AND gate 1108.

Since the R/S flip-flop 1104 is still set, a high is still present on lead 1107 and a low on lead 1109 so that both inputs of AND gate 1108 are high and both inputs of AND gate 1110 are low. With both inputs of AND gate 1108 high, its output goes high but the lows at the input of AND gate 1110 cause its output to go low. With a high and a low supplied to the inputs of NOR gate 1115, a low is outputted to node 1116. This low is supplied via lead 1117 to the inverted input of AND gate 1089 causing its output to go high. This high is supplied as logical "1" via lead 1077 to the $D_i$ input of the first stage of the serial shift register 1075 while the low at node 1116 is supplied back to the second inverted input of AND gate 1106 causing its output to go high so that the R/S flip-flop 1104 is reset on the next clock sequence to pass all subsequent values in the non-complemented form as previously described.

On the third and all subsequent clock times of the third iteration cycle, logical zeroes are outputted from the sixteenth and final stage of the serial shift register 1075 via lead 1078 to node 1111 causing a low to be supplied via lead 1112 to one input of AND gate 1110 and a high to be supplied to one input of AND gate 1108 via lead 1114. Since the R/S flip-flop 1104 has been reset, a high is present on lead 1109 and the low on lead 1107 so that each of the AND gates 1108 and 1110 have a high and a low input causing both of their outputs to go low. With a low at both inputs of NOR gate 1115, a high appears at node 1116. The high at node 1116 is supplied via lead 1117 to disable AND gate 1089 and cause a logical "0" to be supplied back to the $D_i$ input of the first stage of the serial shift register 1075 via lead 1077 as previously described. Simultaneously, the high at node 1116 is supplied via lead 1118 back to disable AND gate 1106 causing its output to go low to enable the R/S flip-flop 1104 to again be set on the sixteenth clock time of the third iteration cycle. Therefore, after all sixteen clock times of the third logic iteration after the detection of the engine crankshaft position pulse $G_3$ are completed, the R/S flip-flop 1104 is again set when the signal $\overline{h_3}$ goes low and the binary number 0000000000000010 is stored in the serial shift register 1075, as known in the art for a standard binary counter at the completion of the second count cycle after clearing.

On the first clock time of the fourth iteration cycle, (the third count cycle after clearing the counter 1075) the zero stored in the sixteenth shift register stage is supplied via lead 1078 back to node 1111 causing a low to be supplied to one input of AND gate 1110 and a high to one input of AND gate 1108. Since the R/S flip-flop 1104 was set when $\overline{h_3}$ went low, a high is present on lead 1107 and a low on lead 1109. Therefore, both inputs of AND gate 1108 are high while both inputs of AND gate 1110 are low causing the output of AND gate 1108 to go high and the output of AND gate 1110 to go low. Since NOR gate 1115 has a high at one input and a low at the other, its output causes a low to appear at node 1116 which is supplied back via lead 1118 to one inverted input of AND gate 1106 causing its output to go high to reset the R/S flip-flop 1104 to pass the remaining values un-complemented and to one inverted input of AND gate 1089 causing its input to go high so that a logical "1" is presented to the $D_i$ input of the first stage of the serial shift register 1075 via lead 1077.

With the R/S flip-flop 1104 having been reset upon the detection of the first zero in this iteration cycle, the second clock time will cause a logical "1" to be outputted from the sixteen stage of the shift register 1075 via lead 1078 causing node 1111 to go high. With a high at node 1111 and the R/S flip-flop 1104 reset, both inputs of AND gate 1108 will be low and both inputs of AND gate 1110 will be high causing the output of AND gate 1108 to go low and the output of AND gate 1110 to be high. With a high and a low at the two inputs of NOR gate 1115, a low appears at its output and is transmitted to node 1116. Since the R/S flip-flop 1104 has already been reset, this low will have no effect upon the state of the flip-flop 1104 but will be transmitted via lead 1117 to the inverted input of AND gate 1089 causing its output to go high. The output of AND gate 1089 transmits a logical "1" to the $D_i$ input of the serial shift register 1075 via lead 1077. This logical "1" was previously stored in the fifteenth stage of the serial shift register 1057 at the end of the previous iteration and hence has been passed through the half adder circuitry in a non-complemented manner as required since the first zero has already been detected.

On the third clock time, the next value, a logical "0" is outputted from the last stage of the shift register 1075 via lead 1078 causing a low to appear at node 1111. The low at node 1111 and the reset state of the R/S flip-flop 1104 causes a high and a low to be presented to the two inputs of each of the AND gates 1108 and 1110 causing both of their outputs to go low. With both of the inputs of NOR gate 1115 low its output goes high causing a high to appear at node 1116. The high at node 1116 is supplied via lead 1118 to disable AND gate 1106 causing its output to go low and enable the R/S flip-flop 1104 to again be set at the end of this iteration cycle when the signal $\overline{h_3}$ again goes momentarily low and this high is also supplied via lead 1117 to an inverted input of AND gate 1089 causing its output to go low. Therefore, subsequent zeroes are passed through the half adder circuitry in an un-complemented fashion and logical zeroes are supplied via lead 1077 back to the $D_i$ input of the first stage of the sixteen stage serial shift register 1075 for the remainder of the clock times of the fourth iteration cycle. At the end of the fourth cycle, which corresponds to the third count since the first cycle was used merely to clear the register 1075, the binary number 0000000000000011 is contained in the sixteen stages or bit positions of the shift register counter 1075.

On the next count iteration cycle, the first two logical ones will be complemented as previously described and fed back as zeroes to the $D_i$ input of the first stage of the register 1075 while the third count time will output a zero which will be complemented and fed back as a logical "1" while the R/S flip-flop 1104 is reset so that all subsequent zeroes are supplied back in un-complemented form so that at the end of this next iteration cycle corresponding to the fourth count, the proper binary number, 0000000000000100, is contained in the corresponding sixteen bit positions or stages of the shift register counter 1075.

In this manner, the combination of the sixteen stage serial shift register counter 1075 and the half adder input logic circuitry previously defined will change the binary count once for each sixteen clock times and hence one for each count cycle or iteration cycle (16 microseconds in the preferred embodiment of the present invention). Since the half adder circuitry complements the values outputted from the shift register until the first zero is detected and then complements the first zero to thereafter pass all further values through un-complemented, the shift register 1075 has stored therein at the end of each iteration of sixteen clock times corresponding to a single count, the proper binary number indicative of that count. With this description of the operation of the circuitry of the engine time interval counter of FIG. 4G, and knowledge of typical prior art binary count sequences, the operation of the circuitry of FIG. 4G for further counting will be readily understood to those skilled in the art.

In addition to the engine time interval counter itself, the circuitry of FIG. 4G includes a stall detector system and an alarm indicating circuit as hereinafter described. The R/S flip-flop 1090 is initially reset after the detection of a properly conditioned engine crankshaft position pulse $G_3$ by the signal $G_2$ outputted from the circuit of FIG. 4F as previously described. With the clocked R/S flip-flop 1090 reset, the $\overline{Q}$ output causes a high or logical "1" to be outputted from node 1119 and this high is supplied via lead 1120 back to one input of NOR gate 1087 causing its output to go low and since its output is connected via lead 1102 to one inverted input of AND gate 1099, it enables the AND gate 1099 to set the R/S flip-flop 1104 once each sixteen clock times when the signal $\overline{h_3}$ goes low. Furthermore, the high from node 1119 is connected via lead 1121 to one inverted input of an AND gate 1122 so that its output is low. Since this low is supplied to a set input of a stall indication R/S flip-flop 1091, it continues to be reset after the detection of each $G_3$ signal when the signal $G_2$ is generated.

Therefore, both the R/S flip-flop 1090 and the R/S flip-flop 1091 remain in the reset state under normal conditions and as long as the R/S flip-flop 1091 remains reset, a low is outputted from the Q output via lead 1123 to one input of NOR gate 1124 for enabling same. The other input of NOR gate 1124 receives the normally low clock failure indication signal $v_1$ via lead 1125 so that as long as there is no clock failure, indicated by the signal $v_1$ going high, and the R/S flip-flop 1091 remains reset indicating the absence of a stall condition, both inputs of NOR gate 1124 are low causing a high to appear at its output. The high at the output of the alarm indication NOR gate 1124 is supplied via lead 1126 to conduct the alarm signal GH2 which is a normally high signal indicating the absence of an alarm state, but when the signal GH2 goes low, either a clock failure alarm condition or a stall alarm condition exists and this information is conveyed to the binary decoder circuitry of block 124 of FIG. 2 via lead 1126 as hereinafter described.

The R/S flip-flop 1090 can be set only if the shift register counter 1075 has reached its maximum count and a logical "1" is stored in each and every one of the sixteen shift register stages thereof. At that point, the all ones detector, NOR gate 1076 has its output go high and since this high is connected via lead 1098 to one inverted input of AND gate 1099, the AND gate 1099 is disabled to prevent further setting of the R/S flip-flop 1104 so that the ones will continue to circulate in an uncomplemented fashion until the detection of the next properly conditioned engine crankshaft position pulse $G_3$ again shifts the count values into the inputs of the corresponding sixteen latching registers 1079; clears the shift register stages 1075 by supplying zeroes to each stage thereof; and then latches the previously inputted count into the latch registers 1079.

The high at the output of NOR gate 1076 is also supplied via lead 1098 to the input of an inverter 1100 whose output causes a low to appear at one inverted input of AND gate 1101 for enabling same. On the next occurrence of the signal $h_3$, the signal $\overline{h_3}$ goes low to enable the other inverted input of AND gate 1101 and cause a high at the output thereof to be supplied to the set input of R/S flip-flop 1090. One clock time later, the R/S flip-flop 1090 is set to indicate that the maximum count has occurred and the $\overline{Q}$ output causes a low to appear at node 1119. The low at node 1119 is supplied via lead 1120 back to one input of NOR gate 1087 whose other input is also low since the next $G_3$ signal has not yet been detected to generate $G_2$. Therefore, the output of NOR gate 1087 goes high to further disable AND gate 1099 and the setting of the R/S flip-flop 1104.

Simultaneously, the low from node 1119 is conducted via lead 1121 to a first inverted input of AND gate 1122 for enabling same. If the maximum count has been attained, an alarm condition exists if and only if we are not in the starting or cranking mode. The signal $J_1$ is supplied via lead 436 to the other inverted input of AND mode 1122 and is a normally high signal whenever the engine is in the starting or cranking mode. If, however, we are not in the cranking mode, a low is supplied to the other inverted input of AND gate 1122 for enabling same and if the maximum count is attained to cause setting of the flip-flop 1090 while we are in a non-cranking mode of operation, both inputs of AND gate 1122 go low causing a high to appear at its output so that the stall flip-flop 1091 is set on the next clock time causing the Q output to go high.

With the Q output high, a high is presented via lead 1123 to one input of NOR gate 1124 causing the alarm signal GH2 to go low indicating the existence of an alarm state. When the next $G_3$ signal is detected and $G_2$ is generated, the max count flip-flop 1090 and the stall flip-flop 1091 are reset. As previously indicated, if the clock failure signal $v_1$ should go high to indicate the existence of a clock failure, as hereinafter described, with reference to the reset control circuit of the microprocessor system of block 123 of FIG. 2, then the output of NOR gate 1124 will also go low causing the alarm signal GH2 on lead 1126 to go low to indicate the presence of an alarm condition. The alarm signal GH2 is supplied to the binary decoder circuitry of block 124 of FIG. 2 for use as hereinafter described.

As previously described, the true binary count indicative of the engine time interval between successive $G_3$ engine crankshaft position pulses is generated in the serial shift register counter 1075, and at the end of each cycle, is stored and latched in the latching registers 1079. The sixteen bit count is broken up into two eight bit binary words and computer-generated command signals dictate which and in what order the two eight bit words are connected onto the data bus for use by the microprocessor, of block 123 of FIG. 2; as conventionally known.

5.0 Microprocessor System

The microprocessor system of block 123 of FIG. 2 will now be briefly described with reference to the block diagram of FIG. 5. The microprocessor system of FIG. 5 includes various circuits for performing a plurality of different functions, some of which could just as easily be attributed to the circuitry of block 122, 124 or the like but which are described herein for the sake of convenience.

The microprocessor system of FIG. 5 includes power-on reset control circuitry which is illustrated by block 1131 of FIG. 5. The reset control circuitry of block 1131 provides a power-on reset circuit for generating power-on reset signals which are synchronized to the logic clock and used to initialize the binary encoder circuitry of FIG. 4 as previously described. The power-on reset generator circuitry also supplies a power-on reset signal which is buffered and synchronized to the master clock for initializing the various circuits of the microprocessor system of FIG. 5 and the binary decoder circuitry of block 124 of FIG. 2, as hereinafter described. Furthermore, the reset control circuitry of block 1131 includes various circuits for detecting a clock failure; for generating an MPU reset signal for resetting the microprocessor, as hereinafter described; and a "watch dog" circuit for detecting computer failures and generating a computer fail signal if the MPU reset signal fails to solve the detected computer failure problem.

The microprocessor system of FIG. 5 has, as its main component, a conventional mini-computer or microprocessor unit, as represented by block 1132 of FIG. 5, which is able to transmit and receive the data on a data bus and address various memory locations, etc., on an address bus so that the microprocessor of block 1132 is able to receive data from the external circuits of FIG. 4, etc. and process this data in accordance with stored programs and various values and mapped surfaces stored in memory, in accordance with preprogrammed control laws, and then output the manipulated data so that it can be decoded to generate various command and control signals for controlling the various operating functions of the internal combustion engine of FIG. 1 as hereinafter described.

A memory section is designated by the block 1133 and, in the preferred embodiment of the present invention includes both read only memory sections (ROMs) and random access or scratch pad memories (RAMs). In addition to storing the programs for implementing the various control laws, interrupt handling routines, etc., as set forth in the programmed documentation of FIGS. 10 through 10.35 as hereinafter described, the memory sections may be preprogrammed with various two or three dimensional control surfaces, which are determined by experimental or emperical means, as known in the art.

The chip select circuitry of block 1134 responds to address information outputted by the MPU of block 1132 to select predetermined memory blocks of the memory section 1133 or to enable various command signal generator circuits of the command signal generator circuitry of block 1135. The command signal generator of block 1135 contains logic circuitry for decoding four predetermined address bits on the address output bus of the MPU of block 1132 for generating various command signals used in the binary encoder circuitry of block 122 of FIG. 2, as previously described, as well as in the microprocessor system of FIG. 5 and in the binary decoder circuitry of block 124 of FIG. 2.

A secondary command signal generator which is represented by block 1136 responds to a signal from the primary command signal generator of block 1135 and to various other control signals as well as to predetermined data bits on the data bus for generating secondary command bus signals, represented collectively by the designation $m_0$, which are used in the multiplexer circuit of FIG. 4B and the oxygen system integrator circuitry of FIG. 4D as previously described.

The buffer circuitry of block 1137 receives the bi-directional data transfer signals $da_0$ through $dh_0$ from the MPU of block 1132 and the input/output electronics input bus signals $da_1$ through $dh_1$, which are transmitted to the microcomputer of block 1132 via the $da_0$ through $dh_0$ via the bidirectional data bus, and outputs the input/output electronics output bus signals $da_2$ through $dh_2$ which represent the outputs from the microcomputer of block 1132. The output data bus signals $da_2$ through $dh_2$ are then transmitted thereto via the bi-directional data bus lines $da_0$ through $dh_0$ as hereinafter described.

The parallel-to-serial converter of block 1138 receives the output data from the microprocessor unit of block 1132 via the buffers of block 1137 and various command and control signals from the circuitry of FIG. 5 and from the decoder circuitry of block 124 of FIG. 2 and outputs serial data to the decoder circuitry of block 124 for use as hereinafter described in controlling the various functions of the internal combustion engine of FIG. 1.

The status input circuitry of block 1139 monitors whether or not the engine is in a cranking or starting mode of operation and monitors whether or not the last oxygen sensor testing indicated a usable or unusable oxygen sensor and transmits appropriate status information to the microprocessor of block 1132 via the $da_1$ through $dh_1$ data input lines and the bi-directional data bus via the buffer circuitry of block 1137.

The microprocessor system of FIG. 5 also includes a camshaft sensor conditioning circuit, as indicated by block 1140, which is able to detect a predetermined point in the engine cycle, such as the top dead center position of the first cylinder or the like, and pass a properly-filtered and conditioned pulse indicative thereof to the interrupt control circuitry of block 1141 which responds thereto and transmits an interrupt flag signal to the microprocessor of block 1132 to inform the microprocessor that a specific point in the engine timing cycle has been attained. The interrupt control logic of block 1141 is also responsive to various other command or control signals for outputting the various interrupt condition information to the microprocessor unit of block 1132 via the input data bus $da_1$ through $dh_1$ and the bi-directional data bus $da_0$ through $dh_0$ via the buffer circuitry of block 1137. The specific circuitry of the various sections of the microprocessor system of FIG. 5 will now be described in greater detail.

5.1 Reset Control System

The reset control system of block 1131 of FIG. 5 will now be discussed with reference to the more specific block diagram of FIG. 5A. The reset control system of FIG. 5A includes the power-on reset generator circuitry of block 1142 which is responsive to the initial power-on condition and to the two-phase master clock signals $H_1$, $H_2$ for generating the power-on reset signals $v_2$ and $\overline{v_2}$ which are synchronized to the logic clock and used to initialize the binary encoder circuitry of FIG. 4, as previously described. The power-on reset generator also outputs a power-on reset signal v to the buffer circuitry of block 1143 which is also supplied with the master clock signals $H_1$, $H_2$ to output the synchronized power-on reset signals $v_0$ and $\overline{v_0}$ which are used to initialize the circuits of the microprocessor system of FIG. 5 and the binary decoder circuitry of FIG. 6 as hereinafter described.

The buffered power-on reset signals $v_0$ and $\overline{v_0}$ are also supplied to the clock fail detector circuit of block 1144 which monitors both phases of the master clock $H_1$ and $H_2$ and also receives the logic clock pulse $h_3$ which occurs once each sixteen master clock times, as previously described. The clock fail detector circuit of block 1144 also receives an MPU reset indication signal $a_9$ which is generated by the MPU reset control logic of block 1145 so that the clock fail detector circuitry is disabled while the MPU is being reset as well as being disabled during the initial power-on reset. During normal operation, however, the clock fail detector circuitry of block 1144 is responsive to a failure of the master logic glock for generating a clock fail signal $v_1$ which indicates the presence or absence of a clock failure and a second clock failure signal $v'_1$ which is used to set the MPU reset control flip-flop to initiate an MPU reset interrupt whenever the clock is restored after a clock failure, as hereinafter described.

Figure 5A:
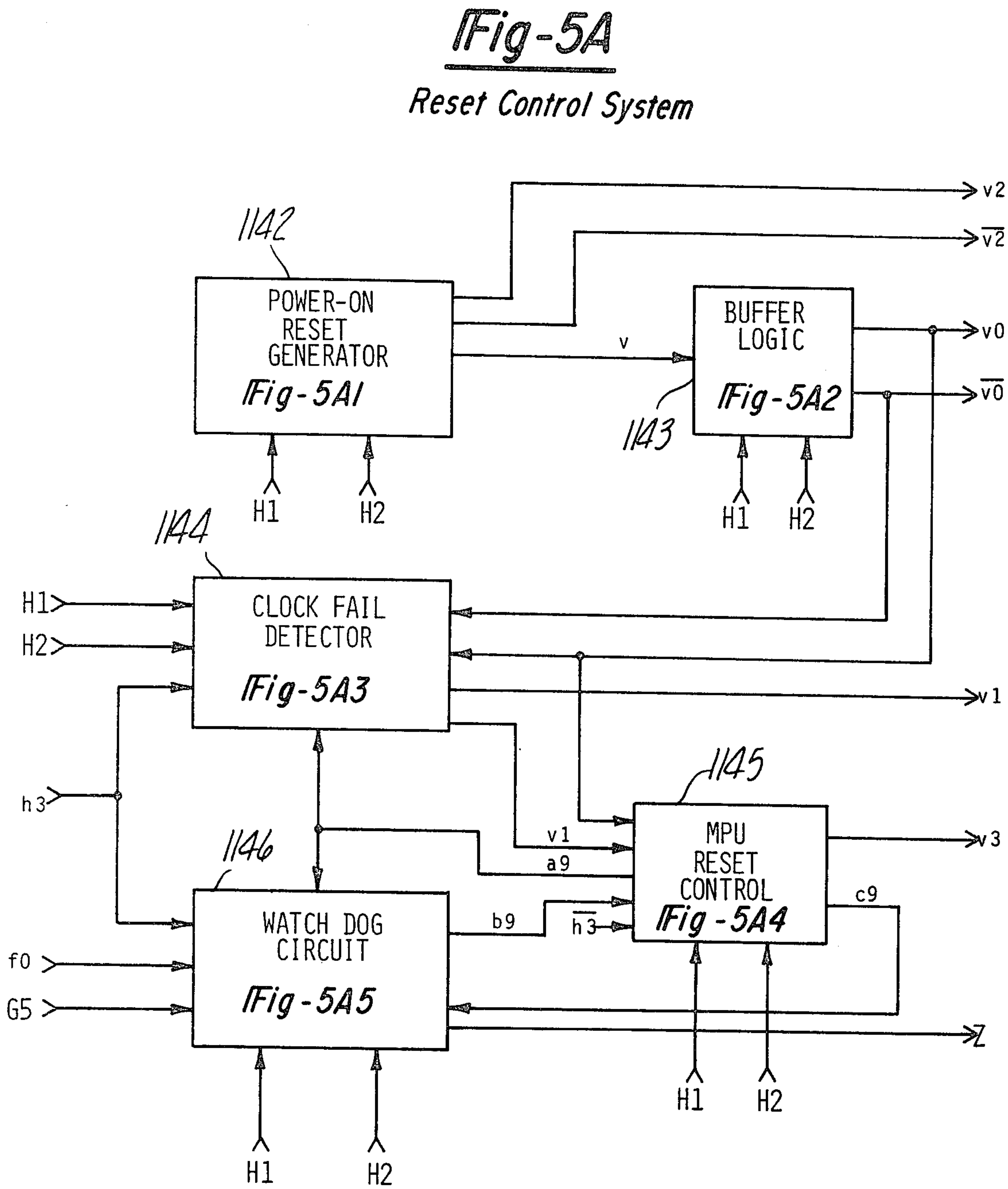
FIG. 5A is a block diagram of the reset control circuitry of block 1131 of FIG. 5.

The watchdog circuit of block 1146 of FIG. 5A is used to monitor the operation of the microprocessor unit of block 1132 and to generate an MPU fail signal $b_9$ which is sent to the MPU reset control circuitry of block 1145 and used to generate an MPU reset signal $v_3$ for resetting the microprocessor of block 1132 and receiving a set signal when the MPU reset signal $v_3$ has been generated. The watchdog circuit of block 1146 is then enabled to determine whether or not the MPU failure previously detected has been eliminated or not and if two successive MPU failures are detected in a row, a computer fail signal C is generated indicating that the detected MPU failure was not corrected by an MPU reset and that the limp home circuits to be hereinafter described should be used.

5.2 Power-On Reset Generator Circuit

The power-on reset generator circuit of block 1142 of FIG. 5A will now be described with reference to the circuit diagram of FIG. 5A1. The circuit of FIG. 5A1 is activated when power supplied to the system causing the master clock to immediately begin generating the clock signals $H_1$, $H_2$ and the regulated power supply circuits of block 125 of FIG. 2 to supply the +5-volt source of potential to the supply inputs, as indicated in FIG. 5A1. The purpose of the power-on reset generator circuit of FIG. 5A1 is to properly shape and condition power-on reset pulses $v_2$ and $\overline{v_2}$ which are supplied to the binary encoder circuitry of FIG. 4 for initializing same and the power-on reset signal "v" which is supplied to the buffer circuit of block 1143 of FIG. 5A for generating the buffer to power-on reset signals $v_0$ and $\overline{v_0}$, as hereinafter described.

The power-on reset generator circuit of FIG. 5A1 includes an internal storage capacitor 1147 having one plate connected to ground via a common grounding lead 1148 and its opposite plate connected to a node 1149. Node 1149 may also be connected via lead 1150 to an external capacitor 1151 whose opposite plate is connected to ground so that the value of the external capacitor 1151 may be increased for increasing the time delay of the system, if desired. A first stage of the power-on reset generator circuit of FIG. 5A1 includes a first transistor 1152 and a second transistor 1153. One current-carrying electrode and the gate electrode of transistor 1152 is connected to the +5-volt source of potential while the opposite current-carrying electrode is connected to an output node 1154. Node 1154 is connected to one current-carrying electrode of the second transistor 1153 whose opposite current-carrying electrode and gate electrode are commonly connected to ground via the grounding lead 1148.

As known in the art, the transistor 1152 is an enhancement mode device while the transistor 1153 is a depletion mode device, the depletion mode being indicated by the presence of an asterisk or star at the substrate location of the transistor symbol. The operation of enhancement mode devices and depletion mode devices are known in the art and, for the purposes of describing the present invention, it is sufficient to state that an enhancement mode device will remain normally nonconductive unless a potential is applied to its gate electrode while a depletion mode device will normally conductive unless the potential is removed or a negative potential applied to the gate electrode.

As known in the art, the transistors 1152 and 1153 are nMOS FET transistors implemented by conventional LSI techniques. As presently configured, transistors 1152 and 1153 function as voltage controlled resistors so that the first stage comprising transistors 1152 and 1153 act as a level shifter by establishing a set threshold at the node 1154 by their voltage-divider action. Since transistor 1153 is a depletion mode device, it is conductive to pull the node 1154 to ground via lead 1148 when there is no power to the system. However, as soon as the power is supplied to the system, a positive potential is supplied to the gate electrode of transistor 1152 causing it to begin conducting and causing the potential at node 1154 to rise. As soon as the threshold level established by transistors 1152 and 1153 is reached, transistor 1152 will switch full on and transistor 1153 will switch off so that a high potential will appear at node 1154.

Node 1154 is connected directly to the gate electrode of a second stage transistor 1155 and to the gate electrode of another transistor 1156. Transistor 1155 is combined with the transistor 1157 to form an inverter while transistor 1156 is combined with a pair of transistors 1158 and 1159 to form a conventional NOR gate as hereinafter described.

The second stage comprising transistors 1155 and transistors 1157 is a conventional inverter driven by the output from node 1154. Transistor 1157 is a depletion mode transistor having its gate electrode in one current-carrying electrode commonly connected to the +5-volt source of potential and its opposite current-carrying electrode connected to an output node 1160. The output node 1160 is also connected to one current-carrying electrode of transistor 1155 whose opposite current-carrying electrode is commonly connected to the grounding lead 1148. Since node 1154 is normally low when there is no power to the system due to the action of the depletion mode transistor 1153, the gate electrode of transistor 1155 is normally low so that transistor 1155 is non-conductive. However, transistor 1157 is maintained normally conductive since it is a depletion-mode device so that the inverter output node 1150 is initially high. As soon as the threshold established at node 1154 has been reached and transistor 1152 has switched fully on, a high is supplied to the gate electrode of transistor 1155 causing it to conduct. The conduction of transistor 1155 turns the depletion mode transistor 1157 off and guards node 1160 so that a low appears at the output of the inverter stage comprising transistors 1155, 1157.

The output node 1160 of the inverter formed from the transistor pair 1155, 1157 is connected via lead 1161 to the gate electrode of a first transistor 1162 which shares both of its current-carrying electrodes with a second transistor 1163. One current-carrying electrode of both of the transistors 1162 and 1163 is connected to ground to the common grounding lead 1148 and the opposite current-carrying electrode of both of the transistors 1162 and 1163 are connected to node 1164. Node 1164 is connected to one current-carrying electrode of a depletion mode transistor 1165 whose opposite current-carrying electrode is connected directly to the +5-volt source of potential. The gate electrode of transistor 1165 is connected directly to a node 1166 and node 1166 is connected directly to node 1164 and to the gate electrode of a transistor 1167 which is paired with a transistor 1168 so as to share their common current-carrying electrodes. One current-carrying electrode of both of the paired transistors 1167, 1168 is connected via the common grounding lead 1148 to ground while the other common current-carrying electrode is connected to a node 1169. Node 1169 is connected to one current-carrying electrode of a depletion mode transistor 1170 whose opposite current-carrying electrode is connected to the +5-volt source of potential. The gate electrode of the depletion mode transistor 1170 is connected to a node 1171 and node 1171 is connected directly to the node 1169 and to the gate electrode of the transistor 1163. Node 1166 serves as an output node and is connected via lead 1172 to the gate electrode of a transistor 1173 of the next inverter stage.

The combination of transistor 1165 with the transistor pair 1162, 1163 form a first NOR gate while the combination of transistor 1170 with the transistor pair 1167, 1168 form a second NOR gate. The cross-coupling of the outputs of the NOR gate via node 1164 being connected via node 1166 to the gate electrode of transistor 1167 and the node 1169 being connected via node 1171 to the gate electrode of transistor 1163, form a cross-coupled NOR gate combination which operates as a flip-flop stage of the power-on reset generator of FIG. 5A1.

As previously indicated, transistor 1156 has its gate electrode connected directly to the threshold level establishing node 1154 and one current-carrying electrode connected to the +5-volt source of potential while its other current-carrying electrode is connected to node 1174. Node 1174 is connected to one common current-carrying electrode of a transistor pair 1158, 1159 whose other shared current-carrying electrode is connected directly to ground. The gate electrode of the transistor 1158, which is a depletion mode device, is also connected directly to ground while the gate electrode of transistor 1159 is connected via lead 1175 to the capacitor node 1149. Output node 1174 is connected via lead 1176 to the gate electrode of input transistor 1168 of the flip-flop stage previously described.

Since transistor 1158 is a depletion mode device, it initially renders the transistor 1158 conductive to pull node 1174 to ground so that the input supplied via lead 1176 to transistor 1168 of the flip-flop stage is low as the voltage at node 1154 builds and the threshold is reached, the high at node 1154 will be conducted to the gate electrode of transistor 1156 causing it to conduct so that the +5-volt source of potential causes node 1174 to go high and this high signal is transmitted via lead 1176 to the input gate electrode of transistor 1168 to reverse the state of the flip-flop stage previously described. The NOR gate comprising transistors 1156 and the transistor pair 1158, 1159 has its other input, from the gate electrode of 1159 connected via lead 1175 to one plate of the capacitor 1147 via node 1149. Therefore, so long as a low signal is present at node 1149, transistor 1159 does not conduct to ground out the mode 1174 but as soon as the voltage has built on the capacitor 1147 and it is sufficiently high to cause transistor 1159 to conduct, the node 1174 will again be pulled low causing a low to be supplied via lead 1176 to the input gate electrode of transistor 1168.

The next stage of the power-on reset generator of FIG. 5A1 is an inverter stage comprising transistors 1173 and 1177. The transistor 1177 is a depletion mode device having one current-carrying electrode connected directly to the +5-volt source of potential and its other current-carrying electrode and its gate electrode commonly coupled to the inverter output node 1178. Output node 1178 is also connected to the current-carrying electrode of transistor 1173 whose gate electrode is connected via lead 1172 to the output node 1166 of the flip-flop stage previously described while its opposite current-carrying electrode is connected to ground via the common grounding lead 1148. The inverter output from node 1178 is initially low but the voltage at the inverter output node 1178 changes sharply near the established voltage threshhold.

The output of the inverter stage comprising transistors 1173 and 1177 is taken from output node 1178 which is connected directly to the gate electrode of a transistor 1179 and via lead 1180 to the gate electrode of a transistor 1181 to be hereinafter described. Transistor 1179 has one current-carrying electrode connected to ground through the common grounding lead 1148 and its opposite current-carrying electrode connected to a node 1183. Node 1183 is commonly connected to one current-carrying electrode and the gate electrode of a depletion mode transistor 1182 whose opposite current-carrying electrode is connected directly to the +5-volt source of potential. Node 1183 is connected directly to node 1149 and via lead 1175 to the gate electrode of transistor 1159 as previously described. While the combination of transistors 1179 and 1182 form an inverter, both transistors operate as voltage-controlled resistors with transistor 1182 having a relatively high resistance value. Therefore, when the power is initially turned on, the value of the resistance of transistor 1182 appears much greater than the value of the resistance of transistor 1179 so that the capacitor 1147 (and the external capacitor 1151, if included) are initially being discharged into ground through transistor 1179 rather than being charged through transistor 1182.

Since the capacitors 1147 and 1151 initially are discharged, a low at node 1149 is conducted via lead 1175 back to the gate electrode of transistor 1159 so that the output node 1174 is enabled to go high as soon as the power builds to threshold established at node 1154 causing transistor 1152 to conduct. The conduction of transistor 1152 applies a high to the gate electrode of transistor 1156 which in turn causes a high to appear at node 1174 which is supplied via lead 1176 to the gate electrode of transistor 1168 causing it to conduct. The conduction of transistor 1168 causes the output node 1169 to be pulled to ground. When node 1169 is grounded, the gate electrode of transistor 1163 is low. As soon as the threshold is reached, the high at node 1154 will cause transistor 1155 to conduct causing the inverter stage of transistors 1155, 1157 to output a low at node 1160 to be transmitted via lead 1161 to the base electrode of transistor 1162.

Therefore, both inputs, the gate electrodes of transistors 1162 and 1163, of the NOR gate comprising transistors 1162, 1163 and 1165 are low causing its output node 1164 to go high due to the fact that transistor 1165 is a depletion mode device. The high at node 1164 appears at output node 1166 of the flip-flop stage and is conducted via lead 1172 to the gate electrode of transistor 1173 causing a low to appear at the inverter output node 1178. A low at node 1178 is transmitted to the gate electrode of transistor 1179 enabling the depletion mode transistor 1182 to conduct. When transistor 1182 conducts, it connects the +5-volt source of potential with the internal capacitor 1147 and the external capacitor 1151 to enable the charging of same.

When the capacitors 1147, 1151 have reached a predetermined high level of charge, the high at node 1149 is conducted via lead 1175 back to the gate electrode of transistor 1159 causing it to conduct. The conduction of transistor 1159 causes the output node 1174 of the NOR gate comprising transistors 1156, 1158 and 1159 to go low and this low is transmitted via lead 1176 back to the gate electrode of transistor 1168 to enable the flip-flop stage to be reset after a power failure or the like.

The node 1149 which is connected to one plate of the internal capacitor 1147 and to one plate of the external capacitor 1151 via lead 1150 is also connected to the gate electrode of a transistor 1184. Transistor 1184 has one current-carrying electrode connected directly to the +5-volt source of potential and its opposite current-carrying electrode connected to a node 1185. Node 1185 is connected to one current-carrying electrode of a depletion mode transistor 1186 whose opposite current-carrying electrode and gate electrode are commonly connected to ground through the grounding lead 1148. Node 1185 is also connected directly to the gate electrode of the transistor 1187 having one current-carrying electrode connected directly to the +5-volt source of potential and its opposite current-carrying electrode connected to a node 1188.

Node 1188 is connected to one current-carrying electrode of a depletion mode transistor 1189 whose opposite current-carrying electrode and gate electrode are commonly coupled to ground through the grounding electrode 1148. Node 1188 is also connected to the gate electrode of transistor 1190 having one current-carrying electrode to ground through the grounding lead 1148 and its opposite current-carrying electrode connected to an output node 1191. Node 1191 is commonly connected to the gate electrode and one current-carrying electrode of a depletion mode transistor 1192 whose opposite current-carrying electrode is connected to the +5-volt source of potential. The transistor pairs 1184, 1186; 1187, 1189; and 1190, 1192 function as level shifters to insure that the output at node 1191 changes only after the established level shifting threshold has been crossed, as known in the art. This is done to insure a sharp and rapid transmission when the threshold is reached so as to avoid some intermediate level when samples are taken to synchronize the power-on reset signal with the system clock as hereinafter described.

The output node 1191 is connected to one current-carrying electrode of a pass transistor 1193 whose opposite current-carrying electrode is connected to a gate electrode of a transistor 1194 and to one current-carrying electrode of a pass transistor 1195. The gate electrode of transistor 1193 is supplied with the second phase master clock signals $H_2$ so that each time the second master clock phase signal $H_2$ is high, transistor 1193 is caused to conduct to sample the signal at the output node 1191 and when the signal $H_2$ is low, the signal at node 1191 is held so that the circuit combination functions as a typical sample and hold circuit as known in the art.

Transistor 1194 has one current-carrying electrode connected to the common grounding lead 1148 and its opposite current-carrying electrode connected to the node 1196. Node 1196 is directly connected to one current-carrying electrode and the gate electrode of a depletion mode transistor 1197 whose opposite current-carrying electrode is connected directly to the +5-volt source of potential. Node 1196 serves as an output node which is connected both to the gate electrode of a transistor 1198 and is outputted via lead 1199 to one current-carrying electrode of a transistor 2000 to be hereinafter described. Transistor 1198 has one current-carrying electrode connected to ground through a common grounding lead 1148 and its opposite current-carrying electrode connected to the output feedback node 2001.

Node 2001 is commonly coupled to one current-carrying electrode and the gate electrode of a depletion mode transistor 2002 whose opposite current-carrying electrode is connected directly to a +5-volt source of potential. Feedback node 2201 is connected via lead 2003 to one current-carrying electrode of a feedback transistor or path transistor 1195 whose opposite current-carrying electrode is connected via lead 2004 to the gate electrode of transistor 1194 and output current-carrying electrode of pass transistor 1193 as previously described. The gate electrode of transistor 1195 is connected to receive the first clock phase signals $H_1$ so that each time the first clock signal $H_1$ is high, transistor 1195 conducts to feed the signal from node 2001 back to the gate electrode of transistor 1194 and when the first clock phase $H_1$ is low, the combination of transistors 1198, 2002 and 1195 function as a sample and hold circuit to hold the output at node 2001 until the next sample time.

The combination of transistors 1194, 1197, 1198, 2002 and feedback transistor 1195 operate as a latching circuit in the following manner. If the signal at node 1191 is high when $H_2$ goes high, transistor 1193 conducts causing a high to appear at the gate electrode of transistor 1194. A high at the gate electrode of transistor 1194 causes it to conduct to pull node 1196 and the gate electrode of transistor 1198 to ground. When the gate electrode of transistor 1198 is held low, the depletion mode transistor 2002 conducts and causes node 2001 to go high. Therefore, when the clock phase $H_2$ goes low to terminate the conduction of transistorr 1193, the latching effect is achieved since when $H_2$ goes low, $H_1$ goes high causing feedback transistor 1195 to conduct to pass the high from feedback output node 2001 back via lead 2003, conducting transistor 1195 and lead 2004 so that the high remains at the gate electrode of transistor 1194 to maintain node 1196 low as previously described. Similarly, when the output node 1191 is initially low, transistor 1194 will be rendered non-conductive when $H_2$ is high which will cause the depletion mode transistor 1197 to conduct and pull node 1196 high. The high at node 1196 will cause transistor 1198 to conduct and pull the output node 2001 low so that when $H_2$ goes low and $H_1$ goes high, the low from node 2001 will appear at the gate electrode of transistor 1194 to maintain node 1196 high to insure the latched condition previously described.

The output node 1196 is connected via lead 1199 to the gate electrode of a transistor 2000, previously described, which forms one input of a flip-flop stage as hereinafter described. One current-carrying electrode of transistor 2000 is connected to one current-carrying electrode of a transistor 2005 whose opposite current-carrying electrode is connected directly to ground. The other current-carrying electrode of transistor 2000 is connected to a node 2006. Node 2006 is commonly connected to one current-carrying electrode and the gate electrode of a depletion mode transistor 2007 whose opposite current-carrying electrode is connected directly to the +5-volt source of potential while the node 2006 is also connected to the one current-carrying electrode of a transistor 2008 and to the gate electrode of a transistor 2009. The opposite current-carrying electrode of transistor 2008 is connected directly to ground while the gate electrode of transistor 2008 and one current-carrying electrode of transistor 2009 are commonly connected to a node 2010. Node 2010 is commonly connected to one current-carrying electrode and the gate electrode of a depletion mode transistor 2011 whose opposite current-carrying electrode is connected to a +5-volt source of potential. Node 2010 is also connected to one current-carrying electrode of transistor 1181 which serves as the other input to the flip-flop configuration and has its gate electrode to lead 1180 to node 1178, as previously described. The second current-carrying electrode of transistor 1181 and transistor 2009 are directly connected to ground.

The combination of transistors 2000, 2005, 2007, 2008, 2011, 2009, and 1181 to form a standard flip-flop configuration which comes up in the reset condition and the capacitors 1147 and 1151 are initially discharged and then switches to a set condition as the capacitors 1147 and 1151 charge only to be reset again once the charge on the capacitors 1147 and 1151 have reached a predetermined threshold value.

The operation of a flip-flop stage comprising transistors 2000, 2005, 2007, 2008, 2009, 2011 and 1181 will now be described in conjunction with the previously described flip-flop stage, its inverter output stage, and the output latching circuit. The output flip-flop can be thought of as having its non-inverted or Q output taken from node 2006 and its inverted output $\overline{Q}$ taken from node 2010. The flip-flop is designed so that when power is initially turned on, it comes up in the reset condition while the capacitors 1147 and 1151 are initially discharged or at least not yet being charged. When the output flip-flop is initialized, therefore, the Q output of node 2006 is initially low while the $\overline{Q}$ output at node 2010 is initially high. The initial high at node 2010 is momentary only and established by circuit values which initially insure that the signal at the gate electrode of transistor 2009, the Q output from node 2006, is initially low. With an initial low at its gate electrode, transistor 2009 is non-conductive. Since the output mode 1178 of the inverter comprising transistors 1177 and 1173 is also initially low and remains so until the power begins to rise, the depletion mode transistor 1177 is caused to conduct, as previously described, and therefore the gate electrode of transistor 1181 is also set to be initially low. With, the signal at the gate of transistor 1181 being initially low, transistor 1181 is intially non-conductive, allowing the $\overline{Q}$ output node at 2010 to begin to go high when the power comes on due to the presence of the depletion mode transistor 2011.

Immediately after the power comes on, the output node 1178 from the inverter comprising transistors 1178 and 1173 goes high causing transistors 1179 and 1181 to conduct. The conduction of transistor 1179 provides a discharge path for the capacitors 1147 and 1151 and the low from node 1183 is passed back to the gate electrode of transistor 1159 for enabling the NOR gate comprising transistors 1158, 1159 and 1156 which cannot yet generate a high output since the signal at the threshold input node 1154 has not yet reached a value to switch transistor 1156 to a conductive state. The high at the gate electrode of transistor 1181 causes it to conduct to ground the $\overline{Q}$ output node 2010 and set the flip-flop. The flip-flop is set since when the capacitors 1147 and 1151 are discharged, node 1191 goes high causing node 1196 to go initially low and this low is supplied via lead 1199 to the gate electrode of transistor 2000 to render it non-conductive. When the signal at the gate electrode of transistor 1181 goes high to render it conductive and pull node 2010 to ground, the gate electrode of transistor 2008 is also pulled low allowing node 2006 to go high due to the conduction of the depletion mode transistor 2009 causing the output flip-flop to enter the set state.

As the voltage increases at the node 1154, it will reach a first point at which transistor 1155 will be switched to a conductive state pulling node 1160 and the gate electrode of transistor 1162 low. With the gate electrode of transistor 1162 low, the flip-flop comprising the cross-coupled NOR gates is enabled for reset. Shortly thereafter, the voltage at node 1154 reaches the required threshold level for switching transistor 1156 to a conductive state and since capacitors 1147 and 1151 have discharged, node 1183 is low. With lows at both inputs of the NOR gate comprising transistors 1158, 1159 and 1156, and transistor 1156 rendered conductive, output node 1174 goes high causing transistor 1168 of the cross-coupled NOR gate flip-flop to conduct and reset the flip-flop causing node 1166 to go high. The high at node 1166 is supplied to the gate electrode of transistor 1173 causing the inverter output node 1178 to go low. The low at node 1178 is supplied to the gate electrode of transistor 1179 rendering it non-conductive and allowing the node 1183 to go high as the capacitors 1147 and 1151 are charged through the depletion mode transistor 1182. Simultaneously, the low from node 178 is fed back to the gate electrode of transistor 1181 so as to enable the output flip-flop to be reset at a later time, as hereinafter described.

When the charge on the capacitors 1147, 1151 have attained a predetermined threshold value, transistor 1184 is rendered conductive causing node 1185 to go high. A high at node 1185 causes transistor 1187 to conduct to cause node 1188 to go high. A high at node 1188 renders transistor 1190 conductive and pulls node 1191 to ground. Therefore, with the occurrence of the clock phase $H_2$ going high, this low is supplied to the gate electrode of transistor 1194 and latched there by the action of feedback transistor 1195, as previously described, to enable node 1196 to go high. The high at node 1196 causes transistor 1198 to conduct so that the feedback node 2001 goes low to maintain the latch while the high from node 1196 is suppied via lead 1199 back to the gate electrode of transistor 2000 to render it conductive. On the next high $H_1$ clock phase, node 2006 is pulled to ground causing the Q output and the signal at the gate electrode of transistor 2009 to go low since the signal at the gate electrode of transistor 1181 is already low, the depletion mode transistor 2011 conducts to cause the $\overline{Q}$ output node 2010 to again go high so that the output flip-flop returns to the reset state previously described.

The $\overline{Q}$ output node 2010 of the output flip-flop comprising transistors 2000, 2005, 2007, 2008, 2009, 2011 and 1181 is also connected directly to one current-carrying electrode of a pass transistor 2012 whose opposite current-carrying electrode is connected to the gate electrode of a transistor 2013 while the gate electrode of the pass transistor 2012 is connected to receive the second master clock phase signal $H_2$ so that each time $H_2$ goes high, the $\overline{Q}$ output of the flip-flop is sampled and passed to the gate electrode of transistor 2013.

One current-carrying electrode of transistor 2013 is connected directly to ground while the other current-carrying electrode is connected to a node 2014. Node 2014 is commonly connected to one current-carrying electrode and the gate electrode of a depletion mode transistor 2015 whose opposite current-carrying electrode is connected to a +5-volt source of potential. The output node 2014 is connected to (1) the gate electrode of a transistor 2016; (2) the gate electrode of a second transistor 2017; and (3) the gate electrode of a third depletion mode transistor 2018. Transistor 2016 has one current-carrying electrode connected to ground and the opposite current-carrying electrode connected to a node 2019.

Node 2019 is commonly coupled to one current-carrying electrode and the gate electrode of another depletion mode transistor 2020 whose opposite current-carrying electrode is connected to the +5 -volt source of potential. Node 2019 is also connected to the gate electrode of another depletion mode transistor 2021 and to the gate electrode of a transistor 2022. One current-carrying electrode of transistor 2021 is connected to the +5-volt source of potential while the other current carrying electrode is connected to node 2023. Node 2023 is connected to one current-carrying electrode of transistor 2017 whose other current-carrying electrode is connected to ground. Similarly, one current-carrying electrode of transistor 2022 is connected to the −5-volt source of potential and the other current-carrying electrode is connected to node 2023. Node 2023 is also used to supply the power-on reset signal v to the gate electrode of a transistor 2024 and to output the signal v via lead 2025 for use as an input to the buffer circuit of block 1143 of FIG. 5A previously described.

Also, as previously described, node 2014 is commonly connected to the gate electrode of transistors 2016, 2017 and 2018. One current-carrying electrode of the depletion mode transistor 2018 is connected to the +5-volt source of potential while its other current-carrying electrode is connected to the circuit output node 2026. Node 2026 is connected to one current-carrying electrode of transistor 2024 whose opposite current-carrying electrode is connected to ground. Output node 2026 is used to output a power-on-reset signal $v_2$ via lead 2027. Node 2026 is also connected to the input of an inverter 2028 whose output is used to output the power-on reset signal $\overline{v_2}$ via lead 2029.

The power-on-reset signal $v_2$ is a signal which may be initially low but which immediately goes high when the capacitors 1147 and 1151 have been discharged and the input flip-flop configured from the cross-coupled NOR gates comprising transistors 1162, 1163, 1165, 1167, 1168 and 1169 have been reset to enable the capacitors to begin charging. The power-on reset signal $v_2$ remains high until the capacitors have attained their pre-determined charge at which time the output of the latch causes a resetting of the output flip-flop comprising transistos 2000, 2005, 2007, 2008, 2009, 2011, and 1181 which again causes the power-on reset signal $v_2$ to go low and remain low so long as power remains on.

The power-on reset signal $\overline{v_2}$, is, of course, the inverse of the signal $v_2$. Furthermore, the power-on reset signal v which is outputted via lead 2025 to the buffer circuit of block 1143 of FIG. 5A is, for all practical purposes, the signal $\overline{v_2}$ and all of the power-on reset signals outputted from the circuit of FIG. 5A1, i.e, $v_2$, $\overline{v_2}$, and v are properly shaped digital pulses having sharp leading and trailing edges which are synchronized to the master logic clock phase $H_2$ since the $\overline{Q}$ output of the flip-flop output stage is supplied to the push-pull amplifier output stage circuitry comprising transistors 2013, 2015, 2016 , 2017, 2018, 2020, 2021, 2022, and 2024 only when the clock phase $H_2$ goes high via the pass transistor 2012 as known in the art. The push-pull output stages previously described serve as buffer amplifiers for outputting the power-on reset signals $v_2$, $\overline{v_2}$, and v, as known in the art, and provide the proper polarity signals described hereinabove with sufficient power to drive the various circuit components which must be reset, as known in the art.

5.3 Buffer Logic

The buffer logic circuitry of block 1143 of FIG. 5A will now be described with reference to the detailed schematic diagram of FIG. 5A2. The purpose of the buffer logic circuit of FIG. 5A2 is to further amplify the power-on reset signal v from the output of the power-on reset generator circuit of FIG. 5A1 and to perform further level shifting and signal-shaping to insure an extremely sharp edge on the reset pulse with the leading and trailing edges being synchronized to the master clock for use in initializing the various circuits of the micorprocessor system of FIG. 5 and the binary decoder circuitry of FIG. 6 to be hereinafter described.

The power-on reset signal v is supplied from the output of the circuit of FIG. 5A1 via lead 2025 to the gate electrode of a transistor 2030 having one current-carrying electrode connected to a common +5-volt source of potential and its opposite current-carrying electrode connected to a node 2031. Node 2031 is commonly connected to the gate electrode at one current-carrying electrode of a transistor 2032 whose opposite current-carrying electrode is connected to ground through a common grounding lead 2033. The combination of transistors 2030 and 2032 form the first stage of the buffer logic circuit of FIG. 5A2 which functions as follows.

The power-on reset signal v may, as previously indicated, be momentarily high but it then goes low when the input cross-coupled NOR gate flip-flop circuit is reset to allow charging of the capacitor and remains low until the charge on the capacitors 1147 and 1151 of the circuit of FIG. 5A1 reach a predetermined level at which time the output of the latching circuit of FIG. 51A goes high to reset the output flip-flop and cause the signal v to again go high. The signal v is supplied via lead 2025 from node 2023 of the circuit of FIG. 5A1 and node 2023 may be momentarily high but as soon as the output flip-flop circuit is set causing the $\overline{Q}$ output to go low, node 2014 will rise with the power supply when it is sufficiently high to cause transistor 2017 to conduct, the signal v goes low with node 2023 and will remain low until the output flip-flop is reset by a high at the latch output which causes the Q output, the node 2010, to go high so that when the clock phase $H_2$ goes high, transistor 2013 conducts to pull node 2014 to ground and turn off transistor 2017 to allow the voltage at node 2023 to build until the sinal v is restored to a high state. Therefore, the signal v remains low during the charging of the capacitors 1147 and 1151 and then goes high shortly after the output flip-flop of circuit 5A1 is reset as previously described.

The conduction of transistor 2030 functions as a voltage controlled resistor and follows the input signal v as it builds up offset by one threshold value. The node 2031 rises until it is one threshold from the +5-volt source of potential at which point the transistor 2030 is rendered fully conductive and transistor 2032 is rendered non-conductive. When transistor 2030 is conductive, the high from node 2031 is supplied directly to the gate electrode of a second stage transistor 2034 to render it conductive.

Transistor 2034 has one current-carrying electrode connected to ground through the grounding lead 2033 and its opposite current-carrying electrode connected to an inverter output node 2035. The inverter output node 2035 is commonly connected to the gate electrode and one current carrying electrode of a depletion-type transistor 2036 whose opposite current-carrying electrode is commonly coupled to the +5-volt source of potential. The second stage comprising transistors 2034 and 2035 form a conventional inverter and the output node 2035 is initially high since the low at node 2031 renders transistor 2034 non-conductive and the depletion-type transistor 2036 is normally conductive to connect the +5-volt source of potential to the inverter output node 2035.

As soon as the threshold established by node 2031 is reached, transistor 2034 is rendered conductive to pull the inverter output node 2034 to ground causing the inverter output to go low as known in the art. The transistor 2034 turns on very slowly since its gate electrode follows the voltage rise at node 2031 and as soon as the voltage at node 2031 rises to approximately one threshold above ground, transistor 2034 will then switch to a fully conductive state to pull node 2035 low and while the switching action at the inverter output node 2035 appears relatively slow, it is significantly faster than the transition occurring at the v signal input. The first stage comrprising transistors 2030 and 2032 form a level shifting circuit which establishes a threshold at node 2031 via a voltage divider effect as previously described since the transistors 2030 and 2032 function as voltage controlled resistors such that the output drive at node 2031 is used to provide the drive to the inverter stage comprising transistors 2034 and 2036 as described hereinabove.

The third stage of the buffer logic circuit of FIG. 5A2 functions as a cascaded buffer amplifier stage to amplify the inverter output and supply sufficient input drive to the next inverter stage as hereinafter described. The output of the second stage inverter comprising transistors 2034 and 2036 is taken from node 2035 and connected directly to the gage electrodes of cascaded transistors 2037 and 2038. One current-carrying electrode of transistor 2037 is connected to ground via the grounding lead 2033 and its opposite current-carrying electrode is connected to node 2039. Node 2039 is connected to one current-carrying electrode of a gain control transistor 2040 and simultaneously to the gate electrode of a transistor 2041. The opposite current-carrying electrode of the gain control transistor 2040 is connected to the common +5-volt source of potential.

One current-carrying electrode of the second cascaded transistor 2038 is connected to ground through the common grounding lead 2033 while the opposite current-carrying electrode is connected to an output node 2042 and node 2042 is connected to one current-carrying electrode of a transistor 2041 whose opposite current-carrying electrode is connected to the +5-volt source of potential. Transistors 2040 and 2041 are depletion-type devices while transistors 2037 and 2038 are normal enhancement-type transistors.

Node 2042 is directly connected to an output node 2043 and node 2043 is connected to the gate electrode of a transistor 2044 of the next inverter stage of the buffer logic circuit of FIG. 5A but output node 2043 is also connected to the gate electrode of the gain control transistor 2040 via a feedback lead 2045.

Since the inverter output node 2035 of the second stage of the buffer logic circuit of FIG. 5A2 is initially high, transistors 2037 and 2038 initially conduct to pull nodes 2039, 2042 and 2043 to ground such that the input to the next inverter stage which is supplied from the output node 2043 to the gate electrode of transistor 2044 is initially low so that the amplifier stage comprising transistors 2037, 2038, 2040 and 2041 include an inversion.

In addition to the inversion feature, the buffer stage provides significantly increased gain due to the positive feedback from node 2043 to the gate electrode of transistor 2040 via lead 2045 as known in the art. The amplifier output at node 2043 is normally and initially pulled toward ground potential. As the output of the second stage inverter goes low, the two lower cascaded transistors turn off slowly and cause the output at node 2043 to rise. The feedback supplied via lead 2034 increases the conductivity of the depletion-type transistor 2040 causing it to conduct more rapidly . The more rapid conduction of transistor 2040 causes node 2039 to go high more quickly which in turn drives the gate electrode of transistor 2041 to turn it on more quickly thereby causing the output node 2043 to rise much more quickly than the inverter output 2035. Therefore, the signal at output node 2043 is initially low and then rises very sharply when the output of the second inverter stage comprising transistors 2034 and 2036 responds to the attainment of the threshold level established at node 2031 for causing the inverter output node 2035 to go low.

The fourth stage of the buffer logic circuit of FIG. 5A2 is a second inverter stage comprising transistors 2044 and transistor 2046. Transistor 2044 has one current-carrying electrode connected to ground through the common grounding lead 2033 and its opposite current-carrying electrode connected to an inverter output node 2047. The inverter output node 2047 is commonly connected to the gate electrode and one current-carrying electrode of a depletion mode transistor 2046 whose opposite current-carrying electrode is connected to the common +5-volt source of potential. Therefore, the inverter output node 2047 is initially high since the inverter input which is taken from node 2043 is initially low and then goes very sharply low when the inverter input signal from node 2043 goes high as previously described.

The output from the inverter stage comprising transistos 2044 and 2046 is taken from node 2047 and connected via lead 2048 to one current-carrying electrode of a pass transistor 2049 whose opposite current-carrying electrode is connected to a node 2050. Since the master clock is up and running immediately upon supplying power to the system, the master clock phase $H_1$ is supplied immediately to the gate electrode of transistor 2049 and additionally to the first clock phase input C of an R/S clock flip-flop 2051 to be hereinafter described. Whenever the clock phase $H_1$ is high, the pass transistor 2049 samples the signal at the inverter output node 2047 via lead 2048 and when the signal $H_1$ is low, the inverter output node 2047 and the pass transistor 2049 function as a conventional sample and hold circuit.

The output of the pass transistor 2049 is supplied to node 2050 and node 2050 is connected to the gate electrode of a transistor 2052 which is part of a latching circuit comprising transistors 2052, 2053, 2054 and 2055, respectively. Node 2050 is also connected via lead 2057 to one current-carrying electrode of a latching feedback transistor 2056 whose opposite current-carrying electrode is connected via feedback lead 2058 to the latch output node 2059 while the gate electrode of transistor 2056 is connected to receive the $H_2$ clock phase signals for use as hereinafter described.

One current carrying electrode of transistor 2052 is connected to ground through the common grounding lead 2033 while its opposite current-carrying electrode is connected to an inverter output node 2060. The inverter output node 2060 is commonly connected to the gate electrode and one current-carrying electrode of a depletion-type transistor 2053 whose opposite current-carrying electrode is connected to the −5-volt source of potential. Simultaneously, the inverter output node 2060 is directly connected to the gate electrode of the transistor 2055 which has one current-carrying electrode connected to grouond through the common grounding lead 2033 and its opposite current-carrying electrode connected to the second inverter output node 2059 which serves as the latch output node as well. Node 2059 is commonly connected to the gate electrode and one current-carrying electrode of a second depletion-type transistor 2054 having its opposite current-carrying electrode connected to the common +5-volt source of potential previously described.

The operation of the latching circuit comprising transistors 2052, 2053, 2054, 2055 and 2056 will now be briefly described. As previously indicated, the signal at the output node 2047 of the second inverter stage comprising transistors 2044 and 2046 is initially high and this high is transmitted via lead 2048 and the pass transistor 2049 to inverter input node 2050 when the clock phase signal $H_1$ goes high. A high at the gate electrode of transistor 2052 will render it conductive to pull node 2060 to ground. With node 2060 initially low, transistor 2055 will be rendered non-conductive so that the depletion-type transistor 2054 will conduct to cause the output node 2059 to be initially high. This high is fed back each time the $H_2$ signal goes high via feedback lead 2058, the conducting pass transistor 2056 and feedback lead 2057 to maintain the input node 2050 high and attain the latch effect as known in the art.

The purpose of the feedback pass transistor 2056 in the latch circuit hereinabove described, in addition to latching the input node 2050, protects the circuit should the pass, transistor 2049 sample the output of the inverter 2046, 2044 during a signal transition period. For example, if the inverter output at node 2047 were in the middle of a transision from high to low, one half a logic level would be passed to input node 2050. While this may be sufficient charge to change the state of the first inverter stage of the flip-flop comprising transistors 2052 and 2053, it may not be enough to change the output state of the inverter of the second stage comprising transistors 2054 and 2055.

Therefore, the feedback signal from the output node 2059 via pass transistor 2056 restores input node 2050 to its original logic state and flips the first inverter stage comprising transistors 2052 and 2053 back to their original state to await the next sampling time $H_1$. Therefore, by the next sampling time $H_1$, the inverter output node 2047 will have completed its transistion so that the conduction of the pass transistor 2049 will provide a sample of sufficient magnitude to the gate of the transistor 2052 to insure flipping both inverter stages and setting the latch as known in the art.

The output node 2059 of the latch stage previously described is connected to one current-carrying electrode of another pass transistor 2061 whose opposite current-carrying electrode is connected to a node 2062. The gate electrode of pass transistor 2061 is connected to the source of the second phase master clock signals $H_2$ so that each time $H_2$ goes high, the transistor 2061 is rendered conductive to sample the signal at the output node 2059 of the latch circuitry and pass a sample of the latch output to the input node 2062.

Node 2062 is connected directly to one inverted input of a logical OR gate 2063 having two inverted inputs and to the input of an inverter 2064 whose output is connected to one inverted input of a logical OR gate 2065 having two inverted inputs. As known in the art, a logical OR gate having inverted input functions as a NAND gate. The output of OR gate 2063 is connected directly to a node 2066 and output node 2066 is connected directly to the reset input R of the R/S clock flip-flop 2051 and is connected back to the second inverted input of the OR gate 2065. Similarly, the output of OR gate 2065 is connected directly to node 2067 and node 2067 is connected directly to the set input S of the flip-flop 2051 and is connected back to the second inverted input of OR gate 2063 in a standard latching arrangement to insure that both outputs are not high simultaneously. The R/S flip-flop 2051 can be more fully understood by referring to the block diagram of FIG. 9.21 A and the schematic of FIG. 9.21 B.

As previously described, the first phase clock input C of R/S flip-flop 2051 is connected to receive the first master clock phase signals $H_1$ while the second clock phase input $\overline{C}$ is connected to receive the second phase master clock signals $H_2$. The clocked R/S flip-flop 2051 has a non-inverted Q output which outputs the signal $v_0$ via lead 2068 and a $\overline{Q}$ output which supplies the signal $\overline{v_0}$ via lead 2069. The buffered output signals $v_0$ and $\overline{v_0}$ are used for initializing various circuits in micropocessor system of FIG. 5 and in the decoder circuitry of FIG. 6 as hereinafter described.

As presently configured, the operation of the R/S flip-flop 2051 is as follows. As previously described, the signal at the output node 2059 of the latching circuit comprising transistors 2052, 2053, 2054, 2055, and feedback transistor 2056 is initially high and this high is passed to input node 2062 each time the clock signal $H_2$ goes high causing pass transistor 2061 to conduct. When a high is supplied to input node 2062, a low appears at the output of inverter 2064 and with a low at one inverted input of OR gate 2065, a high appears at its output and is transmitted to node 2067. The high at node 2067 is supplied directly to the set input of the flip-flop 2051 and is supplied back to one inverted input of OR gate 2063.

Simultaneously, the high from node 2062 is supplied to the opposite inverted input of OR gate 2063 and with both inputs high, the output of OR gate 2063 goes low causing a low to appear at node 2066. The low at node 2066 is supplied to the reset input of R/S flip-flop 2051 and is conducted back to one inverted input of OR gate 2065 for latching the outputs in that state. The first clock phase signal will pass the high present at node 2067 into the input of the flip-flop and the second clock phase signal will set and latch the flip-flop outputs in the set state so that the power-on reset signal $v_0$ is initially high while the signal $v_0$ is low.

As previously described, as soon as the capacitors 1147 and 1151 of FIG. 5A1 have reached their desired charge, the output latch causes the output flip-flop to reset which causes the power-on reset signal v on input lead 2025 to return high which, as described herein, causes the signal at the latch output node 2059 to quickly go low. On the next clock time $H_2$, this low is passed via conducting transistor 2061 to input node 2062. A low at node 2062 is transmitted to one inverted input of OR gate 2063 causing a high to appear at node 2066. The high at node 2066 is supplied back to a first inverted input of OR gate 2065 while the low at node 2062 is inverted by inverter 2064 so that a high is presented to the second input of OR gate 2065 as well. With both of its inputs high, OR gate 2065 supplies a low to node 2067 so that a low is presented to the set input while a high is presented to the reset input of the clocked R/S flip-flop 2051. Therefore, after the next clock sequence, the R/S flip-flop 2051 will be reset causing the signal $v_0$ supplied from the Q output via lead 2068 to go sharply low while the power-on reset $\overline{v_0}$ which is taken from the $\overline{Q}$ output via lead 2069 will go sharply high and these signals will be used for initialization purpoes as hereinafter described.

5.4 Clock Fail Detector Circuit

The clock fail detector circuit of block 1144 of FIG. 5A will now be described with reference to the schematic diagram of FIG. 5A3. The purpose of the clock fail detector of FIG. 5A3 is to monitor the normal operation of the master clock phases $H_1$, $H_2$ and to detect a clock failure and output a clock fail signal $v_1$ should the master clock stop in either phase condition and for generating a clock fail control signal $V'_1$ which is utilized by the MPU reset control logic of block 1145 of FIG. 5A to initiate an MPU reset interrupt whenever normal clock operation is restored after a detected clock failure, as hereinafter described.

The clock fail detector circuit of FIG. 5A3 has the first phase master clock signal $H_1$ supplied to the first input of a logical NAND gate 1201 while the second master clock phase signal $H_2$ is supplied to the first input of a second NAND gate 1202. The second input of each NAND gates 1201 and 1202 is supplied with the internal power-on reset signal $\overline{v_0}$ from output lead 2069 of FIG. 5A2. Since the clocked R/S flip-flop 2051 of the circuit of FIG. 5A2 is normally in the reset condition after the initial power-on reset period, the signal $\overline{v_0}$ is normally high so as to enable one input of each of the NAND gates 1201 and 1202 during normal operation and to disable the operation of the clock fail detector during the initial power-on reset phase when R/S flip-flop 2051 is set while the capacitors 1147 and 1151 of FIG. 5A1 are charging.

The output of NAND gate 1201 is connected directly to input node 1203 and node 1203 is connected directly to the gate electrode of a transistor 1204 and via lead 1205 to the gate electrode of a transistor 1206. The transistor1204 has one current-carrying electrode connected to ground via a common grounding lead 1207 and its opposite current-carrying electrode connected to node 1208 and node 1208 is commmonly connected to one current-carrying electrode and the gate electrode of a transistor 1209 whose opposite current-carrying electrode is connected to ground through the common grounding lead 1207. Node 1208 is also commonly connected to the gate electrode and one current-carrying electrode of a depletion-type transistor 1210 whose opposite current-carrying electrode is connected to a +5-volt source of potential. Lastly, the node 1208 is connected via lead 1211 to the gate electrode of a transistor 1212.

One current-carrying electrode of transistor 1212 is connected to ground through the common grounding lead 1207 and its opposite current-carrying electrode is connected to a node 1213. Node 1213 is connected to a first current-carrying electrode of the transistor 1206 whose opposite current-carrying electrode is connected to the +5-volt source of potential. The node 1213 is also connected via lead 1214 to a node 1215. Node 1215 is connected directly to the gate electrode of a transistor 1216 and to one plate of a charging capacitor 1217 whose opposite plate is connected to ground through the common grounding lead 1207. One current-carrying electrode of transistor 1216 is connected to the first current-carrying electrode of another transistor 1218 and the second current-carrying electrode of transistor 1216 is connected to an output node 1219. The output node 1219 is commonly connected to one current-carrying electrode and the gate electrode of a depletion-type transistor 1220 whose opposite current-carrying electrode is connected directly to the +5-volt source of potential.

The output of NAND gate 1202 is connected directly to an input node 1221 and node 1221 is connected to the gate electrode of a first transistor 1222 and via lead 1223 to the gate electrode of a transistor 1224. One current-carrying electrode of transistor 1222 is connected to ground through a common grounding lead 1225 and the opposite current-carrying electrode is connected to a node 1226. Node 1226 is commonly connected to the gate electrode and one current-carrying electrode of a transistor 1227 whose opposite current-carrying electrode is connected to ground through the common grounding lead 1225. Node 1226 is also commonly connected to the gate electrode and one current-carrying electrode of a depletion-type transistor 1228 whose opposite current-carrying electrode is connected to a +5-volt source of potential.

The node 1226 is also connected via lead 1229 to the gate electrode of a transistor 1230 having one current-carrying electrode connected to ground through the grounding lead 1225 and its opposite current-carrying electrode connected to node 1231. Node 1231 is connected to one current-carrying electrode of transistor 1224 whose opposite current-carrying electrode is connected to the +5-volt source of potential. Node 1231 is also connected via lead 1232 to a node 1233 and node 1233 is connected to the gate electrode of transistor 1218 and to one plate of a charging capacitor 1234 whose opposite plate is connected to ground through the common grounding lead 1225. As previously described, the first current-carrying electrode of transistor 1218 is connected to one current-carrying electrode of transistor 1216 and the opposite current-carrying electrode of transistor 1218 is connected to ground via the common grounding lead 1225.

The output node 1219 is connected via lead 1235 to a node 1236 and node 1236 is connected to a first input of NOR gate 1237 and to the first input of a second NOR gate 1238. The output of NOR gate 1237 is connected to node 1239 and node 1239 is connected to the second input of NOR gate 1238 and is fed back via lead 1240 to the first input of a three input NOR gate 1241 and the second input of NOR gate 1241 is adapted to receive the $v_0$ power-on reset signal from the output of the buffer logic circuit of FIG. 5A2 via lead 2068 and the third input of NOR gate 1241 is connected to receive the MPU reset signal $a_9$ from the MPU reset control circuitry of block 1145 of FIG. 5A as hereinafter described via lead 1242. The output of NOR gate 1241 is connected directly to an output node 1243. Node 1243 is used to output the clock fail signal $v_1$ via lead 1244 and is fed back via lead 1245 to the second input of NOR gate 1237. The cross-coupled outputs of NOR gates 1237 and 1241 form a conventional latching circuit as known in the art. The clock failure signal $v_1$ is normally low in the absence of a clock failure but goes high whenever a clock failure is detected as hereinafter described.

The output of NOR gate 1238 is connected directly to the set input S of a clocked R/S flip-flop 1246 and to the input of an inverter 1247 whose output is connected directly to the reset input R of the R/S flip-flop 1247. One clock phase input $\overline{C}$ is supplied with the master clock signal $H_1$ while the second clock phase input C is connected to receive the second clock signal $H_2$ so that whenever the output of NOR gate 1238 is low, one clock time $H_1$, $H_2$ later, the R/S flip-flop 1246 is reset causing the Q output to go low and whenever the output of NOR gate 1238 is high, then one clock time later the R/S flip-flop 1246 is set so that the Q output goes high, as known in the art. The non-inverted or Q output of the R/S flip-flop 1246 is connected directly to a first input of NAND gate 1248 whose other input is connected to receive th clock signal $h_3$ which occurs once each sixteen master $H_1$, $H_2$ clock pulses and is used to synchronize all serial operations and the input/output circuitry, as previously explained via lead 1058.

The NAND gate 1248 outputs the signal $v'_1$ via lead 1249 to the MPU reset control circuit of block 1145 of FIG. 5A as hereinafter described. The signal $v'_1$ is a normally high signal which goes low whenever the R/S flip-flop 1246 is set to indicate the restoration of normal clock operation after a clock fail condition and upon the arrival of the next clock signal $h_3$. The signal $v'_1$ is used to set a flip-flop in the MPU reset control logic of block 1145 of FIG. 5A to initiate an MPU reset interrupt, as hereinafter described, whenever the master clock is restored to normal operation after a detected clock failure.

The operation of the clock fail detector of FIG. 5A3 will now be described. The operation will be described with respect to the upper circuitry having the first master clock phase $H_1$ input although the lower circuitry having the secondary master clock phase $H_2$ input operates in exactly the same manner with the two circuit sections being 180 degrees out of phase with one another. Assuming that we are not in the initial power-on reset mode, the signal $\overline{v_0}$ is normally high to enable both NAND gates 1201 and 1202. Therefore, when the first clock phase signal $H_1$ goes high, the output of NAND gate 1201 goes low and this low is supplied via node 1203 to the gate electrode of transistor 1204 to render it non-conductive and via lead 1205 to the gage electrode of transistor 1206 to render it non-conductive or at least relatively non-conductive with respect to transistor 1212. When transistor 1204 is non-conductive, node 1208 goes high since the depletion mode transistor 1210 is normally conductive to supply the +5-volt sourvce of potential via lead 1211 to the gate electrode of transistor 1212 rendering it conductive. When transistor 1212 conducts, the capacitor 1217 is discharged to ground via node1215, lead 1214, the at least partially conducting transistor 1212, and the grounding lead 1207.

Similarly, when the master clock phase $H_1$ goes low, the output of NAND gate 1201 goes high and this high is supplied to node 1203. From node 1203, the high is supplied to the gate electrode of transistor 1204 causing it to conduct and pull node 1208 low and via lead 1205 to the gate of transistor 1206 causing it to conduct and drive node 1213 high. The low from node 1208 is supplied via lead 1211 to the gate electrode of transistor 1212 rendering it relatively non-conductive so that the conducting transistor 1206 charges the capacitor 1217 fro the +5-volt source of potential through the conducting transistor 1206, node 1213, lead 1214 and node 1215. The operation continues in this manner so long as the clock functions normally.

Transistor 1206 and transistor 1212 function as voltage controlled resistors with the value of the resistance of transistor 1206 being less than the value of the resistance of transistor 1212 so that it is easier to charge the capacitor 1217 through the conducting or partially conducting transistor (resistor) 1206 than it is to discharge the capacitor 1217 throughthe conducting or partially conducting transistor (resistor) 1212. Therefore, so long as the circuit continues to operate normally, the capacitor 1217will charge faster than it discharges so that a charge will continue to build on the capacitor 1217 during normal operation.

After the circuit has been operating for a short time, the normal charge maintained on the capacitor 1217 and the normal charge maintained on the capacitor 1234 which are supplied via nodes 1215 and 1233 respectively to the gate electrodes of transistors 1216 and 1218 is sufficient to render transistors 1216 and 1218 conductive so as to pull node 1219 low toward ground via conducting transistors 1216, 1218 and the grounding lead 1225 so long as the circuit operates normally. The low at output node 1219, therefore, indicates normal clock operation or the absence of a clock failure.

So long as the low appears at node 1219, one input of NOR gate 1237 and one input of NOR gate 1238 are enabled. Assuming we are not in the power-on reset mode and the MPU reset signal $a_9$ has not been generated and since we have indicated we have not yet detected a clock failure but are operating under normal conditions, the output of NOR gate 1241 the clock failure signal $v_1$ will be low to indicate the absence of a clock fail condition. The low from the output of NOR gate 1241 is fed back from node 1243 via lead 1245 to one input of NOR 1237 and since both inputs of NOR gate 1237 are low, its output goes high. With a high at node 1239, lead 1240 feeds this high back to NOR gate1241 to latch its output low so long as no clock failure exists and the high at one input of NOR gate 1238 causes the output to go low so that the R/S flip-flop 1246 is reset after one master clock time causing the Q output to go low to disable NAND gate 1248 and maintain the signal $v'_1$ normally high.

Should a master clock failure occur, one of the clock phases $H_1$, $H_2$ will be held high while the other is held low. Under these circumstances, one of the charging capacitors 1217 or 1234 will be discharged toward ground through the corresponding conducting transistor 1212 or 1230 which is maintained in a conductive state for more than the normal amount of time. When the voltage on the capacitor falls below the predetermined level required to maintain its corresponding output transistor 1216 or 1218 conductive, at least one of the transistors 1216 and 1218will be rendered non-conductive to break the conductivepath to ground via grounding lead 1225 and allow the output node 1219 to be pulled high by the normally conducting depletion-type transistor 1220 via the +5-volt source of potential.

As the output node 1219 goes high, the output of NOR gate 1237 goes low and this low appears at node 1239 and is fed back via lead 1240 to the third and final input of NOR gate 1241. Since all three inputs of NOR gate 1241 are now low, its output goes high and this high is supplied to the output node 1243. A high at the output node 1243 causes the clock fail signal $v_1$ to go high indicating a clock failure and this signal is supplied via lead 1244 to the MPU reset control circuit of block 1145 of FIG. 5A as hereinafter described. The high from output node 1243 is also connected back to the input of NOR gate 1237 for latching the state of its output low for enabling one input of NAND gates 1238 and 1241. Since the high at node 1219 is supplied to the other input of the enabled NOR gate 1238, its output remains low causing the R/S flip-flop 1246 to remain in the reset state so that the output of NAND gate 1248 remains normally high.

Once all inputs of NOR gate 1241 have gone low causing the output node 1243 to go high and the clock fail signal $v_1$ which is outputted on lead 1244 to go high to cause the circuit of FIG. 4G to generate an alarm signal GH2 to disable the fuel pumps to prevent fires and the like. The high from node 1243 is also connected back via lead 1245 to one input of NOR gate 1237 for disabling same and causing its output to go low. With a low node 1239, one input of NOR gate 1238 is enabled while the other input is still supplied with the high clcok fail signal from node 1219 via lead 1235 and node 1236 so as to maintain the output of NOR gate 1238 low to maintain th R/S flip-flop 1246 in the reset state. Since the R/S flip-flop 1246 is maintained in the reset state, the output of NAND gate 1248 the signal $v'_1$, is still maintained normally high.

If the clock fail condition corrects itself, flip-flop 1246 is set to cause $v'_1$ go to momentarily low. When $v'_1$ goes low, the MPU reset logic of Block 1145 of FIG. 5A will reset the MPU, as hereinafter described. After the MPU reset and during continued normal clcok operation, capacitors 1217 and 1234 are again charged until node 1219 is pulled normally low. When the low appears at node 1219, the output of NOR gate 1237 remainslow since the second input thereof is disabled by the clock fail signal $v_1$ from output node 1243 but the low from node 1219 is transmitted via lead 1235 and node 1236 to the second input of the enabled NOR gate 1238 causing its output to go high. When the output of NOR gate 1238 goes high, a high is applied to the set input while a low is applied to the reset input of the R/S flip-flop 1246 so that after the clock time, R/S flip-flop 1246 sets to indicate that the clock fail condition has been corrected.

With the R/S flip-flop 1246 set, the Q output gos high and the next time the clock signal $h_3$ goe high, the output of NAND gate 1248, the signal $v'_1$, goes low for the duration of the clock time $h_3$. the low $v'_1$ signal indicates that normal clock operation has been restored after a detected clock fail condition, and since this signal is supplied to the MPU reset control circuit of block 1145, the signal $a_9$ will go momentarily high and this high will be supplied via lead 1242 to one input of NOR gate 1241.

With a high at one of its inputs, the output of NOR gate 1241 goes low to clear the clock fail signal and return the $v_1$ output to its normally low state indicating the absence of a clock fail condition and to allow the fuel pump operation to be restored to computer control. The low from node 1243 is supplied back via lead 1245 to the second input of NOR gate 1237 whose opposite input is already supplied with the low from node 1219 via lead 1235 and node 1236 causing the output of NOR gate 1237 to go high. The high from the output of NOR gate 1237 is taken from node 1239 and supplied via lead 1230 back to enable one input of NOR gate 1241 and is supplied to one input of NOR gate 1238 for disabling same and causing its output to go low. A low at the output of NOR gate 1238 will cause a low to appear at the set input and a high to appear at the reset input of the R/S flip-flop 1246 so that after one master clock interval, th R/S flip-flop 1246 is again reset causing the Q output to go low and the signal $v'_1$ at the output of NAND gate 1248 to be returned to its normally high state.

Since the signal $v'_1$ is supplied to the MPU reset control logic of block 1145 as previously explained, it will clear the clock fail reset indication and the signal $a_9$ will go low again at the next $\overline{h_3}$ pulse so that two inputs of NOR gate 1241 are enabled while the third input, the input supplied from the output of NOR gate 1237 via node 1239 and lead 1240 is latched high so as to latch the output of NOR gate 1241 low until the detection of the next clock fail signal by the appearance of a high at node 1219. It will be observed, that if a power-on reset occurs, the signal $\overline{v_0}$ will go low to disable the input NAND gates 1201 and 1202 while the signal $v_0$ on lead 2068 will go high to clear any clcok signal $v_1$ and enable NOR gate 1237 as previously described.

The clock fail detector circuit of FIG. 5A3 is able to monitor normal operation of the master clock and is able to detect a clock fail condition and generate an output signal indicative of the clock failure. The clock-fail signal $v_1$ may be supplied via lead 1125 to the circuit of FIG. 5G for generating the alarm signal GH2 as previously described. The R/S flip-flop 1246 which is normally reset even when a clock failure is detected is set causing the outputpulse $v'_1$ to momentarily low for one clock time to initiate an MPU reset via the MPU reset control logicof block 1145 to indicate that normal clock operation has been restored after a detected clock failure, as hereinafter described. The reset is used to reinitiate the program sequence which may have been lost or disrupted due to the absence of the clock and as soon as reset has been accomplished, the clock fail detector circuit of FIG. 5A3 is restored to normal operations to enable it to detect future clock failures and the corrections thereof.

5.5 The MPU Rest Control Logic

The MPU reset control logic of block 1145 of FIG. 5A will now be described with reference to the schematic diagram of FIG. 5A4. The MPU reset circuit of FIG. 5A4 responds to the restoration of normal clock operation after a detected clock failure and/or the actual detection of some other type of computer failure, as described with respect to the watchdog circuit of block 1146 of FIG. 5A, and causes the generation of an MPU reset pulse $v_3$ which is transmitted back to the microprocessor of block 1132 to reset the computer in an attempt to restore normal operation. The MPU rest pulse is sixteen microseconds wide unless caused by the initial power-on reset signal $v_0$. If the MPU reset was successful and/or the failure problem eliminated, the MPU reset control circuit of FIG. 5A4 detects the correction of the previous failure condition and outputs a signal for clearing the failure indication so as to inform the microprocessor system of block 1132 of FIG. 5 that the problem has been corrected.

The signal $v'_1$ from the output of NAND gate 1248 of FIG. 5A3 is supplied via lead 1249 to one inverted input of a logical OR gate 1250 whose opposite inverted input is supplied with the watchdog counter overflow signal $b_9$ to be hereinafter described with respect to the circuit of block 1146 of FIG. 5A, via lead 1251. As known in the art, a logical OR gate with two inverted inputs functions as a logical NAND gate but for the sake of description it will be referred to hereinafter as an OR gate. The output of OR gate 1250 is connected directly to input node 1252 and node 1252 is connected via lead 1253 to the set input S of a clocked R/S flip-flop 1254.

The R/S flip-flop 1254 has a set input S, a reset input R, a first clock phase input $\overline{C}$ connected to receive the first phase master clock signal $H_1$, a second clock phase input C connected to receive the second master clock phase signals $H_2$, a non-inverting Q output and a direct reset input DR for receiving the power-on reset signal $v_0$ from the output of the buffer logic circuit of FIG. 5A2 via lead 2068 for directly resetting the flip-flop 1254 when initializing the circuit. A further description of the clocked R/S flip-flop 1254 may be had by referring to the block diagram of FIG. 9.21A and the schematic of FIG. 9.21B hereof.

Node 1252 is also connected via lead 1255 to one inverted input of a logical AND gate 1256 whose opposite inverted input is connected to receive the clock signal $\overline{h_3}$ via lead 1063. As known in the art, the logical AND gate with two inverted inputs functions as a logical NOR gate but for the sake of description it will be referred to simply as an AND gate with reference being made to the inverted inputs where appropriate. The output of AND gate 1256 is connected via lead 1257 to the reset input R of the R/S flip-flop 1254. Furthermore, the output of OR gate 1250 which is connected to node 1252 is also connected to output the signal $c_9$ via lead 1258. The signal $c_9$ is a digital signal used in the watchdog circuit of block 1146 of FIG. 5A for setting the MPU fail control flip-flop and "failed-once" flip-flops thereof, as hereinafter described.

The Q output of R/S flip-flop 1254 is connected directly to node 1259 and node 1259 is used to output the MPU reset signal$a_9$ for supplying it to the clock fail detector of FIG. 5A3 via lead 1242 for clearing the clock fail signal once normal operation has resumed as previously described. Furthermore, the Q output node 1259 is connected directly to one input of a NOR gate 1260 whose other input is connected to lead 2068 for receiving the power-on reset signal $v_0$. The output of NOR gate 1260 is connected directly to node 1261 and node 1261 is directly to the gate electrode of a first transistor 1262 having one current-carrying electrode connected directly to a +5-volt source of potential and its opposite current-carrying electrode connected directly to an output node 1263. Node 1261 is also connected to the input of an inverter 1264 whose output is connected directly to the gate electrode of a second transistor 1265 having one current-carrying electrode connected directly to ground and its opposite current-carrying electrode connected to the output node 1263. The output node 1263 outputs the sixteen mircosecond wide MPU reset signal $v_3$ via lead 1266 for causing the microprocessor of block 1132 of FIG. 5 to reset itself in an attempt to eliminate the detected fault condition.

The operation of the MPU reset control circuit of FIG. 5A4 will now be described. When the clock fail detector circuit of FIG. 5A3 is operating normally, flip-flop 1246 is reset causing the output of NAND gate 1248, a signal $v'_1$, to be normally high in the absence of a corroded clock fail condition. Similarly, the signal $b_9$ from the output of the watchdog circuit of block 1146 of FIG. 5A will remain normally high so long as some other type of computer fault or failure does not occur.

So long as both of the inverted inputs of OR gate 1250are high, node 1252 is low and this presents a low to the set input of R/S flip-flop 1254 via lead 1253 and enables one inverted input of AND gate 1256 via lead 1255. During the fifteen microsecond period that the clock signal $\overline{h_3}$ is high, AND gate 1256 is disabled by the high $\overline{h_3}$ pulse at its other inverted input, but on the sixteenth count, $\overline{h}_3$ goes low causing the output of AND gate 1256 to supply a high via lead 1257 to the reset input of the R/S flip-flop 1254. After one clock time, the R/S flip-flop 1254 is reset causing th Q output to go low. This is the normal operating condition of the MPU reset control flip-flop 1254 and the low at the Q output node1259 enables one input of NOR gate 1260.

Assuming that we are not in the power-on reset condition, the signal $v_0$ which is supplied to the second input of NOR gate 1260 via lead 2068 is also low causing the output of NOR gate 1260 to go high. With a high present at node 1261, transistor 1262 is rendered-conductive while transistor 1265 is made non-conductive. The conditon of transistor 1262 connects th +5-volt source of potential to the output node 1263 causing th signal $v_3$ on lead 1266 to be normally high for permitting normal processor operation.

Whenever the input signal $v'_1$ goes momentarily low, indicating that the circuit of FIG. 5A3 detected a clock failure and its subsequent restoration to normal operation, or the input signal $b_9$ goes momentarily low, indicating the detection of a computer fail condition by the circuit of FIG. 5A5, as hereinafrer explained, the output of OR gate 1250 goes high and this high is transmitted to node 1252.

The high code 1252 is supplied to the set input of R/S flip-flop 1254 via lead 1253 and to one inverted input of NAD gate 1256 causing a low to be supplied from the output thereof to the reset input of flip-flop 1254. One clock time later, the MPU reset flip-flop 1254 is set causing the Q output to go high. With a high at the Q output, a high appears at node 1259. This high causes the output of NOR gate 1260 to go low to render transistor 1262 non-conductive and transistor 1265 conductive so as to pull output node 1263 to ground.

Therefore, the momentarily low $v'_1$ or $b_9$ input signal causes (1) the MPU reset signal $v_3$ on lead 1266 to go low to reset the microprocesor of block 1132 of FIG. 5; (2) to clear the clock the clock fail condition output $v_1$ of the circuit of FIG. 5A3 as previously described; and (3) the signal $c_9$ on lead 1258 to go high for enabling the first failure detect flip-flop or triggering the MPU fail signal Z (if it is the second successive computer failure), as hereinafter described with reference to FIG. 5A5.

One clock time later, the momentarily low $v'_1$ or $b_9$ signal will again go normally high causing the output of OR gate 1250 to supply a low to node 1252. This causes $c_9$ to again go low and supplies a logical zero to the set input of the MPU reset flip-flop 1254. The low at node 1252 is also supplied via lead 1255 to enable AND gate 1256 so that a high is transmitted to the rest input of flip-flop 1254 as soon as $\overline{h}_3$ goes low. One clocktime thereafter, the MPU reset flip-flop 1254 is reset to its normal state causing the Q output to go normally low.

The low from the Q output is supplied to node 1259 to pull the $a_9$, signal on lead 1242 back to its normally low state and for enabling one inverted input of OR gate 1260 so that node 1260 returns to its normally high state. With node 1261 again high, transistor 1265 is turned off and transistor 1262 is turned on so that output node 1263 returns to its normally high state causingthe signal $v_3$ on lead 1266 go go high to permit normal processor operation.

5.6 Watchdog Circuit The watchdog circuit of block 1146 of FIG. 5A will now be described with reference to a schematic diagram of FIG. 5A5. The purpose of the watchdog circuit of FIG. 5A5 is to monitor the performance of the microprocessor of block 1132 of FIG. 5 and to detect a computer failure if such should occur. The watchdog circuit monitors the generation of a predetermined command signal which is generated at periodic intervals so long as the computer is operating properly. Improper operation of the computer or a computer failure will be detected since the predetermined command signal will not be generated and this condition will permit a first counter to count successive engine crankshaft position pulses and attain a predetermined failure-indicating count. The attainment of the predetermined failure-indicating count will initiate an MPU reset command, as previously described with respect to the circuit of FIG. 5A4.

The generation of MPU reset signal sets an output flip-flop. If the MPU reset solves the problem and clears up the computer failure, a second counter will be enabled to begin counting, and if it attains a second predetermined count, without the occurrence of a subsequent failure, the output flip-flop is reset. If, however, a second failure is detected by the first counter having attained its predetermined failure-indicating first count before the second counter has attained its predetermined second count for resetting the output flip-flop, then a computer fail signal Z is outputted for turning off the power to the fuel pumps and/or enabling appropriate "limp-home" circuits, as hereinafter described.

A command signal $f_0$ is outputted from the command signal generator of block 1135 of FIG. 5, as hereinafter described, at various time intervals, as dictated by the programming of the microprocessor of block 1132 of FIG. 5 and the signal $f_0$ is supplied via lead 1267 to input node 1268. Node 1268 is connected to one inverted input of a logical AND gate 1269 having two inverted inputs and the output of AND gate 1269 is connected directly to the set input S of an R/S clocked flip-flop 1270. The R/S flip-flop 1270 has a set input S; a reset input R; a first clock phase input $\overline{C}$; a second clock phase input C; a direct reset input DR; a non-inverting output Q and an inverting output $\overline{Q}$. A more detailed description of the clocked R/S flip-flop 1270 may be had by referring to the block diagram of FIG. 9.21A and the schematic diagram of FIG. 9.21B, but the structure and operation thereof is conventional.

Input mode 1268 is also connected directly to the reset input R of the R/S flip-flop 1270 while, as previously described, the output of AND gate 1269 is connected directly to the set input S thereof. The first phase clock input C is supplied with the first clock phase signal H, while the second phase clock input C is supplied with the second clock phase signal $H_2$. The direct reset input DR is supplied with the power-on reset signal $V_0$ which is generated by the buffer logic circuit of FIG. 5A2, previously described via lead 2068.

The synchronized engine crankshaft position pulse $G_5$, which is generated by the crankshaft position pulse processor of FIG. 4F, as previously described, is supplied via lead 1044 to input node 2071. Input node 2071 is connected via lead 2072 to the second inverted input of AND gate 1269. Input node 2071 is also connected via lead 2073 to one inverted input of a logical AND gate 2074 having two inverted inputs, and via lead 2075 to one inverted input of another logical AND gate 2076 having two inverted inputs. The non-inverting Q output of the R/S flip-flop 1270 is connected via output lead 1277 to the second inverted input of AND gate 2076 while the $\overline{Q}$ output of R/S flip-flop 1270 is connected via lead 1278 to the second inverted input of AND gate 2074.

The output of AND gate 2074 is connected to one current-carrying electrode of a transistor 1279 whose opposite current-carrying electrode is connected directly to a node 1280. The node 1280 is connected directly to one input of NAND gate 1281 and via lead 1282 to a first inverted input of a logical AND gate 1283 having two inverted inputs. The gate electrode of transistor 1279 is connected to receive the first master clock phase signal $H_1$ while the second input of NAND gate 1281 is connected to receive the second master clock phase signals $H_2$. The output of NAND gate 1281 is supplied to an output node 1284. Node 1284 is connected directly to the input of an inverter 1285 whose output is connected directly to one inverted input of a logical AND gate 1286 having two inverted inputs. Node 1284 is also connected via lead 1287 to one inverted input of a logical AND gate 1288 having two inverted inputs.

The output of AND gate 1288 is connected directly to an output node 1289. Output node 1289 is connected via lead 1290 to the second inverted input of AND gate 1283; via lead 1291 to the first clock phase input $h_a$ of each of the three stages of a counter 1292, to be hereinafter described; and via lead 1390 is coupled back to the second inverted input of AND gate 1286. Similarly, the output of AND gate 1286 is connected directly to an output node 1293 and node 1293 is connected via lead 1294 to the second clock phase input $h_b$ of each of the stages of the counter 1292 and is coupled back via lead 1295 to the second inverted input of AND gate 1288. Since the output of AND gate 1286 is coupled via output node 1293 and lead 1295 back to one inverted input of AND gate 1288 and the output of AND gate 1288 is connected via output node 1289 and lead 1390 back to one inverted input of AND gate 1286, their outputs are cross-coupled back to opposing inputs so as to form a conventional latching arrangement, as known in the art. The output of AND gate 1283 is connected, via lead 1296, to the third clock phase input $h_c$ of each of the stages of the counter 1292.

The first counter or fail detect counter 1292 is a three stage counter each of whose stages is a static shift register having a first clock phase input $h_a$; a second clock phase input $h_b$; a third clock input $h_c$; a data or data shift input DS; a non-inverting output Q; and a direct reset input DR. Further details of the individual shift register comprising the three stage fail detection counter 1292 of FIG. 5A5 may be had by referring to the block diagram of FIG. 9.25 A and the schematic diagram of FIG. 9.25 B, but the operation thereof is conventional.

As known in the art, the clock phase input $h_a$ of each of the three stages whose outputs are labeled $Q_A$, $Q_B$, and $Q_C$, are commonly coupled to the input lead 1291; the second clock phase inputs $h_b$ of each of the three stages is commonly connected to lead 1294 and the third clock input $h_c$ of each of the three stages is connected to lead 1296. Furthermore, the direct reset inputs of each of the three stages are connected together and the three stages are connected such that the non-inverting Q output of the first stage whose output is labeled $Q_A$ is connected directly to the DS input of the second stage whose $Q_B$ output is connected directly to the DS input of the third stage to form a conventional shift register counter, as known in the art.

The $Q_A$ output of the first shift register stage of the fail detection counter 1292 is connected via output lead 1297 to a node 129. Node 1298 is connected directly to one inverted input of a logical AND gate 1299 having three inverted inputs and directly to one input of a logical AND gate 1300. The $Q_B$ output of the second shift register stage of the counter 1292 is connected directly to an output node 1301. Node 1301 is connected via lead 1302 to a node 1303, and node 1303 is connected simultaneously to the second inverted input of AND gate 1299 and to the first input of a two input logical AND gate 1304. Output node 1301 is also connected directly to the input of an inverter 1305 whose output is connected via lead 1306 to a first input of another two input logical AND gate 1307.

The $Q_C$ output of the third shift register stage of the fail detection counter 1292 is connected directly to an output node 1308, and node 1308 is connected via lead 1309 to a node 1310. Node 1310 is connected directly to the second input of AND gate 1300 and to the second input of AND gate 1307. Output node 1308 is also connected to the input of an inverter 1311 whose output is connected to a node 1312. Node 1312 is connected directly to the third and final inverted input of AND gate 1299, and via lead 1313, to one input of a two input OR gate 1314 whose opposite input is taken directly from the output of AND gate 1300. The output of OR gate 1314 is supplied directly to the second input of AND gate 1304. A two input NOR gate 1315 has one input taken directly from the output of AND gate 1304; its other input taken directly from the output of AND gate 1307; and its output connected via lead 1316 to the data input DS of the first stage of the three stage fail detection shift register counter 1292, previously described.

The output of the three inverted input AND gate 1299 is connected directly to one current-carrying electrode of a transistor 1317 whose opposite current-carrying electrode is connected to one input of a two input NAND gate 1318 whose second input is connected to receive the clock signal $h_3$ via lead 1058 from the timing generator of the binary encoder circuitry of block 124 as previously described. The gate electrode of transistor 1317 is connected to receive the second master clock phase signals $H_2$, and NAND gate 1318 outputs the signal $b_9$ at a predetermined, maximum count indicative of a potential failure, via lead 1251, for transmission to the MPU reset control circuit of FIG. 5A4, as previously described. The signal $b_9$ is normally high indicating the absence of a clock failure but goes momentarily low for one clock time to indicate a potential clock failure whenever the counter 1292 has attained the predetermined count detected by the output decoding gate 1299, as hereinafter described.

The output decoding network comprising the gates 1300, 1304, 1307, 1314 and 1315 operate to decode the output of the three stages of the shift register counter 1292 to supply either a logical "1" or a logical "0" back to the DS input of the first stage of the shift register counter via lead 1316 to establish the count state sequence illustrated in the count state table of FIG. 5A6.

The MPU reset signal $a_9$, which is generated by the MPU reset control circuit of FIG. 5A4, is supplied via lead 1242 to one input of a three input NOR gate 1319. The second input of NOR gate 1319 is connected directly to a node 2077 which receives the power-on reset signal $v_0$ from the buffer logic circuit of FIG. 5A2 via lead 2068, as previously described. The third input of NOR gate 1319 is connected via lead 1320 to node 1321, and node 1321 is connected directly to the output of the two inverted input AND gate 2076, previously described. The output of NOR gate 1319 is connected directly to the input of an inverter 1322 whose output is connected directly to the direct reset DR inputs of each of the three stages of the shift register counter 1292 for initially claring the counter and forcing all zeroes to appear at the outputs $Q_A$, $Q_B$, $Q_C$, respectively.

As previously described, the output of the AND gate 2076 is connected directly to node 1321. Node 1321, in addition to being connected via lead 1320 to one input of the three input NOR gate 1319, is also connected to a first current-carrying electrode of a transistor 1323 whose opposite current-carrying electrode is connected directly to a node 1324. The gate electrode of transistor 1323 is connected to receive the first master clock signal $H_1$. Node 1324 is connected directly to one input of two input NAND gate 1325 whose second input is connected to receive the second master clock phase signals $H_2$. Node 1324 is also connected via lead 1326 to one inverted input of a logical AND gate 1327 having two inverted inputs. The output of NAND gate 1325 is connected directly to a node 1328. Node 1328 is connected directly to one inverted input of a logical AND gate 1329 having two inverted inputs and, simultaneously, to the input of an inverter 1330 whose output is connected directly to one inverted input of a second logical AND gate 1331 having two inverted inputs.

The output of AND gate 1329 is connected directly to output node 1332 which is connected (1) directly to the second inverted input of AND gate 1327; (2) via lead 1333 to the first clock phase input $h_a$ of each of the three stages of a second binary counter 1334, to be hereinafter described; and (3) via lead 1335 to a second inverted input of AND gate 1331. The output of AND gate 1331 is supplied directly to an output node 1336, and node 1336 is connected via lead 1337 to the second clock phase input $h_b$ of each of the three stages of the binary counter 1334, and via lead 1378 back to the second inverted input of AND gate 1329. The output of AND gate 1327 is connected via lead 1339 to the third clock phase input $h_c$ of each of the three stages of the binary counter 1334. Since the output of AND gate 1329 is connected via node 1332 and lead 1335 back to one inverted input of AND gate 1331 while the output of AND gate 1331 is connected via output node 1336 and lead 1338 back to one inverted input of AND gate 1329, the outputs are cross-coupled so as to form a conventional latching arrangement, as previously described.

Each of the three stages of the binary counter 1334 is a static shift register stage having a first clock phase input $h_a$; a second clock phase input $h_b$, a third clock input $h_c$, a direct reset input DR, a data in or data shift input DS, and a non-inverting output Q. The outputs of the first, second and third stages of the counter 1334 are designated $Q_1$, $Q_2$, and $Q_3$, respectively. Although each of the stages of the counter 1334 is a static shift register stage, as may be more fully understood by referring to the block diagram of FIG. 9.25 A and the schematic diagram of FIG. 9.25 B, the counter 1334 is not operated as a standard shift register counter but is connected so that its operation is similar to that of a conventional binary counter or at least it achieves a conventional binary count sequence as set forth in the count stage table of FIG. 5A7 to be hereinafter described.

The decoding logic associated with the output of the counter 1334 will now be described and reference may be had to the ROM notation convention illustrated in FIG. 9, previously described. The $Q_1$ output of the first stage of the counter 1334 is connected directly to an output node 1340. Node 1340 is connected to a vertical line 1341 which represents the non-inverted $Q_1$ output of the first stage of the counter, but node 1340 is also connected directly to the input of an inverter 1342 whose output is the vertical line 1343 which represents the $\overline{Q_1}$ output or inverted output of the first stage of the counter 1334.

Similarly, the $Q_2$ output of the second stage of the counter 1334 is connected directly to the output node 1344. Node 1344 is connected to output lead 1345 which is a vertical line representing the non-inverted $Q_2$ output of the second stage of the counter 1334. Node 1344 is also connected directly to the input of an inverter 1346 whose output is connected to the vertical lead 1347 which represents the $\overline{Q_2}$ output or inverted output of the second stage of the counter 1334 as known in the art. The $Q_3$ output of the third and final stage of the counter 1334 is connected via lead 1348 directly to one current-carrying electrode of a transistor 1349 whose opposite current-carrying electrode is connected to the input of an inverter 1350 whose output is connected directly to the input of the second inverter 1351 whose output is in turn connected directly to the reset input R of an R/S clocked flip-flop 1352 which is also referred to as the computer "first fail" flip-flop to be hereinafter described.

The decoding logic associated with the outputs of the counter 1334 include a first three input NOR gate represented by the horizontal line 1353; a second two input NOR gate represented by the horizontal line 1354; and a third two input NOR gate represented by the horizontal line 1355. The three inputs of NOR gate 1353 receive the signal $\overline{Q_1}$ from the output of inverter 1342 via lead 1343, the signal $\overline{Q_2}$ from the output of inverter 1346 via lead 1347, and the $\overline{Q}$ output of RS flip-flop 1352 which is supplied via lead 1356 to a node 1357, with node 1357 being connected as the third and final input of the NOR gate 1353. The output of NOR gate 1353 is connected as one input of a three input NOR gate represented by the vertical line 1389 and is also supplied via lead 1358 back to the DS input of the third stage of the counter 1334. The second input of the three input NOR gate represented by the vertical line 1389 is taken directly from node 1357 which is supplied via lead 1356 from the Q output of the R/S flip-flop 1352 as previously described.

The first input of the two input NOR gate 1354 receives the signal $Q_1$ as its first input from the output of the first stage of the counter 1334 via output node 1340 and lead 1341 while the second input of NOR gate 1354 receives the signal $Q_2$ from the output of the second stage of the counter 1334 from output node 1344 and lead 1345. The output of the two input NOR gate 1354 is connected as the third and final input of the three input NOR gate 1389 and the output of NOR gate 1354 is connected via lead 1359 back to the DS input of the second stage of the counter 1334.

The third and final two input NOR gate 1355 has one input connected to receive the signal $Q_1$ from the output of the first stage of the counter 1334 via the output node 1340 and lead 1341 and its second input connected to receive the $\overline{Q}$ output of the R/S flip-flop 1352 via lead 1356 and node 1357. The output of the two input NOR gate 1355 is taken from node 1360 and connected via lead 1361 to the DS input of the first stage of the counter 1334.

As previously described, each of the NOR gates represented by the horizontal lines 1353, 1354 and 1355 are depicted as having one end commonly coupled to one current-carrying electrode and the gate electrode of a pull-up transistor 1353*a*, 1354*a*, 1355*a*, respectively, each of whose opposite current-carrying electrodes is commonly coupled to a +5-volt source of potential for providing the necessary driving power to the respective NOR gates to insure proper logic levels as previously described. Similarly, the NOR gate represented by the vertical line 1389 is depicted as having one end commonly connected to the gate electrode and one current-carrying electrode of a pull-up transistor 1357*a* whose opposite current-carrying electrode is connected to a +5-volt source of potential for insuring sufficient driving power and proper logic levels.

The power-on reset signal $v_0$ from the output of the buffer logic circuit of FIG. 5A2, previously described, is supplied via lead 2068 to one inverted input of a logical OR gate 1362 having two inverted inputs. The second inverted input of OR gate 1362 is connected via lead 1363 to an output node 1364. Node 1364 is connected directly to the Q output of R/S flip-flop 1352, and the output of OR gate 1362 is connected to a direct reset DR input of each of the three stages of the counter 1334 for initially clearing or zeroing the counter, as known in the art.

The computer "first fail" flip-flop 1352 may be a conventional R/S clocked flip-flop having a set input S; a reset input R; a direct reset input DR; a first clock phase input $\overline{C}$; a second clock phase input C; a non-inverting output Q; and an inverting output $\overline{Q}$. A block diagram of a conventional RS flip-flop such as flip-flop 1352 is shown in FIG. 9.21 A and a detailed schematic diagram is illustrated in FIG. 9.21 B, as previously indicated. The first clock phase input C is connected to receive the first master clock phase signals $H_1$ while the second clock phase input C is connected to receive the second master clock phase signal $H_2$. As previously indicated, the reset input R is taken from the output of inverter 1351 and the $\overline{Q}$ output is connected via lead 1356 to node 1357 while the Q output is connected directly to output node 1364.

The power-on reset signal $v_0$ which was supplied via lead 2068 to node 277 is connected via lead 1365 to a node 1366. Node 1366 connects the power-on reset signal $v_0$ to the direct reset DR input of flip-flop 1352 via lead 1367, and node 1366 is also connected via lead 1368 to a first input of a two input NOR gate 1369 whose output is connected directly to a node 1370. The output node 1370 serves as a first switch contact but the output is also connected via lead 1371 to a second, and in the present case unused, switch contact. Output node 1370 is also connected back via lead 1372 to one input of a second two input NOR gate 1373 whose output is taken directly from a node 1374. Node 1374 also serves as a first switch contact but is also connected, via lead 1375, to a second unused switch contact. Output node 1374 is also connected back via lead 1376 to the second input of NOR gate 1369 to establish a conventional latching output circuit.

As previously described, the Q output of R/S flip-flop 1352 is connected directly to output noe 1364 and node 1364 is connected directly to one current-carrying electrode of a transistor 1377 whose gate electrode is connected to receive the first master clock signal $H_1$. The opposite current-carrying electrode of transistor 1377 is connected to one input of a logical AND gate 1378 whose output serves as the second input of the two input NOR gate 1373. The set signal $c_9$ to the MPU reset control flip-flop, which was outputted from the MPU reset control logic of FIG. 5A4, is supplied via lead 1258 to input node 1379. Node 1379 supplies the signal $c_9$ to the second input of AND gate 1378 and, simultaneously, to the set input S of the R/S flip-flop 1352 for use as hereinafter described.

A first output transistor 1380 has one current-carrying electrode connected to ground and its opposite current-carrying electrode connected to the computer fail output node 1381. Node 1381 is also connected to a first current-carrying electrode of a second output transistor 1382 whose opposite current-carrying electrode is connected directly to a +5-volt source of potential. The gate electrode of the first output transistor 1380 is connected directly to a mask-positionable switch arm 1383 which is, in the preferred embodiment of the present invention, positioned to connect the gate electrode of transistor 1380 directly to the first switch contact at the node 1370 at the output of NOR gate 1369, but which could, as known in the art, also be mask-positionable, by conventional LSI techniques, to the second switch contact associated with lead 1375 if it were desirable to reverse the polarity of the output signal present at node 1381.

Similarly, the gate electrode of transistor 1382 is connected directly to the mask-positionable switching arm 1384 which is, in the preferred embodiment of the present invention, positioned so as to complete a current path between the gate electrode of transistor 1382 and node 1374 at the output of NOR gate 1373, but which could, if desired, also have been positioned by conventional LSI masking techniques, to contact the second switch electrode associated with lead 1371 from the output of NOR gate 1369 if it were desired to reverse the polarity of the signal at output node 1381. The signal appearing at node 1381 is the computer fail signal "Z" which is outputted via lead 1385 to the "get home" or "limp home" circuitry of block 135 of FIG. 2 for shutting off the fuel pump and/or enabling the "get home" circuitry, as hereinafter described.

The operation of the watchdog circuit of FIG. 5A5 will now be briefly described. As previously indicated, the watchdog circuit includes a watchdog flip-flop 1270, an MPU fail flip-flop 1352, a shift register fail-detection counter 1292 and a binary failure-correction counter 1334. Assume initially that the watchdog flip-flop 1270 is set and the MPU fail flip-flop 1352 is reset.

The watchdog circuit operates by monitoring the generation of the command signals $f_0$ which are generated by the command signal generator of block 1135 of FIG. 5 in accordance with the programmed instructions of the microprocessor of block 1132 thereof. Each time a positive-going command signal $f_0$ is outputted from the circuit of block 1135, as hereinafter described, it arrives via lead 1267 to node 1268. The momentary high at node 1268 is supplied to one inverted input of AND gate 1269 to cause its output to go low so that a low is presented to the set input of the watchdog flip-flop 1270 while the high $f_0$ signal is supplied directly from input node 1268 to the reset input of flip-flop 1270. Therefore, one clock time $H_1$, $H_2$ later, the watchdog flip-flop 1270 counter 1292, as shown in the count state table of FIG. 5A6, from the decoding circuitry, hereinafter described.

Initially, the signal present at the outputs $Q_A$, $Q_B$ and $Q_C$ are each logical zeroes and are therefore low. The decoding circuitry used to feedback a logical "1" or logical "0" to the DS input of the first stage of the first fail counter 1292 includes AND gates 1300, 1304 and 1307, OR gate 1314 and NOR gate 1315 which function as described hereinbelow. With the outputs initially zero, a zero is presented to one input of AND gate 1300 via lead 1297 and node 1298 causing its output which serves as one input to OR gate 1314 to be low. The other input of OR gate 1314 is high since the low at output node 1308 is inverted by inverter 1311 causing a high to appear at node 1312 and this high is supplied via lead 1313 to the second input of OR gate 1314 causing its output to go high. The output of OR gate 1314 serves as one input to AND gate 1304 and therefore one input of AND gate 1304 is high.

The other input of AND gate 1304 is low since the low from the $Q_B$ output of the second stage of the counter 1292 is supplied via node 1301, lead 1302, and node 1303 to the second input of AND gate 1304 causing its output to go low. Since the output of AND gate 1304 is low, and since this serves as one input of NOR gate 1315, NOR gate 1315 has a low at one of its two inputs. Similarly, the low from the $Q_C$ output of the third stage of the counter 1292 is supplied via node 1308 and lead 1309 to a node 1310 and then to one input of AND gate 1307 causing its output to go low. With a low at one input of AND gate 1307, its output goes low and since its output serves as the second input of NOR gate 1315, the second input is also low.

With a low at both inputs of NOR gate 1315, a high appears at its output and this high is transmitted via lead 1316 to the DS input of the first stage of the fail counter 1292 so that one clock time $H_1$, $H_2$ after the first $G_5$ signal to arrive after the setting of the watchdog flip-flop 1270, the first stage or least significant bit of the three stage fail counter 1292 stores a logical "1" while the second and third stage store a logical "0" previously contained in the first and second stages respectively. Since the first stage whose output is designated $Q_A$ represents the least significant bit of the counter 1292 and the third stage whose output is designated $Q_C$ represents the most significant bit of the fail counter 1292, after the first pulse $G_5$ is counted, the count state 001 is stored therein.

Similarly, so long as the watchdog flip-flop 1270 remains set, each successive negative-going engine crankshaft position pulse $G_5$ to arrive at node 2071 will cause a shift register counter 1292 to augment its count by one via the decoding logic network comprising AND gates 1300, 1304, 1307, OR gate 1314 and NOR gate 1315 as previously described, so as to follow the count state table of FIG. 5A6. For example, the detection of the second $G_5$ pulse after the setting of the watchdog flip-flop 1270 will feed another one into the DS input of the first stage of the fail counter 1292 so that after the second $G_5$ pulse is detected, the count state 011 is stored therein. Similarly, after the third $G_5$ signal is detected, the count state 110 is attained while the detection of the fifth, sixth and seventh $G_5$ signals will generate the count state outputs 101, 010, and 100, respectively.

The AND gate 1299 has its three inverted inputs connected to the outputs of the three stages of the counters 1292 so as to detect the seventh count state, i.e., 100, i.e., when seven $G_5$ engine crankshaft position pulses have been detected since the watchdog flip-flop 1270 was initially set. When this condition exists, the zero from the $Q_A$ output of the first stage is supplied via lead 1297 and node 1298 to the first inverted input of gate 1299 while the logical zero at the $Q_B$ output of the second stage of the counter 1292 is supplied via node 1301, lead 1302 and node 1303 to the second inverted input of gate 1299 and the logical "1" present at the $Q_C$ output of the third stage of the fail counter 1292 is supplied to node 1308 and then inverted by inverter 1311 so that a low is presented via node 1312 to the third inverted input of gate 1299 causing the output thereof to go high.

When a high appears at the output of AND gate 1299 and the second clock phase signal $H_2$ goes high, transistor 1317 conducts to pass the high from the output of AND gate 1299 to one input of the NAND gate 1318 to enable same. When the next $h_3$ clock signal arrives at the other input of NAND gate 1318, via lead 1058, the output of NAND gate 1318 goes momentarily low for one clock time causing the signal $b_9$ on lead 1251 to go momentarily low. Since the signal $b_9$ is normally high, the momentarily low $b_9$ signal on lead 1251 indicates the existence or detection of a computer first fail condition and this momentarily low indicating a first computer fail condition is transmitted via lead 1251 to the MPU reset control circuit of FIG. 5A4, as previously described. When the computer fail signal $b_9$ arrives at the MPU reset control logic of FIG. 5A4, the set signal to the MPU reset control flip-flop 1352, the signal $CC_9$ immediately goes high and, one clock time later, flip-flop 1254 was set causing the MPU reset signal $a_9$ to go high, as previously described.

As soon as the signal $a_9$ goes high, it is supplied via lead 1242 to one input of NOR gate 1319 causing its output to go low and therefore the output of the inverter 1322 to go high so as to clear the fail counter 1292 since the high is supplied to the direct reset inputs of each of the three stages of the shift register fail counter 1292 as previously described so as to enable the counter to begin monitoring for a second computer failure if the MPU reset is unsuccessful. As soon as the signal $c_9$ goes high, it is supplied, via lead 1258, to node 1379. The high at node 1379 is supplied to the set input of the MPU "failed once" flip-flop 1352 to set same causing the Q output to go high and the $\overline{Q}$ output low. Prior to this time, the flip-flop 1352 was in the reset condition so that the low from the Q output was supplied to node 1364 and thence via lead 1363 to one inverted input of OR gate 1362 and since the high output of OR gate 1362 was supplied to the direct reset input of each of the three stages of the binary counter 1334, the counter was disabled so long as the MPU fail flip-flop 1352 remained reset. However, as soon as the first computer failure was detected and the signal $b_9$ went low, the high $c_9$ signal set the MPU fail flip-flop 1352.

Therefore, the MPU "failed once" fail flip-flop 1352 is set only after a first computer failure is detected. The setting of the computer failed once flip-flop 1352 causes a high to appear at node 1364 and this high is supplied via lead 1363 to one inverted input of OR gate 1362 whose opposite inverted input is already high since the power-on reset signal $\overline{v_0}$ is normally high. With both of its inputs normally high, the output of OR gate 1362 goes low leaving the three stages of the binary counter is reset causing the Q output to go low and the $\overline{Q}$ output high.

With the $\overline{Q}$ output of the watchdog flip-flop 1270 high, one inverted input of AND gate 2074 is disabled causing its output to go low. With one input disabled, the AND gate 2074 is unable to pass the properly conditioned and synchronized negative-going engine crankshaft position pulses $G_5$ from input node 2071 into the clock control circuitry comprising gates 1281, 1283, 1285, 1286 and 1288 as hereinafter described so that the shift register counter 1292 does not count. Simultaneously, the low from the Q output of the watchdog flip-flop 1270 is supplied via lead 1277 to one inverted output of AND gate 2076 to enable same.

When the next properly conditioned and synchronized negative-going engine crankshaft position pulse $G_5$ arrives via lead 1044 to input node 2071, the following events occur. The momentary low is supplied via lead 2075 to the second inverted input of AND gate 2076 whose opposite inverted input is already enabled by the low at the output of the watchdog flip-flop 1270 via lead 1277. With both of its inverted inputs low, the output of AND gate 2076 goes high causing a high to appear at node 1321. The high at node 1321 is supplied via lead 1320 to one input of NOR gate 1319. With one input of NOR gate 1319 high, its output goes low and this output is inverted by the inverter 1322 so that a high is presented to the direct reset DR input of each of the three stages of the shift register counter 1292 so as to establish the initial count state therein at "000".

Simultaneously, the momentary low at node 2071 is supplied via lead 2072 to one inverted input of AND gate 1269. Since the other inverted input of AND gate 1269 is connected to input node 1268 and since the command signal $f_0$ supplied thereto via lead 1267 is normally low, both inverted inputs of AND gate 1269 are low causing its output to go high. Therefore, a high is presented to the set input of the watchdog flip-flop 1270 while the low $f_0$ signal from node 1268 is presented to the reset input. In this case, after one clock time $H_1$, $H_2$, the watchdog flip-flop 1270 will be set so that the Q output goes high and the $\overline{Q}$ output is low, as known in the art.

With the $\overline{Q}$ output of the watchdog flip-flop 1270 low, one inverted input of AND gate 2074 is enabled so that the opposite inverted input which is connected to the input node 2071 via lead 2073 is enabled each time the negative-going engine crankshaft position pulses $G_5$ are supplied thereto via lead 1044. Each time the $G_5$ signal arrives at node 2071, the output of AND gate 2074 goes high to enable the shift register fail counter 1292 to augment its count by one as illustrated in the count state table of FIG. 5A6.

Since all three stages of the counter 1292 were initially preset with zeroes via the direct reset described hereinabove, the first $G_5$ signal to arrive after the watchdog flip-flop 1270 is set causes a high to appear at the output of AND gate 2074. When the clock signal $H_1$ goes high causing transistor 1279 to conduct, the high at the output of AND gate 2074 is passed to node 1280 to enable one input of NAND gate 1281. Simultaneously, the high from node 1280 is passed via lead 1282 to one inverted input of AND gate 1283 to cause its output to go low. As soon as the clock phase $H_1$ goes low and $H_2$ goes high, both input of NAND gate 1281 are high causing its output to go low. This low appears at node 1284 and is transmitted via lead 1287 to enable one inverted input of AND gate 1288.

Simultaneously, the low from node 1284 is inverted by inverter 1285 causing a high to appear at one inverted input of AND gate 1286 for disabling same and causing a low to appear at its output. The low at the output of AND gate 1286 is supplied via node 1293 and lead 1295 to the second inverted input of AND gate 1288 causing a high to appear at its output. The high at the output of AND gate 1288 is transmitted to node 1289 and then via lead 1291 to the first clock phase input $h_a$ of each of the three stages of the shift register counter 1292 for causing the signal present at the DS input of the first stage of the shift register counter 1292 to be entered therein. As soon as the clock signal $H_2$ goes low which occurs simultaneously with the input signal $G_5$ going high to disable AND gate 2074, the output of NAND gate 1281 again goes high to disable AND gate 1288 and enable one inverted input of AND gate 1286 via the output of inverter 1285.

When the output of the disabled AND gate 1288 goes low, this low is transmitted to node 1289. The low from node 1289 is supplied via lead 1290 to one inverted input of AND gate 1283 to enable same and is fed back via lead 1390 to one inverted input of AND gate 1286 for enabling same. With both inverted inputs of AND gate 1286 low, the output goes high and this high is transmitted to node 1293. The high at node 1293 is coupled back to one inverted input of AND gate 1288 for latching the outputs of AND gates 1286 and 1288, as known in the art.

Simultaneously, the high from node 1293 is supplied to the second clock phase input $h_b$ of each of the three stages of the shift register counter 1292 via lead 1294. As soon as the signal $G_5$ returns to its normally high state, the output of gate 2074 goes low so that when the clock phase $H_1$ goes high to cause transistor 1279 to conduct, node 1280 goes low and this low is transmitted via lead 1282 to the second inverted input of AND gate 1283 causing its output to go high. The high at the output of AND gate 1283 is supplied via lead 1286 to the clock input $h_c$ of each of the three stages of the shift register counter 1292 and as the clock inputs $h_b$ and $h_c$ go high, the values previously entered therein become latched at the outputs thereof, as known in the art.

As previously indicated, the outputs of each of the stages of the shift register counter 1292 were initially 000 due to the direct reset previously described. Therefore, the arrival of the first negative-going engine crankshaft position pulse $G_5$ after the watchdog flip-flop 1270 is set will cause a shifting of the values in the counter 1292 as known in the art. The value presented to the DS input of the first stage of the counter 1292 via lead 1316 from the output of NOR gate 1315 is entered therein when the first clock phase input $h_a$ goes high and then latched at the output when the clock inputs $h_b$ and $h_c$ go high. Simultaneously, the value previously present at the $Q_A$ output of the first stage of the counter 1292 is entered into the DS input of the second stage when the signal at the $h_a$ clock input goes high and then latched at the $Q_B$ output when a high arrives at the $h_b$ and $h_c$ clock inputs. Similarly, the zero initially present at the $Q_B$ output of the second stage is inputted into the DS input of the third stage of the shift register counter 1292 when a high arrives at the $h_a$ clock input thereof and then latched at the $Q_C$ output thereof as soon as a high arrives at the $h_b$ and $h_c$ clock inputs thereof, as known in the art. After the first count, a high is present at the output of NOR gate 1315 and transmitted via lead 1316 into the DS input of the first stage of the first fail 1334 initially cleared so that a logical "0" is present at each of the outputs $Q_1$, $Q_2$ and $Q_3$ respectively.

It will, of course, be realized that if the signal $f_0$ arrives at node 1268 via lead 1267 prior to the fail counter 1292 counting seven successive $G_5$ signals, then the watchdog flip-flop 1270 is reset causing a low to appear at the Q output and a high to appear at the $\overline{Q}$ output thereof. The low at the Q output of the watchdog flip-flop 1270 will be supplied via lead 1277 to one inverted input of AND gate 2076 so that the next negative-going engine crankshaft position pulse $G_5$ to arrive via lead 1044 at node 1077 would be transmitted, via lead 2075, to the second inverted input of AND gate 2076 causing its output to go high. The high at the output of AND gate 2076 would appear at node 1321 and be supplied via lead 1320 to one input of NOR gate 1319 causing its output to go low and the output of inverter 1322 to go high to clear the fail counter 1292 prior to the attainment of the fail indication or fail detection by gate 1299 so that the signal $b_9$ will have been maintained in its normally high state in the absence of a computer failure.

Simultaneously, the arrival of the next $G_5$ signal at node 2071 will not be detected since the high at the $\overline{Q}$ output of the watchdog flip-flop 1270 is supplied via lead 1278 to one inverted input of AND gate 2074 to disable same so that future $G_5$ signals are blocked from clocking the fail counter 1292, as previously described.

If, on the other hand, a first computer failure is detected, as previously described, and the MPU failed once flip-flop 1352 is set, the Q output of flip-flop 1352 goes high. A high present at node 1364 causes the output of OR gate 1362 to go low so that the binary counter 1334 is directly reset so that all zeroes are initially stored therein. Furthermore, the high at node 1364 is conducted to one input of AND gate 1378 when the clock phase $H_1$ goes high via transistor 1377. Since the signal $c_9$ was only high for one clock time and it took that clock time to set flip-flop 1352, the signal $c_9$ at node 1379 is now low when $H_1$ goes high causing the output of AND gate 1378 to go low. The output of AND gate 1378 is supplied to one input of NOR gate 1373 for enabling its output to go high. The high from the output of NOR gate 1373 is taken from node 1374 and supplied to the gate electrode of transistor 1382 via switching arm 1384 so as to render transistor 1382 conductive and is also connected back via lead 1376 to one input of NOR gate 1369 for disabling same and causing the output of NOR gate 1369 to go low. A low at the output of NOR gate 1369 is conducted via switching arm 1383 to the gate electrode of transistor 1380 rendering transistor 1380 non-conductive so as to pull the output node 1381 up to +5V to maintain the computer fail signal Z on lead 1385 normally high. The high from output node 1370 is also coupled back via lead 1372 to the second input of NOR gate 1373 so as to latch the outputs of the NOR gates 1369 and 1373 to output a normally high signal, as known in the art.

Once the MPU reset signal $v_3$ has been transmitted via lead 1366 from the MPU reset control circuit of FIG. 5A4 back to the MPU processor of block 1132 of FIG. 5 so as to initiate the computer reset, the source of the failure may or may not have been corrected.

Assuming, that the computer failure was corrected, the program will again order the command signal generator of block 1135 of FIG. 5 to generate the command signals $f_0$ which are supplied via lead 1267 to node 1268 for resetting the watchdog flip-flop 1270. If the watchdog flip-flop 1270 is reset after the MPU reset is initiated, the Q output of flip-flop 1270 goes low and the $\overline{Q}$ output high so that AND gate 2074 is disabled to prevent the fail counter 1292 from further counting future engine crankshaft position pulses $G_5$ while the gate 2076 is enabled so that the next $G_5$ engine crankshaft position pulse will produce a high at node 1321. The high at node 1321 is transmitted via lead 1320 to one input of NOR gate 1319 whose output goes low causing the output of inverter 1322 to go high to again directly reset the fail counter 1292 as previously described.

In addition to clearing the fail counter 1292 and disabling the AND gate 2074 to prevent further clocking of the counter 1292 until the watchdog flip-flop 1270 is again set, the setting of the MPU first fail flip-flop 1352 enables the binary counter 1334 to begin counting and presents a high at the Q output node 1364 to enable one input of the AND gate 1378 after the clock phase $H_1$ goes high to render transistor 1377 conductive.

As soon as the MPU reset signal has corrected the computer first fail condition, the command signal $f_0$ will again be generated to reset the watchdog flip-flop 1270 causing the Q output to go low and the $\overline{Q}$ output to go high. As previously described, with the $\overline{Q}$ output high, AND gate 2074 is disabled via lead 1278 to disable the fail counter 1292 while the low from the Q output of the watchdog flip-flop 1270 is supplied via lead 1277 to one inverted input of AND gate 2076 to enable same. The next $G_5$ signal to arrive via lead 1044 at node 1071 is transmitted via lead 2075 to the second inverted input of AND gate 2076 causing its output to go high.

As previously indicated, this high is supplied to node 1321 and thence via lead 1320 to one input of NOR gate 1319 causing its output to go low and the output of inverter 1322 to go high to directly reset all stages of the shift register counter 1292 to zero to await the beginning of the new first fail count sequence. Simultaneously, when the $H_1$ signal goes high, the high from node 1321 is transmitted via conducting transistor 1323 to node 1324. The high at node 1324 is presented to one input of a NAND gate 1325 whose opposite input goes high when the clock phase signal $H_2$ goes high. With both of its inputs high, the output of NAND gate 1325 goes low. The low at the output of NAND gate 1325 is supplied to node 1328 and used to enable one inverted input of AND gate 1329 and simultaneously is inverted to supply a logical "1" to one inverted input of AND gate 1331 causing its output to go low.

The low at the output of AND gate 1331 is supplied to node 1336 and fed back via lead 1338 to the second inverted input of AND gate 1329 causing its output to go high. The high at the output of AND gate 1329 is fed to node 1332 and used to disable one inverted input of AND gate 1327 and is fed back via lead 1335 to the second inverted input of AND gate 1331 for latching same. Furthermore, the high at node 1332 is supplied via lead 1333 to the first clock phase input $h_a$ of each of the three stages of the counter 1334 for causing the logical one or logical zero present at the output of NOR gates 1355, 1389 and 1353 to be supplied to the DS input of the first, second and third stages of the counter 1334, respectively.

On the next clock phase, the signal $G_5$ goes high to disable AND gate 2076 and cause node 1321 to go low so that the next $H_1$ clock phase transmits the low to node 1324 to enable one inverted input of AND gate 1327 via lead 1326 and the low at node 1324 causes the output of NAND gate 1325 to go high. The high at the output of NAND gate 1325 is supplied to node 1328 and used to disable AND gate 1329 causing its output to go low. The low at the output of NAND gate 1329 is supplied to node 1332 to enable the second inverted input of AND gate 1327 causing its output to go high.

Simultaneously, the high at node 1328 is inverted by inverter 1330 to supply a low to the second inverted input of AND gate 1331 causing its output to go high. A high at the output of AND gate 1331 is supplied to node 1336 and cross-coupled back to one inverted input of AND gate 1329 via lead 1338 for latching the state of the AND gates 1329, 1331, as known in the art. Furthermore, the high at node 1336 is conducted via lead 1337 to the second clock phase input $h_b$ of each of the three stages of the counter 1334 while the high at the output of AND gate 1327 is conducted via lead 1339 to the $h_c$ clock input of each of the three stages of the counter 1334 for transferring the signal presented to the DS input of each of the stages to the output thereof and latching it therein, as known in the art.

The first $G_5$ pulse to arrive after the watchdog flip-flop 1270 was reset has, therefore, caused the count in the binary counter 1334 to be changed from its initially direct reset state of all zeroes. Since all zeroes were initially present at the $Q_1$, $Q_2$ and $Q_3$ outputs of the counter 1334, and since the MPU first fail flip-flop 1352 is initially set, the Q output of flip-flop 1352 supplies a logical "0" via lead 1356 back to node 1357 and thence to one input of NOR gates 1389, 1353 and 1355. A second input to NOR gate 1355 is the logical "0" from the $Q_1$ output of the first stage of the counter 1334 and with both of its inputs low, the output of NOR gate 1355 taken from node 1360 goes high causing a logical "1" to be supplied to the DS input of the first stage or least significant bit position of the binary counter 1334.

Simultaneously, the DS input of the second stage of the counter 1334 is supplied with a logical "0" from the output of the three input NOR gate 1389 since one of the inputs of NOR gate 1389 is low since it is taken from the $\overline{Q}$ output of the MPU first fail flip-flop 1352 via lead 1356 and node 1357; the second input is low since it is taken from the output of the three input NOR gate 1353 whose first input is low via node 1357, whose second input is high from the output of inverter 1346 and lead 1347, and whose third input is high via the output of inverter 1342 and lead 1343; but whose third and final input is high since it is taken from the output of the two input NOR gate 1354 which has one of its inputs low since it is taken from the $Q_1$ output of the first stage of the counter 1334 via node 1340 and lead 1341 and its other input is also low since it is taken from the $Q_2$ output of the second stage of the counter 1334 via node 1344 and lead 1345.

Since one of the inputs of the three input NOR gate 1357 is high, its output is low and therefore a low is supplied via lead 1359 to the DS input of the second stage of the counter 1334. Similarly, a logical "0" is supplied via lead 1358 to the DS input of the third and final stage or most significant bit of the counter 1334 via the output of the three input NOR gate 1353 since two of its inputs are high since they are taken from the outputs of inverters 1342 via lead 1343 and inverter 1346 via lead 1347, respectively. Therefore, after the first $G_5$ signal has been counted, the count state stored in the binary counter 1334 is a binary one count or 001 as set forth in the count state table of FIG. 5A7.

When the first negative-going engine crankshaft position pulse $G_5$ arrives at node 2071, the signal $f_0$ at node 1268 has returned to its normally low state leaving both inverted inputs of AND gate 1269 low and its output high. With a low at node 1268 supplied to the reset input of the watch dog flip-flop 1270 and a high present to the set input of flip-flop 1270 from the output of AND gate 1269, the watchdog flip-flop 1270 is again set causing the Q output to go high and the $\overline{Q}$ output to go low. When the Q output goes high, input gate 2076 is again disabled but the low at the $\overline{Q}$ output enables AND gate 2074 to count successive $G_5$ signals until the watchdog flip-flop 1270 is again reset by the next $f_0$ command signal.

If the next $f_0$ signal arrives at node 1268 via lead 1267 to reset the watchdog flip-flop 1270 before the shift register fail counter 1292 has reached its maximum count necessary to generate the one clock pulse wide negative-going fail $b_9$ signal, then the low from the Q output of the flip-flop counter 1270 will again enable gate 2076 while the high from the $\overline{Q}$ output of flip-flop 1270 will disable gate 2074. Therefore, the next $G_5$ signal to arrive will increase the count stored in the binary counter 1334 by one and clear the fail counter 1292 via a direct reset, as previously described. So long as normal operations are maintained, the watchdog flip-flop 1270 will be reset each time the command signal $f_0$ arrives at node 1268 and then set when the signal $G_5$ arrives at node 2071 to continue increasing the count in the binary counter 1334 in accordance with the count state table of FIG. 5A7 and clearing the fail counter 1292.

As soon as the binary counter 1334 has attained the count 100 indicating that the third stage of the binary counter 1334, the most significant bit position, has had the $Q_3$ output go high indicating that a failure has not been detected for a predetermined period of time, then the high from the $Q_3$ output of the third stage of the binary counter 1334 is supplied to one current-carrying electrode of transistor 1349 via lead 1348. With the next high $H_2$ clock signal, transistor 1349 conducts to pass the high $Q_3$ output signal to the input of an inverter 1350 whose output goes low and this low is supplied to the input of an inverter 1351 whose output goes high to supply a logical one to the reset input of the MPU first fail flip-flop 1352 whose set input is maintained normally low since the signal $c_9$ was only high for one clock time.

Therefore, one clock time $H_1$, $H_2$ later, the MPU fail flip-flop is reset causing the Q output to go low so that a low appears at node 1364 and AND gate 1378 again has both of its inputs disabled to latch the NOR gates 1369 and 1373 such that transistor 1382 remains conductive to cause the MPU fail signal Z on lead 1385 to be maintained in its normally high state.

Therefore, even though an initial computer first fail signal was detected and caused an MPU reset signal to be generated, since the MPU reset signal apparently solved the problem so that no further failures were detected for a predetermined period of time, the MPU fail flip-flop 1352 is again reset so that all memory of a previous first failure is erased and operations proceed as if a failure had never occurred.

If, however, an initial computer failure is detected and the signal $b_9$ goes momentarily low to trigger the setting of the MPU fail flip-flop 1352 and the generation of the MPU reset signal, as previously described, and the failure is not corrected, then the shift register fail counter 1292 will again attain its overflow count which is detected by gate 1299 before the binary counter 1334 is able to reset the MPU fail flip-flop 1352. Under these circumstances, a shift register fail counter 1292 will again count seven $G_5$ pulses after the setting of the watchdog flip-flop 1270 causing the count 100 to be detected by gate 1299 to again cause the signal $b_9$ on lead 1251 at the output of NAND gate 1318 to go momentarily low to trigger a second MPU reset signal $v_3$ via the circuit of FIG. 5A4 as previously described. Again, this causes the signal $c_9$ to be momentarily high for one clock time and signal $a_9$ to go high to clear the fail counter 1292 as previously described.

However, even though the signal $c_9$ is only high for one clock time, it will not have to set the MPU fail flip-flop 1352 since it is already set so that when this momentary high is applied via lead 1258 and node 1379 to one input of AND gate 1378, when the clock phase $H_1$ goes high, the high from the Q output of the previously set MPU first fail flip-flop 1352 which is present at node 1364 is conducted via transistor 1377 to the other input of AND gate 1378. With both inputs of AND gate 1378 momentarily high, its output goes high and since its output is supplied to one input of a two-input NOR gate 1373, it causes its output to go low. The low at the output of NOR gate 1373 is supplied to node 1374 and thence via switching arm 1384 to the gate electrode of transistor 1382 for rendering transistor 1382 non-conductive.

Simultaneously, the low from node 1374 is supplied via lead 1376 back to the previously disabled input of NOR gate 1369 and with both of its inputs low, the output of NOR gate 1369 goes high. With the output of NOR gate 1369 high, this high appears at node 1370 and is conducted via switching arm 1383 to the gate electrode of transistor 1380 causing it to conduct and pull the output node 1381 to ground. Therefore, after the detection of two successive computer failures, the normally high MPU fail signal Z on lead 1385 is pulled low to indicate the existence of an MPU failure and this signal is supplied to the get-home or limp home circuitry of block 135 to enable same, as hereinafter described.

In summary, therefore, as the watchdog circuit of FIG. 5A5 detects the occurrence of a computer failure by monitoring the periodic generation of program dictated command signals $f_0$ and the failure of the command signals $f_0$ to arrive prior to a predetermined number of engine crankshaft position pulses being counted triggers a first MPU fail signal. The first MPU fail signal causes the generation of an MPU reset signal and if the MPU reset signal corrects the problem and the command signals $f_0$ are again generated as required, a second counter is able to attain a predetermined count prior to the detection of another failure which allows the MPU fail flip-flop to be reset and all memory of a previous failure erased. However, if a second subsequent failure is detected prior to the second counter being able to attain its predetermined count for resetting the MPU fail counter, an MPU reset signal is generated for enabling the limp-home or get-home circuitry of block 135 of FIG. 2, as hereinafter described since the computer operation can no longer be viewed as reliable.

5.7 Microprocessor—MPU 6800

Figure 5B:
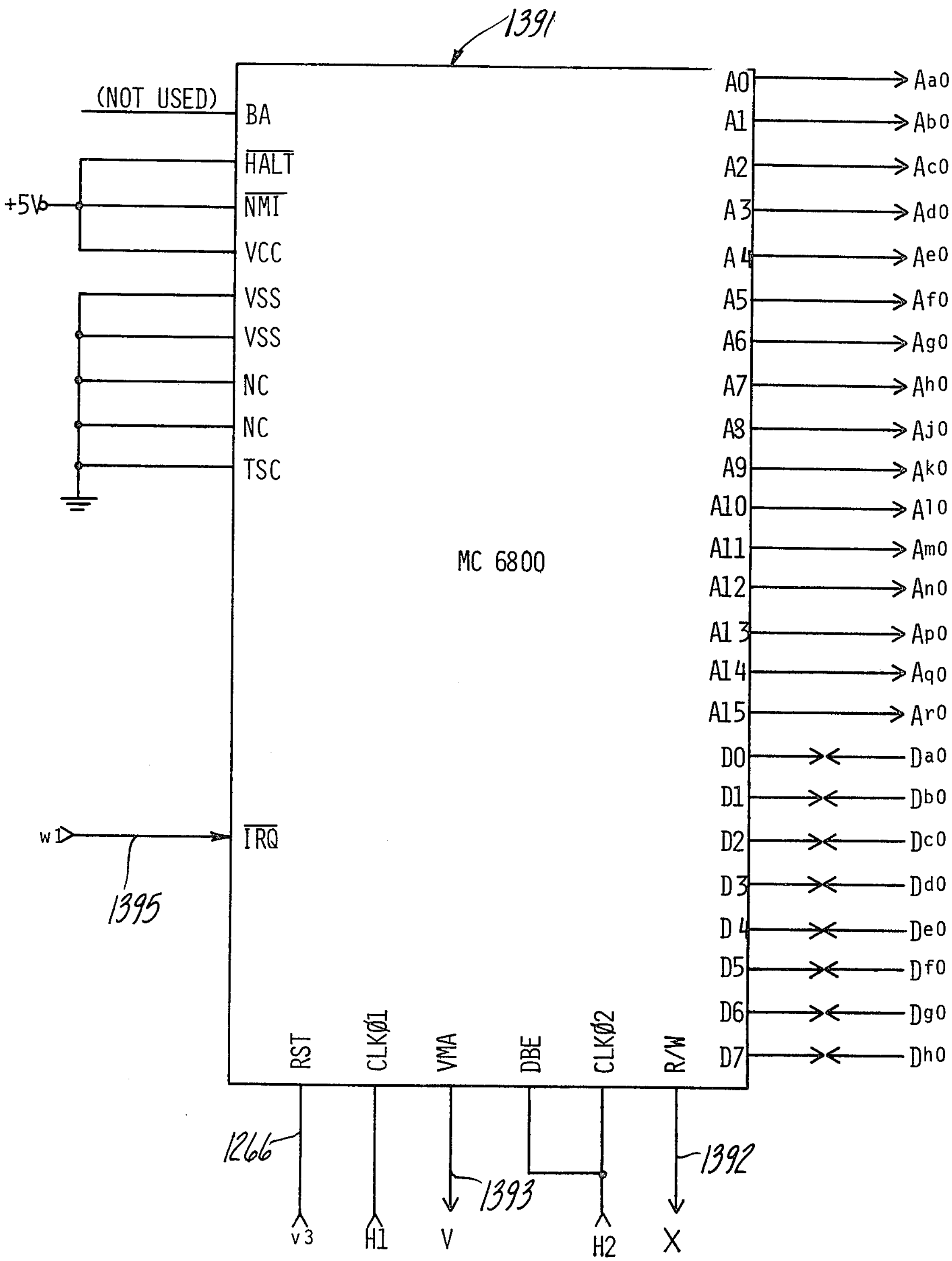
FIG. 5B is a generalized block diagram of the MPU 6800 microprocessor of block 1132 of FIG. 5 and the various inputs and outputs associated therewith.

The microprocessor system of block 1132 of FIG. 5 will now be described with reference to the block diagram of FIG. 5B. In the preferred embodiment of the present invention, the microprocessor of FIG. 5B is a conventional MC 6800 microprocessor manufactured by Motorola, Inc. as briefly described in U.S. Pat. No. 4,004,281, which is incorporated by reference herein. It will, of course, be recognized by those skilled in the art that any suitable conventional microprocessor could also be used and the specific microprocessor or minicomputer used in no way limits the scope of the present invention.

In the preferred embodiment of the present invention, the MC 6800 microprocessing unit (MPU) utilizes eight bit parallel processing and has the following features and inputs. The microprocessor unit or computer 1391 of FIG. 5B has a clock phase one and clock phase two input designated CLK1 and CLK2 respectively which are adapted to receive a two-phase non-overlapping clock that runs at a +5-volt VCC voltage level. The first clock phase input is supplied with the master clock signal $H_1$ and the second clock phase input together with the data bus enable (DBE) input is supplied with the second master clock phase signal $H_2$. The data bus enable input is the three state control signal for the MPU data bus and will enable the bus drivers when in the high state. This input is TTL compatible; however, in normal operation, it will be driven by the phase two clock. During an MPU read cycle, the data bus drivers will be disabled internally. When it is desired that another device control the data bus such as in the direct memory access (DMA) applications, DBE will be held low.

The microprocessor 1391 of the preferred embodiment includes an address bus whose outputs are designated $A_0$ through $A_{15}$, respectively and which output the address bus signals $Aa_0$, $Ab_0$, $Ac_0$, $Ad_0$, $Ae_0$, $Af_0$, $Ag_0$, $Ah_0$, $Aj_0$, $Ak_0$, $Al_0$, $Am_0$, $An_0$, $Ap_0$, $Aq_0$ and $Ar_0$ respectively. The outputs of the address bus are three state bus drivers capable of driving one standard TTL load. When the output is turned off, it is essentially an open circuit which permits the MPU to be used in DMA applications.

The microprocessor 1391 also includes an eight bit data bus whose pins are designated $D_0$ through $D_7$, respectively, and whose data bus input/output signals are designated $Da_0$ through $Dh_0$, respectively. The data bus is bi-directional transferring data to and from the memory and peripheral devices. It also has three-state output buffers capable of driving one standard TTL load, if desired.

The microprocessor 1391 also has a $\overline{\text{Halt}}$ input which, if held in the low state, causes all activity in the machine to be halted. In the present example, the $\overline{\text{Halt}}$ input is connected directly to the +5-volt source of potential so that the Halt mode is not utilized in the preferred embodiment of the present invention. The +5-volt source of potential is also supplied to the VCC power input and to the $\overline{\text{NMI}}$ input. The $\overline{\text{NMI}}$ input stands for a non-maskable interrupt input. A low-going edge on this input requests that a non-mask interrupt sequence be generated within the processor. As with the interrupt request signal, the processor will complete the current instruction that is being executed before it recognizes the $\overline{\text{NMI}}$ signal. The interrupt mask bit in the conditioned code register has no effect upon the $\overline{\text{NMI}}$ signal in the preferred embodiment of the present invention however, the $\overline{\text{NMI}}$ input is also connected to the +5-volt source of potential so that the non-maskable interrupt capability of the microprocessor 1391 is not utilized.

The microprocessor 1391 is also provided with a bus available BA output whereby an output signal will be normally held in the low state and when activated, it will go to a high state indicating that the microprocessor is stopped and that the address bus is available. This will occur if the $\overline{\text{Halt}}$ is in the low state with the processors in the wait state as a result of the execution of a WAIT instruction. At such time, all three-state output drivers will go to their off state and other outputs to the normally inactive level. The processor will be removed from the WAIT state by the occurrence of a maskable or non-maskable interrupt but in the preferred embodiment of the present invention, the bus available BA output is not utilized.

The microprocessor 1391 of FIG. 5B further includes a three-state control (TSC) input. This input causes all of the address lines and the Read/Write line to go into the off or high impedence state. The valid memory address (VMA) and bus available (BA) signals will be forced low and the data bus will not be effected by TSC which has its own enable (data bus enable). In VMA applications, the tri-state control line will be brought high on the leading edge of the phase one clock. The phase one clock must be held in the high state and the phase two clock in the low state for this function to operate properly. The address bus will then be available for other devices to directly address memory. Since the MPU is a dynamic device, it can be held in this state for only 4.5 microseconds or the destruction of data will occur in the MPU. However, in the preferred embodiment of the present invention, the three-state control (TSC) input is connected directly to ground. Similarly, the VSS inputs and the NC inputs are also grounded.

The $\overline{\text{interrupt request}}$ ($\overline{\text{IRQ}}$) input of the microprocessor 1391 is a level sensitive input which requests that an interrupt sequence be generated within the microprocessor. The processor will wait until it completes the current instruction that is being executed before it recognizes the request. At that time, if the interrupt mask bit in the Condition Code Register is not set, the machine will begin an interrupt sequence. The Index Register, Program Counter, Accumulators, and Condition Code Register are stored away in the stack. Next the MPU will respond to the interrupt request by setting the interrupt mask bit high so that no further interrupts may occur. At the end of the cycle, the sixteen-bit address will be loaded that points to a vectoring address which is located in memory locations FFF8 and FFF9. An address loaded at these location causes the MPU to branch to an interrupt routine in memory.

The $\overline{\text{Halt}}$ must be in the high state for interrupts to be serviced. Since interrupts will be left internally while $\overline{\text{Halt}}$ is low but in the preferred embodiment of the present invention, the $\overline{\text{Halt}}$ is normally connected to the +5-volt source of potential so as to continuously enable the $\overline{\text{IRQ}}$ input. In the preferred embodiment of the present invention, the $\overline{\text{IRQ}}$ input receives the MPU interrupt signal $w_1$ from block 1141 of FIG. 5 via lead 1395, as hereinafter described. The $\overline{\text{Reset}}$ ($\overline{\text{RST}}$) input is used to reset and start the MPU from a power-down condition resulting from a power failure or an initial start-up of the processor. If the high level is detected on the input, this will start the MPU to begin the restart sequence. This will start execution of a routine to initialize the processor from its reset condition. All the higher order address lines will be forced high. For the restart, the last two (FFFE, FFFF) locations in memory will be used to load the program that is addressed by the program counter. During the restart operation, the interrupt mask bit is set and must be reset before the MPU can be interrupted by $\overline{\text{IRQ}}$. $\overline{\text{RST}}$ must be held low for at least eight clock periods after VCC reaches 4.75 volts. If $\overline{\text{RST}}$ goes high prior to the leading edge of the $H_2$ clock pulse, on the next $H_1$ clock pulse, the first restart memory vector address FFFE will appear on the address lines. This location should contain the higher order eight bits to be stored into the program counter. Following, the next address FFFF should contain the lower order eight bits to be stored into the program counter.

In the preferred embodiment of the present invention, the MPU reset signal $v_3$ from the MPU reset control logic of FIG. 5A4 is supplied to the $\overline{\text{RST}}$ input via lead 1266 as previously described. The Read/Write (R/W) refers to a TTL compatible output which signals the peripherals and memory devices whether the MPU is in a read (high) or write (low) state. The normal standby state of this signal is read (high). The Read/Write signal outputted from the R/W output of the microprocessor 1391 on lead 1392 is designated as the signal "X" for use as hereinafter described.

Lastly, the microprocessor 1391 includes a Valid Memory Address (VMA) output which indicates to the peripheral devices that there is a valid address on the address bus. In normal operation, this signal should be utilized for enabling peripheral interfaces. This signal is not tri-state and one standard TTL load may be directly driven by this active high signal which, in the preferred embodiment of the present invention outputs the signal V on lead 1393 for use as hereinafter described.

As known in the art, the microprocessor 1391 includes three sixteen-bit registers and three eight-bit registers, available for use by the program and further include a program counter which is a two byte (sixteen bits) register that point to the current program address. A stack pointer utilizes a two byte register that contains the address of the next available location in an external push-down/pop-up stack. This stack is normally a random access Read/Write memory that may have any location address that is convenient. And those applications that require storage of information in the stack when power is lost, the stack may be non-volitile. The MPU also includes an index register which is a two byte register used to store data or a sixteen bit memory address for the index mode of memory addressing. And lastly, the MPU contains two eight-bit accumulators that are used to hold operands and results from an arithmatic logic unit (ALU). These various registers function, as conventionally known in the art, to store and execute various programs for manipulating data and performing calculations typical of any conventional microprocessor, as known in the art and will not be further described herein.

5.8 Memory Section

The memory section of block 1133 of FIG. 5 will now be described with reference to the block diagram of FIG. 5C. The memory section of FIG. 5C includes three Read-Only Memories designated ROM #1, ROM #2 and ROM #3 and two scratch-pad memories or random access memories designated RAM #1 and RAM #2, respectively. All of these memory units are conventional, off-the-shelf items and only the program sequence or data stored therein differs from similar units of the prior art.

Each of the read-only memory sections has eleven address inputs designated $A_0$ through $A_{10}$ respectively and each of the random access memory units RAM #1 and RAM #2 have seven address inputs designated $A_0$ through $A_6$, respectively. A memory input of all of the memory units ROM #1, ROM #2, ROM #3, RAM #1, and RAM #2, have their $A_0$ through $A_6$ address inputs commonly connected to the $Aa_0$ through $Ag_0$ address bus outputs respectively. The address inputs $A_7$ through $A_{10}$ of the three read-only memories $ROM_1$ $ROM_2$ and $ROM_3$ are commonly coupled to the microprocessor address bus outputs $Ah_0$, $Aj_0$, $Ak_0$, $Al_0$, respectively. Similarly, each of the five memory sections ROM #1, ROM #2, ROM #3, RAM #1, and RAM #2, have their bi-directional data bus inputs/outputs $D_0$ through $D_7$ commonly coupled to the MPU data bus outputs $da_0$ through $dh_0$, respectively.

Furthermore, a +5-volt source of potential is connected to the VCC input of each of the five memory sections and each of the VSS inputs of each of the memory sections is coupled directly to ground. The Read/-Write signal X is supplied from the microprocessor 1391 of FIG. 5B via lead 1392 to the Read/Write (R/W) input of RAM #1 and simultaneously to the Read/-Write (R/W) input of RAM #2. The chip select signal $a_7$ which is used to enable the upper 4K words of the read-only memory is supplied via lead 1396 to a node 1397 and node 1397 is connected directly to the $\overline{CS_2}$ input of both the first and second read-only memories ROM #1 and ROM #2 respectively. The chip select signals $a_7$, $b_7$, $c_7$ are generated by the chip select circuitry of block 1134 of FIG. 5 as hereinafter explained. Similarly, the chip select signal $b_7$ which is used to enable the lower 2K words of the read-only memory is supplied via lead 1398 to the $\overline{CS_2}$ input of the third memory read-only memory unit ROM #3.

The address bus signals from the microprocessor unit 1391 of FIG. 5B designated $Am_0$, $An_0$, $Ap_0$ are supplied to the $\overline{CS1}$, $\overline{CS4}$, and $\overline{CS5}$ inputs of both of the random access memory units RAM #1 and RAM #2 respectively. The $\overline{CS3}$ input of both of the memory units RAM #1 and RAM #2 are supplied to the second master clock phase signal $H_2$ while the $\overline{CS2}$ input of RAM #1 and RAM #2 are supplied with the address bus signal $Ah_0$. The CS1 input of the first read-only memory unit ROM #1 and the $\overline{CS1}$ input of ROM #2 are supplied with the address bus signal $Am_0$ while the $\overline{CS1}$ input of the third read-only memory ROM #3 is supplied with the address bus signal $An_0$. The signal V which is outputted via lead 1393 from the valid memory address output (VMA) of the microprocessor 1391 of FIG. 5B is also supplied to a node 1399 and node 1399 is connected directly to the CS0 input both of the random access memories RAM #1 and RAM #2. The chip select signal $c_7$ which is outputted from the chip select circuitry of block 1134 of FIG. 5 is supplied via lead 1394 to the $\overline{CS2}$ input of RAM #2. The chip select $c_7$ is used as a select signal to an RAM scratch-pad memory, as known in the art.

Since the read-only memory units ROM #1, ROM #2 and ROM #3 and the random access memory units RAM #1 and RAM #2 are standard memory units known in the art, a detailed description of their internal workings and operation will be obvious to one of ordinary skill in the art. It will be understood that the various control programs, as hereinafter described; various two dimensional and three dimensional control surfaces used in implementing various control laws to insure proper operation of the internal combustion engine to be controlled; and various temporary data may be selectively stored in the various memory units and read therefrom under the control of the microprocessor 1391 of FIG. 5B, as known in the art.

5.9 Chip Selection Logic

The chip selection logic of block 1134 of FIG. 5 will now be described with reference to the schematic diagram of FIG. 5D. The chip select logic of FIG. 5D operates off of a decoding of the $Ah_0$, $Am_0$, $An_0$ and $Ap_0$ address buses from the microprocessor 1391 of FIG. 5B so as to derive chip select signals to enable various portions of the memory section of FIG. 5C and portions of the command signal generator of block 1135 of FIG. 5 as hereinafter described.

The first master clock phase signal $H_1$ is supplied to one inverted input of a logical OR gate 1401 whose output is connected via lead 1402 to the gate electrode of a transistor 1403 having one current-carrying electrode connected directly to a +5-volt source of potential and its opposite current-carrying electrode connected to an output node 1404. The address bus signal $Am_0$ from the MPU 1391 of FIG. 5B is supplied directly to an input node 1405. The signal at node 1405 is supplied to the input of an inverter 1406 whose output is connected via lead 1407 to one inverted input of a logical AND gate 1408.

Simultaneously, the signal at node 1405 is connected via lead 1409 to a node 1410 and node 1410 is connected directly to the gate electrode of the first output transistor 1411 having one current-carrying electrode connected directly to ground and its opposite current-carrying electrode connected to an output node 1412. Simultaneously, node 1410 is connected to the input of an inverter 1413 whose output is connected to the gate electrode of the second output transistor 1414 having one current-carrying electrode connected directly to a +5-volt source of potential and its opposite current-carrying electrode connected to the output node 1412. Output node 1412 supplies the chip select signal $e_7$, via lead 1415, to the command signal generator circuitry of block 1135 of FIG. 5 for use as hereinafter described.

The valid memory address signal V is supplied from the output of the MPU 1391 via lead 1393 to the input of an inverter 1416 whose output is connected directly to an inverter output node 1417. The inverter output node 1417 is connected via lead 1418 to a second inverted input of AND gate 1408 and via lead 1419 to one inverted input of a logical AND gate 1420 having three inverted inputs.

The address bus signal $An_0$ from the MPU 1391 of FIG. 5B is also supplied to an input node 1421. Node 1421 is connected directly to the input of an inverter 1422 whose output is connected directly to a second inverted input of AND gate 1420 and node 1421 is also connected via lead 1423 to one inverted input of the logical AND gate 1424 having two inputs. A third address bus signal $Ap_0$ from the MPU 1391 of FIG. 5B is supplied to input node 1425. Node 1425 is connected to the input of an inverter 1426 whose output is connected directly to an inverter output node 1427. Inverter output node 1427 is connected via lead 1428 to the third and final inverted input of AND gate 1408 and via lead 1429 to the third and final inverted input of AND gate 1420.

Simultaneously, the signal at node 1425 is supplied via lead 1430 to the second inverted input of AND gate 1424 whose output is connected directly to a node 1431. Node 1431 is connected directly to the gate electrode of a first output transistor 1432 having one current-carrying electrode connected directly to a +5-volt source of potential and a second current-carrying electrode connected to an output node 1433. Node 1431 is also connected to the input of an inverter 1434 whose output is connected to the gate electrode of a second output transistor 1435 having one current-carrying electrode connected to ground and its opposite current-carrying electrode connected to the output node 1433. The output node 1433 is used to output the chipselect signal $d_7$ via lead 1436 to the command signal generator circuitry of block 1135 of FIG. 5 for use as hereinafter described.

The output of the logical AND gate 1408 having three inverted inputs is connected directly to an output node 1437 and node 1437 is connected via lead 1438 to the second inverted input of OR gate 1401. Output node 1437 is also connected to one current-carrying electrode of a transistor 1439 whose opposite current-carrying electrode is connected to a node 1440. Node 1440 is connected directly to the gate electrode of a transistor 1441 and to the gate electrode of the transistor 1442. One current-carrying electrode of transistor 1441 is connected to the opposite current-carrying electrode thereof and each is connected to receive the first master clock phase signals $H_1$.

Similarly, the signal $H_1$ which is supplied to both current-carrying electrodes of transistor 1441 is also connected to one current-carrying electrode of the transistor 1442 whose opposite current-carrying electrode is connected to the output node 1443. Another transistor 1444 has one current-carrying electrode connected to the output node 1443 and its opposite current-carrying electrode connected directly to ground. The $H_2$ clock signal is supplied to the gate electrode of transistors 1439 and 1444 and output node 1443 is connected via lead 1445 to the gate electrode of output transistor 1446 having one current-carrying electrode connected to ground and its opposite current-carrying electrode connected to the output node 1404. Output node 1404 is used to supply the chip select signal $b_7$ via lead 1398 to the $\overline{CS2}$ input of ROM #3 of FIG. 5C for enabling the lower 2K words of the read only memory section as previously described.

The output of the AND gate 1420 having three inverted inputs is connected directly to an output node 1447. Node 1447 is connected via lead 1448 to one inverted input of a logical OR gate 1449 having two inverted inputs. The second inverted input of OR gate 1449 is connected to receive the first master clock phase signals $H_1$ and the output of OR gate 1449 is connected via lead 1450 to the gate electrode of an output transistor 1451 having one current-carrying electrode connected to the +5-volt source of potential and its opposite current-carrying electrode connected to output node 1452. Node 1447 at the output of AND gate 1420 is also connected directly to one current-carrying electrode of a transistor 1453 whose opposite current-carrying electrode is connected to a node 1454. Node 1454 is connected directly to the gate electrode of a first transistor 1455 and to the gate electrode of a second transistor 1456. The current-carrying electrodes of transistor 1455 are commonly connected together so as to receive the first clock phase signal $H_1$.

The commonly connected current-carrying electrodes of transistor 1455 which are connected to receive a first clock phase signal $H_1$ are also commonly connected to the first current-carrying electrode of transistor 1456 whose opposite current-carrying electrode is connected to a node 1457. Node 1457 is connected to one current-carrying electrode of a transistor 1458 whose opposite current-carrying electrode is connected to ground and both gate electrodes of transistors 1453 and 1458 are connected to receive the second master clock phase signals $H_2$. Node 1457 is connected via lead 1459 to the gate electrode of another output transistor 1460 having one current-carrying electrode connected to ground and its opposite current-carrying electrode connected to the output node 1452. Output node 1452 is adapted to output the chip select signal $a_7$ via lead 1396 to the $\overline{CS2}$ inputs of ROM #1 and ROM #2 for enabling with the upper four K words of the read-only memory section of FIG. 5C as previously described.

Lastly, the address bus signal $Ah_0$ from the MPU 1391 of FIG. 5B is supplied to a node 1461. Node 1461 is connected directly to the gate electrode of a first output transistor 1462 having one current-carrying electrode connected to ground and its opposite current-carrying electrode connected to an output node 1463. Node 1461 is also connected to the input of an inverter 1464 whose output is connected directly to the gate electrode of a second output transistor 1465 having one current-carrying electrode connected directly to a +5-volt source of potential and its opposite current-carrying electrode connected to the output node 1463. Output node 1463 is adapted to output the inverted chip enable signal $c_7$ via lead 1394 to the $\overline{CS2}$ input of RAM #2 of FIG. 5B for enabling the RAM scratch-pad memory, previously, described.

5.10 Command Signal Generator

The command signal generator circuitry of block 1135 of the block diagram of the microprocessor system of FIG. 5 will now be described with reference to the schematic diagram of FIG. 5E. The address line $A_{d0}$ which is outputted from the $A_3$ address port of the MC 6800 microprocessor 1391 of FIG. 5B is supplied to input node 1471. Node 1471 is connected to the input of an inverter 1472 whose output is connected to one inverted input of a logical AND gate 1473 having four inverted inputs. The output of the logical AND gate 1474 is connected to a node 1475. Node 1475 is connected directly to the gate electrode of an enhancement mode transistor 476 and simultaneously to the gate electrode of a second enhancement mode transistor 1477. The first current-carrying electrode of transistor 1476 is connected to an output node 1478 which in turn is connected to a first current-carrying electrode of a depletion mode transistor 1479 and simultaneously to the gate electrodes of transistor 1479 andto the gate electrode of the second depletion mode transistor 1481. The first current-carrying electrode of transistor 1477 is connected to an output node 1482 which is connected to the second current-carrying electrode of the depletion mode transistor 1481 and output node 1482 serves to output the command signal $g_7$ which indicates that data is to be read from the I/O into the microprocessor when the signal $g_7$ is in the logic zero state, as hereinafter described.

The second current-carrying electrodes of the enhancement mode transistors 1476 and 1477 are commonly coupled together at node 1484 and node 1484 is connected to the first current-carrying electrode of another enhancement mode transistor 1485 whose second current-carrying electrode is connected to ground commonly with the second current-carrying electrode of another pair of enhancement mode transistors 1486 and 1487 respectively. The opposite current-carrying electrode of transistor 1486 is connected to a node 1488 and node 1488 is connected to the first current-carrying electrode of a depletion mode transistor 1489 and simultaneously to the gate electrode thereof and to the gate electrode of the second depletion mode transistor 1491. The second current-carrying electrode of the depletion mode transistors 1479 1481, 1489 and 1491 are commonly coupled to a +5-volt source of potential. The second current-carrying electrode of transistor 1491 is connected to an output node 1492 and to the first current-carrying electrode of transistor 1487. The output node 1492 is connected via lead 1493 to the various gating systems of the command signal generator to be hereinafter described for strobing purposes and will be referred to as the strobe signal or I/O strobe signal.

The output lead 1436 from the chip select circuit of FIG. 5B supplies the $d_7$ chip select signal to the input of an inverter 1494 whose output is connected to a third inverted input of the logical AND gate 1473 and to a first inverted input of a second logical AND gate 1495 having three inverted inputs. The output of AND gate 1495 is connected via lead 1496 to the gate electrode of the transistors 1486 and 1487 respectively for controlling the operation thereof. The signal V, indicating that a valid memory address (VMA) signal has been sent from the MC 6800 microprocessor, is transmitted via lead 1363 to the input of an inverter 1497 whose output is connected to the fourth inverted input of the logical AND gate 1473 and to the third inverted input of AND gate 1495. Lastly, the chip select signal $e_7$ which is generated by the chip select circuit of FIG. 5D is transmitted via lead 1415 to the second and last input of the four inverted input AND gate 1473 and to the second and final input of the three inverted input AND gate 1495. The master clock signal $\overline{H_2}$ is inputted to clock node 1498 which supplies the clock signal to the gate electrode of transistor 1485 via lead 1499 and via lead 1501 to certain of the command signal generator circuitry to be hereinafter described.

Figure 5C:
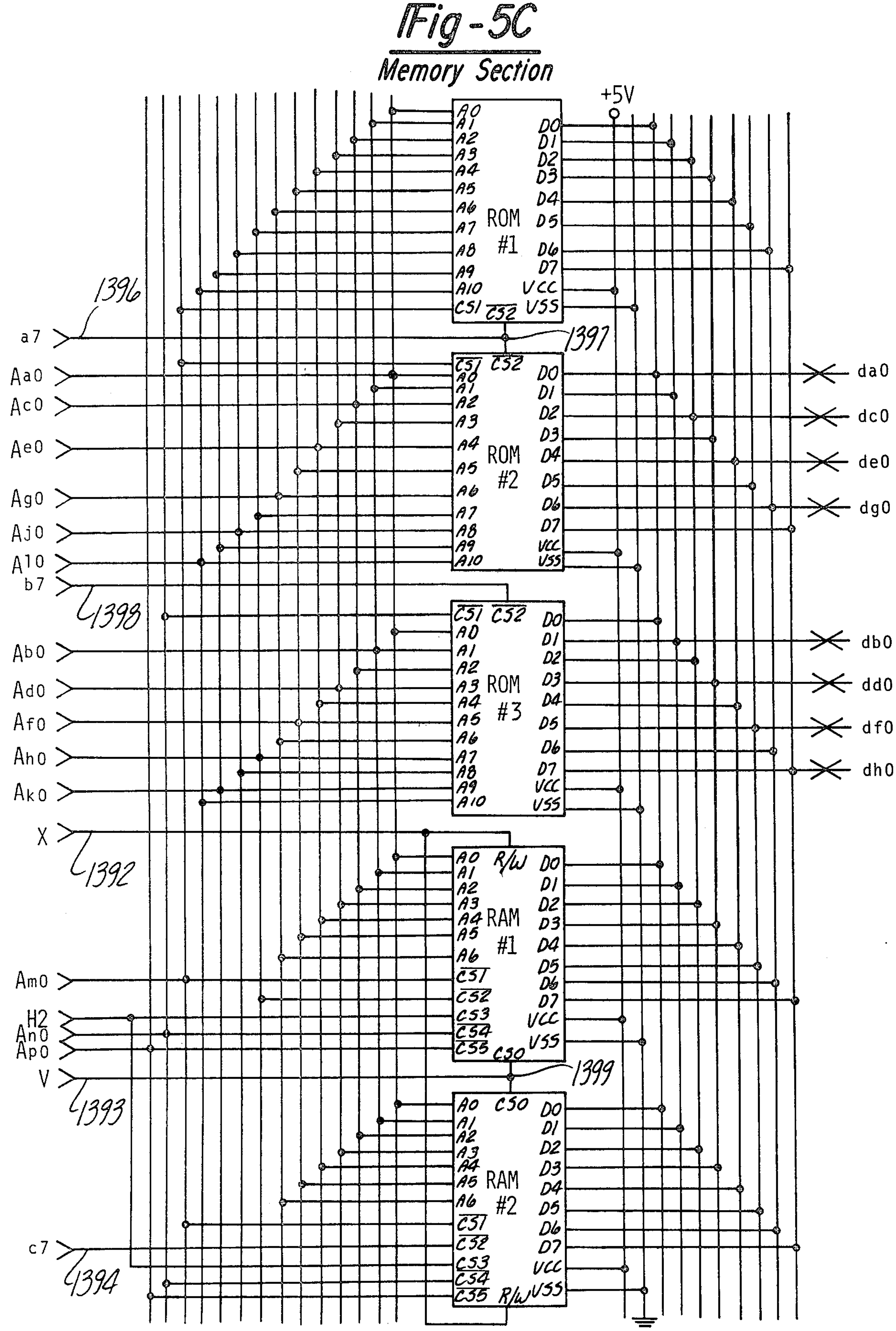
FIG. 5C is a block digram showing the various inputs and outputs associated with the memory circuitry of block 1133 of FIG. 5.
Figure 5D:
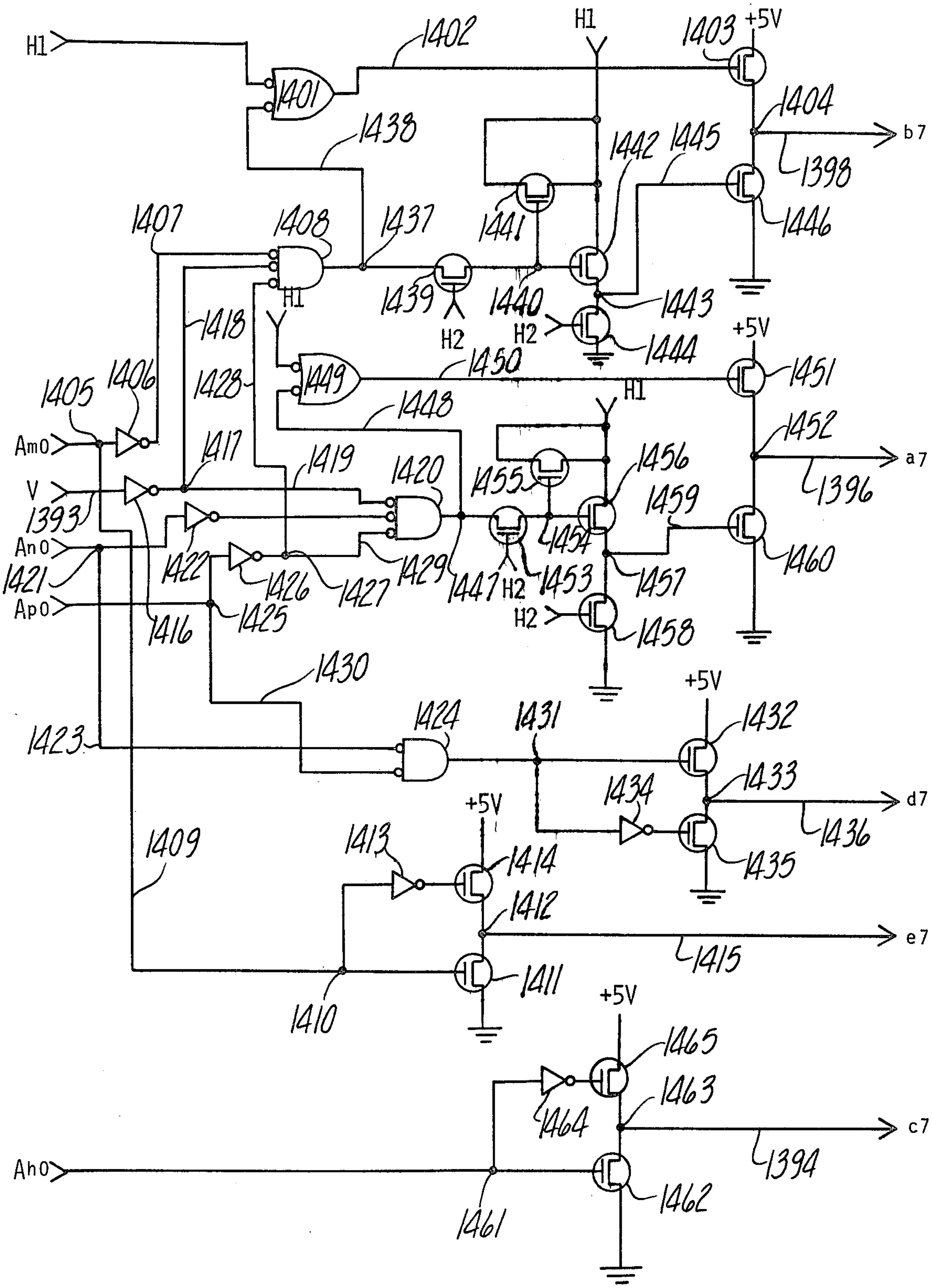
FIG. 5D is an electrical schematic diagram of the chip select circuitry of block 1134 of FIG. 5.
Figure 5E:
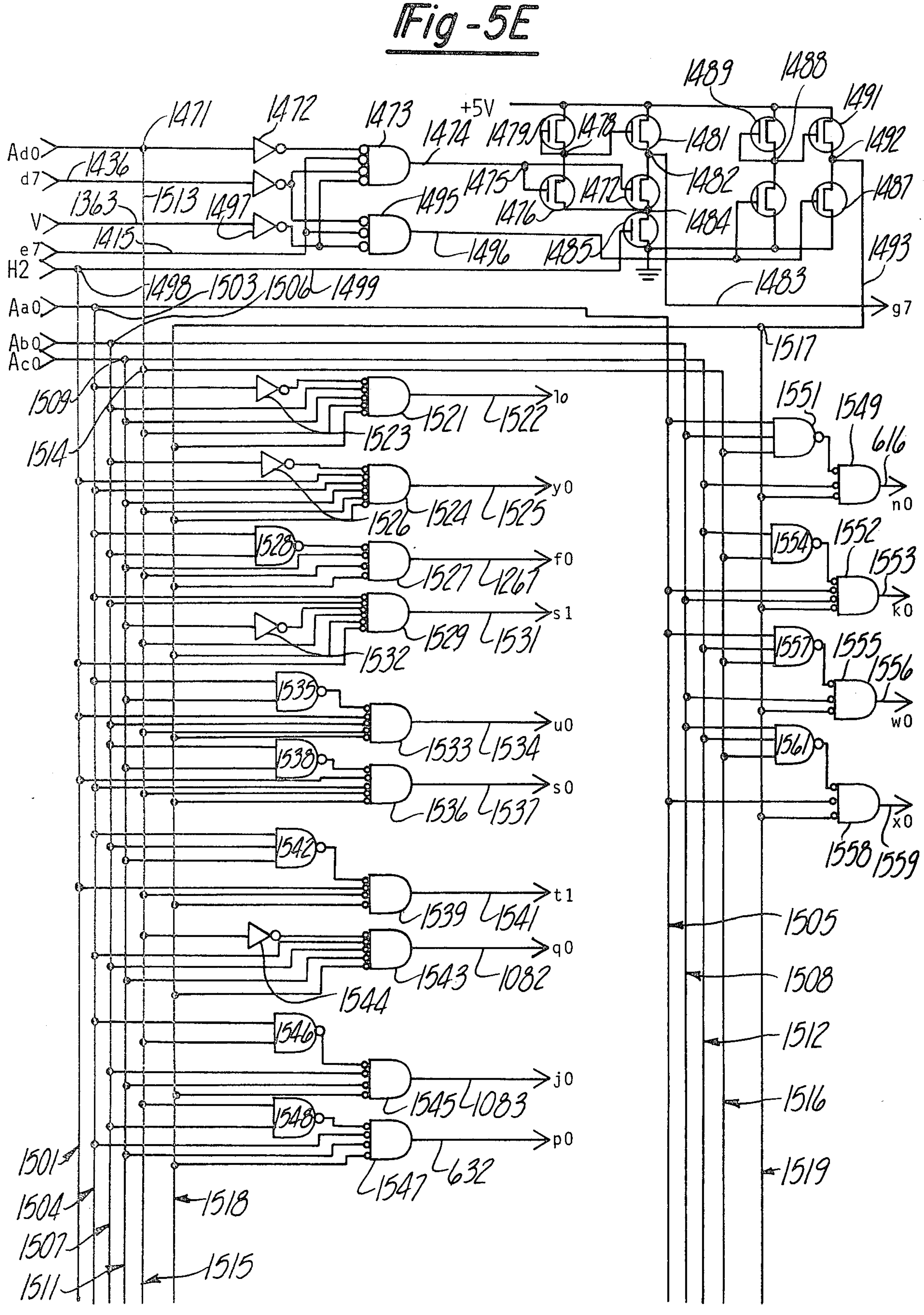
FIG. 5E is an electrical schematic diagram of the command signal generator circuitry of block 1135 of FIG. 5.

The command signal generator of FIG. 5E is used to output fourteen primary command signals as hereinafter described. Each of the command signals is generated by one or more logic gates which function to decode address signals $A_{a0}$, $A_{b0}$, $A_{c0'}$, and $A_{d0}$ which are outputted from the address ports $A_1$, $A_2$ and $A_3$, respectively, of the MPU 6800 microprocessor 1391 of the circuit of FIG. B as previously described.

The address signal $A_{a0}$ is transmitted via the address bus to the address input node 1502 and is then supplied to the various decoding gates via leads 1504 and 1505 respectively. Similarly, the address line $A_{b0}$ is connected to address input node 1506 which in turn is supplied via lead 1507 and lead 1508 to various inputs of the decoder gate circuits. Similarly, address line $A_{c0}$ is inputted to address input node 1509 which is then supplied via lead 1511 and 1512 to various inputs of the gating networks. The $A_{d0}$ input node 1471 is connected via lead 1513 to a node 1514 and node 1514 is connected via leads 1515 and 1516 to the various gating circuits of the command signal generator network of FIG. 5E. Lastly, the chip select strobe signals which are used for gate enablement are transmitted via lead 1493 to input node 1517 and node 1517 is connected to the inputs of the various logic gates via leads 1518 and 1519 respectively.

A first command signal generator network includes a logical AND gate 1521 having five inverted inputs and an output which generates the command signal $1_0$ which, as previously described, is used to synchronize the ramp generator to the computer program and to initiate a software-commanded analog-to-digital conversion. The output of AND gate 1521 supplies or outputs the command signal $1_0$ via lead 1522 to the counter control logic of block 454 of the pulse-width to binary converter of FIG. 4C as previously described. The five inverted inputs are connected as follows. The first inverted input is connected to the output of an inverter 1523 whose input is connected to the $A_{a0}$ input lead 1504; the second inverted input is connected to the $A_{b0}$ input lead 1507; the third inverted input is connected directly to the $A_{c0}$ lead 1511; the fourth inverted input is connected directly to the $A_{d0}$ lead 1515 and the fifth and final inverted input of AND gate 1521 is connected directly to the strobe lead 1518. Therefore, the ouput of AND gate 1521, the command signal $1_0$, will remain low so long as the signal at any of its inputs is high and will go low only if all zeroes or lows are present at its inputs. Therefore, the signal $1_0$ goes high whenever the signal address $A_{a0}$ is high while address lines $A_{b0}$, $A_{c0}$, and $A_{d0}$ are low while the strobe signal which is outputted from node 1492 via leads 1493, node 1517 and lead 1518 are simultaneously low. The remaining gates operate in a similar manner and only the address decode entries will be discussed in any detail since the operation of the gates which generate the command signal is obvious from the schematic diagram of the command signal generator of FIG. 5E.

The second command signal generator includes a second logical AND gate 1524 having six inverted inputs. The AND gate 1523 generates or outputs the command signal $y_0$ which is used to command the T storage counter contents to be transferred to the T counter as hereinafter described with reference to the circuitry of FIG. 6 and a signal $y_0$ is outputted from AND gate 1524 via lead 1525. The first inverted input of AND gate 1424 is connected to the output of an inverter 1526 whose input is connected directly to lead 1507 to receive the address signal $A_{b0}$; the second inverted input is connected directly to lead 1501 to receive the clock signal $\overline{H_2}$; the third inverted input is connected directly to lead 1504 to receive the address signal $A_{a0}$; the fourth inverted input is connected directly to lead 1511 to receive the address signal $A_{c0}$; the fifth inverted input is connected directly to lead 1515 for receiving the address signal $A_{d0}$; and the sixth and final inverted input logical AND gate 1524 is connected directly to lead 1518 for receiving the strobe signal from node 1517 as previously described.

The third command signal generator gating network includes a logical AND gate 1527 having four inverted inputs. AND gate 1527 outputs the command signal $f_0$, previously described with reference to the watchdog circuit of FIG. 5A5 via lead 1267 as previously described. The first inverted input of a logical AND gate 1527 is taken from the output of a two-input NAND gate 1528. The first input of NAND gate 1528 is connected directly to lead 1504 for receiving the address signal $A_{a0}$ while the second input is connected directly to lead 1507 for receiving the address signal $A_{b0}$. The second inverted input of AND gate 1527 is connected directly to the lead 1511 for receiving the address signal $A_{c0}$; the third inverted input is connected directly to lead 1515 for receiving the address signal $A_{d0}$; and the fourth and final inverted input of logical AND gate 1527 is connected directly to lead 1518 for receiving the strobe signal from node 1517, as previously described.

The fourth logical gating network of the command signal generator of FIG. 5E includes a logical AND gate 1529 having six inverted inputs which outputs the command signal $s_1$ via lead 1531 for latching the data bus contents into the output port in the circuitry of FIG. 6 as hereinafter described. The first inverted input of logical AND gate 1529 is connected directly to lead 1504 for receiving the address signal $A_{a0}$; the second inverted input is connected directly to lead 1507 for receiving the address signal $A_{b0}$; the third inverted input is connected directly to the output of an inverter 1532 whose input is connected directly to lead 1511 for receiving the address signal $A_{c0}$; the fourth inverted input is connected directly to lead 1515 for receiving the address signal $A_{d0}$; the fifth inverted input is connected to the strobe signal lead 1518 and the sixth and final inverted input is connected to the clock lead 1501 for receiving the clock phase signal $\overline{H_2}$.

The fifth logical gating network of the command signal generator includes a logical AND gate 1533 having five inverted inputs. AND gate 1533 is used to output the command signal $u_0$ via lead 1534 for latching the data bus contents into the parallel-to-serial converter address register of FIG. 5H, as hereinafter described. The first inverted input of AND gate 1533 is taken from the output of a two input NAND gate 1535 whose first input is connected directly to lead 1504 for receiving the address signal $A_{a0}$ while the second input of NAND gate 1528 is connected directly to lead 1511 for receiving the address signal $A_{c0}$. The second inverted input of AND gate 1533 is connected directly to the clock input lead 1501 for receiving the clock signals $\overline{H_2}$; the third inverted input is connected directly to lead 1507 for receiving the address signal $A_{b0}$; the fourth inverted input is connected directly to lead 1515 for receiving the address signal $A_{d0}$; and the sixth and final inverted input is connected directly to the lead 1518 for receiving the strobe signal, as previously described.

The sixth command signal generator network includes a logical AND gate 1536 having five inverted inputs for outputting the command signal $s_o$ via lead 1537. The command signal $s_o$ is also supplied to the parallel-to-serial converter circuitry of FIG. 5H to be hereinafter described for latching the data bus contents into the most significant byte of the parallel-to-serial converter described therein. The first inverted input of logical AND gate 1536 is taken from the output of a two input NOR gate 1538 having one input connected directly to lead 1507 for receiving the address signal $A_{b0}$ and its other input connected directly to lead 1511 for receiving the address signal $A_{c0}$. The second inverted input of the logical AND gate 1536 is connected directly to the clock input lead 1501 for receiving the clock signals $\overline{H_2}$; the third inverted input is connected directly to lead 1504 for receiving the address signal $A_{a0}$; the fourth inverted input is connected to lead 1515 for receiving the fourth address signal $A_{d0}$ and the sixth and final inverted input of logical AND gate 1536 is connected to the data strobe lead 1518, as previously described.

The seventh command signal generator network includes a logical AND gate 1539 having four inverted inputs. The logical AND gate 1539 outputs the command signal $t_1$ via lead 1541 to the parallel-to-serial converter of FIG. 5H, as hereinafter described, to latch the data bus contents into the least significant byte of the parallel-to-serial converter, as hereinafter described. The first inverted input of the logical AND gate 1539 is taken from the output of a logical NAND gate 1542 having three inputs. The first input of NAND gate 1542 is connected directly to lead 1504 for receiving the address signal $A_{a0}$; the second input to NAND gate 1542 is connected directly to lead 1507 for receiving the address signal $A_{b0}$; and the third and final input of the NAND gate 1542 is connected to lead 1511 for receiving the address signal $A_{c0}$. The second inverted input of logical AND gate 1539 is connected directly to the clock input lead 1501; the third inverted input is connected to lead 1515 for receiving the address signal $A_{d0}$; and the fourth and final inverted input of logical AND gate 1539 is connected to the lead 1518 for receiving the strobe signal as previously described.

The eighth command signal generator network of the circuit of FIG. 5E includes a logical AND gate 1543 having five inverted inputs for outputting the command signal $q_0$ to the time interval counter of FIG. 4D via lead 1082, as previously described. The first inverted input of the logical AND gate 1543 is taken from the output of an inverter 1544 whose input is connected directly to lead 1515 for receiving the address signal $A_{d0}$. The second inverted input of logical AND gate 1543 is connected directly to lead 1504 for receiving the address signal $A_{a0}$; the third input is connected directly to lead 1507 for receiving the address signal $A_{b0}$; the fourth inverted input is connected directly to the lead 1511 for receiving the address signal $A_{c0}$; and the fifth and final inverted input of logical AND gate 1543 is connected directly to lead 1518 for receiving the strobe signal, as previously described.

The ninth command signal generator network includes a logical AND gate 1545 having four inverted inputs. AND gate 1545 outputs the command signal $j_o$ via lead 1083 to the engine time interval counter of FIG. 4G, as previously described, for connecting the most significant word of the engine time interval counter to the microcomputer input bus. The first inverted input of the logical AND gate 1545 is taken directly from the output of a two input NAND gate 1546 having one input connected directly to lead 1504 for receiving the address signal $A_{a0}$ and a second input connected directly to lead 1515 for receiving the address signal $A_{d0}$. The second inverted input of AND gate 1545 is connected directly to lead 1507 for receiving the address signal $A_{b0}$; the third inverted input is connected directly to lead 1511 for receiving the address signal $A_{c0}$; and the fourth and final inverted input is connected directly to lead 1518 for receiving the previously described strobe signal from node 1517.

The tenth command signal generator gating network of FIG. 5E includes a logical AND gate 1547 having four inverted inputs. The output of AND gate 1547 is the command signal $p_o$ which enables the most significant word of the pulse-width to binary converter of FIG. 4C to be connected to the computer data bus, as previously described, via lead 632. The first inverted input of the logical AND gate 1547 is connected directly to the output of the two input NOR gate 1548 which has one input connected directly to lead 1515 for receiving the address signal $A_{d0}$ and its second input connected to the lead 1507 for receiving the address signal $A_{b0}$. The second inverted input of logical AND gate 1547 is connected directly to lead 1504 for receiving the address signal $A_{a0}$; the third inverted input is connected directly to lead 1511 for receiving the address signal $A_{c0}$; and the fourth and final inverted input is connected directly to lead 1518 for receiving the data strobe signal from node 1517, as previously described.

The eleventh command signal generating logic network includes a logical AND gate 1549 having three inverted inputs. AND gate 1549 outputs the command signal $n_0$ via lead 616 to enable the least significant word of the pulse-width to binary converter of block 413 of FIG. 4 to connect to the data computer bus as previously described with respect to FIGS. 4C1, 4C7 and 4C8. The first inverted input of logical AND gate 1549 is taken from the output of a NAND gate 1551 having three inputs. The first input of NAND gate 1551 is connected directly to lead 1505 for receiving the address signal $A_{a0}$; the second input of NAND gate 1551 is connected directly to lead 1508 for receiving the address signal $A_{b0}$; and the third and final input of NAND gate 1551 is connected directly to lead 1516 for receiving the address signal $A_{d0}$. The second inverted input of AND gate 1539 is connected directly to lead 1512 for receiving the address signal $A_{c0}$ and the third and final inverted input of a logical AND gate 1549 is connected directly to lead 1519 for receiving the strobe signal from lead 1517, as previously described.

The twelfth logic network for generating a command signal set forth in the circuitry of FIG. 5E includes a logical AND gate 1552 having four inverted inputs. The output of AND gate 1552 is the command signal $k_0$ which is supplied via lead 1553 to the interrupt control circuitry of FIG. 5K as hereinafter described to connect an interrupt or status word to the MPU data bus. The first inverted input of the logical AND gate 1552 is taken from the output of a two input NAND gate 1554 whose first input is connected to lead 1512 for receiving the address signal $A_{c0}$ and whose second input is connected to lead 1516 for receiving the address signal $A_{d0}$. The second inverted input of logical AND gate 1552 is connected directly to lead 1505 for receiving the address signal $A_{a0}$; whose third inverted input is connected directly to lead 1508 for receiving the second address command $A_{b0}$; and whose fourth and final inverted input is connected directly to the strobe signal input 1519, as previously described.

A thirteenth logic network including a logical AND gate 1555 is used to generate the command signal $w_0$ which is outputted via lead 1556 to the status input circuit of FIG. 5I, as hereinafter described for writing a status word onto the data bus of the microprocessor. The first inverted input of the logical AND gate 1555 is connected directly to the output of a logical NAND gate 1557 having three inverted inputs. The first inverted input of NAND gate 1557 is connected directly to lead 1505 for receiving the address signal $A_{a0}$; the second input of NAND gate 1557 is connected directly to lead 1512 for receiving the address signal $A_{c0}$; and the third and final input of NAND gate 1557 is connected directly to lead 1516 for receiving the address signal $A_{c0}$. The second inverted input of AND gate 1555 is connected directly to lead 1508 for receiving the address signal $A_{b0}$ and the third and final inverted input of logical AND gate 1555 is connected to the previously described strobe signal lead 1519.

The fourteenth and last logic network for generating a command signal in the circuit of FIG. 5E includes a logical AND gate 1558 having three inverted inputs. AND gate 1558 generates the command signal $x_0$ which is connected via lead 1559 to the interrupt control circuit of FIG. 5K, to be hereinafter described, for commanding an interrupt status word to be connected to the microcomputer data bus. The first inverted input of the logical AND gate 1558 is connected directly to the output of a logical NAND gate 1561 having three inputs. The first input of NAND gate 1561 is connected directly to lead 1508 for receiving the address signal $A_{b0}$; the second input of NAND gate 1561 is connected directly to lead 1512 for receiving the address signal $A_{c0}$; and the third and final input of NAND gate 1561 is connected directly to lead 1516 for receiving the address signal $A_{d0}$. The second inverted input of logical AND gate 1558 is connected directly to lead 1505 for receiving the address signal $A_{a0}$ and the third and final inverted input of logical AND gate 1558 is connected to lead 1519 for receiving the pulses from node 1517 as previously described.

In operation, the output of gate 1473 goes high only when all of its inputs are low. This occurs whenever the valid memory address signal V is high indicating that a valid memory address has been outputted; whenever the chip select signal $d_7$ is high while the chip select signal $e_7$ is low and whenever the address signal $A_{d0}$ goes high. A low at the output of gate 1473 will be transmitted via lead 1474 to node 1475 and thence to the gate electrode of transistors 1476 and 1477 causing said transistors to conduct. When the clock signal $\overline{H_2}$ goes high, transistor 1485 also conducts so that nodes 1478 and 1482 are pulled to ground causing transistors 1479 and 1481 to become non-conductive. When node 1482 goes low, the command signal $g_7$ on lead 1483 goes low indicating that data is to be read from the I/O into the computer as hereinafter described. Simultaneously, the low at the output of gate 1495 is transmitted via lead 1496 to the gate electrodes of transistors 1486 and 1487 causing them to conduct. The conduction of transistors 1486 and 1487 pulls nodes 1488 and 1482 to ground and turns off transistors 1489 and 1491, as known in the art. When node 1492 goes low, the strobe signal occurs and this strobe signal is transmitted via lead 1493 to node 15 and thence via leads 1518 and 1519 to the various decoding networks of the command signal generator of FIG. 5E for enabling same.

As previously described, each of the fourteen command signals generated by the network of FIG. 5E represent various decodes of the address signals $A_{a0}$, $A_{b0}$, $A_{c0}$, $A_{d0}$ from the microprocessor 1391 of FIG. 5B, and the particular method of decoding for address signals to obtain up to sixteen different decoded command signals is conventional and the particular address lines decoded by each of the gates to produce the fourteen command signals $l_0$, $y_0$, $f_0$, $s_1$, $u_0$, $s_0$, $t_1$, $q_0$, $j_0$, $p_0$, $n_0$, $k_0$, $w_0$, and $x_0$ require no further explanation.

5.11 Secondary Command Signal Generator

The secondary command signal generator of block 1136 of FIG. 5 will now be described with reference to the schematic diagram of FIG. 5F. In the secondary command signal generator of FIG. 5F, three data bus inputs $d_{a0}$, $d_{b0}$, and $d_{c0}$ are gated with the command signal $l_0$ from the command signal generator of the circuit of FIG. 5E described hereinabove and the derived command signals $l_3$ and $l_4$ which are generated by the binary to pulse-width converter of FIG. 4D14, previously described to output ten secondary command signals $m_1$ through $m_{10}$, which have been previously referred to as the $m_0$ bus signals or secondary command signals.

The data bus signal $d_{a0}$ is connected directly to the input of an inverter 1563 whose output is connected to one current-carrying electrode of a transistor 1564 whose opposite current-carrying electrode is connected to the input of an inverter 1565. The output of inverter 1565 is connected to a first current-carrying electrode of a transistor 1566 whose opposite current-carrying electrode is connected directly to a node 1567. Node 1567 is connected via lead 1568 to the input of an inverter 1569 and via lead 1571 to a first current-carrying electrode of a transistor 1572. The output of inverter 1569 is connected directly to a node 1573 and node 1573 is connected (a) directly to the inverted input of a first driver circuit 1574; (b) directly to the input of an inverter 1575; and (c) directly to the non-inverting input of a second driver 1576. The output of inverter 1575 is connected directly to node 1577 and node 1577 is connected directly to the non-inverting input of the first driver circuit 1574 and to a node 1578. Node 1578 is connected to the second current-carrying electrode of transistor 1572 and to the inverting input of the second driver circuit 1576. Each of the drivers 1574 and 1576 are conventional high-speed drivers such as conventional 1753 drivers.

The second data bus signal $d_{b0}$ is fed directly to the input of an inverter 1579 whose output is connected directly to a first current-carrying electrode of a transistor 1581 whose second current-carrying electrode is connected directly to the input of an inverter 1582. The output of inverter 1582 is connected directly to the first current-carrying electrode of a second transistor 1583 whose second current-carrying electrode is connected directly to a node 1584. Node 1584 is connected via lead 1585 to the input of an inverter 1586 whose output is connected directly to a node 1587 and via lead 1588 is connected to a first current-carrying electrode of a transistor 1589 whose opposite current-carrying electrode is connected to a node 1591. Node 1587 is connected simultaneously to (a) the inverted input of a first high-speed driver 1592; (b) to the input of an inverter 1593; and (c) to the non-inverting input of a second high-speed driver 1594. The output of inverter 1593 is connected directly to the non-inverting input of driver 1592 and to node 1591. Node 1591 is connected directly to the inverting input of the second high-speed driver 1594.

Lastly, the third data bus signal $d_{c0}$ is supplied to the input of an inverter 1595 whose output is connected to the first current-carrying electrode of a transistor 1596 whose second current-carrying electrode is connected to the input of a second inverter 1597. The output of inverter 1597 is connected to the first current-carrying electrode of a transistor 1598 whose second current-carrying electrode is connected directly to a node 1599. Node 1599 is connected via lead 1601 to the input of an inverter 1603 and via lead 1602 to a first current-carrying electrode of a transistor 1604.

The output of inverter 1603 is connected directly to a node 1605 and node 1605 is connected simultaneously to (a) the inverting input of a first high-speed driver 1606; (b) to the input of a second inverter 1607; and (c) to the non-inverting input of a second high-speed driver 1608. The output of inverter 1607 is connected directly to the non-inverting input of the driver 1606 and to a node 1609. Node 1609 is connected directly to the inverting input of the second driver 1608 and to the second current-carrying electrode of transistor 1604.

The master clock signal $H_2$ is supplied via lead 1611 to the gate electrode of transistors 1564, 1581, and 1596 for controlling the conduction thereof as conventionally known in the art. Simultaneously, the command signal $l_0$ is supplied from the circuit of FIG. 5E via lead 1522 to the input of a first inverter 1612 whose output is connected directly to the input of the second inverter 1613 and the output of inverter 1613 is connected directly to node 1614. Node 1614 is connected via lead 1615 directly to the gate electrodes of transistors 1566, 1583 and 1598 for controlling the conduction thereof as conventionally known. Simultaneously, node 1614 is connected to the input of an inverter 1616 whose output is connected via lead 1617 to the gate electrodes of recirculation transistors 1572, 1589 and 1604 for controlling the conduction thereof, as conventionally known.

The ten $m_0$ bus signals $m_1$ through $m_{10}$ are generated by decoding the outputs of the driver circuits 1574, 1576, 1592, 1594, 1606, and 1608 with the generated control signals $l_3$ and $l_4$ as hereinafter described by the use of logical decoding gates.

The control signals $l_3$ and $l_4$ are generated by the binary to pulse-width converter of FIG. 4D14, as previously described, and are inputted via leads 987 and 994, respectively. The output of driver 1574 is supplied directly to node 1618 and connected to the various decoding gates via lead 1619. Similarly, the output of the high-speed driver 1576 is connected directly to node 1621 and to the various decoding gates via lead 1622. The output of the high-speed driver 1592 is connected directly to node 1623 and via lead 1624 to the various decoding gates while the output of the fourth high-speed driver 1594 is connected to a node 1625 and then via lead 1626 to the various decoding gates. Lastly, the output of the fifth high-speed driver 1606 is supplied via lead 1627 to the inputs of the various decoding gates while the output of the sixth and last high-speed driver 1608 is supplied to the various decoding gates via lead 1628. The first logical AND gate 1629 having three inverted inputs is used to output the secondary command signal $m_1$. A first inverted input of logical AND gate 1629 is connected directly to node 1618 while a second inverted input is connected to the lead 1624 and the third and last inverted input is connected to the lead 1627. A second decoding gate comprises a logical AND gate 1631 having four inverted inputs for generating the secondary command signal $m_7$. A first inverted input of AND gate 1631 is connected directly to lead 1619; a second inverted input is connected directly to lead 1624; a third inverted input is connected directly to lead 1628; and the fourth and last input is connected directly to the lead 987 for receiving the $l_3$ control signal.

A third logical AND gate 1632 has three inverted inputs and is used to generate the secondary command signal $m_2$. A first inverted input of AND gate 1632 is connected directly to node 1621 while a second inverted input is connected to the lead 1624 and a third inverted input is connected to lead 1627.

A fourth logical AND gate 1633 having four inverted inputs is used to decode the secondary command signal $m_8$. A first inverted input is connected directly to the lead 1624; a second inverted input is connected directly to the lead 1622; a third logical input is connected directly to the lead 1628; and the fourth and final inverted input of logical AND gate 1633 is connected to the lead 987 for receiving the signal $l_3$.

A fifth logical AND gate 1634 has three inverted inputs and is used to generate the secondary command signal $m_3$. A first inverted input of logical AND gate 1634 is connected directly to lead 1619; a second input is connected directly to lead 1626; and the third and final inverted input is connected directly to the lead 1627.

A sixth logical decoding gate used to generate a secondary command signal $m_9$ is a logical AND gate 1635 having four inverted inputs. A first inverted input is connected directly to the lead 1619; a second inverted input is connected to lead 1626; a third inverted input is connected to lead 1628; and the fourth and final inverted input is connected to lead 987 for receiving the control signal $l_3$, previously described.

A seventh logical AND gate 1636 is used to generate the secondary command signal $m_4$. AND gate 1636 has three inverted inputs. A first inverted input is connected directly to lead 1622 while a second inverted input is connected to lead 1626 and the third and final input is connected to lead 1627.

An eighth logical AND gate 1637 is used to generate the secondary command signal $m_{10}$. Logical AND gate 1637 also has three inverted inputs. A first inverted input is connected directly to lead 1624 while a second inverted input is connected to lead 1628 and the third and final inverted input is connected via lead 994 to receive the control signal $l_4$, previously described.

The ninth secondary command signal, $m_5$ is generated by logical AND gate 1638 having two inverted inputs. One inverted input of logical AND gate 1638 is connected to the lead 1624 while the other inverted input is connected to lead 1628. The tenth and final secondary command signal $m_6$ is outputted from logical AND gate 1639 which has three inverted inputs. A first inverted input of logical AND gate 639 is connected directly to lead 1622 while a second inverted input is connected to lead 1626 and the third and final input is connected directly to lead 1628.

Figure 5F:
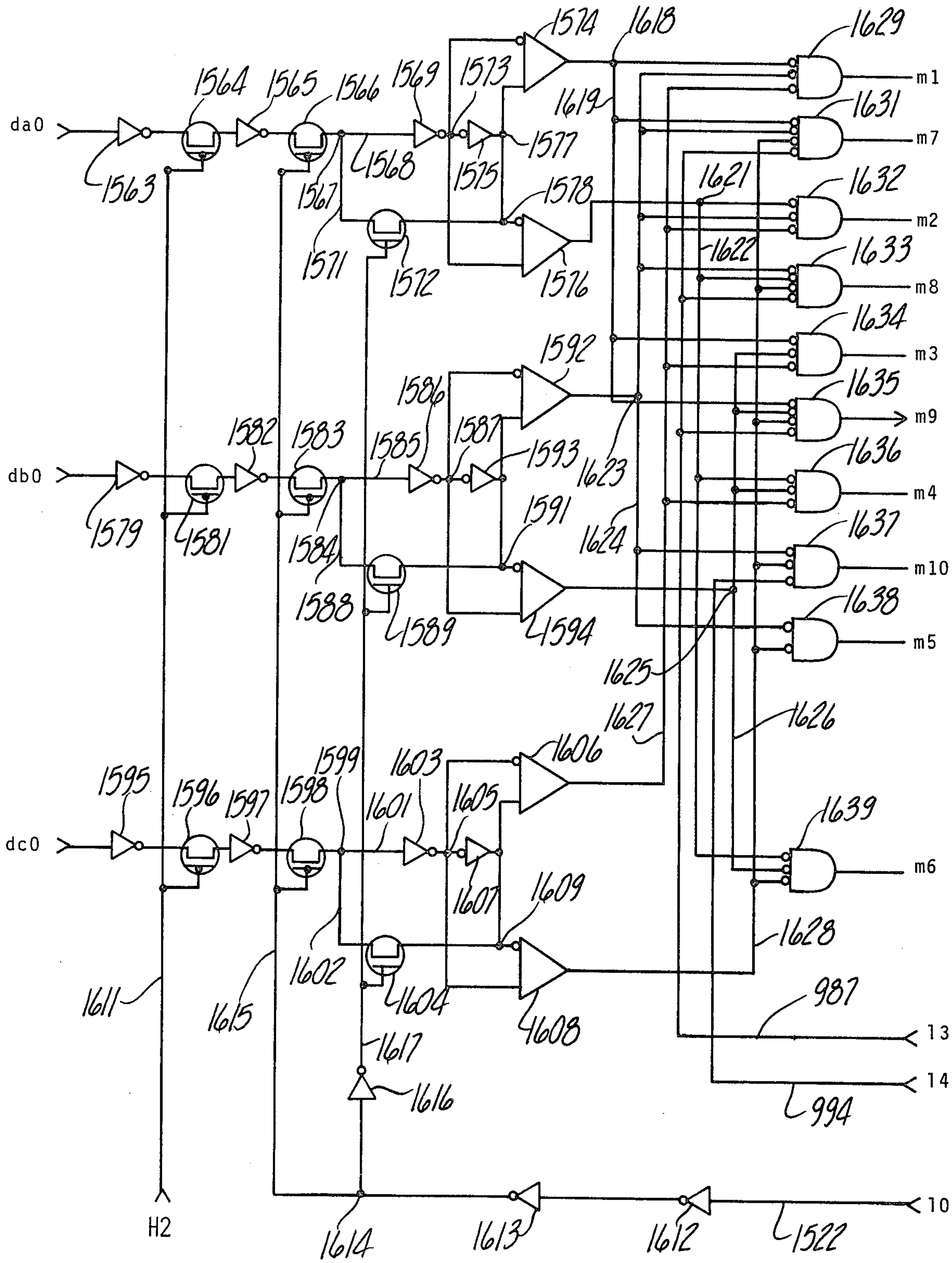
FIG. 5F is an electrical schematic diagram of the secondary command signal generator circuitry of block 1136 of FIG. 5.

The operation of the secondary command signal generator circuit of FIG. 5F will now be briefly described. Whenever the data bus signal, for example $d_{a0}$, goes low, the output of inverter 1563 goes high. When the next clock phase signal $H_2$ goes high causing transistor 1564 to conduct, the high at the first control electrode is inverted to produce a low at the output of inverter 1565 and therefore a low on the first current-carrying electrode of transistor 1566. So long as the command signal $l_0$ is low, node 614 remains low. With node 614 low, transistors 1566, 1583 and 1598 remain non-conductive while transistors 1572, 1589 and 1604 are rendered conductive by the action of the inverter 1616 so as to cause the signal present at node 1567 to be continually recirculated via inverter 1569, node 1573, inverter 1575, node 1577, node 1578, conducting transistor 1572, and lead 1571. However, when the command signal $l_0$ goes high, transistors 1572, 1589 and 1604 are rendered non-conductive while transistors 1566, 1583 and 1598 are rendered conductive. When transistor 1566 conducts, the zero present at its fifth control electrode is transmitted to node 1567 and inverted by inverter 1569 to cause a high to appear at node 1573. The high at node 1573 is transmitted as a high to the inverted input of the first driver 1574 and as a high to the non-inverted input of the second driver 1576. The high at node 1573 is also inverted by inverter 1575 causing a low to appear at node 1577 and therefore a low to appear at the non-inverting input of the first driver 1574 and at the inverting input of the second driver 1576.

Therefore, when the command signal $l_0$ is high and a low appears on the data bus $d_{a0}$, the output of driver 1574 will cause a low signal to appear at node 1618 and hence a low on lead 1619 and a high to appear at the output of the second high-speed driver 1576 at node 1621 and therefore on lead 1622 for decoding purposes. Similarly, low signals will appear on leads 1619, 1624 and 1627 whenever the corresponding data bus signals $d_{a0}$, $d_{b0}$, and $d_{c0}$, respectively, are low while high signals appear on leads 1622, 1626 and 1628 respectively. As previously mentioned, these signals will appear only when the command signal $l_0$ is high for when the command signal $l_0$ is low, whatever signal last appeared at nodes 1567, 1584 and 1599 will be continuously recirculated until the command signal $l_0$ again goes high to initiate a software-commanded analog-to-digital conversion as previously described.

The actual decoding by the logical gates 1629 and 1631 through 1639 is a conventional decoding of the outputs of the high-speed driver circuits previously described together with the control signal inputs $l_3$ and $l_4$ and need no further description. The secondary command signals, referred to collectively as the $m_0$ but signals, are used for various purposes as described herein. For example, the secondary command signals $m_1$ through $m_6$ are used with the multiplexer of FIG. 4B to multiplex the analog inputs into the pulse-width to binary converter circuitry of FIG. 4C as previously described. In this manner, the secondary command signal $m_1$ is used to select the pulse-width modulated signal A to the pulse-width to binary converter of FIG. 4C; the secondary command signal $m_2$ is used to select the pulse-width modulated signal D for connection to the pulse-width to binary converter of FIG. 4C; the secondary command signal $m_3$ is used to select the pulse-width modulated signal C for connection to the pulse-width to binary converter of FIG. 4C; the secondary command signal $m_4$ is used to select the pulse-width modulated signal B for connection to the pulse-width to binary converter of FIG. 4C; the secondary command signal $m_5$ is used to select the pulse-width modulated signal $f_8$ for connection to the pulse-width to binary converter circuit of FIG. 4C; and the secondary command signal $m_6$ is used to select the pulse-width modulated signal E for connection to the pulse-width to binary converter circuit of FIG. 4C.

Furthermore, the secondary command signals $m_7$ may be used to connect the first $ZiO_2$ oxygen sensor integrator word to the binary to pulse-width converter of FIG. 4D14 via the sampling counter multiplexer of FIG. 4D13 while the secondary command signal $m_8$ may be used to connect the second $ZiO_2$ oxygen sensor integrator word thereto. Furthermore, the secondary command signal $m_9$ may be used in the circuit of FIG. 4D, for example for sensor test control purposes, as previously described, while secondary command signals $m_{10}$ may be used to connect the low to the input lines of the binary to pulse-width converter as illustrated and previously described with respect to FIG. 4D14.

5.12 Buffers

The buffer circuitry of block 1137 of FIG. 5 will now be described with reference to the schematic diagram of FIG. 5G. The buffer circuitry of FIG. 5G includes eight substantially identical buffer stages for passing the data signals $d_{a0}$ through $d_{h0}$ into or out of the data processor bus, previously referred to as the $d_0$ data bus, to and from the MPU 6800 microprocessor 1391 of FIG. 5B, as previously described. The stages are used to enable the transfer of external signals $d_{a1}$ through $d_{h1}$ from the various external chips onto the data bus $d_0$ and into the microprocessor and/or to transfer data from the data bus $d_0$ out of the microprocessor and into the external chip circuitry via data bus signals $d_{a2}$ through $d_{h2}$, respectively.

The second clock phase signal $H_2$ is inputted to a clock input node 1641 which is connected via lead 1642 and lead 1643 for supplying a clock signal to each of the eight stages of the buffer circuitry of FIG. 5G as hereinafter described. Similarly, the command signal $g_7$ is supplied via lead 1483 from the circuit of FIG. 5E to enable data to be transferred via the data bus inputs $d_{a1}$ through $d_{h1}$ respectively from the external chips back into the master microprocessor data bus $d_0$ as previously described. The command signal $g_7$ is supplied via lead 1483 to an input node 1644 and node 1644 supplies the command signal $g_7$ to the eight stages of the buffer circuitry of FIG. 5G via leads 1645 and 1646 respectively.

The first data buffer stage is adapted to receive the data signal $d_{a1}$ which represents a specific data signal on the data bus $d_{a1}$ through $d_{h1}$ previously described, via input lead 1647. Lead 1647 is connected directly to one current-carrying electrode of a transistor 1648 whose opposite current-carrying electrode is connected directly to a +5-volt source of potential and whose gate electrode is constantly coupled to the first current-carrying electrode on the data input lead 1647. The data input lead 1647 connects to one inverted input of a logical AND gate 1649 having two inverted inputs. The second inverted input of AND gate 1649 is connected directly to the $g_7$ lead 1645 to enable a transfer of the data signal $d_{a1}$ back to the processor. The output of AND gate 1649 is connected directly to the gate electrode of a transistor 1651 which has one current-carrying electrode connected directly to ground and its second current-carrying electrode connected to a node 1652. Node 1652 is connected to a first current-carrying electrode of a transistor 1653 whose opposite current-carrying electrode is connected to a +5-volt source of potential. The gate electrode of the second transistor 1653 is connected to the output of a logical AND gate 1654 having two inverted inputs. The first inverted input of AND gate 1654 is connected directly to the output of AND gate 1649 while the second inverted input is connected directly to the $g_7$ command signal lead 1645 as previously described. Node 1652 is also connected directly to a data output node 1655 for receiving the input or output data bus signal $d_{a0}$ from the microprocessor data bus $d_0$ previously described. I/O node 1655 is also connected directly to the input of an inverter 1656 whose output is connected to one current-carrying electrode of a transistor 1657 whose opposite current-carrying electrode is connected to the input of another inverter 1658. The output of transistor 1658 is lead 1659 which is used to output or transfer the data signal $d_{22}$ from the microprocessor data bus $d_0$ to the external chip circuitry as previously described. The gate electrode of transistor 1657 is connected to the second clock phase lead 1642.

Briefly, the first stage of the buffer circuit of FIG. 5G operates as follows. Whenever a data signal $d_{a1}$ is to be transferred from an external circuit to the microprocessor 1391 of FIG. 5B, it is input via lead 1647 to the first current-carrying electrode and gate electrode of the normally-conducting pull-up transistor 1648 and to one inverted input of AND gate 1649 for disabling same. With one of its inputs disabled, the output of AND gate 1649 will be low so as to enable the first inverted input of AND gate 1654. When data is to be inputted to the microprocessor 1391 of FIG. 5B, the signal $b_{a1}$ is pulled to ground by the interrupt control circuit of FIG. 5K as hereinafter described causing transistor 1648 to be rendered non-conductive and a low signal to appear at the first inverted input of AND gate 1649 for enabling same. Therefore, as soon as the control signal $g_7$ is generated by the circuit of FIG. 5E, a low which enables the data to be transmitted back to the processor appears via lead 1483 to node 1644 and thence via lead 1645 to the other inverted input of AND gate 1649 causing a high to appear at its output. With a high at the output of AND gate 1649, transistor 1651 is rendered conductive so as to draw node 1652 to ground.

Simultaneously, the high at the output of AND gate 1649 is transmitted back to one inverted input of gate 1654 causing its output to go low to turn off transistor 1653. The low from node 1652, which represents the input data signal $d_{a1}$ is transmitted to the I/O output node 1655 and inputted as the data input signal $d_{a0}$ to the data bus $d_0$ to the microprocessor 1391 of FIG. 5B for further processing. The low at node 1655 will terminate when the control signal $g_7$ goes high which, as explained in FIG. 5E occurs when the clock signal $\overline{H_2}$ returns high, therefore when the clock phase signal $H_2$ goes low.

When the clock signal $H_2$ goes low, the signal $g_7$ goes high and since this signal is supplied via lead 1483, node 1644 and lead 1645 to one inverted input of each of the AND gates 1649 and 1654, both AND gates are disabled for preventing the inputting of any further data into the processor.

The processor data bus $d_0$ is always able to transmit data from the processor to the external circuitry via the data I/O input node 1655 as hereinafter explained, if a low signal is present at node 1655, it is inverted by inverter 1656 so that a high signal is clocked when the $H_2$ signal goes high by the conduction of transistor 1657 to the input of an inverter 1658 whose output on lead 1659 remains latched low, corresponding to the low on the I/O data input node 1655 for approximately the duration of the clock period, much like a typical sample and hold circuit. The low on lead 1659 is transmitted as the data signal $d_{a2}$ to the external chip circuitry via the data bus generally referred to as $d_{a2}$ through $d_{h2}$, described herein.

Therefore, in this manner, the external lead generated to data signals are inputted into the I/O data bus $d_0$ of the microprocessor 1391 of FIG. 5B only when the command signal $g_7$ is generated to enable the transmission thereof back to the processor. On the other hand, data from the microprocessor may be outputted from the I/O data bus $d_0$ to the external circuits for further manipulation, control, etc., as hereinafter described, simply by clocking the transistor 1657 with the second clock signal $H_2$ and latching the signal present at the I/O input node 1655 on the data output path 1659 as the data bus signal $d_{a1}$.

Figure 5G:
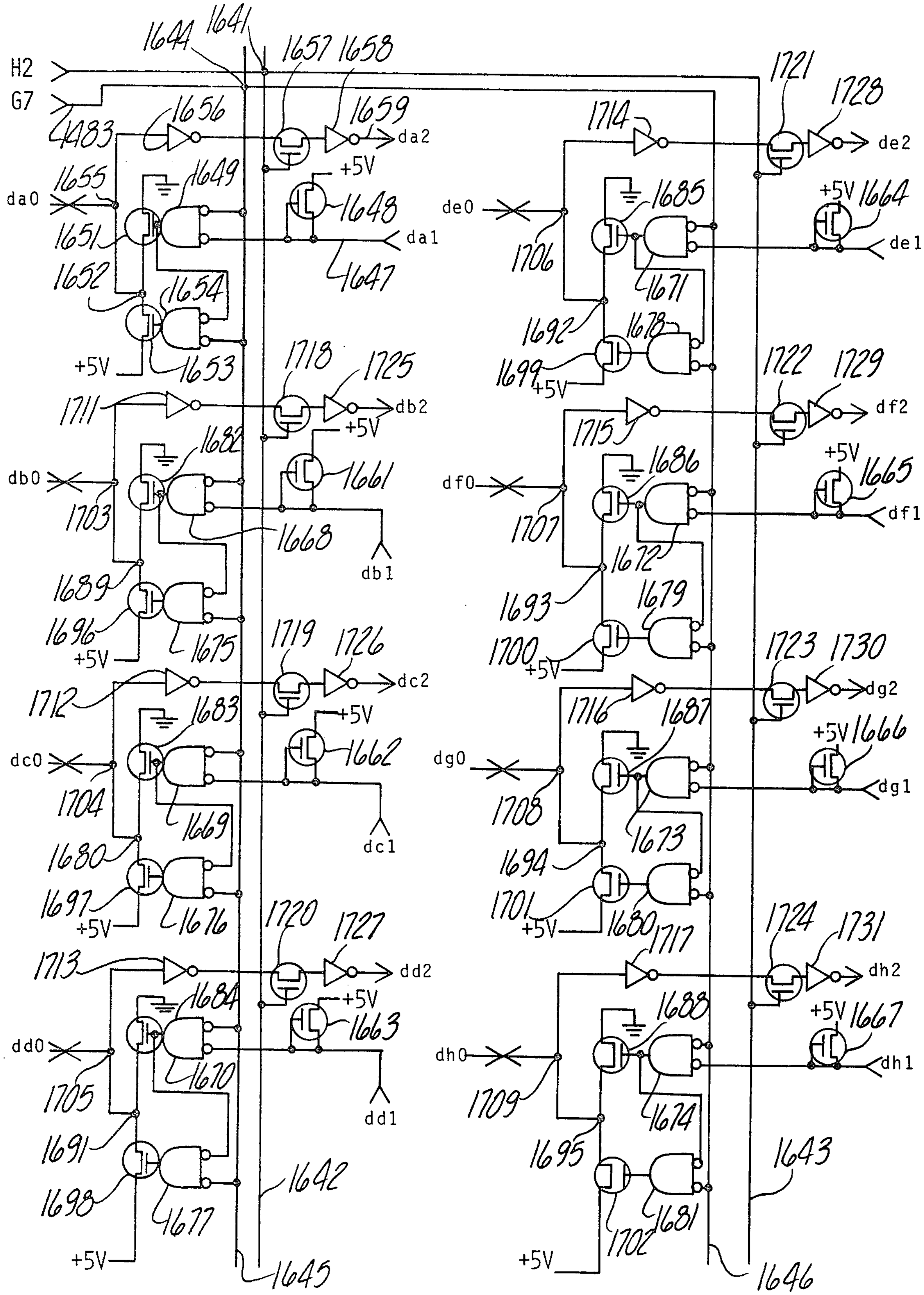
FIG. 5G is an electrical schematic diagram of the buffer circuitry of block 1137 of FIG. 5.

The remaining seven stages of the buffer circuitry of FIG. 5G operate in the same manner. The data input signals from the external chip circuitry, $d_{b1}$ through $d_{h1}$ are inputted via a buffer stage data input transistor 1661 through 1667 respectively, and then inputted to one inverted input of a logical AND gate 1668 through 1674, respectively, each having two inverted inputs. The other inverted inputs of each of the AND gates 1668 through 1674 are supplied with the command signal $g_7$ via input lead 1483 and command signal node 1644 and either command lead 1645 or 1646 connected thereto. The output of the AND gates 1668 through 1674 is fed back as one inverted input of a second AND gate 1675 through 1681, respectively, each having two inverted inputs and the second inverted input thereof is connected to receive the command signal $g_7$ via either leads 1645 or 1646 previously described.

Similarly, the output of the set of AND gates 1668 through 1674 is supplied to the gate electrode of a transistor 1682 through 1688, respectively, each having one current-carrying electrode connected directly to ground and its opposite current-carrying electrode connected to an input enable node 1689 through 1695 respectively. The corresponding enable nodes 1689 through 1695 are connected to a first current-carrying electrode of a transistor 1696 through 1702, respectively, whose opposite current-carrying electrode is connected to a +5-volt source of potential and whose corresponding gate electrode is connected to the output of a corresponding AND gate 1675 through 1681, respectively, as previously described. The enable nodes 1689 through 1695 are also connected directly to the I/O data bus input nodes 1703 through 1709, respectively for inputting and outputting the data bus signals $d_{b0}$ through $d_h$0, respectively, as previously described, for transmission via the data bus $d_0$ to and from the microprocessor 1391 of FIG. 5B.

The I/O data nodes 1703 through 1709 are also connected to the inputs of corresponding inverters 1711 through 1717, respectively, whose outputs are connected to one current-carrying electrode of corresponding latching transistors 1718 through 1724 respectively whose opposite current-carrying electrodes are connected directly to the inputs of corresponding inverters 1725 through 1731 respectively. As previously described with reference to the first inverter stage, the output of the second inverters 1725 through 1731, respectively, are used to transmit the data signals $d_{b2}$ through $d_{h2}$ to the external circuitry via the appropriately designated data bus paths for use therein. As with the first stage, the gate electrode of the latching transistors 1718 through 1724 are connected via leads 1642 and 1643 to the second clock phase input node 1641 for being clocked by the signal $H_2$ so as to latch the output for approximately the duration of the clock period and enable the external circuitry to utilize same. While all of the individual components of the second through eighth stages of the buffer circuitry of FIG. 5E have not been described in the detail of the first stage, the structure and operation is virtually identical and together, the buffer stages of FIG. 5G buffer or control the passage of the eighth data signal between the external chip circuits and the data processor 1391 of FIG. 5B, as conventionally known in the art.

5.13 Parallel-to-Serial Converter

Figure 5H:
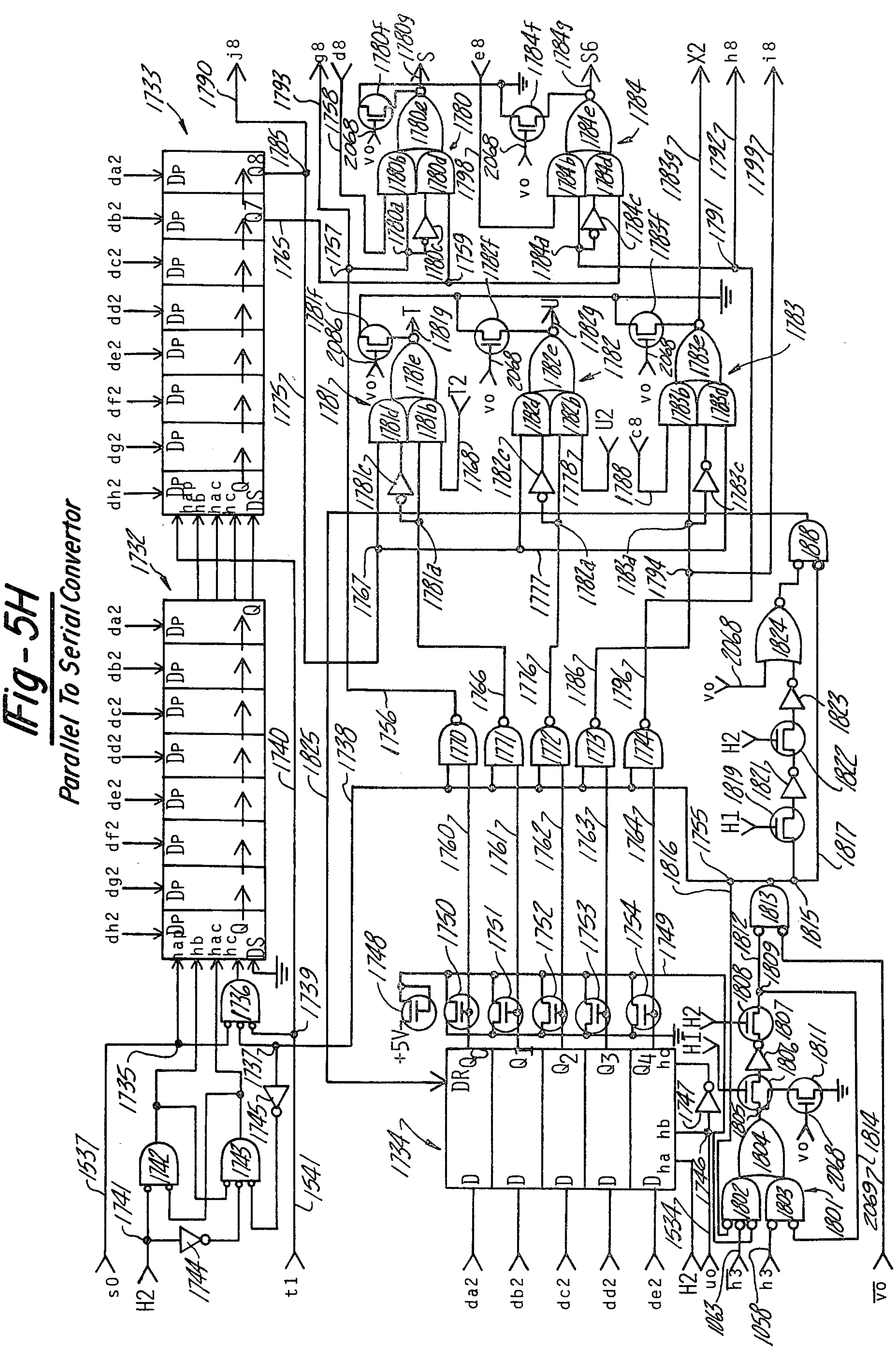
FIG. 5H is an electrical schematic diagram of the parallel-to-serial converter system of block 1138 of FIG. 5.
Figure 5I:
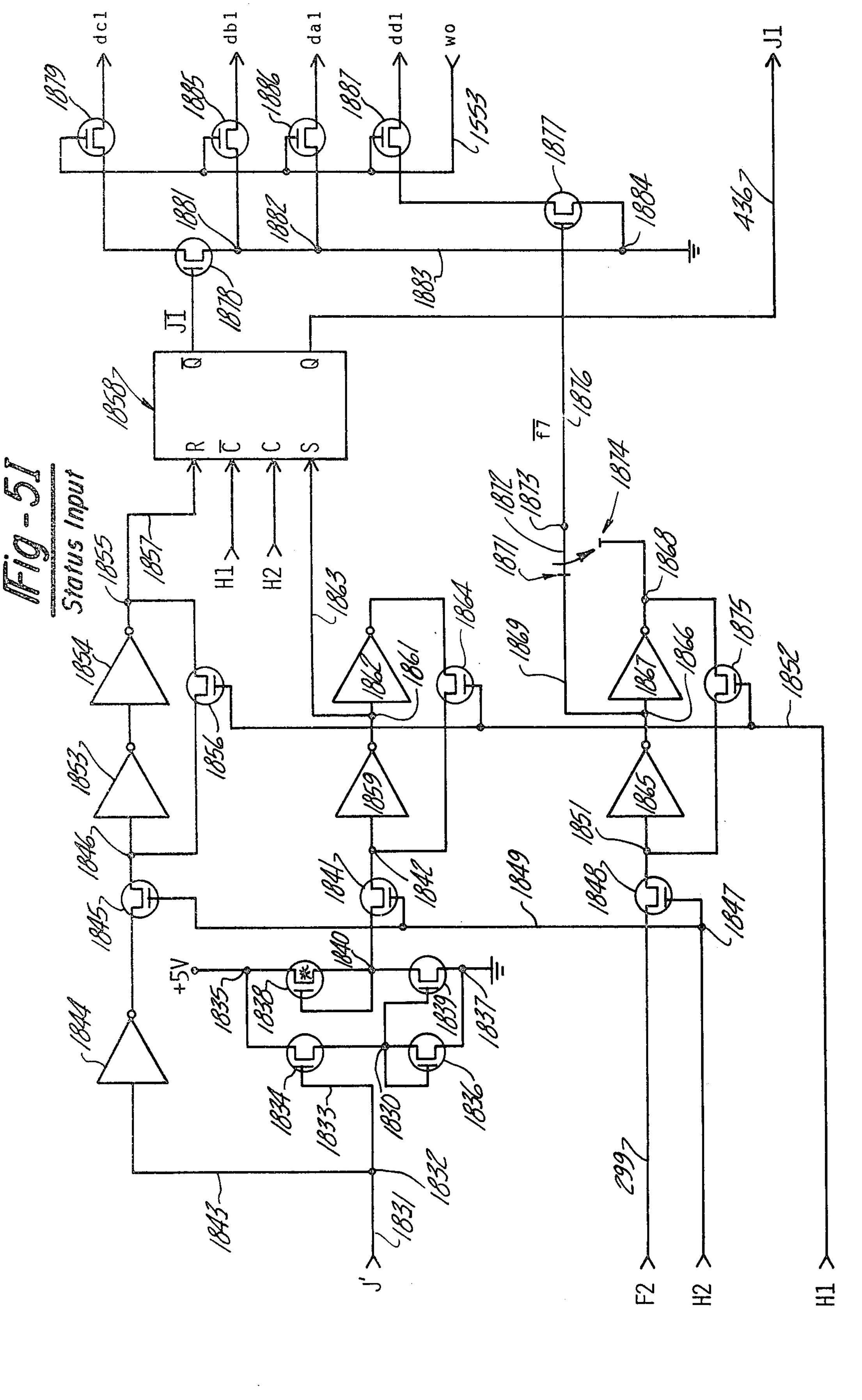
FIG. 5I is an electrical schematic diagram of the status input circuitry associated with block 1139 of FIG. 5.

The parallel-to-serial converter circuitry of block 1138 of FIG. 5 will now be described with reference to the schematic diagram of FIG. 5H. The function of the circuitry of FIG. 5H is to convert parallel eight bit binary word outputs from the microprocessor data bus $d_0$ into either sixteen or eight bit binary data words for utilization by the binary arithmetic associated with the circuitry of FIGS. 5 and 6 as hereinafter described.

The major components of the parallel-to-serial converter circuitry of FIG. 5H include a pair of eight bit parallel-to-serial shift registers 1732 and 1733 which perform the parallel-to-serial conversion, a buffer contents address register 1734, and associated buffer transfer control circuitry and storage register input logic as hereinafter described in greater detail.

The command signal $s_0$ which is generated by the command signal generator circuit of FIG. 5E is transmitted via lead 1537 to a node 1735. The command signal $s_0$ is a command signal utilized to latch the data bus contents into the most significant byte (word register 1732) of the serial-to-parallel converter of FIG. 5H. Node 1735 is connected directly to the $h_{ap}$ inputs of each of the eight static shift register stages making up the first register 1732. The $h_{ap}$ input enables the first or most significant byte of a two byte or sixteen bit data word from the computer, as represented by registers 1732 and 1733 respectively and more precisely the most significant eight bit word or most significant byte outputted from the microprocessor 1321 of FIG. 5B to the parallel-to-serial converter circuit of FIG. 5H via the buffer circuitry of FIG. 5G to be read in parallel into the storage register 1732 temporarily stored therein. Each of the eight stages of shift register 1732 and each of the eight stages of shift register 1733 are conventional static shift register stages with preset inputs as represented in greater detail in the block diagram of FIG. 9.26A and the schematic of FIG. 9.26B and the operation thereof is conventional.

The data bus output signals from the buffer circuitry of FIG. 5G, which are supplied via the data paths designated $d_{a2}$ through $d_{h2}$, respectively are supplied or inputted to the preset inputs $D_p$ of the eight stages of the first shift register 1732 with the data signal $d_{a2}$ being stored in the last stage or least significant bit position of the register 1732 and the data signal $d_{h2}$ being stored in the first stage or most significant bit position thereof, as known in the art. The same outputs supply, at a different time, a second least significant byte data word from the microprocessor via the buffers of FIG. 5G into the preset input of the eight stages of the second or least significant byte or data word register 1733 with the data signals $d_{a2}$ being supplied to the preset input $D_p$ of the last stage or least significant bit position of register 1733 while the data signal $d_{h2}$ is supplied to the preset input $D_p$ of the first stage or most significant bit position of the least significant byte data word register 1733 and, as with register 1732, the eight stages of the register 1733 are static shift register stages with preset as illustrated in the block diagram of FIG. 9.26A and the schematic diagram of FIG. 9.26B, as previously described and known in the art.

The input node 1735 which receives the command signal $f_0$ via lead 1537 is also connected directly to one inverted input of a logical AND gate 1736 having three inverted inputs. The output of AND gate 1736 is connected directly to the $h_c$ clock inputs of each of the eight stages of both shift registers 1732 and 1733, as known in the art. A second inverted input of the logical AND gate 1736 is connected directly to node 1737 which receives a sixteen microsecond long shift signal via lead 1738, as hereinafter described. The third and last inverted input of AND gate 1736 is connected directly to node 1739. Node 1739 receives the command signal $t_1$ from the command signal generator of FIG. 5E via lead 1541 and the signal $t_1$ is used to latch the data bus contents into the least significant byte of the parallel-to-serial converter as hereinafter explained. The signal $t_1$ is also supplied via lead 1541 and node 1739 to the $h_{ap}$ of each of the eight stages of the least significant data word register 1733 via lead 1740 for controlling the parallel inputs thereto.

The second phase clock signal $H_2$ is inputted to clock input node 1741 and node 1741 is connected directly to the first inverted input of a logical AND gate 1742 having two inverted inputs. The output of AND gate 1742 is connected simultaneously back to the first inverted input of a second logical AND gate 1743 having three inverted inputs and to the $h_d$ clock input of each of the eight stages of both of the registers 1732 and 1733 for clock control purposes as known in the art. Node 1741 is also connected to the input of an inverter 1744 whose output is connected to a second inverted input of a logical AND gate 1743. The third and final inverted input of logical AND gate 1743 is taken from the output of an inverter 1745 whose input is connected to the shift signal node 1737 and the output of the logical AND gate 1743 is simultaneously supplied to the second inverted input of the logical AND gate 1742 and to the clock signal input $h_{ac}$ of each of the eight stages of both of the registers 1732 and 1733 for clocking purposes, as known in the art.

The buffer contents address register 1734 includes five stages, each of which comprises a "D"-type flip-flop such as that illustrated in the block diagram of FIG. 9.23A and in the schematic diagram of FIG. 9.23B. Each of the flip-flop stages of the five stage address register 1734 includes a "D" data input; a direct reset DR input; clock inputs $h_a$, $h_b$, and $h_c$, and a Q output. The buffer contents address register 1734 accepts the lower five bits of the data bus word upon generation of the command signal $u_0$ and is utilized to select the storage register into which the converted data word or words is to be shifted.

The first "D" flip-flop is adapted to receive the data signal $d_{a2}$ at its "D" input and its output is designated $Q_0$; the second bit position is represented by the second flip-flop stage and the data bus signal $d_{b2}$ is supplied to the "D" input thereto while its output is designated $Q_1$. The third bit position is represented by the flip-flop which has as its input the data signal $d_{c2}$ supplied to the "D" input and its corresponding output designated $Q_2$. Similarly, the fourth bit position receives the data signal $d_{d2}$ at its "D" input and has its output designated $Q_3$ while the fifth bit position of the least significant data word has its "D" input connected to receive the data signal $d_{e2}$ and its output designated $Q_4$.

The clock signal $H_2$ is supplied directly to the $h_a$ clock input of each of the five flip-flops making up the buffer contents address register 1734. The command signal $u_0$ which is generated by the command signal generator circuitry of FIG. 5E is received via lead 1534 and supplied to the command input node 1746. The command signal $u_0$ is used to latch the data bus contents into the parallel-to-serial converter address register since node 1746 is connected directly to the $h_b$ clock input of each of the five "D" flip-flops comprising the address register 1734 and to the input of an inverter 1747 whose output is connected directly to the $h_c$ clock input of each of the five flip-flops comprising the address register 1734 previously described.

A NOR gate configuration is associated with the Q outputs of the address register 1734 in the following manner. A first pull-up transistor 1748 has one current-carrying electrode connected directly to a +5-volt source of potential and both its gate electrode and its second current-carrying electrode commonly coupled to a NOR gate output lead 1749. The NOR gate includes five transistors designated 1750 through 1754, each of which are associated with the correspondingly designated Q output $Q_0$ through $Q_4$, respectively of the buffer address register 1734. One current-carrying electrode of each of the transistors 1750 through 1754 are commonly coupled directly to ground while the other current-carrying electrode of each of the transistors 1750 through 1754 is connected directly to the NOR gate output lead 1749, as conventionally known. The gate electrode of each of the transistors 1750 through 1754 is connected directly to the correspondingly designated flip-flop output $Q_0$ through $Q_4$ respectively via leads 1760 through 1764 respectively, each of which also serves as one input to a corresponding two input NAND gate 1770 through 1774, respectively. The other input of each of the NAND gates 1770 through 1774 is connected to node 1755 via lead 1738 as hereinafter described.

The circuitry of FIG. 5H also includes five sets of data transfer input gating networks designated generally by the reference numerals 1780 through 1784 and associated with the output of the corresponding NAND gate 1770 through 1774 for supplying data into an address one of the registers associated therewith as hereinafter described. The output of NAND gate 1770 is connected via lead 1756 to a gated output node 1757. The gated output node 1757 supplies the generated control signal $g_8$ to the binary decoder circuitry of FIG. 6 as hereinafter described for commanding the transfer of a new serial word from the parallel-to-serial register 1732, 1733 to the fuel pulse counter number one circuitry thereof. Node 1757 also supplies the address command signal $g_8$ from node 1757 to the input of the transfer logic gating network 1780 which controls the transfer of data into the first fuel pulse counter of the binary decoder logic of FIG. 6. Each of the five transfer networks 1780 through 1784 includes a dual two input AND/ two input NOR gate arrangement as set forth in the block diagram of FIG. 9.12A and the schematic diagram of FIG. 9.12B and the operation of such a gating network is conventionally known. The transfer gating network 1780 will be described in detail and the corresponding components of the transfer networks 1781 through 1784, respectively, will receive correspondingly designated reference numerals.

The $g_8$ command input node 1757 is connected by a lead directly to a command signal input node 1780*a* which is connected directly to one input of a two input AND gate 1780*b* and to the input of an inverter 1780*c* whose output is connected directly to the first input of a second two input AND gate 1780*d*. The outputs of AND gates 1780*b* and 1780*d* are connected directly to the corresponding two inputs of the two input NOR gate 1780*e*. The output of NOR gate 1780*e* is connected to one current-carrying electrode of a transistor 1780*f* whose opposite current-carrying electrode is connected directly to ground. The gate electrode of transistor 1780*f* is connected to receive the reset signal $v_0$ which is outputted from the buffer logic circuit of FIG. 5A2 of the reset control system of FIG. 5A via lead 2068. The second input of the first two input AND gate 1780*b* is connected via lead 1758 to the output of the number one fuel pulse-width counter of FIG. 6, as hereinafter described, for receiving the output signal $d_8$ which represents the output of the last stage of the first fuel pulse counter decremented by one as hereinafter described. Simultaneously, the second input of the second two input AND gate 1780*d* is taken from node 1759 which receives the $\overline{Q_7}$ output from the least significant data word or byte of the parallel-to-serial input registers 1733 via lead 1765 for allowing the second least significant bit to represent the sixteen microsecond bit position for fuel pulse calculations, if desired. NOR gate 1780e outputs the transferred data signal S via representative lead 1780g which is connected as an input to the number one fuel injection pulse-width counter of FIG. 6 as hereinafter described.

Similarly, the output of the second NAND gate 1766 is connected to address node 1781a of the transfer network 1781 which supplies the non-inverted output of NAND gate 1771 to the first input of AND gate 1781b and the inverted output of NAND gate 1771 to the first input of AND gate 1781d. The second input of AND gate 1781d is taken from node 1767. Node 1767 receives the control signal $j_8$ from the $\overline{Q_8}$ of the least significant bit position of the counter 1733 via lead 1775 and the $\overline{Q_8}$ output node 1785 which also outputs the control signal $j_8$ via lead 1790 to the binary decoder circuitry of FIG. 6 as hereinafter described. The control signal $j_8$ represents the least significant bit of the parallel-to-serial conversion register 1733 and indicates the normal 16 microsecond resolution for most of the counters of FIG. 6 but a reduced 8 microsecond resolution for the fuel pulse counters of FIG. 6, if desired. The second input of the second two input AND gate 1781b is connected via input feedback lead 1768 for receiving the output signal T2 from the output of the ignition delay storage register of FIG. 6 as hereinafter described.

The output of the third logical NAND gate 1772 is connected via lead 1776 to node 1782a so that the inverted output of the gate 1772 is supplied to the first input of AND gate 1782b and the inverted input to the first input of AND gate 1782d. The second input of AND gate 1782d receives the signal $j_8$ via node 1785, lead 1775, and distribution node 1767 via lead 1777 emanating therefrom. The second input of AND gate 1782b is connected via feedback lead 1778 to the output of the ignition pulse-width storage register, the signal U2, from the output of the ignition pulse-width storage register of FIG. 6 as hereinafter described.

The output of NAND gate 1773 is connected via lead 1786 to node 1783a for supplying the non-inverted output of NAND gate 1773 to one input of AND gate 1783b and the inverted input thereof to one input of AND gate 1783d of the transfer network 1783. The second input of AND gate 1783 is connected to node 1767 via lead 1777 for receiving the signal $j_8$, as previously described, and feedback lead 1788 is connected to the second input of AND gate 1783b for supplying the output control signal $c_8$ from the output of the proportional EGR counter of FIG. 6 thereto. The signal $c_8$ indicates that the contents of the proportional EGR storage register has been decremented by one, as hereinafter described, in relation to the decoder circuitry of FIG. 6.

Lastly, the output of NAND gate 1774 is supplied via lead 1796 to a node 1791. Node 1791 is used to supply the non-inverted output of NAND gate 1774 to one input of AND gate 1784b and the inverted input thereof to one input of AND gate 1784d. Furthermore, node 1791 supplies the control signal $h_8$ to the decoder circuitry of FIG. 4 via lead 1792. The control signal $h_8$ is used to command the transfer of a new serial word from the parallel-to-serial shift register via the fuel pulse control flip-flop circuits of FIG. 6L, as hereinafter described.

Figure 6A:
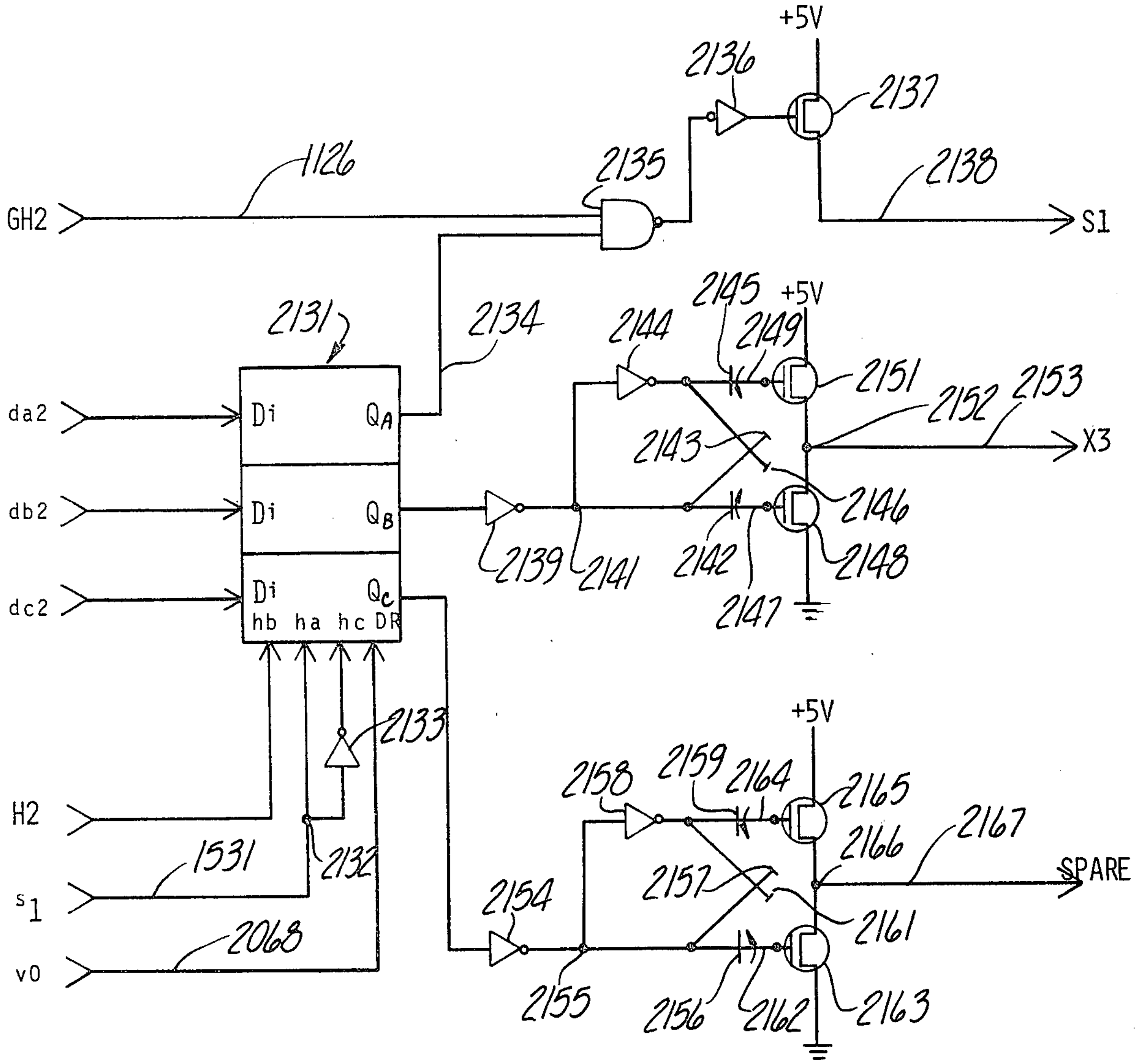
FIG. 6A is an electrical schematic diagram of the output port circuitry of block 2111 of FIG. 6.
Figure 6B:
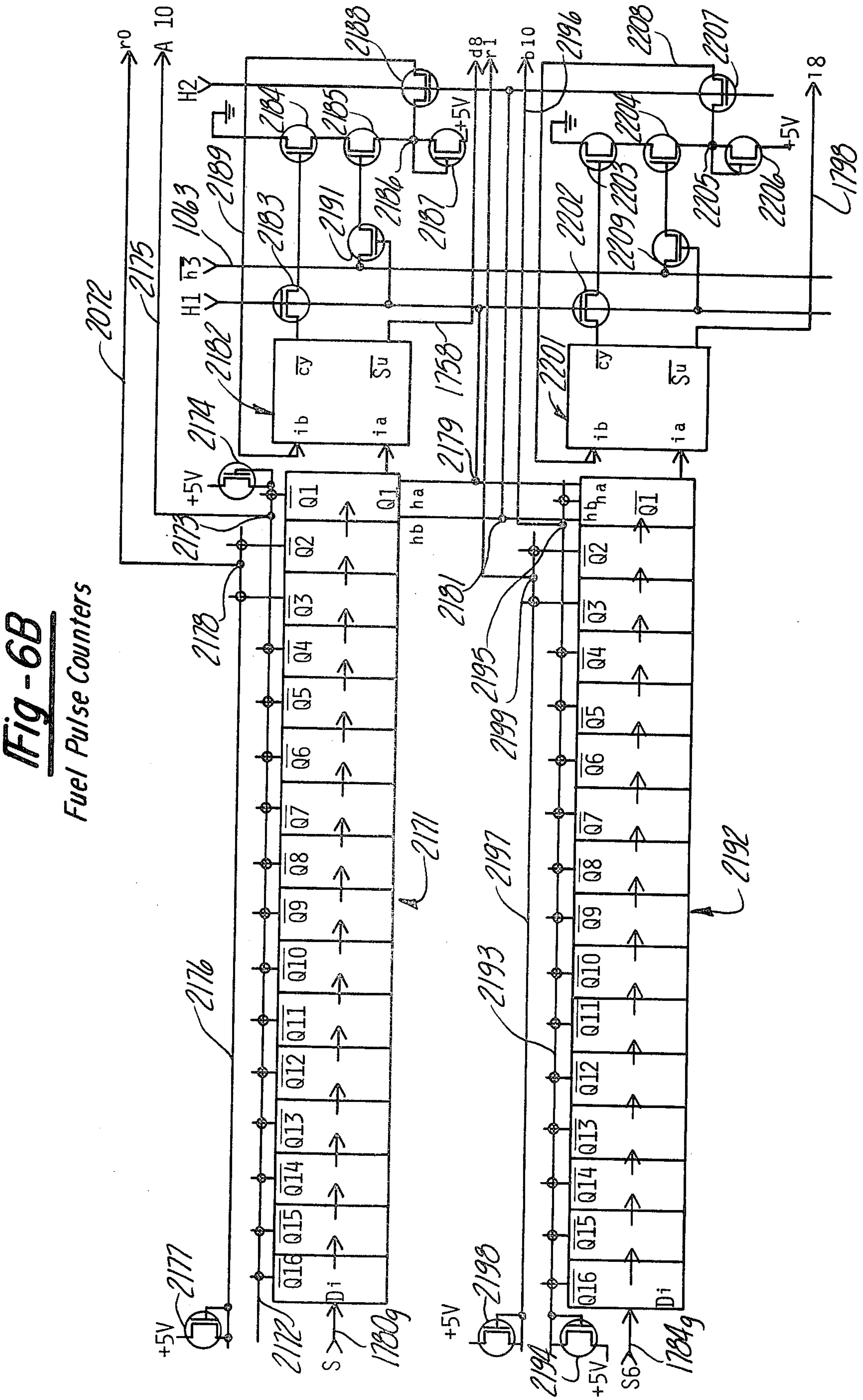
FIG. 6B is an electrical schematic diagram of the first and second fuel pulse counters of block 2112 of FIG. 6.
Figure 6E:
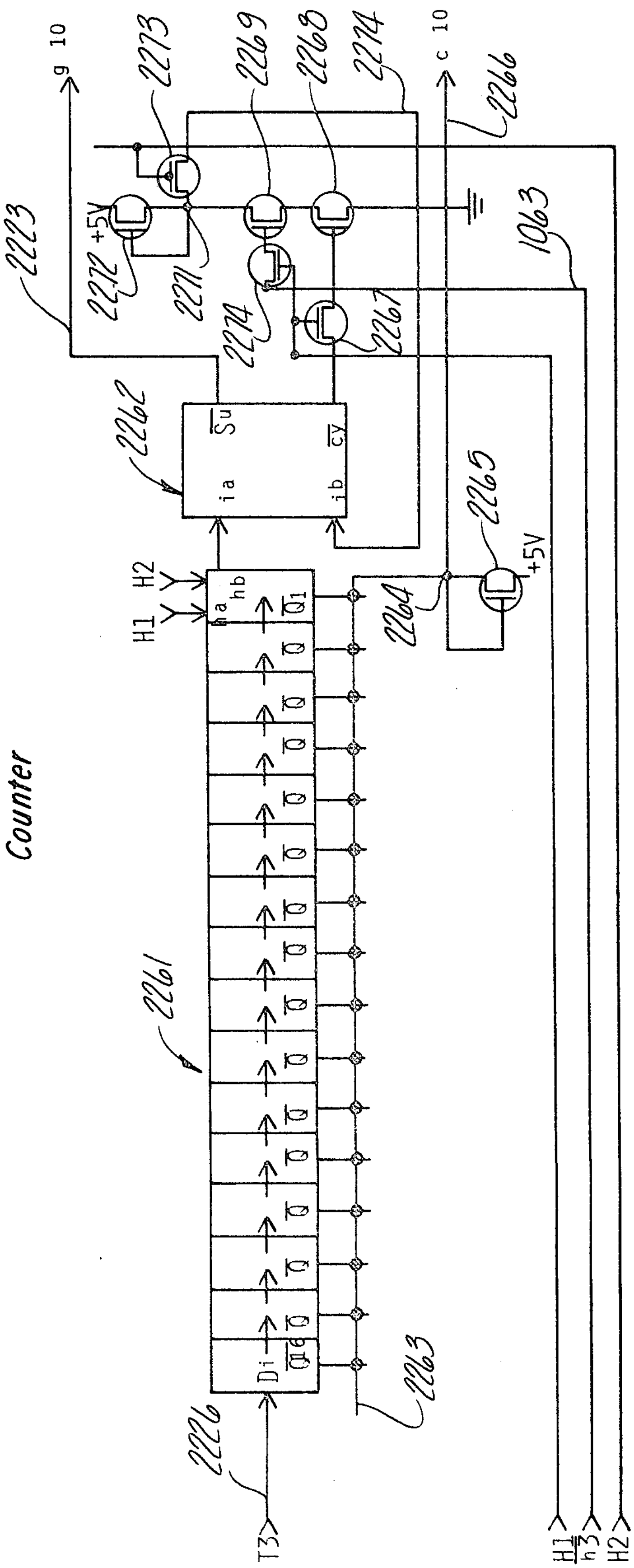
FIG. 6E is an electrical schematic diagram of the ignition delay counter circuitry of block 2115 of FIG. 6.
Figure 6F:
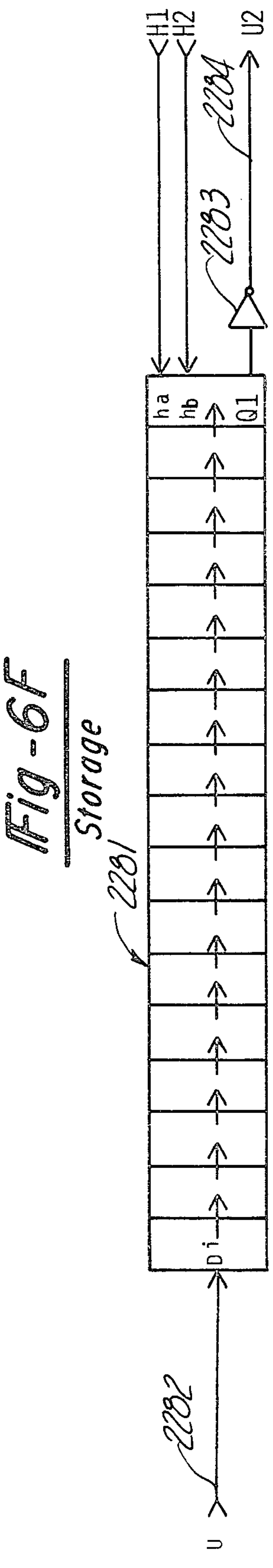
FIG. 6F is an electrical schematic diagram of the ignition pulsewidth storage register of block 2116 of FIG. 6.
Figure 6G:
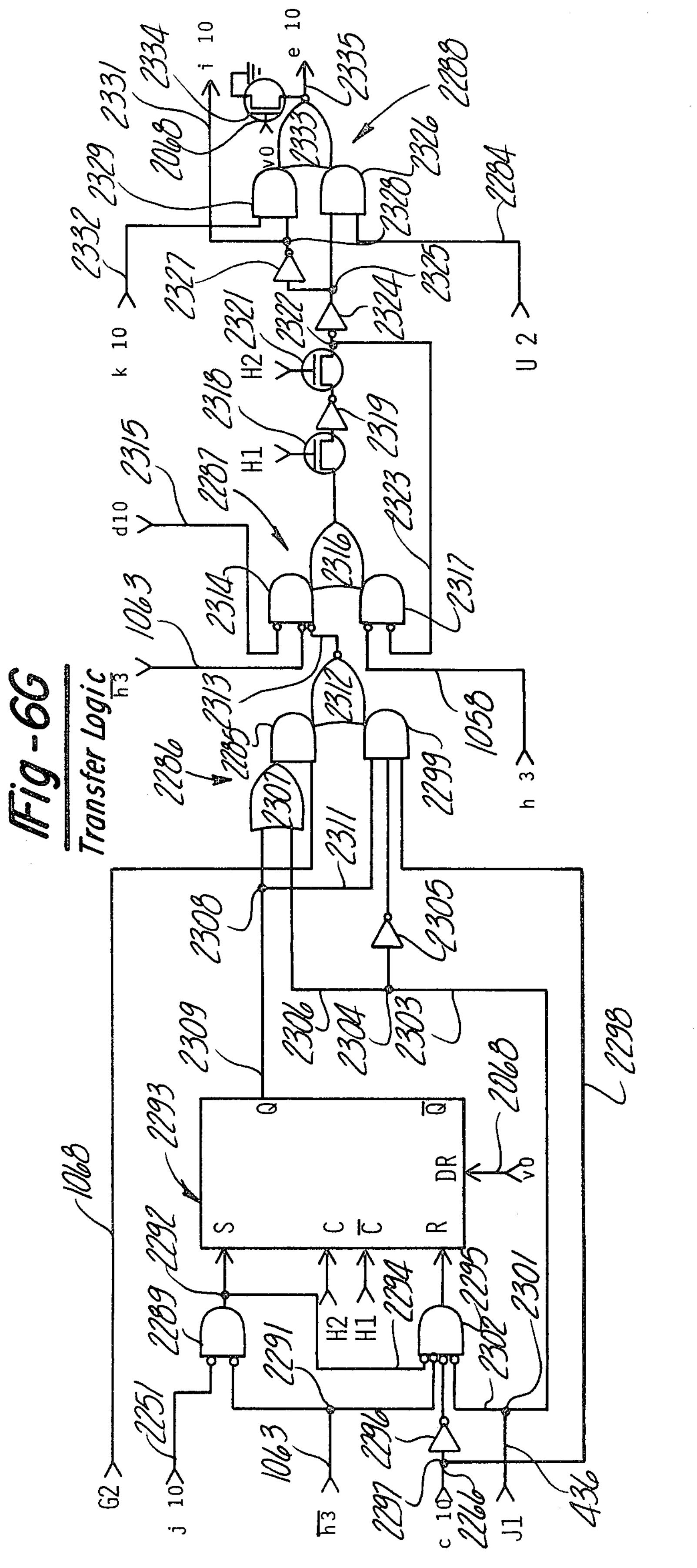
FIG. 6G is an electrical schematic diagram of the transfer logic network of block 2117 of FIG. 6.
Figure 6H:
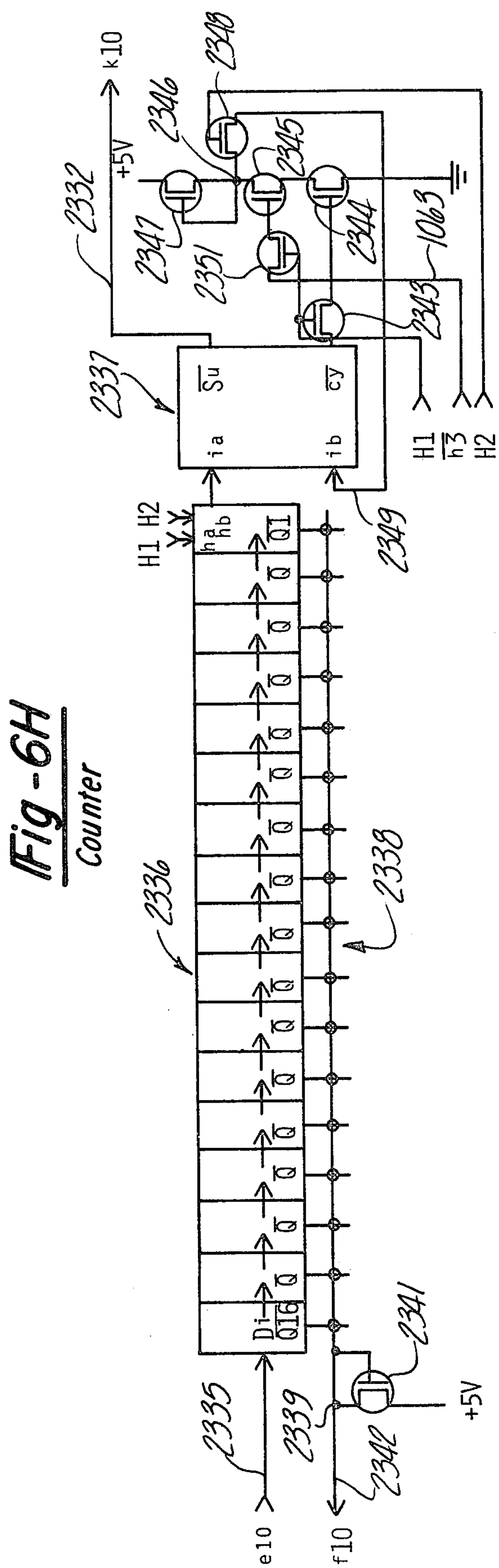
FIG. 6H is an electrical schematic diagram of the ignition pulsewidth counter circuitry of block 2118 of FIG. 6.
Figure 6I:
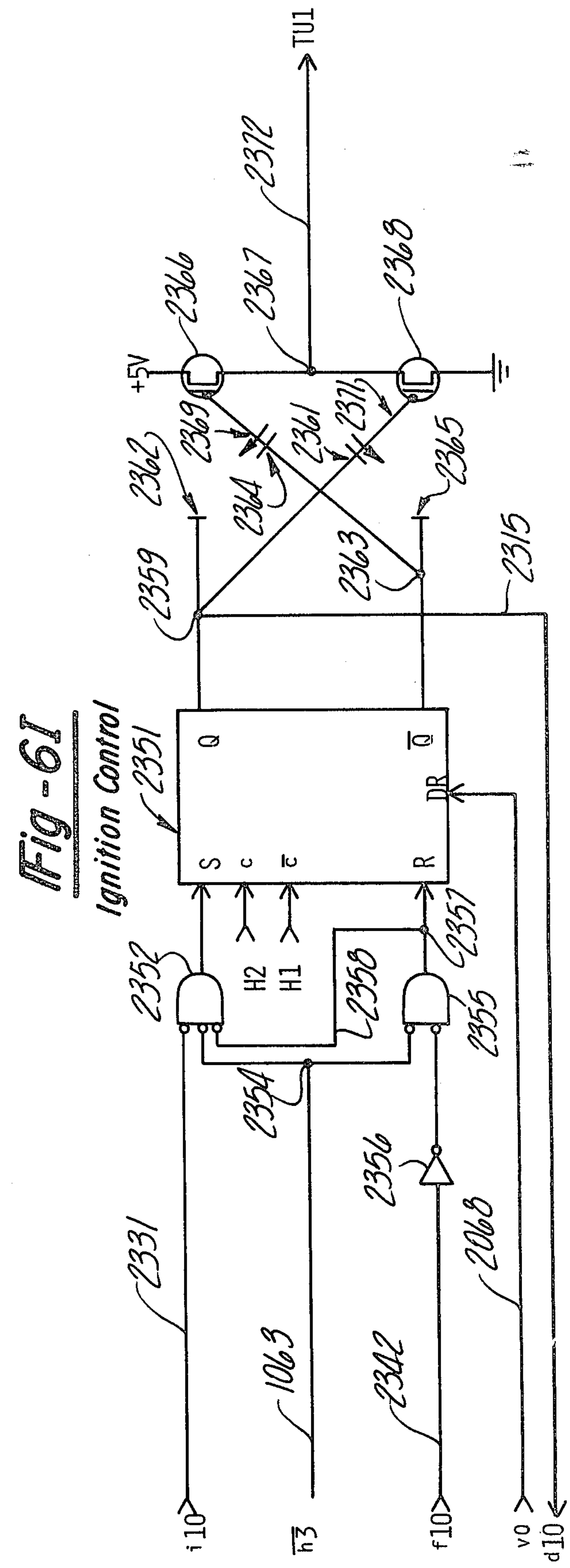
FIG. 6I is an electrical schematic diagram of the ignition control circuit of block 2119 of FIG. 6.
Figure 6J:
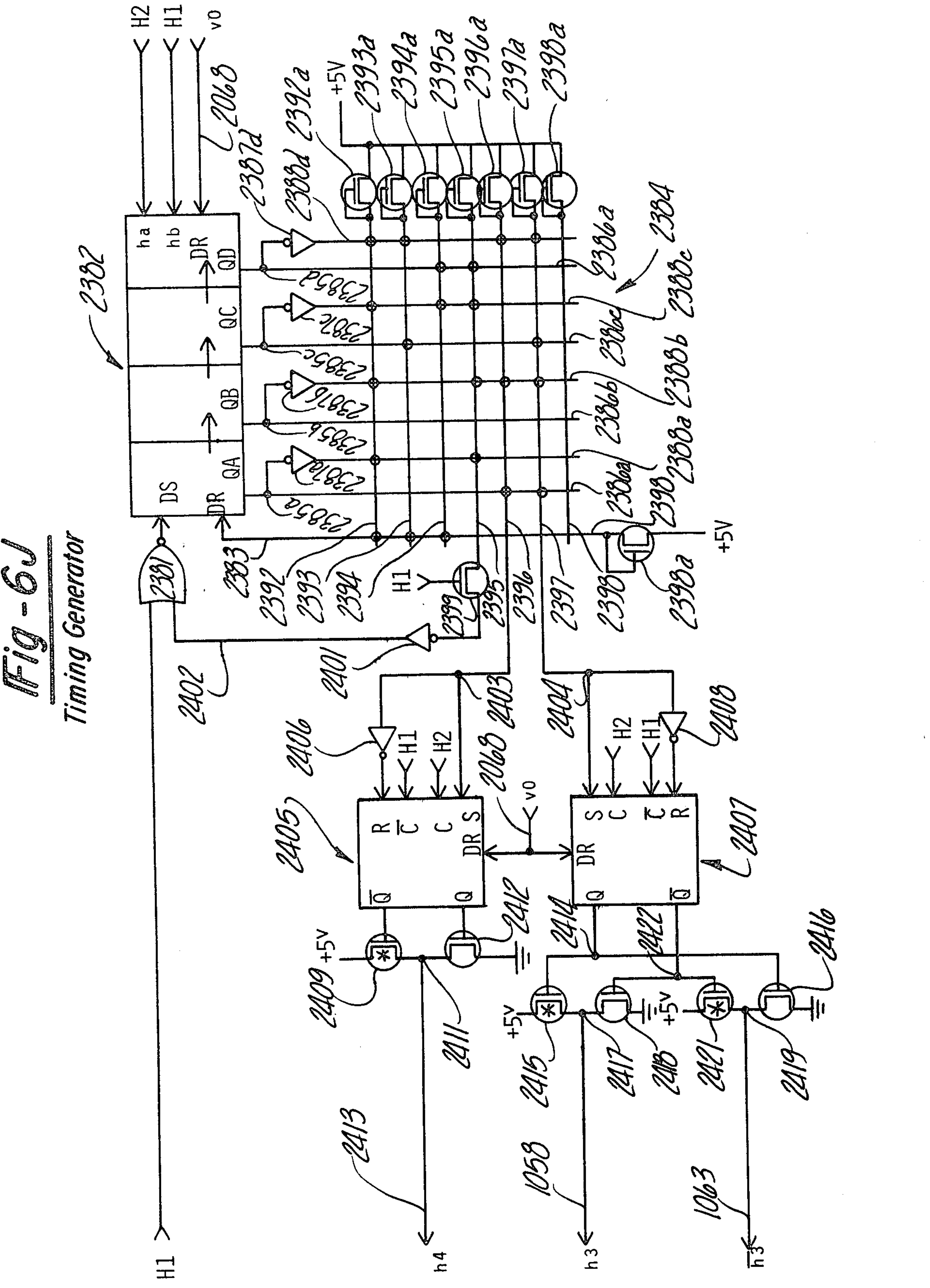
FIG. 6J is an electrical schematic diagram of the ignition timing generator circuitry of block 2120 of FIG. 6.
Figure 6K:
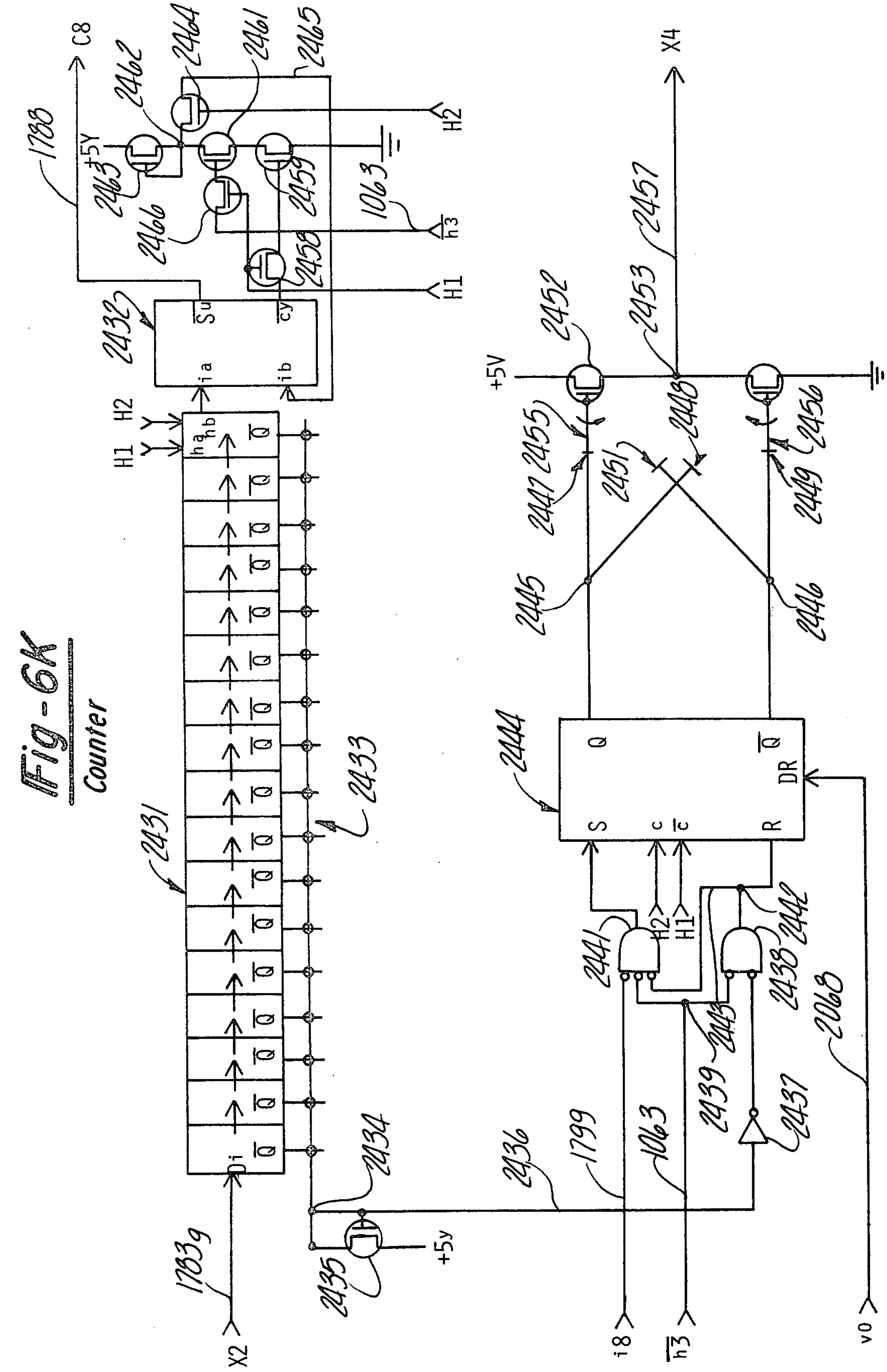
FIG. 6K is an electrical schematic diagram of the proportional EGR counter circuitry and the output circuitry associated therewith a block 2121 of FIG. 6.
Figure 6L:
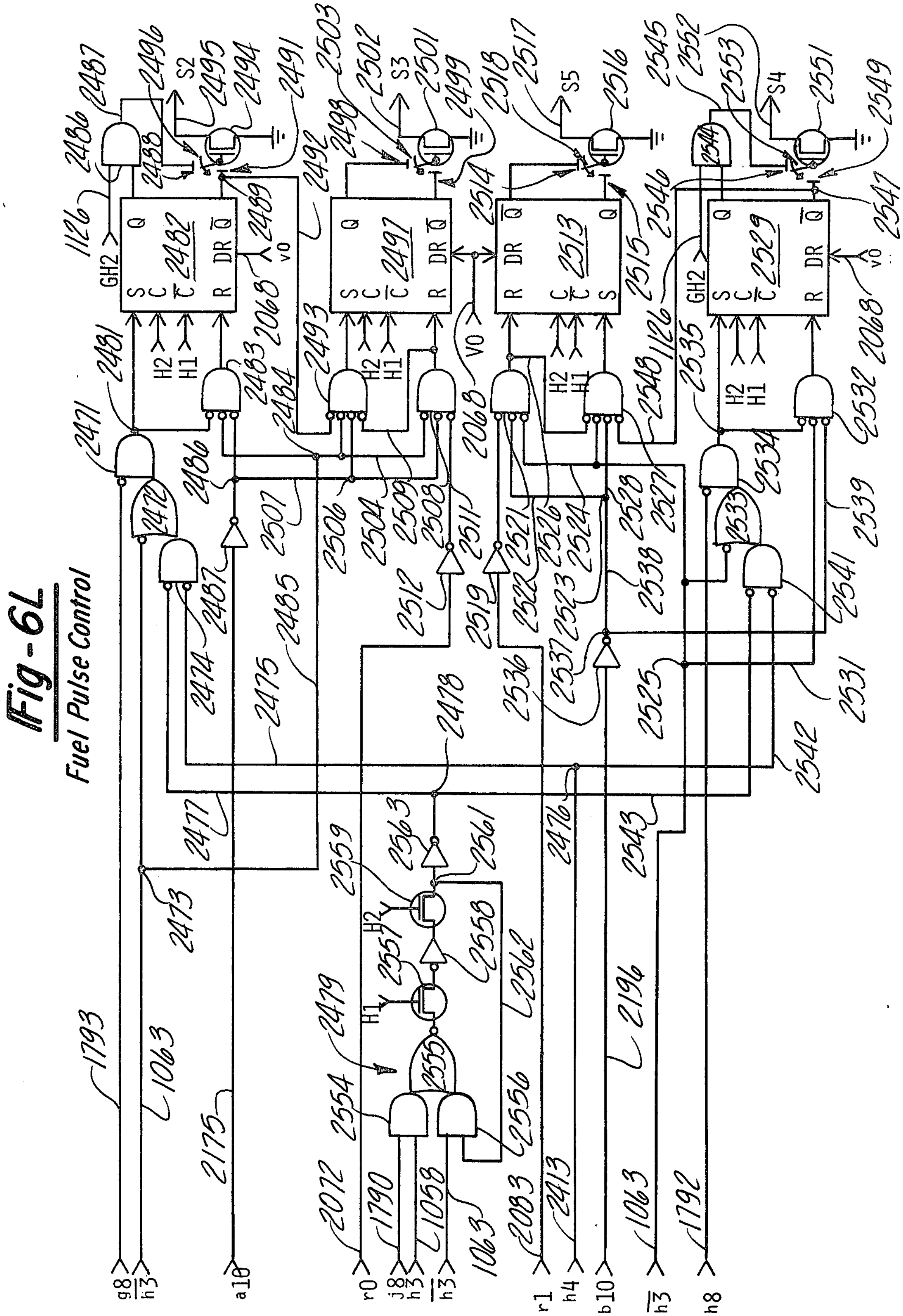
FIG. 6L is an electrical schematic diagram of the fuel pulse control flip-flops and the gating circuitry associated therewith of block 2122 of FIG. 6.

Similarly, control signal $g_8$ which is presented at node 1757 and which is also used to command the transfer of a new serial word from register 1732, 1733, via the fuel pulse control flip-flop network of FIG. 6L and the signal $g_8$ is transmitted thereto via lead 1793. The second input of AND gate 1784b receives the feedback control signal $e_8$ via lead 1798. The control signal $e_8$ is generated by the output of the number two fuel pulse counter circuit of FIG. 6 and represents the output of the number two fuel pulse-width counter decremented by one as hereinafter described.

The output of NAND gate 1774 is also connected via lead 1796 to a node 1794 which outputs the control signal $i_8$ via output lead 1799. The control signal $i_8$ is a command used to transfer a new number coding from the parallel-to-serial register 1732, 1733 of FIG. 5H by controlling the operation of the proportional EGR counter flip-flop of FIG. 6K as hereinafter described.

The parallel-to-serial converter of FIG. 5H also includes circuitry for generating a 16 microsecond shift signal and a reset signal which includes the following elements. A gating network represented by the reference numeral 1801 includes a three input NOR, two input NOR/two input AND gate network as defined in the block diagram of FIG. 9.18A and the schematic diagram of FIG. 9.18B and the operation thereof is conventional. One inverted input of the three inverted input AND gate 1802 is connected to receive the logic clock pulse $h_3$ from the timing generator circuit of FIG. 6J to be hereinafter described via lead 1063 while the clock pulse $h_3$ is connected via lead 1058 to the first inverted input of the two input AND gate 1803. The outputs of AND gates 1802 and 1803 are connected to corresponding inputs of a two input logical OR gate 1804. The output of OR gate 1804 is connected directly to output node 1805.

Node 1805 is connected to one current-carrying electrode of a first transistor 1806 whose opposite current-carrying electrode is connected to the input of an inverter 1807 whose output is, in turn, connected to one current-carrying electrode of a second transistor 1808 whose opposite current-carrying electrode is connected to a node 1809. The gate electrode of the first transistor 1806 is connected to receive the first master clock signals $H_1$ while the gate electrode of the second transistor 1808 is connected to receive the second master clock phase signals $H_2$. Node 1805 is also connected to one current-carrying electrode of a grounding transistor 1811 whose opposite current-carrying electrode is connected to ground and whose gate electrode is connected to receive the reset signal $v_0$ via lead 2068 as previously described. Node 1809 is then connected via lead 1812 to one inverted input of a logical AND gate 1813 having two inverted inputs and via lead 1814 to the second inverted input of the two input AND gate 1803 previously described. The reset signal $\overline{v_0}$ which is outputted from the buffer logic of the reset control system of FIG. 5A via lead 2069 is connected directly to the second inverted input of AND gate 1813. The output of AND gate 1813 is connected directly to nodes 1755 and 1815. Node 1755, as previously described, is connected via lead 1738 to one input of each of the NAND gates 1770 through 1774 and is also connected, via lead 1816, to a second inverted input of the three input AND gate 1802. The last inverted input of the three input AND gate 1802 is connected via lead 1749 to the output of the NOR gate at the output of the address register 1733 as represented by transistors 1748 and 1750 through 1754, respectively.

Node 1815 is also connected via lead 1817 to a first inverted input of a logical AND gate 1818 having two inverted inputs. Node 1815 is also connected directly to one current-carrying electrode of a first transistor 1819 whose opposite current-carrying electrode is connected directly to the input of an inverter 1821. The output of inverter 1821 is connected directly to the first current-carrying electrode of the second transistor 1822 whose opposite current-carrying electrode is connected directly to the input of a second inverter 1823. The output of the second inverter 1823 is connected directly to the first input of a two input NOR gate 1824. As known in the art, the gate electrode of the first transistor 1819 is connected to receive the first master clock phase signal $H_1$ while the gate electrode of the second transistor 1822 is connected to receive the second master clock phase signal $H_2$ for delaying the transmission of the signal at node 1815 to gate 1818 by one complete clock time. The second input of NOR gate 1824 is connected via lead 2068 to receive the reset signal $v_0$ as previously described. The output of NOR gate 1824 is connected directly to the second inverted input of AND gate 1818 and the output of AND gate 1818 is connected via lead 1825 back to the direct reset DR inputs of each of the five flip-flops comprising the address register 1734 for resetting same as known in the art.

Briefly, the operation of the parallel-to-serial converter circuitry of FIG. 5H will now be described. As previously explained, the least significant, eight bit, byte data word from the microprocessor 1391 of FIG. 5B is stored in the parallel-to-serial shift register 1733 while the second or most significant eight bit byte data word from the microprocessor 1391 is stored in the second shift register 1732 to form a two byte data word having sixteen serial bits of data contained therein. When data is entered into the parallel-to-serial register comprising counters 1732 and 1733, the least significant bit is entered into the most significant register cell thereby causing the least significant bit to appear at the $Q_8$ output of register 1733 during the first clock pulse of the sixteen clock pulse or sixteen microsecond data transfer iteration. This technique serves to organize the data from the microprocessor into a serial binary word with the least significant bit presented first in the serial ineration at the output of the dynamic register.

The appropriate address is presented from the microprocessor 1391 of FIG. 5B on the address bus lines and serves to generate the command signals of FIG. 5E as previously described. The command signal $s_0$ commands the most significant byte data word register 1732 to accept the information currently on the data bus $d_{a2}$ through $d_{h2}$ for direct parallel reset into the eight shift register stages thereof. Similarly, the command signal $t_1$ latches the directly preset data into the most significant byte data word register 1732 and enables the second least significant byte data word register 1733 to accept, in parallel, the information on the data bus $d_{a2}$ through $d_{h2}$, as kown in the art.

The buffer address register 1734 accepts the lower five bits $d_{a2}$ through $d_{e2}$ of the data bus upon generation of the command signal $u_0$ and the address register 1734 is utilized to control the transfer of the stored data in the registers 1732 and 1733 to a particular one of the selected registers or counters of the decoder circuit of FIG. 6 via the transmission gate networks 1781 through 1784 associated therewith. When a "1" signal has been transferred to any flip-flop of the address register 1734, the data contents of the registers 1732 and 1733 is shifted synchronously with the serial iteration, as a single serial data word, generally having sixteen bits, into the storage register or counter which is selected by the flip-flop of the address code register 1734 into which the logical "1" or high signal was entered. At the end of the transfer iteration the flip-flops of the buffer address register 1734 are reset to zero. It will be noted that as the data stored in the parallel-to-serial shift registers 1732, 1733 into the addressed storage register or counter of the decoder circuitry of FIG. 6, the serial or DS data shift input of each of the stages of the registers 1732 and 1733 is grounded so that the contents of the registers 1732, 1733 are automatically cleared as the data stored therein is serially transferred to the addressed register or counter for use therein.

The operation of the transfer gating networks 1781 through 1784 will be described in greater detail with respect to the operation of the various storage registers and counters of the decoder circuitry of FIG. 6 when explaining the operation thereof but, for the purposes of explanation, it will be noted that the operation of the gating networks and logic elements set forth in FIG. 5H and the brief description given above will render the detailed operation and function thereof readily discernable to one of ordinary skill in the art.

5.14 Status Input Circuit

The status input circuitry of block 1139 of the microprocessor system of FIG. 5 will now be discussed with reference to the schematic diagram of FIG. 5I. The engine start signal J' is a processed signal output from the relay driver circuit of FIG. 7A, as hereinafter described, which indicates that the ignition switch has been turned on and that the engine is operating in a starting mode or cranking mode as hereinafter described. The signal J' is supplied via 1831 to input node 1832. Node 1832 is connected via lead 1833 to the gate electrode of a first transistor 1834 having one current-carrying electrode connected to an input power supply node 1835 and its opposite current-carrying electrode connected to an output node 1830. Node 1830 is commonly connected to the gate electrode and to a first current-carrying electrode of a second transistor 1836 whose opposite current-carrying electrode is connected directly to a grounding node 1837. The power supply input node 1835 is connected to the +5-volt source of potential and to the first current-carrying electrode of an enhancement mode transistor 1838 whose opposite current-carrying electrode is connected directly to an output node 1840. Node 1840 is commonly connected to (a) the gate electrode of the transistor 1838; (b) to the first current-carrying electrode of a transistor 1839 whose opposite current-carrying electrode is connected to the grounding node 1837 and whose control electrode or gate electrode is connected directly to the output 1830 of the first transistor pair comprising transistors 1834 and 1836 respectively; and (c) node 1840 is connected directly to one current-carrying electrode of a transistor 1841 whose opposite current-carrying electrode is connected to a node 1842.

Simultaneously, the start signal input node 1832 is connected via lead 1843 to the input of a first inverter 1844 whose output is connected directly to the first current-carrying electrode of transistor 1845 whose second current-carrying electrode is connected directly to node 1846. The second clock phase signal $H_2$ is supplied to clock input node 1847 and supplies the second clock phase signal $H_2$ via node 1847 to the gate electrode of transistor 1848 and via lead 1849, supplies the $H_2$ clock signal to the gate electrode of transistors 1841 and 1845 respectively. The F2 sensor temperature state signal which is outputted via lead 299 of the oxygen sensor signal conditioning system of FIG. 3E and which represents the properly conditioned $ZiO_2$ oxygen sensor state wherein a logical "1" state represents a cold sensor and a logical "0" state represents a hot sensor and wheren the control route can only be closed or utilized when the oxygen sensor is hot, as previously described, is inputted via lead 299 to the first current-carrying electrode of transistor 1848 whose opposite current-carrying electrode is connected directly to node 1851. The first master clock phase signal $H_1$ supplies the first master clock phase signals to the status input circuit of FIG. 5I via clock input lead 1852 as hereinafter described.

Node 1846 at the output of transistor 1845 is connected directly to the input of a first inverter 1853 whose output is connected directly to the input of the second inverter 1854 whose output is connected directly to node 1855. Node 1846 is also connected directly to a first current-carrying electrode of a latching transistor 1856 whose opposite current-carrying electrode is connected to node 1855, as conventionally known. Output node 1855 is then connected via lead 1857 to the "R" or reset input of an RS flip-flop 1858 having a set input S, a reset input R, a first clock phase input $\overline{C}$, a second clock phase input C, a non-inverting output Q and an inverting output $\overline{Q}$. In the preferred embodiment of the present invention, the clocked RS flip-flop could be of the type illustrated in the block diagram of FIG. 9.20A and further defined in the electrical schematic diagram of FIG. 9.20B. The first clock phase input C is connected to receive the first master clock phase signals $H_1$ while the second clock phase input C is connected to receive the second master clock phase signals $H_2$, as conventionally known.

Similarly, the input node 1842 is connected directly to the input of a first inverter 1859 whose output is connected directly to node 1861. Node 1861 is connected simultaneously to the input of an inverter 1862 and via lead 1863 to the "S" or set input of RS flip-flop 1858. Also, the output of inverter 1862 is connected back to one current-carrying electrode of a latching transistor 1864 whose opposite current-carrying electrode is connected directly back to iput node 1842, as previously described.

Lastly, input node 1851 is connected to the input of an inverter 1865 whose output is connected directly to a node 1866 and node 1866 is connected both to the input of an inverter 1867 whose output is connected directly to a recirculation node 1868 and via lead 1869 to a first electrical contact 1871. A mask-positionable switching arm 1872 is connected at node 1873 so as to be selectively positionable to complete a current path between node 1873 and node 1871 under normal conditions but which can be selectively positioned, by the previously discussed LSI techniques to complete a current path between node 1873 and contact 1874, to change the polarity of the output signal, if desired. The second contact 1874 is connected directly to the inverter output node 1868 which is also connected back to the first current-carrying electrode of a latching transistor 1875 whose opposite current-carrying electrode is connected back to the input node 1851, as known in the art. The gate electrode of latching transistors 1856, 1864 and 1875 are adapted to receive the first master clock phase signal $H_1$ via lead 1852 as known in the art.

The switch contact output node 1873 supplies the output signal $\overline{f_7}$ via lead 1876 to the gate electrode of a transistor 1877 for controlling the conduction thereof. Simultaneously, the Q output of RS flip-flop 1878 outputs the properly conditioned start signal J1 to the differentiator and level detection circuit of FIG. 4A, as previously described via lead 436. The $\overline{Q}$ output of RS flip-flop 1858 outputs the signal $\overline{J1}$ to the gate electrode of a transistor 1878 having one current-carrying electrode connected to the first current-carrying electrode of an output transistor 1879 and its opposite current-carrying electrode connected via output nodes 1881, 1882 and lead 1883 to a grounding node 1884. The opposite current-carrying electrode of output transistor 1879 inputs or writes the status input data onto the external circuit to microprocessor data bus via the output labeled with the data bus signal designation $d_{c1}$.

Output node 1881 is connected to one current-carrying electrode of a transistor 1885 whose opposite current-carrying electrode outputs the data signal $d_{b1}$ to the data bus as previously described. Similarly, output node 1882 is connected to one current-carrying electrode of a third output transistor 1886 whose opposite current-carrying electrode is used to output a status input on the lead labeled with the data bus designation $d_{a1}$. Lastly, the grounding node 1884 serves as the final data output node which is connected directly to one current-carrying electrode of the transistor 1877 whose opposite current-carrying electrode is connected to the first current-carrying electrode of the fourth and final output transistor 1887 whose opposite current-carrying electrode supplies the appropriate status input data signal onto the input bus to the microprocessor via the lead represented by the data bus signal designated $d_{d1}$, as previously described. The command signal $w_0$ which is generated by the command signal generator circuit of FIG. 5E is supplied via lead 1556 to the gate electrode of each of the status output transistors 1879, 1885, 1886 and 1887, respectively, for controlling the operation thereof. The control signal $w_0$, as previously described, is used to enable the start status data and oxygen sensor condition data to be inputted via the data bus $d_{a1}$ through $d_{h1}$ and the buffer circuit of FIG. 5G to the I/O data bus $d_0$ for supplying the status input word to the microprocessor 1391 of FIG. 5B as previously described.

In operation, the status input circuitry of FIG. 5I operates as follows. When the engine is being started, the initially conditioned start signal J' goes low and this low is transmitted via input lead 1831 to input node 1832. With a low at node 1832, transistor 1834 is rendered non-conductive thereby allowing the depletion mode transistor 1838 to remina in the normally conductive state. With transistor 1838 conductive, node 1840 is high so that with the occurrence of the clock signal $H_2$, transistor 1841 conducts to transmit the high to node 1840 to input node 1842. The signal at input 1842 is inverted by inverter 1859 so that a low appears at node 1861 and this low is transmitted via lead 1863 to the set input of flip-flop 1858. Simultaneously, the low at node 1861 is inverted by inverter 1862 so that with each occurrence of the clock signal $H_1$, feedback or latching transistor 1863 supplies the high signal from the output of inverter 1862 back to node 1842 to maintain the high status in the latched state, as previously described. Therefore, so long as the signal J' is low, the high at node 1840 appears as a high at nodes 1842 and a low at node 1861 since each time the clock phase signal $H_2$ is high, transistor 1841 conducts to trasmit the high from node 1840 to node 1842 thereby causing a low to appear at node 1861 and each time the opposite clock phase signal $H_1$ is high, transistor 1864 conducts to feed the high from the output of inverter 1862 to input 1842 to again cause a low to appear at node 1861 and therefore at the set input of flip-flop 1858.

Simultaneously, the low at node 1832 is supplied via lead 1843 to inverter 1844 so that each time the clock phase $H_2$ goes high, transistor 1845 conducts to pass a high signal to input node 1846. The high at node 1846 is double inverted by the action of inverters 1853 and 1854 so that output node 1855 goes high and since this signal is transmitted via lead 1857 to the reset input of RS flip-flop 1858, after the clock sequence $H_1$, $H_2$, RS flip-flop 1858 is reset so that the Q output and hence the output signal J1 is low, and the Q output and hence the signal $\overline{J1}$ is high. The latch works as previously described so that the high at node 1855 is maintained since each occurrence of the $H_2$ clock phase causes transistor 1845 to conduct to feed the high at the output of inverter 1844 thereto and each time the clock phase $H_1$ is high, transistor 1856 conducts to feedback the high from node 1851 to input node 1846 to repeat the process via the action of the double inverters 1853 and 1854 respectively.

With the RS flip-flop 1858 is in the reset state, the signal $\overline{J1}$ remains high and causes transistor 1878 to conduct so as to pull the data bus output signals $d_{a1}$, $d_{b1}$ and $d_{c1}$ to ground while the data bus signal $d_{d1}$ remains high and this represents, to the microprocessor, the presence of a starting condition.

When the command signal $w_0$ goes high causing transistors 1879, 1885, 1886 and 1887 to conduct, the data signals $d_{a1}$ low, $d_{b1}$ low, $d_{c1}$ and $d_{d1}$ high are fed onto the data bus previously described for input into the microprocessor. Similarly, whenever the ignition switch is turned off so that the engine is not started, the signal J' is high and this operates in the opposite manner to latch the signal at node 1855 low and signal at node 1861 high for setting the RS flip-flop 1858 to cause the signal $\overline{J1}$ to go low. A low $\overline{J1}$ signal renders transistor 1878 non-conductive so that when the command signal $w_0$ is generated to cause the conduction of output transistors 1879, 1885, 1886 and 1887, the inputs to the data bus remain normally high in the absence of some other data signal, status input or interrupt thereon.

Similarly, whenever the oxygen sensor temperature state signal F2 goes low indicating that the sensor is too hot to be used, as previously described, the low will be conducted to input node 1851 when the clock signal $H_2$ goes high to cause the conduction of transistor 1848. The low at node 1851 is latched as a high at node 1866 via inverters 1865 and 1867 and the action of latching transistor 1875, as previously described, so that the output signal $\overline{f_7}$ which is fed to the gate electrode of output transistor 1877 is high. When $\overline{f_7}$ is high, transistor 1877 conducts so that when the command signal $w_0$ goes high to input the status onto the data bus line, the data signal $d_{d1}$ will be pulled low to ground via conducting transistor 1877 while the reamining data signals are maintained in their normally high state for indicating the presence of a hot sensor. On the other hand, when the signal F2 is high indicating a cold sensor and that the control loop cannot be used, the high is transmitted to node 1851 via the conducting transistor 1848 when the clock signal $H_2$ goes high so that a low is latched at node 1861, as previously described, to cause transistor 1877 to remain non-conductive. With transistor 1877 non-conductive, the generation of the command signal $w_0$ will cause the data input signal $d_{d1}$ to be maintained normally high for indicating same to the microprocessor.

5.15 Camshaft or Distributor Sensor-Conditioning Circuit

Figure 5J:
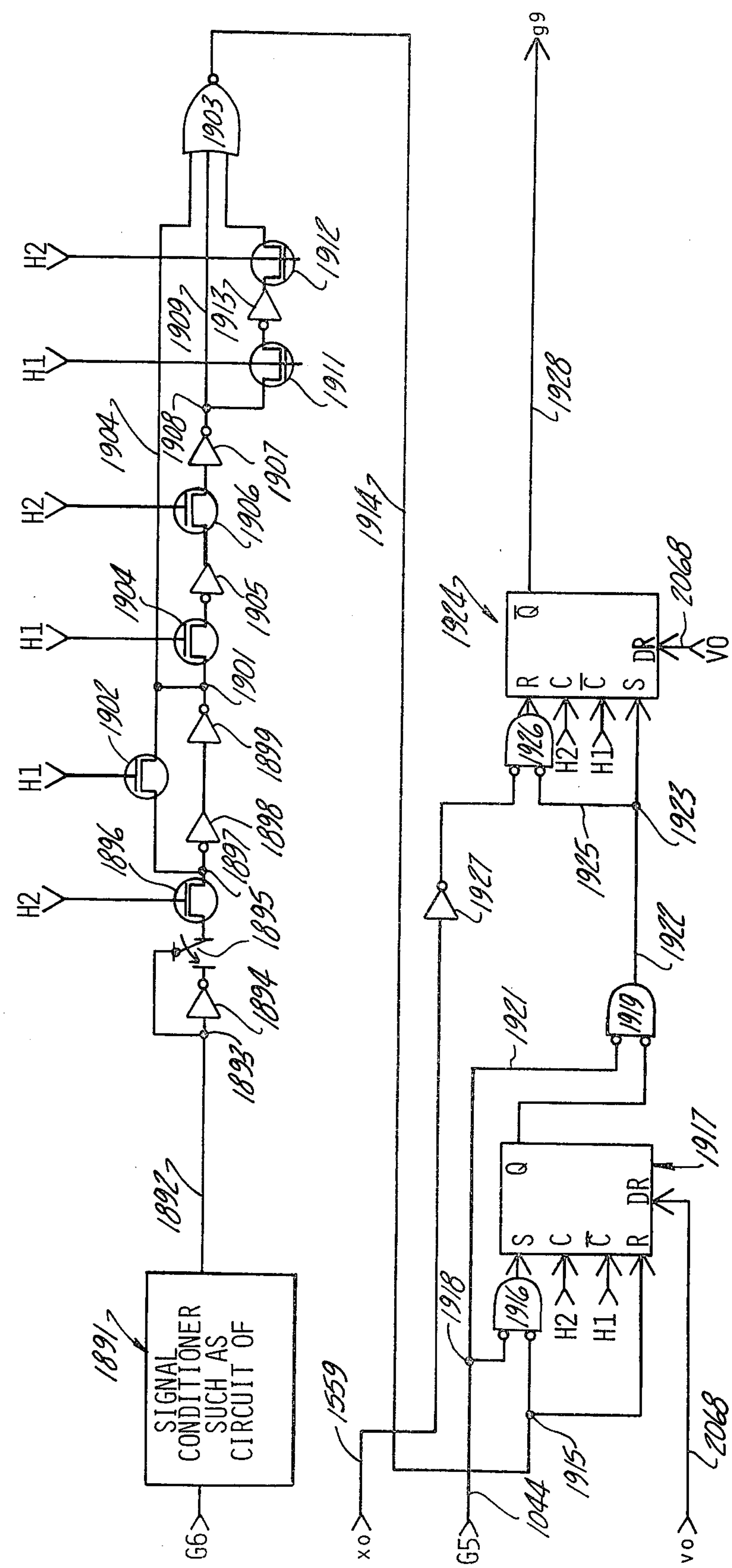
FIG. 5J is an electrical schematic diagram of the camshaft sensor conditioning circuitry assiociated with block 1140 of FIG. 5.

The camshaft sensor-conditioning circuit of block 1140 of the microprocessor system of FIG. 5 will now be described with reference to the electrical schematic diagram of FIG. 5J. The purpose of the camshaft signal-conditioning circuit of FIG. 5J is to incorporate or generate a second, highly accurate engine position pulse which is taken from a signal associated with the camshaft or distributor of the vehicle and a properly conditioned representative thereof is syncronized with the engine position pulses $G_5$ outputted from the circuit of FIG. 4F, as previously described, to output a highly accurate index pulse $g_9$. The second engine position pulse or index pulse $g_9$ which can be generated, if desired, once every second engine revolution and transmitted to the computer to facilitate two group fuel injection as known in the art. In the preferred embodiment of the present invention, the highly accurate index signal $g_9$ is used as a camshaft position signal computer flag which would assume a logical "1" or high state to indicate that the current G1 signal generated by the circuit of FIG. 4F, as previously described, is occurring once per revolution as a particular position, e.g., such as at top dead center of the cycle 1 current. The camshaft sensor-conditioning circuit of FIG. 5J will now be briefly described.

The analog signal from the camshaft position sensor of block 133 of FIG. 2 is designated by the reference numeral $G_6$ and is supplied to the input of a camshaft postion signal conditioner circuit, representated by the block 1891. The signal conditioner circuitry of block 1891 is, for all practical purposes, identical to the crankshaft position signal conditioner circuitry of FIG. 4E previously described and will now be described in further detail. The output of the signal conditioning circuit of block 1891 supplies a properly conditioned and shaped pulse output signal indicative of the input signal $G_6$ to an input node 1893. Node 1893 is connected to the input of an inverter 1894 as output is connected directly to a first switch contact point. Node 1893 is also connected directly to a second switch contact point. A mask-positionable switch arm 1895 may be positioned between the first and second switch contact points by conventional LSI techniques, as known in the art, and in the preferred embodiment of the present invention, the switch arm 1895 is positioned to contact the second switch contact point so as to establish a contact back between input lead 1892, node 1893, and switch arm 1895 which has its pivotal point or opposite end connected directly to the first current-carrying electrode of a transistor 1896. The opposite current-carrying electrode of a transistor 1896 is connected directly to a node 1897. Node 1897 is connected directly to the input of a first inverter 1898 whose output is connected directly to the input of a second series inverter 1899 whose output is connected directly to an inverter output node 1901.

Node 1897 is also connected to the first current-carrying electrode of a transistor 1902 whose opposite current-carrying electrode is connected to the inverter output node 1901. Node 1901 is connected directly to the first input of a three input NOR gate 1903 via lead 1904. Simultaneously, node 1901 is connected to a first current-carrying electrode of a transistor 1904 whose opposite current-carrying electrode is connected directly to the input of an inverter 1905. The output of inverter 1905 is connected directly to the first current-carrying electrode of a transistor 1906 whose opposite current-carrying electrode is connected directly to the input of an inverter 1907. The output of inverter 1907 is connected directly to an inverter output node 1908. The inverter output node 1908 is connected via lead 1909 to the second input of NOR gate 1903 and simultaneously to the first current-carrying electrode of a transistor 1911 whose second current-carrying electrode is connected to the input of an inverter 1913 whose output is connected to the first current-carrying electrode of another transistor 1912. The opposite current-carrying electrode of transistor 1912 is connected to the third and final input of the three input NOR gate 1903.

The first master clock phase H1 is supplied to the gate electrode of transistors 1902, 1904, and 1911 while the second master clock phase H2 is connected directly to the gate electrode of trnsistors 1896, 1906 and 1912. The output of the three input NOR gate 1903 is connected via lead 1914 to a node 1915. Node 1915 is connected directly to one inverted input of a logical AND gate 916 having two inverted inputs and, simultaneously, is connected directly to the reset input of a clocked RS flip-flop 1917. In the preferred embodiment of the present invention, the RS flip-flop 1917 may be, for example, an LSI implemented flip-flop such as illustrated in the block diagram of FIG. 9.20A and as further described in the electrical schematic diagram of FIG. 9.20B and includes a set input "S", a first clock phase input C, a second clock phase input $\overline{C}$, a reset input "R", a direct reset input DR and a non-inverted output Q.

The reset signal $v_0$ generated by the reset control system of FIG. 5A2 is supplied via lead 2068 to the direct reset input of the flip-flop 1917 for reset purposes. The $G_5$ engine position pulse signal generated by the crankshaft position pulse processor of FIG. 4F is transmitted via output lead 1044 to an input node 1918. Node 1918 is connected directly to the second inverted input of the logical AND gate 1916 whose output is connected directly to the set input of the RS flip-flop 1917. The first clock phase input $\overline{C}$ is supplied with the first phase master clock pulses H1 while the second clock phase input C is supplied with a second master clock phase signal H2. The non-inverting Q output of flip-flop 1917 is connected directly to one inverted input of a logical AND gate 1919 having two inverted inputs. The other inverted input of AND gate 1919 is connected via lead 1921 to the $G_5$ input node 1918 for receiving the signal therefrom. The output of AND gate 1919 is connected via lead 1922 to a node 1923. Node 1923 is connected directly to the set input of a clock RS flip-flop 1924 similar to RS flip-flop 1917 but having an inverting output $\overline{Q}$.

The reset signal $v_0$ is similarly supplied via lead 2068 to the direct reset input of flip-flop 1924 for directly resetting the flip-flop, when required. Node 1923 is also connected via lead 1925 to one inverted input of a logical AND gate 1926 whose output is connected to the reset input of the flip-flop 1924 for resetting same. The command signal $x_0$ which is generated by the command signal circuitry of FIG. 5E and which is outputted via lead 1559 therefrom, is supplied to the input of an inverter 1927 whose output is connected directly to the second inverted input of AND gate 1926. As previously described, the command signal $x_0$ is used to command the interrupt status word to be connected to the microprocessor data bus as previously described. The $\overline{Q}$ output of the engine index flag flip-flop 1924 outputs the command signal $g_9$ via lead 1928 to the interrupt control circuit of FIG. 5K to be hereinafter described. The interrupt engine index flag signal $g_9$ acts as a camshaft position signal computer flag to indicate a particular specific point in a revolution or revolution sequence to enable the computer to precisely and accurately time various control functions.

The operation of the camshaft sensor-conditioning circuit of FIG. 5J will now be briefly described. As indicated above, the structure and operation of the signal-conditioning circuitry of block 1891 is substantially identical to that described with reference to FIG. 4E and the operation of the circuitry between input lead 1892 and the output lead 1914 from the output of the three-input NOR gate 1903 is identical to that described with respect to the crankshaft position pulse processor of FIG. 4F so that the input circuitry between node 1893 and the output of NOR gate 1903 serves as a noise-suppressor filter to prevent the circuit from responding to short-term negative-going voltage spikes and the like.

Assume that a properly conditioned negative-going engine camshaft position pulse is outputted from the circuit of block 1891 via lead 1892 and is properly detected by the input circuitry network, then, after the third H2 clock phase count, all three inputs of NOR gate 1903 will be low, causing its output on lead 1914 to go high for one clock time.

The one clock-pulse duration high signal from lead 1914 is provided to node 1915 causing the output of AND gate 1916 to go high to set flip-flop 1917. With the Q output of flip-flop 1917 high, the output of AND gate 1919 goes high to set the engine index flag flip-flop 1924 causing a negative-going pulse $g_9$ to appear on lead 1928 at the $\overline{Q}$ output thereof. Since AND gate 1919 gates the output of flip-flop 1917 with the G5 engine position pulse in signal, they are syncronized with each other. At the end of the one clock time duration, the signal at the output of NOR gate 1903 again goes high causing the output of AND gate 1916 to go low and a high to appear at the reset input of flip-flop 1917 via lead 1914 and input node 1915. With the flip-flop 1917 reset, the Q output goes high causing the output of AND gate 1919 to go low so as to enable one input of AND gate 1926. As soon as the command signal $x_0$ goes high to command that the interrupt status word be connected to the microcomputer data bus, as hereinafter described, the output of inverter 1927 goes low causing a low to be present at both inputs of AND gate 1926. After one full clock period $H_1$, $H_2$, the engine index flag flip-flop 1924 will be reset by the high at the output of AND gate 1926 causing the $\overline{Q}$ output to again go high causing the signal lead 1928, the camshaft position signal computer flag $g_9$ will be returned to its normally high state. Therefore, the output signal $g_9$ on lead 1928 is normally high but, whenever the camshaft sensor-conditioning circuitry of FIG. 5J detects a properly conditioned and shaped "true" engine camshaft position pulse from the sensor block 133 of FIG. 2, the engine index flag flip-flop 1924 is set causing a flag signal $g_9$ to go low and remain low until one clock time after the flip-flop 1924 is reset which occurs one clock time after the generation of the command signal $x_0$ has caused the engine index flag $g_9$ to be written into the data bus as explained hereinafter.

5.16 Interrupt Control Logic

The interrupt control logic circuitry of block 1141 of the microprocessor system block diagram of FIG. 5 will now be described with reference to the electrical schematic diagram of FIG. 5K. The purpose of the interrupt control circuit is to control the inter-connection of either an interrupt status word or status flag into the microcomputer data bus until it is cleared after being read by the microprocessor.

The logic clock pulse $h_3$ generated by the timing generators of FIG. 6J, as hereinafter described, is a logic clock pulse occurring once each 16 master clock pulses $H_1$, $H_2$ which is used to synchronize all serial operations in the I/O circuits. The $h_3$ clock signal is supplied to the clock input node 1931 of the circuit of FIG. 5K via lead 1058. The clock input node 1931 is supplied via lead 1932 to one input of a three input AND, two input AND/two input NOR heating network represented by 1933 as is further illustrated in the block diagram of FIG. 9.11A and the schematic of FIG. 9.11B. Lead 1932 serves as a first input of the three input AND gate 1934. The network 1933 includes a second two input AND gate 1935 and the output of AND gates 1934/1935 serve as the two inputs of a two input NOR gate 1936.

An acceleration enrichment request signal, such as A2 which is an A.E. request derived from MAP or D2 which is an A.E. request derived from throttle angle, can be supplied from the output of the differentiator and level detector circuitry of FIG. 4A, as previously described, and supplied via lead 1937 to input node 1938. Node 1938 is supplied directly to a first switch contact and simultaneously to the input of an inverter 1939 whose output is connected directly to a second switch contact. A mask-programmable switching arm 1941 has its pivotal hand connected directly to a first input of a two input AND gate 1942 and via lead 1943 to the second input of the three input AND gate 1934. As previously described, the switching arm 1941 may be selectively positionable between the first and second contacts for varying the polarity of the input signal, if desired, by conventional LSI techniques and in the preferred embodiment of the present invention, switching arm 1941 is positioned on the first contact so as to complete a current path for the acceleration enrichment request signal A2 or D2 via lead 1937, node 1938, the first switch contact, and switch arm 1941 directly to one input of the AND gate 1942 and via lead 1943 to the second input of AND gate 1934.

AND gate 1942 is part of a dual two input AND two input NOR gate combination represented by the reference numeral 1944 which further includes a second two input logical AND gate 1945 and a two input NOR gate 1946. The outputs of AND gates 1942 and 1945 serve as the two inputs to NOR gate 1946 and the block diagram and electrical schematic diagram of the implementation of the network 1944 may be further understood by referring to the block diagram of FIG. 9.12A and the schematic diagram of 9.12B, if desired.

As mentioned above, one input of AND gate 1942 is adapted to receive the acceleration enrichment request signal A2 or D2 via switch arm 1941 and its second input is connected directly to the clock input node 1931 for receiving the clock pulse $h_3$ via lead 1058. One input of the second AND gate 1945 is connected directly to a node 1947 and node 1947 is connected via lead 1948 to a second clock input node 1949. Clock input node 1949 is adapted to receive the clock signal $\overline{h_3}$ from the timing generator circuit of FIG. 6J via lead 1063. The output of NOR gate 1946 is connected directly to one current-carrying electrode of a transistor 1951 whose opposite current-carrying transistor is connected directly to the input of an inverter 1952 whose output is connected directly to node 1953. Node 1953 is connected back via feedback path 1954 to serve as the second input of AND gate 1945 and is simultaneously connected to a first current-carrying electrode of another transistor 1955 whose opposite current-carrying electrode is connected directly to the third and final input of the three-input AND gate 1934 of gating network 1933. The gate electrode of the trasistor 1951 is connected to receive the first master clock phase signal $H_1$ while the gate electrode of the second transistor 1955 is connected to receive the second master clock phase signal $H_2$.

Node 1947 which receives the clock signal $\overline{h_3}$ from clock input node 1949 via lead 1948, in addition to being connected directly to one input of AND gate 1945, is also connected via lead 1956 to the first input of the two input AND gate 1935 of the gating network 1933. The output of NOR gate 1936 is connected directly to the first current-carrying electrode of a transistor 1957 whose opposite current-carrying electrode is connected to the input of an inverter 1958. The output of inverter 1958 is connected directly to a node 1959. Node 1959 is connected via lead 1961 to an output node 1962 and then, via feedback path 1963, it is connected back as the second and final input of the two input AND gate 1935 of the gating network 1933. Output node 1962 is connected directly to the input of an inverter 1964 and outputs an acceleration enrichment request signal which is synchronized to the data clock via lead 1965 for use as hereinafter described.

Additionally, the node 1959 is connected directly to one current-carrying electrode of a transistor 1966 whose second current-carrying electrode is connected directly to the input of an inverter 1967 whose output is connected to a node 1968. Node 1968 is connected to one inverted input of a logical AND gate 1969 having two inverted inputs and simultaneously, to one current-carrying electrode of the transistor 1971 whose opposite current-carrying electrode is connected to the input of an inverter 1972. The output of inverter 1972 is connected to one current-carrying electrode of a second series transistor 1973 whose opposite current-carrying electrode is connected to the second inverted input of AND gate 1969. The gate electrode of transistors 1957 and 1971 are connected to receive the first master clock phase signals H1 while the gate electrode of transistors of 1966 and 1973 are connected to receive a second master clock phase signals H2.

The output of the two inverted input logical AND gate 1969 is connected directly to a set node 1974 which is connected directly to the set input of a clocked RS flip-flop 1975. The clocked RS flip-flop 1975 may be, for example, a type illustrated in the block diagram of FIG. 9.21A and further illustrated in the electrical schematic diagram of FIG. 9.21B. Preferably, the RS flip-flop 1975 has a first clock phase input C, a second clock phase input $\overline{C}$, a set input S, a reset input R, a direct reset input $\overline{DR}$, a non-inverting output Q and an inverting output $\overline{Q}$.

In the preferred embodiment, the first clock phase input $\overline{C}$ of the acceleration enrichment request flip-flop 1975 is connected to receive the first master clock phase signal $H_1$ while the second clock input C is connected to receive the second master clock phase signal $H_2$. The direct reset input is connected to receive the reset signal $v_0$ from the reset control system of FIG. 5A via lead 2068. As previously described, the set input is connected directly to the set input node 1974 at the output of AND gate 1969 and node 1974 is also connected back as one input of a second logical AND gate 1976 having two inverted inputs. The output of AND gate 1976 is connected directly to the reset input of the acceleration enrichment of flip-flop 1975. The non-inverting output Q of the acceleration enrichment flip-flop 1975 has adapted to output the acceleration enrichment flag signal A, E, F via lead 1977 for use elsewhere in I/O circuitry and the $\overline{Q}$ output is connected directly to node 1978. Output node 1978 is connected to output the acceleration enrichment flag signal $\overline{AEF}$ on lead 1979 for use as hereinafter described.

Furthermore, output node 1978 is connected to the input of an inverter 1981 whose output is connected directly to the first input of a four-input logival NOR gate 1982. The signal G1 which is used to generate a computer in or out and which represents a G3 engine position pulse event synchronized and stored until erased by a software generated computer command is outputted via lead 1055 from the crankshaft position pulse processor circuit of FIG. 4F as previously described. The signal G1 is supplied via lead 1055 to input node 1983. Node 1983 is connected directly to the input of an inverter 1984 whose output is connected directly to the second input of the NOR gate 1982. Node 1983 is also connected to an output lead 1985 for writing the engine position pulse interrupt signal onto the data bus as hereinafter described. The third input to NOR gate 1982 is connected via lead 1986 to the non-inverting output Q of a first fuel injection complete RS clocked flip-flop 1987 while the fourth and final input of NOR gate 1982 is connected via lead 1988 to the non-inverting Q output of a second fuel injection complete clock flip-flop 1989 as hereinafter described.

The output of NOR gate 1982 is connected directly to anode 1991. Node 1991 is connected directly to the gate electrode of a first transistor 1992 having one current-carrying electrode connected directly to a +5 volt source of potential and its opposite current-carrying electrode connected to an output node 1993. Simultaneously the output of NOR gate 1982 from node 1991 is also connected to an input of an inverter 1994 whose output is connected directly to the gate electrode of a second transistor 1995 having its first current-carrying electrode connected to the output node 1993 and its second current-carrying electrode connected directly to ground. The output node 1993 is used to output the computer interrupt commenad $W_1$ signal to the $\overline{IRQ}$ or interrupt request input of the NC6800 microprocessor 1391 of FIG. 5B via interrupt request lead 1395, as previously described.

As previsouly indicated, the microprocessor 1391 of FIg. 5B is a MC 6800 which is entirely interrupt-driven. Whenever the interrupt command $W_1$ arrives at the microprocessor 1391, the processor will wait until it-completes the current instruction that is being executed before it recognizes the request and begins the interrupt sequence as known in the art.

Lead 1996 supplies the clock signal $\overline{h_3}$ from node 1949 to one inverted input of a logical AND gate 1997 having three inverted inputs and to one input of a logical AND gate 1998 having three inverted inputs. The second inverted input of AND gate 1997 is adapted to receive the signal S3 from the fuel post control circuitry of FIG. 6L, as hereinafter described, via lead 2071. The signal $\overline{S3}$ is a logical signal indicating that the system is not currently operating in the last 96 microseconds of fuel pulse 1 as hereinafter described. The third and final inverted input of AND gate 1997 is connected via lead 2072 to receive the signal $r_o$ which is a NOR gate decoded output from the second and third bit positions of the fuel pulse 1 counter of FIG. 6B as hereinafter described.

The RS clocked flip-flop 1987 and 1988 are used to indicate the completion of the group 1 and group 2 fuel injections, as hereinafter described. In the preferred embodiment of the present invention, the clocked RS flip-flops 1987 and 1989 may be of the type illustrated in the block diagram of FIG. 9.21A and described in the schematic diagram of FIG. 9.21B wherein, each of the RS flip-flops has a first clock phase input $\overline{C}$, a second clock phase input C, a set input S, a reset input R, a direct reset DR, a non-inverting output Q and an inverting output $\overline{Q}$, as conventionally known. The first clock phase input of both of the flip-flops 1987 and 1989 is connected to receive the first master clock phase signal $H_1$ while the second clock phase input C is connected to receive the second master clock phase signals H2. The direct reset input of both of the flip-flops 1987 and 1989 is connected to receive the reset signal $v_o$ from the reset control system of FIG. 5A via lead 2068, as previously described.

As indicated above, the output of AND gate 1997 is connected directly to the set input of the first fuel-injection complete flip-flop 1987 and is fed back to one inverted input of a second logical AND gate 2073 having two inverted inputs. The output of AND gate 2073 is connected directly to the reset input of the first fuel pulse complete flip-flop 1987. The second inverted input of AND gate 2073 is connected directly to a node 2074 and node 2074 is connected to a first inverted input of the second two-input logical AND gate 2075 whose output is connected directly to the reset input of the second fuel pulse complete flip-flop 1989. Node 2074 is connected via lead 2076 to a node 2077. Node 2077 is also connected via lead 2078 to the second inverted input of the two input AND gate 1976 whose output connects to the reset input of the acceleration enrichment flag flip-flop 1975, as previously described. Node 2077 is connected directly to the output of an inverter 2079 whose input is connected directly to node 2071. Node 2081 receives the command signal $x_o$ from the command signal generator circuitry of FIG. 5E via lead 1559. The command signal $x_o$, as previously described, commands that the interrupt status word be connected to the data bus $d_o$ of the microprocessor via the buffer circuitry of FIG. 5G.

The second inverted input of the three-input AND gate 1988 is connected to receive the signal $\overline{S5}$ from the fuel pulse control circuit of FIG. 6L, as hereinafter described, via lead 2082. The signal $\overline{S5}$ indicates that the system is not currently operating in the last 96 microseconds of the second fuel pulse, as hereinafter described. The third and last inverted AND gate 1998 is connected to receive the signal $r_1$ via lead 2083 from the second and third NOR gate decoded outputs of the second fuel pulse counter of FIG. 6B, as hereinafter described. The output of the three-input AND gate 1998 is connected both to the set input of the second fuel pulse complete flip-flop 1989 and is fed back to the second inverted input of the two-input AND gate 2075 whose output is connected to the reset input of flip-flop 1989.

As indicated above, the non-inverting Q output of the first and second fuel pulse complete flip-flops 1987 and 1989, respectively, are connected back as the third and fourth inputs of NOR gate 1982 via lead 1986 and 1988, respectively. Simultaneously, the inverting output $\overline{Q}$ of the first fuel pulse complete flip-flop 1987 is outputted via lead 2084 while the inverted output $\overline{Q}$ of the second fuel pulse complete flip-flop 1989 is outputted via lead 2085 for use, as hereinafter described, and writing the appropriate status or interrupt word onto the data bus system. Similarly, the camshaft position computer flag signal $g_9$ is fed into the interrupt control circuit of FIG. 5K via lead 1928 from the output of the camshaft sensor conditioning circuit of FIG. 5J, previously described, to enable it to the written into the data bus. Lastly, the signal $l_2$ which is generated by the counter control logic of the pulse-width to binary converter circuitry of FIG. 4C1 is inputted to the interrupt control circuitry of FIG. 5K via lead 532 so that its status information may be entered onto the data bus as hereinafter described. The signal $l_2$ represents a flag signal to the microprocessor 1391 of FIG. 5B indicating that an analog-to-digital conversion is currently in progress, as previously described.

The circuitry for entering the interrupt word or status information onto the data bus will now be briefly described. As indicated before, with respect to the buffer circuty of FIG. 5G, data is entered into the microprocessor data bus $d_o$ in ink bit words defined by the inked external circuit to micro processor data bit bus signals $d_{a1}$ to $d_{h1}$, respectively. The first data bit position receives the data bus signal $d_{a1}$ from a first series path established between the $d_{a1}$ output and ground via a first current-carrying electrode of a transistor 2086 whose opposite current-carrying electrode is connected in series with the first current-carrying electrode of a status input transistor 2087 whose opposite current-carrying electrode is connected to ground. The second data bit position receives the data bus signal $d_{b1}$ via the similarly designated output which is connected in series with the first current-carrying electrode of a transistor 2088 whose opposite current-carrying electrode is connected directly to the first current-carrying electrode of a status input transistor 2089 whose opposite current-carrying electrode is similarly connected to ground.

Likewise, the third data bit position receives the data bus signal $d_{c1}$ via the similarly designated output which is connected in series with the first current-carrying electrode of a transistor 2091 whose opposite current-carrying electrode is connected to the fist current-carrying electrode of a status input transistor 2092 whose opposite current-carrying electrode is connected to ground. A fourth data bit position receives the data bus signal $d_{d1}$ from the similarly designated output which is connected in series with the first current-carrying electrode of a transistor 2093 whose opposite current-carrying electrode is connected to the first current-carrying electrode of a status input transistor 2094 whose opposite current-carrying electrode is connected to ground.

The fifth data bit position may have interrupt or status information entered thereon by one of two paths. The fifth bit of the data bus input receives the data bus signal $d_{e1}$ via the similarly designated output which may be connected in a first series path to the current-carrying electrode of a transistor 2095 whose opposite current-carrying electrode is connected to the first current-carrying electrode of a status input transistor 2096 whose opposite current-carrying electrode is conncted to ground, or via a second series path wherein, the $d_{e1}$ output is connected in series with the first current-carrying electrode of a transistor 2097 whose second current-carrying electrode is connected to the first current-carrying electrode of a status input transistor 2098 whose opposite current-carrying electrode is similarly connected to ground. Likewise, the sixth data word position may have status information supplied thereto by two series paths but, in the preferred embodiment of the present invention, no status word transistor was required. Rather, the data bus output $d_{f1}$ is connected directly to the input of the first current-carrying transistor 2099 whose opposite current-carrying electrode is connected directly to ground and similarly, the data bus signal output $d_{f1}$ is connected to the first current-carrying electrode of another transistor 2101 whose opposite current-carrying electrode is similarly connected directly to ground.

The seventh data bit position of the data bus input word may receive a data bus signal $d_{g1}$ from a similarly designated output which is connected directly to the first current-carrying electrode of a transistor 2102 whose opposite current-carrying electrode is connected to ground or from a second output designated $d_{g1}$ which is connected directly to the first current-carrying electrode of a transistor 2103 whose opposite current-carrying electrode is connected to the first current-carrying electrode of a status input transistor 2104 whose second current-carrying electrode is connected directly to ground. Lastly, the eighth and last bit position receives the data bus signal $d_{h1}$ from either a first path connected to one current-carrying electrode of a transistor 2105 whose opposite current-carrying electrode is connected to ground or via a second path wherein the $d_{h1}$ output is connected to the first current-carrying electrode of a transistor 2106 whose opposite current-carrying electrode is similarly connected to ground.

Figure 5K:
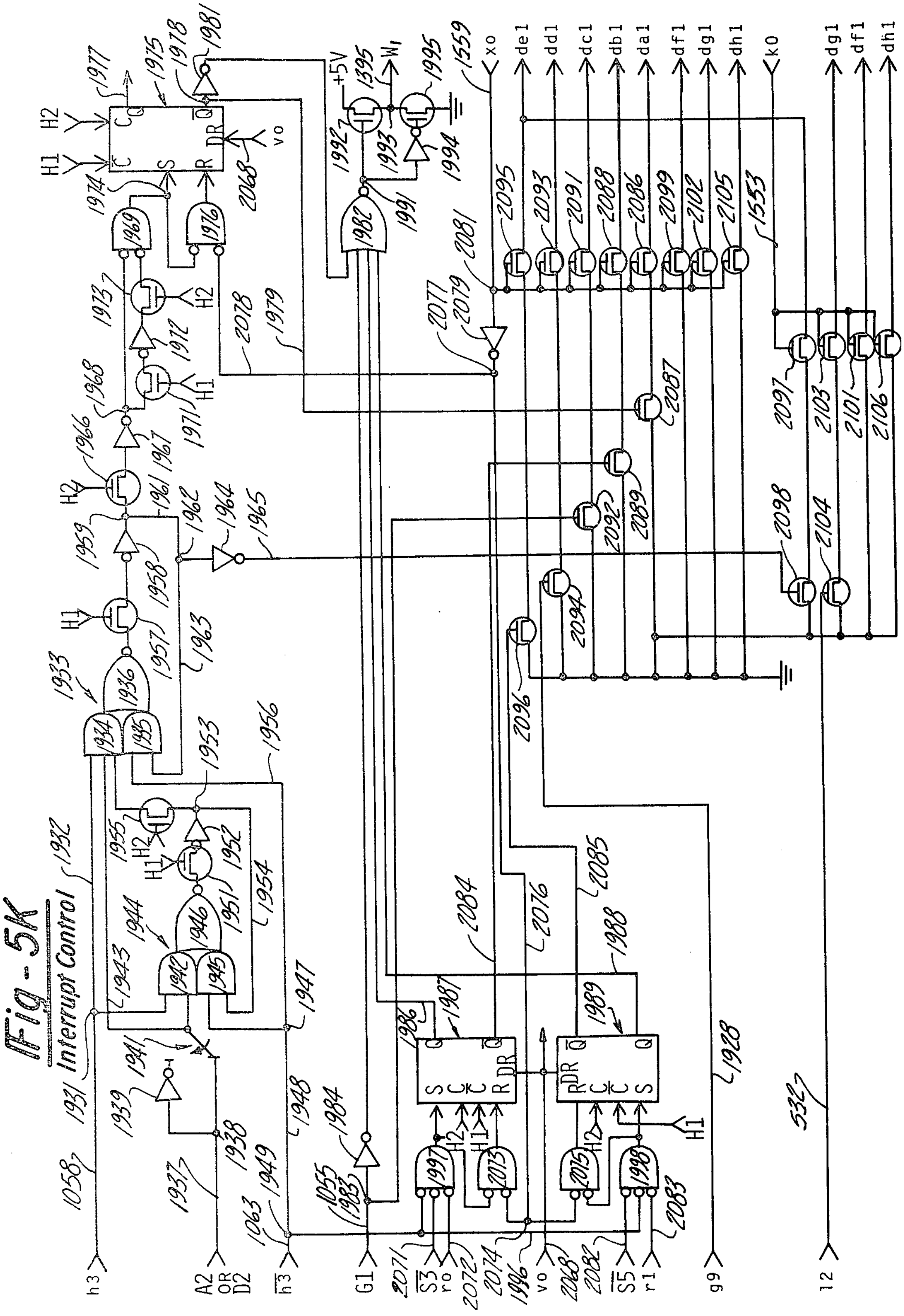
FIG. 5K is an electrical schematic diagram of the interrupt control circuitry of block 1141 of FIG. 5.

In the circuit of FIG. 5K, the previously described command signal $x_o$ which is inputted via lead 1559 to node 2081 is commonly connected to the gate electrode of each of the transistors 2086, 2088, 2091, 2093, 2095, 2099, 2102, and 2105 while the previously described command signal $k_o$ is inputted via lead 1553 and supplied to each of the gate electrodes of transistors 2097, 2101, 2103, and 2106.

Briefly, the operation of the interrupt control circuitry of FIG. 5K will now be described. When an acceleration enrichment request signal A2 or D2 is received via lead 1937, the gating circuitry associated with networks 1943 and 1944 and the circuitry associated therewith will output an acceleration enrichment request signal which is synchronized to the logic clock on lead 1965 as a momentary high signal. Since this signal is supplied to the gate electrode of transistor of 2098, it will cause transistor 2098 to conduct so as to connect the second current-carrying electrode of transistor 2097 directly to ground. When the command signal $k_o$ is generated in the command signal generator circuit of FIG. 5E to command that the status word be connected to the MPU data bus $d_o$, the signal on lead 1553 will go high, causing transistors 2097, 2101, 2103 and 2106 to be rendered conductive. The conduction of transistor 2097 causes the data bus signal output $d_{e1}$ or go low since the output $d_{e1}$ is connected directly to ground through conducting transistors 2097 and 2098 due to the presence of the acceleration enrichment flag signal on lead 1965. Simultaneously, when the command signal $k_o$ goes high, the data signal output $d_{g1}$ will remain high since, in the absence of a high $l_2$ signal on lead 532, transistor 2104 is non-conductive, causing data bus output $d_{g1}$ to remain normally high. Lastly, the high $k_o$ signal causes transistors 2101 and 2106 to conduct so that the data bus signals $d_{f1}$ and $d_{h1}$ go low since the associated outputs are connected directly to ground through conducting transistors 2101 and 2106, respectively.

Similarly, whenever the acceleration enrichment flag signal on lead 1965 is high, the signal of mode 1959 is low which means that the signal at node 1968 is high one clock time later. This causes a high to appear at one inverted input of AND gate 1969 causing its output to go low to enable AND gate 1976. When the command signal $x_o$ is generated, a high appears at node 2081 causing a low to appear at node 2077 and since this low is supplied by a lead 2078 to a second inverted input of AND gate 1976, its output goes high to reset the acceleration enrichment flag flip-flop 1975, causing the Q output to go high. A high signal from node 1978 is connected back via lead 1979 to the gate electrode of transistor of 2087 to render it temporarily conducive as indicated above, the high $x_o$ command signal at node 2081 causes the conduction of the transistors 2086, 2088, 2091, 2093, 2095, 2099, 2102, and 2105 and since the status input transistor 2087 is conductive, the data bus output signal $d_{a1}$ will go low since it is connected directly to ground via conducting transistors 2086 and 2087 respectively. Data signals $d_{b1}$ through $d_{u1}$ will remain high since status input transistors 2089, 2092, 2094 and 2096 do not have high signals at their gate electrodes and are, therefore, non-conductive, so that the conduction of the corresponding transistors 2088, 2091, 2093, and 2095 respectively will not pull the data bus signals $d_{b1}$, $d_{c1}$, $d_{d1}$, and $d_{e1}$, respectively to ground, thereby permitting the data bus signals $d_{b1}$ to $d_{e1}$ to remain in their normally high state. However, when the signal $x_o$ goes high and causes transistors 2099, 2102 and 2105 to conduct, a series path is established between the data bus outputs and ground so that the data bus signals $d_{f1}$, $d_{g1}$, and $d_{h1}$ are forced low.

Similarly, when the engine position flag signal G1 goes high, this high is transmitted via lead 1985 to the gate electrode of status input transistor 2092 causing it to conduct and pull the second current-carrying electrode of transistor of 2091 to ground. Therefore, when the command signal $x_o$ is generated and causes node 2081 to go high, transistor 2091 conducts so as to pull the third data bit to ground and cause data bus signal $d_{c1}$ to go low to indicate the interrupt request to the computer. Simultaneously, when the command signal $x_o$ goes high to cause conduction of the remaining transistors 2086, 2088, 2093, 2095, 2099, 2102, and 2105, then the data bus outputs $d_{a1}$, $d_{b1}$, $d_{d1}$, and $d_{e1}$ remain normally high since their associated status transistors 2087, 2089, 2094, and 2096 remain non-conductive. However, the data outputs $d_{f1}$, $d_{g1}$, and $d_{h1}$ will be pulled low by the conduction of transistors 2099, 2102, and 2105 caused by the high $x_o$ signal since there are no status transistors connected in series therewith.

Furthermore, if the camshaft position computer flag signal $g_9$ of FIG. 5K goes high, the high on lead 1928 will cause status transistor 2094 to conduct and pull the second current-carrying electrode of transistor 2093 to ground. Therefore, when the command signal $x_o$ goes high and causes the conduction of the transistors associated with node 2081 to conduct, the fourth data bit signal will be pulled to ground and the data bus output $d_{d1}$ will go low due to the series conducting transistors 2093 and 2094 respectively. At the same time, the conduction of transistors 2086, 2088, 2091 and 2095 will not pull the associated data bus outputs $d_{a1}$, $d_{b1}$, $d_{c1}$, and $d_{e1}$ low since the associated status transistors 2087, 2089, 2092, and 2096, respectively, are not conducting. As previously indicated, the conduction of transistors 2099, 2102, and 2105 will cause a grounding of the outputs associated therewith so as to cause data bus signals $d_{f1}$, $d_{g1}$ and $d_{h1}$ to go low.

Similarly, whenever the first fuel pulse complete flip-flop 1987 is reset, the $\overline{Q}$ output goes high and this high is transmitted via lead 2084 to the gate electrode of transistor 2089 to render it conductive and pull the second current-carrying electrode of transistor 2088 to ground. Therefore, when the command signal, $x_o$ goes high and causes the transistors associated with node 2081 to conduct, the second bit position of the data word will be pulled to ground since the data bus output $d_{b1}$ will be low due to the series conducting transistors 2088 and 2089 respectively. Simultaneously, the conduction of transistors 2086, 2088, 2091, 2093 and 2095 will not cause the associated data bus outputs $d_{a1}$, $d_{c1}$, $d_{d1}$, and $d_{e1}$ to go high since the series status transistors 2087, 2092, 2094, and 2096, respectively, associated therewith are not conducting. As previously indicated, the conduction of transistors 2099, 2102 and 2105 will pull the data bus outputs $d_{f1}$, $d_{g1}$ and $d_{h1}$ low due to the absence of a series status transistor associated therewith.

Lastly, when the second fuel pulse complete flip-flop 1989 is reset, the $\overline{Q}$ output goes high. This high is transmitted via lead 2085 to the gate electrode of status input tranistor 2096 causing it to conduct and pull the second current-carrying electrode of transistor 2095 to ground. Therefore, when the signal $x_o$ goes high causing the transistors associated with node 2081 to conduct, the fifth bit position or data bus signal $d_{e1}$ is pulled low due to the series conducting transistors 2095 and 2096 respectively. As in the cases hereinabove, the high $x_o$ signal causes node 2081 to go high and the transistors associated therewith to conduct but since the series status transistors associated with the outputs $d_{a1}$, $d_{b1}$, $d_{c1}$, and $d_{d1}$ will remain high, the data bus outputs $d_{f1}$, $d_{f1}$, and $d_{h1}$ will be pulled low since there are no series status transistors associated therewith.

In the manner described hereinabove, the status input circuitry of FIG. 5I and the interrupt control circuitry of FIG. 5K, status and interrupt information will be entered into the microprocessor 1391 of FIG. 5B via data bus $d_o$ through the buffer circuit of FIG. 5G by selectively pulling various individual or combinations of the eight data bus input signals $d_{a1}$ through $d_{h1}$ low or maintaining it high, as previously described. The microprocessor is then able to read and decode the various status or interrupt words and execute the appropriate action as set forth in the flow diagrams of FIG. 9 and the program listing of the Appendix attached hereto, as known in the art.

The first fuel pulse complete flip-flop 1987 operates briefly as follows. The flip-flop is initially set when the output of gate 1997 is high. This occurs when all three inverted inputs are simultaneously low and, therefore, whenever the clock signal $\overline{h_3}$ is low, indicating that the clock signal $h_3$ which occurs once every 16 microseconds is high; the signal $\overline{S3}$ is low, indicating that the circuitry for generating fuel pulse one is not presently in its last 96 microseconds; and the signal $r_o$, which will be hereinafter explained, is simultaneously low. After the first fuel pulse complete flip-flop 1987 is set, gate 2073 will be enabled since the output of gate 1997 will again go low so that when a command signal $x_o$ goes high, the output of gate 2073 goes high to reset the first fuel pulse complete flip-flop 1987 until the conditions are again established for setting same. The second fuel pulse complete flip-flop 1989 operates in a similar manner with the flip-flop being set when input signals $\overline{h_3}$, $r_1$, and $\overline{S5}$ are simultaneously low and reset when the command signal $x_o$ is generated. The precise operation of the individual logic elements of the interrupt control circuitry of FIG. 5K including the operation of the acceleration enrichment flag flip-flop 1975 and the fuel pulse complete flip-flops 1987 and 1989 and the circuitry associated therewith will be obvious to one of ordinary skill in the art in view of the circuit of FIG. 5K and the purpose thereof.

6.0 Broad Functional Description Of The Binary Decoder Circuitry

A broad functional description of the various circuits included in the binary decoder of block 124 of FIG. 2 will now be described with reference to the block diagram of FIG. 6. Broadly speaking, the circuitry of FIG. 6 is used to perform the timing, synchronzing and data translation functions between the microprocessor system of block 123 and the power supply circuits and analog outputs of block 125 of FIG. 2.

FIG. 6 includes an output port represented by block 2111 which is capable of receiving the alarm signal GH2 which is generated when either a clock failure alarm condition or a stall alarm condition exists together with information from the output data bus which is stored in a latching register therein. The output port circuitry of block 2111 outputs the control signal X3 which is the control signal supplied to the on/off EGR valve driver for controlling same and the control signal S1 which is the signal that controls the fuel pump relay driver for operating the fuel pump, as conventionally known.

Additionally, the binary decoder circuitry of FIG. 6 includes first and second fuel pulse counters represented by clock 2112. The fuel pulse counters may be addressed by the buffer contents register, previously described, so that the contents of the buffer registers may be transferred into the fuel pulse-width storage registers at a predetermined time in the arithmetic iteration cycle of the computer. As the data is transferred into the address fuel pulse-width storage register, the corresponding or associated injector on control flip-flop is set to turn on the corresponding injectors. A half subtractor is associated with each fuel pulse-width storage register to allow it to function as a binary downcounter so that the fuel pulse-width stored contents is reduced by one with each arithmetic iteration and associated zero detector circuits so as to detect when the fuel pulse-width counter is zero. When the zero condition is detected, the corresponding injectors are turned off. A provision is made for fuel pulse round-off control to allow the actual fuel pulse-width to be wider, if desired, as hereinafter described.

The ignition delay storage register of block 2113, the transfer logic of block 2114 and the ignition delay counter of block 2115 together with the ignition pulse-width storage register of block 2116, the transfer logic of block 2117 and the counter of block 2118 cooperate with the ignition control circuitry of block 2119 and the ignition timing generator of block 2110 for ignition pulse control. The ignition delay store and the ignition pulse-width store received 16 bit serial binary data words from the microprocessor via the parallel to serial converter registers, previously described. This data codes the ignition delay or ignition pulse-width word and both numbers are stored and retained in the registers until new information is provided from the microprocessor (IWD). The ignition pulse cycle is initiated by an appropriately synchronized engine position pulse signal which will effect the transfer of the engine advance angle word into the ignition delay active storage serial dynamic register or counter of block 2115. At the end of the initiating signal, appropriate flip-flops are set to control gates associated therewith for allowing the ignition pulse control cycle to occur. The word transferred to the ignition delay active storage is decremented during each arithmetic iteration by means of the half subtractor circuit in conjunction with the active storage serial dynamic register so as to function as a binary downcounter. When the ignition delay active storage contents have reached zero, a zero detector circuit will reset a flip-flop and a particular $h_3$ clock time so as to enable the flip-flop to be set again at the start of the next iteration cycle.

Similarly, other flip-flops control the ignition firing circuit external to the circuitry of FIG. 6 for actually initiating an ignition firing pulse. When the ignition pulse-width word is similarly decremented and the zero detector senses that zero has been reached, an associated flip-flop will be reset to inhibit further ignition firing pulse signals from being generated until another appropriately synchronized engine position pulse and/or appropriate computer command is received. The detailed explanation of the ignition pulse control circuitry briefly described hereinabove will be set forth when the circuitry thereof is described hereinafter.

The decoder of FIG. 6 also includes a proportional EGR counter represented by block 2121 which operates in much the same manner as the fuel injection counters to control the generation of a proportional EGR output signal which controls the operation of an EGR valve control solenoid. Lastly, FIG. 6 includes a fuel pulse control block 2122 which includes the fuel pulse control flip-flops which, under control of the fuel pulse counter outputs, generate the fuel pule No. 1 and No. 2 "on" signals S2 and S4 respectively and the fuel pulse No. 1 and No. 2, pulses S3 and S5 respectively as hereinafter described.

6.1 Output Port Circuitry

The output port circuitry of block 2111 of FIG. 6 will now be described in detail with reference to the schematic diagram of FIG. 6A. The output port circuit of FIG. 6A includes a three-stage latching register 2131 comprising three stages, each made up of an identical "D" type static shift register stage such as that depicted in the block diagram of FIG. 9.25A and further described in the schematic diagram of FIG. 9.25B. Each stage of the three-stage latching register 2131 includes a data input $B_i$; and non-inverting output Q, a first clock phase input $h_a$ for entering the data into the stage, a second clock phase input $h_b$ for transferring data from the input to the output and a third clock input $h_c$ for latching the contents of the register stage, if desire,d, and each includes a direct reset input DR.

The data bus signals $d_{a2}$, $d_{b2}$ and $d_{c2}$ are transmitted from the data bus $d_o$ of the microprocessor 1391 of FIG. 5B and then outputted via the buffer circuitry of FIG. 5G to the external data bus for transmission onto the latching register 2131. The data input signals $d_{a2}$, $d_{b2}$ and $d_{c2}$ are supplied to the $D_i$ input of one of the stages of the latching register 2131 and the corresponding outputs are designated $Q_a$, $Q_b$, and $Q_c$, respectively.

The second master clock phase signal H2 is supplied directly to the $h_b$ clock input while the control signal $s_1$ which is a command signal generated by the circuit of FIG. 5E is inputted via lead 1531 to a clock input node 2132. The command signal $s_1$ latches the data bus contents $d_{a2}$, $d_{b2}$, and $d_{c2}$ to be latched into the input port $D_i$ of each of the three stages of the latching register 2131, as conventionally known. Node 2132 is connected directly to the clock input $h_a$ and to the input of an inverter 2133 whose output is connected directly to the third and final clock input $h_c$. Each of the clock inputs $h_a$, $h_b$, and $h_c$ are common to all three stages of the latching register 2131, as conventionally known, as is the direct reset input which is connected via lead 2068 to receive the reset signal $d_o$ from the reset control system of FIG. 5A2, as previously described.

The non-inverting output $Q_a$ of the first stage of the latching register 2131 which stores the data bus signal $d_{a2}$ is connected via lead 2134 to one input of a two-input NAND gate 2135. The other input of NAND gate 2135 is connected via lead 1126 to receive the alarm signal GH2 from the output of the engine time interval counter circuit of FIG. 4G, as previously described. The alarm signal GH2 is normally high but goes low to indicate the existence of the alarm state when either a clock fail signal or an engine stall alarm condition is detected, as previously described. The output of NAND gate 2135 is connected directly to the input of an inverter 2136 whose output is connected directly to the gate electrode of an input transistor 2137 having one current-carrying electrode connected directly to a +5 volt source of potential, and is opposite current-carrying electrode connected to output lead 2138 for outputting the control signal S1 thereon. The control signal S1 is used to control the operation of a conventional fuel pump relay driver, as hereinafter described.

The $Q_b$ output of the second stage of the latching register 2131 is connected directly to the input of an inverter 2139 whose output is connected to a node 2141. Node 2141 is connected to a first non-inverted switch contact 2142 and to a second non-inverted switch contact 2143. Simultaneously, node 2141 is connected to the input of a second inverter 2144 whose output is connected to both a first inverting switch contact 2145 and to a second inverting switch contact 2146. A first means-positionable switching arm 2147 has its pivotal end connected directly to the gate electrode of a transistor 2148 while a second mask-positionable switching arm 2149 has its pivotal or stationary end directly connected to the gate electrode of a second transistor 2151.

As previously described, the mask-positionable switching arm 2147 may be selectively positioned by conventional LSI techniques so that its non-pivoting end makes electrical contact with either the first non-inverting switch contact 2142 or the second inverting switch contact 2146. Similarly, the switching arm 2149 may be selectively positioned to either the first inverting switch contact 2145 or the second non-inverting switch contact 2143, as conventionally known. In the preferred embodiment described herein, the switching arm 2147 is positioned to complete a current path between the gate electrode of transistor 2148 and node 2141 via the switching arm 2147 and the first non-inverting switch contact 2142 while the second mask-positionable switching arm 2149 is positioned to establish an electrically conductive path between the gate electrode of transistor 2151 and the output of inverter 2144 via the switching arm 2149 and the first inverting switch contact 2145.

One current-carrying electrode of transistor 2151 is connected directly to a +5 volt source of potential and its opposite current-carrying electrode is connected directly to an output node 2152. Output node 2152 is connected directly to one current-carrying electrode of the other transistor 2148 whose opposite current-carrying electrode is connected to ground. Output node 2152 is used to output the control signal X3 via lead 2153. The control signal X3 is used to control the operation of an ON/OFF EGR valve driver for ON/OFF EGR-type control.

Lastly, the $Q_c$ output of the third and final stage of the latch 2131 is connected directly to the input of an inverter 2154 whose output is connected to a node 2155. Node 2155 is connected to a first non-inverting switch contact 2156 and to a second non-inverting switch contact 2157. Node 2155 is also connected to an input of an inverter 2158 whose output is connected to both a first inverting switch contact 2159 and to a second inverting switch contact 2161. As described hereinabove, a mask-positionable switching arm 2162 is secured to the gate electrode of a transistor 2163 while a second mask-positionable switching arm 2164 has one end permanently secured to the gate electrode of the transistor 2165.

As conventionally known, a mask-positionable switching arm 2162 may be selectively positioned to enter the first non-inverting switch contact 2156 or to the second inverting switch contact 2161 by conventional LSI techniques, while the second mask-positionable switching arm 2164 may be selectively positioned to contact either the first inverting switching contact 2159 or the second non-inverting switching contact 2157. In the preferred embodiment of FIG. 6A, the switching arm 2162 is connected to establish an electrically conductive path between the gate electrode of transistor 2163 and node 2155 via switching arm 2162 and the first non-inverting switch contact 2156 while the switching arm 2164 is positioned to establish an electrically conductive path between the gate electrode of transistor 2165 and the output of inverter 2158 via the switching arm 2164 and the first inverting switch contact 2159. One current-carrying electrode of the transistor 2165 is connected directly to a +5 volt source of potential while the opposite current-carrying electrode is connected to an output node 2166. Output node 2166 is connected to one current-carrying electrode of the other transistor 2163 whose opposite current-carrying electrode is connected directly to ground. The output node 2166 may be used to output a spare control signal via lead 2167, if desired. For example, the spare control signal outputted on lead 2167 could be used for closed-loop oxygen control system, or the like.

In operation, the output of NAND gate 2135 is normally low since both of its inputs are normally high. The low at the outputted NAND gate 2135 will be inverted by inverter 2136 causing a high to appear at the gate electrode of transistor 2127 causing it to conduct. So long as transistor 2137 conducts, the S1 control signal on lead 2138 will be connected to the +5 volt source of potential to maintain the fuel pump turned on, as conventionally known. However, if either of the alarm signal GH2 goes low to indicate the existence of a clock failure or a stall condition, or if the computer outputs a low $d_{a2}$ data bus signal to indicate the shut-off command, then the low GH2 signal on lead 1126 or the low outputted from the $Q_a$ output of the first stage of the latching register 2131 will be supplied to an input of NAND gate 2135 causing its output to go high. A high at the output of NAND gate 2135 will cause a low to appear at the gate electrode of transistor 2137 via the action of inverter 2136. This causes transistor 2137 to be turned off thereby terminating the control signal S1 on lead 2138 and shuttingoff the fuel pumps to prevent dangerous situations or the like.

Similarly, if the computer normally outputs a high data bus signal $d_{b2}$ to the input of the second stage of the latching register 2131, the $Q_b$ output is high causing a low to appear at node 2141 by the action of inverter 2139. The low at node 2149 will maintain transistor 2148 in the non-conductive state but will be inverted by the action of inverter 2144 to cause a high to be supplied to the gate electrode of transistor 2151 rendering it conductive. The conduction of transistor 2151 connects the +5 volt source of potential to the output node 2152 so that the control signal X3 on lead 2153 is normally high for maintaining the EGR valve driver on to hold the EGR valve on or open to permit exhaust gas recirculation as known in the art. However, if the computer generates a low data bus signal $d_{b2}$ indicating a computer command to turn off the exhaust gas recirculation, the signal at output $Q_b$ goes low, causing a high to appear at node 2141 which causes transistor 2148 to conduct and ground node 2152.

Simultaneously, the high at node 2141 appears at a low at the gate electrode of transistor 2151 shutting it off so that the signal on lead 2153 is low to turn off the EGR control valve as dictated by the computer command.

Lastly, the spare output port circuitry operates in exactly the same manner as the circuitry associated with the X3 output port and could be used in exactly the same manner. The computer would simply maintain the signal on the output lead 2167 at a particular high or low level for controlling the desired function and then reverse the state of the signal by reversing the state of the data bus signal $d_{c2}$ when the computer desired a change in condition, as described hereinabove.

6.2 Fuel Pulse Counters

The fuel pulse counters of block 2112 of FIG. 6 will now be described with reference to the schematic diagram of FIG. 6B. As indicated above, the fuel pulse counter circuitry is implemented by means of the dynamic shift register, combined with a half adder circuit whose inverted outputs are utilized (similar to a half subtractor circuit) and the inverting transfer logic networks of FIG. 5H.

The signal S is a fifteen bit binary word coding fuel injection pulse-width output of the number one fuel pulse register to be hereinafter described and has a resolution of 16 microseconds. The signal S is outputted from the transfer gating network 1780 of FIG. 5H and inputted via lead 1780g to the $D_i$ input of the first or most significant bit position stage of a sixteen stage number one fuel pulse shift register 2171. The shift register 2171 is a dynamic serial shift register wherein each of the sixteen stages comprises a two phase dynamic flip-flop as illustrated in the block diagram of FIG. 9.22A and the electrical schematic digram of FIG. 9.22B. Unless otherwise indicated, the same two phase dynamic flip-flops are used to implement all of the shift register counters of FIG. 6 and each of the shift register stages includes a first clock phase input $h_a$, a second clock phase input $h_b$, a data input $D_i$, a non-inverting Q output and an inverting $\overline{Q}$ output. In the number one fuel pulse shift register 2171, the most significant bit position or stage of the register has its inverting output designated $\overline{Q_{16}}$ while the opposite or least significant bit position or stage of the shift register 2171 has its non-inverting input $Q_1$ and its inverting input labeled $\overline{Q_1}$.

Therefore, the S input of lead 1780g is fed into the $D_i$ data input of the most significant bit position or stage of the counter 2171. As known in the art, the $Q_{16}$ output of the sixteenth or most significant stage of the register 2171 is connected directly to the $D_i$ data input of the next successive fifteenth stage and its $Q_{15}$ output is connected directly to the $D_i$ input of the fourteenth stage, etc. This continues down until the $Q_2$ output of the second least significant stage is connected to the $D_i$ data input of the least significant stage of the register 2171 as known in the art. The arrows depicted between the sixteen stages of the register 2171 indicates this conventional interconnection and the actual interconnections therebetween are conventional.

A zero detection circuit represented generally by the horizontal line 2172 represents a conventional NOR gate decoding network as depicted by the ROM notation previously described herein and further set forth in FIG. 9. The zero detection or decode circuit 2172 represents a fourteen input NOR gate having as its input, the inverting outputs of the first and fourth through sixteenth stages of the shift register 2171. As indicated by the circles and the vertical lines interconnecting the outputs $\overline{Q_1}$ and $\overline{Q_3}$ through $\overline{Q_{16}}$, the fourteen input zero detection NOR gate 2172 includes an output node 2173. Output node 2173 is also connected to the commonly coupled gate electrode and one current-carrying electrode of a pull-up transistor 2174 whose opposite current-carrying electrode is connected to a +5 volt source of potential for supplying the necessary power for driving the NOR gate and insuring proper logic levels. The zero decode output node 2173 supplies the signal $a_{10}$ to the fuel pulse control flip-flop circuitry of FIG. 6L as hereinafter described via lead 2175.

Similarly, the inverting outputs of the second and third stages of the register 2171, $\overline{Q_2}$ and $\overline{Q_3}$ are supplied as two inputs of another decoding NOR gate which is represented by the horizontal line 2176 and having a similar pull-up transistor 2177 associated therewith. One current-carrying electrode and the gate electrode of pull-up transistor 2177 are commonly connected to the lead 2176 while the other current-carrying electrode is connected to a +5 volt source of potential for insuring sufficient driving power to the decoding NOR gate. The NOR gate output is taken from node 2178 and outputs the signal $r_0$ via lead 2072, as previously described. As previously indicated, the control signal $r_0$ on lead 2072 is supplied to the interrupt control logic of FIG. 5K as previously described and is also supplied as one input to the fuel pulse control flip-flop circuitry of FIG. 6L to be hereinafter described.

Each of the stages of the fuel pulse number one shift register 2171 receives the master clock signal $H_1$ at its $h_a$ input via clock input node 2179 and the second master clock phase signal $H_2$ at its second clock phase input $h_b$ via clock input node 2181. The non-inverting output $Q_1$ of the least significant stage of the number one fuel pulse shift register 2171 is connected directly to the $i_a$ or augend input of the half adder circuit 2182. In the preferred embodiment of the present invention, the half adder circuit 2182 and those described hereinafter are implemented in nMOS circuitry via conventional LSI techniques and may be represented by the block diagram illustrated in FIG. 9.29A and the associated electrical schematic diagram of FIG. 9.29B. The half adder circuits are actually configured together with the associated logic circuitry to function as half subtractors since the inverted sum output $\overline{S_u}$ and the inverted carry output $\overline{C_y}$ are used rather than the normal sum and carry outputs. Therefore, the truth table of the half adder 2182 and those similar thereto is as described below.

When the signal supplied to the input $i_a$ is zero or low and the signal supplied to input $i_b$ is zero or low, the signal present at the inverted sum output $\overline{S_u}$ is high or a logical "1" and the signal present at the inverted carry output $\overline{C_y}$ is also high. Similarly, whenever the signal inputted to the $i_a$ input is low while the signal inputted to the $i_b$ input is high, then the inverted sum output $\overline{S_u}$ is low while the signal present at the inverted carry output $\overline{C_y}$ is high. Thirdly, whenever the signal supplied to the $i_a$ input is high while the signal supplied to the $i_b$ input is low, the inverted summation output $\overline{S_u}$ remains low while the inverted carry output $\overline{C_y}$ remains high. Lastly, whenever the signal presented to both of the inputs $i_a$ and $i_b$ are highs or logical ones, the signal present at the inverted summation output $\overline{S_u}$ goes high but the signal present at the inverted carry output $\overline{C_y}$ goes low. With this brief description, the operation of the half adder circuit of FIG. 2182 hereinafter described with respect to the various registers of FIG. 6 will be readily understood by those of ordinary skill in the art.

The inverted sum output $\overline{S_u}$ is connected to an output lead 1758 which supplies the inverted sum output signal $\overline{S_u}$ as the signal $d_8$ which, as previously described, is connected back to the transfer gating network 1780 of the parallel-to-serial converter circuitry of FIG. 5H for use as hereinafter described. Furthermore, the inverted carry output $\overline{C_y}$ is connected directly to one current-carrying electrode of a transistor 2183 whose opposite current-carrying electrode is connected directly to the gate electrode of another transistor 2184. Transistor 2184 has one current-carrying electrode connected directly to ground and its opposite current-carrying electrode connected directly to a first current-carrying electrode of another series transistor 2185 whose opposite current-carrying electrode is connected directly to the output node 2186. Output node 2186 is commonly coupled to the gate electrode and one current-carrying electrode of a transistor 2187 whose opposite current-carrying electrode is connected directly to a +5 volt source of potential. Simultaneously, the output node 2186 is connected to one current-carrying electrode of another transistor 2188 whose opposite current-carrying electrode is connected via lead 2189 back to the $i_b$ input of the half adder of block 2182 as previously described. The gate electrode of transistor 2185 is connected to one current-carrying electrode of a transistor 2191 whose opposite current-carrying electrode is connected to a clock input lead 1063 for receiving the clock signal $\overline{h_3}$ generated by the timing circuitry of FIG. 6J, as hereinafter explained. The gate electrode of transistors 2183 and 2191 are supplied with the first master clock phase signal $H_1$ while the gate electrode of transistor 2188 is supplied with the second master clock phase signal $H_2$. The operation of the half adder circuit 2182, the transistor circuitry associated with the output thereof, the transfer gating network 1780 of FIG. 5H, and register 2171 will be hereinafter explained.

FIG. 6B also includes a fuel pulse number two shift register 2192 which is identical to the number one fuel pulse shift register 2171 described hereinabove. Shift register 2192 similarly includes sixteen stages each of which comprises a two phase dynamic flip-flop having a data input or data shift input $D_i$, a first clock phase input $h_a$, a second clock phase input $h_b$, a non-inverting output Q, and an inverting output $\overline{Q}$. Similarly, the sixteen stages of the shift register 2191 are connected so that the non-inverting Q output of the sixteenth stage or most significant stage or bit position of the register, is connected directly to the data input $D_i$ of the fifteenth stage while the $Q_{15}$ output is connected directly to the $D_i$ input of the fourteenth stage and so on down until the $Q_2$ output of the second least significant stage of the register 2192 is connected directly to the $D_i$ data input of the least significant bit position or stage of the register 2192 as known in the art.

The signal S6 is supplied to the $D_i$ input of the sixteenth stage or most significant stage of the counter 2192 via output lead 1784g from the transfer gating logic network 1784 of FIG. 5H as previously described. A zero detection decoding network comprising a fourteen input NOR gate as represented by the horizontal line 2193 and has, as the fourteen inputs to the NOR gate represented by reference numeral 2193, the inverting outputs of the first and fourth through sixteenth stages of the shift register 2192. A pull-up transistor 2194 has its gate electrode and one current-carrying electrode commonly coupled to the lead 2193 representing the NOR gate decoder and its oposite current-carrying electrode connected to a +5 volt source of potential for supplying the necessary drive to the fourteen input NOR gate to insure proper voltage levels, as known in the art. The output of NOR gate 2193 is taken from the zero detection output node 2195 which supplies the output signal $b_{10}$ to the fuel pulse control flip-flop circuitry of FIG. 6L as hereinafter described, via the zero detection output lead 2196. The first clock phase input $h_a$ of each of the stages of the shift register 2182 are supplied with the first master clock phase signals $H_1$ via clock input node 2179 while the second clock phase input $h_b$ of each of the stages of the shift register 2192 are supplied with the second master clock phase signals $H_2$ via clock input node 2181.

The second detection circuit or two input NOR gate decoder is represented by the horizontal line 2197 which is commonly connected to the gate electrode and one current-carrying electrode of the conventional pull-up transistor 2198 whose opposite current-carrying electrode is connected directly to a +5 volt source of potential for insuring proper logic levels. The two inputs to the NOR gate represented by line 2197 are taken from the output of the second and third stages as indicated by the vertical lines originating at the inverting outputs $\overline{Q_2}$ and $\overline{Q_3}$ and intersecting the horizontal line 2197 at the circles position in accordance with the previously defined ROM notation set forth in FIG. 9. The output of the decoder circuit or NOR gate 2197 is taken from node 2199 and outputs the signal $r_1$ to the interrupt control circuit of FIG. 5K via lead 2083, as previously described, and as an input to the fuel pulse control flip-flop circuitry of FIG. 6L as hereinafter described.

The $Q_1$ output of the least significant stage or first stage of the fuel pulse number two shift register 2192 is connected directly to the $i_a$ input of a half adder circuit represented by block 2201. The half adder circuit of block 2201 is identical to that of block 2182 and reference may be had to the description thereof previously given and to the block diagram and schematic of FIGS. 9.20A and B hereof. The half adder circuit of block 2201 has a first input $i_a$ which, as previously described, is connected to the non-inverting output $Q_1$ of the first and least significant stage of the sixteen stage shift register 2192. Additionally, the half adder circuit of block 2201 has a second input $i_b$, an inverted summation output $\overline{S_u}$, and an inverted carry output $\overline{C_y}$ as described hereinabove.

The inverted summation output $\overline{S_u}$ is connected directly to an output lead 1798 which, as previously described, inputs the output of the half adder 2201 to the transfer logic gating network 1784 of FIG. 5H of the signal $e_8$ as previously described. Furthermore, the inverted carry output $\overline{C_y}$ is connected directly to one current-carrying electrode of a transistor 2202 whose opposite current-carrying electrode is connected to the gate electrode of a transistor 2203. One current-carrying electrode of transistor 2203 is connected directly to ground and its opposite current-carrying electrode is connected to the first current-carrying electrode of a series transistor 2204 whose opposite current-carrying electrode is connected directly to an output node 2205. Output node 2205 is commonly connected to the gate electrode and to one current-carrying electrode of a pull-up transistor 2206 whose opposite current-carrying electrode is connected to a +5 volt source of potential. Simultaneously, the output node 2205 is connected to one current-carrying electrode of a transistor 2207 whose opposite current-carrying electrode is connected via lead 2208 to supply an input signal to the second input $i_b$ of the half adder circuit 2201. The gate electrode of transistor 2204 is connected directly to one current-carrying electrode of the transistor 2209 whose opposite current-carrying electrode is connected directly to the lead 1063 for receiving the clock signal $\overline{h_3}$ therefrom. The gate electrodes of transistors 2202 and 2209 are connected to receive the first master clock phase signals $H_1$ while the gate electrode of transistor 2207 is connected to receive the second master clock phase signal $H_2$.

The operation of the fuel pulse number one and the fuel pulse number two counters are virtually identical and will be described by briefly describing the operation of the fuel pulse number one counter. It will be understood that the operation of the second fuel pulse counter and the operation of several of the other counters implemented by means of a dynamic shift register combined with a half adder, circuitry associated therewith, and a threshhold gating input associated with the shift register all operate basically the same and the differences therebetween will be pointed out hereinafter.

The operation of the fuel pulse counters of FIG. 6 will now be briefly described with reference to the circuitry of FIGS. 6D and 5H although the interplay between the ignition counter circuitry and the fuel pulse control flip-flop circuitry of FIG. 6L will be interrelated at a later time.

The number one fuel pulse-width counter acts much like a preloaded or preset binary downcounter but is implemented in nMOS logic by state-of-the-art LSI techniques utilizing a dynamic shift register 2171, a half adder circuit 2182, transistor circuitry associated with the output of the half adder 2182 which serves as a flip-flop type function, and the transmission gating logic network 1780 of FIG. 5H. The advantage of implementing the counter in this manner resides in greatly reduced chip space or area required on the integrated circuit chip thereby resulting in a lower cost while preserving or enhancing the overall accuracy thereof with no loss of reliability, maintainability, or ease of trouble-shooting and the like. Furthermore, the particular implementation chosen lends itself to being able to provide several unique features to be discussed hereinafter such as the choice of either an eight microsecond resolution or a sixteen microsecond resolution accuracy; the ability to use a round-off error circuit; and the availability to partition various portions of the circuit in a manner which would not otherwise be possible with a conventional binary downcounter. It will, of course, be understood that while this feature represents an inventive improvement over the prior art, the overall system can be implemented using conventional counter techniques and associated decoding networks or any equivalent thereto.

In operation, the microprocessor 1391 of FIG. 5B will output an appropriate data bus signal $d_{a2}$ to the buffer contents address register 1734 of FIG. 5H for addressing or selecting the fuel pulse number one counter for receiving the two byte, sixteen bit data word currently stored in the parallel-to-serial shift registers 1732 and 1733 thereof. Whenever the data bus signal $d_{a2}$ is stored in the first latching stage of the latching register 1734, the Q output thereof will go high causing the transistors associated with the output thereof to conduct so that the signal on lead 1749 goes low to enable gate 1802 and eventually produce a sixteen microsecond shift signal at the output of gate 1813. When the high shift signal on lead 1738 and the high from the $Q_0$ output of the register 1738 are supplied as inputs to NAND gate 1770, its output on lead 1756 goes low. When the output of NAND gate 1770 goes low, node 1757 and the signal $g_8$ go low as well. The initial low at node 1757 is supplied to node 1780a to disable AND gate 1780b and enable AND gate 1780d via the action of inverter 1780c. The signal at node 1780a remains low for the duration of the initial sixteen microsecond shift time or transfer time during which the sixteen bits of data stored in the parallel-to-serial shift registers 1732 and 1733 may be transferred to the sixteen stages of the fuel pulse number one shift register 2171 as hereinafter described.

With AND gate 1780b disabled, a zero appears at its output and this zero or low signal will enable one input of NOR gate 1780e. In the preferred embodiment of the present invention, the $\overline{Q_7}$ output from the second least significant bit position of the least significant data byte stored in register 1733 is outputted via lead 1765 to node 1759 and thence to the second input of the enabled AND gate 1780d. The use of the next to the least significant bit position of the sixteen bit, two byte data word for fuel pulse calculations. This enables the least significant bit weight of the word to have an accuracy of eight microseconds rather than sixteen microseconds for fuel pulse calculations and the use of round-off compensations circuitry, as hereinafter described, enables this feature to be used without any significant loss of accuracy.

The command to initiate the number one fuel pulse injectors is initiated by the computer program when the command is generated by the microprocessor 1391 of FIG. 5B for transferring the fuel pulse-width address for the respective first or second group injectors to the buffer contents register 1734 of FIG. 5H as previously described. Prior to writing this address into the register 1734, the computer would have written, in two eight bit bytes of information representing a number indicative of the desired fuel pulse-width into the parallel-to-serial converter shift register 1732 and 1733 so that a complete sixteen bit word is available for transfer upon command.

The fuel pulse-width command word is a binary number generally having a least significant bit weight of eight microseconds but since the serial binary arithmetic processing logic of the present system is generally not capable of processing sixteen bit words completely within an eight microsecond time period, special manipulation of the fuel pulse word will be initiated in order to provide a sixteen microsecond pulse-width resolution. This manipulation consists of dividing the number by two in order that the time duration can be downcounted in increments of sixteen microseconds and then storing the least significant bit position to allow the fuel pulse-width to be lengthened by eight microseconds to provide a round-off compensation in the event that the least significant bit was one. The round-off manipulation and right shifting of the fuel pulse-width word is accomplished via the fuel pulse round-off control flip-flop as hereinafter described and by the control of the parallel-to-serial converter shifting. For the fuel pulse-width words only, the parallel-to-serial converter register data shift is started during the first $h_3$ pulse which occurs once each sixteen microseconds, as previously described, following the receipt of either the first or second fuel pulse address by the address register 1734.

It will be noted that this is one clock period in advance of the normal transfer shift operation and one clock period in advance of the enabling of the transfer gate network 1780 or 1784 to either of the fuel pulse-width stores. Therefore, the fuel pulse-width information is downshifted one position and divided by two before it is transferred by the network 1780 into the sixteen bit shift register 2171. The transfer from the registers 1732, 1733 into the properly addressed number one fuel pulse-width shift register 2171 via the transferred gating logic network 1780 will begin at clock time $h_3$ of the arithmetic iteration immediately following the receipt thereof, i.e., during the time period $\overline{h_3}$. During this time period, the value of the least significant bit is stored in the address fuel pulse round-off control flip-flop, as hereinafter described, and the fuel pulse round-off control flip-flop is set to signify that the associated fuel pulse-width control logic is to lengthen the injection pulse by eight microseconds at the termination thereof. The mechanism by which this is accomplished will be discussed hereinafter.

As the data is transferred from the registers 1732 and 1733 into the addressed number one fuel pulse-width store register 2171, the respective injector on control set signal is generated to the associated injector on control flip-flop as hereinafter described. This causes the associated injector on contrl flip-flop to set and turn on the respective fuel injectors. The fuel pulse-width store contents of the shift register 2171 is reduced by one during each arithmetic iteration time by means of the half adder circuitry 2182 associated therewith and the associated zero detector circuit 2172 serves to detect when the fuel pulse-width is zero.

Since the arithmetic iteration period requires 16 microseconds, the fuel pulse-width store will be reduced by one count during each 16 microsecond iterations. When the zero condition is detected by the NOR gate decoder circuit represented by 2172, and if the fuel pulse round-off flip-flop is reset, the respective injector on control flip-flop will immediately be reset to terminate the injector pulse as hereinafter described. If, however, the associated fuel pulse round-off flip-flop is set, the immediate reset of the injector on control flip-flop is inhibited and a second flip-flop is set by the zero detection condition. The second flip-flop is reset simultaneously with the injector on control by the occurrence of the next $h_4$ clock pulse which occurs once each 8 master clock pulses and is synchronized with $h_3$, which occurs eight microseconds after the end of the arithmetic iteration thereby widening the fuel pulse by eight microseconds.

The actual fuel pulse-width will be wider by 16 microseconds than the number which is transferred from the counter due to the timing of the setting of the injector on control flip-flop. Compensation for this phenomena may be supplied by the computer program which must subtract two from the fuel pulse word before transmitting it to the registers 1732 and 1733, if desired. Each time a fuel pulse-width is received and an injection is initiated, no further injection will occur until a new fuel pulse-width number is transmitted from the microprocessor to the parallel to serial converter circuit of FIG. 5H. Therefore, the fuel injection pulse-width and timing is, at all times, under control of the microprocessor and the programming therefore.

More specifically, once the address register 1934 has addressed the number one fuel pulse counter, transfer logic network 1780 is addressed and AND gate $1780_d$ is enabled. As the data bits are serially transferred, from least significant bit to most significant bit out of the seventh stage, which represents the second least significant bit position of register 1733, they are inputted to AND gate $1780_d$. Each occurence of a logical one or high from the registers 1732 and 1733 at node $1780_a$ will cause the output of AND gate $1780_d$ to go high and the signal S on lead $1780_g$ to go low and whenever a low is received from the shift register circuitry of register 1732 and 1733, the output of AND gate $1780_d$ goes low so that the transferred data signal at the output of NOR gate $1780_e$ will go high so that the complement of the word stored in registers 1732 and 1733 is inputted through the stages of the number one pulse-width shift register 2171 of FIG. 6B. Therefore, the complement of the computer generated by the binary number stored in the register 1732 and 1733 and indicative of the commanded pulse-width is entered serially into the stages of the pulse-width number one shift register store 2171 with the least significant bits being entered first and the most significant bit being entered last. As soon as the first iteration period or 16 microsecond time period has lapsed after the command $g_8$ has commanded the entry of the pulse-width number one word into the register 2171 via the transfer network 1780, the signal $g_8$ will go high since the shift signal on lead 1738 at one input of NAND gate 1770 will again go low, causing the output on lead 1756 and therefore the signal at lead 1757 to go high. The high at node 1757 appears at node **1780*a* of the transfer network 1780 and operates to enable AND gate 1780*b* and disable AND gate 1780*d* so that a zero appears at the output of AND gate 1780***d* and therefore, at one input of NOR gate 1780*e* regardless of the signal or signals appearing on lead 1765 at the output of the parallel-to-serial shift registers 1732 and 1733 respectively.

Therefore, all further entry of data into the shift register 2171 via the signal S at the output of NOR gate 1780 will come via feedback lead 1758 as hereinafter described. If the signal $d_8$ on lead 1758 is high, the output of AND gate 1780*d* will go high causing the signal S to go low but if the signal $d_8$ on lead 1758 is low, the output of AND gate 1780*b* will go low causing the output of NOR gate 1780*e* to go high. In this manner, it will be apparent that the feedback data $d_8$ on lead 1758 will be inverted by the action of AND gate 1780*b* and NOR gate 1780*e* before it is fed back as signal S into the fuel pulse number one serial shift register 2171 as hereinafter described so that at the end of each iteration, the complement of the original binary number decremented by one will be stored register 2171.

Broadly speaking, during each subsequent 16 microsecond iteration period, the complement of the number stored in the register 2171 is decremented by one and restored therein by means of the half-adder circuit 2182, the transistor circuitry associated therewith, and the transmission gating network 1780. In greater detail, when the new iteration period stars, the first or least significant bit is transferred to the $i_a$ input of the half-adder 2182 and the following occurs. As each bit is transferred from the serial shift register 2171 into the half-adder 2182 by input $i_a$, the signal appearing at the $\overline{S_u}$ output will be supplied via lead 1758 as the signal $d_8$ back to the inverting transfer logic network 1780 prior to being re-inputted into the register 2171. Therefore, it is necessary to initially invert or take the complement of the number transferred from the $\overline{S_u}$ output so that the complement of the properly decremented number is restored in registers 2171 after it has been again complemented or inverted by the action of the logic gating network 1780 as previously described.

The actual operation is as follows. As the start of each iteration period, the clock signal $h_3$ goes high indicating that the clock signal $\overline{h_3}$ is low for one clock time and during this clock time, transistor 2191 is rendered conductive by the first master clock phase signal $H_1$ to transmit the low to the gate electrode of transistor 2185 causing it to remain non-conductive. Therefore, a high will appear at output node 2186 due to the conduction of transistor 2187 and this high signal is transmitted via transistor 2188 which is rendered conductive upon the occurence of the second clock phase signal $H_2$ back to the second $i_b$ input of the half-adder 2182. Therefore, at the very start of the iteration period, the signal initially set into the $i_b$ input is a logical one or high signal which causes the circuit to operate as follows. Immediately after the first clock time $H_1$, $H_2$, clock signal $\overline{h_3}$ goes high so that with each subsequent $H_1$ clock phase, the conduction of transistor 2191 will render transistor 2185 conductive. Therefore, the high will remain at node 2186 only so long as the signal outputted from the inverted carry output $\overline{C_y}$ of the half-adder 2182 and transmitted via transistor 2183 each time the first master clock phase $H_1$ renders it conductive to the gate electrode of transistor 2184 and remains low. As soon as the inverse carry signal $\overline{C_y}$ goes high, the conduction of transistor of 2183 will supply a high signal to the gate electrode of transistor 2184 causing it to conduct and since transistor 2185 is simultaneously conducting, node 2186 will be pulled to ground so as to turn off transistor 2187 regardless of the further state of the inverse carry output $\overline{C_y}$ for the remainder of the interation period. This causes a low to appear at output node 2186 and with each $H_2$ clock phase, transistor 2188 conducts to pass the low back to the second input $i_b$ of the half-adder circuit 2182 for subsequent operations.

In effect, the half-adder circuit of block 2182 initially has its $i_b$ input preset with the logical one signal. Therefore, in accordance with the truth table set forth hereinabove, as each data bit is transferred from the least signicant stage of the counter 2177 to the first input $i_a$ of the half-adder 2182, the $\overline{S_u}$ output will pass the same signal, non-inverted, as feedback signal $d_8$ to the input of the transfer circuit 1780 for inversion prior to entry or re-entry into the shift register 2171 as the signal S. However, as soon as the first zero is detected at the $i_a$ input, the truth table causes $\overline{C_y}$ output to go high and although the first detected zero is passed from the $\overline{S_u}$ output in a non-inverted state via lead 1758 and back to the gating network of 1780 via signal $d_8$, the high at the $\overline{C_y}$ output will be conducted to the base electrode of transistor 2184 causing it to conduct and pull node 2186 to ground. When node 2186 is pulled to ground, transistor 2187 is turned off and a low is fed back via conducting transistor 2188 to the second half-adder input $i_b$. With a low at the secondary input $i_b$, all subsequent inputs fed to the primary input $i_a$ are inverted before they are passed out of the $\overline{S_u}$ output so that all future $d_8$ signals supplied back to the transfer logic network 1780 are inverted prior to being re-inverted by the logic network 1780 and re-inputted via signal S into the shift register 2171.

In this matter, the complement of the binary number originally stored in the register 1732 and 1733 of FIG. 5H is uncomplemented, decremented by one, and then recomplemented prior to being reinserted into the shift register 2171. As the down count continues, eventually the actual binary number will reach one. With the actual binary number being equal to one, the shift register 2171 will store the complement thereof, i.e., all ones except for a zero in the least significant bit position. On the next iteration, this zero will be detected and passed unaltered from the $\overline{S_u}$ output via signal $d_8$ to be reinverted and returned via signal S to the input of the shift register 2171 and all of the remaining 15 logical ones subsequently received in the $i_a$ input of the half-adder 2182 will now be complemented or inverted in the half-adder 2182 since the signal at the $i_b$ output immediately became zero after the detection of the first zero.

Therefore, at the end of the last iteration cycle, the true binary number will have been downcounted to zero and the number actually stored in shift register 2171 will be all logical ones due to the inversion function of the logic gating network 1780, as previously described. With all ones stored in the No. 1 fuel pulse register 2171, the decoding network represented by NOR gate 2172 which receive its inputs from the inverted output terminals $\overline{Q_1}$ through $\overline{Q_{16}}$ respectively, will detect all zeroes at its input causing the signal $a_{10}$ to go high indicating that the number one fuel pulse counter has reached zero. Similarly, as soon as the number stored in the counter 2171 had been downcounted until the complemented values stored in the second and third stages were both logical ones, then both inputs to NOR gate 2176 would be low, causing the output signal $r_0$ to go high for use as hereinafter described.

As previously mentioned, the operation of the serial shift register 2171 together with the half-adder circuit 2182, the flip-flop-type transistor network associated with the output thereof, and the transfer logic input network 1780 cooperate to cause the fuel pulse counters to operate as binary downcounters so that the binary number generated by the computer to represent a desired fuel pulse-width to control the injection of fuel into the engine, will have been initially turned on and then downcounted for the required period of time to insure that the computer commanded amount of fuel is injected. The operation described further detail as to the specific structure or operation of the counter configuration should be obvious in view of FIG. 6B and FIG. 5H and in light of the description and purpose for which they are used in the present invention. As indicated above, the operation of the remaining register circuits associated with half-adders, transfer logic gates, and output transistor circuitry to accomplish a binary adder or subtractor function will not be described in detail since it will be obvious from the description given above.

6.3 Ignition Delay Storage Register

The ignition delay storage register of block 2113 of FIG. 6 will now be described with reference to FIG. 6C. In FIG. 6C, the input signal T from the output of the transfer logic network 1781 of FIG. 5H is inputted via lead 1781g to the $D_i$ input of a sixteen stage shift register 2221 wherein the most significant stage has an output designated $Q_{16}$ and a least significant stage designated $Q_1$. As indicated previously, each of the individual stages of the shift register 2221 is, in the preferred embodiment of the present invention, a two phase dynamic flip-flop such as illustrated in FIG. 9.22A and in the electrical schematic diagram of FIG. 9.22B. Each of the individual stages of the shift register 2221 includes a first clock phase input $h_a$ connected to receive the first master clock phase signals $H_1$ and a second clock phase input $h_b$ connected to receive the second master clock signals $H_2$. Furthermore, each of the individual stages includes a data shift or data input $D_i$ and a non-inverting output Q and an inverting $\overline{Q}$.

As conventionally known, the individual stages of the shift register 2221 are connected so that the input signal P is connected via lead 1781g to the $D_i$ data input of the most significant stage of the shift register 2221 and its $Q_{16}$ output is connected directly to the $D_i$ data input of the fifteenth stage. The $Q_{15}$ output of the fifteenth stage is in turn connected to the $D_i$ data input of the fourteenth stage and so on until the $Q_2$ output of the second stage is connected to the data input of $D_i$ of the least significant bit position or stage of the shift register 2221 whose output is designated $Q_1$. The $Q_1$ output of the ignition delay storage shift register 2221 is connected directly to the input of the inverter 2222 and the output of the inverter supplies the signal T2 via lead 1768 back to the transfer logic gating network 1781 of FIG. 5H for recirculating the data stored therein upon itself until such time as it is needed.

6.4 Ignition Delay Transfer Logic

The ignition delay transfer logic of block 2114 of FIG. 6 will now be described with reference to the electrical schematic diagram of FIG. 6D. The signal $g_{10}$ which represents the output of the active dealy counter register decremented by one, as further described with reference to FIG. 6E, is supplied via lead 2223 to a first input of a two input logical AND gate 2224. The logical AND gate 2224 has its output connected as one input of the two input NOR gate 2225 whose output supplies the signal T3 which represents the serial binary word entering the active T counter serial register or the ignition delay counter of FIG. 6E as hereinafter described via lead 2226. The output of NOR gate 2225 is also connected directly to one current-carrying electrode of a transistor 2227 whose opposite current-carrying electrode is connected directly to ground. The gate electrode of transistor 2227, which is used for initial reset purpose, is connected via lead 2068 to receive the buffer reset signal $v_o$ from the output of the buffer logic circuit of FIG. 5A2 from the reset control system of FIG. 5A as previously described. The command signal $y_0$ which is generated by the command signal generator decoding network of FIG. 5E is inputted via lead 1525 to one input of a two input NOR gate 2228. The output of NOR gate 2228 is connected directly to the input of an inverter 2229 whose output is connected to a node 2231. Node 2231 is connected via feedback lead 2232 to one input of a two input logical AND gate 2233 whose output is connected via lead 2234 to the second input of the two input NOR gate 2228. Node 2231 is also connected to one current-carrying electrode of a transistor 2235 whose opposite current-carrying electrode is connected directly to one input of a two input logical AND gate 2236. The gate electrode of transistor 2235 is connected to receive the second master clock phase signal $H_2$. The second input to logical AND gate 2236 is connected to receive the clock signal $h_3$ which is outputted via lead 1058 from the timing signal generator circuit of FIG. 6J as hereinafter described.

The output of the logical AND gate 2236 is connected to one input of the two input NOR gate 2237 whose output is connected directly to one current-carrying electrode of transistor 2238 whose opposite current-carrying electrode is connected directly to the input of an inverter 2239. The output of inverter 2239 is connected directly to a first current-carrying electrode of the transistor 2241 whose opposite current-carrying electrode is connected directly to a node 2242. The gate electrode of transistor 2238 is connected to receive the first master clock phase signals $H_1$ while the gate electrode of transistor 2241 is connected to receive the second phase master clock signals $H_2$. Node 2242 is connected via lead 2243 back to a feedback node 2244 and node 2244 is connected via lead 2245 to one input of a two-input logical AND gate 2246 whose second input is connected to receive the clock signal $\overline{h_3}$ via lead 1063 from the timing generator circuit of FIG. 6J as hereinafter described. The output of AND gate 2246 serves as a second input of the two input NOR gate 2237 previously described.

Furthermore, node 2244 is connected to the input of an inverter 2247 whose output is connected via lead 2248 to the second input of the two input AND gate 2233 previously described.

Node 2242 is also connected directly to one input of a two input NOR gate 2249 whose second input is connected via lead 1068 to the Q output of flip-flop 1067 of the crankshaft position pulse processor circuit of FIG. 4F for receiving the signal G2 which is generated to indicate the first I/O logic iteration after the occurence of a crankshaft position pulse G3 as previously described.

The output of NOR gate 2249 is connected via lead 2251 to output the control signal $j_{10}$ which is a command signal derived from the signals $y_0$ and G2 and which is used to select either $g_{10}$ or T2 depending upon whether it is in a logical one state or a logical zero state, respectively, for connection to the input of the T counter register of FIG. 6C via the transfer logic network of FIG. 6G to be hereinafter described. The output of NOR gate 2249 is also connected to the input of an inverter 2252 whose output is connected directly to one input of a two input logical AND gate 2253 whose output serves as the second input of the two input logical NOR gate 2225 previously described. The output of NOR gate 2249 is also connected via lead 2254 to the second input of the two input AND gate 2224 which serves as the other input of the NOR gate 2225. The second and final input to AND gate 2253 is connected via lead 1768 to receive the signal T2 from the output of the ignition delay storage register of FIG. 6C described hereinabove.

The ignition delay transfer logic circuit of FIG. 6D involves only conventional logic gates which serve to control the transfer of data into the ignition delay counter circuit of FIG. 6E, as hereinafter described, in accordance with various gated control signals, as known in the art.

6.5 Ignition Delay Counter

The ignition delay counter circuitry of block 2115 of FIG. 6 will now be described with reference to the electrical schematic diagram of FIG. 6E. It will initially be mentioned that the circuit will not be described in great detail since it is substantially identical to the configuration of the serial shift register 2171, the half adder circuit 2182, and the transistor circuitry associated with the output thereof of the number one fuel pulse counter of FIG. 6B described in considerable detail hereinabove. The serial binary word T3 outputted from the circuit of FIG. 6D via lead 2226 is supplied to the data input $D_i$ of a sixteen stage serial shift register 2261 similar to the sixteen stage serial shift register 2171 of FIG. 6B. Again, the shift register 2261 is comprised of sixteen individual shift register stages, each of which could be, for example, a two phase dynamic flip-flop as illustrated in FIGS. 9.22A and 9.22B, previously described.

Each of the individual stages of shift register 2261 has a data input $D_i$, a non-inverting output Q, an inverting output $\overline{Q}$, and a first clock phase input $h_a$ connected to receive the first master clock phase signals $H_1$ and a second clock phase input $h_b$ adapted to receive the second master clock phase signals $H_2$, as known in the art. Furthermore, the Q output of each more significant stage is connected directly to the data input $D_i$ of the next less significant stage to form a shift register as previously described. As in the register previously described, the register having the $\overline{Q_{16}}$ output is the most significant stage or bit position and is adapted to receive the signal T3 via lead 2226 into the data input $D_i$ thereof while the least significant stage has its $Q_1$ output connected directly to the $i_a$ input of a half adder circuit 2262.

Unlike the fuel phase counters previously described, the ignition delay counter uses all sixteen bits of the binary number stored in the parallel-to-serial registers 1732 and 1733 of FIG. 5H and has sixteen microseconds rather than eight microsecond resolutions. All of the $\overline{Q}$ outputs of the sixteen stages of the register 2261 serve as inputs to a sixteen input decoding network comprising a NOR gate represented by the horizontal line 2263 in accordance with the ROM notation set forth in FIG. 9 as previously described. The NOR gate 2263 has an output node 2264 which is commonly connected to the gate electrode and one current-carrying electrode of a pull-up transistor 2265 whose opposite current-carrying electrode is connected directly to a +5 volt source of potential for insuring proper logic levels at the output thereof. Output node 2264 is used to transmit or output the signal $c_{10}$ to the transfer logic circuit of FIG. 6G as hereinafter described, via lead 2266. The signal $c_{10}$ is a signal which is at a logical "1" when the signals stored in all sixteen stages of the ignition delay register 2261 are high so that the Q outputs all present lows to the sixteen inputs of the NOR gate 2263 causing the output at node 2264 to go high.

The half adder circuit 2262 is identical to the half adder 2182 of FIG. 6B and may be further understood by referring the explanation given with respect thereto and by reference to the block diagram and schematic diagram of FIGS. 9.29A and 9.29B, respectively. The $\overline{S_u}$ output of the half adder 2262 outputs the counter output signal $g_{10}$ to the transfer circuit of FIG. 6D via output lead 2223. The inverted carry output $\overline{C_y}$ is connected directly to a first current-carrying electrode of a transistor 2267 whose opposite current-carrying electrode is connected directly to the gate electrode of a transistor 2268. One current-carrying electrode of transistor 2268 is connected directly to ground while the opposite current-carrying electrode is connected directly to the first current-carrying electrode of a second series transistor 2269 whose opposite current-carrying electrode is connected to a node 2271. Node 2271 is commonly connected to the gate electrode and one current-carrying electrode of a pull-up transistor 2272 whose opposite current-carrying electrode is connected directly to a +5 volt source of potential. Simultaneously, the output node 2271 is connected to a first current-carrying electrode of a transistor 2273 whose opposite current-carrying electrode is connected back to the second half adder input $i_b$ via lead 2274. The gate electrode of transistor 2269 is connected directly to one current-carrying electrode of a transistor 2274 whose opposite current-carrying electrode is connected via lead 1063 to receive the clock signal $\overline{h_3}$ from the timing generator of FIG. 6J as hereinafter described. The gate electrode of transistors 2267 and 2274 are connected to receive the first master clock phase signals $H_1$ while the gate electrode of transistor 2273 is connected to receive the second master clock phase signal $H_2$.

As previously indicated, the basic operation of the ignition delay counter circuitry of FIG. 6E in conjunction with the transfer gating circuitry of FIG. 6D is substantially identical to that of the first fuel pulse counter circuitry of FIG. 6B and the threshold logic network 1780 of FIG. 5H and will not be described in further detail herein.

6.6 Ignition Pulse-Width Storage Register

The ignition pulse-width storage register of block 2116 of FIG. 6 will now be described with reference to the schematic diagram of FIG. 6F. The ignition pulse-width storage register of FIG. 6F is substantially identical to the ignition delay storage register of FIG. 6C and will not be described in great detail.

The ignition pulse-width storage register of FIG. 6F comprises a sixteen stage serial shift register 2281 comprised of sixteen individual shift register stages. In the preferred embodiment of the present invention, each of the individual stages could be a two phase dynamic flip-flop such as that illustrated in FIGS. 9.22A and 9.22B. Each of the individual stages includes a first clock phase input $h_a$ connected to receive the first master clock pulses $H_1$ and a second clock phase input $h_b$ connected to receive the second master clock phase signals $H_2$. Furthermore, each of the individual stages of the storage register 2281 has a data input $D_1$, a non-inverting output Q, and an inverting output $\overline{Q}$. As conventionally known, the Q output of each more significant stage of the register 2281 is connected directly to the data input $D_i$ of the next significant stage so as to form a conventional shift register. Furthermore, the binary coded serial word representing the ignition output width is represented by the signal U which is inputted via lead 2282 to the data input $D_i$ of the sixteenth and most significant stage of the shift register 2281, as known in the art. The $Q_1$ output of the least significant or last stage of the storage register 2281 is connected directly to the input of an inverter 2283 whose output is connected to a lead 2284 to output the signal U2 which represents the output of the storage register used to retain U. The operation of the ignition pulse-width storage register of FIG. 6F is identical to that of the ignition delay storage register of FIG. 6C and will not be described further herein.

6.7 Ignition Pulse-Width Transfer Logic

The transfer logic circuitry of block 2117 which is associated with the output of the ignition pulse-width storage register of FIG. 6F will now be described with reference to the schematic diagram of FIG. 6G. The transfer logic diagram of FIG. 6G utilizes some of the signals defined with respect to the transfer logic of FIG. 6D and the definitions will not be repeated herein.

The G2 signal indicating the first I/O logic iteration after the occurence of a crankshaft position pulse is inputted via lead 1068 to a first input of a two input logical AND gate 2285 which forms part of a gating network such as that defined in FIG. 9.15A in the schematic diagram of FIG. 9.15B and this logic network will be referred to generally by the reference numeral 2286. The output of the logic network 2286 is inputted to a second logic network represented generally by reference numeral 2287 which may be, for example, a three input NOR, two input NOR/two input AND gate combination as depicted in the logic diagram of FIG. 9.18A and the schematic diagram of FIG. 9.18B. Lastly, the output of the logic network 2287 is connected through a transistor network to a third logic gating network referred generally by reference numeral 2288 which may be, for example, a conventional dual two input AND/two input NOR gate combination as set forth in the logic diagram of FIG. 9.12A and the schematic diagram of FIG. 9.12B.

The signal $j_{10}$ which was taken from the output of NOR gate 2249 of FIG. 6D is connected via lead 2251 to one inverted input of a two input AND gate 2289 and the second inverted input of the two input AND gate 2289 is supplied with the clock signal $\overline{h_3}$ from the timing generator of FIG. 6J to be hereinafter described via lead 1063 and clock input node 2291. The output of AND gate 2289 is connected directly to a node 2292 and node 2292 is connected simultaneously to the set input of a clocked RS flip-flop 2293 and, via lead 2294 to one inverted input of logical AND gate 2295 having four inverted inputs.

The clocked RS flip-flop 2293 may be, for example, of the type illustrated in the logic diagram of FIG. 9.21A and the schematic diagram of FIG. 9.21B. The clocked RS flip-flop 2293 has a set input S, a reset input R, a direct reset input DR, a first clock phase input C connected to receive the first master clock phase signals $H_1$, a second clock phase input $\overline{C}$ connected to receive the second master clock phase signals $H_2$, an inverting output $\overline{Q}$ and a non-inverting output Q. In the embodiment of FIG. 6G, the direct reset input of RS flip-flop 2293 is connected to receive the $v_0$ signal from the reset control circuit of FIG. 5A via lead 2068 as previously described and the reset input is connected directly to the output of the four input AND gate 2295. A second inverted input of AND gate 2295 is connected directly to the clock input node 2291 for receiving the clock signals $\overline{h_3}$ which are inputted thereto via lead 1063 from the timing generator circuitry of FIG. 6J to be hereinafter described. The third inverted input of AND gate 2295 is connected directly to the output of an inverter 2296 whose input is connected to a node 2297.

The one's detect signal $C_{10}$ which is generated by the NOR gate decoding network 2263 of the ignition delay counter circuit of FIG. 6E is supplied via lead 2266 to input node 2297. Node 2297 also supplies the signal $c_{10}$ via lead 2298 to one input of a three input AND gate 2299 which forms part of the gating network 2286 previously described. Lastly, the ignition switch signal conditioned to digital logic signal levels, J1 which is taken from the Q output of flip-flop 1858 of the status input circuit of FIG. 5I as previously described is supplied via lead 436 to input node 2301. Node 2301 supplies the signal J1 to the fourth and final inverted input of AND gate 2295 via lead 2302 and similarly supplies the signal J1 via lead 2303 to another node 2304. Node 2304 is connected to the input of an inverter 2305 whose output is connected directly to a second input of the three input AND gate 2299 of gating network 2286. Node 2304 is also connected via lead 2306 to the first input of a logical OR gate 2307 whose second input is taken from a node 2308. Node 2308 is connected via lead 2309 to the Q output of the RS clocked flip-flop 2293 for receiving the output therefrom. Node 2308 is also connected via lad 2311 to the third and final input of the three input AND gate 2299.

In the logic network 2286, the output of the two input OR gate 2307 is connected as one input of the two input AND gate 2285 and the output of AND gate 2285 is connected as on input of a two input NOR gate 2312 whose other input is taken from the output of the three input AND gate 2299. The output of NOR gate 2312 and hence the output of the gating network 2286 is connected via lead 2313 to one inverted input of a logical AND gate 2314 having three inverted inputs. The AND gate 2314 is part of the gating network 2287 previously described. The second inverted input of AND gate 2314 is connected via lead 1063 to receive the clock signal $\overline{h_3}$ from the timing generator circuit of FIG. 6J as hereinafter descried and the third and final inverted input of AND gate 2314 receives the signal $d_{10}$ from the ignition control circuit of FIG. 61 as hereinafter described via lead 2315 and the output of the three input AND gate 2314 serves as one input to a two input logical OR gate 2316. The other input of the logical OR gate 2316 is taken from the output of the logical AND gate 2317 having two inverted inputs. One inverted input of AND gate 2317 is connected to receive the clock signal $h_3$ from the timing generator of FIG. 6J via lead 1058. The output of the logical OR gate 2316 forms the output of the gating network 2287 and is connected directly to the first current-carrying electrode of a first series transistor 2318. The second current-carrying electrode of transistor 2318 is connected directly to the input of an inverter 2319 whose output is connected directly to a first current-carrying electrode of a second series transistor 2321. The second current-carrying electrode of the second series transistor 2321 is connected directly to a node 2322 and node 2322 is fed back via lead 2323 to the second and final inverted input of the logical AND gate 2317 of the gating network 2287 previously described.

Node 2322 is also connected directly to the input of an inverter 2324 whose output is connected to a node 2325. Node 2325 is connected directly to one input of a logical AND gate 2326 having two inputs and the otherinput of AND gate 2326 receives the storage output signal U2 from the ignition pulse-width storage register of FIG. 6F descried hereinabove via lead 2284. AND gate 2326 forms one part of the third and final gating circuit 2288 of the circuit of FIG. 6G. Node 2325 is also connected to the input of an inverter 2327 whose output is connected to a node 2328. Output node 2328 is connected simultaneously to one input of a two input logical AND gate 2329 and also outputs the command signal $i_{10}$ on lead 2331 for selecting the signal $k_{10}$ or U2 as the $e_{10}$ input of the ignition pulse-width counter of FIG. 6H as hereinafter described. The second input of the two input AND gate 2329 is supplied via lead 2332 from the output of the half adder circuit associated with the ignition pulse-width counter of FIG. 6H as hereinafter described. The output of the two input AND gate 2329 is connected as one input of a two input NOR gate 2333 whose second input is taken directly from the output of the two input AND gate 2326. The output of NOR gate 2333 and therefore the output of the logic network 2288 is connected to one current-carrying electrode of a reset transistor 2334 whose opposite current-carrying electrode is connected to ground and whose gate electrode receives the reset signal $v_0$ from the reset control circuit of FIG. 5A via lead 2068. The output of NOR gate 2333 is the control signal $e_{10}$ which is used as the input to the ignition pulse-width counter of FIG. 6H as hereinafter described and is outputted thereto via lead 2335.

As with the transfer logic circuit of FIG. 6D, the transfer logic circuit of FIG. 6G is made up of conventional logic gates and the RS flip-flop 2293 and the operation thereof is readily discernable to one of ordinary skill in the art, particularly being given the signal definitions and the purposes for which the transfer logic networks are used. No more detailed description of the circuit of FIG. 6G will be given but reference may be had to the operation thereof for explaining the origin of various signals used hereinafter.

6.8 Ignition Pulse-Width Counter

The ignition pulse-width counter circuit of block 2118 will now be described with reference to the electrical schemtic diagram of FIG. 6H. As indicated previously with respect to the ignition delay counter of FIG. 6E, no detailed description of the circuitry or operation of the ignition pulse-width counter circuit of FIG. 6H will be given since it includes a sixteen stage serial shift register 2336, a half adder circuit 2337, and flip-flop type transistor means associated with the output of the half adder circuit 2337 which are substantially identical, in structure and operation, to the corresponding number one fuel pulse shift register 2176, half adder 2182, and transistor circuitry associated with the output thereof which was previously described in considerable detail with respect to the fuel pulse counters of FIG. 6B.

The sixteen stage serial shift register 2336 includes sixteen separate shift register stages each of which may include a two phase dynamic flip-flop as illustrated in the logic diagram of FIG. 9.22A and as further defined in the electrical schematic diagram of FIG. 9.22B. Each of the shift register stages of the register 2336 includes a first clock phase input $h_a$ connected to receive first master clock phase signals $H_1$, a second clock phase input $h_b$ connected to receive the second master clock phase signals $H_2$, a data signal input $D_i$, a non-inverting Q output, and an inverting output $\overline{Q}$. As conventionally known and previously described herein, a non-inverting Q output of each more significant stage is directly connected to the $D_i$ data input of the next less significant stage of the counter with the most significant or sixteenth stage of the counter having its data input $D_i$ connected to receive the serial binary word $e_{10}$ from the transfer logic circuit of FIG. 6G via lead 2335 as previously described. The last or least significant stage of the shift register 2336 has its non-inverting $Q_1$ output connected directly to the first or primary input $i_a$ of the half adder circuit 2337. As with the ignition delay counter of FIG. 6E, the ignition pulse-width counter of FIG. 6H differs from the fuel pulse counters of FIG. 6B in that sixteen microsecond resolutions than eight microsecond resolution is used. Furthermore, as described with respect to the ignition delay counter of FIG. 6E, an all ones detection circuit 2338 is used with the shift register 2336 for detecting an all ones condition therein. The ones detection circuit includes a sixteen input NOR gate represented generally by the reference numeral 2338 and each of the $\overline{Q}$ or inverting outputs of the sixteen stages of the register 2336 serve as one input of the NOR gate 2338.

As previously noted, the ROM notation of FIG. 9 has been used to define the decoding network. The output of NOR gate 2338 is taken from node 2339 and node 2339 is connected to one current-carrying electrode and the gate electrode of a pull-up transistor 2341 whose opposite current-carrying electrode is connected to a +5 volt source of potential to insure the maintenance of proper voltage levels, as known in the art. Output node 2339 supplies the signal $f_{10}$ to the ignition control circuit of FIG. 61, as hereinafter described, via lead 2342. The signal $f_{10}$ is a signal indicating when all of the stages of the ignition pulse-width register 2336 are set or are storing a logical one and otherwise the signal is low. When all stages of the register 2336 contain a logical one, the $\overline{Q}$ output thereof will present a zero to its corresponding input of NOR gate 2338 and with all of the inputs low, the output of NOR gate 2338 which is taken from node 2339 will cause the signal $f_{10}$ to go high, as known in the art.

The inverted summing output $\overline{S_u}$ of the half adder circuit 2337 is connected via lead 2332 to the transfer logic circuit of FIG. 6G as previously described. The inverted carry output $\overline{C_y}$ is connected directly to one current-carrying electrode of a transistor 2343 whose opposite current-carrying electrode is connected directly to the gate electrode of a first series connected transistor 2344. One current-carrying electrode of the transistor 2344 is connected directly to ground while the opposite current-carrying electrode is connected directly to the first current-carrying electrode of a second series connected transistor 2345 whose opposite current-carrying electrode is connected directly to an output node 2346. Output node 2346 is commonly coupled to the gate electrode and one current-carrying electrode of a pull-up transistor 2347 whose opposite current-carrying electrode is connected directly to a +5 volt source of potential. The output node 2346 is also connected to a first current-carrying electrode of the transistor 2348 whose opposite current-carrying electrode is connected to the secondary input $i_b$ of the half adder 2337 via lead 2349. The gate electrode of transistor 2345 is connected to one current-carrying electrode of a transistor 2351 whose opposite current-carrying electrode is connected via lead 1063 to receive the clock signal $\overline{h_3}$. The gate electrode of transistors 2343 and 2351 are connected to receive the first master clock phase signals $H_1$ while the gate electrode of transistor 2348 is connected to receive the second master clock phase signal $H_2$. As previously stated, the operation of the ignition pulse-width counter of FIG. 6H is substantially identical to that previously described and will not be repeated herein.

6.9 Ignition Control Circuit

The ignition control circuitry of block 2119 of FIG. 6 will now be described with reference to the electrical schematic diagram of FIG. 6I. The ignition control circuit of FIG. 6I includes a clocked RS flip-flop 2351 for generating a signal commanding the ignition firing circuit to turn on to produce a spark for ignition purposes, as known in the art. The flip-flop 2351 may be referred to as an ignition firing pulse on flip-flop 2351. In the preferred embodiment of the present invention, it is a clocked RS flip-flop as set forth in the logic illustration of FIG. 9.21A and the schematic diagram of FIG. 9.21B. The flip-flop 2351 includes a set input S, a reset input R, a direct reset input DR, a non-inverting output Q, an inverting output $\overline{Q}$, a first clock phase input $\overline{C}$ connected to receive the first master clock phase signal $H_1$, and a second clock phase input C connected to receive the second master clock phase signals $H_2$.

In the circuit of FIG. 6I, the control signal $i_{10}$ is supplied via lead 2331 from the ignition pulse-width transfer logic of FIG. 6G, as previously described, to one inverted input of a logical AND gate 2352 having three inverted inputs. The second inverted input of the logical AND gate 2352 is connected directly to a clock input node 2354 which receives the clock signal $\overline{h_3}$ from the timing generator of FIG. 6J, as hereinafter described, via lead 1063. Node 2354 also supplies the $\overline{h_3}$ clock signals inputted via lead 1063 to the first inverted input of the logical AND gate 2355 having two inverted inputs. The second inverted input of the logical AND gate 2355 is connected directly to the output of inverter 2356 whose input is connected for receiving the control signal $f_{10}$ from the output of the decoding network 2338 of the ignition pulse-width counter circuit of FIG. 6H via lead 2342. The output of the two input AND gate 2355 is connected directly to node 2357 and node 2357 is connected simultaneously to the reset input R of the RS clocked flip-flop 2351 and via lead 2358 is connected to the third and final inverted input of the three input AND gate 2352. The output of AND gate 2352 is connected directly to the set input S of the ignition firing pulse on flip-flop 2351 as previously described.

The direct reset input DR is connected to receive the reset signal $v_0$ from the reset control circuit of FIG. 5A, as previously described, via lead 2068. The non-inverting Q output of the ignition firing control flip-flop 2351 is connected directly to the node 2359. Node 2359 is connected to a first Q switch contact 2361 and simultaneously to a second Q switch contact 2362. Further, the Q output node 2359 is connected via lead 2315 to the second logical gating network 2287 of the transfer logic of FIG. 6G as previously described. The inverting output $\overline{Q}$ of the ignition firing pulse control flip-flop 2351 is connected directly to a $\overline{Q}$ output node 2363 and output node 2363 is connected directly to a first $\overline{Q}$ switch contact 2364 and to a second $\overline{Q}$ switch contact 2365. A +5 volt source of potential is connected directly to one current-carrying electrode of a first series connected transistor 2366 whose opposite current-carrying electrode is connected to an output node 2367. Output node 2367 is connected to the first current-carrying electrode of a transistor 2368 whose opposite current-carrying electrode is connected to ground. The gate electrode of transistor 2366 is connected directly to a mask-positionable switching arm 2369 which may be selectively positionable between the second Q switch contact 2362 and the first $\overline{Q}$ contact 2364 by conventional LSI techniques. In the preferred embodiment of the present invention, the mask-positionable switching arm 2369 has been selectively positioned to complete a current path between the gate electrode of transistor 2366 and the $\overline{Q}$ output node 2363 via switch arm 2369 and the first $\overline{Q}$ switch contact 2364. Similarly, the gate electrode of transistor 2368 is connected directly to a mask-positionable switching arm 2371 which may be selectively positioned between a first Q switch contact 2361 and a second $\overline{Q}$ switch contact 2365 by conventional LSI techniques. In the preferred embodiment of the present invention, the switching arm 2371 is selectively positioned to complete the current path between the gate electrode of transistor 2368 and the Q output node 2359 of flip-flop 2351 via the mask-positionable switching arm 2371 and the first Q switching contact 2361.

Output node 2367 supplies an ignition control signal TU1 to the power amplifier circuit of FIG. 7, as hereinafter described, via lead 2372 for controlling the operation of a conventional ignition coil. The operation of the ignition control circuit of FIG. 6I is briefly described as follows. When the decoder circuit 2338 at the output of the ignition pulse-width counter of FIG. 6H detects that the contents of the register 2336 have been down-counted to zero, all ones will be stored therein causing all of the $\overline{Q}$ outputs which serve as inputs to the decoder network 2338 to be low. With all of the inputs to the NOR gate 2338 low, the signal $f_{10}$ at output node 2339 goes high and this high is transmitted via lead 2342 to the input of an inverter 2356 whose output goes low to enable AND gate 2355. When the clock signal $\overline{h_3}$ goes low, the output of AND gate 2355 goes high to reset the flip-flop 2351 causing the Q output to go low and the $\overline{Q}$ output to go high. When the Q output is low, transistor 2368 is rendered non-conductive and a high at the $\overline{Q}$ output node 2363 will cause transistor 2366 to conduct so as to connect the output node 2367 to the +5 volt source of potential so as to cause the output signal TU1 on lead 2372 to go high and enable it to energize the ignition coil of FIG. 7 for ignition pulse control purposes.

Whenever the ignition pulse-width counter does not contain all ones, the signal $f_{10}$ is low causing the output of the inverter 2356 to go high so as to disable AND gate 2355 and cause a low to appear at node 2357. The low at node 2357 is transmitted via lead 2358 back to one inverted input of AND gate 2352 whose second inverted input is connected to the clock node 2354 so that it too is enabled whenever the clock signal $\overline{h_3}$ goes low. As soon as the control signal $i_{10}$ which is generated by the ignition pulse-width transfer logic circuit of FIG. 6G goes low, the output of AND gate 2352 goes high to set the ignition control flip-flop 2351 causing the Q output to go high and the $\overline{Q}$ output low. A high at the Q output node 2359 will cause transistor 2368 to conduct while the low at node 2363 will render transistor 2366 non-conductive. When transistor 2368 conducts, the output node 2367 is pulled to ground so as to cause the output signal TU1 on lead 2372 to go low to prevent the generation of an ignition pulse. The operation of the ignition control circuit and the circuits relating thereto will be further understood by referring to the ignition timing diagram of FIG. 6M which shows the relationship between a particular engine event or engine position such as top dead center between adjacent cylinders with the delay time, the dwell pulse-width, and the spark cylinder firing times.

The ignition pulse control circuity comprising the circuits of FIG. 6C through 6I operate briefly as follows. The ignition delay store of FIG. 6C and the ignition pulse-width store of FIG. 6F receive a sixteen bit serial binary data word from the microprocessor 391 of FIG. 5B via the parallel-to-serial converter registers 1732 and 1733 of FIG. 5H as previously described. This data information codes the ignition delay or ignition pulse-width word with a least significant bit weight of sixteen microseconds. Both the ignition delay and the ignition pulse-width numbers are retained in the respective stores of FIGS. 6C and 6F respectively until new information is provided from the microprocessor.

The ignition pulse cycle is initiated by the engine position synchronized pulse G2. Either this signal or a specific decoded command from the microprocessor will effect a transfer of the engine advance angle word to the ignition delay active storage serial data register or counter of FIG. 6E. At the end of the G2 signal, control gates allow an ignition pulse control cycle to begin. The binary word transferred into the ignition delay active storage register or counter of FIG. 6E is decremented during each arithmetic iteration by the half subtractor circuitry previously described and when the ignition delay active storage contents have been reduced to zero, the zero detector flip-flop will be set at the $\overline{h_3}$ thereby enabling the flip-flops for controlling the ignition firing circuit of FIG. 7 and initiating the ignition firing pulse.

The ignition pulse-width transfer logic flip-flop of FIG. 6G is set for one iteration so as to effect the transfer of the ignition pulse-width word from the ignition pulse-width storage register of FIG. 6F into the ignition pulse-width counter of FIG. 6H. The ignition pulse-width word is subsequently decremented during each iteration and when the ignition pulse-width active storage counter of FIG. 6H is again reduced to zero, the zero detection circuit will enable the ignition control flip-flop 2351 of FIG. 6I to be reset causing the output signal TU1 to go high to initiate ignition firing. Simultaneously, the flip-flop 2293 of the transfer logic of FIG. 6G will be reset to inhibit further ignition firing pulse signals to FIG. 7 and to another engine position pulse or computer generated command is received. On the receipt of the next engine position pulse, the entire process is repeated and the particularly important features of the ignition controls will be better understood by referring to the generalized functional description set forth below.

In the unique microprocessor-controlled ignition timing control system for a motor vehicle including ignition delay storage register of FIG. 6C, the transfer logic of FIG. 6D, the ignition delay counter of FIG. 6E, the ignition pulse-width storage register of FIG. 6F, the transfer logic network of FIG. 6E which includes the flip-flop 2293 which indicates when an ignition delay in progress count is being made, the ignition pulse-width counter of FIG. 8 and finally the ignition control circuit of FIG. 6I are unique in many respects. One important feature of the microprocessor based ignition control system of the present invention is that problems previously encountered in other microprocessor based control systems have been avoided. For example, during engine cranking and during large accelerations, it is possible that the computer running the microprocessor might not have enough information or data or may not be able to respond quickly enough to control the ignition timing properly. Also, problems arose since such counters had to be quite large to handle cranking conditions.

The ignition control system of the present invention, as described hereinabove, is mounted on the engine so that an engine position pulse G2 occurs each time one of the cylinders is near the top dead center position, as previously described with respect to FIG. 4F herein, occurs each time one of the cylinders is near the top dead center position. In this way, there are four pulses per revolution on the typical eight cylinder engine in the preferred embodiment of the present invention or as previously discussed, other arrangements are also possible. The ignition control system includes two counters and two holding registers. One set comprises the ignition delay holding register of FIG. 6C and the ignition delay counter of FIG. 6E while the other set includes the ignition pulse-width storage register or holding register of FIG. 4F and the ignition pulse-width counter of FIG. 6H. The first set is used for determining the ignition delay as defined in the timing diagram of FIG. 6M while the second set is used for determining the ignition pulse-width. The microprocessor sends data to the holding registers and the counters take their data from these registers.

If the computer program is not running fast enough to send new data into the holding registers, the previously stored values will still be held there for further use. The spark plugs are controlled by the ignition firing pulse TU1. This pulse starts when the ignition delay is counted down by the ignition delay counter of FIG. 6E and is terminated when the ignition pulse-width time is counted down by the counter of FIG. 6H. Each time a G2 engine pulse occurs, the value in the ignition delay holding register 2221 is transferred into the ignition delay counter of FIG. 6E. The ignition delay counter then counts it down until it reaches zero and the zero decode from the output of NOR gate 2263 initiates the generation of the ignition firing pulse TU1 by setting the ignition control flip-flop 2251 when the count in the ignition delay counter has been counted down to zero to start the ignition firing pulse TU1, a signal is generated which transfers the value in the ignition pulse-width holding register 2281 into the ignition pulse-width counter of FIG. 6H. The ignition delay counter of FIG. 6H then counts down the number transferred thereto until it reaches zero at which point the zero detect output will reset the flip-flop 2351 of FIG. 61 to terminate the ignition firing pulse TU1 as previously described.

Figure 6M:
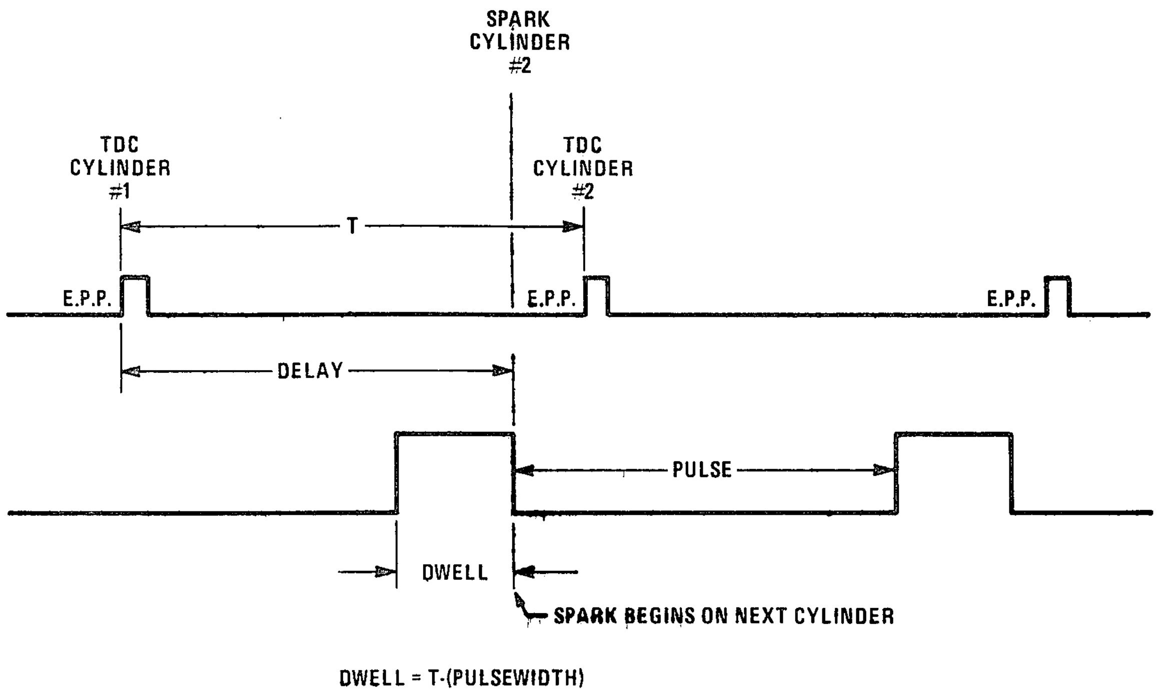
FIG. 6M is an electrical timing diagram for explaining the ignition timing effected by the circuitry of FIG. 6.

During the time of the ignition firing pulse TU1, as seen by the timing diagram of FIG. 6M, the spark is being fired. Between the TU1 pulses, the ignition coil is re-energized to prepare it for the next spark. The unique control logic of the present invention is arranged in such a way that an ignition firing pulse TU1 is started on the next engine position pulse G2 even if the ignition delay counter 2261 is still counting down and has not yet reached zero. This is done by setting the flip-flop 2293 in the transfer logic of FIG. 6G to indicate that the ignition delay counter is still counting down even though the G2 pulse has arrived. Therefore, an ignition spark will occur at the time that the G2 pulse arrives even if the car should accelerate enough to cause the delay previously calculated by the computer program to be longer than the time between successive G2 pulses or if an erroneous value for delay was originally entered or calculated by the computer. Another control circuit causes the ignition firing pulse TU1 to occur at the time of the G2 pulse during engine cranking periods of operation. This allows the two counters and the two holding registers previously described to have far fewer bits than would normally be required since they do not have to be able to count the long time inervals which occur at various low RPM's during cranking operations. The ignition delay counter of FIG. 6E and the ignition pulse-width counter of FIG. 6H can therefore be made or implemented with a very small number of stages and yet have their required high resolution required for precision ignition timing controls.

6.10 Timing Generator Circuitry

The timing generator circuitry of block 2120 of FIG. 6 will now be described with reference to the schematic diagram of FIG. 6J. The first clock phase signals from the master clock oscillator of FIG. 8 are supplied by the input lead designated $H_1$ directly to one input of a two input NOR gate 2381 whose output is connected directly to the direct set DS input of the first stage of a four stage shift register counter 2382 as hereinafter described. The first stage of the shift register counter 2382 is, in the preferred embodiment of the present invention, a two phase dynamic flip-flop as illustrated in the logic diagram of FIG. 9.28A and is more thoroughly described in the schematic diagram of FIG. 9.28B. The two phase dynamic flip-flop making up the first stage of the shift register counter 2382 has a data input $D_i$, a direct set input DS, a direct reset input DR, a first clock phase input $h_a$ connected to receive the $H_2$ master clock phase signals from the master clock oscillator of FIG. 8, a second clock phase input $h_b$ connected to receive the first master clock phase signals $H_1$ from the clock oscillator to FIG. 8, and a non-inverting output Q. The first or input stage of the dynamic shift register counter 2382 of FIG. 6J as its output designated $Q_a$.

The remaining three stages of the shift register counter 2382 comprise, in the preferred embodiment of the present invention, simple two phase dynamic flip-flops such as those illustrated in FIGS. 9.24A and B and each has a first master clock phase input $h_a$ for receiving the master clock signals $H_2$, a second clock phase input $h_b$ for receiving the first master clock phase signals $H_1$, a direct reset input DR, a data input labeled DS in the diagrams of FIG. 9.24 but corresponding to the data input BI of the first stage rather than to a direct set input, and each stage includes a non-inverting output Q.

The second, third and fourth stages of the counter 2282 have their outputs labeled $Q_b$, $Q_c$, and $Q_d$, respectively.

As known in the art, the shift register of the counter 2382 has the four stages connected together, such that the $h_a$ clock inputs of each stage are commonly connected to receive the master clock phase signal $H_2$, the $h_b$ clock input of each stage is commonly connected to receive the first master clock signals $H_1$; and in direct reset inputs DR of each of the stages are commonly connected together to receive the power on reset signal $v_o$ via lead 2068 which is generated in the reset control circuit of FIG. 5A, as previously described. The first stage of the shift register counter 2382 has its direct set input connected directly to the output of NOR gate 2381 while the remaining three stages have no corresponding input or at least no need for one in the embodiment described herein. The data input $D_i$ of the first stage of the counter is connected to receive input signals via input lead 2383 and the $Q_a$ output of the first stage is connected directly to the data input of the second stage. Correspondingly, the $Q_b$ output of the second stage is connected directly to the data input of the third stage while the $Q_c$ output of the third stage is connected directly to the data input of the fourth and final stage, as known in the art.

A decoding network represented generally by the reference numeral 2384 is associated with the output of the shift register counter 2382, and, as previously described, the various decoding gates control the operation of the shift register 2382 so as to cause it to function as a counter, as hereinafter described. The $Q_a$ output of the first counter stage is connected directly to a $Q_a$ output node 2385$_a$. Similarly, the $Q_b$ output of the second stage is connected to a $Q_b$ output node 2385$_b$; the $Q_c$ output of the third stage is connected directly to output node 2385$_c$; and the $Q_d$ output of the fourth and final shift register stage is connected directly to the $Q_d$ output node 2385$_d$. The vertical line extending generally downwardly from the node 2385$_a$ and represented by reference numeral 2386$_a$ is an output lead used to supply a non-inverting output $Q_A$ from node 2385$_a$ to various gates of the decoding logic network represented by the reference numeral 2384 as hereinafter described. Similarly, the inverted output of the dynamic flip-flop comprising the first stage of the shift register 2382 is represented or generated at the output of an inverter 2387$_a$ whose input is connected directly to the $Q_a$ output node 2385$_a$ and whose $\overline{Q_a}$ output is represented by the vertically descending lead line designated 2388$_a$ for supplying the $\overline{Q_a}$ signals to the decoding network 2384, as known in the art.

Similarly, the $Q_B$ output of the second stage of the shift register counter 2383 is represented by the vertical line designated by the reference numeral 2386$_b$. The $\overline{Q_B}$ output is taken from the output of the inverter 2387$_b$ which is represented by the vertical line 2388$_b$. Likewise, node 2385$_c$ supplies the $Q_c$ output signals to the decoding network 2384 via the lead represented by the vertical line 2386$_c$ while the $\overline{Q_c}$ output is taken from the output of inverter 2387$_c$ and represented by the vertical line 2388$_c$. Lastly, output node 2385$_d$ supplies the output signal $Q_d$ to the decoding logic network 2384 via the vertical lead line 2386$_a$ while the $\overline{Q_d}$ output is taken from the output of inverter 2387$_d$ and represented by the vertical line 2388$_d$.

As previously described, each of the seven horizontal lines 2391, 2392, 2393, 2394, 2395, 2395, 2396, 2397, and 2398 represent logical NOR gates as previously described, as does the vertical line 2398. The circled intersections of the horizontal lines 2392 through 2398 with the vertical NOR gate line 2398 and the non-inverting output leads $2386_a$ through $2386_d$ and the inverted output leads $2388_a$ through $2388_d$ in accordance with the ROM convention, previously defined and set forth in the definitional diagram of FIG. 9.

The first horizontal line 2392 represents a four input NOR gate having at its inputs, the inverted outputs of the shift register 2382, i.e., $\overline{Q_a}$, $\overline{Q_b}$, $\overline{Q_c}$, $\overline{Q_d}$, via output leads $2388_a$, $2388_b$, $2388_c$, and $2388_d$, respectively. The output of the four input ones detection NOR gate 2392 is connected as one input to three input NOR gate represented by vertical line 2398 whose output feeds the data input $D_i$ of the first stage of the shift register 2382 via lead 2383, as previously described.

The second horizontal line 2393 represents a two input NOR gate 2393 whose output serves as the second input to NOR gate 2398 and it has, as its inputs, the signals $Q_c$ and $\overline{Q_d}$ from the corresponding outputs of the shift register count 2382. Horizontal line 2394 represents another two input NOR gate whose output serves as the third and final input to the three input NOR gate 2398 and it has, as its inputs, the signals $\overline{Q_c}$, and $Q_d$. NOR gates 2393 and 2394 form an exclusive NOR combination which, together with the ones detect NOR gate 2392, cause the NOR gate 2388 to control the operation of the shift stage counter 2382 such that a one is supplied to the data input $D_i$ of the first stage while the contents of each of the stages is shifted to the next stage so long as any of the outputs of NOR gates 2392, 2393 and 2394 remain high, which is normally the case since one or more of their inputs are normally high. However, when all of the inputs to NOR gate 2398 are low, a logical zero is supplied to the $D_i$ input of the first stage of the register 2382 and the operation thereof will be further understood by referring to the state table of FIG. 6J1 which shows the sequence of operations of the counter of FIG. 6J.

A fourth NOR gate represented by lead 2395 also is operable for changing the normal operating sequence thereof, as described hereinbelow. The NOR gate 2385 is a four input NOR gate having, as its inputs, the counter signals $\overline{Q_a}$, $\overline{Q_b}$, $\overline{Q_c}$, and $Q_d$. Therefore, NOR gate 2395 serves to detect the stored count 1110 within the counter 2382 and responds thereto for overriding the action of NOR gate 2394 which would normally force a logical zero to be supplied to the $D_i$ data input as follows. The output of the four input NOR gate 2395 is supplied to one current-carrying electrode of a transistor 2399 whose opposite current-carrying electrode is connected to the input of an inverter 2401. The output of inverter 2401 is connected via lead 2402 to serve as the second input of the two input NOR gate 2381, previously described. The opposite input of NOR gate 2381 is connected to receive the first master clock phase signal $H_1$ as is the gate electrode of transistor 2399 from the master clock oscillator circuit of FIG. 8, as hereinafter described.

As described hereinabove, the output of the decoding NOR gate 2396 is connected to an input node 2403. Node 2403 is connected directly to the set input of a clocked RS flip-flop 2405 and simultaneously to the input of an inverter 2406 whose output is connected directly to the reset input of flip-flop 2405. Likewise, the output node 2404 from the output of decoding NOR gate 2397 is connected directly to the set input of a second clocked RS flip-flop 2407 and to the input of an inverter 2408 whose output is connected directly to the reset input thereof. In the preferred embodiment of the present invention, clocked RS flip-flops 2405 and 2407 are of the type illustrated in the logic diagram of FIG. 9.21A and as further described in the electrical schematic diagram of FIG. 9.21B, but both the structure and operation thereof are conventional. Each RS flip-flop 2405 and 2407, has a first clock phase input C connected to receive the first master clock phase signals $H_1$ from the master oscillator circuit of FIG. 8, as hereinafter described, and a second clock phase input $\overline{C}$ connected to receive the second master clock phase signals $H_2$ therefrom. Similarly, each flip-flop 2405 and 2407 has a set input S, a reset input R, a direct reset input DR which is connected to receive the reset signal $v_o$ via lead 2068 from the reset control circuit of FIG. 5A, as previously described, and each flip-flop has a non-inverted output Q and an inverted output $\overline{Q}$.

The $\overline{Q}$ output of the RS flip-flop 2405 is connected directly to the gate electrode of a depletion mode transistor 2409 having one current-carrying electrode connected directly to a +5 volt source of potential and its opposite current-carrying electrode connected to an output node 2411. Node 2411 is further connected to a first current-carrying electrode of a second transistor 2412 whose opposite current-carrying electrode is connected directly to ground. The gate electrode of transistor 2142 is connected to the non-inverting Q output of RS flip-flop 2405 and output node 2414 is used to supply the clock signal $h_4$ to various circuits including the pulse-width control flip-flop circuitry of FIG. 6L via output lead 2413.

The operation of flip-flop 2405 to generate the signal $h_4$ will be described as follows. The clock signal $h_4$ is a logic clock pulse occurring in each inked master clock pulses and synchronize with the clock signal $h_3$. Since the decoder NOR gate 2386 detects the count state 01X1 of the counter register 2382, and since this count occurs once every inked count, as indicated in the count state table of FIG. 6J, the output of NOR gate 2396 will go high for one clock time on every eighth count. Therefore, the signal at node 2303 will go high for one clock time every eight counts and cause the setting of RS flip-flop 2405. When RS flip-flop 2405 is set, the $\overline{Q}$ output goes low to turn off the normally conducting transistor 2409 and the Q output goes high to turn on transistor 2412 and pull output node 2411 to ground. Therefore, the normally high $H_4$ signal will go low when the flip-flop 2404 is set. One clock time later, a different count exists in the register 2382 and, therefore, the output of NOR gate 2396 at node 2403 is low. The low from node 2403 is inverted by the action of inverter 2406 to supply a high signal to the reset input of flip-flop 2405 thereby, causing it to be immediately reset one clock time after it was initially set. When RS flip-flop 2405 is reset, transistor 2409 is again rendered conductive by the high at the Q output while the low at the Q output causes transistor 2412 to be rendered non-conductive. When transistor 2409 conducts, node 2415 goes high causing the clock signal $h_4$ outputted on lead 2413 to be restored to its normally high state until, seven counts later, NOR gate 2396 again detects the count state 01X1 to again set flip-flop 2405, as previously described.

Similarly, the Q output of RS flip-flop 2407 is connected directly to a Q output node 2414 and node 2414 is connected directly to the gate electrode of a first depletion mode transistor 2415 and to the gate electrode of an enhancement mode transistor 2416. The depletion mode transistor 2145, which is normally conductive, has one current-carrying electrode connected directly to a +5 volt source of potential and its opposite current-carrying electrode connected directly to a first output node 2417. Output node 2147 is also connected to one current-carrying electrode of a transistor 2418 whose opposite current-carrying electrode is connected directly to ground.

Similarly, transistor 2416 has one current-carrying electrode connected directly to ground and its opposite current-carrying electrode connected to a second output node 2419. Output node 2419 is connected to one current-carrying electrode of a depletion mode transistor 2421 whose opposite current-carrying electrode is connected to a +5 volt source of potential. The $\overline{Q}$ output of the RS flip-flop 2407 is connected directly to a $\overline{Q}$ output node 2422 and node 2422 is connected simultaneously to the gate electrode of transistors 2418 and 2421 for controlling the operation thereof. The first output node 2417 is used to output the clock signal $h_3$ to many of the circuits previously described via lead 1058 while the second output node 2419 is used to output the previously used clock signal $\overline{h_3}$ via lead 1063.

The clock signal $h_3$ is a positive-going logic clock pulse having a pulse duration of one master clock time which is generated once each 16 master clock pulses, as hereinafter described. This signal is used to synchronize all serial operations in the I/O circuits, previously described and the second clock signal $\overline{h_3}$ is a logic clock pulse which goes high for the remaining 15 counts following each $h_3$ clock pulse.

The generation of the clock pulses $h_3$ and $\overline{h_3}$ will now be briefly described. When the four input decoding NOR gate 2397 detects the count 0101 within the four stage shift register counter 2382, which occurs once each count cycle and, therefore, once for each 16 master clock times, its output will go high causing a high to appear at node 2404. The high at node 2404 will set RS flip-flop 2407 causing the Q output to go high and the $\overline{Q}$ output to go low. The low from the $\overline{Q}$ output serves to turn off transistors 2418 and 2421 while the high at the Q output node 2414 serves to turn on transistors 2415 and 2416. When transistor 2415 is turned on, the +5 volt source is connected to the first output node 2416 causing the signal $h_3$ to immediately go high since grounding transistor 2418 is held non-conductive by the low at its gate electrode from node 2422.

Similarly, since the low at 2422 holds transistor 2421 non-conducting, the high at output node 2414 will cause a grounding transistor 2416 to conduct so as to pull node 2419 to ground and cause the normally high clock signal $\overline{h_3}$ to be pulled low. One clock time later, the count stored in the register 2382 changes and the output of the decoding NOR gate 2397 causes a low to appear at node 2404. The low at node 2404 is inverted by the action of inverter 2408 causing RS flip-flop 2407 to be reset. The resetting of flip-flop 2407 causes the $\overline{Q}$ output to go high and the Q output to go low. Therefore, transistors 2418 and 2421 are rendered conductive while transistors 2415 and 2416 are rendered non-conductive. This results in the first output node 2417 being pulled to ground one clock time after the setting of the RS flip-flop 2407 so that the clock signal $h_3$ had a one clock time positive going duration. Simultaneously, the conduction of transistor 2421 will restore the second output node 2419 to its normally high state so that the output signal $\overline{h_3}$ only remains low for one clock pulse time and then is maintained high for the next 15 clock pulses, i.e., until the RS flip-flop 2407 is again set by a high from the output of the decoder 2497, as known in the art.

6.11 Proportional EGR Counter

The proportional EGR counter circuit of block 2121 of FIG. 6 will now be described with reference to the schematic diagram of FIG. 6K but since it is substantially identical to the counter circuitry employing serial shift registers, half-adders, transistor circuitry associated therewith, transfer gating circuits and control latches, such as those described with reference to the fuel pulse counters of FIG. 6B and the ignition control latch of FIG. 6I, only a brief description will be given herein.

The signal X2 which is the serial binary coded 16 bit signal representing the pulse-width of the proportional EGR signal to a resolution of 16 microseconds is supplied from the transfer gating logic network 1783 of FIG. 5H, as previously described, is inputted via lead $\mathbf{1783_g}$ to the $D_i$ data input of a 16 stage serial shift register 2431 substantially similar to the 16 stage serial shift register 2171 and register 2192 of the fuel pulse counter circuits of FIG. 6B and to the serial shift registers with decoded outputs of FIGS. 6E and 6H, previously described. Each of the 16 stages of the serial shift register 2431 has a first clock phase input $h_a$ connected to receive the first master clock phase signals $H_1$ from the master clock oscillator of FIG. 8, as hereinafter described, and a second clock phase input $h_b$ connected to receive the second master clock phase signals $H_2$ therefrom. Similarly, each of the 16 stages of the register 2431 has a data input $D_i$, and a non-inverting output Q, and an inverting output $\overline{Q}$. The various stages of the serial shift register 2431 are arranged so that the data $X_2$ is supplied to the $D_i$ input of the most significant mid-position or stage of the register 2431 and its output is labeled $\overline{Q_{16}}$. As known in the art, the $\overline{Q_{16}}$ output of the most significant stage is connected directly to the $D_i$ data input of the next less significant stage of the counter and so on until the $Q_2$ output of the second least significant stage of the counter is connected directly to the $D_i$ data input of the least significant stage of the register 2431.

The $Q_1$ output of the least significant stage of the shift register 2431 is connected directly to the primary or augend input $i_a$ of a half-adder circuit 2432, as previously described. As indicated previously, the individual stages of the register 2431 may be, for example, conventional two stage dynamic flip-flops, such as those shown in the logic diagram of FIG. 9.22A and further explained in the detailed schematic diagram of FIG. 9.22B. Furthermore, the half-adder circuit 2432 which has its inputs inverted may be further understood by referring to the logic symbol of FIG. 9.29A and the detailed schematic diagram of FIG. 9.29B but the operation of the individual units is well known in the art.

The 16 stage serial shift register 2431 has associated with the $\overline{Q}$ outputs of each of the stages thereof, a decoding netword comprising a 16 input NOR gate designated by the reference numeral 2433, having each of its 16 inputs coupled to one of the $\overline{Q}$ outputs of the 16 stages of the shift register 2431 for detecting when all ones are stored therein. When all ones are stored in the shift register 2431, the signals present at the $\overline{Q}$ outputs at each of the stages thereof will be low, causing lows to appear at each of the 16 inputs of NOR gate 2433 thereby, causing the output of the NOR gate 2433 which is taken from node 2434 to go high, as an indication of the detection of the all ones condition. As conventionally known, output node 2434 is commonly coupled to the gate electrode and one current-carrying electrode of a transistor 2435 whose opposite current-carrying electrode is connected directly to a +5 volt source of potential for supplying the necessary pull up power or drive to the NOR gate 2439 to insure proper logic levels and the like. The output of NOR gate 2433 which is represented by node 2434 is supplied via lead 2436 to the input of an inverter 2437. The output of inverter 2437 is connected to a first inverted input of a logical AND gate 2438 having two inverted inputs.

The clock signal $\overline{h_3}$ is supplied from the output node 2419 of the timing generator circuit of FIG. 5J via lead 1063 to a clock input node 2439 which is commonly connected to the second inverted input of the two input AND gate 2438 and to one inverted input of a logical AND gate 2441 having three inverted inputs. The signal $i_8$ which represents a command to transfer a number coding $X_2$ from the parallel to serial converter of registers 1732 and 1733 of FIG. 5H is outputted from NAND gates 1748 of the circuit of FIG. 5H via lead 1796, node 1794 and supplied via lead 1799 to the second inverted input of the three input AND gate 2441. The output of the two input AND gate 2438 is connected directly to a node 2442 and node 2442 is connected via lead 2443 back to the third and final inverted input of the three input AND gate 2441. Furthermore, node 2442 is also connected directly to the reset input of a clocked RS flip-flop 2444.

The clock RS flip-flop 2444 is, in the preferred embodiment of the present invention, of the type illustrated in the logic diagram of FIG. 9.20A and further explained in the schematic diagram of FIG. 9.20B. As conventionally known, the RS clock flip-flop 2444 has a first clock phase input $\overline{C}$ which is connected to receive the first master clock phase signals $H_1$ from the master clock oscillator of FIG. 8, as hereinafter described, and the second clock phase input C which is connected to receive the second master clock phase signals $H_2$ therefrom. Furthermore, flip-flop 2444 has a set input S, and reset input R, a direct reset input $\overline{DR}$, a non-inverting Q output and an inverting output $\overline{Q}$.

The reset signal $v_o$ from the reset control circuitry of FIG. 5A is supplied via lead 2068 to the direct reset input of the RS flip-flop 2444 and the set input is connected directly to the output of the three input AND gate 2441, previously described. The non-inverting or Q output of flip-flop 2444 is connected directly to a Q output node 2445 while the inverting output is connected to a $\overline{Q}$ output node 2446. Node 2445 is connected directly to a first non-inverting switch contact 2447 and to a second non-inverting switch contact 2448. Similarly, the $\overline{Q}$ node 2446 is connected directly to a first inverting switch contact 2449 and simultaneously, to a second inverting switch contact 2451.

Associated with the output of the RS flip-flop 2444 is a first series connected transistor 2452 having one current-carrying electrode connected directly to a +5 volt source of potential and its opposite current-carrying electrode connected to an output node 2453. Output node 2453 is connected directly to a first current-carrying electrode of a grounding transistor 2454 whose opposite current-carrying electrode is connected directly to ground. As previously described, with reference to the ignition control circuitry of FIG. 61, the gate electrode of the transistor 2452 is directly connected to a mask-positionable switching arm 2455 which may be selectively positionable between the first non-inverting switch contact 2447 or the second inverting switch contact 2451, as desired, by conventional LSI techniques.

Likewise, the gate electrode of transistor 2454 is directly connected to a mask-positionable switching arm 2456 which may be selectively positionable between a first inverting switching contact 2449 and a second non-inverting switch contact 2448. In the preferred embodiment of FIG. 6K, the switching arm 2455 is positioned so as to complete a current path between the gate electrode of transistor 2452 and the Q output node 2445 via switching arm 2455 and the first non-inverting switch contact 2447. Similarly, the second mask-positionable switching arm is positioned to complete a current path between the gate electrode of transistor of 2454 and the $\overline{Q}$ output node 2446 via switching arm 2456 and the first inverting switching contact 2449.

The output node 2453 is used to output the signal $X_4$ via lead 2457 to appropriate valve driver circuitry for commanding the position thereof as known in the art. The signal $X_4$ is a proportional exhaust gas recirculation (EGR) signal which may be used to command the EGR valve to turn on an amount or for a duration of time proportional to the pulse-width output of the counter circuit of FIG. 6K.

The inverted summation output $\overline{S_u}$ outputs the signal $c_8$ via lead 1788 to the transfer control logic network 1783 of FIG. 5H, as previously described. The signal $c_8$ represents the contents of the $X_2$ storage register 2431 decremented by one by the operation of the circuit combination comprising the series shift register 2431, the half-adder circuit 2432, the transistor circuitry associated with the output thereof, and the transfer logic network 1783, as previously described with respect to the No. 1 fuel pulse counter operation of FIG. 6B.

Similarly, the inverted carry output $\overline{C_y}$ is connected directly to a first current-carrying electrode of a transistor 2458 whose opposite current-carrying electrode is connected to the gate electrode of a first series grounding transistor 2459. The grounding transistor 2459 has its first current-carrying electrode directly connected to ground and its second current-carrying electrode connected directly to the first current-carrying electrode of a second series grounding transistor 2461. The opposite current-carrying electrode of transistor 2461 is connected to an output node 2462. Node 2462 is commonly connected to the gate electrode and a first current-carrying electrode of a pull-up transistor 2463 whose opposite current-carrying electrode is connected directly to a +5 volt source of potential, as previously described. Output node 2462 is also connected to one current-carrying electrode of a transistor 2464 whose outer current-carrying electrode is connected back to the secondary or ADDEND input $i_b$ of the half-adder 2432 via lead 2465. The gate electrode of transistor 2461 is connected to the first current-carrying electrode of a circuit initialization transistor 2466 whose opposite current-carrying electrode is connected via lead 1063 to node 2419 of the timing generator of the circuitry of FIG. 6J for receiving the clock signal $\overline{h_3}$. The gate electrodes of transistors 2458 and 2466 are commonly connected to receive the first master clock phase signals $H_1$ while the gate electrode of transistor 2464 is connected to receive the second master clock phase signal $H_2$ from the master clock oscillator of FIG. 8.

The operation of the proportional EGR counter circuitry of FIG. 6K will not be described, since it is substantially identical to that previously described with respect to fuel injection except that the round off feature is omitted and each bit position has a 16 microsecond resolution rather than an 8 microsecond resolution and, as with the ignition delay counter and the ignition pulse-width counters, and all ones detect decoder circuit 2433 is associated with the output of the shift register counter 2431 rather than the detection circuit used with the fuel pulse counters, previously described.

6.12 Fuel Pulse Control Flip-Flops

The fuel pulse control flip-flop circuitry of block 2122 of FIG. 6 will now be described with reference to the schematic diagram of FIG. 6L. The fuel pulse control flip-flops of FIG. 6L control the duration of the No. 1 and No. 2 fuel pulses in response to the outputs of the fuel pulse counters of FIG. 6B and various other control signals as hereinafter described.

The signal $g_8$ is outputted from the buffer address register 1734 of FIG. 5H via NAND gate 1770, lead 1756, node 1757 and inputted via lead 1793 to one inverted input of a logical AND gate 2471. The other input of the AND gate 2471 is taken from the output of a two input logical OR gate 2472. One inverted input of logical OR gate 2472 is connected via lead 1063 to the timing generator circuitry of FIG. 6G, explained hereinabove, for receiving the clock signal $\overline{h_3}$ therefrom via clock input node 2473. The second input of OR gate 2472 is taken from the output of a two input logical AND gate 2474 having two inverted inputs. One inverted input of the AND gate 2474 is taken via lead 2475 from a clock input node 2476 which is connected via lead 2413 to the timing generator circuit of FIG. 6J for receiving the clock signal $h_4$ therefrom. The other inverted input of AND gate 2474 is connected via lead 2477 to the round-off circuit output node 2478 which serves as the output to the round-off compensation control circuit represented generally by reference numeral 2479, whose function will be hereinafter explained.

The output of the AND gate 2471 is connected directly to an output node 2481 and from there, is connected to both the set input of the No. 1 fuel pulse control flip-flop 2482 and to one inverted input of a logical AND gate 2483 having three inverted inputs. The No. 1 fuel pulse control flip-flop 2482 is a conventional RS clock flip-flop such as that explained previously with respect to FIGS. 9.21 A and B and it includes the following inputs and outputs. A first clock phase input $\overline{C}$ is connected to receive the first master clock phase signals $H_1$ from the master clock oscillator of FIG. 8, as hereinafter explained, and a second clock phase input C which is similarly connected to receive the second master clock phase signals $H_2$ therefrom. Flip-flop 2482 further includes a set input S, a reset input R, a direct reset input BR which is connected to receive the reset signal $v_o$ from the reset control circuit of FIG. 5A via lead 2068, a non-inverting output Q and an inverting output $\overline{Q}$.

The output of the three input AND gate 2483 is connected directly to the reset input of control flip-flop 2482 and a second inverted input of AND gate 2483 is connected directly to a clock input node 2484. Clock input node 2484 is connected via lead 2485 to the previously mentioned clock input node 2743 which receives the clock signals $\overline{h_3}$ from the timing generator circuit of FIG. 6J via lead 1063. The third and final inverted input of the three inverted input AND gate 2483 is connected directly to a node 2486. Node 2486 is connected to the output of an inverter 2487 whose input is connected via lead 2175 to receive the decoder output signal $a_{10}$ from the output of the NOR gate decoder 2172 of the number one fuel pulse counter of FIG. 6B.

The non-inverting Q output of the No. 1 fuel pulse control flip-flop 2482 is connected directly to one input of a logical AND gate 2486 whose opposite input receives the normally high alarm signal $GH_2$ via lead 1126 from the circuit of FIG. 4G, as previously described. The output of AND gate 2486 is connected via lead 2487 to a first switch contact 2488. The inverting output of the fuel pulse control flip-flop 2482 is connected to a $\overline{Q}$ output node 2489. The $\overline{Q}$ output node 2489 is connected directly to a second switch contact 2491 and via lead 2492 is connected to one inverted input of a logical AND gate 2493 having four inverted inputs. A grounding transistor 2494 has one current-carrying electrode connected to ground and its opposite current-carrying electrode connected for outputting the number one fuel pulse control signal $S_2$ therefrom via output lead 2495. The signal $S_2$ is a fuel pulse control signal which remains low for the duration of the fuel pulse number one less 48 microseconds, as hereinafter explained, and when the signal $S_2$ goes high, it commands the external circuitry of FIG. 7 to terminate the fuel pulse.

The gate electrode of transistor 2494 is connected directly to a mask-positionable switching arm 2496 which may be selectively positionable between the first contact 2488 and the second contact 2489 by conventional LSI techniques, as previously described herein. In the preferred embodiment of the present invention, the mask-positionable switching arm 2496 is positioned so as to complete a current path between the gate electrode of grounding transistor 2494 and the output of AND gate 2486 via the switching arm 2496, the first switch contact 2488, and lead 2487.

The output of the four input AND gate 2493 is connected directly to the set input of a second end of fuel pulse number one control flip-flop 2497 which is used for generating a signal $S_3$ indicating the last 48 microseconds of fuel pulse number one, as hereinafter described. The flip-flop 2497 is identical to flip-flop 2482 and has its first clock phase input $\overline{C}$ connected to receive the first master clock phase signals $H_1$ its second clock phase input C connected to receive the second master clock phase signals $H_2$ and its direct reset input DR connected to receive the reset signal $v_o$ from the reset control circuit of FIG. 5A via lead 2068. The non-inverting Q output of flip-flop 2497 is connected directly to a non-inverting swtich contact 2498 and the inverting output $\overline{Q}$ is connected directly to an inverting switch contact 2499. A grounding transistor 2501 has one current-carrying electrode connected directly to ground and its opposite current-carrying electrode connected for outputting the signal $S_3$ on lead 2502. As with transistor 2494, the gate electrode transistor 2501 is directly connected to a mask-positionable switching arm 2503 which may be selectively positionable by conventional LSI techniques to contact either the inverting or non-inverting switching contacts 2498 or 2499, as desired. In the preferred embodiment of FIG. 6L, the switching arm 2503 has been positioned to complete a current path between the non-inverting Q output of flip-flop 2497 and the gate electrode of transistor 2501 via contact 2498 and the switching arm 2503.

A second inverted input of AND gate 2493 is connected to receive the clock signal $\overline{h_3}$ from node 2484 via clock lead 2504 while a third inverted input is connected to a node 2506 which, in turn, is connected via lead 2507 to the inverter output node 2486, previously described. Node 2506 is also connected to one inverted input of a three logical AND gate 2508 having three inverted inputs. A second inverted input of AND gate 2508 also receives the clock signal $\overline{h_3}$ from node 2484 via lead 2504. The output of AND gate 2508 is connected to both the reset input of the RS flip-flop 2497 and, simultaneously, to the fourth and final inverted input of AND gate 2493 via lead 2509. The third and final inverted input of AND gate 2508 is connected via lead 2511 to the output of an inverter 2512 whose input is connected via lead 2072 to the output of the second decoder NOR gate 2176 of the nubmer one fuel pulse counter of FIG. 6B for receiving the decode signal $r_O$ therefrom, as previously described.

Another end-of-fuel pulse number two control flip-flop 2513 identical to flip-flops 2497 and 2483, previously described, is used to output the signal $S_5$ which is a signal used to control the generation of the number two fuel pulse during the last 48 microseconds of fuel pulse No. 2, and the logic circuitry associated therewith is substantially identical to that associated with RS flip-flop 2497, previously described.

The control flip-flop 2513 has its first clock phase input $\overline{C}$ connected to receive the first master clock phase signals $H_1$ and a second clock phase input C connected to receive the second master clock phase signals $H_2$. Similarly, the direct reset input DR is connected via lead 2068 to receive the reset signal $v_o$, as previously described. The inverting output $\overline{Q}$ is connected directly to an inverting switching contact 2514 while the non-inverting input Q is connected directly to a non-inverting switching contact 2515. A grounding transistor 2516 has one current-carrying electrode connected to ground and its other current-carrying electrode connected to output the signal $S_5$ via lead 2517. As with transistor 2501, the gate electrode of transistor 2513 is associated with a mask-positionable switching arm 2518 which may be selectively positioned by conventional LSI techniques between the inverting and non-inverting switching contacts 2515 and 2514, respectively, for selecting or altering the polarity of the output signal, as desired. In the preferred embodiment of FIG. 6L, the switching arm 2518 is positioned to complete a current path between the gate electrode of transistor 2516 and the inverting output $\overline{Q}$ of the control flip-flop 2513 via switching arm 2518 and the inverting switching contact 2514.

The signal $r_1$ which represents the output of the second decoding gate 2197 of the No. 2 fuel pulse register 2192 of FIG. 6B is supplied via lead 2073 to the input of an inverter 2519 whose output is connected directly to one inverted input of a logical AND gate 2521 having three inverted inputs.

The second inverted input of AND gate 2521 is connected via lead 2522 to a node 2523. The third and final inverted input of the three input AND gate 2521 is connected to a clock input lead 2524 which connects to a clock input node 2525 for receiving the $\overline{h_3}$ clock signal from the output of the timing generator circuit of FIG. 6J via lead 1063, as previously described. The output of the three input AND gate 2521 is connected directly to the reset input R of the control flip-flop 2515 and is also connected via lead 2526 back to one inverted input of a logical AND gate 2527 having four inverted inputs. A second inverted input of the AND gate 2527 receives the clock signal $\overline{h_3}$ via clock lead 2524 while a third inverted input is connected via lead 2528 to the inverter output node 2523, as previously described. The output of AND gate 2527 is connected directly to the set input S of the control flip-flop 2513 for controlling the operation thereof.

Lastly, the circuit of FIG. 6L includes a No. 2 fuel pulse control flip-flop 2529 which is identical to the previously described flip-flops 2482, 2497 and 2513 in FIG. 6L. The first clock phase input $\overline{C}$ is connected to receive the first master clock phase signals $H_1$, the second clock phase input C is connected to receive the second master clock phase signals $H_2$, and the direct reset input DR is connected via lead 2068 to receive the reset signal $v_o$ from the reset control circuit of FIG. 5A, as previously described. The $\overline{h_3}$ clock signal which is supplied via lead 1063 to node 2525 is connected via lead 2531 to one inverted input of a logical AND gate 2532 having three inverted inputs and to one inverted input of a two input logical OR gate 2533, also having two inverted inputs. The output of the three input AND gate 2532 is connected directly to the reset input R of the No. 2 fuel pulse control flip-flop 2529 while the output of the two input OR gate 2533 is connected to one input of a logical AND gate 2534 whose inverted input is connected via lead 1792 to receive the signal $h_8$ from the address register 1734 of FIG. 5H via lead 1792, as previously described.

The output of the two input AND gate 2434 is connected to an output node 2535, and node 2535 is simultaneously connected to the set input of the No. 2 fuel pulse control flip-flop 2529 and to a second inverted input of the three input AND gate 2532, previously described.

The decoded output signal $b_{10}$ from the decoded output of NOR gate 2193 of the No. 2 fuel pulse-width counter of FIG. 6B is connected via lead 2196 to the input of an inverter 2536 whose output is connected directly to an inverter output node 2537. Inverter output node 2537 is connected via lead 2538 to node 2523 which, as previously described, is connected to one inverted input of AND gate 2537 and, simultaneously, via lead 2522, is connected to one inverted input of AND gate 2521. The inverter output node 2537 is also connected via lead 2539 to the third and final inverted input of AND gate 2532 whose output is connected to the reset input of control flip-flop 2529.

As previously described, the clock signal $\overline{h_3}$ is supplied via lead 1063 to clock input node 2525 and then, via clock lead 2524, is supplied to one input of a two input logical OR gate 2533 whose inverted input is connected directly to the output of logical hand gate 2541 having two inverted inputs. One inverted input of the logical AND gate 2541 is connected via lead 2542 to the clock input node 2476 which, as previously described, is supplied with the clock signal $h_4$ via lead 2413 from the timing generator circuit of FIG. 6J, described hereinabove. The second and final inverted input of the two input AND gate 2541 is connected via lead 2543 to the output node 2478 of the round-off compensation circuit 2479, to be hereinafter explained.

The non-inverting Q output of the No. 2 fuel pulse control flip-flop 2529 is connected directly to one input of a logical AND gate 2544 having two inputs. The second input of AND gate 2544 is connected via lead 1126 to receive the normally high alarm signal $GH_2$ from the circuit of FIG. 4G, as previously described. The output of AND gate 2544 is connected via lead 2545 to a first switch contact 2546 while the inverting output of control flip-flop 2529 is connected to a $\overline{Q}$ output node 2547. The $\overline{Q}$ output node 2547 is connected via lead 2548 to the fourth and final inverted input of the logical AND gate 2527 whose output supplies the signal to the said input of flip-flop 2513 and, simultaneously, is connected to a second switching contact 2549. A grounding transistor 2551 has one current-carrying electrode connected directly to ground and its opposite current-carrying electrode connected to output the fuel pulse duration control signal $S_4$ via output lead 2552 to the circuitry of FIG. 7, as hereinafter described. The signal $S_4$ is low or a logical zero for the duration of the No. 2 fuel pulse less 48 microseconds, as hereinafter described and is high when termination of the fuel pulse is required (or at least when the number two fuel pulse is not being controlled thereby, as when it is controlled by the signal S5 during the final 48 microseconds of the injection).

As described, with respect to transistors 2494, 2501, and 2516, the gate electrode of transistor 2551 is associated with a mask-positionable switching arm 2553 which may be selectively positioned between contact 2546 and 2549 by conventional LSI techniques. In the embodiment of FIG. 6L, switching arm 2553 is positioned to complete a current path between the gate electrode of transistor 2551 and the output of AND gate 2544 via the switching arm 2553, contact 2546 and output lead 2545, as previously described.

Lastly, the round-off compensation circuit 2479 of the circuit of FIG. 6L will be briefly described. The signal $j_8$ which is taken from the least significant stage of shift register 1733 for supplying the least significant bit of the 16 bit where it is stored in the parallel to serial register 1732, 1733, and supplies this signal from output node 1785 to the circuit of FIG. 6L via lead 1790. Lead 1790 supplies the signal $j_8$ to one input of the logical AND gate 2554 which forms a portion of the gating networks such as the dual two input AND/two input NOR gate configuration represented in the logic diagram of FIG. 9.12A and the electrical schematic diagram of FIG. 9.12B. If the signal $j_8$ is a logical one, indicating that a logical one was stored in the least significant bit position of the word stored in the parallel to serial converter of FIG. 5H, then the round-off circuit represented by reference numeral 2479 will be set so as to increase the duration of the fuel pulse by 8 microseconds, as hereinafter described, but otherwise the fuel pulse will terminate its normal time, i.e., when the shift pulse has completed the transfer of the data word into the fuel pulse shift register 2171.

The two input AND gates 2554 has its second input connected to receive the clock signal $h_3$ from the timing generator circuit of FIG. 6J via lead 1058 and its output is connected to one input of a two input NOR gate 2555. The other input of the two input NOR gate 2555 is connected directly to the output of a two input AND gate 2556 having one input connected to receive the clock signal $\overline{h_3}$ from the timing generator circuit of FIG. 6J via lead 1063, as previously described. The output of NOR gate 2555 is connected to one current-carrying electrode of a first series transistor 2557 whose opposite current-carrying electrode is connected directly to the input of an inverter 2558. The output of inverter 2558 is connected directly to one current-carrying electrode of a second series transistor 2559 whose opposite current-carrying electrode is connected directly to a feed back node 2561. Node 2561 is connected via feedback lead 2562 to the second and final input of the two input AND gate 2556 and, simultaneously, node 2561 is connected to the input of an inverter 2563 whose output is connected directly to the round off compensation circuit output node 2478, as previously described.

The operation of the No. 1 and No. 2 fuel pulse-width generating circuits will now be described with reference to the operation of the No. 1 pulse-width control circuit portions to generate the first fuel injection pulse with specific reference being made to the fuel pulse control flip-flop circuitry of FIG. 6L and peripheral mention being made to the parallel to serial converter circuitry of FIG. 5H and the fuel pulse counters of FIG. 6B. Since the operation of the second fuel pulse counter is identical, a detailed description thereof will be omitted, and any minor ambiguities between this description and the circuit description previously given are to be resolved in favor of the operative description given hereinbelow.

The control of the generation of the No. 1 fuel injection control pulse is determined by the state of the output signals $S_2$ and $S_3$, as hereinafter described. Initially, both signals are maintained in a normally high state due to conventional pull-up transistor circuitry associated therewith but not shown in the circuits of FIG. 6, described hereinbelow. Therefore, whenever the No. 1 fuel pulse-width control signal $S_2$ and the end of No. 1 fuel pulse control signal $S_3$ are high, no No. 1 fuel pulse is generated by the external circuitry, but whenever either the No. 1 fuel pulse control signal $S_2$ or the end of No. 1 fuel pulse control signal $S_3$ are low, a No. 1 fuel injection pulse is being generated. The fuel pulse control signals $S_2$ and $S_3$ are pulled to ground to initiate the generation of the fuel pulse signal by activating or setting their respective flip-flops 2482 and 2497, respectively, thereby supplying a high signal to the gate electrode of the respective grounding transistors 2494 and 2501, as previously described, to pull their respective $S_2$ and $S_3$ signals low to command the external circuitry to generate the fuel pulse No. 1 injection signal.

It will be noted that the Q output of the No. 1 fuel pulse control flip-flop 2482 is connected as one input of a logical AND gate 2486 having two inputs and the other input is connected via lead 1126 to receive the alarm state signal $GH_2$ generated by the circuit of FIG. 4G, as previously described. Since the alarm state signal is generally high in the absence of an alarm condition, AND gate 2486 is enabled so that as soon as the No. 1 fuel pulse control flip-flop 2482 is set, the Q output goes high to enable the other input of AND gate 2486 and cause its output to go high. When the output of AND gate 2486 goes high, this high is supplied to the gate electrode of grounding transistor 2494 causing it to conduct to pull the signal $S_2$ to ground and initiate generation of the No. 1 fuel injection pulse. The No. 1 fuel injection pulse will be maintained on until the RS flip-flop 2482 is reset causing the Q output to go low to disable AND gate 2486, turn off transistor 2494 and allow the pull-up circuitry to pull the signal $S_2$ high, as previously described. Similarly, whenever an alarm condition exists causing the alarm signal $GH_2$ to go low, AND gate 2486 is disabled to prevent transistor 2494 from being turned on to cause $S_2$ to go low thereby preventing the No. 1 fuel injection control pulse from being generated.

The fuel pulse generation sequence begins when the computer generates address signals to the command signal decoder circuitry of FIG. 5E causing the generation of the command signals $s_o$ and $t_1$ which latch 18 bit bites of data from the microprocessor 1391 of FIG. 5B into the parallel to serial converter register 1732 and 1733 of FIG. 5H. At the end of the parallel transfer from the computer, the register 1732 and 1733 store a 16 bit binary number representing the computer-calculated representation of the desired No. 1 fuel pulse-width to be generated. Since it is desirable that the fuel pulse control be relatively more accurate than the other controls previously described, an eight microsecond resolution is required. Therefore, an eight microsecond weight is supplied to the least significant bit position of the fuel pulse control word whereas, a 16 microsecond weight is assigned to the least significant bit position for all other words.

However, since the data is supplied from the second least significant bit position of the registers 1732, 1733 into the fuel pulse control counters of FIG. 6B, each bit position in the counters has a weight of 16 microseconds but, the round off compensation circuit 2479, to be hereinafter described, will compensate to provide the necessary eight microsecond resolution. This is required since the serial binary arithematic processing logic used in the present circuits is incapable of producing 16 bit words completely within an eight microsecond period.

The higher resolution is obtained by a round off manipulation which involves dividing the number stored in the parallel to serial converter registers 1732 and 1733 by two, i.e., by outputting from the second least significant stage thereof, in order that the time duration can be downcounted in increments of 16 microseconds and then storing the least significant bit position from the counter 1733 and the round off control circuit 2479 as the signal $j_8$ for round off compensation control is hereinafter described.

As soon as the 16 bit data word representing the binary number computed by the microprocessor and representing the desired No. 1 fuel pulse-width is entered in parallel into the pulse-width serial register 1732 and 1733 of FIG. 5H, and latched therein by the command signals $s_o$ and $t_1$, the computer initiated command signal $u_0$ latches a computer generated data bit into one of the five stages of the latching buffer registers 1734 for addressing a particular one of the counters, as previously described. In the present case, let us assume that the data bus stored a logical "1" into the first stage of the address register 1334 so that a high appears at the $Q_o$ output thereof. The high stored in the first latching stage of the register 1734 which was decoded from the data bus signal $d_{a2}$ indicated that the computer wishes to address the No. 1 fuel pulse control circuitry to initiate the generation of a No. 1 fuel injection pulse.

The NOR gate decoder network at the output of the buffer register 1734 senses a logical one at the $Q_o$ output and causes a low signal to be supplied to one inverted input of AND gate 1802. Since the clock signal $\overline{h_3}$ is momentarily low at the beginning of an iteration period, another input of AND gate 1802 is low causing a high to appear at one input of OR gate 1804, causing its output to go high. This high is inverted by the action of inverter 1807 causing a low to appear at the first inverted input of AND gate 1813 since, the other inverted input was previously enabled by the normally low reset signal $v_o$, the output of AND gate 1713 goes high to generate a 16 microsecond shift pulse for use as hereinafter described.

Since the output from the $Q_o$ stage of the address register 1734 enabled one input of NAND gate 1770, the generation of the high 16 microsecond shift pulse will enable the other input, causing the output of NAND gate 1770, which addresses the No. 1 fuel pulse control circuitry to go low for the duration of the 16 microsecond period. This 16 microsecond address signal or shift signal is designated at $g_8$ and will be used as hereinafter described.

As soon as the output of AND gate 1813 went high, signalling the beginning of the 16 microsecond shift pulse, the feedback from node 1755 to one inverted input of AND gate 1802 disabled same, while the low from output node 1908 was fed back to one inverted input of AND gate 1803 for enabling same. Since the $h_3$ signal supplied to the other inverted input of AND gate 1803 remains normally low for the duration of the 16 microsecond iteration period, the output of AND gate 1803 remains high and the output of OR gate 1804 remains high to continue or latch the generation of the shift pulse until the occurrance of the next high clock pulse $h_3$. When the next $h_3$ clock pulse goes high, signalling the beginning of the next iteration period, previously enabled NAND gate 1803 is also disabled, causing a low to appear at its output and since a low already appears at the output of disabled AND gate 1802, a low will appear at the output of OR gate 1804. This low will be inverted by inverter 1807, causing a high signal to be supplied back to disable AND gate 1803 and the shift pulse generating AND gate 1813 thereby terminating the 16 microsecond shift pulse and causing it to go low.

When the shift pulse goes low, NAND gate 1770 is disabled, causing its output in the signal $g_8$ to go high for use as hereinafter described.

As previously described, the low address or shift pulse $g_8$ is supplied from the output of NAND gate 1770 via lead 1756 to output node 1757 which is also connected to the transmission control logic 1780. When the transmission pulse is low at node 1757, one input to AND gate $\mathbf{1780}_b$ is low while the inverted signal at one input of AND gate $\mathbf{1780}_d$ is high. By the action previously described, the data word serially shifted from the register 1732 and 1733 via the Q output of the second least significant bit position or stage register 1733 is supplied via lead 1765 to node $\mathbf{1780}_a$ to the other input of the previously enabled AND gate $\mathbf{1780}_d$. Since the output of AND gate $\mathbf{1780}_d$ serves as one input to a NOR gate $\mathbf{1780}_e$ whose opposite input is already disabled by the output of AND gate $\mathbf{1780}_b$ due to the presence of a logical zero at one of its inputs from node 1757 via the 16 microsecond low shift pulse $g_8$, the data S entered into the No. 1 fuel pulse counter shift register 2171 of FIG. 6B is caused to be inverted and a determination of the 16 microsecond shift pulse, when $g_8$ goes high, the high appearing at node 1757 will enable one input of AND gate $\mathbf{1780}_b$ while the low appearing at the output of the inverter $\mathbf{1780}_c$ will disable AND gate $\mathbf{1780}_d$ causing its output to be zero.

In this manner, the data fed back from the output of the No. 1 fuel pulse shift register counter of FIG. 6B from the inverted summation output $\overline{S_u}$ via leads 1758 as the signal $d_8$ is resupplied into the threshold transfer logic network 1780 into the second input of the previously enabled AND gate 1780$_b$. Therefore, every time a logical zero is supplied back, a zero will appear at the output of AND gate 1780$_b$ and every time a logical one is supplied back, a one or high signal will be supplied to the second input of NOR gate 1780$_e$. However, since the other input of NOR gate 1780$_e$ is already enabled by the low at the output of AND gate 1780$_d$, the data will again be inverted by the action of NOR gate 1780$_e$ so that the data represented by the signal S and fed back into the serial shift register 2171 of the No. 1 fuel pulse counter of FIG. 6B will again be inverted. More technically speaking, the one's compliment of each digit will be re-entered into the shift register 2171 via the input signal S and then supplied from the $Q_1$ output to the $i_a$ output of the half-adder 2182, as previously described.

Eventually, all of the data word stored in the parallel to serial shift register 1732, 1733 of FIG. 5H will be shifted into the serial shift register 2171 of the address No. 1 fuel pulse counter of FIG. 6B and at the beginning of the next logic iteration, the counter action effected by the serial shift register 2171, the half-adder circuit 2182, and the related transfer circuitry will operate to supply the decremented data back to the transfer gating network 1780 to be reinverted and entered as the signal S back into the serial shift register 2171 for subsequent manipulation during the next iteration cycle.

As mentioned hereinabove, the roll over compensation circuit 2479 reads the values stored in the least significant bit position of the 16 bit binary word stored in the register 1732 and 1733 via node 1782 and supplies the signal $j_8$ back to one input of AND gate 2554 for determining whether or not the fuel pulse width is to be stretched by eight microseconds for compensation purposes. This stretching, which will be hereinafter described, takes place initially by turning on the fuel pulse eight microseconds early rather than by stretching the pulse at the end, as previously inferred.

If a logical zero is stored in the least significant bit position of the register 1733, then the signal $j_8$ is low. When $j_8$ is low, the output of AND gate 2554 is low regardless of the state of the $j_3$ signal. Similarly, at the start of the interation period, the signal $\overline{j_3}$ signal is low, causing the first input to AND gate 2556 to be disabled so that lows appear at both inputs to NOR gate 2555 causing its output to go high. The output of NOR gate 2555 appears as a low at the output of inverter 2558 and this low is fed back via lead 2562 to disable AND gate 2556 for latching purposes. The low signal at the output of inverter 2558, which was gated via the clock signal $H_2$ to node 2561 via conducting transistor 2559, is again inverted to produce a logical one or high signal at the output node 2478 of the roll off or round off compensation circuit 2479. This signal is latched high due to the action of AND gate 2556 whose output remains low due to the latching action of the low supplied from the output of inverter 2558, conducting transistor 2559, and node 2561 via lead 2562 to one input thereof.

Therefore, even though the signal $\overline{h_3}$ goes high for the remaining 15 microseconds of the iteration period, the least significant bit value has been latched in the roll off compensation circuit 2451 and when the least significant bit value is a logical zero, a high appears at the output node 2478 for use, as hereinafter described.

On the other hand, if a logical one is stored in the least significant bit position of register 1733 indicating that roll off compensation is required, then a high $j_8$ signal is supplied back to one input of AND gate 2554. Since the clock signal $h_3$ is also high at the beginning of an iteration period, a logical one appears at the output of AND gate 2554, causing the output of NOR gate 2555 to go low. The low at the output of NOR gate 2555 is inverted by the action of inverter 2558 and conducted via transistor 2559 to node 2561 as a high signal. The high at node 2561 is fed back via lead 2562 to enable one input of AND gate 2556 for latching the round off compensation network 2479 for the duration of the 16 microsecond iteration period since, after the first clock pulse which set the output of NOR gate 2555 low, the clock signal $\overline{h_3}$ will also go high and with both inputs of AND gate 2556 latched high for the duration of the 16 microsecond interation period, one input of NOR gate 2555 will be high while the other is low causing its outputs to remain latched in a low condition. The low signal at node 2561 is inverted by the action of inverter 2563, causing a logical zero or low signal to appear at the output node 2478 with the output of the compensation circuit 2479 to command an eight microsecond increase in the fuel pulse-width, as hereinafter described.

As previously described, the actual initiation of the No. 1 fuel pulse injectors is triggered by the setting of flip-flop 2482, as hereinafter described. Assume initially that the least significant bit of the data word stored in register 1731 was a logical zero indicating that no round off is required, then the fuel injection pulse will normally be initiated at the start of the first 16 microsecond timing period or iteration period following the 16 microsecond shift cycle which transfers the data from the parallel-to-serial registers 1732 and 1733 into the serial shift register 2171 of the No. 1 fuel pulse counter of FIG. 6B, as previously described.

This action is accomplished in the following manner. Throughout the duration of the initial shift cycle wherein, data is transferred from the registers 1732, 1733 into the No. 1 fuel pulse counter, the signal $g_8$ from the circuit of FIG. 5H is low, causing a low to appear at the inverted input of AND gate 2471 so as to enable the AND gate 2471 to output a high signal to set the flip-flop 2482 whenever the signal at the non-inverting input of AND gate 2471 goes high, as known in the art.

A high can occur at the second input of AND gate 2471 whenever it appears that the output of OR gate 2472. Since the clock signal $\overline{h_3}$ is high for the duration of the iteration period and since this signal is supplied to an inverted input of OR gate 2472, its output can go high to trigger the setting of flip-flop 2482 only if the non-inverting input of OR gate 2472 goes high. The non-inverting output of OR gate 2472 which can control the time of setting of the NO. 1 fuel pulse control flip-flop 2482 is connected directly to the output of a logical AND gate having two inverted inputs, and will therefore go high only if both of the inputs are simultaneously low. While one input goes low, eight microseconds prior to the termination of the iteration cycle due to the action of the normally high, negative-going clock pulse $h_4$, the other input is locked high since it is connected via lead 2477 to output node 2478 at the output of the compensation network 2479 and it will remain high throughout the duration of the iteration period, indicating that the signal $j_8$ where the least significant bit of the initial binary word was zero so that no round off compensation is required.

In this manner, when the least significant bit position has a value of zero, no round off compensation is required and the output of AND gate 2474 will remain low. One clock time before the 16 microsecond negative-going signal $g_8$ goes high to again disable AND gate 2471 since the positive-going 67 microsecond shift pulse supplied to the input of NAND gate 1770 required one clock time $H_1H_2$ from the start of the interation clock time to begin shifting, the signal $h_3$ will again go high, causing the signal $\overline{h_3}$ to go low. When $\overline{h_3}$ goes low, the previously high signal at the inverted input of the previously OR gate 2472 will go momentarily low, causing a high to appear at the output of OR gate 2472. The high at the output of OR gate 2472, which corresponds exactly with the clock signal $h_3$ indicating the start of the next iteration cycle, will cause the output of AND gate 2471 to go high thereby, setting the No. 1 fuel pulse control flip-flop 2482, causing the Q output to go high and the output of the previously enabled AND gate 2486 to go high to turn on the grounding transistor 2494 to pull the output signal $S_2$ low to initiate operation of the No. 1 fuel injectors by turning on the No. 1 fuel injection pulse by the external circuitry to be hereinafter described.

On the other hand, if the signal in the least significant bit position of the data word previously stored in register 1733 was high, indicating that round off compensation was required, the output node 2478 of compensation network 2479 will be low, as previously described. With a low at one input of AND gate 2474, it is enabled. Since the clock signal $h_4$ remains normally high for eight microseconds after it was initially generated with the occurrance of $h_3$, which began the iteration cycle, the clock signal $h_4$ will again go low for one clock time, causing lows to appear at both inverted inputs of AND gates 2474, thereby driving the output high. With a high at the non-inverted input of OR gate 2474, a high signal will appear at the non-inverted input of AND gate 2471 which was previously enabled by the low $g_8$ signal at the inverted input. Therefore, the occurrance of clock signal $h_4$ which occurs exactly eight microseconds prior to the generation of the next $hh_3$ clock signal which starts the next iteration phase, will cause the output of AND gate 2471 to go high, and the No. 1 fuel pulse control flip-flop 2482 to set, turning on the No. 1 fuel pulse injectors eight microseconds earlier then would normally occur, to effect the desired resolution compensation.

It will be noted that this means that the No. 1 fuel injectors are actually turned on half way through the shift iteration period which is transferring the data word into the fuel pulse counters and, therefore, even before any count manipulation has begun.

As soon as the number one fuel control flip-flop 2482 was set, the low $\overline{Q}$ signal from output node 2489 is fed back to enable one input of AND gate 2493. Simultaneously, the sixteen microsecond shift signal $g_8$ goes high when the clock signal $h_3$ occurs to disable AND gate 2471 until the transfer of the next fuel pulse from the parallel-to-serial converter of FIG. 5H occurs. So long as AND gate 2471 is disabled, the low from its output node 2481 is used to enable one input of the reset AND gate 2483 whose second input is enabled once each iteration when the clock signal $\overline{h_3}$ goes momentarily low signaling the beginning of the next iteration cycle. The third and final inverted input of AND gate 2483 is received from the output of an inverter 2487 which receives as its input the signal $a_{10}$ from the output decoding circuit represented by NOR gate 2172 of shift register 2171 of FIG. 6B. Since NOR gate 2172 has, as its inputs, the $\overline{Q}$ inverted outputs of each stage of the shift register 2171 except for the second and third stages, it will sense all lows causing its output to go high exactly 48 microseconds, i.e., three count iteration cycle times, from the point at which the number one fuel pulse counter has downcounted the originally stored number to zero. It will, of course, be recognized that the stored value is not actually downcounted but, as previously described, the function of the counter operates as a downcounting binary counter with zero detection outputs.

Therefore, 48 microseconds prior to the original binary word having been downcounted to zero, the signal $a_{10}$, which is normally low, will go high causing the signal at the inverter output node 2486 which is normally low so as to enable the third and final input of AND gate 2483 causing the number one fuel pulse flip-flop 2482 to be reset. With the flip-flop 2482 reset, the Q output goes high causing the output of AND gate 2486 to go low thereby rendering transistor 2494 non-conductive and allowing the external pull-up circuitry to restore the signal 52 to its normally high value which would terminate the number one fuel pulse except for the following fact.

Simultaneously with the low at inverter output node 2486 enabling AND gate 2483 to reset the number one fuel pulse control flip-flop 2482, this same low is supplied to the last non-enabled inverted input of AND gate 2493 causing its output to go high to set the end of fuel pulse number one flip-flop 2497 causing its Q output to go high. With the Q output high, grounding transistor 2501 conducts to pull the signal S3 to ground thereby continuing the generation of the number one fuel pulse output for the remaining 48 microseconds and whenever the signal S3 is high, the external circuitry knows that 48 or less remain before the number one injectors are shut down. The final termination of fuel injection is accomplished as follows. One inverted input of AND gate 2508 is enabled by the low from node 2486 while another inverted input is enabled by the low from node 2484 since the clock signal $\overline{h_3}$ still goes low at the beginning of each new iteration period.

However, the signal $r_0$ which is the output of the NOR gate deacoder 2176 generates a high signal on lead 2072 from node 2178 whenever the outputs from the second and third stages indicate that the remaining 48 microseconds of time has been counted off. This is analogous to the output being normally high so long as either of the contents of the register was high or in this case low since we are dealing with the $\overline{Q}$ outputs therefrom, and it takes three shift cycles to transfer these signals so that both stages contain ones causing the $\overline{Q}$ outputs to go low indicating that the final 48 microseconds has elapsed and causing the signal $r_0$ to go high. The high $r_0$ signal is inverted by the action of inverter 2512 to enable the final input of AND gate 2508 causing its output to go high to reset flip-flop 2497 to indicate the end of the number one fuel pulse since the Q output goes low causing transistor 2501 to be rendered non-conductive thereby allowing the S3 output pulse to be pulled high by the external pull-up circuitry signaling a final end or termination to the number one fuel injection control pulse which operated the number one fuel injectors.

With this operation of the fuel pulse control circuitry of the present invention, the operation of the number two fuel pulse injector control circuitry will be similarly understood and no further explanation is required.

One further important point to be noted is that the Q output of the number one fuel pulse flip-flop 2482 is inputted to the first input of an AND gate 2486 whose opposite input was previously enabled by the normally high alarm state signal GH2 so that as soon as the flip-flop 2482 is set, the output of AND gate 2486 goes high to operate the grounding transistor 2494 and cause the signal S2 to go low indicating the generation of a number one fuel control pulse. As described hereinabove, the signal S2 will go high to terminate the fuel pulse when the flip-flop 2482 is reset. Also, whenever an alarm state condition exists, be it a stall condition or a clock failure condition as previously discussed with reference to the circuit of FIG. 4G, the alarm signal GH2 goes low to disable AND gate 2486 even though the flip-flop 2482 is set to terminate the fuel pulse to prevent accidental fires or damage due to the continued fuel injection after the detection of an alarm condition. It will be obvious that additional AND gate circuits similarly configured can be added to the remaining flip-flops if desired for complete safety sake.

7.0 Analog Outputs and Power Control Circuitry

The analog output circuitry and the power control circuits of block 125 of the microprocessor-based electronic engine control system of FIG. 2 will now be described with reference to the block diagram of FIG. 7. Broadly speaking, the circuit of FIG. 7 includes the power control circuitry and regulators therefore together with the various relay drivers and current drive circuits used to operate all of the engine functions previously described in response to the control signals outputted by the circuitry of FIG. 6 described above.

A relay driver and delay circuit is represented by block 3001 and its purpose is to reduce the possible risk of serious fire by shutting off the fuel pump when the engine stops. The conventional fuel pump relay is designed such that circuitry of block 3001 will de-energize the relay whenever the engine speed drops below a predetermined minimal value. The network also provides transient suppression of the battery power supplied to the digital electronics. This is needed to protect the digital circuits from the large positive and negative voltage surges caused by any outside sources such as battery voltage regulator malfunction and from voltage transients caused by the switching of inductive accessories on the vehicle, etc.

Block 3002 represents the exhaust gas recirculation (EGR) valve driver circuit of the present invention and may be used to operate either an on-type off EGR valve or a solenoid controlled proportional EGR valve, as known in the art.

The injector driver circuitry of block 3003 is a relatively complex circuit used to control, in the preferred embodiment of the present invention, first and second groups of simultaneous double fire fuel injectors with a high degree of accuracy control. Block 3007 is identical to block 3003 and provides the similar circuitry for the number two fuel injector system.

Circuits 3004 and 3005 represent a conventional power amplifier and the ignition coil driver circuitry associated with the output thereof for controlling a conventional ignition coil driver to produce a necessary firing spark as known in the art and lastly, the regulator circuit of block 3006, which may be a conventional power supply adapted to provide precise +5-volt power to the logic circuits and +9.5 volt power to the relay circuits as known in the art. The regulator circuit of block 3006, in the preferred embodiment of the present invention, includes various additive features which will be briefly discussed with respect thereto.

7.1 Relay Driver and Associated Relay

The relay driver and associated relay of block 3001 of the circuitry of FIG. 7 is conventional and will be described briefly with respect to FIG. 7A. The input signal from the ignition switch indicating the starting mode is represented by the symbol J which is generated by conventional techniques and transmitted or inputted to the ignition start input node 2601. Node 2601 is connected to the anode of a diode 2602 whose cathode is connected directly to a node 2603. The input node 2601 is also connected via lead 2604 to one end of a resistor 2605 whose opposite end is connected to a node 2606. Node 2606 is connected through a second resistor 2607 to output lead 1831 adapted to supply the signal J to the status input circuit of FIG. 51 as previously described. The signal J is a process signal input from the relay driver circuit of FIG. 7A indicative of the vehicle being in the starting mode. The signal I is an ignition switch signal indicating that the ignition has been turned on and this signal is supplied to the anode of the diode 2608 whose cathode is connected directly to node 2603. Node 2603 is connected to one end of the conventional fuel pump relay coil 2609 whose opposite end is connected to a node 2611. Node 2611 is connected to the anode of the diode 2612 whose cathode is connected back to node 2603. Node 2611 is also connected to the collector input of a conventional Darlington driver circuit represented by reference numeral 2613 such as a 92 PU45A manufactured by National Semiconductor or a U2TA806 manufactured by Unitrode Corporation and whose emitter electrode is connected directly to a grounding lead 2614 which is commonly connected to ground via grounding node 2615.

The dotted block represented by the reference numeral 2616 represents the relay-operated switching means 2617 which is normally opened but which closes in response to the energization of the fuel pump relay coil 2609 to complete a conductive path between the car battery input terminal labeled plus car battery and an output node 2618. Node 2618 outputs the signal S10 on output lead 2619 and the signal S10 represents the conventional switch power supply to operate a conventional fuel pump, as known in the art. Node 2618 is also connected to one plate of a capacitor 2621 whose opposite plate is connected to the grounding node 2615. Grounding node 2615 is further connected to the anode of a zener diode 2622 whose cathode is connected to output node 2618 for voltage regulation and protection purposes as conventionally known.

The base electrode or input electrode of the Darlington driver 2613 is connected directly to a voltage divider output node 2623. Node 2623 is connected via lead 2624 to an input node 2625 which is connected to receive the control signal S1 via input lead 2138 from the output port circuit of FIG. 6A as previously described. The control signal S1 is used to operate the fuel pump relay driver circuitry of the Darlington driver 2613 as known in the art. Node 2625 is connected to the cathode of a diode 2626 whose anode is connected to ground for protection purposes as conventionally known.

Node 2606 at the intersection of the series connected resistors 2605 and 2607 is connected to one plate of a capacitor 2627 whose opposite plate is connected directly to the grounding lead 2614 for grounding same.

The opposite end of resistor 2605, which is connected to lead 2604 is also connected directly to the grounding lead 2614 through a resistor 2628. Furthermore, a voltage divider network comprising resistors 2629 and 2631 is connected in series between the lead 2604 and the grounding lead 2614 in the following manner. One end of resistor 2629 is connected to lead 2604 at the end of resistor 2605 next adjacent input node 2601 and the opposite terminal of resistor 2629 is connected directly to the base input node 2623 for the driver circuit 2613. Node 2623 is then connected to one terminal of the second voltage divider resistor 2631 whose opposite end is connected directly to the grounding lead 2614.

Figure 7A:
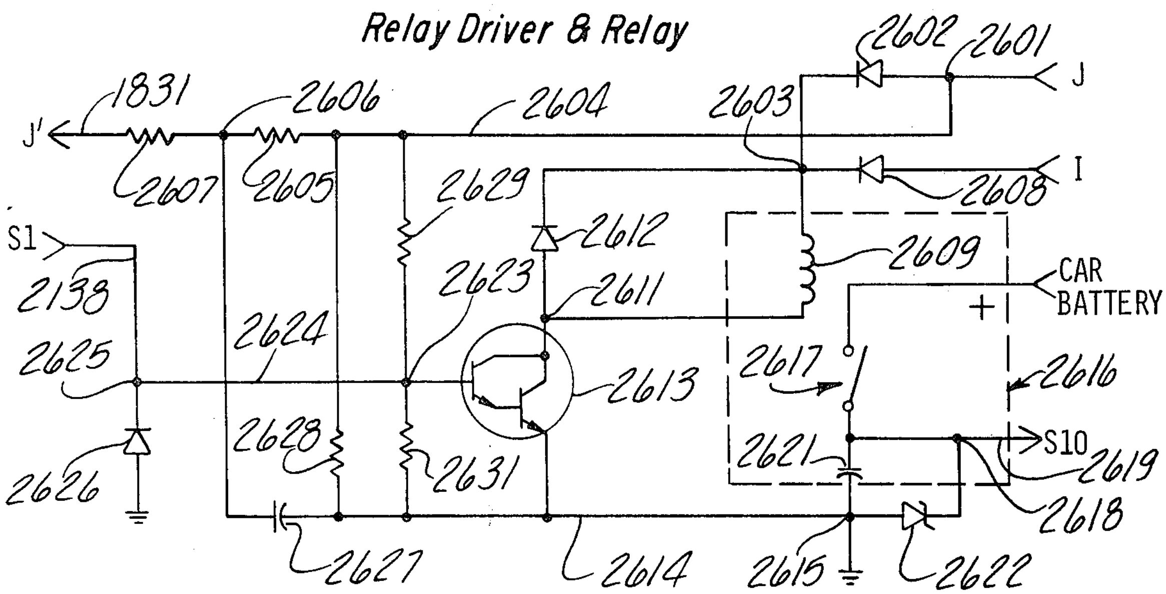
FIG. 7A is an electrical schematic diagram of the relay driver and relay circuitry of block 3001 of FIG. 7.

The operation of the relay driver and fuel pump operating relay coil of FIG. 7A is conventional and will not be described to any further extent since its operation will be obvious to one of ordinary skill in the art given the function attributed to the various input and outputs and the relatively simple nature of the circuit itself.

7.2 EGR Valve Driver

Figure 7B:
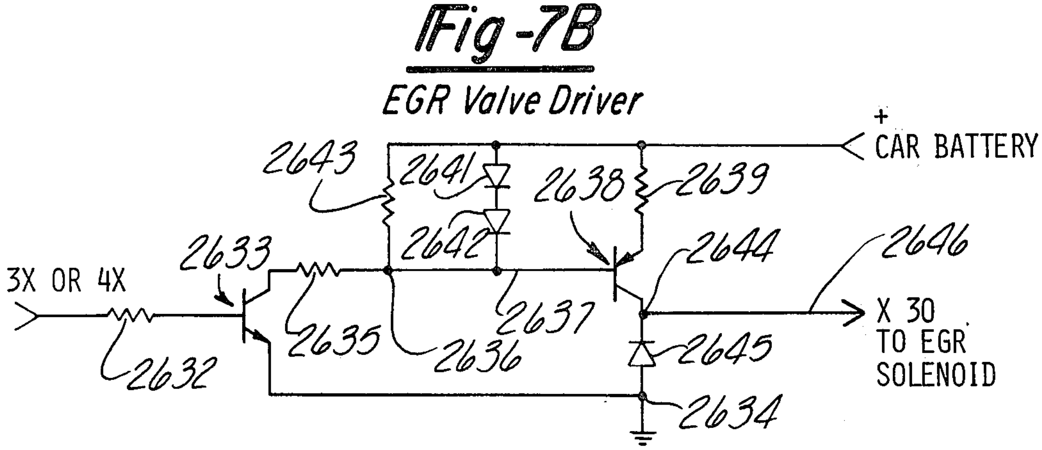
FIG. 7B is an electrial schematic diagram of the EGR valve driver circuitry of block 3002 of FIG. 7.

The EGR valve driver circuitry of block 3002 of FIG. 7 will now be described with reference to the schematic diagram of FIG. 7B. In the circuit of FIG. 7B, either the signal X3 generated by the output circuit of FIG. 6A for serving as an on-off EGR valve driver control signal or the signal X4 which was generated by the circuit of FIG. 6K for controlling the operation of a proportional EGR valve, as known in the art, are inputted to one terminal of a resistor 2632 whose opposite terminal is connected directly to the base electrode of an NPN transistor 2633 whose emitter electrode is connected directly to a grounding node 2634. The collector electrode of transistor 2633 is connected to one terminal of a resistor 2635 whose opposite terminal is connected directly to a node 2636. Node 2636 is connected via lead 2637 to the base electrode of a PNP transistor 2638 whose emitter electrode is connected to one end of a resistor 2639 whose opposite end is connected to the −12 volt car battery input lead previously described. A pair of series connected diodes are connected between the car battery input lead and lead 2637 as follows. The car battery input lead is connected directly to the anode of a diode 2641 whose cathode is connected directly to the anode of a second series diode 2642 whose anode is then connected to the lead 2637. Similarly, another path is connected in parallel with the series connected diodes 2641 and 2642 between the car battery lead and lead 2637 which includes a resistor 2643 having one terminal connected directly to the car battery input lead and its opposite terminal connected to lead 2637 via node 2636. The collector electrode of the PNP transistor 2638 is connected directly to an output node 2644 and node 2644 is connected directly to the cathode of the diode 2645 whose anode is connected directly to the grounding node 2634. The output node 2644 supplies the output signal X30 to the EGR solenoid via output lead 2646 so as to provide sufficient driving power to the EGR solenoid or EGR actuator for either on-off EGR valve operation or proportional EGR valve operation, as desired.

7.3 Fuel Pulse Injector Driver Circuity

The fuel pulse injector driver circuitry of block 3003 for the first set of fuel injectors will now be further described with reference to the block diagram of FIG. 7C. The circuit of FIG. 7C receives, at its input node 2647, the signals S2 and S3 outputted from the previously described fuel pulse control flip-flop circuit of FIG. 6L via leads 2495 and 2502, respectively. The input node 2647 connects the fuel pulse number one control signals from the input node 2647 to an RS flip-flop represented by the block 3014 and to an injector current control circuit represented by block 3020.

The flip-flop of block 3014 controls the operation of an injector clamp control circuit represented by block 3015 and receives control signals from the driver circuit of block 3016. A voltage-to-current converter represented by block 3011 converts the voltage dropped against the sensing resistor into a chip current and this current is supplied via the comparator block 3013 to precision current sinks 3012 or sources, as desired. The injector driver circuit of FIG. 7C also includes biasing circuitry as represented by block 3019, circuitry for protecting the sense resistor as represented by block 3017 and injection short circuit protection as represented by block 3018. An input signal from the injector coil is supplied as an input to the voltage-to-current circuitry of block 3011 and the driver circuit of block 3016 which provides base drive current to the output stage output signals S20,S30, to the fuel injection coils for controlling the pulse-width thereof as conventionally known in the art.

The details of the injector driver circuit represented by the block diagram of FIG. 7C will be described in greater detail with respect to FIGS. 7C1 through 7C10 which follow.

7.4 Voltage-to-Current Converter Circuitry

The voltage-to-current converter circuitry of block 3011 of the injector driver circuit of FIG. 7C will now be described with reference to the electrical schematic diagram of FIG. 7C1. The output from a current sensing resistor, to be hereinafter described, is supplied as the signal $c_{11}$ via lead 2648 to the emitter electrode of a conventional NPN transistor 2649 which has its base electrode directly connected to its collector electrode to serve a diode-like function. The collector electrode of transistor 2649 is connected to one terminal of a resistor 2651 whose opposite terminal is connected directly to the collector electrode of a PNP transistor 2652 whose emitter electrode is connected through a resistor 2653 directly to a +5 volt source of potential. The base electrode of transistor 2649, in addition to being connected directly back to the collector electrode thereof is also connected directly to the gate electrode of a second NPN transistor 2654 which has its emitter electrode connected to ground through a resistor 2655 and its collector electrode connected through a resistor 2656 to an input node 2657. Node 2657 is connected via lead 2658 to receive the signal $b_{11}$ which serves as a control signal and originates in the bias circuitry of FIG. 7C9 to be hereinafter described. Input node 2657 is also connected directly to the collector electrode of the second PNP transistor 2659 whose emitter electrode is connected through a resistor 2661 to the +5 volt source of potential previously described. A series current path is established between the +5 volt source of potential and ground via resistor 2661, transistor 2659, input node 2657, resistor 2656 transistor 2654 and resistor 2655, providing, of course, that transistors 2659 and 2654 are conducting.

The $b_{11}$ input node 2657 is also connected directly to the base electrode of another PNP transistor 2662 which has its collector electrode connected directly to ground and its emitter electrode connected to a node 2663. Node 2663 is connected in common with all base electrodes of the PNP transistors 2652, 2659, 2664, and 2665. When the signal $b_{11}$ turns transistor 2662 on, node 2663 is pulled low so as to pull the bases of all of the PNP transistors toward ground for controlling the operation thereof as conventionally known.

The +5 volt source of potential is also connected to one terminal of a resistor 2666 whose opposite terminal is connected directly to the emitter electrode of PNP transistor 2664 whose collector electrode is then connected through a resistor 2667 to an output lead 2668 for outputting the control signal $f_{21}$ which serves as one input to the sense resistor short circuit protection circuit of FIG. 7C7 as hereinafter described. Lastly, the +5 volt source of potential is connected through another resistor 2669 to the emitter electrode of PNP transistor 2665 whose collector electrode is connected directly to output node 2671 for outputting the signals $d_{11}$ via lead 2672 and the control signal $d_{13}$ via lead 2673 for use in the comparator circuit of FIG. 7C3 and in the precision current sink circuitry of FIG. 7C2 as hereinafter described.

Figure 7C:
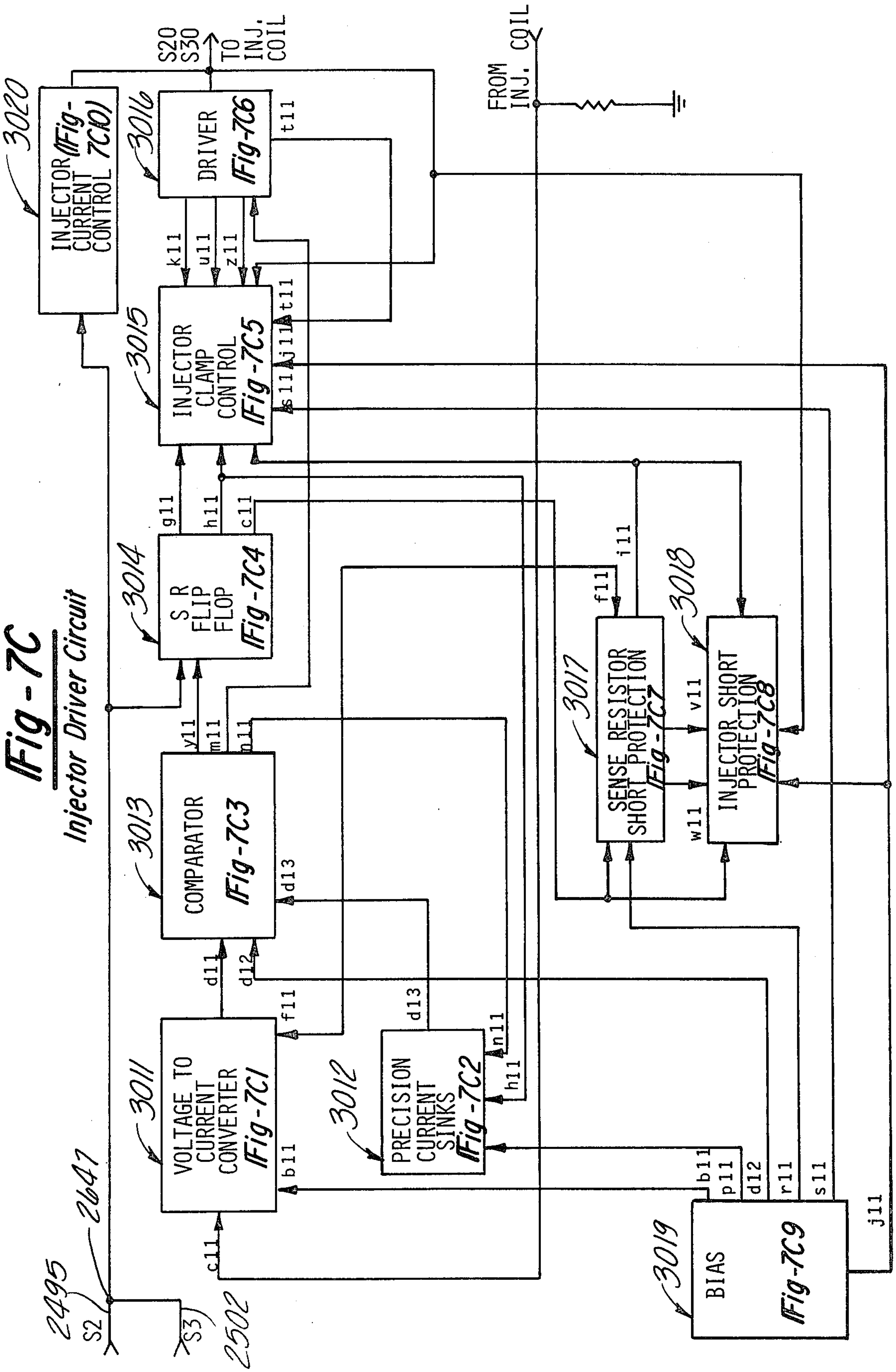
FIG. 7C is a block diagram of the injector driver circuitry of block 3003 (and block 3007 which is substantially identical thereto) of FIG. 7.

The voltage-to-current converter circuitry of FIG. 7C1 is conventional and its operation will only briefly be explained hereinbelow. The operation of the parallel circuit paths whose first branch includes resistor 2653, transistor 2652, resistor 2651 and transistor 2649 and the second path whose components include resistor 2661, transistor 2659, resistor 2656, resistor 2654 and resistor 2655 together with the operation of the control transistor 2662 form a current mirror arrangement, as conventionally known. The diode configuration form of transistor 2649 by connecting its collector back to its base is used to compensate for offset variations in the base-to-emitter voltage of transistor 2654 as known in the art and the protection resistor 2656 is used to prevent circuit damage, if required.

7.5 Precision Current Sinks

The precision current sinks of block 3012 of FIG. 7C will now be described with reference to the schematic diagram of FIG. 7C2. In FIG. 7C2, the input signal $n_{11}$ from the comparator circuit of FIG. 7C3 to be hereinafter described, is inputted via lead 2674 to the base of a conventional NPN transistor 2675 having its collector electrode directly connected to a node 2676. Node 2676 is then connected directly to a +5 volt source of potential and to the collector electrode of the second NPN transistor 2677. The emitter electrode of transistor 2675 is connected via lead 2678 to a node 2679 while the emitter electrode of transistor 2677 is connected via lead 2681 to another node 2682. An input signal $h_{11}$ which is generated in the flip-flop circuit of FIG. 7C4 is supplied via input lead 2683 to the base electrode of the base electrode of transistor 2677 for controlling the conduction thereof. The signal $d_{13}$ is supplied from the output node 2671 of the voltage-to-current converter circuit of FIG. 7C1 to input node 2684 and input node 2684 is commonly connected to the collector electrode of four NPN transistors 2685, 2686, 2687, and 2688, respectively. The emitter electrode of transistor 2685 is connected directly to the node 2679 while the emitter electrode of transistors 2686 and 2687 are commonly connected to node 2682. Node 2679 is connected to ground through a resistor 2689 while the common emitter node 2682 is connected to ground through a parallel resistor 2691 and the emitter electrode of the transistor 2688 is connected to ground through resistor 2692. Lastly, the control signal $P_{11}$ from the bias circuit of FIG. 7C9 to be hereinafter explained, is inputted via lead 2692 and commonly connected to the gate electrodes of transistors 2685, 2686, 2687 and 2688, respectively.

The operation of the precision current sink circuitry of FIG. 7C2 is conventional and will be only briefly described hereinbelow. So long as the control signal $h_{11}$ from the flip-flop circuit of FIG. 7C4 is high, transistor 2677 is turned on to hold the emitter electrodes of transistors 2686, 2687 and 2688 high by connecting them to the source of potential via lead 2676 so as to prevent the sinking of current within the circuit. Similarly, if the signal $n_{11}$ from the output of the comparator circuit of FIG. 7C3 is high to turn on transistor 2675, the +5 volt source of potential is supplied to the emitter electrode of transistor 2685 preventing it from sinking current. However, if the signals $n_{11}$ and/or $h_{11}$ are low, transistors 2675 and/or 2677, respectively, are non-conductive so that when the gate signal $P_{11}$ from the bias network of FIG. 7C9 goes high to cause transistors 2685, and/or 2686, 2687 and 2688 to conduct, the current present on input lead 2673 from the voltage-to-current converter circuit of FIG. 7C1 will be conducted to ground through the respectively conductive transistors and their emitter resistors 2689, 2691 and 2692, as known in the art.

7.6 Comparator Circuitry

The comparator circuitry of block 3013 of the injector driver circuit of FIG. 7C will now be described with reference to the schematic diagram of FIG. 7C3.

In the comparator of FIG. 7C3, the input signals $d_{11}$, $d_{12}$ and $d_{13}$ may be supplied via lead 2672, 2693 and 2673, respectively, from the voltage-to-current converter circuit of FIG. 7C1, the bias circuitry of FIG. 7C9, and the partially current-sunk output/input of the precision current sink circuit of FIG. 7C2 via an output of the voltage-to-current converter circuit of FIG. 7C1 as previously described. The use of the three different input signals $d_{11}$, $d_{12}$ and $d_{13}$ allows different threshold levels to be set at the input of the comparator circuit 7C3, as known in the art.

Leads 2672, 2693 and 2673 are commonly connected to an input node 2694 which is then connected through a resistor 2695 to the base electrode of a PNP transistor 2696. The emitter electrode of the PNP transistor 2696 is connected directly to the emitter electrode of an NPN transistor 2697 and the collector electrode of transistor 2697 together with the base electrode thereof are both connected directly to the +5 volt source of potential. The collector electrode of transistor 2696 is connected to the gate electrode of another NPN transistor 2698 whose collector electrode is connected directly to the +5 volt source of potential and whose emitter electrode is connected directly to output node 2699. The output node 2699 outputs the control signal $m_{11}$ via lead 2701 to the driver circuitry of FIG. 3016 for controlling the amount of current supplied to the injector coil, as conventionally known in the art.

Output node 2699 is also connected via lead 2702 to a node 2703 and node 2703 is connected to one terminal of a resistor 2704 whose opposite terminal is connected directly to a node 2705. Node 2705 is also connected through a resistor 2706 to ground and further connected directly to the base electrode of another NPN transistor 2707. The emitter electrode of transistor 2707 is connected directly to ground and its connector electrode is connected directly to output node 2708. The collector output node 2708 is connected to the +5 volt source of potential through a resistor 2709 and is adapted to output the control signal $y_{11}$ via lead 2711 to one input of the flip-flop circuit of FIG. 7C4 to be hereinafter explained.

Furthermore, node 2703 is connected through a resistor 2712 to the base electrode of an NPN transistor 2713 whose emitter electrode is connected directly to ground and whose collector electrode is connected directly to an output node 2714. Node 2714 is connected to the +5 volt source of potential through a resistor 2715 and is used to output the signal $n_{11}$ to the gate electrode of transistor 2675 of the precision current sink circuit of FIG. 7C2 via lead 2674 as previously described.

The operation of a comparator circuit is conventional and will not be described with detail herein. It may briefly be stated that the current comparator of FIG. 7C2 compares the voltage-to-current converter output circuit of FIG. 7C1 with pre-established reference currents and outputs various control signals for use as hereinafter described in response to that comparison.

7.7 SR Flip-Flop Circuit

The SR flip-flop circuitry of block 3014 of FIG. 7C will now be described with reference to the schematic diagram of FIG. 7C4.

As set forth hereinabove, the signal $y_{11}$ from the output of the comparator circuit of FIG. 7C3 is inputted via lead 2711 to an input node 2721. Input node 2721 is commonly coupled to the base electrode and to the collector of an NPN transistor 2722 to enable the transistor to function as a diode for compensation purposes as previously described. The emitter electrode of transistor 2722 is connected directly to an output node 2723 which outputs the signal $e_{11}$ to the emitter electrode of transistor 2649 of FIG. 7C1 via lead 2648, as previously described. Furthermore, node 2723 is connected through a resistor 2724 directly to the emitter electrode of a PNP transistor 2725 whose collector electrode is connected directly to the emitter electrode of a PNP transistor 2726. The transistor electrode 2726 has its collector electrode connected directly to the +5 volt source of potential and its base electrode connected to serve as an input for the number one fuel pulse control signals S2, S3 which are inputted to node 2647 of FIG. 7C from the outputs 2495 and 2502 of the previously described fuel pulse control flip-flop circuitry of FIG. 6L. For the sake of convenience, the signals S2, S3 will be assumed to have been supplied from input node 2647 of the circuit of FIG. 7C to the base electrode of transistor 2726 via lead 2727. The intersection of the emitter electrode of transistor 2726 and the collector of transistor 2725 are commonly coupled back to the base electrode of transistor 2725 for compensation purposes, as previously described. Furthermore, the emitter electrode of transistor 2726 is connected via lead 2728 to a node 2729.

Node 2729 serves to output the signal $g_{11}$ via lead 2731 which serves as one input to the injector clamp control circuit of FIG. 7C5 to be hereinafter described. Node 2729 is also connected through resistor 2733 to the base electrode of an NPN transistor 2734. Transistor 2734 has its emitter electrode commonly coupled to ground together with the emitter electrode of corresponding transistor 2735. The collector electrodes of transistor 2734 and 2735 are commonly connected together and supplied via lead 2736 to a node 2737. Node 2737 is connected to the +5 volt source of potential through a resistor 2738 and to the base electrode of another NPN transistor 2739 having its collector electrode connected directly to the +5 volt source of potential and its emitter electrode connected directly to a node 2741. The +5 volt source of potential is also connected through a resistor 2742 to a node 2743 and node 2743 is connected through another resistor 2744 to the base electrode of the transistor 2735 previously described. Similarly, the emitter electrode of transistor 2739 is connected back to node 2741 which serves to output the signal $h_{11}$ to the precision current sink circuit of FIG. 7C2 via lead 2683 as previously described. Node 2741 is also connected through a resistor 2745 to a node 2746 and node 2746 is connected to ground through a resistor 2747 and is also connected directly to the base electrode of the first NPN transistor 2748 commonly coupled to ground with the emitter electrode of a corresponding repaired NPN transistor 2749. The collector electrodes of transistors 2748 and 2749 are commonly connected together and coupled directly to node 2743. The base electrode of transistor 2749 is connected through a resistor 2751 to the input node 2721 for receiving the signal $y_{11}$ therefrom.

The RS flip-flop circuit of FIG. 7C4 is conventional and is only briefly described herein. The flip-flop of FIG. 7C4 will be initially set with each first comparison signal out of the comparator circuit of FIG. 7C3 and will be reset whenever the fuel injection command pulses S2, S3 go high to turn off the flip-flop until the next initial out-of-comparison signal again sets it. When the signals S2, S3 are high, indicating that there is no corresponding fuel pulse-width signal in use, a flip-flop of FIG. 7C4 is set so that all referenced current sources are turned on and the voltage-to-current converter output is zero. However, whenever the fuel pulse command signals S2, S3 go low indicating that the computer has commanded that one set of fuel injectors be turned on, then the output of the driver circuit of FIG. 7C6 goes high turning the injector driver on hard until the voltage across the voltage divider resistor 2770 is equal to the reference voltage. At that time, current is supplied to the driver circuit of FIG. 7C6 since the open collector output beings to turn on until the output of the driver circuit of FIG. 7C4 clamps the injector at the required 9.5 volt level required for accurately maintaining the operation thereof.

7.8 Injector Clamp Control Circuitry

The injector clamp control circuitry of block 3015 of FIG. 7C will now be described with reference to the schematic diagram of FIG. 7C5. The injector clamp control circuit of FIG. 7C5 includes a sense amplifier responsive to the actual current being supplied to the injectors and circuitry responsive to the output of the sense amplifier for generating an output control signal for varying the operation of the driver circuit of FIG. 7C6 as hereinafter described.

The output signal $h_{11}$ from the output of the RS flip-flop of FIG. 7C4 is supplied via lead 2683 to a resistor 2761 to node 2762. Node 2762 is connected through a resistor 2762 to the base electrode of a drive transistor 2764 whose emitter electrode is connected directly to ground and whose collector electrode is connected via lead 2765 to output the signal U11 to the driver circuit of FIG. 7C6 as hereinafter described.

Furthermore, node 2764 is connected through a resistor 2766 to the base electrode of another NPN transistor 2767 whose emitter electrode is connected directly to ground and whose collector electrode is connected directly to an output node 2768. Node 2768 serves to output the signal $p_{11}$ via lead 2769 to the driver circuitry of FIG. 7C6 as hereinafter described for protection against negative transients and the like. Node 2768 is also connected to the base electrode of a PNP transistor 2771 whose emitter electrode is commonly coupled to the emitter electrode of a corresponding PNP transistor 2772 and the commonly coupled emitters of transistors 2771 and 2772 are connected through a resistor 2773 to receive the input signals $s_{11}$ via lead 2774 from the bias circuit to be hereinafter described. The collector electrode of transistor 2771 is connected to a node 2775 and node 2775 is commonly connected to the collector electrode of an NPN transistor 2776 and to a node 2777. Node 2777 is connected directly to the base electrode of transistor 2776 and to the base electrode of a corresponding NPN transistor 2778. The emitter electrodes of transistors 2776 and 2778 are connected directly to ground while the collector electrode of transistor 2778 is connected to a node 2779 which in turn is connected to the collector electrode of transistor 2772. The sense node 2779 is connected via lead 2781 to the gate electrode of an NPN transistor 2782 and to one plate of the capacitor 2783 whose opposite plate is connected to receive the input sense signal Z11 from output lead 2784 of the driver circuitry of FIG. 7C6 as hereinafter described. The signal $j_{11}$ which is generated by the bias circuitry of FIG. 7C9 as hereinafter described is connected via lead 2785 to one end of a resistor 2786 whose opposite terminal is connected directly to the base electrode of transistor 2772.

The input signal $i_{11}$ which is generated in the sense resistor short protection circuit of FIG. 7C6 is supplied via lead 2787 to the gate electrode of a PNP transistor 2788 whose emitter electrode is connected directly to a +5 volt source of potential and whose collector electrode is connected through a resistor 2789 to a control node 2791. Similarly, signal $g_{11}$ which is outputted via lead 2731 from the RS flip-flop circuit of FIG. 7C4 as previously described is supplied to input node 2792. Node 2792 is commonly connected to both the base electrode and the collector electrode of an NPN transistor 2793 whose emitter electrode is connected through a resistor 2794 to the control node 2791. Additionally, the control node 2791 is connected to ground through a resistor 2795 and is further connected directly to the base electrode of an NPN transistor 2796 having its emitter electrode connected directly to ground and its base electrode connected directly to an output node 2797. Node 2797 is connected to the collector electrode of the previously described NPN transistor 2782 whose collector electrode is connected directly to ground and the collector output node 2797 serves to output the control signal $k_{11}$ via lead 2798 to the driver circuitry of FIG. 7C6, as hereinafter explained, for aiding in controlling the driver output thereof.

Since the control output which determines the operation of the driver circuit of FIG. 7C6 is provided by the output signal $u_{11}$ on lead 2765 and the output signal $k_{11}$ on lead 2798 which supply the inputs to the driver amplifier circuit of FIG. 7C6 as hereinafter described. If the signal $h_{11}$ which is inputted on lead 2683 is low, the output drive transistor 2764 will be turned off so that no output is supplied via lead 2765 so that the control signal $u_{11}$ will be held low. A more positive clamping action can be obtained with respect to the output signal $k_{11}$ as follows. If the input $i_{11}$ turns transistor 2788 on, a high signal will appear at the control node 2791 causing transistor 2796 to conduct. The conduction of clamping transistor 2796 will pull node 2797 low since the conductive path will be established between node 2797 and ground through the conducting transistor 2796. With the $k_{11}$ signal clamped low causes the drive transistor which serves as one input to the amplifier stage of FIG. 7C6 to be turned off so that there is no output.

7.9 Fuel Pulse Driver Circuitry

The driver circuitry of block 3016 of FIG. 7C will now be described with reference to the schematic diagram of FIG. 7C6. The driver of FIG. 7C6 is to control the output current to the fuel pulse injector as represented by the injector coil 2798.

The input signal $u_{11}$ which is outputted via lead 2765 from the injector clamp control circuit of FIG. 7C5 as previously described is supplied thereby to an input node 2799. Node 2799 is connected (a) to one terminal of a resistor 2801 whose opposite terminal is connected directly to ground; (b) to one terminal of the previously described resistor 2770 whose opposite terminal is connected to node 2802; and (c) directly to the base electrode of a first NPN transistor 2803. The emitter electrode of transistor 2803 is commonly coupled with the emitter electrode of a similar NPN transistor 2804, as conventionally known, and both emitter electrodes are connected to ground through a resistor 2805. The collector electrode of transistor 2803 is connected directly to the positive car battery terminal lead while the collector electrode of transistor 2804 is connected to a node 2806. The base electrode of transistor 2804 is connected directly to a base input node 2807 which is connected to ground through a resistor 2808 and node 2807 is also connected directly to a base input node 2809 which serves to output the control signal $z_{11}$ to the sense feedback input of the injector clamp control circuit of FIG. 7C5 via lead 2784 as previously described.

The collector electrode node 2806 of transistor 2804 is also connected through a lead 2811 to another collector node 2812 and node 2812 is connected through a resistor 2813 to a positive car battery terminal lead previously described. The second collector node 2812 is connected directly to the base electrode of a PNP transistor 2814 whose emitter electrode is connected directly to the positive car battery terminal and whose collector electrode is connected directly to a node 2815. Node 2815 is connected (a) to one plate of a capacitor 2816 whose opposite plate is connected directly to the first collector output node 2806; (b) to the anode of a diode 2817 whose cathode is connected to one terminal of a resistor 2818 and whose opposite terminal is connected to node 2802 as previously described; and (c) directly to the base electrode of an NPN transistor 2819 whose collector electrode is connected directly to the positive car battery terminal and whose emitter electrode is connected to a node 2821. Node 2821 is connected directly to node 2802 and, via output lead 2822 supplies the fuel pulse drive signals S20, S30 to drive the injector coils 2798 as known in the art. Node 2821 is also shown as being connected to the cathode of a diode 2823 whose anode is connected to ground for protecting the circuit against negative transients and the like. The opposite terminal of the injection coil 2798 is connected to a feedback node 2824. Feedback node 2824 is connected to one terminal of a sensing resistor 2825 whose opposite terminal is connected to ground and is also connected via feedback lead 2648 to supply the feedback current sensing signal $c_{11}$ to the input of the voltage-to-current converter circuit of FIG. 7C1 as previously described.

Additionally, node 2802 is connected through a resistor 2831 to an output node 2832. The output node 2832 is connected to the anode of a diode 2833 whose cathode is connected directly to ground for protecting the circuit against negative transients and the like and simultaneously to one terminal of a resistor 2834 whose opposite terminal is connected directly to ground. The node 2832 is connected via lead 2797 to supply the signal $t_{11}$ back to the sensing input node 2768 of the injector clamping control circuit of FIG. 7C5 as previously described.

The signal $m_{11}$ which is outputted from the comparator of FIG. 7C3 as previously described is supplied via lead 2701 to one terminal of an input resistor 2835 whose opposite terminal is connected to a control input node 2836. Node 2836 is connected via input lead 2798 to receive the control signal $k_{11}$ from the output of the injector clamp control circuit of FIG. 7C5 as previously described. Lastly, the control input node 2836 is connected via lead 2837 to the base electrode of a drive transistor 2838 whose emitter electrode is connected directly to node 2809 and whose collector electrode is connected to a +5 volt source of potential.

In operation, the driver circuit of FIG. 7C increases the drive current to the injector driver coil 2798 until it reaches the predetermined required value. As this value varies, the flip-flop circuit of FIG. 7C4 will be reset causing its $\overline{Q}$ output to go high to again turn on the injector clamp control transistors 2764 and 2796 to allow the injector current to begin to decrease until the voltage-to-current converter output current equals the reference current and the current comparator and again turns the injector driver current back on. In this manner, the injector clamp control current and driver circuits of FIG. 7C5 and 7C6 are able to maintain a proper level of drive current through the fuel injectors, as desired.

7.10 Sense Resistor Short Protection

The sense resistor short protection circuitry of block 1017 of FIG. 17C will now be described with reference to the electrical schematic diagram of FIG. 7C7. The sense resistor short circuit protection system of FIG. 7C7 includes a two millisecond timer, a voltage comparator and a logical AND gate used to protect the system in the event of a short circuit and the sensing charge resistor, as hereinafter described.

The signal $s_{21}$ is outputted via lead 2668 from the voltage-to-current converter circuit of FIG. 7C1, as previously described and is supplied via lead 2668 to an input node of 2851 of the sensor resistor short protection circuit of FIG. 7C7. Node 2851 is connected to ground through a grounding resistor 2852 and is also connected directly to the emitter electrode of the PNP clamping transistor 2853 and to the base electrode of an NPN transistor 2854. The collector electrode of the NPN transistor 2854 is connected to a +5 volt source of potential which emitter electrode is commonly connected to the emitter electrode of a similar NPN transistor 2855. The commonly coupled emitters of transistors 2854 and 2855 are connected to ground through a resistor 2856. The gate electrode of transistor 2855 receives the signal $r_{11}$ which is outputted by the bias circuit of FIG. 7C9, as hereinafter explained, via lead 2857 and the collected electrode of transistor 2855 is directly connected to a node 2858.

Node 2858 is commonly connected to the emitter electrode of a pair of NPN transistors 2859, 2861 respectively. The base electrode of transistor 2859 is connected directly to a base input node 2862 while the base electrode of transistor 2861 is connected directly to a base input node 2863. The collector electrode of transistor 2861 is connected directly to a +5 volt source of potential while the collector electrode of transistor 2859 is connected to a collector output node 2864.

The collector output node 2864 is connected to a resistor 2865 to the +5 volt source of potential and is also connected via lead 2866 to one terminal of a resistor 2867 whose opposite terminal is connected via lead 2787 which outputs the signal $i_{11}$ to the injector clamp control circuit of FIG. 5C and the injector short protection circuit of FIG. 7C8.

The base input node 2862 of transistor 2859 is connected via lead 2868 to the collector electrode of an NPN transistor 2869 whose emitter electrode is connected directly to ground and whose base electrode is connected to one terminal of a resistor 2871 whose opposite terminal is connected to the inut lead 2648 for receiving the output $e_{11}$ from the flip-flop circuit of FIG. 7C4, as previously described. The base input node 2862 is also connected directly to a node 2872 which is connected directly to the emitter electrode of a PNP transistor 2873 having its collector electrode connected directly to ground and its base electrode connected through a resistor 2874 to a collector output node 2875 to be hereinafter described. The input node 2872 is also connected via lead 2876 to a timer node 2877. Node 2877 is connected through a resistor 2878 to one plate of a capacitor 2879 whose opposite plate is connected directly to ground such that the combination of the +5 volt source of potential together with resistor 2878 and capacitor 2879 establish an RC time constant which allows the network to function as a two millisecond timer.

As previously described, the base input node 2851 to NPN transistor 2854 is also connected to the emitter of the PNP transistor 2853 whose collector electrode is connected directly to ground to enable transistor 2853 to operate as a clamping device. The base electrode of transistor 2853 is connected directly to a base input node 2854. Node 2854 serves to supply the base drive signal $v_{11}$ to the base of the clamping transistor 2853 and to output the base drive signal $v_{11}$ via lead 2881 to a corresponding clamping transistor of the injector short protection circuit of FIG. 7C8, as hereinafter described. Node 2858 is further connected to one terminal of a resistor 2882 whose opposite terminal is connected to a node 2883 and node 2883 is connected to ground through an isolation resistor 2884 and to the emitter electrode of an NPN transistor 2885 which supplies the base drive current signal $v_{11}$ to the gate electrodes of the clamping transistors via node 2883, resistor 2882 and node 2854. The collector electrode of transistor 2885 is connected directly to the previously described collector output node 2875 and node 2875 is connected directly to the emitter electrode of an NPN transistor 2886. The collector electrode of transistor 2886 is connected directly to the +5 volt source of potential and the base electrode of both transistors 2885 and 2886 are connected to cap nodes of a voltage divider network including four series connected resistors 2887, 2888, 2889 and 2891 which are connected in a series path between the +5 volt source of potential and ground, as hereinafter described.

The +5 volt source of potential is connected to one terminal of resistor 2887 whose opposite terminal is connected to a first voltage divider output node 2892. The voltage divider output node 2892 is connected directly to the gate electrode of transistor 2886 and to one terminal of a second voltage divider resistor 2888 whose opposite terminal is connected directly to a second voltage tap output node 2863.

As previously described, the voltage tap node 2863 supplies a base drive signal to the gate electrode of transistor 2861 and a similar base drive signal $w_{11}$ to the injector short protection circuit of FIG. 7C8 via leads 2893. The second voltage tap output node 2863 is then connected to one terminal of a third voltage divider resistor 2889 whose opposite terminal is connected to the third and final voltage divider output node 2894. Node 2894 supplies the base drive to the NPN transistor 2885, as previously described, and is further connected to the fourth and final voltage divider resistor 2891 to ground.

The operation of the voltage divider network and associated circuitry of FIG. 7C7 is conventional and will not be described in any detail.

The short circuit protection network of FIG. 7C7 operates generally as follows. Whenever the input signals S2, S3 associated with the reset input of the flip-flop network of FIG. 7C4, as previously described, will go high to allow the timing capacitor 2879 to begin charging. Since combination of transistors 2854 and 2855 and the circuitry associated therewith form a voltage comparator circuit and the combination of transistors 2859 and 2861 form a second timing comparator circuit, the following occurs. Since the voltage developed across resistor 2852 and then appearing at one input of the comparator comprising transistors 2854 and 2855 and which appears at node 2851 via lead 2868 as a signal $f_{21}$, from the voltage to current converter circuitry of FIG. 7C1 is proportional to the actual injector current, and if this voltage does not become equal to the reference voltage represented by the signal $r_{11}$ at the other input to the comparator so as to cause transistor 2855 to conduct and pull the common emitter node 2858 toward ground, before the voltage across the capacitor 2879 reaches two thirds of the reference potential, which takes approximately two milliseconds, then the output from node 2864, which represents a logical AND gate and is represented by the output signal $i_{11}$ on lead 2787 will go high, turning on transistor 2796 of FIG. 7C5 to turn the injector driver off, as previously described.

Therefore, this circuit protects against a shorted or partially shorted sensing resistor and insures the termination of the injector drive current should such a short circuit occur.

7.11 Injector Short Protection Circuit

The injector short protection circuitry of block 3018 of FIG. 7C will now be described with reference to the schematic diagram of FIG. 7C8. This circuit is used to protect against an injector short and allows the open loop gain of the overall system to be substantially reduced by providing better stability in less than a four microsecond turn on time.

The +5 volt source of potential is connected directly to a voltage supply node 2901. Node 2901 is connected to the emitter electrode of a PNP transistor 2902 which has its base electrode directly connected to its collector electrode for compensation purposes, as known in the art. The collector electrode of PNP transistor 2902 is connected directly to the collector electrode of the first NPN transistor 2903 and node 2901 is connected directly to the collector electrode of a similar NPN transistor 2904 so that transistors 2903 and 2904 form a conventional comparator circuit. The emitter electrodes of transistors 2903 and 2904 are commonly connected together at node 2905 and the output signal $i_{11}$ is taken via lead 2787 from the common base-collector output node 2096 of transistor 2902 which serves as the output of the comparator circuit and supplies the signal $i_{11}$ to the injector clamp control circuit of FIG. 3015 for similarly turning off the injector drive current should an injector short be detected, as hereinafter described.

The commonly coupled emitter node 2905 of transistors 2903 and 2904 comprising the comparator circuit of FIG. 7C8 are connected directly to the collector electrode of another NPN transistor 2907 which has its emitter electrode commonly connected to the emitter electrode of a corresponding NPN transistor 2908 at the common emitter node 2909 and node 2909 is connected to ground through a resistor 2911. The collector electrode of transistor 2908 is connected directly to a +5 volt source of potential and transistors 2907 and 2908 and the associated circuitry operate as a voltage comparator circuit similar to the voltage comparator comprising transistors 2854 and 2855 of FIG. 7C7, as hereinafter described.

The base electrode of transistor 2907 which serves as the reference input to the voltage comparator circuit is connected through a resistor 2912 to the reference input lead 2857 which supplies the signal $r_{11}$ from the bias network of FIG. 7C9 via lead 2857, as hereinafter described. The other input to the comparator is supplied from base input node 2913 which is connected directly to the base electrode of transistor 2908. Node 2913 is connected directly to a node 2914 and node 2914 is connected through a first resistor 2915 to ground and through a second resistor 2916 is connected to the injector current lead of the driver circuit of FIG. 7C6 for monitoring the injector driver signals S20, S30 carried thereon. Node 2913 is also connected to the emitter electrode of a second PNP clamping transistor 2917 whose collector electrode is connected to ground and whose base electrode is connected via lead 2881 to receive the clamp-initiating signal $v_{11}$ from node 2854 of the sense resistor protection circuit FIG. 7C7, as previously described.

The +5 volt source of potential is also connected to one terminal of a resistor 2918 whose opposite terminal is connected to a timer input node 2919. Node 2919 is connected to one plate of a timing capacitor 2921 whose opposite plate is connected to ground so that resistor 2918 and capacitor 2921 have an RC time constant such that the circuit serves as a 10 microsecond timer. Node 2919 is connected via comparator input lead 2922 to a base input node or comparator inupt node 2923. Node 2923 is connected directly to the base electrode of transistor 2903 and is also connected via lead 2924 to the collector electrode of another NPN transistor 2925 whose emitter electrode is connected directly to ground. The base electrode of transistor 2925 is connected through a resistor 2926 to a base input node 2927. Node 2927 is connected to ground through a resistor 2928 and is also connected via lead 2648 to the output of the RS flip-flop circuit of FIG. 7C4, as previously described.

The operation of the injector short protection circuit of FIG. 7C8 is generally similar to that of the circuit of FIG. 7C7 and will be only briefly described hereinbelow. The RC time constant established by resistor 2818 and capacitor 2921 is such that it takes approximately 10 milliseconds before the voltage across the capacitor 2921 enhance the voltage appearing at node 2919 and therefore, the input of the comparator comprising transistors 2903 and 2904 reaches approximately two-thirds of source potential. The voltage developed across the resistor 2916 is again proportional to the voltage across the injector and this is supplied as one input to the comparator comprising resistors 2908 and 2907, respectively. If this voltage does not become equal to the reference voltage supplied to the other input via the signal $r_{11}$ before the voltage across the timing capacitor 2921 reaches a value approximately equal to two-thirds of the reference potential, then the output of node 2906, the signal $i_{11}$ will go high, causing transistor 2796 of the injector clamp control circuit of FIG. 5C to turn on and the injector driver to turn off so as to protect the circuitry against the shorted injector.

7.12 Bias Circuitry

The bias circuitry of block 3019 of the injector driver circuitry of FIG. 7C will now be described with reference to the schematic diagram of FIG. 7C9. As previously indicated, the bias circuitry of FIG. 7C9 is used to provide the various bias signals to the other circuits previously described herein.

The +5 volt source of potential is connected through a resistor 2931 to the emitter electrode of a PNP transistor 2932 whose collector electrode serves to output the bias signal $s_{11}$ to the injector clamp control circuit of FIG. 7C5 via lead 2774. The base electrode of PNP transistor 2932 is connected directly to a common base node 2933 which is commonly connected directly to the base electrode of a second PNP transistor 2934 having its emitter electrode connected directly to the +5 volt source of potential and its collector electrode connected to a node 2935. Node 2935 is connected directly back to the base electrode of transistor 2934 via the common base node 2933 for compensation purposes, as known in the art. Node 2935 is connected through a resistor 2936 to a node 2937. Node 2937 is connected directly to the base electrode of a first NPN transistor 2938 and to the collector electrode of the second NPN transistor 2939. Transistor 2938 has its collector electrode connected directly to the +5 volt source of potential and its emitter electrode connected to a base drive output node 2941. The base drive output node 2931 is connected to the base electrode of transistor 2939 and outputted as the base drive signal $p_{11}$ to the sense resistor short protection circuit of FIG. $7C_7$ via lead 2692. Similarly, base drive node 2941 is connected through a resistor 2942 to a base node 2943. Base node 2943 is connected directly to the base electrode of NPN transistors 2944 and 2945 while, simultaneously being connected through a resistor 2946 to the emitter output node 2947 which is connected directly to the emitter electrode of transistor 2939.

The collector electrode of transistor 2944 is used to output the bias signal $b_{11}$ to the voltage to current converter circuitry of FIG. 7C1 via lead 2658 while the collector electrode of transistor 2945 is connected to supply the bias signal $d_{12}$ to the comparator circuitry of FIG. 7C3 via lead 2693, as previously described.

As set forth hereinabove, the emitter electrodes of transistors 2939, 2944, 2945 as well as one terminal of resistor 2946 are commonly connected to a node 2947. Node 2947 is used to output the bias signal $r_{11}$ to the sense resistor short protection circuitry of FIG. 7C7 and to the injector short protection circuitry of FIG. 7C8 via lead 2857 as described hereinabove. Further, node 2947 is connected to ground through a resistor 2948 and is connected through a resistor 2949, whose value may be zero, if desired, to output the bias signal $j_{11}$ to the injector clamp control circuitry of FIG. 7C5 via lead 2786 as set forth hereinabove. Since the operation of the bias control network of FIG. 7C9 is conventional, no additional description or comment is required.

7.13 Injector Current Control Circuit

The injector current control circuitry of block 3020 of the injector driver circuitry of FIG. 7C will now be described with reference to the circuit diagram of FIG. 7C10 which supplies an additional means for generating and more precisely controlling the injector driver current.

A positive car battery terminal is supplied to the positive input potential node 2951. Node 2951 is connected to a resistor 2952 to a node 2953. Node 2953 is connected to the collector electrode of an NPN transistor 2954 whose emitter electrode is connected directly to ground through a grounding node 2955. The base electrode of transistor 2954 is connected directly to a base input node 2956 and node 2956 is connected through a resistor 2957 to the grounding node 2955.

Furthermore, the base input node 2956 is connected through a second resistor 2958 to the input node 2647 of the injector driver circuit of FIG. 7C for receiving the fuel pulse-width control signals S2, S3 inputted thereto, as previously described.

Node 2953 which is taken from the collector electrode of transistor 2954 is connected via lead 2959 to the gate electrode of a second NPN transistor 2961 whose emitter electrode is connected directly to ground via grounding node 2955 and whose collector electrode is connected to a resistor 2962 to a node 2963. Node 2963 is connected through a resistor 2964 to the positive source of potential node 2951 and is also connected through a lead 2965 to the base electrode of a PNP transistor 2966. The emitter electrode of transistor 2966 is connected directly to the positive source of potential node 2951 while the collector electrode is connected through a resistor 2967 to a node 2968. Node 2968 serves as the base input node to a Darlington driver circuit represented by the reference numeral 2969, as hereinafter described. Node 2968 is connected via base input lead 2971 to the base of a first or input transistor 2972 whose emitter electrode is connected directly to the base of a second NPN transistor 2973. The emitter electrode of transistor 2973 serves to output the current control signal $S_{20}$, $S_{30}$ via the similarly designated output lead. Further, the collector electrodes of both transistors 2972 and 2973 are commonly connected together at the common collector node 2974 as is common in a Darlington pair configuration. Node 2974 is connected directly to the cathode of a diode 2975 whose cathode is connected directly to the grounding node 2955 while node 2968 is connected to the anode of a Zener diode 2976 whose cathode is connected directly to the grounding lead 2955.

Broadly speaking, the injector current control circuit of FIG. 7C10 provides a more accurate control over the generation of the injector drive current S20, S30 than does the driver circuit of FIG. 7C6, acting alone. Functionally, the fuel pulse control signals S2, S3 which are outputted from the fuel pulse control circuit of FIG. 6L, as previously described, are supplied through the transistor circuitry comprising transistors 2954, 2961 and 2966 to provide the proper phasing and amplification. This amplified and properly phased control signal is supplied to the base drive node 2968 of a conventional Darlington driver circuit 2969 for controlling the operation thereof and, therefore, the generation of the output current represented by signals S20, S30, as previously described. The use of the Darlington driver 2969 enables an extremely abrupt turn off of all drive current S20, S30 when turn off is required and this would not be possible with the driver circuit of FIG. 7C6 acting alone.

The Zener diode 2976 is used to protect the Darlington driver 2969 from negative voltage spikes and the free-wheeling diode 2975, which is an important feature of the injector driver circuit of the present invention, is, in effect, connected across the inductive load represented by the injector driver coil 2798 of FIG. 7C6 to maintain the flow of the driver current S20, S30 during the current switching operation. It will be understood that if a gate turn off switch is used, the free-wheeling diodes may be eliminated since the turn off switches will provide controlled turn off times.

In the driver circuit of FIG. 7C6, the operation thereof is controlled by the incoming fuel pulse control signals S2, S3 via the setting or resetting of the RS flip-flop of FIG. 7C4 thereby, controlling the generation of the drive current S20, S30 through the injector driver coil 2798 via lead 2872 but the rapid turn off is not as good as when the circuit of FIG. 7C10 is added.

The driver circuit of FIG. 7C6 includes a power amplifier stage comprising transistors 2804 and 2803 which respond to command signals $m_{11}$ and $K_{11}$ which supply potential to one of the gate electrodes while the other gate electrode is connected to a reference, and the power amplifier output supplies switching current to the base electrode of additional amplifying transistors which output the drive current S20, S30 to the injector coil 2798, as previously described.

It will be noted that the diode 2823 in the circuit of FIG. 7C6 is not required if the injector current control circuit of FIG. 7C10 with its free-wheeling diode 2975 are used as in the preferred embodiment of the injector driver circuit of FIG. 7C.

7.14 Power Amplifier and Ignition Coil Driver

Figure 7D:
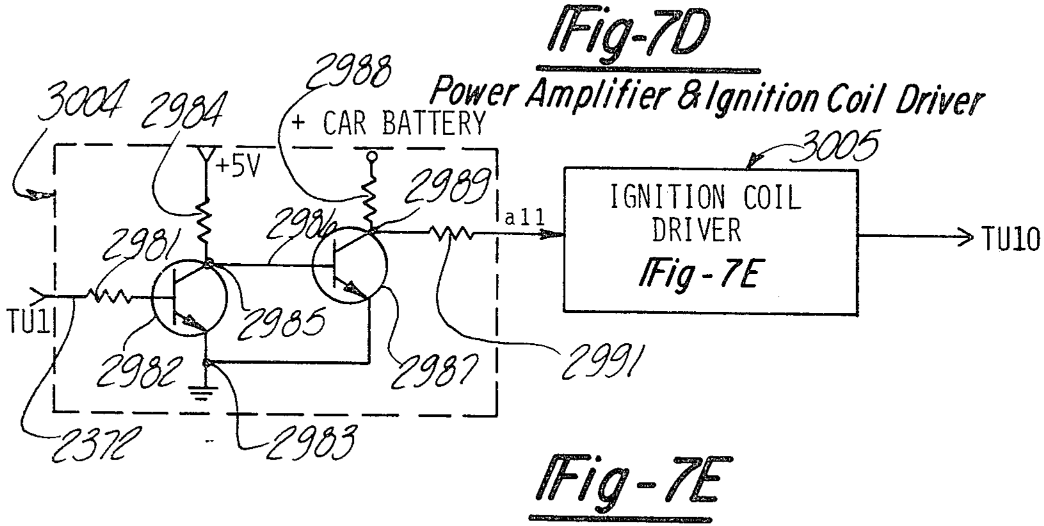
FIG. 7D represents and electrical schematic diagram of the power amplifier circuit of block 3004 of FIG. 7 and the conventional ignition coil driver circuit of block 3005 associted therewith.

The power amplifier and ignition coil driver circuits of blocks 3004 and 3005, respectively, of the power control circuitry of FIG. 7 will now be described with reference to the schematic of FIG. 7D. The power amplifer circuit of block 3004 has the ignition control signal TU1 which is outputted from the ignition control circuitry of FIG. 6I, as previously described, supplied via lead 2372 to one terminal of an input resistor 2981 whose opposite terminal is connected directly to the base electrode of a power transistor 2982 which has its emitter electrode connected to ground via a grounding node 2983 and its collector electrode connected directly to collector output node 2985. The collector output node 2985 is connected to a +5 volt source of potential through a resistor 2984 and is also connected via lead 2986 to the base electrode of a second power transistor 2987 whose emitter electrode is commonly coupled to the emitter electrode of transistor 2982 at the grounding node 2983 to form a conventional power driver circuit configuration.

The collector electrode of transistor 2987 is connected directly to a collector output node 2989 which is connected through a resistor 2988 to the positive terminal of the car battery or some similar source of potential. Similarly, the collector output node 2989 is connected through a resistor 2991 to output the power amplifier output $a_{11}$ to the ignition coil driver of block 3005. The ignition coil driver of block 3005 is conventional and may, for example, a Delco 1875990, or the like, which responds to the output $a_{11}$ of the power amplifier of block 3004 to supply the ignition signal TU10 to produce the desired ignition within the engine, as conventionally known in the art.

7.15 +5 Voltage Regulator Section

The power supply and voltage regulators represented by block 3006 to FIG. 7 may be any conventional regulated power supply capable of producing the voltages required by the present system, but in the preferred embodiment of the present invention, the particular +5 volt and +9.5 volt voltage regulator sections are shown schematically in FIGS. E and F respectively. Since any conventional regulated power supply may be used, the circuits of FIGS. 7E and 7F will not be described in any detail, but the schematic diagram will be sectioned off into broad functional portions and a brief overall description of the operation thereof will be given.

Figure 7E:
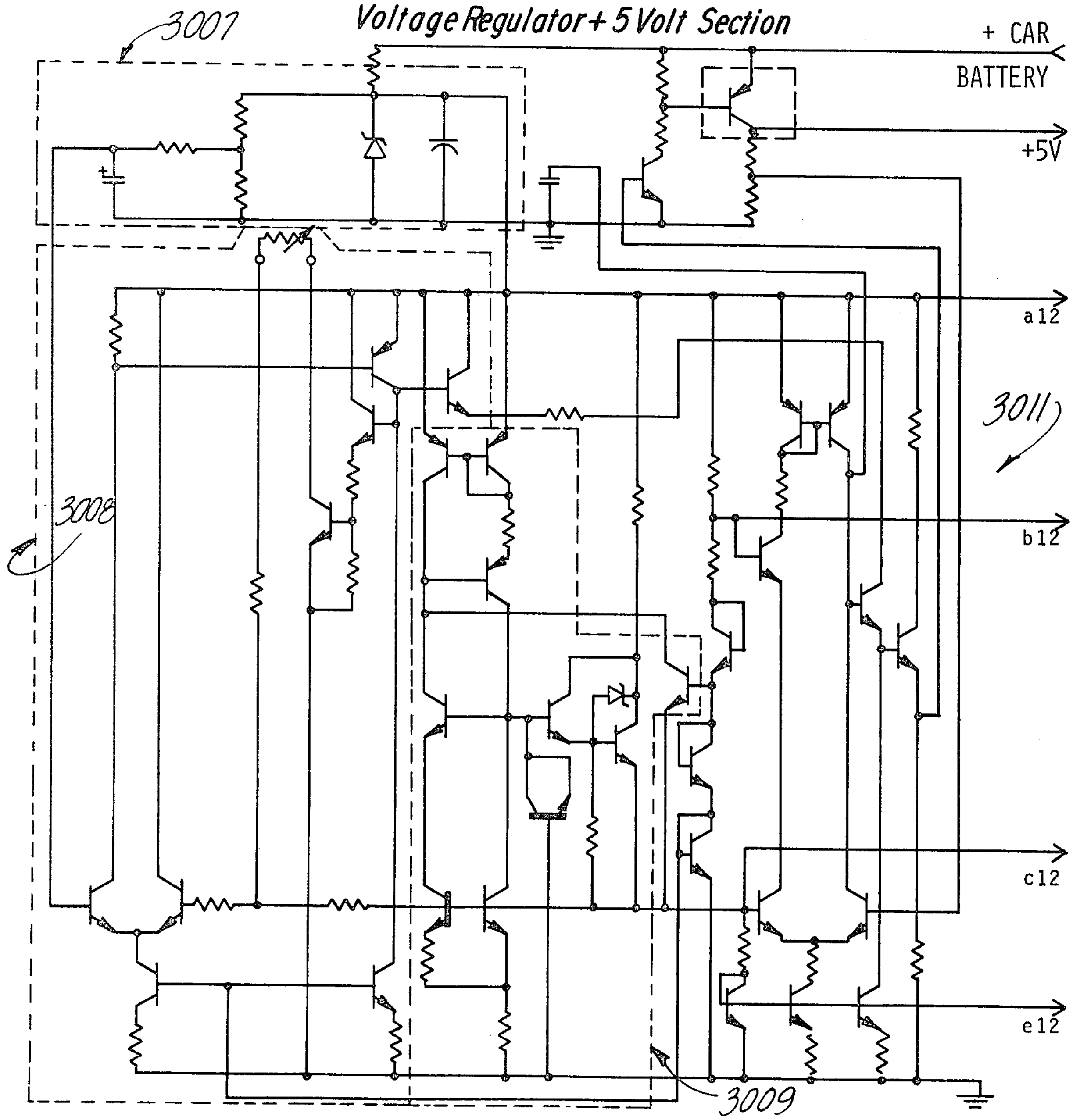
FIG. 7E is a schematic diagram with certain funcional block designations of the five volt section of the power supply regulator of block 3006 including the low voltage shutdown circuitry, the band gap reference circuitry, the five volt regulator circuitry, the circuit protection circuitry associated therewith.

The +5 volt regulator section of FIG. 7E includes a portion designated by the reference numeral 3007 which performs filtering functions, provides a protective clamp and provides for the suppression of negative spikes. A second portion designated with the reference numeral 3008 is properly termed the low voltage shut down circuit portion of the +5 volt regulator. The low voltage shut down portion designated by the dotted block 3008 includes a comparator portion responsive to the sensing of a low voltage condition for performing a voltage shut down operation, and circuit means for providing the necessary hysteresis effect.

The block designated by the reference numeral 3009 is a band gap reference and this portion includes a controlled current source using a current mirror, a temperature co-efficient compensation means and a control loop associated with the current mirror. Lastly, the remaining portion of the +5 volt voltage regulator section of FIG. 7E is represented by the reference numeral 3011 and is referred to generally as the +5 volt regulator section. The +5 volt regulator section 3011 includes circuit means for establishing a band gap reference, a differential amplifier stage wherein, an input signal from an external resistor divider is compared to the reference at the other input to provide current gain to drive external transistors. Means are provided for providing a voltage on the input transistor of the differential amplifier stage which matches the voltage on the collector electrode of the corresponding input stage to improve the accuracy and stability of the regulator. Various other transistors are provided for establishing current sources to bias the regulator, as known in the art.

7.16 +9.5 Volt Voltage Regulator Section

Figure 7F:
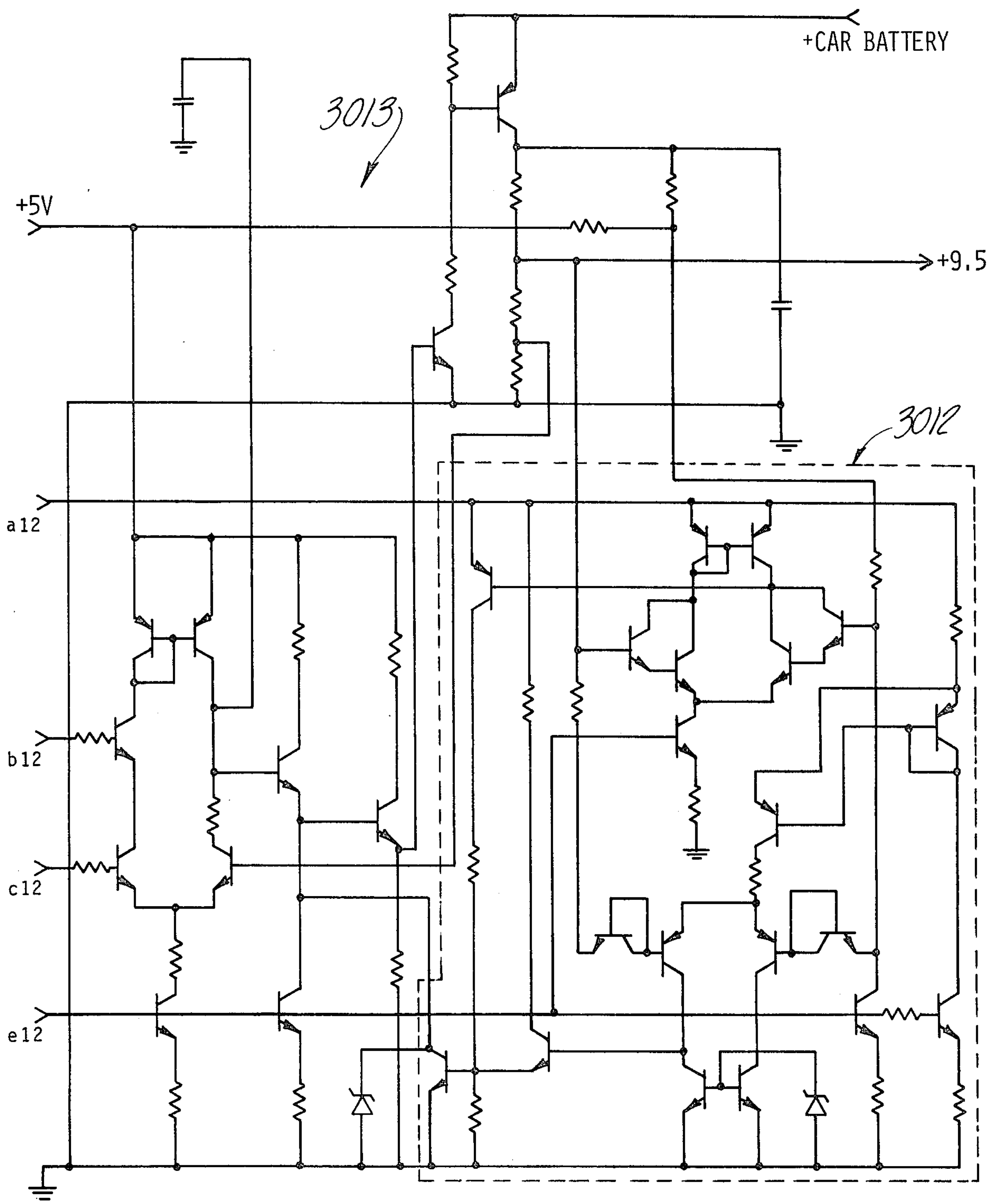
FIG. 7F is an electrical schematic diagram of the +9.5 volt regulator section of the circuit of block 3006 including the 9.5 volt regulator circuitry and the short circuit protection network for the 9.5 volt supply.

The +9 volt section of the regulator of the preferred embodiment of the present invention is shown in FIG. 7F as including a short circuit protection network indicated as that portion enclosed within the dotted block labled 3012 and a +9.5 volt regulator section.

The +9.5 volt regulator section designated by the reference numeral 3013 includes a differential input stage, transistors drivers which are identical to those found in the +5 volt regulator and current sources which has the regulator. The +9.5 volt regulator is run off of the +5 volt regulated voltage so that when the +5 volt regulator shuts down, the +9.5 volt regulator automatically shuts down as well.

The +9.5 volt regulator short circuit protection network represented by the circuitry within the dotted block 2012 includes two complete differential input stages. One of the stages is active when its inputs are high, up to the regulated voltage, and shuts down when its inputs are aground and the other of the two differential input stages is active when its inputs are low, down to ground, and shuts off when its inputs are at the regulated voltage. For any output voltage, one or both of the differential input stages will be active. The short circuit protection circuit is activated when appropriate conditions are sensed for turning on a current transistor which draws current away from the driver transistor stages to limit the output current. The sensing resistor is used to sense excessive output current and this circuit performs of fold-back current-limiting function, as known in the art. The current limit may be changed by varying the value of the sensing resistor and the fold-back slope can be changed by adjusting various resistors and the bias to the differential stages, as known in the art.

In summary, the voltage regulator stages of the preferred embodiment of the invention, as set forth in FIGS. 7E and 7F described hereinabove, use PNP series pass transistors in order to achieve a low input to output offset. The regulator has an adjustable input which sets the supply line voltage below which the regulator automatically shuts down. The unique features of the regulator shown in FIGS. 7E and 7F include the addition of circuitry for automatically adjusting output voltage, providing an adjustable shut down voltage and for establishing a low voltage drop across the series pass elements.

The shut down feature is included to prevent erroneous operation at low voltage supply levels, for example, as in the preferred embodiment of the present invention when the regulators are used to power digital logic controls. The simultaneous use of a low voltage drop control element in conjunction with an adjustable output and an independently or adjustable shut down level greatly increases the efficiency of the regulator, but as set forth hereinabove, any conventional regulated power supply which provides the same or substantially the same features could also be used to power the present system.

7.17 Fuel Management Control Limp Home Circuit

Figure 7G:
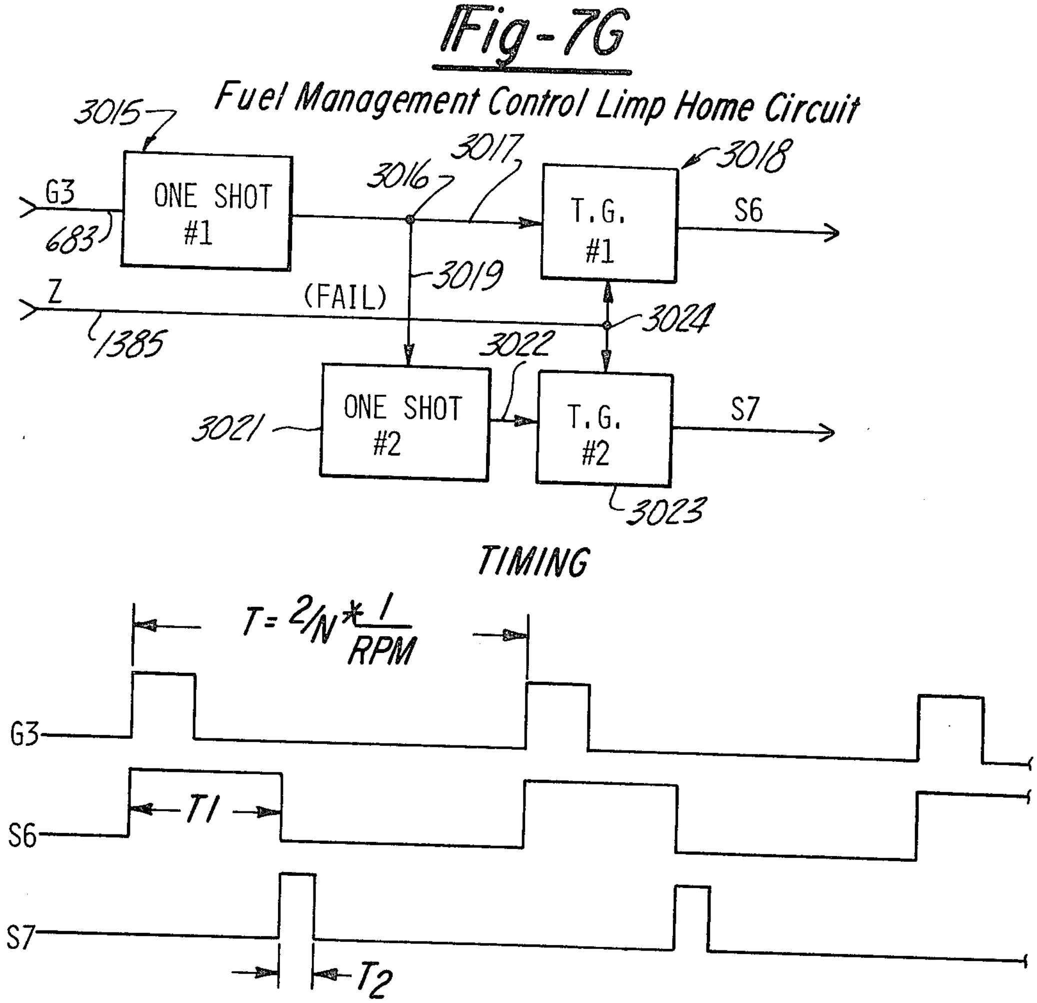
FIG. 7G is an electrical block diagram of the fuel management control limp-home circuit which may be used as one embodiment of or a portion of the get-home circuit of block 135 of FIG. 2.

The limp-home or get-home circuit of block 135 of the microprocessor based electronic engine control system of FIG. 2 could include, for example, the fuel management control limp-home circuit of FIG. 7G. Such a circuit is required to allow the car to be driven a short distance in the event that the fuel injection controllor or carburetor controller for electronically controlled carburetors fails to function. The circuit of FIG. 7G is adapted to produce the fuel pulse control signals S6, S7 which correspond to the control signals S2, S3 or S4, S5 outputted from the electronic fuel pulse control system of FIG. 6L, previously described. If two sets of injectors were used, it will, of course, be understood that two separate circuits could be used but only one is shown in the circuit of FIG. 7G for simplicity sake.

The fuel management control limp-home system of the present invention includes an electronic circuit which can be energized whenever the microprocessor or timing clock or some other portion of the electronics is detected to have failed. The circuit of FIG. 7G responds to the detection of such a failure and, utilizing a minimum number of parts and a minimum number of input signals, it generates sufficient fuel control signals S6, S7 to enable the car to be driven a short distance for repairs and the like.

An engine position pulse, such as the signal G3 which is outputted from the crank shaft position signal condition or circuit of FIG. 4E, as previously described, is supplied via lead 683 to the input of a conventional one-shot multi-vibrator 3015. The engine position pulses G3 derived from the crankshaft position sensor circuit of FIG. 4E are used to control the management since each arriving G3 pulse triggers the one-shot multivibrator 3015. The one-shot 3015 has its output connected directly to a node 3016 and node 3016 is connected via lead 3017 to one AND gate input of a conventional transmission gate 3018 which may be, for example, a Motarola MC14016 device. Simultaneously, the output of the first one-shot multivibrator 3015 is also connected from output node 3016 via lead 3019 to the input of a second one-shot multivibrator 3021. The output of the second one-shot multivibrator 3021 is connected via lead 3022 to the first input of a second transmission gate 3023. A computer or systems failures, such as an MPU failure represented by the signal Z, generated by the watchdog circuit of FIG. 5A5 is supplied via lead 1385 to input node 3024. Node 3024 supplies the fail signal Z to the second input of both transmission gates 3018 and 3023. The output of transmission gate 3018 is connected to output the fuel pulse control signal S6 and the output of transmission gate 3023 is adapted to output the fuel pulse control signal S7 to an appropriate input of either the No. 1 injector driver circuits of FIG. 7C or the No. 2 injector driver circuits of block 3007 of FIG. 7 for outputting the required fuel injector driver signals as described therein.

When a fail indication, such as the signal Z is received, the transmission gates 3018 and 3023 are activated to connect the outputs of the one-shot multivibrators 3015 and 3021, respectively, to the injector driver circuitry of FIG. 7 thereby, allowing the fuel injectors to be energized to deliver fuel to the engine for each EPP signal G3. The time T1 and T2 are fixed and are adjusted to achieve the desired running characteristics of the particular vehicle under consideration.

Typically, T1 will range from two or four milliseconds. T2 is necessary only because the specific driver circuit design described herein whereby, the final portion of the fuel pulse signal is generated by a separate flip-flop and would not otherwise be required. It will be understood that the fuel management control limp-home circuit of FIG. 7G is illustrative of the basic concept of the present invention only and that when, as in the present case, two separate sets of fuel injectures are used, two separate such circuits could be used. Similarly, other arrangements would be obvious from the above description.

7.18 Ignition Limp Home Circuit

The limp-home or get-home circuit of block 135 of the microprocessor based electronic engine control system of FIG. 2 could also include the ignition limp-home circuit of FIG. 7H, either by itself or in conjunction with the fuel management control limp-home circuit of FIG. 7G, discussed hereinabove. Since the system of the present invention employs an electronic engine control system for controlling the timing or firing of the spark plugs in a vehicle, if the electronics should fail, it is important that the driver of the car be able to drive the car at least a short distance for repairs or the like.

In the system of the present invention, a sensor is mounted on the engine which produces an engine position pulse such as G3 which is produced in the crankshaft position signal conditioner circuit of FIG. 4E and outputted therefrom via lead 683 and is inputted to the limp home circuit of the present invention. This G3 pulse is timed so that is occurs at approximately the top-dead-center position of each cylinder. Also, a circuit determines which system has failed by watching for a pulse to occur from the software in a microprocessor based system. A failure indication causes the normal ignition signal TU1 to be disconnected from the system and the "limp house" ignition signal TU2 to be connected instead.

Figure 7H:
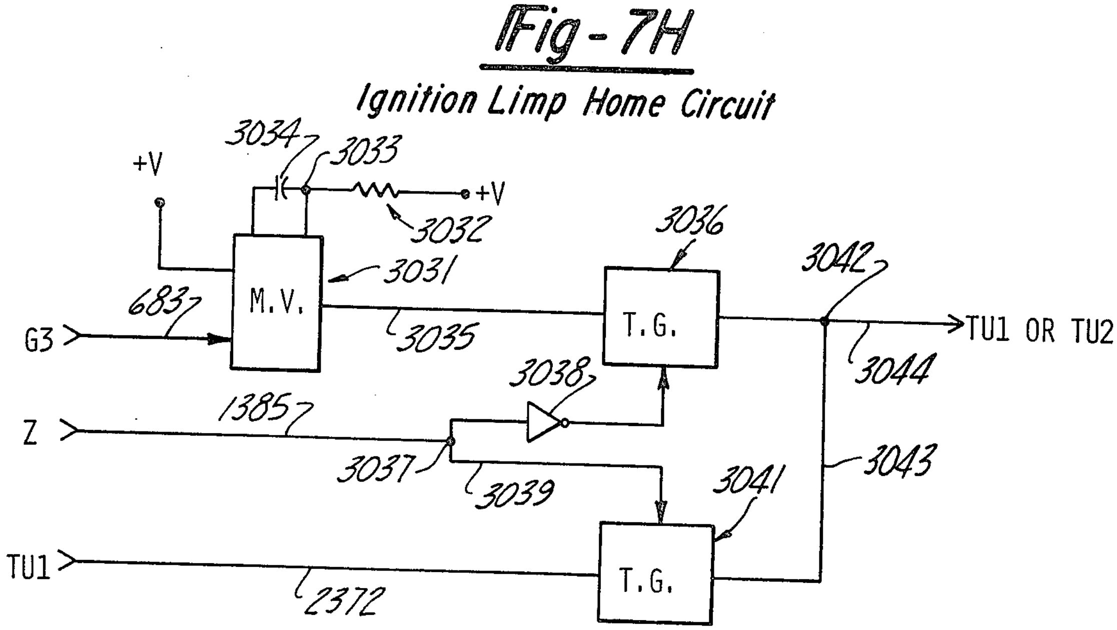
FIG. 7H is an electrical diagram of an ignition limp-home circuit which may be utilized as one embodiment of or a portion of the get-home circuit of block 135 of FIG. 2.

In the circuit of FIG. 7H, the signal G3 is supplied via lead 683 to the input of a conventional CMOS monostable multivibrator, such as a conventional Motarola MC1428AL and which is indicated generally by the reference numeral 3031. A positive source of potential is connected through a resistor 3032 to an input node 3033 and input node 3033 as well as being connected to the conventional input of the multivibrator 3031 is connected to one plate of a capacitor 3034 whose opposite plate is also connected to one input of the multivibrator. The combination of resistor 3032 and capacitor 3034 may be selectively varied to control the duty cycle thereof, as known in the art. The output of the multivibrator is supplied via lead 3035 to one input of a transmission of a conventional transmission gate 3036 such as a conventional Motarola MC14016Al. A microprocessor or electronic system failure signal such as the signal Z generated by the watchdog circuit of FIG. 5A5, as previously described, may be inputted via lead 1385 to an input node 3037. Node 3037 supplies the fail signal Z to the input of an inverter 3038 whose output is connected to the second input of the transmission gate 3036. Simultaneously, the fail signal is supplied from node 3037 via lead 3039 to the second input of a similar transmission gate 3041. The first input of transmission gate 3041 is connected to receive the normally generated ignition control pulses TU1, such as those generated in the ignition control circuit of FIG. 6I and outputted via lead 2382 to the first input of the transmission gate 3041. The output of the first transmission gate 3036 is connected to an output node 3042 while the output of the second transmission gate 3041 is connected via lead 3043 to output node 3042. Node 3042 is connected via lead 3044 to the power amplifier and ignition control driver stages of FIG. 7 for generating the required signal to the ignition coil for operating the sparkplugs to control combustion, as known in the art.

The operation of the ignition limp-home circuit of FIG. 7H is as follows. Each time a predetermined position such as top-dead-center is reached by the engine cylinders, the crankshaft position circuitry will output the signal G3 which may be used to generate or produce a pulse having a predetermined duty cycle or pulse-width controlled by the RC time constant of the combination of resistor 3032 and capacitor 3034, as known in the art. The transmission gates would operate such at in the absence of a failure, the signal Z would be passed via lead 1385, node 3037 and lead 3039 to one input of transmission gate 3041 for enabling it to pass the computer-generated ignition control signals TU1 from the output of the gate 3041 via lead 3043 and to output the signal TU1 from node 3042 via lead 3044 to the appropriate power amplifier and ignition coil driver circuitry of FIG. 7 as previously described. However, whenever a failure is detected causing the signal Z which is normally high to go low, the normal transmission gate 3041 is disabled and when the output of inverter 3038 goes high, the limp-home transmission gate 3036 is enabled to pass the artificially generated limp-home ignition control pulses supplied by the multivibrator 3031 each time the engine position pulse G3 arrives from the output of the gate 3036 to the output node 3042. Therefore, once a failure has been detected, the signal TU2 will be passed from output node 3042 via lead 3044 to the appropriate power amplifier and ignition coil driver circuits of FIG. 7 to insure that the vehicle can continue to function, at least a short distance, in order to reach a place of repair or the like.

It will be realized that the artificially generated limp-home pulses could be set to fire the spark plugs at top-dead-center position which would allow the car to operate sufficiently to get to a repair center but bad enough that the driver would know that something is wrong or that some type of failure has occurred. The delay of the multivibrator will normally be set long enough to allow enough time for the ignition coil to discharge its energy to the spark plugs but still leave enough time to allow the coil to charge back up for the next spark, as known in the art.

8.0 Master Clock Oscillator

The master clock oscillator of block 134 of the microprocessor-based electronic control system of FIG. 2 will now be briefly described with reference to the schematic diagram of FIG. 8. In the embodiment of FIG. 8, a conventional crystal-controlled clock oscillator 3051 which could be, for example, a Motorola MC6875 having a power supply input, a first input $x_b$, $x_a$, and grounding inputs. In the circuit of FIG. 8, the grounding inputs are connected directly to ground via lead 3052 while the $x_a$ and $x_b$ inputs are connected via node 3053 to one terminal of a precision crystal 3054 whose opposite terminal is connected to ground. The first output of the master clock oscillator of FIG. 8 is supplied to an output node 3055 which outputs the first phase master clock signals via the lead designated $H_1$. Node 3055 is also connected to the input of an inverter 3056 whose output is used to supply the inverse of the first master clock phase signals $H_1$, the clock phase signal $\overline{H_1}$ via the output lead so designated. Similarly, the second output of the clock oscillator 3051 is connected directly to an output node 3057 and the second phase master clock signals $H_2$ are outputted via the lead so designated while the node 3057 is also connected to the input of an inverter 3058 which outputs the inverse thereof, the clock signals $\overline{H_2}$ via the output lead having that designation.

It will be understood that any type of precision clock oscillator could be used and in the present invention, the precision crystal controlled clock oscillator 3051 is operated so that each of the clock phase signals $H_1$, $H_2$ is one microsecond in duration but any suitable timing means could be used with the system of the present invention, as known in the art.

9.0 Integrated Circuit Designations

Many of the symbols currently used by those familiar with modern LSI techniques are at first unfamiliar to persons more used to dealing with discrete elements. Therefore, the circuit of FIG. 9 is included to show the read-only memory (ROM) notational scheme indicating the drawing symbol used in the circuits herein, a transistor schematic implementation thereof, and the normal logic symbol customarily associated therewith. The circuits of FIG. 9.1A and 9.1B through 9.30A and 9.30B show, in each case, a logic symbol and often its equivalent in the "A" figure and the preferred circuit implementation corresponding thereto in the "B" figure. Taken together, the circuits of FIG. 9 comprise the basic building blocks which enable anyone of ordinary skill in the art to construct any desired circuit for implementing the function attributed thereto by this application.

10.0 Flow Diagrams

The flow diagrams of FIG. 10 through 10.35 illustrate the preferred embodiment of the control laws and program routines employed in the preferred embodiment of the present invention for performing the various tasks required by the microprocessor for effectively operating the system. Since none of applicants are claiming inventions residing solely within a program, the flow diagrams are included in an attempt to fully disclose the invention in such detail that any programmer of ordinary skill in the art could implement the various control laws, routines and sub-routines set forth therein in any conventionally known language and in any conventional microprocessor or computer.

The flow diagrams may be briefly summarized as follows. Both the fuel management and the ignition timing controls can be thought of as devices which match a set of input variables into the desired value of the output variables. A set of small ROM's containing several breakpoints along the appropriate control curves may be used to approximate the desired curves. Values between these breakpoints can be approximated by a straight line between them and the data from each of these curves can be combined according to appropriate control law equations to get the desired outputs, as known in the art.

The fuel management flow diagrams enable the microprocessor system to compute fuel injector drive pulses whose widths are determined as a function of several engine parameters including manifold absolute pressure (MAP), coolant temperature (Tc), air temperature (Ta), crankshaft speed and revolutions per minute (RPM), throttle angle ($\theta$) and $O_2$ sensor inputs. The pressure, temperature and throttle angle parameters are measured by analog sensors and the hardware circuitry conditions the sensor signals to convert the voltages to pulses with widths proportional to the values read by the sensors. The hardware then converts this pulse-width into a ten bit digital number to be read by the microprocessor. The reciprocal of engine speed RPM is provided as a series of event markers which are also used to synchronize injector pulse deliveries. The fuel management function is accomplished with the base calibration modified by various transient engine operating conditions. The fuel pulse computation is initiated by turning on the starter switch. During cranking, the microprocessor computes the fuel pulse-width based upon MAP and Tc. Basically, the computation involves a linear interpolation between values on the two-dimensional look-up table whose addresses correspond to selected values of manifold pressure and coolant temperature.

After engine start, the based calibration computation, modified for transient conditions, is used. MAP, engine period (1/RPM), and throttle angle are used in a table look-up and interpolation process to determine the basic fuel pulse-width. The pulse-width is modified by factors which account for warm-up of the engine, variations in air temperature, the level of oxygen in the exhaust gas, the condition of the EGR valve, and the possible request for acceleration by the driver.

The fuel pulse is generated once for each engine revolution. Additional fuel pulses occur when the driver first requires acceleration. These pulses are called the acceleration enrichment (AE) tip-in pulses. They are, in the preferred embodiment of the present invention, dependent upon the rate of change of MAP and the coolant temperature. Tip-in pulses occur as soon as possible after the acceleration enrichment request but do not overlap any of the basic fuel pulses. They continue to occur four times each engine revolution (for an eight cylinder engine) until acceleration enrichment is no longer required. The basic fuel management control law is illustrated in the flow diagram of FIG. 10.1. Those of ordinary skill in the art will readily understand the application thereof to the present system.

The timing of the firing of the spark plugs is accomplished as the delay from the previous event marker. Each event marker corresponds to the point where one of the cylinders is at the top of the compression stroke. This is called top-dead-center (TDC). On an eight cylinder engine, there are eight of these markers which occur four per revolution of the engine. In other words, the time to fire the spark plug for cylinder number two is controlled by measuring the delay from top-dead-center of cylinder number one. The ignition timing control law employs two parameters which are computed by the microprocessor software for use by the hardware in ignition timing control. A delay is computed which represents the time interval from an engine cylinder top-dead-center position pulse to the next cylinder spark firing. A pulse time (antidwell) is computed which is the time interval between a spark firing and the energizing of the ignition coil.

The ignition timing computation cycle depends on engine speed. The computation time for the normal microprocessor functions remains relatively constant. The engine period interval, however, varies with engine speed. That is, the higher the RPM, the shorter the computation interval period. For this reason, the ignition timing computations are done four times an engine revolution until the engine speed reaches a particular speed such as 1200 RPMs and then twice a revolution up to a second predetermined speed such as 2400 RPMs and finally, once a revolution up to a third predetermined speed of approximately 4000 RPMs. At speeds greater than this, all computations are done every other engine revolution. Other schemes could also be implemented depending upon computer operating speed, the complexity of the computations, and the like.

The oxygen loop computations provide a method to control the engine exhaust air-fuel ratio. An oxygen factor is computed as the sum of two software integrators, a primary and a second integrator. The primary integrators sums the oxygen analog-to-digital input data after rescaling based on a programmable shift counter. The microprocessor provides for a maximum of a twenty percent change to the fuel pulse. The secondary integrator sums a programmable increment per each primary integrator threshold. It tends to center the primary integrator in its range. The authority of the secondary integrator is programmable up to a maximum of plus or minus forty percent. The hardware of the present system has the capability to handle two separate oxygen sensors and if two sensors are used, the microprocessor software may be altered to cause input of the data from both sensors. This data may be averaged and used with programs for handling inputs from a single sensor or integrated separately, as may be desirable if using two group injection.

In the course of sampling the oxygen sensor inputs, the software causes the hardware to perform a validity check of the sensors for each "N" engine revolutions. A cold or invalid sensor is indicated by a zero input value from the sensor on the cycle following the validity check request.

The oxygen control law or computation sequence is based on inputs from the oxygen sensor. Due to the characteristics of the sensor, the following tests are performed prior to using the sensor inputs. The integrators are inhibited (a) for "N" engine revolutions after the initial start up; (b) until the coolant temperature is greater than a programmable threshold range; (c) if the throttle angle is greater than a programmable threshold; (d) if the hardware oxygen sensor inhibit fit is set; and (e) if the engine RPM is less than a programmable threshold.

The exhaust gas recirculation of function is presently implemented as an on/off function wherein, the EGR valve is either full on or full off and the EGR on/off control is based on coolant temperature and throttle angle. The EGR is turned on when the coolant temperature becomes greater than a programmable threshold value and is turned off when the throttle angle is greater than a programmable threshold and turned back on again when the throttle angle is less than a second programmable threshold. When EGR has been turned off due to throttle angle, a compensating fuel pulse factor is computed as per the flow diagram. With little or no alterations, the data stored in the memory and/or the program may be slightly altered to enable the system to operate a proportional EGR valve as previously described.

The control software of the present system is entirely interrupt driven and the interrupts, in order of priority, are fuel pulse complete interrupts, acceleration enrichment interrupts, and engine position interrupts. The interrupt priority is software determined and all three interrupts may occur at the same time. The interrupt handling routine broadly set forth in FIG. 10.2 must look for and respond to the occurrence of each without masking any of the others, as known in the art. Furthermore, the system may be used to implement the generation of an on/off control signal to operate the fuel pump, as previously described.

Lastly, the various mathematical processes, such as the interpolation process, doubled precision arithmetic, map-in-programmable 'functions, integration, doubled interpolations, and the like are conventional and may be implemented in any number of ways in software suitable for operating the system of the present invention.

It will be understood that the exact nature of the particular control law being implemented by the system and the particular program used to implement that control law are not important to the present invention since no attempt is being made to claim particular programs or routines for implementing particular results. Rather, the present application is usable in any programmed machine for implementing nearly any control law relating to engine parameters such as fuel management, oxygen feedback, exhaust gas recirculation, ignition pulse-width and delay, fuel pump control, and the like, but other control laws could similarly be implemented by the present system without a great deal of change.

Rather than being concerned with particularities, the system of the present invention attempts to utilize the hardware-software inter-action and the interrupt structure of the microprocessor in order to optimize the effectiveness of the system. For example, a major concern in a development of electronic fuel injection control systems is drivability. Part of this problem is the difficulty in obtaining an immediate response to a request for rapid increase in engine speed. A request such as this is of the form of an abrupt increase in manifold pressure, throttle angle, or the like, and the result is a leading fuel charge being delivered to cylinders which induct air from a higher pressure manifold but if received fuel calculated during a lower manifold pressure creating a "stumble" or hesitation which is undesirable to the owners of most of today's automobiles. By using the interrupt structure of the microprocessor base system of the present invention, such requests may be handled by comparator circuitry which senses rapid changes in manifold pressure or throttle angle and in response to this request, additional fuel may be immediately applied or if a fuel charge is being applied at the moment of interrupt, the additional fuel may be applied at the completion of that charge thereby, improving the system drivability without the addition of any extra hardware or any new programs.

It must also be recognized that there is no one ideal set of programmable values but that a look-up table of optimal values can be determined as a function of various engine operating parameters for a particular set of conditions such as a particular type of vehicle, engine, etc., as known in the art. The techniques for experimentally and/or mathematically determining a set of optimal values for mapping into look-up tables or the like is well known in the art. Such tests and measurements are discussed, for example, in U.S. Pat. No. 3,969,614, which is incorporated by reference herein and it will be recognized that once a particular optimal set of values has been determined, various memory sections may be reprogrammed to provide a new set of values if conditions change or different results are required.

It will also be recognized that the desired relationships between the control variables and the sensed conditions are determined generally by experimental methods. At every instant in the operation of an internal combustion engine and over its entire range of operation, there exists optimal settings for controlled variables. The definition of what is optimal is not fixed but, rather depends upon the use to which the engine is put and its state of operation in that particular instance.

To further complicate matters, the control variables are interdependent upon one another and this interdependence and the controlled variables must be taken into consideration when preparing the given look-up tables, but one advantage of this system of the present invention is that the values stored or mapped into the various memory locations can be changed at will to selectively alter the system operation for improving same.

Having described the preferred embodiment of the method and apparatus of the microprocessor-based electronic engine control system of the present invention, and having shown the circuit details for the preferred embodiment thereof, together with timing diagrams, flow charts and the like, it will be understood that the specific examples given are employed in a descriptive sense only, and are not for the purpose of limitation. It will be obvious to those skilled in the art that various modifications to the embodiments, circuit implementations, flow diagrams, control laws implemented, and other modifications and alternatives thereto may be made without departing from the spirit and scope of the present invention which is limited only by the appended claims.

We claim:

1. In an internal combustion engine having an intake system an exhaust system, an engine block, a plurality of cylinders disposed in said engine block, a piston mounted for reciprocal movement in each of said plurality of cylinders in response to the combustion of air shaft responsive to the reciprocation of said pistons in said cylinders for being drivably rotated thereby, throttle means disposed in said intake system for controlling the air flow into said plurality of cylinders, means responsive to a fuel control signal for selectively supplying a controlled quantity of fuel into a selected one or more of said plurality of cylinders, means responsive to an ignition control signal for selectively controlling the time and duration of the ignition of said fuel in said selected one or more of said plurality of cylinders, means coupling said exhaust system to said intake system for establishing an exhaust gas recirculation path therebetween, means disposed at least partially within said recirculation path and responsive to an exhaust gas recirculation control signal for selectively varying the quantity of exhaust gas recirculated from said exhaust system back to said intake system, an improved electronic engine control system comprising:

means for sensing a plurality of selected engine operating parameters and generating a conditioned sensor output signal indicative of the value of each of said sensed plurality of selected engine operating parameters;

means for generating predetermined command signals to control the processing said output signal;

means responsive to said predetermined command signals for converting a selected one of said conditioned sensor output signals indicative of the value of a selected one of said sensed engine operating parameters into one or more digital words indicative thereof;

memory means for storing data representing look-up tables of control command modifier values for use in computing one or more engine control commands and program means for implementing at least one of preprogrammed fuel control law, ignition control law or exhaust gas recirculation control law;

means responsive to said one or more of said digital words representative of the value of said selected engine operating parameters for addressing said memory means for one or more of said stored look-up tables of modifier values;

computing means including means responsive to each of said addressed look-up tables for computing one or more desired modifier values, said computing means further including program execution means for generating said predetermined command signals and for implementing said at least one pre-programmed control law utilizing said computed modifier values for calculating one or more digital command words indicative of a desired control action to be taken for effecting a predetermined engine control function; and means responsive to said one or more digital command words for generating a precisely controlled value of at least a selected one of said fuel control signal for selectively controlling the quantity of fuel supplied to a selected one or more of said plurality of cylinders, said ignition control signal for selectively controlling the time and duration of the ignition of said fuel in said selected one or more of said plurality of cylinders, and said exhaust gas recirculation signal for selectively varying the quantity of exhaust gas recirculated from said exhaust system back to said intake system.

2. In an internal combustion engine having an intake system, an exhaust system, an engine block, a plurality of cylinders disposed in said engine block, a piston disposed in each of said plurality of cylinders and mounted for reciprocal movement within each of said cylinders in response to combustion of fuel and air therein, means associated with at least a predetermined one of said cylinders and responsive to said piston reciprocating therein having attained a predetermined reference position for generating an engine position signal indicative thereof, means responsive to a fuel control signal for selectively controlling the quantity of fuel supplied to a selected one or more of said plurality of cylinders, means responsive to an ignition control signal for selectively controlling the time and duration of the ignition of said fuel in said selected one or more of said plurality of cylinders, an improved microprocessor-based engine control system comprising:

means for sensing a plurality of engine operating parameters and generating sensor output signals indicative of the value thereof;

means for generating command signals for processing said sensor output signals;

means for converting a selected one of said sensor output signals into one or more data words representative thereof in response to said processing signals;

means responsive to one or more of said data words for performing predetermined programmed operations thereon in accordance with pre-programmed fuel control laws and ignition timing laws and for generating digital commands indicative of a desired control action for effecting one or more predetermined engine control functions such as fuel pulse injection or ignition timing, the operation thereof being synchronized to the generation of said engine position signals;

means responsive to said digital commands for controlling the generation of a selected one of said fuel control signal or said ignition timing signal thereby accurately controlling the quantity of fuel supplied to a selected one or more of said plurality of cylinders or the time and duration of fuel ignition therein; and means responsive to said engine position signals for altering the rate at which said digital commands are generated such that certain control functions such as fuel control are up-dated once each revolution until a predetermined engine speed is reached and then once every other revolution thereafter, and other control functions such as ignition timing and the like are updated once every other revolution at low engine speeds and once each revolution after the engine speed reaches a second predetermined level, thereby automatically proportioning the up-dating of said data commands to effectively compensate for changing computing power per engine revolution and hence the number of computations that can be performed per revolution which inherently occur with changes in engine speed.

3. In an internal combustion engine having an engine block, a plurality of cylinders disposed in said engine block, a piston disposed in each of said cylinders and mounted for reciprocal movement therein in response to the combustion of air and fuel in said cylinder, means responsive to a fuel control signal for selectively controlling the supply of fuel into a selected one or more of said plurality of cylinders, means responsive to a digital fuel control command for controlling the generation of said fuel control signal, and an electronic engine control means for implementing a pre-programmed fuel control law to generate said digital fuel control command, the improvement comprising:

external sensing means for generating a signal indicative of the value of engine temperature;

means responsive to said signal indicative of the value of engine temperature for converting said signal into an engine temperature data word representative thereof;

memory means for storing data representative of a look-up table having a predetermined finite number of basic fuel command modifier values representing a continuous control surface having an infinite number of such modifier values;

means responsive to at least said engine temperature data word for addressing said look-up table to obtain at least one predetermined basic fuel command modifier value;

means for interpolating between data representative of said addressed at least one predetermined basic modifier value and the basic modifier values adjacent thereto for accurately computing an optimal modifier value for use by said electronic engine control means in the implementation of said predetermined fuel control law; and program means for implementing said fuel control law to generate said digital fuel control command, said program means being responsive to said accurately computed optimal modifier value for modifying the value of said digital fuel control command to insure the generation of a more accurate engine temperature-compensated digital fuel control command and hence a more accurate engine temperature-compensated fuel control signal thereby insuring a more accurately controlled supply of fuel into said selected one or more cylinders.

4. In an internal combustion engine having an intake system, an exhaust system, an engine block, a plurality of engine cylinders disposed in said engine block, a piston disposed for reciprocal movement within each of said plurality of cylinders, an output shaft responsive to the reciprocation of said pistons within said cylinders in response to the combustion of fuel and air therein for driveably rotating same, means for selectively supplying fuel into one or more of said cylinders, means responsive to an ignition control pulse for controlling the ignition of said fuel in said cylinders, means for sensing a predetermined position of said piston within said cylinder such as top-dead-center or the like for generating engine position pulses and for obtaining an indication of the speed or period of said engine, and a micro-processor-based electronic engine control system including memory means, the improvement in said microprocessor-based electronic engine control system comprising:

memory means for storing data representative of at least one look-up table for establishing a predetermined multi-dimensional control surface representing values of modifier variables;

means responsive to said engine speed or period for addressing said memory means for at least one look-up table and selecting a predetermined modifier variable stored therein;

program means responsive to the addressing of said look-up table memory means for interpolating between said addressed predetermined modifier value and adjacent values for computing an optimal modifier value for use in ignition timing calculations, said program means further including means responsive to said engine speed or period and to said computed optimal modifier values for generating an ignition control word indicative of a predetermined delay interval, said ignition timing being controlled thereby such that said ignition control pulse is initiated at the end of a delay represented by said ignition control word, said program means being further effective for terminating said ignition control pulse after a second predetermined period, thereby controlling the ignition timing of said engine.

5. In an internal combustion engine having an intake system, an exhaust system, an engine block, a plurality of engine cylinders disposed in said engine block, a piston disposed for a reciprocal movement within each of said plurality of cylinders, an output shaft responsive to the reciprocal movement of said pistons within said cylinders in response to the combustion fuel and air therein for drivably rotating same, means for controllably supplying fuel to a selected one or more of said cylinders, sensor means associated with one or more of said pistons or said output shaft for generating engine position pulses indicative of the piston having attained a predetermined position such as top-dead-center or the like, said engine position pulse being generally indicative of engine speed or period, and a microprocessor-based engine control system including a memory means, a means responsive to an ignition control pulse for controlling the ignition of said fuel within said cylinders, the improvement comprising:

memory means for storing data representative of at least one look-up table containing a predetermined finite number of modifier values stored in said memory means for establishing a predetermined at least two dimensional control surface representing an infinite number of modifier values which are a function of at least engine speed or period;

means responsive to at least said engine position pulses or a speed or period value derived therefrom for addressing said look-up table to select one of said finite modifier values therefrom;

program means for interpolating between said one selected modifier value and the addressable values adjacent thereto for computing an optimal modifier value, said program means further including means responsive at last to said accurately computed optimal modifier value for calculating a first digital ignition control word indicative of the pulse-width or duration of said ignition control pulse, said program means further including means responsive to each of said engine position pulses for initiating the start of said ignition control pulse upon receipt thereof for controlling both ignition timing and ignition dwell time.

6. In an internal combustion engine having an engine block, a plurality of cylinders disposed in said engine block, a piston disposed in each of said cylinders and mounted for reciprocal movement in response to the combustion of air and fuel in said cylinder, an output shaft responsive to the reciprocation of said pistons within said cylinders for drivably rotating same, means for selectively controlling the supply of fuel to one or more of said plurality of cylinders, means for generating an ignition pulse for controlling the ignition timing and ignition dwell time and therefore the ignition of said fuel within said cylinders, and a microprocessor-based engine control system for controlling the generation of said ignition pulse, said engine control system further comprising:

sensor means operatively associated with said engine for generating an engine position pulse each time one of said pistons is near the top-dead-center position of its associated cylinder;

program means for computing a first digital ignition control word indicative of ignition delay time and a second digital ignition control word indicative of ignition pulse-width;

means responsive to said first and second digital ignition control words for electronically controlling the generation of said ignition control pulse for ignition timing purposes during normal engine operation; and means for detecting an engine cranking mode of operation for automatically switching the ignition timing from the control of said microprocessor-based engine control system and generating a first command signal; and means responsive to said first command signal for mechanically controlling the generation of said ignition control pulse and therefore ignition timing throughout said cranking mode of operation.

7. The microprocessor-based engine control system of claim 6 wherein said means for detecting an engine cranking mode of operation includes gate means for directing said engine position pulse to the means for generating an ignition pulse and bypassing the microprocessor, and said means for mechanically controlling includes positioning said sensor means relative to said engine to achieve substantially optimum ignition during cranking.

8. A microprocessor-based engine control system for use in an internal combustion engine having means responsive to fuel control commands for supplying a controlled quantity of fuel to said engine, said engine control system comprising means for sensing one or more engine operating parameters and generating a primary fuel command in response thereto, means for monitoring at least one of said engine operating parameters for detecting a need for acceleration enrichment and generating an acceleration enrichment command in response thereto and means responsive to said acceleration enrichment command for generating first an immediate acceleration enrichment fuel command signal and therefore a longer term programmed increase in said primary fuel command for effecting the desired acceleration enrichment.

9. The microprocessor-based engine control system of claim 8 wherein said means for monitoring includes means for detecting when the engine is in the acceleration mode including detecting the rate of change of movement of the fuel control commands, means for generating a trigger signal to the microprocessor indicative of said acceleration mode, and said last named means includes means for deriving an enrichment factor signal in response to said trigger signal.

10. A microprocessor based engine control system for use in internal combustion engines wherein fuel control commands are used to control the quantity of fuel supplied to the engine, said engine control system comprising a microprocessor, a memory means associated with said microprocessor, program means stored in said memory for controlling said microprocessor to implement a particular fuel control law including data representing a look-up table of modifier values which are a function of engine temperature stored in said memory means, means for measuring engine temperature and addressing said memory means look-up table to obtain one of a finite number of pre-programmed modifier values therefrom, means for interpolating between said addressed one of a finite number of stored modifier values and adjacent stored values for computing an accurate engine temperature modifier value, said program means being responsive to said computed engine temperature modifier value in implementing said fuel control law for generating a highly precise engine temperature-compensated fuel control demand.

11. A microprocessor-based engine control system wherein fuel is supplied to one or more cylinders of an engine and the ignition of said fuel therein is controlled, said engine control system comprising a microprocessor, a memory means associated with said microprocessor a look-up table of modifier values stored in said memory means, means for sensing engine speed and generating a data word indicative thereof, means responsive to said data word for addressing said memory means look-up table and obtaining an addressed modifier value, means for interpolating between said addressed modifier value and adjacent stored values computing an accurate ignition dwell time modifier, and program means stored in said memory means for operating said microprocessor, said program means being responsive to one or more engine operating parameters and to said ignition dwell time modifier value for computing an ignition pulse-width digital word, and means responsive to said digital word for controlling the ignition dwell time of said system.

12. A microprocessor-based engine control system for use in an internal combustion engine of the type having means for supplying a controlled quantity of fuel to the engine in response to a fuel control signal, means for igniting the fuel supplied to the engine in response to an ignition control signal, and means for controlling the recirculation of exhaust gases from the exhaust manifold of said engine back to the intake manifold in response to an EGR control signal, said microprocessor-based engine control system comprising:

means for sensing a plurality of engine operating parameters such as manifold absolute pressure, air temperature, engine coolant temperature, throttle position, EGR valve position, the concentration of oxygen in the exhaust system of said engine and the like and for generating a conditioned output signal indicative thereof;

analog-to-digital converter means including means for converting each of said conditioned sensor output signals into a corresponding DC voltage level;

a microprocessor system including memory means and program means for implementing various control laws, arithematic functions and the like and for generating various sets of computer control signals;

multiplexer means responsive to first computer control signals for selecting a predetermined one of said DC voltage levels;

pulse-width to binary converter means responsive to said selected one of said DC voltage levels for generating a pulse-width indicative of said selected level and converting same into a binary number indicative thereof, said pulse-width to binary converter means being responsive to second computer control signals for transmitting said binary number to said microprocessor system;

means responsive to the speed or period of said engine for generating various engine pulse position signals indicative thereof;

program means within said multiprocessor for utilizing said received binary words to calculate digital control words in accordance with pre-programmed look-up tables, control laws, and data supplied thereto;

a plurality of serial shift registers associated with predetermined control functions;

parallel to serial converter means responsive to third computer control signals for receiving said digital control word in parallel from said microprocessor and serially transferring said control word into a selected one of said shift registers;

means for detecting a plurality of system conditions and generating interrupt signals in response thereto, said interrupt signals being transmitted to said microprocessor unit for use therein;

means associated with said serial shift registers for converting said binary values stored therein into a pulse-width output signal; and means responsive to predetermined ones of said pulse width output signals for generating said fuel control pulse, said ignition control pulse and said EGR control pulse for controlling the operation of the said internal combustion engine.

13. In an engine system having an internal combustion engine, a plurality of cylinders in said internal combustion engine, a piston mounted for reciprocal motion within each of said plurality of cylinders in response to the combustion of fuel therein, an output shaft operatively coupled to said piston and rotatably driven by the reciprocation of said pistons within said cylinders, at least one fuel injector means responsive to a fuel control pulse for injecting a controlled quantity of fuel into a selected one or more of said plurality of cylinders for combustion therein, at least one ignition means responsive to an ignition control signal for selectively controlling the timing and duration of ignition of said injected fuel within said cylinder, an improved electronic engine control system comprising:

computer means;

memory means operatively coupled to said computer means for storing data representative of a plurality of look-up tables representing multi-dimensional control surfaces of modifier values which are functions of at least one engine operating parameter;

first program data means stored in said memory means for implementing a predetermined fuel control law when executed by said computer means;

means for sensing a plurality of real time engine operating parameters, at least one of said engine operating parameters being a function of engine speed, and for generating digital words indicative of the actual measured value of said sensed engine operating parameter;

means for generating command signals for processing data in said computer;

second program means executable by said computer means in response to said command signals for utilizing said digital words indicative of the actual measured value of said sensed engine operating parameter for addressing said memory means for a predetermined value stored in said look-up table in said memory means and for interpolating between said predetermined stored value and addressable stored values adjacent thereto to compute an interpolated control surface value for use in executing said fuel control law to generate a compensated fuel control digital command; and means responsive to said fuel control digital command for generating said fuel control pulse to operate said at least one fuel injector means, the duration of said fuel control pulse determining the specific quantity of fuel to be injected into said selected one or more of said plurality of cylinders.

14. The system of claim 13 wherein said means responsive to said fuel control digital command for generating said fuel control pulse includes two separate and distinct circuit means for generating first and second separate non-overlapping, electrical pulses, the initiation of said second electrical pulse being coincident with the end of said first electrical pulse to produce a single uninterrupted fuel control pulse.

15. The system of claim 13 wherein said sensing means includes means for sensing engine temperature and generating a first digital word indicative thereof, means for sensing manifold absolute pressure and generating a second digital word representative thereof, said plurality of look-up tables stored in said memory means including at least one look-up table representing a multi-dimensional control surface of temperature modifier values for use in more accurately implementing said fuel control law, said at least one look-up table of temperature modifier values being a function of engine temperature and manifold absolute pressure and being addressable by said first and second digital words such that said second program means is executed by said computer means for interpolating between the control surface comprising said temperature modifier values for calculating an optimal temperature modifier value corresponding to said actual readings of temperature and manifold absolute pressure, said computer means executing said first program means and utilizing said optimal temperature modifier value in implementing said pre-programmed fuel control law for more accurately computing a compensated value for said fuel control digital command.

16. The system of claim 13 further including means responsive to at least one of said real time sensed engine operating parameters for anticipating a need for acceleration enrichment and generating an acceleration enrichment command signal indicative thereof, said computer means being responsive to said acceleration enrichment command signal for implementing said first program means to compute (1) a first initial and immediate one-time special fuel control digital command for immediate acceleration enrichment purposes and then (2) a longer time, more gradual programmed increase in said fuel control digital command computed by said first program means as it implements said fuel control law under the direction of said computer means.

17. The system of claim 16 wherein said means responsive to said fuel control digital command for generating said fuel control pulse includes a single circuit means for generating the total fuel control pulse from both said first initial and immediate one-time special acceleration enrichment fuel control digital command and from said second longer time, more gradual programmed increase in said normally generated fuel control digital command.

18. In an engine system having an internal combustion engine, a plurality of cylinders in said internal combustion engine, a piston mounted for reciprocal motion within each of said plurality of cylinders in response to the combustion of fuel therein, an output shaft operatively coupled to said piston and rotatably driven by the reciprocation of said pistons within said cylinders, at least one fuel injector means responsive to a fuel control pulse for injecting a controlled quantity of fuel into a selected one or more of said plurality of cylinders for combustion therein, at least one ignition means responsive to an ignition control signal for selectively controlling the timing and duration of ignition of said injected fuel within said cylinder, an improved electronic engine control system comprising:

computer means;

memory means operatively coupled to said computer means for storing data representative of a plurality of look-up tables representing multi-dimensional control surfaces of modifier values which are a function of at least one engine operating parameter;

program means stored in said memory means for implementing a predetermined ignition control signal calculation when executed by said computer means;

means for sensing a plurality of real time engine operating parameters at least one of which is a function of degrees of engine revolution for establishing a reference position for piston whose associated cylinder is to have the injected fuel ignited therein and for generating a reference position pulse indicative thereof;

means for generating command signals for processing data in said computer means;

said computer means executing said program means in response to said command signals for computing a first digital word indicative of a calculated delay time from the receipt of said reference pulse until ignition is to occur and a second separate and distinct digital word indicative of the duration of ignition of said fuel injected into said cylinder.

19. The system of claim 18 wherein said means for generating said ignition control signal further includes means responsive to the occurrence of the next successive reference pulse for generating said ignition control signal even if said predetermined delay period from the receipt of said previous reference position pulse has not yet elapsed to enable smoother acceleration and the like.

20. The system of claim 18 wherein said means for generating said ignition control signal further includes means for initiating said ignition control pulse upon the occurrence of each successive reference position pulse whenever said engine is in a cranking mode of operation such as during warm-up or the like.

21. In combination with an internal combustion engine of the type having an engine block, a plurality of cylinders located in said engine block, a plurality of pistons each mounted in a respective cylinder for reciprocating movement therein, an output shaft operatively coupled to said plurality of pistons and rotatable upon the reciprocation of each of said pistons within said cylinders, an intake manifold common to all of said plurality of cylinders, said intake manifold having an opening therein for receiving air and means disposed within said opening for selectively varying the effective size of said opening, means for supplying fuel to a selected one or more of said plurality of engine cylinders, said fuel supply means including a fuel pump and at least one electromagnetically operated fuel injector valve adapted to operate in response to a fuel control signal, means for igniting the fuel supplied to said selected one or more of said plurality of engine cylinders, said fuel igniting means being responsive to an ignition control signal for controlling the timing and duration of admission of the fuel injected into said selected one or more of said plurality of engine cylinders, and an electrical system for controlling the operation of said fuel supply means and said igniter means to cause the combustion of fuel and air in each of said plurality of engine cylinders and thereby cause said pistons to reciprocate within said cylinders to rotate said output shaft, the improvement in said electrical system comprising:

means for sensing various engine operating parameters on a real time basis and for producing a corresponding plurality of digital signals indicative thereof, at least one of said digital signals representing operator-commanded changes in the size of said opening in said manifold intake;

means for generating said fuel control signal for controlling the operation of said fuel supply means in response to said plurality of digital signals, said fuel control signal generated means including means for receiving and processing said plurality of digital signals from said sensing means, said processing means including a digital data processor operating under the control of a program to convert said plurality of digital signals into a first electrical control signal for operating said fuel pump and controlling the supply of fuel to said fuel injection means, a second electrical control signal for opening said fuel injector valve for a predetermined time interval T1 for a given predetermined revolution of said output crankshaft, means responsive to said one of said digital signals representing a change in the effective size of said opening for anticipating an operator-commanded acceleration enrichment request and generating a fourth electrical control signal indicative thereof, a fourth electrical control signal responsive to said third electrical control signal for opening said fuel injector valve for at least one additional time interval T2 for each predetermined revolution period of said output shaft to increase the amount of fuel supplied to a selected one or more of said plurality of engine cylinders for acceleration enrichment purposes and then increase the rotational speed of said output shaft, another of said plurality of digital signals being representative of a sensed engine operating parameter indicative of one or more of said pistons having reached a predetermined reference position for generating successive engine position pulses, means responsive to the receipt of an engine position pulse for counting a delay time therefrom prior to generating said ignition control signal and causing the combustion of injected fuel within said selected one or more of said plurality of said cylinders, and means normally responsive to the end of said predetermined delay time interval for generating said ignition control pulse for a time interval T3 whose duration controls the time of combustion of said injected fuel within said selected engine cylinder.

22. The system of claim 21 wherein said means normally responsive to the termination of said predetermined delay count for automatically initiating the generation of said ignition control pulse upon the occurrence of the next successive engine position pulse regardless of the state of said delay counter whenever acceleration has been requested, the engine is in the cranking mode of operation, and the like.

* * * * *